United States Patent [19]

Andros et al.

[11] Patent Number: 5,047,764

[45] Date of Patent: Sep. 10, 1991

[54] PAGING SYSTEM WITH DYNAMICALLY PROGRAMMABLE RECEPTION FREQUENCIES

[75] Inventors: Andrew A. Andros, Spring, Tex.; Thomas J. Campana, Jr., Chicago, Ill.

[73] Assignee: Telefind Corporation, Coral Gables, Fla.

[21] Appl. No.: 429,615

[22] Filed: Oct. 31, 1989

Related U.S. Application Data

[63] Continuation-in-part of Ser. No. 158,931, Feb. 22, 1988, Pat. No. 4,881,073.

[51] Int. Cl.[5] .............. H04Q 7/00

[52] U.S. Cl. .............. 340/825.440; 455/56; 379/56

[58] Field of Search .......... 340/311.1, 825.44, 825.47, 340/825.48; 379/57, 60, 63, 56, 58, 59; 455/31, 33, 34, 56, 71, 53, 54, 68, 70

[56] References Cited

U.S. PATENT DOCUMENTS

| | | | |
|---|---|---|---|
| 3,663,762 | 5/1972 | Joel, Jr. | 379/60 |
| 3,906,166 | 9/1975 | Cooper et al. | 379/60 |
| 4,122,257 | 9/1975 | Frost | 379/60 |
| 4,155,040 | 5/1979 | Harmon et al. | 455/62 |
| 4,422,071 | 12/1983 | de Graff | 340/825.44 |
| 4,613,990 | 9/1986 | Halpern | 379/60 |
| 4,644,347 | 2/1987 | Lucas et al. | 340/825.44 |
| 4,644,351 | 2/1987 | Zabarsky | 455/33 |
| 4,713,808 | 12/1987 | Gaskill et al. | 340/825.44 |
| 4,839,641 | 6/1989 | Mori et al. | 340/825.47 |

*Primary Examiner*—Donald J. Yusko
*Assistant Examiner*—Edwin C. Holloway, III
*Attorney, Agent, or Firm*—Antonelli, Terry, Stout & Kraus

[57] ABSTRACT

A paging network is disclosed which utilizes a plurality of distributed switches to transmit pages on a non-real time basis to achieve efficient and low cost transmission. Each of the switches processes packets of pages received from the network. Each of the switches also processes pages into packets of pages to be transmitted to another switch in the network or into batches of pages to be transmitted by a local paging service if the switch is a local switch. The network dynamically programs the reception channel(s) of the paging receivers in response to traffic conditions of a local switch or in accordance with service options specified by a subscriber to a local paging service. The digits of the paging receiver identification code are transmitted in an order of increasing significance to conserve battery life of the paging receivers. Pages may be initiated by placing a local call to any lata switch in the network and service options may be varied by placing of a local call to a lata switch.

50 Claims, 42 Drawing Sheets

FIG. 25A

DATA BOARD MEMORY MAP

| | |
|---|---|
| FFFF<br>C000 | 16K EPROM |

| | | | | |
|---|---|---|---|---|
| BFFF | | A011 | SERIAL INTERFACE CONTROL REGISTER (SICR) | |
| A01F | ERROR CONTROL REGISTER (ECR) | A010 | SERIAL INTERFACE STATUS REGISTER (SISR) | MPCC 2 |
| A01E | CLOCK CONTROL REGISTER (CCR) | A00D | TRANSMITTER INTERRUPT ENABLE REGISTER (TIER) | |
| A01D | BAUD RATE DIVIDER REGISTER 2 (BRDR2) | A00A | TRANSMITTER DATA REGISTER (TDR) | |
| A01C | BAUD RATE DIVIDER REGISTER 1 (BRDR1) | A009 | TRANSMITTER CONTROL REGISTER (TCR) | |
| A01B | ADDRESS REGISTER 2 (AR2) | A008 | TRANSMITTER STATUS REGISTER (TSR) | |
| A01A | ADDRESS REGISTER 1 (AR1) | A005 | RECEIVER INTERRUPT ENABLE REGISTER (RIER) | |
| A019 | PROTOCOL SELECT REGISTER 2 (PSR2) | A002 | RECEIVER DATA REGISTER (RCR) | |
| A018 | PROTOCOL SELECT REGISTER 1 (PSR1) | A001 | RECEIVER CONTROL REGISTER (RCR) | |
| A015 | SERIAL INTERRUPT ENABLE REGISTER (SIER) | A000 | RECEIVER STATUS REGISTER (RSR) | |

| | | |
|---|---|---|
| 9FFF | | |
| 8003 | WRITE TO 06 MODEM STATUS | |
| 8002 | | WRITE TO PC REGISTERS |
| 8001 | WRITE TO 02 INTTERRUPT STATUS | |
| 8000 | WRITE RX DATA | |
| | | READ PC REGISTERS |

| | | |
|---|---|---|
| 7FFF | | |
| 6003 | | D2 TX LATCH HAS DATA |
| 6002 | READ INTERRUPT | D1 RX LATCH FULL |
| 6001 | READ INTERRUPT COMMANDS | D0 INT ENABLE LATCH HAS DATA |
| 6000 | READ TX DATA | |

| | | |
|---|---|---|
| 5FFF | | |
| 401F | ERROR CONTROL REGISTER (ECR) | |
| 401E | CLOCK CONTROL REGISTER (CCR) | |
| 401D | BAUD RATE DIVIDER REGISTER 2 (BRDR2) | |
| 401C | BAUD RATE DIVIDER REGISTER 1 (BRDR1) | MPCC 1 |
| 401B | ADDRESS REGISTER 2 (AR2) | |
| 401A | ADDRESS REGISTER 1 (AR1) | |
| 4019 | PROTOCOL SELECT REGISTER 2 (PSR2) | |
| 4018 | PROTOCOL SELECT REGISTER 1 (PSR1) | |
| 4015 | SERIAL INTERRUPT ENABLE REGISTER (SIER) | |
| 4011 | SERIAL INTERFACE CONTROL REGISTER (SICR) | |
| 4010 | SERIAL INTERFACE STATUS REGISTER (SISR) | |
| 400D | TRANSMITTER INTERRUPT ENABLE REGISTER (TIER) | |
| 400A | TRANSMITTER DATA REGISTER (TDR) | |
| 4009 | TRANSMITTER CONTROL REGISTER (TCR) | |
| 4008 | TRANSMITTER STATUS REGISTER (TSR) | |
| 4005 | RECEIVER INTERRUPT ENABLE REGISTER (RIER) | |
| 4002 | RECEIVER DATA REGISTER (RCR) | |
| 4001 | RECEIVER CONTROL REGISTER (RCR) | |
| 4000 | RECEIVER STATUS REGISTER (RSR) | |

| | |
|---|---|
| 3FFF<br>2000 | 8K RAM MEMORY |

| | |
|---|---|
| 1FFF<br>0000 | 8K RAM MEMORY |

DATA PORT DB25 PINOUTS

PIN 1
PIN 2 FORWARD CHANNEL TX AUDIO
PIN 3
PIN 4 FORWARD CHANNEL TX AUDIO
PIN 5
PIN 6 FORWARD CHANNEL RX AUDIO
PIN 7
PIN 8 FORWARD CHANNEL RX AUDIO
PIN 9
PIN 10 FORWARD CHANNEL "E" LEAD
PIN 11
PIN 12 FORWARD CHANNEL "M" LEAD
PIN 13
PIN 14 RECEIVE CHANNEL TX AUDIO
PIN 15
PIN 16 RECEIVE CHANNEL TX AUDIO
PIN 17
PIN 18 RECEIVE CHANNEL RX AUDIO
PIN 19
PIN 20 RECEIVE CHANNEL RX AUDIO
PIN 21
PIN 22 RECEIVE CHANNEL "E" LEAD
PIN 23
PIN 24 RECEIVE CHANNEL "M" LEAD
PIN 25

FIG. 25B

PROTOCOLS AVAILABLE:
CCITT X.25
IBM BINARY SYNCHRONOUS COMMUNICATIONS (BSC) IN ASCII OR EBCDIC
SIX BIT BSC, X3.28, ISO IS1745, ECMA-16.
SYNCHRONOUS BIT ORIENTED PROTOCOLS (BOP) ,SDLC,HDLC, X.25.
SELECTABLE PARITY (ENABLE , ODD ,EVEN ) AND CRC.
PARITY CRC-16 ,CCITT U.41 ,URC /LRC .
SOFTWARE SELECTABLE HALF-FULL DUPLEX , AUTOECHO MODES.
ASYNCHRONOUS AND ISOCHRONOUS MODES.
STAR OR RING CONFIGURATION
DUAL CHANNEL DIRECTIONAL LOOP OPERATION WITH LOOP MONITORING
POWER FAIL BYPASS OPERATION WITH LOOP OPERATION.
BOARD EMULATES PC SERIAL PORT.
BOARD CONTINUES TO OPERATE WHEN PC IS OFF LINE.
BOARD BUFFERS RECEIVED DATA DURING OFF LINE.

STRAP AND ADDRESS DETAILS

STRAPS ARE LOCATED ON BOARD TO ALLOW OPERATION
ON COMM. 1 TO 4 OPERATION

THE FOLLOWING REGISTERS ARE AVAILABLE:
COMM. 1 3F8, 3F9, 3FA, 3FD, 3FE
COMM. 2 2FX
COMM. 3 3EX
COMM. 4 2EX

PAGING SYSTEM WITH DYNAMICALLY PROGRAMMABLE RECEPTION FREQUENCIES

CROSS REFERENCE TO RELATED APPLICATIONS

This application is a Continuation-In-Part of U.S. application Ser. No. 158,931, now U.S. Pat. No. 4,881,073, filed Feb. 22, 1988 which is incorporated herein in its entirety.

Reference is made to the following U.S. patent applications:

1. U.S. patent application Ser. No. 110,514, entitled "Paging Receiver With Continuously Tunable Antenna" which was filed on Oct. 20, 1987, now U.S. Pat. No. 4,851,830.

2. U.S. patent application Ser. No. 110,658, entitled "Paging Receiver With Programmable Areas of Reception" which was filed on Oct. 20, 1987, abandoned in view of Continuing application Ser. No. 355,851 which is now U.S. Pat. No. 4,935,732.

3. U.S. patent application Ser. No. 110,511, entitled "Paging Receiver With Paging Receiver Identification Code Digits Transmitted In Order of Increasing Significance" which was filed on Oct. 20, 1987, now U.S. Pat. No. 4,857,915.

4. U.S. patent application Ser. No. 110,664, entitled "Paging Receiver With Dynamically Programmable Functionality" which was filed on Oct. 20, 1987, now U.S. Pat. No. 4,849,750.

5. U.S. patent application Ser. No. 110,522, entitled "Paging Receiver Displaying Place of Origin of Pages" which was filed on Oct. 20, 1987, now U.S. Pat. No. 4,853,688.

6. U.S. patent application Ser. No. 110,512, entitled "Paging Receiver For Receiving Pages From Analog or Digital Paging Transmitters" which was filed on Oct. 20, 1987, now U.S. Pat. No. 4,928,100.

7. U.S. patent application Ser. No. 158,984, entitled "Paging System" which was filed on Feb. 22, 1988, how U.S. Pat. No. 4,868,562.

8. U.S. patent application Ser. No. 158,716, entitled "Paging System Local Switch" which was filed on Feb. 22, 1988, now U.S. Pat. No. 4,870,410.

9. U.S. patent application Ser. No. 158,937, entitled "Paging System Lata Switch" which was filed on Feb. 22, 1988, now U.S. Pat. No. 4,868,558.

10. U.S. patent application Ser. No. 158,584, entitled "Paging System Hub Switch" which was filed on Feb. 22, 1988, now U.S. Pat. No. 4,866,431.

11. U.S. patent application Ser. No. 158,982, entitled "Paging System With Commands For Changing Functionality of a Paging Receiver" which was filed on Feb. 22, 1988, now U.S. Pat. No. 4,878,051.

12. U.S. patent application Ser. No. 158,983, entitled "Paging System For Entering Pages By Local Telephone Call" which was filed on Feb. 22, 1988, now U.S. Pat. No. 4,868,860.

13. U.S. patent application Ser. No. 158,981, entitled "Paging System With Transmission Protocol Compatible With Analog and Digital Transmitters" which was filed on Feb. 22, 1988, now U.S. Pat. No. 4,875,039.

14. U.S. patent application Ser. No. 158,950, entitled "Paging System Sublocal Switch" which was filed on Feb. 22, 1988, now U.S. Pat. No. 4,876,538.

15. U.S. patent application Ser. No. 329,543, entitled "Paging Receiver With Continuously Tunable Antenna and RF Amplifier" which was filed on Mar. 28, 1989, now U.S. Pat. No. 5,012,235.

16. U.S. patent application Ser. No. 381,483, entitled "Paging Receiver With Continuously Tunable Antenna and RF Amplifier" which was filed on July 18, 1989.

17. U.S. patent application Ser. No. 381,527, entitled "Paging Receiver With Continuously Tunable Antenna" which was filed on July 18, 1989.

18. Allowed U.S. patent application Ser. No. 409,390, entitled "Paging System" which was filed on Sept. 19, 1989.

19. Allowed U.S. patent application Ser. No. 409,605, entitled "Paging System For Entering Pages By Local Telephone Call" which was filed on Sept. 19, 1989.

APPENDIX

An Appendix containing a hexadecimal code listing of the programs used by the sublocal, local, lata and hub switch processors used with the present invention containing 267 pages is attached hereto. The program is written in assembly language. of the Intel 80286 microprocessor. The Appendix contains subject matter which is copyrighted. A limited license is granted to any one who requires a copy of the program disclosed therein for purposes of understanding or analyzing the present invention, but no license is granted to make a copy for any other purpose, including the loading of a computer with code in any form or language.

BACKGROUND OF THE INVENTION

1. Field of the Invention

The present invention relates to paging systems.

2. Description of the Prior Art

Paging systems are in use throughout the world. There are paging systems which transmit pages from satellite transmitters to different cities. An example of such a system is that operated by National Satellite Paging which transmits only pages consisting of numeric characters. A system operated by Metrocast transmits pages to any city within the system through a serial communication link between the cities. The Metrocast system has a central switch which includes all of the subscriber files and a plurality of local switches which are located in separate geographic locations that are connected together by the serial communication link. In the Metrocast system, pages transmitted locally by a single paging service are exclusively made by calling into the city where the page is to be made by a local telephone call. A page to be made on a regional basis involving transmission of pages between two or more locations is called in by an 800 number telephone call to a central facility in San Diego from which the page is transmitted to the city where the page is to be broadcast by the serial communication link. The page is received from the communication link at the city where it is to be broadcast and then broadcast locally by an existing paging service to transmit the page to the person to be paged. In the Metrocast system, the pages are transmitted from the central switch with an address of a switch in a remote location which is to receive the page. All of the intermediate local switches between the central switch and the remote switch which is to receive the page function to relay the pages to the remote switch. The pages are transmitted in one direction along the serial communication link which functions as a loop beginning and ending at the central switch. Each intermediate switch located along the serial communication link removes pages which are addressed to it. However, the intermediate switches do not disassemble the pages and reassemble the pages and add pages thereto originating at the intermediate switches for transmission to other switches along the serial communication link.

BBL Industries manufactures a digital linking module which connects multiple switches together to form a regional paging network. This system transmits individual pages between the switches over a dedicated communication link. The subscriber file is located at the switch originating the page. The remaining switches function only to remove pages which are addressed to them and do not modify the pages. Pages must be originated by called the switch with the subscriber file.

Paging systems currently in use in the United States maintain subscriber identification information used for making pages transmitted between multiple switches at a single location. In Metrocast, the central switch in San Diego stores the subscriber information in a file which includes the destination(s) of pages for each subscriber. Local paging services which service a single area also maintain a subscriber file at a central location.

Subscriber files contain a subscriber identification number which is a unique identification of the subscriber within the system, whether national or local in nature. The subscriber identification number also functions as the address of the paging receiver of the subscriber and is broadcast with each page that is addressed to the paging receiver of the subscriber. Furthermore, the subscriber file stores the type of service that each subscriber is to have provided when the paging service receives a request for a page. Paging systems rely on the subscriber file to provide the information necessary to provide the type of service that each subscriber requires upon receipt of a request for a page and do not require the requester of a page to know anything other than the identification number of the party being paged and the page itself.

Currently, subscriber files do not store subscriber identification numbers which have a geographic significance regarding the location of the subscriber local paging service within an overall system. Moreover, current paging systems do not process the subscriber identification number to determine a subscriber local paging service location which stores the subscriber file of the subscriber when pages are made which originate outside of the area of the subscribers' local paging service. Current paging systems do not transmit requests for pages originating outside the local paging service providing local service to the subscriber to the local paging service to determine the type of service and the destination of the page by using the network to transmit the request to the local paging service. To place a page from a geographic area outside of the subscribers' local paging service area, current systems require an 800 type call (Metrocast) or a long-distance phone call to be made. Current paging systems do not permit a local call to be used for originating a request for a page from outside the service area of the local paging service, such as requesting a page in Washington, D.C., while being located in New York by making a local phone call to a location in New York.

To date, there is no existing national paging system which substantially covers the geographical United States with reliable service. Because of the cost of hardware, a system like the Metrocast system is not economical in small cities or rural areas where the paging volume is relatively low. Accordingly, while the objective of achieving nationwide paging has been attempted for many years, no existing system integrates local and national paging substantially throughout the geographical United States or throughout the world. The vast majority of paging systems operate totally locally with each system having a limited functionality because of their inability to effectively deliver regional or national (non-local) paging.

Most paging receivers are tuned to receive only a single channel which inherently limits their usage at times when heavy paging conditions exist in a local paging system and further prevents usage in other geographical locations where other channels are used.

Typically, each existing paging system has unique specifications which prevent operation of its paging receivers in other systems. For example, the paging receiver identification codes are not universal. Furthermore, existing paging receivers only receive pages from a single type of transmitter (analog or digital). As a result of paging receivers differing in design and operation, the cost of paging receivers is higher as a result of smaller manufacturing volumes than would be realized if a single paging receiver was usable for a worldwide network.

Paging services which provide a service area that is not limited to a local paging service area (pages involving more than one switch) transmit on a single channel or cyclically on a band of closely related channels.

It is estimated that 25% of the paging receivers in use in the United States are serviced by private paging systems and services (non-common carrier). The private municipal paging system 384, private hospital paging system 386, stock quote service 388, and other private systems 374 illustrated in FIG. 28 are representative of the prior art private paging systems and services. These prior art systems and services have not been integrated with common carrier local paging services as illustrated in accordance with the present invention in FIG. 28 or into a paging network as illustrated in accordance with the present invention in FIG. 1. Paging receivers encompassing both private and common carrier multiple paging frequencies have not been available to date. The transmitters of non-common carrier systems and services have lower broadcast power than the transmitters of common carrier paging systems, and therefore have a limited range in comparison with common carrier systems. As a result, there is a lack of continuity in service range provided by non-common carrier systems and services when a comparison is made to common carrier local paging services. Moreover, the lack of continuity in the range of service provided by private paging systems and services causes persons wishing to receive paging service from common carriers and private non-common carrier systems and services to carry multiple paging receivers creating at least an inconvenience for the user and additional expense in purchasing multiple paging services.

While current paging services providing paging involving transmission of pages between multiple switches have a distributed network of switches, they do not utilize the distributed switches to maximize the efficiency of transmission of pages within a local service area and outside of the local service area. These systems control the transmission of pages between switches by sorting of the pages at the originating central switch where the subscriber file is located. The pages are not further sorted and packetized during their transmission at intermediate switches located between the originating central switch and the destination switch which limits the efficiency of transmission that could be achieved by a system in which the pages at intermediate switches are sorted, buffered and combined with new pages that originate at the intermediate switches that are to be transmitted toward the destination switch to minimize the cost of transmission to a destination switch. Furthermore, none of these systems permits pages to be entered by the local switch into the switching network while bypassing the central switch because of the face that subscriber information is centrally stored and must be centrally processed.

The central processing of pages by existing systems has distinct disadvantages. First, expansion of the capacity of the network is limited by the capacity of the central switch to process all requests for pages. Since studies of the assignee reveal that a majority of pages (70%) originating at a local paging facility are typically intended for only the broadcast by a single local paging facility, central processing of a page to be broadcast by a single local paging service necessarily places a high processing overhead on the central processor's ability to process pages which are to be transmitted between switches (i.e., non-local paging) and necessitates the making of a long-distance or 800 phone call. Furthermore, the cost of expanding the capacity of a central processing facility to increase the volume of pages can involve substantial expense. Finally, a malfunction in the central processing system processing the requests for pages throughout the network can cause the whole network to go down.

Each paging receiver in the Metrocast system cyclically scans a plurality of closely spaced channels to detect the presence of a page addressed to the paging receiver on any one of the closely spaced channels. Paging receivers in the Metrocast system have the disadvantage that the required continual scanning of the closely spaced channels consumes a substantial amount of power causing the batteries of the paging receiver to have a short service life. Short battery life increases the cost of operation of the paging receiver, can cause pages to be lost when the batteries are not promptly replaced and can interfere with the ability to market paging services as being "economical" given the cost of battery replacement.

There currently is no universal standard for issuing identification numbers to paging receivers, with the largest system having capacity for issuing only 2,000,000 paging receiver identification codes. Worldwide, there currently are over 12,000,000 paging receivers in use with projected growth on an annual basis in the paging industry possibly exceeding 20%. Thus, current paging systems do not permit a worldwide paging system to be realized as a result of the actual and projected number of paging receivers being far larger than the capacity of the identification codes in the largest existing paging system.

All paging receivers currently consume considerably battery power in monitoring the one or more channels on which they are designed to receive pages to detect if a paging receiver identification code accompanying a page on the one or more channels matches its stored paging receiver identification code. If a match exists, then a page is processed in an alarm and a display of the message is provided by the paging receiver of the message contained with the page. These systems transmit the paging receiver identification code in an order of decreasing significance of the digits of the identification code. In other words, if a paging receiver has the identification code 12345, the transmitter precedes the transmission of the page which is addressed to the paging receiver with the sequence of digits 12345. Each paging receiver which receives the channel on which the paging receiver identification code is transmitted continually detects each of the successive digits and maintains its radio frequency receiver tuner in any "on" state until a mismatch is found between the transmitted and stored paging receiver identification code digits. As a result of the fact that many paging receivers have the most significant digits in common with other paging receivers within a system, a substantial amount of battery power is consumed detecting if a broadcast page is addressed to a particular paging receiver. Each paging receiver which receives the digits of the paging receiver identification code in an order of decreasing significance is statistically likely to have its radio frequency receiver turned on for most of the transmission of the digits of the paging receiver identification code until the lesser significant digits of the paging receiver identification code are received which enable a final determination to be made of the paging receiver to which a page on a frequency is addressed. The lesser significant paging receiver identification code digits are the digits which begin to distinguish one paging receiver from another and only the least significant paging receiver identification digit distinguishes the paging receiver which is desired to receive a particular page from all other paging receivers. Accordingly, the transmission of the paging receiver identification code digits in an order of decreasing significance substantially increases power consumption lessening the life of the batteries of the paging receivers in a system.

Throughout the world, different frequency bands have been adopted for transmitting pages. In the United States, Transmissions are authorized on VHF and UHF bands. In the United States, the channels of the VHF and UHF bands are separated by 5 KHz steps. Moreover, for each of these bands in the United States, transmitters are in existence which transmit pages by frequency modulation of a digitally encoded carrier wave and other transmitters which transmit pages by frequency modulation of an analog encoded carrier wave. Currently, no paging receiver exists which is compatible with transmissions from both analog and digital transmitters. Furthermore, Europe has allocated VHF channels for paging with individual channels being separated by 6.25 KHz steps and Far Eastern countries have allocated paging frequencies on a 280 MHz VHF band with individual channels being separated by 2.5 KHz steps. Currently, paging receivers do not exist which are operational on any more than one of the above-identified frequency bands. The inability of current paging receivers to receive pages on the different frequency bands allocated throughout the world effectively prevents worldwide paging to be received on a single paging receiver.

None of the existing paging systems dynamically change the channels on which a paging receiver in the system may receive pages which severely restricts the paging receivers to usage in limited geographical areas. In the United States, there are a large number of paging channels in use in different geographical parts of the country. Because of the fact that the channel reception of existing paging receivers are not dynamically changed, it is impossible to universally receive pages throughout the country, to offer special services, or to shift allocation of channels used by a local paging service to accommodate traffic variations because of the fact that reception channels in current systems is limited to a single channel fixed upon obtaining the paging receiver from the paging service or to cyclically scan a group of closely spaced channels such as with the paging receiver used by the Metrocast system. The prior art paging receivers' inability to dynamically change the channels which may be received severely limits the usage of paging for business or other travel.

Currently, no paging system exists which effectively and at low cost permits paging on a regional, national and international level. This is a consequence of the inability of the paging receivers to dynamically receive different and a large number of channels, the lack of a standard transmission protocol which is compatible with existing analog and digital transmitter hardware and existing systems not having a universal paging receiver identification code which uniquely identifies each of the paging receivers throughout the world. The possibility exists in the current systems of several pagers having the same paging receiver identification code. Furthermore, the architecture of existing systems is committed to the construction of dedicated communication links between switches and/or the construction of new broadcast facilities such as at the local switches which involves substantial capital expenditures. A universal paging receiver identification code is needed having the capacity to uniquely identify all of the paging receivers throughout the world. Furthermore, in order to inexpensively implement regional, national and international paging, a system is needed which utilizes existing local paging services without expenditures on communication links between switches or new broadcast facilities.

Currently in the United States, a relatively small number of channels are used in the large metropolitan areas where most of the paging traffic occurs. As paging traffic increases in view of the relatively small number of channels predominantly in use in metropolitan areas, there is the likelihood that message traffic during the three peak paging periods that occur each day will increase to the point where the predominantly used small number of channels will become so busy that it is impossible to rapidly transmit pages to a paging receiver. This condition has occurred in large metropolitan areas and results in delays in pages being transmitted during peak traffic periods. Because of the fact that current paging receivers are not dynamically programmable to receive pages on different channels, existing networks to not have the ability to dynamically switch channels in large metropolitan areas from a channel having the highest traffic to a channel or channels having lower traffic, to accommodate paging traffic variations when one channel becomes so busy that rapid paging is not possible. In fact, in large metropolitan areas, there currently are VHF and UHF mobile channels that are under-utilized due to the current cellular radio system which could be used as alternative paging channels to receive traffic on commonly used stations.

Distinct FM analog and FM digital paging encoding protocols exist, but no universal encoding protocol exists which may be transmitted by existing analog and digital FM paging transmitters and universally received by paging receivers. Existing protocols for the FM analog and digital paging systems do not have a high efficiency in transmitting data per transmitted code. Existing digital transmitters modulate a digital FM transmitter with a binary signal which utilizes frequency shift keying of the basic carrier signal to transmit the high level of a bit with a burst of the shifted frequency and the low level of a bit with the unshifted frequency of the carrier. Thus, each identifiable digit of the transmission from an FM digital paging transmitter can encode only two distinct levels for each frequency burst of the carrier. Analog FM paging transmitters frequency modulate a sinusoidal carrier with a total of 15 tones to create a hexadecimal value transmitting system in which no modulation of the basic carrier frequency is considered to be the "F" value and the remaining 15 different values are encoded by modulating the FM carrier with distinct tones. Paging receivers which are designed to receive analog transmissions require substantial reception time of each tone to validly detect each character. Thus, while the protocol of FM analog paging transmitters transmits a much higher number of data values for each frequency burst, the slowness of the paging receivers in detecting the discrete tones does not result in a high throughput speed of transmitting characters.

Prior art alphanumeric paging (the capability of transmitting pages having numerical and alphabetic type characters) has been commercialized using the above-referenced digital encoding protocol. Since only about 15% of existing paging services use a digital transmitter, which is necessary currently for implementing alphanumeric paging, the great majority of subscribers to paging services may not obtain alphanumeric paging. The analog protocol, which is based upon a hexadecimal tone encoding format, has not been utilized for encoding a character set to transmit alphanumeric messages.

Moreover, current alphanumeric paging service has been expensive to implement both from the perspective of the paging service and from the subscriber. The necessary input devices have proved to be expensive and there is no standard input device design or data encoding protocol. Conversion equipment for changing an analog paging service to a digital service with alphanumeric capability has proven expensive and there is no existing computer system for changing an analog system to a digital system which is inexpensive.

Existing paging systems which permit paging in multiple locations have the deficiency when a subscriber desires to place a page from a location remote from the subscriber file or to modify the level of service from a location remote from the subscriber file of requiring a long-distance phone call to be made to the location where the subscriber file exists. Because of the fact that the long-distance phone call is charged to the person wishing to make the page or change of service level or to the operator of the system (800 service), the expense of using these paging systems is increased and may discourage users from making pages or changes in the level of service by calling in from a location remote from the subscriber file. No national or regional prior art paging system permits a page or a change in service level to be initiated from a geographic area outside the area where the subscriber file is located by making a local phone call to a switch in an area remote from the switch containing the subscriber file within the system and further for the paging receiver to be programmed to receive the page on a particular channel used at the location where the page is to be received.

Current paging systems do not broadcast and current paging service receivers do not execute a repertoire of commands permitting the functional characteristics of the paging receiver to be programmed dynamically by RF transmission to the paging receiver. Current paging receivers do respond to commands which provide an alarm to the person wearing the paging receiver that a page has been received such as activating a display and/or providing an audio alarm. However, current paging systems do not broadcast and current paging receivers do not execute a diversity of commands in which the system influences operation and structure of the paging receiver, including commands activating the display to indicate if the page has originated locally or from another region, causing the message transmitted with the page to be stored in a particular memory location in the paging receiver, programming the channels on which the paging receiver is to receive pages, and permitting the paging receiver to serve as a relay for pages either to be transmitted or received and to interface with peripheral devices.

Cellular radio systems dynamically assign channels on which cellular radio receivers are to receive telephone calls. To make or receive a telephone call, a mobile cellular radio is locked onto a set up channel through communications with the transmitter which are established when the cellular radio receiver is turned on. The cellular system then assigns the mobile cellular radio to a specific channel while the mobile cellular radio is making or receiving a telephone call within a cell. As the cellular radio receiver moves from one cell to another cell, the channel is dynamically changed from one channel to another channel to maintain a strong signal frequency. A cellular radio receiver does not have a channel memory which stores channels which are to be scanned to establish if a call is forth coming. The dynamic assignment of a channel is initiated by the transmitter for the sole purpose of establishing the channel over which voice communications are to be initiated or to be maintained when moving from one cell to another. Cellular radio systems do not assign channels based upon information assigned in a subscriber file.

The telephone system is based upon a network of distributed switches having a local/regional/national-/international functional responsibility. In the United States local telephone offices are connected to "lata" switches which are analogous to area codes but which are identified by a different number pattern based upon system considerations. The local, lata, and hub switches of the present invention operate in a fundamentally different manner than the switches of the telephone system in that they perform substantial data processing to provide packets of data which are periodically transmitted to other switches to provide efficient and low cost operation. The operation of the telephone system is fundamentally different from a paging system in that processing of calls in the telephone system is on a real-time basis which does not process calls to provide packets which are periodically transmitted and in that the initiation of a successful call requires the caller to know the destination of the call (phone number), neither of which occurs in a paging system.

A network known as ISDN (Integrated Service/-Digital Network) has been proposed. This network will interface with the telephone system and provide data communications between switches in the network. Data is to be transmitted in blocks between switches in the network. The proposal does not include disassembly, processing and reassembly of blocks of data by intermediate switches located along the communication path between an originating and destination switch.

The X.25 transmission protocol has been developed which is used for sending a single block of data between an originating location and a receiving location. The prior art X.25 transmission protocol is identical to that discussed with reference to FIG. 29 except that it has not been used in paging and further has not been used for transmitting multiple blocks of data analogous to the multiple pages illustrated therein.

U.S. Pat. No. 4,422,071 discloses a system for programming an identification code of a receiver by a radio frequency communication between a transmitter and the receiver.

SUMMARY OF THE INVENTION

The present invention provides a paging system having substantial advantages over current paging systems. The paging system of the present invention is based upon utilization of existing transmitters which are in place at existing local paging services which eliminates the need for the building of new transmitting facilities. Furthermore, the present invention utilizes existing communication facilities to transmit information between different switches in the system such as, but not limited to, telephone lines. The use of existing communication facilities lessens the overall expense in constructing the network by eliminating the capital cost for new communication lines between the switches such as with the Metrocast system. The system of the present invention is upwardly expandable by adding additional sublocal, local, lata and hub switches as the network expands, which currently may be accomplished in a more cost-efficient manner than updating the capacity of a central switch.

The distributed switching network efficiently transmits pages locally and between switches for performing regional and national paging without requiring routing through a single central switch which processes pages throughout the system. The distributed network of switches permits each of the individual switches to be implemented by a low-cost switching network controlled by a conventional PC with a processing assist from distributed processing units for processing input, output communications and data. The processing assist for data processing strips the communications protocol used for transmitting packets of pages to a switch, converts the data code used for transmission of pages to the data code used by the PC to process the pages, and converts the code used by the PC back to the code used for transmission of pages between switches and adds the communications protocol. The present invention utilizes non-real-time communications with buffering of packets of pages to be sent between switches and further buffers and batches pages to be transmitted between a local switch and an associated local transmitter which provides communications of pages between the switches and the local paging service and the local transmitter in a cost-efficient manner.

The system functions to permit the channel or channels received by each paging receiver to be dynamically programmed which has the advantages of (1) increasing transmission spectrum efficiency by permitting the channels carrying pages in a local paging service during high traffic time periods to be dynamically varied to maximize the efficiency of the transmission of pages on existing paging facilities such as those found in large metropolitan areas, (2) permitting pages to be made in a plurality of regions by dynamically programming the channel which are to be received by a paging receiver to be the same as those channels available in the area in which the paging receiver is to receive the page, (3) permitting battery savings to be achieved for paging receivers which are transported into an area outside of the local paging area by permitting the paging receiver to respond to only pages which have a destination preamble which is transmitted as the first digit of the paging receiver identification code to minimize the time during which the paging receiver is "on" to determine if the page is addressed to it, and (4) creating special service channels for use by local paging services.

The encoding format utilized by the invention is compatible with the existing analog FM modulation and digital FM modulation transmitters used by local paging services which permits the utilization of existing broadcast facilities in the network.

The distributed switching network minimizes the effects of switch malfunction on the operation of the system and permits information to be transmitted through alternative switching paths, other than a normal switching path, if a malfunction occurs.

The system permits pages to be made anywhere within a country or throughout the world without long-distance charges being incurred by utilizing a geographically descriptive identification code which is processed by a lata switch receiving the request by local phone call for a page. The lata switch generates a page including the geographically descriptive identification number accompanying the request for a call which is forwarded by the network to the local switch having the subscriber file storing the subscriber identification code service option and the destinations to which pages are to be transmitted. The local switch receiving the page generates a page in accordance with the level of paging service stored in the subscriber file and adds a destination(s) to the page in accordance with the stored destination information accompanying the subscriber identification number. Furthermore, the information in individual subscriber files at each local switch may be programmed by a local call made to a lata switch anywhere in the network without incurring long distance charges in a manner analogous to the placing of calls to request a page to a lata switch as described above.

The paging system utilizes a command structure for sending pages which differentiates between local and national pages which permits battery savings by the paging receivers.

Each local paging service transmits pages with the digits of the paging receiver identification code transmitted in an order of increasing significance which minimizes battery consumption by the local paging receivers tuned to the frequency on which the pages are transmitted by permitting a rapid determination of whether or not the page is addressed for a particular paging receiver.

Each local paging service transmits pages in a batched form which are batched by the least significant digit of the paging receiver identification code which further saves battery life of the receiver by permitting an increase in the time interval between which the paging receiver is cyclically turned on to sample whether channel frequency is present.

The present invention provides alphanumeric paging which is fully compatible with existing analog and digital transmitters. A universal encoding protocol is used which encodes each alphanumeric character as two successive tones.

The system further permits the paging receiver to pass pages to peripheral devices which may function as data processors, printers, telex services, facsimile service or support for other types of data processing devices.

The invention permits the integration of private paging systems and services into a local paging service or into a common carrier network. Integration of the subscribers of private paging systems and (non-radio common carrier) services into the subscriber base of a local paging service functioning alone or contained in a network extends the service options which may be provided to subscribers of the private paging systems and services to those available in the local paging service or network and extends the reception range of the paging receiver to that of the local paging service or the network. The pages received from the private paging systems and services are broadcast by the transmitter of the local paging service to which they are directly connected and/or by other local paging systems that are part of the network.

The operation of paging receivers located anywhere in the network is dynamically controlled by one or more system commands which are added to each page by the local switch at the time of origination of the page. The system commands are added by the local switch under the control of a processor, which upon matching an identification code accompanying the page with a subscriber identification code stored in a subscriber file, adds one or more system commands to each page in accordance with selected service options stored within the subscriber identification code. Fore each selected service option one or more corresponding system commands are added to the page prior to transmission to a local paging service or to the network.

DEFINITIONS

The following definitions shall apply throughout the disclosure:

1. Jurisdiction—Jurisdiction is control exercised by a switch over one or more additional switches to which the switch is connected or over paging receivers having an identification code stored in a subscriber file of the switch. A page is also a group of tones which is to be transmitted to a paging receiver and may include additional information, including identification code, one or more destinations, and a command specifying a function to be performed by a paging receiver.

2. Page—A page is a group of numerical or alphanumerical characters to be sent to a paging receiver. A page may include additional information including an identification code, one or more area destinations, and a command specifying a function to be performed by a paging receiver.

3. Packet—A packet is one or more pages which are transmitted as a group which have a switch as an area destination. A packet may have a transmission protocol and is transmitted between an originating switch and a destination switch.

4. Batch—A batch is a group of one or more pages which are forwarded to a transmitter for broadcast having one or more common paging receiver identification code digits.

5. Sublocal Switch—A sublocal switch is the lowest level entry point switch in the network of the present invention.

6. Local—A local switch is a switch having jurisdiction over any sublocal switches to which the local switch is connected and in the absence of any sublocal switch being connected thereto is the lowest entry point into the network and has jurisdiction over subscribers stored in a subscriber file therein. The local switch may be associated with a common carrier local paging service.

7. Lata Switch—A lata switch is a switch having jurisdiction over any local switches to which the lata switch is connected.

8. Hub Switch—A hub switch is a switch having jurisdiction over any lata switches to which the hub switch is connected.

BRIEF DESCRIPTION OF THE DRAWINGS

FIGS. 25A and B are a Data Board Memory Map of the data module processor 32 of the present invention.

DESCRIPTION OF THE PREFERRED EMBODIMENTS

I. System Overview

Figure 1:
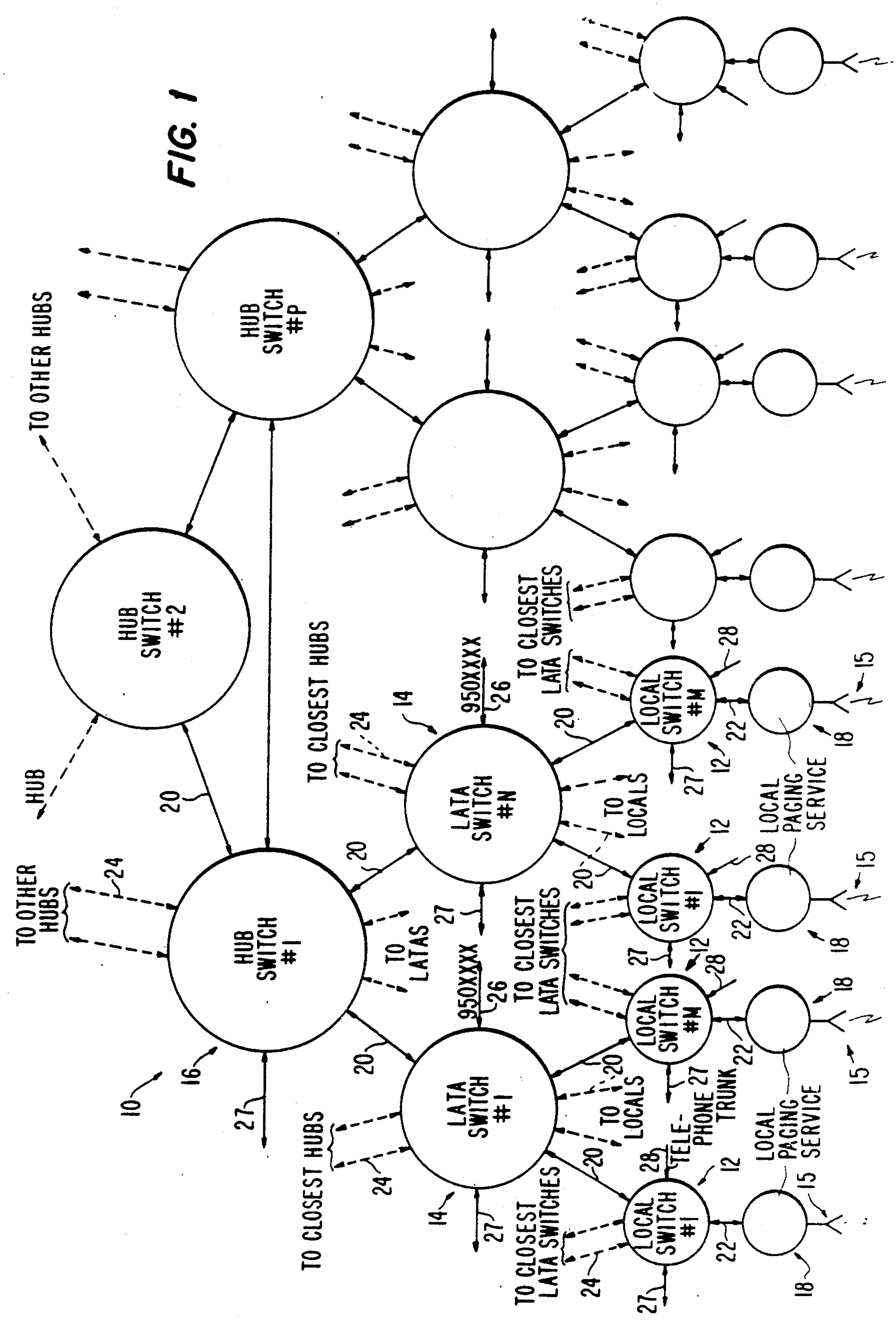
FIG. 1 is a system diagram of the present invention.

FIG. 1 illustrates a diagram of a paging network 10 in accordance with the present invention which provides worldwide paging capability. The system is a distributed network of switches comprised of a plurality of local switches 12, a plurality of lata switches 14 and a plurality of hub switches 16 with each switch being located in a different geographical location within an area being serviced by the system. The hub switches 16 may be located totally within a country to provide national service or in multiple countries to provide international service. In order to simplify the drawings only a single portion of the network is labelled with reference numerals with it being understood that repeating portions exist such as for that portion under the jurisdiction hub switch #P. Communication links which are illustrated as a dotted arrow represent network structure which has been omitted for clarity that is identical to structure that is illustrated in detail. Additionally, one or more sublocal switches as discussed with reference to FIG. 28 below may optionally be provided within the system under the jurisdiction of the local switch. The sublocal switches have been omitted for purposes of clarity. Each switch has jurisdiction over a geographic area. The functions performed by the local switch 12, the lata switch 14 and the hub switch 16 are described below. The architecture of the local, lata and hub switches are similar to each other with a preferred embodiment of the hardware being illustrated below in FIGS. 14–25. A block diagram of the local, lata and hub switches is discussed below with reference to FIGS. 2, 4 and 6. The control programs used with the sublocal, local, lata and hub switches are set forth in the above-referenced Appendix. A single overall control program is used in each of the sublocal, local, lata and hub switches with the program of each switch being programmable by a technician setting up the switch by inputs from a keyboard to program the specified function to be performed by the switch. A local paging service 18 is typically connected to each of the local switches 12 which offers other paging services than that provided by the present invention although it should be understood that the local switch may be used exclusively to control all services offered at the local level. The local paging service 18 is typically an existing common carrier paging service which services an area within broadcast distance of a transmitter 15 under the jurisdiction of the local paging service to which the local switch 12 has been connected to permit the local paging service to function in the network. The transmitter 15 may be either an analog or digital transmitter as discussed above with reference to the prior art. Communications between the local, lata and hub switches may be by any existing communication medium 20 such as direct dial-up circuits (IDD Circuits International), direct outward dial circuits (end-to-end), in-bound watts (and other in-bound services that are volume discounted), out-bound watts (and other out-bound services that are volume discounted), feature group A (U.S. service), feature group B (U.S. and European services), MF tie trunks (U.S. and European services), and direct inward dial (international service, where available), as well as any future medium which permits pages to be transmitted between switches. Each of these services are indicated schematically by a bi-directional arrow 20 which interconnects a local switch 12 to a lata switch 14, a lata switch 14 to a hub switch 16, and a hub switch 16 to another hub switch 16. Furthermore, the local switches 12 are connected to a local paging service 18 by a communication link 22 of any conventional nature, including wires connecting the local switch to the local paging service. Each switch is provided with a local telephone trunk 27 which functions as a maintenance port. Furthermore, dotted bi-directional lines 24 illustrate alternative communication paths between switches which may be used in the case of malfunction or busy conditions. It should be further understood that the invention is not limited to any particular communication protocol linking switches, nor connecting the local switch to the local paging service. A telephone trunk 28 functions as an input for manual (telephone handset) and automatic device entry of pages as described below.

The network 10 provided numeric, alphanumeric and data services to all points within the United States and participating countries. In the preferred embodiment of the network, a universal code is used for encoding transmissions of characters over both the communication links 20 and 22 which is compatible with existing analog and digital transmitter 15. The universal code discussed below utilizes sixteen tones for encoding all characters for transmission between switches or to a local paging service 18. For numeric paging each character is transmitted as successive single tones and for alphanumeric paging each character is transmitted as two successive tones as discussed below in detail. An X.25 transmission protocol as discussed below in detail is preferably utilized for transmitting packets of pages between switches. While in the preferred embodiment, a preferred code and transmission protocol is utilized it should be understood that the invention is not limited thereto.

The network 10 is economical to implement and operate as a consequence of utilizing distributed processing technologies, and transmission of pages periodically in packets of pages between the switches. Dynamic interaction between a frequency agile pager, which preferably is of the type described in the above-referenced patent applications filed on Oct. 20, 1987, and the network 10 efficiently utilizes transmission time that is available in the channel spectrum. One of the distinct advantages of the network 10 is that it utilizes existing paging common carriers to deliver pages to the end user with existing paging RF coverage in the United States being greater than 95% of its geographical area with just two 150 MHz frequencies, with a total of 10,500 additional channels being available for paging receiver use. Wire line common carriers, private systems, hospital, government, emergency and many other services can be accommodated by the utilization of dynamic channel programming, as described below, by the network 10 to change the channels on which individual paging receivers may receive pages. The network 10 in combination with its paging receiver described in the above-referenced patent applications filed on Oct. 20, 1987 presents a universal product useful throughout the world.

The network 10 provides an integrated sublocal, local, regional and nationwide paging network that is transparent to use by the subscriber and provides for pages to be called into an existing local paging service 18 by the making of a local phone call on a telephone trunk 28 connected to the local switch 12 in a conventional fashion as well as to any lata switch 14 throughout the network 10 by a local phone call to telephone trunk 26, as is described below. The functionality of permitting pages to be originated anywhere within the network 10 by local telephone call, preferably by calling a single number within the country (950-XXXX) avoids the telephone expense and system overhead caused by calling of a central switch to originate a page such as in the Metrocast system which necessitates providing a high capacity expensive switching system. It should be understood that the network's usage of periodically transmitting packets of pages between switches results in a much lower cost than the cost of 800 or conventional long distance service. The phone trunk 26 for calling the lata switch 14 to place a page anywhere within the network 10 is indicated by bi-directional arrows to each lata switch 14. As will be described below, regardless of the location of the person making the telephone call to a lata switch 14 over telephone trunk 26 to originate a page, the lata switch 14 will formulate a page with the destination specified by geographically descriptive digits of the identification code inputted with the call to request a page to the lata switch and the network 10 will automatically route the page through the switches of the network to the person being pages by way of the local switch 12, which stores the subscriber file 54 described below with reference to FIG. 3, that stores the identification code of the subscriber and paging receiver. The local switch 12 which stores the identification code inputted with the page in its subscriber file adds one or more destinations to the page and transmits the page(s) to the local paging service 18 and/or the network 10 by way of the lata switch 14 having jurisdiction. The person placing the page by calling the local switch 12 on telephone trunk 28 of the lata switch 14 on telephone trunk 26 does not have to know the location of the person receiving the page.

II. Local Switch

Figure 2:
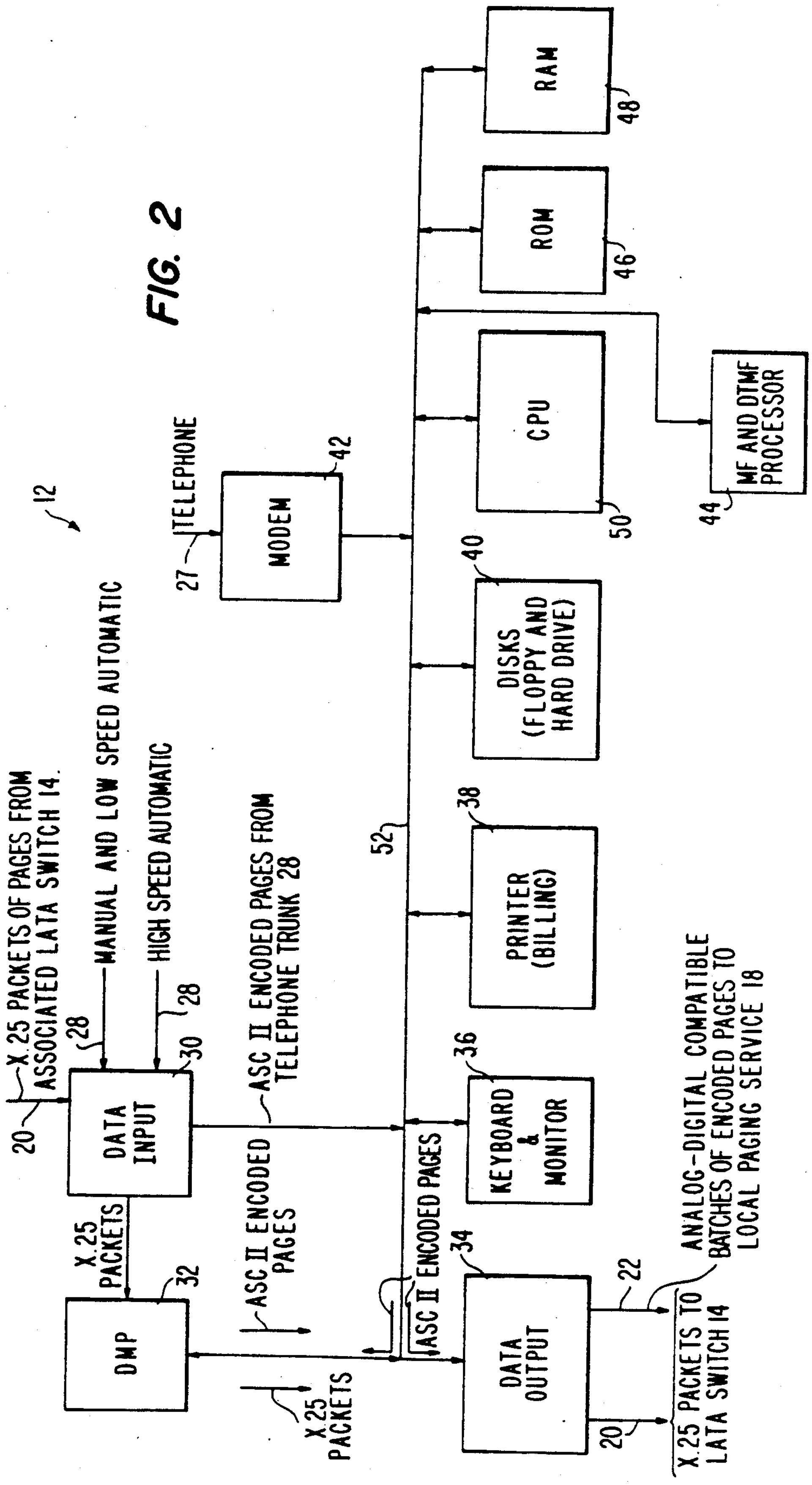
FIG. 2 is a block diagram of a local switch in accordance with the invention.

The local switch 12 is connected to a participating common carrier paging service 18 located in a particular geographic area. The local switch 12 has local direct inward dial trunks 28 which permits the subscriber to use a local telephone call to place a page. Pages over the local telephone trunks 28 may be (1) numeric characters which are entered manually by DTMF tones or other telephone coding mechanisms, (2) alphanumeric characters which are entered manually by DTMF tones or other coding mechanisms, (3) alphanumeric characters which are entered by an automatic message inputting device using an encoding format having a transmission protocol of conventional nature such as DTMF tones or (4) a high speed (baud rate) encoding protocol such as the X.25 protocol described below. With reference to FIG. 2, the top input to data input 30, which is labelled "Manual and LOW SPEED Automatic Pages", receives the first three inputs and the bottom input to the data input, which is labelled "HIGH SPEED AUTOMATIC" receives the fourth input. It should be understood that any number of inputs to the data input 30 may be used in practice. The local switch 12 has voice prompting which facilitates the person placing a call on the telephone trunk 28 to enter a message to be transmitted as a page.

Pages which are entered by the telephone trunk 28 in the four different formats described above are encoded with a command structure as follows. Manually entered numeric character pages consist of digits encoded by the telephone handset. An entry of this type does not have a command header. Manually entered alphanumeric character pages may be entered by the following format consisting of two successive DTMF tones or rotary dial inputs:

| | | | | |
|---|---|---|---|---|
| Numeric: | All numbers are sent as themselves preceded by a zero. | | | |
| Alphanumeric: | A = 21 | H = 42 | O = 63 | V = 83 |
| | B = 22 | I = 43 | P = 71 | W = 91 |
| | C = 23 | J = 51 | Q = 11 | X = 92 |
| | D = 31 | K = 52 | R = 72 | Y = 93 |
| | E = 32 | L = 53 | S = 73 | Z = 12 |
| | F = 33 | M = 61 | T = 81 | Space = 00 |
| | G = 41 | N = 62 | U = 82 | |

An asterisk is used as a command header which precedes the alphanumeric transmission of a manually entered alphanumeric character page. Automatic input from an input device, which is audio coupled to the telephone handset, is encoded with a double (repeated once) asterisk command and preferably utilizes the hybrid coding format discussed below. Input from a high speed automatic entry device, having an X.25 transmission protocol, is encoded with a triple (repeated twice) asterisk header and is preferably encoded in the hybrid coding format discussed below at a high baud rate such as 1200 baud which necessitates a much shorter tone duration than that used by the transmitters 15. The command header is decoded by the data input 30 discussed below with reference to FIG. 2 to control the processing of the different data input formats from the telephone trunk line 28.

Furthermore, following the command header in all inputs, except for the manually entered numeric character input, is a language field which is used to encode whether the page is for transmission in English or Japanese. The dual language capability of the system is discussed below. The processing by the system of pages in two languages is totally controlled by the aforementioned language field. As will be discussed below, the language field controls the commands which are placed with each page except for purely number pages. The individual paging receivers decode the command and display the page in the language dictated by the command.

The local switch 12 processes the pages received from the telephone trunk 28 and from the associated lata switch 14 to which the local switch 12 is connected by the communication link 20 as described below in detail. It should be understood that the local switch 12 has programming which automatically and dynamically monitors paging traffic when a plurality of transmission channels are used and allocates the channels available to the paging service 18 for transmission to the paging receivers to maximize the local paging services paging throughput as described below. The local switch 12 calls the resident local paging terminal of the paging service 18 and determines how much air time it has to deliver a batch of pages to the transmitter 15 associated with the local paging service. The local switch 12 then calls the local paging terminal of the local paging service 18 and transmits a batch of pages encoded in the hybrid encoding format described below which is compatible with existing analog and digital FM paging transmitters.

The local switch periodically transmits packets of pages stored in its outbound lata buffer 82 over communication link 20 as described below in conjunction with FIG. 3 to the lata switch 14 having jurisdiction over it which provides cost efficient transmission and efficient page processing by avoiding processing by a single central switch controlling the network as in the prior art. This architecture is highly efficient in routing the pages originating at the local switch 12 to be transmitted by the network 10 which are intended for broadcast by a transmitter remote from the local switch having the subscriber file storing the identification code of the subscriber to be paged.

In the preferred embodiment, when the paging subscriber desires to receive regional, national, or international service, the local lata switch 12 is programmed by the subscriber by simple telephone area code entries which identify the service areas although it should be understood that the invention is not limited to the usage of telephone area codes to identify the service areas. The programming is accomplished by adding or deleting one or more area codes of the subscriber's destination field 78 contained in a subscriber file 54 maintained in the subscriber's local switch 12 described below with reference to FIG. 3. In the United States, area codes are used for ease of subscriber use and telephone books may then serve as the service area directory. The same ease of use is available to worldwide customers with county-city code entries available from telephone books in any airport, hotel or business.

The local switch controls the generation of individual pages having the message detail as described below with reference to FIG. 31. The number of pages which are generated in response to a page received without an area destination from the telephone trunk 28 or from a lata switch 14 is determined by the central processor of the local switch 12 interrogating any area destinations listed in the destination area code field 78 as described below with reference to FIG. 3. Each page generated by the processor contains the same message content. A separate page is generated for each destination area listed in field 78 and if the local service option of the service option field 68 is selected, an additional page is generated for broadcast by the local paging service 18 without an area destination in the network which is processed by the local switch 12 as a page received from the network for broadcast by the local paging service 18. Furthermore, each individual page generated by a local switch contains one or more commands which are discussed. The commands which are added to each page transmitting a message are determined by the operation of the central processor of the local switch 12 in response to interrogation of the selected service options of field 68. Programming of paging receivers with the channel programming command is in response to the local switch programming the paging receiver to receive one or more channels, subscriber programming of destination areas in field 78, and the degree of utilization of the channels of the local transmitter 15 as described below with reference to FIG. 26.

The central processor of the local switch 12 processes each individual page received from the network to determine if it originated from a local switch 12 or a lata switch 14. This determination is made by determining if a destination header identifying a lata switch 14 originating the page precedes the paging receiver identification code in a packet having the configuration of FIG. 31. In the absence of the header (which is a geographic identification of the originating lata switch 12 in the network) in an individual page, the page is processed exclusively by the local switch 12 for broadcast by the associated local paging service 18 without interrogation of a subscriber file in the local switch. If the header is found in a page, the central processor processes the page as either a request to reprogram the subscriber file or as a page received on the telephone port 28 without an area destination which must be processed to determine one or more area destinations and formed into new pages each with a different area destination from the field 78 if transmission by the paging network is to occur and into a page without an area destination if transmission by the local paging service is to occur as described below.

The local switch 12 also serves as the dynamic programming interface between the paging receiver and the network 10. The local paging service 18 may program channels frequencies to be received by paging receivers, change subscriber identification codes and add new customers to the network 10 utilizing the local switch 12. The functionality of the paging receiver can be changed from a fixed channel to a multi-channel or a scanning pager as required by use of the channel programming command discussed below.

Messages originating at the local switch 12 which are transmitted to the lata collector switch 14 having jurisdiction over it are packetized as described below with reference to FIGS. 2 and 3. Destination area codes (telephone area codes or other geographically descriptive code) are added to pages prior to transmission to the lata switch 14 as described below and the paging receiver is dynamically and automatically reprogrammed for the new service areas by the local switch 12 issuing channel programming command(s) in the form of a page as described below which ensures that the paging receiver is programmed to receive channels in each designated area. The current paging channels remain in the pager to avoid loss of a message while a subscriber is still in the area.

III. Lata Switch

The lata switch 14 provides a second tier of network intelligence. This intelligence includes page processing, packetizing and routing. The lata switch 14 receives packets of pages from each of the local switches 12 within its jurisdiction as well as the hub switch 16 having jurisdiction over it. The lata switch 14 provides the geographical presence for the network 10 to originate and terminate paging messages utilizing dial-up or dedicated communication services.

The lata switch 14 is responsible for collection of pages from the local switches 12 within its jurisdiction. When a packet of pages is received from the local switch 12, it is disassembled, processed and stored for transmission to the proper destination(s) in one or more packets each consisting of one or more pages which are intended for destination(s) either within or outside the lata switch jurisdiction. The lata switch 14 periodically transmits packets of pages stored in its outbound hub buffer 98 and its outbound local buffer 104 described below with reference to FIG. 5 to the associated hub switch 16 having jurisdiction over it and to local switches 12 within its jurisdiction which provides cost efficient transmission and efficient page processing by avoiding processing by a single central switch controlling the network 10. This architecture is highly efficient in routing pages originating within the jurisdiction of the lata switch 14 which are intended for broadcast outside its jurisdiction as well as distributing pages from one local switch 12 to one or more additional local switches within the jurisdiction of the lata switch. If the page is destined for distribution within the jurisdiction of the lata switch 14, the page is processed into packets of pages for transmission to each of the local switches 12 within its jurisdiction or alternatively to less than all of the local switches in its jurisdiction. The pages are then periodically transmitted as packets to the local switches 12 within the jurisdiction of the lata switch 14.

The lata switch 14 is also responsible for collection of pages outside its jurisdiction to be broadcast to the local switches 12 within its jurisdiction. Packets of pages received from the hub switch 16 are disassembled, processed, and packetized for transmission to the destination local switches 12.

The lata switch 14 also serves as a source of regional paging billing collection. The lata switch 14 will be interrogated periodically to obtain the call records for pages within its jurisdiction that have been distributed to each of the local paging services 18 associated with the local switches 12 within its jurisdiction. A dial-up modem port 27 is utilized for this function.

The function of the lata switch 14 in collecting requests for placing pages in the network or to reprogram the subscriber file 54 of a local switch 12 by placing a local phone call on telephone trunk 26 is an important aspect of the present invention. The lata switch 14 places the header discussed above, which geographically identifies the lata switch 14 originating the page in front of the paging receiver identification code, in a packet as illustrated in the message detail of FIG. 31 to enable the local switch 12 to differentiate between pages which are for broadcast by the local paging service 18 associated with a receiving local switch 12 and pages which require access to the subscriber files 54 to generate one or more pages for broadcast or pages for reprogramming a subscriber file. Preferably, the header is four digits comprised of a country code followed by the telephone area code identifying the lata switch 14 which received the call for the originating page. The commands utilized by the local switch 12 in the packet configuration of the message detail of FIG. 31 discussed below with reference to system commands are not utilized by the lata switch.

IV. Hub Switch

The hub switch 16 provides the third tier of network intelligence and serves as an inter-regional communications link. One hub switch 16 will preferably be located in each international region to serve as a network routing switch. In the United States, a hub switch 16 will be located within the region served by each of the Bell regional companies (RBOC's). Accordingly, in the United States the preferred implementation of the network 10 includes seven distinct hub switches 16. Each hub switch 16 in a preferred embodiment can have fifty-five lata switches 14 under its jurisdiction. The hub switch 16 also serves as a network routing switch for inter-hub calls when pages are to continue in the hub-to-hub network.

When a packet of pages is received from either another hub switch 16 or a lata switch 14 within its jurisdiction, the pages are disassembled for examination. Each page is examined for its destination address(es). A determination is made if the hub switch 16 should forward the page to one of the six adjacent hub switches or forward the page to a lata switch 14 within its jurisdiction as described below in detail. The pages are then destination processed and packetized for transmission to either another hub switch 16 or a lata switch 14 within its jurisdiction. The first hub switch 16 to receive a page to be transmitted between hub switches will also provide nationwide billing records. The hub switch 16 will be interrogated by a dial-up modem 27 to transfer the message records to the billing center.

V. Switch Architecture

Each of the sublocal, local, lata and hub switches utilize the same hardware with changes in function being implemented by programming at the time of installation. The control programs for each of the processors in the sublocal and local, lata and hub switches, which are set forth in the Appendix referred to above, are modified by keyboard input to perform the desired function of each of the different switches.

A. Local Switch 12

FIG. 2 illustrates a functional block diagram of the local switch 12. The local switch 12 is comprised of a data input terminal 30, a data module processor 32, a data output 34, a keyboard and monitor 36, a printer 38, floppy and hard drive disks 40, a modem 42, MF and DTMF processor 44, a read-only memory (ROM) 46, a random access memory (RAM) 48 and a central processing unit (CPU) 50. Each of the aforementioned elements are connected to a data bus 52.

The local switch 12 serves as the primary point of entry into the network 10. Each participating common carrier (local paging service 18) is furnished a local switch 12 to perform diverse functions. The local switch provides both DID (direct dial) and DOD (overdial) access to local subscribers issued a paging receiver. Voice synthesized prompting allows customers to readily enter the necessary identification code to activate a page and numeric messages. Entry for alphanumeric character pages also takes place on the DOD and DID trunks via a slow-speed (manual or automatic) DTMF entry or high-speed modem (X.25 protocol).

The local switch 12 performs a number of important functions. The local switch 12 permits local subscriber entry from the keyboard 36 or the modem 42 to change the subscriber file 54 as described below with reference to FIG. 3 upon inputting a correct secret code. The local switch 12 provides for the batching of local pages to be sent to the local paging service 18. Pages to be transmitted throughout the jurisdiction of the lata switch 14 associated with a local switch 12 and nationwide pages to be transmitted to a plurality of lata switches 14 are formed into packets and forwarded to the lata switch having jurisdiction over the local switch 12 for distribution to the network 10. Packets of pages to be transmitted by a local paging service 18 which are received from the network 10 are received from the lata switch 14 having jurisdiction over the local switch 12 by means of communication link 20.

The CPU 50 performs the overall control of the local switch 12 with processing assists as described below from the data input 30, data module processor 32 and data output 34. The CPU 50 formats each request for a page which is inputted by the telephone trunk 28 to include the paging receiver identification code in an order of increasing significance of the digits from the least significant digit to the most significant digit, a destination(s) as determined by interrogation of field 78 as described below with reference to FIG. 3, a command as determined by interrogation of the service option field 68 as described below with reference to FIG. 3 and the language field inputted with the page. As explained below, the formatting and broadcast of the paging receiver identification code digits in an order of increasing significance produces substantial battery savings for each of the paging receivers in the system.

The CPU 50 may be any processing system but, in a preferred embodiment of the present invention, is a PC AT processor based upon an Intel 80286 microprocessor. The control program for the CPU 50 is set forth in the above-referenced Appendix. The PC will be provided with a plurality of slots for receiving circuit boards carrying the data module 32, modem 42, data output 34, data input 30 and blank slots for expansion.

1. Data Input 30

The data input 30 performs the important function of being the input for all pages inputted by the telephone trunk 28 and the input of pages received from the network 10 which are addressed to the lata switch 14 having jurisdiction over the local switch 12. The data input 30 decodes the command format of the inputted pages discussed above from the trunk lines 28. Page inputs on the trunk lines 28 which are not in X.25 protocol are converted into ASCII with the rate of conversion being controlled by the decoded command. It further strips all inputs, which are not in X.25 protocol, of any communication protocol, that is typically in a DTMF format, and converts the pages into ASCII code for storage in the buffer 84 of the RAM 48 as discussed below with reference to FIG. 3 and subsequent processing by the CPU 50. All inputs in the X.25 transmission protocol to the local switch, whether from a lata switch 14 or from a telephone trunk line 28, are forwarded to the data module processor 32 for stripping of the X.25 transmission protocol, as discussed below with reference to FIG. 31, and for conversion into ASCII code format for storage in buffers 80 and 84 of the RAM 48 of FIG. 3 discussed below.

Figure 14A:
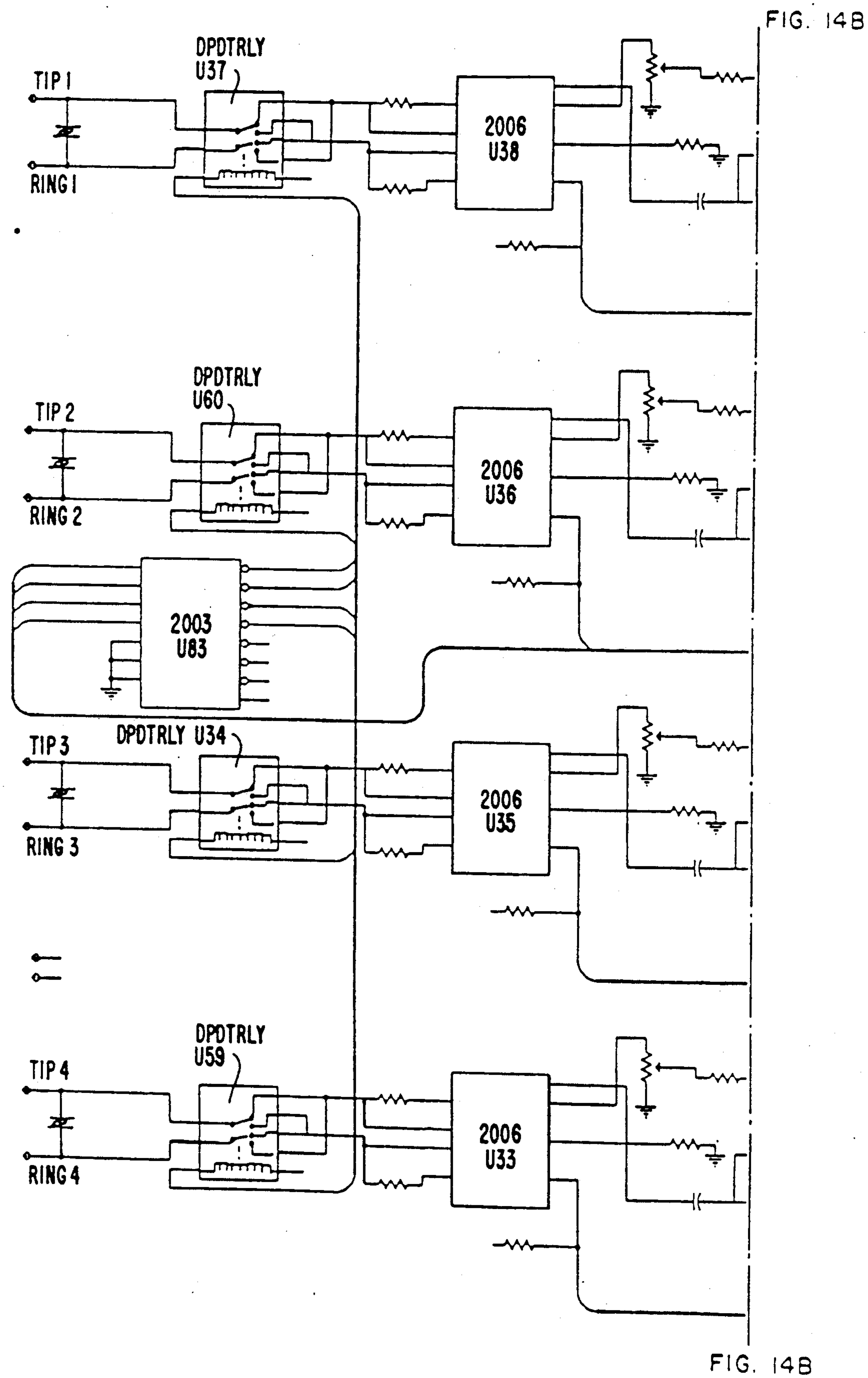
FIGS. 14A and B are a circuit schematic of a PC DID Trunk Interface of the data input 30 in accordance with the present invention.
Figure 14B:
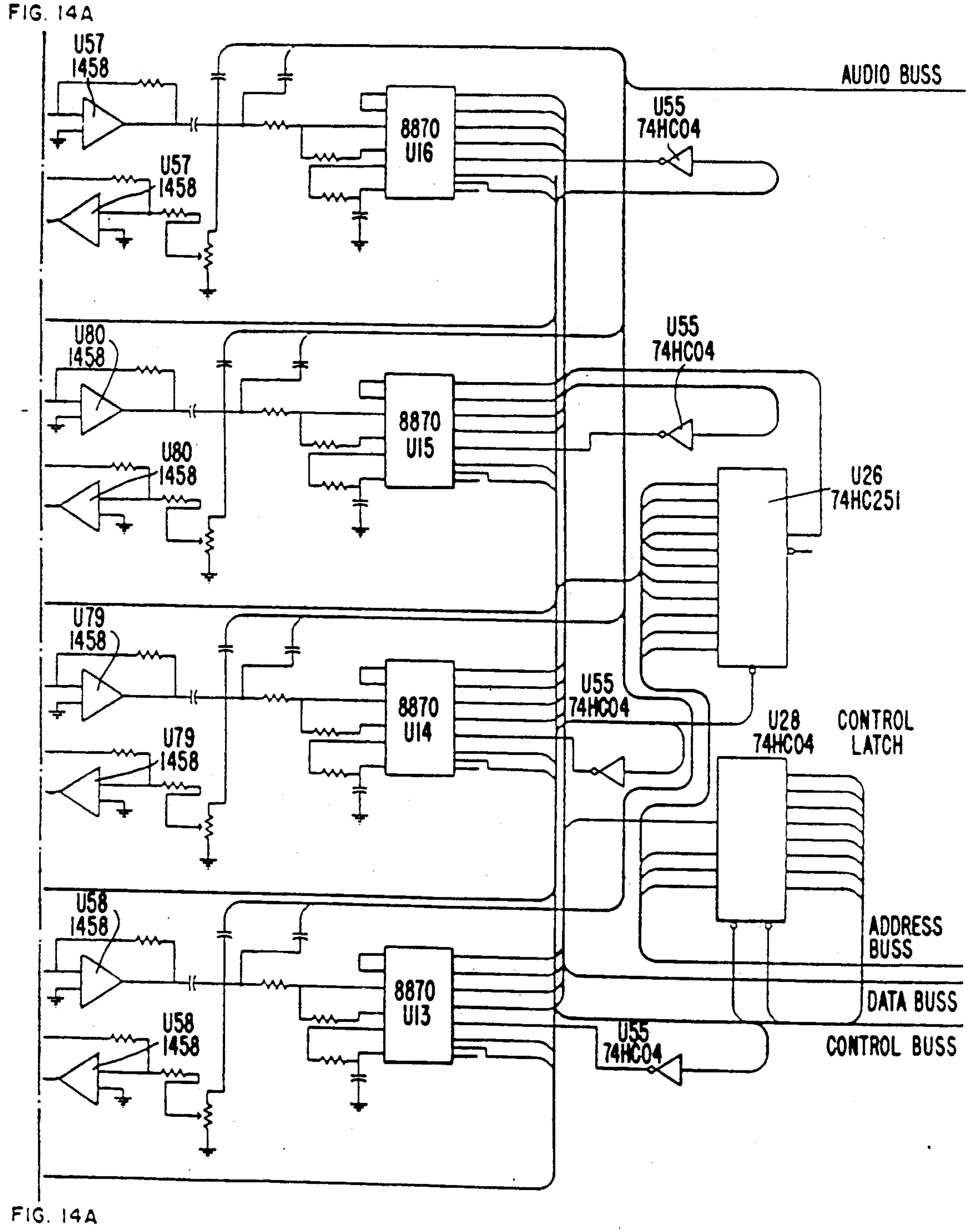

A preferred embodiment of the data input 30 is illustrated in FIGS. 14(A and B)-16(A and B). Integrated circuits are identified by their industry or manufacturer's designation. A control program for the data input processor is set forth in the above-reference Appendix. The control program for the data input processor is programmable by input from the keyboard 36 to alter its function to perform the inputting of data for any one of the sublocal, local, lata and hub switches. The data input 30 contains support for four direct inward dial DID trunks. Digits out-pulsed from the central telephone office may be rotary dial or DTMF tones up to sixteen digits in length. The data input 30 supports immediate or wink-start trunks. A preferred implementation of the DID trunk board with trunk interfaces is illustrated in FIGS. 14A and B. Validation relay U37 provides the necessary tip-ring line reversals for call validation. The U38 electronic SLIC provides the two-wire to four-wire conversion for the on-board electronics. Resistors R4 and R5 determine the lien impedance for the 2006 SLIC. Hybrid balance is set by resistor R6 at 40/60 db. Off-hook seizure of the trunk is detected by the 2006 SLIC. The off-hook logic is routed to U26 for detection by the on-board processor. The off-hook output also detects rotary dial signaling. The line amplifier U57 provides an adjustable input and output level for DTMF tones and voice messages. The U15 8870 DTMF decoder detects dialed-up and "over-dialed" digits sent from the central office or the subscriber. The data valid output of the U15 8870 DTMF decoder is routed to U26 for detection by the microprocessor. The valid date relay is controlled by the relay driver U83 and the control latch U28.

Figure 15A:
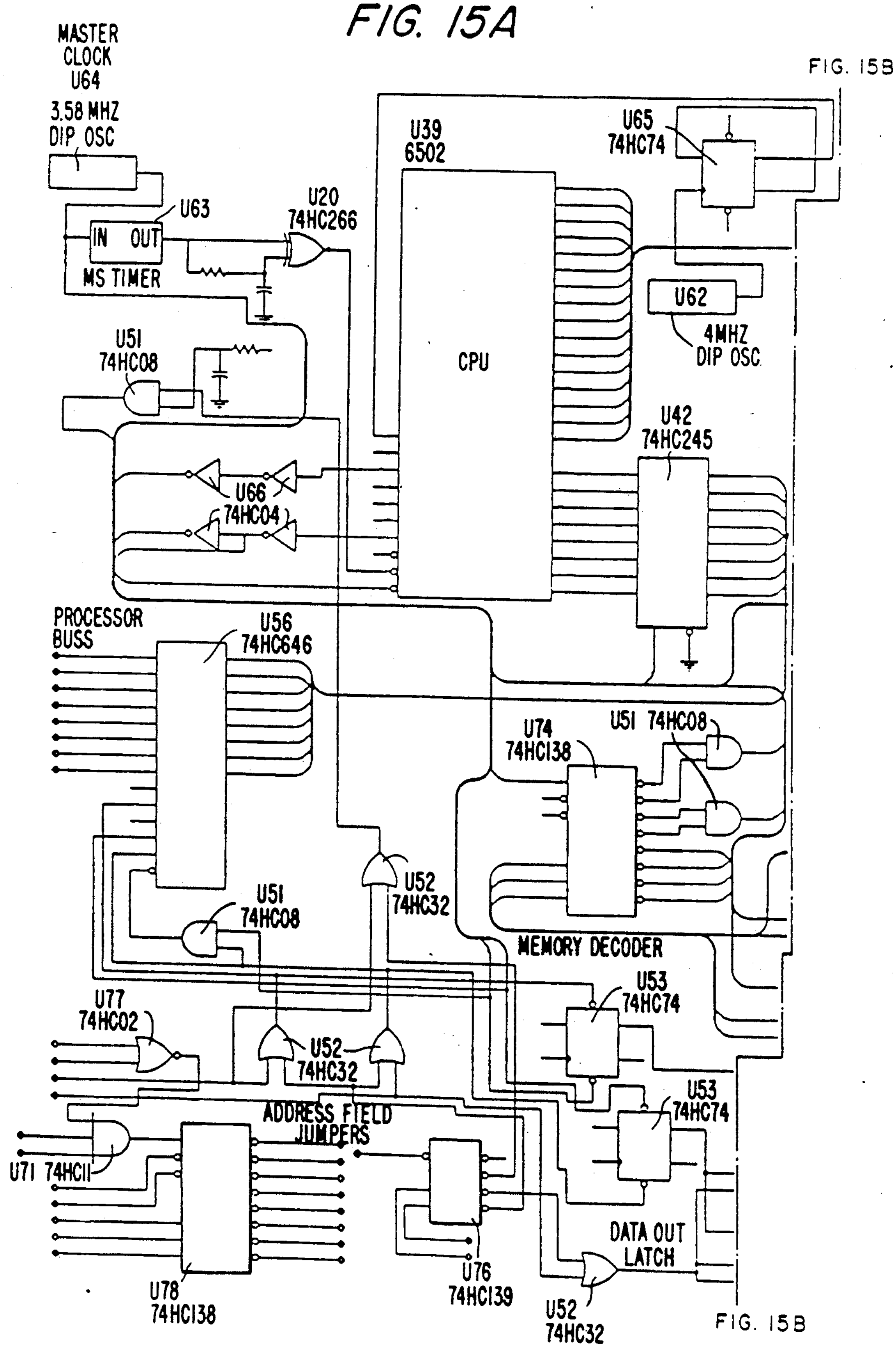
FIGS. 15A and B are a circuit schematic of a PC DID CPU Interface of the data input 30 in accordance with the present invention.
Figure 15B:
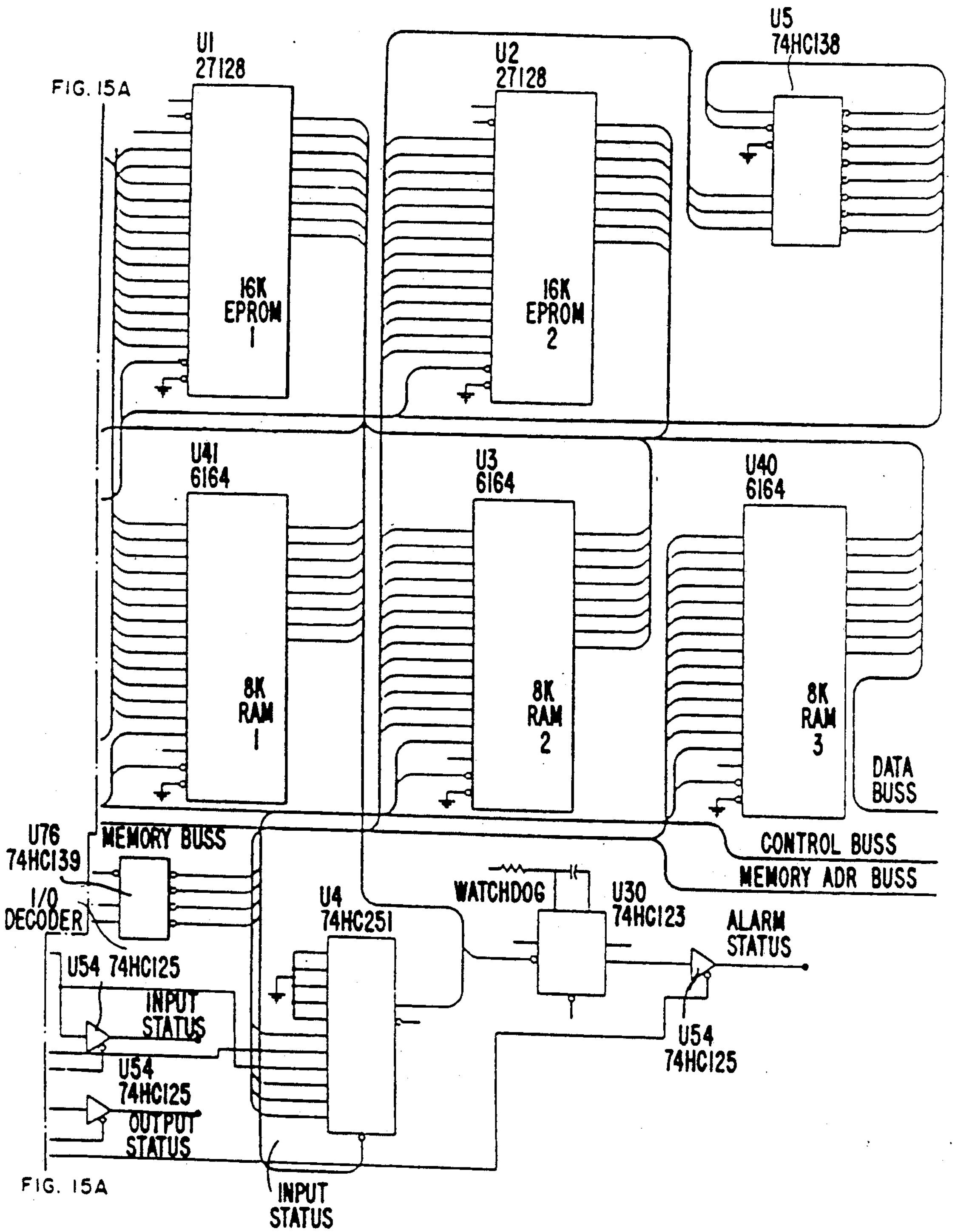

FIGS. 15A and B are discussed as follows. FIG. 15A contains the resident microprocessor U39 of the data input 30 which has 32 bytes of stored program in EPROM (U1 and U2) and 24K bytes of RAM (U3, U40 and U41) for temporary message storage contained in FIG. 15B. The resident microprocessor applies the buffer address of the inbound pages buffer 84 to pages that are inputted by the telephone trunk 28 in non-X.25 protocol. The operational status of the resident processor is monitored by watchdog timer U30. In the event of processor failure, the watchdog timer alerts the CPU 50 that a malfunction exists. The data interchange between the resident microprocessor of the data input 30 and the CPU 50 takes place with the bi-directional latch U56. Buffer status latches U53 determine the status of data entering and exiting the data input 30. Board address decoding is determined by the U76, U77, U78 and U21. The address jumpers are set to determine the starting address field for the data input.

Figure 16A:
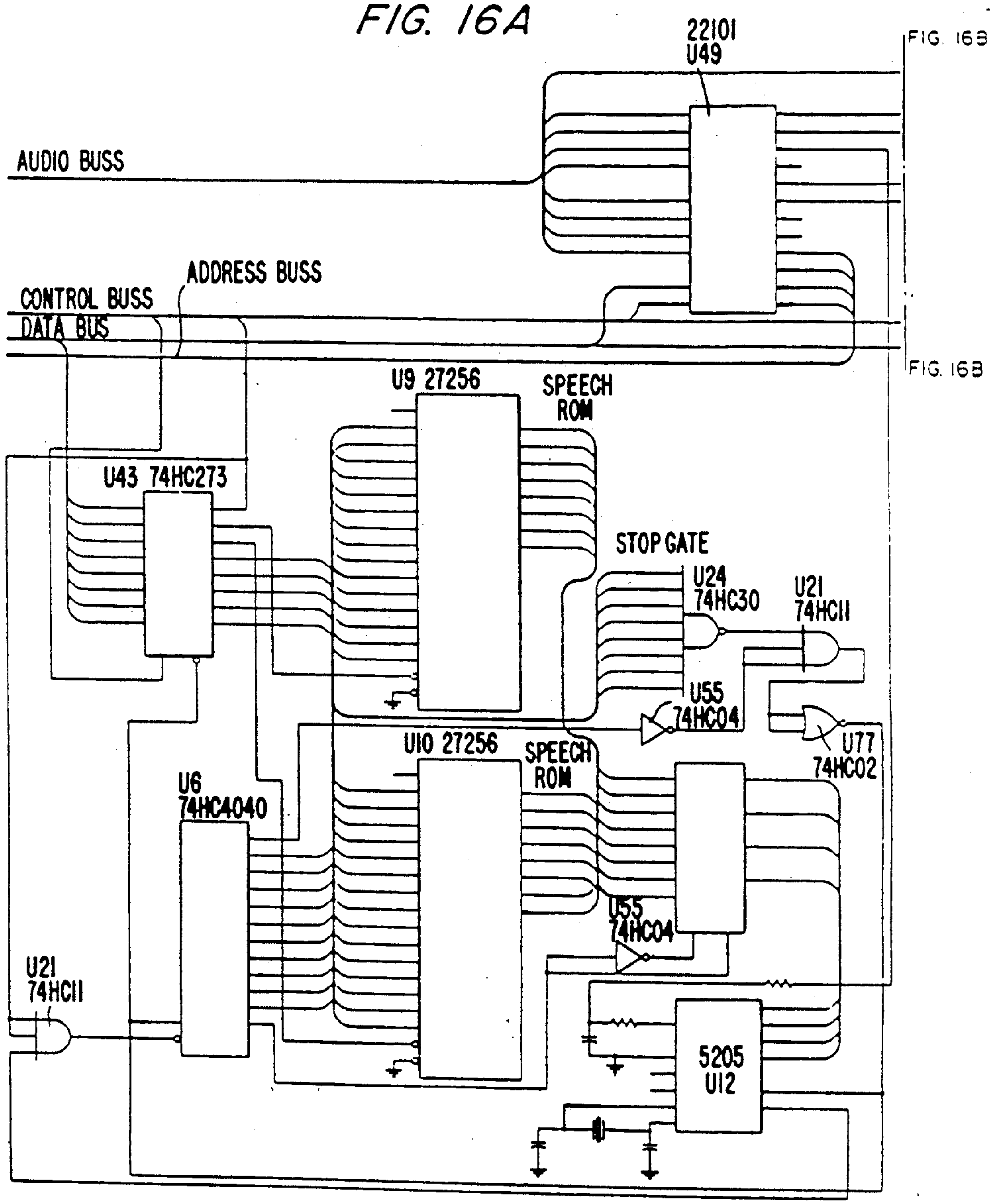
FIGS. 16A and B are a circuit schematic of PC DID Audio Routing of the data input 30 in accordance with the present invention.
Figure 16B:
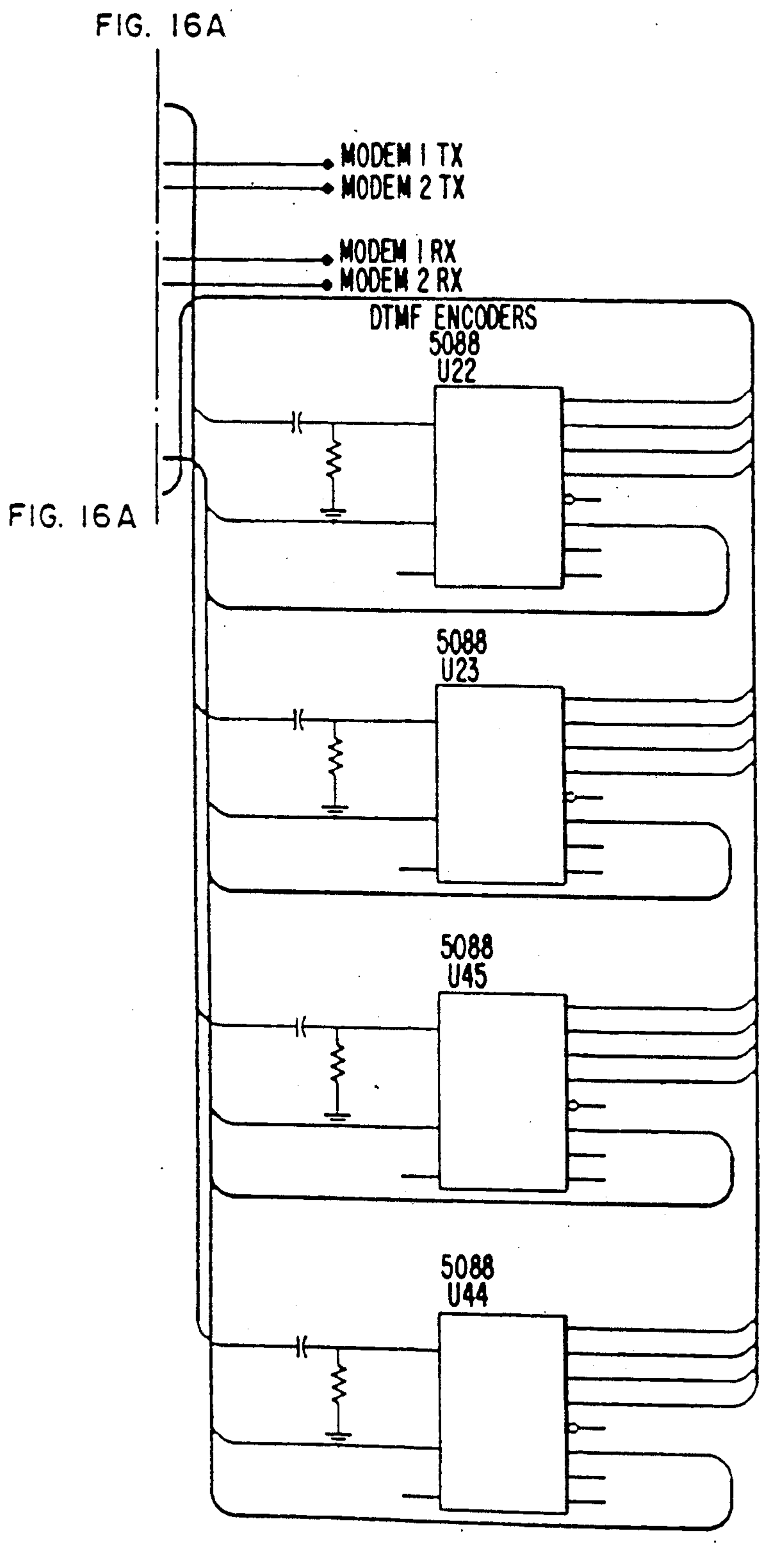

FIGS. 16A and B contain the voice messaging synthesizers, the audio matrix switch and the DTMF encoders of the data input 30. The voice synthesizer is under direct control of the CPU 50 via the word latch U43 and functions to provide necessary voice prompting between persons calling in pages or programming their subscriber file. The starting address of the word addresses the speech ROMs U9 and U10. The U6 HC 4040 word address counter presents the four-bit ADPCM words to the U8 HC 4019 four-bit gate to the U12 5205 voice synthesizer message. The voice audio is routed through the U49 22101 audio matrix switch to the respective DID trunk.

Dedicated trunk DTMF encoders U22, U23, U45 and U44 encode digits sent to the trunks 1-4, respectively of the data input 30. The encoded digits are sent from the microprocessor to the respective encoder. The output levels are present relative to the adjusted audio level from the line amplifiers for a level equal to the maximum voice level.

2. Data Output 34

The data output 34 performs several functions. For batches of pages which are destined for the local paging service 18, the data output converts the pages as outputted from the ID code buffers 86 from ASCII to the hybrid encoding format discussed below. However, it should be understood that the invention is not limited to the use of the hybrid encoding format. For packets of pages which are destined for the lata switch 14, the data output 34 accepts the pages which have been formatted in the X.25 transmission protocol by the data module processor 32 as described below and outputs them to the lata switch over communications link 20. A preferred embodiment of the data output 34 is illustrated in FIGS. 17(A and B)-19(A and B). A control program for the data output 34 is set forth in the above-referenced Appendix. The control program is programmable by input from the keyboard 36 to alter its function to perform the outputting of data for any of the sublocal, local, lata and hub switches. Integrated circuits are identified by their industry or manufacturer's designation. The transmission of pages from the data output 34 are periodic (non-real time) to both the lata switch 14 having jurisdiction over the local switch 12 and to the local paging service 18.

The ports of the data output 34 perform the following functions. A first port serves as the network entry/exit point for the network. X.25 data packets are sent and received between the first port which is connected by communication link 20 to the lata switch 14 having jurisdiction. The first port utilizes a two-wire subscriber line to send X.25 encoded packets which originate from the local switch 12 to the lata switch 14 having jurisdiction. Ring-in on the port connected to the lata switch 14 initiates a network answer and network paging data can be down-loaded from the lata switch 14. The second port of the data output 34 may perform any one of three functions. It may operate as a telephone port as described above. When operated as a telephone port, it dials into an unused DID trunk of the local paging service 18. An unused telephone and voice pager is assigned to the terminal of local paging service 18. This permits functioning as the local paging service 18 front-end entry to the network 10. This configuration is especially useful when the local paging service 18 has an existing analog compatible transmitter. The second function of the second port is a stand-along paging switch connected directly to a locally controlled transmitter 15 in the local paging service 18 or "hand-shaked" with an existing analog system. The output audio is paralleled or switched with the transmitter controlled local control connections. Hand-shake inputs and outputs permit the local switch 12 and the terminal of the local paging service 18 to "share" transmitter control without collisions. A collision is when one terminal attempts to page while the other is paging on the transmitter control pair. In this configuration, the local collector may operate as a stand-alone or "shared" terminal. The third function of the second port permits the local switch 12 to operate as a stand-alone or shared switch for a digital-only paging service 18. In the stand-alone digital configuration, the local switch 12 is connected to the digital transmitter 15 via the data and transmitter keying control logic outputs. When shared with an existing digital transmitter, the data transmitter control and hand-shake control lines are routed through the local switch 12 for control.

The data output 34 contains a resident microprocessor to control the local and network ports, encode and decode telephone digits. The microprocessor performs the important function of converting ASCII encoded batches of pages which are received from the ID code buffers 86 for transmission to the local paging service 18 into the hybrid encoding format discussed below which is compatible with analog or digital FM paging transmitters. Each character of a numeric page which is transmitted with the A3, C3, A5 and C5 commands is encoded with a single tone discussed below. Each character of a page which is transmitted with the A4, C4, A6 and C6 commands is encoded with sequential tones discussed below to be transmitted to a local paging service 18 is encoded by two tones in accordance with the table set forth below whether the page is to be in English or Japanese. The pages previously grouped by the CPU 50 in the ID code buffers 86 are buffered in the data output until their periodic transmission. The data output 34 controls the transmitter 15 of the local paging service 18. A prompting voice synthesizer and the audio matrix switch for routing X.25 formatted packets of pages are also contained in the data output 34.

Figure 17A:
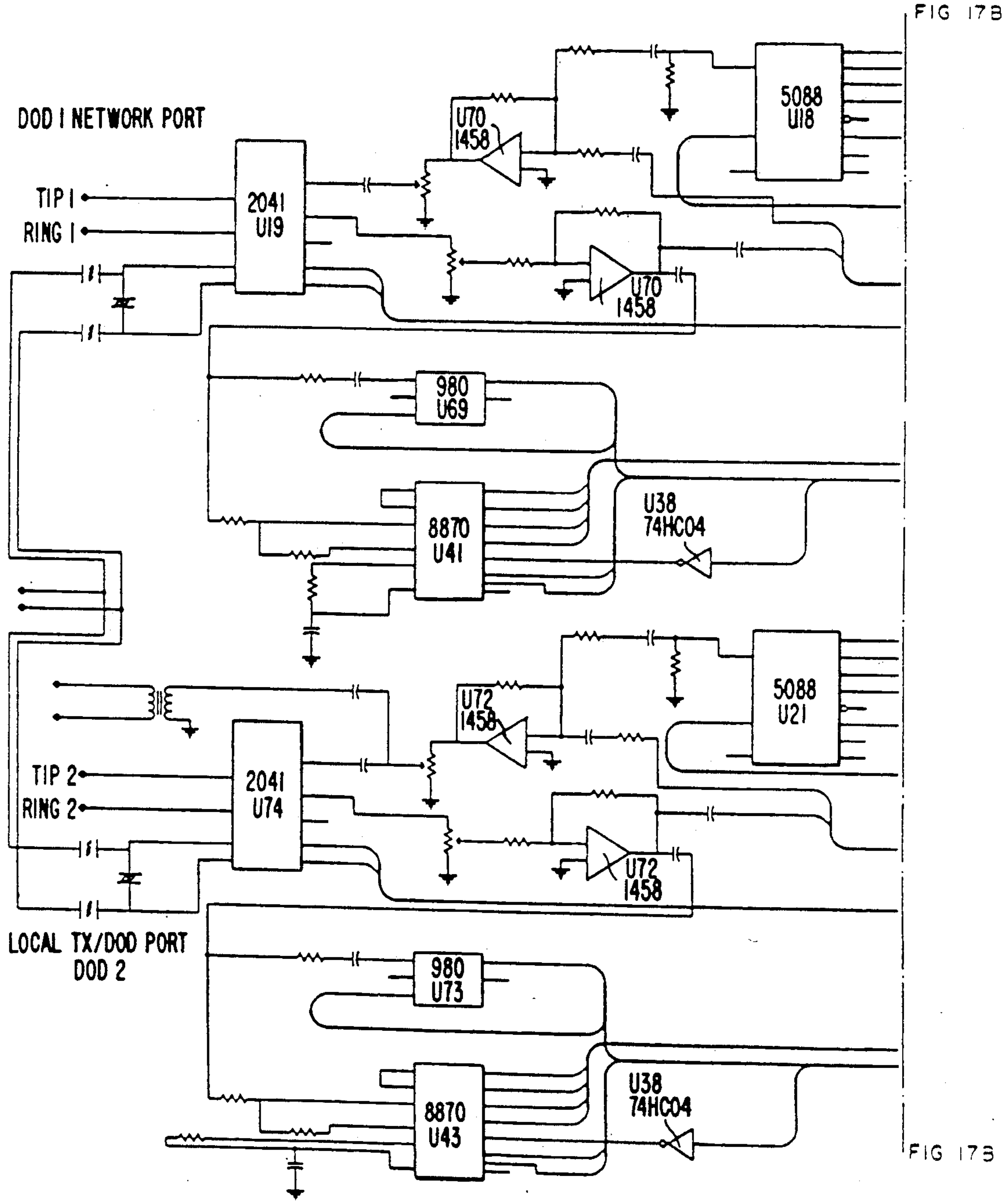
FIGS. 17A and B are a circuit schematic of a PC DOD Trunk Interface of the data output 34 of the present invention.
Figures 17A, 17B:
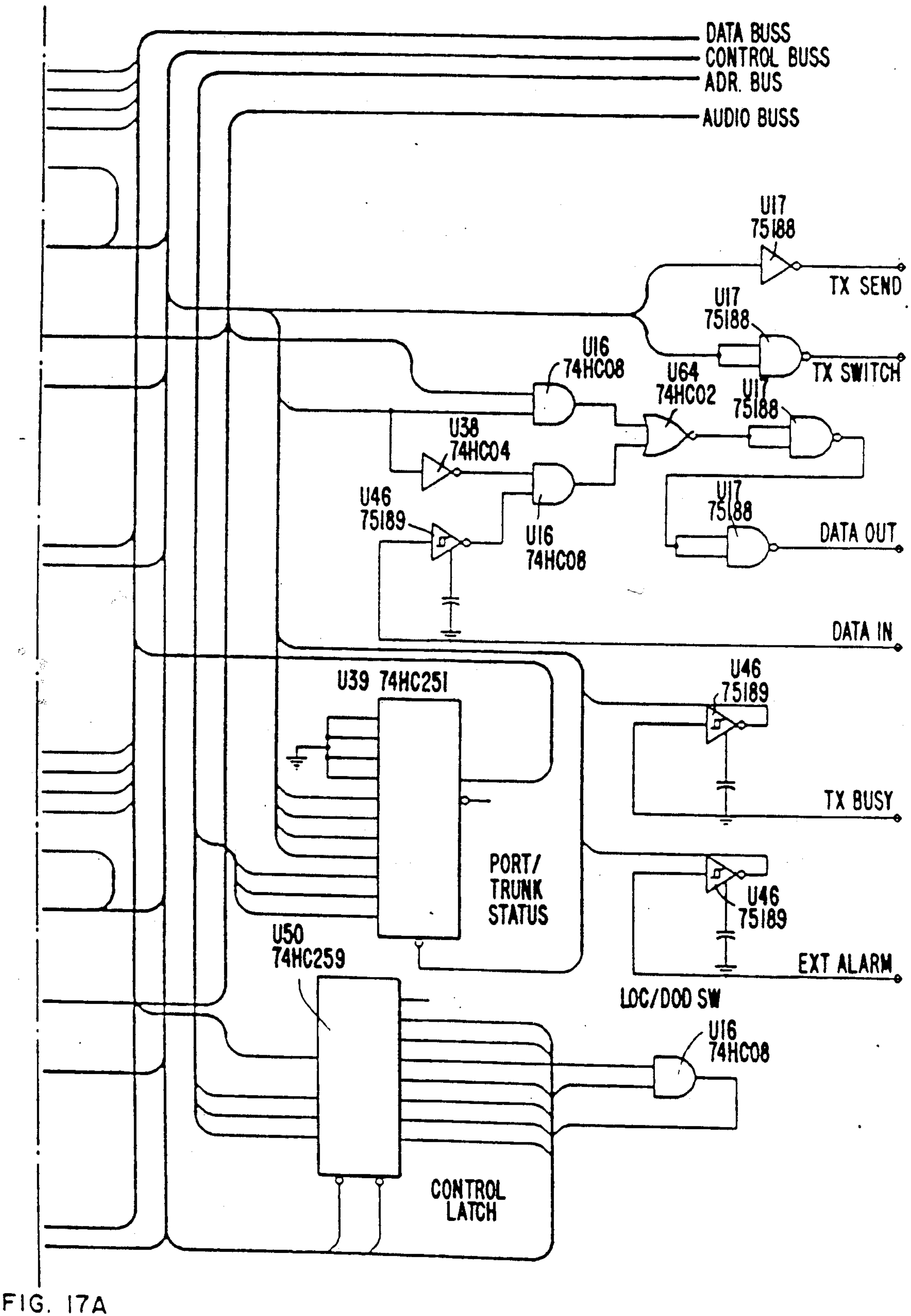

FIGS. 17A and B contain the telephone trunk interface electronics. When both ports are used in a dial-up configuration, the U19 and U20 2041 electronic RSLIC's convert to the two-wire TIP-RING to a four-wire circuit. An internal hybrid provides the necessary isolation. Ring-in detection and seizure of the telephone circuit are also accomplished by the RSLIC. The U70 and U72 1458 line amplifiers provide gain for receiving and transmitting audio. DTMF digits are decoded by the U41 and U43 8870 decoders. Telephone office tones are detected by the U69 and U70 M980 detectors. Tones are monitored by frequency and cadence permitting the sequence for determining call status. A U18 or U21 5088 DTMF encoder is utilized under direct processor control to originate DTMF signaling digits.

Figure 18A:
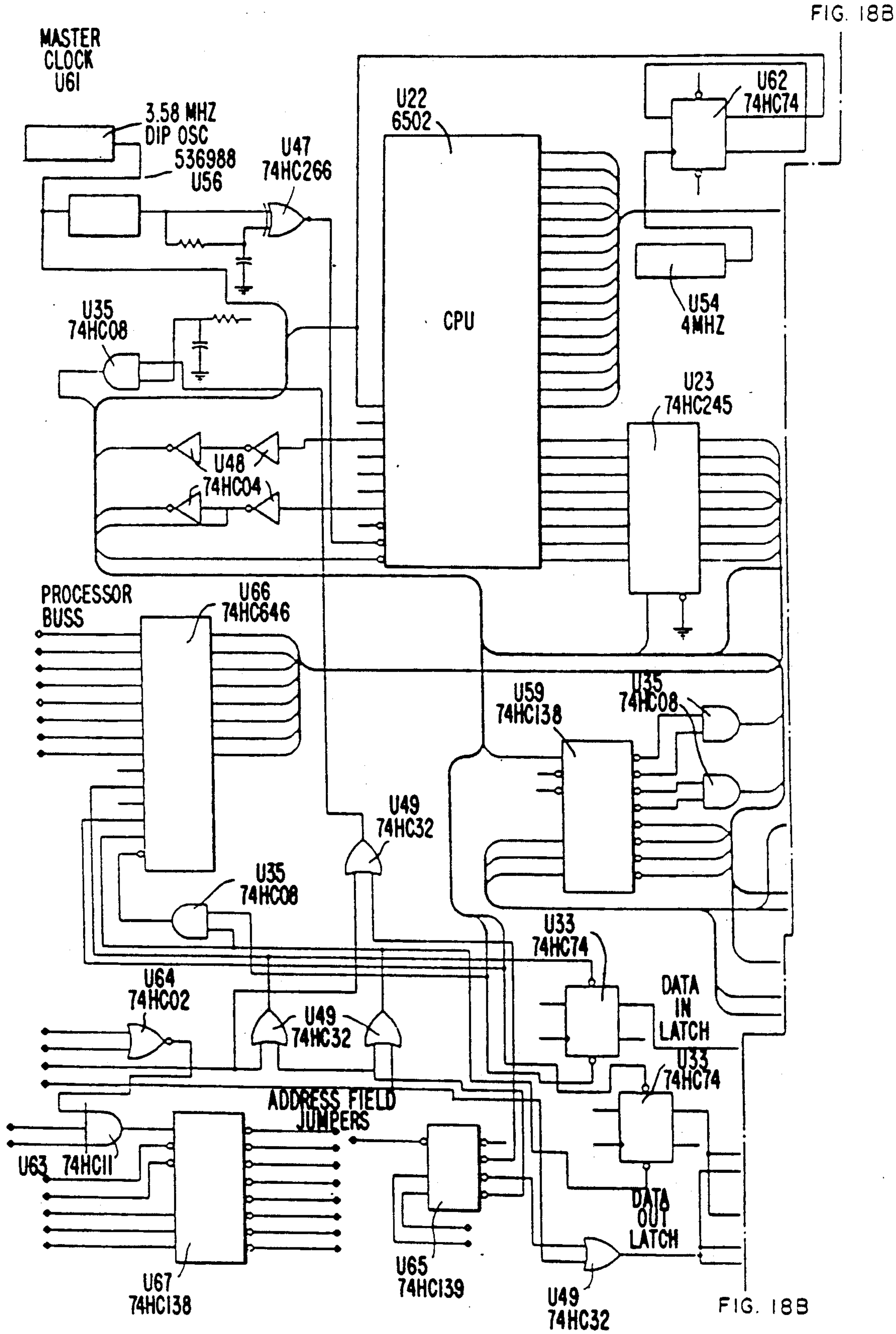
FIGS. 18A and B are a circuit schematic of a PC DOD CPU Interface of the data output 34 of the present invention.
Figure 18B:
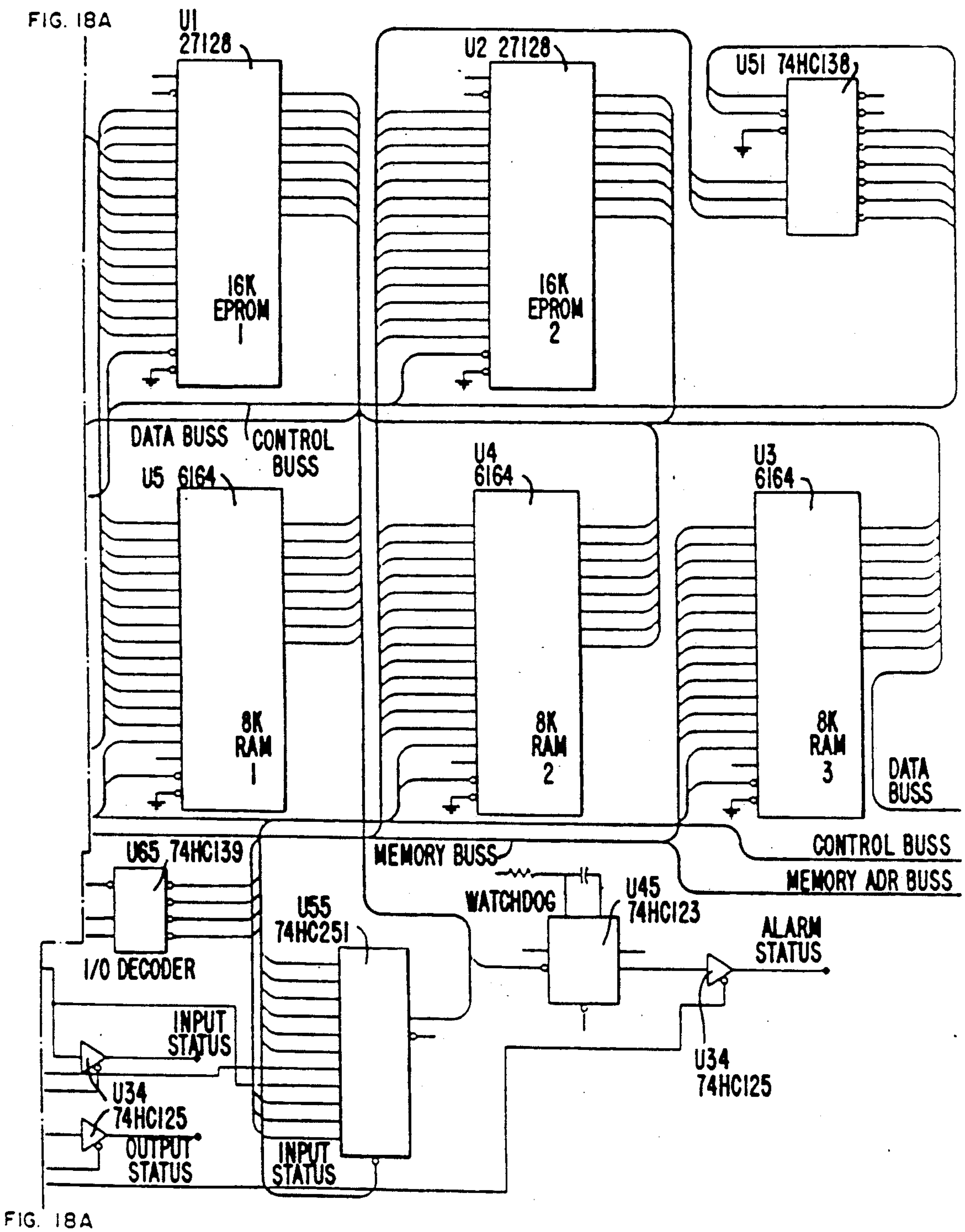

FIGS. 18A and B contain the resident microprocessor (U22), RAM (U3–U5) and EPROM (U1 and U2) memories utilized for the stored program and the buffering of messages. Storage of 32K bytes of stored program and 24K of RAM memory are utilized for these functions. The address jumpers are located within the appropriate bus buffer U66 and status latch U33. A watchdog timer U45 monitors the operation of the processor and alerts the switch when a malfunction is detected.

Figure 19A:
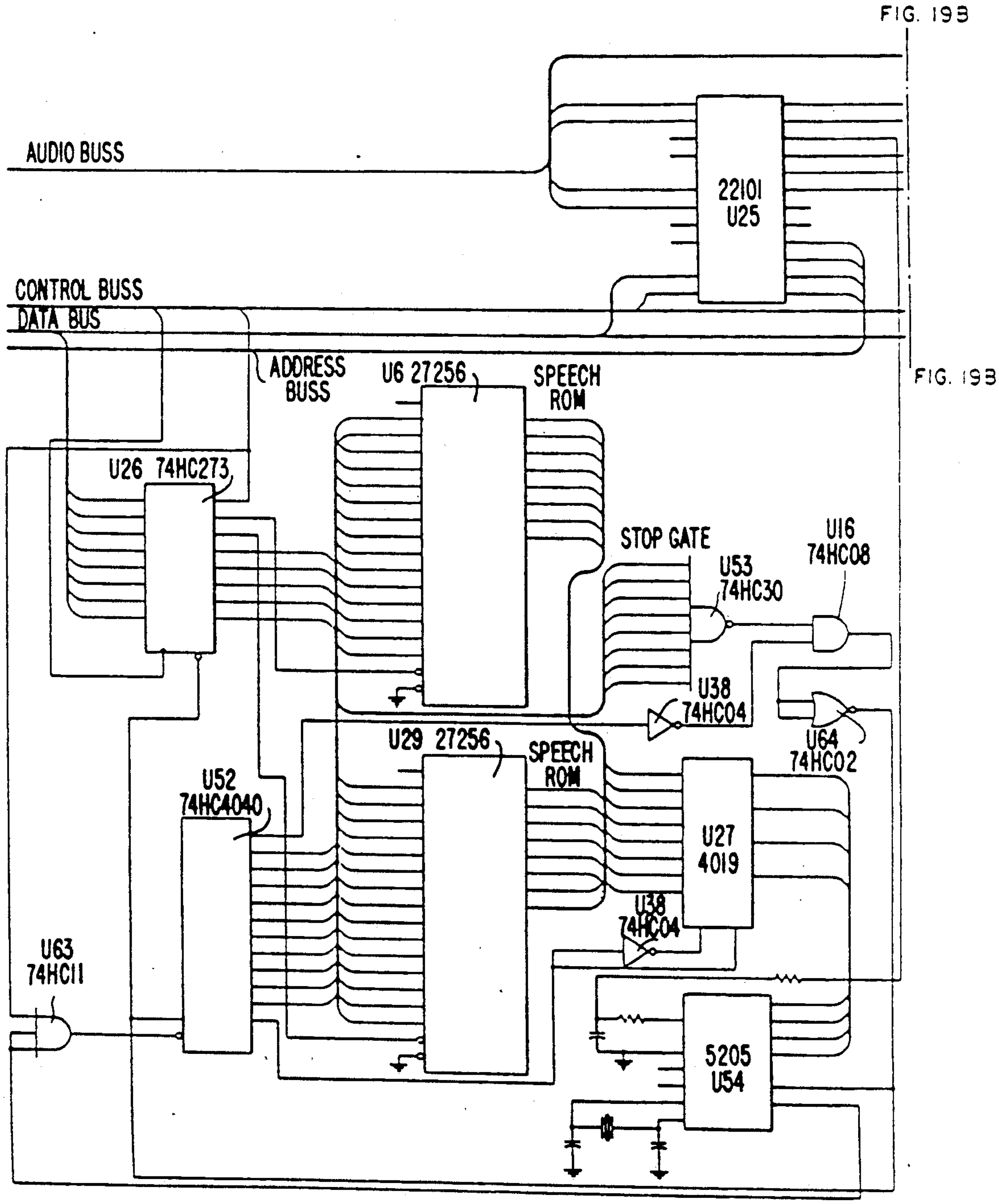
FIGS. 19A and B are a circuit schematic of PC DOD Audio Routing of the data output 34 of the present invention.
Figure 19B:
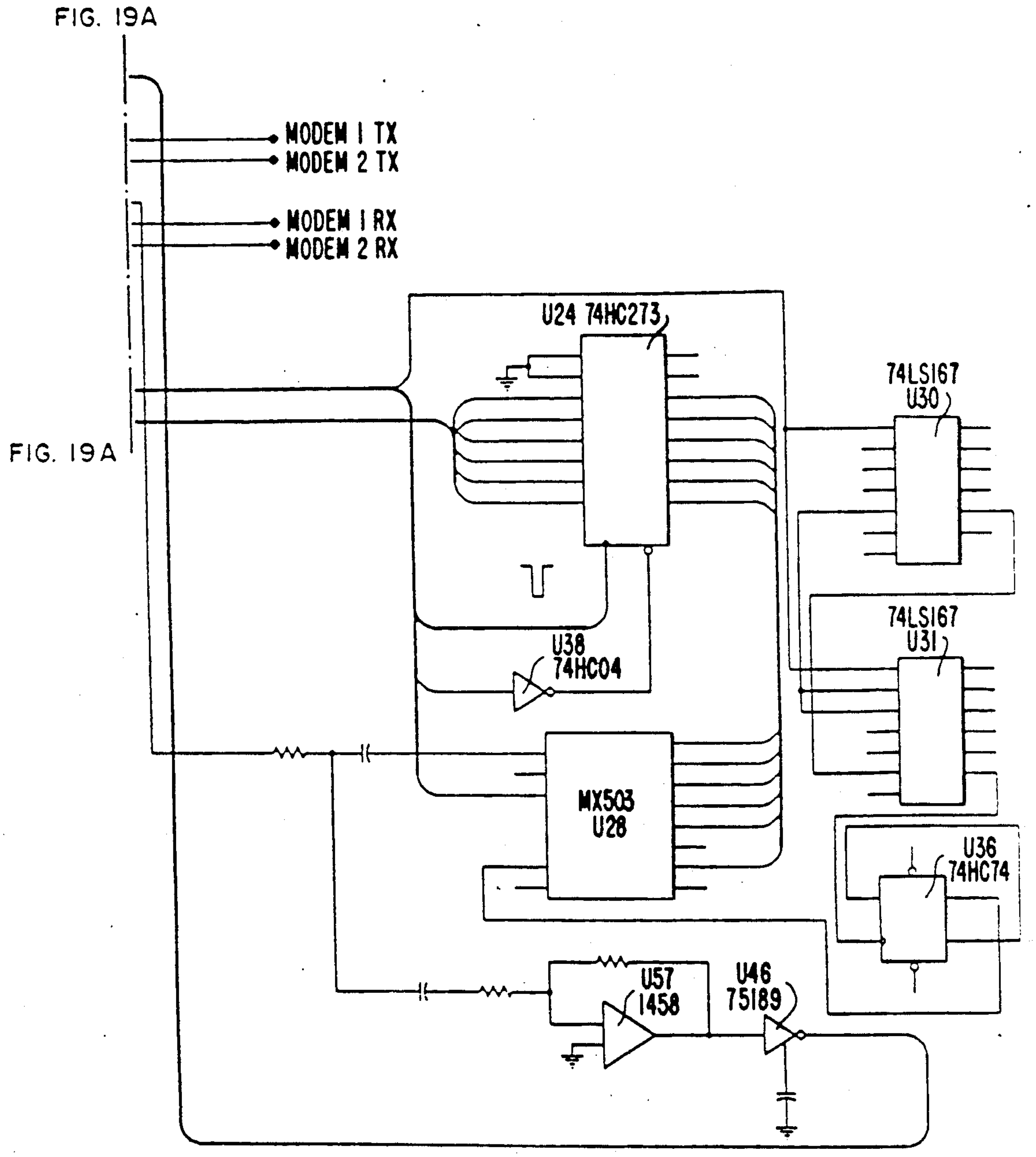

FIGS. 19A and B contain the voice message synthesizer, X.25 matrix switch and the paging protocol encoder for encoding batches of pages received from the ID code buffers 86 for transmission to the local paging service. The protocol encoder U28 is under direct control of the processor via the latch U24. The analog protocol is converted into a digital waveform by U46 and U57 when digital outputs are used from the board. The U25 22101 audio matrix switch routes pages to and from the CPU 50 and also routes the voice messaging audio to the network ports. The voice synthesizer U54 synthesizes words stored in ROM memories U6 and U29 that are selected by word latch U26. Message generation is under direct control of the processor of the microprocessor.

3. MF and DTMF Processor 44

The MF and DTMF processor is utilized when interfacing to four-wire E and M trunks requiring MF signaling and bi-directional supervision. The MF and DTMF processor 44 contains two trunks, the MF encoders and decoders and DTMF encoders and decoders under the direct supervision of an on-board microprocessor. A preferred embodiment of the MF and DTMF processor 14 is illustrated in FIGS. 20(A and B)–22(A and B). Integrated circuits are identified by their industry or manufacturer's designation. The program of the resident microprocessor is set forth in the Appendix.

Figure 20A:
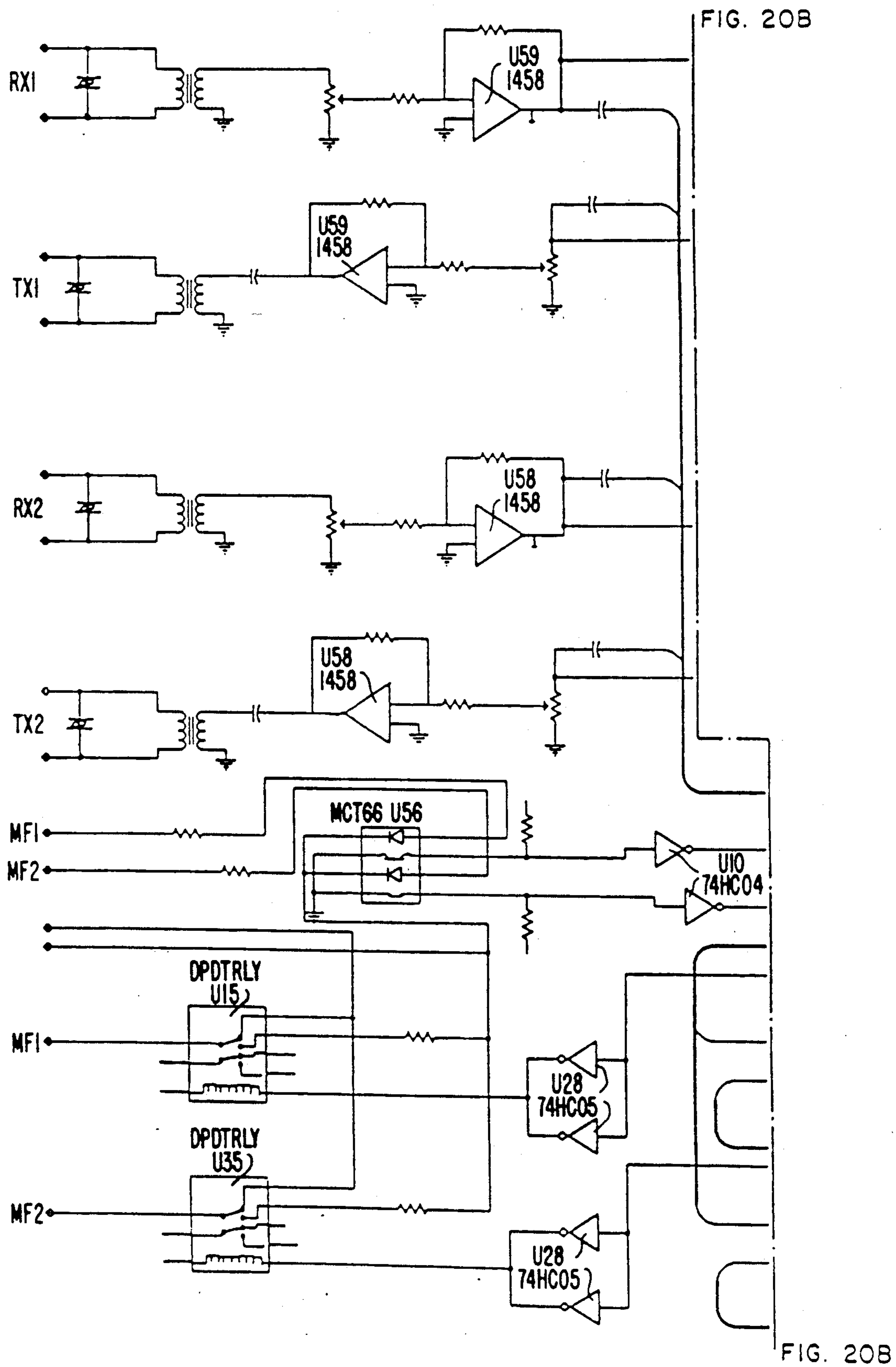
FIGS. 20A and B are a circuit schematic of a PC MF Trunk Interface of the MF and DTMF Processor 44 of the present invention.
Figure 20B:
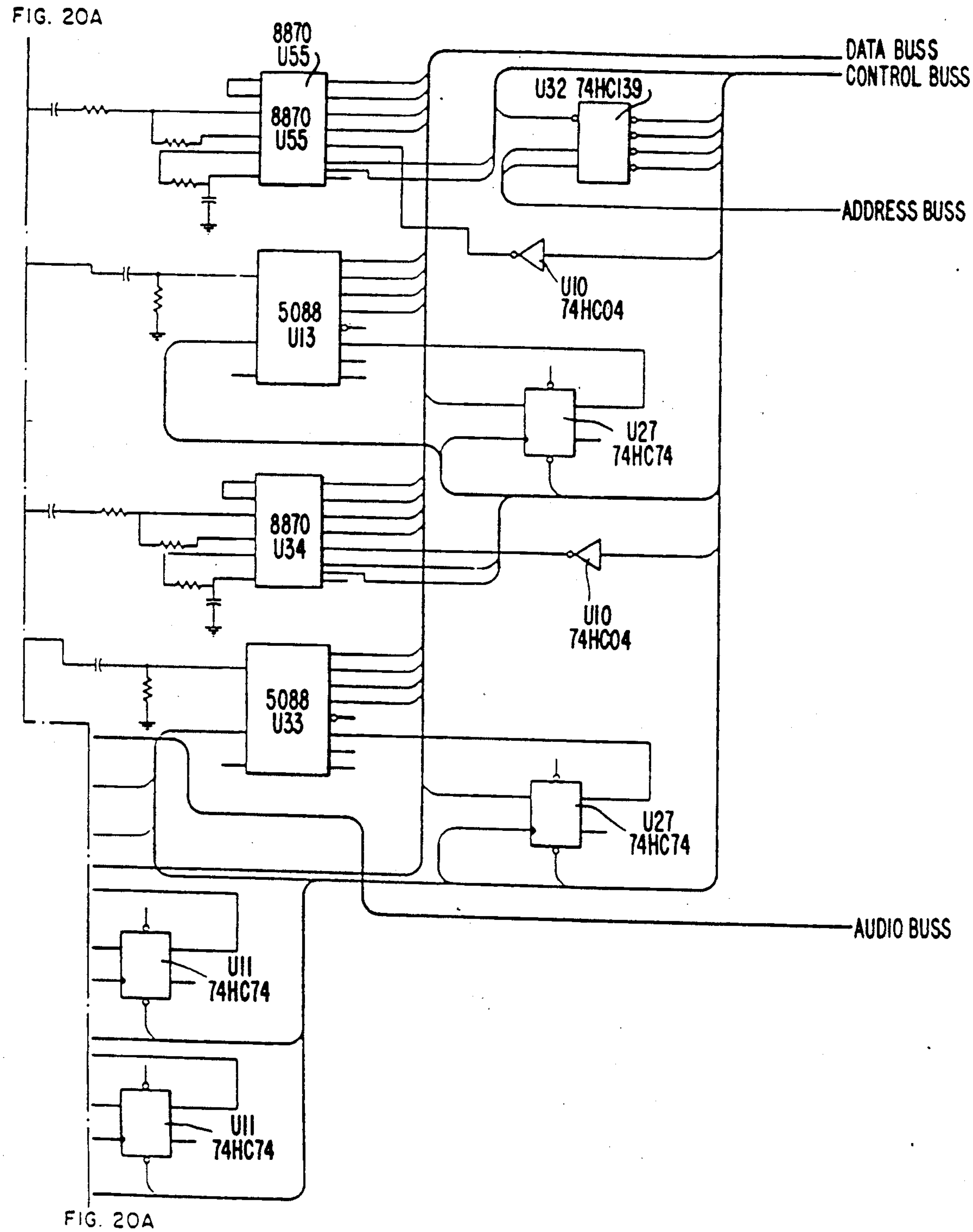

FIGS. 20A and B are described as follows. FIG. 20A contains the trunk line amplifiers U58 and U59 for the two trunk pairs. The "E" lead supervision inputs for each trunk are controlled by the opto-isolator U56. Current is limited to 15 milliamps in each of the "E" lead circuits by resistors R25 and R26 for trunks 1 and 2, respectively. The "M" lead control for each trunk is provided by relays U15 and U35 with current-limiting resistors R27 and R28. The "M" lead is at a battery-common potential when at rest and changes to a −48 volt battery during wink and supervision periods. The "E" lead logic signals are routed to the processor for interpretation. FIG. 20B performs the following functions. The "M" lead control is under direct control of the microprocessor via latch U11. DTMF encoders and decoders are provided. The U34 and U55 8870 decoders contain the amplifiers, filters and tone detection electronics to detect the presence of DTMF tones. When a tone is detected, the microprocessor is alerted via the DV (data valid) output on pin 15. DTMF tone generation is accomplished by the 5088 encoders U13 and U33. Tone duration is microprocessor controlled with the tone enable latches U27 and U32. Modem audio and voice messaging is routed to the audio matrix switch for distribution.

Figure 21A:
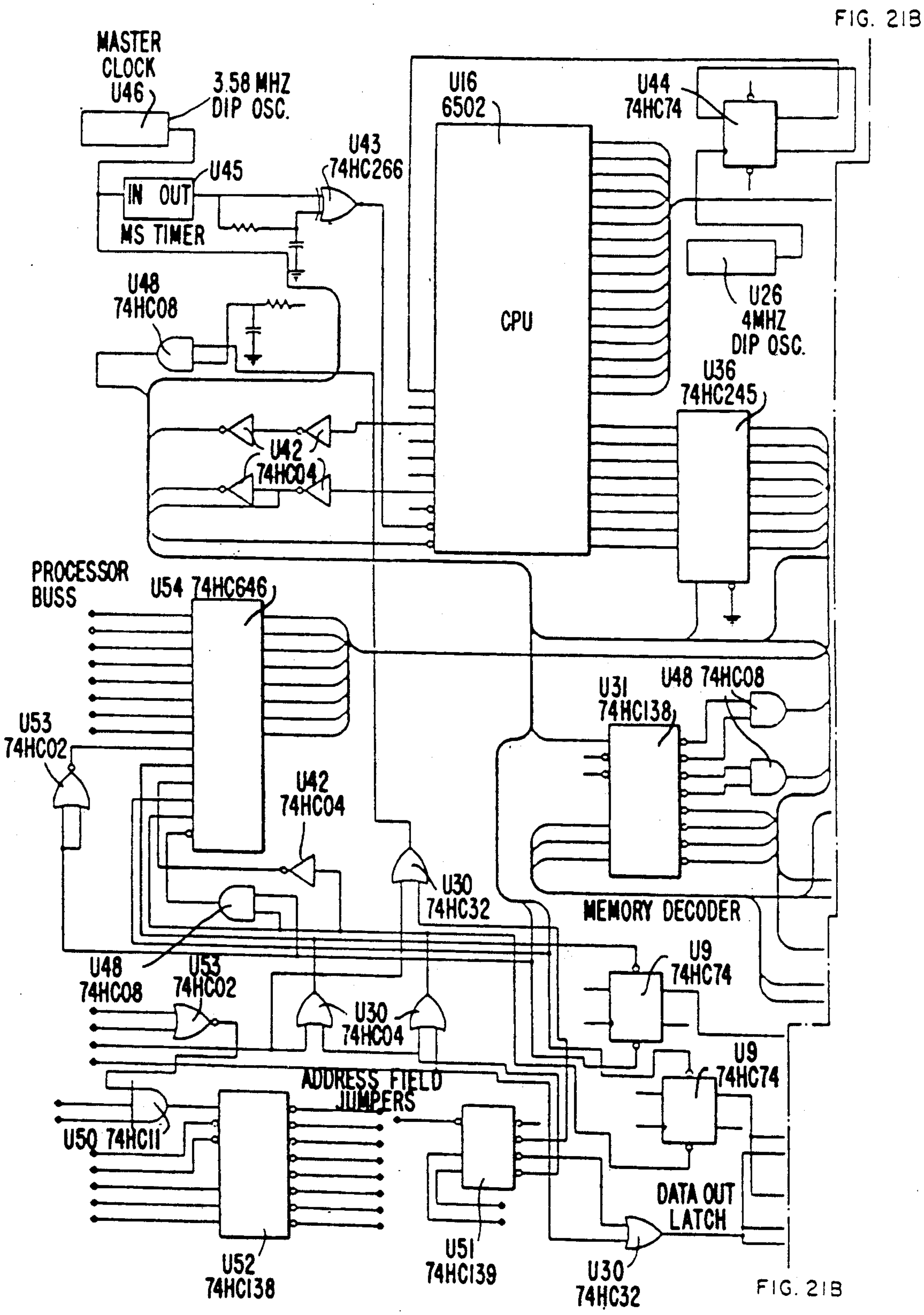
FIGS. 21A and B are a circuit schematic of a PC MF CPU Interface of the MF and DTMF Processor 44 of the present invention.
Figure 21B:
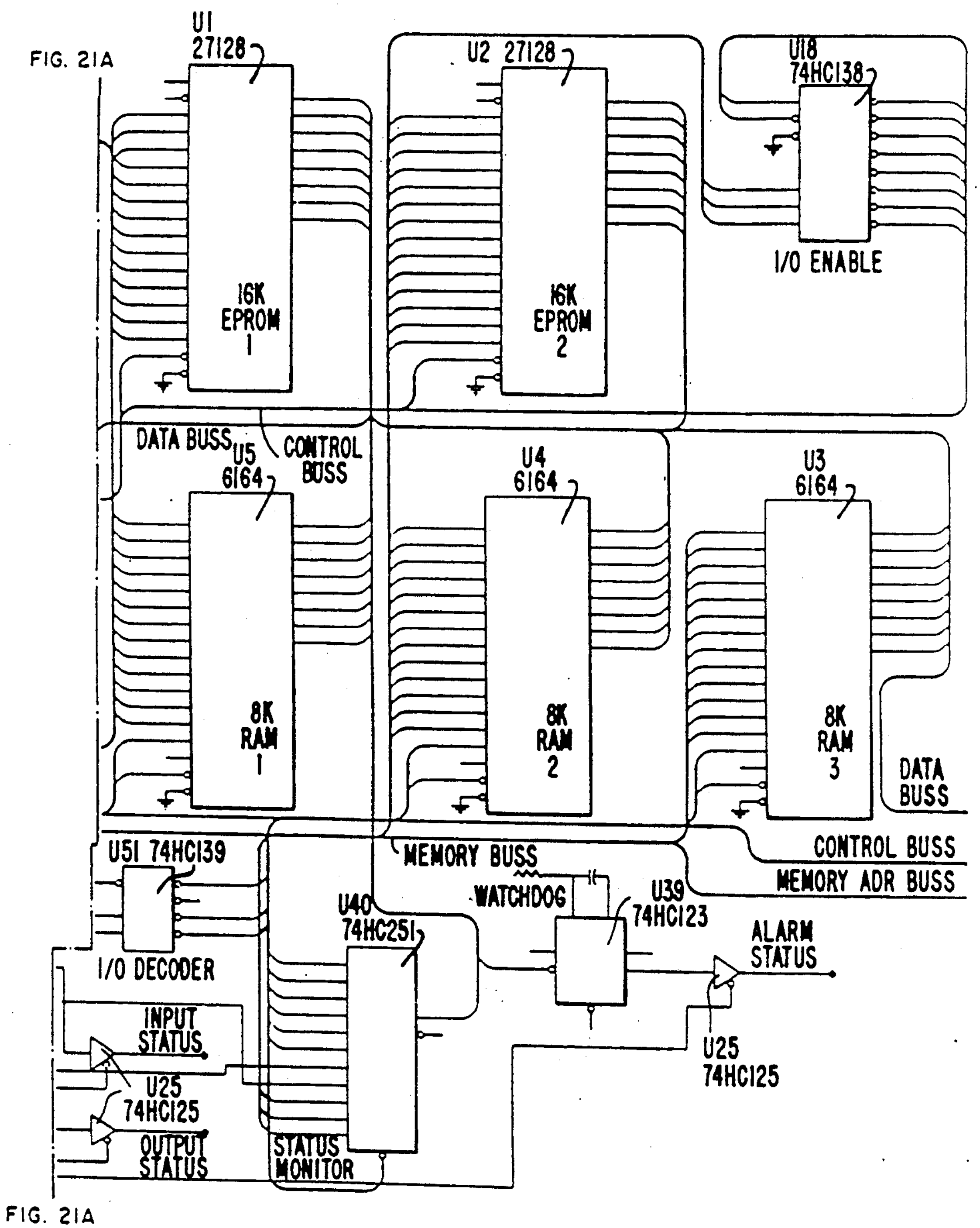

FIGS. 21A and B contain the microprocessor and related support electronics. The U46 master clock for the processor U16 is a 3.58 MHz and is utilized for the DTMF encoders and decoders and the interrupt timers. The master clock frequency is divided by two by U44 and sent to the clock input of the processor. Five millisecond interrupts are generated by the 3.5 MHz divider U45 and the EXCLUSIVE OR gate U43. Every 5 milliseconds, the processor determines if any change in input/output functions has taken place. The processor also uses the 5 millisecond interrupts as a timer reference for determining timing and signaling sequences. Two 27128 16K byte EPROM memories (U1 and U2) contain the stored program for the microprocessor. Memory of 24K bytes of RAM (U3–U5) are used for temporary storage of pages to be sent or received via DTMF signaling and trunk status. A watchdog timer U39 monitors the status of the data bus and, upon failure of the microprocessor, alerts the central processing unit 50. The input/output interface between the MF and DTMF processor 44 and the CPU 50 utilizes a bi-directional tri-state latch. The latch U54 can send, receive and store messages simultaneously. The address of the MF and DTMF processor 44 within the architecture of FIG. 2 is determined by U52, U53, U51, U9 and U26. When the MF and DTMF processor 54 receives data from the microprocessor, the data is ready to be read.

Figure 22A:
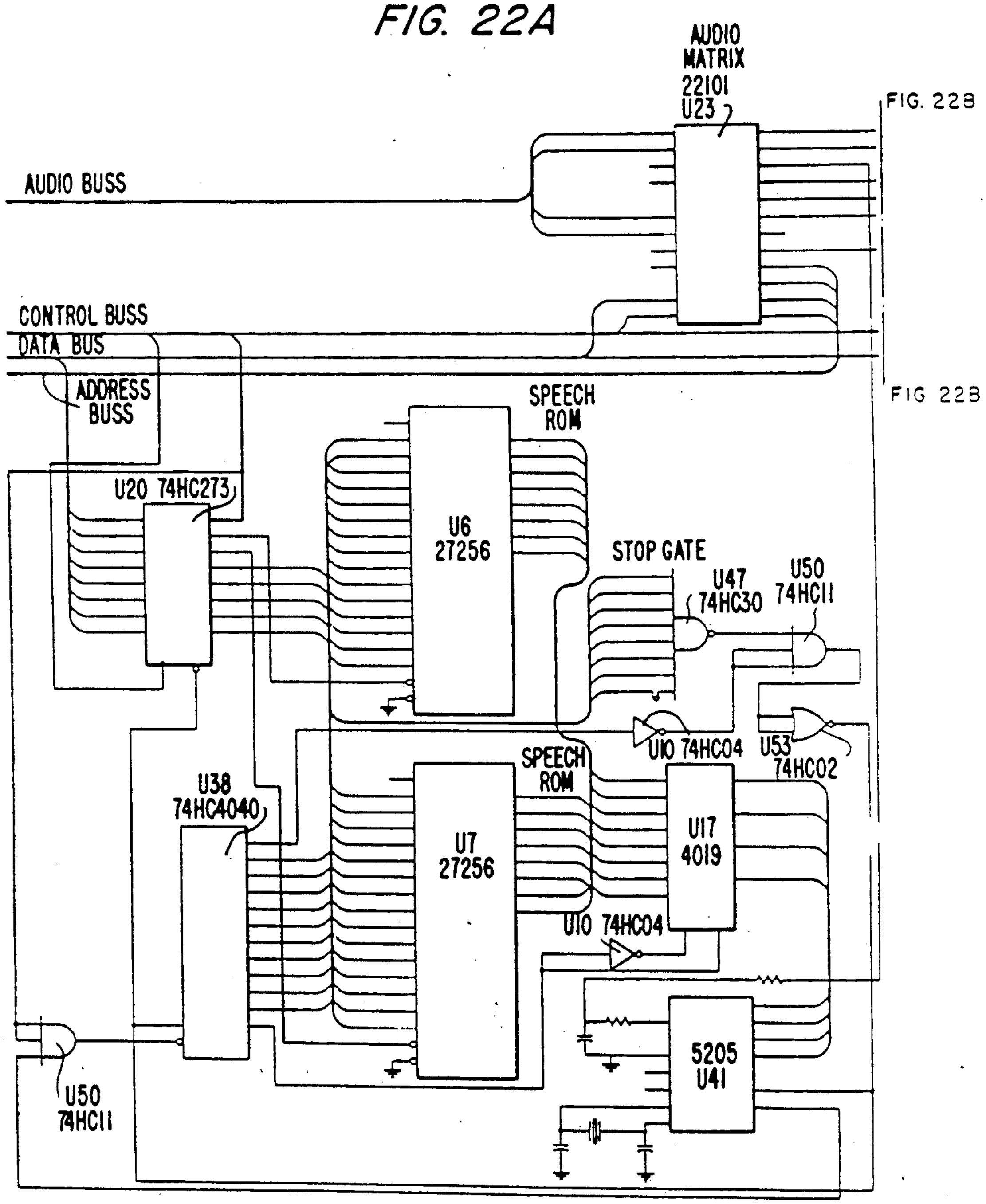
FIGS. 22A and B are a circuit schematic of PC MF Audio Routing of the MF and DTMF Processor 44 of the present invention.
Figure 22B:
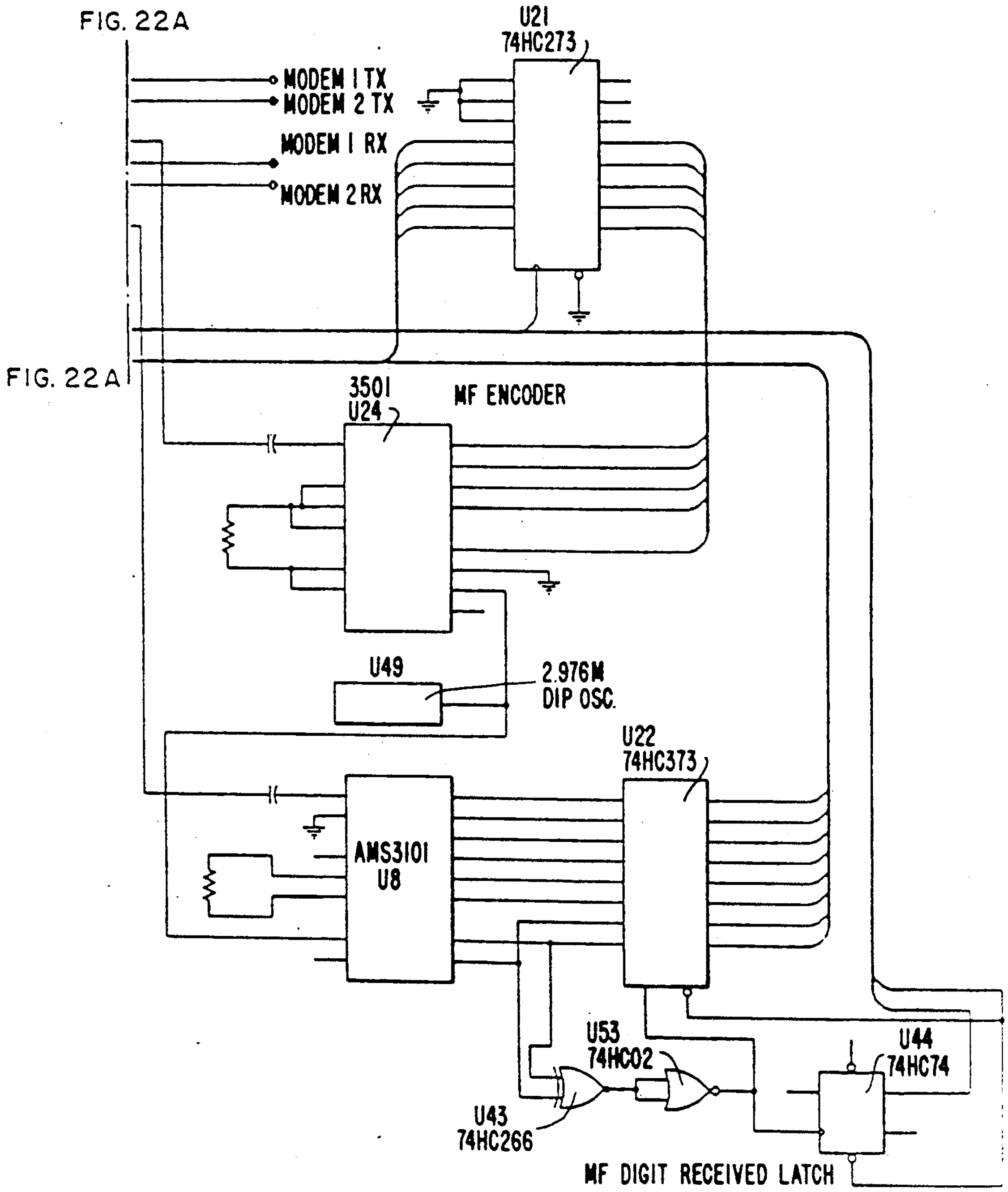

FIGS. 22A and B are described as follows. FIG. 22A contains the U23 22101 audio matrix switch which routes the received and transmitted X.25 transmission formatted pages to the respective trunk. The multiplex MF encoder and decoder is also routed to the respective trunk via the audio switch. The U24 3501 MF encoder and the U8 3101 MF decoder are under direct microprocessor control. The output level of the 3501 encoder is fixed by resistor R5. The 3501 encoder is capable of sending R1 and R2 tone subsets. The voice messaging synthesizer U41 5205 is controlled by the U20 word latch. The word latch addresses the specific areas of the ROM word memories U6 and U7 and is transferred by the U17 4019 switch to the 5205 voice messaging synthesizer. Address counter U38 sends counts from the starting address set by the U21 HC 273 work latch until the "END WORD" gate U47 detects completion of the word. The word latch is then cleared and the new word may be received from the microprocessor.

4. Data Module Processor 32

The data module processor (DMP) 32 performs several functions. A first function is to interface with the system 10 via the communication path 20 between a local switch 12 and the lata switch 14. A second function is processing of input and output communications which involve the X.25 transmission protocol. Input packets of pages, which are in the X.25 transmission protocol, are received over the communication link 20 from the lata switch 14 or from the telephone trunk 28, as explained above, are stripped of the X.25 transmission protocol down to the fifth level as explained with reference to FIG. 31 below and converted into ASCII code for processing by the CPU 50. The DMP 32 converts ASCII encoded pages received from the outbound lata buffer 82 of the RAM 48, which are intended for transmission to the lata switch 14 over the communication link 20, to the hybrid code described below and formats them into X.25 protocol with the X.25 protocol being identical to that described below with reference to FIG. 31. Furthermore, the DMP 32 contains buffers for storage of ASCII coded pages which are sent to the RAM 48 and storage for packets of pages which are forwarded to the data output 34 for transmission to the associated lata switch 14.

FIGS. 23(A and B)–25(A and B) illustrate a preferred embodiment of the data module processor 32. Integrated circuits are identified by their industry or manufacturer's designation. A control program for the data module processor 32 is set forth in the Appendix. The control program for the DMP 32 is programmable by input from the keyboard 36 to alter its function to perform the inputting of data for any one of the sublocal, local, lata and hub switches.

The DMP 32 has two X.25 encoder/decoder sets capable of receiving and transmitting X.25 encoded packets from the network 10. An audio matrix is provided on each of a pair of trunk boards routing the packets in the X.25 transmission protocol. Two modems are provided for the interchange of system data. The resident microprocessor U7 and random access memory U5 and U6 process and store packets of pages. The processing includes the above-described stripping of X.25 transmission protocol from packets of pages and conversion of characters from the hybrid code described below to ASCII and from ASCII to the hybrid code with the X.25 transmission protocol being added. The DMP 32 also provides temporary buffering of disassembled pages prior to transmission to the buffers 80 and 84 of the RAM 48 and temporary buffering of packets of pages prior to transmission to the data output 34.

Figure 23A:
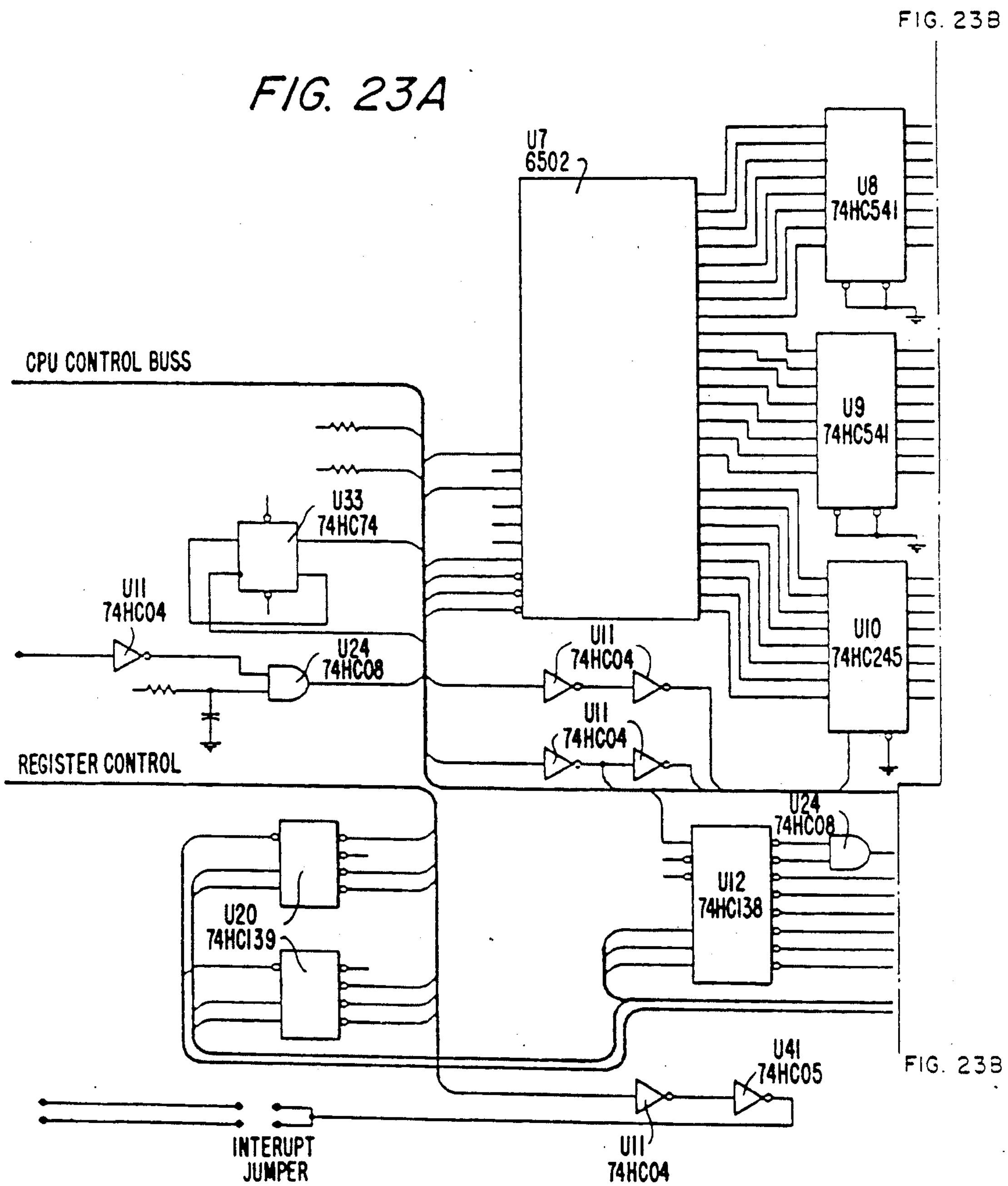
FIGS. 23A and B are a circuit schematic of the PC XT Data Channel Board of the data module processor 32 of the present invention.

With reference to FIGS. 23A and B, the resident microprocessor set consists of the CPU (U7-6502), RAM memory (U5,U6-6164), and the 27128 EPROM (U4). All microprocessor address lines are buffered (U8,U9-74HC541) and a data bus buffer U10 (74HC245) is provided. Memory bank decoding is accomplished by U12, with the HC138 being one of eight decoders. The memory decoder partitions the 64K of memory into 8 banks. Two banks (16K) are utilized for stored program access (EPROM) and two banks are used for random access memory (16K RAM). Two banks are utilized for the X.25 encoder/decoder circuits and the remaining two banks for the host processor read/write registers.

Figure 24A:
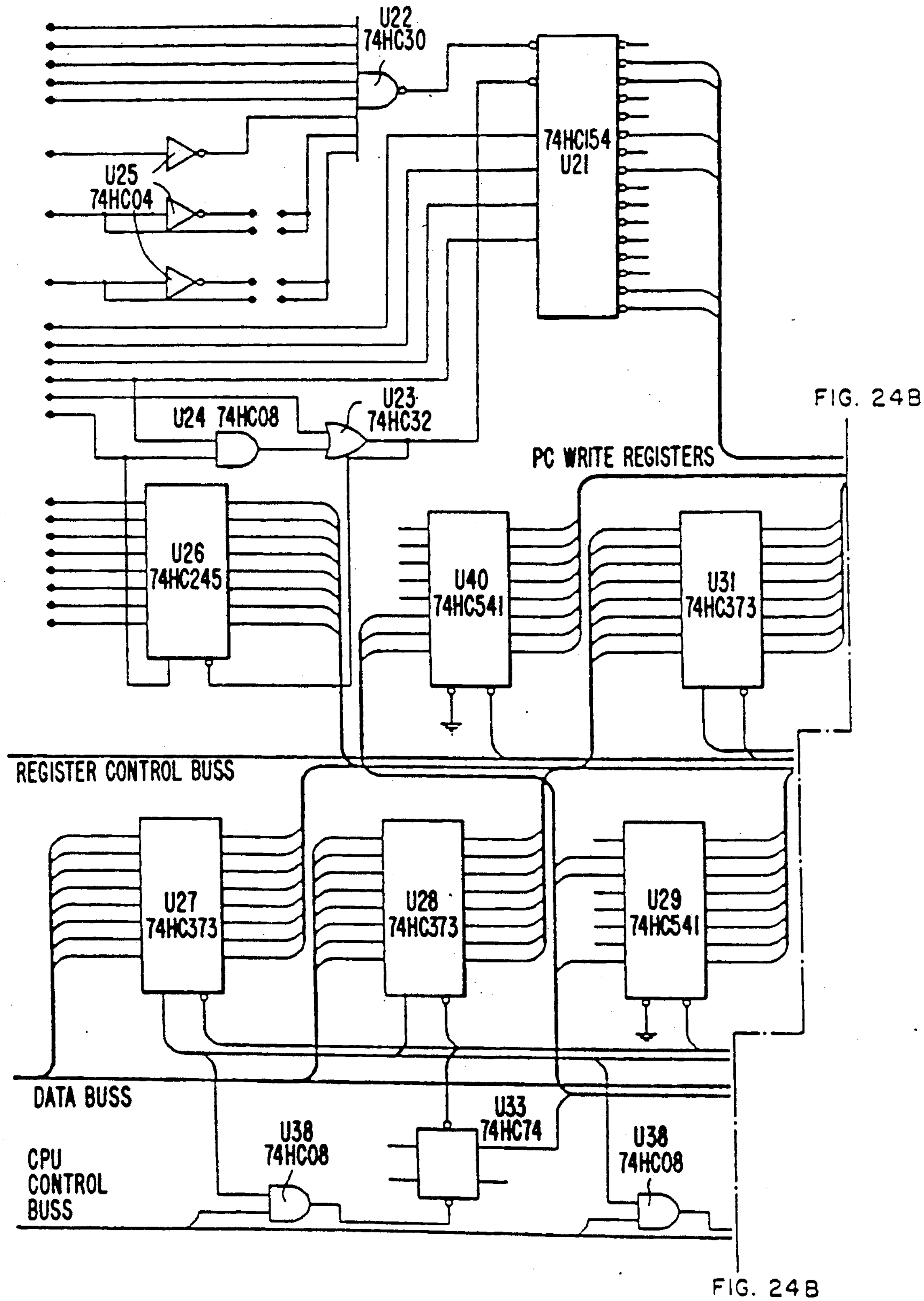
FIGS. 24A and B are a circuit schematic of the PC XT Channel Register and Modems of the data module processor 32 of the present invention.

With reference to FIG. 24A, the host processor interface consists of three write registers (U40—interrupt, U31—TX data, and U32—command) and four read registers (U27, U28, U29, and U30). Each register is individually addressed in a fashion identical to an 8255 serial port. Memory address decoding is accomplished by a jumper field and decoder U21 (74HC154).

The U7 microprocessor receives clock pulses from divider U33 (74HC74). A resident watchdog timer U37 (74HC123) monitors processor activity and alerts the host CPU 50 in the event of a catastrophic failure.

Figure 23B:
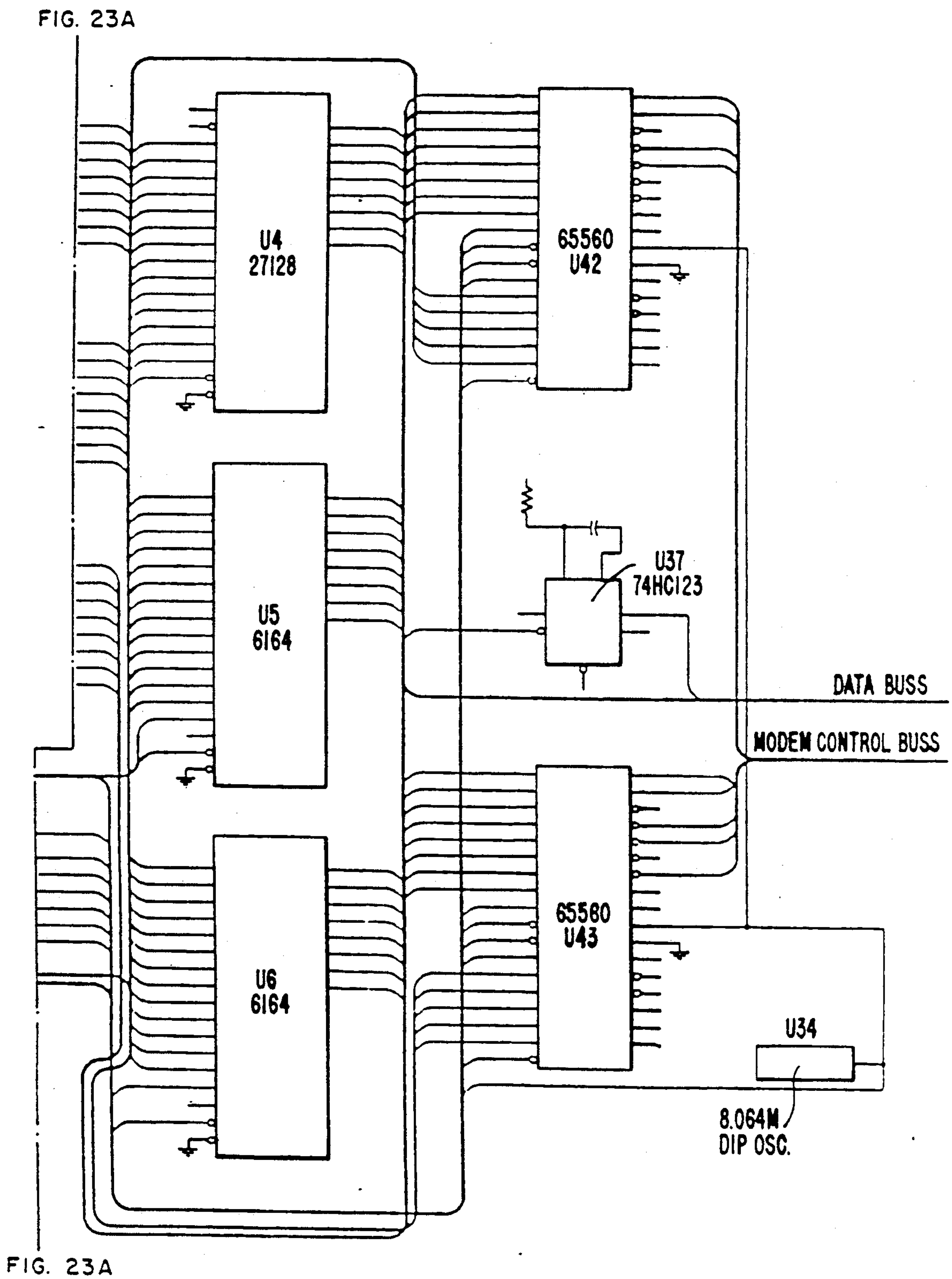
Figure 24B:
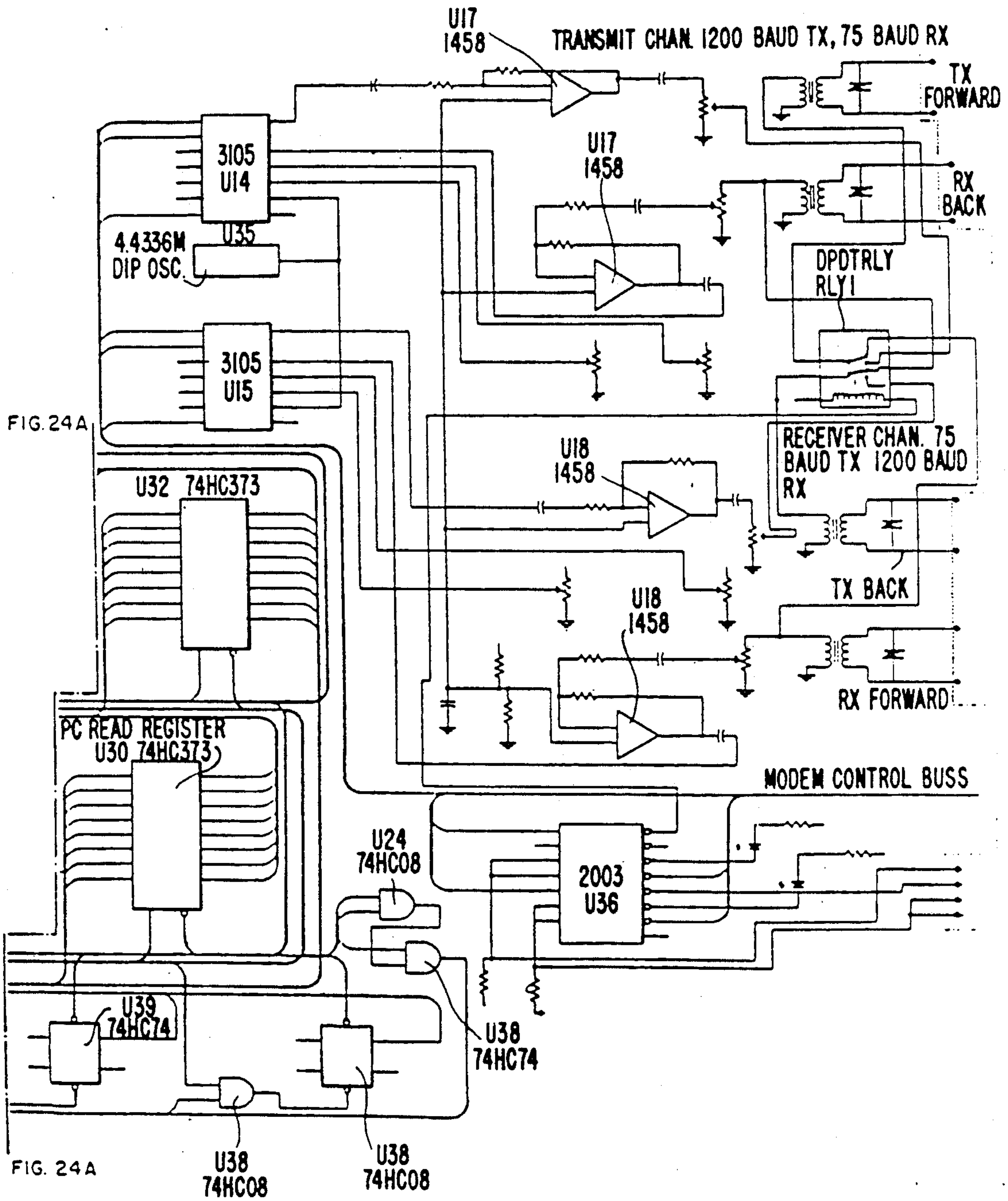

With reference to FIG. 23B, X.25, packet assembly/-disassembly is accomplished by the U42, U43 (68560) processors. The 68560 processors control the 3105 modems U14–U15 (FIG. 24B). The clock is derived from U34 (FIG. 23B) and the modems receive the clock from U35 (FIG. 24B). Amplifiers U17 and U18 (FIG. 24B) provide the necessary gain and buffering to receive and send modem tones. Jumper straps select two of the four external paths for the modems.

Modem receiver bias and carrier detect levels are set via potentiometers VR5, VR6, VR7, VR8 of FIG. 24B.

5. Other Components

The keyboard and monitor 36, printer 38, floppy and hard drive disks 40, modem 42, ROM 46 and RAM 48 are of conventional construction. The ROM memory 46 is used for support of the CPU 50. The RAM 48 stores the subscriber base, which is described below with reference to FIG. 3, and the current version of the operating program for the CPU 50. The disks 40 store the stored program to permit updates to be made to the current program stored in the RAM 48. The printer 38 is used for generating the portion of the overall billing information for the network 10 which is to be allocated to the local paging service 18. The keyboard and monitor 36 permit the entry of information into the local switch 12 and the display of communications to and from the local switch 12.

6. Memory Map of Local Switch

Figure 3:
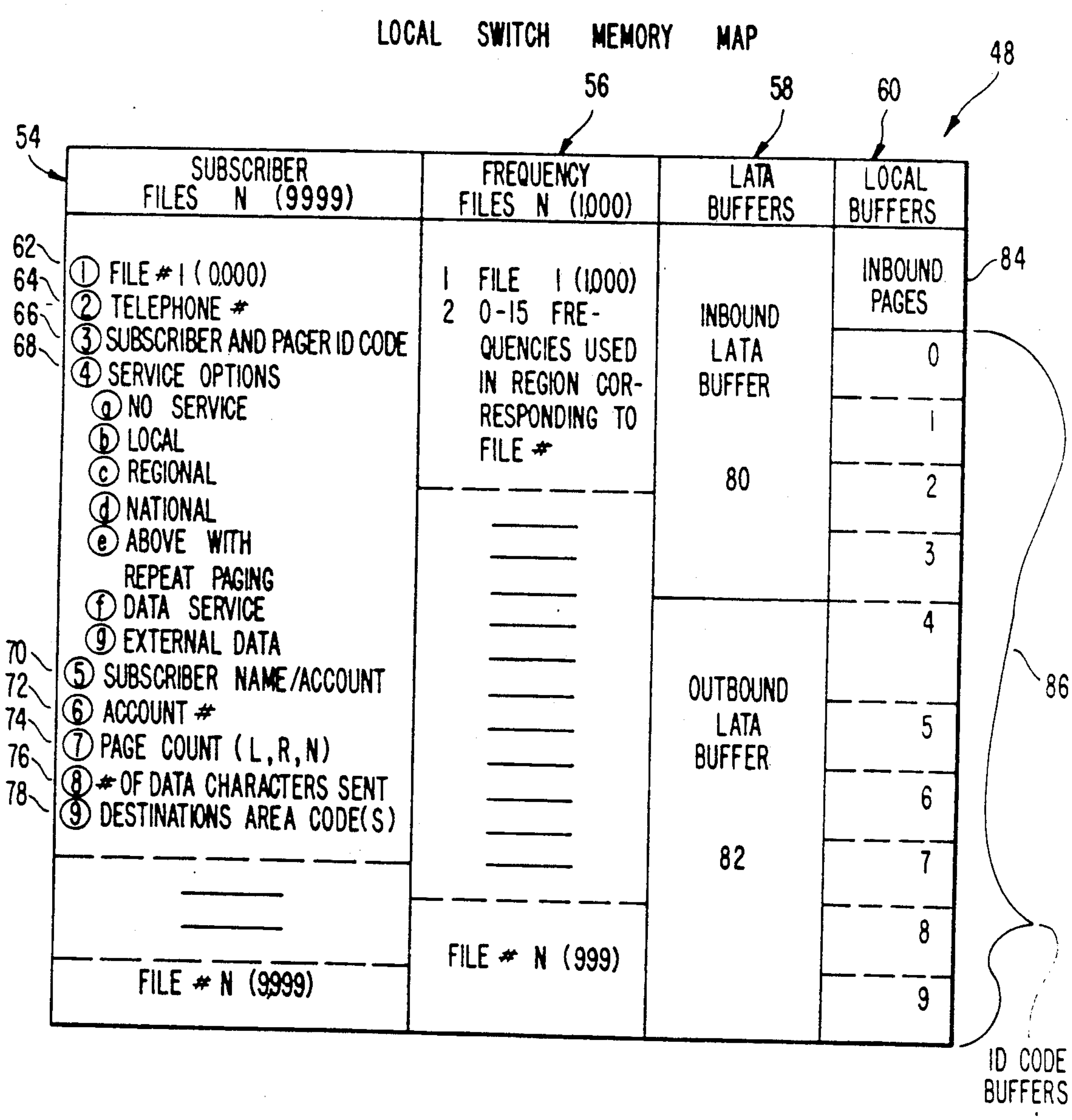
FIG. 3 is a memory map of the random access memory of a local switch.

FIG. 3 illustrates a memory map of the RAM 48. The RAM 48 has four main storage areas which are the subscriber files 54, frequency files 56, lata buffers 58 and local buffers 60. It should be understood that in FIG. 3 a number in parenthesis illustrates a number present in a preferred embodiment of the invention, but in the more general case any variable number within the scope of the present invention is indicated by a letter.

Each local switch 12 is allocated a capacity of, for example, 10,000 subscribers which are identified by a four-digit code stored in field 62 of the subscriber files 54.

Field 64 stores the subscriber's local telephone number within the area code serviced by the lata switch 14 having jurisdiction.

Field 66 is the subscriber's paging receiver identification code which uniquely identifies the subscriber and the paging receiver of the subscriber which is to receive pages throughout the network 10. The paging receiver identification code in a preferred embodiment consists of 8 digits with the four most significant digits geographically representing the area serviced by the associated lata switch 14 (country code as the most significant digit followed sequentially by area or city code lesser significant digits) and the four least significant digits being digits assigned to identify 10,000 subscribers within the jurisdiction of the local switch. The capacity of the system 10 is 100 million subscribers with the eight digit identification code. The least significant numbers of the identification code define subscribers of a specific local switch 12 within the jurisdiction of the lata switch 14.

Field 68 stores the service options which each subscriber may choose to have provided by the local paging service 18. The service options control the commands discussed below, which are used with pages sent to the paging receivers. The main CPU 50 interrogates the particular subscriber file identified by the identification code inputted with the request for a page by telephone trunks 26 or 28, causes storage of the page, determines the destination(s) of the page and the appropriate system command to be used to transmit the page. It should be understood that the service options may be dynamically programmed through voice prompted communications over the telephone trunk lines 28 with the local switch 12 and through telephone calls to the lata switch 14 by trunk 26 as described below.

The service options are described as follows. The service option "a" is for no service which is a condition when an active subscriber does not wish to receive any pages such as may occur when the subscriber is on vacation or is otherwise desirous of not being paged for a period of time but does not wish to be removed from the subscriber base of the system. The service option "b" is for pages to be broadcast only by the transmitter 15 of the local paging service 18. The local service option has two suboptions (not illustrated) which permit the selection of numeric character transmission (A3 and C3 commands discussed below) and the selection of alphanumeric character transmission (A4 and C4 commands discussed below). The service option "c" is for regional service which is for pages to be broadcast throughout all of the local paging services 18 which are within its lata switch jurisdiction. The service option "d" is for national paging which is for pages to be broadcast from the local switch 12 to one or more lata switches 14 other than the lata switch having jurisdiction over the local switch 12. While not illustrated, an international service option may be added. The regional, national and international service options permit the selection of two suboptions (not illustrated) of numeric and alphanumeric character transmission (A5,C5,A6,C6 commands discussed below). The service option "e" is for a repeat of pages for any of the "b", "c" or "d" service options so that a page is broadcast more than once. The service option "f" is for data service which causes the page to be stored in a specified section of memory such as sections 11-14 of the RAM (60) described in the above-referenced patent application filed on Oct. 20, 1987. It should be understood that reference to a part of a paging receiver in parenthesis refers to a part in the drawings of the above-referenced application filed on Oct. 29, 1987. The service option "g" is for external data service which commands the paging receiver to output the page to the external data port (67) of the paging receiver disclosed in the above-referenced application filed on Oct. 20, 1987. This option permits the paging receiver to support peripheral devices to provide a wide range of data services. Although not illustrated, the service options may further include sublocal and group paging as discussed below. Sublocal paging is discussed below with reference to FIG. 28. Group paging is paging where a specified group of paging receivers receive pages on the local level by the paging receiver being programmed to turn on when a destination code is sent as the first character of the identification code accompanying the page as described below.

The following additional fields are provided. The fifth field 70 is the subscriber's name and the subscriber's specified account number. The sixth field 72 is the subscriber's account number entry for purposes of interval billing by the local paging service 18. The seventh field 74 is the subscriber's page count (local, regional or national) which is a total of the number of pages made in a billing period. The eighth field 76 is the total number of data characters sent during the billing period.

The ninth field 78 is the destination (area code(s)) of each of the pages. For local service, there is no area code specified. For regional service, the area code of the associated lata switch 14 having jurisdiction over the local switch 12 is specified and for national and international service, one or more area codes or other geographic identification identifying lata switches 14 other than the lata switch having jurisdiction over the local switch are specified. For international service, a country code may be used to identify lata switches 14 within a particular country. Any number of area codes may be specified but in a preferred embodiment of the invention, three area codes is a maximum number of lata switches 14 which may be specified as regions to receive pages from the local switch 12.

The above-referenced description describes the first file of the n (10,000) possible subscriber files stored in the subscriber files 54. It should be understood that the other subscriber files have the same configuration. Access to the subscriber file is obtained by a voice prompted message requiring the inputting of a secret code which if inputted correctly is followed by voice prompted requests requesting specification of the information of the subscriber file to be changed.

The frequency files 56 perform an important part in the functioning of the present invention. The frequency files 56 contain n possible lata files with each individual file identifying up to, for example, 15 four-digit numbers that represent broadcast channels available within the service area of a lata switch 14. Thus, each of the individual lata switches 14 in the network 10 will have a separate frequency file which identifies all of the channels which are available to transmit pages from the transmitters 15 associated with the local paging services 18 under the jurisdiction of that lata switch 14. The channels are stored as a four-digit number in a hexadecimal numbering system which requires only four digits of space. The tables of the frequency files may be accessed from the keyboard 36 or the modem 42. A file containing all zeros (no channel) will cause an invalid area code message to be returned to a subscriber attempting to reprogram service areas. A flow chart of the usage of the frequency files 56 by the system is described with reference to FIG. 13 below. However, it should be understood that the frequency files are the source of channels which are utilized by the channel programming command discussed below to program each paging receiver for operation in each lata switch jurisdiction and the local switch jurisdiction. For example, a paging receiver which is to be serviced by only a single local paging service 18 may be programmed to receive only a single or a number of channels up to the number of channels used by that local paging service. Furthermore, for regional service or national service, the frequency files are used to program the paging receiver to receive pages from the channels used by the local paging services 18 within the designated area codes representative of the service areas serviced by the lata switches 14. Furthermore, if a paging receiver is to be programmed to receive messages in a particular area serviced by a lata switch 14 as a consequence of the subscriber travelling, the channel programming command utilizes the channels stored in the file number corresponding to the jurisdiction of the lata switch in the area to which the subscriber is to travel, to dynamically program the channel(s) which the paging receiver is to receive in that area. For service in a local region, the frequency files are used as a source of channels to be used by the channel programming command to dynamically shift the channels on which the paging receiver is to receive a page, to adjust the channels used in the broadcast area used by the local paging service 18 associated with the local switch 12 based on the amount of paging traffic on each channel and to further provide a source of channels which are to be used for specialized services for transmitting particular types of information to particular subscribers such as, but not limited to stock quotations.

The lata buffers 58 consist of an inbound lata buffer 80 and an outbound lata buffer 82. The inbound lata buffer 80 functions to receive pages coded in ASCII which have been processed by the data module processor 32 to strip them of the X.25 transmission protocol used for transmitting pages from the lata switch 14 to the local switch 12 and converted from the hybrid code described below to ASCII. Pages which are initially stored in the inbound lata buffer 80 are processed by the CPU 50 for destination and are either for broadcast by the associated local paging service 18 in which case they are ultimately stored in the appropriate identification code buffer 86 which matches the least significant digit of the identification code contained with the page or in the outbound lata buffer 82 if the page is a page which has originated from one of the lata switches 14 by calling on the telephone trunk 26 and which has a final destination which is determined by the field 78 of the subscriber file 54 as described below.

The local buffers 60 are comprised of an inbound pager buffer 84 for receiving all local inbound pages which originate from the trunk line 28 which is connected to the local switch 12 and a plurality of identification code buffers 86 which are each individually assigned to store outbound pages with a particular least significant identification code digit of the number base used for the subscriber identification code which are to be transmitted to a local paging receiver. All of the received pages from the local switch 12 are initially stored in the buffer 84. Each of the individual identification code buffers 86 stores pages for broadcast by the local paging service 18 in batches which are grouped by the least significant digit of the subscriber identification code received with the page after sorting by the CPU 50. In other words, the least significant digit of the subscriber identification code within a page for broadcast by a local paging service 18 determines in which of the identification code buffers 86 the page is stored. For example, if the last digit of the identification code of a page for broadcast by the local paging service 18 ends in the digit 0, the page is stored in the identification code buffer identified by "0".

7. CPU 50

The main functions of the CPU 50 are (1) to determine and add area destinations to each page received from the telephone trunk 28 and the lata switches 14 without any specified area destination to create a page for each area destination specified by the service option field 68 and area destination field 78 obtained by interrogation of the subscriber file matching the identification code contained in the page, (2) to add one or more system commands to each page created from interrogation of the subscriber file, (3) to process each page received from the network 10 and each page created by the interrogation of the subscriber file by area destination, (4) to store each page processed by area destination in the corresponding storage areas of the RAM 48 as discussed above, and (5) to control the outputting of the stored pages from the RAM 48 for further processing by the data module processor 32 or the data output 34.

Each of the pages created by the CPU 50 has four fields which are (1) the paging receiver identification code, (2) an area destination in the network and if the page is for transmission by only the local paging service 18 the area destination filed is left blank, (3) one or more system commands specifying the function(s) to be performed by the paging receiver receiving the page and (4) the text of the page. These fields are discussed below with reference to FIG. 31.

The CPU 50 is programmed to output the groups of pages which are stored in the buffers 82 and 86 whenever either one of two conditions occur which are (1) the buffers are approaching a percentage of their maximum storage capacity measured in characters which should not be exceeded to avoid overflow of the buffers, or (2) pages have not been outputted within an immediately past time interval of a predetermined length. Overflow causes the issuance of a busy tone to a caller wishing to place a page or after a predetermined time interval such as 15 minutes has elapsed, whichever comes first, to avoid a long delay between the calling in of a page and its actual transmission. The maximum percentage of the overall storage capacity of the buffers 82 and 86 which may be utilized before requiring transmission to avoid overflow is programmable from the keyboard 36. Furthermore, the size of the buffers 80, 82, 84 and 86 is programmable from the keyboard 36.

B. Lata Switch 14

1. Architecture

Figure 4:
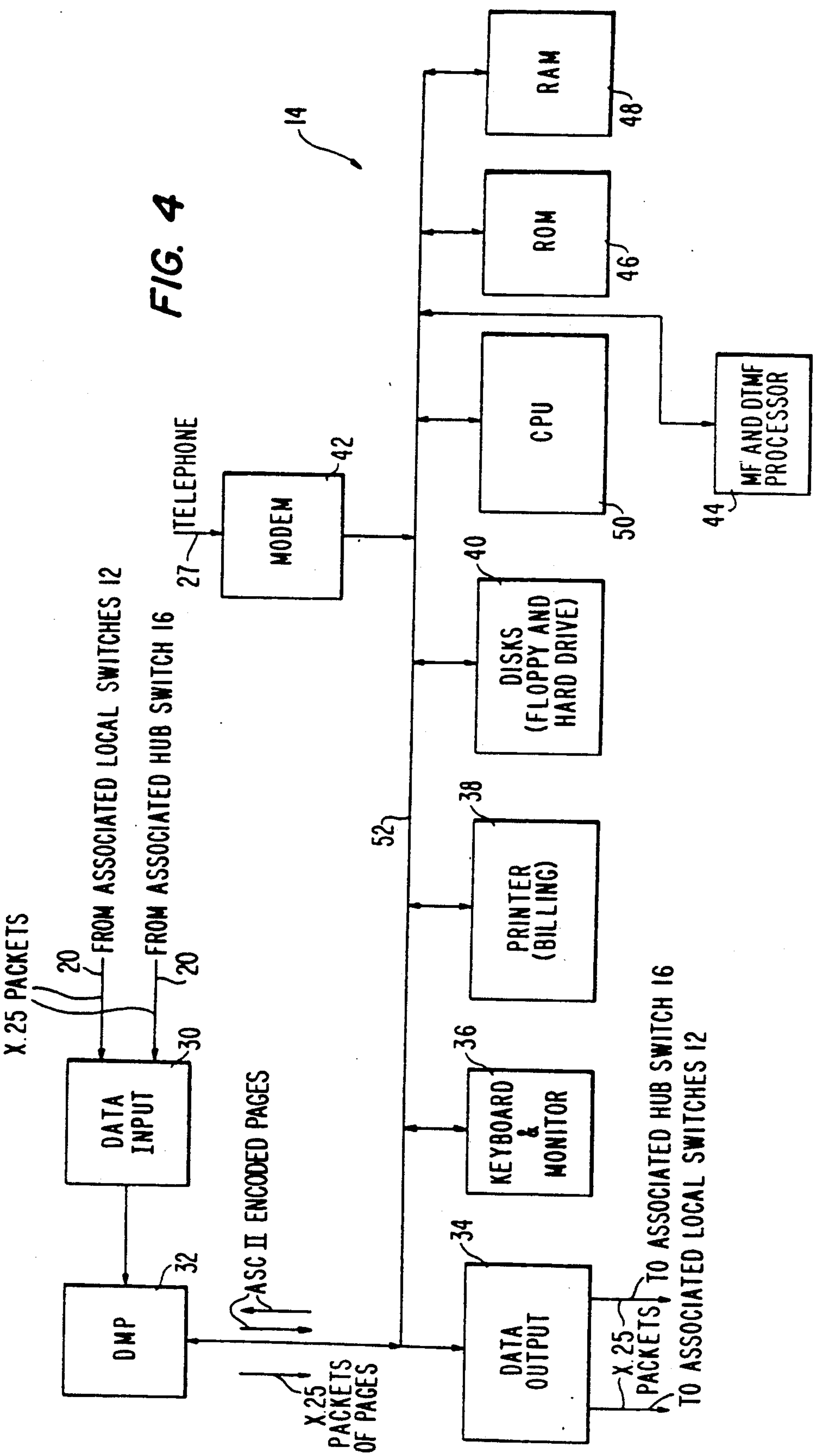
FIG. 4 is a block diagram of a lata switch in accordance with the present invention.

FIG. 4 illustrates a functional block diagram of a lata switch 14. It should be understood that the block diagram of the lata switch 14 is similar to the block diagram of the lata switch 12 described above with reference to FIG. 2. Identical parts in FIGS. 2 and 4 are identified by like reference numerals and are not discussed herein except to the extent necessary to point out the differences. Furthermore, it should be understood that the circuits discussed above with reference to FIGS. 14(A and B)-25(A and B) are utilized for implementing the lata switch 14 with the pages being received and transmitted by the data input 30 and data output 34 being different and further with the operating program for the CPU 50 being different to produce the correct functioning of the circuitry of FIGS. 14(A and B)-25(A and B) as a lata switch 14 with the changes being implemented by inputs from keyboard 36. The data input 30 has two high speed X.25 protocol ports for respectively receiving packets from each of the local switches 12 associated with the lata switch 14 and packets from an associated hub switch 16. However it should be understood that the number of ports may vary without departing from the invention. Furthermore, the data input 30 does not function to disassemble low sped manual and automatic telephone entered communications as is the case with the data input 30 of the local switch 12 in view of the fact that all communications received by the data input 30 are in the X.25 transmission protocol. The data input transmits both X.25 port inputs directly to the data module processor 32. The data module processor 32 strips the X.25 protocol from the received packets of pages from the local switches 12 over which it has jurisdiction and from the hub switch 16 having jurisdiction over it and converts the hybrid code described below which is preferably utilized with the X.25 transmission formatted packets of pages into ASCII and transmits the ASCII coded pages to the hub buffer 100 and local inbound pager buffer 102. Pages, which are periodically outputted from the outbound pages buffers 98 and 104, are processed by the data module processor 32 to convert them from ASCII to the hybrid code discussed. below and are formatted into the X.25 transmission protocol as discussed below with reference to FIG. 31. The printer 38 functions to generate billing information for pages which are distributed to the local switches 12 which are within the jurisdiction of the lata switch 14. The CPU 50 controls the periodic outputting of pages stored in the RAM 48 from the outbound hub buffer 98 and outbound local buffers 104 to the data module processor 32 for code conversion, protocol formatting and transmission to the associated hub switch 16 or the associated local switches 12 via the data output 34 as discussed below when the buffers are storing at least a predetermined percentage (e.g. 70%) of their capacity to avoid loss of pages from overflow or if a transmission of packets from each buffer has not occurred within a predetermined time in a manner analogous to buffers 82 and 86, discussed above. The predetermined percentage and the capacity of the buffers 98, 100, 102 and 104 is programmable by the keyboard 36.

2. Memory Map

Figure 5:
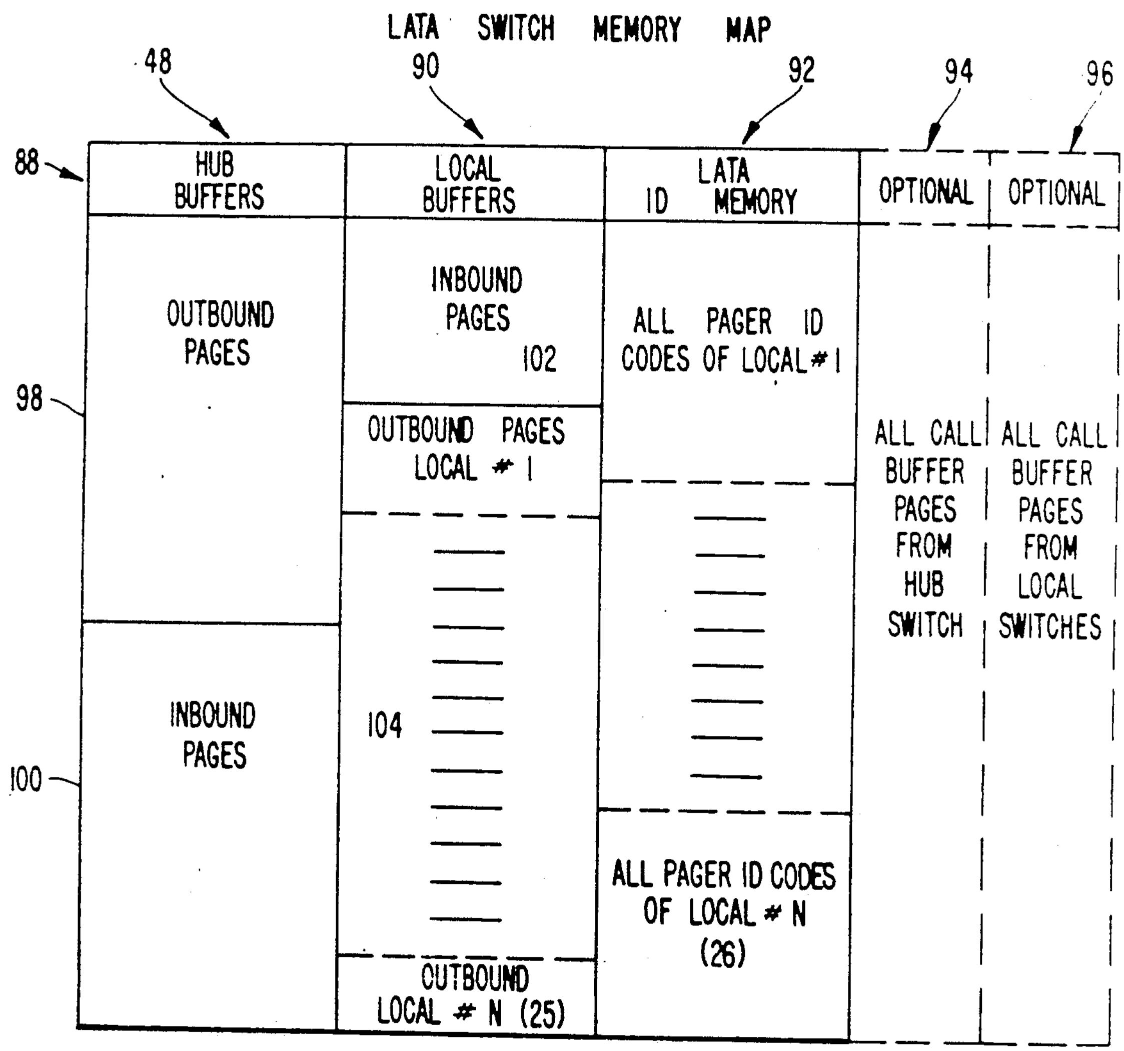
FIG. 5 is a memory map of the random access memory of a lata switch.

FIG. 5 is a memory map of the random access memory 48 of the lata switch 14. The RAM 48 has three main areas and two optional areas. The three main areas are hub buffers 88, local buffers 90 and a lata identification code (ID) memory 92. The optional memory areas are an all call buffer 94 for storing nationwide pages received from the hub switch 16 which are to be transmitted to all of the local switches 12 under the jurisdiction of the lata switch 14 and an all call buffer 96 which stores pages received from one of the local switches which are to be transmitted to all of the local switches 12 under the jurisdiction of the lata switch 14.

The hub buffers 88 are an outbound hub buffer 98 and an inbound hub buffer 100. The outbound hub buffer stores pages to be periodically transmitted to the hub switch 16 having jurisdiction over the lata switch under the control of the CPU 50. The inbound hub buffer 100 stores pages which are periodically received from the associated hub switch 16 via storage in a buffer of the data module processor 32.

The local buffers 90 are comprised of an inbound local buffer 102 which stores groups of inbound pages received from the local switches 12 and a plurality of outbound local buffers 104 each of which store groups of pages which are to be transmitted periodically to a specific one of the local switches with a separate outbound local buffer being provided for each of the local switches under the jurisdiction of the lata switch 14. The CPU 50 processes each of the pages which is received in the inbound buffers 100 and 102 by destination and causes storage in the outbound buffers 98 and 104 which is associated with the destination of the page.

The lata identification code memory 92 stores the subscriber identification numbers of all of the subscribers which are associated with each of the local switches 12 within its jurisdiction. The lata identification code memory 92 is used for determining the local switch which stores a subscriber file of the subscriber used for pages which are inputted to the system from a direct call by telephone trunk 26 to a lata switch 14 or from a direct call by telephone trunk 26 to a lata switch by a subscriber to program the reception area of pages by changing the destination 78 of the pages. The lata identification code memory 92 may be organized by subscriber identification codes which are within the jurisdiction of each local switch 12 so that the matching of an identification code of a page inputted to the lata switch 14 in the lata identification code memory 92 provides the location of the particular local switch which stores the subscriber file 54 of that subscriber.

In order to avoid having to provide additional storage space in each of the outbound local buffers 104, the optional all call buffer 94 may be provided to store a single page, received from the hub switch 16 having jurisdiction over the lata switch 14, which is to be transmitted to each of the local switches 12. Similarly, the optional all call buffer 96 may be provided for receiving pages from an individual local switch 12 which are to be transmitted to all of the local switches 12 within the jurisdiction of the lata switch 14.

The CPU 50 controls the telephone trunk 26 between the lata switch 14 and the caller requesting a numerical or alphanumerical character page over the telephone trunk with voice prompted messages by placing in a direct phone call to the lata switch. For pages or requests to reprogram the subscriber file 54 which are made to a lata switch 14 over telephone trunk 26 which require access to a subscriber file outside the jurisdiction of the lata switch, the CPU 50 makes a page contained in a packet having an area destination identified by the four most significant digits of the identification code inputted to the lata switch 14 preceded by the identification code of the paging receiver to receive the page, preceded by the geographical area identification of the lata switch receiving the call to originate a page or to program the subscriber file which is transmitted by the network 10 to the specified area destination. For pages to be billed to subscribers stored in the subscriber file 54 of a local switch 12 within the jurisdiction of the lata switch 14 or requests to program the subscriber file 54, the CPU 50 makes a packet having an area destination of the local switch 12 within its jurisdiction which stores the subscriber identification code as determined by interrogation of the lata identification code buffer 92 by the CPU. The ultimate destination of a page is determined by the destination filed 78 of the subscriber file 54 matching the identification code of the paging receiver either within or outside the jurisdiction of the lata switch that is called in over telephone trunk 26. The local switch 12 containing the subscriber file 54 creates the one or more pages in accordance with the information int eh subscriber file including the adding of destination(s) and the appropriate command. Transmission of the pages created by the local switch 12 in response to a call to a lata switch 14 is identical to the transmission of pages originating at the local switch 12 by the placing of a telephone call on telephone trunk 28. In the case of requesting programming of the subscriber's file 54, the caller must in response to a voice prompted message enter a four-digit secret identification code to obtain access to the subscriber file with voice prompted messages being supplied under the control of the CPU 50 to control the input of programming information from the subscriber. To request a page by calling the lata switch 14, the caller will receive a voice prompted message to enter the subscriber identification code and then the appropriate numeric or alphanumeric character page.

C. Hub Switch 16

1. Architecture

Figure 6:
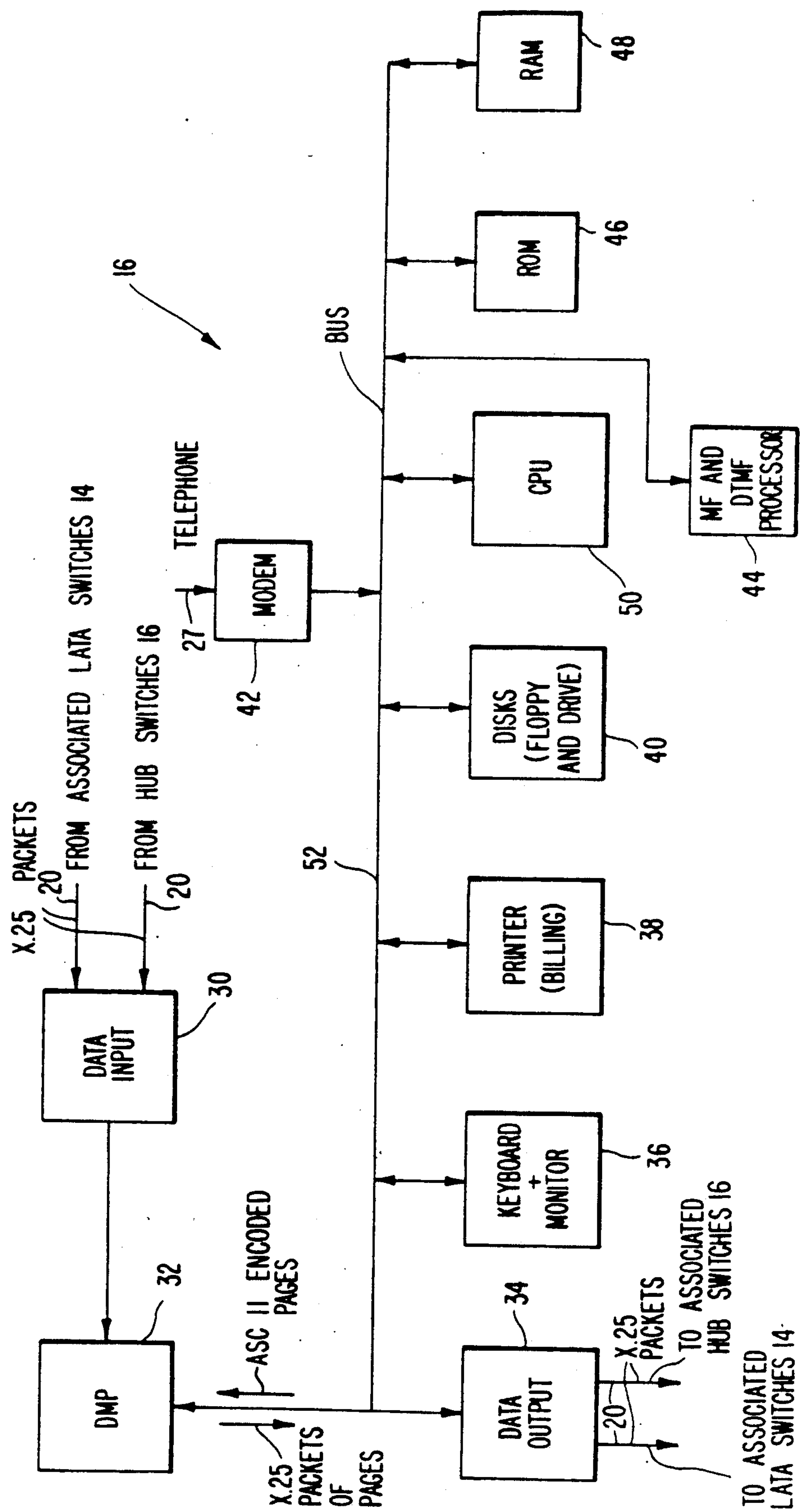
FIG. 6 is a block diagram of a hub switch in accordance with the present invention.

FIG. 6 is a functional block diagram of the hub switch 16. It should be understood that the block diagram of the hub switch 16 is similar to the block diagram of the local and lata switches described with reference to FIGS. 2 and 4. Like parts in FIGS. 2, 4 and 6 are identified by like reference numerals and further only those differences between the subject matter of FIG. 2 and FIG. 6 are discussed which are necessary for understanding the operation of the hub switch 16. Furthermore, it should be understood that the programming for controlling each of the processors including the central processing unit 50 is set forth in the aforementioned Appendix with variations in the programming being implemented by inputs from the keyboard 36 to cause the program to control a hub switch 16. The circuits for implementing the data input 30, data module processor 32, data output 34 and MF and DTMF processor 44 are illustrated in FIGS. 14(A and B)–25(A and B) discussed above. The data input 30 receives X.25 encoded packets on input ports respectively from associated lata switches 14 and from hub switches 16 which are forwarded to the data module processor 32 for processing. The data module processor 32 functions to strip the X.25 transmission protocol and convert the character in the hybrid code described below into ASCII coded pages. Pages received from lata switches 14 within the jurisdiction of the hub switch 16 are addressed by the data module processor 32 for storage in a corresponding inbound lata buffer 118 described below with respect to FIG. 7. Similarly, pages received from other hub switches 16 are addressed by the data module processor 32 for storage in the corresponding inbound hub buffer 114 described below with respect to FIG. 7. The CPU 50 processes each page stored in the inbound buffers 114 or 118 to determine its destination and causes its storage in the outbound buffers 116 and 120 which correspond to the destination of the page. The CPU 50 periodically outputs the stored pages from the outbound buffers 116 and 120 when either the pages stored in the buffers 114 and 118 reaches a predetermined percentage of their maximum capacity to avoid an overflow of pages which could cause a loss of pages or when a transmission of pages from each of the buffers 116 and 120 has not occurred during a predetermined time interval. The predetermined percentage and the size of the buffers 114, 116, 118 and 120 is programmable by input from the keyboard 36. The data module processor 32 also functions to convert the pages from ASCII code to the hybrid code and formats the page into the X.25 transmission protocol described below with reference to FIG. 7, which are periodically outputted from the outbound hub buffers 116 and the outbound lata buffers 120 of RAM 48 described below with reference to FIG. 7. The data output 34 outputs the packets of pages received from the data module processor 32 to the appropriate output port(s) depending upon the destination of the packets of pages. The printer 38 functions to produce a record for billing of subscribers for pages transmitted through the hub switch 16.

2. Memory Map

Figure 7:
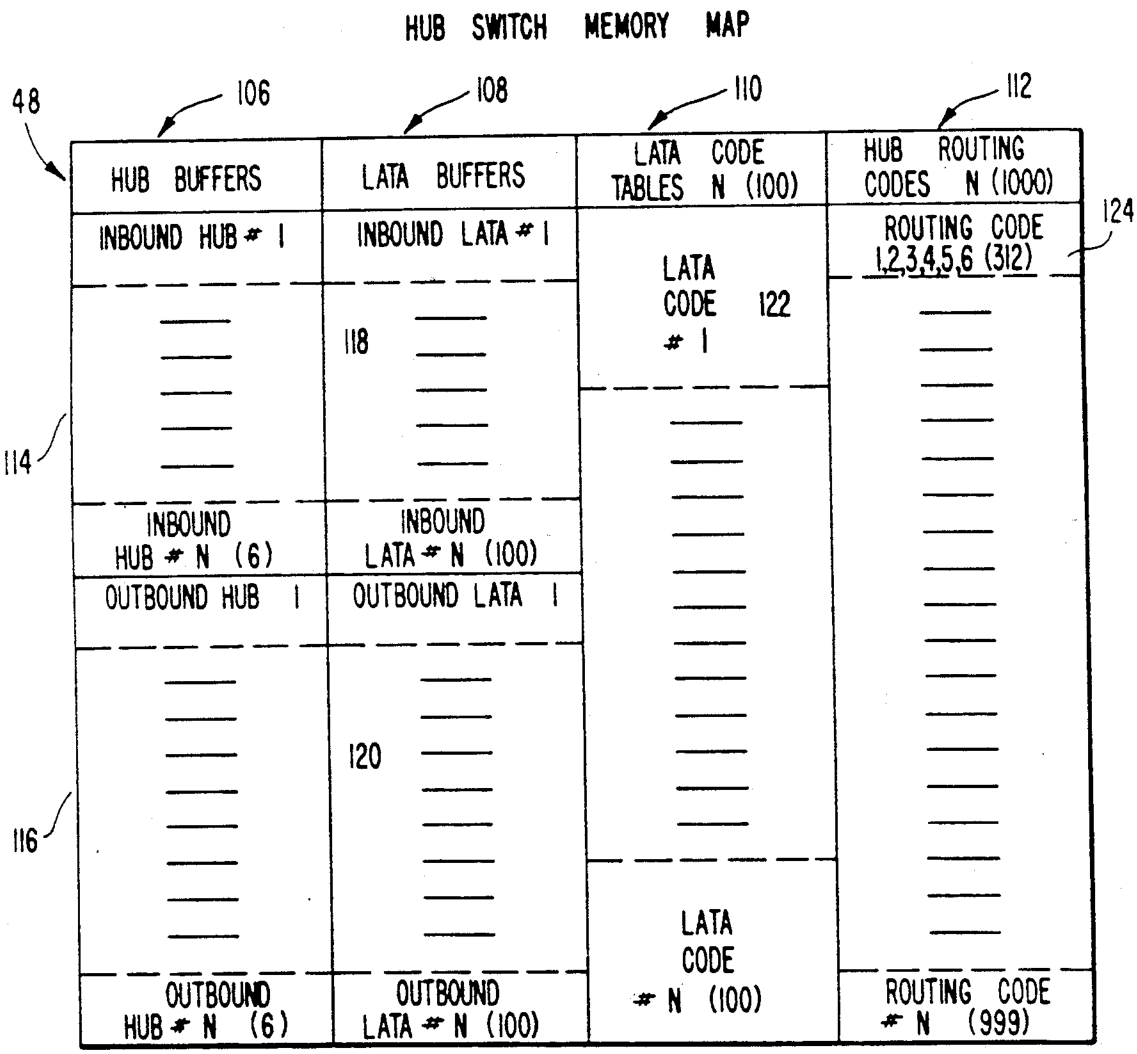
FIG. 7 is a memory map of the random access memory of a hub switch.

FIG. 7 is a memory map of the RAM 48 of the hub switch 16. The hub switch memory map is comprised of four main parts which are hub buffers 106, lata buffers 108, lata code tables 110 and hub routing codes 112. The hub buffers 106 are comprised of a plurality of inbound hub buffers 114 which correspond in number to the number of other hub switches 16 in the network 10 which have direct connection to the hub switch and a corresponding number of outbound hub buffers 116. The individual inbound hub buffers 114 each store pages received from one of the hub switches 16 with pages received from each adjacent hub switch 16 being stored in only a single one of the inbound hub buffers 114. Similarly, pages which are to be transmitted to another hub switch 16 are stored in the outbound hub buffer 116 which is associated with the destination hub switch to which they are being transmitted with all pages which are to be routed to a single hub switch being stored in a corresponding one of the outbound hub buffers 116 with a separate hub buffer being associated with each hub switch to which pages are directly transmitted. The lata buffers 108 are comprised of a plurality of inbound lata buffers 118 which correspond to the number of lata switches 14 under the jurisdiction of the hub switch 16. The inbound lata buffers 118 store all of the pages received from the lata switches 14 under the jurisdiction of the hub switch 16. The outbound lata buffers 120 correspond in number to the lata switches 14 under the jurisdiction of the hub switch 16 with a separate lata buffer being associated with each of the lata switches. The outbound lata buffers 120 store groups of pages to be periodically transmitted to their associated lata switch 14. Pages which are stored in the inbound hub buffers 114 are processed by destination by the CPU 50 and stored in either the outbound hub buffer 116, which is the destination of the pages if the pages are not to be received by a lata switch 14 under the jurisdiction of the hub switch 16, or in one or more of the outbound lata buffers 120 if the destination of the packets of pages received from another hub switch 16 is a lata switch under the jurisdiction of the hub switch 16. The CPU 50 also processes the pages stored in the inbound lata buffers 118 according to their destination and causes their storage in either the outbound hub buffers 116 if the pages are to be sent to a lata switch 14 outside of the jurisdiction of the hub switch 16 or to one or more of the outbound lata switches 120 if the pages are to be received by one or more lata switches 14 under the jurisdiction of the hub switch 16.

The lata code tables 110 store each of the lata (telephone area or other geographic identifier) codes 122 under the jurisdiction of the hub switch 16 which are utilized by the comparison performed by the CPU 50 with the pages stored in the inbound hub buffers 114 and inbound lata buffers 118 to determine in which of the outbound hub buffers 116 or outbound lata buffers 120 the pages should be stored. Each separate lata code 122 corresponds to the geographical identification of the lata switch 14 which in the preferred embodiment is the telephone area code of a lata switch's jurisdiction.

The routing codes 112 determine the transmission routes to other hub switches on a priority basis to which a packet of pages should be sent which are not intended for a lata switch 14 within the jurisdiction of the hub switch 16. It should be understood that a number of factors may be considered in choosing the priority of a route to be used to transmit a page from one hub switch 16 to another hub switch. It would appear on first analysis that a direct first hub switch to second hub switch route would be best but often the switching overhead of routing a packet through one or more intermediate switches is more than compensated for by the efficiency of a route having one or more intermediate hub switches by adding additional pages which are inputted to the one or more intermediate hub switch(es) to the packets of pages being transmitted to the second hub switch. The CPU 50 compares the destination of the groups of pages stored in the inbound hub buffers 114 and the inbound lata buffers 118 to determine if these pages should be routed to another hub switch 16. The hub routing codes 112 are referred to by default when a match is not found by the CPU 50 in comparing the destination of the pages stored in the inbound hub buffers 114 and inbound lata buffers 118 with the codes stored in the lata code tables 110. Each page stored in the inbound hub buffer 114 and inbound lata buffers 118 is processed by destination by the CPU 50 and caused to be stored in the outbound buffers 116 and 120 which correspond to its destination. Each individual hub routing code contains the hub switch destination priorities for pages to be sent to a single lata switch 14 outside the jurisdiction of the hub switch 16. For example, for the lata switch 14 having jurisdiction over area code 312, the hub routing code 134 determines the priorities in descending order from the highest priority to the lowest priority such that the highest priority hub would be #1 followed by #2–#6.

VI. Local Switch Operation

Figure 8:
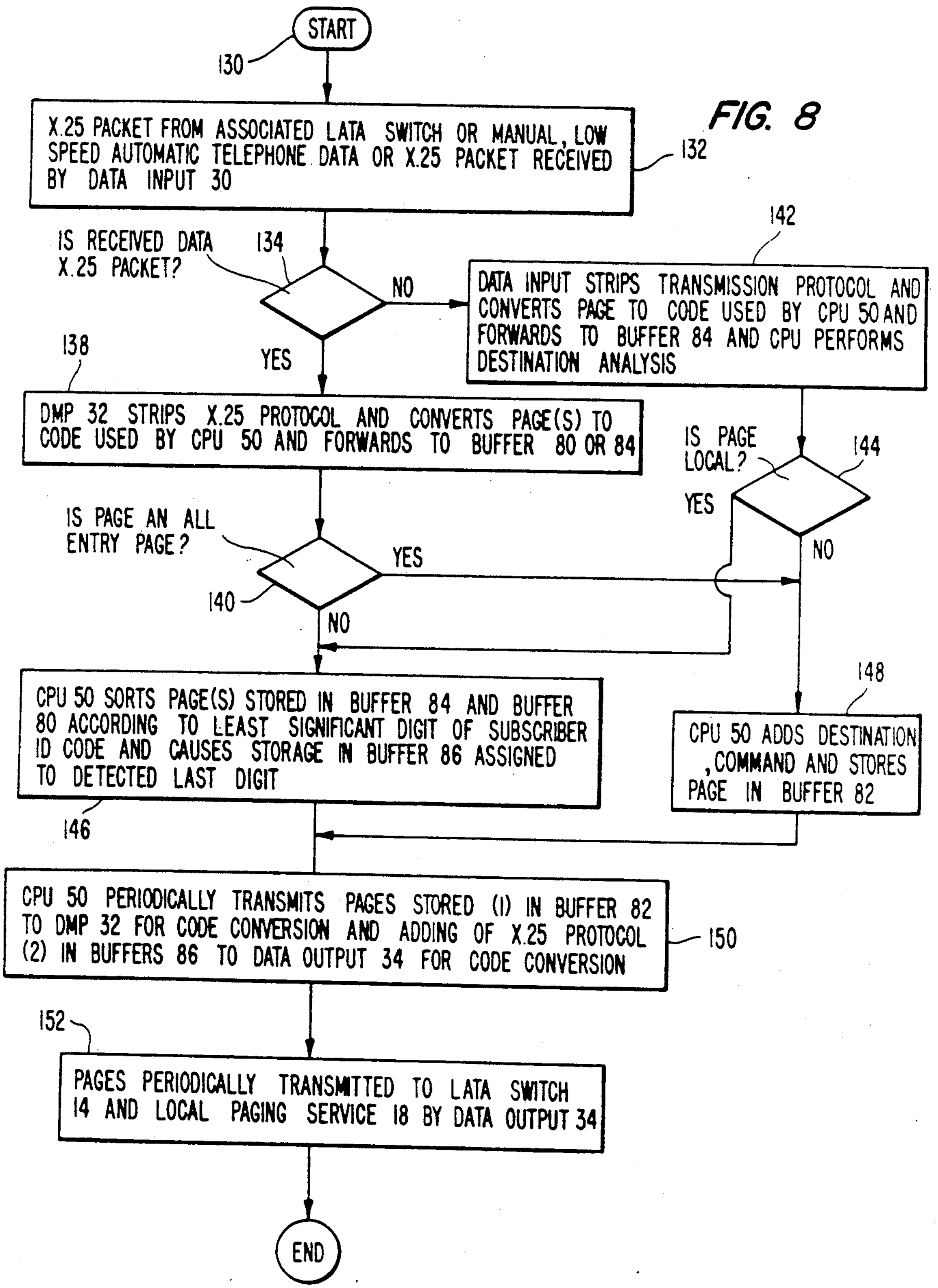
FIG. 8 is a flowchart of the operation of a local switch of the present invention.

FIG. 8 is a flowchart of the operation of the local switch 12 in processing pages received from either a local telephone input by telephone trunk 28 or from the associated lata switch 14 over communication link 20. The processing starts at point 130 and proceeds to point 132 where a packet of pages formatted in the X.25 transmission protocol received from an associated lata switch 14 over transmission link 20 or manual DTMF tone numeric coded characters, manual DTMF alphanumeric encoded characters, low speed automatic telephone DTMF coded alphanumeric characters or alphanumeric coded characters formatted in X.25 transmission protocol from a high speed data device over a telephone trunk 28 is received by data input 30. The data input decodes the pages which are received from the telephone port 28 to determine which of the four possible types of inputs the page is. The decoding is performed by detecting if any of the particular command headers discussed above is included within the page. The header or absence thereof within each page controls the processing rate by the microprocessor of the data input 30 as described below. The data input 30 determines if the received data is encoded in a high speed X.25 protocol or in the protocol used for manual or low speed automatic telephone entry as indicated by decision point 134. Data inputs which are not in X.25 transmission protocol are stripped of any transmission protocol by the data input 30, converted from the code used for transmission to the data input 30 to ASCII and forwarded to the inbound pages buffer 84 as indicated at point 142. If the received packet of pages is determined to be an X.25 protocol, the packet of pages is forwarded to the data module processor 32 where the X.25 encoding protocol is stripped and the pages are converted into ASCII code from the code used for transmission which preferably is the hybrid code described below. The data module processor 32 further places a data buffer address on the disassembled pages and causes them to be forwarded to the inbound lata buffer 80 or to the inbound pages buffer 84 if they were received in X.25 protocol over the telephone trunk 28 as indicated at point 138. The CPU 50 processes the pages stored in the inbound lata buffer 80 by destination to determine if the page is to be placed in the identification code buffers 86 or is an "all entry" page originating from another lata switch 14 by a telephone call over telephone trunk 26 requiring processing by the CPU 50 to determine its final destination by lookup in the subscriber file 54 storing the identification code contained with the page to determine the destination lata switch(es) 14. The CPU 50 performs destination analysis of the pages by matching the page identification code contained within the page with the corresponding subscriber identification code contained in the subscriber file 54 and interrogation of the destination field 78 to determine if the page is to be broadcast to the local paging service 18 or is to be sent back to the network via the lata switch 14 having jurisdiction over it for transmission to the destination specified by field 78. The destination analysis processing by the data input 30 is indicated at point 142 and the determination of whether the page is local or not is indicated at decision point 144. If it is determined that the page is intended for purely local broadcast at decision point 144, processing proceeds to point 146 where all pages received from the lata switch 14 which are determined to not be pages made by local telephone call on telephone trunk 26 to a lata switch 14 and further all pages telephoned to the input 30 by telephone trunk 28 which are determined to be broadcast by the local paging service 18 are processed by the CPU 50 by processing the contents of the inbound lata buffer 80 and the local inbound pages local buffer 84. The CPU 50 determines the least significant digit of the paging receiver identification code contained in the page and causes storage in the buffer of the identification code buffers 86 which is assigned to store pages which are determined to have a least significant digit which agrees with the determined least significant digit. If the pages originating by telephone call to the data input 30 are determined to not be for local destination at decision point 144, processing by the CPU 50 occurs at point 148 where the CPU adds the destination area code specified in field 78 of the subscriber file 54, adds the command to the page which is utilized for its transmission by the system 10 by interrogation of the service options 68 and causes storage in the outbound lata buffer 82. At point 150, the CPU periodically transmits pages (1) stored in the outbound lata buffer 82 to the data module processor 32 for conversion of the characters from ASCII code to another code, which preferably is the hybrid code described below, and the addition of the X.25 transmission protocol and transmission to the data output 34, and (2)stored in buffers 86 to the data output for code conversion from ASCII to another code which preferably is the hybrid code discussed below. At point 152, the data output 34 transmits the X.25 transmission formatted packets of pages to the lata switch 14 by the transmission link 20 and transmits batches of the pages encoded in hybrid code, without the X.25 transmission protocol, to the local paging service 18 by the communications link 22 for transmission by transmitter 15.

VII. Lata Switch Operation

Figure 9:
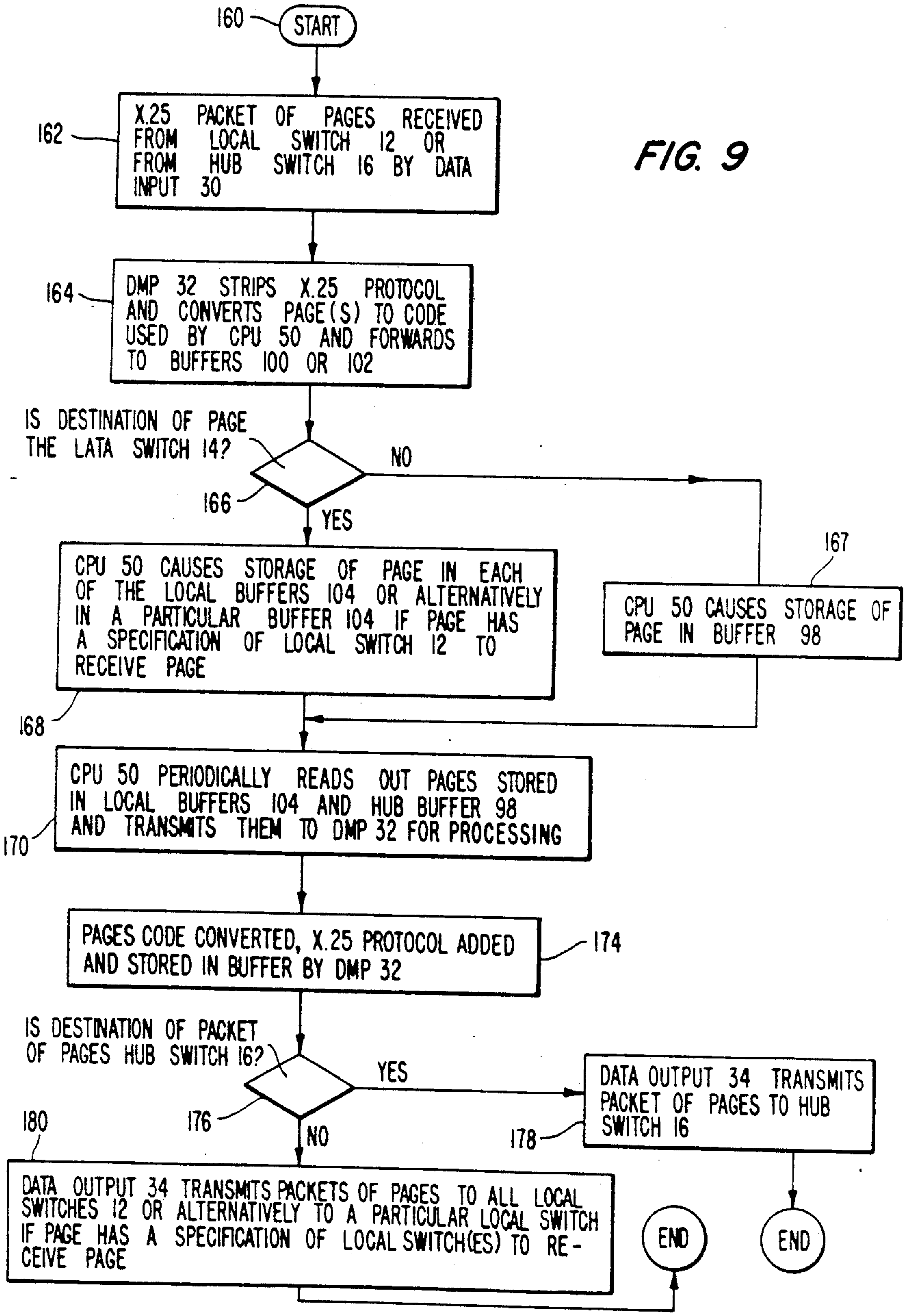
FIG. 9 is a flowchart of the operation of a lata switch of the present invention.

FIG. 9 is a flowchart illustrating the processing of pages by the lata switch 14. Processing proceeds from starting point 160 to point 162 where the data input 30 of the lata switch 14 receives X.25 transmission formatted packets of pages from either an associated local switch 12 in its jurisdiction or from the hub switch 16 having jurisdiction over it. The received packets of pages are forwarded to the data module processor 32 which strips the X.25 transmission protocol and converts the characters of the pages from the code used for transmission, which preferably is the hybrid code discussed below, to ASCII code used by the central processing unit 50 and applies suitable addressing to forward the packets of pages to either the inbound hub buffer 100 for storing pages received from the hub switch 16 or to the inbound local buffer 102 for storing pages received from local switches 12. The functioning of the data module processor 32 is illustrated at point 164. The CPU 50 determines if the packets of pages stored in the buffers 100 and 102 are destined for the lata switch 14 as illustrated at decision point 166. If none of the pages are destined for the lata switch 14, each page is caused by the CPU 50 to be stored in the outbound hub buffer 98 for subsequent transmission to the associated hub switch 16 as indicated at point 167. If, on the other hand, pages in either the buffers 100 and 102 are determined to be destined for transmission to a local switch 12, the CPU 50 causes the storage of each page in each of the local outbound buffers 104 as indicated at point 168. It should be understood that the destination of each page that is determined by the lata switch 14 to be to all of the local switches under its jurisdiction could alternatively be determined to be a particular single local switch in which case the page would be stored in a single one of the outbound local buffers 102 which is associated with the destination local switch 12. The only disadvantage of this procedure is that it requires further intelligence to be specified in the destination stored in the destination field 78 for all pages which are to be transmitted from a single local switch 12 to another local switch. The CPU 50 periodically reads out the pages stored in the local buffers 104 and hub buffer 98 and transmits them to the data module processor 32 for processing as indicated at point 170. The data module processor 32 receives the pages outputted from the outbound hub buffer 98 and the local outbound buffers 102, converts them from ASCII to the code to be used to encode characters for transmission, which preferably is the hybrid code discussed below, and adds the C.25 transmission protocol as indicated at point 174. A determination is made by the data module processor 32 of the destination of the packet of pages as indicated at decision point 176. If the destination of the packets of pages received by the data output 34 is the associated hub switch 16, the packets are transmitted to the hub switch by communication link 20 as indicated at point 178 where processing of pages destined for the hub switch is complete. If, on the other hand, the destination of the packets of pages is determined to be to the local switches 12 within the jurisdiction of the lata switch 14, the data output 34 forwards the pages to each of the associated local switches 12 under the jurisdiction of the lata switch 14 by communication links 20. Alternatively, as discussed above with respect to point 168, if a single or a group of local switches 12 less than the total number of switches under the jurisdiction of the lata switch 14 has been specified as the destination of the page, the data output 34 transmits the packet of pages to the single or plurality of local switches 12 which are specified as a destination. The functioning of the pate output 34 in transmitting a packet of pages to the local switches is indicated at point 180.

VIII. Hub Switch Operation

Figure 10:
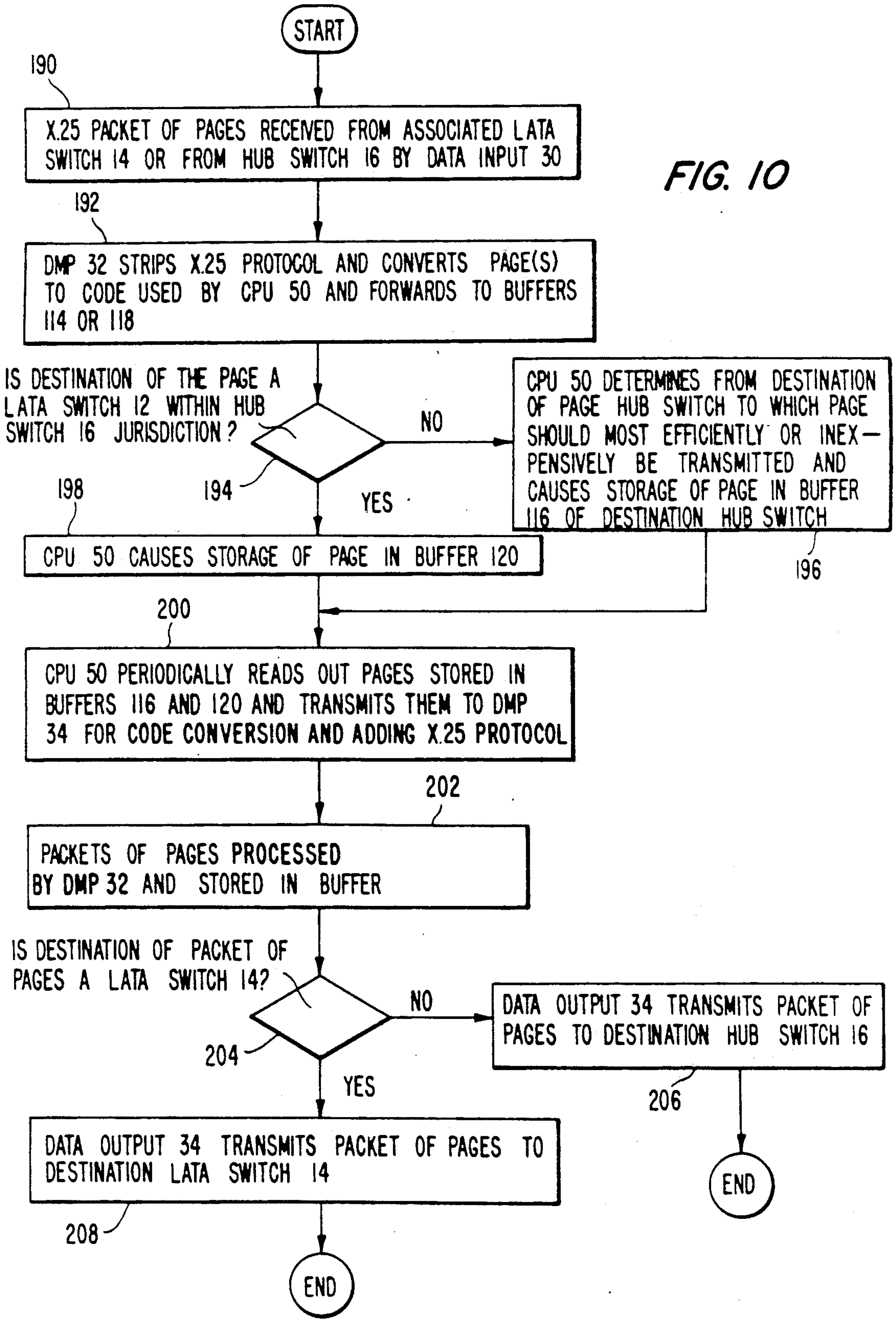
FIG. 10 is a flowchart of the operation of a hub switch of the present invention.

FIG. 10 illustrates a flowchart of the processing of packets of pages received by the hub switch 16. The processing proceeds to point 190 where the data input 30 receives packets of pages from either of the ports connected to the associated lata switches 14 or from the ports connected to the associated hub switches 16 as indicated at point 190. The packets are forwarded from the data input 30 to the data module processor 32 which strips off the X.25 protocol and converts the received pages from the hybrid code described below to ASCII code used by the CPU 50. The data module processor 32 attaches an address to the packets of pages which are respectively received from the ports from the associated lata switches 14 and from the ports from the associated hub switches 16 which is used to address respectively the inbound lata buffers 118 and the inbound hub buffers 114 as indicated at point 192. As indicated at decision point 194, the CPU 50 determines whether or not the pages stored respectively in the inbound lata buffers 118 and the inbound hub buffers 114 are destined for a lata switch within the jurisdiction of the hub switch 16. If the pages stored in the aforementioned inbound lata buffers 118 and the inbound hub buffers 114 are not destined for a lata switch 14, the CPU 50 causes the pages to be stored in the outbound hub buffer 116 associated with the destination hub switch as indicated at point 196. The aforementioned destinations are determined by the CPU 50 utilizing the hub routing codes 112 by comparing the destination of each page with the hub routing code to determine which hub switch 16 to which the page should be sent. It should be noted that each hub routing code 124 contains the priority of the hub switches 16 and the transmission paths by which pages destined for the destination lata switch 14 are to be transmitted. Thus, as illustrated with reference to FIG. 7, if the destination code of the lata switch 14 is area code 312, the first priority hub switch is number 1 with descending priorities being switches 2, 3, 4, 5 and 6. If hub switch number 16 is busy or malfunctioning as determined by the placing of a call to that hub switch by the data output 34, the CPU 50 utilizes the routing code for area code 312 to determined the next highest available priority hub switch 16 and transmission path by which the page should be sent. In this manner, alternative paths which are less efficient or more expensive are substituted for the most efficient or least expensive transmission route to another hub switch 16 to maintain overall system functionality in the event of one or more switches or components failing. If the destination of the page is determined to be a lata switch 14 under the jurisdiction of the hub switch 16 as a consequence of matching the destination with one of the lata codes contained in the lata code table 110, the CPU 50 causes the storage of the page in the outbound lata buffer 120 to which it is destined as indicated by point 198. The CPU 50 periodically reads out the pages stored in the outbound hub buffers 116 and the outbound lata buffers 120. The CPU 50 places an address on pages being read out respectively from the outbound hub buffers 116 and outbound lata buffers 120 which causes them to be received in a buffer of the data module processor 32 for code conversion and adding of transmission protocol to form into packets of pages for transmission to the destinations specified by the CPU as indicated by point 200. The data module processor 32 converts the ASCII encoded characters to the hybrid code described below and formats the pages stored in its buffers with X.25 transmission protocol to form packets of pages. The particular buffers of the DMP 32 in which the packets of pages are stored determines from which port the packets are outputted by the data output 34 to the lata switches 14 under the hub switches jurisdiction or to the other hub switches 16. A determination is made by the data module processor 32 of whether the destination of the packet of pages is a lata switch 14 as indicated at decision point 204 and the packet is transmitted to the data output 34. If the destination of the packet of pages is not a lata switch 14, the data output 34 transmits the packet of pages to a destination hub switch 16 as indicated at point 206. If the destination of the packet is determined to be a lata switch 14, the data output 34 transmits the packet of pages to the destination lata switch as indicated at point 208.

IX. System Operation For Processing Pages Originating At A Local Switch

Figure 11:
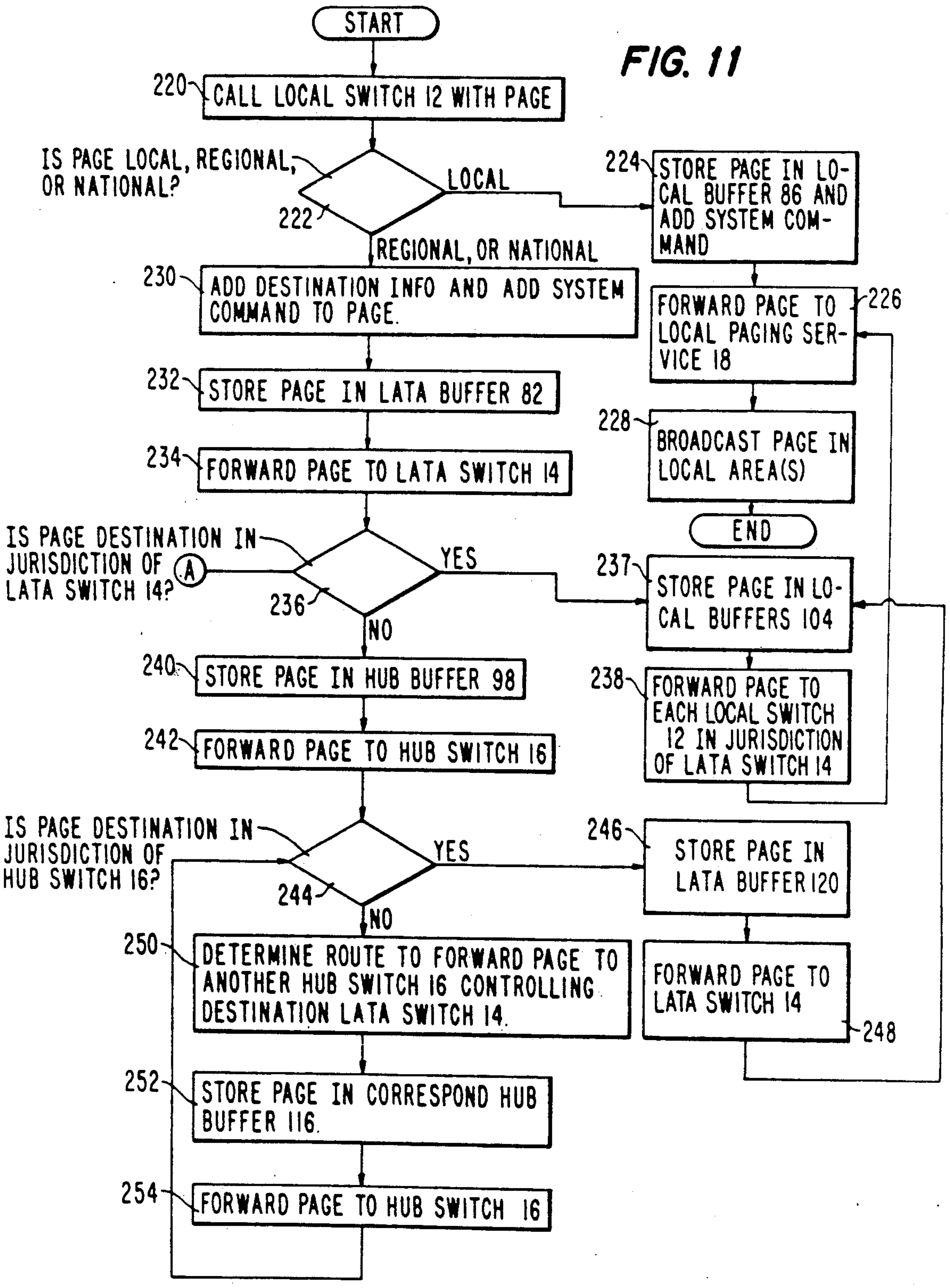
FIG. 11 is a flowchart of the operation of the network in processing pages.

FIG. 11 is a flowchart of the operation of the network 10 in processing pages originating at a local switch 12. The processing proceeds to point 220 where a call is placed to the local switch 12 with a page to be transmitted to a paging receiver. The call is placed via the local telephone trunk 28 and may be either a page consisting of numerical characters or a page consisting of alphanumeric characters having the three input formats described below. As described with reference to FIG. 2, the input may be introduced manually by a telephone handset using DTMF tones or, alternatively, a rotary dial set or from a low speed automatic input providing alphanumeric characters in coded format or from a high speed input in coded format using the X.25 transmission protocol. The message includes the subscriber identification code stored in the field 66. The local switch 12 determines if the page is destined for broadcast by the associated local paging service 18 or for regional or national service as determined by the appropriate service option stored in field 68 of the subscriber file 54. The CPU 50 determines the appropriate level of service by matching the paging receiver identification code inputted by the local call with the corresponding number in the subscriber file 54 and interrogates the service options specified therein in field 68 to determine the command to be used as described below. The operation of the CPU 50 in determining if the service is local, regional, or national is indicated at decision point 222. The page is initially held in the local inbound page buffer 84 while this determination is made. If the page is determined to be a page to be transmitted to a local paging service 18, processing proceeds to point 224 where the CPU 50 causes storage in the identification code buffer 86 associated with a digit which agrees with the least significant digit of the inputted paging receiver identification code and adds the system command to be used. Processing proceeds to point 226 where the CPU 50 periodically reads out any pages stored in the individual ID code buffers 86 to produce groups of one or more pages to be transmitted to the data output 34 for coding in the hybrid code discussed below and transmission to the local paging service 18. Thereafter, the individual page is broadcast by the transmitter 15 associated with the local paging service 18 as indicated as point 228. If at decision point 222 the page is determined to be one destined for a lata switch 14 (regional) or a plurality of lata switches (national), the CPU 50 adds the destination information stored in field 78 of the subscriber file 54, adds the system command as indicated at point 230 and proceeds to store the page in the outbound lata buffer 82 as indicated at point 232. The CPU 50 then forwards the page to the data module processor 32 for code conversion from ASCII to the hybrid code described below and formatting in the X.25 transmission format to form a packet of pages and transmission to the data output 34 where it is outputted to the lata switch 14 as indicated at point 234. The page is received by the associated lata switch 14 where a determination is made if its destination is that particular lata switch jurisdiction as indicated at point 236. If the lata switch 14 determines that the page is destined for its jurisdiction, the CPU 50 of the lata switch 14 causes storage of the page in the outbound local buffers 104 as indicated at point 237. As indicated at point 238, the CPU 50 of the lata switch 14 then periodically outputs the contents of the outbound local buffers 104 to the associated data module processor 32 for code conversion from ASCII to the hybrid code described below and addition of the X.25 transmission protocol as described below to form a packet of pages and forwarding to the data output 34 for transmission to each of the local switches 12 in the jurisdiction of the lata switch 14 as indicated at point 238. Processing then proceeds to point 226 as described above. If the lata switch 14 determines that the page is not destined for its jurisdiction, the CPU 50 causes storage in the outbound hub buffer 98 as indicated at point 240. The CPU 50 then forwards the pages periodically from the hub buffer 98 to the data module processor 32 for code conversion from ASCII to the hybrid code described below and for addition of the X.25 transmission protocol as described below to form a packet of pages and forwarding to data output 34 for transmission to the hub switch 16 associated with the lata switch 14 as indicated at point 242. The hub switch 16 upon receipt of the packet from the lata switch 14 determines if the pages contained therein are destined for a lata switch within its jurisdiction as indicated at decision point 244. If the answer is "yes", the CPU 50 in the hub switch 16 causes the page to be stored in the outbound lata buffer 120 which is associated with the lata switch which is the destination of the page as indicated at point 246. The CPU 50 of the hub switch 16 then periodically outputs any pages stored in the outbound hub buffer 120 to the data module processor 32 for code conversion from ASCII to the hybrid code described below and addition of the X.25 transmission protocol to form a packet of pages and forwarding to data output 34 where they are forwarded to the destination lata switch 14 as indicated at point 248. The process then proceeds to point 237 as described above. If the CPU 50 of the hub switch 16 determines that the destination of the page is not within its jurisdiction, the communication route for the page is determined by the hub routing codes 112 in accordance with the priority information stored therein. As indicated at point 250, the CPU 50 of the hub switch 16 then causes storage in the corresponding outbound hub buffer 116 as indicated at point 252. The CPU 50 periodically causes any pages stored in the output hub buffer to be forwarded to the data module processor 32 for code conversion from ASCII to the hybrid code described below and addition of the X.25 transmission protocol to form a packet of pages and to the data output 34 for transmission to the designated hub switch 16 as indicated at point 254. The processing proceeds back to decision point 244.

X. System Operation For Pages Placed by Local Telephone Call to Lata Switch

Figure 12:
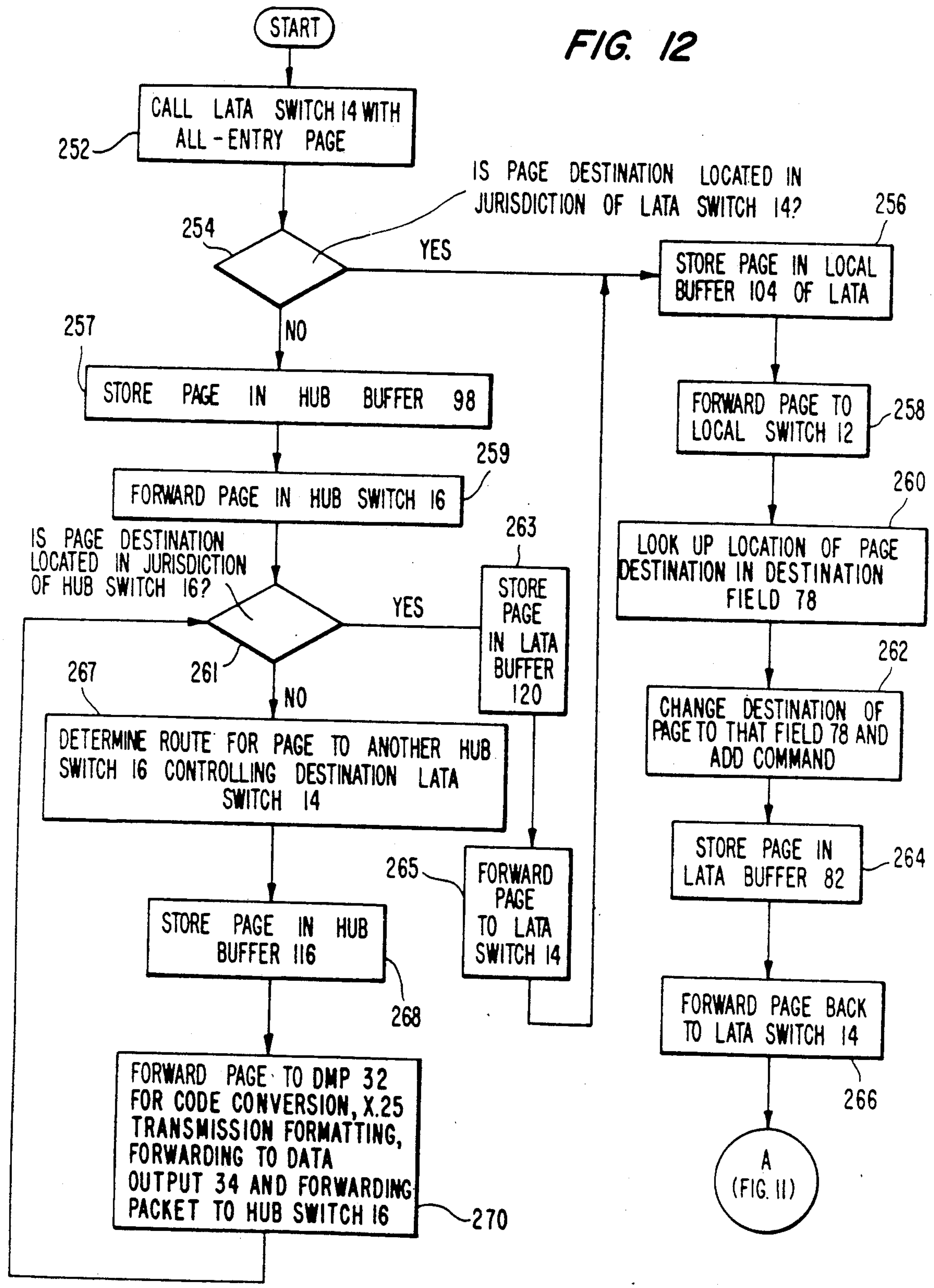
FIG. 12 is a flowchart of the operation of the network in processing pages called to a lata switch in the network.

FIG. 12 illustrates a flowchart of the processing of an "all entry" page called into a lata switch 14 by calling on the telephone trunk 26. While the description of the network's processing of the page called in to a lata switch 14 discussed below is not with reference to a request to reprogram a subscriber file 54, it should be understood that the processing of requests to reprogram a subscriber file is analogous to the description below in routing a page to a local switch 12. It should be understood that the page called in on telephone trunk 26 may be either a purely numeric character page or an alphanumeric character page received with any of the four input formats described above and further contains an identification code which is the paging receiver to receive the page and subscriber identification code. A page originated by a local phone call to a lata switch 14 includes a message portion preceded by the identification code of the paging receiver to receive the page preceded by the geographic identification code of the lata switch receiving the call on telephone trunk 26 to originate a page. The geographic code of the lata switch 14 enables a receiving local switch 12 to differentiate the page from pages originating at a local switch. The resultant page is formed into a packet and forwarded by the network 10 to a local switch 12 where the subscriber file of the subscriber having the same subscriber identification code as the identification code of the page is stored that is within the jurisdiction of the lata switch 14 identified by the first four digits of the identification code contained in the page. The destination information 78 of the subscriber identified by the subscriber identification code is interrogated by the CPU 50 to determine any area destination(s) of the page in the network. The calling of the lata switch 14 is indicated at point 252. It is not necessary for the person placing the request for a page to have any knowledge of the subscriber's location given the fact that the subscriber and paging receiver identification code called in with the "all entry" page is geographically descriptive of the lata switch 14 having jurisdiction over the local switch 12 storing the subscriber file 54 which permits the network 10 to forward the page back to the local switch to determine any area destination(s) to which the page should be sent. Processing proceeds to decision point 254 where a determination is made if the page received by the lata switch 14 has an area destination within the lata switch jurisdiction which is made by comparing the identification code accompanying the page with the identification codes stored in the lata ID memory 92. If the answer is "yes", processing proceeds to point 256 where the CPU 50 of that lata switch 14 causes the page to be stored in the outbound local buffer 104 which is associated with the particular local switch in which the subscriber file is located based on the above-described comparison of the subscriber identification code with the identification codes stored in the lata ID memory 92. The CPU 50 of the lata switch 14 outputs the page from the buffer 104 to the data module processor 32 for code conversion from ASCII to the hybrid code described below and formatting of the page in the X.25 transmission protocol to form a packet and forwards the packet to the data output 34 for transmission to the local switch 12 containing the subscriber file as indicated at point 258. The local switch 12 receives the packet, disassembles the packet and compares the identification code of the disassembled page with the identification codes contained in the subscriber files 54 to identify the particular subscriber file. Upon location of the particular subscriber file, the subscriber's destination field 78 is interrogated to determine any area destination(s) to which the page is to be transmitted as indicated at point 260. The area destination of the page is then changed by the CPU 50 to any destination(s) specified by the destination field 78 as indicated at point 262 and the system command as dictated by the service option field 68 is added to form one or more pages corresponding in number to the number of area destinations specified by the service options 68 and destination area codes 78. The CPU 50 then causes the page to be stored in the outbound lata buffer 82 as indicated at point 264. The page(s) is then outputted to the data module processor 32 for code conversion from ASCII to the hybrid code discussed below and formatting of the page in the X.25 transmission protocol to form a packet(s) and forwarding to data output 34 where the packet(s) is transmitted to the lata switch 14 having jurisdiction as indicated at point 266. Thereafter, the processing proceeds to point 236 of FIG. 11 as described above. If the determination is that the area destination of the pages(s) is not within the lata switch jurisdiction at decision point 254, processing proceeds to point 257 where the page(s) is stored in the outbound hub buffer 98. The CPU 50 periodically outputs the contents of the hub buffer 98 to the data module processor 32 for code conversion from ASCII to the hybrid code discussed below and formatting of the page(s) in the X.25 transmission protocol to form a packet(s) and forwarding the packet(s) to data output 34 for transmission to the associated hub switch(es) 16 as indicated at point 259. Processing proceeds to decision point 261 where a determination is made by the hub switch 16 if the destination of the page(s) is within the hub switch jurisdiction. If the answer is "yes", the processing proceeds to point 263 where the CPU 50 causes storage of the page(s) in the outbound lata buffer 120. Thereafter, the CPU 50 periodically outputs the contents of the outbound lata buffer 120 to the data module processor 32 for code conversion from ASCII to the hybrid code discussed below and formatting in the X.25 transmission protocol to form a packet(s) and forwarding the packet(s) to the data output 34 where the packet(s) is transmitted to the lata switch 14 which is the destination as indicated at point 265. Processing then proceeds to point 256 as described above. If the answer is "no" at decision point 264, processing proceeds to point 267 where the CPU 50 makes a determination of the transmission route for the page(s) to another hub switch 16 by use of the hub routing codes 12 to determine the hub switch to which the page should be forwarded. The CPU 50 then causes storage in the outbound hub buffer 116 which is the area destination determined by comparison of the destination area code with the hub routing codes 112 as indicated at point 268. The CPU 50 then causes the page(s) to be outputted from the outbound hub buffer 116 to the data module processor 32 for code conversion from ASCII to the hybrid code discussed below and formatting in the X.25 transmission protocol to form a packet(s) and forwarding to data output 34 where the packet(s) is transmitted to the adjacent hub switch 16 as indicated at point 270.

XI. Programming of Frequency Band of Paging Receiver

Figure 13:
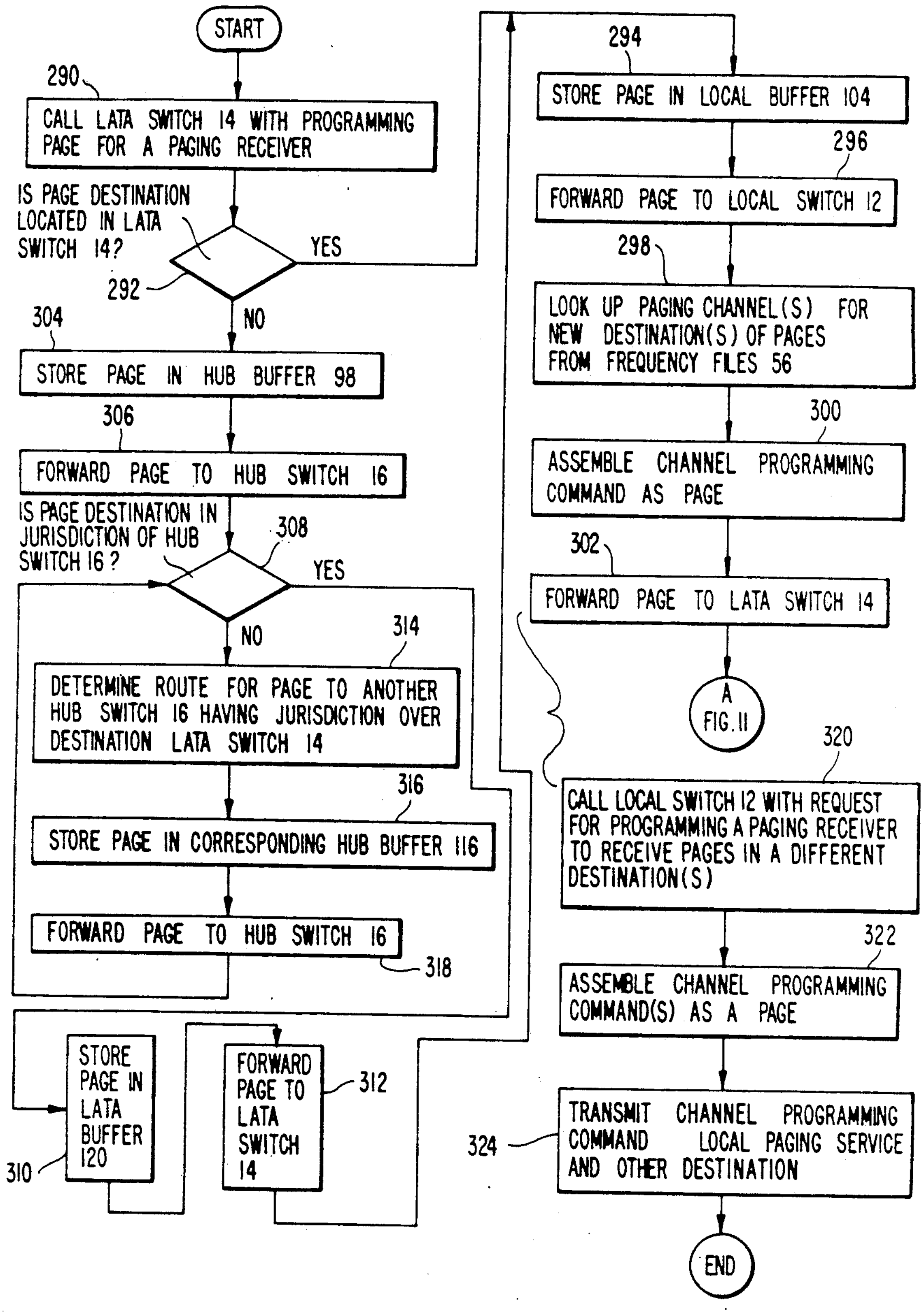
FIG. 13 is a flowchart of the operation of the network in processing a request for programming a subscriber file by calling a lata switch within the network.

FIG. 13 is a flowchart illustrating the programming of the channel memory of a paging receiver to receive different channels. Programming of the channels of a paging receiver may be made by placing either a call to a lata switch 14 by telephone trunk 26 or by local call on telephone trunk 28. The channel programming command that is transmitted to the paging receiver to accomplish programming of the reception frequency is described below. The paging receiver is described in detail in the above-referenced patent applications filed on Oct. 20, 1987. It should be understood that the actual programming of channels is transparent to the subscriber or other authorized person requesting programming of channels in that the local switch 12 at which the subscriber's subscriber file 54 is stored automatically issues a page commanding the paging receiver having an identification code identical to the paging receiver identification code stored in field 66 to be programmed with channels permitting reception in the new destination area(s) specified in field 78 to receive the channels specified in the frequency files 56 which match the area(s) stored in field 78. Programming the channel by a call to a lata switch 14 proceeds from the starting point where a caller directly calls a lata switch 14 by placing a local phone call over a telephone trunk 26 such as a 950 exchange to program the field 78 for reception in a new area(s). The caller receives a voice prompted message from the CPU 50 located at the lata switch 14 which prompts the caller to enter by means of DTMF codes or by rotary dialing a secret code (four digits) issued to the subscriber and the new area(s) in which the paging receiver is to receive pages. The secret code prevents unauthorized access to the subscriber's file 54 maintained in the local switch 12. This process is identified by reference numeral 290. Processing proceeds to decision point 292 where the lata switch 14 examines the second, third and fourth most significant digits of the paging receiver identification code inputted by the caller and compares those digits with its region designation to determine if the page is destined for that particular lata switch 14. The first digit is common to all paging receivers in a country and therefore is ignored in this example. This determination is made by the central processing unit 50 comparing the identification code called in with the page with the lata ID memory 92 to determine if the identification code matches any one of the paging receiver identification codes stored in the lata ID memory. If a match is found, which means that the page destination is located in the region of the lata switch 14, processing proceeds to point 294 where the page is stored in the particular outbound local buffer 104 which is assigned to the particular local switch 12 which contains the subscriber identification code in its subscriber files 54. Processing proceeds to point 296 where the lata switch 14 causes the pages stored in the local outbound buffer 104 to be periodically read out and forwarded to the data module processor 32 for code conversion from ASCII to the hybrid protocol described below and formatting in the X.25 transmission protocol to form a packet and forwarding to output 34 and transmission to the local switch 12 as indicated. The local switch 12, containing the subscriber identification code matching that contained in the page which was called to the lata switch 14, proceeds to verify that the secret access code to the subscriber's file agrees with that subscriber's secret access code and enters the new area(s) into the field 78 and looks up the channels in the frequency files 56 which are assigned to the new area as indicated at point 298. The CPU 50 then assembles a channel programming command for each new area(s) which has been added to the field 78 which has a destination of one of the newly added areas as indicated at point 300. The local switch 12 then stores the channel programming command(s) in the outbound lata buffer 82 which is periodically read out under the control of the CPU 50. The CPU 50 then causes the channel programming commands to be outputted from the outbound lata buffer 82 to the data module processor 32 for code conversion from ASCII to the hybrid code described below and formatting in the X.25 transmission protocol to form a packet and forwarding to the data output 34 for transmission to the associated lata switch 14 as indicated at point 302. Furthermore, although not illustrated, if the service option field 68 specifies local service, the CPU 50 causes the page to be assembled as a page to be broadcast locally, stored in the appropriate ID code buffer 86, outputted to the data output 34 and converted to the hybrid code discussed below and forwarded to the local paging service 18. Operation then proceeds as described above at decision point 236 of FIG. 11. If the determination at decision point 292 was that the page destination is outside of the jurisdiction of the lata switch 14, processing proceeds to point 304 where the lata switch 14 causes storage of the page to be stored in the outbound hub buffer 98. The CPU 50 of the lata switch 14 causes the page to be read out of the hub page buffer 98 and transmitted to the data module processor 32 for code conversion from ASCII to the hybrid code described below and formatting in the X.25 transmission protocol to produce a packet and forwarding to the data output 34 for transmission to the associated hub switch 16 as indicated at point 306. The hub switch 16 makes the determination as indicated at decision point 308 of whether the page has a destination of a lata switch 14 within the hub region. If the decision is "yes" at decision point 308, processing proceeds to point 310 where the hub switch 16 causes storage of the page in the outbound lata buffer 120 which is assigned to the destination lata switch 14. The CPU 50 of the hub switch 16 then causes the page to be read out of the lata buffer 120 and transmitted to the data module processor 32 for code conversion from ASCII to the hybrid code described below and formatting in the X.25 transmission protocol to produce a packet and transmission to data output 34 where it is forwarded to the lata switch 14 as indicated at point 312. Processing then proceeds to point 294 as described above. If the answer was "no" at decision point 308 that the page is not destined for a lata switch 14 within the jurisdiction of the hub switch 16, processing proceeds to point 314 where the CPU 50 determines to which hub switch 16 the page should be transmitted by use of the hub routing codes 112 in the random access memory 48. The CPU 50 then determines the destination hub switch 16 by matching the area destination of the page with a particular area destination within the hub routing codes 112 and causes storage of the page in the corresponding outbound hub buffer 116 which is the highest priority hub switch 16 to which pages are to be sent in the matched hub routing code as indicated at point 316. The CPU 50 of the hub switch 16 causes the page to be forwarded to the hub destination upon the periodic reading out of the outbound hub buffer 16 by transmission to the data module processor 32 for code conversion from ASCII to the hybrid code described below and formatting in the X.25 transmission protocol to form a packet and forwarding to the data output 34 where the page is transmitted to the hub destination as indicated at point 318.

Furthermore, it should be understood that programming of the paging receiver to receive pages in a new area(s) by updating the field 78 of the subscriber files may be accomplished by a local telephone call to the local switch 12 having the subscriber file 54 containing the subscriber identification code. The initiation of this programming is indicated by block 320. After verification of the secret code and matching of the identification code transmitted with the page with an identification code in the subscriber file 54 and reprogramming of the destinations 78, processing proceeds to point 322 where the frequency programming command is assembled. At point 324 the command after buffering and protocol formatting is transmitted to a transmitter 15 at the local paging service as indicated and to the area codes (if any) specified in field 78.

It should further be understood that the updating of service by adding an area(s) to the field 78 causes the channel programming command to be outputted to each of the areas stored in the field 78 including those area(s) already present in the field and the newly added area(s). In this the highest probability exists for local paging service as indicated and to the area codes (if any) specified in field 78.

It should further be understood that the updating of service by adding an area(s) to the field 78 causes the channel programming command to be outputted to each of the areas stored in the field 78 including those area(s) already present in the field and the newly added area(s). In this way, the highest probability exists for the paging receiver receiving the new frequency programming information.

Figure 26:
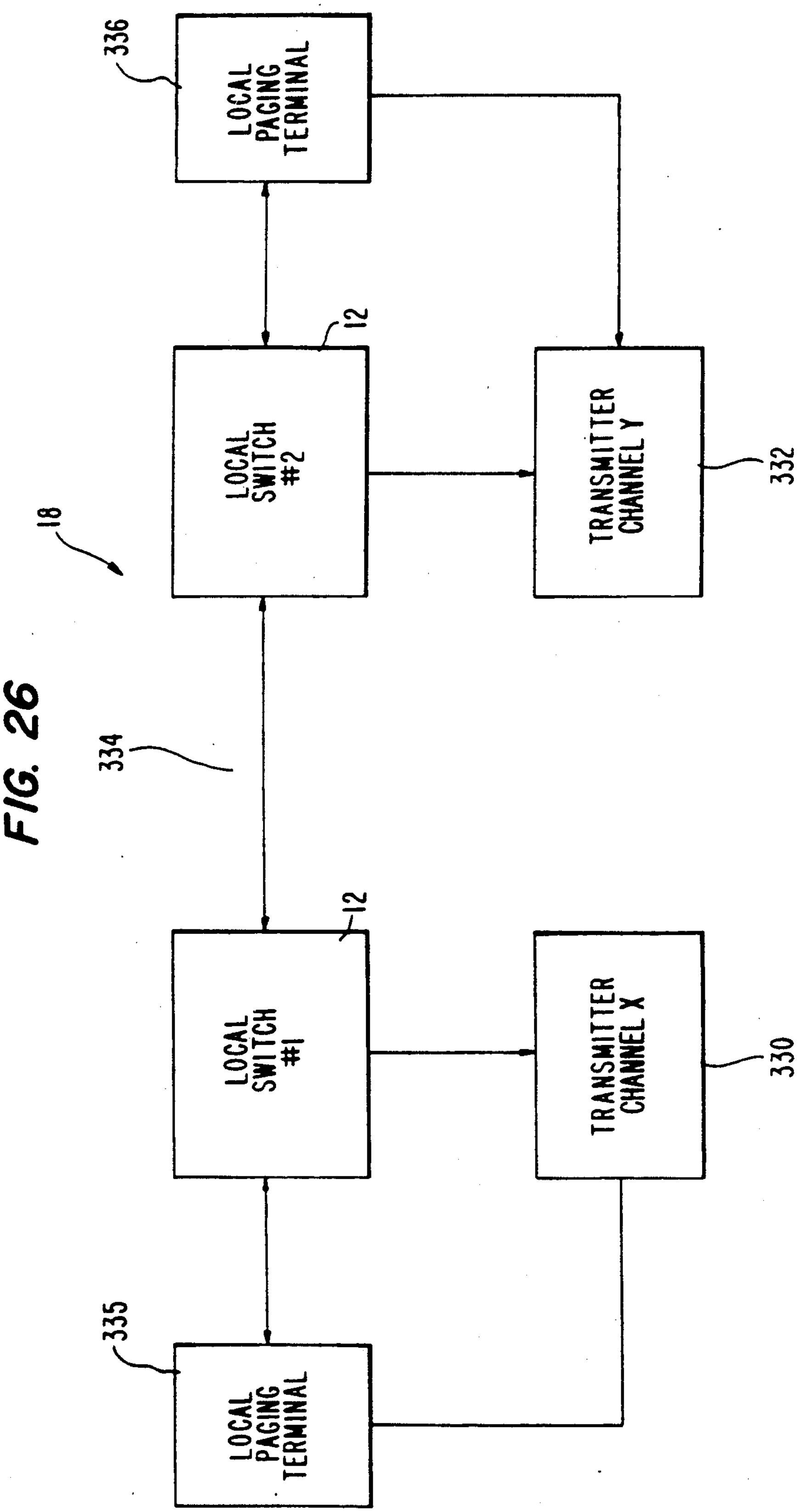
FIG. 26 illustrates a block diagram of a system used by a paging service 18 in dynamically switching paging receiver reception channels between one channel and one or more additional channels.

XII. Local Switch Programming of Reception Frequencies in Response to Paging Traffic FIG. 26 illustrates a block diagram of a system utilized by a local paging service 18 having at least two transmission channels which dynamically switches the channel on which paging receivers under the jurisdiction of the local paging service 18 are to receive pages from one of the channels to another of the channels. As illustrated, the pair of local switches 12, which are identical to those described above with respect to FIGS. 2 and 3, are connected to each other via the communication line 334 which preferably has a RS232 protocol. The local switch #1 is connected to a local paging terminal 335 which represents the part of a local paging service 18 which controls the transmitter 330 transmitting pages on channel X. Similarly, the local switch #2 is connected to a local paging terminal 336 which represents the part of a local paging service 18 which controls the transmission of pages on a transmitter 332 on channel Y. It should be understood that typically the local paging terminals 335 and 336 are contained within a single local paging service 18 but that in fact they are not limited thereto. Furthermore, the local switches #1 and #2 may be disposed in different geographical areas within broadcast range of the area served by the local paging service 18. It should also be understood that the transmitters 330 and 332 may be located at a single transmission facility or may be disposed in separate locations within the service area o the local paging service 18. The local switches #1 and #2 may be implemented in a high capacity switch having the functional capability of two individual local switches 12. Finally, the above-described system may be implemented with only two local switches and transmitters under their jurisdiction.

The system of FIG. 26 functions to change the paging receiver channel of groups of subscribers stored in a subscriber file 54 of one of at least two local switches to the paging receiver channel of one of the other of the switches when traffic conditions on one of the switches reaches an overload as described below. In the preferred form, the channel of individual subscribers is not changed but it should be understood that this could be accomplished in the alternative. Overload conditions typically will happen during three peak traffic periods during a day but may also occur randomly as dictated by service conditions. The programming for implementing the operation of the local switches is contained in the Appendix referred to above. The local switch controlling the changing of the channel of a group of subscriber's paging receiver to the channel of another local switch issues a frequency changing command discussed below to reprogram the channel of each of the paging receivers having a paging receiver identification code contained within the group of subscribers. The channel "X" of transmitter 330 is utilized when the local switch #2 is overloaded with paging traffic and the channel "Y" of transmitter 332 is utilized when the local switch #1 is overloaded with paging traffic assuming that both switches are not simultaneously busy. The local switch controlling the changing o the channel of a group of paging receivers programs the destination field 78 of the subscriber to forward pages within the group of paging receivers to the port connected to line 334 of the other switch to cause each page to a paging receiver within the group to be transferred to the other switch by line 334 for transmission by its transmitter. It should be understood that the compilation of the pages which are intended for paging receivers within the group of paging receivers that have their channel changed remains under the jurisdiction of the switch which initiated the change in the channel with only the transmission of the pages being controlled by the other switch. It should be understood that this configuration in the network 10 replaces the combination of the local switch 12, transmitter 15 and local paging service 18 associated with each lata switch 14 as illustrated in FIG. 1 when the local paging service has two or more channels available. It should be understood that the number and the size of the buffers of the local switches are programmable by inputs from the keyboard 36.

Figure 27:
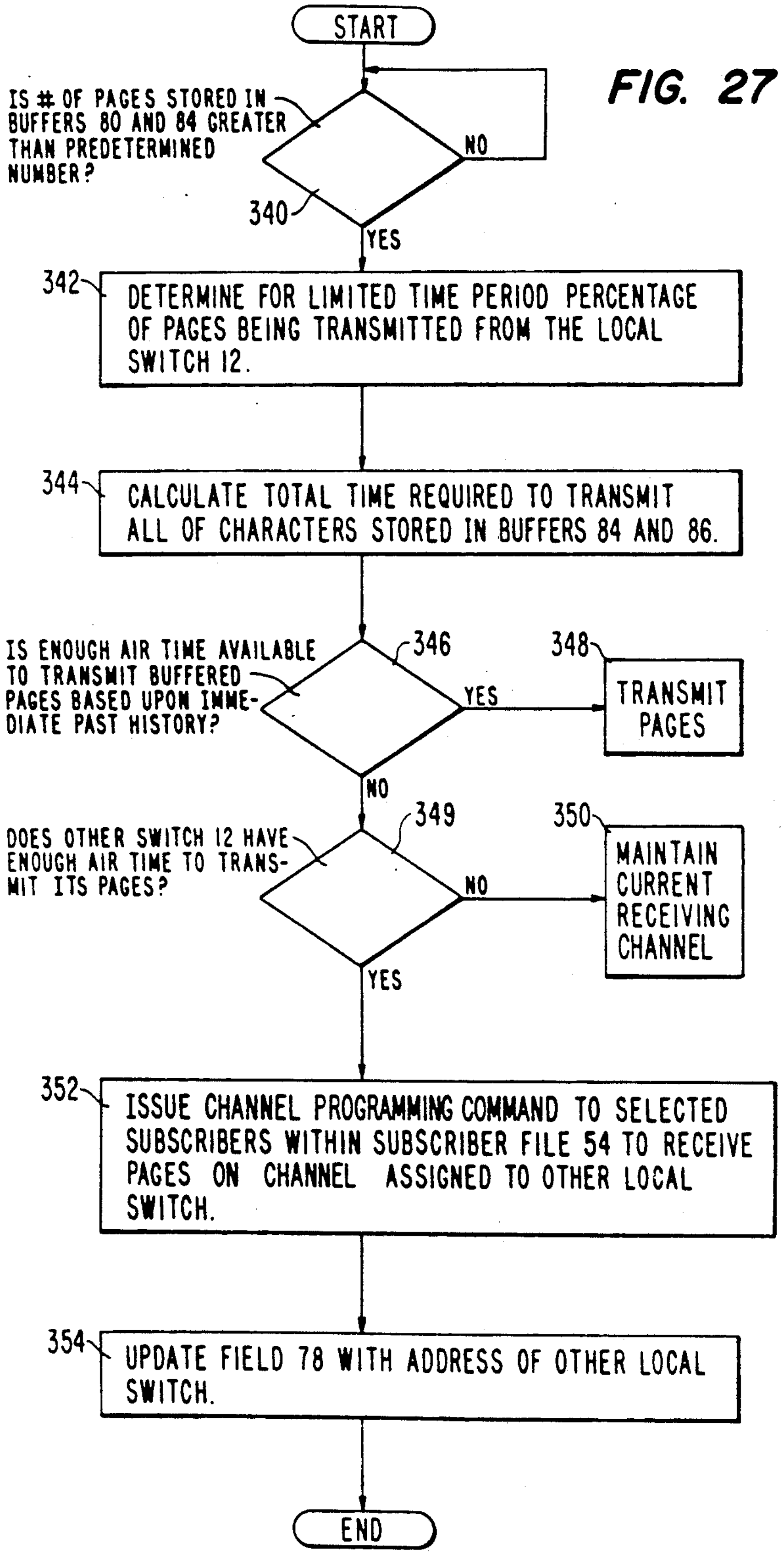
FIG. 27 is a flowchart of the operation of the system of FIG. 26.

FIG. 27 is a flowchart illustrating the operation of the system of FIG. 26. It should be understood that the explanation of operation in equally applicable to either one of the local switches #1 or #2. Operation commences at point 340 where the CPU 50 of one of the local switches 12 determines the number of pages stored in its inbound data buffer 80 and inbound pages buffer 84. If the number is greater than a predetermined programmable number, such as 70% of the overall capacity of pages which may be stored by these buffers, a condition exists in which it may be desirably to shift the channel on which subscriber stored in the subscriber file 54 of the one local switch are to receive pages from one of the channels "X" and "Y" to the other of the channels "X" and "Y". If the system does not have local paging terminals 335 and 336 which have separate subscriber files from the subscriber files 54 of the local switches #1 and #2, then the determination may proceed directly to decision point 348 described below which eliminates the requirement for determining percentage of air time discussed below with reference to steps 342, 344 and 346. If the number exceeds the aforementioned number, processing proceeds to point 342 where a determination is made of the percentage of the air time over an immediately past time interval used by the local switch in transmitting its pages with respect to the total air time of the transmission of pages by the transmitter in transmitting pages from the associated local paging terminal and the local switch. This determination may be made for a period such as the five preceding minutes of operation. The assumption is that if the local switch 12 has its inbound buffers substantially full, then the overall amount of time which it spent transmitting pages in the last five minutes will reflect its percentage of the overall air time. If there is no backup of pages in the buffers 82 and 86 in the last five minutes of operation, there is assumed to be no backup of pages requiring reprogramming of the channel of the paging receivers. The CPU 50 determines the overall total time required to transmit the totality of the pages stored in each of the buffers 82 and 86 as indicated at point 344. At point 346, based upon the overall percentage of transmission time which has been utilized by the local switch during the predetermined time period, a determination is made if the total required time to transmit the totality of buffered pages contained in the buffers 82 and 86 does not exceed the available air time. In other words, if the local switch utilized 20% of broadcast time for an immediately past predetermined time of five minutes, then the total time required to transmit the number of pages stored in the buffers 82 and 86 must not exceed one minute in order to avoid a backup. If the answer is "yes" at point 346, then the local switch proceeds as described above with reference to the operation of the local switch to output the stored pages in the ID code buffers 86 for transmission to its associated transmitter 330 or 332 as indicated at point 348. If the answer is "no" at point 346, the processing proceeds to point 349 where an inquiry is made to the other local switch to determine if it has enough air time available to transmit the pages stored in its buffers 80 and 84. At this point it should be noted that the control program of both local switches are simultaneously making the determinations of steps 340–349. If the answer is "no" at point 349, which means that the other local switch 12 also has backlog pages, then the local switch does not issue any channel programming commands and maintains the current channel for all of the subscribers in its subscriber files 54 as indicated at point 350. If the answer is "yes" at point 349, operation proceeds to point 352 where the CPU 50 causes the generation of the channel programming command as discussed below to receive the page on the channel assigned to the other local switch. Processing proceeds from point 352 to point 354 where a pointer is placed in the field 78 to forward each page of the group of subscribers who have had their channel changed to the other switch. It should be noted that the formatting of a channel programming command is totally under the control of the switch initiating the changing of the channel with the complete page being forwarded to the other switch under the control of the aforementioned pointer.

At this point it should be understood that there are two main modes of operation which are the automatic and manual modes. During the automatic mode, the control program of the CPU 50 may be altered at the local switch 12 by a suitable input such as from the keyboard and monitor 36 prior to operation to shift the channel of a group of subscribers less than the total number of subscriber files or to shift the whole group of subscribers stored therein. During the automatic mode of operation, the shifting of reception frequency of a group of subscribers happens without human intervention. Shifting of the channel of the entire subscriber file is an action which would normally be reserved for a transmitter failure or shutdown of the transmitter for maintenance. When less than all of the subscribers in the subscriber file 54 are to have their channel changed, the local switch may be programmed to automatically identify those particular subscribers to have their channel changed to identify blocks of subscribers such as but not limited to by the least significant digit of their identification code. The manual mode of operation is the same as described above except that implementation of the step at point 352 is performed with manual intervention which permits the choice of programming either all of the subscribers which are resident in the subscriber file 54 as a group or sub-groups such as those having a common least significant digit in their identification code 66.

XIII. International, National, Regional, Local, Sublocal and Group Paging

As discussed above, the network 10 provides versatility in the level of service which may be provided to the subscriber. The subscriber may elect international, national, regional, local, sublocal and group paging by use of the service option field 68.

A. Local Paging

When it is desired to program a paging receiver which is identified by the pager identification code 66 of the subscriber file 54 to receive local service, the paging receiver is programmed to receive a fixed channels either manually or automatically by use of the channel programming changing AC as described below. Automatic programming is accomplished with the channel programming command AC discussed below with the desired channels being sent twice by identical channel programming command to the paging receiver by means of the transmitter 15. The operating program of the processor of the paging receiver recognizes the sequential sending of the same programming command twice and stores the repeated channel in the area channel section and operating channel section of the channel memory as discussed in detail in the above-referenced patent applications filed Oct. 20, 1987. By storing only a single channel in its operation channel and its area channel sections discussed below, the paging receiver is forced to receive only a single channel which is typically used for local operation. It should also be understood that a paging receiver may be programmed to receive more than one channel.

B. Sublocal Paging

Figure 28:
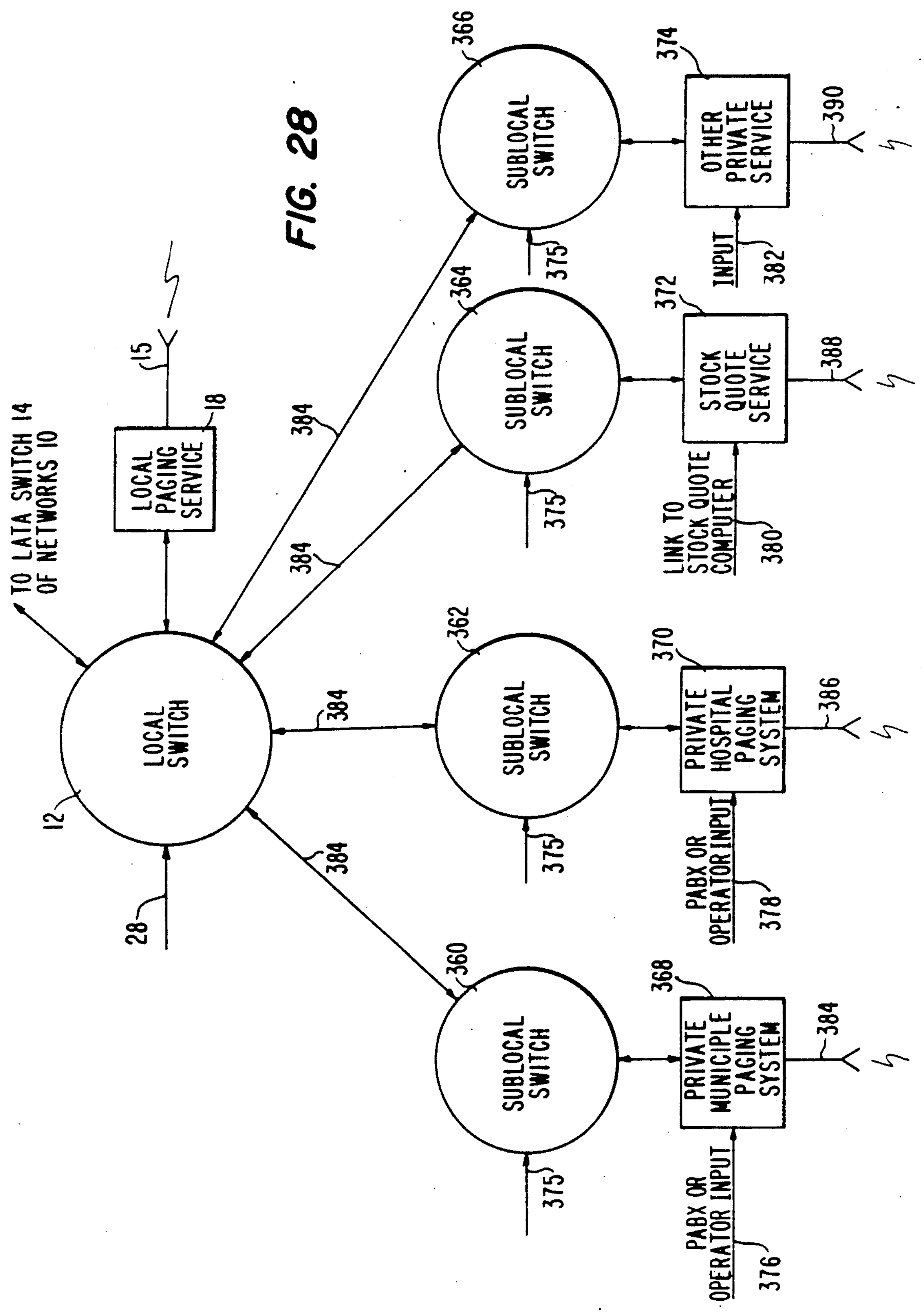
FIG. 28 is a diagram of a local switch 12 and a plurality of sublocal switches.

FIG. 28 illustrates a block diagram of a system in accordance with the present invention for providing sublocal paging message services by means of pages transmitted from one or more sublocal paging systems or services 368, 370, 372 and 374 through associated sublocal switches 360, 362, 364 and 366 to the local switch 12 for broadcast by the transmitter 15 of the local paging receiver 18 on a common carrier channel.

The channel programming command, discussed below, is issued by the local switch 12 to program the channel(s) of the paging receiver of subscribers resident in the subscriber file of the systems or services 368–374 to the channel(s) of the local transmitter 15. A sublocal paging system or service transmits on a non-common carrier channel pages to groups of subscribers maintained in a sublocal switch subscriber file 54 as described below to provide specialized services typically of the type not provided by a common carrier paging service such as the local paging service 18. A separate sublocal switch is provided for each of the sublocal services or systems to be controlled. The circuitry of the sublocal switches 360, 362, 364 and 366 is identical to the local switch described above with reference to FIGS. 2 and 3 and they have the same general control program with necessary modifications being made by input from the keyboard 36. As illustrated, sublocal switches 360, 362, 364 and 366 are respectively associated with a private municipal paging system 368, a private hospital paging system 370, a stock quotation service 372 and any other type of private service 374. Each of the sublocal switches and local switch 12 has a telephone trunk(s) 375. A sublocal switch may be used in conjunction with any non-common carrier service or system with the number of sublocal switches not being limited to that as illustrated and further not being limited to any particular type of sublocal system or service as illustrated. As illustrated, the private municipal paging system 368 has a PABX or operator input 376, the private hospital paging system has a PABX or operator input 378; the stock quote service 372 has a link to a stock quote computer 380, and the other private service has an input of any type of information 382 with it being understood that the inputs to the sublocal systems or services are of any nature to support the function performed by these systems or services. The function of these systems is to permit specialized forms of information to be broadcast in the form of a page to subscribers of the services or system 368, 370, 372 and 374 either by means of their associated sublocal non-common carrier transmitter 384, 386, 388 and 390 or by means of the local switch controlling the transmitter 15 of the common carrier of the local paging service 18. Each of the sublocal switches 360, 362, 364 and 366 are connected to the local switch by means of a communication link 384 which may be a telephone trunk.

Figure 30:
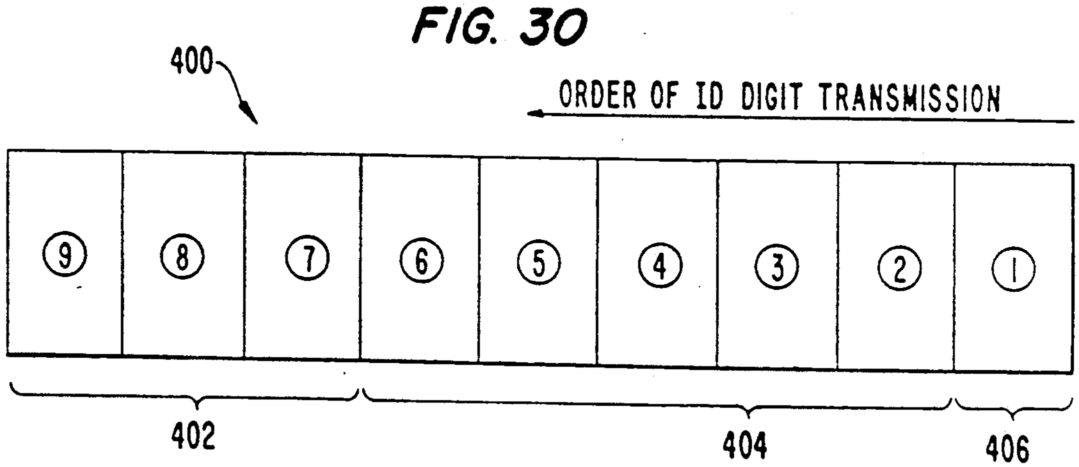
FIG. 30 is a diagram illustrating the digits of the subscriber and paging receiver identification code and destination code and their order of transmission for a page broadcast for service options other than a local service option.

Each of the sublocal switches 360, 362, 364 and 366 has a memory map as illustrated in FIG. 3 with a private service option field 68 (not illustrated) being utilized to permit election of sublocal service which utilizes only the transmitter 384, 386, 388 or 390 associated with the sublocal switches 360, 362, 364 or 366 or local, regional, national or international service provided by the network 10. The channel programming command AC is issued to program the channel of the paging receiver of the subscribers within the subscriber file 54 of the local switch 18 to receive a page origination from the sublocal switch broadcast by the local transmitter 15. The other service options remain which permit a subscriber to the systems or services 360, 370, 372 or 374 to elect the other service levels provided by the network 10. When the subscriber to the private systems or services elects to utilize the transmitter 15 of the local paging service 18, the subscriber calls the local switch 12 and enters the four-digit secret code to obtain access to the subscriber files 54. The subscriber then requests service other than sublocal transmission by the transmitters associated with the systems or services 368, 370, 372 and 374 by specifying a service option of either local service which corresponds to the local service described above with reference to field 68 of the local switch memory map of FIG. 3 or some other wider level of broadcast service by entering the service option and the area code(s) of the destinations. The destination code 406 discussed below with reference to FIG. 30 is transmitted with the channel programming command which is stored by the paging receiver. All pages which originate from a sublocal switch that are broadcast by the transmitter 15 are broadcast with the destination code 406 as the first character of the identification code to save battery power of the paging receiver. The local switch 12 programs the channel(s) to be received by the paging receiver to those used by the service areas of the destination field 78 of the subscriber file by transmission of the channel programming command by the transmitter 15 and to the network 10 if a level of service greater than local service is requested. The regional and national service options also utilize the destination code 406 as described below. The sublocal switch receives each page from the associated system or service and formats the page with the appropriate identification code including destination code 406 and system command as described below including the hybrid code described below and adding of the X.25 transmission protocol to form a packet. The sublocal switch then forwards the packet to the local switch 12 for processing and distribution to the destinations specified by the destination field 78 in accordance with the function of a local switch 12 as described above with reference to FIGS. 2 and 3. When the local switch 12 receives a page from one of the sublocal switches via communication link 384, it compares the identification code of the page with the subscriber file 54 to find a match and determines the destination(s). For a local service option the page is processed as a page received from a lata switch 14, and broadcast by the transmitter 15. If regional, national or international service has been elected then the local switch 12 forwards the page(s) to system 10 for processing as described above. If the subscriber wishes to return to the status of only receiving pages via transmission of the sublocal switches and private transmitter, then a call is made to the sublocal and local switches to reprogram the service options in field 68 to specify only private service over which the switch 12 does not have jurisdiction.

C. International, National, Regional and Group Paging

International, national and regional service are provided by the transmission of packets of pages between switches in the network 10. The channel programming command AC is used to program the paging receiver of the subscriber to receive the channels for the areas identified in field 78 which are stored in the frequency file 56 which are associated with the designated areas. Thus, if regional service is elected for area code 312 or national service is elected to cover a plurality of area codes such as 312, 202 and 212, the local switch 12 issues a channel programming command AC discussed below which is broadcast to all of the specified area codes as well as the broadcast area of the transmitter 15 with channels chosen from the frequency file.

Group paging is analogous to sublocal paging except that the pages are directed to a selected group of paging receivers within the jurisdiction of the local switch 12. The destination code 406 which is discussed below in detail is added as the first digit of the paging receiver identification code to limit the sampling time required by the local paging receiver to determine if the page is intended to be received by it as part of the group.

Figure 29:
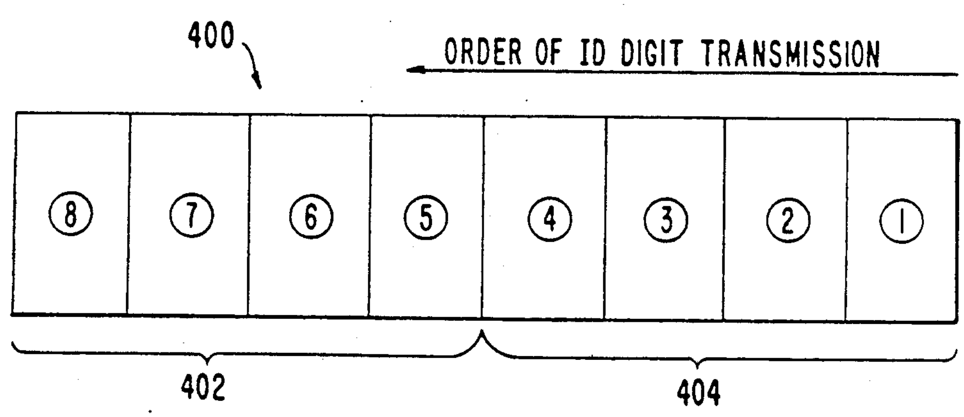
FIG. 29 is a diagram illustrating the digits of the subscriber and paging receiver identification code and their order of transmission for a page broadcast for a local service option.

D. Limiting of Battery Consumption of Paging Receivers for Sublocal, Group, Regional, National and International Paging FIG. 29 illustrates the order of transmission of digits of the identification code for all pages which are broadcast by a local paging service 18 for subscribers stored within its subscriber identification files 54. Each circled number indicates the significance of the digit of the identification code with the most significant digit being identified by the largest number. The area designation field 402 is the country code and area code of the geographical location where the local switch 12 is located with the most significant digit being the country code followed by the next three most significant digits which comprise the area code. For example a local switch in the Chicago area would have a filed 402 of "1312". The field 404 are the digits which identify the subscribers of the local switch. The arrow pointing to the left illustrates the order of transmission of the digits of the identification code with the least significant digit being transmitted first sequentially followed by digits of increasing significance with the most significant digit being transmitted last. This order of transmission produces a substantial increase in battery life of the paging receiver because the individual paging receiver samples fewer digits of the identification code on any given channel to determine if a page on that channel is addressed to a particular paging receiver than if the digits are transmitted in an order of decreasing significance as in the prior art.

FIG. 30 illustrates the use of the destination code 406 to limit power consumption in paging receivers for sublocal, group, regional, national and international paging. Identical reference numerals identify like parts in FIGS. 29 and 30. The only difference between local paging on one hand and sublocal, group, regional, national and international paging on the other hand is that a destination code 406 is added to the identification code of pages as the least significant digit which are transmitted to paging receivers which are to receive group, sublocal, regional, national or international service pursuant to the service option field 68 discussed above. The destination code 406 has one or more characters which precede the paging receiver identification code that are not matched by a paging receiver which is to receive only a local service page. This ensures that only paging receivers which are programmed to receive international, national, regional, sublocal and group pages may be turned on to sample more than one digit of the identification code of pages intended for international, national, regional, sublocal and group service options when transmission occurs on a local frequency. Paging receivers which are programmed for the international, national, regional, sublocal and group service options will only turn on for one digit of local service options on a channel before a mismatch occurs that causes the paging receiver to turn off for pages broadcast local pages. In a preferred form of the invention, the destination code 406 is a letter, which is transmitted prior to the transmission of the paging receiver identification code. Since local pages do not transmit any letters with the identification code, a mismatch will occur immediately for paging receivers programmed to receive nonlocal service pages. Paging receivers which are to receive international, national, regional, sublocal or group pages are programmed by the channel programming command AC to store a destination code as a header on the channels broadcast with the channel programming command. Thus, on a particular channel where some pages are transmitted with destination codes, only the first digit of each page is required to be compared with any stored destination code to enable an identification by a paging receiver programmed to receive pages with destination codes if a page is potentially directed to that paging receiver. The paging receiver which has been programmed with a destination code immediately turns off when a match is not found between the first digit of a page on a received channel and the stored destination code which occurs for pages broadcast as part of local service thereby saving power required to compare the following digits of the stored and transmitted paging receiver identification.

When it is desired to program a paging receiver to receive pages to use the destination code 406, the individual channels of the area channel section of the channel memory, as discussed below, of the paging receiver as discussed in detail in the above-referenced applications filed on Oct. 20, 1987 are programmed by the channel programming command AC as described below. The first digit of the channels which are to be programmed to be received by the channel programming command AC contain the destination code 406 character such as the letter A, B, C, etc., which is not recognized as part of a paging receiver identification code for only local paging, which preferably are base ten numbers. Thus, paging receivers which are programmed for local paging service on a channel also being used for international, national, regional, sublocal or group paging will immediately detect a mismatch when the first digit of a page intended from national, regional, sublocal or group service is received which saves battery life. When a paging receiver which has been programmed for international, national, regional, sublocal or group service receives the first digit of the paging receiver identification code, that digit is compared with the first digit of the channels stored in the area channel section of the paging receiver channel memory. If a match occurs, the operating program of the paging receiver causes the RF tuner to stay in an "on" state to compare the subsequent digits of the received identification code with the stored paging receiver identification code stored by the paging receiver until a mismatch or a complete match is found. If there is no match between the first digit o the transmitted page and the destination code, then the paging receiver RF tuner is immediately turned off to save battery power.

XIV. X25 Transmission Protocol

Figure 31:
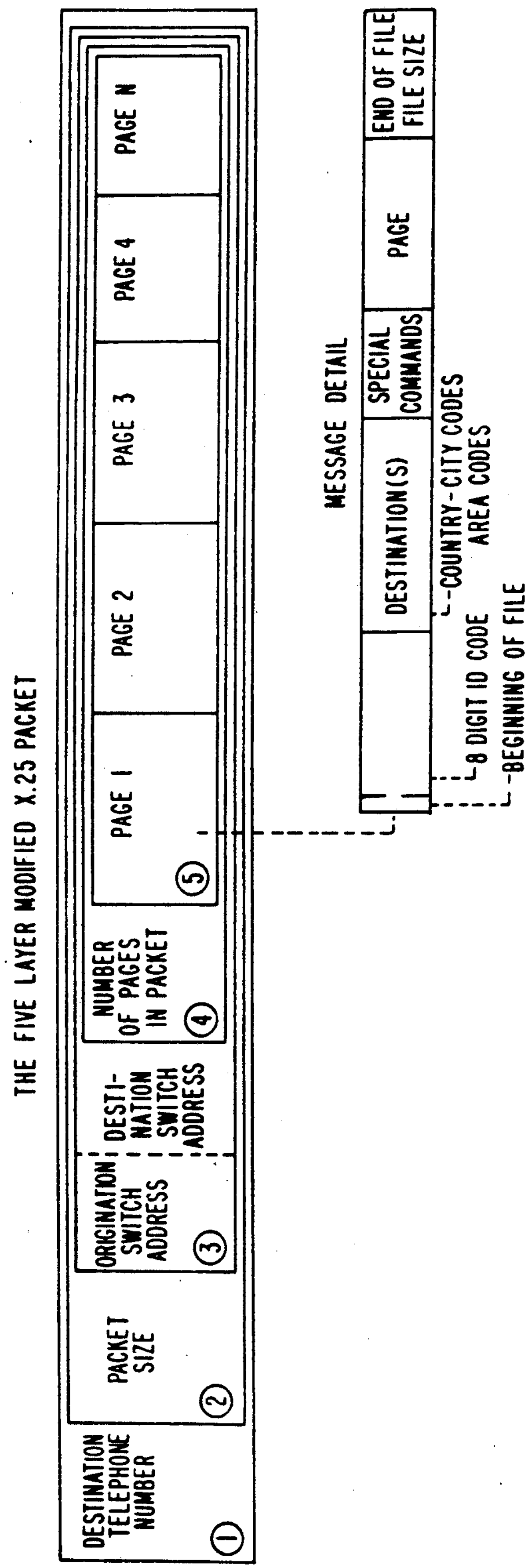
FIG. 31 illustrates a preferred embodiment of the protocols of a packet and a page in accordance with the present invention.

FIG. 31 illustrates a preferred transmission protocol to be used for transmitting packets of pages between switches. The protocol which is used is a modified X.25 protocol. As illustrated, each packet contains five separate layers. The first layer is the destination telephone number which is the receiving port to receive the page. With reference to FIG. 1 if a packet of X.25 formatted pages were to be sent from a first lata switch 14 to its associated hub switch 16 over communication path 20, the destination telephone number would be the telephone number of the hub switch. It should be further understood that the X.25 transmission protocol as described herein may be utilized with other types of communication mediums between switches such that a destination telephone number may be replaced with another form of address of the receiving switch. The second layer indicates the packet size field in terms of succeeding layers of information. In the present case levels 3, 4 and 5 are provided which dictates that the packet size would store the number 3 to indicate the subsequently lower third, fourth and fifth layers. The third layer contains an origination switch address and a destination switch address which can be either telephone numbers or real addresses within the network 10. The fourth layer is the number of pages which are contained in a packet. As illustrated, this number may be any integer n. The fifth layer is one or more pages which each correspond to an individual page to be sent to a particular paging receiver.

Each message includes the following information. In accordance with standard X.25 protocol, a beginning of file header is included. Following the beginning of file header is a pager I.D. code which is the identification code of the destination paging receiver which is identical to the subscriber identification code stored in the subscriber files 54 of the subscriber to receive the page. Following the pager I.D. code is the destination(s) of the page which is geographically descriptive of the area to which the page is to be transmitted and is added by the local switch 12 interrogating the destination field 78 of FIG. 3. In the preferred embodiment, the destination is a combination of country and area code as utilized by the telephone system to identify the area to which the page is destined. For each country, the same country code will be used so that if the paging system 10 as illustrated in FIG. 1 were to be utilized for the United States, the first digit of the destination would be a 1. Similarly, the destinations in other countries would be followed by different numbers identifying those countries followed by code which breaks up the identified country into smaller geographic regions. While the utilization of area codes under the telephone system facilitates the usage of the present invention, it should be understood that a destination which is not based on the telephone system is equally usable with the present invention. The field of special commands are the system commands described below which are transmitted with each page to a paging receiver. The "page" is the part of the page which is to be displayed to the bearer of the paging receiver and may be numeric or alphanumeric characters. The end of the file and file size information are part of a standard X.25 protocol.

XV. Hybrid Page Code

In a preferred form of the present invention a hybrid code is utilized which is compatible with both analog and digital FM paging transmitters now currently in use. Preferably, this code is used for coding all forms of transmission in the system. This hybrid code uses sequential tones to encode numerical pages transmitted with the A3, C3, A5 and C5 commands discussed below. This hybrid code utilizes two sequential tones to encode each numerical or alphanumerical character of alphanumeric pages transmitted with the A4, C4, A6 and C6 commands discussed below. Each tone represents one of 16 possible values in a hexadecimal numbering system as follows: 600 Hz.=0; 741 Hz.=1; 882 Hz.=2; 1023 Hz.=3; 1164 Hz.=4; 1305 Hz.=5; 1446 Hz.=6; 1587 Hz.=7; 1728 Hz.=8; 1869 Hz.=9; 2151 Hz.=A; 2435 Hz.=B; 2010 Hz.=C; 2295 Hz.=D; 4059 Hz.=E; and no tone (absence of modulated carrier signal)=F. The processing by the individual paging receiver of the above-described hybrid code is discussed in detail in the above-referenced patent applications filed on Oct. 20, 1987. Thus, it should be understood that the "page" field of the X.25 packet described above with respect to FIG. 31 is transmitted with one tone being used to encode each number of a numerical page and two tones being used to code each alphanumeric or numeric digit of an alphanumeric page. The encoding format utilized for digits of the alphanumeric commands in the preferred embodiment is set forth below.

CONVERSION TABLE

| Successive Values | Character |
|---|---|
| 01 | ! |
| 02 | " |
| 03 | # |
| 04 | $ |
| 05 | % |
| 06 | & |
| 07 | ' |
| 08 | ( |
| 09 | ) |
| 10 | * |
| 11 | + |
| 12 | , |
| 13 | - |
| 14 | . |
| 15 | / |
| 16 | 0 |
| 17 | 1 |
| 18 | 2 |
| 19 | 3 |
| 20 | 4 |
| 21 | 5 |
| 22 | 6 |
| 23 | 7 |
| 24 | 8 |
| 25 | 9 |
| 26 | : |
| 27 | ; |
| 28 | < |
| 29 | = |
| 30 | > |
| 31 | ? |
| 32 | |
| 33 | A |
| 34 | B |
| 35 | C |
| 36 | D |
| 37 | E |
| 38 | F |
| 39 | G |
| 40 | H |
| 41 | I |
| 42 | J |
| 43 | K |
| 44 | L |
| 45 | M |
| 46 | N |
| 47 | O |
| 48 | P |
| 49 | Q |
| 50 | R |
| 51 | S |
| 52 | T |
| 53 | U |
| 54 | V |
| 55 | W |
| 56 | X |
| 57 | Y |
| 58 | Z |
| 59 | [ |
| 60 | ¥ |
| 61 | ] |
| 62 | ^ |
| 63 | ~ |
| 64 | — \ |
| 65 | a |
| 66 | b |

-continued

CONVERSION TABLE

| Successive Values | Character |
|---|---|
| 67 | c |
| 68 | d |
| 69 | e |
| 70 | f |
| 71 | g |
| 72 | h |
| 73 | i |
| 74 | j |
| 75 | k |
| 76 | l |
| 77 | m |
| 78 | n |
| 79 | o |
| 80 | p |
| 81 | q |
| 82 | r |
| 83 | s |
| 84 | t |
| 85 | u |
| 86 | v |
| 87 | w |
| 88 | x |
| 89 | y |
| 90 | z |
| 91 | { |
| 92 | \| |
| 93 | } |
| 94 | → |
| 95 | ← |
| 96 | [illegible] |
| 97 | [illegible] |
| 98 | [illegible] |
| 99 | [illegible] |

It should be further understood that display of the characters set forth above in the English language is controlled by the first letter of the input commands used for making alphanumeric or numeric pages as described above. Although not illustrated, corresponding Kanji characters of the Japanese language are transmitted by using the same two digit address and varying the first character of the commands described below from the letter "A" for English display as discussed above to the letter "C" for display of the corresponding Japanese character. Thus, with respect to the conversion table set forth above, a command as described below requesting alphanumeric display of an exclamation point in English would be encoded with the sequence "01" with the command beginning with the letter "A" and the display of the corresponding character in Kanji format would also be encoded by the combination of digits "01" with the command beginning with a "C". Every command which is to be executed in conjunction with a page in English begins with a "A" and every command which is to be executed in conjunction with a page in Japanese begins with a "C".

Pages which are to be transmitted to an external device through the paging receiver have the "page" field described above coded in the hybrid code at a 1200 baud rate. For the X.25 transmission of pages to an external data device each bit is encoded in 833 microseconds and each bit in all other transmission of pages which are coded in the two-tone encoding format described above is coded with 8.2 milliseconds.

XVI. Commands

The command repertoire of the present invention permits the functionality of the paging receiver to be changed dynamically by the network 10 in a manner not achieved by the prior art. All commands which are executed by the paging receiver are sent according to a command protocol. An example of the command protocol is set forth below with a nationwide telephone number page to paging receiver ID 789 12345 with telephone number 424, 6464 and a warble tone.

| | FF--5--B4 | BE | 321 | BE | 987 | A7 | 424 | DE | 6464 | AEA |
|---|---|---|---|---|---|---|---|---|---|---|
| NOTES | 1 1A | 2 | | 2 | | 3 | | 4 | | 5 |

FF—Provides 66 m.s. of silence prior to the page.

NOTE 1—Is the least significant digit of the paging receiver identification code which is sent first as the preamble. If the page is a group page, a C may be substituted for the 5.

NOTE 1A—When a "B" appears after the preamble digit, the person receiving the page will be alerted that a "batched" page is occurring to be sent to a group of paging receivers. Batched pages are outputted from the buffers 86.

NOTE 2—The BE's are received by the paging receiver and ignored and provide time spacing.

NOTE 3—A7. The A signifies that a command sequence follows. The 7 indicates the message is numeric, and illuminates a nationwide origin display in the paging receiver and telephone messages.

NOTE 4—DE's are sent during the data character portion of the transmission to allow overlay operation.

NOTE 5—AEA or AE indicates the end of transmission and the type of alert tone to use e.g. warble.

The command protocol also permits the repeating of digits, the placing of group calls and batches of pages to be sent from identification code buffers 86 as explained below.

The repeating of digits 799 12225 is as follows:

FF - - - 5 - - - 2 BE2E1 BE987

The command protocol will never allow the same two numbers to be successively sent. An E is substituted for the second number or letter. i.e.

| | |
|---|---|
| 12225 = | 12E25 |
| 44BB5 = | 4EBE5 |
| 38111 = | 381E1 |
| 11111 = | 1E1E1 |

Group calls to groups of paging receivers are explained as follows:

The "C" tone is substituted for a digit for group calls. Groups are 10,100,1000, etc. or all.

| i.e. | | |
|---|---|---|
| 789 12345 | (no group call) | |
| 789 1234C | (10 pagers) | (0-9) |
| 789 123C5 | (10 pagers) | (05,15,25 etc.) |
| 789 123CC | (100 pagers) | (00-99) |
| 789 CCCCC | (100,000 pagers) | |
| CCC CCCCC | (all pagers) | |

The transmission of batched pages occurs from the identification code buffers 86 within the example below the page being 789-12345. If a "B" tone immediately follows a preamble tone, all paging receivers with the 5 preamble in their identification code will remain on to search for their identification code. Batching of pages allows one preamble to be sent, and then multiple pages to follow within the same preamble group. The following pages will then be sent with the preamble digit 5 eliminated. Each paging receiver will remain on, searching for the AE or AEA end of page combination. If a page does not follow within 300 m.s., the paging receiver will return to sample mode. If a page follows with a new preamble digit of 1900 m.s. duration, the paging receiver will also return to sample mode.

FF - - - 5 - - - B4BE321BE987A7 (ETC.)

Three batched pages are as follows:

987-12345, 987-12345, 987-12125

FF--5--B4BE321BE789A7AE
FFB3BE421BE789A3AEA
FF2BE121BE789A4

Note that "B" is sent on following pages, and the "5" is eliminated on following pages (the 5 is not necessary on following pages as the first page sends 5B which alerts all "5" paging receivers that batching is occurring). The last page of the batch will not have a "B" sent to allow the paging receivers to digit mismatch and return to sample mode. It should be noted that each of the local switches has the capability of batching pages into a single page having a plurality of identification codes contained in each page.

The operating program of the main CPU 50 of the switch is programmed to generate commands which are transmitted with each page which are dictated by the operation of the system and the specified service options in field 68. As explained above with reference to FIG. 31, a command sequence follows the paging receiver identification code and destinations. The command sequence begins with an "A" character followed by a command character for English language pages and with a "C" character followed by a command character for Japanese language pages. Set forth below is a command table explaining the command structure. While the English language commands are the only commands discussed in the examples below, it should be understood that the Japanese language commands are identical in function and are illustrated in the table.

COMMAND TABLE

| English | Japanese | |
|---|---|---|
| A0 | C0 | BATTERY SAVE |
| A1 | C1 | REPEAT |
| A2 | C2 | PROGRAM ID |
| A3 | C3 | LOCAL & NUMERIC (16 NUMBERS) |
| A4 | C4 | LOCAL & MESSAGE - ALPHA (511 CHAR) |
| A5 | C5 | NATIONAL & NUMERIC (16 NUMBERS) |
| A6 | C6 | NATIONAL & MESSAGE-ALPHA (511 CHAR.) |
| A7 | C7 | ALPHA FIXED MEMORY LOCATION |
| A8 | C8 | RESERVED |
| A9 | C9 | EXT DATA (OPENS AUDIO TO EXIT JACK) |
| AA | CA | DO NOT USE! |
| AB | CB | OUT OF SERVICE |
| AC | CC | CHANNEL PROGRAM |
| AD | CD | COMPANY MESSAGE |
| AE | CE | DO NOT USE! |

The A1, A3–A7, A9 and AD commands are automatically generated by CPU 50 of local switch 12 as a function of the service options in field 68 of the subscriber files 54. In other words, the programming of field 68 automatically dictates the command structure to be used. Furthermore, the AC command is utilized by the system for programming the channel of the paging receivers as described above in sections XI, XII and XIII as well as any time the system is used to reprogram the channels to be received by the paging receiver. A number in parenthesis identifies a part identified within the drawings of the above-referenced patent applications filed on Oct. 21, 1987.

A0 AND C0 BATTERY SAVE

The battery save command is followed by a two digit decimal format indicating how many seconds the paging receiver should be turned off before beginning its channel sampling. It is followed by an AE message terminator with no tone alert necessary. The two digit number represents the number of 10 second increments the paging receiver should be turned off with a maximum of 990 seconds (16.5 minutes).

A022AE=220 second turned off period
A099AE=990 second turned off period.

A1 AND C1 REPEAT PAGE

The repeat command indicates that the page being sent is a repeat of the previous page. The previous message display will be used, and the numeric character or alphanumeric character page should match a previous page which has been stored in the random access memory (60) of the paging receiver during the execution of the A3–A6 commands which cause a page to be stored in the random access memory. If a page match is detected by the paging receiver, the page is discarded. If the first page was not received, the page should be stored in the random access memory (60) of the paging receiver and the wearer of the paging receiver alerted. The display (64) will show "RPT" indicating a repeat page and the first page was not found in memory, i.e., A1. A3 424DE6464AE REPEAT 424-6464 (local, numeric, which is the execution of command A3 described below)

A2 AND C2 PROGRAM ID

The program ID command is used to send a new paging receiver identification code 66 to the paging receiver. The previous paging receiver identification code will be overwritten by this command. No tone alert is necessary, but the paging receiver should display the new paging receiver identification code as a page, i.e.,

CHANGE 789 12345 TO ID 789 45678
A2789DE4567DE8AE (NEW ID)

A3 AND C3 LOCAL AND NUMERIC (16 DIGITS)

The A3 command sequentially illuminates the display (64) of the paging receiver described in the above-referenced patent applications filed on Oct. 21, 1987, indicating the page is of local origin, and a numeric character display (telephone number) as a page. This command is used to transmit pages originating within the jurisdiction of the local switch 12 which controls the transmitter 15 broadcasting the page. The numeric characters are sent as sequential tones. The paging receiver will receive and decode individual characters the page as single digits, i.e.

A3956DE1030AE TEL #956-1030

The maximum numeric message length is 16 digits.

A4 AND C4 LOCAL AND ALPHANUMERIC (511 CHARACTERS)

The A4 command sequentially illuminates the display (64) of the paging receiver of the above-referenced patent applications filed on Oct. 21, 1987 indicating the page is of local original and an alphanumeric display as a page. The alphanumeric format is sent with each character being encoded as a two digit number as explained above. The paging receiver will receive and decode individual characters of the page as sequential tones. The message length will be 51 characters or less. This command is used to transmit pages originating within the jurisdiction of the local switch 12 which controls the transmitter 15 broadcasting the page. The display (64) will flash, indicating the message is 511 characters long, i.e., IBM STOCK 5124 3/4
(18 CHARACTER MESSAGE)
A4 41 34 DE 45 32 DE 51 52 DE 47 35 DE 43 32 DE 04 17 DE 18 20 DE 32 19 DE 15 20 AE (56 CHARACTER 1.848 SEC.)

A5 AND C5 NATIONAL AND NUMERIC (16 DIGITS)

The A5 command sequentially illuminates the display (64) of the paging receiver described in the above-referenced patent applications filed on Oct. 21, 1987 indicating that the origin of the page is not within the jurisdiction of the local switch 12 controlling the transmitter 15 broadcasting the page and a numeric character message as a page. This command is used by a local switch 12 for relaying a page through the network 10 to a transmitter 15 located at a remote area (an area other than where the subscriber file is located) where a paging receiver is to receive a page transmitted by the transmitter located at the remote area such as between local switch #1 of lata switch #1 to local switch #1 of local switch #m of FIG. 1. The numeric characters are sent as sequential tones. The paging receiver will receive and decode characters of the page in a single digit format, e.g.,

TEL # 956 1001
A6956DE10E1AE (NOTE: REPEAT DIGIT FOR SECOND ZERO)

A6 AND C6 NATIONAL & MESSAGE (511 CHAR.)

The A6 command sequentially illuminates the display (64) of the paging receiver described in the above-reference patent applications filed on Oct. 21, 1987 indicating that the origin of the page is not within the jurisdiction of the local switch 12 controlling the transmitter 15 broadcasting the page and an alphanumeric message as a page. This command is used by a local switch 12, for relaying a page through the network 10 to a transmitter 15 located at a remote area (an area other than where the subscriber file is located) where a paging receiver is to receive a page transmitted by the transmitter 15 located at the remote area such as between local switch #1 of lata switch #1 to local switch #1 of local switch #m of FIG. 1.

The maximum message length is 51 characters. The example is identical to the A4 command discussed above with the first two characters being A6.

A7 AND C7 ALPHANUMERIC SPECIFIC MESSAGE MEMORY

The A7 command permits a subset of commands to follow. The digit immediately following the A7 command will indicate in which section of addressable sections of the random access memory (60) of the paging receiver described in the above-referenced patent applications filed on Oct. 21, 1987 the page is to be stored. If a page exists in this memory location of the random access memory, it will automatically overwrite the page stored therein. The command subset will be 1-4 indicating memory locations (11-14) of the random access memory (60). An ordinary page will not overwrite the (11-14) page locations. The page will immediately follow:

| |
|---|
| A7 1 (page location 11) |
| A7 2 (page location 12) |
| A7 3 (page location 13) |
| A7 4 (page location 14) |

The page locations (11-14) will only be overwritten by pages with the same command (e.g. memory location 11 will only be overwritten by the A7 (1) command) or erased by the user. The page type will always be "Special Call" and will be sent as an alphanumeric page.

A8 AND C8 RESERVED

A9 and C9 External Data Message

The A9 command alerts the person being paged that the audio must be routed to the external data jack (67) of the paging receiver described in the above-referenced patent applications filed on Oct. 21, 1987 for remote processing. The paging receiver will forward the audio to the external data jack (67) until the AE message is received, indicating end of data transmission, i.e. A9 - - - DATA - - - AE.

The A9 command plays an important part of the present invention's functionality in offering diverse data services by permitting the connection of peripheral devices to the paging receiver. Thus, diverse data services such as but not limited to telex and facsimile may be offered with the paging receiver acting as the receiver which forwards received data to a peripheral device.

AA AND CC INVALID

The AA command cannot be used, as it would be processed by the main CPU (24) and an AE (end of file) command.

AB AND CB OUT OF SERVICE

The AB command will illuminate an out of service display on the display (64) of the paging receiver described in the above-referenced patent applications filed on Oct. 20, 1987 and may or may not have numeric data following. This command may be used when system maintenance is required, or to alert the wearer of the paging service that service is being denied, until the bill is paid, i.e. ABAE (illuminates out of service message upon turn on and for two seconds).

The paging receiver still receives messages as normal. An out of range display turns on. The display (64) displays "out of service" until the next page is allowed. The network 10 will prevent any messages from being sent to the pager.

AC CHANNEL PROGRAMMING

The AC channel programming command is one of the most important commands in the system in providing paging services. The AC channel programming command alerts the person wearing the paging receiver that channel programming information is forthcoming. The channel programming command is not transmitted with characters comprising a page to be displayed or outputted by a paging receiver and only includes information for changing at least one channel of a paging receiver to which the channel programming command is addressed. The channels are stored in the channel memory (62) of the paging receiver, described in the above-referenced patent applications filed on Oct. 20, 1987 which are transmitted as four digit decimals numbers, each separated by the DE delimiter. As explained in the patent applications filed on Oct. 20, 1987, up to 15 channels may be loaded into the area channel section or the operation channel section. A preceding V indicates VHF, a U UHF, a J indicates Japan and an E indicates Europe.

When only one channel is desired, such as for local paging, the channel is repeated at least twice, to alert the paging receiver that only one channel is desired to be programmed in the area channel section of the channel memory (62). All previous channels in the area channel section (66) of the channel memory 62 are erased. The memory cells have the new channel number entered to fix the paging receiver to receive a single channel. The memory cells will remain programmed until the next channel reprogramming of the paging receiver, i.e.

AC0123DE0123AE (CH.V 123 NO SCANNING)
AC0E10DE0107DE0210DE1050DE7AEA (CH.v10,v107,u210,u50).

The channel programming sequence is as follows:

| | |
|---|---|
| 0001 - 0DDD | VHF 5 KHz steps |
| 1001 - 1DDD | VHF 6.25 KHz steps (Europe) |
| 2001 - 2DDD | UHF 5 KHz steps |
| 3001 - 3B2B | 280 MHz 2.5 KHz steps (Japan). |

Channel codes 4001, 5001, 6001, 7001, 8001, 9001 are open for additional channels to be added. The total upward reserve channel capacity in ROM 58 is 16,458 channels.

The following sub-commands are utilized for instructing the main CPU to perform functions pertaining to the programming of channels.

NO COMMAND (ADD ONE CHANNEL)

When no sub-command is sent, one channel is to be added to the area channel section (66), e.g. AC 0237 DE 7AEA (add VHF channel 237 to area channel section).

SUB-COMMAND 4000 (TYPICALLY REGIONAL)

When 4000 is transmitted, it erased the entire area channel section (66) and the operation channel section (64) of the channel memory (62) and cannot be used in adjacent areas which must be programmed with the 6000 sub-command. e.g. AC 4000 DE 0156 DE 2132 DE 7AEA. This command erases and stores VHF 156 and UHF 132 channels in the area channel section (66).

SUB-COMMAND 5000

When 5000 is transmitted, the destination code may be programmed. This command erases the operating channel section (64) and the area channel section (66) and forces the reception of a particular channel. The command is used for dynamic frequency agility. The paging receiver is fixed to receive a fixed channel. e.g. AC 5000 DE 0171 DE 7AEA. This command erases the operating channel section (64) and the area channel section (66) and forces the paging receiver to VHF channel 171, causing the operating channel section to store VHF channel 171.

SUB-COMMAND 6000 (NATIONAL)

This command is divided into the loading of the 15 possible destination codes (96) and the channels.

ACB6122 DE0200 DE0000 DE0000 DE0000 DE0212 DE0311 DE0408 DE2511 DE2139 DE7AEA

This represents the 6000 national command followed by the destination code (96) or local code for each of the 15 possible channels in the area channel section. The five channels follow and will be as follows:

| | |
|---|---|
| 6122 | National, channel 1 = A, channel 2 = B, channel 3 = B |
| 0200 | Channel 4 = local, channel 5 = B, filler code |
| 0000 | Channel 8 = 11, filler code |
| 0000 | Channel 12-15, filler code |
| 0212 | VHF channel 212 |
| 0311 | VHF channel 311 |
| 0408 | VHF channel 408 |
| 2511 | UHF channel 511 |
| 2139 | UHF channel 139 |
| 7AEA | Stop channel command. |

CHANNEL PROGRAMMING TERMINATION (7AEA)

The channels to be sent to the paging receiver are sent in the following order:

| |
|---|
| 0XXX channels (VHF) (ascending numerical order) |
| 1XXX channels (VHF Europe) |
| 2XXX channels (UHF Europe) |
| 3XXX channels (280 MHz). |

The last channel sent is actually a terminate message code. It is 7AEA (7AAA).

The paging receiver will receive the last frequency code and immediately terminates the page. The 7AEA terminate frequency code is necessary at the end of every AC channel program message. During the transmission of channel codes, the AEA code may appear (e.g. channel 1AEA). In order to prevent termination of the message, the AC command changes the AEA termination command to 7AEA. 7AEA is an invalid channel code.

AD AND CD COMPANY COMMAND

The AD command allows a 32 alphanumeric character company message to be sent to the paging receiver. The message is always alphanumeric, e.g., AD 4247, DE 4637, DE 5100, DE 4833, DE 3941, DE 4639, AE Jones Paging.

When a company message is desired, it will be sent after the paging receiver identification code has been programmed. When the paging receiver is turned on, the company message will be displayed instead of a self test message which is typically used. If no company message resides in the paging receiver, the self test message will display.

The 32 character part of the random access memory (60) is battery protected to permit the message to permanently reside in the paging receiver. It may be changed by simply sending a new AD command and message to the pager. This permits the company message to be changed at will.

AE AND CE—INVALID

The AE command cannot be used, as it cannot be encoded and also conflicts with the end of file command.

END OF PAGE COMMAND AE AND CE OR AEA AND CEA

All pages require the end of page command. The end of page command serves a two fold purpose indicating the end of transmission and determines the type of tone alert.

| | |
|---|---|
| AE = | 2041 hertz - 50% duty cycle - 2 seconds |
| AEA = | 2041 hertz - 25/75% duty cycle - 2 seconds |

Certain commands do not send a tone alert. A listing of the commands is as follows:

| | | |
|---|---|---|
| A0 | BATTERY SAVE | (NO ALERT) |
| A1 | REPEAT | (NO ALERT)* |
| A2 | PROGRAM ID | (ALERT) - DISPLAY ID |
| A3 | LOCAL & TEL NUMERIC | (ALERT) |
| A4 | LOCAL & ALPHA | (ALERT) |
| A5 | NAT. & TEL NUMERIC | (ALERT) |
| A6 | NAT. & ALPHA | (ALERT) |
| A7 | ALPHA FIXED MEMORY | (ALERT) |
| A8 | UNASSIGNED | (ALERT) |
| A9 | SPECIAL & DATA AUDIO | (ALERT) |
| AB | OUT OF SERVICE | (ALERT) |
| AC | CHANNEL PROGRAM | (ALERT) |
| AD | COMPANY MESSAGE | (ALERT). |

*A1 will alert if first page was not received or if previously erased.

While the invention has been described in terms of its preferred embodiments, it should be understood that numerous modifications may be made thereto without departing from the spirit and scope of the invention as defined in the appended claims. The network 10 is not limited to the commands, code used for coding characters of the pages and transmission protocol described above with reference to the preferred embodiment. Furthermore, while in the preferred embodiment, the code used for coding characters of pages transmitted between switches is different than the code used by the RAM 48 and CPU 50, it should be understood that the invention may be practiced without using any code conversion including the code conversion performed by the data input 30, data module processor 32 and data output 34. While the preferred form of the switches utilizes a PC and hardware assist to perform necessary processing operations, it should be understood that this configuration of processing is not required with other processing configurations utilizing hardware and/or software to perform the disclosed functions of the switches being within the scope of the invention. While the preferred form of transmitting pages between the switches utilizes grouping of the pages to be transmitted between switches into one or more packets which each have a switch as area destination, it should be understood that the invention is not limited to utilizing of packets. While the preferred form of the invention utilizes the memory maps of FIGS. 3, 5 and 7, it should be understood that other storage configurations of memory may be used in accordance with known memory storage techniques including those which do not specifically allocate individual storage areas for storing a single type of data such as the preferred memory maps. While in the preferred form of the invention, the pages are transmitted as packets with a transmission protocol, it should be understood that the pages may be sent individually or in groups, without a transmission protocol, to a single receiving switch and processed by the receiving switch in accordance with the area destination of the individual pages and transmitted to an output for further transmission without formatting into packets. It should be understood that the cost of transmitting pages in the network is substantially lowered by the function of the switch in originating a page and the switches located in the network before a final area destination switch of a page in formulating groups of pages for transmission to a single switch area destination for transmission between switches. Finally, it should be understood that the terminology "identification code" and "identification number" and "code" each describe the combination of one or more characters including letters or numbers with the terms being used interchangeably throughout the specification to identify information processed by the switches.

```
COPYRIGHT TELEFIND INC.  1987
ESA TELECOMMUNICATIONS
10347 SOUTH OXFORD
CHICAGO RIDGE,ILLINOIS
60415
SOFTWARE:DIG3.0 DIGITAL PAGING
PROGRAMMER: ROBERT A.KINAST
DATE:DECEMBER 16,1987

       0  1  2  3  4  5  6  7  8  9  A  B  C  D  E  F
C000   D1 32 55 AB CA 50 88 AB 55 6B 45 26 2A 36 5B AC   .2U..P..U.E6*5[.
C010   A6 58 5A DA 46 D3 16 2D 14 6A 57 60 D5 56 84 8A   .XZ.H..-.jW`.V..
C020   52 88 F2 26 83 E6 5A D8 2E 2E E0 4D 2B 60 7D 35   R..&..Z....-.)5
C030   68 E5 38 08 AE 49 6C C3 26 34 9C 2B ED 08 5A 30   h.8..Il.&4.-..Z0
C040   8A 35 83 93 56 64 2E 27 39 4C 56 4C E8 35 07 65   .5..Vd.'9LVL.5.e
C050   56 38 8A 5B 6F 16 24 90 9C 57 77 21 2C D0 F4 58   V8.[o.$..Ww!,..X
C060   08 75 4B 30 67 5A 98 71 56 37 3C 25 3B 1D 22 72   .uK0gZ.qV7<%;."r
C070   83 4E 8D 8D 4B C3 CC 2E 27 E6 26 87 1D 2B 50 8C   .N..K...'.&..+P.
C080   25 0C 6A 22 E4 14 21 20 8A 2E 10 46 51 43 83 24   %.j"..! ....QC.$
C090   A0 C8 24 A0 B0 28 EE 37 40 5C E6 C7 7E 9C 60 87   ..$..(.7@\..~.`.
C0A0   82 3F 8F A0 07 F3 9C 03 9D 07 0F ED F9 20 15 96   .?........... ..
C0B0   3F 1F 19 71 C9 32 20 03 4A 16 A9 CF DC CF 54 D0   ?..q.2 .J.....T.
C0C0   B5 D0 E2 D0 0F D1 3C D1 7B D1 A8 D1 F2 D1 1F D2   ......<.{.......
C0D0   69 D2 F6 D2 E0 D2 0D D3 2A D0 51 D4 76 D4 DA D4   i.......*.Q.v...
C0E0   DA D4 1F D5 40 D5 E5 D5 66 D6 AB D6 2C D7 71 D7   ....@...f...,.q.
C0F0   F2 D7 37 D8 B8 D8 FD D8 7E D9 C3 D9 44 DA 89 DA   ..7.....~...D...
       0  1  2  3  4  5  6  7  8  9  A  B  C  D  E  F
C100-  0A D8 4F D8 FE CF 68 CA 18 58 AD 01 A0 29 01 D0   ..O...h..X...)..
C110   03 4C 08 C1 AD 01 80 C9 0F F0 07 C9 FF F0 06 4C   .L.............L
C120   28 C1 4C 77 C1 4C 6D C1 C9 00 F0 03 C9 01 F0 0A   (.Lw.Lm.........
C130   C9 02 F0 09 4C B6 C3 4C 40 C1 4C 50 C1 4C 60 C1   ....L..L@.LP.L`.
C140   A9 01 8D 00 60 A9 00 8D 03 40 8D 06 60 4C B6 C3   ....`....@..`L..
C150   A9 00 8D 00 60 8D 06 60 A9 01 8D 03 40 4C B6 C3   ....`..`....@L..
C160   A5 FC 8D 00 80 A9 01 8D 04 80 4C B6 C3 A9 00 8D   ..........L.....
C170   03 80 85 FD 4C B6 C3 A9 00 75 FF A2 00 AD 01 80   ....L....u......
C180   95 00 E6 FF E8 AD 01 A0 29 01 D0 F1 A5 00 C9 04   ........).......
C190   F0 12 C9 05 F0 0E C9 06 F0 07 C9 07 F0 03 4C B6   ..............L.
C1A0   C3 4C 4E C2 AD E0 06 F0 12 AD E1 06 F0 10 AD E2   .LN.............
C1B0   06 F0 0E AD E3 06 F0 0C 4C A4 C1 4C C7 C1 4C E9   ........L..L..L.
C1C0   C1 4C 0B C2 4C 2D C2 A2 00 B5 00 9D 00 06 E8 E4   .L..L-..........
C1D0   FF D0 F6 A5 FF 8D 1B 06 A9 01 8D E0 06 85 50 58   ..............PX
C1E0   A9 00 85 51 85 52 4C 08 C1 A2 00 B5 00 9D 30 06   ...Q.RL.......0.
C1F0   E8 E4 FF D0 F6 A5 FF 8D 4B 06 A9 01 8D E1 06 85   ........K.......
       0  1  2  3  4  5  6  7  8  9  A  B  C  D  E  F
C200   50 58 A9 00 85 51 85 52 4C 08 C1 A2 00 B5 00 9D   PX...Q.RL.......
C210   60 06 E8 E4 FF D0 F6 A5 FF 8D 7B 06 A9 01 8D E2   `.........{.....
C220   06 85 50 58 A9 00 85 51 85 52 4C 08 C1 A2 00 B5   ..PX...Q.RL.....
C230   00 9D 90 06 E8 E4 FF D0 F6 A5 FF 8D AB 06 A9 01   ................
C240   8D E3 06 85 50 58 A9 01 8D 04 80 4C 4E C2 AD 00   ....PX.....LN...
C250   0B 29 01 D0 03 4C A1 C2 AD 01 0B 29 01 D0 03 4C   .)...L.....)...L
C260   C3 C2 AD 02 0B 29 01 D0 03 4C E5 C2 AD 03 0B 29   .....)...L.....)
C270   01 D0 03 4C 07 C3 AD 04 0B 29 01 D0 03 4C 29 C3   ...L.....)...L).
C280   AD 05 0B 29 01 D0 03 4C 4B C3 AD 06 0B 29 01 D0   ...)...LK....)..
C290   03 4C 6D C3 AD 07 0B 29 01 D0 03 4C 8F C3 4C 4E   .Lm....)...L..LN
C2A0   C2 A2 00 B5 00 9D 00 0A E8 E4 FF D0 F6 A5 FF 8D   ................
C2B0   1B 0A A9 01 8D 00 0B 85 50 A9 00 85 51 85 52 58   ........P...Q.RX
C2C0   4C 08 C1 A2 00 B5 00 9D 20 0A E8 E4 FF D0 F6 A5   L....... .......
C2D0   FF 8D 3B 0A A9 01 8D 01 0B 85 50 A9 00 85 51 85   ..;.......P...Q.
C2E0   52 58 4C 08 C1 A2 00 B5 00 9D 40 0A E8 E4 FF D0   RXL.......@.....
C2F0   F6 A5 FF 8D 5B 0A A9 01 8D 02 0B 85 50 A9 00 85   ....[.......P...
       0  1  2  3  4  5  6  7  8  9  A  B  C  D  E  F
C300   51 85 52 58 4C 08 C1 A2 00 B5 00 9D 60 0A E8 E4   Q.RXL.......`...
C310   FF D0 F6 A5 FF 8D 7B 0A A9 01 8D 03 0B 85 50 A9   ......{.......P.
C320   00 85 51 85 52 58 4C 08 C1 A2 00 B5 00 9D 80 0A   ..Q.RXL.........
C330   E8 E4 FF D0 F6 A5 FF 8D 9B 0A A9 01 8D 04 0B 85   ................
C340   50 A9 00 85 51 85 52 58 4C 08 C1 A2 00 B5 00 9D   P...Q.RXL.......
C350   A0 0A E8 E4 FF D0 F6 A5 FF 8D BB 0A A9 01 8D 05   ................
```

```
C360  0B 85 50 A9 00 85 51 85 52 58 4C 08 C1 A2 00 B5   ..P...Q.RXL.....
C370  00 9D C0 0A E8 E4 FF D0 F6 A5 FF 8D DB 0A A9 01   ................
C380  8D 06 0B 85 50 A9 00 85 51 85 52 58 4C 08 C1 A2   ....P...Q.RXL...
C390  00 B5 00 9D E0 0A E8 E4 FF D0 F6 A5 FF 8D FB 0A   ................
C3A0  A9 01 8D 07 0B 85 50 A9 00 85 51 85 52 58 A9 01   ......P...Q.RX..
C3B0  8D 04 80 4C 53 C3 AD 01 A0 29 01 D0 03 4C 08 C1   ...LS....)...L..
C3C0  AD 01 60 4C B6 C3 AD E0 06 C9 00 F0 03 4C D4 C3   ..`L.........L..
C3D0  78 4C 39 CA 18 78 A2 00 BD 00 06 9D 00 07 E8 EC   xL9..x..........
C3E0  15 06 D0 F4 8E 19 07 20 6C C4 20 19 CA AD E1 06   ....... l. .....
C3F0  C9 00 F0 03 4C FA C3 4C 59 C4 18 A2 00 BD 30 06   ....L..LY.....0.
      0  1  2  3  4  5  6  7  8  9  A  B  C  D  E  F
C400  9D 00 07 E8 EC 48 06 D0 F4 8E 19 07 20 6C C4 20   .....H...... l.
C410  19 CA AD E1 06 C9 00 F0 03 4C 1F C4 4C 59 C4 18   .........L..LY..
C420  A2 00 BD 60 06 9D 00 07 E8 EC 78 06 D0 F4 8E 19   ...`......x.....
C430  07 20 6C C4 20 19 CA AD E3 06 C9 00 F0 03 4C 44   . l. .........LD
C440  C4 4C 59 C4 18 A2 00 BD 90 06 9D 00 07 E8 EC AB   .LY.............
C450  06 D0 F4 8E 19 07 20 6C C4 A9 01 8D 04 80 AD D8   ...... l........
C460  C0 85 55 AD D9 C0 85 56 58 4C 69 C4 A2 03 BD 00   ..U....VXLi.....
C470  07 8D 1A 07 E8 BD 00 07 8D 1B 07 18 F8 AD 1A 07   ................
C480  2A 2A 2A 2A 29 F0 8D 1A 07 0D 1B 07 8D 1C 07 C9   ****)...........
C490  24 F0 05 30 03 4C A4 C4 A9 01 8D 1C 07 D8 20 C5   $..0.L........ .
C4A0  C4 4C D3 C4 C9 49 F0 05 30 03 4C B2 C4 A9 02 4C   .L...I..0.L....L
C4B0  9A C4 C9 74 F0 05 30 03 4C C0 C4 A9 03 4C 9A C4   ...t..0.L....L..
C4C0  A9 04 4C 9A C4 AE 1D 07 AD 1C 07 9D 1E 07 E8 8E   ..L.............
C4D0  1D 07 60 20 CC CA A2 00 BD 00 07 9D 92 07 E8 E0   ..` ............
C4E0  06 D0 F5 20 51 C8 AD 28 07 8D 69 07 AD 29 07 8D   ... Q..(..i..)..
C4F0  6A 07 AD 2A 07 8D 6B 07 A2 00 18 AD 28 07 6A 8D   j..*..k.....(.j.
      0  1  2  3  4  5  6  7  8  9  A  B  C  D  E  F
C500  28 07 8D 35 07 69 00 9D 35 07 E8 E0 08 D0 EB 18   (..5.i..5.......
C510  AD 29 07 6A 8D 29 07 BD 35 07 69 00 9D 35 07 E8   .).j.)..5.i..5..
C520  E0 10 D0 EB 18 AD 2A 07 6A 8D 2A 07 BD 35 07 69   ......*.j.*..5.i
C530  00 9D 35 07 E8 E0 16 D0 EB 20 43 C9 20 40 C5 60   ..5...... C. @.`
C540  AD 1C 07 C9 01 F0 0B C9 02 F0 22 C9 03 F0 39 4C   .........."...9L
C550  A3 C5 A9 00 85 53 A9 08 85 54 A9 01 8D 8E 07 AE   .....S...T......
C560  4A 07 20 BE C5 98 8D 4A 07 20 0D C6 60 A9 51 85   J. ....J. ..`.Q.
C570  53 A9 08 85 54 A9 01 8D 8F 07 AE 4B 07 20 BE C5   S...T......K. ..
C580  98 8D 4B 07 20 0D C6 60 A9 00 85 53 A9 09 85 54   ..K. ..`...S...T
C590  A9 01 8D 90 07 AE 4C 07 20 BE C5 98 8D 4C 07 20   ......L. ....L.
C5A0  0D C6 60 A9 51 85 53 A9 09 85 54 A9 01 8D 91 07   ..`.Q.S...T.....
C5B0  AE 4D 07 20 BE C5 98 8D 4D 07 20 0D C6 60 8A A8   .M. ....M. ..`..
C5C0  A2 1E A9 00 8D 4E 07 8D 4F 07 18 BD 2B 07 6D 50   .....N..O...+.mP
C5D0  07 8D 30 07 BD 2B 07 6A 2E 4E 07 EE 4F 07 AD 4F   ..0..+.j.N..O..O
C5E0  07 C9 08 B0 06 CA 30 16 4C CB C5 AD 4E 07 91 53   ......0.L...N..S
C5F0  C8 CA A9 00 8D 4E 07 8D 4F 07 18 4C CB C5 18 AD   .....N..O..L....
      0  1  2  3  4  5  6  7  8  9  A  B  C  D  E  F
C600  30 07 6A 2E 4E 07 AD 4E 07 91 53 C8 60 38 AD 19   0.j.N..N..S.`8..
C610  07 E9 06 8D 19 07 C9 00 F0 21 A2 00 18 BD 06 07   .........!......
C620  2A 2A 2A 2A 9D 06 07 E8 EC 19 07 D0 EF AD 19 07   ****............
C630  C9 07 F0 0B C9 0A F0 04 4C A1 C6 60 4C 67 C6 A2   ........L..`Lg..
C640  00 A0 00 BD 06 07 99 8B 07 E8 C8 E0 03 D0 F4 A9   ................
C650  B0 99 8B 07 C8 BD 06 07 99 8B 07 E8 C8 E0 07 D0   ................
C660  F4 8C 67 07 4C BF C6 A2 00 A0 00 BD 06 07 99 8B   ..g.L...........
C670  07 C8 E8 E0 03 D0 F4 A9 C0 99 8B 07 C8 BD 06 07   ................
C680  99 8B 07 C8 E8 E0 07 D0 F4 A9 B0 99 8B 07 C8 BD   ................
C690  06 07 99 8B 07 C8 E8 E0 0A D0 F4 8C 67 07 4C BF   ............g.L.
C6A0  C6 A2 00 BD 06 07 9D 8B 07 E8 EC 19 07 D0 F4 8E   ................
C6B0  67 07 A9 C0 8D 68 07 A9 05 8D 6C 07 4C BF C6 A2   g....h....l.L...
C6C0  00 AD 67 07 C9 05 F0 3F B0 1D AE 67 07 A9 C0 9D   ..g....?...g....
C6D0  8B 07 E8 E0 05 D0 F8 8E 67 07 A9 00 8D 68 07 A9   ........g....h..
C6E0  05 8D 6C 07 4C 2A C7 C9 0A F0 1C B0 1D AE 67 07   ..l.L*........g.
C6F0  A9 C0 9D 8B 07 E8 E0 0A D0 F8 8E 67 07 A9 00 8D   ...........g....
      0  1  2  3  4  5  6  7  8  9  A  B  C  D  E  F
C700  68 07 A9 05 8D 6C 07 4C 2A C7 C9 0F F0 F9 B0 F7   h....l.L*.......
C710  AE 67 07 A9 C0 9D 8B 07 E8 E0 0F D0 F8 8E 67 07   .g............g.
C720  A9 00 8D 6E 07 A9 05 8D 6C 07 20 0C CA AE 68 07   ...n....l. ...h.
C730  A0 00 8C 4F 07 18 BD 8B 07 2A 9D 8B 07 B9 35 07   ...O.....*....5.
C740  69 00 99 35 07 99 6D 07 C8 EE 4F 07 AD 4F 07 C9   i..5..m...O..O..
```

```
C750   04 BC 03 4C 35 C7 A9 00 8D 4F 07 E8 EE 68 07 EC   ...L5....C...n..
C760   6C 07 F0 03 4C 35 C7 18 AD 6C 07 69 05 8D 6C 07   l...L5...l.i..l.
C770   18 A9 01 99 35 07 99 6D 07 20 43 C9 A0 00 B9 6D   ....5..m. C....m
C780   07 99 35 07 C8 C0 16 D0 F5 20 AC C7 20 0C CA 38   ..5...... .. ..8
C790   AD 67 07 E9 05 8D 67 07 C9 00 F0 03 4C 2A C7 60   .g....g.....L*.`
C7A0   AD 1C 07 C9 01 F0 0B C9 02 F0 21 C9 03 F0 37 4C   ..........!...7L
C7B0   00 C8 A9 00 85 53 A9 08 85 54 A9 01 8D 8E 07 AE   .....S...T......
C7C0   4A 07 20 BE C5 98 8D 4A 07 4C 17 C8 A9 51 85 53   J. ....J.L...Q.S
C7D0   A9 0E 85 54 A9 01 8D 8F 07 AE 4E 07 20 BE C5 98   ...T......N. ...
C7E0   8D 4E 07 4C 17 C8 A9 00 85 53 A9 09 85 54 A9 01   .K.L.....S...T..
C7F0   8D 90 07 AE 4C 07 20 BE C5 98 8D 4C 07 4C 17 C8   ....L. ....L.L..
       0  1  2  3  4  5  6  7  8  9  A  B  C  D  E  F
C800   A9 51 85 53 A9 09 85 54 A9 01 8D 91 07 AE 4D 07   .Q.S...T......M.
C810   20 BE C5 98 8D 4D 07 60 18 D8 A9 00 8D 2A 07 8D    ....M.`.....*..
C820   29 07 8D 28 07 AD 98 07 C9 00 F0 03 4C 32 C8 4C   )..(........L2.L
C830   5E C8 18 AD 28 07 69 40 8D 28 07 AD 29 07 69 42   ^...(.i@.(..).iB
C840   8D 29 07 AD 2A 07 69 0F 8D 2A 07 CE 98 07 4C 25   .)..*.i..*....L%
C850   C8 18 D8 A9 00 8D 2A 07 8D 29 07 8D 28 07 AD 92   ......*..)..(...
C860   07 C9 00 F0 1F 18 AD 28 07 69 A0 8D 28 07 AD 29   .......(.i..(..)
C870   07 69 86 8D 29 07 AD 2A 07 69 01 8D 2A 07 CE 92   .i..)..*.i..*...
C880   07 4C 5E C8 AD 93 07 C9 00 F0 1F 18 AD 28 07 69   .L^..........(.i
C890   10 8D 28 07 AD 29 07 69 27 8D 29 07 AD 2A 07 69   ..(..).i'.)..*.i
C8A0   00 8D 2A 07 CE 93 07 4C 84 C8 AD 94 07 C9 00 F0   ..*....L........
C8B0   1F 18 AD 28 07 69 E8 8D 28 07 AD 29 07 69 03 8D   ...(.i..(..).i..
C8C0   29 07 AD 2A 07 69 00 8D 2A 07 CE 94 07 4C AA C8   )..*.i..*....L..
C8D0   AD 95 07 C9 00 F0 1F 18 AD 28 07 69 64 8D 28 07   .........(.id.(.
C8E0   AD 29 07 69 00 8D 29 07 AD 2A 07 69 00 8D 2A 07   .).i..)..*.i..*.
C8F0   CE 95 07 4C D0 C8 AD 96 07 C9 00 F0 1F 18 AD 28   ...L...........(
       0  1  2  3  4  5  6  7  8  9  A  B  C  D  E  F
C900   07 69 0A 8D 28 07 AD 29 07 69 00 8D 29 07 AD 2A   .i..(..).i..)..*
C910   07 69 00 8D 2A 07 CE 96 07 4C F6 C8 AD 97 07 C9   .i..*....L......
C920   00 F0 1F 18 AD 28 07 69 01 8D 28 07 AD 29 07 69   .....(.i..(..).i
C930   00 8D 29 07 AD 2A 07 69 00 8D 2A 07 CE 97 07 4C   ..)..*.i..*....L
C940   1C C9 60 A2 1E BD 2B 07 C9 00 D0 04 CA 4C 45 C9   ..`...+......LE.
C950   BD 2B 07 49 01 9D 2B 07 CA BD 2B 07 49 01 9D 2B   .+.I..+...+.I..+
C960   07 CA BD 2B 07 49 01 9D 2B 07 CA BD 2B 07 49 00   ...+.I..+...+.I.
C970   9D 2B 07 CA BD 2B 07 49 01 9D 2B 07 CA BD 2B 07   .+...+.I..+...+.
C980   49 01 9D 2B 07 CA BD 2B 07 49 00 9D 2B 07 CA BD   I..+...+.I..+...
C990   2B 07 49 01 9D 2B 07 CA BD 2B 07 49 00 9D 2B 07   +.I..+...+.I..+.
C9A0   CA BD 2B 07 49 00 9D 2B 07 CA BD 2B 07 49 01 9D   ..+.I..+...+.I..
C9B0   2B 07 20 8B C9 4C 43 C9 A2 1E BD 2B 07 C9 00 F0   +. ..LC....+....
C9C0   01 60 E0 0A F0 04 CA 4C BA C9 A2 00 18 AD 69 07   .`.....L......i.
C9D0   6A 8D 69 07 BD 35 07 69 00 9D 35 07 E8 E0 08 D0   j.i..5.i..5.....
C9E0   EB 18 AD 6A 07 6A 8D 6A 07 BD 35 07 69 00 9D 35   ...j.j.j..5.i..5
C9F0   07 E8 E0 10 D0 EB 18 AD 6B 07 6A 8D 6B 07 BD 35   ........k.j.k..5
       0  1  2  3  4  5  6  7  8  9  A  B  C  D  E  F
CA00   07 69 00 9D 35 07 E8 E0 16 68 68 60 A2 00 A9 00   .i..5....hh`....
CA10   9D 2B 07 E8 E0 20 D0 F8 60 A2 0C A9 00 9D 00 07   .+... ..`.......
CA20   E8 E0 1D D0 F8 A2 22 9D 00 07 E8 E0 4A D0 F8 8D   ......"....J....
CA30   50 07 8D 67 07 8D 68 07 60 AD 00 0B C9 00 F0 03   P..g..h.`.......
CA40   4C EC CA 58 A9 00 8D 03 80 8D C6 60 8D 00 40 8D   L..X.......`..@.
CA50   02 40 A9 01 8D 00 60 AD 06 C1 85 55 AD 07 C1 85   .@....`....U....
CA60   56 A9 00 85 52 4C A2 CF 18 A5 52 69 01 85 52 C9   V...RL....Ri..R.
CA70   C8 B0 03 4C A2 CF A2 FF 9A A9 01 8D 01 60 AD BA   ...L.........`..
CA80   C0 85 55 AD BB C0 85 56 58 4C 08 C1 18 78 A2 00   ..U....VXL...x..
CA90   BD 00 0A 9D 00 07 E8 EC 1B 0A D0 F4 8E 19 07 20   ...............
CAA0   99 CB AD 01 0B C9 00 F0 03 4C AF CA 4C 90 CB 18   .........L..L...
CAB0   A2 00 BD 20 0A 9D 00 07 E8 EC 3B 0A D0 F4 8E 19   ... ......;.....
CAC0   07 20 99 CB AD 02 0B C9 00 F0 03 4C D1 CA 4C 90   . .........L..L.
CAD0   CB 18 A2 00 BD 40 0A 9D 00 07 E8 EC 5B 0A D0 F4   .....@......[...
CAE0   8E 19 07 20 99 CB AD 03 0B C9 00 F0 03 4C F3 CA   ... .........L..
CAF0   4C 90 CB 18 A2 00 BD 60 0A 9D 00 07 E8 EC 7B 0A   L......`......{.
       0  1  2  3  4  5  6  7  8  9  A  B  C  D  E  F
CB00   D0 F4 8E 19 07 20 99 CB AD 04 0B C9 00 F0 03 4C   ..... .........L
CB10   15 CB 4C 90 CB 18 A2 00 BD 80 0A 9D 00 07 E8 EC   ..L.............
CB20   9B 0A D0 F4 8E 19 07 20 99 CB AD 05 0B C9 00 F0   ....... ........
CB30   03 4C 37 CB 4C 90 CB 18 A2 00 BD A0 0A 9D 00 07   .L7.L...........
CB40   E8 EC BB 0A D0 F4 8E 19 07 20 99 CB AD 06 0B C9   ......... ......
```

| | | | | | | | | | | | | | | | | | |
|---|---|---|---|---|---|---|---|---|---|---|---|---|---|---|---|---|---|
| CB50 | 00 | F0 | 03 | 4C | 59 | CB | 4C | 90 | CB | 18 | A2 | 00 | BD | C0 | 0A | 9D | ...LY._......... |
| CB60 | 00 | 07 | E8 | EC | DB | 0A | D0 | F4 | 8E | 19 | 07 | 20 | 99 | CB | AD | 07 | ........... .... |
| CB70 | 0B | C9 | 00 | F0 | 03 | 4C | 7B | CB | 4C | 90 | CB | 18 | A2 | 00 | BD | E0 | .....L(.L....... |
| CB80 | 0A | 9D | 00 | 07 | E8 | EC | FB | 0A | D0 | F4 | 8E | 19 | 07 | 20 | 99 | CB | ............ .. |
| CB90 | A9 | 01 | 8D | 04 | 80 | 78 | 4C | 2B | D4 | A2 | 0B | BD | C0 | 07 | 8D | 14 | .....xL+........ |
| CBA0 | 0B | A2 | 01 | A0 | 00 | BD | 00 | 07 | 8D | 98 | 07 | E8 | BD | 00 | 07 | 99 | ................ |
| CBB0 | 9D | 07 | E8 | C8 | E0 | 08 | D0 | F4 | 20 | 18 | CB | AD | 28 | 07 | 29 | 07 | ........ ...(.). |
| CBC0 | 8D | 12 | 0B | 20 | 0C | CA | A2 | 00 | 18 | AD | 14 | 0B | 6A | 8D | 14 | 0B | ... ........j... |
| CBD0 | BD | 35 | 07 | 69 | 00 | 9D | 35 | 07 | 9D | 6D | 07 | E8 | 18 | AD | 14 | 0B | .5.i..5..m...... |
| CBE0 | 6A | 8D | 14 | 0B | BD | 35 | 07 | 69 | 00 | 9D | 35 | 07 | 9D | 6D | 07 | E8 | j....5.i..5..m.. |
| CBF0 | AD | 28 | 07 | 6A | 6A | 6A | 8D | 28 | 07 | A0 | 00 | 18 | AD | 28 | 07 | 6A | .(.jjj.(.....(.j |
| | 0 | 1 | 2 | 3 | 4 | 5 | 6 | 7 | 8 | 9 | A | B | C | D | E | F | |
| CC00 | 8D | 28 | 07 | BD | 35 | 07 | 69 | 00 | 9D | 35 | 07 | 9D | 6D | 07 | E8 | C8 | .(..5.i..5..m... |
| CC10 | C0 | 05 | D0 | E7 | A0 | 00 | 18 | AD | 29 | 07 | 6A | 8D | 29 | 07 | BD | 35 | ........).j.)..5 |
| CC20 | 07 | 69 | 00 | 9D | 35 | 07 | 9D | 6D | 07 | E8 | C8 | C0 | 08 | D0 | E7 | A0 | .i..5..m........ |
| CC30 | 00 | 18 | AD | 2A | 07 | 6A | 8D | 2A | 07 | BD | 35 | 07 | 69 | 00 | 9D | 35 | ...*.j.*..5.i..5 |
| CC40 | 07 | 9D | 6D | 07 | E8 | C8 | C0 | 05 | D0 | E7 | A9 | 00 | 9D | 35 | 07 | 9D | ..m..........5.. |
| CC50 | 6D | 07 | 20 | 0F | CF | A0 | 00 | B9 | 6D | 07 | 99 | 35 | 07 | C8 | C0 | 16 | m. .....m..5.... |
| CC60 | D0 | F5 | A2 | 00 | BD | 08 | 0B | 29 | 01 | D0 | 03 | 4C | 72 | CC | E8 | 4C | .......)...Lr..L |
| CC70 | 64 | CC | E0 | 07 | B0 | 03 | 4C | 7E | CC | A9 | 01 | 8D | 04 | 80 | A9 | 01 | d.....L~........ |
| CC80 | 9D | 08 | 0B | 8E | 11 | 0B | 20 | 9B | CE | 18 | AD | 12 | 0B | 6D | 12 | 0B | ...... ......m.. |
| CC90 | 6D | 12 | 0B | 6D | 12 | 0B | 6D | 12 | 0B | 6D | 12 | 0B | 6D | 12 | 0B | 6D | m..m..m..m..m..m |
| CCA0 | 12 | 0B | 8D | 13 | 0B | 20 | 2E | CE | 38 | AD | 19 | 07 | E9 | 09 | 8D | 19 | ..... ..8....... |
| CCB0 | 07 | C9 | 00 | F0 | 11 | A2 | 00 | 18 | AD | 19 | 07 | C9 | 07 | F0 | 0B | C9 | ................ |
| CCC0 | 0A | F0 | 04 | 4C | 2C | CD | 60 | 4C | F2 | CC | A2 | 00 | A0 | 00 | BD | 09 | ...L,.`L........ |
| CCD0 | 07 | 99 | 8B | 07 | E8 | C8 | E0 | 03 | D0 | F4 | A9 | 0D | 99 | 8B | 07 | C8 | ................ |
| CCE0 | BD | 09 | 07 | 99 | 8B | 07 | E8 | C8 | E0 | 07 | D0 | F4 | 8C | 15 | 0B | 4C | ...............L |
| CCF0 | 4A | CD | A2 | 00 | A0 | 00 | BD | 09 | 07 | 99 | 8B | 07 | C8 | E8 | E0 | 03 | J............... |
| | 0 | 1 | 2 | 3 | 4 | 5 | 6 | 7 | 8 | 9 | A | B | C | D | E | F | |
| CD00 | D0 | F4 | A9 | 0C | 99 | 8B | 07 | C8 | BD | 09 | 07 | 99 | 8B | 07 | C8 | E8 | ................ |
| CD10 | E0 | 06 | D0 | F4 | A9 | 0D | 99 | 8B | 07 | C8 | BD | 09 | 07 | 99 | 8B | 07 | ................ |
| CD20 | C8 | E8 | E0 | 04 | D0 | F4 | 8C | 15 | 0B | 4C | 4A | CD | A2 | 00 | BD | 09 | ..........LJ.... |
| CD30 | 07 | 9D | 8B | 07 | E8 | EC | 19 | 07 | D0 | F4 | 8E | 15 | 0B | A9 | 00 | 8D | ................ |
| CD40 | 68 | 07 | A9 | 05 | 8D | 6C | 07 | 4C | 4A | CD | A2 | 00 | AD | 15 | 0B | C9 | h...l.LJ........ |
| CD50 | 05 | F0 | 3F | B0 | 1D | AE | 15 | 0B | A9 | 0C | 9D | 8B | 07 | E8 | E0 | 05 | ..?............. |
| CD60 | D0 | F8 | 8E | 15 | 0B | A9 | 00 | 8D | 68 | 07 | A9 | 05 | 8D | 6C | 07 | 4C | ........h...l.L |
| CD70 | B5 | CD | C9 | 0A | F0 | 1C | B0 | 1D | AE | 15 | 0B | A9 | 0C | 9D | 8B | 07 | ................ |
| CD80 | E8 | E0 | 0A | D0 | F8 | 8E | 15 | 0B | A9 | 00 | 8D | 68 | 07 | A9 | 05 | 8D | ...........h.... |
| CD90 | 6C | 07 | 4C | B5 | CD | C9 | 0F | F0 | F9 | B0 | F7 | AE | 15 | 0B | A9 | 0C | l.L............. |
| CDA0 | 9D | 8B | 07 | E8 | E0 | 0F | D0 | F8 | 8E | 15 | 0B | A9 | 00 | 8D | 68 | 07 | ..............h. |
| CDB0 | A9 | 05 | 8D | 6C | 07 | 20 | 0C | CA | AE | 68 | 07 | A0 | 14 | A9 | 01 | 99 | ...l. ...h...... |
| CDC0 | 35 | 07 | 99 | 6D | 07 | 88 | A9 | 00 | 8D | 4F | 07 | 18 | BD | 8B | 07 | 6A | 5..m.....O.....j |
| CDD0 | 9D | 8B | 07 | 59 | 35 | 07 | 69 | 00 | 99 | 35 | 07 | 99 | 6D | 07 | 88 | EE | ....5.i..5..m... |
| CDE0 | 4F | 07 | AD | 4F | 07 | C9 | 04 | B0 | 03 | 4C | CE | CD | A9 | 00 | 8D | 4F | O..O.....L.....O |
| CDF0 | 07 | EE | EE | 68 | 07 | EC | 6C | 07 | F0 | 03 | 4C | CB | CD | 18 | AD | 6C | ...h..l...L....l |
| | 0 | 1 | 2 | 3 | 4 | 5 | 6 | 7 | 8 | 9 | A | B | C | D | E | F | |
| CE00 | 07 | 69 | 05 | 8D | 6C | 07 | 18 | 20 | 0F | CF | A0 | 00 | B9 | 6D | 07 | 99 | .i..l.. .....m.. |
| CE10 | 35 | 07 | C8 | C0 | 15 | D0 | F5 | 20 | 2E | CE | 20 | 0C | CA | 38 | AD | 15 | 5...... .. ..8.. |
| CE20 | 0B | E9 | 05 | 8D | 15 | 0B | C9 | 00 | F0 | 03 | 4C | B5 | CD | 60 | A2 | 1E | ..........L..`.. |
| CE30 | A9 | 00 | 8D | 50 | 07 | 8D | 4E | 07 | 8D | 4F | 07 | 18 | BD | 2B | 07 | 6D | ...P..N..O...+.m |
| CE40 | 50 | 07 | 8D | 50 | 07 | BD | 2B | 07 | 6A | 2E | 4E | 07 | EE | 4F | 07 | AD | P..P..+.j.N..O.. |
| CE50 | 4F | 07 | C9 | 08 | B0 | 06 | CA | 30 | 1D | 4C | 3C | CE | AD | 13 | 0B | A8 | O......0.L<..... |
| CE60 | AD | 4E | 07 | 91 | 53 | C8 | 8C | 13 | 0B | CA | A9 | 00 | 8D | 4E | 07 | 8D | .N..S........N.. |
| CE70 | 4F | 07 | 18 | 4C | 3C | CE | 18 | AD | 50 | 07 | 6A | 2E | 4E | 07 | AD | 13 | O..L<...P.j.N... |
| CE80 | 0B | A8 | AD | 4E | 07 | 91 | 53 | EE | 13 | 0B | AD | 13 | 0B | C9 | 40 | B0 | ...N..S.......@. |
| CE90 | 01 | 60 | AE | 11 | 0B | A9 | 01 | 9D | 08 | 0B | 60 | E0 | 00 | F0 | 1F | E0 | .`........`..... |
| CEA0 | 01 | F0 | 24 | E0 | 02 | F0 | 29 | E0 | 03 | F0 | 2E | E0 | 04 | F0 | 33 | E0 | ..$...)........3. |
| CEB0 | 05 | F0 | 38 | E0 | 06 | F0 | 3D | E0 | 07 | F0 | 42 | 4C | 06 | CF | A9 | 00 | ..8...=...BL.... |
| CEC0 | 85 | 53 | A9 | 0C | 85 | 54 | 60 | A9 | 40 | 85 | 53 | A9 | 0C | 85 | 54 | 60 | .S...T`.@.S...T` |
| CED0 | A9 | 80 | 85 | 53 | A9 | 0C | 85 | 54 | 60 | A9 | C0 | 85 | 53 | A9 | 0C | 85 | ...S...T`...S... |
| CEE0 | 54 | 60 | A9 | 00 | 85 | 53 | A9 | 0D | 85 | 54 | 60 | A9 | 40 | 85 | 53 | A9 | T`...S...T`.@.S. |
| CEF0 | 0D | 85 | 54 | 60 | A9 | 80 | 85 | 53 | A9 | 0D | 85 | 54 | 60 | A9 | C0 | 85 | ..T`...S...T`... |

```
      0  1  2  3  4  5  6  7  8  9  A  B  C  D  E  F
CF00  53 A9 0D 85 54 60 A9 00 85 53 A9 0E 85 54 60 A2   S...T ...S...T .
CF10  1E BD 2B 07 C9 00 D0 04 CA 4C 11 CF BD 2B 07 49   ..+......L...+.I
CF20  01 9D 2B 07 CA BD 2B 07 49 01 9D 2B 07 CA BD 2B   ..+...-.I..-...+
CF30  07 49 01 9D 2B 07 CA BD 2B 07 49 00 9D 2B 07 CA   .I..+...-.I..-..
CF40  BD 2B 07 49 01 9D 2B 07 CA BD 2B 07 49 01 9D 2B   .+.I..-...-.I..+
CF50  07 CA BD 2B 07 49 00 9D 2B 07 CA BD 2B 07 49 01   ...+.I..+...+.I.
CF60  9D 2B 07 CA BD 2B 07 49 00 9D 2B 07 CA BD 2B 07   .+...-.I..+...+.
CF70  49 00 9D 2B 07 CA BD 2B 07 49 01 9D 2B 07 20 84   I..+...-.I..-. .
CF80  CF 4C 0F CF A2 1E BD 2B 07 C9 00 F0 01 60 E0 0A   .L.....-.......
CF90  F0 04 CA 4C 86 CF 68 68 60 78 48 98 48 8A 48 6C   ...L..hh'xH.H.Hl
CFA0  55 00 68 AA 68 A8 68 58 40 A5 50 29 01 D0 03 4C   U.h.h.hX@.P)...L
CFB0  A2 CF 18 A5 52 69 01 85 52 A5 51 69 00 85 51 C9   ....Ri..R.Qi..Q.
CFC0  07 B0 03 4C A2 CF A5 52 C9 D0 B0 03 4C A2 CF AD   ...L...R....L...
CFD0  BC C0 85 55 AD BD C0 85 56 4C A2 CF A9 01 8D 04   ...U....VL......
CFE0  80 AD 05 A0 29 01 D0 F9 A9 00 85 52 AD 04 C1 85   ....).......R...
CFF0  55 AD 05 C1 85 56 A9 00 8D 01 60 4C A2 CF 18 A5   U....V....`L....
      0  1  2  3  4  5  6  7  8  9  A  B  C  D  E  F
D000  52 69 01 85 52 C9 C8 B0 0A AD 05 A0 29 01 D0 06   Ri..R.......)...
D010  4C A2 CF 4C 19 D0 4C E1 CF A9 01 8D 06 60 A9 00   L..L..L......`..
D020  8D 00 60 78 A2 FF 9A 4C C6 C3 A9 01 8D 04 80 8D   ..`x...L........
D030  02 40 8D 06 60 A9 00 8D 00 60 A9 55 8D 8A 07 A9   .@..`....`.U....
D040  00 8D 8C 07 8D 8D 07 AD BE C0 85 55 AD BF C0 85   ...........U....
D050  56 4C A2 CF 18 AD 8A 07 0A 8D 8A 07 A9 00 2A 8D   VL............*.
D060  08 80 EE 8C 07 AD 8C 07 C9 08 B0 03 4C A2 CF A9   ............L...
D070  55 8D 8A 07 EE 8D 07 AD 8D 07 C9 50 B0 0D A9 00   U..........P....
D080  8D 8C 07 4C A2 CF A9 00 8D 8D 07 A9 00 8D 8C 07   ...L............
D090  AD 82 07 8D 86 07 AD 83 07 8D 87 07 AD 84 07 8D   ................
D0A0  88 07 AD 85 07 8D 89 07 AD C0 C0 85 55 AD C1 C0   ............U...
D0B0  85 56 4C A2 CF 18 AD 86 07 0A 8D 86 07 A9 00 2A   .VL............*
D0C0  8D 08 80 EE 8C 07 AD 8C 07 C9 08 B0 03 4C A2 CF   .............L..
D0D0  A9 00 8D 8C 07 AD C2 C0 85 55 AD C3 C0 85 56 4C   .........U....VL
D0E0  A2 CF 18 AD 87 07 0A 8D 87 07 A9 00 2A 8D 08 80   ............*...
D0F0  EE 8C 07 AD 8C 07 C9 08 B0 03 4C A2 CF A9 00 8D   ..........L.....
      0  1  2  3  4  5  6  7  8  9  A  B  C  D  E  F
D100  8C 07 AD C4 C0 85 55 AD C5 C0 85 56 4C A2 CF 18   ......U....VL...
D110  AD 88 07 0A 8D 88 07 A9 00 2A 8D 08 80 EE 8C 07   .........*......
D120  AD 8C 07 C9 08 B0 03 4C A2 CF A9 00 8D 8C 07 AD   .......L........
D130  C6 C0 85 55 AD C7 C0 85 56 4C A2 CF 18 AD 89 07   ...U....VL......
D140  0A 8D 89 07 A9 00 2A 8D 08 80 EE 8C 07 AD 8C 07   ......*.........
D150  C9 08 B0 03 4C A2 CF EE 8D 07 AD 8D 07 C9 02 B0   ....L...........
D160  03 4C 8B D0 A9 00 8D 8C 07 A9 01 8D 8A 07 AD C8   .L..............
D170  C0 85 55 AD C9 C0 85 56 4C A2 CF AD 8A 07 8D 08   ..U....VL.......
D180  80 49 01 8D 8A 07 EE 8C 07 AD 8C 07 C9 0F B0 03   .I..............
D190  4C A2 CF A9 00 8D 8C 07 8D 8B 07 AD CA C0 85 55   L..............U
D1A0  AD CB C0 85 56 4C A2 CF AE 8B 07 18 BD 00 08 0A   ....VL..........
D1B0  9D 00 08 A9 00 2A 8D 08 80 EE 8C 07 AD 8C 07 C9   .....*..........
D1C0  08 B0 03 4C A2 CF EE 8B 07 A9 00 8D 8C 07 AD 8B   ...L............
D1D0  07 C9 50 B0 03 4C A2 CF A9 00 8D 8B 07 A9 01 8D   ..P..L..........
D1E0  8A 07 20 E6 D3 AD CC C0 85 55 AD CD C0 85 56 4C   .. ......U....VL
D1F0  A2 CF AD 8A 07 8D 08 80 49 01 8D 8A 07 EE 8C 07   ........I.......
      0  1  2  3  4  5  6  7  8  9  A  B  C  D  E  F
D200  AD 8C 07 C9 0F B0 03 4C A2 CF A9 00 8D 8C 07 8D   .......L........
D210  8B 07 AD CE C0 85 55 AD CF C0 85 56 4C A2 CF AE   ......U....VL...
D220  8B 07 18 BD 51 08 0A 9D 51 08 A9 00 2A 8D 08 80   ....Q...Q...*...
D230  EE 8C 07 AD 8C 07 C9 08 B0 03 4C A2 CF EE 8B 07   ..........L.....
D240  A9 00 8D 8C 07 AD 8B 07 C9 50 B0 03 4C A2 CF A9   .........P..L...
D250  00 8D 8B 07 A9 01 8D 8A 07 20 04 D4 AD D0 C0 85   ......... ......
D260  55 AD D1 C0 85 56 4C A2 CF AD 8A 07 8D 08 80 49   U....VL........I
D270  01 8D 8A 07 EE 8C 07 AD 8C 07 C9 0F B0 03 4C A2   ..............L.
D280  CF A9 00 8D 8C 07 8D 8B 07 AD D2 C0 85 55 AD D3   .............U..
D290  C0 85 56 4C A2 CF AE 8B 07 18 BD 00 09 0A 9D 00   ..VL............
D2A0  09 A9 00 2A 8D 08 80 EE 8C 07 AD 8C 07 C9 08 B0   ...*............
D2B0  03 4C A2 CF EE 8B 07 A9 00 8D 8C 07 AD 8B 07 C9   .L..............
D2C0  50 B0 03 4C A2 CF A9 00 8D 8B 07 A9 01 8D 8A 07   P..L............
D2D0  20 18 D4 AD D4 C0 85 55 AD D5 C0 85 56 4C A2 CF    ......U....VL..
D2E0  AD 8A 07 8D 08 80 49 01 8D 8A 07 EE 8C 07 AD 8C   ......I.........
D2F0  07 C9 0F B0 03 4C A2 CF A9 00 8D 8C 07 8D 8B 07   .....L..........
```

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| D300 | AD | D6 | C0 | 85 | 55 | AD | D7 | C0 | 85 | 56 | 4C | A2 | CF | AE | 8B | 07 | ....U....VL...... |
| D310 | 18 | BD | 51 | C9 | 0A | 9D | 51 | 09 | A9 | 0C | 2A | 8D | 08 | 80 | EE | 8C | ..Q...Q...*...... |
| D320 | 07 | AD | 8C | 07 | C9 | 08 | B0 | 03 | 4C | A2 | CF | EE | 8B | 07 | A9 | 00 | .........L....... |
| D330 | 8D | 8C | 07 | AD | 8B | 07 | C9 | 50 | B0 | 03 | 4C | A2 | CF | 20 | 4A | D3 | ........P..L.. J. |
| D340 | 20 | C3 | D3 | A9 | 00 | 85 | 50 | 4C | 39 | CA | A2 | 00 | A9 | 7A | 9D | 00 | ......PL9....z.. |
| D350 | 08 | E8 | A9 | 89 | 9D | 00 | 08 | E8 | A9 | C1 | 9D | 00 | 08 | E8 | A9 | 97 | ................. |
| D360 | 9D | 00 | 08 | E8 | E0 | 50 | D0 | E4 | A2 | 00 | A9 | 7A | 9D | 51 | 08 | E8 | .....P.....z.Q.. |
| D370 | A9 | 89 | 9D | 51 | 08 | E8 | A9 | C1 | 9D | 51 | 08 | E8 | A9 | 97 | 9D | 51 | ...Q.....Q......Q |
| D380 | 08 | E8 | E0 | 50 | D0 | E4 | A2 | 00 | A9 | 7A | 9D | 00 | 09 | E8 | A9 | 89 | ...P.....z....... |
| D390 | 9D | 00 | 09 | E8 | A9 | C1 | 9D | 00 | 09 | E8 | A9 | 97 | 9D | 00 | 09 | E8 | ................. |
| D3A0 | E0 | 50 | D0 | E4 | A2 | 00 | A9 | 7A | 9D | 51 | 09 | E8 | A9 | 89 | 9D | 51 | .P......z.Q.....Q |
| D3B0 | 09 | E8 | A9 | C1 | 9D | 51 | 09 | E8 | A9 | 97 | 9D | 51 | 09 | E8 | E0 | 50 | ......Q.....Q...P |
| D3C0 | D0 | E4 | 60 | A2 | 00 | A9 | 00 | 9D | 00 | 06 | E8 | D0 | FA | 8D | 8E | 07 | ..`.............. |
| D3D0 | 8D | 8F | 07 | 8D | 90 | 07 | 8D | 91 | 07 | 8D | 4A | 07 | 8D | 4B | 07 | 8D | ..........J..K.. |
| D3E0 | 4C | 07 | 8D | 4D | 07 | 60 | AD | 8F | 07 | 29 | 01 | D0 | 03 | 4C | F1 | D3 | L..M.`...)....L.. |
| D3F0 | 60 | AD | 90 | 07 | 29 | 01 | D0 | F8 | AD | 91 | 07 | 29 | 01 | D0 | F1 | 68 | `...)......)...h |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| D400 | 68 | 4C | 3D | D3 | AD | 90 | 07 | 29 | 01 | D0 | 03 | 4C | 0F | D4 | 60 | AD | hL=....)...L...`. |
| D410 | 91 | 07 | 29 | 01 | D0 | F8 | 68 | 68 | 4C | 3D | D3 | AD | 91 | 07 | 29 | 01 | ..)...hhL=....).. |
| D420 | D0 | 03 | 4C | 26 | D4 | 60 | 68 | 68 | 4C | 3D | D3 | 78 | A9 | 01 | 8D | 04 | ..L&.`hhL=.x.... |
| D430 | 80 | 8D | 00 | 40 | 8D | 06 | 60 | A9 | 00 | 8D | 01 | 60 | 8D | 00 | 60 | 85 | ...@..`....`..`. |
| D440 | 51 | 85 | 52 | AD | DA | C0 | 85 | 55 | AD | DB | C0 | 85 | 56 | 58 | 4C | 4E | Q.R....U....VXLN |
| D450 | D4 | E6 | 51 | A5 | 51 | C9 | C8 | B0 | 03 | 4C | A2 | CF | AD | DC | C0 | 85 | ..Q.Q....L...... |
| D460 | 55 | AD | DD | C0 | 85 | 56 | A9 | 00 | 8D | A0 | 07 | 8D | A1 | 07 | A9 | AA | U....V.......... |
| D470 | 8D | 9E | 07 | 4C | A2 | CF | 18 | AD | 9E | 07 | 0A | 8D | 9E | 07 | A9 | 00 | ...L............ |
| D480 | 2A | 8D | 08 | 80 | EE | A0 | 07 | AD | A0 | 07 | C9 | 08 | B0 | 03 | 4C | A2 | *.............L. |
| D490 | CF | A9 | AA | 8D | 9E | 07 | EE | A1 | 07 | AD | A1 | 07 | C9 | 4C | B0 | 08 | .............L.. |
| D4A0 | A9 | 00 | 8D | A0 | 07 | 4C | A2 | CF | A9 | 00 | 8D | A0 | 07 | 8D | A1 | 07 | .....L.......... |
| D4B0 | AD | A2 | 07 | 8D | A6 | 07 | AD | A3 | 07 | 8D | A7 | 07 | AD | A4 | 07 | 8D | ................ |
| D4C0 | A8 | 07 | AD | A5 | 07 | 8D | A9 | 07 | AD | DE | C0 | 85 | 55 | AD | DF | C0 | ............U... |
| D4D0 | 85 | 56 | A9 | 00 | 8D | AB | 07 | 4C | A2 | CF | AE | AB | 07 | 18 | BD | A6 | .V.....L........ |
| D4E0 | 07 | 0A | 9D | A6 | 07 | A9 | 00 | 2A | 8D | 08 | 80 | EE | A0 | 07 | AD | A0 | .......*........ |
| D4F0 | 07 | C9 | 08 | B0 | 03 | 4C | A2 | CF | A9 | 00 | 8D | A0 | 07 | EE | AB | 07 | .....L.......... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| D500 | AD | AB | 07 | C9 | 04 | B0 | 03 | 4C | A2 | CF | A9 | 00 | 8D | AB | 07 | 8D | .......L........ |
| D510 | A1 | 07 | AD | E2 | C0 | 85 | 55 | AD | E3 | C0 | 85 | 56 | 4C | A2 | CF | AE | ......U....VL... |
| D520 | AB | 07 | 18 | BD | 00 | 0C | 0A | 9D | 00 | 0C | A9 | 00 | 2A | 8D | 08 | 80 | ............*... |
| D530 | EE | A0 | 07 | AD | A0 | 07 | C9 | 08 | B0 | 03 | 4C | A2 | CF | EE | AB | 07 | ..........L..... |
| D540 | A9 | 00 | 8D | A0 | 07 | AD | AB | 07 | C9 | 40 | B0 | 03 | 4C | A2 | CF | AD | .........@..L.... |
| D550 | AC | 07 | 29 | 01 | D0 | 03 | 4C | 5C | D5 | 4C | 80 | DB | A9 | 00 | 8D | A0 | ..)...L\.L...... |
| D560 | 07 | 8D | A1 | 07 | EE | 9F | 07 | AE | 9F | 07 | BD | 08 | 0B | 29 | 01 | D0 | .............).. |
| D570 | 05 | A9 | 01 | 8D | AC | 07 | AD | E4 | C0 | 85 | 55 | AD | E5 | C0 | 85 | 56 | ..........U....V |
| D580 | AD | A2 | 07 | 8D | A6 | 07 | AD | A3 | 07 | 8D | A7 | 07 | AD | A4 | 07 | 8D | ................ |
| D590 | A8 | 07 | AD | A5 | 07 | 8D | A9 | 07 | A9 | 0C | 8D | AB | 07 | 4C | A2 | CF | .............L.. |
| D5A0 | AE | AB | 07 | 18 | BD | A6 | 07 | 0A | 9D | A6 | 07 | A9 | 00 | 2A | 8D | 08 | .............*.. |
| D5B0 | 80 | EE | A0 | 07 | AD | A0 | 07 | C9 | 08 | B0 | 03 | 4C | A2 | CF | A9 | 00 | ...........L.... |
| D5C0 | 8D | A0 | 07 | EE | AB | 07 | AD | AB | 07 | C9 | 04 | B0 | 03 | 4C | A2 | CF | .............L.. |
| D5D0 | A9 | 00 | 8D | AB | 07 | 8D | A1 | 07 | AD | E6 | C0 | 85 | 55 | AD | E7 | C0 | ............U... |
| D5E0 | 85 | 56 | 4C | A2 | CF | AE | AB | 07 | 18 | BD | 40 | 0C | 0A | 9D | 40 | 0C | .VL.......@...@. |
| D5F0 | A9 | 00 | 2A | 8D | 08 | 80 | EE | A0 | 07 | AD | A0 | 07 | C9 | 08 | B0 | 03 | ..*............. |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| D600 | 4C | A2 | CF | EE | AB | 07 | A9 | 00 | 8D | A0 | 07 | AD | AB | 07 | C9 | 40 | L..............@ |
| D610 | B0 | 03 | 4C | A2 | CF | AD | AC | 07 | 29 | 01 | D0 | 03 | 4C | 22 | D6 | 4C | ..L.....)...L".L |
| D620 | 80 | DB | A9 | 00 | 8D | A0 | 07 | 8D | A1 | 07 | EE | 9F | 07 | AE | 9F | 07 | ................ |
| D630 | BD | 08 | 0B | 29 | 01 | D0 | 05 | A9 | 01 | 8D | AC | 07 | AD | E8 | C0 | 85 | ...)............ |
| D640 | 55 | AD | E9 | C0 | 85 | 56 | AD | A2 | 07 | 8D | A6 | 07 | AD | A3 | 07 | 8D | U....V.......... |
| D650 | A7 | 07 | AD | A4 | 07 | 8D | A8 | 07 | AD | A5 | 07 | 8D | A9 | 07 | A9 | 00 | ................ |
| D660 | 8D | AB | 07 | 4C | A2 | CF | AE | AB | 07 | 18 | BD | A6 | 07 | 0A | 9D | A6 | ...L............ |
| D670 | 07 | A9 | 00 | 2A | 8D | 08 | 80 | EE | A0 | 07 | AD | A0 | 07 | C9 | 08 | B0 | ...*............ |
| D680 | 03 | 4C | A2 | CF | A9 | 00 | 8D | A0 | 07 | EE | AB | 07 | AD | AB | 07 | C9 | .L.............. |
| D690 | 04 | B0 | 03 | 4C | A2 | CF | A9 | 00 | 8D | AB | 07 | 8D | A1 | 07 | AD | EA | ...L............ |
| D6A0 | C0 | 85 | 55 | AD | EB | C0 | 85 | 56 | 4C | A2 | CF | AE | AB | 07 | 18 | BD | ..U....VL....... |
| D6B0 | 80 | 0C | 0A | 9D | 80 | 0C | A9 | 00 | 2A | 8D | 08 | 80 | EE | A0 | 07 | AD | ........*....... |
| D6C0 | A0 | 07 | C9 | 08 | B0 | 03 | 4C | A2 | CF | EE | AB | 07 | A9 | 00 | 8D | A0 | ......L......... |
| D6D0 | 07 | AD | AB | 07 | C9 | 40 | B0 | 03 | 4C | A2 | CF | AD | AC | 07 | 29 | 01 | .....@..L.....). |
| D6E0 | D0 | 03 | 4C | E8 | D6 | 4C | 80 | DB | A9 | 00 | 8D | A0 | 07 | 8D | A1 | 07 | ..L..L.......... |
| D6F0 | EE | 9F | 07 | AE | 9F | 07 | BD | 08 | 0B | 29 | 01 | D0 | 05 | A9 | 01 | 8D | .........)...... |

```
      0  1  2  3  4  5  6  7  8  9  A  B  C  D  E  F
D700  AC 07 AD EC C0 85 55 AD ED C0 85 56 AD A2 07 8D   .......U........
D710  A6 07 AD A3 07 8D A7 07 AD A4 07 8D A8 07 AD A5   ................
D720  07 8D A9 07 A9 00 8D AB 07 4C A2 CF AE AB 07 18   .........L......
D730  BD A6 07 0A 9D A6 07 A9 00 2A 8D 08 80 EE A0 07   .........*......
D740  AD A0 07 C9 08 B0 03 4C A2 CF A9 00 8D A0 07 EE   .......L........
D750  AB 07 AD AB 07 C9 04 B0 03 4C A2 CF A9 00 8D AB   .........L......
D760  07 8D A1 07 AD EE C0 85 55 AD EF C0 85 56 4C A2   ........U....VL.
D770  CF AE AB 07 18 BD C0 0C 0A 9D C0 0C A9 00 2A 8D   ..............*.
D780  08 80 EE A0 07 AD A0 07 C9 08 B0 03 4C A2 CF EE   ............L...
D790  AB 07 A9 00 8D A0 07 AD AB 07 C9 40 B0 03 4C A2   ..........@...L.
D7A0  CF AD AC 07 29 01 D0 03 4C AE D7 4C 80 DB A9 00   ....)...L..L....
D7B0  8D A0 07 8D A1 07 EE 9F 07 AE 9F 07 BD 08 0B 29   ...............)
D7C0  01 D0 05 A9 01 8D AC 07 AD F0 C0 85 55 AD F1 C0   ............U...
D7D0  85 56 AD A2 07 8D A6 07 AD A3 07 8D A7 07 AD A4   .V..............
D7E0  07 8D A8 07 AD A5 07 8D A9 07 A9 00 8D AB 07 4C   ...............L
D7F0  A2 CF AE AB 07 18 BD A6 07 0A 9D A6 07 A9 00 2A   ...............*
      0  1  2  3  4  5  6  7  8  9  A  B  C  D  E  F
D800  8D 08 80 EE A0 07 AD A0 07 C9 08 B0 03 4C A2 CF   .............L..
D810  A9 00 8D A0 07 EE AB 07 AD AB 07 C9 04 B0 03 4C   ...............L
D820  A2 CF A9 00 8D AB 07 8D A1 07 AD F2 C0 85 55 AD   ..............U.
D830  F3 C0 85 56 4C A2 CF AE AB 07 18 BD 00 0D 0A 9D   ...VL...........
D840  00 0D A9 00 2A 8D 08 80 EE A0 07 AD A0 07 C9 08   ....*...........
D850  B0 03 4C A2 CF EE AB 07 A9 00 8D A0 07 AD AB 07   ..L.............
D860  C9 40 B0 03 4C A2 CF AD AC 07 29 01 D0 03 4C 74   .@..L.....)...Lt
D870  D8 4C 80 DB A9 00 8D A0 07 8D A1 07 EE 9F 07 AE   .L..............
D880  9F 07 BD 08 0B 29 01 D0 05 A9 01 8D AC 07 AD F4   .....)..........
D890  C0 85 55 AD F5 C0 85 56 AD A2 07 8D A6 07 AD A3   ..U....V........
D8A0  07 8D A7 07 AD A4 07 8D A8 07 AD A5 07 8D A9 07   ................
D8B0  A9 00 8D AB 07 4C A2 CF AE AB 07 18 BD A6 07 0A   .....L..........
D8C0  9D A6 07 A9 00 2A 8D 08 80 EE A0 07 AD A0 07 C9   .....*..........
D8D0  08 B0 03 4C A2 CF A9 00 8D A0 07 EE AB 07 AD AB   ...L............
D8E0  07 C9 04 B0 03 4C A2 CF A9 00 8D AB 07 8D A1 07   .....L..........
D8F0  AD F6 C0 85 55 AD F7 C0 85 56 4C A2 CF AE AB 07   ....U....VL.....
      0  1  2  3  4  5  6  7  8  9  A  B  C  D  E  F
D900  18 BD 40 0D 0A 9D 40 0D A9 00 2A 8D 08 80 EE A0   ..@...@...*.....
D910  07 AD A0 07 C9 08 B0 03 4C A2 CF EE AB 07 A9 00   ........L.......
D920  8D A0 07 AD AB 07 C9 40 B0 03 4C A2 CF AD AC 07   .......@..L.....
D930  29 01 D0 03 4C 3A D9 4C 80 DB A9 00 8D A0 07 8D   )...L:.L........
D940  A1 07 EE 9F 07 AE 9F 07 BD 08 0B 29 01 D0 05 A9   ...........)....
D950  01 8D AC 07 AD F8 C0 85 55 AD F9 C0 85 56 AD A2   ........U....V..
D960  07 8D A6 07 AD A3 07 8D A7 07 AD A4 07 8D A8 07   ................
D970  AD A5 07 8D A9 07 A9 00 8D AB 07 4C A2 CF AE AB   ...........L....
D980  07 18 BD A6 07 0A 9D A6 07 A9 00 2A 8D 08 80 EE   ...........*....
D990  A0 07 AD A0 07 C9 08 B0 03 4C A2 CF A9 00 8D A0   .........L......
D9A0  07 EE AB 07 AD AB 07 C9 04 B0 03 4C A2 CF A9 00   ...........L....
D9B0  8D AB 07 8D A1 07 AD FA C0 85 55 AD FB C0 85 56   ..........U....V
D9C0  4C A2 CF AE AB 07 18 BD 80 0D 0A 9D 80 0D A9 00   L...............
D9D0  2A 8D 08 80 EE A0 07 AD A0 07 C9 08 B0 03 4C A2   *.............L.
D9E0  CF EE AB 07 A9 00 8D A0 07 AD AB 07 C9 40 B0 03   .............@..
D9F0  4C A2 CF AD AC 07 29 01 D0 03 4C 00 DA 4C 80 DB   L.....)...L..L..
      0  1  2  3  4  5  6  7  8  9  A  B  C  D  E  F
DA00  A9 00 8D A0 07 8D A1 07 EE 9F 07 AE 9F 07 BD 08   ................
DA10  0B 29 01 D0 05 A9 01 8D AC 07 AD FC C0 85 55 AD   .)............U.
DA20  FD C0 85 56 AD A2 07 8D A6 07 AD A3 07 8D A7 07   ...V............
DA30  AD A4 07 8D A8 07 AD A5 07 8D A9 07 A9 00 8D AB   ................
DA40  07 4C A2 CF AE AB 07 18 BD A6 07 0A 9D A6 07 A9   .L..............
DA50  00 2A 8D 08 80 EE A0 07 AD A0 07 C9 08 B0 03 4C   .*.............L
DA60  A2 CF A9 00 8D A0 07 EE AB 07 AD AB 07 C9 04 B0   ................
DA70  03 4C A2 CF A9 00 8D AB 07 8D A1 07 AD FE C0 85   .L..............
DA80  55 AD FF C0 85 56 4C A2 CF AE AB 07 18 BD C0 0D   U....VL.........
DA90  0A 9D C0 0D A9 00 2A 8D 08 80 EE A0 07 AD A0 07   ......*.........
DAA0  C9 08 B0 03 4C A2 CF EE AB 07 A9 00 8D A0 07 AD   ....L...........
DAB0  AB 07 C9 40 B0 03 4C A2 CF AD AC 07 29 01 D0 03   ...@..L.....)...
DAC0  4C C6 DA 4C 80 DB A9 00 8D A0 07 8D A1 07 EE 9F   L..L............
DAD0  07 AE 9F 07 BD 08 0B 29 01 D0 05 A9 01 8D AC 07   .......)........
DAE0  AD 00 C1 85 55 AD 01 C1 85 56 AD A2 07 8D A6 07   ....U....V......
DAF0  AD A3 07 8D A7 07 AD A4 07 8D A8 07 AD A5 07 8D   ................
```

```
      0  1  2  3  4  5  6  7  8  9  A  B  C  D  E  F
DB00  A9 07 A9 00 8D AB 07 4C A2 CF AE AB 07 18 BD A6   .......L........
DB10  07 0A 9D A6 07 A9 00 2A 8D 0B 80 EE A0 07 AD A0   .......*........
DB20  07 C9 08 B0 03 4C A2 CF A9 00 8D A0 07 EE AB 07   ................
DB30  AD AB 07 C9 04 B0 03 4C A2 CF A9 00 8D AB 07 8D   .......L........
DB40  A1 07 AD 02 C1 85 55 AD 03 C1 85 56 4C A2 CF AE   ......U....VL...
DB50  AB 07 18 BD 00 0E 0A 9D 00 0E A9 00 2A 8D 08 80   ............*...
DB60  EE A0 07 AD A0 07 C9 08 B0 03 4C A2 CF EE AB 07   ..........L.....
DB70  A9 00 8D A0 07 AD AB 07 C9 40 B0 03 4C A2 CF EA   ........@..L....
DB80  20 56 DB 4C 43 D3 A9 0C 85 56 A0 00 84 55 A2 0E    .V.LC....V...U..
DB90  A9 7A 91 55 C8 A9 89 91 55 C8 A9 C1 91 55 C8 A9   .z.U....U....U..
DBA0  97 91 55 C8 D0 EA E6 56 E4 56 B0 E4 A2 00 A9 00   ..U....V.V......
DBB0  9D 00 0B E8 E0 08 D0 F6 A2 00 9D 08 0B E8 E0 09   ................
DBC0  D0 F8 8D AC 07 8D 9F 07 60 18 78 AD 01 A0 29 01   ........`.x...).
DBD0  D0 03 4C C9 DB AD 01 80 C9 01 F0 03 4C E2 DB 4C   ..L.........L..L
DBE0  3F DC C9 02 F0 03 4C EC DB 4C 53 DC C9 03 F0 03   ?.....L..LS.....
DBF0  4C F6 DB 4C 63 DC C9 04 F0 03 4C 00 DC 4C 73 DC   L..Lc.....L..Ls.
      0  1  2  3  4  5  6  7  8  9  A  B  C  D  E  F
DC00  C9 05 F0 03 4C 0A DC 4C 7B DC C9 06 F0 03 4C 14   ....L..L{.....L.
DC10  DC 4C 83 DC C9 07 F0 03 4C 1E DC 4C C9 DB C9 08   .L......L..L....
DC20  F0 03 4C 28 DC 4C BE DC C9 FF F0 07 C9 09 F0 06   ..L(.L..........
DC30  4C C9 DB 4C 02 DD 4C C9 DB AD 01 A0 29 01 D0 03   L..L..L.....)...
DC40  4C 39 DC AD 01 80 8D 00 80 A9 01 85 FD 8D 04 80   L9..............
DC50  4C C9 DB A9 C0 8D 00 60 8D 06 60 A9 01 8D 03 40   L......`..`....@
DC60  4C C9 DB A9 01 8D C0 60 A9 C0 8D 03 40 8D 06 60   L......`....@..`
DC70  4C C9 DB A9 01 8D 04 80 4C C9 DB A9 00 8D 03 80   L.......L.......
DC80  4C C9 DB 18 A9 01 8D 01 40 A9 00 8D 00 60 A9 01   L.......@....`..
DC90  8D 06 60 A9 C0 8D 71 03 A9 55 8D 00 04 18 AD 00   ..`...q..U......
DCA0  04 4A 8D 00 04 A9 00 2A 8D 08 80 20 0C DD 99 FF   .J.....*... ....
DCB0  1F EE 71 03 AD 71 03 C9 08 D0 E2 4C 93 DC A9 55   ..q..q.....L...U
DCC0  8D 00 A5 00 C9 55 F0 03 4C E6 DC A9 55 8D 00 20   .....U..L...U..
DCD0  AD 00 20 C9 55 F0 03 4C E6 DC A9 55 8D 00 3F AD   .. .U..L...U..?.
DCE0  00 3F C9 55 F0 08 A9 01 8D 00 80 4C F3 DC A9 00   .?.U.......L....
DCF0  8D 00 80 A9 01 8D 04 80 85 FD 4C C9 DB A9 00 4C   ..........L....L
      0  1  2  3  4  5  6  7  8  9  A  B  C  D  E  F
DD00  EE DC A9 00 8D 03 80 85 FD 4C C9 DB A0 02 A2 FF   .........L......
DD10  CA D0 FD 88 D0 F8 A0 01 A2 8C CA D0 FD 88 D0 F8   ................
DD20  60 78 A2 00 A9 00 9D 00 40 E8 E0 08 D0 F8 A2 00   `x......@.......
DD30  A9 01 9D 00 60 E8 E0 07 D0 F8 A9 00 8D 06 60 8D   ....`.........`.
DD40  07 60 8D 03 80 8D 08 80 A0 C0 84 00 84 01 A2 3F   .`.............?
DD50  A9 00 91 00 C8 D0 FB E6 01 E4 01 B0 F5 18 A2 00   ................
DD60  A9 01 9D 00 40 E8 E0 08 D0 F8 AD 01 A0 29 01 D0   ....@........)..
DD70  03 4C 6A DD AD 01 80 85 01 A2 00 A9 00 9D 00 40   .Lj............@
DD80  E8 E0 08 D0 F6 A5 01 C9 01 F0 07 C9 02 F0 6F 4C   ..............oL
DD90  6A DD A2 FF 9A AD 01 A0 29 01 D0 03 4C 95 DD AD   j.......)...L...
DDA0  01 80 8D 82 07 A2 01 AD 01 A0 29 01 D0 03 4C BB   ..........)...L.
DDB0  DD AD 01 80 9D 82 07 E8 4C A7 DD AD 01 A0 29 01   ........L.....).
DDC0  D0 03 4C BB DD AD 01 80 8D A2 07 A2 01 AD 01 A0   ..L.............
DDD0  29 01 D0 03 4C E1 DD AD 01 80 9D A2 07 E8 4C CD   )...L.........L.
DDE0  DD A2 FF 9A 20 4A D3 20 86 DB AD 8A C0 85 55 AD   .... J. ......U.
DDF0  8B C0 85 56 A9 00 85 01 85 00 58 4C 08 C1 A2 FF   ...V......XL....
```

COPYRIGHT TELEFIND INC. 1987

ESA TELECOMMUNICATIONS
10347 SOUTH OXFORD
CHICAGO RIDGE, ILLINOIS
60415

SOFTWARE:PENCO4.0 TONE SYNTHESIZER
PROGRAMMER: ROBERT A. KINAST
DATE:AUGUST 21,1987

```
      0  1  2  3  4  5  6  7  8  9  A  B  C  D  E  F
1000  20 D8 10 A9 00 8D 00 07 AD 00 08 29 01 D0 06 8D    ...........)....
1010  00 09 4C 03 10 A9 00 8D 00 07 AA AD 03 08 29 0F   ..L...........).
1020  9D 00 02 E8 A0 FF AD 00 08 29 01 D0 EE CA BD 00   .........)......
1030  02 C9 0F F0 04 E8 4C 43 10 AD 00 08 29 01 D0 DB   ......LC....)...
1040  4C 39 10 8E 00 07 AD 00 02 C9 01 F0 03 4C 53 10   L9...........LS.
1050  4C 02 11 C9 02 F0 03 4C 5D 10 4C 4A 11 C9 03 F0   L......L].LJ....
```

```
1060  03 4C 67 10 4C 92 11 C9 04 F0 03 4C 71 10 4C FD   .Lg.L......Lq.L.
1070  11 C9 05 F0 03 4C 7B 10 4C 86 12 C9 06 F0 03 4C   .....L{.L......L
1080  85 10 4C CC 12 C9 07 F0 03 4C 8F 10 4C 87 13 C9   ..L......L..L...
1090  08 F0 03 4C 99 10 4C 92 14 C9 09 F0 03 4C A3 10   ...L..L......L..
10A0  4C DA 14 C9 0A F0 03 4C AD 10 4C 2C 15 C9 0B F0   L......L..L,....
10B0  03 4C B7 10 4C 7E 15 C9 0C F0 03 4C C1 10 4C 5D   .L..L~.....L..L]
10C0  16 C9 0D F0 03 4C CB 10 4C AF 16 C9 0E F0 03 4C   .....L..L......L
10D0  D5 10 4C 01 17 4C 03 10 A2 00 8A 95 00 E8 D0 FB   ..L..L..........
10E0  A9 02 85 01 A9 07 85 02 A0 00 84 00 A6 02 A9 00   ................
10F0  91 00 C8 D0 FB E6 01 E4 01 B0 F5 60 A9 40 8D 01   ...........`.@..
      0  1  2  3  4  5  6  7  8  9  A  B  C  D  E  F
1100  08 60 20 FC 10 A2 01 BD 00 02 29 0F 85 01 20 27   .` .......)... '
1110  17 A5 01 09 C0 8D 01 08 09 D0 8D 01 08 8E 01 07   ................
1120  20 A0 17 A9 C0 8D 01 08 20 C5 17 AE 01 07 E8 EC    ....... .......
1130  00 07 F0 03 4C 07 11 A9 8F 8D 01 08 EA A9 AF 8D   ....L...........
1140  01 08 29 8F 8D 01 08 4C 03 10 20 FC 10 A2 01 BD   ..)....L.. .....
1150  00 02 29 0F 85 01 20 27 17 A5 01 09 C0 8D 01 08   ..`.. '.........
1160  09 D0 8D 01 08 8E 01 07 20 C5 17 A9 C0 8D 01 08   .... .. .......
1170  20 BA 17 AE 01 07 E8 EC 00 07 F0 03 4C 4F 11 A9    ...........LO..
1180  8F 8D 01 08 EA A9 AF 8D 01 08 29 EF 8D 01 08 4C   ...........)....L
1190  03 10 20 FC 10 A2 01 BD 00 02 29 0F 85 01 20 27   .. .......)... '
11A0  17 A5 01 09 C0 8D 01 08 09 D0 8D 01 08 20 F0 17   .............. ..
11B0  A9 C0 8D 01 08 20 C5 17 A2 02 BD 00 02 29 0F 85   ..... .......)..
11C0  01 20 27 17 A5 01 09 C0 8D 01 08 09 D0 8D 01 08   . '.............
11D0  8E 01 07 20 AD 17 A9 C0 8D 01 08 20 C5 17 AE 01   ... ....... ....
11E0  07 E8 EC 00 07 F0 03 4C BA 11 A9 8F 8D 01 08 EA   .......L........
11F0  A9 AF 8D 01 08 29 8F 8D 01 08 4C 03 10 20 FC 10   .....)....L.. ..
      0  1  2  3  4  5  6  7  8  9  A  B  C  D  E  F
1200  A9 00 8D 01 07 AD 01 02 29 0F 09 40 8D 01 08 EA   ........)..@....
1210  29 4F 09 60 8D 01 08 29 4F 8D 01 08 AD 00 08 29   )O.`...)O......)
1220  02 D0 03 4C 1C 12 EE 01 07 AD 01 07 C9 15 F0 03   ...L............
1230  4C 05 12 A9 CF 8D 01 08 EA 09 EF 8D 01 08 29 CF   L.............).
1240  8D 01 08 20 8A 17 20 95 17 A2 02 BD 00 02 29 0F   ... .. .......).
1250  09 C0 8D 01 08 EA 09 E0 8D 01 08 29 CF 8D 01 08   ...........)....
1260  AD 00 08 29 02 D0 03 4C 60 12 E8 EC 00 07 F0 03   ...)...L`.......
1270  4C 4B 12 A9 8F 8D 01 08 EA A9 AF 8D 01 08 29 8F   LK............).
1280  8D 01 08 4C 03 10 20 FC 10 A2 01 BD 00 02 29 0F   ...L.. .......).
1290  09 C0 8D 01 08 EA 09 E0 8D 01 08 29 CF 8D 01 08   ...........)....
12A0  AD 00 08 29 02 D0 03 4C A0 12 8E 01 07 AE 01 07   ...)...L........
12B0  E8 EC 00 07 F0 03 4C 8B 12 A9 8F 8D 01 08 EA A9   ......L.........
12C0  AF 8D 01 08 29 8F 8D 01 08 4C 03 10 20 FC 10 A9   ....)....L.. ...
12D0  00 8D 01 07 AD 01 02 29 0F 09 40 8D 01 08 EA 09   .......)..@.....
12E0  60 8D 01 08 29 5F 8D 01 08 AD 00 08 29 02 D0 03   `...)_......)...
12F0  4C E9 12 EE 01 07 AD 01 07 C9 15 F0 03 4C D4 12   L............L..
      0  1  2  3  4  5  6  7  8  9  A  B  C  D  E  F
1300  A9 CF 8D 01 08 EA A9 EF 8D 01 08 29 CF 8D 01 08   ...........)....
1310  20 8A 17 20 95 17 A2 02 BD 00 02 29 0F 09 C0 8D    .. .......)....
1320  01 08 EA 09 E0 8D 01 08 29 CF 8D 01 08 AD 00 08   ........)......
1330  29 02 D0 03 4C 2D 13 8E 01 07 AE 01 07 E8 EC 00   )...L-..........
1340  07 F0 03 4C 18 13 A9 00 8D 01 07 A9 0C 09 C0 8D   ...L............
1350  01 08 EA 09 E0 8D 01 08 29 CF 8D 01 08 AD 00 08   ........).......
1360  29 02 D0 03 4C 5D 13 EE 01 07 AD 01 07 C9 02 F0   )...L]..........
1370  03 4C 4B 13 A9 8F 8D 01 08 EA A9 AF 8D 01 08 29   .LK............)
1380  8F 8D 01 08 4C 03 10 20 FC 10 AD 01 02 29 0F 09   ....L.. .....)..
1390  C0 8D 01 08 09 D0 8D 01 08 20 CC 17 A9 C0 8D 01   ......... ......
13A0  08 20 95 17 A2 02 BD 00 02 29 0F 09 C0 8D 01 08   . .......)......
13B0  09 D0 8D 01 08 8E 01 07 20 8A 17 A9 C0 8D 01 08   ........ .......
13C0  20 95 17 AE 01 07 E8 EC 00 07 F0 03 4C A6 13 A9    ...........L...
13D0  CF 8D 01 08 EA A9 EF 8D 01 08 29 CF 8D 01 08 20   ...........)....
13E0  95 17 AD 01 02 29 0F 09 C0 8D 01 08 09 D0 8D 01   .....)..........
13F0  08 20 CC 17 A9 C0 8D 01 08 20 95 17 A2 02 BD 00   . ...... ......
      0  1  2  3  4  5  6  7  8  9  A  B  C  D  E  F
1400  02 29 0F 09 C0 8D 01 08 09 D0 8D 01 08 8E 01 07   .)..............
1410  20 8A 17 A9 C0 8D 01 08 20 95 17 AE 01 07 E8 EC    ...... .......
1420  00 07 F0 03 4C FE 13 A9 CF 8D 01 08 EA A9 EF 8D   ....L...........
1430  01 08 29 CF 8D 01 08 20 95 17 AD 01 02 29 0F 09   ..).... .....)..
1440  C0 8D 01 08 09 D0 8D 01 08 20 CC 17 A9 80 8D 01   ......... ......
```

```
1450  08 20 95 17 A2 02 BD 00 02 29 0F 09 80 8D 01 08   . ........)......
1460  09 90 8D 01 08 8E 01 07 20 8A 17 A9 80 8D 01 08   ........ .......
1470  20 95 17 AE 01 07 E8 EC 00 07 F0 03 4C 56 14 A9    ...........LV..
1480  8F 8D 01 08 EA A9 AF 8D 01 08 29 8F 8D 01 08 4C   ...........)....L
1490  03 10 20 FC 10 A2 01 BD 00 02 29 0F 85 01 20 27   .. ........)... '
14A0  17 A5 01 09 C0 8D 01 08 09 D0 8D 01 08 8E 01 07   ................
14B0  20 8A 17 A9 C0 8D 01 08 20 95 17 AE 01 07 E8 EC    ....... .......
14C0  00 07 F0 03 4C 97 14 A9 8F 8D 01 08 EA A9 AF 8D   ....L...........
14D0  01 08 29 8F 8D 01 08 4C 03 10 20 FC 10 A9 0F 20   ..)....L.. .....
14E0  0C 17 A2 01 BD 00 02 29 0F 8D 02 07 A2 02 BD 00   .......)........
14F0  02 29 0F 20 0C 17 E8 EC 00 07 F0 03 4C EE 14 A9   .). ........L...
      0  1  2  3  4  5  6  7  8  9  A  B  C  D  E  F
1500  0D 20 0C 17 A9 0C 20 0C 17 AD 02 07 20 0C 17 A9
1510  02 20 0C 17 A9 0F 20 0C 17 A9 8F 8D 01 08 EA A9   . .... ..... ...
1520  AF 8D 01 08 29 8F 8D 01 08 4C 03 10 20 FC 10 A9   . .... .........
1530  0F 20 0C 17 A2 01 BD 00 02 29 0F 8D 02 07 A2 02   ....)....L.. ...
1540  BD 00 02 29 0F 20 0C 17 E8 EC 00 07 F0 03 4C 40   . .......)......
1550  15 A9 0D 20 0C 17 A9 0C 20 0C 17 AD 02 07 20 0C   ...). ........L@
1560  17 A9 03 20 0C 17 A9 0F 20 0C 17 A9 8F 8D 01 08   ... .... ..... .
1570  EA A9 AF 8D 01 08 29 8F 8D 01 08 4C 03 10 CE 00   ... .... .......
1580  07 20 FC 10 A9 0F 20 0C 17 A2 01 BD 00 02 29 0F   ......)....L....
1590  8D 02 07 A2 02 BD 00 02 29 0F 20 0C 17 E8 E0 07   . .... .......).
15A0  F0 03 4C 95 15 A9 0B 20 0C 17 A9 0D 20 0C 17 AD   ........). .....
15B0  02 07 20 0C 17 A9 0E 20 0C 17 A9 00 20 0C 17 A9   ..L.... .... ...
15C0  0B 20 0C 17 A9 0D 20 0C 17 AD 00 07 C9 0D F0 07   .. .... .... ...
15D0  C9 10 F0 06 4C DD 15 4C FD 15 4C 2A 16 A2 07 BD   .. .... ........
15E0  00 02 29 0F 20 0C 17 EC 00 07 F0 04 E8 4C DF 15   ....L..L..L*....
15F0  A9 0B 20 0C 17 A9 0F 20 0C 17 4C 6B 15 A2 07 BD   ..). ........L..
      0  1  2  3  4  5  6  7  8  9  A  B  C  D  E  F   .. .... ..Lk....
1600  00 02 29 0F 20 0C 17 E0 09 F0 04 E8 4C FF 15 A9
1610  0C 20 0C 17 A2 0A BD 00 02 29 0F 20 0C 17 EC 00   ..). .......L...
1620  07 F0 04 E8 4C 16 16 4C F0 15 A2 07 BD 00 02 29   . ........). ....
1630  0F 20 0C 17 E0 09 F0 04 E8 4C 2C 16 A9 0C 20 0C   ....L..L.......)
1640  17 A2 0A BD 00 02 29 0F 20 0C 17 E0 0C F0 04 E8   . .......L,.... .
1650  4C 43 16 A9 0C 20 0C 17 A2 0D 4C 16 16 20 FC 10   ......). .......
1660  A9 0F 20 0C 17 A2 01 BD 00 02 29 0F 8D 02 07 A2   LC... ....L.. ..
1670  02 BD 00 02 29 0F 20 0C 17 E8 EC 00 07 F0 03 4C   .. ........).....
1680  71 16 A9 0C 20 0C 17 A9 0B 20 0C 17 AD 02 07 20   ....). ........L
1690  0C 17 A9 07 20 0C 17 A9 0F 20 0C 17 A9 8F 8D 01   q... .... .....
16A0  08 EA A9 AF 8D 01 08 29 8F 8D 01 08 4C 03 10 20   .... .... ......
16B0  FC 10 A9 0F 20 0C 17 A2 01 BD 00 02 29 0F 8D 02   .......)....L..
16C0  07 A2 02 BD 00 02 29 0F 20 0C 17 E8 EC 00 07 F0   .... ........)...
16D0  03 4C C3 16 A9 0C 20 0C 17 A9 0B 20 0C 17 AD 02   ......). .......
16E0  07 20 0C 17 A9 08 20 0C 17 A9 0F 20 0C 17 A9 8F   .L.... .... ....
16F0  8D 01 08 EA A9 AF 8D 01 08 29 8F 8D 01 08 4C 03   . .... .... ....
      0  1  2  3  4  5  6  7  8  9  A  B  C  D  E  F   ..........)....L.
1700  10 AD 01 02 29 0F 8D 02 07 4C 03 10 09 C0 8D 01
1710  08 EA 09 E0 8D 01 08 29 CF 8D 01 08 AD 00 08 29   ....)....L......
1720  02 D0 03 4C 1C 17 60 A5 01 C9 00 F0 03 4C 35 17   .......).......)
1730  A9 0A 85 01 60 A5 01 C9 0E F0 03 4C 43 17 A9 0B   ...L..`......L5.
1740  85 01 60 A5 01 C9 0F F0 03 4C 51 17 A9 0C 85 01   ....`......LC...
1750  60 A5 01 C9 0A F0 03 4C 5F 17 A9 0D 85 01 60 A5   ..`......LQ.....
1760  01 C9 0B F0 03 4C 6D 17 A9 CE 85 01 60 A5 01 C9   `......L_.....`.
1770  0C F0 03 4C 7B 17 A9 0F 85 01 60 A5 01 C9 0D F0   .....Lm.....`...
1780  03 4C 89 17 A9 00 85 01 60 60 A0 F9 A2 1B CA D0   ...L{.....`.....
1790  FD 88 D0 F8 60 A0 F9 A2 0B CA D0 FD 88 D0 F8 60   .L......``......
17A0  20 8A 17 20 8A 17 20 95 17 20 95 17 60 20 8A 17   ....`..........`
17B0  20 95 17 20 95 17 20 95 17 60 A0 F9 A2 1F CA D0    .. .. .. ..` ..
17C0  FD 88 D0 F8 60 20 8A 17 20 95 17 60 A9 00 8D 03    .. .. .. `......
17D0  07 A0 FF A2 C3 CA D0 FD 88 D0 F8 EE 03 07 AD 03   ....` .. ..`....
17E0  07 C9 03 D0 EC A0 FF A2 B7 CA D0 FD 88 D0 F8 60   ................
17F0  A9 00 8D 03 07 A0 FF A2 C3 CA D0 FD 88 D0 F8 EE   ...............`
      0  1  2  3  4  5  6  7  8  9  A  B  C  D  E  F   ................
1800  03 07 AD 03 07 C9 0C D0 EC 60 A9 00 8D 00 07 8D   .........`......
1810  00 02 8D 01 07 A9 8F 8D 01 08 EA A9 AF 8D 01 08   ................
1820  29 8F 8D 01 08 A2 FF 9A 4C 00 10 FF FF FF FF FF   )......L........
1830  FF FF FF FF FF FF FF FF FF FF FF FF FF FF FF FF   ................
```

| | | | | | | | | | | | | | | | | | |
|---|---|---|---|---|---|---|---|---|---|---|---|---|---|---|---|---|---|
| 1840 | FF | FF | FF | FF | FF | FF | FF | FF | FF | FF | FF | FF | FF | FF | FF | FF | ................ |
| 1850 | FF | FF | FF | FF | FF | FF | FF | FF | FF | FF | FF | FF | FF | FF | FF | FF | ................ |
| 1860 | FF | FF | FF | FF | FF | FF | FF | FF | FF | FF | FF | FF | FF | FF | FF | FF | ................ |
| 1870 | FF | FF | FF | FF | FF | FF | FF | FF | FF | FF | FF | FF | FF | FF | FF | FF | ................ |
| 1880 | FF | FF | FF | FF | FF | FF | FF | FF | FF | FF | FF | FF | FF | FF | FF | FF | ................ |
| 1890 | FF | FF | FF | FF | FF | FF | FF | FF | FF | FF | FF | FF | FF | FF | FF | FF | ................ |
| 18A0 | FF | FF | FF | FF | FF | FF | FF | FF | FF | FF | FF | FF | FF | FF | FF | FF | ................ |
| 18B0 | FF | FF | FF | FF | FF | FF | FF | FF | FF | FF | FF | FF | FF | FF | FF | FF | ................ |
| 18C0 | FF | FF | FF | FF | FF | FF | FF | FF | FF | FF | FF | FF | FF | FF | FF | FF | ................ |
| 18D0 | FF | FF | FF | FF | FF | FF | FF | FF | FF | FF | FF | FF | FF | FF | FF | FF | ................ |
| 18E0 | FF | FF | FF | FF | FF | FF | FF | FF | FF | FF | FF | FF | FF | FF | FF | FF | ................ |
| 18F0 | FF | FF | FF | FF | FF | FF | FF | FF | FF | FF | FF | FF | FF | FF | FF | FF | ................ |
| | 0 | 1 | 2 | 3 | 4 | 5 | 6 | 7 | 8 | 9 | A | B | C | D | E | F | |
| 1900 | FF | FF | FF | FF | FF | FF | FF | FF | FF | FF | FF | FF | FF | FF | FF | FF | ................ |
| 1910 | FF | FF | FF | FF | FF | FF | FF | FF | FF | FF | FF | FF | FF | FF | FF | FF | ................ |
| 1920 | FF | FF | FF | FF | FF | FF | FF | FF | FF | FF | FF | FF | FF | FF | FF | FF | ................ |
| 1930 | FF | FF | FF | FF | FF | FF | FF | FF | FF | FF | FF | FF | FF | FF | FF | FF | ................ |
| 1940 | FF | FF | FF | FF | FF | FF | FF | FF | FF | FF | FF | FF | FF | FF | FF | FF | ................ |
| 1950 | FF | FF | FF | FF | FF | FF | FF | FF | FF | FF | FF | FF | FF | FF | FF | FF | ................ |
| 1960 | FF | FF | FF | FF | FF | FF | FF | FF | FF | FF | FF | FF | FF | FF | FF | FF | ................ |
| 1970 | FF | FF | FF | FF | FF | FF | FF | FF | FF | FF | FF | FF | FF | FF | FF | FF | ................ |
| 1980 | FF | FF | FF | FF | FF | FF | FF | FF | FF | FF | FF | FF | FF | FF | FF | FF | ................ |
| 1990 | FF | FF | FF | FF | FF | FF | FF | FF | FF | FF | FF | FF | FF | FF | FF | FF | ................ |
| 19A0 | FF | FF | FF | FF | FF | FF | FF | FF | FF | FF | FF | FF | FF | FF | FF | FF | ................ |
| 19B0 | FF | FF | FF | FF | FF | FF | FF | FF | FF | FF | FF | FF | FF | FF | FF | FF | ................ |
| 19C0 | FF | FF | FF | FF | FF | FF | FF | FF | FF | FF | FF | FF | FF | FF | FF | FF | ................ |
| 19D0 | FF | FF | FF | FF | FF | FF | FF | FF | FF | FF | FF | FF | FF | FF | FF | FF | ................ |
| 19E0 | FF | FF | FF | FF | FF | FF | FF | FF | FF | FF | FF | FF | FF | FF | FF | FF | ................ |
| 19F0 | FF | FF | FF | FF | FF | FF | FF | FF | FF | FF | FF | FF | FF | FF | FF | FF | ................ |
| | 0 | 1 | 2 | 3 | 4 | 5 | 6 | 7 | 8 | 9 | A | B | C | D | E | F | |
| 1A00 | FF | FF | FF | FF | FF | FF | FF | FF | FF | FF | FF | FF | FF | FF | FF | FF | ................ |
| 1A10 | FF | FF | FF | FF | FF | FF | FF | FF | FF | FF | FF | FF | FF | FF | FF | FF | ................ |
| 1A20 | FF | FF | FF | FF | FF | FF | FF | FF | FF | FF | FF | FF | FF | FF | FF | FF | ................ |
| 1A30 | FF | FF | FF | FF | FF | FF | FF | FF | FF | FF | FF | FF | FF | FF | FF | FF | ................ |
| 1A40 | FF | FF | FF | FF | FF | FF | FF | FF | FF | FF | FF | FF | FF | FF | FF | FF | ................ |
| 1A50 | FF | FF | FF | FF | FF | FF | FF | FF | FF | FF | FF | FF | FF | FF | FF | FF | ................ |
| 1A60 | FF | FF | FF | FF | FF | FF | FF | FF | FF | FF | FF | FF | FF | FF | FF | FF | ................ |
| 1A70 | FF | FF | FF | FF | FF | FF | FF | FF | FF | FF | FF | FF | FF | FF | FF | FF | ................ |
| 1A80 | FF | FF | FF | FF | FF | FF | FF | FF | FF | FF | FF | FF | FF | FF | FF | FF | ................ |
| 1A90 | FF | FF | FF | FF | FF | FF | FF | FF | FF | FF | FF | FF | FF | FF | FF | FF | ................ |
| 1AA0 | FF | FF | FF | FF | FF | FF | FF | FF | FF | FF | FF | FF | FF | FF | FF | FF | ................ |
| 1AB0 | FF | FF | FF | FF | FF | FF | FF | FF | FF | FF | FF | FF | FF | FF | FF | FF | ................ |
| 1AC0 | FF | FF | FF | FF | FF | FF | FF | FF | FF | FF | FF | FF | FF | FF | FF | FF | ................ |
| 1AD0 | FF | FF | FF | FF | FF | FF | FF | FF | FF | FF | FF | FF | FF | FF | FF | FF | ................ |
| 1AE0 | FF | FF | FF | FF | FF | FF | FF | FF | FF | FF | FF | FF | FF | FF | FF | FF | ................ |
| 1AF0 | FF | FF | FF | FF | FF | FF | FF | FF | FF | FF | FF | FF | FF | FF | FF | FF | ................ |
| | 0 | 1 | 2 | 3 | 4 | 5 | 6 | 7 | 8 | 9 | A | B | C | D | E | F | |
| 1B00 | FF | FF | FF | FF | FF | FF | FF | FF | FF | FF | FF | FF | FF | FF | FF | FF | ................ |
| 1B10 | FF | FF | FF | FF | FF | FF | FF | FF | FF | FF | FF | FF | FF | FF | FF | FF | ................ |
| 1B20 | FF | FF | FF | FF | FF | FF | FF | FF | FF | FF | FF | FF | FF | FF | FF | FF | ................ |
| 1B30 | FF | FF | FF | FF | FF | FF | FF | FF | FF | FF | FF | FF | FF | FF | FF | FF | ................ |
| 1B40 | FF | FF | FF | FF | FF | FF | FF | FF | FF | FF | FF | FF | FF | FF | FF | FF | ................ |
| 1B50 | FF | FF | FF | FF | FF | FF | FF | FF | FF | FF | FF | FF | FF | FF | FF | FF | ................ |
| 1B60 | FF | FF | FF | FF | FF | FF | FF | FF | FF | FF | FF | FF | FF | FF | FF | FF | ................ |
| 1B70 | FF | FF | FF | FF | FF | FF | FF | FF | FF | FF | FF | FF | FF | FF | FF | FF | ................ |
| 1B80 | FF | FF | FF | FF | FF | FF | FF | FF | FF | FF | FF | FF | FF | FF | FF | FF | ................ |
| 1B90 | FF | FF | FF | FF | FF | FF | FF | FF | FF | FF | FF | FF | FF | FF | FF | FF | ................ |
| 1BA0 | FF | FF | FF | FF | FF | FF | FF | FF | FF | FF | FF | FF | FF | FF | FF | FF | ................ |
| 1BB0 | FF | FF | FF | FF | FF | FF | FF | FF | FF | FF | FF | FF | FF | FF | FF | FF | ................ |
| 1BC0 | FF | FF | FF | FF | FF | FF | FF | FF | FF | FF | FF | FF | FF | FF | FF | FF | ................ |
| 1BD0 | FF | FF | FF | FF | FF | FF | FF | FF | FF | FF | FF | FF | FF | FF | FF | FF | ................ |
| 1BE0 | FF | FF | FF | FF | FF | FF | FF | FF | FF | FF | FF | FF | FF | FF | FF | FF | ................ |
| 1BF0 | FF | FF | FF | FF | FF | FF | FF | FF | FF | FF | FF | FF | FF | FF | FF | FF | ................ |

COPYRIGHT TELEFIND INC. 1987

ESA TELECOMMUNICATIONS
10347 SOUTH OXFORD
CHICAGO RIDGE, ILLINOIS
60415
PROGRAMMER: ROBERT A. KINAST

SOFTWARE:MF2.0 MFTRUNK BOARD
DATE:NOVEMBER 25,1986

```
      0  1  2  3  4  5  6  7  8  9  A  B  C  D  E  F
1000  4B 14 72 14 A0 14 DA 14 0A 15 3D 15 02 16 22 17   K.r.......=...".
1010  7C 17 21 18 C3 18 F0 18 3F 19 69 19 CA 19 F1 19   !.!.....?.i.....
1020  19 1A 47 1A 81 1A 99 1A B3 1A 49 1B A6 1B A9 1B   ..G.......I.....
1030  16 1C 64 18 7E 18 18 D8 58 8D 00 F0 AD 04 0A 29   ..d.~...X......)
1040  01 D0 F6 AD 03 0A 29 01 D0 06 8D 00 FF 4C 36 10   ......).......L6.
1050  AD 00 0E 29 0F C9 00 F0 03 4C 5F 10 4C D0 10 C9   ...).....L_.L...
1060  01 F0 03 4C 69 10 4C 11 11 C9 03 F0 03 4C 73 10   ...Li.L......Ls.
1070  4C 52 11 C9 04 F0 03 4C 7D 10 4C 7F 11 C9 05 F0   LR.....L}.L.....
1080  03 4C 87 10 4C AC 11 C9 06 F0 03 4C 91 10 4C B5   .L..L......L..L.
1090  11 C9 0A F0 03 4C 9B 10 4C BE 11 C9 0B F0 03 4C   .....L..L......L
10A0  A5 10 4C DA 11 C9 08 F0 03 4C AF 10 4C F9 11 C9   ..L......L..L...
10B0  09 F0 03 4C B9 10 4C 6C 12 C9 0C F0 03 4C C3 10   ...L..Ll.....L..
10C0  4C DF 12 C9 0D F0 03 4C CD 10 4C FE 12 4C 1D 13   L......L..L..L..
10D0  EA AD 00 0A 29 01 D0 03 4C F7 10 A9 06 8D 06 06   ....)...L.......
10E0  78 20 84 1B AD 10 10 85 02 AD 11 10 85 03 A9 00   x ..............
10F0  8D 00 0F 58 4C 1D 13 78 A9 00 8D 06 06 20 20 14   ...XL..x.....  .
      0  1  2  3  4  5  6  7  8  9  A  B  C  D  E  F
1100  AD 00 10 85 02 AD 01 10 85 03 20 2D 13 58 4C 1D   .......... -.XL.
1110  13 EA AD 01 0A 29 01 D0 03 4C 38 11 A9 06 8D 07   .....)...L8.....
1120  06 78 20 95 1B AD 10 10 85 04 AD 11 10 85 05 A9   .x .............
1130  00 8D 01 0F 58 4C 1D 13 78 A9 00 8D 07 06 20 20   ....XL..x.....
1140  14 AD 00 10 85 04 AD 01 10 85 05 20 74 13 58 4C   ........... t.XL
1150  1D 13 A9 01 8D 00 0F 8D 0C 06 A9 00 8D 00 0B 8D   ................
1160  17 06 20 84 1B 20 E8 13 20 04 14 A9 03 8D 06 06   .. .. .. .......
1170  78 AD 10 10 85 02 AD 11 10 85 03 58 4C 1D 13 A9   x..........XL...
1180  01 8D 01 0F 8D 0D 06 20 95 1B 20 F6 13 20 12 14   ....... .. .. ..
1190  A9 00 8D 01 0B 8D 18 06 A9 03 8D 07 06 78 AD 10   .............x..
11A0  10 85 04 AD 11 10 85 05 58 4C 1D 13 AD 06 06 8D   ........XL......
11B0  00 0D 4C 1D 13 AD 07 06 8D 00 0D 4C 1D 13 20 2D   ..L........L.. -
11C0  13 A9 01 8D 00 0F A9 09 8D 06 06 78 AD 2C 10 85   ...........x.,..
11D0  02 AD 2D 10 85 03 58 4C 1D 13 20 95 1B 20 74 13   ..-...XL.. .. t.
11E0  A9 01 8D 01 0F A9 09 8D 07 06 78 AD 2E 10 85 04   ..........x.....
11F0  AD 2F 10 85 05 58 4C 1D 13 20 2D 13 A2 00 AD 03   ./...XL.. -.....
      0  1  2  3  4  5  6  7  8  9  A  B  C  D  E  F
1200  0A 29 01 D0 03 4C 18 12 AD 00 0E 29 0F C9 0A F0   .)...L.....)....
1210  07 9D 00 04 E8 4C FE 11 8E 19 06 AD 60 06 29 01   .....L......`.).
1220  D0 03 4C 32 12 AD 03 0A 29 01 D0 03 4C 25 12 4C   ..L2....)...L%.L
1230  41 12 78 AD 14 10 85 02 AD 15 10 85 03 58 4C 1D   A.x..........XL.
1240  13 A2 00 AD 03 0A 29 01 D0 03 4C 59 12 BD 00 0E   ......)...LY....
1250  29 0F 9D 7F 04 E8 4C 43 12 8E 1B 06 A9 01 8D 61   ).....LC.......a
1260  06 4C 32 12 A9 0A 8D 06 06 4C CB 11 20 74 13 A2   .L2......L.. t..
1270  00 AD 03 0A 29 01 D0 03 4C E3 12 AD 00 0E 29 0F   ....)...L.....).
1280  C9 0A F0 07 9D 00 05 E8 4C 71 12 8E 1A 06 AD 60   ........Lq.....`
1290  06 29 01 D0 03 4C A5 12 AD 03 0A 29 01 D0 03 4C   .)...L.....)...L
12A0  98 12 4C B4 12 78 AD 14 10 85 04 AD 15 10 85 05   ..L..x..........
12B0  58 4C 1D 13 A2 00 AD 03 0A 29 01 D0 03 4C CC 12   XL.......)...L..
12C0  BD 00 0E 29 0F 9D 7F 05 E8 4C B6 12 8E 1C 06 A9   ...).....L......
12D0  01 8D 62 06 4C A5 12 A9 0A 8D 07 06 4C EA 11 AD   ..b.L.......L...
12E0  17 06 8D 00 0D A2 00 BD 00 02 8D 00 0D E8 EC 17   ................
12F0  06 B0 03 4C E7 12 20 84 1B A9 00 4C 57 11 AD 18   ...L.. ....LW...

      0  1  2  3  4  5  6  7  8  9  A  B  C  D  E  F
1300  06 8D 00 0D A2 00 BD 00 03 8D 00 0D E8 EC 18 06   ................
1310  B0 03 4C 06 13 20 95 1B A9 00 4C 84 11 AD 03 0A   ..L.. ....L.....
1320  29 01 D0 03 4C 36 10 AD 00 0E 4C 1D 13 20 84 1B   )...L6....L.. ..
1330  20 E8 13 20 04 14 A9 00 8D 00 0F 8D 06 0B 8D 00    .. ............
1340  0B 8D 08 06 8D 0C 06 8D 0E 06 8D 0F 06 8D 15 06   ................
1350  8D 17 06 8D 1B 06 8D 63 06 A2 00 9D 00 02 E8 E0   ........c.......
```

```
1360  FF D0 F8 8D FF 02 A2 00 9D 00 04 E8 E0 FF D0 F8   ................
1370  8D FF 04 60 20 95 1B 20 F6 13 20 12 14 A9 00 8D   ...` .. .. .....
1380  01 0F 8D 07 0B 8D 01 0B 8D 09 06 8D 0D 06 8D 10   ................
1390  06 8D 11 06 8D 18 06 8D 19 06 8D 1C 06 8D 16 06   ................
13A0  8D 64 06 A2 00 9D 00 03 E8 E0 FF D0 F8 8D FF 03   .d..............
13B0  A2 00 9D 00 05 E8 E0 FF D0 F8 8D FF 05 60 E0 00   .............`..
13C0  F0 05 E0 01 F0 07 60 A9 11 8D 0B 06 60 A9 21 8D   ......`.....`.!.
13D0  0B 06 60 E0 00 F0 05 E0 01 F0 07 60 A9 11 8D 0A   ..`........`....
13E0  06 60 A9 21 8D 0A 06 60 AD 0B 06 C9 11 F0 01 60   .`.!...`.......`
13F0  A9 00 8D 0B 06 60 AD 0B 06 C9 21 F0 01 60 A9 00   .....`....!..`..
      0  1  2  3  4  5  6  7  8  9  A  B  C  D  E  F
1400  8D 0B 06 60 AD 0A 06 C9 11 F0 01 60 A9 00 8D 0A   ...`.......`....
1410  06 60 AD 0A 06 C9 21 F0 01 60 A9 00 8D 0A 06 60   .`....!..`.....`
1420  AD 0A 06 C9 00 F0 01 60 AD 00 09 60 48 98 48 8A   .......`...`H.H.
1430  48 78 18 A2 00 8E 05 06 6C 02 00 18 A2 01 8E 05   Hx......l.......
1440  06 6C 04 00 68 AA 68 A8 68 58 40 BD 00 0A 29 01   .l..h.h.hX@...).
1450  D0 08 A9 00 9D 06 06 4C 50 18 20 48 18 AD 02 10   .......LP. H....
1460  95 02 AD 03 10 95 03 AE 05 06 A9 00 9D 08 06 4C   ...............L
1470  50 18 BD 00 0A 29 01 D0 10 20 48 18 AD 00 10 95   P....)... H.....
1480  02 AD 01 10 95 03 4C 67 14 FE 08 06 BD 08 06 C9   ......Lg........
1490  02 B0 03 4C 50 18 A9 00 9D 08 06 A9 02 9D 06 06   ...LP...........
14A0  AD 0A 06 29 01 D0 03 4C BA 14 20 48 18 AD 04 10   ...)...L.. H....
14B0  95 02 AD 05 10 95 03 4C 50 18 A9 01 9D 00 0F 20   .......LP......
14C0  D3 13 20 48 18 A9 00 9D 0E 06 9D 0F 06 AD 06 10   .. H............
14D0  95 02 AD 07 10 95 03 4C 50 18 20 48 18 FE 0E 06   .......LP. H....
14E0  BD 0E 06 C9 2A B0 03 4C 50 18 A9 00 9D 0E 06 AE   ....*..LP.......
14F0  05 06 9D 00 0F A9 01 9D 00 0B 20 48 18 AD 08 10   .......... H....
      0  1  2  3  4  5  6  7  8  9  A  B  C  D  E  F
1500  95 02 AD 09 10 95 03 4C 50 18 AD 02 0A 29 01 D0   .......LP....)..
1510  03 4C 17 15 4C DD 15 20 48 18 18 BD 0F 06 69 01   .L..L.. H.....i.
1520  9D 0F 06 BD 0E 06 69 00 9D 0E 06 18 C9 02 B0 03   ......i.........
1530  4C 50 18 BD 0F 06 C9 58 B0 03 4C 50 18 AE 05 06   LP.....X..LP....
1540  BD 00 0A 29 01 D0 2F A9 00 9D 06 06 9D 08 06 BD   ...)../.........
1550  0A 06 9D 00 0B 9D 63 06 9D 00 0F 9D 17 06 20 48   ......c....... H
1560  18 A9 00 9D 0F 06 9D 0E 06 AD 00 10 95 02 AD 01   ................
1570  10 95 03 4C 67 14 AD 2B 06 29 01 D0 03 4C 83 15   ...Lg..+.)...L..
1580  4C CD 15 AE 05 06 A9 00 8D 0A 06 A9 08 9D 06 06   L...............
1590  A9 01 8D 02 0F AE 05 06 E0 00 F0 04 E0 01 F0 08   ................
15A0  A9 01 8D 2B 06 4C AD 15 A9 11 8D 2B 06 AD 02 0A   ...+.L.....+....
15B0  29 01 D0 03 4C BD 15 AD 00 09 4C AD 15 20 48 18   )...L.....L.. H.
15C0  AD 2C 10 95 02 AD 2D 10 95 03 4C 50 18 20 48 18   .,....-...LP. H.
15D0  AD 0A 10 95 02 AD 0B 10 95 03 4C 50 18 AE 05 06   ..........LP....
15E0  AD 00 09 C9 A4 F0 03 4C 3D 15 20 48 18 A9 00 9D   .......L=. H....
15F0  0F 06 9D 0E 06 AD 0C 10 95 02 AD 0D 10 95 03 4C   ...............L
      0  1  2  3  4  5  6  7  8  9  A  B  C  D  E  F
1600  50 18 AD 02 0A 29 01 D0 16 20 48 18 18 BD 0E 06   P....)... H.....
1610  69 01 9D 0E 06 C9 28 B0 03 4C 50 18 4C 3D 15 AD   i.....(..LP.L=..
1620  00 09 C9 B0 F0 06 20 6E 16 4C E1 16 AE 05 06 AD   ...... n.L......
1630  65 06 D0 03 4C 5E 16 BD 63 06 29 01 D0 20 A9 0E   e...L^..c.).. ..
1640  20 8E 18 AE 05 06 A9 01 9D 00 0F 9D 63 06 20 48    ...........c. H
1650  18 AD 08 10 95 02 AD 09 10 95 03 4C 50 18 20 48   ...........LP. H
1660  18 AD 0E 10 95 02 AD 0F 10 95 03 4C 50 18 AD 00   ...........LP...
1670  09 C9 83 F0 03 4C 7B 16 A9 01 60 C9 85 F0 03 4C   .....L{...`....L
1680  85 16 A9 02 60 C9 86 F0 03 4C 8F 16 A9 03 60 C9   ....`....L....`.
1690  89 F0 03 4C 99 16 A9 04 60 C9 8A F0 03 4C A3 16   ...L....`....L..
16A0  A9 05 60 C9 8C F0 03 4C AD 16 A9 06 60 C9 91 F0   ..`....L....`...
16B0  03 4C B7 16 A9 07 60 C9 92 F0 03 4C C1 16 A9 08   .L....`....L....
16C0  60 C9 94 F0 03 4C CB 16 A9 09 60 C9 98 F0 03 4C   `....L....`....L
16D0  D5 16 A9 00 60 C9 A4 F0 05 68 68 4C 3D 15 4C 50   ....`....hhL=.LP
16E0  18 AE 05 06 8D 14 06 BC 17 06 E0 00 F0 03 4C FA   ..............L.
16F0  16 AD 14 06 99 00 02 4C 00 17 AD 14 06 99 00 03   .......L........
      0  1  2  3  4  5  6  7  8  9  A  B  C  D  E  F
1700  C8 98 9D 17 06 A9 00 8D 14 06 20 48 18 A9 00 9D   .......... H....
1710  0E 06 9D 0F 06 AD 0C 10 95 02 AD 0D 10 95 03 4C   ...............L
1720  50 18 A9 00 8D 0A 06 AD 2B 06 29 01 D0 4B A9 01   P.......+.)..K..
1730  9D 06 06 8D 02 0F AE 05 06 E0 00 F0 04 E0 01 F0   ................
1740  08 A9 01 8D 2B 06 4C 4E 17 A9 11 8D 2B 06 AE 05   ....+.LN....+...
```

```
1750  06 A9 00 9D 0C 06 9D 00 0B 8D 0A 06 BD 06 06 C9   ................
1760  05 F0 03 4C 69 17 4C BD 15 20 48 18 AD 10 10 95   ...Li.L.. H.....
1770  02 AD 11 10 95 03 4C 50 18 4C 50 18 BD 00 0A 29   ......LP.LP....)
1780  01 D0 03 4C 21 18 BD 0C 06 29 01 D0 03 4C 50 18   ...L!....)...LP.
1790  BD 05 0A 29 01 D0 33 BD 17 06 C9 01 B0 03 4C 50   ...)..3.......LP
17A0  18 20 48 18 18 BD 0F 06 69 01 9D 0F 06 BD 0E 06   . H.....i.......
17B0  69 00 9D 0E 06 18 C9 03 B0 03 4C 50 18 BD 0F 06   i.........LP....
17C0  C9 E8 B0 03 4C 50 18 4C 2C 16 AE 05 06 BD 01 0C   ....LP.L,.......
17D0  29 0F C9 0C F0 03 4C DC 17 4C 10 18 BC 17 06 E0   ).....L..L......
17E0  00 F0 03 4C EC 17 99 00 02 4C EF 17 99 00 03 C8   ...L.....L......
17F0  98 9D 17 06 C0 10 B0 18 20 48 18 A9 00 9D 0E 06   ........ H......
      0  1  2  3  4  5  6  7  8  9  A  B  C  D  E  F
1800  9D 0F 06 AD 32 10 95 02 AD 33 10 95 03 4C 50 18   ....2....3...LP.
1810  18 20 48 18 AD 34 10 95 02 AD 35 10 95 03 4C 50   . H..4....5...LP
1820  18 20 48 18 AD 2B 06 29 01 D0 03 4C 3B 18 AD 12   . H..+.)...L;...
1830  10 95 02 AD 13 10 95 03 4C 50 18 AE 05 06 A9 05   ........LP......
1840  9D 06 06 A9 01 4C 33 17 AE 05 06 18 8A 2A AA 60   .....L3......*.`
1850  AD 05 06 C9 00 F0 07 C9 01 F0 06 4C 61 18 4C 3B   ...........La.L;
1860  14 4C 44 14 AE 05 06 BD 05 0A 29 01 D0 0D 20 48   .LD.......)... H
1870  18 AD 10 10 95 02 AD 11 10 95 03 4C 50 18 AE 05   ...........LP...
1880  06 BD 05 0A 29 01 D0 03 4C 2C 16 4C 50 18 AE 05   ....)...L,.LP...
1890  06 8D 14 06 BC 17 06 E0 00 F0 03 4C A7 18 AD 14   ...........L....
18A0  06 99 00 02 4C AD 18 AD 14 06 99 00 03 C8 98 9D   ....L...........
18B0  17 06 A9 00 8D 14 06 20 48 18 A9 00 9D 0E 06 9D   ....... H.......
18C0  0F 06 60 AD 0B 06 29 01 D0 23 A9 01 9D 00 0F 9D   ..`...)..#......
18D0  06 0B 20 BE 13 20 48 18 A9 00 9D 0F 06 9D 0E 06   .. .. H.........
18E0  AD 16 10 95 02 AD 17 10 95 03 4C 50 18 4C 50 18   ..........LP.LP.
18F0  BD 00 0A 29 01 D0 30 A9 00 9D 06 06 20 48 18 18   ...)..0..... H..
      0  1  2  3  4  5  6  7  8  9  A  B  C  D  E  F
1900  BD 0F 06 69 01 9D 0F 06 BD 0E 06 69 00 9D 0E 06   ...i.......i....
1910  C9 03 B0 03 4C 50 18 BD 0F 06 C9 E8 B0 03 4C 50   ....LP........LP
1920  18 AE 05 06 4C 9B 19 AE 05 06 A9 01 9D 08 06 20   ....L...........
1930  48 18 AD 18 10 95 02 AD 19 10 95 03 4C 50 18 BD   H...........LP..
1940  00 0A 29 01 D0 06 20 48 18 4C E0 18 FE 08 06 BD   ..)... H.L......
1950  08 06 C9 1C B0 03 4C 50 18 20 48 18 AD 1A 10 95   ......LP. H.....
1960  02 AD 1B 10 95 03 4C 50 18 BD 00 0A 29 01 D0 1B   ......LP....)...
1970  A9 00 9D 08 06 20 48 18 9D 0F 06 9D 0E 06 AD 1C   ..... H.........
1980  10 95 02 AD 1D 10 95 03 4C 50 18 AE 05 06 FE 08   ........LP......
1990  06 BD 08 06 C9 64 B0 03 4C 50 18 AD 60 06 29 01   .....d..LP..`.).
19A0  D0 03 4C AF 19 BD 61 06 29 01 D0 03 4C C5 19 A9   ..L...a.)...L...
19B0  07 9D 06 06 A9 00 9D 00 0F 9D 06 0B 8D 0B 06 20   ................
19C0  48 18 4C 16 1C A9 09 4C B1 19 FE 08 06 BD 08 06   H.L....L........
19D0  C9 64 B0 03 4C 50 18 A9 00 9D 08 06 A9 19 8D 00   .d..LP..........
19E0  08 20 48 18 AD 1E 10 95 02 AD 1F 10 95 03 4C 50   . H...........LP
19F0  18 FE 08 06 BD 08 06 C9 18 B0 03 4C 50 18 A9 00   ...........LP...
      0  1  2  3  4  5  6  7  8  9  A  B  C  D  E  F
1A00  8D 00 08 9D 08 06 9D 15 06 20 48 18 AD 20 10 95   ......... H.. ..
1A10  02 AD 21 10 95 03 4C 50 18 FE 08 06 BD 08 06 C9   ..!...LP........
1A20  0F B0 03 4C 50 18 A9 00 9D 08 06 18 BD 15 06 DD   ...LP...........
1A30  19 06 B0 03 4C 47 1A 20 48 18 AD 26 10 95 02 AD   ....LG. H..&....
1A40  27 10 95 03 4C 50 18 AE 05 06 BD 15 06 A8 9D 15   '...LP..........
1A50  06 E0 00 F0 03 4C 5E 1A B9 00 04 4C 61 1A B9 00   .....L^....La...
1A60  05 20 AC 1B 8D 00 08 C8 98 9D 15 06 A9 00 9D 08   . ..............
1A70  06 20 48 18 AD 24 10 95 02 AD 25 10 95 03 4C 50   . H..$....%...LP
1A80  18 FE 08 06 BD 08 06 C9 0F B0 03 4C 50 18 A9 00   ...........LP...
1A90  9D 08 06 8D 00 08 4C 09 1A A9 00 9D 08 06 A9 14   ......L.........
1AA0  8D 00 08 20 48 18 AD 28 10 95 02 AD 29 10 95 03   ... H..(....)...
1AB0  4C 50 18 FE 08 06 BD 08 06 C9 0F B0 03 4C 50 18   LP...........LP.
1AC0  A9 00 9D 08 06 8D 00 08 AD 60 06 29 01 D0 03 4C   .........`.)...L
1AD0  D9 1A BD 61 06 29 01 D0 1D A9 00 9D 06 0B 8D 0B   ...a.)..........
1AE0  06 A9 02 9D 06 06 20 48 18 AD 2A 10 95 02 AD 2B   ...... H..*....+
1AF0  10 95 03 4C 50 18 AE 05 06 E0 00 F0 03 4C 2A 1B   ...LP........L*.
      0  1  2  3  4  5  6  7  8  9  A  B  C  D  E  F
1B00  A2 00 BD 7F 04 9D 00 04 E8 EC 1B 06 F0 03 4C 02   ..............L.
1B10  1B AD 1B 06 8D 19 06 A9 00 8D 61 06 20 48 18 A9   ..........a. H..
1B20  00 9D 0F 06 9D 0E 06 4C E0 18 A2 00 BD 7F 05 9D   .......L........
1B30  00 05 E8 EC 1C 06 F0 03 4C 2C 1B AD 1C 06 8D 1A   ........L,......
```

```
1B40  06 A9 00 8D 62 06 4C 1C 1B BD 00 0A 29 01 D0 08   ....b.L.....)...
1B50  A9 00 9D 08 06 4C 50 18 FE 08 06 BD 08 06 C9 14   .....LP.........
1B60  B0 03 4C 50 18 A9 00 9D 08 06 A9 04 9D 06 06 A9   ..LP............
1B70  00 9D 0C 06 20 48 18 AD 10 10 95 02 AD 11 10 95   .... H..........
1B80  03 4C 50 18 AD 2B 06 C9 01 F0 01 60 A9 00 8D 02   .LP..+.....`....
1B90  0F 8D 2B 06 60 AD 2B 06 C9 11 F0 01 60 A9 00 8D   ..+.`.+.....`...
1BA0  02 0F 8D 2B 06 60 4C 50 18 4C 50 18 C9 01 F0 03   ...+.`LP.LP.....
1BB0  4C B6 1B A9 11 60 C9 02 F0 03 4C C0 1B A9 12 60   L....`....L....`
1BC0  C9 03 F0 03 4C CA 1B A9 13 60 C9 04 F0 03 4C D4   ....L....`....L.
1BD0  1B A9 16 60 C9 05 F0 03 4C DE 1B A9 17 60 C9 06   ...`....L....`..
1BE0  F0 03 4C E8 1B A9 15 60 C9 07 F0 03 4C F2 1B A9   ..L....`....L...
1BF0  1E 60 C9 08 F0 03 4C FC 1B A9 1F 60 C9 09 F0 03   .`....L....`....

      0  1  2  3  4  5  6  7  8  9  A  B  C  D  E  F
1C00  4C 06 1C A9 1D 60 C9 00 F0 03 4C 10 1C A9 1C 60   L....`....L....`
1C10  AD FF FF 4C 10 1C AE 05 06 AD 2B 06 29 01 D0 2D   ...L......+.)..-
1C20  A9 01 8D 02 0F AE 05 06 E0 00 F0 04 E0 01 F0 08   ................
1C30  A9 01 8D 2B 06 4C 3D 1C A9 11 8D 2B 06 20 48 18   ...+.L=....+. H.
1C40  AD 2C 10 95 02 AD 2D 10 95 03 4C 50 18 20 48 18   .,....-...LP. H.
1C50  AD 30 10 95 02 AD 31 10 95 03 4C 50 18 78 18 AD   .0....1...LP.x..
1C60  03 0A 29 01 D0 06 8D EE FF 4C 5D 1C AD 00 0E 29   ..)......L]....)
1C70  0F C9 01 F0 03 4C 7B 1C 4C FD 1C C9 02 F0 03 4C   .....L{.L......L
1C80  85 1C 4C 18 1D C9 03 F0 03 4C 8F 1C 4C 34 1D C9   ..L......L..L4..
1C90  04 F0 03 4C 99 1C 4C 3C 1D C9 05 F0 03 4C A3 1C   ...L..L<.....L..
1CA0  4C 44 1D C9 06 F0 03 4C AD 1C 4C 4C 1D C9 07 F0   LD.....L..LL....
1CB0  03 4C B7 1C 4C 54 1D C9 08 F0 03 4C C1 1C 4C 5F   .L..LT.....L..L_
1CC0  1D C9 09 F0 03 4C CB 1C 4C 6A 1D C9 0A F0 03 4C   .....L..Lj.....L
1CD0  D5 1C 4C 0C 1E C9 0B F0 03 4C DF 1C 4C B6 1E C9   ..L......L..L...
1CE0  0C F0 03 4C E9 1C 4C D4 1E C9 0D F0 03 4C F3 1C   ...L..L......L..
1CF0  4C 0A 1F C9 0E F0 03 4C 5D 1C 4C 40 1F AD 03 0A   L......L].L@....
      0  1  2  3  4  5  6  7  8  9  A  B  C  D  E  F
1D00  29 01 D0 03 4C FD 1C AD 00 0E 29 0F 8D 08 06 AD   )...L.....).....
1D10  08 06 8D 00 0D 4C 5D 1C A9 55 85 01 85 02 A5 01   .....L]..U......
1D20  C9 55 F0 08 A9 01 8D 00 0D 4C 5D 1C A9 00 8D 00   .U.......L].....
1D30  0D 4C 5D 1C A9 01 8D 00 0F 4C 5D 1C A9 00 8D 00   .L]......L].....
1D40  0F 4C 5D 1C A9 01 8D 01 0F 4C 5D 1C A9 00 8D 01   .L]......L].....
1D50  0F 4C 5D 1C AD 00 0A 29 0F 8D 00 0D 4C 5D 1C AD   .L]....)....L]..
1D60  01 0A 29 0F 8D 00 0D 4C 5D 1C A9 01 8D 06 0B 8D   ..)....L].......
1D70  01 0B AD 03 0A 29 01 D0 03 4C 6A 1D AD 00 0E 29   .....)...Lj....)
1D80  0F 20 DE 1D 20 AC 1B 8D 00 08 20 AB 1E A9 00 8D   . .. ..... .....
1D90  00 08 AD 02 0A 29 01 D0 03 4C 92 1D AD 00 09 8D   .....)...L......
1DA0  08 06 29 80 D0 03 4C D1 1D AD 08 06 20 F5 1D 20   ..)...L...... ..
1DB0  6E 16 8D 00 0D AD 00 09 A9 01 8D 02 0F 20 CC 1E   n............ ..
1DC0  A9 00 8D 06 0B 8D 01 0B 8D 02 0F AD 00 09 4C 5D   ..............L]
1DD0  1C A9 0C 8D 00 0D A9 01 8D 02 0F 4C BD 1D C9 0A   ...........L....
1DE0  F0 05 C9 0B F0 08 60 68 68 A9 19 4C 87 1D 68 68   ......`hh..L..hh
1DF0  A9 14 4C 87 1D C9 A4 F0 05 C9 B0 F0 08 60 68 68   ..L..........`hh
      0  1  2  3  4  5  6  7  8  9  A  B  C  D  E  F
1E00  A9 0A 4C B2 1D 68 68 A9 0B 4C B2 1D A9 01 8D 07   ..L..hh..L......
1E10  0B 8D 00 0B AD 03 0A 29 01 D0 03 4C 0C 1E AD 00   .......)...L....
1E20  0E 29 0F 20 7D 1E 20 AC 1B 8D 00 08 20 AB 1E A9   .). }. ..... ...
1E30  00 8D 00 08 AD 02 0A 29 01 D0 03 4C 34 1E AD 00   .......)...L4...
1E40  09 8D 08 06 29 80 D0 03 4C 70 1E AD 08 06 20 94   ....)...Lp.... .
1E50  1E 20 6E 16 8D 00 0D A9 01 8D 02 0F 20 CC 1E A9   . n.......... ..
1E60  00 8D 07 0B 8D 00 0B 8D 02 0F AD 00 09 4C 5D 1C   .............L].
1E70  A9 0C 8D 00 0D A9 01 8D 02 0F 4C 5C 1E C9 0A F0   ..........L\....
1E80  05 C9 0B F0 08 60 68 68 A9 19 4C 29 1E 68 68 A9   .....`hh..L).hh.
1E90  14 4C 29 1E C9 A4 F0 05 C9 B0 F0 08 60 68 68 A9   .L).........`hh.
1EA0  0A 4C 54 1E 68 68 A9 0B 4C 54 1E A0 FF A2 FF CA   .LT.hh..LT......
1EB0  D0 FD 88 D0 F8 60 A9 01 8D 02 0F 20 AB 1E 20 AB   .....`..... .. .
1EC0  1E 20 AB 1E A9 00 8D 02 0F 4C 5D 1C AD 04 0A 29   . .......L]....)
1ED0  01 D0 F9 60 AD 05 0A 29 01 D0 03 4C D4 1E AD 01   ...`...)...L....
1EE0  0C 29 0F 8D 08 06 AD 05 0A 29 01 D0 F9 A9 01 8D   .).......)......
1EF0  02 0F AD 08 06 8D 00 0D AD 04 0A 29 01 D0 F9 A9   ...........)....
```

```
      0  1  2  3  4  5  6  7  8  9  A  B  C  D  E  F
1F00  00 8D 02 0F 8D 08 06 4C D4 1E AD 06 0A 29 01 D0    .......L.....)..
1F10  03 4C 0A 1F AD 02 0C 29 0F 8D 09 06 AD 06 0A 29    .L.....).......)
1F20  01 D0 F9 A9 01 8D 02 0F AD 09 06 8D 00 0D AD 04    ................
1F30  0A 29 01 D0 F9 A9 00 8D 02 0F 8D 09 06 4C 0A 1F    .)...........L..
1F40  A9 01 8D 06 0B 8D 07 0B A9 19 8D 00 08 4C 5D 1C    .............L].
1F50  78 D8 18 A2 FF 9A A2 00 A9 00 9D 00 06 E8 E0 FF    x...............
1F60  D0 F6 A9 00 8D FF 06 8D 00 08 8D 00 0F 8D 01 0F    ................
1F70  A2 00 9D 00 0B E8 E0 10 D0 F8 8D 0B 06 8D 0A 06    ................
1F80  8D 2B 06 AD 00 09 20 2D 13 20 74 13 A2 00 8E 05    .+.... -. t.....
1F90  06 20 48 18 AD 00 10 95 02 AD 01 10 95 03 A2 01    . H.............
1FA0  8E 05 06 20 48 18 AD 00 10 95 02 AD 01 10 95 03    ... H...........
1FB0  A2 FF 9A 78 AD 03 0A 29 01 D0 03 4C B4 1F AD 00    ...x...)...L....
1FC0  0E 29 0F C9 01 F0 13 C9 02 F0 12 C9 03 F0 11 C9    .)..............
1FD0  04 F0 15 C9 05 F0 19 4C B4 1F 4C 36 10 4C 5D 1C    .......L..L6.L].
1FE0  A9 01 8D 60 06 4C 36 10 A9 01 8D 65 06 4C 36 10    ...`.L6....e.L6.
1FF0  A9 01 8D 60 06 8D 65 06 4C 36 10 FF FF FF FF FF    ...`..e.L6......
```

COPYRIGHT TELEFIND INC. 1987
ESA TELECOMMUNICATIONS
10347 SOUTH OXFORD
CHICAGO RIDGE, ILLINOIS
60415
PROGRAMMER: ROBERT A. KINAST
SOFTWARE:DID2.4 DIDTRUNK BOARD
DATE:JANUARY 7,1987

```
      0  1  2  3  4  5  6  7  8  9  A  B  C  D  E  F
1000  A5 04 A5 05 A9 0F 85 03 A9 00 85 01 85 02 85 00    ................
1010  A5 00 29 20 D0 03 4C 10 10 A5 02 09 08 85 02 A5    ..) ..L.........
1020  02 29 F0 18 6A 6A 6A 6A 29 0F 8D A9 01 8D A5 01    .)..jjjj).......
1030  8D A6 01 8D A7 01 8D A8 01 20 56 13 A9 0C 8D 96    ......... V.....
1040  01 A9 0D 8D 97 01 A9 0E 8D 98 01 A9 0F 8D 99 01    ................
1050  58 00 EA 20 41 13 20 A5 10 20 4C 11 20 2C 17 20    X.. A. .. L. ,.
1060  F3 11 20 9A 12 20 2C 17 4C 6E 10 4C 53 10 AD 8A    .. .. ,.Ln.LS...
1070  01 29 01 D0 18 AD 8A 01 29 02 D0 17 AD 8A 01 29    .)......)......)
1080  04 D0 16 AD 8A 01 29 08 D0 15 4C 6B 10 20 C5 13    ......)...Lk. ..
1090  4C 6B 10 20 A1 14 4C 6B 10 20 7A 15 4C 6B 10 20    Lk. ..Lk. z.Lk.
10A0  53 16 4C 6B 10 AD A0 01 29 01 D0 15 AD 8D 01 C9    S.Lk....).......
10B0  04 F0 0F AD 07 04 29 01 D0 1A AD 9B 01 29 01 D0    ......)......)..
10C0  01 60 20 5D 13 AD 07 04 29 01 D0 01 60 20 C9 19    .` ]....)...` ..
10D0  20 0B 14 60 AD 47 04 29 01 D0 03 4C E1 10 4C F1     ..`.G.)...L..L.
10E0  10 AD 9A 01 29 01 D0 09 AD 80 01 09 01 8D 80 01    ....)...........
10F0  60 AD 9B 01 29 01 D0 08 AD 85 01 09 01 8D 85 01    `...)...........
      0  1  2  3  4  5  6  7  8  9  A  B  C  D  E  F
1100  AD 9B 01 09 01 8D 9B 01 AD 8D 01 C9 03 F0 05 A9    ................
1110  0C 8D 06 08 A5 00 29 01 D0 01 60 A9 02 8D 8D 01    ......)...`.....
1120  A9 00 8D 86 01 AD 85 01 29 FE 09 01 8D 85 01 AE    ........).......
1130  9C 01 AD 02 04 29 0F 9D E0 01 EE 9C 01 AD 9C 01    .....)..........
1140  CD A5 01 B0 01 60 A9 FE 8D 86 01 60 AD A0 01 29    .....`.....`...)
1150  02 D0 15 AD 8E 01 C9 04 F0 0F AD 17 04 29 01 D0    .............)..
1160  1A AD 9B 01 29 02 D0 01 60 20 77 13 AD 17 04 29    ....)...` w....)
1170  01 D0 01 60 20 4A 1A 20 0B 14 60 AD 57 04 29 01    ...` J. ..`.W.).
1180  D0 03 4C 88 11 4C 98 11 AD 9A 01 29 02 D0 09 AD    ..L..L.....)....
1190  80 01 09 02 8D 80 01 60 AD 9B 01 29 02 D0 08 AD    .......`...)....
11A0  85 01 09 02 8D 85 01 AD 9B 01 09 02 8D 9B 01 AD    ................
11B0  8E 01 C9 03 F0 05 A9 0D 8D 06 08 A5 00 29 02 D0    .............)..
11C0  01 60 A9 02 8D 8E 01 A9 00 8D 87 01 AD 85 01 29    .`.............)
11D0  FD 09 02 8D 85 01 AE 9D 01 AD 03 04 29 0F 9D D0    ............)...
11E0  01 EE 9D 01 AD 9D 01 CD A6 01 B0 01 60 A9 FE 8D    ............`...
11F0  87 01 60 AD A0 01 29 04 D0 15 AD 8F 01 C9 04 F0    ..`...).........
      0  1  2  3  4  5  6  7  8  9  A  B  C  D  E  F
1200  0F AD 27 04 29 01 D0 1A AD 9B 01 29 04 D0 01 60    ..'.)......)...`
1210  20 91 13 AD 27 04 29 01 D0 01 60 20 CB 1A 20 0B     ...'.)...` .. .
1220  14 60 AD 67 04 29 01 D0 03 4C 2F 12 4C 3F 12 AD    .`.g.)...L/.L?..
1230  9A 01 29 04 D0 09 AD 80 01 09 04 8D 80 01 60 AD    ..)...........`.
1240  9B 01 29 04 D0 08 AD 85 01 09 04 8D 85 01 AD 9B    ..).............
1250  01 09 04 8D 9B 01 AD 8F 01 C9 03 F0 05 A9 0E 8D    ................
```

```
1260  06 08 A5 00 29 04 D0 01 60 A9 02 8D 8F 01 A9 00   ....)...`.......
1270  8D 88 01 AD 85 01 29 FB 09 04 8D 85 01 AE 9E 01   ......).........
1280  AD 04 04 29 0F 9D C0 01 EE 9E 01 AD 9E 01 CD A7   ...)............
1290  01 B0 01 60 A9 FE 8D 88 01 60 AD A0 01 29 08 D0   ...`.....`...)..
12A0  15 AD 90 01 C9 04 F0 0F AD 37 04 29 01 D0 1A AD   .........7.)....
12B0  9B 01 29 08 D0 01 60 20 AB 13 AD 37 04 29 01 D0   ..)...` ...7.)..
12C0  01 60 20 4C 1B 20 0B 14 60 AD 77 04 29 01 D0 03   .` L. ..`.w.)...
12D0  4C D6 12 4C E6 12 AD 9A 01 29 08 D0 09 AD 80 01   L..L.....)......
12E0  09 08 8D 80 01 60 AD 9B 01 29 08 D0 08 AD 85 01   .....`...)......
12F0  09 08 8D 85 01 AD 9B 01 09 08 8D 9B 01 AD 90 01   ................
      0  1  2  3  4  5  6  7  8  9  A  B  C  D  E  F
1300  C9 03 F0 05 A9 0F 8D 06 08 A5 00 29 08 D0 01 60   ...........)...`
1310  A9 02 8D 90 01 A9 00 8D 89 01 AD 85 01 29 F7 09   .............)..
1320  08 8D 85 01 AE 9F 01 AD 05 04 29 0F 9D B0 01 EE   ..........).....
1330  9F 01 AD 9F 01 CD A8 01 B0 01 60 A9 FE 8D 89 01   ..........`.....
1340  60 A5 00 29 40 D0 03 4C 50 13 A9 00 8D 8C 01 60   `..)@..LP......`
1350  A9 01 8D 8C 01 60 A5 02 29 F7 85 02 60 AD 8D 01   .....`..)...`...
1360  C9 00 F0 03 4C 6B 13 20 C9 19 60 A5 02 09 02 85   ....Lk. ..`.....
1370  02 A9 04 8D 8D 01 60 AD 8E 01 C9 00 F0 03 4C 85   ......`.......L.
1380  13 20 4A 1A 60 A5 02 09 02 85 02 A9 04 8D 8E 01   . J.`...........
1390  60 AD 8F 01 C9 00 F0 03 4C 9F 13 20 CB 1A 60 A5   `.......L.. ..`.
13A0  02 09 02 85 02 A9 04 8D 8F 01 60 AD 90 01 C9 00   ..........`.....
13B0  F0 03 4C B9 13 20 4C 1B 60 A5 02 09 02 85 02 A9   ..L.. L.`.......
13C0  04 8D 90 01 60 A5 02 29 02 D0 03 4C CF 13 60 A5   ....`..)...L..`.
13D0  02 09 02 85 02 A5 00 29 20 D0 19 AD 07 04 29 01   .......) .....).
13E0  D0 06 20 3B 19 4C 0B 14 20 4C 11 20 F3 11 20 9A   .. ;.L.. L. .. .
13F0  12 4C CF 13 A5 02 09 08 85 02 A5 02 29 F0 C9 10   .L..........)...
      0  1  2  3  4  5  6  7  8  9  A  B  C  D  E  F
1400  F0 10 20 40 17 4C CF 13 20 56 13 A5 02 29 FD 85   .. @.L.. V...)..
1410  02 60 20 56 13 A9 01 8D 8D 01 AE 8C 01 9D 00 08   .` V............
1420  A5 00 29 20 D0 03 4C 20 14 A5 02 09 08 85 02 A5   ..) ..L ........
1430  02 29 F0 C9 90 F0 03 4C 08 14 AD 9C 01 9D 00 08   .).....L........
1440  A9 00 8D A1 01 A5 00 29 20 D0 03 4C 45 14 A5 02   .......) ..LE...
1450  09 08 85 02 A5 02 29 F0 C9 A0 F0 06 20 56 13 4C   ......)..... V.L
1460  45 14 20 56 13 AE A1 01 BD E0 01 AE 8C 01 9D 00   E. V............
1470  08 AE A1 01 E8 EC 9C 01 F0 06 8E A1 01 4C 45 14   .............LE.
1480  A5 02 29 FD 85 02 AD 8A 01 29 FE 8D 8A 01 A9 00   ..)......)......
1490  8D A1 01 AD 85 01 29 FE 8D 85 01 A9 06 8D 8D 01   ......).........
14A0  60 A5 02 29 02 D0 03 4C AB 14 60 A5 02 09 02 85   `..)...L..`.....
14B0  02 A5 00 29 20 D0 19 AD 17 04 29 01 D0 06 20 58   ...) .....)... X
14C0  19 4C E7 14 20 A5 10 20 F3 11 20 9A 12 4C AB 14   .L.. .. .. ..L..
14D0  A5 02 09 08 85 02 A5 02 29 F0 C9 20 F0 0D 20 40   ........).. .. @
14E0  17 4C AB 14 20 56 13 20 0B 14 60 20 56 13 A9 01   .L.. V. ..` V...
14F0  8D 8E 01 AE 8C 01 9D 00 08 A5 00 29 20 D0 03 4C   ...........) ..L
      0  1  2  3  4  5  6  7  8  9  A  B  C  D  E  F
1500  F9 14 A5 02 09 08 85 02 A5 02 29 F0 C9 90 F0 03   ..........).....
1510  4C E4 14 AD 9D 01 9D 00 08 A9 00 8D A2 01 A5 00   L...............
1520  29 20 D0 03 4C 1E 15 A5 02 09 08 85 02 A5 02 29   ) ..L..........)
1530  F0 C9 A0 F0 06 20 56 13 4C 1E 15 20 56 13 AE A2   ..... V.L.. V...
1540  01 BD D0 01 AE 8C 01 9D 00 08 AE A2 01 E8 EC 9D   ................
1550  01 F0 06 8E A2 01 4C 1E 15 A5 02 29 FD 85 02 AD   ......L....)....
1560  8A 01 29 FD 8D 8A 01 A9 00 8D A2 01 AD 85 01 29   ..)............)
1570  FD 8D 85 01 A9 06 8D 8E 01 60 A5 02 29 02 D0 03   .........`..)...
1580  4C 84 15 60 A5 02 09 02 85 02 A5 00 29 20 D0 19   L..`........) ..
1590  AD 27 04 29 01 D0 06 20 77 19 4C C0 15 20 A5 10   .'.)... w.L.. ..
15A0  20 4C 11 20 9A 12 4C 84 15 A5 02 09 08 85 02 A5    L. ..L.........
15B0  02 29 F0 C9 30 F0 0D 20 40 17 4C 84 15 20 56 13   .)..0.. @.L.. V.
15C0  20 0B 14 60 20 56 13 A9 01 8D 8F 01 AE 8C 01 9D    ..` V..........
15D0  00 08 A5 00 29 20 D0 03 4C D2 15 A5 02 09 08 85   ....) ..L.......
15E0  02 A5 02 29 F0 C9 90 F0 03 4C BD 15 AD 9E 01 9D   ...).....L......
15F0  00 08 A9 00 8D A3 01 A5 00 29 20 D0 03 4C F7 15   .........) ..L..
      0  1  2  3  4  5  6  7  8  9  A  B  C  D  E  F
1600  A5 02 09 08 85 02 A5 02 29 F0 C9 A0 F0 06 20 56   ........)..... V
1610  13 4C F7 15 20 56 13 AE A3 01 BD C0 01 AE 8C 01   .L.. V..........
1620  9D 00 08 AE A3 01 E8 EC 9E 01 F0 06 8E A3 01 4C   ...............L
1630  F7 15 A5 02 29 FD 85 02 AD 8A 01 29 FB 8D 8A 01   ....)......)....
1640  A9 00 8D A3 01 AD 85 01 29 FB 8D 85 01 A9 06 8D   ........).......
```

```
1650  8F 01 60 A5 02 29 02 D0 03 4C 5D 16 60 A5 02 09   ..`..)...L].`...
1660  02 85 02 A5 00 29 20 D0 19 AD 37 04 29 01 D0 06   .....) ...7.)...
1670  20 97 19 4C 99 16 20 A5 10 20 4C 11 20 F3 11 4C    ..L.. .. L. ..L
1680  5D 16 A5 02 09 08 85 02 A5 02 29 F0 C9 40 F0 0D   ].........)..@..
1690  20 40 17 4C 5D 16 20 56 13 20 0B 14 60 20 56 13    @.L]. V. ..` V.
16A0  A9 01 8D 90 01 AE 8C 01 9D 00 08 A5 00 29 20 D0   .............) .
16B0  03 4C AB 16 A5 02 09 08 85 02 A5 02 29 F0 C9 90   .L..........)...
16C0  F0 03 4C 96 16 AD 9F 01 9D 00 08 A9 00 8D A4 01   ..L.............
16D0  A5 00 29 20 D0 03 4C D0 16 A5 02 09 08 85 02 A5   ..) ..L.........
16E0  02 29 F0 C9 A0 F0 06 20 56 13 4C D0 16 20 56 13   .)..... V.L.. V.
16F0  AE A4 01 BD B0 01 AE 8C 01 9D 00 08 AE A4 01 E8   ................
      0  1  2  3  4  5  6  7  8  9  A  B  C  D  E  F
1700  EC 9F 01 F0 06 8E A4 01 4C D0 16 A5 02 29 FD 85   ........L....)..
1710  02 AD 8A 01 29 F7 8D 8A 01 A9 00 8D A4 01 AD 85   ....)...........
1720  01 29 F7 8D 85 01 A9 06 8D 90 01 60 A5 00 29 20   .).........`..)
1730  D0 01 60 20 41 13 A5 02 09 08 85 02 A5 02 29 F0   ..` A.........).
1740  C9 E0 F0 03 4C 4D 17 20 56 13 4C 6B 18 C9 10 F0   ....LM. V.Lk....
1750  03 4C 57 17 4C 9E 17 C9 20 F0 03 4C 61 17 4C AB   .LW.L... ..La.L.
1760  17 C9 30 F0 03 4C 6B 17 4C B4 17 C9 40 F0 03 4C   ..0..Lk.L...@..L
1770  75 17 4C BD 17 C9 50 F0 03 4C 7F 17 4C C6 17 C9   u.L...P..L..L...
1780  60 F0 03 4C 89 17 4C EF 17 C9 70 F0 03 4C 93 17   `..L..L...p..L..
1790  4C 18 18 C9 80 F0 04 20 56 13 60 4C 41 18 20 56   L...... V.`LA. V
17A0  13 AD 8D 01 AE 8C 01 9D 00 08 60 20 56 13 AD 8E   ..........` V...
17B0  01 4C A4 17 20 56 13 AD 8F 01 4C A4 17 20 56 13   .L.. V....L.. V.
17C0  AD 90 01 4C A4 17 20 56 13 20 FC 19 EA A9 08 EA   ...L.. V. ......
17D0  8D 07 08 EA AD 91 01 09 01 8D 91 01 A9 03 8D 8D   ................
17E0  01 A9 10 8D A5 01 AD 9B 01 09 01 8D 9B 01 60 20   ..............`
17F0  56 13 20 7D 1A EA A9 09 EA 8D 07 08 EA AD 91 01   V. }............
      0  1  2  3  4  5  6  7  8  9  A  B  C  D  E  F
1800  09 02 8D 91 01 A9 03 8D 8E 01 A9 10 8D A6 01 AD   ................
1810  9B 01 09 02 8D 9B 01 60 20 56 13 20 FE 1A EA A9   .......` V. ....
1820  0A EA 8D 07 08 EA AD 91 01 09 04 8D 91 01 A9 03   ................
1830  8D 8F 01 A9 10 8D A7 01 AD 9B 01 09 04 8D 9B 01   ................
1840  60 20 56 13 20 7F 1B EA A9 0B EA EA 8D 07 08 EA   ` V. ...........
1850  AD 91 01 09 08 8D 91 01 A9 03 8D 90 01 A9 10 8D   ................
1860  A8 01 AD 9B 01 09 08 8D 9B 01 60 A5 00 29 20 D0   ..........`..) .
1870  03 4C 6B 18 20 41 13 A5 02 09 08 85 02 A5 02 29   .Lk. A.........)
1880  F0 C9 90 F0 03 4C 8B 18 4C B6 19 C9 10 F0 03 4C   .....L..L......L
1890  95 18 4C DF 18 C9 20 F0 03 4C 9F 18 4C F6 18 C9   ..L... ..L..L...
18A0  30 F0 03 4C A9 18 4C 0D 19 C9 40 F0 03 4C B3 18   0..L..L...@..L..
18B0  4C 24 19 C9 50 F0 03 4C BD 18 4C 3B 19 C9 60 F0   L$..P..L..L;..`.
18C0  03 4C C7 18 4C 58 19 C9 70 F0 03 4C D1 18 4C 77   .L..LX..p..L..Lw
18D0  19 C9 80 F0 03 4C DB 18 4C 97 19 20 56 13 60 20   .....L..L.. V.`
18E0  56 13 20 C9 19 AD A0 01 09 01 8D A0 01 A9 08 8D   V. .............
18F0  07 08 8D 06 08 60 20 56 13 20 4A 1A AD A0 01 09   .....` V. J.....
      0  1  2  3  4  5  6  7  8  9  A  B  C  D  E  F
1900  02 8D A0 01 A9 09 8D 07 08 8D 06 08 60 20 56 13   ............` V.
1910  20 CB 1A AD A0 01 09 04 8D A0 01 A9 0A 8D 07 08    ...............
1920  8D 06 08 60 20 56 13 20 4C 1B AD A0 01 09 08 8D   ...` V. L.......
1930  A0 01 A9 0B 8D 07 08 8D 06 08 60 20 56 13 AD 07   ..........` V...
1940  04 29 01 D0 04 20 C9 19 60 20 25 1A A9 08 8D 06   .).... ..` %....
1950  08 EA A9 00 8D 07 08 60 20 56 13 AD 17 04 29 01   .......` V....).
1960  D0 04 20 4A 1A 60 20 A6 1A A9 09 8D 06 08 EA A9   .. J.` .........
1970  01 8D 07 08 4C A7 11 20 56 13 AD 27 04 29 01 D0   ....L.. V..'.)..
1980  04 20 CB 1A 60 20 27 1B EA A9 0A 8D 06 08 EA A9   . ..` '.........
1990  02 8D 07 08 4C 4E 12 20 56 13 AD 37 04 29 01 D0   ....LN. V..7.)..
19A0  04 20 4C 1B 60 20 A8 1B A9 0B 8D 06 08 EA A9 03   . L.` ..........
19B0  8D 07 08 4C F5 12 20 56 13 AD 8B 01 AE 8C 01 9D   ...L.. V........
19C0  00 08 A5 02 29 FE 85 02 60 A9 00 8D 8D 01 A9 00   ....)...`.......
19D0  8D 07 08 AD 80 01 29 FE 8D 80 01 AD 9A 01 29 FE   ......).......).
19E0  8D 9A 01 AD 91 01 29 FE 8D 91 01 AD 9B 01 29 FE   ......).......).
19F0  8D 9B 01 AD A9 01 8D A5 01 20 CD 1B A9 00 8D 9C   ......... ......
      0  1  2  3  4  5  6  7  8  9  A  B  C  D  E  F
1A00  01 8D 92 01 8D 81 01 8D A1 01 8D 86 01 AD 85 01   ................
1A10  29 FE 8D 85 01 AD 8A 01 29 FE 8D 8A 01 AD 8B 01   ).......).......
1A20  29 FE 8D 8B 01 AD A0 01 29 FE 8D A0 01 A9 00 8D   ).......).......
1A30  06 08 A9 04 8D 06 08 8D 07 08 A2 00 A9 00 9D E0   ................
1A40  01 E8 E0 10 D0 F8 AD 02 04 60 A9 00 8D 8E 01 A9   .........`......
```

```
1A50  01 8D 07 08 AD 80 01 29 FD 8D 80 01 AD 9A 01 29   ........).......)
1A60  FD 8D 9A 01 AD 91 01 29 FD 8D 91 01 AD 9B 01 29   .......).......)
1A70  FD 8D 9B 01 AD A9 01 8D A6 01 20 CD 1B A9 00 8D   ..........  .....
1A80  9D 01 8D 93 01 8D 82 01 8D A2 01 8D 87 01 AD 85   ................
1A90  01 29 FD 8D 85 01 AD 8A 01 29 FD 8D 8A 01 AD 8B   .).......)......
1AA0  01 29 FD 8D 8B 01 AD A0 01 29 FD 8D A0 01 A9 01   .).......)......
1AB0  8D 06 08 A9 05 8D 06 08 8D 07 08 A2 00 A9 00 9D   ................
1AC0  D0 01 E8 E0 10 D0 F8 AD 03 04 60 A9 00 8D 8F 01   ..........`.....
1AD0  A9 02 8D 07 08 AD 80 01 29 FB 8D 80 01 AD 9A 01   ........).......
1AE0  29 FB 8D 9A 01 AD 91 01 29 FB 8D 91 01 AD 9B 01   ).......).......
1AF0  29 FB 8D 9B 01 AD A9 01 8D A7 01 20 CD 1B A9 00   )..........  ....
      0  1  2  3  4  5  6  7  8  9  A  B  C  D  E  F
1B00  8D 9E 01 8D 94 01 8D 83 01 8D 88 01 8D A3 01 AD   ................
1B10  85 01 29 FB 8D 85 01 AD 8A 01 29 FB 8D 8A 01 AD   ..).......).....
1B20  8B 01 29 FB 8D 8B 01 AD A0 01 29 FB 8D A0 01 A9   ..).......).....
1B30  02 8D 06 08 A9 06 8D 06 08 8D 07 08 A2 00 A9 00   ................
1B40  9D C0 01 E8 E0 10 D0 F8 AD 04 04 60 A9 00 8D 90   ...........`....
1B50  01 A9 03 8D 07 08 AD 80 01 29 F7 8D 80 01 AD 9A   .........)......
1B60  01 29 F7 8D 9A 01 AD 91 01 29 F7 8D 91 01 AD 9B   .).......)......
1B70  01 29 F7 8D 9B 01 AD A9 01 8D A8 01 20 CD 1B A9   .)..........  ...
1B80  00 8D 9F 01 8D 95 01 8D 84 01 8D 89 01 8D A4 01   ................
1B90  AD 85 01 29 F7 8D 85 01 AD 8A 01 29 F7 8D 8A 01   ...).......)....
1BA0  AD 8B 01 29 F7 8D 8B 01 AD A0 01 29 F7 8D A0 01   ...).......)....
1BB0  A9 03 8D 06 08 A9 07 8D 06 08 8D 07 08 A2 00 A9   ................
1BC0  00 9D B0 01 E8 E0 10 D0 F8 AD 05 04 60 A5 02 29   ............`..)
1BD0  FD 85 02 60 48 98 48 8A 48 78 AD 80 01 29 01 D0   ...`H.H.Hx...)..
1BE0  03 4C 16 1C A9 08 8D 07 08 EE 81 01 AD 81 01 C9   .L..............
1BF0  19 F0 03 4C 16 1C A9 00 8D 07 08 8D 81 01 AD 80   ...L............
      0  1  2  3  4  5  6  7  8  9  A  B  C  D  E  F
1C00  01 29 FE 8D 80 01 AD 9A 01 09 01 8D 9A 01 AD 85   .)..............
1C10  01 09 01 8D 85 01 AD 80 01 29 02 D0 03 4C 54 1C   .........)...LT.
1C20  A9 09 8D 07 08 EE 82 01 AD 82 01 C9 19 F0 03 4C   ...............L
1C30  54 1C A9 01 8D 07 08 A9 00 8D 82 01 AD 80 01 29   T..............)
1C40  0D 8D 80 01 AD 9A 01 09 02 8D 9A 01 AD 85 01 09   ................
1C50  02 8D 85 01 AD 80 01 29 04 D0 03 4C 92 1C A9 0A   .......)...L....
1C60  8D 07 08 EE 83 01 AD 83 01 C9 19 F0 03 4C 92 1C   .............L..
1C70  A9 02 8D 07 08 A9 00 8D 83 01 AD 80 01 29 0B 8D   .............)..
1C80  80 01 AD 9A 01 09 04 8D 9A 01 AD 85 01 09 04 8D   ................
1C90  85 01 AD 80 01 29 08 D0 03 4C D0 1C A9 0B 8D 07   .....)...L......
1CA0  08 EE 84 01 AD 84 01 C9 19 F0 03 4C D0 1C A9 03   ...........L....
1CB0  8D 07 08 A9 00 8D 84 01 AD 80 01 29 07 8D 80 01   ...........)....
1CC0  AD 9A 01 09 08 8D 9A 01 AD 85 01 09 08 8D 85 01   ................
1CD0  AD 85 01 29 01 D0 03 4C 0B 1D EE 86 01 AD 86 01   ...)...L........
1CE0  C9 FF F0 03 4C 0B 1D AD 8D 01 C9 00 F0 12 C9 02   ....L...........
1CF0  F0 03 4C 03 1D AD 8A 01 09 01 8D 8A 01 4C 03 1D   ..L..........L..
      0  1  2  3  4  5  6  7  8  9  A  B  C  D  E  F
1D00  20 6D 1E AD A0 01 09 01 8D A0 01 AD 85 01 29 02    m............).
1D10  D0 03 4C 46 1D EE 87 01 AD 87 01 C9 FF F0 03 4C   ..LF...........L
1D20  46 1D AD 8E 01 C9 00 F0 12 C9 02 F0 03 4C 3E 1D   F............L>.
1D30  AD 8A 01 09 02 8D 8A 01 4C 3E 1D 20 8E 1E AD A0   ........L>. ....
1D40  01 09 02 8D A0 01 AD 85 01 29 04 D0 03 4C 81 1D   .........)...L..
1D50  EE 88 01 AD 88 01 C9 FF F0 03 4C 81 1D AD 8F 01   ..........L.....
1D60  C9 00 F0 12 C9 02 F0 03 4C 79 1D AD 8A 01 09 04   ........Ly......
1D70  8D 8A 01 4C 79 1D 20 AF 1E AD A0 01 09 04 8D A0   ...Ly. .........
1D80  01 AD 85 01 29 08 D0 03 4C BC 1D EE 89 01 AD 89   ....)...L.......
1D90  01 C9 FF F0 03 4C BC 1D AD 90 01 C9 00 F0 12 C9   .....L..........
1DA0  02 F0 03 4C B4 1D AD 8A 01 09 08 8D 8A 01 4C B4   ...L..........L.
1DB0  1D 20 D0 1E AD A0 01 09 08 8D A0 01 AD 91 01 29   . .............)
1DC0  0F D0 03 4C 62 1E AD 91 01 29 01 D0 03 4C ED 1D   ...Lb....)...L..
1DD0  EE 92 01 AD 92 01 C9 64 F0 03 4C ED 1D AD 96 01   .......d..L.....
1DE0  49 08 8D 96 01 8D 06 08 A9 00 8D 92 01 AD 91 01   I...............
1DF0  29 02 D0 03 4C 14 1E EE 93 01 AD 93 01 C9 64 F0   )...L.........d.
      0  1  2  3  4  5  6  7  8  9  A  B  C  D  E  F
1E00  03 4C 14 1E AD 97 01 49 08 8D 97 01 8D 06 08 A9   .L.....I........
1E10  00 8D 93 01 AD 91 01 29 04 D0 03 4C 3B 1E EE 94   .......)...L;...
1E20  01 AD 94 01 C9 64 F0 03 4C 3B 1E AD 98 01 49 08   .....d..L;....I.
1E30  8D 98 01 8D 06 08 A9 00 8D 94 01 AD 91 01 29 08   ..............).
```

```
1E40   D0 03 4C 62 1E EE 95 01 AD 95 01 C9 64 F0 03 4C   ..Lb........d..L
1E50   62 1E AD 99 01 49 08 8D 99 01 8D 06 08 A9 00 8D   b....I..........
1E60   95 01 68 AA 68 A8 A9 9C 85 1E 68 58 40 AD 8D 01   ..h.h.....hX@...
1E70   C9 04 F0 03 4C 78 1E 60 AD 8B 01 09 01 8D 8B 01   ....Lx.`........
1E80   20 F5 1E AD A0 01 09 01 8D A0 01 4C EE 1E AD 8E    ..........L....
1E90   01 C9 04 F0 03 4C 99 1E 60 AD 8B 01 09 02 8D 8B   .....L..`.......
1EA0   01 20 FB 1E AD A0 01 09 02 8D A0 01 4C EE 1E AD   . ..........L...
1EB0   8F 01 C9 04 F0 03 4C BA 1E 60 AD 8B 01 09 04 8D   ......L..`......
1EC0   8B 01 20 01 1F AD A0 01 09 04 8D A0 01 4C EE 1E   .. ..........L..
1ED0   AD 90 01 C9 04 F0 03 4C DB 1E 60 AD 8B 01 09 08   .......L..`.....
1EE0   8D 8B 01 20 07 1F AD A0 01 09 08 8D A0 01 A5 02   ... ............
1EF0   09 01 85 02 60 A9 0C 8D 07 08 60 A9 0D 8D 07 08   ....`.....`.....
       0  1  2  3  4  5  6  7  8  9  A  B  C  D  E  F
1F00   60 A9 0E 8D 07 08 60 A9 0F 8D 07 08 60 AD 02 04   `.....`.....`...
1F10   AD 03 04 AD 04 04 AD 05 04 78 D8 18 A2 FF A9 00   .........x......
1F20   9D 00 01 CA D0 FA A0 00 A2 FF 9A 4C 00 10 FF FF   ...........L....
1F30   FF FF FF FF FF FF FF FF FF FF FF FF FF FF FF FF   ................
1F40   FF FF FF FF FF FF FF FF FF FF FF FF FF FF FF FF   ................
1F50   FF FF FF FF FF FF FF FF FF FF FF FF FF FF FF FF   ................
1F60   FF FF FF FF FF FF FF FF FF FF FF FF FF FF FF FF   ................
1F70   FF FF FF FF FF FF FF FF FF FF FF FF FF FF FF FF   ................
1F80   FF FF FF FF FF FF FF FF FF FF FF FF FF FF FF FF   ................
1F90   FF FF FF FF FF FF FF FF FF FF FF FF FF FF FF FF   ................
1FA0   FF FF FF FF FF FF FF FF FF FF FF FF FF FF FF FF   ................
1FB0   FF FF FF FF FF FF FF FF FF FF FF FF FF FF FF FF   ................
1FC0   FF FF FF FF FF FF FF FF FF FF FF FF FF FF FF FF   ................
1FD0   FF FF FF FF FF FF FF FF FF FF FF FF FF FF FF FF   ................
1FE0   FF FF FF FF FF FF FF FF FF FF FF FF FF FF FF FF   ................
1FF0   FF FF FF FF FF FF FF FF FF FF FF FF FF FF FF FF   ................
```

COPYRIGHT TELEFIND INC. 1987

ESA TELECOMMUNICATIONS
10347 SOUTH OXFORD
CHICAGO RIDGE, ILLINOIS
60415

SOFTWARE:2T3.OXT/O TONE SYNTHESIZER
PROGRAMMER: ROBERT A. KINAST
DATE:AUGUST 21,1987

```
       0  1  2  3  4  5  6  7  8  9  A  B  C  D  E  F
1000   78 A9 80 8D 03 08 A9 FF 8D 02 08 A9 00 8D 01 08   x...............
1010   8D 00 08 AD 01 08 29 20 D0 06 8D FF AF 4C 13 10   ......) .....L..
1020   AD 01 08 29 20 D0 03 4C 45 10 AD 01 08 09 80 8D   ...) ..LE.......
1030   01 08 AD 01 08 29 0F 95 01 E8 AD 01 08 49 80 8D   .....).......I..
1040   01 08 4C 20 10 E0 09 F0 05 A2 00 4C 13 10 AD 01   ..L .......L....
1050   08 29 10 D0 F0 A9 01 8D 00 08 85 1F 20 E9 18 4C   .)........... ..L
1060   7B 10 A5 54 29 01 D0 09 A5 50 29 01 D0 06 4C 77   {..T)....P)...Lw
1070   10 4C 80 18 4C 6E 16 A9 02 85 1F A2 00 8A 85 0A   .L..Ln..........
1080   85 21 85 20 85 23 85 22 85 13 85 14 85 15 85 16   .!. .#."........
1090   85 17 85 18 85 19 A5 1F C9 01 F0 07 C9 02 F0 16   ................
10A0   4C 00 10 A5 02 85 0F A5 03 85 10 A5 04 85 11 A5   L...............
10B0   05 85 12 4C C6 10 A5 06 85 0F A5 07 85 10 A5 08   ...L............
10C0   85 11 A5 09 85 12 A9 09 85 0B 85 0C 85 0D 85 0E   ................
10D0   FB A5 0F C9 01 B0 03 4C 6C 13 F0 07 A9 01 85 23   .......Ll......#
10E0   4C FB 10 A5 10 C9 00 F0 03 4C FB 10 A5 11 C9 00   L........L......
10F0   F0 03 4C FB 10 A5 12 C9 00 F0 00 20 06 12 A5 22   ..L......... ..."
       0  1  2  3  4  5  6  7  8  9  A  B  C  D  E  F
1100   29 01 D0 D3 A5 21 29 01 D0 06 4C 13 11 4C 6C 13   )....!)...L..Ll.
1110   4C 6C 11 A5 12 C5 0E B0 0A 38 A5 0E E5 12 85 0E   Ll.......8......
1120   4C 2B 11 F0 F4 20 46 12 4C 19 11 A5 11 C5 0D B0   L+... F.L.......
1130   0A 38 A5 0D E5 11 85 0D 4C 43 11 F0 F4 20 AD 12   .8......LC... ..
1140   4C 31 11 A5 10 C5 0C B0 0A 38 A5 0C E5 10 85 0C   L1.......8......
1150   4C 5B 11 F0 F4 20 F7 12 4C 49 11 38 A5 0B E5 0F   L[... ..LI.8....
1160   85 0B 18 B5 13 69 01 95 13 4C FB 10 A5 0B 85 0A   .....i...L......
1170   A5 0C 85 0B A5 0D 85 0C A5 0E 85 0D A9 00 85 0E   ................
1180   20 3A 12 A5 20 29 01 D0 03 4C 95 11 A9 00 85 21    :.. )...L.....!
1190   85 20 4C FB 10 A5 12 C5 0E B0 0A 38 A5 0E E5 12   . L........8....
11A0   85 0E 4C AD 11 F0 F4 20 46 12 4C 9B 11 A5 11 C5   ..L.... F.L.....
```

```
11B0  0D B0 0A 38 A5 0D E5 11 85 0D 4C C5 11 F0 F4 20   ...8......L....
11C0  AD 12 4C B3 11 A5 10 C5 0C B0 0A 38 A5 0C E5 10   ..L........8....
11D0  85 0C 4C DD 11 F0 F4 20 F7 12 4C CB 11 A5 0F C5   ..L.... ..L.....
11E0  0B B0 0A 38 A5 0B E5 0F 85 0B 4C F5 11 F0 F4 20   ...8......L....
11F0  26 13 4C E3 11 38 A5 0A E9 00 85 0A 18 B5 13 69   &.L..8.........i
      0  1  2  3  4  5  6  7  8  9  A  B  C  D  E  F
1200  01 95 13 4C B0 11 A5 0F C5 0B B0 01 60 F0 04 20   ...L.........`..
1210  34 13 60 A5 10 C5 0C B0 01 60 F0 04 20 34 13 60   4.`......`.. 4.`
1220  A5 11 C5 0D B0 01 60 F0 04 20 34 13 60 A5 12 C5   ......`.. 4.`...
1230  0E B0 01 60 F0 03 20 34 13 60 A5 0A C9 00 F0 01   ...`.. 4.`......
1240  60 A9 01 85 20 60 A5 0D C9 00 F0 0F 38 A5 0D E9   `... `......8...
1250  01 85 0D 18 A5 0E 69 10 85 0E 60 A5 0C C9 00 F0   ......i...`.....
1260  13 38 A5 0C E9 01 85 0C A9 09 85 0D 18 A5 0E 69   .8.............i
1270  10 85 0E 60 A5 0B C9 00 F0 15 38 A5 0B E9 01 85   ...`......8.....
1280  0B 18 A9 09 85 0C 85 0D A5 0E 69 10 85 0E 60 A5   ..........i...`.
1290  21 29 01 D0 01 60 38 A5 0A E9 01 85 0A A9 09 85   !)...`8.........
12A0  0B 85 0C 85 0D 18 A5 0E 69 10 85 0E 60 A5 0C C9   ........i...`...
12B0  00 F0 0F 38 A5 0C E9 01 85 0C 18 A5 0D 69 10 85   ...8.........i..
12C0  0D 60 A5 0B C9 00 F0 13 38 A5 0B E9 01 85 0B A9   .`......8.......
12D0  09 85 0C 18 A5 0D 69 10 85 0D 60 A5 21 29 01 D0   ......i...`.!)..
12E0  01 60 38 A5 CA E9 01 85 0A A9 09 85 0B 85 0C 18   .`8.............
12F0  A5 0D 69 10 85 0D 60 A5 0B C9 00 F0 0F 38 A5 0B   ..i...`......8..
      0  1  2  3  4  5  6  7  8  9  A  B  C  D  E  F
1300  E9 01 85 0B 18 A5 0C 69 10 85 0C 60 A5 21 29 01   .......i...`.!).
1310  D0 01 60 38 A5 0A E9 01 85 0A A9 09 85 0B 18 A5   ..`8............
1320  0C 69 10 85 0C 60 A5 0A E9 01 85 0A 18 A5 0B 69   .i...`.........i
1330  10 85 0B 60 E8 A5 23 29 01 D0 09 E0 04 D0 0E A9   ...`..#)........
1340  01 85 22 60 E0 06 D0 05 A9 01 85 22 60 A5 0B C9   .."`.......
"`...
1350  00 D0 14 A5 0C 85 0B A5 0D 85 0C A5 0E 85 0D A9   ................
1360  00 85 0E 20 06 12 60 A9 01 85 21 60 A5 23 29 01   ... ..`...!`.#).
1370  D0 25 A5 16 C9 05 B0 07 C9 04 F0 05 4C D8 13 F0   .%..........L...
1380  FB 18 A5 15 69 01 85 15 A5 14 69 00 85 14 A5 13   ....i.....i.....
1390  69 00 85 13 4C D8 13 A5 18 C9 05 B0 0A C9 04 F0   i...L...........
13A0  08 4C B0 13 4C D8 13 F0 07 18 A5 17 69 01 85 17   .L..L.......i...
13B0  A5 17 C9 05 B0 07 C9 04 F0 05 4C D8 13 F0 19 18   ..........L.....
13C0  A5 16 69 01 85 16 A5 15 69 00 85 15 A5 14 69 00   ..i.....i.....i.
13D0  85 14 A5 13 69 00 85 13 A5 23 C9 01 F0 3A A5 13   ....i....#...:..
13E0  C9 00 F0 03 4C EA 13 4C 78 14 38 A5 15 E9 04 85   ....L..Lx.8.....
13F0  15 30 03 4C F9 13 20 54 14 A5 14 E9 00 85 14 30   .0.L.. T.......0
      0  1  2  3  4  5  6  7  8  9  A  B  C  D  E  F
1400  03 4C 07 14 20 5D 14 A5 13 E9 00 85 13 30 03 4C   .L.. ].......0.L
1410  78 14 20 66 14 4C 78 14 38 A5 16 E9 04 85 16 30   x. f.Lx.8......0
1420  03 4C 27 14 20 6F 14 A5 15 E9 00 85 15 30 03 4C   .L'. o.......0.L
1430  35 14 20 54 14 A5 14 E9 00 85 14 30 03 4C 43 14   5. T.......0.LC.
1440  20 5D 14 A5 13 E9 00 85 13 30 03 4C 78 14 20 66    ].......0.Lx. f
1450  14 4C 78 14 38 A5 15 E9 90 85 15 18 60 38 A5 14   .Lx.8.......`8..
1460  E9 90 85 14 18 60 38 A5 13 E9 90 85 13 18 60 38   .....`8.......`8
1470  A5 16 E9 90 85 16 18 60 A5 23 A5 13 C9 0C F0 03   .......`.#......
1480  4C 86 14 4C 04 15 A5 23 29 01 D0 15 18 A9 00 65   L..L...#)......e
1490  13 85 13 A5 14 0A 0A 0A 0A 18 65 15 85 14 4C B7   ..........e...L.
14A0  14 A5 13 0A 0A 0A 0A 18 65 14 85 13 A5 15 0A 0A   ........e.......
14B0  0A 0A 18 65 16 85 14 A9 00 85 15 85 16 A5 13 D0   ...e............
14C0  06 A5 14 C9 02 90 1D 38 A5 14 E9 02 85 14 A5 13   .......8........
14D0  E9 00 85 13 18 A5 16 69 01 85 16 A5 15 69 00 85   .......i.....i..
14E0  15 4C BD 14 A5 15 4A 4A 4A 4A 85 13 45 15 29 F0   .L....JJJJ..E.).
14F0  45 15 85 14 A5 16 4A 4A 4A 4A 85 15 45 16 29 F0   E.....JJJJ..E.).
      0  1  2  3  4  5  6  7  8  9  A  B  C  D  E  F
1500  45 16 85 16 D8 A9 00 85 0B 85 0C 85 0D 85 0E A6   E...............
1510  13 F0 13 18 A9 E8 65 0C 85 0C A9 03 65 0B 85 0B   ......e.....e...
1520  CA F0 03 4C 13 15 A6 14 F0 19 A9 00 85 0D 85 0E   ...L............
1530  18 A9 64 65 0E 85 0E A9 00 65 0D 85 0D CA F0 03   ..de.....e......
1540  4C 30 15 18 A5 0C 65 0E 85 0E A5 0B 65 0D 85 0D   L0....e.....e...
1550  A9 00 85 0B 85 0C A6 15 E0 00 F0 13 18 A9 0A 65   ...............e
1560  0C 85 0C A9 00 65 0B 85 0B CA F0 03 4C 5C 15 18   .....e......L\..
1570  A5 0C 65 0E 85 0E A5 0B 65 0D 85 0D A9 00 85 0B   ..e.....e.......
1580  85 0C A6 16 F0 13 18 A9 01 65 0C 85 0C A9 00 65   .........e.....e
1590  0B 85 0B CA F0 03 4C 86 15 18 A5 0C 65 0E 85 0C   ......L.....e...
```

```
15A0  A5 0B 65 0D 85 0B A5 1F 29 02 D0 0B A5 0C 85 25   ..e.....).......%
15B0  A5 0B 85 24 4C 62 10 A5 0C 85 27 A5 0B 85 26 A5   ...$Lb....'...&.
15C0  02 C9 09 F0 03 4C E2 15 A5 03 C9 09 F0 03 4C E2   .....L........L.
15D0  15 A5 04 C9 07 B0 03 4C E2 15 A9 F3 85 25 A9 01   .......L.....%..
15E0  85 24 A5 05 C9 09 F0 03 4C 05 16 A5 06 C9 09 F0   .$......L.......
15F0  03 4C 05 16 A5 07 C9 07 B0 03 4C 05 16 A9 F3 85   .L........L.....
      0  1  2  3  4  5  6  7  8  9  A  B  C  D  E  F
1600  27 A9 01 85 26 A5 01 C9 00 F0 03 4C 11 16 4C A8   ...&......L..L.
1610  16 C9 01 F0 03 4C 1B 16 4C E0 16 C9 02 F0 03 4C   .....L..L......L
1620  25 16 4C 18 17 C9 03 F0 03 4C 2F 16 4C 47 17 C9   %.L......L/.LG..
1630  04 F0 03 4C 39 16 4C 6C 17 C9 05 F0 03 4C 43 16   ...L9.Ll.....LC.
1640  4C A0 17 C9 06 F0 03 4C 4D 16 4C D2 17 C9 07 F0   L......LM.L.....
1650  03 4C 57 16 4C 0A 18 C9 08 F0 03 4C 61 16 4C 42   .LW.L......La.LB
1660  18 C9 09 F0 03 4C 6B 16 4C 6E 16 4C 80 18 A9 C0   .....Lk.Ln.L....
1670  8D 0B 08 A5 25 8D 04 08 A5 24 8D 05 08 20 C2 18   ....%....$... ..
1680  20 C2 18 20 D9 18 A5 27 8D 04 08 A5 26 8D 05 08    .. ...'....&...
1690  20 B7 18 20 B7 18 20 B7 18 20 B7 18 A9 00 8D 0B    .. .. .. .......
16A0  08 8D 00 08 AA 4C 13 10 A9 C0 8D 0B 08 A5 25 8D   .....L........%.
16B0  04 08 A5 24 8D 05 08 20 AC 18 20 AC 18 A5 27 8D   ...$... .. ...'.
16C0  04 08 A5 26 8D 05 08 20 AC 18 20 AC 18 20 AC 18   ...&... .. .. ..
16D0  20 AC 18 A9 00 8D 0B 08 8D 00 08 A2 00 4C 13 10    ............L..
16E0  A9 C0 8D 0B 08 A5 25 8D 04 08 A5 24 8D 05 08 20   ......%....$...
16F0  B7 18 20 B7 18 A5 27 8D 04 08 A5 26 8D 05 08 20   .. ...'....&...
      0  1  2  3  4  5  6  7  8  9  A  B  C  D  E  F
1700  B7 18 20 B7 18 20 B7 18 20 B7 18 A9 00 8D 0B 08   .. .. .. .......
1710  8D 00 08 A2 00 4C 13 10 A9 C0 8D 0B 08 A5 25 8D   .....L........%.
1720  04 08 A5 24 8D 05 08 20 B7 18 A5 27 8D 04 08 A5   ...$... ...'....
1730  26 8D 05 08 20 B7 18 20 B7 18 A9 00 8D 0B 08 8D   &... .. ........
1740  00 08 A2 00 4C 13 10 A9 C0 8D 0B 08 A5 27 8D 04   ....L........'..
1750  08 A5 26 8D 05 08 20 C2 18 20 C2 18 20 C2 18 A9   ..&... .. .. ...
1760  00 8D 0B 08 8D 00 08 A2 00 4C 13 10 A9 C0 8D 0B   .........L......
1770  08 A5 27 8D 04 08 A5 26 8D 05 08 20 C2 18 20 C2   ..'....&... .. .
1780  18 20 C2 18 20 C2 18 20 C2 18 20 C2 18 20 C2 18   . .. .. .. .. ..
1790  20 C2 18 A9 00 8D 0B 08 8D 00 08 A2 00 4C 13 10    ............L..
17A0  A9 C0 8D 0B 08 A5 25 8D 04 08 A5 24 8D 05 08 20   ......%....$...
17B0  C2 18 A5 27 8D 04 08 A5 26 8D 05 08 20 C2 18 20   ...'....&... ..
17C0  C2 18 20 C2 18 A9 00 8D 0B 08 8D 00 08 A2 00 4C   .. ............L
17D0  13 10 A9 C0 8D 0B 08 A5 25 8D 04 08 A5 24 8D 05   ........%....$..
17E0  08 20 C2 18 20 C2 18 A5 27 8D 04 08 A5 26 8D 05   . .. ...'....&..
17F0  08 20 C2 18 20 C2 18 20 C2 18 20 C2 18 A9 00 8D   . .. .. .. .....
      0  1  2  3  4  5  6  7  8  9  A  B  C  D  E  F
1800  0B 08 8D 00 08 A2 00 4C 13 10 A9 C0 8D 0B 08 A5   .......L........
1810  25 8D 04 08 A5 24 8D 05 08 20 C2 18 20 C2 18 20   %....$... .. ..
1820  C2 18 A5 27 8D 04 08 A5 26 8D 05 08 20 C2 18 20   ...'....&... ..
1830  C2 18 20 C2 18 A9 00 8D 0B 08 8D 00 08 A2 00 4C   .. ............L
1840  13 10 A9 C0 8D 0B 08 A5 25 8D 04 08 A5 24 8D 05   ........%....$..
1850  08 20 C2 18 20 C2 18 20 C2 18 A5 27 8D 04 08 A5   . .. .. ...'....
1860  26 8D 05 08 20 C2 18 20 C2 18 20 C2 18 20 C2 18   &... .. .. .. ..
1870  20 C2 18 A9 00 8D 0B 08 8D 00 08 A2 00 4C 13 10    ............L..
1880  A9 C0 8D 0B 08 A5 25 8D 04 08 A5 24 8D 05 08 20   ......%....$...
1890  B7 18 A5 27 8D 04 08 A5 26 8D 05 08 20 B7 18 A9   ...'....&... ...
18A0  00 8D 0B 08 8D 00 08 A2 00 4C 13 10 A2 FF A0 C3   .........L......
18B0  88 D0 FD CA D0 F8 60 A2 FF A0 9C 88 D0 FD CA D0   .......`........
18C0  F8 60 A9 00 85 23 A2 FF A0 C3 88 D0 FD CA D0 F8   .`...#..........
18D0  E6 23 A5 23 C9 04 D0 EE 60 A0 FF A2 4D CA D0 FD   .#.#....`...M...
18E0  88 D0 F8 A2 3B CA D0 FD 60 A5 01 C9 09 F0 0B C9   ....;...`.......
18F0  0A F0 07 A9 00 85 50 85 54 60 A5 02 C9 02 F0 03   ......P.T`......

      0  1  2  3  4  5  6  7  8  9  A  B  C  D  E  F
1900  4C 4A 19 A5 03 85 52 A5 04 85 53 20 85 19 A9 00   LJ....R...S ....
1910  85 24 A5 51 85 25 A5 06 C9 02 F0 0B A9 00 85 50   .$.Q.%.........P
1920  85 54 68 68 4C 62 10 A5 07 85 52 A5 08 85 53 20   .ThhLb....R...S
1930  85 19 A9 00 85 26 A9 00 85 50 85 54 68 68 A5 01   .....&...P.Thh..
1940  C9 0A F0 03 4C 6E 16 4C 80 18 A5 06 C9 02 F0 07   ....Ln.L........
1950  A9 00 85 50 85 54 60 A9 00 85 26 A5 07 85 52 A5   ...P.T`...&...R.
1960  08 85 53 20 85 19 A5 51 85 27 A5 01 C9 0A F0 03   ..S ...Q.'......
1970  4C 7C 19 A9 01 85 54 A9 00 85 50 60 A9 01 85 50   L|....T...P`...P
1980  A9 00 85 54 60 A5 52 C9 07 F0 23 C9 06 F0 24 C9   ...T`.R...#...$.
```

```
1990  05 F0 25 C9 04 F0 26 C9 03 F0 27 C9 02 F0 28 C9   ..%...&...'...(.
19A0  01 F0 2E C9 00 F0 25 A9 00 85 50 85 54 60 A9 B7   ......%...P.T`..
19B0  85 51 60 A9 BD 85 51 60 A9 C4 85 51 60 A9 CB 85   .Q`...Q`...Q`...
19C0  51 60 A9 D2 85 51 60 A9 DA 85 51 60 A9 F2 85 51   Q`...Q`...Q`...Q
19D0  60 A5 53 C9 09 F0 05 A9 EA 85 51 60 A9 E2 85 51   `.S.......Q`...Q
19E0  60 A2 FF A9 00 95 00 CA D0 FB A2 FF A9 00 9D 00   `...............
19F0  01 CA D0 FA 85 00 A2 00 A0 00 A2 FF 9A A2 00 4C   ...............L
      0  1  2  3  4  5  6  7  8  9  A  B  C  D  E  F
1A00  00 10 FF FF FF FF FF FF FF FF FF FF FF FF FF FF   ................
1A10  FF FF FF FF FF FF FF FF FF FF FF FF FF FF FF FF   ................
1A20  FF FF FF FF FF FF FF FF FF FF FF FF FF FF FF FF   ................
1A30  FF FF FF FF FF FF FF FF FF FF FF FF FF FF FF FF   ................
1A40  FF FF FF FF FF FF FF FF FF FF FF FF FF FF FF FF   ................
1A50  FF FF FF FF FF FF FF FF FF FF FF FF FF FF FF FF   ................
1A60  FF FF FF FF FF FF FF FF FF FF FF FF FF FF FF FF   ................
1A70  FF FF FF FF FF FF FF FF FF FF FF FF FF FF FF FF   ................
1A80  FF FF FF FF FF FF FF FF FF FF FF FF FF FF FF FF   ................
1A90  FF FF FF FF FF FF FF FF FF FF FF FF FF FF FF FF   ................
1AA0  FF FF FF FF FF FF FF FF FF FF FF FF FF FF FF FF   ................
1AB0  FF FF FF FF FF FF FF FF FF FF FF FF FF FF FF FF   ................
1AC0  FF FF FF FF FF FF FF FF FF FF FF FF FF FF FF FF   ................
1AD0  FF FF FF FF FF FF FF FF FF FF FF FF FF FF FF FF   ................
1AE0  FF FF FF FF FF FF FF FF FF FF FF FF FF FF FF FF   ................
1AF0  FF FF FF FF FF FF FF FF FF FF FF FF FF FF FF FF   ................
      0  1  2  3  4  5  6  7  8  9  A  B  C  D  E  F
1B00  FF FF FF FF FF FF FF FF FF FF FF FF FF FF FF FF   ................
1B10  FF FF FF FF FF FF FF FF FF FF FF FF FF FF FF FF   ................
1B20  FF FF FF FF FF FF FF FF FF FF FF FF FF FF FF FF   ................
1B30  FF FF FF FF FF FF FF FF FF FF FF FF FF FF FF FF   ................
1B40  FF FF FF FF FF FF FF FF FF FF FF FF FF FF FF FF   ................
1B50  FF FF FF FF FF FF FF FF FF FF FF FF FF FF FF FF   ................
1B60  FF FF FF FF FF FF FF FF FF FF FF FF FF FF FF FF   ................
1B70  FF FF FF FF FF FF FF FF FF FF FF FF FF FF FF FF   ................
1B80  FF FF FF FF FF FF FF FF FF FF FF FF FF FF FF FF   ................
1B90  FF FF FF FF FF FF FF FF FF FF FF FF FF FF FF FF   ................
1BA0  FF FF FF FF FF FF FF FF FF FF FF FF FF FF FF FF   ................
1BB0  FF FF FF FF FF FF FF FF FF FF FF FF FF FF FF FF   ................
1BC0  FF FF FF FF FF FF FF FF FF FF FF FF FF FF FF FF   ................
1BD0  FF FF FF FF FF FF FF FF FF FF FF FF FF FF FF FF   ................
1BE0  FF FF FF FF FF FF FF FF FF FF FF FF FF FF FF FF   ................
1BF0  FF FF FF FF FF FF FF FF FF FF FF FF FF FF FF FF   ................

COPYRIGHT TELEFIND INC. 1987
ESA TELECOMMUNICATIONS
10347 SOUTH OXFORD
CHICAGO RIDGE,ILLINOIS
60415
SOFTWARE:E/E5.0 DODA TRUNK
PROGRAMMER: ROBERT A.KINAST
DATE:DECEMBER 16,1987

      0  1  2  3  4  5  6  7  8  9  A  B  C  D  E  F
1000  B2 15 32 16 52 16 88 16 87 16 E5 16 1D 17 9D 17   ..2.R...........
1010  C1 17 2E 19 8C 19 C2 19 EA 19 27 1A 57 1A AF 15   ..........'.W...
1020  F2 18 7F 1A 07 16 58 19 97 1A EA 1A E7 1A 21 18   ......X.......!.
1030  9F 19 09 18 0A 18 4F 17 AD 16 18 D8 58 AD 02 0E   ......O.....X...
1040  C9 01 D0 F9 AD 00 0E 29 01 D0 03 4C 3A 10 AD 00   .......)...L:...
1050  0B C9 FF F0 03 4C 5B 10 4C 32 15 8D 34 06 29 7F   .....L[.L2..4.).
1060  C9 00 F0 03 4C 6A 10 4C 46 11 C9 01 F0 03 4C 74   ....Lj.LF.....Lt
1070  10 4C 4C 11 C9 02 F0 03 4C 7E 10 4C 52 11 C9 03   .LL.....L~.LR...
1080  F0 03 4C 88 10 4C 58 11 C9 04 F0 03 4C 92 10 4C   ..L..LX.....L..L
1090  5E 11 C9 05 F0 03 4C 9C 10 4C 4A 11 C9 06 F0 03   ^.....L..LJ.....
10A0  4C A6 10 4C F6 11 C9 07 F0 03 4C B0 10 4C 42 12   L..L......L..LB.
10B0  C9 08 F0 03 4C BA 10 4C 8E 12 C9 09 F0 03 4C C4   ....L..L......L.
10C0  10 4C FA 12 C9 0A F0 03 4C CE 10 4C 66 13 C9 0B   .L......L..Lf...
10D0  F0 03 4C D8 10 4C D2 13 C9 0C F0 03 4C E2 10 4C   ..L..L......L..L
10E0  3E 14 C9 0D F0 03 4C EC 10 4C 5A 14 C9 0E F0 03   >.....L..LZ.....
10F0  4C F6 10 4C 76 14 C9 0F F0 03 4C 00 11 4C 92 14   L..Lv.....L..L..
```

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1100 | C9 | 10 | F0 | 03 | 4C | 1A | 11 | 4C | AE | 14 | C9 | 11 | F0 | 03 | 4C | 14 | ....L..L.......L. |
| 1110 | 11 | 4C | C4 | 14 | C9 | 12 | F0 | 03 | 4C | 1E | 11 | 4C | 6B | 11 | C9 | 13 | .L......L..Lk... |
| 1120 | F0 | 03 | 4C | 28 | 11 | 4C | B7 | 11 | C9 | 14 | F0 | 03 | 4C | 32 | 11 | 4C | ..L(.L......L2.L |
| 1130 | 03 | 12 | C9 | 15 | F0 | 03 | 4C | 3C | 11 | 4C | 4F | 12 | C9 | 28 | F0 | 03 | ......L<.LO.(.. |
| 1140 | 4C | 46 | 15 | 4C | 3E | 15 | 20 | 01 | 1D | 4C | 46 | 15 | 20 | 6F | 1D | 4C | LF.L>. ..LF. o.L |
| 1150 | 46 | 15 | 20 | DA | 1D | 4C | 46 | 15 | 20 | 45 | 1E | 4C | 46 | 15 | AD | 04 | F. ..LF. E.LF... |
| 1160 | 06 | 8D | 00 | 0B | C9 | 04 | F0 | 1A | 4C | 46 | 15 | AD | 08 | 06 | 8D | 00 | ........LF...... |
| 1170 | 0B | A2 | 00 | BD | 50 | 02 | 8D | 00 | 0B | E8 | EC | 08 | 06 | B0 | 03 | 4C | ....P..........L |
| 1180 | 73 | 11 | 20 | FF | 14 | A9 | 02 | 8D | 04 | 06 | 8D | 35 | 06 | 78 | A9 | 00 | s. ........5.x.. |
| 1190 | 8D | 08 | 06 | 8D | 0D | 06 | 8D | 0C | 06 | 8D | 14 | 06 | AD | 0C | 10 | 85 | ................ |
| 11A0 | 02 | AD | 0D | 10 | 85 | 03 | 58 | 4C | 46 | 15 | AD | 05 | 06 | 8D | 00 | 0B | ......XLF....... |
| 11B0 | C9 | 04 | F0 | 1A | 4C | 46 | 15 | AD | 09 | 06 | 8D | 00 | 0B | A2 | 00 | BD | ....LF.......... |
| 11C0 | 50 | 03 | 8D | 00 | 0B | E8 | EC | 09 | 06 | B0 | 03 | 4C | BF | 11 | 20 | 05 | P..........L.. . |
| 11D0 | 15 | A9 | 02 | 8D | 05 | 06 | 8D | 36 | 06 | 78 | A9 | 00 | 8D | 09 | 06 | 8D | .......6.x...... |
| 11E0 | 0F | 06 | 8D | 0E | 06 | 8D | 15 | 06 | AD | 0C | 10 | 85 | 04 | AD | 0D | 10 | ................ |
| 11F0 | 85 | 05 | 58 | 4C | 46 | 15 | AD | 06 | 06 | 8D | 00 | 0B | C9 | 04 | F0 | 1A | ..XLF........... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1200 | 4C | 46 | 15 | AD | 0A | 06 | 8D | 00 | 0B | A2 | 00 | BD | 50 | 04 | 8D | 00 | LF..........P... |
| 1210 | 0B | E8 | EC | 0A | 06 | B0 | 03 | 4C | 0B | 12 | 20 | 11 | 15 | A9 | 02 | 8D | .......L.. ..... |
| 1220 | 06 | 06 | 8D | 37 | 06 | 78 | A9 | 00 | 8D | 0A | 06 | 8D | 11 | 06 | 8D | 10 | ...7.x.......... |
| 1230 | 06 | 8D | 16 | 06 | AD | 0C | 10 | 85 | 06 | AD | 0D | 10 | 85 | 07 | 58 | 4C | ...............L |
| 1240 | 46 | 15 | AD | 07 | 06 | 8D | 00 | 0B | C9 | 04 | F0 | 1A | 4C | 46 | 15 | AD | F...........LF.. |
| 1250 | 0B | 06 | 8D | 00 | 0B | A2 | 00 | BD | 50 | 05 | 8D | 00 | 0B | E8 | EC | 0B | ........P....... |
| 1260 | 06 | B0 | 03 | 4C | 57 | 12 | 20 | 1D | 15 | A9 | 02 | 8D | 07 | 06 | 8D | 38 | ...LW. ........8 |
| 1270 | 06 | 78 | A9 | 00 | 8D | 0B | 06 | 8D | 13 | 06 | 8D | 12 | 06 | 8D | 17 | 06 | .x.............. |
| 1280 | AD | 0C | 10 | 85 | 08 | AD | 0D | 10 | 85 | 09 | 58 | 4C | 46 | 15 | 20 | 01 | ..........XLF. . |
| 1290 | 1D | A2 | 00 | AD | 00 | 0E | 29 | 01 | D0 | 03 | 4C | A7 | 12 | AD | 00 | 0B | ......)...L..... |
| 12A0 | 9D | 00 | 02 | E8 | 4C | 93 | 12 | 8E | 00 | 06 | A2 | 00 | BD | 00 | 02 | C9 | ....L........... |
| 12B0 | 0B | F0 | 1A | C9 | 0E | F0 | 03 | 4C | DC | 12 | A2 | 01 | A0 | 00 | BD | 00 | .......L........ |
| 12C0 | 02 | 99 | 00 | 03 | E8 | C8 | C0 | 04 | D0 | F4 | CE | 00 | 06 | 78 | AD | 30 | ...............0 |
| 12D0 | 10 | 85 | 02 | AD | 31 | 10 | 85 | 03 | 58 | 4C | 46 | 15 | AD | 34 | 06 | C9 | ....1...XLF..4.. |
| 12E0 | 88 | F0 | 03 | 4C | E8 | 12 | A9 | 01 | 8D | 30 | 06 | 78 | AD | 12 | 10 | 85 | ...L.....0.x.... |
| 12F0 | 02 | AD | 13 | 10 | 85 | 03 | 58 | 4C | 46 | 15 | 20 | 6F | 1D | A2 | 00 | AD | ......XLF. o.... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1300 | 00 | 0E | 29 | 01 | D0 | 03 | 4C | 13 | 13 | AD | 00 | 0B | 9D | 00 | 03 | E8 | ..)...L......... |
| 1310 | 4C | FF | 12 | 8E | 01 | 06 | A2 | 00 | BD | 00 | 03 | C9 | 0B | F0 | 14 | C9 | L............... |
| 1320 | 0E | F0 | 03 | 4C | 48 | 13 | A2 | 01 | A0 | 00 | BD | 00 | 03 | 99 | 00 | 03 | ...LH........... |
| 1330 | E8 | C8 | C0 | 04 | D0 | F4 | CE | 01 | 06 | 78 | AD | 30 | 10 | 85 | 04 | AD | .........x.0.... |
| 1340 | 31 | 10 | 85 | 05 | 58 | 4C | 46 | 15 | AD | 34 | 06 | C9 | 89 | F0 | 03 | 4C | 1...XLF..4.....L |
| 1350 | 57 | 13 | A9 | 01 | 8D | 31 | 06 | 78 | AD | 12 | 10 | 85 | 04 | AD | 13 | 10 | W....1.x........ |
| 1360 | 85 | 05 | 58 | 4C | 46 | 15 | 20 | DA | 1D | A2 | 00 | AD | 00 | 0E | 29 | 01 | ..XLF. .......). |
| 1370 | D0 | 03 | 4C | 7F | 13 | AD | 00 | 0B | 9D | 00 | 04 | E8 | 4C | 6B | 13 | 8E | ..L.........Lk.. |
| 1380 | 02 | 06 | A2 | 00 | BD | 00 | 04 | C9 | 0B | F0 | 14 | C9 | 0E | F0 | 03 | 4C | ...............L |
| 1390 | 84 | 13 | A2 | 01 | A0 | 00 | BD | 00 | 04 | 99 | 00 | 04 | E8 | C8 | C0 | 04 | ................ |
| 13A0 | D0 | F4 | CE | 02 | 06 | 78 | AD | 30 | 10 | 85 | 06 | AD | 31 | 10 | 85 | 07 | .....x.0...1.... |
| 13B0 | 58 | 4C | 46 | 15 | AD | 34 | 06 | C9 | 8A | F0 | 03 | 4C | 93 | 13 | A9 | 01 | XLF..4.....L.... |
| 13C0 | 8D | 32 | 06 | 78 | AD | 12 | 10 | 85 | 06 | AD | 13 | 10 | 85 | 07 | 58 | 4C | .2.x..........XL |
| 13D0 | 46 | 15 | 20 | 45 | 1E | A2 | 00 | AD | 00 | 0E | 29 | 01 | D0 | 03 | 4C | EB | F. E......)..... |
| 13E0 | 13 | AD | 00 | 0B | 9D | 00 | 05 | E8 | 4C | D7 | 13 | 8E | 03 | 06 | A2 | 00 | ................ |
| 13F0 | BD | 00 | 05 | C9 | 0B | F0 | 1A | C9 | 0E | F0 | 03 | 4C | 20 | 14 | A2 | 01 | ...........L ... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1400 | A0 | 00 | BD | 00 | 05 | 99 | 00 | 05 | E8 | C8 | C0 | 04 | D0 | F4 | CE | 03 | ................ |
| 1410 | 06 | 78 | AD | 30 | 10 | 85 | 08 | AD | 31 | 10 | 85 | 09 | 58 | 4C | 46 | 15 | .x.0....1...XLF. |
| 1420 | AD | 34 | 06 | C9 | 8B | F0 | 03 | 4C | 2F | 14 | A9 | 01 | 8D | 33 | 06 | 78 | .4.....L/....3.x |
| 1430 | AD | 12 | 10 | 85 | 08 | AD | 13 | 10 | 85 | 09 | 58 | 4C | 46 | 15 | 20 | F9 | ..........XLF. . |
| 1440 | 14 | 78 | AD | 0C | 10 | 85 | 02 | AD | 0D | 10 | 85 | 03 | 58 | A9 | 02 | 8D | .x..........X... |
| 1450 | 04 | 06 | A9 | 01 | 8D | 00 | 0D | 4C | 46 | 15 | 20 | 05 | 15 | 78 | AD | 0C | .......LF. ..x.. |
| 1460 | 10 | 85 | 04 | AD | 0D | 10 | 85 | 05 | 58 | A9 | 02 | 8D | 05 | 06 | A9 | 01 | ........X....... |
| 1470 | 8D | 01 | 0D | 4C | 46 | 15 | 20 | 11 | 15 | 78 | AD | 0C | 10 | 85 | 06 | AD | ...LF. ..x...... |
| 1480 | 0D | 10 | 85 | 07 | 58 | A9 | 02 | 8D | 06 | 06 | A9 | 01 | 8D | 02 | 0D | 4C | ....X..........L |
| 1490 | 46 | 15 | 20 | 1D | 15 | 78 | AD | 0C | 10 | 85 | 08 | AD | 0D | 10 | 85 | 09 | F. ..x.......... |
| 14A0 | 58 | A9 | 02 | 8D | 07 | 06 | A9 | 01 | 8D | 03 | 0D | 4C | 46 | 15 | 78 | AD | X..........LF.x. |
| 14B0 | 00 | 0E | 29 | 01 | D0 | 03 | 4C | AE | 14 | AD | 00 | 0B | EA | 8D | 00 | 0B | ..)...L......... |
| 14C0 | 58 | 4C | 46 | 15 | 78 | A9 | 55 | 85 | 0B | 85 | 0C | A5 | 0B | C9 | 55 | F0 | XLF.x.U.......U. |
| 14D0 | 03 | 4C | E0 | 14 | A5 | 0C | C9 | 55 | F0 | 03 | 4C | E0 | 14 | 4C | E8 | 14 | .L.....U..L..L.. |
| 14E0 | A9 | 01 | 8D | 01 | 0C | 8D | 00 | 0B | 4C | F5 | 14 | A9 | 01 | 8D | 01 | 0C | ................ |
| 14F0 | A9 | 00 | 8D | 00 | 0B | 58 | 4C | 46 | 15 | AD | 1C | 06 | C9 | 01 | F0 | 01 | .....XLF........ |

```
      0  1  2  3  4  5  6  7  8  9  A  B  C  D  E  F
1500  60 20 29 15 60 AD 1C 06 C9 02 F0 01 60 20 29 15    ).`.......  ).
1510  60 AD 1C 06 C9 03 F0 01 60 20 29 15 60 AD 1C 06   .......  ). ...
1520  C9 04 F0 01 60 20 29 15 60 A9 00 8D 01 0C 8D 1C   ....`).`.......
1530  06 60 4C 46 15 A9 00 8D 00 0C 8D 22 06 60 A9 29   .`LF......". .)
1540  8D 00 0B 4C 46 15 AD 00 0E 29 01 D0 03 4C 3A 10   ...LF...)..._:.
1550  AD 00 0B 4C 46 15 48 98 48 8A 48 78 18 A2 00 8E   ...LF.H.H.Hx....
1560  1D 06 A9 10 8D 1E 06 A9 01 8D 1F 06 6C 02 00 18   ............l...
1570  A2 01 8E 1D 06 A9 20 8D 1E 06 A9 02 8D 1F 06 6C   ...... ........l
1580  04 00 18 A2 02 8E 1D 06 A9 40 8D 1E 06 A9 04 8D   .........@......
1590  1F 06 6C 06 00 18 A2 03 8E 1D 06 A9 80 8D 1E 06   ..l.............
15A0  A9 08 8D 1F 06 6C 08 00 68 AA 68 A8 68 58 40 4C   .....l..h.h.hX@L
15B0  E3 1C AD 00 0A 2D 1E 06 D0 10 AD 00 09 2D 1E 06   .....-.......-..
15C0  F0 25 A9 00 9D 04 06 4C E3 1C A9 00 9D 14 06 20   .%.....L.......
15D0  A0 1C A9 00 9D 0D 06 9D 0C 06 AD 02 10 95 02 AD   ................
15E0  03 10 95 03 4C E3 1C 20 A0 1C A9 00 9D 0D 06 9D   ....L.. .......
15F0  0C 06 AD 24 10 95 02 AD 25 10 95 03 AE 1D 06 A9   ...$....%.......
      0  1  2  3  4  5  6  7  8  9  A  B  C  D  E  F
1600  00 9D 14 06 4C E3 1C AD 00 09 2D 1E 06 F0 0B A9   ....L.....-.....
1610  00 9D 14 06 20 A0 1C 4C A0 16 FE 14 06 BD 14 06   .... ..L........
1620  C9 14 B0 03 4C E3 1C A9 00 9D 14 06 20 A0 1C 4C   ....L....... ..L
1630  E5 16 AD 00 0A 2D 1E 06 D0 18 20 A0 1C A9 00 9D   .....-.... .....
1640  0C 06 9D 0D 06 AD 06 10 95 02 AD 07 10 95 03 4C   ...............L
1650  E3 1C 20 A0 1C 18 BD 0C 06 69 01 9D 0C 06 BD 0D   .. ......i......
1660  06 69 00 9D 0D 06 C9 07 B0 03 4C E3 1C BD 0C 06   .i........L.....
1670  C9 D0 B0 03 4C E3 1C 20 A0 1C AD 00 10 95 02 AD   ....L.. ........
1680  01 10 95 03 4C E3 1C EA AD 00 0A 2D 1E 06 D0 1D   ....L......-....
1690  20 A0 1C FE 0D 06 BD 0D 06 C9 0C B0 03 4C E3 1C    ............L..
16A0  AD 00 10 95 02 AD 01 10 95 03 4C E3 1C 20 A0 1C   ..........L.. ..
16B0  AD 38 10 95 02 AD 39 10 95 03 AD 00 0A 2D 1E 06   .8....9......-..
16C0  D0 10 20 A0 1C FE 0D 06 BD 0D 06 C9 3C B0 0E 4C   .. .........<..L
16D0  E3 1C 20 A0 1C A9 00 9D 0D 06 4C E3 1C A9 00 9D   .. .......L.....
16E0  0D 06 AE 1D 06 20 A0 1C AD 0A 10 95 02 AD 0B 10   ..... ..........
16F0  95 03 AD 1C 06 C9 00 F0 03 4C E3 1C AE 1D 06 A9   .........L......
      0  1  2  3  4  5  6  7  8  9  A  B  C  D  E  F
1700  03 9D 04 06 E8 8E 1C 06 A9 01 8D 01 0C 20 A0 1C   ............. ..
1710  AD 1E 10 95 02 AD 1F 10 95 03 4C E3 1C AD 00 09   ..........L.....
1720  2D 1F 06 D0 35 AD 00 09 2D 1E 06 F0 0A BD 2B 06   -...5...-.....+.
1730  C9 01 F0 18 4C E3 1C A9 01 9D 2B 06 4C E3 1C 20   ....L.....+.L..
1740  A0 1C AD 36 10 95 02 AD 37 10 95 03 4C E3 1C AD   ...6....7...L...
1750  1C 06 C9 10 F0 03 4C E3 1C AE 1D 06 A9 05 9D 04   ......L.........
1760  06 E8 8E 1C 06 A9 01 8D 01 0C 20 A0 1C AD 1E 10   .......... .....
1770  95 02 AD 1F 10 95 03 4C E3 1C BD 00 0F 9D 39 06   .......L......9.
1780  20 A0 1C AD 0E 10 95 02 AD 0F 10 95 03 4C E3 1C    ............L..
1790  AD 00 09 2D 1F 06 D0 03 4C 9E 17 4C E3 1C 20 08   ...-....L..L.. .
17A0  18 AE 1D 06 A9 06 9D 04 06 20 A0 1C A9 00 9D 0C   ......... ......
17B0  06 9D 0D 06 AD 10 10 95 02 AD 11 10 95 03 4C E3   ..............L.
17C0  1C AD 00 09 2D 1F 06 D0 28 20 A0 1C 18 BD 0C 06   ....-...( ......
17D0  69 01 9D 0C 06 BD 0D 06 69 00 9D 0D 06 C9 03 B0   i.......i.......
17E0  03 4C E3 1C BD 0C 06 C9 E8 B0 03 4C E3 1C 4C F2   .L.........L..L.
17F0  18 20 A0 1C A9 00 9D 0C 06 9D 0D 06 AD 0C 10 95   . ..............
      0  1  2  3  4  5  6  7  8  9  A  B  C  D  E  F
1800  02 AD 0D 10 95 03 4C E3 1C EA EA AE 1D 06 E0 00   ......L.........
1810  F0 05 E0 01 F0 0A E0 02 F0 09 4C BF 18 4C 26 18   ..........L..L&.
1820  4C 59 18 4C 8C 18 AC 14 06 AD 39 06 99 50 02 C8   LY.L......9..P..
1830  8C 14 06 C9 0C F0 10 AD 35 06 C9 02 F0 08 AD 14   ........5.......
1840  06 CD 21 06 B0 01 60 20 A0 1C AD 20 10 85 02 AD   ..!...` ... ....
1850  21 10 85 03 68 68 4C E3 1C AC 15 06 AD 3A 06 99   !...hhL......:..
1860  50 03 C8 8C 15 06 C9 0C F0 10 AD 36 06 C9 02 F0   P..........6....
1870  08 AD 15 06 CD 21 06 B0 01 60 20 A0 1C AD 20 10   .....!...` ... .
1880  85 04 AD 21 10 85 05 68 68 4C E3 1C AC 16 06 AD   ...!...hhL......
1890  3B 06 99 50 04 C8 8C 16 06 C9 0C F0 10 AD 37 06   ;..P..........7.
18A0  C9 02 F0 08 AD 16 06 CD 21 06 B0 01 60 20 A0 1C   ........!...` ..
18B0  AD 20 10 85 06 AD 21 10 85 07 68 68 4C E3 1C AC   . ....!...hhL...
18C0  17 06 AD 3C 06 99 50 05 C8 8C 17 06 C9 0C F0 10   ...<..P.........
18D0  AD 38 06 C9 02 F0 08 AD 17 06 CD 21 06 B0 01 60   .8.........!...`
18E0  20 A0 1C AD 20 10 85 08 AD 21 10 85 09 68 68 4C    ... ....!...hhL
18F0  E3 1C AE 1D 06 AD 1C 06 C9 00 F0 10 20 A0 1C AD   ............ ...
```

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1900 | 20 | 10 | 95 | 02 | AD | 21 | 10 | 95 | 03 | 4C | E3 | 1C | A9 | 01 | 8D | 01 | ....'...L....... |
| 1910 | 0C | 9D | 04 | 06 | BD | 14 | 06 | 9D | 08 | 06 | E8 | EE | 1C | 06 | 20 | A0 | ................ |
| 1920 | 1C | AD | 1E | 10 | 95 | 02 | AD | 1F | 10 | 95 | 03 | 4C | E3 | 1C | A9 | 01 | ...........L.... |
| 1930 | 9D | 00 | 0D | 9D | 04 | 0C | A9 | 00 | 9D | 14 | 06 | A9 | 02 | 9D | 04 | 06 | ................ |
| 1940 | 20 | A0 | 1C | A9 | 00 | 9D | 0C | 06 | 9D | 0D | 06 | AD | 26 | 10 | 95 | 02 | ............&... |
| 1950 | AD | 27 | 10 | 95 | 03 | 4C | E3 | 1C | FE | 14 | 06 | BD | 14 | 06 | C9 | 96 | .'...L.......... |
| 1960 | B0 | 03 | 4C | E3 | 1C | BD | 30 | 06 | 29 | 01 | D0 | 03 | 4C | 77 | 19 | A9 | ..L...0.)...Lw.. |
| 1970 | 00 | 9D | 04 | 0C | 9D | 30 | 06 | A9 | 00 | 9D | 14 | 06 | 20 | A0 | 1C | AD | ......0......... |
| 1980 | 14 | 10 | 95 | 02 | AD | 15 | 10 | 95 | 03 | 4C | E3 | 1C | AD | 00 | 0A | 2D | .........L.....- |
| 1990 | 1F | 06 | D0 | 0B | AD | 00 | 09 | 2D | 1E | 06 | F0 | 03 | 4C | E3 | 1C | A9 | .......-....L... |
| 19A0 | 01 | 9D | 00 | 0D | A9 | 02 | 9D | 04 | 06 | 20 | A0 | 1C | 18 | A9 | 00 | 9D | ................ |
| 19B0 | 0C | 06 | 9D | 0D | 06 | AD | 16 | 10 | 95 | 02 | AD | 17 | 10 | 95 | 03 | 4C | ...............L |
| 19C0 | E3 | 1C | 20 | A0 | 1C | 18 | BD | 0C | 06 | 69 | 01 | 9D | 0C | 06 | C9 | C8 | .........i...... |
| 19D0 | B0 | 03 | 4C | E3 | 1C | AD | 18 | 10 | 95 | 02 | AD | 19 | 10 | 95 | 03 | AE | ..L............. |
| 19E0 | 1D | 06 | A9 | 00 | 9D | 14 | 06 | 4C | E3 | 1C | BD | 23 | 06 | 29 | 01 | D0 | .......L...#.).. |
| 19F0 | 03 | 4C | 04 | 1A | 20 | A0 | 1C | AD | 28 | 10 | 95 | 02 | AD | 29 | 10 | 95 | .L......(....).. |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1A00 | 03 | 4C | E3 | 1C | 20 | F1 | 18 | 09 | 10 | AE | 1D | 06 | 9D | 00 | 0B | 20 | .L.............. |
| 1A10 | A0 | 1C | A9 | 00 | 9D | 0C | 06 | 9D | 0D | 06 | AD | 1A | 10 | 95 | 02 | AD | ................ |
| 1A20 | 1B | 10 | 95 | 03 | 4C | E3 | 1C | 20 | A0 | 1C | 18 | BD | 0C | 06 | 69 | 01 | ....L........i. |
| 1A30 | 9D | 0C | 06 | C9 | 14 | B0 | 03 | 4C | E3 | 1C | AE | 1D | 06 | A9 | 00 | 9D | .......L........ |
| 1A40 | 00 | 0B | 20 | A0 | 1C | A9 | 00 | 9D | 0C | 06 | AD | 1C | 10 | 95 | 02 | AD | ................ |
| 1A50 | 1D | 10 | 95 | 03 | 4C | E3 | 1C | 20 | A0 | 1C | 18 | BD | 0C | 06 | 69 | 01 | ....L........i. |
| 1A60 | 9D | 0C | 06 | C9 | 0A | B0 | 03 | 4C | E3 | 1C | 20 | A0 | 1C | A9 | 00 | 9D | .......L........ |
| 1A70 | 0C | 06 | AE | 1D | 06 | BD | 18 | 06 | 29 | 01 | D0 | 03 | 4C | 04 | 1A | AE | ........)...L... |
| 1A80 | 1D | 06 | A9 | 04 | 9D | 04 | 06 | 20 | A0 | 1C | AD | 1E | 10 | 95 | 02 | AD | ................ |
| 1A90 | 1F | 10 | 95 | 03 | 4C | E3 | 1C | 20 | 4B | 1B | AE | 1D | 06 | A9 | 00 | 9D | ....L...K....... |
| 1AA0 | 00 | 0D | 20 | A0 | 1C | A9 | 00 | 9D | 0C | 06 | 9D | 0D | 06 | AD | 2A | 10 | ..............*. |
| 1AB0 | 95 | 02 | AD | 2B | 10 | 95 | 03 | 4C | E3 | 1C | 20 | A0 | 1C | FE | 0C | 06 | ...+...L........ |
| 1AC0 | BD | 0C | 06 | C9 | 08 | B0 | 03 | 4C | E3 | 1C | A9 | 00 | 9D | 0C | 06 | AE | .......L........ |
| 1AD0 | 1D | 06 | A9 | 01 | 9D | 00 | 0D | 20 | A0 | 1C | AD | 2C | 10 | 95 | 02 | AD | ................ |
| 1AE0 | 2D | 10 | 95 | 03 | 4C | E3 | 1C | 20 | A0 | 1C | FE | 0C | 06 | BD | 0C | 06 | -...L........... |
| 1AF0 | C9 | 0C | B0 | 03 | 4C | E3 | 1C | A9 | 00 | 9D | 0C | 06 | AE | 1D | 06 | A9 | ....L........... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1B00 | 01 | 9D | 00 | 0D | DE | 27 | 06 | BD | 27 | 06 | C9 | 00 | F0 | 03 | 4C | 94 | ................ |
| 1B10 | 1A | 20 | A0 | 1C | AD | 2E | 10 | 95 | 02 | AD | 2F | 10 | 95 | 03 | 4C | E3 | ........../...L. |
| 1B20 | 1C | 20 | A0 | 1C | FE | 0C | 06 | BD | 0C | 06 | C9 | 8C | B0 | 03 | 4C | E3 | ..............L. |
| 1B30 | 1C | A9 | 00 | 9D | 0C | 06 | AE | 1D | 06 | BD | 18 | 06 | C9 | 01 | F0 | 03 | ................ |
| 1B40 | 4C | 97 | 1A | A9 | 01 | 9D | 00 | 0D | 4C | 7F | 1A | AE | 1D | 06 | E0 | 00 | L.......L....... |
| 1B50 | F0 | 0B | E0 | 01 | F0 | 2C | E0 | 02 | F0 | 4D | 4C | CC | 1B | AD | 14 | 06 | .........ML..... |
| 1B60 | A8 | B9 | 00 | 02 | C9 | 00 | F0 | 0F | 8D | 27 | 06 | EE | 14 | 06 | AD | 14 | ................ |
| 1B70 | 06 | CD | 00 | 06 | B0 | 06 | 60 | A9 | 0A | 4C | 68 | 1B | A9 | 01 | 8D | 18 | ......'..Lh..... |
| 1B80 | 06 | 60 | AD | 15 | 06 | A8 | B9 | 00 | 03 | C9 | 00 | F0 | 0F | 8D | 28 | 06 | .'.............. |
| 1B90 | EE | 15 | 06 | AD | 15 | 06 | CD | 01 | 06 | B0 | 06 | 60 | A9 | 0A | 4C | 8D | ...........'..L. |
| 1BA0 | 1B | A9 | 01 | 8D | 19 | 06 | 60 | AD | 16 | 06 | A8 | B9 | 00 | 04 | C9 | 00 | ......'......... |
| 1BB0 | F0 | 0F | 8D | 29 | 06 | EE | 16 | 06 | AD | 16 | 06 | CD | 02 | 06 | B0 | 06 | ...)............ |
| 1BC0 | 60 | A9 | 0A | 4C | B2 | 1B | A9 | 01 | 8D | 1A | 06 | 60 | AD | 17 | 06 | A8 | '..L........'... |
| 1BD0 | B9 | 00 | 05 | C9 | 00 | F0 | 0F | 8D | 2A | 06 | EE | 17 | 06 | AD | 17 | 06 | ........*....... |
| 1BE0 | CD | 03 | 06 | B0 | 06 | 60 | A9 | 0A | 4C | D7 | 1B | A9 | 01 | 8D | 1B | 06 | .....'..L....... |
| 1BF0 | 60 | AD | 1D | 06 | C9 | 00 | F0 | 0B | C9 | 01 | F0 | 0A | C9 | 02 | F0 | 09 | '............... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1C00 | 4C | 7B | 1C | 4C | 0C | 1C | 4C | 31 | 1C | 4C | 56 | 1C | AD | 14 | 06 | A8 | L{.L..L1.LV..... |
| 1C10 | B9 | 00 | 02 | 8D | 39 | 06 | EE | 14 | 06 | 20 | A8 | 1C | AD | 14 | 06 | CD | ....9........... |
| 1C20 | 00 | 06 | B0 | 04 | AD | 39 | 06 | 60 | A9 | 01 | 8D | 18 | 06 | AD | 39 | 06 | .....9.'......9. |
| 1C30 | 60 | AD | 15 | 06 | A8 | B9 | 00 | 03 | 8D | 3A | 06 | EE | 15 | 06 | 20 | A8 | '.........:..... |
| 1C40 | 1C | AD | 15 | 06 | CD | 01 | 06 | B0 | 04 | AD | 3A | 06 | 60 | A9 | 01 | 8D | ...........:.'.. |
| 1C50 | 19 | 06 | AD | 3A | 06 | 60 | AD | 16 | 06 | A8 | B9 | 00 | 04 | 8D | 3B | 06 | ...:.'........;. |
| 1C60 | EE | 16 | 06 | 20 | A8 | 1C | AD | 16 | 06 | CD | 02 | 06 | B0 | 04 | AD | 3B | ...............; |
| 1C70 | 06 | 60 | A9 | 01 | 8D | 1A | 06 | AD | 3B | 06 | 60 | AD | 17 | 06 | A8 | B9 | .'.....;.'...... |
| 1C80 | 00 | 05 | 8D | 3C | 06 | EE | 17 | 06 | 20 | A8 | 1C | AD | 17 | 06 | CD | 03 | ...<............ |
| 1C90 | 06 | B0 | 04 | AD | 3C | 06 | 60 | A9 | 01 | 8D | 1B | 06 | AD | 3C | 06 | 60 | ....<.'......<.' |
| 1CA0 | AE | 1D | 06 | 1E | 8A | 2A | AA | 60 | AE | 1D | 06 | BD | 39 | 06 | C9 | 0C | .....*.'.....9.. |
| 1CB0 | F0 | 0D | C9 | 0B | F0 | 15 | C9 | 00 | F0 | 17 | C9 | 0D | F0 | 19 | 60 | A9 | ..............'. |
| 1CC0 | 00 | 9D | 39 | 06 | 68 | 68 | 68 | 68 | 4C | 0F | 1A | A9 | 0C | 9D | 39 | 06 | ..9.hhhhL.....9. |
| 1CD0 | 60 | A9 | 0A | 9D | 39 | 06 | 60 | A9 | 01 | 9D | 18 | 06 | 68 | 68 | 68 | 68 | '...9.'.....hhhh |
| 1CE0 | 4C | 0F | 1A | AE | 1D | 06 | E0 | 00 | F0 | 0B | E0 | 01 | F0 | 0A | E0 | 02 | L............... |
| 1CF0 | F0 | 09 | 4C | FE | 1C | 4C | 6F | 15 | 4C | 82 | 15 | 4C | 95 | 15 | 4C | A8 | ..L..Lo.L...L..L. |

```
      0  1  2  3  4  5  6  7  8  9  A  B  C  D  E  F
1D00  15 A0 00 A9 00 99 00 02 C8 D0 F8 8D 00 06 8D 04    ................
1D10  06 8D 08 06 8D 0C 06 8D 0D 06 8D 14 06 8D 18 06    ................
1D20  8D 2B 06 8D 35 06 8D 30 06 8D 3D 06 AD 1C 06 C9    .+..5..0..=.....
1D30  01 F0 03 4C 3E 1D A9 00 8D 1C 06 8D 01 0C AD 22    ...L>...........
1D40  06 C9 01 F0 03 4C 53 1D A9 00 8D 22 06 8D 00 0C    .....LS...."....
1D50  8D 04 0C A9 00 8D 04 0C 8D 00 08 8D 00 0D 8D 04    ................
1D60  0D 8D 2B 06 AD 00 10 85 02 AD 01 10 85 03 60 A0    ..+.............
1D70  00 A9 00 99 00 03 C8 D0 F8 8D 01 06 8D 05 06 8D    ................
1D80  09 06 8D 0E 06 8D 0F 06 8D 15 06 8D 19 06 8D 2C    ...............,
1D90  06 8D 31 06 8D 36 06 8D 3E 06 AD 1C 06 C9 02 F0    ..1..6..>.......
1DA0  03 4C AC 1D A9 00 8D 1C 06 8D 01 0C AD 22 06 C9    .L..............
1DB0  02 F0 03 4C C1 1D A9 00 8D 22 06 8D 00 0C 8D 05    ...L....."......
1DC0  0C A9 00 8D 05 0C 8D 01 08 8D 01 0D 8D 05 0D AD    ................
1DD0  00 10 85 04 AD 01 10 85 05 60 A0 00 A9 00 99 00    ................
1DE0  04 C8 D0 F8 8D 02 06 8D 06 06 8D 0A 06 8D 10 06    ................
1DF0  8D 11 06 8D 16 06 8D 1A 06 8D 2D 06 8D 32 06 8D    ...........-..2..
      0  1  2  3  4  5  6  7  8  9  A  B  C  D  E  F
1E00  37 06 8D 3F 06 AD 1C 06 C9 03 F0 03 4C 17 1E A9    7..?............
1E10  00 8D 1C 06 8D 01 0C AD 22 06 C9 03 F0 03 4C 2C    ...............,
1E20  1E A9 00 8D 22 06 8D 00 0C 8D 06 0C A9 00 8D 06    ....."..........
1E30  0C 8D 02 08 8D 02 0D 8D 06 0D AD 00 10 85 06 AD    ................
1E40  01 10 85 07 60 A0 00 A9 00 99 00 05 C8 D0 F8 8D    ................
1E50  03 06 8D 07 06 8D 0B 06 8D 12 06 8D 13 06 8D 17    ................
1E60  06 8D 1B 06 8D 2E 06 8D 33 06 8D 38 06 8D 40 06    ........3..8..@.
1E70  AD 1C 06 C9 04 F0 03 4C 82 1E A9 00 8D 1C 06 8D    .......L........
1E80  01 0C AD 22 06 C9 04 F0 03 4C 97 1E A9 00 8D 22    ..."......L....."
1E90  06 8D 00 0C 8D 07 0C A9 00 8D 07 0C 8D 03 08 8D    ................
1EA0  03 0D 8D 07 0D AD 00 10 85 08 AD 01 10 85 09 60    ................
1EB0  78 A9 00 85 0B A9 07 85 0C A0 00 84 0A A6 0C A9    x...............
1EC0  00 91 0A C8 D0 FB E6 0B E4 0B B0 F5 8D 01 0C 8D    ................
1ED0  00 0C A2 00 A9 00 9D 04 0C 9D 00 08 9D 04 0D E8    ................
1EE0  E0 04 D0 F2 AD 00 0F AD 01 0F AD 02 0F AD 03 0F    ................
1EF0  A2 FF 9A A2 00 A9 01 9D 00 0D E8 E0 04 D0 F6 18    ................
      0  1  2  3  4  5  6  7  8  9  A  B  C  D  E  F
1F00  AD 00 0E 29 01 D0 06 8D 2F 06 4C FF 1E AD 00 0B    ...)..../.L.....
1F10  8D 21 06 A2 00 BD 04 0E 29 01 D0 08 A9 01 9D 23    .!......).......#
1F20  06 4C 29 1F A9 00 9D 23 06 E8 E0 04 B0 03 4C 15    .L)....#......L.
1F30  1F A2 00 A9 00 9D 00 0D E8 E0 04 D0 F6 A2 FF 9A    ................
1F40  AD 00 10 85 02 85 04 85 06 85 08 AD 01 10 85 03    ................
1F50  85 05 85 07 85 09 4C 46 15 58 4C 3A 10 FF FF FF    ......LF.XL:....
1F60  FF FF FF FF FF FF FF FF FF FF FF FF FF FF FF FF    ................
1F70  FF FF FF FF FF FF FF FF FF FF FF FF FF FF FF FF    ................
1F80  FF FF FF FF FF FF FF FF FF FF FF FF FF FF FF FF    ................
1F90  FF FF FF FF FF FF FF FF FF FF FF FF FF FF FF FF    ................
1FA0  FF FF FF FF FF FF FF FF FF FF FF FF FF FF FF FF    ................
1FB0  FF FF FF FF FF FF FF FF FF FF FF FF FF FF FF FF    ................
1FC0  FF FF FF FF FF FF FF FF FF FF FF FF FF FF FF FF    ................
1FD0  FF FF FF FF FF FF FF FF FF FF FF FF FF FF FF FF    ................
1FE0  FF FF FF FF FF FF FF FF FF FF FF FF FF FF FF FF    ................
1FF0  FF FF FF FF FF FF FF FF FF FF FF FF FF FF FF FF    ................
```

COPYRIGHT TELEFIND INC. 1987
ESA TELECOMMUNICATIONS
10347 SOUTH OXFORD
CHICAGO RIDGE, ILLINOIS
60415
PROGRAMMER: ROBERT A. KINAST
SOFTWARE: E/E3.1 DODA
DATE:AUGUST 22,1987

```
      0  1  2  3  4  5  6  7  8  9  A  B  C  D  E  F
1000  B6 15 36 16 56 16 B6 16 8B 16 DB 16 13 17 86 17    ..6.V...........
1010  B7 17 24 19 82 19 B8 19 E0 19 1D 1A 4D 1A B3 15    ..$.........M...
1020  E8 18 75 1A 0B 16 4E 19 8D 1A B0 1A DD 1A 17 1B    ..u...N.........
1030  95 19 FF 17 00 18 45 17 18 D8 58 AD 02 0E 29 01    ......E...X...).
1040  D0 F9 AD 00 0E 29 01 D0 03 4C 38 10 AD 00 0B C9    .....)...L8.....
1050  FF F0 03 4C 59 10 4C 4E 15 8D 34 06 29 7F C9 00    ...LY.LN..4.)...
```

```
1060  F0 03 4C 68 10 4C 3A 11 C9 01 F0 03 4C 72 10 4C   ..Lh.L:.....Lr.L
1070  40 11 C9 02 F0 03 4C 7C 10 4C 46 11 C9 03 F0 03   @.....L!.LF.....
1080  4C 86 10 4C 4C 11 C9 04 F0 03 4C 90 10 4C 52 11   L..LL.....L..LR.
1090  C9 05 F0 03 4C 9A 10 4C A8 11 C9 06 F0 03 4C A4   ....L..L......L.
10A0  10 4C FE 11 C9 07 F0 03 4C AE 10 4C 54 12 C9 08   .L......L..LT...
10B0  F0 03 4C B8 10 4C AA 12 C9 09 F0 03 4C C2 10 4C   ..L..L......L..L
10C0  16 13 C9 0A F0 03 4C CC 10 4C 82 13 C9 0B F0 03   ......L..L......
10D0  4C D6 10 4C EE 13 C9 0C F0 03 4C E0 10 4C 5A 14   L..L......L..LZ.
10E0  C9 0D F0 03 4C EA 10 4C 76 14 C9 0E F0 03 4C F4   ....L..Lv.....L.
10F0  10 4C 92 14 C9 0F F0 03 4C FE 10 4C AE 14 C9 10   .L......L..L....
      0  1  2  3  4  5  6  7  8  9  A  B  C  D  E  F
1100  F0 03 4C 08 11 4C CA 14 C9 11 F0 03 4C 12 11 4C   ..L..L......L..L
1110  E0 14 C9 12 F0 03 4C 1C 11 4C 69 11 C9 13 F0 03   ......L..Li.....
1120  4C 26 11 4C BF 11 C9 14 F0 03 4C 30 11 4C 15 12   L&.L......L0.L..
1130  C9 15 F0 03 4C 38 10 4C 6B 12 20 F7 1C 4C 38 10   ....L8.Lk. ..L8.
1140  20 62 1D 4C 38 10 20 CA 1D 4C 38 10 20 32 1E 4C    b.L8. ..L8. 2.L
1150  38 10 AD 04 06 8D 00 0B C9 04 F0 24 C9 10 F0 03   8..........$....
1160  4C 38 10 20 51 15 4C 38 10 AD 08 06 8D 00 0B A2   L8. Q.L8........
1170  00 BD 50 02 8D 00 0B E8 EC 08 06 B0 03 4C 71 11   ..P..........Lq.
1180  20 15 15 A9 02 8D 04 06 8D 35 06 78 A9 00 8D 08    ........5.x....
1190  06 8D 0D 06 8D 0C 06 8D 14 06 AD 0C 10 85 02 AD   ................
11A0  0D 10 85 03 58 4C 38 10 AD 05 06 8D 00 0B C9 04   ....XL8.........
11B0  F0 24 C9 10 F0 03 4C 38 10 20 51 15 4C 38 10 AD   .$....L8. Q.L8..
11C0  09 06 8D 00 0B A2 00 BD 50 03 8D 00 0B E8 EC 09   ........P.......
11D0  06 B0 03 4C C7 11 20 21 15 A9 02 8D 05 06 8D 36   ...L.. !.......6
11E0  06 78 A9 00 8D 09 06 8D 0F 06 8D 0E 06 8D 15 06   .x..............
11F0  AD 0C 10 85 04 AD 0D 10 85 05 58 4C 38 10 AD 06   ..........XL8...
      0  1  2  3  4  5  6  7  8  9  A  B  C  D  E  F
1200  06 8D 00 0B C9 04 F0 24 C9 10 F0 03 4C 38 10 20   .......$....L8.
1210  51 15 4C 38 10 AD 0A 06 8D 00 0B A2 00 BD 50 04   Q.L8..........P.
1220  8D 00 0B E8 EC 0A 06 B0 03 4C 1D 12 20 2D 15 A9   .........L.. -..
1230  02 8D 06 06 8D 37 06 78 A9 00 8D 0A 06 8D 11 06   .....7.x........
1240  8D 10 06 8D 16 06 AD 0C 10 85 06 AD 0D 10 85 07   ................
1250  58 4C 38 10 AD 07 06 8D 00 0B C9 04 F0 24 C9 10   XL8..........$..
1260  F0 03 4C 38 10 20 51 15 4C 38 10 AD 0B 06 8D 00   ..L8. Q.L8......
1270  0B A2 00 BD 50 05 8D 00 0B E8 EC 0B 06 B0 03 4C   ....P..........L
1280  73 12 20 39 15 A9 02 8D 07 06 8D 38 06 78 A9 00   s. 9.......8.x..
1290  8D 0B 06 8D 13 06 8D 12 06 8D 17 06 AD 0C 10 85   ................
12A0  08 AD 0D 10 85 09 58 4C 38 10 20 F7 1C A2 00 AD   ......XL8. .....
12B0  00 0E 29 01 D0 03 4C C3 12 AD 00 0B 9D 00 02 E8   ..)...L.........
12C0  4C AF 12 8E 00 06 A2 00 BD 00 02 C9 0B F0 1A C9   L...............
12D0  0E F0 03 4C F8 12 A2 01 A0 00 BD 00 02 99 00 02   ...L............
12E0  E8 C8 C0 04 D0 F4 CE 00 06 78 AD 30 10 85 02 AD   .........x.0....
12F0  31 10 85 03 58 4C 38 10 AD 34 06 C9 88 F0 03 4C   1...XL8..4.....L
      0  1  2  3  4  5  6  7  8  9  A  B  C  D  E  F
1300  07 13 A9 01 8D 30 06 78 AD 12 10 85 02 AD 13 10   .....0.x........
1310  85 03 58 4C 38 10 20 62 1D A2 00 AD 00 0E 29 01   ..XL8. b......).
1320  D0 03 4C 2F 13 AD 00 0B 9D 00 03 E8 4C 1B 13 8E   ..L/........L...
1330  01 06 A2 00 BD 00 03 C9 0B F0 1A C9 0E F0 03 4C   ...............L
1340  64 13 A2 01 A0 00 BD 00 03 99 00 03 E8 C8 C0 04   d...............
1350  D0 F4 CE 01 06 78 AD 30 10 85 04 AD 31 10 85 05   .....x.0....1...
1360  58 4C 38 10 AD 34 06 C9 89 F0 03 4C 73 13 A9 01   XL8..4.....Ls...
1370  8D 31 06 78 AD 12 10 85 04 AD 13 10 85 05 58 4C   .1.x..........XL
1380  38 10 20 CA 1D A2 00 AD 00 0E 29 01 D0 03 4C 9B   8. .......)...L.
1390  13 AD 00 0B 9D 00 04 E8 4C 87 13 8E 02 06 A2 00   ........L.......
13A0  BD 00 04 C9 0B F0 1A C9 0E F0 03 4C D0 13 A2 01   ...........L....
13B0  A0 00 BD 00 04 99 00 04 E8 C8 C0 04 D0 F4 CE 02   ................
13C0  06 78 AD 30 10 85 06 AD 31 10 85 07 58 4C 38 10   .x.0....1...XL8.
13D0  AD 34 06 C9 8A F0 03 4C DF 13 A9 01 8D 32 06 78   .4.....L.....2.x
13E0  AD 12 10 85 06 AD 13 10 85 07 58 4C 38 10 20 32   ..........XL8. 2
13F0  1E A2 00 AD 00 0E 29 01 D0 03 4C 07 14 AD 00 0B   ......)...L.....
      0  1  2  3  4  5  6  7  8  9  A  B  C  D  E  F
1400  9D 00 05 E8 4C F3 13 8E 03 06 A2 00 BD 00 05 C9   ....L...........
1410  0B F0 1A C9 0E F0 03 4C 3C 14 A2 01 A0 00 BD 00   .......L<.......
1420  05 99 00 05 E8 C8 C0 04 D0 F4 CE 03 06 78 AD 30   .............x.0
1430  10 85 08 AD 31 10 85 09 58 4C 38 10 AD 34 06 C9   ....1...XL8..4..
1440  8B F0 03 4C 4B 14 A9 01 8D 33 06 78 AD 12 10 85   ...LK....3.x....
```

```
1450  08 AD 13 10 85 09 58 4C 38 10 A9 01 8D 00 0D 20   ......XL8......
1460  15 15 78 AD 0C 10 85 02 AD 0D 10 85 03 58 A9 02   ..x..........X..
1470  8D 04 06 4C 38 10 A9 01 8D 01 0D 20 21 15 78 AD   ...L8...... !.x.
1480  0C 10 85 04 AD 0D 10 85 05 58 A9 02 8D 05 06 4C   .........X.....L
1490  38 10 A9 01 8D 02 0D 20 2D 15 78 AD 0C 10 85 06   8...... -.x.....
14A0  AD 0D 10 85 07 58 A9 02 8D 06 06 4C 38 10 A9 01   .....X.....L8...
14B0  8D 03 0D 20 39 15 78 AD 0C 10 85 08 AD 0D 10 85   ... 9.x.........
14C0  09 58 A9 02 8D 07 06 4C 38 10 78 AD 00 0E 29 01   .X.....L8.x...).
14D0  D0 03 4C CA 14 AD 00 0B EA 8D 00 0B 58 4C 38 10   ..L.........XL8.
14E0  78 A9 55 85 0B 85 0C A5 0B C9 55 F0 03 4C FC 14   x.U.......U..L..
14F0  A5 0C C9 55 F0 03 4C FC 14 4C 07 15 A9 01 8D 01   ...U..L..L......
      0  1  2  3  4  5  6  7  8  9  A  B  C  D  E  F
1500  0C 8D 00 0B 4C 11 15 A9 01 8D 01 0C A9 00 8D 00   ....L...........
1510  0B 58 4C 38 10 AD 1C 06 C9 01 F0 01 60 20 45 15   .XL8.........` E.
1520  60 AD 1C 06 C9 02 F0 01 60 20 45 15 60 AD 1C 06   `.......` E.`...
1530  C9 03 F0 01 60 20 45 15 60 AD 1C 06 C9 04 F0 01   ....` E.`.......
1540  60 20 45 15 60 A9 00 8D 01 0C 8D 1C 06 60 4C 38   ` E.`........`L8
1550  10 A9 00 8D 00 0C 8D 22 06 60 48 98 48 8A 48 78   .......".`H.H.Hx
1560  18 A2 00 8E 1D 06 A9 10 8D 1E 06 A9 01 8D 1F 06   ................
1570  6C 02 00 18 A2 01 8E 1D 06 A9 20 8D 1E 06 A9 02   l.......... ....
1580  8D 1F 06 6C 04 00 18 A2 02 8E 1D 06 A9 40 8D 1E   ...l.........@..
1590  06 A9 04 8D 1F 06 6C 06 00 18 A2 03 8E 1D 06 A9   ......l.........
15A0  80 8D 1E 06 A9 08 8D 1F 06 6C 08 00 68 AA 68 A8   .........l..h.h.
15B0  68 58 40 4C D9 1C AD 00 0A 2D 1E 06 D0 10 AD 00   hX@L.....-......
15C0  09 2D 1E 06 F0 25 A9 00 9D 04 06 4C D9 1C A9 00   .-...%.....L....
15D0  9D 14 06 20 96 1C A9 00 9D 0D 06 9D 0C 06 AD 02   ... ............
15E0  10 95 02 AD 03 10 95 03 4C D9 1C 20 96 1C A9 00   ........L.. ....
15F0  9D 0D 06 9D 0C 06 AD 24 10 95 02 AD 25 10 95 03   .......$....%...
      0  1  2  3  4  5  6  7  8  9  A  B  C  D  E  F
1600  AE 1D 06 A9 00 9D 14 06 4C D9 1C AD 00 09 2D 1E   ........L.....-.
1610  06 F0 0B A9 00 9D 14 06 20 96 1C 4C CE 16 FE 14   ........ ..L....
1620  06 BD 14 06 C9 14 B0 03 4C D9 1C A9 00 9D 14 06   ........L.......
1630  20 96 1C 4C DB 16 AD 00 0A 2D 1E 06 D0 18 20 96    ..L.....-.... .
1640  1C A9 00 9D 0C 06 9D 0D 06 AD 06 10 95 02 AD 07   ................
1650  10 95 03 4C D9 1C 20 96 1C 18 BD 0C 06 69 01 9D   ...L.. ......i..
1660  0C 06 BD 0D 06 69 00 9D 0D 06 C9 07 B0 03 4C D9   .....i.......L.
1670  1C BD 0C 06 C9 D0 B0 03 4C D9 1C 20 96 1C AD 08   ........L.. ....
1680  10 95 02 AD 09 10 95 03 4C D9 1C AD 22 06 C9 00   ........L..."...
1690  F0 03 4C D9 1C A9 01 8D 00 0C 9D 04 0D A9 10 9D   ..L.............
16A0  04 06 E8 8E 22 06 20 96 1C AD 1E 10 95 02 AD 1F   ....". .........
16B0  10 95 03 4C D9 1C AD 00 0A 2D 1E 06 D0 1D 20 96   ...L.....-.... .
16C0  1C FE 0D 06 BD 0D 06 C9 0C B0 03 4C D9 1C AD 00   ...........L....
16D0  10 95 02 AD 01 10 95 03 4C D9 1C 20 96 1C AD 0A   ........L.. ....
16E0  10 95 02 AD 0B 10 95 03 AD 1C 06 C9 00 F0 03 4C   ...............L
16F0  D9 1C AE 1D 06 A9 03 9D 04 06 E8 8E 1C 06 A9 01   ................
      0  1  2  3  4  5  6  7  8  9  A  B  C  D  E  F
1700  8D 01 0C 20 96 1C AD 1E 10 95 02 AD 1F 10 95 03   ... ............
1710  4C D9 1C AD 00 09 2D 1F 06 D0 55 AD 00 09 2D 1E   L.....-...U...-.
1720  06 F0 0A BD 2B 06 C9 01 F0 0B 4C D9 1C A9 01 9D   ....+.....L.....
1730  2B 06 4C D9 1C 20 96 1C AD 36 10 95 02 AD 37 10   +.L.. ...6....7.
1740  95 03 4C D9 1C AD 1C 06 C9 00 F0 03 4C D9 1C AE   ..L.........L...
1750  1D 06 A9 05 9D 04 06 E8 8E 1C 06 A9 01 8D 01 0C   ................
1760  20 96 1C AD 1E 10 95 02 AD 1F 10 95 03 4C D9 1C    ............L..
1770  BD 00 0F 9D 39 06 20 96 1C AD 0E 10 95 02 AD 0F   ....9. .........
1780  10 95 03 4C D9 1C AD 00 09 2D 1F 06 D0 03 4C 94   ...L.....-....L.
1790  17 4C D9 1C 20 01 18 AE 1D 06 A9 06 9D 04 06 20   .L.. .......... 
17A0  96 1C A9 00 9D 0C 06 9D 0D 06 AD 10 10 95 02 AD   ................
17B0  11 10 95 03 4C D9 1C AD 00 09 2D 1F 06 D0 28 20   ....L.....-...( 
17C0  96 1C 18 BD 0C 06 69 01 9D 0C 06 BD 0D 06 69 00   ......i.......i.
17D0  9D 0D 06 C9 03 B0 03 4C D9 1C BD 0C 06 C9 E8 B0   .......L........
17E0  03 4C D9 1C 4C E8 18 20 96 1C A9 00 9D 0C 06 9D   .L..L.. ........
17F0  0D 06 AD 0C 10 95 02 AD 0D 10 95 03 4C D9 1C EA   ............L...
      0  1  2  3  4  5  6  7  8  9  A  B  C  D  E  F
1800  EA AE 1D 06 E0 00 F0 0B E0 01 F0 0A E0 02 F0 09   ................
1810  4C B5 18 4C 1C 18 4C 4F 18 4C 82 18 AC 14 06 AD   L..L..LO.L......
1820  39 06 99 50 02 C8 8C 14 06 C9 0C F0 10 AD 35 06   9..P..........5.
1830  C9 02 F0 08 AD 14 06 CD 21 06 B0 01 60 20 96 1C   ........!...` ..
```

```
1840  AD 20 10 85 02 AD 21 10 85 03 68 68 4C D9 1C AC   . ....!...hhL...
1850  15 06 AD 3A 06 99 50 03 C8 8C 15 06 C9 0C F0 10   ...:..P.........
1860  AD 36 06 C9 02 F0 08 AD 15 06 CD 21 06 B0 01 60   .6.........!....
1870  20 96 1C AD 20 10 85 04 AD 21 10 85 05 68 68 4C    ... ....!...hhL
1880  D9 1C AC 16 06 AD 3B 06 99 50 04 C8 8C 16 06 C9   ......;..P......
1890  0C F0 10 AD 37 06 C9 02 F0 08 AD 16 06 CD 21 06   ....7.........!.
18A0  B0 01 60 20 96 1C AD 20 10 85 06 AD 21 10 85 07   .. ... ....!....
18B0  68 68 4C D9 1C AC 17 06 AD 3C 06 99 50 05 C8 8C   hhL......<..P...
18C0  17 06 C9 0C F0 10 AD 38 06 C9 02 F0 08 AD 17 06   .......8........
18D0  CD 21 06 B0 01 60 20 96 1C AD 20 10 85 08 AD 21   .!... ... .....!
18E0  10 85 09 68 68 4C D9 1C AE 1D 06 AD 1C 06 C9 00   ...hhL..........
18F0  F0 10 20 96 1C AD 20 10 95 02 AD 21 10 95 03 4C   .. ... ....!...L

      0  1  2  3  4  5  6  7  8  9  A  B  C  D  E  F
1900  D9 1C A9 01 8D 01 0C 9D 04 06 BD 14 06 9D 08 06   ................
1910  E8 8E 1C 06 20 96 1C AD 1E 10 95 02 AD 1F 10 95   .... ...........
1920  03 4C D9 1C A9 01 9D 00 0D 9D 04 0C A9 00 9D 14   .L..............
1930  06 A9 02 9D 04 06 20 96 1C A9 00 9D 0C 06 9D 0D   ...... .........
1940  06 AD 26 10 95 02 AD 27 10 95 03 4C D9 1C FE 14   ..&....'...L....
1950  06 BD 14 06 C9 96 B0 03 4C D9 1C BD 30 06 29 01   ........L...0.).
1960  D0 03 4C 6D 19 A9 00 9D 04 0C 9D 30 06 A9 00 9D   ..Lm.......0....
1970  14 06 20 96 1C AD 14 10 95 02 AD 15 10 95 03 4C   .. ............L
1980  D9 1C AD 00 0A 2D 1F 06 D0 0B AD 00 09 2D 1E 06   .....-.......-..
1990  F0 03 4C D9 1C A9 01 9D 00 0D A9 02 9D 04 06 20   ..L............
19A0  96 1C 18 A9 00 9D 0C 06 9D 0D 06 AD 16 10 95 02   ................
19B0  AD 17 10 95 03 4C D9 1C 20 96 1C 18 BD 0C 06 69   .....L.. ......i
19C0  01 9D 0C 06 C9 C8 B0 03 4C D9 1C AD 18 10 95 02   ........L.......
19D0  AD 19 10 95 03 AE 1D 06 A9 00 9D 14 06 4C D9 1C   .............L..
19E0  BD 23 06 29 01 D0 03 4C FA 19 20 96 1C AD 28 10   .#.)...L.. ...(.
19F0  95 02 AD 29 10 95 03 4C D9 1C 20 E7 1B 09 10 AE   ...)...L.. .....
      0  1  2  3  4  5  6  7  8  9  A  B  C  D  E  F
1A00  1D 06 9D 00 08 20 96 1C A9 00 9D 0C 06 9D 0D 06   ..... ..........
1A10  AD 1A 10 95 02 AD 1B 10 95 03 4C D9 1C 20 96 1C   ..........L.. ..
1A20  18 BD 0C 06 69 01 9D 0C 06 C9 14 B0 03 4C D9 1C   ....i........L..
1A30  AE 1D 06 A9 00 9D 00 08 20 96 1C A9 00 9D 0C 06   ........ .......
1A40  AD 1C 10 95 02 AD 1D 10 95 03 4C D9 1C 20 96 1C   ..........L.. ..
1A50  18 BD 0C 06 69 01 9D 0C 06 C9 0A B0 03 4C D9 1C   ....i........L..
1A60  20 96 1C A9 00 9D 0C 06 AE 1D 06 BD 18 06 29 01    ..............).
1A70  D0 03 4C FA 19 AE 1D 06 A9 04 9D 04 06 20 96 1C   ..L.......... ..
1A80  AD 1E 10 95 02 AD 1F 10 95 03 4C D9 1C 20 41 1B   ..........L.. A.
1A90  AE 1D 06 A9 00 9D 00 0D 20 96 1C A9 00 9D 0C 06   ........ .......
1AA0  9D 0D 06 AD 2A 10 95 02 AD 2B 10 95 03 4C D9 1C   ....*....+...L..
1AB0  20 96 1C FE 0C 06 BD 0C 06 C9 08 B0 03 4C D9 1C    ............L..
1AC0  A9 00 9D 0C 06 AE 1D 06 A9 01 9D 00 0D 20 96 1C   ............. ..
1AD0  AD 2C 10 95 02 AD 2D 10 95 03 4C D9 1C 20 96 1C   .,....-...L.. ..
1AE0  FE 0C 06 BD 0C 06 C9 0C B0 03 4C D9 1C A9 00 9D   ..........L.....
1AF0  0C 06 AE 1D 06 A9 01 9D 00 0D DE 27 06 BD 27 06   ...........'..'.
      0  1  2  3  4  5  6  7  8  9  A  B  C  D  E  F
1B00  C9 00 F0 03 4C 90 1A 20 96 1C AD 2E 10 95 02 AD   ....L.. ........
1B10  2F 10 95 03 4C D9 1C 20 96 1C FE 0C 06 BD 0C 06   /...L.. ........
1B20  C9 8C B0 03 4C D9 1C A9 00 9D 0C 06 AE 1D 06 BD   ....L...........
1B30  18 06 C9 01 F0 03 4C 8D 1A A9 01 9D 00 0D 4C 75   ......L.......Lu
1B40  1A AE 1D 06 E0 00 F0 CB E0 01 F0 2C E0 02 F0 4D   ...........,...M
1B50  4C C2 1B AD 14 06 A8 B9 00 02 C9 00 F0 0F 8D 27   L..............'
1B60  06 EE 14 06 AD 14 06 CD 00 06 B0 06 60 A9 0A 4C   ............`..L
1B70  5E 1B A9 01 8D 18 06 60 AD 15 06 A8 B9 00 03 C9   ^......`........
1B80  00 F0 0F 8D 28 06 EE 15 06 AD 15 06 CD 01 06 B0   ....(...........
1B90  06 60 A9 0A 4C 83 1B A9 01 8D 19 06 60 AD 16 06   .`..L.......`...
1BA0  A8 B9 00 04 C9 00 F0 0F 8D 29 06 EE 16 06 AD 16   .........).;....
1BB0  06 CD 02 06 B0 06 60 A9 0A 4C A8 1B A9 01 8D 1A   ......`..L......
1BC0  06 60 AD 17 06 A8 B9 00 05 C9 00 F0 0F 8D 2A 06   .`............*.
1BD0  EE 17 06 AD 17 06 CD 03 06 B0 06 60 A9 0A 4C CD   ............`..L.
1BE0  1B A9 01 8D 1B 06 60 AD 1D 06 C9 00 F0 0B C9 01   ......`.........
1BF0  F0 0A C9 02 F0 09 4C 71 1C 4C 02 1C 4C 27 1C 4C   ......Lq.L..L'.L
```

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1C00 | 4C | 1C | AD | 14 | 06 | A8 | B9 | 00 | 02 | 8D | 39 | 06 | EE | 14 | 06 | 20 | L.........9..... |
| 1C10 | 9E | 1C | AD | 14 | 06 | CD | 00 | 06 | B0 | 04 | AD | 39 | 06 | 60 | A9 | 01 | ...........9.`.. |
| 1C20 | 8D | 18 | 06 | AD | 39 | 06 | 60 | AD | 15 | 06 | A8 | B9 | 00 | 03 | 8D | 3A | ....9.`........: |
| 1C30 | 06 | EE | 15 | 06 | 20 | 9E | 1C | AD | 15 | 06 | CD | 01 | 06 | B0 | 04 | AD | .... ........... |
| 1C40 | 3A | 06 | 60 | A9 | 01 | 8D | 19 | 06 | AD | 3A | 06 | 60 | AD | 16 | 06 | A8 | :.`......:.`.... |
| 1C50 | B9 | 00 | 04 | 8D | 3B | 06 | EE | 16 | 06 | 20 | 9E | 1C | AD | 16 | 06 | CD | ....;.... ...... |
| 1C60 | 02 | 06 | B0 | 04 | AD | 3B | 06 | 60 | A9 | 01 | 8D | 1A | 06 | AD | 3B | 06 | .....;.`......;. |
| 1C70 | 60 | AD | 17 | 06 | A8 | B9 | 00 | 05 | 8D | 3C | 06 | EE | 17 | 06 | 20 | 9E | `........<.... . |
| 1C80 | 1C | AD | 17 | 06 | CD | 03 | 06 | B0 | 04 | AD | 3C | 06 | 60 | A9 | 01 | 8D | ..........<.`... |
| 1C90 | 1B | 06 | AD | 3C | 06 | 60 | AE | 1D | 06 | 18 | 8A | 2A | AA | 60 | AE | 1D | ...<.`.....*.`.. |
| 1CA0 | 06 | BD | 39 | 06 | C9 | 0C | F0 | 0D | C9 | 0B | F0 | 15 | C9 | 00 | F0 | 17 | ..9............. |
| 1CB0 | C9 | 0D | F0 | 19 | 60 | A9 | 00 | 9D | 39 | 06 | 68 | 68 | 68 | 68 | 4C | 05 | ....`...9.hhhhL. |
| 1CC0 | 1A | A9 | 0C | 9D | 39 | 06 | 60 | A9 | 0A | 9D | 39 | 06 | 60 | A9 | 01 | 9D | ....9.`...9.`... |
| 1CD0 | 18 | 06 | 68 | 68 | 68 | 68 | 4C | 05 | 1A | AE | 1D | 06 | E0 | 00 | F0 | 0B | ..hhhhL......... |
| 1CE0 | E0 | 01 | F0 | 0A | E0 | 02 | F0 | 09 | 4C | F4 | 1C | 4C | 73 | 15 | 4C | 86 | ........L..Ls.L. |
| 1CF0 | 15 | 4C | 99 | 15 | 4C | AC | 15 | A0 | 00 | A9 | 00 | 99 | 00 | 02 | C8 | D0 | .L..L........... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1D00 | F8 | 8D | 00 | 06 | 8D | 04 | 06 | 8D | 08 | 06 | 8D | 0C | 06 | 8D | 0D | 06 | ................ |
| 1D10 | 8D | 14 | 06 | 8D | 18 | 06 | 8D | 2B | 06 | 8D | 35 | 06 | 8D | 30 | 06 | AD | .......+..5..0.. |
| 1D20 | 1C | 06 | C9 | 01 | F0 | 03 | 4C | 31 | 1D | A9 | 00 | 8D | 1C | 06 | 8D | 01 | ......L1........ |
| 1D30 | 0C | AD | 22 | 06 | C9 | 01 | F0 | 03 | 4C | 46 | 1D | A9 | 00 | 8D | 22 | 06 | ..".....LF....". |
| 1D40 | 8D | 00 | 0C | 8D | 04 | 0C | A9 | 00 | 8D | 04 | 0C | 8D | 00 | 08 | 8D | 00 | ................ |
| 1D50 | 0D | 8D | 04 | 0D | 8D | 2B | 06 | AD | 00 | 10 | 85 | 02 | AD | 01 | 10 | 85 | .....+.......... |
| 1D60 | 03 | 60 | A0 | 00 | A9 | 00 | 99 | 00 | 03 | C8 | D0 | F8 | 8D | 01 | 06 | 8D | .`.............. |
| 1D70 | 05 | 06 | 8D | 09 | 06 | 8D | 0E | 06 | 8D | 0F | 06 | 8D | 15 | 06 | 8D | 19 | ................ |
| 1D80 | 06 | 8D | 2C | 06 | 8D | 31 | 06 | 8D | 36 | 06 | AD | 1C | 06 | C9 | 02 | F0 | ..,..1..6....... |
| 1D90 | 03 | 4C | 9C | 1D | A9 | 00 | 8D | 1C | 06 | 8D | 01 | 0C | AD | 22 | 06 | C9 | .L...........".. |
| 1DA0 | 02 | F0 | 03 | 4C | B1 | 1D | A9 | 00 | 8D | 22 | 06 | 8D | 00 | 0C | 8D | 05 | ...L.....")..... |
| 1DB0 | 0C | A9 | 00 | 8D | 05 | 0C | 8D | 01 | 08 | 8D | 01 | 0D | 8D | 05 | 0D | AD | ................ |
| 1DC0 | 00 | 10 | 85 | 04 | AD | 01 | 10 | 85 | 05 | 60 | A0 | 00 | A9 | 00 | 99 | 00 | .........`...... |
| 1DD0 | 04 | C8 | D0 | F8 | 8D | 02 | 06 | 8D | 06 | 06 | 8D | 0A | 06 | 8D | 10 | 06 | ................ |
| 1DE0 | 8D | 11 | 06 | 8D | 16 | 06 | 8D | 1A | 06 | 8D | 2D | 06 | 8D | 32 | 06 | 8D | ..........-..2.. |
| 1DF0 | 37 | 06 | AD | 1C | 06 | C9 | 03 | F0 | 03 | 4C | 04 | 1E | A9 | 00 | 8D | 1C | 7........L...... |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1E00 | 06 | 8D | 01 | 0C | AD | 22 | 06 | C9 | 03 | F0 | 03 | 4C | 19 | 1E | A9 | 00 | .....".....L.... |
| 1E10 | 8D | 22 | 06 | 8D | 00 | 0C | 8D | 06 | 0C | A9 | 00 | 8D | 06 | 0C | 8D | 02 | .".............. |
| 1E20 | 08 | 8D | 02 | 0D | 8D | 06 | 0D | AD | 00 | 10 | 85 | 06 | AD | 01 | 10 | 85 | ................ |
| 1E30 | 07 | 60 | A0 | 00 | A9 | 00 | 99 | 00 | 05 | C8 | D0 | F8 | 8D | 03 | 06 | 8D | .`.............. |
| 1E40 | 07 | 06 | 8D | 0B | 06 | 8D | 12 | 06 | 8D | 13 | 06 | 8D | 17 | 06 | 8D | 1B | ................ |
| 1E50 | 06 | 8D | 2E | 06 | 8D | 33 | 06 | 8D | 38 | 06 | AD | 1C | 06 | C9 | 04 | F0 | .....3..8....... |
| 1E60 | 03 | 4C | 6C | 1E | A9 | 00 | 8D | 1C | 06 | 8D | 01 | 0C | AD | 22 | 06 | C9 | .Ll..........".. |
| 1E70 | 04 | F0 | 03 | 4C | 81 | 1E | A9 | 00 | 8D | 22 | 06 | 8D | 00 | 0C | 8D | 07 | ...L....."...... |
| 1E80 | 0C | A9 | 00 | 8D | 07 | 0C | 8D | 03 | 08 | 8D | 03 | 0D | 8D | 07 | 0D | AD | ................ |
| 1E90 | 00 | 10 | 85 | 08 | AD | 01 | 10 | 85 | 09 | 60 | 78 | A9 | 00 | 85 | 0B | A9 | .........`x..... |
| 1EA0 | 07 | 85 | 0C | A0 | 00 | 84 | 0A | A6 | 0C | A9 | 00 | 91 | 0A | C8 | D0 | FB | ................ |
| 1EB0 | E6 | 0B | E4 | 0B | B0 | F5 | 8D | 01 | 0C | 8D | 00 | 0C | A2 | 00 | A9 | 00 | ................ |
| 1EC0 | 9D | 04 | 0D | E8 | E0 | 04 | D0 | F8 | A2 | 00 | A9 | 00 | 9D | 04 | 0C | E8 | ................ |
| 1ED0 | E0 | 04 | D0 | F8 | AD | 00 | 0F | AD | 01 | 0F | AD | 02 | 0F | AD | 03 | 0F | ................ |
| 1EE0 | A9 | 00 | 8D | 00 | 08 | 8D | 01 | 08 | 8D | 02 | 08 | 8D | 03 | 08 | A2 | FF | ................ |
| 1EF0 | 9A | A2 | 00 | A9 | 01 | 9D | 00 | 0D | E8 | E0 | 04 | D0 | F6 | 18 | AD | 00 | ................ |

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 1F00 | 0E | 29 | 01 | D0 | 06 | 8D | 2F | 06 | 4C | FD | 1E | AD | 00 | 0B | 8D | 21 | .)..../.L......! |
| 1F10 | 06 | AD | 04 | 0E | 29 | 01 | D0 | 08 | A9 | 01 | 8D | 23 | 06 | 4C | 25 | 1F | ....)......#.L%. |
| 1F20 | A9 | 00 | 8D | 23 | 06 | AD | 05 | 0E | 29 | 01 | D0 | 08 | A9 | 01 | 8D | 24 | ...#....)......$ |
| 1F30 | 06 | 4C | 39 | 1F | A9 | 00 | 8D | 24 | 06 | AD | 06 | 0E | 29 | 01 | D0 | 08 | .L9....$....)... |
| 1F40 | A9 | 01 | 8D | 25 | 06 | 4C | 4D | 1F | A9 | 00 | 8D | 25 | 06 | AD | 07 | 0E | ...%.LM....%.... |
| 1F50 | 29 | 01 | D0 | 08 | A9 | 01 | 8D | 26 | 06 | 4C | 61 | 1F | A9 | 00 | 8D | 26 | )......&.La....& |
| 1F60 | 06 | A2 | 00 | A9 | 00 | 9D | 00 | 0D | E8 | E0 | 04 | D0 | F6 | A2 | FF | 9A | ................ |
| 1F70 | AD | 00 | 10 | 85 | 02 | 85 | 04 | 85 | 06 | 85 | 08 | AD | 01 | 10 | 85 | 03 | ................ |
| 1F80 | 85 | 05 | 85 | 07 | 85 | 09 | 58 | 4C | 38 | 10 | FF | FF | FF | FF | FF | FF | ......XL8....... |
| 1F90 | FF | FF | FF | FF | FF | FF | FF | FF | FF | FF | FF | FF | FF | FF | FF | FF | ................ |
| 1FA0 | FF | FF | FF | FF | FF | FF | FF | FF | FF | FF | FF | FF | FF | FF | FF | FF | ................ |
| 1FB0 | FF | FF | FF | FF | FF | FF | FF | FF | FF | FF | FF | FF | FF | FF | FF | FF | ................ |
| 1FC0 | FF | FF | FF | FF | FF | FF | FF | FF | FF | FF | FF | FF | FF | FF | FF | FF | ................ |
| 1FD0 | FF | FF | FF | FF | FF | FF | FF | FF | FF | FF | FF | FF | FF | FF | FF | FF | ................ |
| 1FE0 | FF | FF | FF | FF | FF | FF | FF | FF | FF | FF | FF | FF | FF | FF | FF | FF | ................ |
| 1FF0 | FF | FF | FF | FF | FF | FF | FF | FF | FF | FF | FF | FF | FF | FF | FF | FF | ................ |

Copyright TELEFIND INC. 1987
ESA Telecommunications, Inc.
10347 S. Oxford St.
Chicago Ridge, IL 60415
Gary F. Thelen
Hex dump of ESA.EXE ver. TW260
October 1, 1987

```
00000  4D 5A E0 01 83 01 00 00 20 00 00 00 FF FF 5C 04
00010  3C 00 16 57 00 01 00 00 20 00 00 00 4D 4A 00 01
00020  00 00 00 00 00 00 00 00 00 00 00 00 00 00 00 00
00030  00 00 00 00 00 00 00 00 00 00 00 00 00 00 00 00
00040  00 00 00 00 00 00 00 00 00 00 00 00 00 00 00 00
00050  00 00 00 00 00 00 00 00 00 00 00 00 00 00 00 00
00060  00 00 00 00 00 00 00 00 00 00 00 00 00 00 00 00
00070  00 00 00 00 00 00 00 00 00 00 00 00 00 00 00 00
00080  00 00 00 00 00 00 00 00 00 00 00 00 00 00 00 00
00090  00 00 00 00 00 00 00 00 00 00 00 00 00 00 00 00
000A0  00 00 00 00 00 00 00 00 00 00 00 00 00 00 00 00
000B0  00 00 00 00 00 00 00 00 00 00 00 00 00 00 00 00
000C0  00 00 00 00 00 00 00 00 00 00 00 00 00 00 00 00
000D0  00 00 00 00 00 00 00 00 00 00 00 00 00 00 00 00
000E0  00 00 00 00 00 00 00 00 00 00 00 00 00 00 00 00
000F0  00 00 00 00 00 00 00 00 00 00 00 00 00 00 00 00
00100  00 00 00 00 00 00 00 00 00 00 00 00 00 00 00 00
00110  00 00 00 00 00 00 00 00 00 00 00 00 00 00 00 00
00120  00 00 00 00 00 00 00 00 00 00 00 00 00 00 00 00
00130  00 00 00 00 00 00 00 00 00 00 00 00 00 00 00 00
00140  00 00 00 00 00 00 00 00 00 00 00 00 00 00 00 00
00150  00 00 00 00 00 00 00 00 00 00 00 00 00 00 00 00
00160  00 00 00 00 00 00 00 00 00 00 00 00 00 00 00 00
00170  00 00 00 00 00 00 00 00 00 00 00 00 00 00 00 00
00180  00 00 00 00 00 00 00 00 00 00 00 00 00 00 00 00
00190  00 00 00 00 00 00 00 00 00 00 00 00 00 00 00 00
001A0  00 00 00 00 00 00 00 00 00 00 00 00 00 00 00 00
001B0  00 00 00 00 00 00 00 00 00 00 00 00 00 00 00 00
001C0  00 00 00 00 00 00 00 00 00 00 00 00 00 00 00 00
001D0  00 00 00 00 00 00 00 00 00 00 00 00 00 00 00 00
001E0  00 00 00 00 00 00 00 00 00 00 00 00 00 00 00 00
001F0  00 00 00 00 00 00 00 00 00 00 00 00 00 00 00 00
00200  00 00 00 00 00 00 00 00 00 00 00 00 00 00 00 00
00210  00 00 00 00 00 00 00 00 00 00 00 00 00 00 00 00
00220  00 00 00 00 00 00 00 00 00 00 00 00 00 00 00 00
00230  00 00 00 00 00 00 00 00 00 00 00 00 00 00 00 00
00240  00 00 00 00 00 00 00 00 00 00 00 00 00 00 00 00
00250  00 00 00 00 00 00 00 00 00 00 00 00 00 00 00 00
00260  00 00 00 00 00 00 00 00 00 00 00 00 00 00 00 00
00270  00 00 00 00 00 00 00 00 00 00 00 00 00 00 00 00
00280  00 00 00 00 00 00 00 00 00 00 00 00 00 00 00 00
00290  00 00 00 00 00 00 00 00 00 00 00 00 00 00 00 00
002A0  00 00 00 00 00 00 00 00 00 00 00 00 00 00 00 00
002B0  00 00 00 00 00 00 00 00 00 00 00 00 00 00 00 00
002C0  00 00 00 00 00 00 00 00 00 00 00 00 00 00 00 00
002D0  00 00 00 00 00 00 00 00 00 00 00 00 00 00 00 00
002E0  00 00 00 00 00 00 00 00 00 00 00 00 00 00 00 00
002F0  00 00 00 00 00 00 00 00 00 00 00 00 00 00 00 00
00300  E9 C9 08 42 65 74 74 65 72 42 41 53 49 43 20 28
00310  74 6D 29 20 63 72 65 61 74 65 64 20 62 79 20 49
00320  76 61 72 20 57 6F 6C 64 2C 20 77 69 74 68 20 68
00330  65 6C 70 20 66 72 6F 6D 20 43 68 61 72 6C 79 20
00340  45 68 6C 69 6E 2C 20 42 69 6C 6C 20 50 69 74 74
00350  6F 72 65 2C 20 61 6E 64 20 74 68 65 20 72 65 73
00360  74 20 6F 66 20 74 68 65 20 53 75 6D 6D 69 74 20
00370  54 65 61 6D 2E 20 4E 6F 73 65 79 20 61 72 65 6E
00380  27 74 20 79 6F 75 21 21 00 00 00 00 00 00 00 00
00390  00 00 50 00 55 06 56 52 50 53 51 8B EC E3 2B 8B
003A0  D8 3D 00 00 74 58 3D D8 00 74 60 3D 64 00 74 41
```

```
003B0    3D 51 00 7E 1D 3D 64 00 7C 05 3D 6E 00 7C 25 B8
003C0    BE 02 89 46 04 E1 4E 12 00 08 59 5B 58 5A 5E 07
003D0    5D CF 8B 5E 04 B4 02 9C 36 FF 1E E2 02 89 4E 00
003E0    70 E0 EB E6 8B 5E 04 B4 07 9C 36 FF 1E 12 03 EB
003F0    EF 8B 5E 04 B4 08 9C 36 FF 1E 12 03 EB E2 8B 5E
00400    04 B4 06 9C 36 FF 1E 12 03 EB D5 B4 05 8E C2 26
00410    8A 14 4E 80 FA 0A 75 09 2E 81 3E 92 01 FF 00 74
00420    3A 80 FA 09 74 3B CD 21 80 FA 0D 74 51 80 FA 20
00430    72 29 2E FF 06 90 01 2E 8B 16 90 01 2E 3B 16 92
00440    01 72 18 2E C7 06 90 01 00 00 B2 0D CD 21 2E 81
00450    3E 92 01 FF 00 74 04 B2 0A CD 21 49 75 B1 E9 69
00460    FF 2E 8B 1E 90 01 43 81 E3 07 00 F7 DB 83 C3 08
00470    2E 01 1E 90 01 B2 20 CD 21 4B 75 FB EB DD 2E C7
00480    06 90 01 00 00 E8 D4 55 06 56 52 50 53 51 8B EC
00490    8B D8 3D 00 00 74 0E B4 01 9C 36 FF 1E E2 02 89
004A0    4E 00 E9 3B FF B4 0A 9C 36 FF 1E 12 03 E9 4E 00
004B0    E9 2D FF 00 00 00 00 00 00 00 00 00 00 00 00 00
004C0    00 00 00 00 00 00 00 00 00 00 00 00 00 00 00 00
004D0    C7 46 14 BE 02 EB 48 90 31 03 EC 03 B2 03 9F 03
004E0    1A 03 53 04 92 04 AF 05 CF 05 5D 05 9C 36 FF 1E
004F0    92 02 51 56 0E 1F 80 FC 07 74 14 80 FC 08 74 0F
00500    80 FC 09 74 0A 83 FB 01 75 C6 80 FC 0B 77 0B 8A
00510    DC D0 E3 81 C3 D8 02 2E FF 27 C7 46 14 CF 02 81
00520    76 1A 00 08 9C 36 FF 1E 96 02 C7 46 14 C1 02 EB
00530    EE 8B 4E 0A 22 C0 74 07 FE C8 75 EE EB 5A 90 B4
00540    0F 50 8E 5E 08 8B 76 FC 8C CF 8E C7 BF C0 02 E3
00550    D9 FD AC FC AA E2 FA B0 20 AA 8C CE 8E DE BE C0
00560    02 BF 80 00 B4 29 B4 29 CD 21 26 80 7D 01 20 74
00570    B9 8B D7 58 CD 21 22 C0 75 17 8B DA C7 47 0E 01
00580    00 C7 47 21 00 00 C7 47 23 00 00 9C 36 FF 1E 96
00590    02 C7 46 14 C4 02 EB 87 B4 16 EB A5 E9 31 FF BA
005A0    80 00 B4 10 CD 21 22 C0 74 E1 C7 46 14 C3 02 E9
005B0    6D FF 8C CA 8E DA BA C0 02 8B FA B4 1A CD 21 BA
005C0    80 00 8E 46 08 8B 76 FC 26 8A 04 88 05 4E 89 01
005D0    00 B4 28 CD 21 22 C0 75 0B FF 4E FE 75 EA 9C 36
005E0    FF 1E 96 02 C7 46 14 C0 02 E9 33 FF C7 46 0A 00
005F0    00 8B 4E FE 8B 76 FC 8E 46 08 81 66 FE FF 7F 8A
00600    FD BA C0 02 8B FA B4 1A CD 21 BA 80 00 B9 01 00
00610    B4 27 CD 21 22 C0 75 1D 8A 05 F6 C7 80 75 04 3C
00620    0D 74 26 26 88 04 4E FF 46 0A FF 4E FE 75 DE 9C
00630    36 FF 1E 96 02 FE C8 75 08 C7 46 14 BC 02 E9 DE
00640    FE C7 46 14 CD 02 E9 D6 FE B4 27 CD 21 9C 36 FF
00650    1E 96 02 8E 5E 08 8B 56 06 B4 1A CD 21 0E 1F 8B
00660    4E 0A BA 80 00 E3 08 B4 27 CD 21 22 C0 75 06 9C
00670    36 FF 1E 96 02 C7 46 14 BC 02 FE C8 74 11 C7 46
00680    14 CD 02 FE C8 74 05 89 4E 0A C7 46 14 BC 02 E9
00690    8D FE 8E 5E 08 8B 56 06 B4 1A CD 21 0E 1F 8B 4E
006A0    0A E3 0B BA 80 00 B4 28 CD 21 22 C0 75 06 9C 36
006B0    FF 1E 96 02 C7 46 14 C0 02 E9 63 FE 9C 36 FF 1E
006C0    92 02 51 56 0E 1F 80 FC 0A 74 4F 80 FC 06 74 1A
006D0    80 FC 0B 74 0F 80 FC 12 74 76 C7 46 14 CF 02 81
006E0    76 1A 00 08 9C 36 FF 1E 96 02 8E 46 08 8B 76 FC
006F0    26 8A 14 80 FA 0D 75 06 C7 06 29 07 FF FF 80 FA
00700    0A 74 04 FF 06 29 07 B4 02 CD 21 4E FF 4E FE 75
00710    DF 89 76 FC 9C 36 FF 1E 96 02 C7 46 0A 00 00 8B
00720    4E FE 8B 76 FC 8E 46 08 81 66 FE FF 7F F6 C5 80
00730    75 4B B4 01 CD 21 3C 00 74 31 3C 08 74 5A 26 88
00740    04 FF 46 0A 4E FF 4E FE 75 EB 9C 36 FF 1E 96 02
00750    8B 0E 29 07 89 4E 0A 9C 36 FF 1E 96 02 8B 0E 90
00760    01 41 89 4E 0A 9C 36 FF 1E 96 02 B4 02 B2 0A CD
00770    21 C7 06 29 07 00 00 9C 36 FF 1E 96 02 B4 08 CD
00780    21 FF 46 0A 26 88 04 4E FF 4E FE 75 F0 9C 36 FF
00790    1E 96 02 FF 46 0A EB 9A FF 4E 0A 78 F6 B2 20 B4
007A0    02 CD 21 B2 08 B4 02 CD 21 46 FF 46 FE EB 83 8B
007B0    5E 0C 81 FB C8 00 72 06 8B 0E 90 01 EB 08 B4 12
007C0    9C 36 FF 1E 12 03 89 4E 0A 9C 36 FF 1E 96 02 89
007D0    0E 92 01 9C 36 FF 1E 96 02 00 00 00 00 00 00 00
```

```
007E0   00 00 00 00 00 00 00 00 00 00 00 00 00 00 00 00
007F0   00 00 00 00 00 00 00 00 00 00 00 00 00 90 00 00
00800   00 00 00 00 00 00 00 00 00 00 00 00 00 00 00 00
00810   00 00 00 00 00 00 00 00 00 00 00 00 00 00 00 00
00820   00 00 00 00 00 00 00 00 00 00 00 00 00 00 00 00
00830   00 00 00 00 00 00 00 00 00 00 00 00 00 00 00 00
00840   00 00 00 00 00 00 00 00 00 00 00 00 00 00 00 00
00850   00 00 00 00 00 00 00 00 00 00 00 00 00 00 00 00
00860   00 00 00 00 00 00 00 00 00 00 00 00 00 00 00 00
00870   00 00 00 00 00 00 00 00 00 00 00 00 00 00 00 00
00880   00 00 00 00 00 00 00 00 00 00 00 00 00 00 00 00
00890   00 00 00 00 00 00 00 00 00 00 00 00 00 00 00 00
008A0   00 00 00 00 00 00 00 00 00 00 00 00 00 00 00 00
008B0   00 00 00 00 00 00 00 00 00 00 00 00 00 00 00 00
008C0   00 00 00 00 00 00 00 00 00 00 00 00 00 00 00 00
008D0   00 00 00 00 00 00 00 00 00 00 00 00 00 00 00 00
008E0   00 00 00 00 00 00 00 00 00 00 00 00 00 00 00 00
008F0   00 00 00 00 00 00 00 00 00 00 00 00 00 00 00 00
00900   00 00 00 00 00 00 00 00 00 00 00 00 00 00 00 00
00910   00 00 06 00 00 00 00 00 00 00 00 00 00 00 00 00
00920   00 00 00 00 00 28 28 00 00 00 00 00 00 00 00 00
00930   00 00 00 00 00 00 00 00 00 00 00 00 00 00 00 00
00940   00 00 00 00 00 00 00 00 00 00 00 00 00 00 00 00
00950   00 00 00 00 00 00 00 00 00 00 00 00 00 00 00 00
00960   00 00 00 00 00 00 00 00 00 00 00 00 00 00 00 00
00970   00 00 00 00 00 00 00 00 00 00 00 00 00 00 00 00
00980   00 00 00 00 00 00 00 00 00 00 00 00 00 00 00 00
00990   00 00 00 00 00 00 00 00 00 00 00 00 00 00 00 00
009A0   00 00 00 00 00 00 00 00 00 00 00 00 00 00 00 00
009B0   00 00 00 00 00 00 00 00 00 00 00 00 00 00 00 00
009C0   00 00 00 00 00 00 00 00 00 00 00 00 00 00 00 00
009D0   00 00 00 00 00 00 00 00 00 00 00 00 00 00 00 00
009E0   00 00 00 00 00 00 00 00 00 00 00 00 00 00 00 00
009F0   00 00 00 00 00 00 00 00 00 00 00 00 00 00 00 00
00A00   00 00 00 00 00 00 00 00 00 00 00 00 00 00 00 00
00A10   00 00 00 00 00 00 00 00 00 00 00 00 00 00 00 00
00A20   00 00 00 00 00 00 00 00 00 00 00 00 62 2E 64 65
00A30   66 00 0A 62 2E 63 6E 66 00 0A 73 68 65 6C 6C 2E
00A40   73 69 7A 00 0A 42 45 54 54 45 52 42 41 53 49 43
00A50   49 6E 73 75 66 66 69 63 69 65 6E 74 20 4D 65 6D
00A60   6F 72 79 00 0A 54 6F 6F 20 4D 75 63 68 20 4D 65
00A70   6D 6F 72 79 20 53 70 65 63 69 66 69 65 64 20 49
00A80   6E 20 22 53 48 45 4C 4C 3D 22 20 63 6F 6D 6D 61
00A90   6E 64 0D 0A 55 6E 6B 6E 6F 77 6E 20 4B 45 59 57
00AA0   4F 52 44 20 69 6E 20 43 6F 6E 66 69 67 75 72 61
00AB0   74 69 6F 6E 20 46 69 6C 65 0D 0A 52 65 71 75 65
00AC0   73 74 65 64 20 53 74 61 63 6B 20 69 73 20 74 6F
00AD0   6F 20 6C 61 72 67 65 0D 0A 53 79 6E 74 61 78 20
00AE0   45 72 72 6F 72 20 69 6E 20 43 6F 6E 66 69 67 75
00AF0   72 61 74 69 6F 6E 20 46 69 6C 65 0D 0A 49 6C 6C
00B00   65 67 61 6C 20 50 72 65 63 69 73 69 6F 6E 20 53
00B10   70 65 63 69 66 69 65 64 0D 0A 49 6C 6C 65 67 61
00B20   6C 20 4E 75 6D 62 65 72 20 69 6E 20 22 53 68 65
00B30   6C 6C 3D 22 20 44 65 63 6C 61 72 61 74 69 6F 6E
00B40   0D 0A 49 6C 6C 65 67 61 6C 20 4E 75 6D 62 65 72
00B50   20 69 6E 20 22 58 6D 65 6D 3D 22 20 44 65 63 6C
00B60   61 72 61 74 69 6F 6E 0D 0A 48 65 78 20 4E 75 6D
00B70   62 65 72 20 45 78 70 65 63 74 65 64 20 69 6E 20
00B80   43 6F 6E 66 69 67 75 72 61 74 69 6F 6E 20 46 69
00B90   6C 65 0D 0A 4E 6F 6E 2D 45 78 69 73 74 65 6E 74
00BA0   20 50 72 6F 67 72 61 6D 20 46 69 6C 65 0D 0A 55
00BB0   6E 6B 6E 6F 77 6E 20 41 63 74 69 6F 6E 20 4B 65
00BC0   79 57 6F 72 64 0D 0A 2E FF 2E F0 05 FA 2E 8C 1E
00BD0   F2 05 B8 F2 10 05 0F 00 B1 04 D3 E8 8B DC 83 C3
00BE0   0F D3 EB 8C D1 03 D9 8C C9 8E D1 BC 0C 07 2E C7
00BF0   06 10 07 80 02 03 C8 8E D9 8B CB 8E C1 2E 89 0E
```

| | | | | | | | | | | | | | | | | |
|---|---|---|---|---|---|---|---|---|---|---|---|---|---|---|---|---|
| 00C00 | 1B | 07 | BE | 5E | 01 | 8C | 5C | 02 | 8C | 5C | 06 | 8C | 5C | 0A | 8C | 5C |
| 00C10 | 0E | 0E | 07 | BF | E0 | 05 | B9 | 08 | 00 | FC | F3 | A5 | 2E | C7 | 06 | 13 |
| 00C20 | 07 | 80 | 02 | B8 | 06 | 00 | EB | 22 | E9 | 08 | 02 | BF | 94 | 09 | E9 | 17 |
| 00C30 | 04 | 2E | FF | 2E | E4 | 05 | 2E | 8E | 16 | 0E | 07 | 2E | 8B | 26 | 10 | 07 |
| 00C40 | 51 | 9C | 36 | FF | 1E | 1E | 03 | 59 | E3 | E7 | B4 | 30 | CD | 21 | 2E | A2 |
| 00C50 | F6 | 05 | 3C | 02 | 72 | 03 | E8 | EE | 05 | 2E | 8E | 1E | F2 | 05 | 2E | 80 |
| 00C60 | 3E | 21 | 07 | 00 | 75 | C2 | 2E | FE | 06 | 21 | 07 | 2E | C7 | 06 | F4 | 05 |
| 00C70 | 00 | 00 | 2E | A1 | 1B | 07 | 8B | 1E | 02 | 00 | 2B | D8 | 2E | 89 | 1E | 1D |
| 00C80 | 07 | 2E | 8E | 1E | F2 | 05 | BE | 81 | 00 | 8A | 0E | 80 | 00 | 2A | ED | 81 |
| 00C90 | F9 | 88 | 00 | 76 | 03 | B9 | 88 | 00 | 51 | E3 | 33 | D1 | E9 | 41 | AD | 86 |
| 00CA0 | C4 | 50 | E2 | FA | EB | 28 | 90 | 8C | C8 | 8E | D8 | 2E | 8E | 06 | F2 | 05 |
| 00CB0 | BE | 33 | 08 | 2E | 80 | 3E | F6 | 05 | 02 | 72 | 05 | EB | 11 | EB | 63 | 90 |
| 00CC0 | BF | AB | 07 | B8 | 01 | 29 | CD | 21 | EB | 04 | 90 | E9 | 5D | FF | 56 | 1E |
| 00CD0 | 9C | 2E | A1 | 1B | 07 | 2E | A3 | 1F | 07 | 8E | D8 | BE | 14 | 00 | FC | AD |
| 00CE0 | 3D | 40 | 41 | 75 | 34 | AD | 3D | 54 | 48 | 75 | 2E | AD | 22 | E4 | 75 | 29 |
| 00CF0 | 8C | DE | 8E | DE | 8B | 36 | 00 | 00 | 23 | F6 | 74 | 06 | 8C | DA | 03 | F2 |
| 00D00 | EB | F0 | 9D | 8C | DE | 1F | 2E | 2B | 36 | 1B | 07 | 2E | 01 | 36 | 1B | 07 |
| 00D10 | 2E | 29 | 36 | 1D | 07 | 5E | EB | 0A | 90 | 9D | 1F | 5E | BF | 94 | 09 | E9 |
| 00D20 | 26 | 03 | 0E | 1F | 0E | 07 | 2E | 80 | 3E | F6 | 05 | 02 | 73 | 03 | E9 | 85 |
| 00D30 | 00 | BE | 3A | 08 | 8B | D6 | B4 | 3D | 2A | C0 | CD | 21 | 73 | 16 | BF | 6B |
| 00D40 | 07 | 26 | 80 | 3D | 00 | 74 | 6F | E8 | BA | 04 | BA | AB | 07 | B8 | 00 | 3D |
| 00D50 | CD | 21 | 72 | 62 | 8B | D8 | B4 | 3E | CD | 21 | BE | 3A | 08 | 2E | FF | 36 |
| 00D60 | 1D | 07 | 2E | FF | 36 | 1B | 07 | E8 | BD | 03 | 2E | 8F | 06 | 1B | 07 | 2E |
| 00D70 | 8F | 06 | 1D | 07 | 2E | 8E | 1E | 1B | 07 | 2B | F6 | B9 | 04 | 00 | E8 | 59 |
| 00D80 | 03 | 2E | 89 | 1E | F4 | 05 | 2E | 8E | 1E | F2 | 05 | 1E | 07 | 8B | 1E | 02 |
| 00D90 | 00 | 2E | 2B | 1E | F4 | 05 | 8C | D8 | 2B | D8 | B4 | 4A | CD | 21 | 73 | 03 |
| 00DA0 | E9 | 88 | FE | 2E | 8B | 1E | F4 | 05 | 43 | 2E | 29 | 1E | 1D | 07 | 73 | 06 |
| 00DB0 | BF | 65 | 08 | E9 | 92 | 02 | 2E | 8E | 06 | 1B | 07 | 26 | C7 | 06 | 00 | 00 |
| 00DC0 | 00 | 00 | 2E | FF | 06 | 1B | 07 | 2E | FF | 0E | 1D | 07 | 8C | C0 | 40 | 2E |
| 00DD0 | A3 | 0E | 07 | 2E | 8B | 36 | 1F | 07 | 8E | C6 | 26 | 8B | 36 | 00 | 00 | 23 |
| 00DE0 | F6 | 74 | 15 | 8C | C2 | 03 | F2 | 26 | A1 | 0E | 00 | 2E | 3B | 06 | 13 | 07 |
| 00DF0 | 72 | E6 | 2E | A3 | 13 | 07 | EB | E0 | 2E | A1 | 0E | 07 | FA | 8E | D0 | 2E |
| 00E00 | A1 | 13 | 07 | 3D | FF | 0F | 77 | 0C | 2E | 01 | 06 | 1B | 07 | 2E | 29 | 06 |
| 00E10 | 1D | 07 | 73 | 06 | BF | BB | 08 | E9 | 2E | 02 | B1 | 04 | D3 | E0 | 8B | E0 |
| 00E20 | 2E | A3 | 10 | 07 | 8B | CC | FB | 2E | 8E | 06 | 0E | 07 | 2B | FF | 8B | C7 |
| 00E30 | FC | F3 | AA | 2E | A1 | 1B | 07 | 2E | 8B | 1E | 1D | 07 | B9 | 0C | 00 | 2E |
| 00E40 | FF | 1E | E8 | 05 | 2E | 8B | 0E | 17 | 07 | 36 | 89 | 0E | E0 | 01 | 9C | 36 |
| 00E50 | FF | 1E | 9E | 02 | 36 | 8C | 06 | DE | 01 | 2E | A1 | 27 | 07 | 36 | A3 | 2C |
| 00E60 | 00 | 36 | C7 | 06 | 2A | 00 | 00 | 00 | 36 | C7 | 06 | 34 | 00 | 00 | 00 | 36 |
| 00E70 | C7 | 06 | 2E | 00 | 00 | 00 | E8 | EA | 01 | 2E | 8B | 36 | 1F | 07 | 8E | C6 |
| 00E80 | 2B | C6 | 26 | 8B | 36 | 00 | 00 | 23 | F6 | 74 | 2C | 8C | C2 | 03 | F2 | 2B |
| 00E90 | DB | 26 | 8B | 0E | 02 | 00 | 26 | 03 | 0E | 10 | 00 | E3 | 0D | 9C | 36 | FF |
| 00EA0 | 1E | 9E | 02 | 8C | C3 | 36 | 89 | 16 | 34 | 00 | 9C | 36 | FF | 1E | CA | 02 |
| 00EB0 | 36 | 89 | 16 | 2E | 00 | EB | C7 | B9 | 80 | 02 | BB | 80 | 02 | 2E | A1 | 15 |
| 00EC0 | 07 | 36 | A3 | 56 | 00 | 2B | C0 | 2E | A0 | 12 | 07 | FA | 36 | A3 | 8E | 02 |
| 00ED0 | 36 | A3 | 64 | 00 | 36 | 89 | 26 | 5E | 00 | 36 | 89 | 26 | 60 | 00 | 2B | E3 |
| 00EE0 | 36 | 89 | 26 | 62 | 00 | FB | 2E | FF | 2E | E4 | 05 | 36 | 0A | 01 | 0D | D5 |
| 00EF0 | 0E | EC | 02 | 94 | 01 | 87 | 02 | C9 | 0E | C9 | 0E | C9 | 0E | C9 | 0E | 00 |
| 00F00 | 00 | 36 | 8E | 06 | 26 | 00 | 2E | A0 | 2B | 08 | 50 | 24 | EB | 26 | A2 | 00 |
| 00F10 | 00 | 58 | 36 | 81 | 26 | 90 | 02 | E7 | FF | A8 | 04 | 74 | 07 | 36 | 81 | 0E |
| 00F20 | 90 | 02 | 08 | 00 | A8 | 10 | 74 | 07 | 36 | 81 | 0E | 90 | 02 | 10 | 00 | 51 |
| 00F30 | 56 | 57 | 1E | 06 | E3 | 51 | BE | 0A | 07 | 0E | 1F | 0E | 07 | FD | AD | 8B |
| 00F40 | C8 | C7 | 44 | 02 | 00 | 00 | E3 | 2E | 8B | FE | 51 | B0 | 2F | F2 | AE | 58 |
| 00F50 | 75 | 22 | 26 | 80 | 3D | 63 | 74 | 0B | 26 | 80 | 3D | 43 | 74 | 05 | BE | 08 |
| 00F60 | 07 | EB | 11 | 8B | F7 | 4E | 49 | 83 | F9 | 01 | 75 | 06 | 80 | 3C | 0D | 75 |
| 00F70 | 01 | 49 | 8B | C1 | 8B | C8 | 36 | 89 | 0E | 6E | 00 | 36 | 8B | 3E | AE | 01 |
| 00F80 | 16 | 07 | F3 | A4 | B0 | 0D | AA | 07 | 1F | 5F | 5E | 59 | CF | F9 | C3 | 2E |
| 00F90 | 8E | 06 | F2 | 05 | BF | 2B | 07 | B0 | 01 | 56 | B4 | 29 | CD | 21 | 5E | 80 |
| 00FA0 | 7D | 01 | 20 | 74 | E8 | 8B | D7 | 8B | DA | 50 | 53 | 51 | 52 | 56 | 57 | B4 |
| 00FB0 | 0F | CD | 21 | 22 | C0 | 74 | 03 | E9 | 8B | 00 | C7 | 45 | 0E | 01 | 00 | 2B |
| 00FC0 | C0 | 88 | 45 | 20 | 89 | 45 | 21 | 89 | 45 | 23 | 8B | 45 | 12 | 8B | 75 | 10 |
| 00FD0 | 8B | D8 | F7 | C6 | 0F | 00 | 74 | 03 | 83 | C6 | 10 | B9 | 04 | 00 | D3 | C8 |
| 00FE0 | D3 | EE | 03 | F0 | 2E | 29 | 36 | 1D | 07 | 72 | 65 | 2E | 87 | 36 | 1B | 07 |
| 00FF0 | 2E | 01 | 36 | 1B | 07 | 1E | 56 | 2E | 8E | 1E | 1B | 07 | 2B | F6 | 89 | 34 |
| 01000 | 5E | 1F | 8B | 45 | 10 | 8B | C8 | 22 | DB | 74 | 03 | B9 | E0 | FF | 2B | C1 |

| | | | | | | | | | | | | | | | | |
|---|---|---|---|---|---|---|---|---|---|---|---|---|---|---|---|---|
| 01010 | 73 | 01 | 4B | 50 | 2B | D2 | 1E | 8E | DE | 81 | C6 | FE | 0F | B4 | 1A | CD |
| 01020 | 21 | 1F | 8B | D7 | B4 | 27 | CD | 21 | 3C | 01 | 58 | 77 | 18 | 22 | DB | 75 |
| 01030 | D4 | 23 | C0 | 75 | D0 | B4 | 10 | CD | 21 | 22 | C0 | 75 | 08 | F8 | 5F | 5E |
| 01040 | 5A | 59 | 5B | 58 | C3 | F9 | EB | F6 | E8 | 0A | 00 | 2E | FF | 2E | F0 | 05 |
| 01050 | BF | 50 | 08 | EB | F3 | 2E | 8A | 15 | B4 | 02 | CD | 21 | 47 | 80 | FA | 0D |
| 01060 | 75 | F3 | C3 | 2B | F6 | BD | D6 | 02 | 2E | 8B | 8C | EB | 0C | E3 | 0E | 89 |
| 01070 | 4E | 00 | 8C | 4E | 02 | 83 | C6 | 02 | 83 | C5 | 04 | EB | EB | 36 | C7 | 06 |
| 01080 | 12 | 03 | BC | 04 | 36 | 8C | 0E | 14 | 03 | 36 | C7 | 06 | 16 | 03 | AE | 0E |
| 01090 | 36 | 8C | 0E | 18 | 03 | 36 | C7 | 06 | 1E | 03 | D5 | 0E | 36 | 8C | 0E | 20 |
| 010A0 | 03 | 36 | C7 | 06 | 22 | 03 | BF | 0E | 36 | 8C | 0E | 24 | 03 | C3 | 2E | 8E |
| 010B0 | 06 | 1F | 07 | 26 | C7 | 06 | 14 | 00 | FF | FF | 2E | FF | 2E | F0 | 05 | 2E |
| 010C0 | A1 | F2 | 05 | 2E | 8B | 1E | F4 | 05 | CF | B8 | 78 | 03 | 55 | 8B | EC | 81 |
| 010D0 | 4E | 06 | 00 | 08 | 5D | CF | CF | E9 | 51 | FB | 2B | DB | FC | AC | 3C | 20 |
| 010E0 | 74 | 41 | 3C | 30 | 72 | 09 | 3C | 39 | 77 | 08 | 2C | 30 | EB | 1B | 90 | BF |
| 010F0 | 69 | 09 | E9 | 53 | FF | 3C | 61 | 72 | 06 | 3C | 66 | 77 | F2 | 2C | 20 | 3C |
| 01100 | 41 | 72 | EC | 3C | 46 | 77 | E8 | 2C | 37 | 86 | CD | B1 | 04 | D3 | E3 | 86 |
| 01110 | E9 | 2A | E4 | 8A | EC | 03 | D8 | E2 | C4 | 80 | 3C | 30 | 72 | 05 | 80 | 3C |
| 01120 | 39 | 76 | 02 | F8 | C3 | F9 | C3 | 8B | D6 | B4 | 3D | 2A | C0 | CD | 21 | 73 |
| 01130 | 18 | 0E | 07 | BF | 6B | 07 | 26 | 80 | 3D | 00 | 74 | 76 | E8 | C5 | 00 | BA |
| 01140 | AB | 07 | B8 | 00 | 3D | CD | 21 | 72 | 69 | 2E | A3 | F7 | 05 | 2B | C9 | 8B |
| 01150 | D1 | 2E | 8B | 1E | F7 | 05 | B8 | 02 | 42 | CD | 21 | 8B | FA | 8B | F0 | 05 |
| 01160 | 0F | 00 | B9 | 04 | 00 | D3 | CA | D3 | E8 | 03 | C2 | 2E | 29 | 06 | 1D | 07 |
| 01170 | 72 | 66 | 2E | 8B | 2E | 1B | 07 | 2E | 87 | 06 | 1B | 07 | 2E | 01 | 06 | 1B |
| 01180 | 07 | 1E | 56 | 2E | 8E | 1E | 1B | 07 | 2B | F6 | 89 | 34 | 5E | 1F | 2B | C9 |
| 01190 | 2B | D2 | B8 | 00 | 42 | CD | 21 | 8B | C6 | 0B | FF | 74 | 03 | B8 | E0 | FF |
| 011A0 | 2B | F0 | 8B | C8 | 8E | DD | 2B | D2 | 2E | 8B | 1E | F7 | 05 | E8 | 82 | 00 |
| 011B0 | 73 | 06 | BF | 94 | 09 | E9 | 90 | FE | 0B | F6 | 75 | 04 | 0B | FF | 74 | 0D |
| 011C0 | 81 | EE | E0 | FF | 83 | DF | 00 | 81 | C5 | FE | 0F | EB | CA | 2E | 8B | 1E |
| 011D0 | F7 | 05 | B4 | 3E | CD | 21 | F8 | C3 | BF | 50 | 08 | E9 | 6A | FE | E8 | BB |
| 011E0 | 00 | 56 | 73 | 03 | 5E | F9 | C3 | FC | 8B | F7 | 83 | EE | 03 | AC | 3C | 20 |
| 011F0 | 74 | FB | 3C | 2F | 75 | EE | AC | 0C | 20 | 3C | 63 | 75 | E7 | C6 | 44 | FE |
| 01200 | 00 | 5E | F8 | C3 | 2A | C0 | FC | B9 | 40 | 00 | F2 | AE | E3 | 20 | 56 | 1E |
| 01210 | 8C | CF | 8E | DF | BF | AB | 07 | 51 | 83 | E9 | 40 | F7 | D9 | 49 | BE | 6B |
| 01220 | 07 | F3 | A4 | 59 | 1F | 5E | AC | AA | 0A | C0 | 74 | 05 | E2 | F8 | E9 | FA |
| 01230 | F9 | C3 | B4 | 3F | CD | 21 | 72 | F6 | 0B | C0 | 75 | 02 | F9 | C3 | C3 | B8 |
| 01240 | 00 | 42 | CD | 21 | 72 | E8 | C3 | 1E | 0E | 07 | BF | 6B | 07 | B9 | 40 | 00 |
| 01250 | FC | 2A | C0 | F3 | AA | 2E | 8E | 1E | F2 | 05 | 8E | 1E | 2C | 00 | 2B | F6 |
| 01260 | B9 | 40 | 00 | E8 | 36 | 00 | 72 | 32 | 83 | F9 | 01 | 75 | 09 | 3C | 00 | 75 |
| 01270 | 05 | 80 | 3D | 00 | 74 | 24 | B9 | 0B | 00 | 56 | 57 | BF | 45 | 08 | F3 | A6 |
| 01280 | 74 | 06 | 5F | 5E | 8B | F7 | EB | D8 | AC | 3C | 3D | 5F | 5F | 75 | 0B | BF |
| 01290 | 6B | 07 | AC | AA | 0A | C0 | 74 | 02 | EB | F8 | 1F | C3 | 8B | D6 | 8B | FE |
| 012A0 | 8B | D9 | FC | 2A | E4 | AC | F6 | C4 | 01 | 75 | 0B | 3C | 20 | 74 | 33 | 3C |
| 012B0 | 09 | 74 | 2F | 80 | CC | 01 | 3C | 0D | 74 | 2D | 3C | 0A | 74 | 29 | 3C | 20 |
| 012C0 | 74 | 25 | 3C | 2B | 74 | 21 | 3C | 3D | 74 | 1D | 3C | 3B | 74 | 19 | 3C | 2C |
| 012D0 | 74 | 15 | 3C | 00 | 74 | 11 | E2 | CD | 8B | F2 | 2B | D9 | 8B | CB | 8B | FE |
| 012E0 | F9 | C3 | 42 | E2 | C0 | EB | F1 | 49 | 8B | FE | 8B | F2 | 2B | D9 | 8B | CB |
| 012F0 | F8 | C3 | 00 | 00 | 00 | 00 | 00 | 00 | 00 | 00 | 00 | 00 | 00 | 00 | 00 | 00 |
| 01300 | 6A | 02 | 95 | 0B | B3 | 04 | B7 | 01 | BD | 01 | C3 | 01 | C9 | 01 | CF | 01 |
| 01310 | D5 | 01 | DB | 01 | E1 | 01 | 61 | 2D | F0 | 01 | E7 | 01 | 96 | 03 | 3B | 02 |
| 01320 | 0A | 02 | 22 | 2E | FE | 08 | 0D | 09 | 12 | 09 | A7 | 05 | 9B | 05 | AE | 05 |
| 01330 | D2 | 11 | E3 | 11 | 11 | 12 | F3 | 11 | 9E | 10 | 43 | 0B | 4F | 0B | 40 | 2A |
| 01340 | D9 | 21 | F1 | 05 | A7 | 05 | 84 | 05 | 10 | 02 | 18 | 02 | B8 | 2D | 48 | 20 |
| 01350 | 52 | 22 | A0 | 11 | 52 | 05 | EF | 04 | D6 | 0A | 69 | 0B | 2B | 0B | 0E | 11 |
| 01360 | D6 | 0A | 3F | 0E | F6 | 0D | 86 | 13 | 63 | 22 | 24 | 02 | F6 | 01 | 6C | 02 |
| 01370 | 30 | 1E | 76 | 01 | 7F | 01 | 8C | 01 | 99 | 01 | 6A | 22 | 59 | 22 | 4B | 22 |
| 01380 | 87 | 03 | B1 | 01 | A8 | 01 | A8 | 01 | A8 | 01 | A8 | 01 | A8 | 01 | A8 | 01 |
| 01390 | A8 | 01 | A8 | 01 | A8 | 01 | 62 | 1F | A8 | 01 | A8 | 01 | A8 | 01 | A8 | 01 |
| 013A0 | A2 | 01 | A2 | 01 | A2 | 01 | A2 | 01 | A2 | 01 | A2 | 01 | A8 | 01 | A8 | 01 |
| 013B0 | A8 | 01 | A8 | 01 | A8 | 01 | A8 | 01 | A8 | 01 | A8 | 01 | A8 | 01 | A8 | 01 |
| 013C0 | A8 | 01 | A8 | 01 | A8 | 01 | A8 | 01 | A8 | 01 | A8 | 01 | A8 | 01 | A8 | 01 |
| 013D0 | A8 | 01 | A8 | 01 | A8 | 01 | A8 | 01 | A8 | 01 | A8 | 01 | A8 | 01 | A8 | 01 |
| 013E0 | A8 | 01 | A8 | 01 | A8 | 01 | A8 | 01 | A8 | 01 | B3 | 2D | B3 | 2D | B3 | 2D |
| 013F0 | B3 | 2D | 12 | 0A | 22 | 0E | 5A | 0F | D7 | 2E | 92 | 02 | FF | 02 | FA | 0D |
| 01400 | AC | 01 | AC | 01 | AC | 01 | AC | 01 | AC | 01 | AC | 01 | AC | 01 | AC | 01 |

```
01410  AC 01 AC 01 AC 01 AC 01 AC 01 AC 01 AC 01 AC 01
01420  AC 01 AC 01 AC 01 AC 01 AC 01 B3 2D B3 2D B3 2D
01430  B3 2D B3 2D B3 2D B3 2D B3 2D B3 2D B3 2D B3 2D
01440  54 02 20 29 20 29 20 29 18 29 E8 28 ED 28 20 29
01450  9D 2A 31 2B 75 2D 60 0A 58 01 D4 09 01 08 C9 03
01460  00 00 30 34 00 00 54 2F 00 00 00 00 00 00 2B 0E
01470  2F 0E 39 0E 35 0E E8 01 02 70 00 BC 00 80 00 E8
01480  F8 01 24 00 96 00 8C 00 9E 00 80 00 E8 EB 01 26
01490  00 96 00 8E 00 9E 00 80 00 E8 DE 01 96 00 9E 00
014A0  80 00 36 80 26 4A 00 7F 2E FF 61 80 2E FF A1 B4
014B0  FE 2B C0 2E FF 61 80 B8 12 00 E9 1C 08 B8 24 00
014C0  E9 16 08 B8 36 00 E9 10 08 B8 48 00 E9 0A 08 B8
014D0  5A 00 E9 04 08 B8 6C 00 E9 FE 07 B8 7E 00 E9 F8
014E0  07 B8 90 00 E9 F2 07 36 80 0E 4A 00 80 EB 65 90
014F0  BF 7C 08 EB 5F 90 C5 5E B8 8B 0F 89 4E B6 89 4E
01500  C0 36 C6 06 4B 00 EE EB 46 90 83 C5 12 EB 3D 90
01510  36 89 36 40 00 EB 3D 90 36 C7 06 40 00 00 00 EB
01520  33 90 00 00 83 C5 12 89 66 BE BF EC 0C 89 7E BC
01530  8C 4E BA C7 46 B8 22 02 EB 1A 90 36 C6 06 4B 00
01540  00 EB 03 83 ED 12 8B 66 BE 83 ED 12 8B 7E BC 36
01550  8E 1E 0E 00 46 46 26 8B 1C 22 FF 74 04 8B C3 8B
01560  1F 2E FF 27 90 90 90 90 90 90 EB E8 46 46 26 8B
01570  1C 2E FF A7 6E 01 2B C9 36 87 0E 52 00 E3 D5 8B
01580  C1 8C D9 36 3B 0E 38 00 74 03 E9 37 2B E9 60 2B
01590  06 00 81 FF 8C 0D 74 32 46 46 8C D9 C5 5E B8 8B
015A0  07 3D 20 00 73 1E 2E F7 26 90 02 36 8E 1E 54 00
015B0  8B D8 26 8B 04 89 47 14 89 4F 16 36 A1 02 00 89
015C0  47 18 EB 82 B8 17 00 E9 FA 2A 36 8E 1E 54 00 58
015D0  3D 20 00 73 EF 8B D8 8B C8 81 E1 0F 00 D1 EB D1
015E0  EB 80 E3 FC BA 01 00 D3 E2 85 57 0E 75 D6 09 57
015F0  0C 80 0E 0A 00 01 8B 66 BE 83 ED 12 BF 7C 08 36
01600  8E 1E 54 00 80 3E 0A 00 00 7E 21 2B DB B9 02 00
01610  83 7F 0C 00 75 1E 83 C3 04 E2 F5 E9 95 2A 36 8E
01620  1E 54 00 8F 06 08 00 5B 5A 31 57 0E 36 8E 1E 0E
01630  00 E9 42 FF BA 01 00 2B C0 85 57 0C 75 05 D1 E2
01640  40 EB F6 52 53 FF 36 08 00 09 57 0E 31 57 0C C6
01650  06 0A 00 00 D1 E3 D1 E3 03 C3 A3 08 00 2E F7 26
01660  90 02 8B D8 8B 47 18 C5 5F 14 23 DB 74 B0 81 3F
01670  50 01 75 03 E9 F1 26 E9 B9 27 36 89 36 3E 00 5E
01680  8C C8 8E C0 E9 CF FE 2B F6 36 87 36 3E 00 36 8E
01690  06 14 00 E9 BE FE 83 C6 02 36 8B 1E 42 00 36 89
016A0  77 B6 26 03 34 E9 AE FE BD 66 03 83 C5 52 36 89
016B0  2E 58 00 B8 64 03 36 A3 44 00 36 C7 06 26 03 10
016C0  08 36 8C 0E 28 03 E9 E6 00 55 06 1E 3D FF FF 74
016D0  D7 8B F0 36 8B 2E 58 00 36 C7 06 3C 00 00 00 36
016E0  89 2E 42 00 89 6E B4 2B C0 36 8E 06 54 00 BF 08
016F0  00 B9 CC 00 FC F3 AA 2B D2 36 87 16 3C 00 26 89
01700  16 08 00 36 8E 1E 0E 00 36 8E 06 14 00 36 FF 36
01710  0E 00 36 FF 36 14 00 36 FF 36 02 00 36 FF 36 64
01720  00 36 FF 36 44 00 8B 16 E8 00 36 89 16 64 00 26
01730  8B 16 00 00 36 89 16 4C 00 89 66 BE 89 66 B0 BF
01740  7C 08 89 7E BC 89 46 C0 89 46 B2 36 A3 46 00 36
01750  A3 48 00 36 A3 4A 00 36 81 26 90 02 F8 FF 36 A3
01760  40 00 36 A3 52 00 36 8B 0E 5E 00 89 4E BA E9 E5
01770  FD 2B C9 2B C0 EB 0D 36 80 3E 3B 00 00 75 05 36
01780  8B 36 36 00 36 8B 2E 58 00 8B 66 BE 51 8B 4E BA
01790  36 FF 1E 0A 03 59 36 8F 06 44 00 36 8F 06 64 00
017A0  36 8F 06 02 00 36 8F 06 14 00 36 8F 06 0E 00 1F
017B0  07 5D CB 2B C0 81 FF 8C 0D 75 01 58 36 A3 3C 00
017C0  36 8B 2E 58 00 8B 66 BE 36 8F 06 44 00 36 8F 06
017D0  64 00 36 8F 06 02 00 36 8F 06 14 00 36 8F 06 0E
017E0  00 8B 4E BA 36 FF 1E 0A 03 BE 02 00 E9 F0 FE 81
017F0  FF 8C 0D 75 4D 5B 8B 66 BE 83 ED 12 8B 7E BC 26
01800  8B 44 02 40 D1 E3 74 41 3B D8 77 3D D1 E3 40 40
01810  D1 E0 03 C6 03 F3 83 EE 04 26 8B 74 04 36 83 2E
```

```
01820   44 00 02 36 8B 1E 44 00 81 FB 52 03 76 06 36 89
01830   07 E9 21 FD BB 64 03 36 89 1E 44 00 B6 16 00 E9
01840   92 28 8B C6 05 08 00 EB D0 40 40 D1 E0 03 F0 E9
01850   04 FD 61 FF 8C 0D 75 1E 5B 8B 66 BE 83 ED 12 8B
01860   7E BC 26 8B 44 02 40 D1 E3 7E DE 3B D8 77 DA D1
01870   E3 03 F3 83 EE 04 26 8B 74 04 4E E9 81 FD B6 15
01880   00 E9 40 28 36 8B 1E 44 00 81 FB 64 03 73 EF 36
01890   8B 37 36 83 06 44 00 02 E9 BB FC 59 8B 66 BE 83
018A0   ED 12 8B 7E BC E3 13 26 03 74 02 E9 A7 FC 59 8B
018B0   66 BE 83 ED 12 8B 7E BC E3 ED 83 C6 04 E9 96 FC
018C0   B8 12 00 E9 FE 27 36 8B 1E 4C 00 23 DB 74 F1 26
018D0   8B 47 01 23 C0 74 0B 36 83 06 4C 00 02 8B D8 E9
018E0   7B FC 26 8B 5F 03 23 DB 74 D6 36 89 1E 4C 00 EB
018F0   DE 81 FF 8C 0D 74 27 26 81 7C 02 54 00 75 12 26
01900   8B 5C 06 83 C3 04 36 89 1E 4C 00 83 C6 0A E9 45
01910   FC 26 A1 00 00 36 A3 4C 00 46 46 E9 36 FC 59 83
01920   F9 01 7C 9C 26 8B 1E 00 00 23 DB 74 93 26 8B 47
01930   01 23 C0 74 07 49 74 0A 43 43 EB F1 26 8B 5F 03
01940   EB E7 36 89 1E 4C 00 E9 FC FB 8B D9 80 E5 7F 23
01950   C0 75 03 EB 71 90 51 06 8E C2 8B FE C5 76 B2 FD
01960   2B D2 22 FF 78 21 36 38 3E AE 01 74 05 80 CF 40
01970   EB 0D 8C C2 51 8C D1 3B D1 59 74 03 80 CF 40 2B
01980   D2 3B C8 76 02 8B C8 2A DB E3 2E 22 FF 78 0E F6
01990   C7 40 75 09 80 3C 22 75 04 AC E9 8F 00 AC AA 22
019A0   FF 78 13 3C 0D 74 26 F6 C7 40 75 0A 3C 2C 75 06
019B0   42 33 C0 EB 21 90 42 E2 E4 22 FF 78 03 B0 0D AA
019C0   2B C0 EB 12 07 59 5E B8 1C 00 E9 F7 26 AC 3C 0A
019D0   B8 01 00 75 01 40 07 52 03 C2 2B C9 E8 DE 1E 59
019E0   53 83 C5 12 5E C5 5E B8 83 FB FE 73 0F 81 7E AA
019F0   7C 08 74 03 83 ED 12 89 0F E9 4A FB 75 04 2B C1
01A00   03 E0 36 8E 1E 0E 00 83 ED 24 8B 7E BC 2E FF 65
01A10   F8 AC 3C 0D 75 05 AA 33 C0 EB BB 3C 22 75 0D AA
01A20   42 AC 3C 2C B8 00 00 75 AD 40 EB AA AA 42 E2 E1
01A30   EB 87 8B 4E B6 E3 90 56 8B 76 B2 8B 56 B4 36 89
01A40   36 4E 00 36 89 16 50 00 2B C0 81 7E AA 7C 08 74
01A50   0C C5 5E A6 8B 07 81 7E AA 3C 1D 74 37 51 F7 C1
01A60   FF 7F 74 08 9C 36 FF 1E EA 02 70 2E 58 F6 C4 80
01A70   74 08 8B C8 80 E5 7F E9 6A FF 8E DA 2B F1 81 7E
01A80   AA 7C 08 75 09 46 80 3C 20 75 02 E2 F1 4E C6 04
01A90   0D E9 50 FF 83 ED 12 E9 B0 FE 5E 5E C5 5E B8 89
01AA0   0F E9 20 26 C5 5E B8 8B 0F 83 ED 12 8B 46 B6 3B
01AB0   C8 76 02 8B C8 56 80 CD 80 E9 7C FF C5 5E B8 8B
01AC0   0F 8B C4 8B D0 C7 46 B6 FF FF E3 1C 2B D1 72 2B
01AD0   55 81 C5 00 01 3B D5 5D 76 21 8B E2 80 CD 80 56
01AE0   8B F0 4E 8C D2 E9 60 FF 8B CC 8B D5 81 C2 00 01
01AF0   2B CA 72 07 8B E2 FF 4E B8 EB E4 B8 18 00 E9 C3
01B00   25 8B D8 03 77 FC 40 40 1E 36 8E 1E 02 00 50 CB
01B10   36 8E 1E 0E 00 73 0D 83 C5 12 89 66 BE 50 BF 8C
01B20   0D E9 32 FA BF 7C 08 E9 2C FA 00 00 00 00 00 00
01B30   BC 0E D6 0E F7 0E 03 0F 0F 0F 14 0F 20 0F ED 14
01B40   25 0F 31 0F B1 1E 83 1E 5D 1E 12 28 FC 27 EA 27
01B50   0D 28 F7 27 E5 27 D0 27 6E 1E B3 2D B3 2D 2E 0A
01B60   CC 09 CC 09 CC 09 8D 09 54 02 54 02 C4 0E 54 02
01B70   FE 14 54 02 C1 1E B3 2D B3 2D B3 2D 7C 08 EE 2B
01B80   DF 0B B3 2D B3 2D B3 2D B3 2D B3 2D B3 2D B3 2D
01B90   B3 2D B3 2D B3 2D B3 2D D0 08 B3 2D B3 2D B3 2D
01BA0   B3 2D B3 2D B3 2D B3 2D B3 2D B3 2D B3 2D B3 2D
01BB0   B3 2D B3 2D B3 2D B3 2D B3 2D B3 2D B3 2D B3 2D
01BC0   B3 2D B3 2D B3 2D B3 2D B3 2D B3 2D B3 2D B3 2D
01BD0   06 36 8B 1E 48 00 23 DB 74 11 36 8B 4F B0 36 8B
01BE0   3E 46 00 2B CF 8C D0 8E C0 EB 07 36 C4 0E 00 00
01BF0   2B FF 2A C0 FC F3 AA 07 BF 7C 08 E9 56 F9 BF 8C
01C00   0D 83 C5 12 89 66 BE 89 7E BC E9 47 F9 BF 1C 13
01C10   EB EF 80 5E C8 89 5E CA 8C 56 CC 36 C7 07 00 00
01C20   BF DC 1D EB DC B8 1A 00 E9 99 24 58 3B 7E AA 75
```

| | | | | | | | | | | | | | | | | |
|---|---|---|---|---|---|---|---|---|---|---|---|---|---|---|---|---|
| 01C30 | F4 | 06 | 1E | 56 | C5 | 76 | B8 | 83 | ED | 12 | C4 | 7E | B8 | FF | E0 | 48 |
| 01C40 | 5E | 1F | 07 | 8B | 66 | BE | 83 | ED | 12 | 50 | 8B | 7E | BC | 2E | FF | 65 |
| 01C50 | F0 | E8 | F0 | 1A | 40 | 09 | 3F | 09 | 40 | 09 | E8 | E7 | 1A | 3F | 09 | 40 |
| 01C60 | 09 | 3F | 09 | E8 | DE | 1A | 40 | 09 | 40 | 09 | 3F | 09 | E8 | D5 | 1A | 40 |
| 01C70 | 09 | 3F | 09 | 3F | 09 | E8 | CC | 1A | 3F | 09 | 40 | 09 | 40 | 09 | E8 | C3 |
| 01C80 | 1A | 3F | 09 | 3F | 09 | 40 | 09 | 8B | DD | 8C | D0 | 8E | D8 | 83 | C5 | 12 |
| 01C90 | 89 | 66 | BE | 8B | 47 | C0 | 89 | 46 | C0 | 8B | 47 | B6 | 89 | 46 | B6 | 8B |
| 01CA0 | 47 | B4 | 89 | 46 | B4 | 8B | 47 | B2 | 89 | 46 | B2 | 8B | 47 | B8 | 89 | 46 |
| 01CB0 | B8 | 8B | 47 | BA | 89 | 46 | BA | 8B | 7F | BC | 89 | 7E | BC | 8B | 4F | B0 |
| 01CC0 | 89 | 4E | B0 | E9 | 89 | F8 | 8B | DD | 8C | D0 | 8E | D8 | 83 | C5 | 12 | 89 |
| 01CD0 | 66 | BE | EB | D7 | 8B | D8 | 8B | 47 | 02 | 36 | 8B | 1E | 48 | 00 | 83 | CB |
| 01CE0 | 36 | 8B | 5F | B4 | 03 | D8 | 3B | D9 | 73 | 11 | 8C | D0 | 8E | D8 | 8B | D7 |
| 01CF0 | 8B | 7F | BC | 2E | 8B | 45 | E2 | 8B | FA | FF | E0 | B8 | 1F | 00 | E9 | C3 |
| 01D00 | 23 | 8B | DD | 36 | 8B | 2E | 42 | 00 | 8B | 6E | B4 | 36 | 89 | 2E | 42 | 00 |
| 01D10 | EB | D8 | 26 | 8B | 5C | 02 | 2B | C9 | 46 | 46 | 83 | C5 | 12 | 89 | 4E | B2 |
| 01D20 | 89 | 66 | BE | 89 | 5E | B8 | C7 | 46 | BC | 7C | 08 | E9 | 21 | F8 | 83 | 7F |
| 01D30 | B2 | 00 | 75 | 0F | 8B | 5F | B8 | 43 | 26 | 8B | 1F | 36 | 8E | 1E | 0E | 00 |
| 01D40 | E9 | 1A | F8 | C5 | 5F | B8 | EB | 25 | 8C | 5E | CC | B9 | 01 | 00 | EB | C8 |
| 01D50 | 8B | D7 | 8B | 7F | BC | 2E | 3B | 3D | 74 | 99 | B8 | 1E | 00 | E9 | 64 | 23 |
| 01D60 | 8B | D8 | 8B | 5F | 02 | 36 | 8E | 1E | 02 | 00 | 83 | C3 | 40 | 26 | 83 | 7C |
| 01D70 | 02 | 01 | 77 | DC | 74 | D2 | 46 | 46 | 2E | FF | 65 | DE | 8B | D8 | 8B | 5F |
| 01D80 | 02 | 36 | 03 | 1E | 46 | 00 | 8C | D0 | 8E | D8 | EB | DE | 8C | C2 | C4 | 7E |
| 01D90 | B8 | 26 | 8B | 05 | 8D | 7F | C0 | 89 | 7E | B8 | 8C | 5E | BA | 89 | 05 | 8E |
| 01DA0 | C2 | EB | 06 | 8B | 46 | C0 | 89 | 47 | C0 | 8B | 46 | B6 | 89 | 47 | B6 | 8B |
| 01DB0 | 46 | B2 | 89 | 47 | B2 | 8B | 46 | B4 | 89 | 47 | B4 | 8B | 46 | BC | 89 | 47 |
| 01DC0 | BC | 8B | 46 | B8 | 89 | 47 | B8 | 8B | 46 | BA | 89 | 47 | BA | 8B | 4E | B0 |
| 01DD0 | 89 | 4F | B0 | E9 | 70 | F7 | 46 | 46 | 81 | FF | 8C | 0D | 75 | 09 | 59 | 83 |
| 01DE0 | ED | 12 | BF | 7C | 08 | E3 | 3D | 83 | C5 | 12 | 36 | A1 | 5E | 00 | 89 | 46 |
| 01DF0 | BA | 36 | FF | 36 | 44 | 00 | 89 | 66 | BE | 36 | A1 | 42 | 00 | 89 | 46 | B4 |
| 01E00 | 36 | 89 | 2E | 42 | 00 | C7 | 46 | B2 | 02 | 00 | C7 | 46 | C0 | 00 | 00 | 26 |
| 01E10 | 8B | 04 | 03 | C6 | 40 | 89 | 46 | B8 | BF | 7C | 08 | 89 | 7E | BC | 89 | 76 |
| 01E20 | B6 | E9 | 30 | F7 | 26 | 03 | 34 | 46 | E9 | 29 | F7 | 81 | FF | 8C | 0D | 75 |
| 01E30 | 09 | 59 | 83 | ED | 12 | BF | 7C | 08 | E3 | 1E | 8B | 66 | BE | 8B | 76 | B6 |
| 01E40 | E9 | 11 | F7 | 59 | 83 | ED | 12 | BF | 7C | 08 | E3 | 0C | E9 | 05 | F7 | 59 |
| 01E50 | 83 | ED | 12 | BF | 7C | 08 | E3 | F4 | 36 | 8B | 2E | 42 | 00 | BF | 7C | 08 |
| 01E60 | 83 | 7E | B2 | 02 | 75 | 29 | 8B | 76 | B8 | 36 | 8B | 2E | 42 | 00 | 8B | 66 |
| 01E70 | BE | 36 | 8F | 06 | 44 | 00 | 8B | 6E | B4 | 36 | 89 | 2E | 42 | 00 | BF | 7C |
| 01E80 | 08 | 8B | 66 | BE | 8B | 4E | BA | 36 | FF | 1E | 0A | 03 | E9 | C5 | F6 | 8B |
| 01E90 | 66 | BE | E9 | 7E | 20 | B9 | 01 | 00 | 81 | FF | 8C | 0D | 75 | 01 | 59 | 36 |
| 01EA0 | 8B | 2E | 42 | 00 | 83 | 7E | B2 | 03 | 75 | 1D | 8B | 5E | BE | 36 | 8B | 07 |
| 01EB0 | 36 | 3B | 06 | 44 | 00 | 74 | 04 | 36 | A3 | 44 | 00 | 23 | C9 | 7E | BF | 8B |
| 01EC0 | 6E | B4 | 36 | 89 | 2E | 42 | 00 | 23 | C9 | 7E | B3 | E2 | 07 | 36 | 89 | 2E |
| 01ED0 | 42 | 00 | EB | 89 | 83 | 7E | B2 | 02 | 75 | B5 | 8B | 6E | B4 | EB | EC | 36 |
| 01EE0 | 81 | 3E | 44 | 00 | 64 | 03 | 73 | 09 | 36 | 83 | 06 | 44 | 00 | 02 | E9 | 63 |
| 01EF0 | F6 | B8 | 15 | 00 | E9 | CD | 21 | 00 | 00 | 00 | 00 | 00 | 00 | 00 | 00 | 00 |
| 01F00 | BC | 0E | D6 | 0E | F7 | 0E | 03 | 0F | 0F | 0F | 14 | 0F | 20 | 0F | ED | 14 |
| 01F10 | 25 | 0F | 31 | 0F | B1 | 1E | 83 | 1E | 5D | 1E | 12 | 28 | FC | 27 | EA | 27 |
| 01F20 | 0D | 28 | F7 | 27 | E5 | 27 | D0 | 27 | 6E | 1E | BB | 0A | B3 | 2D | E7 | 10 |
| 01F30 | CC | 09 | CC | 09 | CC | 09 | 8D | 09 | 54 | 02 | 54 | 02 | C4 | 0E | 54 | 02 |
| 01F40 | FE | 14 | 54 | 02 | C1 | 1E | F2 | 19 | E7 | 19 | B3 | 2D | 4C | 0C | B3 | 2D |
| 01F50 | B3 | 2D | B3 | 2D | B3 | 2D | B3 | 2D | B3 | 2D | B3 | 2D | B3 | 2D | B3 | 2D |
| 01F60 | B3 | 2D | B3 | 2D | B3 | 2D | C6 | 09 | 09 | 1A | B3 | 2D | BA | 10 | BA | 10 |
| 01F70 | C6 | 10 | D2 | 10 | D7 | 10 | DD | 10 | B3 | 2D | B3 | 2D | B3 | 2D | B3 | 2D |
| 01F80 | B3 | 2D | B3 | 2D | B3 | 2D | B3 | 2D | B3 | 2D | B3 | 2D | B3 | 2D | B3 | 2D |
| 01F90 | B3 | 2D | B3 | 2D | B3 | 2D | B3 | 2D | B3 | 2D | B3 | 2D | B3 | 2D | B3 | 2D |
| 01FA0 | BC | 0E | D6 | 0E | F7 | 0E | 03 | 0F | 0F | 0F | 14 | 0F | 20 | 0F | ED | 14 |
| 01FB0 | 25 | 0F | 31 | 0F | B1 | 1E | 83 | 1E | 5D | 1E | 12 | 28 | FC | 27 | EA | 27 |
| 01FC0 | 0D | 28 | F7 | 27 | E5 | 27 | D0 | 27 | 6E | 1E | BB | 0A | B3 | 2D | E3 | 10 |
| 01FD0 | CC | 09 | CC | 09 | CC | 09 | 8D | 09 | 54 | 02 | 54 | 02 | C4 | 0E | 54 | 02 |
| 01FE0 | FE | 14 | 54 | 02 | C1 | 1E | D7 | 19 | CC | 19 | B3 | 2D | EC | 0C | 00 | 2C |
| 01FF0 | B3 | 2D | B3 | 2D | B3 | 2D | B3 | 2D | B3 | 2D | B3 | 2D | B3 | 2D | B3 | 2D |
| 02000 | B3 | 2D | B3 | 2D | B3 | 2D | C6 | 09 | E3 | 19 | 1C | 0E | C0 | 10 | C0 | 10 |
| 02010 | CC | 10 | D2 | 10 | D7 | 10 | DD | 10 | 90 | 34 | B3 | 2D | B3 | 2D | B3 | 2D |
| 02020 | B3 | 2D | B3 | 2D | AC | 10 | B3 | 2D | B3 | 2D | A4 | 07 | B3 | 2D | B3 | 2D |
| 02030 | 0A | 25 | B3 | 2D | B3 | 2D | E9 | 22 | A7 | 25 | BC | 07 | 80 | 22 | C3 | 11 |

| | | | | | | | | | | | | | | | | |
|---|---|---|---|---|---|---|---|---|---|---|---|---|---|---|---|---|
| 02040 | 4A | 0E | 52 | 0E | 61 | 0E | 71 | 0E | 7B | 0E | 8D | 0E | 9C | 0E | BB | 13 |
| 02050 | D7 | 13 | ED | 13 | B1 | 1E | 83 | 1E | 5D | 1E | 12 | 28 | FC | 27 | EA | 27 |
| 02060 | 0D | 28 | F7 | 27 | E5 | 27 | D0 | 27 | 6E | 1E | B3 | 2D | B3 | 2D | B3 | 2D |
| 02070 | FA | 10 | EB | 10 | CB | 1B | 8D | 09 | A3 | 0E | AE | 0E | 76 | 02 | 05 | 14 |
| 02080 | B9 | 18 | 54 | 02 | C1 | 1E | B3 | 2D | B3 | 2D | B3 | 2D | 8C | 0D | 39 | 2C |
| 02090 | 54 | 02 | 3C | 15 | 4B | 0F | C7 | 0E | 4B | 0F | 8C | 19 | 05 | 18 | 3D | 1A |
| 020A0 | 3D | 1A | 62 | 1F | C6 | 05 | 96 | 10 | B3 | 2D | 44 | 0F | B3 | 2D | B3 | 2D |
| 020B0 | B3 | 2D | 92 | 28 | B3 | 2D | B3 | 2D | 61 | 0F | 6E | 0F | 7A | 0F | 86 | 0F |
| 020C0 | 92 | 0F | 9E | 0F | B3 | 2D | AA | 0F | B5 | 0F | C0 | 0F | DA | 0F | 06 | 10 |
| 020D0 | 1B | 10 | 2C | 10 | 35 | 10 | 3E | 10 | 47 | 10 | 11 | 10 | 4D | 10 | 4B | 0F |
| 020E0 | ED | 20 | F9 | 20 | F3 | 20 | B3 | 2D | B3 | 2D | B3 | 2D | B3 | 2D | E5 | 0F |
| 020F0 | 57 | 10 | 6E | 10 | 7F | 10 | 8C | D2 | EB | 05 | 36 | 8B | 16 | 54 | 00 | 83 |
| 02100 | C5 | 12 | 89 | 66 | BE | 46 | 46 | 26 | 8B | 04 | 89 | 46 | B8 | 89 | 56 | BA |
| 02110 | 8B | DF | BF | EC | 0C | 89 | 7E | BC | 2E | FF | 67 | EE | B8 | 13 | 00 | E9 |
| 02120 | A2 | 1F | 46 | 46 | 26 | 8B | 04 | D1 | E8 | EB | 17 | 8C | D0 | EB | 13 | 36 |
| 02130 | A1 | 0E | 00 | EB | 0D | 8C | C8 | EB | 09 | 36 | A1 | 14 | 00 | EB | 03 | B8 |
| 02140 | 01 | 00 | 89 | 66 | D0 | 50 | 2E | FF | 65 | F0 | 8B | D8 | FF | 77 | 02 | E9 |
| 02150 | 02 | F4 | 8B | D8 | 8B | 5F | 02 | 36 | 8E | 1E | 02 | 00 | FF | 37 | E9 | EE |
| 02160 | F3 | 8B | D8 | 8B | 5F | 02 | 36 | 03 | 1E | 46 | 00 | 36 | FF | 37 | E9 | E3 |
| 02170 | F3 | 8B | D8 | C5 | 5F | 02 | FF | 37 | E9 | D4 | F3 | 8B | D8 | 8B | 5F | 02 |
| 02180 | 36 | 8E | 1E | 02 | 00 | 8A | 07 | 2A | E4 | 50 | E9 | C2 | F3 | 8B | D8 | 8B |
| 02190 | 5F | 02 | 36 | 03 | 1E | 46 | 00 | 36 | 8A | 07 | EB | EB | 8B | D8 | C5 | 5F |
| 021A0 | 02 | EB | E2 | C5 | 5E | B8 | 83 | ED | 12 | BF | 8C | 0D | EB | D7 | C5 | 5E |
| 021B0 | B8 | 83 | ED | 12 | BF | 8C | 0D | FF | 37 | E9 | 93 | F3 | 8B | D8 | 89 | 66 |
| 021C0 | D0 | FF | 77 | 02 | 83 | C5 | 12 | BF | EC | 0C | 89 | 7E | BC | 89 | 66 | B8 |
| 021D0 | 8C | 56 | BA | E9 | A0 | F3 | BF | EC | 0C | 2B | C9 | 36 | 8B | 16 | 02 | 00 |
| 021E0 | 8B | D8 | 83 | C5 | 12 | 89 | 66 | BE | 89 | 7E | BC | 89 | 56 | BA | 03 | 4F |
| 021F0 | 02 | 89 | 4E | B8 | E9 | 5D | F3 | BF | EC | 0C | 36 | 8B | 0E | 46 | 00 | 8C |
| 02200 | D2 | EB | DD | BF | EC | 0C | 8B | D8 | 8B | 57 | 04 | 2B | C9 | EB | D3 | BF |
| 02210 | 4C | 0C | EB | C5 | BF | 4C | 0C | 36 | 8B | 0E | 46 | 00 | 8C | D2 | EB | C0 |
| 02220 | BF | 4C | 0C | EB | E1 | BF | 7C | 12 | 8B | 0E | E8 | 00 | 89 | 4E | C2 | EB |
| 02230 | A8 | BF | 7C | 12 | 8B | 0E | E8 | 00 | 89 | 4E | C2 | 36 | 8B | 0E | 46 | 00 |
| 02240 | 8C | D2 | EB | 9C | 8B | 5E | AA | 2E | FF | 67 | FA | 58 | 8B | 66 | BE | 83 |
| 02250 | ED | 12 | 50 | 8B | 7E | BC | 2E | FF | 65 | F0 | 46 | 46 | 26 | 8B | 04 | EB |
| 02260 | F1 | 59 | 58 | 2B | D2 | 3B | C1 | 75 | 01 | 4A | 52 | E9 | E6 | F2 | 59 | 58 |
| 02270 | 2B | D2 | 3B | C1 | 75 | F3 | 52 | E9 | DA | F2 | 59 | 58 | 2B | D2 | 3B | C1 |
| 02280 | 7F | E7 | 52 | E9 | CE | F2 | 59 | 58 | 2B | D2 | 3B | C1 | 7D | DB | 52 | E9 |
| 02290 | C2 | F2 | 59 | 58 | 2B | D2 | 3B | C1 | 7C | CF | 52 | E9 | B6 | F2 | 59 | 58 |
| 022A0 | 2B | D2 | 3B | C1 | 7E | C3 | 52 | E9 | AA | F2 | 58 | 8B | DC | 36 | 01 | 07 |
| 022B0 | 70 | 18 | E9 | 9F | F2 | 58 | 8B | DC | 36 | 29 | 07 | 70 | 0D | E9 | 94 | F2 |
| 022C0 | 58 | 59 | F7 | E9 | 70 | 04 | 50 | E9 | 8A | F2 | B8 | 01 | 00 | E9 | F4 | 1D |
| 022D0 | B8 | FF | 7F | 50 | B8 | 02 | 00 | E9 | EA | 1D | 59 | 58 | E3 | F2 | 99 | F7 |
| 022E0 | F9 | 50 | E9 | 6F | F2 | 59 | 5B | B8 | 01 | 00 | 83 | F9 | 00 | 74 | 08 | 7C |
| 022F0 | 0A | F7 | EB | 70 | D5 | E2 | FA | 50 | E9 | 59 | F2 | 23 | DB | 74 | D1 | 99 |
| 02300 | F7 | FB | 50 | E9 | 4E | F2 | 59 | 58 | E3 | C6 | 99 | F7 | F9 | 52 | E9 | 43 |
| 02310 | F2 | 8B | DC | 36 | F7 | 1F | 70 | B2 | E9 | 39 | F2 | 59 | 2B | C0 | 23 | C9 |
| 02320 | 78 | 06 | 74 | 01 | 40 | E9 | 24 | FF | 48 | E9 | 20 | FF | 58 | 8B | DC | 36 |
| 02330 | 21 | 07 | E9 | 1F | F2 | 58 | 8B | DC | 36 | 09 | 07 | E9 | 16 | F2 | 58 | 8B |
| 02340 | DC | 36 | 31 | 07 | E9 | 0D | F2 | 58 | F7 | D0 | E9 | FF | FE | 58 | 23 | C0 |
| 02350 | 79 | 02 | F7 | D8 | E9 | F5 | FE | 59 | E3 | 09 | 8B | DC | 23 | C9 | 78 | 06 |
| 02360 | 36 | D3 | 27 | E9 | EE | F1 | F6 | D9 | 36 | D3 | 2F | E9 | E6 | F1 | 59 | E3 |
| 02370 | F2 | 8B | DC | 23 | C9 | 79 | E9 | F6 | D9 | 36 | D3 | 3F | E9 | D5 | F1 | 59 |
| 02380 | E3 | E1 | 8B | DC | 23 | C9 | 78 | 06 | 36 | D3 | 07 | E9 | C6 | F1 | F6 | D9 |
| 02390 | 36 | D3 | 0F | E9 | BE | F1 | 8B | DC | 36 | FF | 37 | E9 | B6 | F1 | 58 | 8B |
| 023A0 | 66 | BE | 83 | ED | 12 | 8B | 7E | BC | 2E | FF | 65 | E0 | 2B | C0 | 3B | 7E |
| 023B0 | AA | 75 | 01 | 48 | 83 | ED | 12 | E9 | 92 | FE | B8 | 01 | 00 | E9 | 8C | FE |
| 023C0 | B8 | 02 | 00 | E9 | 86 | FE | B8 | 00 | 00 | E9 | 80 | FE | B8 | 01 | 00 | E9 |
| 023D0 | 7A | FE | 2B | C0 | E9 | 75 | FE | 8B | 46 | B8 | E9 | 6F | FE | 8B | 46 | BA |
| 023E0 | E9 | 69 | FE | 2E | FF | 65 | E6 | 2E | FF | 65 | E4 | C5 | 5F | B8 | 8B | 07 |
| 023F0 | 50 | 36 | 8E | 1E | 0E | 00 | 2E | FF | 65 | F0 | C5 | 5F | B8 | 8A | 07 | 2A |
| 02400 | E4 | EB | ED | 36 | 89 | 36 | 40 | 00 | E9 | 3B | F1 | E9 | 18 | 0B | 36 | 8B |
| 02410 | 1E | 42 | 00 | 36 | 8B | 5F | 84 | 36 | 8B | 47 | CE | 3D | 7C | 12 | 74 | EB |
| 02420 | 36 | C5 | 7F | EE | 8B | 15 | 36 | C5 | 7F | CA | 3D | 4C | 0C | 74 | 37 | 01 |
| 02430 | 15 | 70 | 1A | 8B | 05 | 36 | C5 | 7F | DC | F6 | C6 | 80 | 75 | 1C | 3B | 05 |
| 02440 | 7F | 1C | 8B | 7E | BC | 36 | 8E | 1E | 0E | 00 | E9 | DE | F9 | C7 | 05 | FF |

```
02450   7F F6 C6 80 74 08 FF 05 EB 04 3B 05 7D E4 36 8E
02460   1E 0E 00 E9 03 FA 22 F6 74 05 80 FE FF 75 EF F6
02470   C6 80 75 1A 00 15 72 0C 8A 05 36 C5 7F DC 3A 05
02480   77 DC EB BE C6 05 FF EB D5 C6 05 00 EB D0 F6 DA
02490   28 15 72 F5 8A 05 36 C5 7F DC 3A 05 73 A4 EB BE
024A0   36 8B 1E 42 00 36 8B 5F B4 36 C5 5F CA 8B 0F FF
024B0   0F 23 C9 7E 03 E9 97 F0 36 8E 1E 0E 00 E9 98 F9
024C0   E9 F0 1B C5 5E B8 80 7F 01 00 74 E9 B8 0A 00 E9
024D0   F2 1B 5A 81 FF 8C 0D 74 04 ED E9 6F FD EC 2A E4
024E0   E9 69 FD 58 5A 81 FF 8C 0D 74 04 EF E9 54 F0 EE
024F0   E9 50 F0 3B 7E AA 75 C8 83 ED 12 8F 46 B8 8F 46
02500   BA 8B 66 BE BF 4C 0C 89 7E BC 8B 5E AA 2E FF 67
02510   EC 3B 7E AA 75 AA 83 ED 12 8F 46 B8 8F 46 BA 8B
02520   66 BE BF EC 0C 89 7E BC 8B 5E AA 2E FF 67 EE 00
02530   BC 0E D6 0E F7 0E 03 0F 0F 0F 14 0F 20 0F ED 14
021D0   8C 56 BA E9 A0 F3 BF EC 0C 2B C9 36 8B 16 02 00
021E0   8B D8 83 C5 12 E9 66 BE 89 7E BC 89 56 BA 03 4F
021F0   02 89 4E B8 E9 5D F3 BF EC 0C 36 8B 0E 46 00 8C
02200   D2 EB DD BF EC 0C 8B D8 8B 57 04 2B C9 EB D3 BF
02210   4C 0C EB C5 BF 4C 0C 36 8B 0E 46 00 8C D2 EB C0
02220   BF 4C 0C EB E1 BF 7C 12 8B 0E E8 00 89 4E C2 EB
02230   A8 BF 7C 12 8B 0E E8 00 89 4E C2 36 8B 0E 46 00
02240   8C D2 EB 9C 8B 5E AA 2E FF 67 FA 58 8B 66 BE 83
02250   ED 12 50 8B 7E BC 2E FF 65 F0 46 46 26 8B 04 EB
02260   F1 59 58 2B D2 3B C1 75 01 4A 52 E9 E6 F2 59 58
02270   2B D2 3B C1 75 F3 52 E9 DA F2 59 58 2B D2 3B C1
02280   7F E7 52 E9 CE F2 59 58 2B D2 3B C1 7D DB 52 E9
02290   C2 F2 59 58 2B D2 3B C1 7C CF 52 E9 B6 F2 59 58
022A0   2B D2 3B C1 7E C3 52 E9 AA F2 58 8B DC 36 01 07
022B0   70 18 E9 9F F2 58 8B DC 36 29 07 70 0D E9 94 F2
022C0   58 59 F7 E9 70 04 50 E9 8A F2 B8 01 00 E9 F4 1D
022D0   B8 FF 7F 50 B8 02 00 E9 EA 1D 59 58 E3 F2 99 F7
022E0   F9 50 E9 6F F2 59 5B B8 01 00 83 F9 00 74 08 7C
022F0   0A F7 EB 70 D5 E2 FA 50 E9 59 F2 23 DB 74 D1 99
02300   F7 FB 50 E9 4E F2 59 58 E3 C6 99 F7 F9 52 E9 43
02310   F2 8B DC 36 F7 1F 70 B2 E9 39 F2 59 2B C0 23 C9
02320   78 06 74 01 40 E9 24 FF 48 E9 20 FF 58 8B DC 36
02330   21 07 E9 1F F2 58 8B DC 36 09 07 E9 16 F2 58 8B
02340   DC 36 31 07 E9 0D F2 58 F7 D0 E9 FF FE 58 23 C0
02350   79 02 F7 D8 E9 F5 FE 59 E3 09 8B DC 23 C9 78 06
02360   36 D3 27 E9 EE F1 F6 D9 36 D3 2F E9 E6 F1 59 E3
02370   F2 8B DC 23 C9 79 E9 F6 D9 36 D3 3F E9 D5 F1 59
02380   E3 E1 8B DC 23 C9 78 06 36 D3 07 E9 C6 F1 F6 D9
02390   36 D3 0F E9 BE F1 8B DC 36 FF 37 E9 B6 F1 58 8B
023A0   66 BE 83 ED 12 8B 7E BC 2E FF 65 E0 2B C0 3B 7E
023B0   AA 75 01 48 83 ED 12 E9 92 FE B8 01 00 E9 8C FE
023C0   B8 02 00 E9 86 FE B8 00 00 E9 80 FE B8 01 00 E9
023D0   7A FE 2B C0 E9 75 FE 8B 46 B8 E9 6F FE 8B 46 BA
023E0   E9 69 FE 2E FF 65 E6 2E FF 65 E4 C5 5F B8 8B 07
023F0   50 36 8E 1E 0E 00 2E FF 65 F0 C5 5F B8 8A 07 2A
02400   E4 EB ED 36 89 36 40 00 E9 3B F1 E9 18 0B 36 8B
02410   1E 42 00 36 8B 5F B4 36 8B 47 CE 3D 7C 12 74 EB
02420   36 C5 7F EE 8B 15 36 C5 7F CA 3D 4C 0C 74 37 01
02430   15 70 1A 8B 05 36 C5 7F DC F6 C6 80 75 1C 3B 05
02440   7F 1C 8B 7E BC 36 8E 1E 0E 00 E9 DE F9 C7 05 FF
02450   7F F6 C6 80 74 08 FF 05 EB 04 3B 05 7D E4 36 8E
02460   1E 0E 00 E9 03 FA 22 F6 74 05 80 FE FF 75 EF F6
02470   C6 80 75 1A 00 15 72 0C 8A 05 36 C5 7F DC 3A 05
02480   77 DC EB BE C6 05 FF EB D5 C6 05 00 EB D0 F6 DA
02490   28 15 72 F5 8A 05 36 C5 7F DC 3A 05 73 A4 EB BE
024A0   36 8B 1E 42 00 36 8B 5F B4 36 C5 5F CA 8B 0F FF
024B0   0F 23 C9 7E 03 E9 97 F0 36 8E 1E 0E 00 E9 98 F9
024C0   E9 F0 1B C5 5E B8 80 7F 01 00 74 E9 B8 0A 00 E9
024D0   F2 1B 5A 81 FF 8C 0D 74 04 ED E9 6F FD EC 2A E4
024E0   E9 69 FD 58 5A 81 FF 8C 0D 74 04 EF E9 54 F0 EE
```

| | | | | | | | | | | | | | | | | |
|---|---|---|---|---|---|---|---|---|---|---|---|---|---|---|---|---|
| 024F0 | E9 | 50 | F0 | 3B | 7E | AA | 75 | C8 | 83 | ED | 12 | 8F | 46 | B8 | 8F | 46 |
| 02500 | BA | 8B | 66 | BE | BF | 4C | 0C | 89 | 7E | BC | 8B | 5E | AA | 2E | FF | 67 |
| 02510 | EC | 3B | 7E | AA | 75 | AA | 83 | ED | 12 | 8F | 46 | B8 | 8F | 46 | BA | 8B |
| 02520 | 66 | BE | BF | EC | 0C | 89 | 7E | BC | 8B | 5E | AA | 2E | FF | 67 | EE | 00 |
| 02530 | BC | 0E | D6 | 0E | F7 | 0E | 03 | 0F | 0F | 0F | 14 | 0F | 20 | 0F | ED | 14 |
| 02540 | 25 | 0F | 31 | 0F | B1 | 1E | 83 | 1E | 5D | 1E | 12 | 28 | FC | 27 | EA | 27 |
| 02550 | 0D | 28 | F7 | 27 | E5 | 27 | D0 | 27 | 6E | 1E | BB | 0A | B3 | 2D | C7 | 1B |
| 02560 | CC | 09 | CC | 09 | CC | 09 | 8D | 09 | 54 | 02 | 54 | 02 | C4 | 0E | 54 | 02 |
| 02570 | FE | 14 | 54 | 02 | C1 | 1E | 0D | 1A | 18 | 1A | B3 | 2D | 7C | 12 | B3 | 2D |
| 02580 | B3 | 2D | B3 | 2D | B3 | 2D | B3 | 2D | B3 | 2D | B3 | 2D | B3 | 2D | B3 | 2D |
| 02590 | B3 | 2D | B3 | 2D | B3 | 2D | C6 | 09 | E3 | 19 | 1C | 0E | A4 | 19 | B4 | 19 |
| 025A0 | BA | 19 | C0 | 19 | D7 | 10 | DD | 10 | B3 | 2D | B3 | 2D | B3 | 2D | B3 | 2D |
| 025B0 | B3 | 2D | B3 | 2D | AC | 10 | B3 | 2D | B3 | 2D | B3 | 2D | B3 | 2D | B3 | 2D |
| 025C0 | B3 | 2D | B3 | 2D | B3 | 2D | B3 | 2D | B3 | 2D | B3 | 2D | B3 | 2D | B3 | 2D |
| 025D0 | 1D | 14 | 24 | 14 | 3D | 14 | 4C | 14 | 5E | 14 | 6E | 14 | 7F | 14 | 91 | 14 |
| 025E0 | A2 | 14 | B9 | 14 | B1 | 1E | 83 | 1E | 5D | 1E | 12 | 28 | FC | 27 | EA | 27 |
| 025F0 | 0D | 28 | F7 | 27 | E5 | 27 | D0 | 27 | 6E | 1E | B3 | 2D | B3 | 2D | B3 | 2D |
| 02600 | 1A | 1C | 02 | 1C | E9 | 1B | 8D | 09 | 86 | 14 | 53 | 14 | 7B | 19 | D1 | 14 |
| 02610 | 76 | 02 | 54 | 02 | C1 | 1E | B3 | 2D | B3 | 2D | B3 | 2D | 1C | 13 | A6 | 2C |
| 02620 | 28 | 15 | 54 | 02 | 97 | 19 | 01 | 15 | C7 | 18 | 97 | 19 | 10 | 18 | 48 | 1A |
| 02630 | 48 | 1A | 62 | 1F | C6 | 05 | 3A | 16 | B3 | 2D | C5 | 19 | B3 | 2D | B3 | 2D |
| 02640 | B3 | 2D | B3 | 2D | B3 | 2D | B3 | 2D | 53 | 15 | 74 | 15 | 83 | 15 | 92 | 15 |
| 02650 | A1 | 15 | B0 | 15 | B3 | 2D | BF | 15 | 08 | 16 | 16 | 16 | 24 | 16 | CD | 15 |
| 02660 | 45 | 16 | 5B | 16 | 80 | 16 | A5 | 16 | CA | 16 | E6 | 16 | F1 | 16 | 64 | 17 |
| 02670 | FC | 16 | 09 | 17 | 16 | 17 | 23 | 17 | 30 | 17 | 3D | 17 | 4A | 17 | 57 | 17 |
| 02680 | 89 | 17 | BA | 17 | DF | 17 | 83 | C5 | 12 | 89 | 66 | BE | 8B | 0E | E8 | 00 |
| 02690 | 89 | 4E | B0 | 2B | E1 | B8 | 01 | 00 | 9C | 36 | FF | 1E | 02 | 03 | 7F | 12 |
| 026A0 | 8B | C4 | 16 | 50 | 9C | 36 | FF | 1E | FE | 02 | 80 | 02 | 8C | 56 | BA | 89 |
| 026B0 | 66 | B8 | 8B | DF | BF | 7C | 12 | 2E | FF | 67 | F2 | 40 | 40 | 1E | 50 | 9C |
| 026C0 | 36 | FF | 1E | FE | 02 | 7F | 00 | 70 | 39 | 9C | 36 | FF | 1E | 02 | 03 | 80 |
| 026D0 | 14 | 70 | 2F | 50 | E9 | 7D | EE | 8B | D8 | 36 | FF | 36 | 02 | 00 | FF | 77 |
| 026E0 | 02 | 9C | 36 | FF | 1E | FE | 02 | 7F | 00 | 70 | 17 | EB | DC | 8B | D8 | 36 |
| 026F0 | A1 | 46 | 00 | 03 | 47 | 02 | 16 | 50 | 9C | 36 | FF | 1E | FE | 02 | 7F | 00 |
| 02700 | EB | C7 | E9 | BF | 19 | FF | 76 | BA | FF | 76 | B8 | 9C | 36 | FF | 1E | FE |
| 02710 | 02 | 7F | 00 | 70 | ED | 83 | ED | 12 | BF | 8C | 0D | EB | AC | 8B | D8 | 8B |
| 02720 | 47 | 02 | EB | 0C | 8B | D8 | 8B | 5F | 02 | 36 | 8E | 1E | 02 | 00 | 8B | 07 |
| 02730 | 9C | 36 | FF | 1E | 02 | 03 | 7F | 12 | 70 | C8 | E9 | 12 | EE | 8B | D8 | 8B |
| 02740 | 5F | 02 | 36 | 03 | 1E | 46 | 00 | 36 | 8B | 07 | EB | E4 | 8B | D8 | C5 | 5F |
| 02750 | 02 | EB | DB | C5 | 5E | B8 | 83 | ED | 12 | BF | 1C | 13 | EB | D0 | 8B | D8 |
| 02760 | 8B | 5F | 02 | 36 | 8E | 1E | 02 | 00 | 8A | 07 | 2A | E4 | EB | C2 | 8B | D8 |
| 02770 | 8B | 5F | 02 | 36 | 03 | 1E | 46 | 00 | 36 | 8A | 07 | 2A | E4 | EB | B1 | 8B |
| 02780 | D8 | C5 | 5F | 02 | EB | E2 | C5 | 5E | B8 | 83 | ED | 12 | BF | 1C | 13 | EB |
| 02790 | D7 | 40 | 40 | 1E | 50 | 9C | 36 | FF | 1E | FE | 02 | 7F | 00 | 70 | 4B | E9 |
| 027A0 | B2 | ED | 8B | D8 | 36 | FF | 36 | 02 | 00 | FF | 77 | 02 | 9C | 36 | FF | 1E |
| 027B0 | FE | 02 | 7F | 00 | 70 | 34 | E9 | 9B | ED | 8B | D8 | 36 | A1 | 46 | 00 | 03 |
| 027C0 | 47 | 02 | 16 | 50 | 9C | 36 | FF | 1E | FE | 02 | 7F | 00 | 70 | 1C | E9 | 83 |
| 027D0 | ED | FF | 76 | BA | FF | 76 | B8 | 9C | 36 | FF | 1E | FE | 02 | 7F | 00 | 70 |
| 027E0 | 09 | 83 | ED | 12 | BF | 1C | 13 | E9 | 6A | ED | E9 | D7 | 18 | 40 | 40 | 1E |
| 027F0 | 50 | 9C | 36 | FF | 1E | FE | 02 | 7F | 00 | 89 | 66 | D0 | 70 | EC | 83 | C5 |
| 02800 | 12 | 36 | 2B | 26 | 64 | 00 | 8B | C4 | 8B | 0E | E8 | 00 | 89 | 4E | B0 | 16 |
| 02810 | 50 | 9C | 36 | FF | 1E | FE | 02 | 80 | 02 | BF | 7C | 12 | 89 | 7E | BC | 8C |
| 02820 | 56 | BA | 89 | 66 | B8 | E9 | 4E | ED | 9C | 36 | FF | 1E | 02 | 03 | 80 | 14 |
| 02830 | 70 | 1E | 50 | BF | 8C | 0D | 89 | 7E | BC | E9 | 18 | ED | 58 | 9C | 36 | FF |
| 02840 | 1E | 02 | 03 | 7F | 12 | 70 | 09 | BF | 1C | 13 | 89 | 7E | BC | E9 | 04 | ED |
| 02850 | E9 | 71 | 18 | 2B | C0 | 9C | 36 | FF | 1E | 06 | 03 | 01 | 00 | 0C | 75 | 01 |
| 02860 | 48 | 9C | 36 | FF | 1E | 02 | 03 | 02 | 18 | 9C | 36 | FF | 1E | 02 | 03 | 7F |
| 02870 | 12 | E9 | E0 | EC | 2B | C0 | 9C | 36 | FF | 1E | 06 | 03 | 01 | 00 | 0C | 75 |
| 02880 | DF | EB | DE | 2B | C0 | 9C | 36 | FF | 1E | 06 | 03 | 01 | 00 | 0C | 7F | D0 |
| 02890 | EB | CF | 2B | C0 | 9C | 36 | FF | 1E | 06 | 03 | 01 | 00 | 0C | 7D | C1 | EB |
| 028A0 | C0 | 2B | C0 | 9C | 36 | FF | 1E | 06 | 03 | 01 | 00 | 0C | 7C | B2 | EB | B1 |
| 028B0 | 2B | C0 | 9C | 36 | FF | 1E | 06 | 03 | 01 | 00 | 0C | 7E | A3 | EB | A2 | 9C |
| 028C0 | 36 | FF | 1E | 06 | 03 | 01 | 80 | 00 | 70 | 6D | E9 | 87 | EC | 9C | 36 | FF |
| 028D0 | 1E | 02 | 03 | 01 | 0A | 36 | FF | 36 | 64 | 00 | 36 | FF | 06 | 64 | 00 | 9C |
| 028E0 | 36 | FF | 1E | 06 | 03 | 00 | 01 | 06 | 70 | 48 | 9C | 36 | FF | 1E | 02 | 03 |
| 028F0 | 00 | 0C | 9C | 36 | FF | 1E | 06 | 03 | 01 | 80 | 04 | 36 | 8F | 06 | 64 | 00 |

```
02900   9C 36 FF 1E 02 03 00 08 9C 36 FF 1E 06 03 01 80
02910   02 70 24 E9 3E EC 9C 36 FF 1E 06 03 01 80 04 70
02920   16 E9 30 EC 9C 36 FF 1E 06 03 01 80 06 70 08 E9
02930   22 EC 36 8F 06 64 00 E9 8A 17 9C 36 FF 1E 02 03
02940   00 0A E9 0F EC 2B C0 9C 36 FF 1E 02 03 80 16 78
02950   06 74 01 40 E9 F5 F8 48 E9 F1 F8 9C 36 FF 1E 02
02960   03 80 14 70 7E 8B C8 9C 36 FF 1E 02 03 80 14 70
02970   72 23 C1 9C 36 FF 1E 02 03 7F 12 70 66 E9 D4 EB
02980   9C 36 FF 1E 02 03 80 14 70 59 8B C8 9C 36 FF 1E
02990   02 03 80 14 70 4D 0B C1 9C 36 FF 1E 02 03 7F 12
029A0   70 41 E9 AF EB 9C 36 FF 1E 02 03 80 14 70 34 8B
029B0   C8 9C 36 FF 1E 02 03 80 14 70 28 33 C1 9C 36 FF
029C0   1E 02 03 7F 12 70 1C E9 8A EB 9C 36 FF 1E 02 03
029D0   80 14 70 0F F7 D0 9C 36 FF 1E 02 03 7F 12 70 03
029E0   E9 B4 02 E9 DE 16 9C 36 FF 1E 02 03 00 10 E9 63
029F0   EB 9C 36 FF 1E 02 03 00 0E E9 9B 02 9C 36 FF 1E
02A00   02 03 00 24 70 DD E9 8E 02 9C 36 FF 1E 02 03 00
02A10   26 70 D0 E9 81 02 9C 36 FF 1E 02 03 00 28 70 C3
02A20   E9 74 02 9C 36 FF 1E 02 03 00 2A 70 B6 E9 67 02
02A30   9C 36 FF 1E 02 03 00 2C 70 A9 E9 5A 02 9C 36 FF
02A40   1E 02 03 00 2E 70 9C E9 4D 02 9C 36 FF 1E 02 03
02A50   00 30 70 8F E9 40 02 9C 36 FF 1E 02 03 00 32 70
02A60   82 E9 F0 EA 9C 36 FF 1E 02 03 00 0C 79 18 73 16
02A70   B8 01 00 9C 36 FF 1E 02 03 7F 12 70 5F 9C 36 FF
02A80   1E 06 03 01 80 02 E9 0E 02 9C 36 FF 1E 02 03 80
02A90   14 70 49 8B C8 E3 1A 9C 36 FF 1E 02 03 80 14 70
02AA0   3B 23 C9 78 0F D3 E0 9C 36 FF 1E 02 03 7F 12 70
02AB0   2B E9 A0 EA F6 D9 D3 E8 EB ED 9C 36 FF 1E 02 03
02AC0   80 14 70 18 8B C8 E3 E9 9C 36 FF 1E 02 03 80 14
02AD0   70 0A 23 C9 79 CF F6 D9 D3 F8 EB CB E9 E5 15 9C
02AE0   36 FF 1E 02 03 80 14 70 F3 8B C8 E3 C4 9C 36 FF
02AF0   1E 02 03 80 14 70 E5 23 C9 78 04 D3 C0 EB A8 F6
02B00   D9 D3 C8 EB A2 58 9C 36 FF 1E 02 03 7F 12 70 CC
02B10   36 A1 64 00 2D 02 00 D1 E0 8A E0 88 66 BE 83 ED
02B20   12 2B D2 2B DB 9C 36 FF 1E 0E 03 8B C4 48 BA 20
02B30   00 2B E2 16 50 9C 36 FF 1E FE 02 80 06 2B D1 03
02B40   E2 8B 7E BC 2E FF 65 F8 BA 01 00 EB 02 2B D2 8B
02B50   4E B6 E3 28 8B D9 03 DC 4B E8 7F 00 72 4F 8B 4E
02B60   B6 16 53 9C 36 FF 1E FE 02 7F 04 36 89 0E 3C 00
02B70   23 C9 75 23 9C 36 FF 1E 02 03 01 18 26 81 7C FE
02B80   96 00 74 24 2B C0 23 D2 74 1B 9C 36 FF 1E 02 03
02B90   7F 12 70 40 E9 00 01 23 D2 75 F9 9C 36 FF 1E 02
02BA0   03 80 14 70 D7 E9 A4 F6 E9 46 07 EB CF 36 89 0E
02BB0   3C 00 23 D2 75 D4 E9 93 F6 9C 36 FF 1E 02 03 80
02BC0   14 70 11 50 E9 AF E9 9C 36 FF 1E 02 03 80 14 70
02BD0   03 E9 78 F6 E9 ED 14 56 1E EB 08 56 1E 8C D0 8E
02BE0   D8 8B F3 52 55 56 FD 2B ED 2B DB 2A E4 AC 24 7F
02BF0   3C 26 75 76 AC 24 7F B9 0A 00 3C 2E 74 1D 8A D0
02C00   80 E2 5F B9 10 00 80 FA 48 74 10 B9 02 00 80 FA
02C10   42 74 08 B9 08 00 80 FA 4F 75 03 AC 24 7F 3C 30
02C20   7C 2B 3C 39 7E 0C 24 5F 3C 41 7C 21 3C 46 7F 1D
02C30   2C 07 2C 30 3A C1 7D 0E 93 F7 E1 70 09 93 81 CD
02C40   02 00 03 D8 73 D5 5B 5D 5A 1F 5E F8 C3 46 F7 C5
02C50   01 00 74 05 3C 48 75 EE 4E F7 C5 02 00 74 E7 8B
02C60   C3 59 2B CE 5D 5A 1F 5E F9 C3 B9 10 00 3C 30 7C
02C70   D5 3C 39 7F D1 81 CD 01 00 EB B7 58 9C 36 FF 1E
02C80   02 03 7F 12 70 03 E9 ED E8 E9 38 14 58 9C 36 FF
02C90   1E 02 03 7F 12 70 F2 8B 66 BE 83 ED 12 8B 7E BC
02CA0   2E FF 65 F4 8C D9 C5 5E B8 8A 07 8E D9 24 7F 98
02CB0   40 E9 98 F5 8B 46 B0 E9 92 F5 B8 02 00 E9 8C F5
02CC0   2B C0 E9 87 F5 8B 5E AA 2E FF 67 FC 9C 36 FF 1E
02CD0   02 03 80 14 70 30 50 58 83 ED 12 C5 5E B8 89 07
02CE0   E9 63 E8 2B C0 EB F4 9C 36 FF 1E 02 03 80 14 70
02CF0   15 50 58 83 ED 12 80 FC 00 75 08 C5 5E B8 88 07
02D00   E9 43 E8 B8 0A 00 E9 BB 13 2A C0 EB EE 58 9C 36
```

| | | | | | | | | | | | | | | | | |
|---|---|---|---|---|---|---|---|---|---|---|---|---|---|---|---|---|
| 02D10 | FF | 1E | 02 | 03 | 7F | 12 | 70 | EE | 8B | 4E | 9E | FF | 76 | A8 | FF | 76 |
| 02D20 | A6 | 9C | 36 | FF | 1E | FE | 02 | 80 | 02 | 70 | DB | E9 | 15 | E8 | 51 | 53 |
| 02D30 | 52 | B9 | 01 | 00 | 8C | D8 | E8 | 04 | 09 | 5A | 5B | 59 | C3 | 58 | 9C | 36 |
| 02D40 | FF | 1E | 02 | 03 | 7F | 12 | 70 | BE | 56 | E8 | E2 | 09 | 74 | 67 | 23 | C0 |
| 02D50 | 74 | 63 | C5 | 73 | B2 | 2B | F0 | 8B | 4B | C0 | 03 | F1 | FD | BB | 40 | 00 |
| 02D60 | B2 | 20 | 52 | 2B | D2 | AC | 3C | 5F | 75 | 33 | 83 | F9 | 02 | 72 | 02 | 49 |
| 02D70 | AC | 46 | E8 | B9 | FF | 4E | E2 | ED | E9 | 2E | 01 | 80 | CB | 01 | EB | 30 |
| 02D80 | F6 | C3 | A0 | 74 | 02 | FE | C2 | 80 | CB | 20 | EB | 24 | F6 | C7 | A0 | 74 |
| 02D90 | 02 | FE | C2 | 80 | CF | 80 | EB | 18 | 80 | CB | 08 | EB | 13 | EB | 51 | 80 |
| 02DA0 | CB | 02 | 83 | F9 | 02 | 72 | 09 | 38 | 04 | 75 | 05 | 4E | 49 | 80 | CB | 80 |
| 02DB0 | E2 | B3 | E9 | F4 | 00 | 2B | DB | 36 | A1 | 64 | 00 | 2D | 02 | 00 | D1 | E0 |
| 02DC0 | 8A | E0 | 2B | D2 | 5E | 26 | 81 | 3C | 92 | 00 | 75 | 03 | 80 | CB | 01 | 9C |
| 02DD0 | 36 | FF | 1E | 0E | 03 | 8B | C4 | 48 | BA | 20 | 00 | 2B | E2 | 16 | 50 | 9C |
| 02DE0 | 36 | FF | 1E | FE | 02 | 80 | 06 | 2B | D1 | 03 | E2 | E9 | F7 | 07 | EB | 85 |
| 02DF0 | 3C | 23 | 74 | 37 | 3C | 2B | 74 | A7 | 3C | 2D | 74 | A6 | 3C | 24 | 74 | 80 |
| 02E00 | 3C | 2A | 74 | 88 | 3C | 28 | 74 | 90 | 3C | 3B | 74 | E2 | 3C | 5E | 74 | 35 |
| 02E10 | 3C | 2E | 74 | 2A | 3C | 27 | 74 | 03 | E9 | 56 | FF | 83 | F9 | 02 | 72 | F8 |
| 02E20 | 49 | AC | 83 | C4 | 02 | 50 | EB | 88 | 80 | CB | 10 | FE | C2 | E2 | 02 | EB |
| 02E30 | 78 | AC | 3C | 23 | 74 | F5 | 3C | 2C | 74 | EE | 3C | 2E | 75 | 0D | 80 | CF |
| 02E40 | 40 | E2 | 36 | EB | 64 | 49 | E3 | 61 | AC | EB | 37 | 3C | 3E | 75 | 04 | B4 |
| 02E50 | 02 | EB | 06 | 3C | 5E | 75 | 2B | B4 | 01 | 83 | F9 | 04 | 72 | 4B | 38 | 04 |
| 02E60 | 75 | 47 | 38 | 44 | FF | 75 | 42 | 38 | 44 | FE | 75 | 3D | 83 | E9 | 04 | 83 |
| 02E70 | EE | 03 | 0A | FC | E3 | 33 | AC | EB | 09 | AC | 3C | 23 | 75 | CD | FE | C6 |
| 02E80 | E2 | F7 | E3 | 25 | 3C | 2B | 75 | 05 | 80 | CB | 06 | EB | 10 | 3C | 2D | 75 |
| 02E90 | 05 | 80 | CB | 04 | EB | 07 | 3C | 29 | 75 | 07 | 80 | CB | 08 | 49 | E3 | 09 |
| 02EA0 | AC | 3C | 2C | 75 | 04 | 49 | 80 | CF | 04 | 89 | 4B | C0 | 8B | C2 | 5A | 23 |
| 02EB0 | C0 | 75 | 05 | F6 | C7 | 40 | 75 | 0C | B6 | 30 | F6 | C7 | 80 | 74 | 02 | B2 |
| 02EC0 | 2A | E9 | 00 | FF | E9 | F0 | FE | 2E | FF | 65 | E8 | FF | 77 | BA | FF | 77 |
| 02ED0 | B8 | 9C | 36 | FF | 1E | FE | 02 | 7F | 00 | 70 | 39 | 9C | 36 | FF | 1E | 02 |
| 02EE0 | 03 | 80 | 14 | 70 | 2F | 50 | E9 | 66 | E6 | FF | 77 | BA | FF | 77 | B8 | 9C |
| 02EF0 | 36 | FF | 1E | FE | 02 | 7F | 00 | 70 | 1B | 36 | 8E | 1E | 0E | 00 | 2E | FF |
| 02F00 | 65 | F4 | C5 | 5F | B8 | 8B | 07 | 36 | 8E | 1E | 0E | 00 | 9C | 36 | FF | 1E |
| 02F10 | 02 | 03 | 7F | 12 | 70 | 0D | 2E | FF | 65 | F4 | C5 | 5F | B8 | 8A | 07 | 2A |
| 02F20 | E4 | EB | E4 | E9 | 9E | 11 | 36 | FF | 77 | CC | 36 | FF | 77 | CA | 9C | 36 |
| 02F30 | FF | 1E | FE | 02 | 7F | 00 | 70 | EB | 36 | C5 | 7F | EE | 1E | 57 | 9C | 36 |
| 02F40 | FF | 1E | FE | 02 | 7F | 00 | 70 | DB | 9C | 36 | FF | 1E | 02 | 03 | 00 | 16 |
| 02F50 | 9C | 36 | 8E | 1E | 0E | 00 | 9C | 36 | FF | 1E | 06 | 03 | 01 | 80 | 00 | 9C |
| 02F60 | 36 | FF | 1E | 02 | 03 | 00 | 0A | 36 | 8B | 4F | C2 | 36 | FF | 77 | CC | 36 |
| 02F70 | FF | 77 | CA | 9C | 36 | FF | 1E | FE | 02 | 80 | 02 | 36 | FF | 77 | DE | 36 |
| 02F80 | FF | 77 | DC | 9C | 36 | FF | 1E | FE | 02 | 7F | 00 | 70 | 96 | 9D | 78 | 1E |
| 02F90 | 9C | 36 | FF | 1E | 06 | 03 | 01 | 00 | 0C | 7F | 1E | 36 | 8B | 0E | 5E | 00 |
| 02FA0 | 83 | C1 | 28 | 36 | FF | 1E | 0A | 03 | 8B | 7E | BC | E9 | 7D | EE | 9C | 36 |
| 02FB0 | FF | 1E | 06 | 03 | 01 | 00 | 0C | 7D | E2 | 36 | 8B | 0E | 5E | 00 | 83 | C1 |
| 02FC0 | 28 | 36 | FF | 1E | 0A | 03 | E9 | A0 | EE | 1E | C5 | 5E | B8 | 8B | 0F | B8 |
| 02FD0 | 0F | 00 | E3 | 12 | FF | 76 | B4 | FF | 76 | B2 | 9C | 36 | FF | 1E | FE | 02 |
| 02FE0 | 7F | 04 | E3 | 02 | 1F | C3 | E9 | DB | 10 | 00 | 00 | 00 | 00 | 00 | 00 | 00 |
| 02FF0 | BC | 0E | D6 | 0E | F7 | 0E | 03 | 0F | 0F | 0F | 14 | 0F | 20 | 0F | ED | 14 |
| 03000 | 25 | 0F | 31 | 0F | B1 | 1E | 83 | 1E | 5D | 1E | 12 | 28 | FC | 27 | EA | 27 |
| 03010 | 0D | 28 | F7 | 27 | E5 | 27 | D0 | 27 | 6E | 1E | 8C | 0A | E6 | 20 | B9 | 20 |
| 03020 | CC | 09 | CC | 09 | CC | 09 | 8D | 09 | 54 | 02 | 54 | 02 | C4 | 0E | 54 | 02 |
| 03030 | FE | 14 | 54 | 02 | C1 | 1E | 53 | 2D | B3 | 2D | B3 | 2D | 3C | 1D | B3 | 2D |
| 03040 | B3 | 2D | B3 | 2D | B3 | 2D | B3 | 2D | B3 | 2D | B3 | 2D | B3 | 2D | 21 | 23 |
| 03050 | 21 | 23 | 62 | 1F | C6 | 05 | 87 | 09 | 89 | 20 | 3A | 20 | 0A | 22 | 20 | 22 |
| 03060 | 26 | 22 | 2C | 22 | 32 | 22 | 38 | 22 | 51 | 09 | 5A | 09 | 63 | 09 | 6C | 09 |
| 03070 | 75 | 09 | 7E | 09 | 77 | 24 | 35 | 20 | 32 | 07 | B3 | 2D | B3 | 2D | B3 | 2D |
| 03080 | B3 | 2D | B3 | 2D | F4 | 25 | B3 | 2D | B3 | 2D | 4A | 26 | B3 | 2D | B3 | 2D |
| 03090 | BC | 0E | D6 | 0E | F7 | 0E | 03 | 0F | 0F | 0F | 14 | 0F | 20 | 0F | ED | 14 |
| 030A0 | 25 | 0F | 31 | 0F | F3 | 1E | 2A | 1F | 04 | 1F | 12 | 28 | FC | 27 | EA | 27 |
| 030B0 | 0D | 28 | F7 | 27 | E5 | 27 | D0 | 27 | 15 | 1F | B3 | 2D | E6 | 20 | B3 | 2D |
| 030C0 | CC | 09 | CC | 09 | CC | 09 | BD | 20 | 54 | 02 | 54 | 02 | C4 | 0E | 54 | 02 |
| 030D0 | FE | 14 | 51 | 1F | 3E | 22 | B3 | 2D | B3 | 2D | B3 | 2D | DC | 1D | BF | 2C |
| 030E0 | B3 | 2D | B3 | 2D | F7 | 24 | EE | 1E | 4D | 18 | 48 | 18 | F7 | 24 | F6 | 22 |
| 030F0 | F6 | 22 | B3 | 2D | B3 | 2D | 1A | 20 | B3 | 2D | A6 | 20 | B3 | 2D | B3 | 2D |
| 03100 | B3 | 2D | B3 | 2D | B3 | 2D | B3 | 2D | B3 | 2D | B3 | 2D | B3 | 2D | B3 | 2D |
| 03110 | B3 | 2D | B3 | 2D | B3 | 2D | A1 | 20 | B3 | 2D | B3 | 2D | D1 | 24 | C5 | 24 |

```
03120  B3 2D 2E 25 B3 2D B5 21 B3 2D B3 2D B3 2D B3 2D
03130  83 C5 12 89 66 BE BF 3C 1D 89 7E BC 89 3E 01 49
03140  89 4E B6 8C 56 B4 8C 56 BA 36 A1 AE 01 89 46 B2
03150  B8 6E 00 89 46 B8 8B 5E AA 2E FF 67 F6 8B D8 8C
03160  D2 8B 4F 04 8B 5F 02 36 03 1E 46 00 EB 22 8B D8
03170  36 8B 16 02 00 03 16 E2 00 03 57 02 8B 4F 04 2B
03180  DB EB 0D 8B D8 36 8B 16 02 00 8B 4F 04 8B 5F 02
03190  83 C5 12 89 66 BE BF 3C 1D 89 7E BC 89 56 B4 89
031A0  56 BA 89 4E B6 89 5E B8 43 03 D9 89 5E B2 E9 A3
031B0  E3 8B D8 89 66 D0 8B 4F 02 83 C3 04 E8 D1 05 8B
031C0  CB 83 C5 12 8C 56 B4 8B C1 48 03 C4 89 46 B2 BF
031D0  3C 1D 89 7E BC 89 4E B6 8C 56 BA 89 4E C0 8D 46
031E0  C0 89 46 B8 F7 C4 01 00 74 01 4C E9 88 E3 8B 4E
031F0  B6 EB D1 8B D8 8B 4F 02 83 C3 04 01 4E B6 E8 8F
03200  05 E9 50 E3 8B D8 8C D2 8B 47 04 8B 5F 02 36 03
03210  1E 46 00 EB 22 8B D8 36 8B 16 02 00 03 16 E2 00
03220  03 57 02 8B 47 04 2B DB EB 0D 8B D8 36 8B 16 02
03230  00 8B 47 04 8B 5F 02 8E DA 8B 0F 3B C8 76 02 8B
03240  C8 03 D8 83 C3 02 2B D9 01 4E B6 E8 42 05 E9 FE
03250  E2 C5 5E B8 8B 0F C5 5E B2 43 83 ED 12 BF DC 1D
03260  EB E4 83 C5 12 89 66 BE 36 C5 1E 4E 00 2B C9 2B
03270  D2 8A 27 80 FC 0D 74 57 F7 C2 02 00 74 25 80 FC
03280  22 75 20 C6 07 0D 53 36 2B 1E AE 01 F7 DB 43 36
03290  A1 6E 00 3B D8 5B 73 09 4B 80 3F 2C 74 30 EB 2F
032A0  90 EB 2C 0B D2 75 16 42 80 FC 22 75 06 BA 02 00
032B0  4B EB BE 80 FC 20 75 05 4B 2B D2 EB B4 F7 C2 02
032C0  00 75 05 80 FC 2C 74 06 41 4B 50 44 EB A3 4B 36
032D0  89 1E 4E 00 36 8E 1E 0E 00 81 7E AA 3C 1D 74 02
032E0  E3 0C 89 4E B6 BF DC 1D 89 7E BC E9 66 E2 B8 EF
032F0  FF 36 8B 2E 42 00 8B 66 BE 8B 4E BA 36 FF 1E 0A
03300  03 BF 7C 08 36 8E 06 14 00 36 8B 0E 40 00 36 8B
03310  36 3E 00 E3 1D 8B F1 E9 3A E2 8B DC 8C D0 8E D8
03320  8B 4E B6 01 4E B6 E8 67 04 E9 23 E2 07 8B F2 68
03330  ED FF E9 8F 0D BB 01 00 EB 02 2B DB 06 8B D6 C5
03340  76 B2 C4 7E B8 26 8B 0D 3B 4E B6 76 03 8B 4E B6
03350  83 ED 12 81 7E BC 3C 1D 75 D2 C4 7E B8 8B 46 B6
03360  83 FB 00 75 05 26 C7 05 00 00 26 2B 05 3B C8 76
03370  02 8B C8 E3 0E 26 8B 05 26 01 0D C4 7E B2 2B F8
03380  FD F3 A4 8B F2 07 E9 8D E1 06 C4 7E B8 26 C7 05
03390  00 00 C4 7E B2 8B 4E B6 B0 20 FD F3 AA 07 E9 A5
033A0  E1 BB 01 00 EB 02 2B DB 06 8B D6 8C D0 8E D8 8B
033B0  4E B6 8B F1 03 F4 46 EB 97 2E FF 65 EA 8C C0 C4
033C0  7F B8 26 8B 0D 8E C0 3B 4F B6 76 03 8B 4F B6 C5
033D0  5F B2 8B 7E BC 2B D9 43 E8 B5 03 36 8E 1E 0E 00
033E0  8B C8 2E FF 65 F8 C5 5E B8 8B 0F EB 1F 59 B8 01
033F0  00 EB 0F 59 B8 00 80 EB 09 59 58 83 ED 12 22 E4
03400  78 61 22 ED 78 63 8B 66 BE 83 ED 12 8B 56 B6 8B
03410  DA 8B 7E BC 81 FF DC 1D 74 0B C5 5E B8 8B 1F 3B
03420  DA 76 02 8B DA 3B CB 76 02 8B CB 3D 00 80 75 06
03430  8B C3 2B C1 EB 13 48 74 10 3B C3 72 02 8B C3 03
03440  C8 3B CB 76 02 8B CB 2B C8 81 FF 3C 1D 75 32 E3
03450  03 29 46 B2 81 7E AA DC 1D 74 1A 36 8E 1E 0E 00
03460  E9 6C FD B8 0C 00 E9 5B 0C B8 0D 00 E9 55 0C B8
03470  0F 00 E9 4F 0C C5 5E B2 83 ED 12 E9 54 FF E9 32
03480  0C 81 FF DC 1D 75 F7 89 4E B6 8B 7E BE E3 18 3D
03490  00 00 74 1D 4F 56 06 8B F7 2B F0 8C D3 8E DB 8E
034A0  C3 FD F3 A4 47 07 5E 88 E7 36 8E 1E 0E 00 E9 46
034B0  03 2B F9 EB F2 8B DC 8B 4E B6 E3 B3 03 D9 36 8A
034C0  47 FF 2A E4 E9 85 ED B8 0D 00 E9 F7 0B B8 18 00
034D0  E9 F1 0B B8 0A 00 E9 EB 0B 3B 7E AA 75 A0 59 83
034E0  ED 12 58 8B 66 BE 22 E4 75 E9 E3 1B F6 C5 80 75
034F0  D6 8B DC 2B D9 72 D6 3B DD 76 D2 8B E3 8B D1 36
03500  88 07 43 E2 FA 8B CA E9 F0 02 8B 4E B6 C5 5E B8
03510  8B 07 3B C1 76 02 8B C1 36 8E 1E 0E 00 E9 2C ED
03520  8B 46 B6 E9 26 ED B8 03 00 E9 20 ED B8 01 00 E9
```

| | | | | | | | | | | | | | | | | |
|---|---|---|---|---|---|---|---|---|---|---|---|---|---|---|---|---|
| 03530 | 1A | ED | 8B | 46 | B2 | E9 | 14 | ED | 8B | 46 | B4 | E9 | 0E | ED | 01 | 4E |
| 03540 | B6 | E9 | 32 | E0 | 20 | 3F | 0A | 0D | 09 | 2C | 22 | 2E | FF | 36 | 49 | 22 |
| 03550 | EB | 0C | 2E | FF | 36 | 4A | 22 | EB | 05 | 2E | FF | 36 | 48 | 22 | B9 | 01 |
| 03560 | 00 | EB | 0F | 2E | FF | 36 | 44 | 22 | EB | 05 | 2E | FF | 36 | 46 | 22 | B9 |
| 03570 | 02 | 00 | 83 | C5 | 12 | 8B | C4 | 40 | 40 | 89 | 46 | BE | 2B | D2 | EB | 7C |
| 03580 | E8 | AB | 01 | C5 | 5E | B8 | 8B | 17 | 23 | D2 | 7E | 7E | 22 | F6 | 75 | 7D |
| 03590 | 56 | 8B | F2 | 81 | 7B | AA | 3C | 1D | 75 | 1C | C5 | 5B | A6 | 8B | 0F | E3 |
| 035A0 | 33 | C5 | 5B | A0 | 2B | D9 | 43 | 8A | 07 | 3C | 0A | 74 | 07 | 3C | 0D | 74 |
| 035B0 | 23 | 4A | 74 | 5F | E2 | F0 | 2B | C0 | 81 | 7B | AA | EC | 0C | 75 | 05 | C5 |
| 035C0 | 5B | A6 | 8B | 07 | 8B | D8 | B4 | 07 | 9C | 36 | FF | 1E | E2 | 02 | 2B | D1 |
| 035D0 | 7E | 41 | 8B | F2 | 4E | 4A | B4 | 20 | 8B | CA | E3 | 2B | 8B | D6 | 5E | 50 |
| 035E0 | 44 | E2 | FC | 8B | CA | 2B | D2 | EB | 13 | E8 | 42 | 01 | 56 | C5 | 5E | B8 |
| 035F0 | 8B | 17 | 8B | F2 | EB | E0 | BA | 01 | 00 | 8B | 4E | B6 | 56 | 8B | F4 | 03 |
| 03600 | F1 | 46 | 8C | D0 | E8 | 3C | 00 | 5E | 72 | 06 | E9 | 39 | DF | B8 | 0A | 00 |
| 03610 | E9 | B1 | 0A | 8B | D6 | 5E | B8 | 0A | 0D | 50 | 56 | 8B | F2 | 46 | F8 | EB |
| 03620 | B4 | BA | 01 | 00 | 56 | C5 | 76 | B8 | 8B | 0C | 3B | 4E | B6 | 76 | 03 | 8B |
| 03630 | 4E | B6 | 8B | 76 | B2 | 8B | 46 | B4 | E8 | 08 | 00 | EB | CA | 57 | 1E | 56 |
| 03640 | 50 | EB | 66 | 57 | 1E | 56 | 50 | E8 | E4 | 00 | 74 | 5D | 23 | D2 | 74 | 59 |
| 03650 | 23 | C0 | 74 | 55 | C5 | 5B | B2 | 03 | 5B | C0 | 2B | D8 | 8A | 17 | 80 | FA |
| 03660 | 21 | 75 | 05 | B8 | 01 | 00 | EB | 34 | 80 | FA | 26 | 75 | 04 | 8B | C1 | EB |
| 03670 | 2B | 80 | FA | 5C | 74 | 0F | 56 | 8B | F3 | E8 | B2 | F6 | 5E | 4B | FF | 4B |
| 03680 | C0 | 74 | 26 | EB | D7 | 8A | F2 | B8 | 01 | 00 | 40 | 4B | FF | 4B | C0 | 74 |
| 03690 | 68 | 8A | 17 | 80 | FA | 20 | 74 | F2 | 3A | D6 | 75 | 5D | FF | 4B | C0 | 8B |
| 036A0 | D8 | 2B | D9 | 3B | C8 | 76 | 04 | 8B | C8 | 2B | DB | 5A | 53 | 2B | C0 | 81 |
| 036B0 | 7B | AA | 7C | 08 | 74 | 0C | C5 | 5B | A6 | 8B | 07 | 81 | 7B | AA | 3C | 1D |
| 036C0 | 74 | 3D | E3 | 08 | 9C | 36 | FF | 1E | E6 | 02 | 70 | 2D | 59 | 5B | E3 | 19 |
| 036D0 | 8B | D1 | B7 | 20 | 8B | F4 | 4E | 53 | 44 | E2 | FC | 8B | CA | 8C | D2 | 9C |
| 036E0 | 36 | FF | 1E | E6 | 02 | 70 | 06 | 03 | E1 | 8B | F3 | 1F | 5F | F8 | C3 | 03 |
| 036F0 | E1 | 8B | F3 | EB | 06 | B8 | 1B | 00 | 5E | 5B | 5E | F9 | 1F | 5F | C3 | 56 |
| 03700 | 8B | F4 | 36 | 03 | 44 | 02 | 03 | C1 | 3B | 43 | A4 | 77 | E8 | 89 | 07 | 36 |
| 03710 | 2B | 44 | 02 | 5E | 8C | C3 | C4 | 7B | A0 | 2B | F8 | 03 | F9 | 8E | DA | FD |
| 03720 | F3 | A4 | 59 | B0 | 20 | F3 | AA | 8E | C3 | 5E | 1F | 5F | F8 | C3 | 36 | A0 |
| 03730 | 48 | 00 | 98 | 8B | F8 | 8B | 43 | B6 | 83 | 7B | C0 | 00 | 75 | 03 | 89 | 43 |
| 03740 | C0 | 23 | FF | C3 | 5B | E8 | E3 | E4 | 8B | 04 | C5 | 76 | C4 | 26 | 8B | 0D |
| 03750 | C4 | 7E | B2 | 2B | C1 | 70 | 02 | 03 | C8 | FD | E3 | 06 | F3 | A6 | 74 | 02 |
| 03760 | EB | 05 | 3D | 00 | 00 | 74 | 09 | B8 | 00 | 00 | 7F | 08 | 2E | FF | 67 | 04 |
| 03770 | 2E | FF | 67 | 02 | 2E | FF | 27 | 8B | 4E | B6 | 3B | 4E | A4 | 75 | 03 | E9 |
| 03780 | 2A | EC | 2B | C0 | 83 | ED | 12 | E9 | C2 | EA | B8 | 18 | 00 | E9 | 34 | 09 |
| 03790 | 58 | E3 | 28 | 88 | D4 | 2B | D1 | 72 | F1 | 55 | 81 | C5 | 00 | 01 | 3B | D5 |
| 037A0 | 5D | 72 | E7 | 8B | E2 | 8B | FC | 56 | 06 | 8B | F3 | 8C | D3 | 8E | C3 | 8B |
| 037B0 | D9 | FC | F3 | A4 | 07 | 5E | 8B | 7E | BC | FF | E0 | 8B | D9 | FF | E0 | 61 |
| 037C0 | 7A | E0 | 41 | 5A | 20 | 2E | 8B | 16 | C2 | 24 | 2E | 8A | 26 | C4 | 24 | EB |
| 037D0 | 0A | 2E | 8B | 16 | BF | 24 | 2E | 8A | 26 | C1 | 24 | 9B | 4E | B6 | E3 | 1A |
| 037E0 | 8B | DD | 8B | EC | 8A | 46 | 00 | 3A | C2 | 7C | 07 | 3A | C6 | 7F | 03 | 00 |
| 037F0 | 66 | 00 | 45 | E2 | EF | 88 | EB | 8B | 4E | B6 | 83 | ED | 12 | 8B | 7E | BC |
| 03800 | 2E | FF | 65 | F8 | B8 | 0D | 00 | E9 | BA | 08 | C5 | 5E | B8 | 8B | 0F | 3B |
| 03810 | 4E | A4 | 77 | F0 | C5 | 5E | A6 | 8B | 07 | 89 | 0F | 2B | C8 | 76 | 0C | C5 |
| 03820 | 5E | A0 | 2B | D8 | B0 | 20 | 88 | 07 | 4B | E2 | FB | E9 | 15 | DD | 8B | 56 |
| 03830 | B6 | 23 | D2 | 74 | 60 | C5 | 5E | A6 | 8B | 0F | E3 | 5F | 49 | 56 | 06 | 8E |
| 03840 | 46 | 90 | C5 | 5E | 94 | 8B | 07 | 3B | C8 | 77 | 20 | 8B | F0 | 03 | F2 | 3B |
| 03850 | 76 | 92 | 77 | 47 | 89 | 37 | C5 | 76 | 8E | 2B | F0 | 46 | 8B | FE | 2B | FA |
| 03860 | 91 | 2B | C8 | FC | F3 | A4 | 8B | FE | 4F | EB | 17 | 8B | F1 | 03 | F2 | 3B |
| 03870 | 76 | 92 | 77 | 2D | 89 | 37 | 2B | C8 | C4 | 7E | 8E | 2B | F8 | B0 | 20 | FD |
| 03880 | F3 | AA | 8B | CA | 8C | D2 | 8E | DA | 8B | F4 | 03 | F1 | 83 | C6 | 04 | 4E |
| 03890 | FD | F3 | A4 | 07 | 5E | 83 | ED | 24 | E9 | AB | DC | B8 | 0C | 00 | E9 | 23 |
| 038A0 | 08 | B8 | 0D | 00 | E9 | 1D | 08 | C5 | 5E | A6 | 8B | 0F | C5 | 5E | B8 | 8B |
| 038B0 | 07 | E3 | E8 | 49 | 83 | ED | 24 | E8 | 03 | 00 | E9 | 89 | DC | 23 | C0 | 74 |
| 038C0 | 32 | C5 | 5E | B8 | 8B | 17 | 3B | CA | 73 | 29 | 2B | D1 | 3B | C2 | 76 | 02 |
| 038D0 | 8B | C2 | 89 | 0F | 2B | D0 | 01 | 17 | 56 | 06 | 8E | 46 | B4 | C5 | 7E | B2 |
| 038E0 | 2B | F9 | 8B | F7 | 2B | F0 | 8B | CA | FD | F3 | A4 | 8B | C8 | B0 | 20 | F3 |
| 038F0 | AA | 07 | 5E | C3 | 56 | 06 | C5 | 5E | 94 | 8B | 07 | 48 | C5 | 5E | B8 | 88 |
| 03900 | 0F | 8B | D1 | 03 | D0 | C5 | 5E | A6 | 2B | 17 | 77 | 2C | 4A | C5 | 5E | A0 |
| 03910 | 2B | D8 | 8B | C1 | 8B | F3 | 4B | C4 | 7E | B2 | FD | F3 | A6 | 75 | 12 | 8B |
| 03920 | 46 | A0 | 2B | C3 | 83 | ED | 24 | 36 | 8E | 1E | 0E | 00 | 07 | 5E | E9 | 1B |
| 03930 | E9 | 42 | 74 | 04 | 8B | C8 | EB | DC | 2B | C0 | EB | E8 | B8 | 0F | 00 | 1F |

| | | | | | | | | | | | | | | | | |
|---|---|---|---|---|---|---|---|---|---|---|---|---|---|---|---|---|
| 03940 | E9 | 81 | 07 | B8 | 1D | 00 | 1F | E9 | 7A | 07 | 1E | C5 | 5E | A6 | 8B | 0F |
| 03950 | E3 | EA | C5 | 5E | B8 | 8B | 17 | D1 | EA | 76 | E8 | 89 | 56 | B6 | 06 | 56 |
| 03960 | C5 | 76 | A0 | FD | 2B | DB | 8E | 46 | B4 | 8B | 56 | B6 | 8B | 7E | B2 | AC |
| 03970 | AE | 72 | 08 | AE | 77 | 06 | 43 | E2 | F0 | EB | 04 | 4F | 4A | 75 | F1 | 8B |
| 03980 | C3 | 83 | ED | 12 | 5E | 07 | 1F | E9 | C2 | E8 | 00 | 00 | 00 | 00 | 00 | 00 |
| 03990 | BC | 0E | D6 | 0E | F7 | 0E | 03 | 0F | 0F | 0F | 14 | 0F | 20 | 0F | ED | 14 |
| 039A0 | 25 | 0F | 31 | 0F | B1 | 1E | 83 | 1E | 5D | 1E | 12 | 28 | FC | 27 | EA | 27 |
| 039B0 | 0D | 28 | F7 | 27 | E5 | 27 | D0 | 27 | 6E | 1E | A3 | 0A | 5E | 28 | 8D | 09 |
| 039C0 | CC | 09 | CC | 09 | CC | 09 | 8D | 09 | 54 | 02 | 54 | 02 | C4 | 0E | 54 | 02 |
| 039D0 | FE | 14 | 54 | 02 | C1 | 1E | B3 | 2D | B3 | 2D | B3 | 2D | DC | 26 | B3 | 2D |
| 039E0 | B3 | 2D | B3 | 2D | B3 | 2D | B3 | 2D | B3 | 2D | B3 | 2D | B3 | 2D | B3 | 2D |
| 039F0 | B3 | 2D | B3 | 2D | C6 | 05 | 87 | 09 | D7 | 29 | 1D | 2A | B2 | 29 | B2 | 29 |
| 03A00 | B8 | 29 | D0 | 29 | D7 | 10 | DD | 10 | 02 | 2A | FE | 29 | B3 | 2D | B3 | 2D |
| 03A10 | B3 | 2D | B3 | 2D | EB | 29 | B3 | 2D | B3 | 2D | B3 | 2D | B3 | 2D | B3 | 2D |
| 03A20 | B3 | 2D | B3 | 2D | B3 | 2D | B3 | 2D | B3 | 2D | B3 | 2D | B3 | 2D | B3 | 2D |
| 03A30 | BC | 0E | D6 | 0E | F7 | 0E | 03 | 0F | 0F | 0F | 14 | 0F | 20 | 0F | ED | 14 |
| 03A40 | 25 | 0F | 31 | 0F | B1 | 1E | 83 | 1E | 5D | 1E | 12 | 28 | FC | 27 | EA | 27 |
| 03A50 | 0D | 28 | F7 | 27 | E5 | 27 | D0 | 27 | 6E | 1E | A3 | 0A | B8 | 28 | 8D | 09 |
| 03A60 | CC | 09 | CC | 09 | CC | 09 | 8D | 09 | 54 | 02 | 54 | 02 | C4 | 0E | 54 | 02 |
| 03A70 | FE | 14 | 54 | 02 | C1 | 1E | B3 | 2D | B3 | 2D | B3 | 2D | 7C | 27 | B3 | 2D |
| 03A80 | B3 | 2D | B3 | 2D | B3 | 2D | B3 | 2D | B3 | 2D | B3 | 2D | B3 | 2D | B3 | 2D |
| 03A90 | B3 | 2D | B3 | 2D | C6 | 05 | 87 | 09 | D7 | 29 | 1D | 2A | B2 | 29 | B2 | 29 |
| 03AA0 | CA | 29 | D0 | 29 | D7 | 10 | DD | 10 | 02 | 2A | FE | 29 | B3 | 2D | B3 | 2D |
| 03AB0 | B3 | 2D | B3 | 2D | EB | 29 | B3 | 2D | B3 | 2D | B3 | 2D | B3 | 2D | B3 | 2D |
| 03AC0 | B3 | 2D | B3 | 2D | B3 | 2D | B3 | 2D | B3 | 2D | B3 | 2D | B3 | 2D | B3 | 2D |
| 03AD0 | BF | DC | 26 | 8B | D8 | 36 | 8B | 16 | 02 | 00 | 03 | 16 | E2 | 00 | 03 | 57 |
| 03AE0 | 02 | 2B | C0 | EB | 3A | BF | 7C | 27 | EB | 03 | BF | DC | 26 | 8B | D8 | 8B |
| 03AF0 | 57 | 06 | 8B | 47 | 02 | EB | 28 | BF | 7C | 27 | EB | 03 | BF | DC | 26 | 8B |
| 03B00 | D8 | 8C | D2 | 8B | 47 | 02 | 36 | 03 | 06 | 46 | 00 | EB | 12 | BF | 7C | 27 |
| 03B10 | EB | 03 | BF | DC | 26 | 36 | 8B | 16 | 02 | 00 | 8B | D8 | 8B | 47 | 02 | 83 |
| 03B20 | C5 | 12 | 89 | 66 | BE | 89 | 7E | BC | 89 | 46 | B8 | 8B | 5F | 04 | 89 | 56 |
| 03B30 | BA | 8B | 0F | 89 | 4E | B6 | 8B | 47 | 02 | 89 | 46 | C0 | 03 | 5F | 04 | 89 |
| 03B40 | 5E | B2 | 8C | 5E | B4 | A1 | E8 | 00 | 89 | 46 | B0 | E9 | 06 | DA | 54 | 02 |
| 03B50 | 2F | 29 | 44 | 29 | 59 | 29 | 89 | 29 | DA | 28 | E1 | 28 | 77 | 29 | 2B | 06 |
| 03B60 | EA | 00 | 83 | 6E | B2 | 08 | C5 | 5E | B2 | 3B | 47 | 02 | 73 | 1C | FE | 4E |
| 03B70 | C0 | 8B | 4F | 04 | F7 | E1 | 89 | 4E | B6 | 01 | 46 | B8 | 8B | C3 | 8B | 1F |
| 03B80 | 36 | 8E | 1E | 0E | 00 | 2E | FF | A7 | 0E | 27 | B8 | 0B | 00 | E9 | 34 | 05 |
| 03B90 | 08 | 00 | 58 | 2B | 06 | EA | 00 | 83 | ED | 12 | 8A | 56 | C0 | 2A | F6 | 3B |
| 03BA0 | C2 | 73 | E7 | 2E | F7 | 26 | 90 | 28 | C5 | 5E | B2 | 2B | D8 | 8B | 47 | FA |
| 03BB0 | 36 | 8E | 1E | 0E | 00 | E9 | 94 | E6 | 8A | 56 | C0 | 2A | F6 | 3B | C2 | 73 |
| 03BC0 | C9 | 2B | C2 | D1 | E0 | D1 | E0 | D1 | E0 | C5 | 5E | B2 | 03 | D8 | 8B | C3 |
| 03BD0 | 8B | 1F | 36 | 8E | 1E | 0E | 00 | 2E | FF | 27 | 8B | D8 | B9 | 7C | 27 | EB |
| 03BE0 | 1D | 8B | D8 | B9 | DC | 26 | EB | 16 | B9 | 7C | 27 | EB | 03 | B9 | DC | 26 |
| 03BF0 | 8B | D8 | 8B | 47 | 02 | 01 | 46 | B8 | 8B | 47 | 04 | 89 | 46 | B6 | 89 | 4E |
| 03C00 | BC | 8B | 7F | 06 | 8B | 45 | 02 | 89 | 46 | C0 | 03 | 7D | 04 | 89 | 7E | B2 |
| 03C10 | 8C | 5E | B4 | 8B | F9 | E9 | 3C | D9 | 8B | D8 | 8B | 4F | 04 | 89 | 4E | B6 |
| 03C20 | 8B | D8 | 8B | 47 | 02 | 01 | 46 | B8 | 8B | 1F | 2E | FF | A7 | 0E | 27 | BF |
| 03C30 | 4C | 0C | 89 | 7E | BC | 36 | F6 | 06 | 4A | 00 | 80 | 75 | 31 | 8B | 5E | AA |
| 03C40 | 2E | FF | 67 | EC | BF | EC | 0C | 89 | 7E | BC | 36 | F6 | 06 | 4A | 00 | 80 |
| 03C50 | 75 | 1C | 8B | 5E | AA | 2E | FF | 67 | EE | BF | 7C | 12 | 89 | 7E | BC | 36 |
| 03C60 | F6 | 06 | 4A | 00 | 80 | 75 | 07 | 8B | 5E | AA | 2E | FF | 67 | F2 | 36 | 80 |
| 03C70 | 26 | 4A | 00 | 7F | E9 | DD | D8 | C5 | 5E | B8 | 83 | C3 | 10 | 8B | 66 | BE |
| 03C80 | 83 | ED | 12 | 8B | 7E | BC | E9 | E1 | E0 | 8B | 46 | B8 | 03 | 46 | B6 | 48 |
| 03C90 | 89 | 46 | B2 | 8B | 46 | BA | 89 | 46 | B4 | 83 | 6E | B6 | 02 | BF | 3C | 1D |
| 03CA0 | 89 | 7E | BC | 36 | F6 | 06 | 4A | 00 | 80 | 75 | C3 | 8B | 5E | AA | 2E | FF |
| 03CB0 | 67 | F6 | 8B | 46 | B6 | E9 | 94 | E5 | 8A | 46 | C1 | A8 | 08 | 74 | 04 | 24 |
| 03CC0 | 07 | 04 | 0A | 2A | E4 | 04 | 0A | E9 | 82 | E5 | B8 | 04 | 00 | E9 | 7C | E5 |
| 03CD0 | 8A | 46 | C0 | 98 | E9 | 75 | E5 | 8C | C3 | C4 | 7E | B8 | 8B | 4E | B6 | E3 |
| 03CE0 | 05 | 2A | C0 | FC | F3 | AA | 8E | C3 | E9 | 5B | D8 | 8B | 4E | B2 | 3B | 4E |
| 03CF0 | A0 | 75 | 03 | E9 | B6 | E6 | 2B | C0 | 83 | ED | 12 | E9 | 4E | E5 | 2B | C0 |
| 03D00 | EB | 03 | B8 | FF | FF | 8B | 4E | B6 | 56 | 1E | 06 | C5 | 76 | B8 | C4 | 7E |
| 03D10 | A6 | FC | F3 | A6 | 07 | 1F | 5E | 74 | DF | F7 | D0 | EB | DB | 56 | 1E | 06 |
| 03D20 | C5 | 76 | B8 | 8B | 4E | B6 | 83 | ED | 12 | E3 | 06 | C4 | 7E | B8 | FC | F3 |
| 03D30 | A4 | 07 | 1F | 5E | E9 | 0F | D8 | 00 | 00 | 00 | 00 | 00 | 00 | 00 | 00 | 00 |
| 03D40 | 83 | C5 | 12 | 89 | 66 | BE | BF | DC | 26 | 89 | 7E | BC | 46 | 46 | 26 | 8B |

| | | | | | | | | | | | | | | | | |
|---|---|---|---|---|---|---|---|---|---|---|---|---|---|---|---|---|
| 03D50 | 1C | 89 | 5E | B8 | 8C | 5E | BA | 36 | 8B | 0E | 02 | 00 | 89 | 4E | B6 | E9 |
| 03D60 | F2 | D7 | B8 | 18 | 00 | E9 | 5C | 03 | 36 | FF | 36 | 5E | 00 | 36 | FF | 36 |
| 03D70 | 44 | 00 | 36 | FF | 36 | 64 | 00 | 36 | FF | 36 | 48 | 00 | 36 | FF | 36 | 46 |
| 03D80 | 00 | 36 | FF | 36 | 4A | 00 | 56 | 06 | 36 | FF | 36 | 0E | 00 | 36 | FF | 36 |
| 03D90 | 02 | 00 | 36 | 8C | 1E | 0E | 00 | 36 | A3 | 02 | 00 | EB | 28 | 8B | D8 | 36 |
| 03DA0 | FF | 36 | 5E | 00 | 36 | FF | 36 | 44 | 00 | 36 | FF | 36 | 64 | 00 | 36 | FF |
| 03DB0 | 36 | 48 | 00 | 36 | FF | 36 | 46 | 00 | 36 | FF | 36 | 4A | 00 | 56 | 06 | 1E |
| 03DC0 | 36 | FF | 36 | 02 | 00 | 36 | FF | 36 | 4C | 00 | 83 | C5 | 12 | 8B | C4 | 2B |
| 03DD0 | 47 | 06 | 72 | 8E | 55 | 81 | C5 | 00 | 01 | 3B | E8 | 5D | 73 | 84 | 89 | 66 |
| 03DE0 | B0 | 8B | E0 | 89 | 66 | BE | 36 | 89 | 26 | 46 | 00 | 36 | A1 | 5E | 00 | 89 |
| 03DF0 | 46 | BA | BF | 7C | 08 | 89 | 7E | BC | 36 | A1 | 42 | 00 | 89 | 46 | B4 | 36 |
| 03E00 | 89 | 2E | 42 | 00 | 36 | 89 | 2E | 48 | 00 | 89 | 5E | B2 | 8B | 77 | 02 | 8C |
| 03E10 | D8 | 03 | 47 | 04 | 8E | C0 | 36 | 8C | 06 | 14 | 00 | 2B | DB | 36 | 81 | 26 |
| 03E20 | 4A | 00 | 7F | 00 | 89 | 5E | C0 | 26 | 8B | 07 | 36 | A3 | 4C | 00 | E9 | 23 |
| 03E30 | D7 | 8B | D8 | 36 | FF | 36 | 5E | 00 | 36 | FF | 36 | 44 | 00 | 36 | FF | 36 |
| 03E40 | 64 | 00 | 36 | FF | 36 | 48 | 00 | 36 | FF | 36 | 46 | 00 | 36 | FF | 36 | 4A |
| 03E50 | 00 | 56 | 06 | 1E | 36 | FF | 36 | 02 | 00 | 8B | 77 | 04 | 8B | 5F | 02 | 36 |
| 03E60 | 8E | 1E | 54 | 00 | 8E | 1E | 02 | 00 | 8B | 44 | 02 | 8B | 14 | 83 | EA | 0E |
| 03E70 | 8E | DA | 81 | 3F | 50 | 01 | 75 | 13 | 36 | A3 | 02 | 00 | 36 | 8C | 1E | 0E |
| 03E80 | 00 | A1 | E8 | 00 | 36 | A3 | 64 | 00 | E9 | 3A | FF | B8 | 22 | 00 | E9 | 33 |
| 03E90 | 02 | 36 | 8B | 2E | 48 | 00 | 8B | 66 | B0 | 8B | 5E | B2 | 8A | 57 | 08 | 36 |
| 03EA0 | 8F | 06 | 4C | 00 | 36 | 8F | 06 | 02 | 00 | 1F | 07 | 36 | 8C | 06 | 14 | 00 |
| 03EB0 | 36 | 8C | 1E | 0E | 00 | 8B | 6E | B4 | 36 | 89 | 2E | 42 | 00 | BF | 7C | 08 |
| 03EC0 | 5E | 36 | 8F | 06 | 4A | 00 | 36 | 8F | 06 | 46 | 00 | 36 | 8F | 06 | 48 | 00 |
| 03ED0 | 36 | 8F | 06 | 64 | 00 | 36 | 8F | 06 | 44 | 00 | 59 | 36 | FF | 1E | 0A | 03 |
| 03EE0 | F6 | C2 | 04 | 75 | 06 | 8B | 66 | BE | E9 | 8B | D6 | E9 | 30 | D7 | 36 | 81 |
| 03EF0 | 3E | 44 | 00 | 64 | 03 | 75 | 03 | E9 | 77 | D8 | B8 | 14 | 00 | E9 | C4 | 01 |
| 03F00 | 58 | 83 | ED | 12 | 8B | 7E | BC | 2E | FF | 65 | 02 | 91 | 2B | 3E | 2C | 8C |
| 03F10 | 2C | C6 | 2C | 2B | D2 | 36 | 89 | 16 | 52 | 00 | 36 | 8B | 1E | 48 | 00 | 23 |
| 03F20 | DB | 74 | C5 | 36 | 8B | 5F | B2 | 8B | 5F | 08 | 81 | E3 | 03 | 00 | D1 | E3 |
| 03F30 | 2B | C0 | 2B | C9 | 2E | FF | A7 | 0B | 2C | 36 | A3 | 52 | 00 | 58 | BA | 4C |
| 03F40 | 0F | 36 | 8B | 2E | 48 | 00 | 8B | 66 | B0 | 36 | 8F | 06 | 4C | 00 | 36 | 8F |
| 03F50 | 06 | 02 | 00 | 1F | 07 | 36 | 8C | 06 | 14 | 00 | 36 | 8C | 1E | 0E | 00 | 8B |
| 03F60 | 6E | B4 | 8B | 5E | B4 | 36 | 89 | 1E | 42 | 00 | 5E | 36 | 8F | 06 | 4A | 00 |
| 03F70 | 36 | 8F | 06 | 46 | 00 | 36 | 8F | 06 | 48 | 00 | 36 | 8F | 06 | 64 | 00 | 36 |
| 03F80 | 8F | 06 | 44 | 00 | 59 | 36 | FF | 1E | 0A | 03 | FF | E2 | 36 | 8B | 2E | 48 |
| 03F90 | 00 | 8B | 6E | B0 | 8B | 4E | 14 | 36 | FF | 1E | 0A | 03 | 9C | 36 | FF | 1E |
| 03FA0 | 02 | 03 | 7F | 12 | EB | 04 | 36 | A3 | 52 | 00 | 36 | 8B | 2E | 48 | 00 | 8B |
| 03FB0 | 6E | B0 | 36 | 8B | 0E | 5E | 00 | 89 | 4E | 14 | BA | 97 | 19 | EB | 82 | 36 |
| 03FC0 | A3 | 52 | 00 | 8B | 4E | B6 | 36 | 8B | 1E | 48 | 00 | 36 | 8B | 6F | B0 | 8B |
| 03FD0 | 46 | 00 | 36 | A3 | 4C | 00 | 8B | 46 | 02 | 36 | A3 | 02 | 00 | 8E | 5E | 04 |
| 03FE0 | 8E | 46 | 06 | 8B | 56 | 08 | 8B | 46 | 0A | 36 | A3 | 4A | 00 | 8B | 46 | 0C |
| 03FF0 | 36 | A3 | 46 | 00 | 8B | 46 | 0E | 36 | A3 | 48 | 00 | 8B | 46 | 10 | 36 | A3 |
| 04000 | 64 | 00 | 8B | 46 | 12 | 36 | A3 | 44 | 00 | 8B | C1 | 8B | 4E | 14 | 36 | FF |
| 04010 | 1E | 0A | 03 | 8B | C8 | 36 | 8C | 06 | 14 | 00 | 36 | 8C | 1E | 0E | 00 | 36 |
| 04020 | 8B | 6F | B4 | 8B | 46 | B4 | 36 | A3 | 42 | 00 | 8B | 7E | BE | E3 | 12 | 8B |
| 04030 | F4 | 03 | F1 | 8B | D9 | 4E | 4F | 36 | 8A | 04 | 36 | 88 | 05 | E2 | F6 | 8B |
| 04040 | CB | 8B | E7 | 8B | F2 | E9 | B2 | F7 | 36 | 8B | 1E | 42 | 00 | 36 | F6 | 47 |
| 04050 | B2 | 01 | 74 | 04 | 36 | 8B | 5F | B4 | 36 | C7 | 47 | C0 | 00 | 00 | E9 | F3 |
| 04060 | D4 | 8B | C6 | 40 | 40 | 36 | 8B | 1E | 42 | 00 | 36 | 89 | 47 | C0 | 26 | 03 |
| 04070 | 74 | 02 | E9 | E0 | D4 | 8B | D8 | 56 | 06 | 1E | 0E | B8 | 96 | 2D | 50 | 8C |
| 04080 | DA | 03 | 16 | EC | 00 | 52 | FF | 77 | 02 | 8E | DA | 8E | C2 | 36 | 8B | 1E |
| 04090 | 42 | 00 | 83 | C3 | 12 | CB | 1F | 07 | 5E | 36 | 8B | 2E | 42 | 00 | 8B | 66 |
| 040A0 | BE | 9C | 8B | 4E | BA | 36 | FF | 1E | 0A | 03 | 9D | BF | 7C | 08 | 72 | 14 |
| 040B0 | E9 | A1 | D4 | B8 | E7 | 03 | EB | 0C | 58 | 36 | 8B | 2E | 42 | 00 | 8B | 66 |
| 040C0 | BE | BF | 7C | 08 | 2B | C9 | 36 | 87 | 0E | 3E | 00 | E3 | 02 | 8B | F1 | 36 |
| 040D0 | 8E | 1E | 0E | 00 | 36 | 8C | 1E | 38 | 00 | 36 | 89 | 36 | 36 | 00 | 36 | 8B |
| 040E0 | 1E | 48 | 00 | 23 | DB | 74 | 04 | 36 | 8B | 5F | B2 | 36 | 89 | 1E | 3A | 00 |
| 040F0 | 36 | A3 | 3C | 00 | 8B | D0 | 36 | 8E | 1E | 0E | 00 | 36 | 8E | 06 | 14 | 00 |
| 04100 | 8B | C6 | 36 | 8B | 1E | 42 | 00 | 36 | 8B | 4F | C0 | E3 | 50 | 8B | F1 | 26 |
| 04110 | 83 | 7C | 02 | 54 | 74 | 54 | 52 | 50 | 36 | FF | 36 | 44 | 00 | B8 | 03 | 00 |
| 04120 | EB | 03 | B8 | 01 | 00 | 83 | C5 | 12 | 3B | EC | 73 | 28 | 89 | 66 | BE | BF |
| 04130 | 7C | 08 | 89 | 7E | BC | 89 | 46 | B2 | C7 | 46 | C0 | 00 | 00 | 36 | A1 | 42 |
| 04140 | 00 | 89 | 46 | B4 | 36 | 89 | 2E | 42 | 00 | 36 | 8B | 0E | 5E | 00 | 89 | 4E |
| 04150 | BA | E9 | 00 | D4 | E9 | 0B | FC | 8B | 4E | BA | EB | 3A | 90 | 36 | 83 | 7F |

```
04160    B2 03 75 3A BA 26 00 EB 56 90 36 8B 2E 42 00 8B
04170    66 BE 8B 4E BA 36 FF 1E 0A 03 BF 7C 08 36 8B 1E
04180    48 00 23 DB 74 D1 36 8B 5F B0 36 8B 47 12 36 8B
04190    4F 14 36 A3 44 00 36 FF 1E 0A 03 E9 B6 D3 36 8B
041A0    2E 42 00 8B 46 B8 8B 7E B2 8B CF E3 12 83 F9 03
041B0    76 12 F7 45 08 04 00 75 03 E9 59 FD B9 01 00 8B
041C0    C2 E9 B3 D5 8B 6E B4 8B DD 36 89 1E 42 00 E9 36
041D0    FF B8 29 00 E9 ED FE BB 02 00 81 FF 7C 08 74 02
041E0    F7 DB 36 8B 2E 42 00 83 7E B2 03 75 E4 8B 66 BE
041F0    8B 46 B4 36 A3 42 00 83 ED 12 36 8F 06 44 00 5E
04200    5A 8B 7E BC 22 FF 78 04 22 F6 78 8F 36 8B 2E 42
04210    00 8B 66 BE 8B 7E BC 8B 4E BA 36 FF 1E 0A 03 26
04220    81 3C FC 00 74 04 03 F3 EB F5 E9 D2 D3 00 00 00
04230    D8 33 08 34 EE 2F 30 30 54 31 B5 31 13 32 9B 32
04240    35 32 FE 32 DD 32 C9 30 01 31 3A 31 61 33 8E 33
04250    B4 33 00 00 06 51 2B F6 BD 92 02 2E 8B 8C 30 2F
04260    E3 0E 89 4E 00 8C 4E 02 83 C6 02 83 C5 04 EB EB
04270    59 8E C0 36 A3 54 00 05 0E 00 50 26 A3 02 00 26
04280    C7 06 00 00 20 00 05 08 00 26 A3 06 00 03 C1 2B
04290    D9 83 EB 0E 83 EB 08 D1 E1 26 89 0E 04 00 07 D1
042A0    E1 D1 E1 83 C1 40 50 2B C0 8B F8 FC F3 AB 58 8F
042B0    80 00 26 89 05 26 89 45 02 03 C3 26 89 45 04 2B
042C0    C0 26 89 45 06 07 CB 08 00 58 1E 53 51 52 56 57
042D0    55 8B EC 81 66 14 FF F7 FA FF E0 8B E5 89 46 0E
042E0    81 4E 14 00 08 5D 5F 5E 5A 59 5B 1F 58 CF 53 06
042F0    36 8E 06 54 00 26 8E 06 06 00 26 A1 02 00 26 8B
04300    0E 04 00 2B C8 07 5B CF E8 71 01 8B 46 0E 26 FF
04310    77 04 26 8B 5F 06 3B C3 77 11 F7 C3 01 00 74 01
04320    43 2B D8 D1 E3 D1 E3 D1 E3 07 C3 B8 04 00 EB AB
04330    50 E8 95 FF 36 8E 06 54 00 26 C4 0E 04 00 49 BB
04340    08 00 26 83 7F 02 00 74 0A 83 C3 08 E2 F4 B8 05
04350    00 EB 88 8B 4E 08 26 A1 04 00 26 2B 06 02 00 3B
04360    C8 77 5D 26 A1 02 00 26 01 0E 02 00 26 FF 06 06
04370    00 26 89 07 26 89 47 02 8B D1 03 C8 26 89 4F 04
04380    26 C7 47 06 00 00 D1 EB D1 EB D1 EB 89 5E 06 8E
04390    C0 8B D8 2B C0 2B FF FC F7 C2 00 F0 74 13 B9 00
043A0    80 F3 AB 81 EA 00 10 8C C1 81 C1 00 10 8E C1 EB
043B0    E7 8B CA D1 E1 D1 E1 D1 E1 F3 AB 8E C3 E9 25 FF
043C0    89 46 08 B8 01 00 E9 12 FF 50 E8 FC FE E8 AC 00
043D0    26 83 7F 08 00 75 24 26 8B 0F 26 89 0E 02 00 26
043E0    FF 0E 06 00 2B C0 26 89 07 26 89 47 02 26 89 47
043F0    04 26 89 47 06 FF 4E 06 E9 EA FE B8 06 00 E9 DA
04400    FE 50 E8 C4 FE E8 74 00 26 8B 4F 06 B8 01 00 23
04410    C1 03 C8 D1 E1 D1 E1 D1 E1 26 8B 47 02 26 8B 57
04420    04 26 89 47 04 8E DA 2B D0 26 29 16 02 00 8E C0
04430    2B F6 2B FF FC F3 A4 E9 AB FE 50 E8 8B FE E8 3B
04440    00 2B C0 26 87 47 06 D1 E8 15 00 00 26 29 06 02
04450    00 E9 91 FE 50 E8 71 FE E8 21 00 26 8B 0F E3 40
04460    26 8B 57 06 89 56 08 26 8B 57 02 89 56 0A 26 8B
04470    47 04 2B C2 89 46 0E 8E C1 E9 69 FE 36 8E 06 54
04480    00 26 C4 1E 04 00 3B D3 77 0F 8B DA D1 E3 D1 E3
04490    D1 E3 26 83 3F 00 74 01 C3 58 B8 02 00 E9 3B FE
044A0    B8 03 00 E9 35 FE 26 F7 47 06 01 00 75 04 26 FF
044B0    47 04 E9 0B FF 50 E8 10 FE E8 C0 FF 2B FF 26 F7
044C0    47 06 01 00 75 07 BF 08 00 26 FF 4F 04 8B 4E 08
044D0    26 8B 47 04 26 2B 47 02 72 CC 3B C8 77 C8 26 FF
044E0    47 06 26 8B 57 06 89 56 0E 26 8B 47 02 26 01 4F
044F0    02 26 8E 47 04 26 89 05 D1 E1 D1 E1 D1 E1 D1 E1
04500    26 89 4D 04 26 C7 45 02 00 00 26 89 55 06 8E C0
04510    E9 D2 FD 50 E8 B2 FD E8 EE FD 26 8B 4F 02 26 8B
04520    47 04 89 4E 0A 89 46 08 26 8E 07 E9 B7 FD 26 8B
04530    47 04 E9 88 FE 50 E8 90 FD E8 40 FF 8B D1 26 8B
04540    4F 04 26 2B 4F 02 3B D1 77 E4 26 01 57 02 26 8B
04550    47 06 E8 B9 FD 8B 46 0E 26 3B 47 06 74 21 26 8B
04560    4F 02 26 8E 1F 8C D8 03 C2 26 89 07 E3 0C 06 8E
```

```
04570   C0 8B F1 4E 8B FE FD F3 A4 07 83 C3 08 EB D6 B1
04580   04 D3 E2 26 01 57 04 26 8B 47 02 89 46 0A 26 8B
04590   47 04 89 46 08 26 8E 07 E9 4A FD 50 E8 2A FD E8
045A0   66 FD 8B 4E 08 8B C1 26 2B 4F 02 74 2A 72 20 26
045B0   3B 4F 04 76 1A 26 2B 4F 04 D1 E9 D1 E9 D1 E9 D1
045C0   E9 41 8B 46 0E 9C 36 FF 1E B2 02 70 2E EB D0 26
045D0   29 4F 04 26 89 47 02 26 8E 07 E9 08 FD 50 E8 E8
045E0   FC E8 24 FD 26 8B 7F 02 03 CF 8B 46 0E 9C 36 FF
045F0   1E AE 02 70 06 FC F3 A4 E9 EA FC E9 DD FC 50 E8
04600   C7 FC E8 77 FE 53 06 26 FF 77 06 B8 01 00 E8 FD
04610   FC 5A 2B C9 51 FC 26 8B 47 04 26 81 67 04 0F 00
04620   B1 04 D3 E8 59 03 C1 26 39 57 06 73 1D 50 83 EB
04630   08 26 8E 1F 26 29 07 26 8B 4F 02 E3 D9 06 26 8E
04640   07 2B F6 8B FE F3 A4 07 EB CC 07 5B 26 29 47 02
04650   26 8B 47 04 26 2B 47 02 89 46 08 26 8E 07 E9 84
04660   FC 57 06 36 8E 06 54 00 26 C4 16 00 00 2B FF 26
04670   83 3D 00 74 09 83 C7 04 4A 75 F4 07 5F CF 26 89
04680   05 26 89 5D 02 8B D7 D1 EA D1 EA 42 EB ED 57 06
04690   36 8E 06 54 00 26 C4 06 00 00 8B FA 4F 3B F8 73
046A0   0D D1 E7 D1 E7 26 8B 05 26 8B 5D 02 EB CD 2B C0
046B0   2B DB EB C7 57 06 36 8E 06 54 00 26 C4 06 00 00
046C0   8B FA 4F 3B F8 73 B4 D1 E7 D1 E7 26 C7 05 00 00
046D0   26 C7 45 02 00 00 EB A3 55 53 51 52 56 57 36 FF
046E0   36 5C 00 36 FF 36 64 00 8B EC 36 89 2E 5C 00 FF
046F0   76 12 FF 76 10 89 46 14 8C 5E 12 8C 46 10 81 66
04700   1A FF F7 FF 76 1A 9D CB 36 8B 2E 5C 00 8B E5 36
04710   8F 06 64 00 36 8F 06 5C 00 5F 5E 5A 59 5B 5D 07
04720   1F 58 CF 00 00 00 00 00 00 00 00 00 00 00 00 00
04730   E3 5E B8 AD 01 36 A3 AE 01 36 89 26 B0 01 9C 36
04740   FF 1E DA 02 36 C7 06 90 02 01 00 2B D2 42 9C 36
04750   FF 1E CE 02 23 C0 74 38 8E C0 26 83 3E 00 00 02
04760   76 EB 26 8B 0E 06 00 E3 E4 52 03 C8 2D 0E 00 36
04770   A3 0E 00 36 89 0E 14 00 36 89 1E 02 00 B8 FF FF
04780   2E FF 1E 5E 01 B8 02 00 2E FF 1E 5E 01 5A EB BD
04790   B4 03 2B DB 9C 36 FF 1E E2 02 36 8E 06 54 00 26
047A0   8B 0E 00 00 41 51 9C 36 FF 1E DE 02 59 E2 F6 9C
047B0   36 FF 1E 16 03 F4 00 00 00 00 00 00 00 00 00 00
047C0   5A 41 5A 41 5A 41 5A 41 5A 41 5A 41 5A 41 5A 41
047D0   5A 41 5A 41 5A 41 5A 41 5A 41 5A 41 5A 41 5A 41
047E0   5A 41 5A 41 5A 41 5A 41 5A 41 5A 41 5A 41 5A 41
047F0   5A 41 5A 41 5A 41 5A 41 5A 41 5A 41 00 00 00 00
04800   FA 01 00 00 00 00 F9 01 06 00 00 00 11 00 00 00
04810   00 00 00 00 4D 41 54 48 00 00 00 00 00 00 00 00
04820   6D 61 74 68 2E 62 69 6E 00 00 00 00 00 00 00 00
04830   0D 52 45 41 4C 49 4E 49 54 00 00 0E 00 00 54 01
04840   28 00 00 00 16 01 16 01 99 01 20 00 67 00 00 00
04850   E3 06 36 89 0E 5E 00 CB 56 06 51 53 50 2B DB 36
04860   89 1E 66 00 36 89 1E 68 00 36 89 1E 6C 00 2B F6
04870   BB FE 02 2E 8B 8C 14 00 E3 0F 36 89 0F 36 8C 4F
04880   02 83 C6 02 83 C3 04 E8 EA 36 A1 60 00 36 A3 5E
04890   00 58 59 5B 07 5E CB 36 A3 68 00 36 89 16 6A 00
048A0   36 89 1E 6C 00 CF D2 00 58 55 2E FF 36 76 00 36
048B0   FF 36 64 00 36 FF 36 5C 00 53 51 52 56 57 1E 06
048C0   8C D5 8E C5 8E DD 8B EC 36 89 2E 5C 00 81 66 1C
048D0   FF F7 FF 76 1C 9D FF E0 36 8B 2E 5C 00 8B E5 2B
048E0   C9 36 87 0E 66 00 E3 08 89 4E 16 81 4E 1C 00 08
048F0   07 1F 5F 5E 5A 59 5B 36 8F 06 5C 00 36 8F 06 64
04900   00 C3 5D 58 CF FF 76 1C 9D 5D 58 CA 06 00 F7 01
04910   5C 03 B2 0C 57 06 16 03 72 01 CC 03 7E 01 82 01
04920   00 0C 51 0C 25 06 86 01 F0 0B 44 03 23 04 EB 09
04930   A0 05 B8 19 09 1A 5A 1A DF 1B 56 18 87 17 1F 1D
04940   FE 1D FC 0B 4D 0C 50 E8 5E FF C4 5E 18 83 46 18
04950   02 26 8B 07 50 8A DC B4 7F 22 C4 3A C4 74 38 B4
04960   14 F6 E4 8B 36 5E 00 03 F0 3B 36 62 00 72 19 B7
04970   00 8C D0 8E C0 2E FF 97 DE 00 59 F6 C1 80 74 05
```

04980 83 06 5E 00 14 E9 50 FF A1 60 00 A3 5E 00 C7 06
04990 66 00 21 00 E9 41 FF 83 2E 5E 00 14 8B 36 5E 00
049A0 EB C7 83 2E 5E 00 14 8B 3E 5E 00 E9 62 00 80 24
049B0 7F C3 80 34 80 C3 89 36 5E 00 C3 2B 04 EB 04 F3
049C0 09 D8 0A E0 01 E7 01 A8 05 50 E8 DB FE C4 5E 18
049D0 26 8B 0F 51 83 46 18 03 8A C1 B4 14 F6 E4 8B 3E
049E0 5E 00 8B F7 03 F8 8A C5 24 7F B4 14 F6 E4 03 F0
049F0 26 8A 5F 02 B7 00 8C D8 8E C0 2E FF 97 8B 01 59
04A00 F6 C5 80 74 05 83 06 5E 00 14 E9 CB FE 00 00 00
04A10 FC B9 14 00 F3 A4 C3 FC B9 14 00 8B DF 8B FE AC
04A20 86 07 AA 43 E2 F9 C3 C7 46 12 D5 00 1E 8B DE 8D
04A30 7C 04 C5 76 1E BA 14 00 83 EA 04 FC AC 8A C8 24
04A40 80 81 E1 7F 00 74 36 80 F9 0F 77 25 36 88 07 AC
04A50 98 36 89 47 01 49 74 19 2B D1 AC 3C 63 77 12 AA
04A60 E2 F8 2A C0 8B CA F3 AA 1F 8B F3 88 44 03 E9 93
04A70 00 1F C7 06 66 00 19 00 8B F3 EB 04 90 1F 8B F3
04A80 8B FE B9 14 00 FC 2A C0 F3 AA C7 44 01 00 F0 C3
04A90 81 7C 01 00 F0 74 E9 8B DE 8D 7C 03 80 3D 00 74
04AA0 6D FD FF 47 01 8B 0E 64 00 03 F9 8B F7 4E 80 3D
04AB0 32 72 17 56 57 4F B4 64 2A F6 F9 AC 12 C6 3A C4
04AC0 72 02 2A C4 AA F5 72 F3 5F 5E F3 A4 C6 05 00 8B
04AD0 F3 8B 44 01 3D 81 FF 7E 18 3D 7F 00 7F 1B 8D 7C
04AE0 04 A1 64 00 03 F8 B9 10 00 2B C8 2A C0 FC F3 AA
04AF0 C3 C7 06 66 00 04 00 EB 87 8B FE C7 06 66 00 03
04B00 00 E9 E4 07 81 7C 01 00 F0 74 C6 8D 7C 03 80 7D
04B10 01 00 75 BD 47 8B DE B9 14 00 83 E9 05 8B D1 2B
04B20 C0 FC 8B F7 47 F3 AE 74 14 4F 2B D1 41 29 7F 01
04B30 01 77 01 87 F7 F3 A4 8B CA F3 AA EB 92 88 07 C7
04B40 47 01 00 F0 EB 89 56 8D 74 03 03 36 64 00 2B C0
04B50 87 44 FF 3C 32 7D 04 5E E9 35 FF 4E 4E 8B FE B4
04B60 64 FD F9 AC 14 00 3A C4 72 02 2A C4 AA F5 72 F3
04B70 5E E9 1C FF 8D 5C 03 03 1E 64 00 C7 44 FF 00 00
04B80 E9 0D FF 1E C5 5E 1E C6 07 00 1F C3 C7 46 12 D5
04B90 00 A1 64 00 8B 4E 0A E3 05 3B C8 76 03 40 88 C8
04BA0 49 49 8B 5C 01 81 FB 00 F0 74 D8 8A 04 22 C0 74
04BB0 02 B0 80 8D 7C 03 8B F7 03 F1 80 7C 01 32 72 20
04BC0 56 50 FD B4 64 F9 AC 14 00 3A C4 72 02 2A C4 F5
04BD0 88 44 01 72 F1 58 5E 80 3D 00 74 04 FE C3 4E 4F
04BE0 80 3C 00 75 03 4E E2 F8 06 8B F7 46 C4 7E 1E 02
04BF0 C1 FE C0 FC AA 8A C3 AA F3 A4 07 C3 81 66 1C 7E
04C00 FF F6 04 80 74 05 81 4E 1C 80 00 8B 44 01 3D 00
04C10 F0 74 22 3D 00 00 7E 27 8B 0E 64 00 3B C1 7D 15
04C20 8D 7C 04 03 F8 2B C8 FC 2B C0 26 80 3D 00 74 02
04C30 FE C4 AA E2 F5 22 E4 74 05 81 4E 1C 01 00 C3 81
04C40 4E 1C 01 00 E9 39 FE 00 00 00 00 00 00 00 00 00
04C50 E9 D4 00 8B FE 8E 5E 1A 8B 76 0C FD 57 2A D2 36
04C60 86 15 3A 14 75 EA 36 8B 0E 64 00 8B E9 8B 44 01
04C70 36 8B 5D 01 2B D8 78 38 3B D9 7D 20 2B CB 8D 7B
04C80 03 2B EB 8D 5A 03 8B F7 B4 64 F8 36 AC 12 07 3A
04C90 C4 72 02 2A C4 AA 4B F5 E2 F1 72 03 EB 53 90 36
04CA0 AC FE C0 3A C4 72 05 2A C4 AA EB F3 AA EB 42 90
04CB0 36 89 45 01 8D 7B 03 8D 72 03 F7 D3 3B D9 7D 2E
04CC0 2B CB 43 53 F7 DB 03 DF B4 64 F8 AC 36 12 07 3A
04CD0 C4 72 02 2A C4 AA 4B F5 E2 F1 59 73 12 AC FE C0
04CE0 3A C4 72 07 2A C4 AA E2 F4 EB 06 AA EB 01 41 F3
04CF0 A4 5E 8C D0 8E D8 30 14 36 8B 2E 5C 00 E9 90 FD
04D00 E9 63 FF 36 C7 45 01 00 F0 2A C0 36 88 05 83 C7
04D10 03 E9 14 00 83 E9 03 F3 AA EB D6 FD 57 2A D2 36
04D20 86 15 36 3A 14 75 D9 36 8B 0E 64 00 8B E9 8B 44
04D30 01 36 8B 5D 01 2B D8 78 4A 75 13 51 56 57 83 C6
04D40 04 83 C7 04 FC F3 A6 5F 5E 59 74 B7 77 35 3B D9
04D50 7D 2B 53 2B CB 8D 7B 03 2B EB 8D 5A 03 8B F7 B4
04D60 64 FD F8 36 AC 1A 07 79 02 02 C4 AA 4B E2 F4 59
04D70 73 0B 36 FE 0C 79 06 36 00 24 4E E2 F5 E9 71 FF
04D80 E9 6B FF 80 F2 80 36 89 45 01 8D 7B 03 8D 72 03

| | | | | | | | | | | | | | | | | |
|---|---|---|---|---|---|---|---|---|---|---|---|---|---|---|---|---|
| 04D90 | F7 | DB | 3B | D9 | 7D | EA | 2B | CB | 53 | F7 | DB | 03 | DF | B4 | 64 | FD |
| 04DA0 | F8 | AC | 36 | 1A | 07 | 79 | 02 | 02 | C4 | AA | 4B | E2 | F4 | 59 | 73 | 0E |
| 04DB0 | AC | FE | C8 | 79 | 08 | 02 | C4 | AA | E2 | F6 | E9 | 34 | FF | AA | F3 | A4 |
| 04DC0 | E9 | 2E | FF | 00 | 00 | 00 | 00 | 00 | 00 | 00 | 00 | 00 | 00 | 00 | 00 | 00 |
| 04DD0 | 8B | FE | 8E | 5E | 1A | 8B | 76 | 0C | FC | 8A | 66 | 1C | 80 | E4 | 3F | 36 |
| 04DE0 | F6 | 05 | 80 | 75 | 09 | F6 | 04 | 80 | 74 | 0E | 88 | 66 | 1C | C3 | F6 | 04 |
| 04DF0 | 80 | 75 | 20 | 80 | CC | 80 | EB | F2 | 36 | 8B | 4D | 01 | 8B | 5C | 01 | 81 |
| 04E00 | F9 | 00 | F0 | 74 | 1B | 81 | FB | 00 | F0 | 74 | DF | 2B | CB | 74 | 1A | 79 |
| 04E10 | D9 | EB | E0 | 36 | 8B | 4D | 01 | 2B | 4C | 01 | 74 | 23 | 79 | D5 | EB | CA |
| 04E20 | 3B | D9 | 75 | CF | 80 | CC | 40 | EB | C1 | 36 | 8B | 0E | 64 | 00 | 8D | 7D |
| 04E30 | 04 | 8D | 74 | 04 | F3 | A6 | 7F | BB | 7C | B0 | 80 | CC | 40 | EB | AB | 36 |
| 04E40 | 8B | 0E | 64 | 00 | 8D | 7D | 04 | 8D | 74 | 04 | F3 | A6 | 7F | 9C | 7C | A3 |
| 04E50 | 80 | CC | 40 | EB | 95 | 8A | 66 | 1C | 80 | E4 | 3F | F6 | 04 | 80 | 74 | 03 |
| 04E60 | 80 | CC | 80 | 81 | 7C | 01 | 00 | F0 | 75 | 03 | 80 | CC | 40 | 88 | 66 | 1C |
| 04E70 | C3 | 00 | 00 | 00 | 00 | 00 | 00 | 00 | 00 | 00 | 00 | 00 | 00 | 00 | 00 | 00 |
| 04E80 | 03 | 0A | 00 | 64 | 00 | E8 | 03 | C7 | 46 | 12 | D5 | 00 | 55 | 56 | FD | 8B |
| 04E90 | 3E | 5E | 00 | 4F | 2A | C0 | AA | 57 | AA | 8B | DE | 8D | 74 | 04 | 8B | 0E |
| 04EA0 | 64 | 00 | 49 | 2B | D2 | 8A | 04 | 3C | 0A | 73 | 04 | 46 | 49 | 42 | AA | 8A |
| 04EB0 | 04 | 46 | D4 | 0A | 86 | C4 | AA | 8A | C4 | AA | E2 | F3 | 23 | D2 | 74 | 07 |
| 04EC0 | 8A | 04 | D4 | 0A | 8A | C4 | AA | 4F | 8B | 47 | 01 | 3D | 00 | F0 | 74 | 05 |
| 04ED0 | D1 | E0 | 2B | C2 | 48 | 89 | 05 | 4F | 8A | 07 | 88 | 05 | 8B | DF | 5A | 8D |
| 04EE0 | 77 | 03 | 2B | C0 | 87 | 04 | 80 | FC | 05 | 72 | 21 | 46 | 46 | 8B | FE | FC |
| 04EF0 | F9 | AC | 14 | 00 | 37 | AA | 72 | F9 | 3B | FA | 76 | 10 | 8B | F3 | 46 | 8B |
| 04F00 | 47 | 01 | 40 | 89 | 44 | 01 | 8A | 07 | 88 | 04 | 8B | DE | FD | 8B | F3 | C4 |
| 04F10 | 7E | 1E | 8A | 0C | 8B | 54 | 01 | B0 | 20 | 22 | C9 | 79 | 02 | B0 | 2D | 8B |
| 04F20 | 1E | 6C | 00 | F6 | C3 | 08 | 74 | 0B | 3C | 2D | 75 | 1C | B0 | 28 | EB | 18 |
| 04F30 | E9 | C2 | 00 | 3C | 2D | 74 | 0C | F6 | C3 | 01 | 75 | 0D | F6 | C3 | 02 | 74 |
| 04F40 | 02 | B0 | 2B | F6 | C3 | 84 | 75 | 01 | AA | 50 | 83 | 3E | 68 | 00 | 00 | 75 |
| 04F50 | DF | 8D | 74 | 03 | 8B | 0E | 64 | 00 | 83 | E9 | 02 | D1 | E1 | 03 | F1 | 83 |
| 04F60 | C6 | 02 | AC | 3C | 00 | 74 | 03 | E8 | 8D | 02 | AC | E8 | 89 | 02 | B0 | 2E |
| 04F70 | AA | 49 | AC | E8 | 81 | 02 | E2 | FA | 81 | FA | 00 | F0 | 75 | 02 | 2B | D2 |
| 04F80 | B0 | 45 | AA | B0 | 28 | 22 | F6 | 79 | 04 | F7 | DA | B0 | 2D | AA | 2B | C0 |
| 04F90 | 92 | 3D | E8 | 03 | 7C | 0B | 2E | F7 | 36 | 55 | 06 | E8 | 61 | 02 | 2B | C0 |
| 04FA0 | 92 | 3D | 64 | 00 | 7C | 08 | 2E | F7 | 36 | 53 | 06 | E8 | 51 | 02 | 2B | C0 |
| 04FB0 | 92 | 2E | F7 | 36 | 51 | 06 | E8 | 46 | 02 | 8A | C2 | E8 | 41 | 02 | 58 | 8B |
| 04FC0 | 1E | 6C | 00 | F6 | C3 | 08 | 74 | 08 | 3C | 20 | 74 | 09 | B0 | 29 | EB | 05 |
| 04FD0 | F6 | C3 | 04 | 74 | 01 | AA | F6 | C7 | 04 | 74 | 03 | B0 | 2C | AA | 5E | 5D |
| 04FE0 | 8B | C7 | 88 | 7E | 1E | 2B | F8 | 89 | 7E | 0A | C3 | B0 | 20 | B9 | 04 | 00 |
| 04FF0 | AA | E2 | FD | EB | C9 | 83 | EC | 12 | 8B | EC | 89 | 7E | 0A | 2B | C0 | 89 |
| 05000 | 46 | 10 | 89 | 46 | 0C | F6 | 06 | 6D | 00 | 01 | 74 | 0F | A0 | 68 | 00 | 98 |
| 05010 | 48 | 2B | 46 | 10 | 2B | D0 | 89 | 56 | 0C | 8B | D0 | 89 | 56 | 0E | A1 | 64 |
| 05020 | 00 | 2D | 02 | 00 | D1 | E0 | 05 | 04 | 00 | 03 | C6 | 89 | 46 | 06 | 8B | D8 |
| 05030 | 48 | 81 | FA | 00 | F0 | 75 | 09 | 8B | D0 | 8B | F8 | 89 | 46 | 04 | EB | 35 |
| 05040 | 2B | C2 | 89 | 46 | 04 | 8B | D0 | 3B | DA | 76 | 02 | 8B | DA | 2B | C0 | F6 |
| 05050 | 06 | 6C | 00 | 10 | 74 | 0E | 8B | 46 | 06 | 2B | C3 | 74 | 07 | 48 | 2E | F6 |
| 05060 | 36 | 50 | 06 | 98 | 89 | 46 | 10 | 8D | 7C | 03 | 47 | 3B | FB | 73 | 06 | 80 |
| 05070 | 7D | 01 | 00 | 74 | F5 | 89 | 7E | 08 | A0 | 69 | 00 | 98 | F7 | D8 | 03 | C2 |
| 05080 | 39 | 46 | 06 | 77 | 05 | 89 | 46 | 06 | EB | 04 | 3B | F8 | 73 | 0C | F6 | 06 |
| 05090 | 6C | 00 | 40 | 74 | 4D | 89 | 46 | 08 | 8B | F8 | 89 | 46 | 02 | A0 | 68 | 00 |
| 050A0 | 98 | 03 | D0 | 8B | C2 | 2B | 46 | 10 | 3B | 46 | 06 | 72 | 1F | 89 | 56 | 00 |
| 050B0 | 3B | 7E | 06 | 73 | 59 | 80 | 3D | 05 | 72 | 54 | 47 | 8B | DF | FC | F9 | 8A |
| 050C0 | 07 | 43 | 14 | 00 | 37 | 72 | F8 | 4B | 3B | D3 | 73 | 31 | 83 | 3E | 6A | 00 |
| 050D0 | 00 | 74 | 0F | 80 | 0E | 6D | 00 | 01 | 8B | 56 | 0E | 4A | FF | 46 | 0C | E9 |
| 050E0 | 39 | FF | 8B | 54 | 01 | 83 | 3E | 6A | 00 | 00 | 74 | 08 | 80 | 0E | 6D | 00 |
| 050F0 | 01 | E9 | 18 | FF | 8B | 7E | 0A | 83 | C4 | 12 | E9 | 54 | FE | F9 | 8A | 05 |
| 05100 | 14 | 00 | 37 | AA | 72 | F8 | 3B | 5E | 06 | 76 | 03 | FF | 46 | 06 | FD | 8B |
| 05110 | 7E | 0A | 8B | F2 | 8B | 1E | 6C | 00 | 8B | 56 | 06 | 3B | 56 | 04 | 73 | 03 |
| 05120 | 8B | 56 | 04 | F6 | C3 | 10 | 74 | 03 | 2B | 76 | 10 | A0 | 6A | 00 | 22 | C0 |
| 05130 | 74 | 08 | 3B | F2 | 76 | 06 | AA | 4E | EB | F8 | 8B | F2 | 2A | E4 | 8B | 56 |
| 05140 | 04 | 3B | F2 | 75 | 11 | 80 | 3E | 6A | 00 | 00 | 74 | 0A | 80 | 3E | 68 | 00 |
| 05150 | 00 | 74 | 03 | 47 | B4 | 30 | F6 | C3 | 80 | 74 | 04 | 8A | 46 | 12 | AA | F6 |
| 05160 | C3 | 20 | 74 | 03 | B0 | 24 | AA | 22 | E4 | 74 | 05 | 8A | C4 | AA | EB | 23 |
| 05170 | 3B | F2 | 74 | 1F | AC | EB | 7F | 00 | 3B | F2 | 76 | 17 | F6 | C3 | 10 | 74 |
| 05180 | F3 | 8B | C6 | 2B | C2 | 2E | F6 | 36 | 50 | 06 | 22 | E4 | 75 | E6 | B0 | 2C |
| 05190 | AA | EB | E1 | 3B | 76 | 02 | 76 | 35 | 3B | 76 | 08 | 77 | 07 | 80 | 3E | 6B |

```
051A0   00 00 74 29 B0 2E AA 3B 76 06 76 06 B0 30 AA 4E
051B0   EB F5 3B 76 08 76 06 AC E8 3C 00 EB EA A0 6B 00
051C0   22 C0 74 11 3B 76 02 76 0C AA 4E EB F7 F6 C7 08
051D0   74 03 B0 2E AA 8B 56 0C 81 FA 01 FF 7D 03 BA 00
051E0   F0 83 C4 12 F6 C7 01 75 0B F6 C7 02 75 03 E9 CD
051F0   FD E9 F7 FD E9 81 FD 3C 09 76 04 B0 3F EB 02 04
05200   30 AA C3 00 00 00 00 00 00 00 00 00 00 00 00 00
05210   64 00 8B F7 8C D0 8E D8 E9 65 F8 8B FE 8E 5E 1A
05220   8B 76 0C FD 8A 04 36 30 05 8B 44 01 3D 00 F0 74
05230   E1 36 8B 4D 01 81 F9 00 F0 74 D7 03 C1 48 36 89
05240   45 01 55 57 8D 55 03 8D 7C 03 8B DF 8C D9 8E C1
05250   36 8B 0E 64 00 03 D1 03 F9 2A C0 F3 AE 41 8B E9
05260   8B FA 8C D1 8E C1 36 8B 0E 64 00 F3 AE 03 CD 03
05270   FD 3B FA 76 07 8B FA 36 8B 0E 64 00 2B D2 87 CD
05280   8B F7 3B CD 76 02 8B CD 51 55 2B ED 36 AC 43 F6
05290   27 03 D0 83 D5 00 E2 F4 8B C2 8B D5 2E F7 36 E0
052A0   09 5D 59 28 D9 92 AA 4D 75 D6 36 88 15 5E 8D 7C
052B0   03 36 03 3E 64 00 36 80 7D 01 32 72 12 B4 64 F9
052C0   36 8A 05 14 00 3A C4 72 02 2A C4 AA F5 72 F1 5D
052D0   8C D0 8E D8 E9 B9 F7 00 00 00 00 00 00 00 00 00
052E0   64 00 C7 06 66 00 05 00 C7 45 01 7F 00 C6 45 03
052F0   00 8D 7D 04 B0 63 8B 0E 64 00 49 49 FC F3 AA 2B
05300   C0 AB C3 8B F7 E9 78 F7 8B 44 01 3D 00 F0 74 D2
05310   81 7D 01 00 F0 74 EC 29 45 01 8A 04 30 05 55 57
05320   83 EC 04 8B EC 8B 0E 64 00 8D 5D 03 8B C3 03 C1
05330   8D 7C 03 8A 45 01 B2 64 F6 E2 02 45 02 80 D4 00
05340   40 89 46 00 03 F9 2A C0 FD F3 AE 41 89 4E 02 8B
05350   0E 64 00 8D 74 03 43 8A 07 F6 E2 2B D2 43 02 07
05360   80 D4 00 83 D2 00 75 13 3B 46 00 73 0E 2E F7 26
05370   B0 0A C6 47 FE 00 E2 E5 EB 5E 90 F7 76 00 56 51
05380   53 55 8B FB 41 8B 5E 02 3B CB 7E 02 8B CB 03 F9
05390   4F 4F 03 F1 41 8B E8 2B DB AC 98 F7 E5 03 C3 2E
053A0   F7 36 B0 0A 8B D8 8A 05 2A C2 79 03 04 64 43 AA
053B0   E2 E7 8B C5 5D 5B 59 BA 64 00 3B C2 73 43 86 47
053C0   FE F6 E2 02 47 FF 80 D4 00 F7 E2 02 07 80 D4 00
053D0   2E F7 26 B0 0A 5E E2 85 8B 4E 00 49 F7 F1 BA 64
053E0   00 3B C2 72 11 2B C2 8B F3 4E 4E FE 04 38 14 72
053F0   F0 28 14 4E EB F5 88 47 FF 83 C4 04 5E 5D E9 8F
05400   F6 2B C2 8B F3 83 EE 03 FE 04 38 14 72 AC 28 14
05410   4E EB F5 00 00 00 00 00 00 00 00 00 00 00 00 00
05420   8B 54 01 EB 10 10 27 64 00 E9 54 F6 B3 01 EB 02
05430   2A DB 8B 56 16 23 D2 74 F0 FC 8B FE B9 14 00 2A
05440   C0 F3 AA 22 DB 75 0A F6 C6 80 74 05 F7 DA C6 04
05450   80 8D 7C 04 BB 01 00 83 FA 64 72 1B 43 8B C2 3D
05460   10 27 72 0B 43 2B D2 2E F7 36 F5 0B AA 8B C2 2B
05470   D2 2E F7 36 F7 0B AA 88 15 89 5C 01 C3 B2 01 EB
05480   02 2A D2 8B 44 01 3D 00 F0 74 3D 8B FE 8D 74 03
05490   8B DE 03 D8 2B C0 3B DE 74 15 72 28 46 2E F7 26
054A0   F7 0B 7C 2D 02 04 80 D4 00 72 26 3B F3 72 ED 80
054B0   7F 01 32 7C 03 40 72 19 F6 05 80 74 0F 3D 00 80
054C0   77 0F F7 D8 89 46 16 C3 2B C0 EB F8 3D 00 80 72
054D0   F3 C7 06 66 00 01 00 B8 FF 7F EB DC 00 00 00 00
054E0   0A 00 C7 46 12 D5 00 83 EC 08 8B EC 89 4E 04 8B
054F0   DE 8B FE B9 14 00 2A C0 88 46 03 88 46 02 FC F3
05500   AA 8B 3E 5E 00 83 EF 28 8B 0E 64 00 49 D1 E1 8B
05510   36 5C 00 C5 74 1E 8B 46 04 8B D6 2B D0 C7 46 00
05520   B1 0D FC E8 54 01 74 FB 3C 2B 74 08 3C 2D 75 09
05530   36 C6 07 80 E8 43 01 74 FB 3C 2E 74 48 3C 30 74
05540   17 3C 30 7C 4D 3C 39 7F 49 E3 04 2C 30 AA 49 36
05550   FF 47 01 E8 24 01 EB E9 36 FE 07 E8 1C 01 3C 30
05560   74 F6 EB DD 36 83 7F 01 00 74 1A E8 0C 01 80 4E
05570   02 01 3C 30 7C 67 3C 39 7F 63 E3 E8 FE 46 03 2C
05580   30 AA 49 EB DF 36 FF 4F 01 E8 EE 00 3C 30 75 DE
05590   EB F3 3C 2E 74 CE 3C 45 75 47 80 4E 02 02 C7 46
055A0   00 A3 0D 2B C9 8A E5 E8 D0 00 74 FB 88 46 06 3C
```

| | | | | | | | | | | | | | | | | |
|---|---|---|---|---|---|---|---|---|---|---|---|---|---|---|---|---|
| 055B0 | 2B | 74 | 04 | 3C | 2D | 75 | 05 | E8 | C0 | 00 | 74 | FB | 3C | 39 | 7F | 13 |
| 055C0 | 2C | 30 | 7C | 0F | 91 | 52 | 2E | F7 | 26 | B0 | 0C | 5A | 03 | C8 | E8 | A9 |
| 055D0 | 00 | EB | E9 | 80 | 7E | 06 | 2D | 75 | 0A | F7 | D9 | EB | 06 | 3C | 45 | 74 |
| 055E0 | B9 | 2B | C9 | 46 | 36 | 8B | 47 | 01 | 3D | 00 | 00 | 74 | 69 | 48 | F6 | C4 |
| 055F0 | 80 | 74 | 07 | 40 | 80 | 7E | 03 | 00 | 74 | 61 | 03 | C1 | 40 | 8C | D1 | 8E |
| 05600 | D9 | 3D | 02 | FF | 7C | 63 | 3D | FE | 00 | 7F | 5E | 89 | 47 | 01 | D1 | 7F |
| 05610 | 01 | 80 | 27 | 80 | 56 | 8B | 36 | 5E | 00 | 83 | EE | 28 | 8B | CF | 2B | CE |
| 05620 | 8D | 7F | 04 | A9 | 01 | 00 | 75 | 0C | AC | 8A | E0 | E2 | 0D | 2A | C0 | D5 |
| 05630 | 0A | AA | EB | 0C | FF | 47 | 01 | AC | EB | 03 | AC | D5 | 0A | AA | E2 | E8 |
| 05640 | 5E | 87 | F2 | 2B | D6 | EA | 46 | 02 | 8B | 2E | 5C | 00 | 89 | 46 | 16 | 29 |
| 05650 | 56 | 0A | 83 | C4 | 08 | C3 | F6 | 07 | 7F | 74 | 0E | 8C | D0 | 8E | D8 | C6 |
| 05660 | 07 | 00 | C7 | 47 | 01 | 00 | F0 | EB | D8 | 36 | 8B | 2E | 5C | 00 | C7 | 46 |
| 05670 | 0A | 00 | 00 | C7 | 46 | 16 | 10 | 00 | EB | D8 | 3B | F2 | 76 | 0E | 8A | 04 |
| 05680 | 4E | 24 | 7F | 3C | 65 | 75 | 02 | B0 | 45 | 3C | 20 | C3 | 4E | 58 | FF | 66 |
| 05690 | 00 | 00 | 00 | 00 | 00 | 00 | 00 | 00 | 00 | 00 | 00 | 00 | 00 | 00 | 00 | 00 |
| 056A0 | 09 | 08 | 07 | 06 | 05 | 00 | 00 | 00 | 00 | 32 | 00 | 00 | 00 | 00 | 00 | 00 |
| 056B0 | 00 | 00 | 00 | 00 | 00 | 00 | 00 | 00 | 00 | 00 | 00 | 00 | 00 | 10 | 42 | 42 |
| 056C0 | 42 | 42 | 42 | 42 | 42 | 42 | 42 | 42 | 42 | 42 | 42 | 42 | 43 | 00 | 00 | 00 |
| 056D0 | 00 | 04 | 10 | 42 | 42 | 42 | 42 | 42 | 42 | 42 | 42 | 42 | 42 | 42 | 42 | 42 |
| 056E0 | 42 | 00 | FF | FF | 00 | 53 | 21 | 21 | 21 | 21 | 21 | 21 | 21 | 21 | 21 | 21 |
| 056F0 | 21 | 21 | 21 | 21 | 21 | 00 | FF | FF | 00 | 0D | 58 | 58 | 58 | 58 | 58 | 58 |
| 05700 | 58 | 58 | 58 | 58 | 58 | 58 | 58 | 58 | 59 | 00 | FF | FF | 00 | 01 | 62 | 29 |
| 05710 | 1A | 62 | 29 | 1A | 62 | 29 | 1A | 62 | 29 | 1A | 62 | 29 | 1B | 00 | FE | FF |
| 05720 | 00 | 18 | 50 | 0F | 57 | 1E | 0F | 57 | 1E | 0F | 57 | 1E | 0F | 57 | 1E | 0F |
| 05730 | 57 | 00 | FE | FF | 00 | 02 | 4B | 39 | 1F | 5C | 17 | 62 | 3A | 5A | 41 | 14 |
| 05740 | 00 | 00 | 00 | 00 | 00 | 00 | FD | FF | 00 | 1B | 37 | 49 | 13 | 16 | 27 | 55 |
| 05750 | 59 | 06 | 34 | 00 | 00 | 00 | 00 | 00 | 00 | 00 | FD | FF | 00 | 02 | 32 | 34 |
| 05760 | 0A | 53 | 55 | 2C | 11 | 12 | 4D | 32 | 00 | 00 | 00 | 00 | 00 | 06 | 05 | 04 |
| 05770 | 03 | 02 | 00 | 00 | 00 | 00 | 21 | 21 | 21 | 21 | 21 | 21 | 21 | 21 | 21 | 21 |
| 05780 | 21 | 21 | 21 | 21 | 21 | 21 | 00 | 00 | 00 | 00 | 14 | 00 | 00 | 00 | 00 | 00 |
| 05790 | 00 | 00 | 00 | 00 | 00 | 00 | 00 | 00 | 00 | 00 | 00 | 00 | 00 | 00 | 0E | 1C |
| 057A0 | 39 | 0E | 1C | 39 | 0E | 1C | 39 | 0E | 1C | 39 | 0E | 1C | 39 | 0E | 00 | 00 |
| 057B0 | 00 | 00 | 0B | 0B | 0B | 0B | 0B | 0B | 0B | 0B | 0B | 0B | 0B | 0B | 0B | 0B |
| 057C0 | 0B | 0B | 00 | 00 | 00 | 00 | 09 | 09 | 09 | 09 | 09 | 09 | 09 | 09 | 09 | 09 |
| 057D0 | 09 | 09 | 09 | 09 | 09 | 09 | 00 | 00 | 00 | 00 | 07 | 45 | 17 | 07 | 45 | 17 |
| 057E0 | 07 | 45 | 17 | 07 | 45 | 17 | 07 | 45 | 17 | 08 | 00 | 00 | 00 | 00 | 06 | 42 |
| 057F0 | 42 | 42 | 42 | 42 | 42 | 42 | 42 | 42 | 42 | 42 | 42 | 42 | 42 | 43 | 00 | 00 |
| 05800 | F0 | 00 | 00 | 00 | 00 | 00 | 00 | 00 | 00 | 00 | 00 | 00 | 00 | 00 | 00 | 00 |
| 05810 | 00 | 00 | 00 | 00 | F0 | 00 | 00 | 00 | 00 | 00 | 00 | 00 | 00 | 00 | 00 | 00 |
| 05820 | 00 | 00 | 00 | 00 | 00 | 00 | 00 | 00 | 00 | 00 | 45 | 1F | 2F | 12 | 05 | 3B |
| 05830 | 5E | 35 | 09 | 29 | 00 | 00 | 00 | 00 | 00 | 00 | 00 | 01 | 00 | 00 | 01 | 09 |
| 05840 | 56 | 0C | 1C | 56 | 44 | 0A | 60 | 5B | 00 | 00 | 00 | 00 | 00 | 00 | 00 | 01 |
| 05850 | 00 | 00 | 01 | 26 | 3E | 5E | 24 | 0B | 13 | 59 | 06 | 12 | 50 | 00 | 00 | 00 |
| 05860 | 00 | 00 | 00 | 01 | 00 | 00 | 01 | 3C | 5E | 25 | 5B | 18 | 22 | 0A | 03 | 4A |
| 05870 | 3C | 00 | 00 | 00 | 00 | 00 | 00 | 01 | 00 | 00 | 01 | 4F | 11 | 3B | 2E | 5C |
| 05880 | 1C | 05 | 32 | 00 | 00 | 00 | 00 | 00 | 00 | 00 | 00 | 01 | 00 | 00 | 01 | 5E |
| 05890 | 3B | 0A | 0E | 5A | 37 | 1F | 21 | 05 | 0A | 35 | 34 | 46 | 00 | 00 | 00 | 01 |
| 058A0 | 00 | 00 | 02 | 07 | 5E | 29 | 36 | 10 | 4F | 53 | 3B | 1C | 19 | 10 | 60 | 28 |
| 058B0 | 00 | 00 | 00 | 01 | 00 | 00 | 02 | 13 | 48 | 18 | 39 | 49 | 24 | 15 | 5D | 52 |
| 058C0 | 4F | 04 | 5A | 32 | 00 | 00 | 00 | 00 | F0 | 00 | 00 | 00 | 00 | 00 | 00 | 00 |
| 058D0 | 00 | 00 | 00 | 00 | 00 | 00 | 00 | 00 | 00 | 00 | 00 | 00 | 00 | 00 | 09 | 35 |
| 058E0 | 0A | 11 | 62 | 04 | 20 | 31 | 00 | 00 | 00 | 00 | 00 | 00 | 00 | 00 | 00 | 00 |
| 058F0 | 00 | 00 | 12 | 17 | 15 | 37 | 43 | 5D | 5F | 2E | 00 | 00 | 00 | 00 | 00 | 00 |
| 05900 | 00 | 00 | 00 | 00 | 00 | 00 | 1A | 17 | 40 | 1A | 2C | 43 | 31 | 0B | 00 | 00 |
| 05910 | 00 | 00 | 00 | 00 | 00 | 00 | 00 | 00 | 00 | 00 | 21 | 40 | 48 | 17 | 42 | 15 |
| 05920 | 15 | 1D | 00 | 00 | 00 | 00 | 00 | 00 | 00 | 00 | 00 | 00 | 00 | 00 | 28 | 36 |
| 05930 | 41 | 0A | 51 | 08 | 10 | 2C | 00 | 00 | 00 | 00 | 00 | 00 | 00 | 00 | 00 | 00 |
| 05940 | 00 | 00 | 2F | 00 | 03 | 3E | 5C | 2D | 49 | 38 | 00 | 00 | 00 | 00 | 00 | 00 |
| 05950 | 00 | 00 | 00 | 00 | 00 | 00 | 35 | 06 | 1C | 19 | 0A | 3E | 11 | 04 | 00 | 00 |
| 05960 | 00 | 00 | 00 | 00 | 00 | 00 | 00 | 00 | 00 | 00 | 3A | 4D | 56 | 42 | 31 | 02 |
| 05970 | 0B | 5A | 00 | 00 | 00 | 00 | 00 | 00 | 00 | 00 | 00 | 00 | 00 | 00 | 40 | 12 |
| 05980 | 35 | 56 | 3D | 48 | 27 | 30 | 00 | 00 | 00 | 00 | 00 | 00 | 00 | 00 | 07 | 06 |
| 05990 | 05 | 04 | 03 | 00 | 00 | 00 | 00 | 21 | 21 | 21 | 21 | 21 | 21 | 21 | 21 | 21 |
| 059A0 | 21 | 21 | 21 | 21 | 21 | 21 | 21 | 00 | 00 | 00 | 00 | 0D | 21 | 21 | 21 | 21 |
| 059B0 | 21 | 21 | 21 | 21 | 21 | 21 | 21 | 21 | 21 | 21 | 21 | 00 | 00 | 00 | 00 | 05 |

| | | | | | | | | | | | | | | | | |
|---|---|---|---|---|---|---|---|---|---|---|---|---|---|---|---|---|
| 059C0 | 27 | 44 | 19 | 27 | 44 | 19 | 27 | 44 | 19 | 27 | 44 | 19 | 27 | 44 | 19 | 00 |
| 059D0 | 00 | 00 | 00 | 02 | 12 | 45 | 30 | 55 | 24 | 0F | 34 | 00 | 00 | 00 | 00 | 00 |
| 059E0 | 00 | 00 | 00 | 00 | FF | FF | 00 | 58 | 3F | 17 | 37 | 1D | 5A | 15 | 60 | 00 |
| 059F0 | 00 | 00 | 00 | 00 | 00 | 00 | 00 | 00 | FF | FF | 00 | 23 | 5C | 0C | 50 | 24 |
| 05A00 | 39 | 18 | 51 | 00 | 00 | 00 | 00 | 00 | 00 | 00 | 00 | 00 | FF | FF | 00 | 0E |
| 05A10 | 37 | 53 | 2B | 57 | 05 | 0D | 12 | 00 | 00 | 00 | 00 | 00 | 00 | 00 | 00 | 00 |
| 05A20 | FF | FF | 00 | 01 | 2F | 32 | 3E | 61 | 36 | 02 | 21 | 32 | 00 | 00 | 00 | 00 |
| 05A30 | 00 | 00 | 00 | 00 | 00 | F0 | 00 | 00 | 00 | 00 | 00 | 00 | 00 | 00 | 00 | 00 |
| 05A40 | 00 | 00 | 00 | 00 | 00 | 00 | 00 | 00 | 00 | 00 | 00 | 0A | 03 | 22 | 43 | 14 |
| 05A50 | 55 | 2D | 05 | 2D | 05 | 50 | 4C | 02 | 43 | 00 | 00 | 00 | 00 | 00 | 00 | 14 |
| 05A60 | 1B | 0A | 03 | 37 | 08 | 43 | 18 | 53 | 20 | 0D | 36 | 57 | 06 | 00 | 00 | 00 |
| 05A70 | 00 | 00 | 00 | 1E | 5D | 24 | 18 | 60 | 09 | 3E | 20 | 21 | 03 | 35 | 02 | 61 |
| 05A80 | 1C | 00 | 00 | 00 | 00 | 00 | 00 | 2A | 1B | 5D | 15 | 57 | 26 | 10 | 11 | 00 |
| 05A90 | 00 | 00 | 00 | 00 | 00 | 00 | 00 | 00 | 00 | 00 | 00 | 36 | 3F | 02 | 30 | 62 |
| 05AA0 | 2B | 4F | 05 | 00 | 00 | 00 | 00 | 00 | 00 | 00 | 00 | 00 | 00 | 00 | 00 | 44 |
| 05AB0 | 29 | 24 | 50 | 53 | 29 | 45 | 17 | 00 | 00 | 00 | 00 | 00 | 00 | 00 | 00 | 00 |
| 05AC0 | 00 | 00 | 00 | 54 | 16 | 58 | 26 | 04 | 3F | 07 | 5E | 00 | 00 | 00 | 00 | 00 |
| 05AD0 | 00 | 00 | 00 | 00 | 01 | 00 | 00 | 01 | 02 | 60 | 26 | 37 | 46 | 32 | 24 | 28 |
| 05AE0 | 00 | 00 | 00 | 00 | 00 | 00 | 00 | 00 | 01 | 00 | 00 | 01 | 1A | 01 | 3A | 15 |
| 05AF0 | 4B | 32 | 21 | 5A | 00 | 00 | 00 | 00 | 00 | 00 | 00 | 00 | 01 | 00 | 00 | 01 |
| 05B00 | 37 | 4A | 07 | 48 | 2E | 36 | 5A | 14 | 00 | 00 | 00 | 00 | 00 | 00 | 00 | 00 |
| 05B10 | 01 | 00 | 00 | 01 | 60 | 2F | 3B | 41 | 48 | 30 | 41 | 0A | 00 | 00 | 00 | 00 |
| 05B20 | 00 | 00 | 00 | 00 | 01 | 00 | 00 | 02 | 39 | 15 | 33 | 3E | 15 | 1A | 1F | 50 |
| 05B30 | 00 | 00 | 00 | 00 | 00 | 00 | 00 | 00 | 01 | 00 | 00 | 03 | 3C | 15 | 02 | 2C |
| 05B40 | 4F | 43 | 61 | 50 | 00 | 00 | 00 | 00 | 00 | 00 | 00 | 00 | 01 | 00 | 00 | 05 |
| 05B50 | 4F | 4E | 53 | 47 | 36 | 52 | 58 | 5A | 00 | 00 | 00 | 00 | 00 | 00 | 00 | 00 |
| 05B60 | 01 | 00 | 00 | 0E | 0A | 0E | 13 | 5E | 47 | 47 | 47 | 47 | 00 | 00 | 00 | 00 |
| 05B70 | 00 | 00 | 00 | 80 | 01 | 00 | 00 | 22 | 17 | 19 | 20 | 49 | 37 | 39 | 2A | 00 |
| 05B80 | 00 | 00 | 00 | 00 | 00 | 00 | 00 | 00 | 00 | F0 | 00 | 00 | 00 | 00 | 00 | 00 |
| 05B90 | 00 | 00 | 00 | 00 | 00 | 00 | 00 | 00 | 00 | 00 | 00 | 00 | 00 | 00 | 00 | 09 |
| 05BA0 | 60 | 44 | 41 | 18 | 5B | 10 | 15 | 00 | 00 | 00 | 00 | 00 | 00 | 00 | 00 | 00 |
| 05BB0 | 00 | 00 | 00 | 13 | 49 | 5F | 37 | 62 | 31 | 58 | 08 | 00 | 00 | 00 | 00 | 00 |
| 05BC0 | 00 | 00 | 00 | 00 | 00 | 00 | 00 | 1D | 0E | 38 | 4F | 2C | 4D | 56 | 47 | 00 |
| 05BD0 | 00 | 00 | 00 | 00 | 00 | 00 | 00 | 00 | 00 | 00 | 00 | 26 | 05 | 06 | 25 | 47 |
| 05BE0 | 0C | 24 | 32 | 00 | 00 | 00 | 00 | 00 | 00 | 00 | 00 | 00 | 00 | 00 | 00 | 2E |
| 05BF0 | 24 | 2F | 3C | 5A | 00 | 50 | 3D | 00 | 00 | 00 | 00 | 00 | 00 | 00 | 00 | 00 |
| 05C00 | 00 | 00 | 00 | 36 | 04 | 13 | 32 | 02 | 46 | 3A | 2A | 00 | 00 | 00 | 00 | 00 |
| 05C10 | 00 | 00 | 00 | 00 | 00 | 00 | 00 | 3D | 07 | 19 | 60 | 2B | 59 | 14 | 57 | 00 |
| 05C20 | 00 | 00 | 00 | 00 | 00 | 00 | 00 | 00 | 00 | 00 | 00 | 43 | 2F | 28 | 5E | 16 |
| 05C30 | 17 | 37 | 1B | 00 | 00 | 00 | 00 | 00 | 00 | 00 | 00 | 00 | 00 | 00 | 00 | 49 |
| 05C40 | 1C | 0F | 0A | 11 | 56 | 32 | 42 | 00 | 00 | 00 | 00 | 00 | 00 | 00 | 00 | 00 |
| 05C50 | 00 | 00 | 00 | 4E | 35 | 62 | 10 | 21 | 61 | 2C | 53 | 00 | 00 | 00 | 00 | 00 |
| 05C60 | 00 | 00 | 00 | 06 | 05 | 04 | 03 | 02 | 80 | 00 | 00 | 00 | 21 | 21 | 21 | 21 |
| 05C70 | 21 | 21 | 21 | 21 | 21 | 21 | 21 | 21 | 21 | 21 | 21 | 21 | 00 | 00 | 00 | 00 |
| 05C80 | 14 | 00 | 00 | 00 | 00 | 00 | 00 | 00 | 00 | 00 | 00 | 00 | 00 | 00 | 00 | 00 |
| 05C90 | 80 | 00 | 00 | 00 | 0E | 1C | 39 | 0E | 1C | 39 | 0E | 1C | 39 | 0E | 1C | 39 |
| 05CA0 | 0E | 1C | 39 | 0E | 00 | 00 | 00 | 00 | 0B | 0B | 0B | 0B | 0B | 0B | 0B | 0B |
| 05CB0 | 0B | 0B | 0B | 0B | 0B | 0B | 0B | 0B | 80 | 00 | 00 | 00 | 09 | 09 | 09 | 09 |
| 05CC0 | 09 | 09 | 09 | 09 | 09 | 09 | 09 | 09 | 09 | 09 | 09 | 09 | 00 | 00 | 00 | 00 |
| 05CD0 | 07 | 45 | 17 | 07 | 45 | 17 | 07 | 45 | 17 | 07 | 45 | 17 | 07 | 45 | 17 | 07 |
| 05CE0 | 80 | 00 | 00 | 00 | 06 | 42 | 42 | 42 | 42 | 42 | 42 | 42 | 42 | 42 | 42 | 42 |
| 05CF0 | 42 | 42 | 42 | 43 | 00 | 00 | F0 | 00 | 00 | 00 | 00 | 00 | 00 | 00 | 00 | 00 |
| 05D00 | 00 | 00 | 00 | 00 | 00 | 00 | 00 | 00 | 00 | 01 | 00 | 00 | 01 | 00 | 00 | 00 |
| 05D10 | 00 | 00 | 00 | 00 | 00 | 00 | 00 | 00 | 00 | 00 | 00 | 00 | 00 | 01 | 00 | 00 |
| 05D20 | 01 | 29 | 2A | 0D | 38 | 17 | 49 | 09 | 32 | 00 | 00 | 00 | 00 | 00 | 00 | 00 |
| 05D30 | 00 | 01 | 00 | 00 | 01 | 49 | 14 | 32 | 50 | 4B | 44 | 57 | 46 | 00 | 00 | 00 |
| 05D40 | 00 | 00 | 00 | 00 | 00 | 01 | 00 | 00 | 02 | 00 | 00 | 00 | 00 | 00 | 00 | 00 |
| 05D50 | 00 | 00 | 00 | 00 | 00 | 00 | 00 | 00 | 00 | 01 | 00 | 00 | 02 | 17 | 3C | 43 |
| 05D60 | 61 | 4A | 63 | 4E | 5A | 00 | 00 | 00 | 00 | 00 | 00 | 00 | 00 | 01 | 00 | 00 |
| 05D70 | 02 | 2C | 5E | 59 | 4A | 1B | 53 | 11 | 50 | 00 | 00 | 00 | 00 | 00 | 00 | 00 |
| 05D80 | 00 | 01 | 00 | 00 | 02 | 40 | 39 | 33 | 1F | 0A | 40 | 3B | 00 | 00 | 00 | 00 |
| 05D90 | 00 | 00 | 00 | 00 | 00 | 01 | 00 | 00 | 02 | 52 | 54 | 1B | 0C | 2F | 2E | 13 |
| 05DA0 | 00 | 00 | 00 | 00 | 00 | 00 | 00 | 00 | 00 | 01 | 00 | 00 | 03 | 00 | 00 | 00 |
| 05DB0 | 00 | 00 | 00 | 00 | 00 | 00 | 00 | 00 | 00 | 00 | 00 | 00 | 00 | 01 | 00 | 00 |
| 05DC0 | 03 | 10 | 16 | 11 | 42 | 01 | 44 | 25 | 5A | 00 | 00 | 00 | 00 | 00 | 00 | 00 |

| | | | | | | | | | | | | | | | | |
|---|---|---|---|---|---|---|---|---|---|---|---|---|---|---|---|---|
| 05DD0 | 00 | 00 | F0 | 00 | 00 | 00 | 00 | 00 | 00 | 00 | 00 | 00 | 00 | 00 | 00 | 00 |
| 05DE0 | 00 | 00 | 00 | 00 | 00 | 01 | 00 | 00 | 03 | 10 | 16 | 11 | 42 | 01 | 44 | 25 |
| 05DF0 | 5A | 00 | 00 | 00 | 00 | 00 | 00 | 00 | 00 | 01 | 00 | 00 | 04 | 2F | 15 | 23 |
| 05E00 | 5F | 31 | 63 | 39 | 5A | 00 | 00 | 00 | 00 | 00 | 00 | 00 | 00 | 01 | 00 | 00 |
| 05E10 | 05 | 2F | 48 | 19 | 39 | 32 | 33 | 42 | 0A | 00 | 00 | 00 | 00 | 00 | 00 | 00 |
| 05E20 | 00 | 01 | 00 | 00 | 06 | 20 | 2D | 37 | 20 | 03 | 24 | 4B | 50 | 00 | 00 | 00 |
| 05E30 | 00 | 00 | 00 | 00 | 00 | 01 | 00 | 00 | 07 | 07 | 0A | 43 | 51 | 12 | 41 | 2F |
| 05E40 | 32 | 00 | 00 | 00 | 00 | 00 | 00 | 00 | 00 | 01 | 00 | 00 | 07 | 4A | 3B | 42 |
| 05E50 | 45 | 18 | 0E | 53 | 1E | 00 | 00 | 00 | 00 | 00 | 00 | 00 | 00 | 01 | 00 | 00 |
| 05E60 | 08 | 24 | 42 | 00 | 1A | 35 | 28 | 4B | 32 | 00 | 00 | 00 | 00 | 00 | 00 | 00 |
| 05E70 | 00 | 01 | 00 | 00 | 08 | 5E | 2A | 47 | 5A | 63 | 63 | 0F | 50 | 00 | 00 | 00 |
| 05E80 | 00 | 00 | 00 | 00 | 00 | 01 | 00 | 00 | 09 | 30 | 44 | 20 | 62 | 05 | 05 | 0D |
| 05E90 | 46 | 00 | 00 | 00 | 00 | 00 | 00 | 00 | 00 | 01 | 00 | 00 | 0A | 00 | 00 | 00 |
| 05EA0 | 00 | 00 | 00 | 00 | 00 | 00 | 00 | 00 | 00 | 00 | 00 | 00 | 00 | 00 | 00 | 00 |
| 05EB0 | 2B | 2A | 5E | 30 | 13 | 03 | 19 | 12 | 1B | 41 | 0B | 1C | 00 | 00 | 00 | 00 |
| 05EC0 | 00 | 01 | 00 | 00 | 02 | 1E | 19 | 55 | 09 | 1D | 5E | 04 | 38 | 54 | 01 | 50 |
| 05ED0 | 00 | 00 | 00 | 00 | 00 | 01 | 00 | 00 | 01 | 00 | 00 | 00 | 00 | 00 | 00 | 00 |
| 05EE0 | 00 | 00 | 00 | 00 | 00 | 00 | 00 | 00 | 80 | 01 | 00 | 00 | 01 | 00 | 00 | 00 |
| 05EF0 | 00 | 00 | 00 | 00 | 00 | 00 | 00 | 00 | 00 | 00 | 00 | 00 | 00 | 01 | 00 | 00 |
| 05F00 | 02 | 00 | 00 | 00 | 00 | 00 | 00 | 00 | 00 | 00 | 00 | 00 | 00 | 00 | 00 | 00 |
| 05F10 | 00 | 01 | 00 | 00 | 01 | 39 | 07 | 60 | 20 | 43 | 5E | 59 | 42 | 13 | 17 | 0D |
| 05F20 | 16 | 00 | 00 | 00 | 80 | 01 | 00 | 00 | 01 | 39 | 07 | 60 | 20 | 43 | 5E | 59 |
| 05F30 | 42 | 13 | 17 | 0D | 16 | 00 | 00 | 00 | 00 | 00 | 00 | 00 | 3F | 42 | 13 | 4D |
| 05F40 | 17 | 43 | 3A | 0D | 2B | 07 | 37 | 2B | 54 | 30 | 00 | 00 | 00 | 01 | 00 | 00 |
| 05F50 | 03 | 0E | 0F | 5C | 41 | 23 | 59 | 4F | 20 | 26 | 2E | 1A | 2B | 00 | 00 | 00 |
| 05F60 | 00 | 00 | 00 | 00 | 1F | 53 | 09 | 58 | 3D | 53 | 4F | 06 | 47 | 35 | 4D | 43 |
| 05F70 | 32 | 00 | 00 | 00 | 00 | 00 | 00 | 00 | 03 | 0C | 32 | 00 | 00 | 00 | 00 | 00 |
| 05F80 | 00 | 00 | 00 | 00 | 00 | 00 | 00 | 00 | 00 | 00 | 00 | 00 | 32 | 00 | 00 | 00 |
| 05F90 | 00 | 00 | 00 | 00 | 00 | 00 | 00 | 00 | 00 | 00 | 00 | 00 | 00 | 01 | 00 | 00 |
| 05FA0 | 0A | 00 | 00 | 00 | 00 | 00 | 00 | 00 | 00 | 00 | 00 | 00 | 00 | 00 | 00 | 00 |
| 05FB0 | 36 | A3 | 66 | 00 | E9 | 21 | E9 | 36 | 83 | 3E | 64 | 00 | 0A | 7E | 07 | 36 |
| 05FC0 | C7 | 06 | 64 | 00 | 0A | 00 | E8 | 1A | 00 | 36 | 8B | 36 | 5E | 00 | 36 | 83 |
| 05FD0 | 3E | 64 | 00 | 0A | 7C | 05 | 36 | FF | 0E | 64 | 00 | E9 | B2 | EA | B8 | 03 |
| 05FE0 | 00 | EB | CD | E8 | 00 | 07 | BB | 7C | 16 | 9C | 36 | FF | 1E | 02 | 03 | 00 |
| 05FF0 | 20 | 70 | EE | 9C | 36 | FF | 1E | 02 | 03 | 00 | 0C | E8 | E8 | 06 | 9C | 36 |
| 06000 | FF | 1E | 02 | 03 | 80 | 14 | 70 | D6 | 50 | BB | 90 | 16 | 9C | 36 | FF | 1E |
| 06010 | 02 | 03 | 00 | 20 | 70 | CB | 9C | 36 | FF | 1E | 06 | 03 | 01 | 80 | 02 | BB |
| 06020 | 44 | 17 | 9C | 36 | FF | 1E | 02 | 03 | 00 | 20 | 70 | B5 | E8 | B7 | 06 | E8 |
| 06030 | 54 | 06 | B8 | 75 | 0E | E8 | 5E | 06 | BB | A4 | 16 | 9C | 36 | FF | 1E | 02 |
| 06040 | 03 | 00 | 1E | 70 | 9C | 36 | 83 | 06 | 64 | 00 | 02 | B9 | 05 | 00 | 9C | 36 |
| 06050 | FF | 1E | 06 | 03 | 00 | 00 | 04 | 70 | 88 | E2 | F3 | 36 | 83 | 2E | 64 | 00 |
| 06060 | 02 | 58 | D1 | F8 | 73 | 0B | BB | 6C | 17 | 9C | 36 | FF | 1E | 02 | 03 | 00 |
| 06070 | 20 | 36 | 8B | 2E | 5E | 00 | 01 | 46 | 01 | C3 | B8 | 06 | 00 | EB | 04 | 90 |
| 06080 | E8 | 07 | 00 | E9 | 2A | FF | 36 | 83 | 3E | 64 | 00 | 0A | 7E | 07 | 36 | C7 |
| 06090 | 06 | 64 | 00 | 0A | 00 | E8 | 03 | 00 | E9 | 2E | FF | 36 | 8B | 2E | 5E | 00 |
| 060A0 | 81 | 7E | 01 | 00 | F0 | 74 | D9 | 80 | 7E | 00 | 80 | 74 | CD | FF | 76 | 01 |
| 060B0 | C7 | 46 | 01 | 01 | 00 | 2B | C0 | 2B | DB | 8A | 46 | 04 | 8A | D8 | 3C | 0A |
| 060C0 | 7C | 06 | D4 | 0A | 86 | C4 | FE | C7 | 53 | 50 | 22 | FF | 74 | 08 | 86 | C4 |
| 060D0 | 86 | C3 | 2A | C3 | 2A | E4 | E8 | 2A | 06 | 36 | 8B | 2E | 5E | 00 | 88 | 46 |
| 060E0 | 04 | C7 | 46 | 01 | 01 | 00 | 9C | 36 | FF | 1E | 06 | 03 | 01 | 80 | 06 | 70 |
| 060F0 | 32 | 36 | 8B | 2E | 5E | 00 | 8A | 46 | 05 | D4 | 0A | 2A | C0 | 86 | C4 | 50 |
| 06100 | 86 | C4 | D5 | 0A | E8 | FC | 05 | 36 | 8B | 2E | 5E | 00 | 88 | 46 | 05 | C6 |
| 06110 | 46 | 04 | 01 | C7 | 46 | 01 | 01 | 00 | 9C | 36 | FF | 1E | 06 | 03 | 01 | 80 |
| 06120 | 06 | 71 | 03 | E9 | 5D | FF | BB | B8 | 16 | 9C | 36 | FF | 1E | 02 | 03 | 00 |
| 06130 | 1E | 70 | F0 | E8 | 80 | 05 | BB | CC | 16 | 9C | 36 | FF | 1E | 02 | 03 | 00 |
| 06140 | 1E | 70 | E0 | 9C | 36 | FF | 1E | 06 | 03 | 01 | 80 | 06 | 70 | D5 | E8 | 95 |
| 06150 | 05 | E8 | 92 | 05 | 9C | 36 | FF | 1E | 06 | 03 | 01 | 00 | 04 | 70 | C4 | BB |
| 06160 | 42 | 0F | E8 | 31 | 05 | E8 | 7E | 05 | 9C | 36 | FF | 1E | 06 | 03 | 01 | 80 |
| 06170 | 00 | 70 | 72 | 58 | BB | 96 | 10 | E8 | AE | 05 | 9C | 36 | FF | 1E | 02 | 03 |
| 06180 | 00 | 1E | 70 | 61 | 58 | 50 | 2A | E4 | BB | CE | 0F | E8 | 9A | 05 | 9C | 36 |
| 06190 | FF | 1E | 02 | 03 | 00 | 1E | 70 | 4D | 58 | 5B | 22 | FF | 74 | 0D | BB | 90 |
| 061A0 | 16 | 9C | 36 | FF | 1E | 02 | 03 | 00 | 1E | 70 | 3A | 58 | 48 | 3D | 00 | 00 |
| 061B0 | 74 | 32 | E8 | 4E | 05 | 36 | 8B | 2E | 5E | 00 | C7 | 46 | 01 | 01 | 00 | D1 |
| 061C0 | E0 | 79 | 06 | F6 | D8 | C6 | 46 | 00 | 80 | 88 | 46 | 04 | BB | 90 | 16 | 9C |
| 061D0 | 36 | FF | 1E | 02 | 03 | 00 | 20 | 70 | 0C | 9C | 36 | FF | 1E | 06 | 03 | 01 |

```
061E0   80 00 70 01 C3 E9 9B FE 36 8B 2E 5E 00 2B C0 86
061F0   46 00 50 BB 58 17 9C 36 FF 1E 02 03 00 20 E8 8F
06200   00 E8 E2 04 9C 36 FF 1E 06 03 01 00 00 9C 36 FF
06210   1E 06 03 00 00 04 BB A4 16 9C 36 FF 1E 02 03 00
06220   1E 9C 36 FF 1E 06 03 01 80 06 58 36 8B 2E 5E 00
06230   30 46 00 E9 93 FD E9 4A FE 36 8B 2E 5E 00 C6 46
06240   00 00 BB 58 17 9C 36 FF 1E 02 03 00 20 E8 40 00
06250   9C 36 FF 1E 06 03 00 00 04 BB A4 16 36 8B 2E 5E
06260   00 E8 82 04 80 76 00 80 9C 36 FF 1E 02 03 01 1E
06270   9C 36 FF 1E 02 03 00 1E 9C 36 FF 1E 06 03 01 80
06280   06 E9 45 FD E9 FC FD E9 F9 FD E8 03 00 E9 39 FD
06290   36 83 3E 64 00 0A 7E 07 36 C7 06 64 00 0A 00 2B
062A0   C0 36 8B 2E 5E 00 86 46 00 50 E8 39 04 36 83 06
062B0   64 00 03 BB 30 17 9C 36 FF 1E 02 03 00 20 9C 36
062C0   FF 1E 02 03 00 0C BB 1C 17 9C 36 FF 1E 02 03 00
062D0   20 36 FF 0E 64 00 9C 36 FF 1E 02 03 00 08 9C 36
062E0   FF 1E 06 03 01 80 02 BB E0 16 36 83 2E 64 00 02
062F0   9C 36 FF 1E 02 03 00 22 7E 18 36 8B 2E 5E 00 80
06300   76 00 80 BB 1C 17 9C 36 FF 1E 02 03 00 1E 80 76
06310   00 80 E8 0A 00 58 36 8B 2E 5E 00 30 46 00 C3 36
06320   8B 2E 5E 00 83 7E 01 F8 7C F4 8A 46 00 80 66 00
06330   00 50 2B C9 36 8B 2E 5E 00 8B 5E 01 8B 46 04 83
06340   FB 00 7C 51 E8 BC 03 36 8B 2E 5E 00 83 FB 00 7F
06350   1F 04 05 D4 0A 80 FC 0A 8A CC 7D 0D 2A C0 D5 0A
06360   3C 00 75 20 FE CF EB 1C 90 43 B8 01 00 EB 15 90
06370   80 C4 05 86 C4 D4 0A 8A CC 80 C1 0A 2A C0 D5 0A
06380   86 E0 B0 01 89 5E 01 89 46 04 9C 36 FF 1E 06 03
06390   01 80 02 70 74 51 36 8B 2E 5E 00 8A 46 00 24 80
063A0   80 66 00 7F 50 E8 3E 03 E8 3B 03 9C 36 FF 1E 06
063B0   03 01 00 04 70 53 BB 63 11 E8 DA 02 58 08 46 00
063C0   E8 23 03 58 BB 03 12 E8 5E 03 9C 36 FF 1E 02 03
063D0   01 1E 70 35 9C 36 FF 1E 02 03 00 20 70 2B BB A4
063E0   16 36 8B 2E 5E 00 80 76 00 80 9C 36 FF 1E 02 03
063F0   00 1E 70 15 9C 36 FF 1E 06 03 01 80 06 70 0A 58
06400   36 8B 2E 5E 00 08 46 00 C3 E9 77 FC E9 10 01 36
06410   83 3E 64 00 0A 7E 07 36 C7 06 64 00 0A 00 36 8B
06420   2E 5E 00 2B C0 38 46 00 74 05 88 46 00 40 40 83
06430   7E 01 01 7C 26 E8 CB 02 36 8B 2E 5E 00 C7 46 01
06440   01 00 C6 46 04 01 9C 36 FF 1E 06 03 00 01 0A 9C
06450   36 FF 1E 06 03 01 80 06 70 45 40 50 83 7E 01 EE
06460   7C AA E8 81 02 E8 7E 02 36 8B 2E 5E 00 FF 46 01
06470   9C 36 FF 1E 02 03 00 0C 9C 36 FF 1E 02 03 80 14
06480   05 05 00 D4 0A 86 E0 98 50 E8 77 02 36 8B 2E 5E
06490   00 3C 0A 7C 0D C7 46 01 01 00 B0 01 EB 11 90 E9
064A0   E1 F3 86 C4 D5 0A 3C 00 74 08 C7 46 01 00 00 88
064B0   46 04 9C 36 FF 1E 06 03 02 00 02 70 E2 9C 36 FF
064C0   1E 06 03 01 80 04 70 D7 BB A4 16 9C 36 FF 1E 02
064D0   03 00 1E 70 CA 9C 36 FF 1E 06 03 01 80 06 70 BF
064E0   36 8B 2E 5E 00 2B C0 8A 46 00 88 66 00 50 E8 F5
064F0   01 E8 F2 01 9C 36 FF 1E 06 03 01 00 04 70 A0 BB
06500   36 14 E8 91 01 58 36 8B 2E 5E 00 88 46 00 58 BB
06510   57 13 E8 13 02 9C 36 FF 1E 02 03 00 1E 70 27 58
06520   A9 01 00 74 16 BB E0 16 36 8B 2E 5E 00 80 76 00
06530   80 9C 36 FF 1E 02 03 00 1E 70 0B A8 02 74 04 C6
06540   46 00 80 E9 83 FA E9 3A FB B8 08 00 E9 34 FB 36
06550   8B 2E 5E 00 80 7E 00 80 74 EF 81 7E 01 00 F0 74
06560   E2 8A 46 04 80 7E 05 32 7C 02 FE C0 B8 C4 14 3C
06570   0A 7C 08 BB A0 15 D4 0A 86 C4 98 E8 AA 01 36 8B
06580   2E 5E 00 8B 46 01 E8 7A 01 9C 36 FF 1E 02 03 00
06590   1E 70 71 D1 F8 72 70 BB 6C 17 9C 36 FF 1E 02 03
065A0   00 20 36 8B 2E 5E 00 89 46 01 9C 36 FF 1E 06 03
065B0   01 00 0A 36 8B 16 64 00 4A 36 FF 06 64 00 E8 25
065C0   01 9C 36 FF 1E 06 03 00 02 06 70 38 9C 36 FF 1E
065D0   06 03 00 02 00 70 2D BB 58 17 9C 36 FF 1E 02 03
065E0   00 20 70 20 E8 4E 01 9C 36 FF 1E 06 03 02 80 08
```

| | | | | | | | | | | | | | | | | |
|---|---|---|---|---|---|---|---|---|---|---|---|---|---|---|---|---|
| 065F0 | 3B | CA | 7C | CA | 36 | FF | 0E | 64 | 00 | 9C | 36 | FF | 1E | 02 | 03 | 01 |
| 06600 | 18 | E9 | C5 | F9 | E9 | 7C | FA | 40 | EB | 98 | 81 | 7E | 01 | 00 | F0 | 74 |
| 06610 | 09 | 36 | 83 | 06 | 5E | 00 | 14 | E9 | AF | F9 | 36 | 83 | 06 | 5E | 00 | 28 |
| 06620 | B8 | 01 | 00 | 9C | 36 | FF | 1E | 02 | 03 | 7F | 12 | E9 | 9B | F9 | 36 | 83 |
| 06630 | 3E | 64 | 00 | 0A | 7E | 07 | 36 | C7 | 06 | 64 | 00 | 0A | 00 | 36 | 8B | 2E |
| 06640 | 5E | 00 | 81 | 7E | 15 | 00 | F0 | 74 | C1 | 9C | 36 | FF | 1E | 06 | 03 | 01 |
| 06650 | 00 | 0A | 80 | 7E | 00 | 80 | 75 | 34 | 83 | C5 | 14 | E8 | FB | 00 | 72 | 30 |
| 06660 | 36 | 8B | 2E | 5E | 00 | 2B | C0 | 88 | 46 | 00 | D1 | EA | 73 | 02 | B0 | 80 |
| 06670 | 50 | E8 | 27 | FA | 9C | 36 | FF | 1E | 06 | 03 | 01 | 80 | 04 | E8 | 63 | F9 |
| 06680 | 58 | 36 | 8B | 2E | 5E | 00 | 88 | 46 | 00 | E9 | 3D | F9 | 2B | C0 | EB | E0 |
| 06690 | B8 | 09 | 00 | E9 | ED | F9 | 2B | C9 | 56 | 36 | 8B | 36 | 64 | 00 | 83 | EE |
| 066A0 | 02 | D1 | E6 | 83 | EE | 08 | 79 | 02 | 2B | F6 | D1 | EE | F7 | D6 | 83 | FE |
| 066B0 | FB | 7D | 03 | BE | FB | FF | 2E | 8A | 08 | 5E | 9C | 36 | FF | 1E | 06 | 03 |
| 066C0 | 00 | 01 | 04 | E8 | 20 | 00 | 9C | 36 | FF | 1E | 02 | 03 | 00 | 20 | 9C | 36 |
| 066D0 | FF | 1E | 06 | 03 | 03 | 80 | 00 | 83 | C3 | 14 | E2 | DE | 36 | 83 | 06 | 5E |
| 066E0 | 00 | 28 | C3 | E9 | 9D | F9 | 56 | 57 | 51 | 36 | 8B | 36 | 5E | 00 | 8B | FE |
| 066F0 | B9 | 14 | 00 | 2B | F9 | 36 | 89 | 3E | 5E | 00 | D1 | E9 | FC | F3 | A5 | 59 |
| 06700 | 5F | 5E | C3 | 50 | 57 | 51 | 36 | 8B | 3E | 5E | 00 | 4F | 4F | B9 | 14 | 00 |
| 06710 | D1 | E9 | FD | 2B | C0 | F3 | AB | 47 | 47 | 36 | 89 | 3E | 5E | 00 | 36 | C7 |
| 06720 | 45 | 01 | 00 | F0 | 59 | 5F | 58 | C3 | A8 | 80 | 74 | 02 | F6 | D8 | B4 | 14 |
| 06730 | F6 | E4 | 03 | D8 | C3 | 56 | 57 | 36 | 8B | 36 | 5E | 00 | 83 | FE | 83 | C6 |
| 06740 | 28 | FC | 46 | 47 | 2B | C9 | A7 | 75 | 0D | 8B | CA | 83 | C1 | 02 | 51 | F3 |
| 06750 | A6 | 5E | 28 | F1 | 87 | CE | 5F | 5E | C3 | 2B | D2 | 8B | 46 | 01 | 3D | 01 |
| 06760 | 00 | 7C | 1F | 36 | 8B | 0E | 64 | 00 | 49 | 49 | 3B | C1 | 73 | 14 | 8D | 7E |
| 06770 | 04 | 2B | C8 | 03 | F8 | 8C | D0 | 8E | C0 | 2B | C0 | 26 | 3A | 55 | FF | FC |
| 06780 | F3 | AF | C3 | 00 | 00 | 00 | 00 | 00 | 00 | 00 | 00 | 00 | 00 | 00 | 00 | 00 |
| 06790 | 00 | 00 | 1E | 01 | FC | 00 | 02 | 00 | 00 | 00 | 00 | 00 | 00 | 00 | 00 | 00 |
| 067A0 | 24 | 05 | 25 | 00 | 00 | 00 | 58 | 02 | 06 | 00 | 00 | 00 | 65 | 00 | 00 | 00 |
| 067B0 | 00 | 00 | 00 | 00 | 43 | 4F | 4E | 53 | 4F | 4C | 45 | 00 | 00 | 00 | 00 | 00 |
| 067C0 | 50 | 01 | 14 | 00 | 68 | 02 | 00 | 00 | 40 | 00 | 50 | 01 | 02 | 00 | 6B | 02 |
| 067D0 | 02 | 00 | 61 | 00 | 50 | 01 | 00 | 00 | 6D | 02 | 02 | 00 | 81 | 00 | 50 | 01 |
| 067E0 | 14 | 00 | 6F | 02 | 00 | 00 | A0 | 00 | 50 | 01 | 0E | 00 | 97 | 02 | 00 | 00 |
| 067F0 | C0 | 00 | 50 | 01 | 04 | 00 | C7 | 02 | 04 | 00 | E0 | 00 | 50 | 01 | 02 | 00 |
| 06800 | D2 | 02 | 00 | 00 | 00 | 01 | 50 | 01 | 00 | 00 | 03 | 03 | 00 | 00 | 20 | 01 |
| 06810 | 50 | 01 | 02 | 00 | 07 | 03 | 00 | 00 | 40 | 01 | 50 | 01 | 00 | 00 | 36 | 03 |
| 06820 | 04 | 00 | 63 | 01 | 50 | 01 | 02 | 00 | 37 | 03 | 02 | 00 | 80 | 01 | 50 | 01 |
| 06830 | 04 | 00 | 46 | 03 | 02 | 00 | A0 | 01 | 50 | 01 | 04 | 00 | 54 | 03 | 00 | 00 |
| 06840 | C0 | 01 | 50 | 01 | 00 | 00 | 56 | 03 | 00 | 00 | E0 | 01 | 50 | 01 | 0C | 00 |
| 06850 | 57 | 03 | 00 | 00 | 00 | 02 | 50 | 01 | 1A | 00 | 62 | 03 | 00 | 00 | 20 | 02 |
| 06860 | 50 | 01 | 1C | 00 | A1 | 03 | 04 | 00 | 40 | 02 | 50 | 01 | 02 | 00 | B0 | 03 |
| 06870 | 00 | 00 | 60 | 02 | 50 | 01 | 04 | 00 | B5 | 03 | 02 | 00 | 80 | 02 | 50 | 01 |
| 06880 | 04 | 00 | BC | 03 | 02 | 01 | A3 | 02 | 50 | 01 | 0C | 00 | C0 | 03 | 00 | 00 |
| 06890 | C0 | 02 | 50 | 01 | 0C | 00 | D7 | 03 | 00 | 00 | E0 | 02 | 50 | 01 | 06 | 00 |
| 068A0 | E2 | 03 | 00 | 00 | 00 | 03 | 50 | 01 | 06 | 00 | E5 | 03 | 00 | 00 | 20 | 03 |
| 068B0 | 50 | 01 | 08 | 00 | E7 | 03 | 02 | 00 | 40 | 03 | 50 | 01 | 00 | 00 | 02 | 04 |
| 068C0 | 02 | 00 | 61 | 03 | 50 | 01 | 0A | 00 | 03 | 04 | 00 | 00 | 80 | 03 | 50 | 01 |
| 068D0 | 08 | 00 | 12 | 04 | 02 | 00 | A0 | 03 | 50 | 01 | 14 | 00 | 22 | 04 | 7A | 00 |
| 068E0 | C0 | 03 | 50 | 01 | 0C | 00 | 6B | 04 | 06 | 01 | E3 | 03 | 50 | 01 | 08 | 00 |
| 068F0 | 77 | 04 | 02 | 00 | 01 | 04 | 50 | 01 | 00 | 00 | 7A | 04 | 00 | 00 | 20 | 04 |
| 06900 | 50 | 01 | 0C | 00 | 7B | 04 | 06 | 01 | 43 | 04 | 50 | 01 | 16 | 00 | 86 | 04 |
| 06910 | 00 | 00 | 60 | 04 | 50 | 01 | 10 | 00 | 8A | 04 | 04 | 00 | 80 | 04 | 50 | 01 |
| 06920 | 00 | 00 | 9F | 04 | 00 | 00 | A1 | 04 | 50 | 01 | 02 | 00 | A0 | 04 | 00 | 00 |
| 06930 | C0 | 04 | 50 | 01 | 00 | 00 | F8 | 04 | 00 | 00 | E0 | 04 | 50 | 01 | 04 | 00 |
| 06940 | 06 | 05 | 8D | 02 | 00 | 05 | 00 | 00 | 64 | 00 | 01 | 00 | 0E | 00 | 42 | 01 |
| 06950 | 64 | 00 | 01 | 00 | 00 | 00 | 00 | 00 | 4E | 00 | 01 | 00 | 0E | 00 | 42 | 01 |
| 06960 | 4E | 00 | 01 | 00 | 00 | 00 | 64 | 00 | 15 | 0F | AE | 00 | 42 | 01 | 00 | 00 |
| 06970 | 01 | 00 | 00 | 00 | 42 | 01 | 01 | 00 | 01 | 00 | 00 | 00 | 42 | 01 | 02 | 00 |
| 06980 | 01 | 00 | 00 | 00 | 42 | 01 | 03 | 00 | 01 | 00 | 00 | 00 | 42 | 01 | 04 | 00 |
| 06990 | 01 | 00 | 00 | 00 | 42 | 01 | 05 | 00 | 01 | 00 | 00 | 00 | 42 | 01 | 06 | 00 |
| 069A0 | 01 | 00 | 00 | 00 | 42 | 01 | 07 | 00 | 01 | 00 | 00 | 00 | 42 | 01 | 08 | 00 |
| 069B0 | 01 | 00 | 00 | 00 | 42 | 01 | 09 | 00 | 01 | 00 | 00 | 00 | 42 | 01 | 0A | 00 |
| 069C0 | 01 | 00 | 00 | 00 | 42 | 01 | 0B | 00 | 01 | 00 | 00 | 00 | 42 | 01 | 0C | 00 |
| 069D0 | 01 | 00 | 00 | 00 | 42 | 01 | 0D | 00 | 01 | 00 | 00 | 00 | 44 | 01 | 0E | 00 |
| 069E0 | 02 | 00 | 00 | 00 | 42 | 01 | 10 | 00 | 01 | 00 | 00 | 00 | 42 | 01 | 11 | 00 |
| 069F0 | 01 | 00 | 00 | 00 | 44 | 01 | 12 | 00 | 02 | 00 | 00 | 00 | 42 | 01 | 14 | 00 |

```
06A00   01 00 00 00 42 01 15 00 01 00 00 00 4C 01 16 00
06A10   4E 00 98 02 00 00 F4 01 01 04 0E 00 4A 01 05 00
06A20   64 00 A6 02 1A 01 00 00 56 03 00 00 0A 00 01 01
06A30   0E 00 44 01 05 00 02 00 00 00 0B 00 02 0F 16 00
06A40   42 01 00 00 01 00 00 00 4C 01 01 00 0A 00 6C 03
06A50   FF FF 00 42 4C 41 43 4B 00 42 4C 55 45 00 47 52
06A60   45 45 4E 00 43 59 41 4E 00 52 45 44 00 4D 41 47
06A70   45 4E 54 41 00 42 52 4F 57 4E 00 57 48 49 54 45
06A80   00 47 52 45 59 00 4C 54 42 4C 55 45 00 4C 54 47
06A90   52 45 45 4E 00 4C 54 43 59 41 4E 00 4C 54 52 45
06AA0   44 00 4C 54 4D 41 47 45 4E 54 41 00 59 45 4C 4C
06AB0   4F 57 00 42 52 54 57 48 49 54 45 00 55 4E 44
06AC0   45 52 4C 49 4E 45 00 42 4C 49 4E 4B 01 00 FF FF
06AD0   00 42 4C 41 43 4B 00 42 4C 55 45 00 47 52 45 45
06AE0   4E 00 43 59 41 4E 00 52 45 44 00 4D 41 47 45 4E
06AF0   54 41 00 42 52 4F 57 4E 00 57 48 49 54 45 01 00
06B00   20 01 F4 01 7A 03 02 01 00 02 02 01 02 02 02 01
06B10   04 02 02 01 06 02 00 01 20 03 00 01 21 03 00 01
06B20   22 03 00 01 24 03 00 01 25 03 00 01 26 03 00 01
06B30   E6 03 00 01 C7 02 00 01 C8 02 00 01 D4 02 00 01
06B40   FF 00 5A 01 12 00 90 03 5A 01 24 00 8E 04 FF FF
06B50   7C 4F 4E 00 01 00 5A 01 36 00 90 03 5A 01 48 00
06B60   A2 04 FF FF 7C 42 4C 49 4E 4B 00 01 5A 01 12 00
06B70   B2 04 FF FF 7C 42 4F 52 44 45 52 00 01 00 5A 01
06B80   24 00 90 03 5A 01 12 00 CA 04 FF FF 7C 4F 4E 00
06B90   4F 46 46 00 01 00 5A 01 12 00 DC 04 FF FF 7C 57
06BA0   49 4E 44 4F 57 00 01 00 5A 01 12 00 EE 04 FF FF
06BB0   7C 57 49 4E 44 4F 57 00 01 00 5A 01 7E 00 90 03
06BC0   5A 01 90 00 06 05 FF FF 7C 4F 4E 00 01 00 5A 01
06BD0   A2 00 0E 04 5A 01 B4 00 1A 05 FF FF 7C 42 4C 49
06BE0   4E 4B 00 01 5A 01 12 00 2A 05 FF FF 7C 57 49 4E
06BF0   44 4F 57 00 01 00 5A 01 A2 00 00 00 5A 01 B4 00
06C00   00 00 5A 01 12 00 48 05 FF FF 7C 53 43 52 45 45
06C10   4E 00 01 00 5A 01 12 00 5A 05 FF FF 7C 53 43 52
06C20   45 45 4E 00 01 00 5A 01 12 00 6C 05 FF FF 7C 50
06C30   41 52 00 01 5A 01 12 00 7A 05 FF FF 7C 50 41 52
06C40   00 01 5A 01 24 00 88 05 FF FF 7C 4F 4E 00 4F 46
06C50   46 00 53 43 52 4F 4C 4C 00 4E 55 4C 4C 00 01 00
06C60   5A 01 36 00 A6 05 FF FF 7C 4F 4E 00 4F 46 46 00
06C70   01 00 5A 01 12 00 B8 05 FF FF 7C 57 49 4E 44 4F
06C80   57 00 01 00 00 01 FF FF 5A 01 36 00 90 03 5A 01
06C90   48 00 D4 05 FF FF 7C 4F 4E 00 01 00 5A 01 5A 00
06CA0   0E 04 5A 01 6C 00 E8 05 FF FF 7C 42 4C 49 4E 4B
06CB0   00 01 00 01 00 00 00 01 01 00 5A 01 12 00 00 06
06CC0   FF FF 7C 43 55 52 53 4F 52 00 01 00 5A 01 12 00
06CD0   12 06 FF FF 7C 57 49 4E 44 4F 57 00 01 00 5A 01
06CE0   36 00 90 03 5A 01 48 00 2A 06 FF FF 7C 4F 4E 00
06CF0   01 00 5A 01 5A 00 0E 04 00 00 00 00 00 00 00 00
06D00   69 62 6D 63 6F 6E 73 6C 2E 62 69 6E 00 00 00 00
06D10   0C 43 4F 4E 49 4E 49 54 00 00 26 01 0C 43 4F 4E
06D20   52 53 54 52 00 00 30 01 0E 44 45 46 57 49 4E 44
06D30   4F 57 00 00 36 01 0E 53 45 4C 57 49 4E 44 4F 57
06D40   00 00 46 01 10 43 4C 45 41 52 57 49 4E 44 4F 57
06D50   00 00 4E 01 0F 44 52 41 57 57 49 4E 44 4F 57 00
06D60   00 56 01 0D 52 45 41 44 4C 49 4E 45 00 00 66 01
06D70   0B 53 43 52 45 45 4E 00 00 76 01 0A 43 4F 4C 4F
06D80   52 00 00 7E 01 0B 4C 4F 43 41 54 45 00 00 02 01
06D90   0B 43 55 52 43 4F 4C 00 00 12 01 0B 43 55 52 52
06DA0   4F 57 00 00 1C 01 0F 53 41 56 45 53 43 52 45 45
06DB0   4E 00 00 86 01 0F 52 45 53 54 53 43 52 45 45 4E
06DC0   00 00 98 01 0D 53 41 56 45 50 41 52 41 00 00 AA
06DD0   01 0D 52 45 53 54 50 41 52 41 00 00 BB 01 0A 49
06DE0   4E 4B 45 59 00 00 C4 01 0A 57 49 44 54 48 00 00
06DF0   CC 01 11 47 45 54 43 55 52 57 49 4E 44 4F 57 00
06E00   00 D6 01 0E 47 45 54 53 43 52 45 45 4E 00 00 DE
```

| | | | | | | | | | | | | | | | | |
|---|---|---|---|---|---|---|---|---|---|---|---|---|---|---|---|---|
| 06E10 | 01 | 00 | 54 | 01 | 25 | 04 | 05 | 00 | 01 | 00 | 01 | 00 | 01 | 00 | 01 | 00 |
| 06E20 | 01 | 00 | 54 | 01 | F2 | 04 | 02 | 00 | 01 | 00 | 01 | 00 | 54 | 01 | 1C | 05 |
| 06E30 | 02 | 00 | 01 | 00 | 01 | 00 | 54 | 01 | 64 | 02 | 02 | 00 | 01 | 00 | 01 | 00 |
| 06E40 | 54 | 01 | 1D | 04 | 00 | 00 | 54 | 01 | B0 | 15 | 05 | 00 | 01 | 00 | 01 | 00 |
| 06E50 | 01 | 00 | 01 | 00 | 01 | 00 | 54 | 01 | 86 | 16 | 01 | 00 | 01 | 00 | 54 | 01 |
| 06E60 | 52 | 16 | 01 | 00 | 01 | 00 | 54 | 01 | 2A | 19 | 05 | 00 | 01 | 00 | 01 | 00 |
| 06E70 | 01 | 00 | 01 | 00 | 01 | 00 | 54 | 01 | D9 | 1A | 05 | 00 | 01 | 00 | 01 | 00 |
| 06E80 | 01 | 00 | 01 | 00 | 03 | 00 | 54 | 01 | 12 | 17 | 01 | 00 | 01 | 00 | 54 | 01 |
| 06E90 | F1 | 16 | 01 | 00 | 01 | 00 | 54 | 01 | 91 | 17 | 06 | 00 | 01 | 00 | 01 | 00 |
| 06EA0 | 01 | 00 | 01 | 00 | 01 | 00 | 01 | 00 | 54 | 01 | BF | 17 | 06 | 00 | 01 | 00 |
| 06EB0 | 01 | 00 | 01 | 00 | 01 | 00 | 01 | 00 | 01 | 00 | 54 | 01 | ED | 17 | 04 | 00 |
| 06EC0 | 01 | 00 | 01 | 00 | 01 | 00 | 01 | 00 | 54 | 01 | 0F | 18 | 03 | 00 | 01 | 00 |
| 06ED0 | 01 | 00 | 01 | 00 | 54 | 01 | 40 | 07 | 01 | 00 | 03 | 00 | 54 | 01 | 6F | 07 |
| 06EE0 | 02 | 00 | 01 | 00 | 01 | 00 | 54 | 01 | 82 | 07 | 01 | 00 | 01 | 00 | 54 | 01 |
| 06EF0 | 8E | 07 | 03 | 00 | 01 | 00 | 01 | 00 | 01 | 00 | 0D | 00 | 04 | 0E | 31 | 06 |
| 06F00 | 6E | 2F | C7 | 00 | 04 | 0E | 0A | 06 | 70 | 00 | 53 | FF | 00 | F0 | 3C | 01 |
| 06F10 | D5 | 0B | BC | 04 | 9D | 1D | CB | 0E | 9D | 1D | 00 | 00 | 00 | 00 | 22 | 02 |
| 06F20 | 20 | 02 | 32 | 03 | 36 | 07 | 30 | 0B | 2E | 34 | 70 | 19 | 67 | 22 | 6D | 32 |
| 06F30 | 0D | 1C | 77 | 11 | 32 | 03 | 36 | 07 | 30 | 0B | 0D | 1C | 6D | 32 | 61 | 1E |
| 06F40 | 6B | 25 | 65 | 12 | 20 | 39 | 70 | 19 | 72 | 13 | 6F | 18 | 67 | 22 | 72 | 13 |
| 06F50 | 61 | 1E | 6C | 26 | 08 | 0E | 6D | 32 | 20 | 39 | 22 | 28 | 74 | 14 | 77 | 11 |
| 06F60 | F5 | 01 | 64 | 00 | 3C | 43 | 01 | 9A | 40 | 2E | 25 | 00 | 00 | 00 | 00 | 00 |
| 06F70 | 00 | E9 | E5 | 00 | FA | 8C | 16 | 57 | 02 | 89 | 26 | 59 | 02 | 2B | C0 | 8E |
| 06F80 | C0 | C7 | 06 | EE | 01 | 31 | 06 | 8C | 0E | F0 | 01 | B8 | A8 | 05 | 26 | 87 |
| 06F90 | 06 | 24 | 00 | A3 | EA | 01 | 8C | C8 | 26 | 87 | 06 | 26 | 00 | A3 | EC | 01 |
| 06FA0 | B8 | E2 | 06 | 26 | 87 | 06 | 58 | 00 | A3 | F2 | 01 | 8C | C8 | 26 | 87 | 06 |
| 06FB0 | 5A | 00 | A3 | F4 | 01 | B8 | 0D | 04 | 26 | 87 | 06 | 6C | 00 | A3 | F6 | 01 |
| 06FC0 | 26 | A1 | 6E | 00 | A3 | F8 | 01 | 26 | 8C | 0E | 6E | 00 | BF | 70 | 00 | B8 |
| 06FD0 | EC | 07 | 26 | 87 | 05 | 2E | A3 | FA | 01 | 8C | C8 | 26 | 87 | 45 | 02 | 2E |
| 06FE0 | A3 | FC | 01 | B8 | 3C | 06 | 26 | 87 | 06 | 8C | 00 | A3 | FE | 01 | 26 | A1 |
| 06FF0 | 8E | 00 | A3 | 00 | 02 | 26 | 8C | 0E | 8E | 00 | 1E | B8 | 00 | F0 | 8E | D8 |
| 07000 | 80 | 3E | FE | FF | FD | 1F | 75 | 17 | B8 | 13 | 04 | 26 | 87 | 06 | 40 | 00 |
| 07010 | A3 | 0A | 02 | 26 | A1 | 42 | 00 | A3 | 0C | 02 | 26 | 8C | 0E | 42 | 00 | B8 |
| 07020 | 6D | 05 | 36 | 87 | 06 | 12 | 03 | A3 | 02 | 02 | 36 | A1 | 14 | 03 | A3 | 04 |
| 07030 | 02 | 36 | 8C | 0E | 14 | 03 | B8 | 73 | 03 | 36 | 87 | 06 | DE | 02 | A3 | 06 |
| 07040 | 02 | 36 | A1 | E0 | 02 | A3 | 08 | 02 | 36 | 8C | 0E | E0 | 02 | C7 | 06 | 10 |
| 07050 | 02 | 12 | 02 | C7 | 06 | 0E | 02 | 14 | 02 | 55 | B8 | 03 | 00 | CD | 10 | 5D |
| 07060 | C5 | 5E | B8 | 8B | 1F | 2E | 89 | 1E | 54 | 02 | C5 | 5E | A6 | 8B | 1F | 2E |
| 07070 | 89 | 1E | 50 | 02 | 2E | 8E | 1E | 54 | 02 | 8B | 1F | 2E | 89 | 1E | 52 | 02 |
| 07080 | F8 | FB | CB | 2B | C0 | 8E | C0 | 2E | A1 | EA | 01 | 26 | A3 | 24 | 00 | 2E |
| 07090 | A1 | EC | 01 | 26 | A3 | 26 | 00 | 2E | A1 | F2 | 01 | 26 | A3 | 58 | 00 | 2E |
| 070A0 | A1 | F4 | 01 | 26 | A3 | 5A | 00 | 2E | A1 | 02 | 02 | 36 | A3 | 12 | 03 | 2E |
| 070B0 | A1 | 04 | 02 | 36 | A3 | 14 | 03 | 2E | A1 | F6 | 01 | 26 | A3 | 6C | 00 | 2E |
| 070C0 | A1 | F8 | 01 | 26 | A3 | 6E | 00 | 1E | B8 | 00 | F0 | 8E | D8 | 80 | 3E | FE |
| 070D0 | FF | FD | 75 | 0E | 2E | C5 | 06 | 0A | 02 | 26 | A3 | 40 | 00 | 26 | 8C | 1E |
| 070E0 | 42 | 00 | 1F | FA | BF | 70 | 00 | 2E | A1 | FA | 01 | 26 | 89 | 05 | 2E | A1 |
| 070F0 | FC | 01 | 26 | 89 | 45 | 02 | FB | 2E | A1 | FE | 01 | 26 | A3 | 8C | 00 | 2E |
| 07100 | A1 | 00 | 02 | 26 | A3 | 8E | 00 | 2E | A1 | 06 | 02 | 36 | A3 | DE | 02 | 2E |
| 07110 | A1 | 08 | 02 | 36 | A3 | E0 | 02 | B8 | 03 | 00 | CD | 10 | CF | 2E | FE | 06 |
| 07120 | 5B | 02 | CF | 55 | FC | 9C | 2E | FF | 1E | 0A | 02 | 5D | CF | 9C | 36 | FF |
| 07130 | 1E | DE | 02 | F8 | CB | 2E | C5 | 3E | 52 | 02 | C4 | 5E | 82 | 26 | 8A | 17 |
| 07140 | 88 | 55 | 15 | C4 | 9E | 70 | FF | 26 | 8A | 37 | 80 | FA | FF | 75 | 05 | 8A |
| 07150 | 55 | 0E | FE | C2 | 80 | FE | FF | 75 | 05 | 8A | 75 | 0F | FE | C6 | FE | CE |
| 07160 | FE | CA | 3A | 55 | 04 | 77 | 65 | 3A | 75 | 05 | 77 | 60 | E8 | D8 | 0C | C4 |
| 07170 | 5E | A6 | 26 | 8B | 07 | 3D | FF | 00 | 74 | 1F | 25 | 1F | 00 | 88 | 45 | 13 |
| 07180 | C4 | 5E | B8 | 26 | 8B | 07 | 3D | FF | 00 | 75 | 08 | 8A | 45 | 13 | 88 | 45 |
| 07190 | 12 | EB | 06 | 25 | 1F | 00 | 88 | 45 | 12 | 8A | 45 | 06 | C4 | 5E | 94 | 26 |
| 071A0 | 8A | 27 | 80 | FC | FF | 74 | 0E | 80 | E4 | 01 | F6 | C4 | 01 | 75 | 04 | 0C |
| 071B0 | 20 | EB | 02 | 24 | DF | A8 | 40 | 75 | 0E | A8 | 20 | 74 | 07 | 50 | E8 | AD |
| 071C0 | 0C | 58 | E8 | 03 | E8 | 32 | 0D | F8 | 88 | 45 | 06 | CB | F9 | B8 | D2 | 02 |
| 071D0 | CB | F9 | CB | 8B | 56 | 08 | FE | CE | FE | CA | 2E | C5 | 3E | 52 | 02 | 3A |
| 071E0 | 55 | 04 | 77 | 0E | 3A | 75 | 05 | 77 | 09 | E8 | 5B | 0C | 9C | 36 | FF | 1E |
| 071F0 | 96 | 02 | 81 | 4E | 1A | 00 | 08 | C7 | 46 | 14 | D6 | 02 | 9C | 36 | FF | 1E |
| 07200 | 96 | 02 | C5 | 5E | A6 | 8B | 1F | C5 | 76 | B8 | 8E | 1C | B4 | 01 | 9C | 36 |
| 07210 | FF | 1E | 12 | 03 | 70 | 04 | 89 | 17 | F8 | CB | F9 | CB | E8 | 1F | 0C | 2A |

```
07220   F6 FE C2 89 56 08 9C 36 FF 1E 96 02 C5 5E A6 8B
07230   1F C5 76 B8 8E 1C B4 00 9C 36 FF 1E 12 03 EB D4
07240   E8 FB 08 8A D6 2A F6 FE C2 89 56 08 9C 36 FF 1E
07250   96 02 14 30 05 0C 05 ED 15 9A 16 57 19 05 17 13
07260   15 43 14 69 16 3E 1B 64 12 3D 14 C3 04 2C 18 64
07270   18 B8 18 FE 18 4D 17 02 15 26 17 9A 05 9C 36 FF
07280   1E 92 02 51 56 0E 1F BB 43 05 3A 67 FF 77 0B 2A
07290   C0 86 C4 D0 E0 03 D8 2E FF 27 C7 46 14 CF 02 81
072A0   4E 1A 00 08 9C 36 FF 1E 96 02 8C 4E 12 C7 46 06
072B0   EA 01 9C 36 FF 1E 96 02 FB 9C 0E 55 50 55 8B EC
072C0   B8 31 06 89 46 04 5D 58 2E FF 2E EA 01 1E 50 B8
072D0   00 F0 8E D8 80 3E FE FF FD 75 0D B8 40 00 8E D8
072E0   B0 F0 20 06 17 00 E4 A0 58 2E 8E 1E 57 02 F7 06
072F0   90 02 01 00 75 34 81 26 90 02 FB FF 1F 2B C9 2E
07300   89 0E 5B 02 2E C7 06 10 02 12 02 2E C7 06 0E 02
07310   14 02 2E 8E 16 57 02 2E 8B 26 59 02 50 E4 21 24
07320   FD E6 21 58 9C 36 FF 1E D6 02 2E C6 06 5B 02 00
07330   81 0E 90 02 04 00 1F CF 5B 9C 0E 53 2E FF 2E F2
07340   01 2E 80 3E 5B 02 00 75 84 E8 01 00 CF 50 E4 21
07350   0C 02 E6 21 B4 01 53 E8 DE FF 5B 74 19 53 2A E4
07360   E8 D5 FF 5B 22 C0 75 16 80 FC 72 75 11 2E 80 36
07370   5C 02 01 58 EB D7 E4 21 24 FD E6 21 58 C3 53 1E
07380   8C CB 8E DB FA 8B 1E 0E 02 3B 1E 10 02 74 17 89
07390   07 43 43 81 FB 4E 02 76 03 BB 12 02 89 1E 0E 02
073A0   1F 5B 58 FB EB A7 F6 06 5D 02 FF 75 F3 C6 06 5D
073B0   02 FF FB 51 B3 40 B7 02 E4 61 50 2A E4 24 FC E6
073C0   61 B9 A0 00 32 CC E2 FE 0C 02 E6 61 B9 A0 00 32
073D0   CC E2 FE FE CB 75 E6 FE CF 74 0C B3 20 80 F4 50
073E0   75 DB 80 F3 60 EB D6 58 E6 61 59 C6 06 5D 02 00
073F0   EB AE E8 58 FF 53 1E 8C CB 8E DB FB 0A E4 74 0B
07400   FE CC 74 28 FE CC 74 40 1F 5B CF 8B 1E 10 02 43
07410   43 81 FB 4E 02 76 03 BB 12 02 E8 30 FF 3B 1E 0E
07420   02 74 F7 8B 07 89 1E 10 02 1F 5B CF 8B 1E 10 02
07430   43 43 81 FB 4E 02 76 03 BB 12 02 3B 1E 0E 02 74
07440   02 8B 07 1F 5B CA 02 00 1F B4 02 E8 EA FE 5B CF
07450   C4 5E B8 26 C7 07 00 00 B4 01 CD 16 74 1F 2A E4
07460   CD 16 C4 5E B8 26 C7 07 01 00 0A C0 75 05 26 C7
07470   07 02 00 C4 5E B2 26 88 07 26 88 67 FF F8 CB C5
07480   7E B8 8B 0D C5 7E A6 8B 1D B4 08 9C 36 FF 1E E2
07490   02 CB C5 7E B8 2E A0 56 02 2A E4 89 05 CB C5 5E
074A0   94 8A 37 C5 5E A6 8A 17 FE CE FE CA 2E C5 3E 52
074B0   02 3A 55 04 77 41 3A 75 05 77 3C 03 15 52 B4 03
074C0   2B DB CD 10 58 52 8B D0 B4 02 CD 10 B4 08 55 CD
074D0   10 5D 50 B4 0F CD 10 5A C5 5E B8 3C 07 74 04 3C
074E0   04 73 07 83 3F 00 74 02 86 D6 2A F6 89 17 5A 2B
074F0   DB B4 02 CD 10 F8 CB B8 D2 02 F9 CB 50 53 1E 0E
07500   1F FA 2E 8E 1E 57 02 F7 06 90 02 04 00 74 25 F7
07510   06 90 02 01 00 75 1D B0 20 E6 20 36 81 26 90 02
07520   FA FF 2E 8E 16 57 02 2E 8B 26 59 02 2B C9 9C 36
07530   FF 1E D6 02 FB 1F 5B 58 2E FF 2E FA 01 00 00 00
07540   00 50 51 53 52 2B C0 2B C9 8A 47 01 8A D0 03 C8
07550   3A 55 04 7E 7F F6 45 06 04 75 35 F6 07 04 74 0A
07560   83 C3 03 FE C6 3A 75 05 7E DF 3A 75 05 72 48 52
07570   53 55 8B EC 8B 56 06 8B 5E 08 22 F6 74 15 F6 45
07580   06 04 75 0F F6 07 02 74 2B 83 EB 03 FE CE EB EA
07590   52 53 55 BB 80 00 E4 61 B9 80 01 E6 61 E2 FE 34
075A0   02 4B 75 F4 24 FD E6 61 5D 5B 5A 5A 5B 59 58 83
075B0   C4 02 5A C3 5D 5B 5A 83 C3 03 FE C6 B2 00 E8 EE
075C0   07 50 B8 75 00 E8 9A 02 80 4D 06 01 58 C6 07 03
075D0   80 4F FD 04 FE 47 01 58 98 2B C8 7E 3B 51 FE CA
075E0   80 FA 00 7D 05 FE CE 8A 55 04 E8 5A 08 2B DB E8
075F0   33 09 FE C2 3A 55 04 7E 04 FE C6 B2 00 E8 47 08
07600   B9 01 00 8A 5D 08 E8 23 09 FE CA 80 FA 00 7D 05
07610   FE CE 8A 55 04 59 E2 C5 E8 2C 08 2B DB B9 01 00
07620   8A 5D 08 B0 20 E8 04 09 5B 59 8A C6 B4 03 F6 E4
```

```
07630    8D 5D 19 03 D8 58 C3 08 51 52 E8 01 08 92 2A E4
07640    2E F6 36 27 09 2B C9 2E 8A 0E 27 09 2A CC E3 0C
07650    00 4D 15 51 B0 20 E8 32 00 59 E2 F7 5A 59 E9 30
07660    01 F6 07 08 75 15 50 B8 75 00 E8 F5 01 58 E8 85
07670    01 2E C6 06 5E 02 00 5A E9 16 01 2E C6 06 5E 02
07680    00 5A C3 E9 0C 01 2E FE 06 5E 02 3C 09 74 A9 2E
07690    F7 06 5C 02 01 00 74 17 3C 0A 74 13 B4 05 8A D0
076A0    CD 21 80 FA 0D 75 08 B4 05 B2 0A CD 21 B0 0D 52
076B0    E8 AA 07 3C 0D 74 CC 3C 0A 74 C8 F6 07 08 75 BB
076C0    2A E4 22 D2 75 22 F6 45 10 FF 74 1C 3A 75 11 75
076D0    17 E8 DB 06 F6 07 08 75 A2 50 B8 75 00 E8 82 01
076E0    58 C6 07 03 80 4F FD 04 C6 45 10 00 F6 07 01 75
076F0    1D 2A C9 88 4F 01 80 27 F7 80 0F 01 EB 10 90 3A
07700    57 01 7C 07 FE C2 88 57 01 FE CA EB 24 90 F6 45
07710    06 01 74 03 E8 2A FE 2E F6 06 5E 02 FF 74 E0 FE
07720    C2 3A 57 01 7E 03 88 57 01 FE CA 2E C6 06 5E 02
07730    00 E8 13 07 53 2B DB 8A 5D 08 B9 01 00 E8 EC 07
07740    5B FE 45 0E 8B 55 0E 3A 55 04 7E 2A F6 07 04 75
07750    03 FE 45 10 FE C6 2A D2 36 F7 06 90 02 02 00 75
07760    08 3A 57 05 73 03 88 57 05 8A 45 04 3A 47 01 77
07770    16 88 75 11 EB 11 36 F7 06 90 02 02 00 75 08 3A
07780    57 02 73 03 88 57 02 E8 BD 06 2E C6 06 5E 02 00
07790    5A C3 80 65 06 FE F6 07 08 74 07 C6 45 10 00 80
077A0    27 F7 2E F6 06 5E 02 FF 74 CC 3C 0D 74 2B 53 F6
077B0    45 10 FF 74 10 38 75 11 75 0B C6 45 10 00 5B 83
077C0    EB 03 53 FE CE E8 2E 00 5B 2E C6 06 5E 02 00 FE
077D0    C6 83 C3 03 E8 D8 05 EB 9D 36 F7 06 90 02 02 00
077E0    74 0D 52 50 B8 75 00 E8 78 00 80 0F 01 58 5A 2A
077F0    D2 EB 83 83 EB 03 B2 00 F6 07 02 75 F6 C3 00 00
07800    00 00 9C 0E 50 55 8B EC 06 2B C0 8E C0 26 A1 0C
07810    00 2E A3 EE 0A 26 A1 0E 00 2E A3 F0 0A 07 B8 1B
07820    0B 87 46 02 5D 2E FF 2E EE 0A 90 90 59 EB 6E 90
07830    77 76 75 74 73 53 52 50 4F 4D 4B 48 47 08 84 49
07840    10 00 A4 0D F2 0A 61 0F 2E 0D 68 0D 20 0E 67 0E
07850    B7 0E E1 0E 27 0F 32 0F 95 0B C3 0B 5D 0C A2 0C
07860    D6 0C 55 53 51 52 56 57 06 0E 07 2E 8B 0E 30 0B
07870    BF 20 0B FC F2 AE 75 25 8B C1 D1 E0 8D 1E 32 0B
07880    03 D8 2E 8B 07 E8 D5 05 3D 27 0F 90 74 0A 3D 61
07890    0F 90 74 04 80 65 06 FE FF D0 E8 AA 05 07 5F 5E
078A0    5A 59 5B 5D C3 06 8C D8 8E C0 FC E8 99 05 E8 72
078B0    00 74 07 E8 87 00 72 11 EB F1 E8 80 00 72 0A E8
078C0    85 05 E8 5E 00 75 30 EB F1 07 3A 57 02 73 03 88
078D0    57 02 C3 06 8C D8 8E C0 FC E8 6B 05 E8 44 00 74
078E0    07 E8 72 00 72 11 EB F1 E8 6B 00 72 0A E8 57 05
078F0    E8 30 00 75 02 EB F1 07 3A 57 02 73 03 88 57 02
07900    C3 20 22 21 28 29 2D 3D 2B 5D 7D 5B 7B 3B 3A 60
07910    7E 2F 3F 2E 3E 2C 3C 7C 23 40 24 5E 26 2A 5C 25
07920    00 20 00 57 06 53 2B DB E8 FA 05 5B 2E 8B 0E 11
07930    0C 8C CF 8E C7 BF F1 0B F2 AE 07 5F C3 80 FA 00
07940    74 04 FE CA 79 0C 22 F6 74 0A FE CE 83 EB 03 8A
07950    57 01 F8 C3 F9 C3 FE C2 3A 57 01 7C 0C 3A 75 05
07960    74 09 FE C6 83 C3 03 2A D2 F8 C3 F9 C3 F6 45 10
07970    FF 74 06 38 75 11 75 01 C3 F6 07 08 74 01 C3 52
07980    8B CA FF 37 53 F6 07 04 9C 53 88 4F 01 8A 55 04
07990    2B DB 8A 7D 07 B0 00 E8 A7 05 5B FE C5 8A F5 B1
079A0    00 88 0F 83 C3 03 9D 75 DC 5B 5A 80 E2 0B 88 17
079B0    5A C3 53 E8 B7 FF 5B 52 3A 75 05 7D F3 83 C3 03
079C0    FE C6 2A D2 8B CA 51 2B C9 8A 4D 05 2A CE 53 2B
079D0    C0 88 07 B0 00 88 47 01 E3 05 83 C3 03 E2 F0 5B
079E0    59 8A 75 05 EB 9C B4 02 CD 16 24 03 74 42 B4 03
079F0    BB 01 00 9C 36 FF 1E 12 03 E8 61 04 8A 45 06 A8
07A00    C0 74 02 B0 80 88 45 06 B8 07 00 88 45 07 88 45
07A10    08 88 45 09 88 65 0A 88 65 0B 88 65 0C 88 65 0D
07A20    BA 00 00 B9 4F 17 B3 01 B4 02 9C 36 FF 1E 12 03
07A30    BA 00 00 8B CA 51 E8 0E 04 E8 21 04 EB 88 BA 00
```

| | | | | | | | | | | | | | | | | |
|---|---|---|---|---|---|---|---|---|---|---|---|---|---|---|---|---|
| 07A40 | 00 | E8 | 03 | 04 | E8 | 16 | 04 | 2A | C0 | 3A | 45 | 04 | 7D | 1E | 3A | 57 |
| 07A50 | 01 | 7E | 03 | 8A | 57 | 01 | 0A | D2 | 75 | 00 | 3A | 55 | 04 | 7D | 0D | 36 |
| 07A60 | F7 | 06 | 90 | 02 | 02 | 00 | 75 | 03 | 88 | 57 | 02 | C3 | 83 | C3 | 03 | FE |
| 07A70 | C6 | EB | D4 | E8 | D1 | 03 | 5A | C3 | 22 | F6 | 74 | C2 | 83 | EB | 03 | FE |
| 07A80 | CE | 2A | C0 | 3A | 45 | 04 | 7D | F0 | 80 | 7F | 01 | 00 | 74 | 1A | 3A | 57 |
| 07A90 | 01 | 7E | 03 | 8A | 57 | 01 | 36 | F7 | 06 | 90 | 02 | 02 | 00 | 75 | 08 | 3A |
| 07AA0 | 57 | 02 | 73 | 03 | 88 | 57 | 02 | C3 | 2A | D2 | EB | EA | C3 | 5A | 36 | 8F |
| 07AB0 | 06 | 90 | 02 | C3 | 22 | F6 | 74 | F4 | F6 | 45 | 06 | 04 | 75 | EE | 36 | FF |
| 07AC0 | 36 | 90 | 02 | 36 | 81 | 0E | 90 | 02 | 01 | 00 | 52 | F6 | 47 | FD | 04 | 74 |
| 07AD0 | 09 | FE | CE | 74 | D8 | 83 | EB | 03 | EB | F1 | 83 | C4 | 02 | 06 | 57 | 56 |
| 07AE0 | 52 | 51 | 1E | 07 | B0 | 03 | F6 | E6 | 8B | FB | 2B | F8 | 8B | F7 | 83 | C6 |
| 07AF0 | 03 | 6A | CE | 2A | ED | FC | E3 | 09 | 51 | B9 | 03 | 00 | F3 | A4 | 59 | E2 |
| 07B00 | F7 | 59 | 5A | 5E | 5F | 07 | 52 | 53 | FE | CE | 8A | 55 | 04 | 2B | DB | 2B |
| 07B10 | C9 | 8A | 7D | 07 | B0 | 01 | E8 | 28 | 04 | 5B | 5A | 2A | D2 | 36 | 8F | 06 |
| 07B20 | 90 | 02 | FE | CE | 83 | EB | 03 | 88 | 17 | 88 | 57 | 02 | 88 | 57 | 01 | C3 |
| 07B30 | 0A | D2 | 74 | 14 | FE | CA | 36 | F7 | 06 | 90 | 02 | 02 | 00 | 75 | 08 | 3A |
| 07B40 | 57 | 02 | 73 | 03 | 88 | 57 | 02 | C3 | B0 | 00 | 80 | 7D | 10 | 00 | 74 | 05 |
| 07B50 | 3A | 75 | 11 | 74 | 0B | F6 | 07 | 02 | 74 | ED | F6 | 47 | FD | 04 | 74 | E7 |
| 07B60 | FE | CE | 8A | 55 | 04 | 36 | F7 | 06 | 90 | 02 | 02 | 00 | 75 | 08 | 3A | 57 |
| 07B70 | FF | 73 | 03 | 88 | 57 | FF | C3 | 3A | 55 | 04 | 7D | 03 | FE | C2 | C3 | F6 |
| 07B80 | 07 | 04 | 75 | 20 | 80 | 7D | 10 | 00 | 75 | 11 | 3A | 55 | 04 | 72 | 2A | FE |
| 07B90 | 45 | 10 | FE | C6 | 88 | 75 | 11 | 2A | D2 | EB | 0D | 8A | 4D | 11 | FE | C9 |
| 07BA0 | 3A | F1 | 75 | 15 | FE | C6 | B2 | 00 | 36 | F7 | 06 | 90 | 02 | 02 | 00 | 75 |
| 07BB0 | 08 | 3A | 57 | 05 | 73 | 03 | 88 | 57 | 05 | C3 | E9 | BB | FE | 3A | 75 | 05 |
| 07BC0 | 7D | 0A | FE | C6 | 83 | C3 | 03 | F6 | 07 | 04 | 75 | F1 | 8A | 57 | 01 | 3A |
| 07BD0 | 55 | 04 | 72 | 14 | FE | 45 | 10 | FE | C6 | 88 | 75 | 11 | 2A | D2 | 3A | 57 |
| 07BE0 | 05 | 73 | 0D | 88 | 57 | 05 | EB | 08 | 3A | 57 | 02 | 73 | 03 | 88 | 57 | 02 |
| 07BF0 | C3 | 83 | C3 | 03 | FE | C6 | 3A | 75 | 05 | 7F | BF | 2A | C0 | 3A | 45 | 04 |
| 07C00 | 7D | EF | 36 | F7 | 06 | 90 | 02 | 02 | 00 | 75 | 08 | 3A | 57 | 02 | 73 | 03 |
| 07C10 | 88 | 57 | 02 | 80 | 7F | 01 | 00 | 74 | 1A | 3A | 57 | 01 | 7E | 03 | 8A | 57 |
| 07C20 | 01 | 36 | F7 | 06 | 90 | 02 | 02 | 00 | 75 | 08 | 3A | 57 | 02 | 73 | 03 | 88 |
| 07C30 | 57 | 02 | C3 | 2A | D2 | EB | EA | 80 | 75 | 06 | 01 | F6 | 45 | 06 | 01 | 75 |
| 07C40 | 00 | C3 | C6 | 45 | 10 | 00 | 36 | F7 | 06 | 90 | 02 | 02 | 00 | 75 | 08 | 3A |
| 07C50 | 57 | 02 | 73 | 03 | 88 | 57 | 02 | 3A | 57 | 01 | 7D | 13 | E8 | 55 | 00 | 52 |
| 07C60 | 8B | C2 | 2A | F6 | 2B | CA | 49 | 92 | E8 | 7E | 00 | 5A | E8 | D8 | 01 | EB |
| 07C70 | D0 | 0A | D2 | 74 | 09 | 3A | 57 | 01 | 7F | 34 | FE | CA | EB | C4 | 22 | F6 |
| 07C80 | 74 | 2C | B0 | 00 | F6 | 07 | 02 | 75 | 0F | 80 | 7D | 10 | 00 | 74 | 1F | 3A |
| 07C90 | 75 | 11 | 75 | 1A | C6 | 45 | 10 | 00 | 38 | 47 | 01 | 75 | 07 | C6 | 07 | 00 |
| 07CA0 | 80 | 67 | FD | FB | FE | CE | 8A | 55 | 04 | 83 | EB | 03 | EB | 94 | C6 | 45 |
| 07CB0 | 10 | 00 | EB | BB | 2B | C0 | 2B | C9 | 8A | 4F | 01 | 8B | F3 | F6 | 04 | 04 |
| 07CC0 | 74 | 0A | 83 | C6 | 03 | 8A | 44 | 01 | 03 | C8 | EB | F1 | FE | 4C | 01 | 8A |
| 07CD0 | 44 | 01 | 3C | 00 | 75 | 12 | F6 | 04 | 02 | 74 | 0D | 80 | 64 | FD | FB | C6 |
| 07CE0 | 04 | 00 | FE | 45 | 10 | 88 | 75 | 11 | C3 | 51 | E3 | 4E | 2B | C0 | 8A | 45 |
| 07CF0 | 04 | 40 | 2A | C2 | 3B | C1 | 7D | 02 | 8A | C8 | 2A | ED | 5E | 2B | F1 | 56 |
| 07D00 | 51 | FE | C2 | 3A | 55 | 04 | 7E | 04 | FE | C6 | B2 | 00 | E8 | 38 | 01 | 2B |
| 07D10 | DB | E3 | 11 | 02 | FE | CA | 80 | FA | 00 | 7D | 05 | FE | CE | 8A | 55 | 04 |
| 07D20 | E8 | 24 | 01 | 8A | 5D | 08 | B9 | 01 | 00 | E8 | 00 | 02 | FE | C2 | 3A | 55 |
| 07D30 | 04 | 7E | 04 | FE | C6 | B2 | 00 | 59 | E2 | C6 | EB | 0A | 01 | 2B | DB | 8A |
| 07D40 | 5D | 08 | B0 | 20 | B9 | 01 | 00 | E8 | E2 | 01 | 59 | E3 | 02 | EB | 9A | C3 |
| 07D50 | E9 | 4A | FB | E9 | D9 | 00 | 3A | 75 | 05 | 7E | 2A | 83 | EB | 03 | F6 | 45 |
| 07D60 | 10 | FF | 74 | 03 | 80 | 0F | 08 | C6 | 45 | 10 | 00 | B2 | 00 | 2E | F6 | 06 |
| 07D70 | 5E | 02 | FF | 75 | 0B | 8A | 55 | 04 | F6 | 45 | 10 | FF | 75 | 02 | 2A | D2 |
| 07D80 | FE | CE | E9 | AA | 00 | F6 | 45 | 10 | FF | 74 | 1A | C6 | 45 | 10 | 00 | 22 |
| 07D90 | F6 | 74 | 12 | 83 | EB | 03 | FE | CE | 80 | 0F | 08 | 2A | D2 | 2E | F6 | 06 |
| 07DA0 | 5E | 02 | FF | 75 | 02 | B2 | 00 | E9 | 85 | 00 | 2A | D2 | E9 | 80 | 00 | 51 |
| 07DB0 | 50 | 55 | 36 | FF | 36 | 90 | 02 | F6 | 45 | 06 | 04 | 75 | 99 | 3A | 75 | 05 |
| 07DC0 | 7C | E8 | 74 | 40 | 36 | 81 | 0E | 90 | 02 | 01 | 00 | 06 | 56 | 57 | 8C | DD |
| 07DD0 | 8E | C5 | 8A | E6 | 80 | EC | 00 | 2A | ED | 8A | CC | B0 | 03 | F6 | E4 | 8B |
| 07DE0 | FB | 8B | F3 | 2B | F0 | 2B | F8 | 83 | C6 | 03 | FC | 51 | B9 | 03 | 00 | F3 |
| 07DF0 | A4 | 59 | E2 | F7 | B1 | 00 | 83 | EF | 03 | 88 | 4D | 01 | 88 | 0D | 5F | 5E |
| 07E00 | 07 | EB | 0F | 90 | 36 | 81 | 0E | 90 | 02 | 01 | 00 | B1 | 00 | 88 | 4F | 01 |
| 07E10 | 88 | 0F | 2B | C9 | B0 | 01 | 3A | 75 | 05 | 7F | 04 | 8A | EE | B0 | 00 | 8B |
| 07E20 | 55 | 04 | 2B | DB | 8A | 7D | 07 | E8 | 17 | 01 | 8A | 75 | 05 | B2 | 00 | E8 |
| 07E30 | 15 | 00 | E8 | 28 | 00 | 36 | 8F | 06 | 90 | 02 | 5D | 58 | 59 | C3 | 2E | C5 |
| 07E40 | 3E | 52 | 02 | 8B | 55 | 0E | C3 | 50 | 53 | 2B | DB | 52 | 2E | C5 | 3E | 52 |

| | | | | | | | | | | | | | | | | |
|---|---|---|---|---|---|---|---|---|---|---|---|---|---|---|---|---|
| 07E50 | 02 | 89 | 55 | 0E | 03 | 15 | E8 | 0A | 01 | 5A | 5B | 58 | C3 | E8 | DE | FF |
| 07E60 | 50 | 8A | C6 | B4 | 03 | F6 | E4 | 8D | 5D | 19 | 03 | D8 | 58 | C3 | 1E | 57 |
| 07E70 | 52 | E8 | CA | FF | 03 | 15 | 8A | 45 | 06 | 50 | A8 | 40 | 75 | 12 | 51 | 8B |
| 07E80 | 4D | 12 | 81 | C9 | 00 | 20 | B4 | 01 | CD | 10 | 59 | 58 | 5A | 5F | 1F | C3 |
| 07E90 | E8 | 02 | 00 | EB | F6 | 8A | 45 | 06 | A8 | 80 | 74 | 02 | D0 | E2 | 56 | 51 |
| 07EA0 | 06 | 1E | BB | 00 | B8 | 8E | C3 | 81 | C3 | 00 | 02 | 8E | DB | E8 | 33 | 00 |
| 07EB0 | B9 | 04 | 00 | A8 | 01 | 74 | 07 | B9 | 02 | 00 | 81 | C6 | A0 | 00 | A8 | 80 |
| 07EC0 | 75 | 11 | 26 | 80 | 34 | FF | 80 | 34 | FF | 83 | C6 | 50 | E2 | F4 | 1F | 07 |
| 07ED0 | 59 | 5E | C3 | 26 | 81 | 34 | FF | FF | 81 | 34 | FF | FF | 83 | C6 | 50 | E2 |
| 07EE0 | F2 | EB | EB | 50 | 52 | B8 | 40 | 01 | 8A | D6 | 2A | F6 | F7 | E2 | 5A | 52 |
| 07EF0 | 2A | F6 | 03 | C2 | 8B | F0 | 5A | 58 | C3 | 1E | 57 | 52 | 51 | 50 | E8 | 3D |
| 07F00 | FF | E8 | 43 | FF | 03 | 15 | A8 | 40 | 74 | 09 | E8 | 88 | FF | 58 | 59 | 5A |
| 07F10 | 5F | 1F | C3 | 8B | 4D | 12 | F6 | 45 | 06 | 01 | 74 | 03 | 80 | E5 | F0 | B4 |
| 07F20 | 01 | CD | 10 | EB | E8 | 55 | B4 | 08 | CD | 10 | 5D | C3 | 55 | B4 | 09 | CD |
| 07F30 | 10 | 5D | C3 | 55 | 51 | 52 | EB | 10 | 90 | 00 | 00 | 00 | 00 | 00 | 00 | 00 |
| 07F40 | 00 | 55 | 51 | 52 | 03 | 0D | 03 | 15 | 3A | EE | 75 | 02 | B0 | 00 | B4 | 06 |
| 07F50 | CD | 10 | 5A | 59 | 5D | C3 | 50 | 53 | 51 | 2B | DB | B4 | 03 | CD | 10 | 59 |
| 07F60 | 5B | 58 | C3 | 50 | 53 | 2B | DB | B4 | 02 | CD | 10 | 5B | 58 | C3 | 00 | 00 |
| 07F70 | 22 | 00 | 00 | 00 | E8 | E6 | FE | 8A | 45 | 06 | 2E | A2 | 60 | 12 | 36 | F7 |
| 07F80 | 06 | 90 | 02 | 02 | 00 | 75 | 16 | 53 | 51 | 8D | 5D | 19 | B9 | 19 | 00 | C6 |
| 07F90 | 47 | 02 | 50 | 83 | C3 | 03 | E2 | F7 | 59 | 5B | E8 | 57 | 02 | C7 | 46 | 0A |
| 07FA0 | 00 | 00 | 81 | 66 | FE | FF | 7F | 8B | 76 | FC | 8E | 46 | 08 | 8A | F5 | 80 |
| 07FB0 | E6 | 80 | 2E | A0 | 60 | 12 | E8 | 29 | 00 | E8 | 3D | FF | 52 | B2 | FF | B4 |
| 07FC0 | 06 | CD | 21 | 5A | 74 | F0 | 50 | E8 | A4 | FE | 58 | F6 | C6 | 80 | 74 | 46 |
| 07FD0 | FF | 46 | 0A | 26 | 88 | 04 | 4E | FF | 4E | FE | 75 | D6 | 9C | 36 | FF | 1E |
| 07FE0 | 96 | 02 | 2E | F6 | 06 | 5B | 02 | FF | 74 | 09 | 36 | F7 | 06 | 90 | 02 | 01 |
| 07FF0 | 00 | 74 | 01 | C3 | 2B | C9 | 2E | 88 | 0E | 5B | 02 | 2E | 8E | 16 | 57 | 02 |
| 08000 | 2E | 8B | 26 | 59 | 02 | 36 | 81 | 26 | 90 | 02 | FB | FF | 9C | 36 | FF | 1E |
| 08010 | D6 | 02 | B6 | 01 | EB | 9C | 22 | C0 | 74 | F8 | F6 | C6 | 01 | 74 | 08 | E8 |
| 08020 | 40 | F8 | 80 | E6 | FE | EB | 8B | 3C | 0A | 75 | 02 | B0 | 0D | 3C | 1B | 75 |
| 08030 | 03 | EB | 2C | 90 | 3C | 08 | 74 | 0C | 50 | E8 | 4F | F6 | 58 | 3C | 0D | 74 |
| 08040 | 0F | E9 | 6E | FF | E8 | 1B | F8 | E9 | 68 | FF | 9C | 36 | FF | 1E | 96 | 02 |
| 08050 | E8 | 0A | FE | C6 | 45 | 15 | 00 | E8 | 3D | 00 | E8 | 52 | FD | EB | EB | E8 |
| 08060 | F8 | FD | F6 | 45 | 10 | FF | 74 | 0E | 3A | 75 | 11 | 75 | 09 | C6 | 45 | 10 |
| 08070 | 00 | 83 | EB | 03 | FE | CE | F6 | 07 | 02 | 74 | 0B | 22 | F6 | 74 | 07 | 83 |
| 08080 | EB | 03 | FE | CE | EB | F0 | 2A | D2 | E8 | BC | FD | B8 | 75 | 00 | E8 | D1 |
| 08090 | F7 | 80 | E6 | FE | E9 | 1B | FF | E8 | C3 | FD | 2B | F6 | 89 | 76 | 0A | 8E |
| 080A0 | 46 | 08 | 8B | 76 | FC | F6 | 45 | 10 | FF | 74 | 0E | 3A | 75 | 11 | 75 | 09 |
| 080B0 | C6 | 45 | 10 | 00 | 83 | EB | 03 | FE | CE | F6 | 07 | 02 | 74 | 1A | 36 | F7 |
| 080C0 | 06 | 90 | 02 | 02 | 00 | 75 | 06 | 80 | 7F | FF | 50 | 74 | 0B | 22 | F6 | 74 |
| 080D0 | 07 | 83 | EB | 03 | FE | CE | EB | E1 | 2A | D2 | 36 | F7 | 06 | 90 | 02 | 02 |
| 080E0 | 00 | 75 | 03 | 8A | 57 | 02 | 2B | C9 | 8A | 4D | 04 | FE | C1 | F6 | 07 | 04 |
| 080F0 | 75 | 03 | 8A | 4F | 01 | 53 | 2A | CA | 3B | 4E | FE | 7C | 03 | 8B | 4E | FE |
| 08100 | 29 | 4E | FE | 01 | 4E | 0A | E3 | 16 | E8 | 3C | FD | 2B | DB | E8 | 15 | FE |
| 08110 | 84 | C0 | 75 | 02 | B0 | 20 | 26 | 88 | 04 | 4E | FE | C2 | E2 | EA | 5B | 83 |
| 08120 | C3 | 03 | B2 | 00 | FE | C6 | 3A | 75 | 05 | 7F | 0E | F6 | 47 | FD | 04 | 74 |
| 08130 | 08 | 83 | 7E | FE | 00 | 75 | AF | EB | E6 | 89 | 55 | 0E | C3 | C7 | 46 | 14 |
| 08140 | C7 | 02 | 81 | 4E | 1A | 00 | 08 | 9C | 36 | FF | 1E | 96 | 02 | B8 | 64 | 00 |
| 08150 | EB | 04 | 90 | 8B | 46 | 0C | 2E | FF | 36 | 52 | 02 | 2D | 64 | 00 | 7C | DD |
| 08160 | 2E | 8B | 3E | 50 | 02 | 2E | 8E | 1E | 54 | 02 | 3A | 45 | FF | 77 | CE | D1 |
| 08170 | E0 | 03 | F8 | 8B | 3D | 8A | 45 | 06 | A8 | 02 | 74 | 64 | A8 | 08 | 75 | 55 |
| 08180 | 2E | 89 | 3E | 52 | 02 | 8B | 55 | 0E | E8 | 57 | FE | E8 | B9 | FC | 8E | 46 |
| 08190 | 08 | 8B | 76 | FC | 26 | 8A | 04 | 0A | C0 | 75 | 08 | 2E | C6 | 06 | 63 | 12 |
| 081A0 | FF | EB | 16 | 2E | 80 | 3E | 63 | 12 | 00 | 74 | 0B | 2E | C6 | 06 | 63 | 12 |
| 081B0 | 00 | E8 | AE | F6 | EB | 03 | E8 | CD | F4 | FF | 4E | FC | FF | 4E | FE | 75 |
| 081C0 | D0 | 89 | 76 | FC | 2E | 8F | 06 | 52 | 02 | E8 | 72 | FC | E8 | 78 | FC | 9C |
| 081D0 | 36 | FF | 1E | 96 | 02 | 2E | 8F | 06 | 52 | 02 | 9C | 36 | FF | 1E | 96 | 02 |
| 081E0 | C7 | 46 | 14 | C8 | 02 | 81 | 4E | 1A | 00 | 08 | 9C | 36 | FF | 1E | 96 | 02 |
| 081F0 | E9 | EF | FD | 53 | 06 | 8C | CB | 8E | C3 | 2E | 8B | 4D | FE | 2E | 8B | 5D |
| 08200 | FC | FC | F2 | AE | 75 | 09 | D1 | E1 | 03 | D9 | 2E | FF | 17 | 2B | C9 | 07 |

```
08210  5B C3 E8 48 FC 8A 4D 15 2A ED 89 4E 0A 9C 36 FF
08220  1E 96 02 50 8B 76 FC 8E 46 08 26 8A 04 2E F6 06
08230  5F 02 FF 75 3C 22 C0 75 08 2E FE 06 5F 02 EB 21
08240  90 BF 70 15 90 E8 AB FF 74 17 E8 95 FD 50 E8 35
08250  F4 58 3C 0D 75 04 C6 45 15 FF 3C 0A 74 03 FE 45
08260  15 4E FF 4E FE 75 C0 89 76 FC 58 9C 36 FF 1E 96
08270  02 E8 EE F5 2E C6 06 5F 02 00 EB E5 78 15 08 00
08280  07 08 0B 0C 1C 1D 1E 1F 8F 15 94 15 99 15 9E 15
08290  A3 15 A8 15 52 0B 88 15 B4 02 8A D0 CD 21 C3 B0
082A0  50 E9 BE F5 B0 48 E9 B9 F5 B0 4B E9 B4 F5 B0 4D
082B0  E9 AF F5 B0 77 E9 AA F5 B0 47 E9 A5 F5 90 00 00
082C0  C4 5E A6 26 8A 17 C4 5E 94 26 8A 37 C4 5E 82 26
082D0  8A 0F C4 9E 70 FF 26 8A 2F C4 5E B8 26 8B 1F B4
082E0  02 9C 36 FF 1E 12 03 70 02 F8 CB F9 CB 81 4E 1A
082F0  00 08 C7 46 14 C7 02 9C 36 FF 1E 96 02 BF 50 02
08300  2E 8E 1E 54 02 2E 8B 3D 8B 46 0C 3A 45 FF 77 DD
08310  D0 E0 2A E4 03 F8 8B 3D 89 15 89 4D 02 2B CA 89
08320  4D 04 80 4D 06 02 2B C9 8B 55 04 2B DB 8A 7D 07
08330  2B C0 E8 0C FC 8D 5D 19 2B C9 8A 4D 03 2A 4D 01
08340  E3 0A 88 6F 01 88 2F 83 C3 03 E2 F6 2B D2 89 55
08350  0E 2E 8B 3E 52 02 8B 55 0E E8 EB FA 9C 36 FF 1E
08360  96 02 B4 08 C4 5E B8 26 8B 1F 9C 36 FF 1E 12 03
08370  70 02 F8 CB F9 CB E9 74 FF 8B 56 0C BF 50 02 2E
08380  8E 1E 54 02 2E 8B 3D 3A 55 FF 77 EA D0 E2 2A F6
08390  03 FA 8B 3D EB 90 C4 5E B8 26 8B 1F B4 03 9C 36
083A0  FF 1E 12 03 70 02 F8 CB F9 CB 8B 56 0C BF 50 02
083B0  2E 8E 1E 54 02 2E 8B 3D 3A 55 FF 77 B9 2E 88 16
083C0  56 02 D0 E2 2A F6 03 FA 8B 3D 2E 89 3E 52 02 8B
083D0  55 0E E8 72 FA 8A 45 06 A8 40 75 1F A8 20 74 0D
083E0  8B 4D 12 81 C9 00 20 B4 01 CD 10 EB 0E 8B 4D 12
083F0  A8 01 74 03 80 E5 F0 B4 01 CD 10 9C 36 FF 1E 96
08400  02 C4 5E B8 26 8B 1F B4 05 9C 36 FF 1E 12 03 70
08410  02 F8 CB F9 CB 8B 5E 0C B4 0B CD 10 9C 36 FF 1E
08420  96 02 C4 5E B8 26 8B 1F B4 13 9C 36 FF 1E 12 03
08430  70 02 F8 CB F9 CB 8B 46 0C 2A E4 50 CD 10 B4 0F
08440  CD 10 5B 3A D8 75 06 9C 36 FF 1E 96 02 81 4E 1A
08450  00 08 C7 46 14 40 1F 9C 36 FF 1E 96 02 8B 5E 0C
08460  22 FF 74 12 2E C5 3E 52 02 2E 8A 1E 56 02 2A FF
08470  89 5E 0C EB 15 90 BF 50 02 2E 8E 1E 54 02 2E 8B
08480  3D 3A 5D FF 77 10 D1 E3 8B 39 89 7E 04 8C 5E 12
08490  9C 36 FF 1E 96 02 E9 54 FE 90 00 00 00 00 00 00
084A0  00 C5 5E B8 88 3F C5 5E A6 8B 37 C5 5E 94 8A 0F
084B0  C5 5E 82 8A 2F C5 9E 70 FF 8A 17 C5 9E 5E FF 8A
084C0  37 B4 0D 9C 36 FF 1E 12 03 70 02 F8 CB F9 CB C5
084D0  5E B8 8B 3F C5 5E A6 8B 37 C5 5E 94 8A 0F C5 5E
084E0  82 8A 2F C5 9E 70 FF 8A 17 C5 9E 5E FF 8A 37 B4
084F0  0E 9C 36 FF 1E 12 03 70 02 F8 CB F9 CB C5 5E B8
08500  8B 17 C5 5E A6 8B 37 C5 5E 94 8B 0F C5 5E 82 8B
08510  1F B4 0F 9C 36 FF 1E 12 03 70 02 F8 CB F9 CB C5
08520  5E B8 8B 17 C5 5E A6 8B 37 C5 5E 94 8B 1F B4 10
08530  9C 36 FF 1E 12 03 70 02 F8 CB F9 CB FC 8E 46 04
08540  8B 7E 06 E8 05 04 AA 8B C3 AA 8B C1 AA 51 8B CB
08550  F3 A4 2B F3 8B C6 E8 6D 04 8B F0 59 E2 EF 9C 36
08560  FF 1E 96 02 C7 46 14 D5 02 81 4E 1A 00 08 9C 36
08570  FF 1E 96 02 FC E8 D3 03 8B FE 8C DE 8E C6 8E 5E
08580  04 8B 76 06 8A E0 AC 3A E0 74 06 02 C4 3C 0A 75
08590  D3 2B C0 AC 8A F8 2A FB 3A C3 73 02 2A FF AC 3B
085A0  C1 7D 02 8B C8 51 8A CB 2A ED F3 A4 8A CF E3 02
085B0  F3 AC 8B C7 53 2A FF 2B C3 5B E8 09 04 8B F8 59
085C0  E2 E3 9C 36 FF 1E 96 02 FC 8D 0E 64 00 3B 4E 0A
085D0  77 25 8B 5E 0C BF 50 02 2E 8E 1E 54 02 2E 8B 3D
085E0  3A 5D FF 77 18 D1 E3 8B 31 8E 46 08 8B 7E 06 F3
085F0  A4 9C 36 FF 1E 96 02 B8 D2 02 EB 04 90 B8 C7 02
08600  89 46 14 81 4E 1A 00 08 9C 36 FF 1E 96 02 FC 8B
08610  5E 0C BF 50 02 2E 8E 06 54 02 2E 8B 3D 26 3A 5D
```

| | | | | | | | | | | | | | | | | |
|---|---|---|---|---|---|---|---|---|---|---|---|---|---|---|---|---|
| 08620 | FF | 77 | DA | D1 | E3 | 26 | 8B | 39 | 8E | 5E | 08 | 8B | 76 | 06 | 8D | 0E |
| 08630 | 64 | 00 | F3 | A4 | 9C | 36 | FF | 1E | 96 | 02 | C4 | 5E | A6 | 26 | 8A | 17 |
| 08640 | C4 | 5E | 94 | 26 | 8A | 37 | C4 | 5E | 82 | 26 | 8A | 0F | C4 | 9E | 70 | FF |
| 08650 | 26 | 8A | 2F | C4 | 5E | B8 | 26 | 8B | 1F | B4 | 04 | 9C | 36 | FF | 1E | 12 |
| 08660 | 03 | 70 | 02 | F8 | CB | F9 | CB | 2E | C5 | 3E | 52 | 02 | FF | 75 | 0E | FF |
| 08670 | 35 | 57 | 2E | C6 | 06 | 60 | 02 | 00 | 8B | 5E | 0C | F6 | 45 | 06 | 40 | 74 |
| 08680 | 56 | 8B | 5E | 0C | 80 | E3 | 03 | B9 | 02 | 00 | 8A | FB | D2 | E3 | 02 | DF |
| 08690 | D2 | E3 | 02 | DF | D2 | E3 | 02 | DF | 8B | 46 | 0C | B9 | 04 | 00 | D2 | E8 |
| 086A0 | 8A | E0 | B1 | 02 | D2 | E0 | 02 | C4 | D2 | E0 | 02 | C4 | D2 | E0 | 02 | C4 |
| 086B0 | 8A | F8 | 2E | FE | 06 | 60 | 02 | F6 | 45 | 06 | 80 | 75 | 1A | 2B | C0 | 80 |
| 086C0 | E3 | 01 | 74 | 02 | FE | C8 | 8A | D8 | 80 | E7 | 01 | 74 | 02 | FE | CC | 8A |
| 086D0 | FC | 2E | 80 | 06 | 60 | 02 | 02 | C7 | 05 | 00 | 00 | 8B | 56 | 08 | 8B | FA |
| 086E0 | 8B | 76 | 0A | B9 | 01 | 00 | B0 | C9 | 2E | F6 | 06 | 60 | 02 | 03 | 74 | 08 |
| 086F0 | B0 | 00 | E8 | 9A | 03 | EB | 09 | 90 | 2A | FF | E8 | 66 | F8 | E8 | 2C | F8 |
| 08700 | FE | C2 | B0 | CD | 8B | CE | 2A | ED | 2A | CA | 51 | 2E | F6 | 06 | 60 | 02 |
| 08710 | 03 | 74 | 08 | B0 | 01 | E8 | 77 | 03 | EB | 07 | 90 | E8 | 45 | F8 | E8 | 0B |
| 08720 | F8 | 8B | D7 | 8B | CE | 86 | D1 | B9 | 01 | 00 | B0 | BB | 2E | F6 | 06 | 60 |
| 08730 | 02 | 03 | 74 | 08 | B0 | 02 | E8 | 56 | 03 | EB | 07 | 90 | E8 | 24 | F8 | E8 |
| 08740 | EA | F7 | 8B | D7 | FE | C6 | 8B | FA | 8B | CE | 3A | F5 | 74 | 3C | B0 | BA |
| 08750 | B9 | 01 | 00 | 2E | F6 | 06 | 60 | 02 | 03 | 74 | 08 | B0 | 03 | E8 | 2F | 03 |
| 08760 | EB | 07 | 90 | E8 | FD | F7 | E8 | C3 | F7 | 8B | CE | 86 | CA | B9 | 01 | 00 |
| 08770 | B0 | BA | 2E | F6 | 06 | 60 | 02 | 03 | 74 | 08 | B0 | 03 | E8 | 10 | 03 | EB |
| 08780 | 07 | 90 | E8 | DE | F7 | E8 | A4 | F7 | EB | B8 | B0 | C8 | B9 | 01 | 00 | 2E |
| 08790 | F6 | 06 | 60 | 02 | 03 | 74 | 08 | B0 | 04 | E8 | F3 | 02 | EB | 07 | 90 | E8 |
| 087A0 | C1 | F7 | E8 | 87 | F7 | FE | C2 | 59 | B0 | CD | 2E | F6 | 06 | 60 | 02 | 03 |
| 087B0 | 74 | 08 | B0 | 06 | E8 | D8 | 02 | EB | 07 | 90 | E8 | A6 | F7 | E8 | 6C | F7 |
| 087C0 | 8B | D6 | B0 | BC | B9 | 01 | 00 | 2E | F6 | 06 | 60 | 02 | 03 | 74 | 08 | B0 |
| 087D0 | 05 | E8 | BB | 02 | EB | 07 | 90 | E8 | 89 | F7 | E8 | 4F | F7 | 5F | 8F | 05 |
| 087E0 | 8F | 45 | 0E | 9C | 36 | FF | 1E | 96 | 02 | C4 | 76 | B2 | 8C | C2 | 8B | 4E |
| 087F0 | B6 | C4 | 5E | A6 | 26 | 8A | 07 | C4 | 5E | 82 | 26 | 8A | 3F | 8A | D8 | C4 |
| 08800 | 7E | 94 | 26 | 8A | 05 | C4 | BE | 70 | FF | 26 | 8B | 3D | B4 | 09 | 9C | 36 |
| 08810 | FF | 1E | 12 | 03 | 70 | 08 | C4 | 7E | B8 | 26 | 89 | 0D | F8 | CB | F9 | CB |
| 08820 | B8 | C7 | 02 | 81 | 4E | 1A | 00 | 08 | 89 | 46 | 14 | 2E | 8F | 06 | 52 | 02 |
| 08830 | 5A | E8 | 13 | F6 | 8A | 45 | 06 | A8 | 20 | 75 | 03 | E8 | BB | F6 | 9C | 36 |
| 08840 | FF | 1E | 96 | 02 | B8 | C8 | 02 | EB | DA | B8 | C9 | 02 | EB | D5 | E8 | ED |
| 08850 | F5 | 52 | 2E | FF | 36 | 52 | 02 | BF | 50 | 02 | 2E | 8E | 1E | 54 | 02 | 2E |
| 08860 | 8B | 3D | 8B | 46 | 0C | 3A | 45 | FF | 7F | B6 | D0 | E0 | 2A | E4 | 03 | F8 |
| 08870 | 8B | 3D | 2E | 89 | 3E | 52 | 02 | F6 | 45 | 06 | 02 | 74 | C7 | 8B | 5E | 0C |
| 08880 | 3A | 7D | 05 | 7F | C4 | E8 | B6 | F5 | 52 | E8 | E2 | F5 | 8B | 5E | 0C | 8B |
| 08890 | 46 | 14 | 3C | FF | 74 | 58 | 8A | D8 | 8B | D3 | E8 | AA | F5 | E8 | BD | F5 |
| 088A0 | 2B | C9 | 8A | 4F | 01 | 2A | CA | 79 | 08 | C7 | 46 | 0A | 00 | 00 | EB | 7E |
| 088B0 | 90 | 83 | 7E | 04 | FF | 74 | 08 | 39 | 4E | 04 | 7D | 03 | 8B | 4E | 04 | 3B |
| 088C0 | 4E | FE | 7C | 03 | 8B | 4E | FE | 29 | 4E | FE | 89 | 4E | 0A | 8E | 46 | 08 |
| 088D0 | 8B | 76 | 06 | E3 | 16 | E8 | 6F | F5 | 2B | DB | E8 | 48 | F6 | 84 | C0 | 75 |
| 088E0 | 02 | B0 | 20 | 26 | 88 | 04 | 4E | FE | C2 | E2 | EA | EB | 41 | 90 | 51 | 56 |
| 088F0 | 8D | 75 | 19 | 8A | 4D | 05 | 2A | ED | 41 | 2A | DB | F6 | 04 | 02 | 74 | 0E |
| 08900 | 83 | C6 | 03 | E2 | F6 | 5E | 59 | 5A | E8 | 3C | F5 | E9 | 3B | FF | 3A | DF |
| 08910 | 73 | 04 | FE | C3 | EB | EA | F6 | D9 | 02 | 4D | 05 | FE | C1 | 8A | F9 | 5E |
| 08920 | 59 | 8B | D3 | 2A | D2 | E8 | 1F | F5 | E8 | 6C | F7 | 8B | 4E | 0A | 5A | E8 |
| 08930 | 15 | F5 | 2E | 8F | 06 | 52 | 02 | 5A | E8 | 0C | F5 | 8A | 45 | 06 | A8 | 20 |
| 08940 | 75 | 03 | E8 | B4 | F5 | 9C | 36 | FF | 1E | 96 | 02 | 52 | B4 | 0F | CD | 10 |
| 08950 | 2E | A2 | 90 | 17 | 5A | 50 | 3C | 03 | 74 | 08 | 3C | 04 | 74 | 5F | 3C | 06 |
| 08960 | 74 | 2F | 8B | D9 | 2A | DA | 43 | D1 | E3 | 2A | FF | 2A | EE | FE | C5 | 8A |
| 08970 | CD | 2A | ED | B0 | A0 | F6 | E6 | 8B | F0 | 2A | F6 | D1 | E2 | 03 | F2 | B8 |
| 08980 | 00 | B0 | 8E | D8 | 58 | 3C | 03 | 75 | 07 | 50 | B8 | 00 | B8 | 8E | D8 | 58 |
| 08990 | C3 | B8 | 40 | 01 | 52 | 8B | D9 | 2A | DA | 2A | FF | 43 | 2A | EE | 8A | CD |
| 089A0 | 2A | ED | 41 | D1 | E1 | D1 | E1 | D1 | E1 | 8A | D6 | 2A | F6 | F7 | E2 | 5A |
| 089B0 | 2A | F6 | 03 | C2 | 8B | F0 | B8 | 00 | B8 | 8E | D8 | 58 | C3 | D0 | E1 | D0 |
| 089C0 | E2 | B8 | 40 | 01 | EB | CE | 50 | 2E | A0 | 90 | 17 | 3C | 03 | 74 | 11 | 3C |
| 089D0 | 07 | 74 | 0D | 58 | A9 | 00 | 20 | 74 | 03 | 05 | 50 | 00 | 35 | 00 | 20 | C3 |
| 089E0 | 58 | 05 | A0 | 00 | C3 | 00 | 00 | 3F | 20 | 27 | 24 | 24 | 24 | 00 | 00 | FF |
| 089F0 | 00 | FF | 00 | 00 | 00 | 00 | 00 | FC | 04 | E4 | 24 | 24 | 24 | 24 | 24 | 24 |
| 08A00 | 24 | 24 | 24 | 24 | 24 | 24 | 24 | 24 | 27 | 20 | 3F | 00 | 00 | 24 | 24 | 24 |
| 08A10 | E4 | 04 | FC | 00 | 00 | 00 | 00 | 00 | FF | 00 | FF | 00 | 00 | 00 | 00 | 00 |
| 08A20 | 00 | 0F | FF | 0C | 00 | 0C | 3F | 0C | 30 | 0C | 30 | 0C | 30 | 00 | 00 | 00 |

```
08A30   00 FF FF 00 00 FF FF 00 00 00 00 00 00 00 00 00
08A40   00 FF F0 00 30 FC 30 0C 30 0C 30 0C 30 0C 30 0C
08A50   30 0C 30 0C 30 0C 30 0C 30 0C 30 0C 30 0C 30 0C
08A60   30 0C 30 0C 3F 0C 00 0F FF 00 00 00 00 0C 30 0C
08A70   30 0C 30 FC 30 00 30 FF F0 00 00 00 00 00 00 00
08A80   00 00 00 FF FF 00 00 FF FF 00 00 00 00 00 00 1E
08A90   06 56 57 52 32 E4 50 B8 40 01 52 86 D6 32 F6 F7
08AA0   E2 5A 32 F6 5F 8D 36 D5 1C D1 E7 D1 E7 D1 E7 03
08AB0   F7 2E F6 06 60 02 02 75 48 8D 36 0D 1D D1 E7 03
08AC0   F7 D1 E2 03 C2 8B F8 B8 00 B8 8E C0 0E 1F BA 08
08AD0   00 57 51 AD 50 22 E3 22 C3 A3 7D 1D 58 F7 D0 22
08AE0   C7 22 E7 0B 06 7D 1D F3 AB 59 5F 81 F7 00 20 F7
08AF0   C7 00 20 75 03 83 C7 50 4A 75 D6 5A 5F 5E 07 1F
08B00   C3 03 C2 8B F8 B8 00 B8 8E C0 0E 1F BA 08 00 57
08B10   51 AC 8A E0 22 E3 F6 D0 22 C7 0A C4 F3 AA 59 5F
08B20   81 F7 00 20 F7 C7 00 20 75 03 83 C7 50 4A 75 DF
08B30   EB C9 00 00 04 01 00 00 04 01 00 00 02 01 08 02
08B40   02 01 0A 02 02 01 0C 02 02 01 0E 02 02 01 10 02
08B50   02 01 12 02 00 01 07 00 00 01 10 00 00 01 08 00
08B60   00 01 7F 00 00 01 00 01 02 01 14 02 02 01 16 02
08B70   02 01 18 02 02 01 1A 02 02 01 1C 02 02 01 1E 02
08B80   02 01 20 02 02 01 22 02 00 01 11 00 00 01 02 00
08B90   00 01 09 00 04 01 00 00 04 01 02 00 00 01 03 00
08BA0   00 01 04 00 02 01 24 02 00 01 90 02 00 01 18 00
08BB0   00 01 27 00 00 01 4F 00 18 01 00 00 02 00 04 01
08BC0   00 00 00 01 28 00 00 01 50 00 04 01 00 00 14 01
08BD0   05 00 3A 4E 52 43 53 00 14 01 05 00 3A 31 54 50
08BE0   4C 00 14 01 05 00 3A 32 54 50 4C 00 14 01 05 00
08BF0   3A 33 54 50 4C 00 14 01 05 00 3A 31 4D 4F 43 00
08C00   14 01 05 00 3A 32 4D 4F 43 00 00 01 05 00 02 01
08C10   26 02 02 01 28 02 02 01 2A 02 02 01 2C 02 02 01
08C20   2E 02 02 01 30 02 02 01 32 02 02 01 34 02 02 01
08C30   36 02 04 01 00 00 04 01 02 00 04 01 00 00 18 01
08C40   00 00 00 01 02 01 38 02 02 01 3A 02 04 01 00 00
08C50   04 01 00 00 04 01 00 00 1C 01 00 00 88 02 04 01
08C60   64 00 04 01 66 00 04 01 68 00 04 01 6A 00 04 01
08C70   6C 00 04 01 6E 00 04 01 70 00 04 01 72 00 04 01
08C80   74 00 04 01 76 00 04 01 78 00 14 01 01 00 20 00
08C90   18 01 00 00 00 01 04 01 02 01 04 01 04 01 04 01
08CA0   00 00 18 01 00 00 00 01 04 01 02 01 04 01 04 01
08CB0   04 01 00 00 04 01 02 00 00 01 40 00 00 01 80 00
08CC0   00 01 20 00 02 01 3C 02 02 01 3E 02 02 01 40 02
08CD0   02 01 42 02 00 01 0C 0B 00 01 07 06 00 01 17 00
08CE0   00 01 70 00 00 01 06 00 02 01 44 02 04 01 00 00
08CF0   04 01 02 00 04 01 04 00 04 01 06 00 00 00 85 02
08D00   01 00 0E 00 42 01 85 02 01 00 00 00 1C 01 08 00
08D10   3E 26 04 01 66 00 04 01 68 00 04 01 6A 00 04 01
08D20   00 00 4A 04 24 00 E0 24 9E 00 FC 00 52 04 24 00
08D30   06 25 9E 00 FC 00 72 02 FC 00 02 00 01 00 20 00
08D40   00 00 05 00 7E 04 05 00 7E 04 05 00 7E 04 05 00
08D50   7E 04 05 00 7E 04 06 00 08 00 0A 00 0C 00 0E 00
08D60   52 07 FC 00 02 00 FC 00 02 00 01 0B 57 C9 CE C4
08D70   00 00 04 00 18 00 1A 00 74 24 A8 00 18 00 1A 00
08D80   74 24 AA 00 62 07 FC 00 24 00 74 24 82 00 02 00
08D90   00 00 18 00 1A 00 78 24 A8 00 18 00 1A 00 78 24
08DA0   AA 00 6C 07 FC 00 24 00 78 24 82 00 02 00 22 02
08DB0   00 00 05 00 7E 04 05 00 7E 04 05 00 7E 04 05 00
08DC0   7E 04 05 00 7E 04 90 24 24 00 22 00 FA 01 9E 00
08DD0   FC 00 24 00 46 04 F6 05 BA 00 54 00 05 00 4F 00
08DE0   3D 00 4F 00 3D 00 4F 00 3D 00 FC 00 24 00 46 04
08DF0   94 24 AE 00 2E 00 09 00 24 00 56 04 4C 00 FC 00
08E00   7C 24 24 00 06 00 9E 00 80 24 24 00 08 00 9E 00
08E10   84 24 24 00 0A 00 9E 00 88 24 24 00 0C 00 9E 00
08E20   8C 24 24 00 0E 00 9E 00 FC 00 24 00 7C 24 7E 04
08E30   AC 00 2E 00 17 00 7C 24 24 00 64 03 24 00 90 24
```

```
08E40    38 00 F4 02 9E 00 2A 00 13 00 64 03 24 00 90 24
08E50    38 00 F4 02 24 00 7C 24 9E 00 FC 00 24 00 80 24
08E60    7E 04 AC 00 2E 00 17 00 80 24 24 00 64 03 24 00
08E70    90 24 38 00 FC 02 9E 00 2A 00 13 00 64 03 24 00
08E80    90 24 38 00 FC 02 24 00 80 24 9E 00 FC 00 24 00
08E90    88 24 7E 04 AC 00 2E 00 17 00 88 24 24 00 64 03
08EA0    24 00 90 24 38 00 0C 03 9E 00 2A 00 13 00 64 03
08EB0    24 00 90 24 38 00 0C 03 24 00 88 24 9E 00 FC 00
08EC0    24 00 8C 24 7E 04 AC 00 2E 00 17 00 8C 24 24 00
08ED0    64 03 24 00 90 24 38 00 14 03 9E 00 2A 00 13 00
08EE0    64 03 24 00 90 24 38 00 14 03 24 00 8C 24 9E 00
08EF0    FC 00 24 00 46 04 F6 05 BA 00 54 00 05 00 5B 01
08F00    B5 00 0D 02 2D 01 0D 02 2D 01 FC 00 24 00 84 24
08F10    7E 04 AC 00 2E 00 0F 00 84 24 24 00 4E 04 9E 00
08F20    2A 00 0B 00 4E 04 24 00 84 24 9E 00 FC 00 84 24
08F30    CE 07 FC 00 24 00 7C 24 98 24 C6 00 2E 00 1B 00
08F40    80 24 24 00 80 24 9C 24 BA 00 9E 00 7C 24 24 00
08F50    7C 24 98 24 BC 00 9E 00 FC 00 64 03 24 00 90 24
08F60    38 00 EC 02 24 00 80 24 98 24 BE 00 7C 24 BA 00
08F70    9E 00 FC 00 24 00 0C 00 7E 04 AE 00 2E 00 1F 00
08F80    64 03 24 00 90 24 38 00 E4 02 24 00 8C 24 98 24
08F90    BE 00 88 24 BA 00 9E 00 2A 00 1F 00 64 03 24 00
08FA0    90 24 38 00 E4 02 24 00 80 24 98 24 BE 00 7C 24
08FB0    BA 00 A0 24 C6 00 9E 00 FC 00 02 00 FC 00 24 00
08FC0    84 24 F2 05 AC 00 2E 00 09 00 24 00 56 04 4C 00
08FD0    FC 00 24 00 84 24 7E 04 AC 00 2E 00 17 00 84 24
08FE0    24 00 64 03 24 00 90 24 38 00 04 03 9E 00 2A 00
08FF0    13 00 64 03 24 00 90 24 38 00 04 03 24 00 84 24
09000    9E 00 FC 00 24 00 A4 24 80 24 BA 00 88 00 CE 07
09010    FC 00 7C 24 CE 07 FC 00 64 03 24 00 90 24 38 00
09020    EC 02 24 00 84 24 9E 00 02 00 FC 00 02 00 1F 00
09030    00 00 90 03 8F 04 00 00 91 03 00 00 A3 04 00 00
09040    A8 24 24 00 82 04 9E 00 FC 00 24 00 46 04 94 24
09050    AE 00 A8 24 C8 24 AC 00 C6 00 2E 00 09 00 24 00
09060    56 04 4C 00 FC 00 24 00 46 04 F6 05 AE 00 96 04
09070    9C 24 B0 00 C6 00 2E 00 09 00 24 00 56 04 4C 00
09080    FC 00 24 00 46 04 F6 05 AC 00 46 04 CC 24 AC 00
09090    C8 00 9C 04 F2 05 B0 00 C6 00 2E 00 0B 00 24 00
090A0    56 04 4C 00 02 00 FC 00 24 00 46 04 F6 05 BA 00
090B0    54 00 05 00 B1 00 8D 00 5B 01 05 01 17 02 55 01
090C0    FC 00 24 00 46 04 94 24 AC 00 2E 00 0F 00 54 00
090D0    01 00 53 02 69 01 2A 00 09 00 24 00 56 04 4C 00
090E0    FC 00 24 00 A8 24 C8 24 AC 00 2E 00 0B 00 A8 24
090F0    24 00 CC 24 9E 00 FC 00 AC 24 24 00 7E 04 9E 00
09100    B0 24 24 00 7E 04 9E 00 B4 24 24 00 7E 04 9E 00
09110    FC 00 B8 24 24 00 A8 24 F6 05 BC 00 9E 00 BC 24
09120    24 00 B8 24 9E 00 FC 00 24 00 96 04 9C 24 B0 00
09130    2E 00 09 00 24 00 56 04 4C 00 FC 00 24 00 96 04
09140    F2 05 AE 00 2E 00 1F 00 AC 24 24 00 96 04 F6 05
09150    BC 00 9C 04 9C 24 BE 00 BA 00 9E 00 B4 24 24 00
09160    AC 24 9E 00 FC 00 24 00 B8 24 88 00 24 00 AC 24
09170    88 00 24 00 B0 24 88 00 24 00 BC 24 88 00 24 00
09180    B4 24 88 00 1E 01 FC 00 02 00 FC 00 24 00 9C 04
09190    F2 05 AE 00 2E 00 09 00 24 00 56 04 4C 00 FC 00
091A0    AC 24 24 00 7E 04 9E 00 B0 24 24 00 7E 04 9E 00
091B0    BC 24 24 00 7E 04 9E 00 B4 24 24 00 7E 04 9E 00
091C0    24 00 82 04 9C 24 B0 00 2E 00 09 00 24 00 56 04
091D0    4C 00 FC 00 B0 24 24 00 82 04 F6 05 BC 00 CC 24
091E0    C0 00 9E 00 24 00 82 04 F6 05 BC 00 F6 05 C6 00
091F0    F6 05 AC 00 2E 00 0F 00 AC 24 24 00 F6 05 9E 00
09200    2A 00 0B 00 AC 24 24 00 F2 05 9E 00 FC 00 24 00
09210    96 04 F2 05 AE 00 2E 00 0F 00 B8 24 24 00 96 04
09220    F6 05 BC 00 9E 00 FC 00 24 00 B8 24 88 00 24 00
09230    AC 24 88 00 24 00 B0 24 88 00 F2 00 0F 00 F2 00
09240    13 00 1E 01.02 00 FC 00 24 00 96 04 F2 05 AE 00
```

| | | | | | | | | | | | | | | | | |
|---|---|---|---|---|---|---|---|---|---|---|---|---|---|---|---|---|
| 09250 | 2E | 00 | 09 | 00 | 24 | 00 | 56 | 04 | 4C | 00 | FC | 00 | B8 | 24 | 24 | 00 |
| 09260 | 82 | 04 | F6 | 05 | BC | 00 | 9E | 00 | 24 | 00 | B8 | 24 | 68 | 00 | F2 | 00 |
| 09270 | 07 | 00 | F2 | 00 | 0B | 00 | F2 | 00 | 0F | 00 | F2 | 00 | 13 | 00 | 1E | 01 |
| 09280 | 02 | 00 | FC | 00 | C0 | 24 | 24 | 00 | A8 | 24 | 9E | 00 | FC | 00 | 24 | 00 |
| 09290 | 82 | 04 | C8 | 24 | AC | 00 | 2E | 00 | 0F | 00 | C0 | 24 | 24 | 00 | F6 | 05 |
| 092A0 | 9E | 00 | 2A | 00 | 0F | 00 | C0 | 24 | 24 | 00 | 82 | 04 | F6 | 05 | BC | 00 |
| 092B0 | 9E | 00 | FC | 00 | 24 | 00 | 96 | 04 | D0 | 24 | AC | 00 | 2E | 00 | 0F | 00 |
| 092C0 | C0 | 24 | 24 | 00 | C0 | 24 | 9C | 24 | BA | 00 | 9E | 00 | FC | 00 | 24 | 00 |
| 092D0 | 96 | 04 | 9C | 24 | AC | 00 | 2E | 00 | 0F | 00 | C4 | 24 | 24 | 00 | 94 | 24 |
| 092E0 | 9E | 00 | 2A | 00 | 0B | 00 | C4 | 24 | 24 | 00 | F2 | 05 | 9E | 00 | FC | 00 |
| 092F0 | C4 | 24 | 24 | 00 | C4 | 24 | 9C | 04 | 9C | 24 | BE | 00 | BA | 00 | 9E | 00 |
| 09300 | FC | 00 | 24 | 00 | C0 | 24 | 68 | 00 | 24 | 00 | C4 | 24 | 68 | 00 | F2 | 00 |
| 09310 | 0B | 00 | 24 | 00 | C0 | 24 | 94 | 24 | C6 | 00 | 88 | 00 | 24 | 00 | C4 | 24 |
| 09320 | 94 | 24 | C6 | 00 | 88 | 00 | 1E | 01 | 02 | 00 | FC | 00 | 02 | 00 | 1E | 01 |
| 09330 | 00 | 00 | B2 | 04 | 90 | 03 | D8 | 24 | 24 | 00 | 22 | 00 | FA | 01 | 9E | 00 |
| 09340 | FC | 00 | 24 | 00 | 46 | 04 | F2 | 05 | AE | 00 | 2E | 00 | 09 | 00 | 24 | 00 |
| 09350 | 56 | 04 | 4C | 00 | FC | 00 | 4E | 04 | 24 | 00 | BE | 04 | F6 | 05 | BC | 00 |
| 09360 | 9E | 00 | FC | 00 | 24 | 00 | BE | 04 | F6 | 05 | BC | 00 | 88 | 00 | CE | 07 |
| 09370 | FC | 00 | 24 | 00 | 64 | 03 | 24 | 00 | F2 | 05 | 38 | 00 | DC | 02 | 98 | 24 |
| 09380 | C6 | 00 | 98 | 24 | AE | 00 | 2E | 00 | 05 | 00 | 02 | 00 | FC | 00 | D4 | 24 |
| 09390 | 24 | 00 | D8 | 24 | 9E | 00 | FC | 00 | 24 | 00 | F2 | 05 | 88 | 00 | AA | 01 |
| 093A0 | FC | 00 | 24 | 00 | 4E | 04 | 88 | 00 | 24 | 00 | 4E | 04 | 88 | 00 | F2 | 00 |
| 093B0 | 0B | 00 | 24 | 00 | 4E | 04 | 88 | 00 | 24 | 00 | 4E | 04 | 88 | 00 | 1E | 01 |
| 093C0 | 24 | 00 | F2 | 05 | 88 | 00 | B4 | 01 | FC | 00 | 24 | 00 | D4 | 24 | 88 | 00 |
| 093D0 | AA | 01 | FC | 00 | 02 | 00 | 1E | 01 | 02 | 00 | FC | 00 | 02 | 00 | 38 | 00 |
| 093E0 | 00 | 00 | 04 | 00 | 24 | 00 | 46 | 04 | 94 | 24 | AC | 00 | 06 | 00 | F2 | 05 |
| 093F0 | AC | 00 | C6 | 00 | 2E | 00 | 0B | 00 | 54 | 00 | 01 | 00 | 21 | 00 | 05 | 00 |
| 09400 | FC | 00 | 24 | 00 | 46 | 04 | 06 | 00 | AE | 00 | 2E | 00 | 0B | 00 | 54 | 00 |
| 09410 | 01 | 00 | FD | 02 | C9 | 00 | FC | 00 | 24 | 00 | 64 | 03 | 24 | 00 | F6 | 05 |
| 09420 | 38 | 00 | 3C | 03 | F2 | 05 | AE | 00 | 2E | 00 | 0B | 00 | 54 | 00 | 01 | 00 |
| 09430 | FD | 02 | C9 | 00 | FC | 00 | 24 | 00 | 64 | 03 | 24 | 00 | CC | 24 | 38 | 00 |
| 09440 | 3C | 03 | F2 | 05 | AE | 00 | 2E | 00 | 0B | 00 | 54 | 00 | 01 | 00 | FD | 02 |
| 09450 | C9 | 00 | FC | 00 | 24 | 00 | 64 | 03 | 24 | 00 | DC | 24 | 38 | 00 | 3C | 03 |
| 09460 | F2 | 05 | AE | 00 | 2E | 00 | 0B | 00 | 54 | 00 | 01 | 00 | FD | 02 | C9 | 00 |
| 09470 | FC | 00 | 24 | 00 | 64 | 03 | 24 | 00 | E0 | 24 | 38 | 00 | 3C | 03 | F2 | 05 |
| 09480 | AE | 00 | 2E | 00 | 0B | 00 | 54 | 00 | 01 | 00 | FD | 02 | C9 | 00 | FC | 00 |
| 09490 | 24 | 00 | 46 | 04 | F6 | 05 | BA | 00 | 54 | 00 | 05 | 00 | C9 | 00 | 29 | 00 |
| 094A0 | 85 | 01 | 3D | 00 | 41 | 02 | 51 | 00 | FC | 00 | 24 | 00 | 64 | 03 | 24 | 00 |
| 094B0 | F6 | 05 | 38 | 00 | EC | 02 | 94 | 24 | AE | 00 | 64 | 03 | 24 | 00 | F6 | 05 |
| 094C0 | 38 | 00 | E4 | 02 | 94 | 24 | AE | 00 | C8 | 00 | 2E | 00 | 0B | 00 | 54 | 00 |
| 094D0 | 01 | 00 | FD | 02 | C9 | 00 | FC | 00 | 24 | 00 | 64 | 03 | 24 | 00 | CC | 24 |
| 094E0 | 38 | 00 | EC | 02 | 94 | 24 | AE | 00 | 64 | 03 | 24 | 00 | F6 | 05 | 38 | 00 |
| 094F0 | E4 | 02 | 94 | 24 | AE | 00 | C8 | 00 | 2E | 00 | 0B | 00 | 54 | 00 | 01 | 00 |
| 09500 | FD | 02 | C9 | 00 | FC | 00 | 24 | 00 | 64 | 03 | 24 | 00 | DC | 24 | 38 | 00 |
| 09510 | EC | 02 | 94 | 24 | AE | 00 | 64 | 03 | 24 | 00 | F6 | 05 | 38 | 00 | E4 | 02 |
| 09520 | 94 | 24 | AE | 00 | C8 | 00 | 2E | 00 | 0B | 00 | 54 | 00 | 01 | 00 | FD | 02 |
| 09530 | C9 | 00 | FC | 00 | 24 | 00 | 64 | 03 | 24 | 00 | E0 | 24 | 38 | 00 | EC | 02 |
| 09540 | 94 | 24 | AE | 00 | 64 | 03 | 24 | 00 | F6 | 05 | 38 | 00 | E4 | 02 | 94 | 24 |
| 09550 | AE | 00 | C8 | 00 | 2E | 00 | 0B | 00 | 54 | 00 | 01 | 00 | FD | 02 | C9 | 00 |
| 09560 | FC | 00 | 02 | 00 | FC | 00 | 24 | 00 | 64 | 03 | 24 | 00 | F6 | 05 | 38 | 00 |
| 09570 | EC | 02 | DC | 24 | AE | 00 | 64 | 03 | 24 | 00 | F6 | 05 | 38 | 00 | E4 | 02 |
| 09580 | F2 | 05 | AE | 00 | C8 | 00 | 2E | 00 | 0B | 00 | 54 | 00 | 01 | 00 | FD | 02 |
| 09590 | C9 | 00 | FC | 00 | 24 | 00 | 64 | 03 | 24 | 00 | CC | 24 | 38 | 00 | EC | 02 |
| 095A0 | DC | 24 | AE | 00 | 64 | 03 | 24 | 00 | F6 | 05 | 38 | 00 | E4 | 02 | F2 | 05 |
| 095B0 | AE | 00 | C8 | 00 | 2E | 00 | 0B | 00 | 54 | 00 | 01 | 00 | FD | 02 | C9 | 00 |
| 095C0 | FC | 00 | 24 | 00 | 64 | 03 | 24 | 00 | DC | 24 | 38 | 00 | EC | 02 | DC | 24 |
| 095D0 | AE | 00 | 64 | 03 | 24 | 00 | F6 | 05 | 38 | 00 | E4 | 02 | F2 | 05 | AE | 00 |
| 095E0 | C8 | 00 | 2E | 00 | 0B | 00 | 54 | 00 | 01 | 00 | FD | 02 | C9 | 00 | FC | 00 |
| 095F0 | 24 | 00 | 64 | 03 | 24 | 00 | E0 | 24 | 38 | 00 | EC | 02 | DC | 24 | AE | 00 |
| 09600 | 64 | 03 | 24 | 00 | F6 | 05 | 38 | 00 | E4 | 02 | F2 | 05 | AE | 00 | C8 | 00 |
| 09610 | 2E | 00 | 0B | 00 | 54 | 00 | 01 | 00 | FD | 02 | C9 | 00 | FC | 00 | 02 | 00 |
| 09620 | FC | 00 | 24 | 00 | 64 | 03 | 24 | 00 | F6 | 05 | 38 | 00 | EC | 02 | F6 | 05 |
| 09630 | AE | 00 | 64 | 03 | 24 | 00 | F6 | 05 | 38 | 00 | E4 | 02 | F2 | 05 | AE | 00 |
| 09640 | C8 | 00 | 2E | 00 | 0B | 00 | 54 | 00 | 01 | 00 | FD | 02 | C9 | 00 | FC | 00 |
| 09650 | 24 | 00 | 64 | 03 | 24 | 00 | CC | 24 | 38 | 00 | EC | 02 | F6 | 05 | AE | 00 |

```
09660   64 03 24 00 F6 05 38 00 E4 02 F2 05 AE 00 C8 00
09670   2E 00 0B 00 54 00 01 00 FD 02 C9 00 FC 00 24 00
09680   64 03 24 00 DC 24 38 00 EC 02 F6 05 AE 00 64 03
09690   24 00 F6 05 38 00 E4 02 F2 05 AE 00 C8 00 2E 00
096A0   0B 00 54 00 01 00 FD 02 C9 00 FC 00 24 00 64 03
096B0   24 00 E0 24 38 00 EC 02 F6 05 AE 00 64 03 24 00
096C0   F6 05 38 00 E4 02 F2 05 AE 00 C8 00 2E 00 0B 00
096D0   54 00 01 00 FD 02 C9 00 FC 00 02 00 FC 00 24 00
096E0   06 00 88 00 68 02 FC 00 02 00 E4 02 F2 05 AE 00
096F0   00 00 24 00 F2 05 88 00 B4 01 24 00 F6 05 88 00
09700   B4 01 24 00 CC 24 88 00 B4 01 24 00 DC 24 88 00
09710   B4 01 24 00 E0 24 88 00 B4 01 FC 00 24 00 F6 05
09720   88 00 AA 01 FC 00 02 00 FD 02 C9 00 FC 00 24 00
09730   00 00 CA 04 E4 24 24 00 22 00 FA 01 9E 00 FC 00
09740   24 00 F2 05 88 00 AA 01 FC 00 24 00 C4 04 54 00
09750   03 00 2F 00 3D 00 C5 01 C9 00 FC 00 02 00 FC 00
09760   64 03 24 00 F2 05 38 00 DC 02 24 00 64 03 24 00
09770   F2 05 38 00 DC 02 98 24 9C 24 BA 00 E0 24 BA 00
09780   C8 00 9E 00 FC 00 64 03 24 00 F2 05 38 00 DC 02
09790   24 00 64 03 24 00 F2 05 38 00 DC 02 98 24 9C 24
097A0   BA 00 BC 00 9E 00 FC 00 24 00 6E 00 00 00 24 00
097B0   E8 24 34 00 24 00 24 00 6E 00 00 00 24 00 E8 24
097C0   34 00 9C 24 C8 00 9E 00 FC 00 24 00 46 04 F2 05
097D0   AC 00 2E 00 43 00 F4 00 03 00 24 00 F2 05 88 00
097E0   24 00 EC 24 88 00 24 00 F2 05 88 00 24 00 EC 24
097F0   88 00 24 00 52 04 F6 05 BC 00 88 00 F4 00 03 00
09800   F4 00 03 00 F4 00 11 00 F4 00 01 00 96 01 54 00
09810   01 00 D1 02 91 01 FC 00 24 00 46 04 F6 05 AC 00
09820   2E 00 3F 00 F4 00 03 00 24 00 F2 05 88 00 24 00
09830   EC 24 88 00 24 00 F2 05 88 00 24 00 EC 24 88 00
09840   24 00 F0 24 88 00 F4 00 11 00 F4 00 03 00 F4 00
09850   03 00 F4 00 01 00 96 01 54 00 01 00 D1 02 91 01
09860   FC 00 24 00 46 04 CC 24 AC 00 2E 00 3F 00 F4 00
09870   03 00 24 00 F2 05 88 00 24 00 EC 24 88 00 24 00
09880   F2 05 88 00 24 00 EC 24 88 00 24 00 F4 24 88 00
09890   F2 00 0F 00 F2 00 13 00 F2 00 17 00 F2 00 1B 00
098A0   A0 01 54 00 01 00 D1 02 91 01 FC 00 24 00 46 04
098B0   94 24 AC 00 2E 00 3F 00 F4 00 03 00 24 00 F2 05
098C0   88 00 24 00 EC 24 88 00 24 00 F2 05 88 00 24 00
098D0   EC 24 88 00 24 00 F4 24 88 00 F4 00 03 00 F4 00
098E0   03 00 F4 00 11 00 F4 00 01 00 96 01 54 00 01 00
098F0   D1 02 91 01 FC 00 24 00 46 04 F2 05 AC 00 2E 00
09900   29 00 24 00 4E 04 88 00 24 00 4E 04 88 00 F2 00
09910   0B 00 24 00 4E 04 88 00 24 00 4E 04 88 00 1E 01
09920   54 00 01 00 4D 02 19 01 FC 00 24 00 46 04 F6 05
09930   AC 00 2E 00 0B 00 54 00 01 00 6B 02 2D 01 FC 00
09940   24 00 46 04 CC 24 AC 00 2E 00 0B 00 54 00 01 00
09950   6B 02 2D 01 FC 00 24 00 46 04 94 24 AC 00 2E 00
09960   1D 00 F4 00 11 00 F4 00 03 00 F4 00 03 00 F4 00
09970   01 00 28 01 54 00 01 00 6B 02 2D 01 FC 00 64 03
09980   24 00 F2 05 38 00 DC 02 24 00 64 03 24 00 F2 05
09990   38 00 DC 02 98 24 C8 00 9E 00 FC 00 64 03 24 00
099A0   F2 05 38 00 DC 02 24 00 64 03 24 00 F2 05 38 00
099B0   DC 02 9C 24 C8 00 9E 00 FC 00 64 03 24 00 F2 05
099C0   38 00 DC 02 24 00 64 03 24 00 F2 05 38 00 DC 02
099D0   24 00 E0 24 CC 00 C6 00 9E 00 FC 00 24 00 6E 00
099E0   00 00 24 00 E8 24 34 00 24 00 24 00 6E 00 00 00
099F0   24 00 E8 24 34 00 24 00 9C 24 CC 00 C6 00 9E 00
09A00   FC 00 24 00 E4 24 88 00 AA 01 24 00 F2 05 88 00
09A10   B4 01 FC 00 02 00 F4 00 03 00 F4 00 03 00 F4 00
09A20   00 00 F8 24 14 08 FC 00 28 00 F8 24 82 00 02 00
09A30   00 00 00 00 24 00 46 04 94 24 AC 00 2E 00 05 00
09A40   02 00 FC 00 4E 04 24 00 F2 05 9E 00 FC 00 24 00
09A50   46 04 F6 05 AC 00 46 04 CC 24 AC 00 C8 00 2E 00
09A60   0B 00 54 00 01 00 AD 00 C9 00 FC 00 24 00 06 00
```

| | | | | | | | | | | | | | | | | |
|---|---|---|---|---|---|---|---|---|---|---|---|---|---|---|---|---|
| 09A70 | 02 | 25 | AE | 00 | 06 | 00 | 06 | 25 | AE | 00 | C6 | 00 | 2E | 00 | 09 | 00 |
| 09A80 | 24 | 00 | 5A | 04 | 4C | 00 | FC | 00 | 24 | 00 | 06 | 00 | 02 | 25 | AC | 00 |
| 09A90 | 2E | 00 | 0F | 00 | FE | 24 | 24 | 00 | F6 | 05 | 9E | 00 | 2A | 00 | 0B | 00 |
| 09AA0 | FE | 24 | 24 | 00 | DC | 24 | 9E | 00 | FC | 00 | FE | 24 | C6 | 07 | FC | 00 |
| 09AB0 | 24 | 00 | 06 | 00 | 02 | 25 | AC | 00 | 2E | 00 | 0F | 00 | 52 | 04 | 24 | 00 |
| 09AC0 | 02 | 25 | 9E | 00 | 2A | 00 | 0B | 00 | 52 | 04 | 24 | 00 | 06 | 25 | 9E | 00 |
| 09AD0 | FC | 00 | 24 | 00 | F2 | 05 | 88 | 00 | 68 | 02 | 02 | 00 | FC | 00 | 24 | 00 |
| 09AE0 | 06 | 00 | 02 | 25 | AC | 00 | 2E | 00 | 0D | 00 | 24 | 00 | F6 | 05 | 88 | 00 |
| 09AF0 | 68 | 02 | 02 | 00 | FC | 00 | 24 | 00 | 06 | 00 | 06 | 25 | AC | 00 | 2E | 00 |
| 09B00 | 0F | 00 | 24 | 00 | CC | 24 | 88 | 00 | 6E | 02 | 2A | 00 | 09 | 00 | 24 | 00 |
| 09B10 | 5A | 04 | 4C | 00 | FC | 00 | 02 | 00 | C9 | 00 | FC | 00 | 24 | 00 | 06 | 00 |
| 09B20 | 00 | 00 | 0C | 00 | 00 | 00 | 24 | 00 | 28 | 00 | 06 | 00 | C0 | 00 | 0E | 25 |
| 09B30 | AC | 00 | 2E | 00 | 0F | 00 | 24 | 00 | 08 | 00 | 88 | 00 | D2 | 00 | 64 | 01 |
| 09B40 | 02 | 00 | FC | 00 | 24 | 00 | 28 | 00 | 06 | 00 | C0 | 00 | 18 | 25 | AC | 00 |
| 09B50 | 2E | 00 | 13 | 00 | 0A | 25 | 24 | 00 | F6 | 05 | 9E | 00 | 54 | 00 | 01 | 00 |
| 09B60 | D5 | 00 | C9 | 00 | FC | 00 | 24 | 00 | 28 | 00 | 06 | 00 | C0 | 00 | 22 | 25 |
| 09B70 | AC | 00 | 2E | 00 | 13 | 00 | 0A | 25 | 24 | 00 | CC | 24 | 9E | 00 | 54 | 00 |
| 09B80 | 01 | 00 | D5 | 00 | C9 | 00 | FC | 00 | 24 | 00 | 28 | 00 | 06 | 00 | C0 | 00 |
| 09B90 | 2C | 25 | AC | 00 | 2E | 00 | 13 | 00 | 0A | 25 | 24 | 00 | DC | 24 | 9E | 00 |
| 09BA0 | 54 | 00 | 01 | 00 | D5 | 00 | C9 | 00 | FC | 00 | 24 | 00 | 28 | 00 | 06 | 00 |
| 09BB0 | C0 | 00 | 36 | 25 | AC | 00 | 2E | 00 | 13 | 00 | 0A | 25 | 24 | 00 | E0 | 24 |
| 09BC0 | 9E | 00 | 54 | 00 | 01 | 00 | D5 | 00 | C9 | 00 | FC | 00 | 24 | 00 | 28 | 00 |
| 09BD0 | 06 | 00 | C0 | 00 | 40 | 25 | AC | 00 | 2E | 00 | 13 | 00 | 0A | 25 | 24 | 00 |
| 09BE0 | 4A | 25 | 9E | 00 | 54 | 00 | 01 | 00 | D5 | 00 | C9 | 00 | FC | 00 | 24 | 00 |
| 09BF0 | 62 | 04 | 4C | 00 | FC | 00 | 0A | 25 | 08 | 00 | 1C | 08 | FC | 00 | 02 | 00 |
| 09C00 | 00 | 00 | 00 | 00 | 00 | 00 | 24 | 00 | 06 | 00 | A4 | 24 | BA | 00 | 88 | 00 |
| 09C10 | 08 | 00 | 1C | 08 | FC | 00 | 02 | 00 | 28 | 00 | 06 | 00 | C0 | 00 | 22 | 25 |
| 09C20 | 00 | 00 | 24 | 00 | 46 | 04 | 88 | 00 | 68 | 02 | FC | 00 | 02 | 00 | 54 | 00 |
| 09C30 | 00 | 00 | DC | 04 | 04 | 00 | 04 | 00 | 04 | 00 | 04 | 00 | 04 | 00 | 24 | 00 |
| 09C40 | 0C | 00 | 10 | 00 | B2 | 00 | 0A | 00 | 0E | 00 | B0 | 00 | C8 | 00 | 2E | 00 |
| 09C50 | 09 | 00 | 24 | 00 | 5A | 04 | 4C | 00 | FC | 00 | 24 | 00 | 10 | 00 | F6 | 05 |
| 09C60 | BA | 00 | 52 | 04 | B0 | 00 | 2E | 00 | 09 | 00 | 24 | 00 | 5A | 04 | 4C | 00 |
| 09C70 | FC | 00 | 24 | 00 | 0E | 00 | EC | 24 | B0 | 00 | 2E | 00 | 09 | 00 | 24 | 00 |
| 09C80 | 5A | 04 | 4C | 00 | FC | 00 | 24 | 00 | 0C | 00 | F2 | 05 | B4 | 00 | 10 | 00 |
| 09C90 | F2 | 05 | B4 | 00 | C8 | 00 | 0A | 00 | F2 | 05 | B4 | 00 | C8 | 00 | 0E | 00 |
| 09CA0 | F2 | 05 | B4 | 00 | C8 | 00 | 2E | 00 | 09 | 00 | 24 | 00 | 5A | 04 | 4C | 00 |
| 09CB0 | FC | 00 | 64 | 03 | 24 | 00 | 08 | 00 | 38 | 00 | 3C | 03 | 24 | 00 | F2 | 05 |
| 09CC0 | 9E | 00 | FC | 00 | 0E | 00 | 10 | 00 | 0A | 00 | 0C | 00 | 08 | 00 | 86 | 07 |
| 09CD0 | FC | 00 | 08 | 00 | 9E | 07 | FC | 00 | 02 | 00 | FC | 00 | 02 | 00 | 1E | 01 |
| 09CE0 | 00 | 00 | EE | 04 | 04 | 00 | 04 | 00 | 04 | 00 | 04 | 00 | 04 | 00 | 90 | 03 |
| 09CF0 | 07 | 05 | 00 | 00 | 0F | 04 | 00 | 00 | 1B | 05 | 00 | 00 | 6E | 25 | 24 | 00 |
| 09D00 | 22 | 00 | FA | 01 | 9E | 00 | FC | 00 | 4E | 25 | 24 | 00 | FA | 04 | 9E | 00 |
| 09D10 | FC | 00 | 24 | 00 | 46 | 04 | 94 | 24 | AE | 00 | 4E | 25 | C8 | 24 | AC | 00 |
| 09D20 | C6 | 00 | 2E | 00 | 09 | 00 | 24 | 00 | 56 | 04 | 4C | 00 | FC | 00 | 24 | 00 |
| 09D30 | 46 | 04 | F6 | 05 | AE | 00 | 0E | 05 | 9C | 24 | B0 | 00 | C6 | 00 | 2E | 00 |
| 09D40 | 09 | 00 | 24 | 00 | 56 | 04 | 4C | 00 | FC | 00 | 24 | 00 | 46 | 04 | F6 | 05 |
| 09D50 | AC | 00 | 46 | 04 | CC | 24 | AC | 00 | C8 | 00 | 14 | 05 | F2 | 05 | B0 | 00 |
| 09D60 | C6 | 00 | 2E | 00 | 09 | 00 | 24 | 00 | 56 | 04 | 4C | 00 | FC | 00 | 24 | 00 |
| 09D70 | 46 | 04 | F6 | 05 | BA | 00 | 54 | 00 | 05 | 00 | C7 | 00 | 8D | 00 | A7 | 01 |
| 09D80 | 05 | 01 | 99 | 02 | 55 | 01 | FC | 00 | 24 | 00 | 46 | 04 | 94 | 24 | AC | 00 |
| 09D90 | 2E | 00 | 0F | 00 | 54 | 00 | 01 | 00 | 01 | 03 | 67 | 01 | 2A | 00 | 09 | 00 |
| 09DA0 | 24 | 00 | 56 | 04 | 4C | 00 | FC | 00 | F4 | 00 | 03 | 00 | 24 | 00 | 08 | 00 |
| 09DB0 | 88 | 00 | 24 | 00 | 0A | 00 | 88 | 00 | 24 | 00 | 0C | 00 | 88 | 00 | 24 | 00 |
| 09DC0 | 0E | 00 | 88 | 00 | 24 | 00 | 10 | 00 | 88 | 00 | 8C | 01 | FC | 00 | 24 | 00 |
| 09DD0 | 4E | 25 | C8 | 24 | AC | 00 | 2E | 00 | 0B | 00 | 4E | 25 | 24 | 00 | CC | 24 |
| 09DE0 | 9E | 00 | FC | 00 | 52 | 25 | 24 | 00 | 7E | 04 | 9E | 00 | 56 | 25 | 24 | 00 |
| 09DF0 | 7E | 04 | 9E | 00 | 5A | 25 | 24 | 00 | 7E | 04 | 9E | 00 | FC | 00 | 5E | 25 |
| 09E00 | 24 | 00 | 4E | 25 | F6 | 05 | BC | 00 | 9E | 00 | 62 | 25 | 24 | 00 | 5E | 25 |
| 09E10 | 9E | 00 | FC | 00 | 24 | 00 | 0E | 05 | 9C | 24 | B0 | 00 | 2E | 00 | 09 | 00 |
| 09E20 | 24 | 00 | 56 | 04 | 4C | 00 | FC | 00 | 24 | 00 | 0E | 05 | F2 | 05 | AE | 00 |
| 09E30 | 2E | 00 | 1F | 00 | 52 | 25 | 24 | 00 | 0E | 05 | F6 | 05 | BC | 00 | 14 | 05 |
| 09E40 | 9C | 24 | BE | 00 | BA | 00 | 9E | 00 | 5A | 25 | 24 | 00 | 52 | 25 | 9E | 00 |
| 09E50 | FC | 00 | 24 | 00 | 08 | 00 | 88 | 00 | AA | 01 | FC | 00 | 24 | 00 | 5E | 25 |
| 09E60 | 88 | 00 | 24 | 00 | 52 | 25 | 88 | 00 | 24 | 00 | 56 | 25 | 88 | 00 | 24 | 00 |
| 09E70 | 62 | 25 | 88 | 00 | 24 | 00 | 5A | 25 | 88 | 00 | 1E | 01 | FC | 00 | 54 | 00 |

| | | | | | | | | | | | | | | | | |
|---|---|---|---|---|---|---|---|---|---|---|---|---|---|---|---|---|
| 09E80 | 01 | 00 | D7 | 03 | E1 | 01 | FC | 00 | 24 | 00 | 14 | 05 | F2 | 05 | AE | 00 |
| 09E90 | 2E | 00 | 09 | 00 | 24 | 00 | 56 | 04 | 4C | 00 | FC | 00 | 52 | 25 | 24 | 00 |
| 09EA0 | 7E | 04 | 9E | 00 | 56 | 25 | 24 | 00 | 7E | 04 | 9E | 00 | 62 | 25 | 24 | 00 |
| 09EB0 | 7E | 04 | 9E | 00 | 5A | 25 | 24 | 00 | 7E | 04 | 9E | 00 | 24 | 00 | FA | 04 |
| 09EC0 | 9C | 24 | B0 | 00 | 2E | 00 | 09 | 00 | 24 | 00 | 56 | 04 | 4C | 00 | FC | 00 |
| 09ED0 | 56 | 25 | 24 | 00 | FA | 04 | F6 | 05 | BC | 00 | CC | 24 | C0 | 00 | 9E | 00 |
| 09EE0 | 24 | 00 | FA | 04 | F6 | 05 | BC | 00 | F6 | 05 | C6 | 00 | F6 | 05 | AC | 00 |
| 09EF0 | 2E | 00 | 0F | 00 | 52 | 25 | 24 | 00 | F6 | 05 | 9E | 00 | 2A | 00 | 0B | 00 |
| 09F00 | 52 | 25 | 24 | 00 | F2 | 05 | 9E | 00 | FC | 00 | 24 | 00 | 0E | 05 | F2 | 05 |
| 09F10 | AE | 00 | 2E | 00 | 0F | 00 | 5E | 25 | 24 | 00 | 0E | 05 | F6 | 05 | BC | 00 |
| 09F20 | 9E | 00 | FC | 00 | F4 | 00 | 03 | 00 | 24 | 00 | 08 | 00 | 88 | 00 | 24 | 00 |
| 09F30 | 0A | 00 | 88 | 00 | 24 | 00 | 0C | 00 | 88 | 00 | 24 | 00 | 0E | 00 | 88 | 00 |
| 09F40 | 24 | 00 | 10 | 00 | 88 | 00 | 8C | 01 | FC | 00 | 24 | 00 | 08 | 00 | 88 | 00 |
| 09F50 | AA | 01 | FC | 00 | 24 | 00 | 5E | 25 | 88 | 00 | 24 | 00 | 52 | 25 | 88 | 00 |
| 09F60 | 24 | 00 | 56 | 25 | 88 | 00 | F2 | 00 | 0F | 00 | F2 | 00 | 13 | 00 | 1E | 01 |
| 09F70 | 54 | 00 | 01 | 00 | D7 | 03 | E1 | 01 | FC | 00 | 24 | 00 | 0E | 05 | F2 | 05 |
| 09F80 | AE | 00 | 2E | 00 | 09 | 00 | 24 | 00 | 56 | 04 | 4C | 00 | FC | 00 | 5E | 25 |
| 09F90 | 24 | 00 | FA | 04 | F6 | 05 | BC | 00 | 9E | 00 | 24 | 00 | 5E | 25 | 88 | 00 |
| 09FA0 | F2 | 00 | 07 | 00 | F2 | 00 | 0B | 00 | F2 | 00 | 0F | 00 | F2 | 00 | 13 | 00 |
| 09FB0 | 1E | 01 | FC | 00 | F4 | 00 | 03 | 00 | 24 | 00 | 08 | 00 | 88 | 00 | 24 | 00 |
| 09FC0 | 0A | 00 | 88 | 00 | 24 | 00 | 0C | 00 | 88 | 00 | 24 | 00 | 0E | 00 | 88 | 00 |
| 09FD0 | 24 | 00 | 10 | 00 | 88 | 00 | 8C | 01 | 54 | 00 | 01 | 00 | D7 | 03 | E1 | 01 |
| 09FE0 | FC | 00 | F4 | 00 | 03 | 00 | 24 | 00 | 08 | 00 | 88 | 00 | 24 | 00 | 0A | 00 |
| 09FF0 | 88 | 00 | 24 | 00 | 0C | 00 | 88 | 00 | 24 | 00 | 0E | 00 | 88 | 00 | 24 | 00 |
| 0A000 | 10 | 00 | 88 | 00 | 8C | 01 | FC | 00 | 66 | 25 | 24 | 00 | 4E | 25 | 9E | 00 |
| 0A010 | FC | 00 | 24 | 00 | FA | 04 | C8 | 24 | AC | 00 | 2E | 00 | 0F | 00 | 66 | 25 |
| 0A020 | 24 | 00 | F6 | 05 | 9E | 00 | 2A | 00 | 0F | 00 | 66 | 25 | 24 | 00 | FA | 04 |
| 0A030 | F6 | 05 | BC | 00 | 9E | 00 | FC | 00 | 24 | 00 | 0E | 05 | D0 | 24 | AC | 00 |
| 0A040 | 2E | 00 | 0F | 00 | 66 | 25 | 24 | 00 | 66 | 25 | 9C | 24 | BA | 00 | 9E | 00 |
| 0A050 | FC | 00 | 24 | 00 | 0E | 05 | 9C | 24 | AC | 00 | 2E | 00 | 0F | 00 | 6A | 25 |
| 0A060 | 24 | 00 | 94 | 24 | 9E | 00 | 2A | 00 | 0B | 00 | 6A | 25 | 24 | 00 | F2 | 05 |
| 0A070 | 9E | 00 | FC | 00 | 6A | 25 | 24 | 00 | 6A | 25 | 14 | 05 | 9C | 24 | BE | 00 |
| 0A080 | BA | 00 | 9E | 00 | FC | 00 | 24 | 00 | 08 | 00 | 88 | 00 | AA | 01 | FC | 00 |
| 0A090 | 24 | 00 | 66 | 25 | 88 | 00 | 24 | 00 | 6A | 25 | 88 | 00 | F2 | 00 | 08 | 00 |
| 0A0A0 | 24 | 00 | 66 | 25 | 94 | 24 | C6 | 00 | 88 | 00 | 24 | 00 | 6A | 25 | 94 | 24 |
| 0A0B0 | C6 | 00 | 88 | 00 | 1E | 01 | FC | 00 | 24 | 00 | 6E | 25 | 88 | 00 | AA | 01 |
| 0A0C0 | 24 | 00 | 08 | 00 | 88 | 00 | B4 | 01 | FC | 00 | 02 | 00 | 0F | 00 | 66 | 25 |
| 0A0D0 | 00 | 00 | 2A | 05 | 04 | 00 | 04 | 00 | 04 | 00 | 04 | 00 | 04 | 00 | 05 | 00 |
| 0A0E0 | 7E | 04 | 05 | 00 | 7E | 04 | 05 | 00 | 7E | 04 | 05 | 00 | 7E | 04 | 76 | 25 |
| 0A0F0 | 24 | 00 | 22 | 00 | FA | 01 | 9E | 00 | FC | 00 | 72 | 25 | 24 | 00 | 76 | 25 |
| 0A100 | 9E | 00 | FC | 00 | F4 | 00 | 03 | 00 | 24 | 00 | 08 | 00 | 88 | 00 | 24 | 00 |
| 0A110 | 0A | 00 | 88 | 00 | 24 | 00 | 0C | 00 | 88 | 00 | 24 | 00 | 0E | 00 | 88 | 00 |
| 0A120 | 24 | 00 | 10 | 00 | 88 | 00 | 8C | 01 | FC | 00 | 24 | 00 | 08 | 00 | 88 | 00 |
| 0A130 | AA | 01 | FC | 00 | 24 | 00 | 46 | 04 | 54 | 00 | 03 | 00 | 9D | 00 | 8D | 00 |
| 0A140 | BF | 00 | A1. | 00 | FC | 00 | 24 | 00 | 12 | 00 | 88 | 00 | 24 | 00 | 14 | 00 |
| 0A150 | 88 | 00 | F2 | 00 | 0B | 00 | 24 | 00 | 36 | 05 | 88 | 00 | 24 | 00 | 3C | 05 |
| 0A160 | 88 | 00 | 1E | 01 | 54 | 00 | 01 | 00 | D9 | 00 | C9 | 00 | FC | 00 | F2 | 00 |
| 0A170 | 03 | 00 | F2 | 00 | 07 | 00 | 24 | 00 | 12 | 00 | 88 | 00 | F2 | 00 | 0F | 00 |
| 0A180 | F2 | 00 | 13 | 00 | 1E | 01 | 54 | 00 | 01 | 00 | D9 | 00 | C9 | 00 | FC | 00 |
| 0A190 | 24 | 00 | 12 | 00 | 88 | 00 | F2 | 00 | 07 | 00 | F2 | 00 | 0B | 00 | F2 | 00 |
| 0A1A0 | 0F | 00 | F2 | 00 | 13 | 00 | 1E | 01 | FC | 00 | F2 | 00 | 03 | 00 | B4 | 01 |
| 0A1B0 | 24 | 00 | 72 | 25 | 88 | 00 | AA | 01 | 02 | 00 | FC | 00 | 02 | 00 | 24 | 00 |
| 0A1C0 | 00 | 00 | 04 | 00 | 24 | 00 | 06 | 00 | 40 | 04 | 80 | 03 | B0 | 00 | 2E | 00 |
| 0A1D0 | 09 | 00 | 24 | 00 | 72 | 04 | 4C | 00 | FC | 00 | 24 | 00 | 64 | 03 | 24 | 00 |
| 0A1E0 | 06 | 00 | 38 | 00 | DC | 02 | CC | 24 | C6 | 00 | CC | 24 | B4 | 00 | 2E | 00 |
| 0A1F0 | 09 | 00 | 24 | 00 | 72 | 04 | 4C | 00 | FC | 00 | 06 | 00 | 96 | 07 | FC | 00 |
| 0A200 | 02 | 00 | F2 | 00 | 0B | 00 | 24 | 00 | 36 | 05 | 88 | 00 | 24 | 00 | 3C | 05 |
| 0A210 | 00 | 00 | 05 | 00 | 7E | 04 | 24 | 00 | 06 | 00 | 7E | 04 | AC | 00 | 2E | 00 |
| 0A220 | 11 | 00 | 7A | 25 | 24 | 00 | 22 | 00 | FA | 01 | 9E | 00 | 2A | 00 | 0B | 00 |
| 0A230 | 7A | 25 | 24 | 00 | 06 | 00 | 9E | 00 | FC | 00 | 24 | 00 | 7A | 25 | 40 | 04 |
| 0A240 | 80 | 03 | B0 | 00 | 2E | 00 | 09 | 00 | 24 | 00 | 72 | 04 | 4C | 00 | FC | 00 |
| 0A250 | 24 | 00 | 64 | 03 | 24 | 00 | 7A | 25 | 38 | 00 | DC | 02 | CC | 24 | C6 | 00 |
| 0A260 | CC | 24 | AE | 00 | 2E | 00 | 11 | 00 | 64 | 03 | 24 | 00 | 7A | 25 | 38 | 00 |
| 0A270 | 4C | 03 | 9C | 00 | 02 | 00 | FC | 00 | 7A | 25 | 9E | 07 | FC | 00 | 02 | 00 |
| 0A280 | 00 | 00 | 04 | 00 | 04 | 00 | 9C | 00 | FC | 00 | 24 | 00 | 08 | 00 | F2 | 05 |

| | | | | | | | | | | | | | | | | |
|---|---|---|---|---|---|---|---|---|---|---|---|---|---|---|---|---|
| 0A290 | B4 | 00 | 2E | 00 | 09 | 00 | 24 | 00 | 7A | 04 | 4C | 00 | FC | 00 | C4 | 05 |
| 0A2A0 | 08 | 00 | C4 | 05 | 06 | 00 | 7E | 25 | B6 | 07 | FC | 00 | 28 | 00 | 7E | 25 |
| 0A2B0 | 82 | 00 | 02 | 00 | 52 | 25 | 24 | 00 | F6 | 05 | 9E | 00 | 2A | 00 | 0B | 00 |
| 0A2C0 | 00 | 00 | 48 | 05 | 04 | 00 | 04 | 00 | 04 | 00 | 04 | 00 | 18 | 00 | 24 | 00 |
| 0A2D0 | 0C | 00 | 08 | 00 | B4 | 00 | 0E | 00 | 0A | 00 | B4 | 00 | C8 | 00 | 0E | 00 |
| 0A2E0 | 52 | 04 | B0 | 00 | C8 | 00 | 0C | 00 | EC | 24 | B0 | 00 | C8 | 00 | 2E | 00 |
| 0A2F0 | 09 | 00 | 24 | 00 | 5A | 04 | 4C | 00 | FC | 00 | 24 | 00 | 0A | 00 | F2 | 05 |
| 0A300 | B4 | 00 | 0E | 00 | F2 | 05 | B4 | 00 | C8 | 00 | 08 | 00 | F2 | 05 | B4 | 00 |
| 0A310 | C8 | 00 | 0C | 00 | F2 | 05 | B4 | 00 | C8 | 00 | 2E | 00 | 09 | 00 | 24 | 00 |
| 0A320 | 5A | 04 | 4C | 00 | FC | 00 | 24 | 00 | 46 | 04 | 94 | 24 | AC | 00 | 46 | 04 |
| 0A330 | F2 | 05 | AC | 00 | C8 | 00 | 58 | 00 | 39 | 00 | FC | 00 | 24 | 00 | 0C | 00 |
| 0A340 | 08 | 00 | BC | 00 | F6 | 05 | BA | 00 | 0E | 00 | 0A | 00 | BC | 00 | F6 | 05 |
| 0A350 | BA | 00 | BE | 00 | CC | 24 | BE | 00 | DC | 24 | BA | 00 | 18 | 00 | 1A | 00 |
| 0A360 | 10 | 00 | A2 | 00 | B0 | 00 | 2E | 00 | 09 | 00 | 24 | 00 | 5A | 04 | 4C | 00 |
| 0A370 | FC | 00 | 5A | 00 | FC | 00 | 24 | 00 | 46 | 04 | F6 | 05 | AC | 00 | 58 | 00 |
| 0A380 | 39 | 00 | FC | 00 | 24 | 00 | 0C | 00 | 08 | 00 | BC | 00 | F6 | 05 | BA | 00 |
| 0A390 | 0E | 00 | 0A | 00 | BC | 00 | F6 | 05 | BA | 00 | BE | 00 | E0 | 24 | C0 | 00 |
| 0A3A0 | DC | 24 | BA | 00 | 18 | 00 | 1A | 00 | 10 | 00 | A2 | 00 | B0 | 00 | 2E | 00 |
| 0A3B0 | 09 | 00 | 24 | 00 | 5A | 04 | 4C | 00 | FC | 00 | 5A | 00 | FC | 00 | 24 | 00 |
| 0A3C0 | 46 | 04 | CC | 24 | AC | 00 | 58 | 00 | 39 | 00 | FC | 00 | 24 | 00 | 0C | 00 |
| 0A3D0 | 08 | 00 | BC | 00 | F6 | 05 | BA | 00 | 0E | 00 | 0A | 00 | BC | 00 | F6 | 05 |
| 0A3E0 | BA | 00 | BE | 00 | 9C | 24 | C0 | 00 | DC | 24 | BA | 00 | 18 | 00 | 1A | 00 |
| 0A3F0 | 10 | 00 | A2 | 00 | B0 | 00 | 2E | 00 | 09 | 00 | 24 | 00 | 5A | 04 | 4C | 00 |
| 0A400 | FC | 00 | 5A | 00 | FC | 00 | 08 | 00 | 0A | 00 | 0C | 00 | 0E | 00 | 18 | 00 |
| 0A410 | 1A | 00 | 10 | 00 | A8 | 00 | 18 | 00 | 1A | 00 | 10 | 00 | AA | 00 | D6 | 07 |
| 0A420 | FC | 00 | 02 | 00 | FC | 00 | 24 | 00 | 46 | 04 | F6 | 05 | AC | 00 | 58 | 00 |
| 0A430 | 00 | 00 | 5A | 05 | 04 | 00 | 04 | 00 | 04 | 00 | 04 | 00 | 18 | 00 | 24 | 00 |
| 0A440 | 0E | 00 | 0A | 00 | BC | 00 | F6 | 05 | BA | 00 | 18 | 00 | 10 | 00 | 24 | 00 |
| 0A450 | F6 | 05 | 38 | 00 | B0 | 00 | 2E | 00 | 1F | 00 | 88 | 25 | 24 | 00 | 0A | 00 |
| 0A460 | 18 | 00 | 10 | 00 | 24 | 00 | F6 | 05 | 38 | 00 | BA | 00 | F6 | 05 | BC | 00 |
| 0A470 | 9E | 00 | 2A | 00 | 0B | 00 | 88 | 25 | 24 | 00 | 0E | 00 | 9E | 00 | FC | 00 |
| 0A480 | 24 | 00 | 0C | 00 | 08 | 00 | BC | 00 | F6 | 05 | BA | 00 | 18 | 00 | 10 | 00 |
| 0A490 | 24 | 00 | CC | 24 | 38 | 00 | B0 | 00 | 2E | 00 | 1F | 00 | 88 | 25 | 24 | 00 |
| 0A4A0 | 08 | 00 | 18 | 00 | 10 | 00 | 24 | 00 | CC | 24 | 38 | 00 | BA | 00 | F6 | 05 |
| 0A4B0 | BC | 00 | 9E | 00 | 2A | 00 | 0B | 00 | 84 | 25 | 24 | 00 | 0C | 00 | 9E | 00 |
| 0A4C0 | FC | 00 | 08 | 00 | 0A | 00 | 0C | 00 | 0E | 00 | 18 | 00 | 1A | 00 | 10 | 00 |
| 0A4D0 | A8 | 00 | 18 | 00 | 1A | 00 | 10 | 00 | AA | 00 | E8 | 07 | FC | 00 | 02 | 00 |
| 0A4E0 | 00 | 00 | 6C | 05 | 04 | 00 | 18 | 00 | 08 | 00 | 18 | 00 | 1A | 00 | 0A | 00 |
| 0A4F0 | A2 | 00 | 18 | 00 | 1A | 00 | 0A | 00 | A8 | 00 | 18 | 00 | 1A | 00 | 0A | 00 |
| 0A500 | AA | 00 | FA | 07 | FC | 00 | 02 | 00 | 1F | 00 | 88 | 25 | 24 | 00 | 0A | 00 |
| 0A510 | 00 | 00 | 7A | 05 | 04 | 00 | 18 | 00 | 08 | 00 | 18 | 00 | 1A | 00 | 0A | 00 |
| 0A520 | A8 | 00 | 18 | 00 | 1A | 00 | 0A | 00 | AA | 00 | 08 | 08 | FC | 00 | 02 | 00 |
| 0A530 | 00 | 00 | 04 | 00 | 88 | 05 | A7 | 05 | 00 | 00 | 8C | 25 | 24 | 00 | 22 | 00 |
| 0A540 | FA | 01 | 9E | 00 | FC | 00 | 24 | 00 | 82 | 05 | 54 | 00 | 07 | 00 | 37 | 00 |
| 0A550 | 51 | 00 | 68 | 00 | 8D | 00 | ED | 00 | DD | 00 | 35 | 01 | 55 | 01 | FC | 00 |
| 0A560 | 24 | 00 | 6E | 04 | 4C | 00 | FC | 00 | 24 | 00 | 06 | 00 | 8C | 25 | AC | 00 |
| 0A570 | 2E | 00 | 09 | 00 | 24 | 00 | 5A | 04 | 4C | 00 | FC | 00 | 64 | 03 | 24 | 00 |
| 0A580 | 06 | 00 | 38 | 00 | DC | 02 | 24 | 00 | 64 | 03 | 24 | 00 | 06 | 00 | 38 | 00 |
| 0A590 | DC | 02 | CC | 24 | C8 | 00 | 9E | 00 | 02 | 00 | FC | 00 | 24 | 00 | 06 | 00 |
| 0A5A0 | 8C | 25 | AC | 00 | 2E | 00 | 09 | 00 | 24 | 00 | 5A | 04 | 4C | 00 | FC | 00 |
| 0A5B0 | 64 | 03 | 24 | 00 | 06 | 00 | 38 | 00 | DC | 02 | 24 | 00 | 64 | 03 | 24 | 00 |
| 0A5C0 | 06 | 00 | 38 | 00 | DC | 02 | CC | 24 | C8 | 00 | 9E | 00 | FC | 00 | 64 | 03 |
| 0A5D0 | 24 | 00 | 06 | 00 | 38 | 00 | DC | 02 | 24 | 00 | 64 | 03 | 24 | 00 | 06 | 00 |
| 0A5E0 | 38 | 00 | DC | 02 | CC | 24 | BC | 00 | 9E | 00 | 02 | 00 | FC | 00 | 24 | 00 |
| 0A5F0 | A0 | 05 | 54 | 00 | 03 | 00 | D7 | 00 | 05 | 01 | 15 | 01 | 2D | 01 | FC | 00 |
| 0A600 | 24 | 00 | 6E | 04 | 4C | 00 | FC | 00 | 64 | 03 | 24 | 00 | 06 | 00 | 38 | 00 |
| 0A610 | DC | 02 | 24 | 00 | 64 | 03 | 24 | 00 | 06 | 00 | 38 | 00 | DC | 02 | E0 | 24 |
| 0A620 | C8 | 00 | 9E | 00 | FC | 00 | 64 | 03 | 24 | 00 | 06 | 00 | 38 | 00 | DC | 02 |
| 0A630 | 24 | 00 | 64 | 03 | 24 | 00 | 06 | 00 | 38 | 00 | DC | 02 | E0 | 24 | BC | 00 |
| 0A640 | 9E | 00 | 02 | 00 | FC | 00 | 64 | 03 | 24 | 00 | 06 | 00 | 38 | 00 | DC | 02 |
| 0A650 | 24 | 00 | 64 | 03 | 24 | 00 | 06 | 00 | 38 | 00 | DC | 02 | E0 | 24 | C8 | 00 |
| 0A660 | 9E | 00 | 02 | 00 | FC | 00 | 24 | 00 | A0 | 05 | 54 | 00 | 03 | 00 | 4F | 01 |
| 0A670 | 7D | 01 | 6F | 01 | 91 | 01 | FC | 00 | 24 | 00 | 6E | 04 | 4C | 00 | FC | 00 |
| 0A680 | 64 | 03 | 24 | 00 | 06 | 00 | 38 | 00 | DC | 02 | 24 | 00 | 64 | 03 | 24 | 00 |
| 0A690 | 06 | 00 | 38 | 00 | DC | 02 | 9C | 24 | C8 | 00 | 9E | 00 | 02 | 00 | FC | 00 |

| | | | | | | | | | | | | | | | | |
|---|---|---|---|---|---|---|---|---|---|---|---|---|---|---|---|---|
| 0A6A0 | 64 | 03 | 24 | 00 | 06 | 00 | 38 | 00 | DC | 02 | 24 | 00 | 64 | 03 | 24 | 00 |
| 0A6B0 | 06 | 00 | 38 | 00 | DC | 02 | 9C | 24 | C8 | 00 | 9E | 00 | FC | 00 | 64 | 03 |
| 0A6C0 | 24 | 00 | 06 | 00 | 38 | 00 | DC | 02 | 24 | 00 | 64 | 03 | 24 | 00 | 06 | 00 |
| 0A6D0 | 38 | 00 | DC | 02 | 9C | 24 | BC | 00 | 9E | 00 | FC | 00 | 02 | 00 | DC | 02 |
| 0A6E0 | 00 | 00 | 90 | 25 | 26 | 08 | FC | 00 | 24 | 00 | 90 | 25 | 82 | 00 | 02 | 00 |
| 0A6F0 | 00 | 00 | 04 | 00 | 04 | 00 | 04 | 00 | 04 | 00 | 04 | 00 | 24 | 00 | 0A | 00 |
| 0A700 | F6 | 05 | BA | 00 | 0E | 00 | B2 | 00 | 08 | 00 | F6 | 05 | BA | 00 | 0C | 00 |
| 0A710 | B2 | 00 | C8 | 00 | 2E | 00 | 09 | 00 | 24 | 00 | 5A | 04 | 4C | 00 | FC | 00 |
| 0A720 | 24 | 00 | 0E | 00 | F6 | 05 | BA | 00 | 52 | 04 | B0 | 00 | 2E | 00 | 09 | 00 |
| 0A730 | 24 | 00 | 5A | 04 | 4C | 00 | FC | 00 | 24 | 00 | 0C | 00 | EC | 24 | B0 | 00 |
| 0A740 | 2E | 00 | 09 | 00 | 24 | 00 | 5A | 04 | 4C | 00 | FC | 00 | 24 | 00 | 0A | 00 |
| 0A750 | F2 | 05 | B4 | 00 | 0E | 00 | F2 | 05 | B4 | 00 | C8 | 00 | 08 | 00 | F2 | 05 |
| 0A760 | B4 | 00 | C8 | 00 | 0C | 00 | F2 | 05 | B4 | 00 | C8 | 00 | 2E | 00 | 09 | 00 |
| 0A770 | 24 | 00 | 5A | 04 | 4C | 00 | FC | 00 | 24 | 00 | 46 | 04 | 54 | 00 | 03 | 00 |
| 0A780 | A3 | 00 | C9 | 00 | C3 | 00 | 91 | 01 | FC | 00 | 54 | 00 | 01 | 00 | D7 | 00 |
| 0A790 | A5 | 01 | FC | 00 | 24 | 00 | 06 | 00 | DC | 24 | B0 | 00 | 2E | 00 | 0D | 00 |
| 0A7A0 | 24 | 00 | 6A | 04 | 4C | 00 | 2A | 00 | 0B | 00 | 54 | 00 | 01 | 00 | D7 | 00 |
| 0A7B0 | A5 | 01 | FC | 00 | 24 | 00 | 06 | 00 | F6 | 05 | B0 | 00 | 2E | 00 | 09 | 00 |
| 0A7C0 | 24 | 00 | 6A | 04 | 4C | 00 | FC | 00 | 0C | 00 | 0E | 00 | 08 | 00 | 0A | 00 |
| 0A7D0 | 06 | 00 | A6 | 07 | FC | 00 | 02 | 00 | 52 | 04 | B0 | 00 | 2E | 00 | 09 | 00 |
| 0A7E0 | 00 | 00 | B8 | 05 | 04 | 00 | 05 | 00 | C4 | 05 | 24 | 00 | 64 | 03 | 24 | 00 |
| 0A7F0 | 08 | 00 | 38 | 00 | DC | 02 | CC | 24 | CC | 24 | AE | 00 | C6 | 00 | 2E | 00 |
| 0A800 | 09 | 00 | 24 | 00 | 76 | 04 | 4C | 00 | FC | 00 | 94 | 25 | 24 | 00 | 0A | 00 |
| 0A810 | 9E | 00 | FC | 00 | 24 | 00 | 0A | 00 | C4 | 05 | AC | 00 | 46 | 04 | F2 | 05 |
| 0A820 | AC | 00 | C6 | 00 | 2E | 00 | 23 | 00 | 94 | 25 | 24 | 00 | 64 | 03 | 24 | 00 |
| 0A830 | 08 | 00 | 38 | 00 | F4 | 02 | 98 | 24 | 64 | 03 | 24 | 00 | 08 | 00 | 38 | 00 |
| 0A840 | FC | 02 | BE | 00 | BA | 00 | 9E | 00 | FC | 00 | 24 | 00 | 0A | 00 | C4 | 05 |
| 0A850 | AC | 00 | 46 | 04 | 94 | 24 | AC | 00 | C6 | 00 | 2E | 00 | 23 | 00 | 94 | 25 |
| 0A860 | 24 | 00 | 64 | 03 | 24 | 00 | 08 | 00 | 38 | 00 | F4 | 02 | 98 | 24 | 64 | 03 |
| 0A870 | 24 | 00 | 08 | 00 | 38 | 00 | FC | 02 | BE | 00 | BA | 00 | 9E | 00 | FC | 00 |
| 0A880 | 24 | 00 | 0A | 00 | C4 | 05 | AC | 00 | 46 | 04 | F6 | 05 | AC | 00 | C6 | 00 |
| 0A890 | 2E | 00 | 13 | 00 | 94 | 25 | 24 | 00 | 64 | 03 | 24 | 00 | 08 | 00 | 38 | 00 |
| 0A8A0 | 04 | 03 | 9E | 00 | FC | 00 | 24 | 00 | 0A | 00 | C4 | 05 | AC | 00 | 46 | 04 |
| 0A8B0 | CC | 24 | AC | 00 | C6 | 00 | 2E | 00 | 0B | 00 | 94 | 25 | 24 | 00 | F6 | 05 |
| 0A8C0 | 9E | 00 | FC | 00 | 24 | 00 | 08 | 00 | 88 | 00 | 24 | 00 | 94 | 25 | 88 | 00 |
| 0A8D0 | 7C | 02 | FC | 00 | 02 | 00 | 23 | 00 | 94 | 25 | 24 | 00 | 64 | 03 | 24 | 00 |
| 0A8E0 | 00 | 00 | 04 | 00 | 0C | 00 | 91 | 03 | 00 | 00 | D5 | 05 | 00 | 00 | 0F | 04 |
| 0A8F0 | 00 | 00 | E9 | 05 | 00 | 00 | 16 | 00 | 0B | 00 | 54 | 00 | 01 | 00 | 69 | 04 |
| 0A900 | D1 | 07 | FC | 00 | C6 | 25 | 24 | 00 | 22 | 00 | FA | 01 | 9E | 00 | FC | 00 |
| 0A910 | 24 | 00 | 06 | 00 | 88 | 00 | AA | 01 | FC | 00 | 24 | 00 | 64 | 03 | 24 | 00 |
| 0A920 | 06 | 00 | 38 | 00 | DC | 02 | CC | 24 | C6 | 00 | CC | 24 | B4 | 00 | 2E | 00 |
| 0A930 | 09 | 00 | 24 | 00 | 72 | 04 | 4C | 00 | FC | 00 | 9E | 25 | 24 | 00 | 7E | 04 |
| 0A940 | 9E | 00 | A2 | 25 | 24 | 00 | 7E | 04 | 9E | 00 | A6 | 25 | 24 | 00 | 7E | 04 |
| 0A950 | 9E | 00 | AA | 25 | 24 | 00 | 7E | 04 | 9E | 00 | FC | 00 | AE | 25 | 24 | 00 |
| 0A960 | DC | 05 | 9E | 00 | FC | 00 | 24 | 00 | 46 | 04 | 94 | 24 | AE | 00 | C8 | 05 |
| 0A970 | C8 | 24 | AC | 00 | C6 | 00 | 2E | 00 | 09 | 00 | 24 | 00 | 56 | 04 | 4C | 00 |
| 0A980 | FC | 00 | 24 | 00 | 46 | 04 | 94 | 24 | AE | 00 | DC | 05 | D0 | 24 | AC | 00 |
| 0A990 | C6 | 00 | 2E | 00 | 09 | 00 | 24 | 00 | 56 | 04 | 4C | 00 | FC | 00 | B2 | 25 |
| 0A9A0 | 24 | 00 | 64 | 03 | 24 | 00 | 06 | 00 | 38 | 00 | AC | 02 | 9E | 00 | B6 | 25 |
| 0A9B0 | 24 | 00 | 64 | 03 | 24 | 00 | 06 | 00 | 38 | 00 | B4 | 02 | 9E | 00 | BA | 25 |
| 0A9C0 | 24 | 00 | 64 | 03 | 24 | 00 | 06 | 00 | 38 | 00 | BC | 02 | 9E | 00 | BE | 25 |
| 0A9D0 | 24 | 00 | 64 | 03 | 24 | 00 | 06 | 00 | 38 | 00 | C4 | 02 | 9E | 00 | FC | 00 |
| 0A9E0 | 24 | 00 | 64 | 03 | 24 | 00 | 06 | 00 | 38 | 00 | 3C | 03 | F6 | 05 | C6 | 00 |
| 0A9F0 | F6 | 05 | AC | 00 | 2E | 00 | 0F | 00 | B6 | 25 | 24 | 00 | B6 | 25 | F6 | 05 |
| 0AA00 | BC | 00 | 9E | 00 | FC | 00 | 24 | 00 | BE | 25 | B6 | 25 | BC | 00 | F6 | 05 |
| 0AA10 | B4 | 00 | 2E | 00 | 09 | 00 | 24 | 00 | 66 | 04 | 4C | 00 | FC | 00 | 24 | 00 |
| 0AA20 | BA | 25 | B2 | 25 | BC | 00 | 08 | 00 | A0 | 00 | CC | 24 | BA | 00 | B4 | 00 |
| 0AA30 | 2E | 00 | 09 | 00 | 24 | 00 | 66 | 04 | 4C | 00 | FC | 00 | F4 | 00 | 03 | 00 |
| 0AA40 | 24 | 00 | 06 | 00 | 88 | 00 | 98 | 25 | DC | 01 | FC | 00 | 24 | 00 | 46 | 04 |
| 0AA50 | 54 | 00 | 03 | 00 | B9 | 02 | CD | 01 | 49 | 03 | 1D | 02 | FC | 00 | 24 | 00 |
| 0AA60 | 46 | 04 | F2 | 05 | AC | 00 | 2E | 00 | 0B | 00 | 54 | 00 | 01 | 00 | 45 | 02 |
| 0AA70 | 91 | 01 | FC | 00 | 24 | 00 | C8 | 05 | F2 | 05 | AE | 00 | 2E | 00 | 13 | 00 |
| 0AA80 | 9E | 25 | 24 | 00 | C8 | 05 | F6 | 05 | BC | 00 | 9E | 00 | 2A | 00 | 0B | 00 |
| 0AA90 | 54 | 00 | 01 | 00 | 1D | 02 | 7D | 01 | FC | 00 | 24 | 00 | C8 | 05 | C8 | 24 |
| 0AAA0 | AC | 00 | 2E | 00 | 0B | 00 | 9E | 25 | 24 | 00 | F6 | 05 | 9E | 00 | FC | 00 |

| | | | | | | | | | | | | | | | | |
|---|---|---|---|---|---|---|---|---|---|---|---|---|---|---|---|---|
| 0AAB0 | 24 | 00 | DC | 05 | D0 | 24 | AC | 00 | 2E | 00 | 0F | 00 | 9E | 25 | 24 | 00 |
| 0AAC0 | 9E | 25 | 9C | 24 | BA | 00 | 9E | 00 | FC | 00 | 24 | 00 | DC | 05 | 9C | 24 |
| 0AAD0 | AC | 00 | 2E | 00 | 0F | 00 | A2 | 25 | 24 | 00 | 94 | 24 | 9E | 00 | 2A | 00 |
| 0AAE0 | 0B | 00 | A2 | 25 | 24 | 00 | F2 | 05 | 9E | 00 | FC | 00 | A2 | 25 | 24 | 00 |
| 0AAF0 | A2 | 25 | E2 | 05 | 9C | 24 | BE | 00 | BA | 00 | 9E | 00 | FC | 00 | 24 | 00 |
| 0AB00 | 9E | 25 | 88 | 00 | 24 | 00 | A2 | 25 | 88 | 00 | F2 | 00 | 0B | 00 | 24 | 00 |
| 0AB10 | 9E | 25 | 88 | 00 | 24 | 00 | A2 | 25 | 88 | 00 | 1E | 01 | 54 | 00 | 01 | 00 |
| 0AB20 | B1 | 03 | 59 | 02 | FC | 00 | 24 | 00 | C8 | 05 | F2 | 05 | AE | 00 | 2E | 00 |
| 0AB30 | 17 | 00 | 9E | 25 | 24 | 00 | C8 | 05 | F6 | 05 | BC | 00 | 9E | 00 | A6 | 25 |
| 0AB40 | 24 | 00 | 9E | 25 | 9E | 00 | FC | 00 | 24 | 00 | DC | 05 | F2 | 05 | AE | 00 |
| 0AB50 | 2E | 00 | 1F | 00 | A2 | 25 | 24 | 00 | DC | 05 | F6 | 05 | BC | 00 | 9C | 24 |
| 0AB60 | E2 | 05 | BE | 00 | BA | 00 | 9E | 00 | AA | 25 | 24 | 00 | A2 | 25 | 9E | 00 |
| 0AB70 | FC | 00 | 24 | 00 | 9E | 25 | 88 | 00 | 24 | 00 | A2 | 25 | 88 | 00 | F2 | 00 |
| 0AB80 | 0B | 00 | 24 | 00 | A6 | 25 | 88 | 00 | 24 | 00 | AA | 25 | 88 | 00 | 1E | 01 |
| 0AB90 | 54 | 00 | 01 | 00 | B1 | 03 | 59 | 02 | FC | 00 | 24 | 00 | C8 | 05 | F2 | 05 |
| 0ABA0 | AC | 00 | 2E | 00 | 1B | 00 | A6 | 25 | 24 | 00 | 64 | 03 | 24 | 00 | 06 | 00 |
| 0ABB0 | 38 | 00 | 04 | 03 | 9E | 00 | 54 | 00 | 01 | 00 | 13 | 03 | F5 | 01 | FC | 00 |
| 0ABC0 | A6 | 25 | 24 | 00 | C8 | 05 | F6 | 05 | BC | 00 | CC | 24 | C0 | 00 | 9E | 00 |
| 0ABD0 | 24 | 00 | C8 | 05 | F6 | 05 | BC | 00 | F6 | 05 | C6 | 00 | 64 | 03 | 24 | 00 |
| 0ABE0 | 06 | 00 | 38 | 00 | FC | 02 | AE | 00 | 2E | 00 | 09 | 00 | 24 | 00 | 6A | 04 |
| 0ABF0 | 4C | 00 | FC | 00 | 24 | 00 | DC | 05 | F2 | 05 | AE | 00 | 2E | 00 | 09 | 00 |
| 0AC00 | 24 | 00 | 6A | 04 | 4C | 00 | FC | 00 | F2 | 00 | 03 | 00 | F2 | 00 | 07 | 00 |
| 0AC10 | 24 | 00 | A6 | 25 | 88 | 00 | F2 | 00 | 0F | 00 | F2 | 00 | 13 | 00 | 1E | 01 |
| 0AC20 | 54 | 00 | 01 | 00 | B1 | 03 | 59 | 02 | FC | 00 | 24 | 00 | DC | 05 | F2 | 05 |
| 0AC30 | AE | 00 | 2E | 00 | 09 | 00 | 24 | 00 | 6A | 04 | 4C | 00 | FC | 00 | 24 | 00 |
| 0AC40 | C8 | 05 | F2 | 05 | AC | 00 | 2E | 00 | 2B | 00 | 24 | 00 | 64 | 03 | 24 | 00 |
| 0AC50 | 06 | 00 | 38 | 00 | F4 | 02 | 88 | 00 | F2 | 00 | 07 | 00 | F2 | 00 | 0B | 00 |
| 0AC60 | F2 | 00 | 0F | 00 | F2 | 00 | 13 | 00 | 1E | 01 | 54 | 00 | 01 | 00 | B1 | 03 |
| 0AC70 | 59 | 02 | FC | 00 | 24 | 00 | C8 | 05 | F6 | 05 | BC | 00 | 88 | 00 | F2 | 00 |
| 0AC80 | 07 | 00 | F2 | 00 | 0B | 00 | F2 | 00 | 0F | 00 | F2 | 00 | 13 | 00 | 1E | 01 |
| 0AC90 | FC | 00 | B6 | 25 | BA | 25 | B6 | 25 | B2 | 25 | 06 | 00 | 86 | 07 | FC | 00 |
| 0ACA0 | 24 | 00 | 06 | 00 | 88 | 00 | AA | 01 | FC | 00 | C2 | 25 | 24 | 00 | F6 | 05 |
| 0ACB0 | 9E | 00 | 20 | 00 | 24 | 00 | BA | 25 | B2 | 25 | BC | 00 | F6 | 05 | BA | 00 |
| 0ACC0 | 08 | 00 | A0 | 00 | BC | 00 | CC | 24 | C0 | 00 | 88 | 00 | 62 | 00 | 60 | 00 |
| 0ACD0 | 05 | 00 | CA | 25 | 94 | 00 | 5E | 00 | FC | 00 | 08 | 00 | 94 | 00 | FC | 00 |
| 0ACE0 | F4 | 00 | 03 | 00 | 24 | 00 | 06 | 00 | 88 | 00 | 98 | 25 | E6 | 01 | FC | 00 |
| 0ACF0 | BE | 25 | BA | 25 | 24 | 00 | B6 | 25 | F6 | 05 | BA | 00 | 88 | 00 | B2 | 25 |
| 0AD00 | 06 | 00 | 86 | 07 | FC | 00 | F2 | 00 | 03 | 00 | F2 | 00 | 07 | 00 | F2 | 00 |
| 0AD10 | 0B | 00 | F2 | 00 | 0F | 00 | F2 | 00 | 13 | 00 | 1E | 01 | FC | 00 | 24 | 00 |
| 0AD20 | C6 | 25 | 88 | 00 | AA | 01 | FC | 00 | 64 | 03 | 24 | 00 | 06 | 00 | 38 | 00 |
| 0AD30 | 3C | 03 | 24 | 00 | 64 | 03 | 24 | 00 | 06 | 00 | 38 | 00 | 3C | 03 | F6 | 05 |
| 0AD40 | C8 | 00 | 9E | 00 | FC | 00 | 02 | 00 | FC | 00 | 24 | 00 | C6 | 25 | 88 | 00 |
| 0AD50 | AA | 01 | FC | 00 | 4E | 00 | FC | 00 | 24 | 00 | 64 | 00 | 3C | 00 | 4C | 00 |
| 0AD60 | FC | 00 | 02 | 00 | 24 | 00 | BA | 25 | B2 | 25 | BC | 00 | F6 | 05 | BA | 00 |
| 0AD70 | 00 | 00 | 04 | 00 | 04 | 00 | 05 | 00 | C4 | 05 | 05 | 00 | C4 | 05 | 24 | 00 |
| 0AD80 | 0C | 00 | C4 | 05 | AE | 00 | 0A | 00 | C4 | 05 | AE | 00 | C8 | 00 | 2E | 00 |
| 0AD90 | 09 | 00 | 24 | 00 | 5A | 04 | 4C | 00 | FC | 00 | 9C | 00 | FC | 00 | 24 | 00 |
| 0ADA0 | 0A | 00 | C4 | 05 | AC | 00 | 2E | 00 | 0F | 00 | D6 | 25 | 24 | 00 | C4 | 05 |
| 0ADB0 | 9E | 00 | 2A | 00 | 0B | 00 | D6 | 25 | 24 | 00 | 0A | 00 | 9E | 00 | FC | 00 |
| 0ADC0 | 24 | 00 | 08 | 00 | C4 | 05 | AC | 00 | 2E | 00 | 0F | 00 | DA | 25 | 24 | 00 |
| 0ADD0 | C4 | 05 | 9E | 00 | 2A | 00 | 0B | 00 | DA | 25 | 24 | 00 | 08 | 00 | 9E | 00 |
| 0ADE0 | FC | 00 | 24 | 00 | DA | 25 | F2 | 05 | B4 | 00 | 2E | 00 | 09 | 00 | 24 | 00 |
| 0ADF0 | 7A | 04 | 4C | 00 | FC | 00 | 24 | 00 | D6 | 25 | F2 | 05 | B4 | 00 | 0A | 00 |
| 0AE00 | C4 | 05 | AE | 00 | C6 | 00 | 2E | 00 | 09 | 00 | 24 | 00 | 7A | 04 | 4C | 00 |
| 0AE10 | FC | 00 | 0C | 00 | DA | 25 | D6 | 25 | 06 | 00 | D0 | 25 | B6 | 07 | FC | 00 |
| 0AE20 | 28 | 00 | D0 | 25 | 82 | 00 | 02 | 00 | C4 | 05 | 05 | 00 | C4 | 05 | 24 | 00 |
| 0AE30 | 00 | 00 | 04 | 00 | 04 | 00 | 05 | 00 | F2 | 05 | DE | 25 | 24 | 00 | 0A | 00 |
| 0AE40 | 9E | 00 | FC | 00 | 06 | 00 | 08 | 00 | DE | 25 | 2E | 08 | FC | 00 | 24 | 00 |
| 0AE50 | DE | 25 | 82 | 00 | 02 | 00 | 2E | 00 | 0F | 00 | D6 | 25 | 24 | 00 | C4 | 05 |
| 0AE60 | 00 | 00 | 02 | 00 | 0B | 00 | D6 | 25 | 24 | 00 | 0A | 00 | 9E | 00 | FC | 00 |
| 0AE70 | 00 | 00 | 04 | 00 | 04 | 00 | 05 | 00 | C4 | 05 | 05 | 00 | F6 | 05 | 24 | 00 |
| 0AE80 | 0C | 00 | C4 | 05 | B4 | 00 | 2E | 00 | 09 | 00 | 24 | 00 | 5A | 04 | 4C | 00 |
| 0AE90 | FC | 00 | 9C | 00 | FC | 00 | 24 | 00 | 0A | 00 | C4 | 05 | AC | 00 | 2E | 00 |
| 0AEA0 | 0F | 00 | E8 | 25 | 24 | 00 | C4 | 05 | 9E | 00 | 2A | 00 | 0B | 00 | E8 | 25 |
| 0AEB0 | 24 | 00 | 0A | 00 | 9E | 00 | FC | 00 | 24 | 00 | 08 | 00 | C4 | 05 | AC | 00 |

```
0AEC0   2E 00 0F 00 EC 25 24 00 C4 05 9E 00 2A 00 0B 00
0AED0   EC 25 24 00 08 00 9E 00 FC 00 24 00 EC 25 F2 05
0AEE0   B4 00 2E 00 09 00 24 00 7A 04 4C 00 FC 00 24 00
0AEF0   E8 25 F2 05 B4 00 0A 00 C4 05 AE 00 C6 00 2E 00
0AF00   09 00 24 00 7A 04 4C 00 FC 00 0C 00 EC 25 E8 25
0AF10   06 00 E2 25 B6 07 FC 00 28 00 E2 25 82 00 02 00
0AF20   00 00 00 06 05 00 7E 04 05 00 7E 04 05 00 7E 04
0AF30   05 00 7E 04 05 00 7E 04 24 00 08 00 F6 05 BA 00
0AF40   88 00 24 00 0A 00 F6 05 BA 00 88 00 0C 00 0E 00
0AF50   10 00 52 07 FC 00 02 00 9E 00 2A 00 0B 00 E8 25
0AF60   00 00 12 06 04 00 91 03 00 00 2B 06 00 00 0F 04
0AF70   00 00 24 00 64 03 24 00 08 00 38 00 DC 02 CC 24
0AF80   CC 24 AE 00 C6 00 2E 00 09 00 24 00 76 04 4C 00
0AF90   FC 00 24 00 1E 06 F2 05 AC 00 2E 00 1F 00 F0 25
0AFA0   24 00 64 03 24 00 08 00 38 00 EC 02 9E 00 54 00
0AFB0   01 00 37 01 F1 00 2A 00 0F 00 F0 25 24 00 1E 06
0AFC0   F6 05 BC 00 9E 00 FC 00 24 00 32 06 F2 05 AC 00
0AFD0   46 04 F6 05 AE 00 C6 00 2E 00 13 00 F4 25 24 00
0AFE0   64 03 24 00 08 00 38 00 FC 02 9E 00 FC 00 24 00
0AFF0   32 06 F2 05 AC 00 46 04 F6 05 AC 00 C6 00 2E 00
0B000   13 00 F4 25 24 00 64 03 24 00 08 00 38 00 F4 02
0B010   9E 00 FC 00 24 00 32 06 F2 05 AE 00 2E 00 0F 00
0B020   F4 25 24 00 32 06 F6 05 BC 00 9E 00 FC 00 24 00
0B030   46 04 F6 05 AC 00 58 00 49 00 FC 00 24 00 F0 25
0B040   F6 05 BA 00 F6 05 C6 00 64 03 24 00 08 00 38 00
0B050   FC 02 AC 00 2E 00 09 00 24 00 6A 04 4C 00 FC 00
0B060   24 00 F4 25 F2 05 AE 00 2E 00 09 00 24 00 6A 04
0B070   4C 00 FC 00 F0 25 24 00 F0 25 CC 24 C0 00 9E 00
0B080   FC 00 5A 00 FC 00 F0 25 24 00 F0 25 98 24 F4 25
0B090   BE 00 BA 00 9E 00 FC 00 24 00 08 00 88 00 24 00
0B0A0   F0 25 88 00 7C 02 FC 00 02 00 AC 00 C6 00 2E 00
0B0B0   00 00 24 00 46 04 82 00 02 00 08 00 38 00 F4 02
0B0C0   00 00 04 00 24 00 06 00 F6 05 BA 00 54 00 05 00
0B0D0   57 00 3D 00 57 00 3D 00 57 00 3D 00 FC 00 24 00
0B0E0   46 04 94 24 AC 00 06 00 F2 05 AC 00 C6 00 2E 00
0B0F0   0B 00 54 00 01 00 57 00 3D 00 FC 00 24 00 46 04
0B100   94 24 AC 00 06 00 94 24 AE 00 C6 00 2E 00 09 00
0B110   24 00 5E 04 4C 00 FC 00 4E 04 24 00 F2 05 9E 00
0B120   FC 00 24 00 52 04 02 25 AC 00 2E 00 0F 00 10 26
0B130   24 00 F6 05 9E 00 2A 00 0B 00 10 26 24 00 DC 24
0B140   9E 00 FC 00 24 00 46 04 94 24 AC 00 2E 00 27 00
0B150   08 26 24 00 F2 05 9E 00 0C 26 24 00 14 26 9E 00
0B160   10 26 24 00 10 26 CC 24 C6 00 9E 00 54 00 01 00
0B170   E9 00 C9 00 FC 00 46 04 24 00 06 00 9E 00 FC 00
0B180   24 00 06 00 54 00 03 00 F7 02 09 02 17 04 BD 02
0B190   FC 00 10 26 C6 07 FC 00 0C 26 24 00 18 26 9E 00
0B1A0   08 26 24 00 FC 25 9E 00 FC 00 04 26 24 00 F2 05
0B1B0   9E 00 20 00 24 00 4A 04 88 00 62 00 60 00 A3 00
0B1C0   FC 00 64 03 24 00 04 26 38 00 9C 00 FC 00 64 03
0B1D0   24 00 04 26 38 00 DC 02 24 00 08 26 00 26 BA 00
0B1E0   9E 00 FC 00 64 03 24 00 04 26 38 00 E4 02 24 00
0B1F0   94 24 9E 00 FC 00 64 03 24 00 04 26 38 00 EC 02
0B200   24 00 94 24 9E 00 FC 00 64 03 24 00 04 26 38 00
0B210   F4 02 24 00 94 24 9E 00 64 03 24 00 04 26 38 00
0B220   FC 02 24 00 F2 05 9E 00 64 03 24 00 04 26 38 00
0B230   04 03 24 00 F2 05 9E 00 64 03 24 00 04 26 38 00
0B240   0C 03 24 00 F2 05 9E 00 FC 00 64 03 24 00 04 26
0B250   38 00 34 03 24 00 0C 26 9E 00 FC 00 04 26 9E 07
0B260   FC 00 5E 00 FC 00 F4 00 03 00 24 00 F6 05 88 00
0B270   24 00 F2 05 88 00 24 00 F2 05 88 00 24 00 10 26
0B280   88 00 24 00 52 04 F6 05 BC 00 88 00 8C 01 FC 00
0B290   24 00 24 00 6E 00 00 00 24 00 E8 24 34 00 9C 24
0B2A0   C6 00 F2 05 AC 00 2E 00 0B 00 54 00 01 00 7F 02
0B2B0   CD 01 FC 00 64 03 24 00 F2 05 38 00 E4 02 24 00
0B2C0   20 26 9E 00 FC 00 64 03 24 00 F2 05 38 00 EC 02
```

| | | | | | | | | | | | | | | | | |
|---|---|---|---|---|---|---|---|---|---|---|---|---|---|---|---|---|
| OB2D0 | 24 | 00 | 20 | 26 | 9E | 00 | FC | 00 | 64 | 03 | 24 | 00 | F2 | 05 | 38 | 00 |
| OB2E0 | F4 | 02 | 24 | 00 | F2 | 05 | 9E | 00 | 64 | 03 | 24 | 00 | F2 | 05 | 38 | 00 |
| OB2F0 | FC | 02 | 24 | 00 | 94 | 24 | 9E | 00 | 64 | 03 | 24 | 00 | F2 | 05 | 38 | 00 |
| OB300 | 04 | 03 | 24 | 00 | F2 | 05 | 9E | 00 | 64 | 03 | 24 | 00 | F2 | 05 | 38 | 00 |
| OB310 | 0C | 03 | 24 | 00 | 94 | 24 | 9E | 00 | FC | 00 | 64 | 03 | 24 | 00 | F2 | 05 |
| OB320 | 38 | 00 | DC | 02 | 24 | 00 | 64 | 03 | 24 | 00 | F2 | 05 | 38 | 00 | DC | 02 |
| OB330 | E0 | 24 | C8 | 00 | 9E | 00 | 54 | 00 | 01 | 00 | C3 | 02 | E1 | 01 | FC | 00 |
| OB340 | 64 | 03 | 24 | 00 | F2 | 05 | 38 | 00 | DC | 02 | 24 | 00 | 64 | 03 | 24 | 00 |
| OB350 | F2 | 05 | 38 | 00 | DC | 02 | 98 | 24 | C8 | 00 | 9C | 24 | C8 | 00 | 9E | 00 |
| OB360 | FC | 00 | 64 | 03 | 24 | 00 | F2 | 05 | 38 | 00 | DC | 02 | 24 | 00 | 64 | 03 |
| OB370 | 24 | 00 | F2 | 05 | 38 | 00 | DC | 02 | 24 | 00 | E0 | 24 | CC | 00 | C6 | 00 |
| OB380 | 9E | 00 | FC | 00 | F4 | 00 | 03 | 00 | 24 | 00 | F2 | 05 | 88 | 00 | 24 | 00 |
| OB390 | EC | 24 | 88 | 00 | 24 | 00 | F2 | 05 | 88 | 00 | 24 | 00 | EC | 24 | 88 | 00 |
| OB3A0 | 24 | 00 | 52 | 04 | F6 | 05 | BC | 00 | 88 | 00 | 8C | 01 | FC | 00 | 54 | 00 |
| OB3B0 | 01 | 00 | 4D | 05 | 85 | 03 | FC | 00 | 04 | 26 | 24 | 00 | F2 | 05 | 9E | 00 |
| OB3C0 | 20 | 00 | 24 | 00 | 4A | 04 | 88 | 00 | 62 | 00 | 60 | 00 | A3 | 00 | FC | 00 |
| OB3D0 | 64 | 03 | 24 | 00 | 04 | 26 | 38 | 00 | 9C | 00 | FC | 00 | 64 | 03 | 24 | 00 |
| OB3E0 | 04 | 26 | 38 | 00 | EC | 02 | 24 | 00 | DC | 24 | 9E | 00 | FC | 00 | 64 | 03 |
| OB3F0 | 24 | 00 | 04 | 26 | 38 | 00 | E4 | 02 | 24 | 00 | F2 | 05 | 9E | 00 | FC | 00 |
| OB400 | 64 | 03 | 24 | 00 | 04 | 26 | 38 | 00 | F4 | 02 | 24 | 00 | F2 | 05 | 9E | 00 |
| OB410 | 64 | 03 | 24 | 00 | 04 | 26 | 38 | 00 | FC | 02 | 24 | 00 | F6 | 05 | 9E | 00 |
| OB420 | 64 | 03 | 24 | 00 | 04 | 26 | 38 | 00 | 04 | 03 | 24 | 00 | DC | 24 | 9E | 00 |
| OB430 | 64 | 03 | 24 | 00 | 04 | 26 | 38 | 00 | 0C | 03 | 24 | 00 | F2 | 05 | 9E | 00 |
| OB440 | FC | 00 | 64 | 03 | 24 | 00 | 04 | 26 | 38 | 00 | DC | 02 | 24 | 00 | F8 | 25 |
| OB450 | FC | 25 | BA | 00 | 9E | 00 | FC | 00 | 64 | 03 | 24 | 00 | 04 | 26 | 38 | 00 |
| OB460 | 34 | 03 | 24 | 00 | 18 | 26 | 9E | 00 | FC | 00 | 04 | 26 | 9E | 07 | FC | 00 |
| OB470 | 5E | 00 | FC | 00 | 52 | 04 | 24 | 00 | 02 | 25 | 9E | 00 | FC | 00 | F4 | 00 |
| OB480 | 03 | 00 | 24 | 00 | F6 | 05 | 88 | 00 | 24 | 00 | F2 | 05 | 88 | 00 | 24 | 00 |
| OB490 | F2 | 05 | 88 | 00 | 24 | 00 | 1C | 26 | 88 | 00 | 24 | 00 | F0 | 24 | 88 | 00 |
| OB4A0 | 8C | 01 | FC | 00 | F4 | 00 | 03 | 00 | 24 | 00 | F2 | 05 | 88 | 00 | 24 | 00 |
| OB4B0 | EC | 24 | 88 | 00 | 24 | 00 | F2 | 05 | 88 | 00 | 24 | 00 | EC | 24 | 88 | 00 |
| OB4C0 | 24 | 00 | F0 | 24 | 88 | 00 | 8C | 01 | FC | 00 | E0 | 24 | C6 | 07 | 54 | 00 |
| OB4D0 | 01 | 00 | 2B | 05 | 71 | 03 | FC | 00 | 04 | 26 | 24 | 00 | F2 | 05 | 9E | 00 |
| OB4E0 | 20 | 00 | 24 | 00 | 4A | 04 | 88 | 00 | 62 | 00 | 60 | 00 | 9F | 00 | FC | 00 |
| OB4F0 | 64 | 03 | 24 | 00 | 04 | 26 | 38 | 00 | EC | 02 | 24 | 00 | F6 | 05 | 9E | 00 |
| OB500 | FC | 00 | 64 | 03 | 24 | 00 | 04 | 26 | 38 | 00 | 9C | 00 | FC | 00 | 64 | 03 |
| OB510 | 24 | 00 | 04 | 26 | 38 | 00 | E4 | 02 | 24 | 00 | F2 | 05 | 9E | 00 | FC | 00 |
| OB520 | 64 | 03 | 24 | 00 | 04 | 26 | 38 | 00 | F4 | 02 | 24 | 00 | 94 | 24 | 9E | 00 |
| OB530 | 64 | 03 | 24 | 00 | 04 | 26 | 38 | 00 | FC | 02 | 24 | 00 | F6 | 05 | 9E | 00 |
| OB540 | 64 | 03 | 24 | 00 | 04 | 26 | 38 | 00 | 04 | 03 | 24 | 00 | DC | 24 | 9E | 00 |
| OB550 | 64 | 03 | 24 | 00 | 04 | 26 | 38 | 00 | 0C | 03 | 24 | 00 | F2 | 05 | 9E | 00 |
| OB560 | FC | 00 | 64 | 03 | 24 | 00 | 04 | 26 | 38 | 00 | DC | 02 | 24 | 00 | F8 | 25 |
| OB570 | 9E | 00 | FC | 00 | 64 | 03 | 24 | 00 | 04 | 26 | 38 | 00 | 34 | 03 | 24 | 00 |
| OB580 | 18 | 26 | 9E | 00 | FC | 00 | 04 | 26 | 9E | 07 | FC | 00 | 5E | 00 | FC | 00 |
| OB590 | 52 | 04 | 24 | 00 | 06 | 25 | 9E | 00 | FC | 00 | F4 | 00 | 03 | 00 | 24 | 00 |
| OB5A0 | F6 | 05 | 88 | 00 | 24 | 00 | F2 | 05 | 88 | 00 | 24 | 00 | F2 | 05 | 88 | 00 |
| OB5B0 | 24 | 00 | 1C | 26 | 88 | 00 | 24 | 00 | F4 | 24 | 88 | 00 | 8C | 01 | FC | 00 |
| OB5C0 | F4 | 00 | 03 | 00 | 24 | 00 | F2 | 05 | 88 | 00 | 24 | 00 | EC | 24 | 88 | 00 |
| OB5D0 | 24 | 00 | F2 | 05 | 88 | 00 | 24 | 00 | EC | 24 | 88 | 00 | 24 | 00 | F4 | 24 |
| OB5E0 | 88 | 00 | 8C | 01 | FC | 00 | 24 | 26 | C6 | 07 | FC | 00 | 64 | 03 | 24 | 00 |
| OB5F0 | F2 | 05 | 38 | 00 | DC | 02 | 24 | 00 | 64 | 03 | 24 | 00 | F2 | 05 | 38 | 00 |
| OB600 | DC | 02 | CC | 24 | E0 | 24 | BA | 00 | C8 | 00 | 9E | 00 | FC | 00 | 64 | 03 |
| OB610 | 24 | 00 | F6 | 05 | 38 | 00 | DC | 02 | 24 | 00 | 64 | 03 | 24 | 00 | F6 | 05 |
| OB620 | 38 | 00 | DC | 02 | CC | 24 | C8 | 00 | 9E | 00 | FC | 00 | 24 | 00 | F6 | 05 |
| OB630 | 88 | 00 | AA | 01 | FC | 00 | 02 | 00 | 9E | 07 | FC | 00 | 5E | 00 | FC | 00 |
| OB640 | 00 | 00 | 64 | 03 | 9C | 00 | FC | 00 | 24 | 00 | 4A | 04 | DC | 24 | B4 | 00 |
| OB650 | 2E | 00 | 0B | 00 | 4A | 04 | 24 | 00 | CC | 24 | 9E | 00 | FC | 00 | 16 | 00 |
| OB660 | 0B | 00 | 54 | 00 | 01 | 00 | B9 | 00 | 2D | 01 | FC | 00 | 46 | 04 | 24 | 00 |
| OB670 | F2 | 05 | 9E | 00 | FC | 00 | 18 | 00 | 40 | 04 | 88 | 03 | 24 | 00 | F2 | 05 |
| OB680 | 1A | 00 | 38 | 00 | A8 | 00 | 18 | 00 | 40 | 04 | 86 | 03 | 24 | 00 | F2 | 05 |
| OB690 | 1A | 00 | 38 | 00 | AA | 00 | 76 | 07 | FC | 00 | DC | 24 | C6 | 07 | FC | 00 |
| OB6A0 | 28 | 26 | 24 | 00 | F2 | 05 | 9E | 00 | 20 | 00 | 24 | 00 | 4A | 04 | 88 | 00 |
| OB6B0 | 62 | 00 | 60 | 00 | 1D | 00 | FC | 00 | 40 | 04 | 88 | 03 | 24 | 00 | 28 | 26 |
| OB6C0 | 38 | 00 | 24 | 00 | 64 | 03 | 24 | 00 | 28 | 26 | 38 | 00 | A8 | 00 | 9E | 00 |
| OB6D0 | FC | 00 | 5E | 00 | FC | 00 | 40 | 04 | 80 | 03 | 24 | 00 | 4A | 04 | 9E | 00 |

```
0B6E0    FC 00 24 00 F2 05 88 00 68 02 FC 00 24 00 F6 05
0B6F0    88 00 AA 01 FC 00 02 00 FC 00 4E 00 FC 00 46 04
0B700    24 00 94 24 9E 00 FC 00 54 00 01 00 5F 00 79 00
0B710    FC 00 02 00 01 00 B9 00 2D 01 FC 00 46 04 24 00
0B720    00 00 04 00 04 00 30 26 24 00 64 03 24 00 06 00
0B730    38 00 C4 02 9E 00 FC 00 38 26 24 00 64 03 24 00
0B740    06 00 38 00 BC 02 9E 00 FC 00 2C 26 24 00 64 03
0B750    24 00 06 00 38 00 B4 02 9E 00 FC 00 34 26 24 00
0B760    64 03 24 00 06 00 38 00 AC 02 9E 00 FC 00 24 00
0B770    64 03 24 00 06 00 38 00 3C 03 54 00 05 00 EF 00
0B780    2D 01 D3 01 91 01 85 02 09 02 FC 00 24 00 30 26
0B790    2C 26 BC 00 CC 24 B4 00 2E 00 09 00 24 00 66 04
0B7A0    4C 00 FC 00 24 00 08 00 88 00 24 00 2C 26 88 00
0B7B0    24 00 34 26 88 00 24 00 30 26 88 00 24 00 38 26
0B7C0    88 00 04 02 FC 00 F4 00 03 00 24 00 06 00 88 00
0B7D0    24 00 2C 26 F6 05 BA 00 88 00 24 00 34 26 F6 05
0B7E0    BA 00 88 00 24 00 30 26 F6 05 BC 00 88 00 24 00
0B7F0    38 26 F6 05 BC 00 88 00 8C 01 FC 00 64 03 24 00
0B800    06 00 38 00 3C 03 24 00 CC 24 9E 00 02 00 FC 00
0B810    24 00 30 26 2C 26 BC 00 CC 24 B4 00 2E 00 09 00
0B820    24 00 66 04 4C 00 FC 00 F4 00 03 00 24 00 2C 26
0B830    F6 05 BC 00 88 00 24 00 34 26 F6 05 BA 00 88 00
0B840    24 00 2C 26 F6 05 BC 00 88 00 24 00 38 26 F6 05
0B850    BC 00 88 00 4C 26 C8 01 FC 00 24 00 08 00 88 00
0B860    24 00 2C 26 F6 05 BC 00 88 00 24 00 34 26 88 00
0B870    24 00 30 26 88 00 24 00 38 26 88 00 04 02 FC 00
0B880    F4 00 03 00 24 00 2C 26 88 00 24 00 34 26 F6 05
0B890    BA 00 88 00 24 00 30 26 88 00 24 00 38 26 F6 05
0B8A0    BC 00 88 00 4C 26 D2 01 FC 00 F4 00 03 00 24 00
0B8B0    06 00 88 00 24 00 2C 26 F6 05 BA 00 88 00 24 00
0B8C0    34 26 F6 05 BA 00 88 00 24 00 30 26 F6 05 BC 00
0B8D0    88 00 24 00 38 26 F6 05 BC 00 88 00 8C 01 FC 00
0B8E0    64 03 24 00 06 00 38 00 3C 03 24 00 DC 24 9E 00
0B8F0    02 00 FC 00 24 00 08 00 88 00 24 00 2C 26 F6 05
0B900    BC 00 88 00 24 00 34 26 F6 05 BC 00 88 00 24 00
0B910    30 26 F6 05 BA 00 88 00 24 00 38 26 F6 05 BA 00
0B920    88 00 04 02 FC 00 64 03 24 00 06 00 38 00 3C 03
0B930    24 00 CC 24 9E 00 02 00 FC 00 24 00 08 00 88 00
0B940    24 00 2C 26 CC 24 BC 00 88 00 24 00 34 26 F6 05
0B950    BC 00 88 00 24 00 30 26 F6 05 BA 00 88 00 24 00
0B960    38 26 F6 05 BA 00 88 00 04 02 FC 00 F4 00 03 00
0B970    24 00 06 00 88 00 24 00 2C 26 88 00 24 00 34 26
0B980    88 00 24 00 30 26 88 00 24 00 38 26 88 00 8C 01
0B990    FC 00 64 03 24 00 06 00 38 00 3C 03 24 00 DC 24
0B9A0    9E 00 02 00 FC 00 24 00 08 00 88 00 24 00 2C 26
0B9B0    CC 24 BC 00 88 00 24 00 34 26 F6 05 BC 00 88 00
0B9C0    24 00 30 26 F6 05 BA 00 88 00 24 00 38 26 F6 05
0B9D0    BA 00 89 00 04 02 FC 00 02 00 06 00 38 00 3C 03
0B9E0    E6 00 02 00 00 00 6E 00 0A 00 00 00 2A 00 00 00
0B9F0    00 00 00 00 4D 41 49 4E 00 00 00 00 00 00 00 00
0BA00    50 01 04 00 82 00 00 00 42 00 50 01 04 00 86 00
0BA10    0A 00 60 00 50 01 04 00 8E 00 00 00 82 00 50 01
0BA20    04 00 91 00 00 00 A2 00 50 01 04 00 94 00 00 00
0BA30    C3 00 50 01 04 00 97 00 00 00 E3 00 50 01 02 00
0BA40    9A 00 12 00 03 01 50 01 02 00 9C 00 08 00 23 01
0BA50    50 01 02 00 9E 00 06 00 43 01 50 01 04 00 A0 00
0BA60    0E 10 60 01 50 01 00 00 AC 00 00 00 80 01 50 01
0BA70    02 00 AD 00 00 00 A2 01 50 01 02 00 AF 00 00 00
0BA80    C2 01 50 01 02 00 B1 00 00 00 E3 01 50 01 08 00
0BA90    B3 00 00 00 00 02 50 01 04 00 BA 00 00 00 23 02
0BAA0    50 01 02 00 BC 00 00 00 43 02 50 01 0A 00 C6 00
0BAB0    0A 00 60 02 50 01 02 00 D1 00 0A 00 81 02 50 01
0BAC0    04 00 D6 00 0A 00 A0 02 50 01 06 00 DC 00 00 00
0BAD0    C0 02 50 01 06 00 E0 00 00 00 E0 02 50 01 04 00
0BAE0    E4 00 00 00 03 03 50 01 00 00 E6 00 00 00 20 03
```

```
0BAF0   50 01 02 00 E8 00 02 00 41 03 50 01 00 00 EE 00
0BB00   00 00 60 03 50 01 00 00 EF 00 84 00 83 03 50 01
0BB10   00 00 F0 00 00 00 A1 03 50 01 00 00 F3 00 00 00
0BB20   C0 03 00 00 04 00 01 01 0E 00 44 01 02 00 02 00
0BB30   00 00 1A 01 00 00 24 02 10 01 04 00 10 01 0E 00
0BB40   02 01 18 00 0E 01 02 01 01 00 0E 01 02 03 09 00
0BB50   00 01 00 00 5A 01 12 00 5A 02 FF FF 7C 53 45 47
0BB60   00 01 5A 01 24 00 68 02 FF FF 7C 3D 00 01 5A 01
0BB70   24 00 74 02 FF FF 7C 3D 00 01 5A 01 24 00 80 02
0BB80   FF FF 7C 3D 00 01 00 00 00 00 00 00 00 00 00 00
0BB90   6D 61 69 6E 2E 62 69 6E 00 00 00 00 00 00 00 00
0BBA0   0C 53 59 53 45 58 49 54 00 00 51 00 0C 47 45 54
0BBB0   4C 50 4F 53 00 00 57 00 08 48 45 58 00 00 5F 00
0BBC0   08 4F 43 54 00 00 69 00 08 42 49 4E 00 00 73 00
0BBD0   08 52 4E 44 00 00 7D 00 0C 53 45 54 53 45 45 44
0BBE0   00 00 85 00 0C 43 4F 4D 4D 41 4E 44 00 00 8D 00
0BBF0   00 54 01 B9 01 00 00 54 01 D4 01 01 00 01 00 54
0BC00   01 EC 01 02 00 01 00 03 00 54 01 1F 02 02 00 01
0BC10   00 03 00 54 01 4A 02 02 00 01 00 03 00 54 01 71
0BC20   02 01 00 02 00 54 01 DC 03 01 00 01 00 54 01 EB
0BC30   03 01 00 03 00 00 00 61 43 FD 43 03 00 C3 9E 26
0BC40   00 00 00 00 00 00 00 00 00 00 00 00 00 00 00 00
0BC50   00 00 00 00 00 00 00 00 00 05 00 00 00 00 00 00
0BC60   00 00 00 00 00 00 00 00 00 02 05 00 00 00 00 00
0BC70   00 00 00 00 00 00 00 00 00 01 02 05 00 00 00 00
0BC80   00 00 00 00 00 00 00 00 00 00 06 02 05 00 00 00
0BC90   00 00 00 00 00 00 00 00 00 00 03 01 02 05 00 00
0BCA0   00 00 00 00 00 00 00 00 00 00 01 05 06 02 05 00
0BCB0   00 00 00 00 00 00 00 00 00 00 00 07 08 01 02 05
0BCC0   00 00 00 00 00 00 00 00 00 00 00 03 09 00 06 02
0BCD0   05 00 00 00 00 00 00 00 00 00 00 01 09 05 03 01
0BCE0   02 05 00 00 00 00 00 00 00 00 00 09 07 06 05
0BCF0   06 02 05 00 00 00 00 00 00 00 00 00 04 08 08 02
0BD00   08 01 02 05 00 00 00 00 00 00 00 00 02 04 04 01
0BD10   04 00 06 02 05 00 00 00 00 00 00 00 01 02 02 00
0BD20   07 00 03 01 02 05 00 00 00 00 00 00 00 06 01 00
0BD30   03 05 01 05 06 02 05 00 00 00 00 00 00 03 00 05
0BD40   01 07 05 07 08 01 02 05 00 00 00 00 00 01 05 02
0BD50   05 08 07 08 09 00 06 02 05 B4 03 2B DB 9C 36 FF
0BD60   1E E2 02 B9 10 00 9C 36 FF 1E DE 02 E2 F8 9C 36
0BD70   FF 1E 16 03 0E 1F C4 5E B8 26 8B 1F B4 09 9C 36
0BD80   FF 1E E2 02 C4 5E B8 26 89 0F F8 CB C5 5E A6 8B
0BD90   07 FC C4 7E B2 83 EF 03 B9 04 00 EB 0A 8B C3 D1
0BDA0   E8 D1 E8 D1 E8 D1 E8 8B D8 24 0F 3C 09 76 02 04
0BDB0   07 04 30 AA E2 E7 C5 7E B8 C7 05 04 00 F8 CB C5
0BDC0   5E A6 8B 07 FC C4 7E B2 83 EF 05 B9 06 00 EB 08
0BDD0   8B C3 D1 E8 D1 E8 D1 E8 8B D8 24 07 04 30 AA E2
0BDE0   EF C5 7E B8 C7 05 06 00 F8 CB C5 5E A6 8B 07 FC
0BDF0   C4 7E B2 83 EF 0F B9 10 00 EB 04 8B C3 D1 EB 8B
0BE00   D8 24 01 04 30 AA E2 F3 C5 7E B8 C7 05 10 00 F8
0BE10   CB 55 2B C0 B9 10 00 FC 0E 07 BF A9 00 F3 AA 0E
0BE20   1F C4 5E B8 26 80 3F 00 74 11 26 8A 0F 81 E1 0F
0BE30   00 2A C0 FC 8D 7F 01 F3 AE 75 03 EB 4E 90 2E C5
0BE40   36 95 00 88 6C 02 8B 3C 0E 1F 8B 1E 99 00 8B 0E
0BE50   9B 00 8B C5 F7 E1 A3 A5 00 8B C7 F7 E3 01 06 A5
0BE60   00 8B C5 F7 E3 A3 A7 00 01 16 A5 00 A1 9D 00 01
0BE70   06 A7 00 A1 9F 00 11 06 A5 00 C4 3E 95 00 A1 A5
0BE80   00 26 89 05 A1 A7 00 26 89 45 02 5D C4 5E B8 26
0BE90   8A 07 3C 24 7C 71 BA FF FF 83 3E A5 00 00 74 3B
0BEA0   8B 36 A5 00 B9 10 00 4A D1 E6 72 02 E2 F9 3C 24
0BEB0   74 38 81 E2 FF 03 B9 04 00 D3 E2 26 89 57 07 2B
0BEC0   FF D1 EE D1 DF E2 FA 26 09 77 06 26 89 7F 04 2B
0BED0   C0 26 89 47 02 26 88 47 01 F8 CB 25 0F 00 8B C8
0BEE0   8D 7F 01 FC 2B C0 F3 AA F8 CB 81 E2 7F 00 B9 07
0BEF0   00 D3 E2 26 89 57 03 25 D2 D1 EE D0 DE 26 09 77
```

| | | | | | | | | | | | | | | | | |
|---|---|---|---|---|---|---|---|---|---|---|---|---|---|---|---|---|
| 0BF00 | 02 | 26 | 88 | 77 | 01 | F8 | CB | 55 | 8B | 1E | A5 | 00 | BF | B8 | 01 | BE |
| 0BF10 | B8 | 00 | BA | 00 | 00 | BD | 01 | 00 | B9 | 10 | 00 | FD | 85 | DD | 74 | 1F |
| 0BF20 | BE | B8 | 00 | 2B | F2 | 51 | B9 | 10 | 00 | 2B | CA | AC | 12 | 05 | 37 | 88 |
| 0BF30 | 44 | 01 | 4F | E2 | F6 | 59 | 42 | 2B | FA | D1 | E5 | E2 | DF | EB | 09 | 83 |
| 0BF40 | EF | 10 | 4F | 42 | D1 | E5 | E2 | D4 | 5D | C4 | 7E | B8 | 26 | C6 | 05 | 09 |
| 0BF50 | 26 | C6 | 45 | 01 | 00 | B9 | 08 | 00 | 47 | 47 | BE | A9 | 00 | FC | AC | 8A |
| 0BF60 | E0 | 8A | D8 | AC | D0 | E4 | D0 | E4 | D0 | E4 | 02 | E3 | 02 | E3 | 02 | E0 |
| 0BF70 | 8A | C4 | AA | E2 | E9 | 4F | 26 | 80 | 0D | 01 | F8 | CB | C5 | 76 | B8 | 2E |
| 0BF80 | 89 | 36 | 95 | 00 | 2E | 8C | 1E | 97 | 00 | F8 | CB | 9C | 36 | FF | 1E | 22 |
| 0BF90 | 03 | 8E | D8 | BE | 80 | 00 | 8A | 0C | 2A | ED | C4 | 7E | B8 | 26 | 89 | 0D |
| 0BFA0 | E3 | 0A | C4 | 7E | B2 | 46 | FC | AC | FD | AA | E2 | FA | F8 | CB | 00 | 00 |
| 0BFB0 | 00 | 01 | FF | FF | 12 | 01 | 00 | 00 | 00 | 01 | 01 | 00 | 00 | 01 | FF | 7F |
| 0BFC0 | 0E | 01 | 04 | 03 | 03 | 1B | 44 | 00 | 14 | 01 | 26 | 00 | 20 | 3F | 29 | 37 |
| 0BFD0 | 36 | 37 | 32 | 33 | 20 | 6F | 74 | 20 | 38 | 36 | 37 | 32 | 33 | 2D | 28 | 20 |
| 0BFE0 | 64 | 65 | 65 | 53 | 20 | 72 | 65 | 62 | 6D | 75 | 4E | 20 | 6D | 6F | 64 | 6E |
| 0BFF0 | 61 | 52 | 14 | 01 | 00 | 00 | 18 | 01 | 00 | 00 | 10 | 00 | 18 | 01 | 00 | 00 |
| 0C000 | 06 | 00 | 18 | 01 | 00 | 00 | 04 | 00 | 18 | 01 | 00 | 00 | 00 | 10 | 12 | 01 |
| 0C010 | 02 | 10 | 04 | 01 | 0C | 10 | 00 | 01 | 24 | 00 | 0E | 01 | 02 | 00 | 32 | 00 |
| 0C020 | 00 | 01 | 20 | 00 | 0E | 01 | 04 | 03 | 06 | 37 | 23 | 00 | 00 | 01 | 03 | 00 |
| 0C030 | 00 | 01 | FF | 00 | 00 | 01 | 0A | 00 | 00 | 01 | 00 | 01 | 12 | 01 | 00 | 00 |
| 0C040 | 00 | 01 | 00 | 80 | 0E | 01 | 04 | 03 | 06 | 37 | 24 | 00 | 12 | 01 | 00 | 00 |
| 0C050 | 12 | 01 | 00 | 00 | 00 | 01 | 07 | 00 | 04 | 01 | 00 | 00 | 18 | 01 | 00 | 00 |
| 0C060 | 82 | 00 | 00 | 01 | 2C | 00 | 00 | 01 | E4 | 00 | 14 | 01 | 14 | 00 | 31 | 2E |
| 0C070 | 31 | 20 | 76 | 65 | 52 | 20 | 20 | 43 | 49 | 53 | 41 | 42 | 72 | 65 | 74 | 74 |
| 0C080 | 65 | 42 | 14 | 01 | 37 | 00 | 2E | 63 | 6E | 49 | 20 | 79 | 67 | 6F | 6C | 6F |
| 0C090 | 6E | 68 | 63 | 65 | 54 | 20 | 65 | 72 | 61 | 77 | 74 | 66 | 6F | 53 | 20 | 74 |
| 0C0A0 | 69 | 6D | 6D | 75 | 53 | 20 | 35 | 38 | 39 | 31 | 2C | 34 | 38 | 39 | 31 | 20 |
| 0C0B0 | 29 | 43 | 28 | 20 | 74 | 68 | 67 | 69 | 72 | 79 | 70 | 6F | 43 | 00 | 00 | 00 |
| 0C0C0 | 00 | 00 | 32 | 02 | 9C | 00 | FC | 00 | 32 | 02 | 24 | 00 | B8 | 06 | 38 | 00 |
| 0C0D0 | 24 | 00 | B8 | 06 | 9E | 00 | FC | 00 | 32 | 02 | 24 | 00 | 50 | 02 | 38 | 00 |
| 0C0E0 | 25 | 03 | FC | 00 | 24 | 00 | 40 | 02 | 2E | 00 | 05 | 00 | 82 | 00 | FC | 00 |
| 0C0F0 | 24 | 00 | 24 | 00 | 6E | 00 | 02 | 00 | 24 | 00 | 66 | 07 | 34 | 00 | 50 | 02 |
| 0C100 | AC | 00 | 2E | 00 | 05 | 00 | 82 | 00 | FC | 00 | 6A | 07 | 94 | 00 | 7A | 00 |
| 0C110 | FC | 00 | 82 | 07 | 94 | 00 | 7A | 00 | FC | 00 | 02 | 00 | 38 | 39 | 31 | 20 |
| 0C120 | 00 | 00 | 09 | 00 | 44 | 02 | 24 | 00 | 26 | 00 | 06 | 00 | C4 | 00 | B0 | 06 |
| 0C130 | AC | 00 | 2E | 00 | 0B | 00 | 26 | 00 | 06 | 00 | 88 | 00 | 0A | 01 | FC | 00 |
| 0C140 | 3C | 02 | 26 | 00 | 06 | 00 | 9E | 00 | FC | 00 | 3C | 02 | 1D | 03 | FC | 00 |
| 0C150 | 26 | 00 | 3C | 02 | 82 | 00 | 02 | 00 | 0A | 64 | FA | 01 | 0D | 43 | CF | CD |
| 0C160 | 00 | 00 | 09 | 00 | 4A | 02 | 26 | 00 | 06 | 00 | 4A | 02 | AC | 00 | 84 | 00 |
| 0C170 | 2E | 00 | 0B | 00 | 54 | 00 | 01 | 00 | 57 | 00 | 65 | 00 | FC | 00 | B4 | 06 |
| 0C180 | 26 | 00 | 06 | 00 | 9E | 00 | FC | 00 | 32 | 02 | 24 | 00 | B8 | 06 | 38 | 00 |
| 0C190 | 26 | 00 | B4 | 06 | BC | 06 | C2 | 00 | 9E | 00 | FC | 00 | 32 | 02 | 24 | 00 |
| 0C1A0 | 50 | 02 | 38 | 00 | 26 | 00 | B4 | 06 | C0 | 06 | C0 | 00 | BC | 06 | C2 | 00 |
| 0C1B0 | 9E | 00 | FC | 00 | 02 | 00 | FC | 00 | C8 | 06 | 94 | 00 | FC | 00 | 4A | 00 |
| 0C1C0 | F2 | 06 | 94 | 00 | 72 | 00 | B4 | 06 | 76 | 00 | FC | 00 | 54 | 00 | 01 | 00 |
| 0C1D0 | 27 | 00 | 29 | 00 | FC | 00 | 02 | 00 | 06 | 00 | 4A | 02 | AC | 00 | 84 | 00 |
| 0C1E0 | 00 | 00 | 08 | 00 | 08 | 00 | 26 | 00 | 06 | 00 | 08 | 00 | B4 | 00 | 84 | 00 |
| 0C1F0 | 2E | 00 | 0D | 00 | 26 | 00 | 06 | 00 | 82 | 00 | 2A | 00 | 09 | 00 | 26 | 00 |
| 0C200 | 08 | 00 | 82 | 00 | 02 | 00 | C2 | 00 | 9E | 00 | FC | 00 | 32 | 02 | 24 | 00 |
| 0C210 | 00 | 00 | 08 | 00 | 08 | 00 | 26 | 00 | 06 | 00 | 08 | 00 | B0 | 00 | 84 | 00 |
| 0C220 | 2E | 00 | 0D | 00 | 26 | 00 | 06 | 00 | 82 | 00 | 2A | 00 | 09 | 00 | 26 | 00 |
| 0C230 | 08 | 00 | 82 | 00 | 02 | 00 | B4 | 06 | 76 | 00 | FC | 00 | 54 | 00 | 01 | 00 |
| 0C240 | 00 | 00 | 0C | 00 | 0C | 00 | 24 | 00 | 06 | 00 | 08 | 00 | B4 | 00 | 2E | 00 |
| 0C250 | 0D | 00 | 28 | 00 | 06 | 00 | 82 | 00 | 2A | 00 | 09 | 00 | 28 | 00 | 08 | 00 |
| 0C260 | 82 | 00 | 02 | 00 | 26 | 00 | 06 | 00 | 82 | 00 | 2A | 00 | 09 | 00 | 26 | 00 |
| 0C270 | 00 | 00 | 0C | 00 | 0C | 00 | 24 | 00 | 06 | 00 | 08 | 00 | B0 | 00 | 2E | 00 |
| 0C280 | 0D | 00 | 28 | 00 | 06 | 00 | 82 | 00 | 2A | 00 | 09 | 00 | 28 | 00 | 08 | 00 |
| 0C290 | 82 | 00 | 02 | 00 | 26 | 00 | 06 | 00 | 82 | 00 | 2A | 00 | 09 | 00 | 26 | 00 |
| 0C2A0 | 00 | 00 | 04 | 00 | 06 | 00 | F6 | 06 | 13 | 03 | FC | 00 | 28 | 00 | F6 | 06 |
| 0C2B0 | 82 | 00 | 02 | 00 | 0C | 00 | 24 | 00 | 06 | 00 | 08 | 00 | B4 | 00 | 2E | 00 |
| 0C2C0 | 00 | 00 | 04 | 00 | 06 | 00 | FC | 06 | 09 | 03 | FC | 00 | 28 | 00 | FC | 06 |
| 0C2D0 | 82 | 00 | 02 | 00 | 18 | 02 | 00 | 00 | 02 | 00 | 00 | 3D | 39 | 30 | 30 | 30 |
| 0C2E0 | 00 | 00 | 04 | 00 | 06 | 00 | 02 | 07 | FF | 02 | FC | 00 | 28 | 00 | 02 | 07 |
| 0C2F0 | 82 | 00 | 02 | 00 | 06 | 00 | 82 | 00 | 2A | 00 | 09 | 00 | 28 | 00 | 08 | 00 |
| 0C300 | 00 | 00 | 1A | 00 | 1A | 00 | 24 | 00 | 18 | 00 | 1A | 00 | 06 | 00 | A4 | 00 |

```
0C310   B8 06 BA 00 54 00 07 00 31 00 51 00 53 00 C9 00
0C320   75 00 91 01 97 00 59 02 FC 00 24 00 16 07 4C 00
0C330   FC 00 12 07 24 00 06 00 9E 00 FC 00 06 00 24 00
0C340   08 00 9E 00 FC 00 08 00 24 00 12 07 9E 00 FC 00
0C350   02 00 FC 00 12 07 24 00 06 00 9E 00 FC 00 06 00
0C360   24 00 08 00 9E 00 FC 00 08 00 24 00 12 07 9E 00
0C370   FC 00 02 00 FC 00 0E 07 26 00 06 00 9E 00 FC 00
0C380   06 00 26 00 08 00 9E 00 FC 00 08 00 26 00 0E 07
0C390   9E 00 FC 00 02 00 FC 00 08 07 06 00 9E 00 FC 00
0C3A0   06 00 08 00 9E 00 FC 00 08 00 08 07 9E 00 FC 00
0C3B0   02 00 9E 00 FC 00 08 00 24 00 12 07 9E 00 FC 00
0C3C0   00 00 F1 02 FC 00 02 00 06 00 9E 00 FC 00 06 00
0C3D0   00 00 08 00 26 00 26 00 06 00 C4 00 26 00 26 00
0C3E0   06 00 D0 00 D2 00 BE 00 82 00 02 00 9E 00 FC 00
0C3F0   00 00 08 00 26 00 26 00 06 00 C4 00 26 00 26 00
0C400   06 00 D0 00 1A 07 BA 00 D2 00 BE 00 82 00 02 00
0C410   00 00 04 00 28 00 24 00 20 07 24 00 06 00 40 00
0C420   82 00 02 00 00 00 00 00 00 00 00 00 00 00 84 00
0C430   00 00 08 00 00 00 05 00 50 02 26 00 06 00 24 07
0C440   B0 00 06 00 50 02 B4 00 C8 00 84 00 2E 00 09 00
0C450   24 00 2C 07 4C 00 FC 00 24 00 0A 00 50 02 B4 00
0C460   0A 00 30 07 B0 00 C8 00 2E 00 09 00 24 00 34 07
0C470   4C 00 FC 00 24 00 26 00 06 00 84 00 30 00 0A 00
0C480   CA 00 08 00 C6 00 50 02 AC 00 2E 00 0B 00 54 00
0C490   01 00 43 00 3D 00 FC 00 02 00 00 00 00 00 2E 00
0C4A0   00 00 04 00 04 00 28 00 24 00 08 00 24 00 06 00
0C4B0   40 00 82 00 02 00 B4 00 C8 00 84 00 2E 00 09 00
0C4C0   00 00 18 00 28 00 24 00 18 00 1A 00 06 00 A4 00
0C4D0   24 00 62 00 40 00 24 00 18 00 1A 00 06 00 A8 00
0C4E0   38 07 C2 00 24 00 62 00 40 00 24 00 24 00 18 00
0C4F0   1A 00 06 00 A8 00 38 07 C0 00 D2 00 24 00 62 00
0C500   40 00 24 00 18 00 1A 00 06 00 AA 00 38 07 C2 00
0C510   24 00 62 00 40 00 24 00 24 00 18 00 1A 00 06 00
0C520   AA 00 38 07 C0 00 D2 00 24 00 62 00 40 00 24 00
0C530.  18 00 1A 00 06 00 A0 00 38 07 C2 00 24 00 62 00
0C540   40 00 24 00 24 00 18 00 1A 00 06 00 A0 00 38 07
0C550   C0 00 D2 00 24 00 62 00 40 00 82 00 02 00 18 00
0C560   00 00 5A 02 69 02 00 00 09 00 4A 02 3C 07 26 00
0C570   0A 00 9E 00 FC 00 26 00 3C 07 4A 02 AC 00 84 00
0C580   2E 00 0D 00 3C 07 24 00 6E 00 02 00 9E 00 FC 00
0C590   26 00 3C 07 40 07 B4 00 84 00 2E 00 09 00 24 00
0C5A0   B8 06 4C 00 FC 00 26 00 3C 07 50 02 B4 00 84 00
0C5B0   2E 00 0F 00 3C 07 26 00 44 07 3C 07 BA 00 9E 00
0C5C0   FC 00 26 00 3C 07 24 07 B0 00 84 00 2E 00 09 00
0C5D0   24 00 B8 06 4C 00 FC 00 38 02 26 00 22 00 26 00
0C5E0   3C 07 88 00 6E 01 9E 00 FC 00 26 00 38 02 BC 06
0C5F0   B0 00 84 00 2E 00 0F 00 38 02 26 00 38 02 44 07
0C600   BC 00 9E 00 FC 00 02 00 84 00 2E 00 09 00 24 00
0C610   00 00 08 00 4C 07 26 00 06 00 9E 00 FC 00 26 00
0C620   4C 07 24 07 B0 00 4C 07 50 02 B4 00 C8 00 84 00
0C630   2E 00 09 00 24 00 B8 06 4C 00 FC 00 24 00 26 00
0C640   38 02 84 00 26 00 22 00 26 00 4C 07 88 00 6E 01
0C650   84 00 36 00 82 00 02 00 FC 00 26 00 38 02 BC 06
0C660   00 00 08 00 04 00 50 07 26 00 06 00 9E 00 FC 00
0C670   26 00 50 07 24 07 B0 00 50 07 50 02 B4 00 C8 00
0C680   08 00 50 02 B4 00 C8 00 08 00 30 07 B0 00 C8 00
0C690   84 00 2E 00 09 00 24 00 B8 06 4C 00 FC 00 26 00
0C6A0   38 02 84 00 26 00 22 00 26 00 50 07 88 00 6E 01
0C6B0   84 00 36 00 24 00 08 00 9E 00 FC 00 02 00 6E 01
0C6C0   00 00 0E 00 74 02 0E 00 24 00 06 00 A2 00 0A 00
0C6D0   A0 00 B0 00 2E 00 21 00 06 00 28 00 0A 00 24 00
0C6E0   20 07 24 00 06 00 A2 00 0A 00 A0 00 BC 00 40 00
0C6F0   9E 00 2A 00 09 00 06 00 0A 00 9E 00 FC 00 02 00
0C700   00 00 0E 00 80 02 0E 00 24 00 06 00 A2 00 0A 00
0C710   A0 00 B0 00 2E 00 21 00 06 00 28 00 24 00 20 07
```

| | | | | | | | | | | | | | | | | |
|---|---|---|---|---|---|---|---|---|---|---|---|---|---|---|---|---|
| 0C720 | 24 | 00 | 06 | 00 | A2 | 00 | 0A | 00 | A0 | 00 | BC | 00 | 40 | 00 | 0A | 00 |
| 0C730 | 9E | 00 | 2A | 00 | 09 | 00 | 06 | 00 | 0A | 00 | 9E | 00 | FC | 00 | 02 | 00 |
| 0C740 | 00 | 00 | 04 | 00 | 0C | 00 | 28 | 00 | 24 | 00 | 28 | 00 | 08 | 00 | CA | 00 |
| 0C750 | 24 | 00 | 06 | 00 | 40 | 00 | 82 | 00 | 02 | 00 | A0 | 00 | BC | 00 | 40 | 00 |
| 0C760 | 00 | 00 | 24 | 00 | 54 | 07 | 24 | 00 | 62 | 00 | 40 | 00 | 94 | 00 | FC | 00 |
| 0C770 | 02 | 00 | 0E | 00 | 80 | 02 | 0E | 00 | 24 | 00 | 06 | 00 | A2 | 00 | 0A | 00 |
| 0C780 | 00 | 00 | 04 | 00 | 24 | 00 | 06 | 00 | 50 | 02 | AC | 00 | 06 | 00 | B8 | 06 |
| 0C790 | AC | 00 | C8 | 00 | 2E | 00 | 0F | 00 | 58 | 07 | 24 | 00 | B8 | 06 | 9E | 00 |
| 0C7A0 | 2A | 00 | 0B | 00 | 58 | 07 | 24 | 00 | 06 | 00 | 9E | 00 | FC | 00 | 24 | 00 |
| 0C7B0 | 58 | 07 | 2C | 07 | B0 | 00 | 58 | 07 | B8 | 06 | B4 | 00 | C8 | 00 | 2E | 00 |
| 0C7C0 | 09 | 00 | 24 | 00 | B8 | 06 | 4C | 00 | FC | 00 | 58 | 07 | F7 | 02 | FC | 00 |
| 0C7D0 | 24 | 00 | 58 | 07 | 82 | 00 | 02 | 00 | 62 | 00 | 40 | 00 | 94 | 00 | FC | 00 |
| 0C7E0 | 00 | 00 | 02 | 00 | B0 | 00 | 4C | 07 | 50 | 02 | B4 | 00 | C8 | 00 | B4 | 00 |
| 0C7F0 | 00 | 00 | 5C | 07 | 2D | 03 | FC | 00 | 28 | 00 | 5C | 07 | 82 | 00 | 02 | 00 |
| 0C800 | 00 | 00 | 24 | 00 | 24 | 00 | 6E | 00 | 00 | 00 | 24 | 00 | 62 | 07 | 34 | 00 |
| 0C810 | 50 | 02 | AC | 00 | 2E | 00 | 0D | 00 | 24 | 00 | 50 | 02 | 82 | 00 | 2A | 00 |
| 0C820 | 09 | 00 | 24 | 00 | B8 | 06 | 82 | 00 | 02 | 00 | B4 | 00 | C8 | 00 | 2E | 00 |
| 0C830 | 00 | 00 | 40 | 02 | 24 | 00 | B8 | 06 | 9E | 00 | FC | 00 | 02 | 00 | FC | 00 |
| 0C840 | 14 | 05 | 00 | 01 | 00 | 00 | 07 | 03 | 06 | 00 | 00 | 00 | 56 | 00 | 00 | 00 |
| 0C850 | 00 | 00 | 00 | 00 | 46 | 49 | 4C | 45 | 00 | 00 | 00 | 00 | 00 | 00 | 00 | 00 |
| 0C860 | 50 | 01 | 18 | 00 | 1A | 03 | 00 | 00 | 40 | 00 | 50 | 01 | 0A | 00 | 23 | 03 |
| 0C870 | 00 | 00 | 60 | 00 | 50 | 01 | 0C | 00 | 2D | 03 | 00 | 00 | 80 | 00 | 50 | 01 |
| 0C880 | 12 | 00 | 30 | 03 | 00 | 00 | A0 | 00 | 50 | 01 | 14 | 00 | 3B | 03 | 00 | 00 |
| 0C890 | C0 | 00 | 50 | 01 | 16 | 00 | 3F | 03 | 00 | 00 | E0 | 00 | 50 | 01 | 0C | 00 |
| 0C8A0 | 48 | 03 | 0E | 00 | 00 | 01 | 50 | 01 | 0A | 00 | 58 | 03 | 00 | 00 | 20 | 01 |
| 0C8B0 | 50 | 01 | 0C | 00 | 5B | 03 | 0E | 00 | 40 | 01 | 50 | 01 | 0A | 00 | 6B | 03 |
| 0C8C0 | 00 | 00 | 60 | 01 | 50 | 01 | 08 | 00 | 6E | 03 | 00 | 00 | 80 | 01 | 50 | 01 |
| 0C8D0 | 02 | 00 | 79 | 03 | 0A | 00 | A2 | 01 | 50 | 01 | 02 | 00 | 84 | 03 | 00 | 00 |
| 0C8E0 | C2 | 01 | 50 | 01 | 04 | 00 | 8D | 03 | 00 | 00 | E0 | 01 | 50 | 01 | 06 | 00 |
| 0C8F0 | C2 | 03 | 00 | 00 | 00 | 02 | 50 | 01 | 04 | 00 | C5 | 03 | 4A | 00 | 20 | 02 |
| 0C900 | 50 | 01 | 00 | 00 | D9 | 03 | 00 | 00 | 43 | 02 | 50 | 01 | 04 | 00 | DA | 03 |
| 0C910 | 08 | 00 | 60 | 02 | 50 | 01 | 00 | 00 | F0 | 03 | 06 | 00 | 83 | 02 | 50 | 01 |
| 0C920 | 04 | 00 | F5 | 03 | 0B | 00 | A0 | 02 | 50 | 01 | 02 | 00 | 0F | 04 | 02 | 00 |
| 0C930 | C1 | 02 | 50 | 01 | 00 | 00 | 11 | 04 | 00 | 00 | E0 | 02 | 50 | 01 | 08 | 00 |
| 0C940 | 12 | 04 | 00 | 00 | 00 | 03 | 50 | 01 | 02 | 00 | 16 | 04 | 00 | 00 | 20 | 03 |
| 0C950 | 50 | 01 | 02 | 00 | 17 | 04 | 00 | 00 | 40 | 03 | 50 | 01 | 02 | 00 | 18 | 04 |
| 0C960 | 00 | 00 | 60 | 03 | 50 | 01 | 00 | 00 | 19 | 04 | 00 | 00 | 83 | 03 | 50 | 01 |
| 0C970 | 00 | 00 | 1A | 04 | 00 | 00 | A3 | 03 | 50 | 01 | 02 | 00 | 1B | 04 | 00 | 00 |
| 0C980 | C0 | 03 | 50 | 01 | 02 | 00 | 20 | 04 | 00 | 00 | E0 | 03 | 50 | 01 | 00 | 00 |
| 0C990 | 21 | 04 | 00 | 00 | 00 | 04 | 50 | 01 | 02 | 00 | 22 | 04 | 00 | 00 | 22 | 04 |
| 0C9A0 | 50 | 01 | 02 | 00 | 25 | 04 | A6 | 00 | 43 | 04 | 50 | 01 | 02 | 00 | 2D | 04 |
| 0C9B0 | 16 | 00 | 63 | 04 | 50 | 01 | 06 | 00 | 3D | 04 | 00 | 00 | 80 | 04 | 50 | 01 |
| 0C9C0 | 04 | 00 | 47 | 04 | 02 | 00 | A1 | 04 | 50 | 01 | 06 | 00 | 4D | 04 | 4C | 00 |
| 0C9D0 | C0 | 04 | 50 | 01 | 08 | 00 | B3 | 04 | 4A | 00 | E0 | 04 | 50 | 01 | 02 | 00 |
| 0C9E0 | EE | 04 | 00 | 00 | 00 | 05 | 50 | 01 | 00 | 00 | FD | 04 | 04 | 00 | 23 | 05 |
| 0C9F0 | 50 | 01 | 00 | 00 | FF | 04 | 44 | 00 | 43 | 05 | 50 | 01 | 02 | 00 | 01 | 05 |
| 0CA00 | 0A | 00 | 61 | 05 | 50 | 01 | 00 | 00 | 0D | 05 | 02 | 00 | 80 | 05 | 50 | 01 |
| 0CA10 | 02 | 00 | 18 | 05 | 00 | 00 | A2 | 05 | 00 | 01 | 00 | 00 | 00 | 01 | 01 | 00 |
| 0CA20 | 00 | 01 | 09 | 00 | 00 | 01 | 0A | 00 | 00 | 01 | 11 | 00 | 00 | 01 | 12 | 00 |
| 0CA30 | 00 | 01 | 13 | 00 | 00 | 00 | 80 | 00 | 01 | 00 | 0E | 00 | 42 | 01 | 80 | 00 |
| 0CA40 | 01 | 00 | 00 | 00 | 00 | 00 | 28 | 00 | 01 | 01 | 0E | 00 | 44 | 01 | 14 | 00 |
| 0CA50 | 02 | 00 | 00 | 00 | EE | 00 | 04 | 0F | 26 | 00 | 48 | 01 | 00 | 00 | 44 | 00 |
| 0CA60 | 00 | 00 | 4C | 01 | 44 | 00 | 28 | 00 | E6 | 02 | 4C | 01 | 6C | 00 | 80 | 00 |
| 0CA70 | D6 | 02 | 44 | 01 | EC | 00 | 02 | 00 | 00 | 00 | 00 | 00 | E0 | 0E | 01 | 04 |
| 0CA80 | 0E | 00 | 4A | 01 | 10 | 00 | EE | 00 | F4 | 02 | 1A | 01 | 00 | 00 | 1C | 03 |
| 0CA90 | 00 | 00 | 28 | 00 | 01 | 01 | 0E | 00 | 44 | 01 | 14 | 00 | 02 | 00 | 00 | 00 |
| 0CAA0 | 1A | 01 | E0 | 0E | 32 | 03 | 16 | 01 | 08 | 0F | 10 | 00 | 16 | 01 | 1A | 0F |
| 0CAB0 | 10 | 00 | 5A | 01 | 24 | 00 | 58 | 03 | FF | FF | 7C | 46 | 4F | 52 | 00 | 01 |
| 0CAC0 | 5A | 01 | 36 | 00 | 66 | 03 | FF | FF | 7C | 4F | 55 | 54 | 50 | 55 | 54 | 00 |
| 0CAD0 | 49 | 4E | 50 | 55 | 54 | 00 | 41 | 50 | 50 | 45 | 4E | 44 | 00 | 01 | 5A | 01 |
| 0CAE0 | 48 | 00 | 84 | 03 | FF | FF | 7C | 41 | 53 | 00 | 01 | 00 | 5A | 01 | 5A | 00 |
| 0CAF0 | 92 | 03 | FF | FF | 7C | 23 | 00 | 01 | 5A | 01 | 7E | 00 | 9E | 03 | FF | FF |
| 0CB00 | 7C | 4C | 45 | 4E | 00 | 01 | 5A | 01 | 90 | 00 | AC | 03 | FF | FF | 7C | 3D |
| 0CB10 | 00 | 01 | 0E | 01 | 03 | 02 | 01 | 1C | 5A | 01 | A2 | 00 | 00 | 00 | 5A | 01 |
| 0CB20 | 24 | 00 | C4 | 03 | FF | FF | 7C | 23 | 00 | 01 | 5A | 01 | 24 | 00 | D0 | 03 |

```
0CB30   FF FF 7C 41 53 00 01 00 5A 01 48 00 DE 03 FF FF
0CB40   7C 4C 45 4E 00 01 5A 01 5A 00 EC 03 FF FF 7C 3D
0CB50   00 01 5A 01 24 00 F8 03 FF FF 7C 41 53 00 01 00
0CB60   5A 01 36 00 06 04 FF FF 7C 23 00 01 5A 01 5A 00
0CB70   12 04 FF FF 7C 4C 45 4E 00 01 5A 01 6C 00 20 04
0CB80   FF FF 7C 3D 00 01 5A 01 24 00 2C 04 FF FF 7C 46
0CB90   4F 52 00 01 5A 01 36 00 3A 04 FF FF 7C 4F 55 54
0CBA0   50 55 54 00 49 4E 50 55 54 00 41 50 50 45 4E 44
0CBB0   00 01 5A 01 48 00 58 04 FF FF 7C 41 53 00 01 00
0CBC0   5A 01 6C 00 66 04 FF FF 7C 4C 45 4E 00 01 5A 01
0CBD0   7E 00 74 04 FF FF 7C 3D 00 01 5A 01 12 00 80 04
0CBE0   FF FF 7C 52 45 43 4F 52 44 00 01 00 5A 01 24 00
0CBF0   92 04 FF FF 7C 23 00 01 0E 01 00 00 5A 01 12 00
0CC00   A2 04 FF FF 7C 52 45 43 4F 52 44 00 01 00 0E 01
0CC10   00 00 5A 01 12 00 B8 04 FF FF 7C 52 45 43 4F 52
0CC20   44 00 01 00 5A 01 24 00 CA 04 FF FF 7C 23 00 01
0CC30   0E 01 00 00 5A 01 12 00 DA 04 FF FF 7C 52 45 43
0CC40   4F 52 44 00 01 00 0E 01 00 00 5A 01 12 00 F0 04
0CC50   FF FF 7C 23 00 01 14 01 00 00 5A 01 24 00 00 05
0CC60   FF FF 7C 41 53 00 01 00 5A 01 12 00 0E 05 FF FF
0CC70   7C 3D 00 01 5A 01 12 00 1A 05 FF FF 7C 3D 00 01
0CC80   5A 01 12 00 26 05 FF FF 7C 28 00 01 5A 01 36 00
0CC90   32 05 FF FF 7C 29 00 01 5A 01 48 00 3E 05 FF FF
0CCA0   7C 4F 46 46 00 4F 4E 00 53 54 4F 50 01 00 00 00
0CCB0   66 69 6C 65 44 6F 73 32 2E 62 69 6E 00 00 00 00
0CCC0   0B 46 49 4C 45 49 4F 00 00 0C 01 0E 49 4E 49 54
0CCD0   46 49 4C 45 53 00 00 1A 01 0B 52 41 4E 44 4F 4D
0CCE0   00 00 26 01 0C 49 4E 49 54 43 4F 4D 00 00 38 01
0CCF0   0C 43 4F 4D 4F 50 45 4E 00 00 3E 01 0B 47 45 54
0CD00   44 49 52 00 00 4A 01 0D 4B 49 4C 4C 46 49 4C 45
0CD10   00 00 56 01 0B 52 45 4E 41 4D 45 00 00 5E 01 0C
0CD20   53 45 54 54 49 4D 45 00 00 68 01 0B 47 45 54 4C
0CD30   4F 43 00 00 74 01 0C 53 45 54 44 41 54 45 00 00
0CD40   80 01 0C 47 45 54 44 41 54 45 00 00 8C 01 0C 47
0CD50   45 54 54 49 4D 45 00 00 98 01 0C 43 4F 4D 4D 4F
0CD60   44 45 00 00 A0 01 08 45 4F 46 00 00 AA 01 0D 47
0CD70   45 54 44 52 49 56 45 00 00 B2 01 0C 47 45 54 50
0CD80   41 54 48 00 00 BA 01 0A 43 48 44 49 52 00 00 C2
0CD90   01 0A 4D 4B 44 49 52 00 00 CA 01 0A 52 4D 44 49
0CDA0   52 00 00 D2 01 10 43 48 41 4E 47 45 44 52 49 56
0CDB0   45 00 00 DA 01 0C 4F 4C 44 4B 49 4C 4C 00 00 E2
0CDC0   01 09 44 49 53 4B 00 00 EA 01 00 90 54 01 42 02
0CDD0   04 00 01 00 01 00 03 00 01 00 54 01 3D 05 03 00
0CDE0   01 00 01 00 01 00 54 01 D3 03 06 00 04 00 01 00
0CDF0   01 00 01 00 01 00 01 00 54 01 32 1B 00 00 54 01
0CE00   7C 17 03 00 01 00 01 00 04 00 54 01 5F 11 03 00
0CE10   01 00 01 00 03 00 54 01 22 12 01 00 03 00 54 01
0CE20   83 12 02 00 03 00 03 00 54 01 C8 12 03 00 01 00
0CE30   01 00 01 00 54 01 66 13 03 00 01 00 01 00 01 00
0CE40   54 01 26 13 03 00 01 00 01 00 01 00 54 01 48 13
0CE50   03 00 01 00 01 00 01 00 54 01 EE 12 01 00 03 00
0CE60   54 01 78 1A 02 00 01 00 01 00 54 01 C5 04 01 00
0CE70   01 00 54 01 0F 14 01 00 03 00 54 01 27 14 01 00
0CE80   03 00 54 01 B1 13 01 00 03 00 54 01 C2 13 01 00
0CE90   03 00 54 01 DB 13 01 00 03 00 54 01 00 14 01 00
0CEA0   01 00 54 01 4D 12 01 00 03 00 54 01 4F 14 02 00
0CEB0   02 00 01 00 E8 4C 90 6D 02 B5 02 FA 02 C3 02 83
0CEC0   03 00 00 00 00 00 00 00 00 EC 02 9D 1D 73 03 6E
0CED0   2F CB 0E 9D 1D 9A 40 00 00 50 00 50 00 50 00 50
0CEE0   00 FF 00 FF 00 73 09 00 00 63 43 EE 00 50 25 00
0CEF0   00 EF 00 00 00 00 00 00 1A 38 02 95 35 C4 04 D3
0CF00   0B 00 C4 76 A0 8C C2 C4 5E A6 26 8B 0F C4 5E 82
0CF10   26 8B 1F 0E 1F C4 7E B8 26 8B 3D D1 E7 83 FF 0A
0CF20   72 05 B8 E8 03 F9 CB 2E FF 95 F7 01 CB 2B C0 9C
0CF30   36 FF 1E E2 02 50 9C C4 5E 82 26 8B 07 8B D8 0E
```

| | | | | | | | | | | | | | | | | |
|---|---|---|---|---|---|---|---|---|---|---|---|---|---|---|---|---|
| 0CF40 | 1F | E8 | 7B | 02 | 73 | 07 | 58 | 9D | B8 | EE | 03 | F9 | C3 | 9D | 71 | 0E |
| 0CF50 | 26 | C6 | 07 | 00 | 26 | C6 | 47 | 02 | 00 | 8B | D8 | 58 | F9 | C3 | 59 | 26 |
| 0CF60 | 81 | 4F | 44 | 03 | 00 | 8B | D8 | B8 | 00 | 01 | B9 | 00 | 80 | 9C | 36 | FF |
| 0CF70 | 1E | E2 | 02 | F8 | C3 | B8 | 01 | 00 | 9C | 36 | FF | 1E | E2 | 02 | F8 | 71 |
| 0CF80 | 01 | F9 | C3 | 2B | C0 | 9C | 36 | FF | 1E | E2 | 02 | 71 | 06 | E8 | E5 | FF |
| 0CF90 | 73 | 01 | C3 | C4 | 5E | 82 | 26 | 8B | 1F | 0E | 1F | E8 | 21 | 02 | 73 | 01 |
| 0CFA0 | C3 | 06 | 1F | C7 | 47 | 44 | 11 | 00 | C4 | 76 | 94 | 26 | 8B | 04 | F7 | 47 |
| 0CFB0 | 5C | FF | 00 | 75 | 03 | 89 | 47 | 6A | F8 | C3 | E8 | 70 | FF | 73 | 06 | E8 |
| 0CFC0 | B3 | FF | 73 | 01 | C3 | 0E | 1F | E8 | F5 | 01 | 26 | C7 | 47 | 44 | 09 | 00 |
| 0CFD0 | 26 | C7 | 47 | 50 | 00 | 00 | 8D | 47 | 6C | 26 | 89 | 47 | 4C | 26 | 89 | 47 |
| 0CFE0 | 4E | 53 | 26 | 8B | 5F | 64 | B0 | 02 | 2B | C9 | 8B | D1 | B4 | 42 | CD | 21 |
| 0CFF0 | 5B | 0B | C0 | 75 | 06 | 0B | D2 | 75 | 02 | F8 | C3 | 52 | 50 | 2D | 01 | 00 |
| 0D000 | 83 | DA | 00 | 8B | CA | 8B | D0 | B8 | 00 | 42 | 53 | 26 | 8B | 5F | 64 | CD |
| 0D010 | 21 | 5B | 8D | 57 | 6C | 8B | FA | 26 | C6 | 05 | 00 | 06 | 1F | B9 | 01 | 00 |
| 0D020 | 53 | 26 | 8B | 5F | 64 | B4 | 3F | CD | 21 | 5B | 5A | 59 | 80 | 3D | 1A | 75 |
| 0D030 | 06 | 83 | EA | 01 | 83 | D9 | 00 | B4 | 42 | B0 | 00 | 26 | 8B | 5F | 64 | CD |
| 0D040 | 21 | F8 | C3 | B4 | 03 | 9C | 36 | FF | 1E | E2 | 02 | 70 | 31 | 0E | 1F | C4 |
| 0D050 | 5E | 82 | 26 | 8B | 1F | E8 | 67 | 01 | 73 | 01 | C3 | 26 | F7 | 47 | 44 | 20 |
| 0D060 | 00 | F8 | 74 | 18 | 26 | 8B | 5F | 56 | 8B | 1F | 8B | 7F | 1E | D1 | E7 | 1E |
| 0D070 | B8 | 40 | 00 | 8E | D8 | 8B | 15 | 1F | 42 | 2A | C0 | EE | F8 | C3 | 50 | 0E |
| 0D080 | 1F | C4 | 5E | 82 | 26 | 8B | 1F | E8 | 35 | 01 | 26 | C7 | 47 | 44 | 00 | 00 |
| 0D090 | F9 | 58 | C3 | C4 | 5E | B8 | 26 | 8B | 07 | 2E | A3 | 36 | 02 | C4 | 76 | 82 |
| 0D0A0 | 26 | 8B | 1C | E8 | 19 | 01 | C5 | 76 | A6 | 8B | 0C | 26 | 8B | 47 | 6A | F7 |
| 0D0B0 | E1 | 8B | F8 | C5 | 76 | 94 | 8B | 0C | 8B | F2 | 26 | 8B | 47 | 6A | F7 | E1 |
| 0D0C0 | 0B | D2 | 74 | 05 | F9 | B8 | F1 | 03 | CB | 03 | C6 | 72 | F7 | 8B | C8 | 8B |
| 0D0D0 | D7 | B8 | 00 | 42 | 0B | D2 | 75 | 0F | 0B | C9 | 75 | 0B | B0 | 01 | 53 | 26 |
| 0D0E0 | 8B | 5F | 64 | CD | 21 | EB | 0E | 26 | 2B | 57 | 6A | 83 | D9 | 00 | 53 | 26 |
| 0D0F0 | 8B | 5F | 64 | CD | 21 | 5B | C5 | 96 | 5E | FF | 06 | C4 | B6 | 70 | FF | 26 |
| 0D100 | 83 | 3C | 03 | 75 | 09 | C5 | 96 | 58 | FF | 2B | 96 | 5C | FF | 4A | 07 | 26 |
| 0D110 | 8B | 4F | 6A | 53 | 26 | 8B | 5F | 64 | B4 | 3F | 2E | 83 | 3E | 36 | 02 | 00 |
| 0D120 | 74 | 02 | B4 | 40 | CD | 21 | 5B | 1E | 06 | 1F | 9C | E8 | 7F | 03 | 9D | 1F |
| 0D130 | 72 | 49 | 3B | C1 | 75 | 1D | 2E | 83 | 3E | 36 | 02 | 00 | 75 | 13 | C5 | B6 |
| 0D140 | 70 | FF | 83 | 3C | 03 | 75 | 0A | 8B | 86 | 5C | FF | C5 | B6 | 5E | FF | 89 |
| 0D150 | 04 | F8 | CB | 2E | 83 | 3E | 36 | 02 | 00 | 75 | 25 | 26 | 8B | 4F | 6A | 1E |
| 0D160 | 07 | 8B | FA | FC | 2A | C0 | F3 | AA | C5 | B6 | 70 | FF | 83 | 3C | 03 | 75 |
| 0D170 | E0 | C5 | B6 | 70 | FF | C7 | 04 | 00 | 00 | EB | D6 | F9 | B8 | F1 | 03 | CB |
| 0D180 | B8 | EA | 03 | F9 | CB | 0E | 1F | C4 | 5E | B8 | 26 | 8B | 1F | 8B | CB | E8 |
| 0D190 | 2D | 00 | 73 | 01 | CB | B8 | EB | 03 | 26 | F7 | 47 | 44 | 01 | 00 | 74 | 1D |
| 0D1A0 | B8 | EF | 03 | 26 | F7 | 47 | 44 | 0C | 00 | 75 | 12 | B4 | 0A | 8B | D9 | 9C |
| 0D1B0 | 36 | FF | 1E | E2 | 02 | C4 | 76 | B8 | 26 | 89 | 1C | F8 | CB | F9 | CB | 50 |
| 0D1C0 | 52 | 1E | 8C | C8 | 8E | D8 | 8B | C3 | 3D | 10 | 00 | 76 | 08 | F9 | 1F | 5A |
| 0D1D0 | 58 | B8 | EE | 03 | C3 | 0B | C0 | 74 | F4 | 8E | 06 | 29 | 02 | 48 | 8B | 1E |
| 0D1E0 | 2B | 02 | F7 | E3 | 8B | D8 | 03 | 1E | 27 | 02 | 1F | 5A | 58 | C3 | 50 | B0 |
| 0D1F0 | 64 | E6 | 20 | FE | C0 | E6 | 20 | 58 | 2E | FF | 2E | 11 | 02 | 0E | 1F | 8C |
| 0D200 | 16 | 15 | 02 | B8 | 38 | 02 | A3 | 39 | 02 | 8C | 0E | 3B | 02 | BF | E2 | 02 |
| 0D210 | 36 | 8B | 05 | A3 | 09 | 02 | 36 | 8B | 45 | 02 | A3 | 0B | 02 | 36 | C7 | 05 |
| 0D220 | 8E | 06 | 36 | 8C | 4D | 02 | BF | DE | 02 | 36 | 8B | 05 | A3 | 0D | 02 | 36 |
| 0D230 | 8B | 45 | 02 | A3 | 0F | 02 | 36 | C7 | 05 | D3 | 05 | 36 | 8C | 4D | 02 | BF |
| 0D240 | 1E | 03 | 36 | 8B | 05 | A3 | 11 | 02 | 36 | 8B | 45 | 02 | A3 | 13 | 02 | 36 |
| 0D250 | C7 | 05 | 2E | 05 | 36 | 8C | 4D | 02 | BF | 90 | 00 | 2B | C0 | 8E | C0 | B8 |
| 0D260 | A5 | 27 | 26 | 87 | 05 | A3 | 3D | 02 | 8C | C8 | 26 | 87 | 45 | 02 | A3 | 3F |
| 0D270 | 02 | C6 | 06 | 41 | 02 | 00 | C4 | 5E | A6 | 26 | 8B | 07 | A3 | 29 | 02 | C4 |
| 0D280 | 5E | 94 | 26 | 8B | 07 | A3 | 27 | 02 | C4 | 5E | B8 | 26 | 8B | 07 | A3 | 2B |
| 0D290 | 02 | F8 | CB | 0E | 1F | BF | E2 | 02 | A1 | 09 | 02 | 36 | 89 | 05 | A1 | 0B |
| 0D2A0 | 02 | 36 | 89 | 45 | 02 | BF | DE | 02 | A1 | 0D | 02 | 36 | 89 | 05 | A1 | 0F |
| 0D2B0 | 02 | 36 | 89 | 45 | 02 | BF | 1E | 03 | A1 | 11 | 02 | 36 | 89 | 05 | A1 | 13 |
| 0D2C0 | 02 | 36 | 89 | 45 | 02 | 2B | C0 | 8E | C0 | BF | 90 | 00 | A1 | 3D | 02 | 26 |
| 0D2D0 | 89 | 05 | A1 | 3F | 02 | 26 | 89 | 45 | 02 | CF | 58 | 53 | 51 | 52 | 57 | 56 |
| 0D2E0 | 55 | 1E | 06 | 56 | 51 | 83 | EC | 08 | 8B | EC | 81 | 66 | 22 | FF | F7 | FF |
| 0D2F0 | E0 | 58 | 83 | C4 | 08 | 59 | 5E | 07 | 1F | 5D | 5E | 5F | 5A | 59 | 5B | FF |
| 0D300 | E0 | 00 | 00 | 00 | 00 | 00 | 00 | 00 | 00 | 00 | 00 | 00 | 00 | 00 | 00 | 00 |
| 0D310 | D4 | 06 | BF | 09 | 09 | 0D | 98 | 08 | 37 | 09 | 54 | 09 | 73 | 09 | A2 | 0F |
| 0D320 | ED | 0F | 32 | 10 | B8 | 0B | 04 | 53 | 43 | 52 | 4E | 04 | 4C | 50 | 54 | 31 |
| 0D330 | 04 | 4C | 50 | 54 | 32 | 04 | 4C | 50 | 54 | 33 | 04 | 43 | 4F | 4D | 31 | 04 |
| 0D340 | 43 | 4F | 4D | 32 | 04 | 4B | 59 | 42 | 44 | 03 | 43 | 4F | 4E | 00 | 80 | FC |

```
0D350  38 75 04 E8 BA 08 CF 50 E8 7F FF 2E 89 26 2D 02
0D360  8B 46 1C 50 53 8A DC 2A FF D1 E3 83 FB 16 76 0B
0D370  2E FF 2E 09 02 B8 E8 03 E9 DF 09 2E 8B 9F 50 06
0D380  2E 89 1E 25 02 5B 58 2E FF 16 25 02 73 03 E9 C9
0D390  09 E9 B5 09 0E 1F 50 E8 27 00 58 0A C0 74 07 81
0D3A0  4F 44 05 00 EB 05 81 4F 44 03 00 8D 47 6C 89 47
0D3B0  48 8C 5F 4A 89 47 4C 89 47 4E 2B C0 89 47 50 F8
0D3C0  C3 50 E8 8D 02 26 F7 47 44 01 00 74 06 B8 EF 03
0D3D0  E9 87 09 8D 7F 6C 8E DA 57 51 B0 20 B9 14 00 FC
0D3E0  F3 AA 59 5F 51 0B C9 75 06 B8 FB 03 E9 6B 09 FD
0D3F0  AC FC 3C 61 72 06 3C 7A 77 02 2C 20 3C 22 74 03
0D400  AA E2 EC 59 2A C0 AA 06 1F 8D 77 6C E8 D5 00 58
0D410  0A C0 74 12 F7 47 5C 40 00 74 12 C7 47 5C 00 00
0D420  E8 EF 03 E9 34 09 F7 47 5C 0F 00 75 EE F7 47 5C
0D430  C1 00 74 01 C3 8D 57 6C 0A C0 75 24 B4 3D B0 02
0D440  CD 21 73 15 3D 02 00 74 05 B8 EF 03 EB 03 B8 E9
0D450  03 C7 47 5C 00 00 E9 01 09 89 47 64 E8 20 00 C3
0D460  B4 3C 2B C9 F7 47 5C FF 00 74 03 B8 02 3D CD 21
0D470  73 06 B8 EF 03 E9 E2 08 89 47 64 E8 01 00 C3 53
0D480  8B D8 B8 00 44 CD 21 F7 C2 80 00 74 0D 81 CA 20
0D490  00 81 E2 FF 00 B8 01 44 CD 21 5B 2B C0 89 47 66
0D4A0  89 47 68 F7 C2 80 00 75 03 E8 01 00 C3 50 51 52
0D4B0  56 57 53 8B 5F 64 2B C9 2B D2 B8 01 42 CD 21 8B
0D4C0  F0 8B FA 2B D2 B8 02 42 CD 21 52 50 8B D6 8B CF
0D4D0  B8 00 42 CD 21 58 5A 5B 89 47 66 89 57 68 5F 5E
0D4E0  5A 59 58 C3 06 0E 07 C7 47 5C 00 00 8D 3E 66 06
0D4F0  FC 2B D2 8B C6 26 8A 0D 47 2A ED E3 59 51 57 F3
0D500  A6 5F 59 74 07 42 03 F9 8B F0 EB E9 80 3C 00 74
0D510  0A 80 3C 3A 74 05 80 3C 22 75 EA C6 04 00 52 8B
0D520  CA 8B F2 BA 01 00 D3 E2 89 57 5C C7 47 5E 50 00
0D530  59 80 F9 04 75 05 C7 47 5E FF 00 80 F9 05 75 05
0D540  C7 47 5E FF 00 2E 85 16 17 02 74 0A D1 E6 2E 8B
0D550  84 19 02 89 47 5E 07 C3 0E 1F 8B 46 1A 0A C0 75
0D560  1C B9 10 00 2B DB 43 53 E8 E7 00 26 F7 47 44 01
0D570  00 5B 74 05 51 E8 05 00 59 E2 EB F8 C3 E8 D2 00
0D580  26 F7 47 44 01 00 75 06 B8 EB 03 E9 CC 07 26 F7
0D590  47 44 20 00 74 13 26 8E 5F 58 26 8B 77 56 8B 34
0D5A0  E8 FB 11 06 1F 2A C0 EB 27 26 F7 47 44 02 00 75
0D5B0  0A 26 83 7F 50 00 74 03 E8 69 05 06 1F 2A C0 F7
0D5C0  47 5C C1 00 75 0A 53 26 8B 5F 64 B4 3E CD 21 5B
0D5D0  C7 47 44 00 00 C7 47 4C 00 00 C7 47 4E 00 00 C7
0D5E0  47 50 00 00 C7 47 5C 00 00 C7 07 00 00 73 06 B8
0D5F0  EC 03 E9 65 07 F8 C3 0E 1F E8 56 00 26 F7 47 44
0D600  01 00 75 06 B8 EB 03 E9 50 07 26 89 77 48 26 89
0D610  57 4A F8 C3 0E 1F 53 E8 38 00 26 81 4F 44 00 40
0D620  5B 53 E8 5A 00 5B 0E 1F E8 27 00 26 81 67 44 FF
0D630  BF F8 C3 0E 1F 53 E8 19 00 26 81 4F 44 00 40 5B
0D640  53 E8 85 03 5B 0E 1F E8 08 00 26 81 67 44 FF BF
0D650  F8 C3 50 52 1E 8C C8 8E D8 8B C3 3D 10 00 76 06
0D660  B8 EE 03 E9 F4 06 0B C0 74 F6 8E 06 29 02 48 8B
0D670  1E 2B 02 F7 E3 8B D8 03 1E 27 02 1F 5A 58 C3 0E
0D680  1F E8 CE FF 26 8B 57 44 F7 C2 01 00 75 06 B8 EB
0D690  03 E9 67 01 26 F7 47 5C C0 00 74 1A 2E 8B 26 2D
0D6A0  02 8B EC 81 66 22 FF F7 E8 46 FC 58 BB 00 00 B4
0D6B0  0A 36 FF 2E 12 03 F7 C2 22 00 75 06 B8 EF 03 E9
0D6C0  39 01 83 4E 18 C7 46 18 00 00 89 0E 31 02 F7 C2
0D6D0  00 40 75 15 0B C9 79 11 81 CA 00 80 81 E1 FF 7F
0D6E0  89 0E 31 02 81 66 08 FF 7F E8 66 00 0B C9 75 03
0D6F0  EB 40 90 F7 C2 00 80 75 0B F7 C2 00 40 74 13 E8
0D700  46 01 EB 03 E8 04 01 2E 83 3E 31 02 00 75 08 EB
0D710  21 90 E8 74 00 74 1B 8B 46 06 29 46 08 01 46 18
0D720  F7 C2 00 40 75 02 F7 D8 01 46 0A 2E 8E 06 29 02
0D730  EB B7 8B 46 06 01 46 18 F7 C2 00 40 75 0F F7 C2
0D740  00 80 74 09 81 4E 18 00 80 81 E2 FF 7F 89 57 44
0D750  F8 C3 26 83 7F 50 00 77 11 F7 C2 40 00 74 03 E9
```

```
0D760    96 00 E8 82 01 73 03 E9 8E 00 26 8B 4F 50 8B 46
0D770    08 3B C8 76 02 8B C8 C7 46 06 00 00 8B 7E 0A 26
0D780    8B 77 4E 06 1F 8E 46 16 C3 FC AC FF 4F 50 FF 47
0D790    4E F7 C2 00 01 74 08 81 E2 FF FE 3C 0A 74 32 3C
0D7A0    0D 75 05 E8 34 00 EB 2F FD AA 3C 1A 75 20 F7 C2
0D7B0    20 00 75 1A 81 CA 40 00 8B 47 50 01 47 4E C7 47
0D7C0    50 00 00 83 7E 06 00 74 02 EB 0C EB 2B 90 FF 46
0D7D0    06 E2 B6 0D 01 00 C3 33 C0 C3 8B 4F 50 FC E3 09
0D7E0    AC 3C 0A 75 0A 46 49 EB 06 81 CA 00 01 EB 07 4E
0D7F0    89 77 4E 89 4F 50 F8 C3 B8 F0 03 81 E2 FF BF 2E
0D800    8E 06 29 02 26 89 57 44 E9 4F 05 F7 C2 00 01 74
0D810    16 81 E2 FF FE 80 3C 0A 75 0D FF 4F 50 46 FF 47
0D820    4E 3B 4F 50 76 01 49 E3 1E FC AC FF 4F 50 FF 47
0D830    4E F7 C2 20 00 75 04 3C 1A 74 BD FD FF 46 06 AA
0D840    2E FF 0E 31 02 E2 C4 C3 F7 C2 00 01 74 16 81 E2
0D850    FF FE 80 3C 0A 75 0D FF 4F 50 46 FF 47 4E 3B 4F
0D860    50 76 01 49 51 FC F3 A4 58 29 47 50 01 47 4E 2E
0D870    29 06 31 02 01 46 06 C3 0E 1F E8 D5 FD 06 1F 8B
0D880    57 44 F7 C2 20 00 75 28 F7 C2 10 00 75 3F 83 7F
0D890    50 00 77 05 E8 50 00 72 09 8B 77 4E FC AC 3C 1A
0D8A0    75 24 C7 47 50 00 00 81 4F 44 40 00 C7 46 1A FF
0D8B0    FF F8 C3 83 7F 50 00 75 0D C4 77 56 26 8B 34 26
0D8C0    83 7C 0A 00 74 E6 2B DB 89 5E 1A F8 C3 2B C9 8B
0D8D0    D1 53 8B 5F 64 B8 01 42 CD 21 5B 3B 57 68 72 E6
0D8E0    3B 47 66 72 E1 EB C5 51 52 56 1E 26 89 57 44 8D
0D8F0    57 6C 26 89 57 4C 26 89 57 4E 26 F7 47 44 20 00
0D900    74 03 E8 2A 90 2E 8E 1E 29 02 26 8B 4F 46 53 26
0D910    8B 5F 64 B4 3F CD 21 5B 26 89 47 50 26 01 47 4C
0D920    0B C0 75 01 F9 1F 5E 5A 59 26 8B 57 44 C3 0E 1F
0D930    26 8B 77 56 8B 34 83 7C 0A 00 74 FA 26 8B 7F 4C
0D940    C7 46 02 00 00 26 8B 4F 46 8B 44 0A 3B C1 77 02
0D950    8B C8 89 4E 00 8B 44 02 2B 44 10 F7 D8 3B C1 73
0D960    07 2B C8 89 4E 02 8B C8 8B 44 0E 8B 54 02 8E 1C
0D970    8B F2 FC F3 A4 83 7E 02 00 74 0C 8B F0 8B 4E 02
0D980    C7 46 02 00 00 EB EC 8B 4E 00 56 0E 1F 26 01 4F
0D990    50 26 8B 77 56 8B 34 26 01 4F 4C 29 4C 0A 58 89
0D9A0    44 02 F7 44 18 00 10 74 1A 8B 4C 0A 83 C1 32 3B
0D9B0    4C 16 73 0F 50 52 57 53 8B DE FA E8 3F 0A FB 5B
0D9C0    5F 5A 58 1F 5E 5A 59 F8 C3 0E 1F E8 84 FC 26 8B
0D9D0    57 44 F7 C2 01 00 75 06 B8 EB 03 E9 7C 03 26 F7
0D9E0    47 5C 81 00 74 1A 2E 8B 26 2D 02 8B EC 81 66 22
0D9F0    FF F7 E8 FC F8 58 BB 00 00 B4 06 36 FF 2E 12 03
0DA00    F7 C2 3C 00 75 06 B8 EF 03 E9 4E 03 F7 C2 20 00
0DA10    74 03 E9 51 01 C7 46 18 00 00 C7 46 06 00 00 8E
0DA20    5E 16 8B 76 0A 8B 4E 08 26 8B 47 46 26 2B 47 50
0DA30    3B C8 76 02 8B C8 0B C9 75 03 E9 A7 00 26 8B 7F
0DA40    -4C FC F7 C2 00 40 74 08 89 4E 06 F3 A4 EB 68 90
0DA50    FD AC 3C 0D 77 35 72 0C 26 C7 47 5A FF FF 81 CA
0DA60    00 01 EB 27 3C 0A 75 23 26 C7 47 5A FF FF F7 C2
0DA70    00 01 74 17 81 E2 FF FE 26 F7 47 5C FF 00 74 0B
0DA80    26 81 7F 5E FF 00 75 03 EB 28 90 FC AA 26 FF 47
0DA90    5A FF 46 06 26 F7 47 5C FF 00 74 16 26 8B 47 5E
0DAA0    26 39 47 5A 72 0C 26 C7 47 5A 00 00 E8 3B 00 EB
0DAB0    2A 90 49 E3 02 EB 8A 8B 46 06 26 01 47 50 29 46
0DAC0    08 01 46 18 26 01 47 4C F7 C2 00 40 75 02 F7 D8
0DAD0    01 46 0A E8 4E 00 06 1F E8 D2 F9 83 7E 08 00 74
0DAE0    03 E9 36 FF 26 89 57 44 F8 C3 8B 46 06 26 01 47
0DAF0    50 29 46 08 01 46 18 26 01 47 4C F7 D8 01 46 0A
0DB00    E8 21 00 26 8B 77 4C 26 C6 04 0D 26 FF 47 50 26
0DB10    81 7F 5E FF 00 74 09 26 C6 44 01 0A 26 FF 47 50
0DB20    E8 01 00 C3 06 1F 52 26 89 57 44 8D 57 6C 26 89
0DB30    57 4C 26 89 57 4E 26 8B 4F 50 26 C7 47 50 00 00
0DB40    51 53 26 8B 5F 64 B4 40 CD 21 5B 59 3B C1 74 14
0DB50    26 F7 47 5C FF 00 74 05 B8 1A 04 EB 03 B8 EA 03
0DB60    5A E9 97 FC 5A C3 26 8B 5F 56 8B 1F 8E 07 8B 7F
```

```
0DB70   08 8E 5E 16 8B 76 12 8B 4E 18 1E 57 51 8C CF 8E
0DB80   DF 8B FB E8 F2 0A 59 5F 1F 73 03 E9 CC 01 BA 00
0DB90   01 4A 2E 39 57 0C 73 E2 FD AC 3C 0D 75 06 2E C7
0DBA0   47 20 FF FF 2E FF 47 20 FC 2E F7 47 18 00 02 74
0DBB0   0A 2E 81 67 18 FF FD 3C 0A 74 2C 26 88 05 2E FF
0DBC0   47 0C 47 2E 3B 7F 14 72 04 2E 8B 7F 12 2E 89 7F
0DBD0   08 3C 0D 75 12 2E 81 4F 18 00 02 2E F7 47 18 00
0DBE0   01 74 04 B0 0A EB D4 E2 91 2E F7 47 18 20 00 74
0DBF0   03 E8 02 00 F8 C3 57 50 2E 8B 7F 1E D1 E7 1E B8
0DC00   40 00 8E D8 8B 15 1F 83 C2 02 E8 F3 06 58 5F C3
0DC10   0E 1F 1E 36 A1 54 00 8E D8 BF 06 00 49 E3 03 83
0DC20   C7 06 89 75 14 89 55 16 89 5D 18 1F F8 C3 50 53
0DC30   51 52 1E 8E 1E 15 02 A1 54 00 8E D8 8B CB 81 E1
0DC40   0F 00 D1 EB D1 EB 81 E3 FC 00 BA 01 00 D3 E2 85
0DC50   57 0E 75 08 09 57 0C 80 0E 0A 00 01 1F 5A 59 5B
0DC60   58 C3 0B DB 75 15 2E 8B 26 2D 02 8B EC 81 66 22
0DC70   FF F7 E8 7C F6 58 2E FF 2E 09 02 81 FB C8 00 73
0DC80   E5 0E 1F E8 CC F9 26 F7 47 44 20 00 74 0E 26 8B
0DC90   5F 56 8B 1F 8B 4F 20 89 4E 18 F8 C3 26 F7 47 5C
0DCA0   C1 00 75 C2 26 8B 4F 5A 89 4E 18 F8 C3 0E 1F 0A
0DCB0   FF 74 0D FE CB 2A FF E8 98 F9 26 89 4F 5E F8 C3
0DCC0   8D 36 19 02 D1 E3 89 08 D1 EB 8A CB BA 01 00 D3
0DCD0   E2 2E 89 16 17 02 83 FB 01 75 15 2E 8B 26 2D 02
0DCE0   8B EC 81 66 22 FF F7 E8 07 F6 58 2E FF 2E 09 02
0DCF0   F8 C3 53 8A CB BA 01 00 D3 E2 0E 1F B9 10 00 BB
0DD00   01 00 53 E8 4C F9 26 F7 47 44 01 00 74 12 26 85
0DD10   57 5C 74 0C 26 8B 4F 5A 41 89 4E 18 58 5B F8 C3
0DD20   5B 43 E2 DE 5B C7 46 18 01 00 F7 C2 02 00 74 17
0DD30   2E 8B 26 2D 02 8B EC 81 66 22 FF F7 E8 B2 F5 58
0DD40   B4 09 2E FF 2E 09 02 F8 C3 2E 8B 26 2D 02 8B EC
0DD50   81 66 22 FF F7 E8 99 F5 58 CF 2E 8B 26 2D 02 8B
0DD60   EC 89 46 1C 81 4E 22 00 08 E8 85 F5 58 CF 58 CF
0DD70   00 00 00 00 00 00 00 00 00 00 00 00 00 00 00 00
0DD80   00 00 00 00 00 00 00 00 00 00 00 00 00 00 00 00
0DD90   00 00 00 00 00 00 00 00 00 00 00 42 42 00 00 00
0DDA0   00 00 00 00 00 00 00 00 00 00 00 00 00 00 00 00
0DDB0   00 00 00 00 00 00 00 00 00 00 00 00 00 00 00 00
0DDC0   00 00 00 00 00 00 00 00 00 00 00 00 00 00 00 00
0DDD0   00 00 00 00 00 00 00 00 00 00 00 00 00 00 00 00
0DDE0   00 00 00 00 00 00 00 00 00 00 00 00 00 00 00 00
0DDF0   00 00 00 00 00 00 00 00 00 00 00 00 00 00 00 00
0DE00   00 00 00 00 00 00 00 00 00 00 00 00 00 00 00 00
0DE10   00 00 00 00 00 00 00 00 00 00 00 00 00 00 00 C4
0DE20   5E B8 26 8B 0F C4 5E A6 26 8B 1F C5 76 B2 E8 0F
0DE30   00 E8 33 00 A0 C5 10 2A E4 C5 76 94 89 04 F8 CB
0DE40   0E 07 E8 79 00 73 04 B8 FB 03 C3 BA B0 10 0E 1F
0DE50   B4 1A CD 21 BA DB 10 B4 4E F7 C3 FF 00 74 02 B4
0DE60   4F B9 10 00 CD 21 C3 72 4C C4 7E B2 8D 36 CE 10
0DE70   B9 08 00 FC AC 0A C0 74 0A 3C 2E 74 06 FD AA E2
0DE80   F2 FC AC 3C 2E FD 75 24 E3 04 B0 20 F3 AA B0 2E
0DE90   AA B9 03 00 FC AC FD 0A C0 74 03 AA E2 F6 E3 04
0DEA0   B0 20 F3 AA C4 7E B8 26 C6 05 0C C3 83 C1 04 B0
0DEB0   20 F3 AA EB EF C4 7E B8 26 C7 05 00 00 C3 0B C9
0DEC0   75 02 F9 C3 51 0E 07 8D 3E DB 10 57 B9 42 00 2A
0DED0   C0 FC F3 AA 5F 59 FD AC FC AA E2 FA 26 C6 05 00
0DEE0   F8 C3 C4 5E B8 26 8B 0F C5 76 B2 E8 D0 FF 73 01
0DEF0   CB BA DB 10 06 1F B4 41 CD 21 73 0F 3D 02 00 74
0DF00   05 B8 EF 03 F9 CB B8 E9 03 F9 CB F8 CB C4 5E B8
0DF10   26 8B 0F 0E 07 C5 76 B2 E8 A3 FF 73 01 CB BE DB
0DF20   10 BF 1D 11 0E 1F B8 01 29 CD 21 26 80 7D 01 20
0DF30   74 0A 8B D7 B4 13 CD 21 0A C0 74 05 B8 E9 03 F9
0DF40   CB F8 CB C4 5E B8 26 8B 0F 0E 07 C5 76 B2 E8 6D
0DF50   FF 73 01 CB BF 1D 11 BE DB 10 06 1F B9 42 00 FC
0DF60   F3 A4 C4 5E A6 26 8B 0F 0E 07 C5 76 A0 E8 4E FF
0DF70   73 01 CB BA DB 10 BF 1D 11 06 1F B4 56 CD 21 73
```

```
0DF80  05 B8 FC 03 F9 CB F8 CB C4 5E B6 26 8B 17 8A F2
0DF90  2A D2 C4 5E A6 26 8B 0F C4 5E 94 26 8B 07 8A E8
0DFA0  B4 2D CD 21 0A C0 F8 74 04 F9 B8 FD 03 CB B4 2C
0DFB0  CD 21 FD C4 7E B2 8A C5 D4 0A E8 1E 00 B0 3A AA
0DFC0  8A C1 D4 0A E8 14 00 B0 3A AA 8A C6 D4 0A E8 0A
0DFD0  00 C4 7E B8 26 C7 05 08 00 F8 CB 86 C4 04 30 AA
0DFE0  8A C4 04 30 AA C3 C4 5E B8 26 8B 17 C4 5E A6 26
0DFF0  8B 07 8A F0 C4 5E 94 26 8B 0F B4 2B CD 21 0A C0
0E000  F8 74 04 F9 B8 FD 03 CB B4 2A CD 21 8A C2 2A E4
0E010  C4 5E B8 26 89 07 8A C6 C4 5E A6 26 89 07 C4 5E
0E020  94 26 89 0F F8 CB 0E 1F C4 5E B6 26 8B 1F E8 8E
0E030  F1 72 0B 8C C0 8E D8 F7 47 44 01 00 75 05 B8 EB
0E040  03 F9 CB F7 47 44 20 00 75 18 B8 01 42 2B C9 2B
0E050  D2 8B 5F 64 CD 21 C5 76 A6 89 04 C5 76 94 89 14
0E060  F8 CB 8B 47 50 C5 77 56 8B 34 03 44 0A 2B D2 EB
0E070  E5 E8 35 00 73 01 CB B4 3B CD 21 72 01 CB B8 FE
0E080  03 CB E8 24 00 73 01 CB B4 39 CD 21 73 0C 3D 03
0E090  00 F9 B8 FE 03 74 03 B8 EF 03 CB E8 0B 00 73 01
0E0A0  CB B4 3A CD 21 73 F3 EB E5 C5 76 B8 8B 0C C5 76
0E0B0  B2 E8 0A FE 73 04 B8 FE 03 C3 BA DB 10 06 1F C3
0E0C0  C5 76 B8 8A 14 2A F6 B4 0E CD 21 B8 FF 03 CB B4
0E0D0  19 CD 21 04 41 C5 5E B2 88 07 C6 47 FF 3A C5 5E
0E0E0  B8 C7 07 02 00 F8 CB 0E 1F BE DB 10 2A D2 B4 47
0E0F0  CD 21 2B C9 C4 7E B2 26 C6 05 5C 4F 41 FC AC 0A
0E100  C0 74 05 FD AA 41 EB F5 C5 5E B8 89 0F F8 CB C5
0E110  5E B8 8B 17 B4 36 CD 21 72 69 3D FF FF 74 64 9C
0E120  36 FF 1E 02 03 7F 12 8B C3 0B C0 79 21 2D FF 7F
0E130  9C 36 FF 1E 02 03 7F 12 B8 FF 7F 9C 36 FF 1E 02
0E140  03 7F 12 9C 36 FF 1E 06 03 01 80 00 EB 0A 8B C3
0E150  9C 36 FF 1E 02 03 7F 12 9C 36 FF 1E 06 03 01 80
0E160  04 8B C1 9C 36 FF 1E 02 03 7F 12 9C 36 FF 1E 06
0E170  03 01 80 04 C4 5E A6 06 53 9C 36 FF 1E FE 02 80
0E180  02 F8 CB B8 EF 03 F9 CB 00 00 00 00 00 00 00 00
0E190  77 16 40 16 AB 15 A6 15 6F EF 00 F0 6F EF 00 F0
0E1A0  D3 05 95 35 00 00 00 00 00 00 F0 14 12 15 00 00
0E1B0  95 35 0F 1C 0F 1C 0F 20 0F 20 00 00 00 00 0F 1C
0E1C0  0F 20 0F 20 0F 21 00 04 00 00 00 00 00 00 00 00
0E1D0  00 00 95 35 0F 21 0F 21 0F 25 0F 25 00 00 00 00
0E1E0  0F 21 0F 25 0F 25 0F 26 00 04 00 00 00 00 00 00
0E1F0  01 00 00 00 FB 50 53 52 57 56 1E 06 2B C0 8E D8
0E200  8B 16 00 04 BF 00 00 8C C8 8E D8 42 42 EC A8 01
0E210  75 0C 32 E4 8B F0 52 FF 94 D0 14 5A EB EF BA 20
0E220  00 B0 20 EE 07 1F 5E 5F 5A 5B 58 CF FB 50 53 52
0E230  57 56 1E 06 2B C0 8E D8 8B 16 02 04 BF 02 00 8C
0E240  C8 8E D8 8E C0 42 42 EC A8 01 75 0C 32 E4 8B F0
0E250  52 FF 94 D0 14 5A EB EF BA 20 00 B0 20 EE 07 1F
0E260  5E 5F 5A 5B 58 CF 83 C2 03 EC C3 2A E4 83 C2 03
0E270  8B 9D EA 14 F7 47 1A 01 00 74 18 F7 47 1A 02 00
0E280  74 07 81 4F 1A 04 00 EB 0A 53 8B DF D1 EB 43 E8
0E290  9C F9 5B 81 67 18 FE FF EC 24 1E 74 42 F7 47 18
0E2A0  80 00 74 1B A8 04 74 17 B4 80 88 47 1D 81 4F 18
0E2B0  01 00 8E 06 15 02 26 C7 06 52 00 00 04 EB 20 3C
0E2C0  04 74 1C B4 80 88 47 1D 81 4F 18 01 00 F7 47 18
0E2D0  00 20 74 0B 8E 06 15 02 26 C7 06 52 00 00 04 E8
0E2E0  A1 00 72 04 E8 CA 00 C3 74 01 C3 83 7F 0C 00 74
0E2F0  0E 83 C2 05 EC A8 20 74 FB 83 EA 03 EB 02 90 C3
0E300  FA 0E 1F 8B 9D EA 14 F7 47 18 10 00 75 21 F7 47
0E310  18 00 04 74 09 F7 47 18 00 08 74 02 FB C3 83 7F
0E320  0C 00 74 0D 81 67 18 DF FF 4A 4A E8 F6 00 EE FB
0E330  C3 81 4F 18 20 00 C3 8B 9D EA 14 83 C2 04 EC 2A
0E340  E4 88 47 1C F7 47 18 02 00 74 04 A8 80 74 16 F7
0E350  47 18 04 00 74 04 A8 20 74 0B F7 47 18 08 00 74
0E360  0A A8 10 75 06 81 4F 18 10 00 C3 F7 47 18 10 00
0E370  74 F8 81 67 18 EF FF 4A EC A8 20 74 FB 83 EA 03
0E380  E9 7D FF 83 EA 05 8B 9D EA 14 EC F7 47 18 00 04
```

```
0E390   74 1D 50 24 7F 3C 13 75 07 81 4F 18 00 08 EB 0B
0E3A0   3C 11 75 0A 81 67 18 FF F7 2B C0 58 F9 C3 58 F8
0E3B0   C3 0A C4 8B 77 0A 3B 77 16 73 1E E8 21 00 F7 47
0E3C0   18 00 04 74 13 8B 77 0A 83 C6 1E 3B 77 16 72 08
0E3D0   E8 24 00 81 4F 18 00 10 C3 81 4F 18 40 00 C3 8E
0E3E0   07 8B 77 04 26 88 04 FF 47 0A 46 3B 77 10 75 03
0E3F0   8B 77 0E 89 77 04 C3 B0 13 E8 0C 00 C3 B0 11 E8
0E400   06 00 81 67 18 FF EF C3 2E 8B 7F 1E D1 E7 2E 8B
0E410   95 84 17 83 C2 05 8A E0 EC A8 20 74 FB 8A C4 83
0E420   EA 05 EE C3 8E 07 8B 77 06 26 8A 04 46 FF 4F 0C
0E430   3B 77 14 75 03 8B 77 12 89 77 06 C3 EB 1E 90 00
0E440   00 00 00 00 00 00 00 00 00 06 17 04 00 03 80 01
0E450   C0 00 60 00 40 00 30 00 18 00 0C 00 0E 1F C4 5E
0E460   A6 26 8B 37 D1 E6 8D 94 EA 14 C4 5E 94 26 8B 1F
0E470   E8 4C ED 26 F7 47 44 01 00 75 20 06 53 E8 20 00
0E480   5B 07 73 16 26 C7 47 44 00 00 26 C7 47 5C 00 00
0E490   26 C5 77 56 8B 34 E8 05 03 F9 CB B8 EF 03 F9 CB
0E4A0   26 89 57 56 26 8C 4F 58 26 81 4F 44 21 00 E8 53
0E4B0   01 E8 2C 02 C4 5E B8 E8 34 02 E8 6E 02 C6 06 82
0E4C0   17 0B 26 80 7F 08 00 75 05 80 0E 83 17 02 80 0E
0E4D0   83 17 09 1E C4 5E A6 26 8B 37 D1 E6 BA 40 00 8E
0E4E0   DA 8B 14 1F 89 94 84 17 83 C2 03 B0 80 EE 83 EA
0E4F0   03 A1 80 17 EE 42 8A C4 EE B0 00 83 C2 02 A0 7F
0E500   17 EE 83 EA 03 2B C9 EC E2 FD 83 C2 06 EC EC 83
0E510   EA 05 A0 82 17 EE 83 C2 03 A0 83 17 EE 83 EA 02
0E520   EC 8B 9C EA 14 C7 47 18 20 00 C7 47 0A 00 00 C7
0E530   47 0C 00 00 8B 47 0E 89 47 02 89 47 04 8B 47 12
0E540   89 47 08 89 47 06 C6 47 1C 00 C7 47 20 00 00 C4
0E550   7E B8 26 80 7D 18 00 74 05 81 4F 18 00 01 26 80
0E560   7D 1C 00 74 05 81 4F 18 80 00 26 80 7D 20 00 74
0E570   05 81 4F 18 00 04 26 80 7D 0C 00 74 05 81 4F 18
0E580   08 00 26 80 7D 10 00 74 05 81 4F 18 04 00 26 80
0E590   7D 14 00 74 05 81 4F 18 02 00 26 80 7D 24 00 74
0E5A0   05 81 4F 18 00 20 81 BC 84 17 F8 03 75 05 E8 41
0E5B0   00 EB 12 81 BC 84 17 F8 02 75 05 E8 3D 00 EB 05
0E5C0   F9 B8 F4 03 C3 F8 E8 7E 00 72 26 8B 94 84 17 83
0E5D0   C2 02 EC A8 01 75 1A 8B DE D1 E3 0B DB 74 04 2B
0E5E0   DB EB 03 BB 04 00 1E 2B C0 8E D8 9C FF 5F 2C 1F
0E5F0   F8 C3 B4 EF E4 21 22 C4 E6 21 C3 B4 F7 E4 21 22
0E600   C4 E6 21 C3 E4 21 B4 10 0B F6 74 02 B4 08 0A C4
0E610   E6 21 2B C0 8E C0 0B F6 75 17 BF 30 00 B8 34 15
0E620   26 87 05 A3 D8 14 8C C8 26 87 45 02 A3 DA 14 EB
0E630   15 BF 2C 00 B8 6C 15 26 87 05 A3 DC 14 8C C8 26
0E640   87 45 02 A3 DE 14 C3 B9 30 75 E2 FE 8B C2 C4 5E
0E650   B8 8B BC EA 14 8B 94 84 17 83 C2 06 EC 88 45 1C
0E660   26 8B 57 0E 89 16 E4 14 26 8B 57 12 89 16 E6 14
0E670   26 8B 57 16 89 16 E8 14 2B D2 B9 0F 00 2A E4 8A
0E680   45 1C A8 10 75 16 83 3E E4 14 00 74 0F 83 3E E4
0E690   14 FF 74 E9 3B 16 E4 14 74 41 FE CC A8 20 75 16
0E6A0   83 3E E6 14 00 74 0F 83 3E E6 14 FF 74 CF 3B 16
0E6B0   E6 14 74 27 FE CC A8 80 75 16 83 3E E8 14 00 74
0E6C0   0F 83 3E E8 14 FF 74 B5 3B 16 E8 14 74 0D FE CC
0E6D0   22 E4 74 05 E2 A7 42 EB A1 F8 C3 F9 B8 1A 04 C3
0E6E0   BF 7F 17 B9 09 00 2A C0 FC 0E 07 F3 AA C3 26 8A
0E6F0   47 04 2C 05 08 06 7F 17 26 8A 47 06 D0 E0 D0 E0
0E700   08 06 7F 17 26 8A 67 02 2A C0 80 FC 4E 74 18 B1
0E710   08 80 FC 4F 74 10 B1 18 80 FC 45 74 09 B1 38 80
0E720   FC 53 74 02 B1 28 08 0E 7F 17 C3 26 8B 37 D1 E6
0E730   8B 84 88 17 A3 80 17 C3 C4 5E B8 26 8B 0F C4 5E
0E740   A6 26 8B 07 0B C0 74 09 FE C8 74 16 FE C8 74 3D
0E750   CB 1E 1F 49 8B D9 D1 E3 8B 9F EA 14 81 67 1A F8
0E760   FF CB 1E 1F 49 8B D9 D1 E3 8B 9F EA 14 81 67 1A
0E770   FD FF 81 4F 1A 01 00 F7 47 1A 04 00 74 0D 81 67
0E780   1A FB FF BB 01 00 03 D9 E8 A3 F4 F8 CB 1E 1F 49
0E790   8B D9 D1 E3 8B 9F EA 14 81 4F 1A 02 00 CB 50 53
```

```
0E7A0   06 8B 5C 1E 8A CB D1 E3 BA 40 00 8E C2 26 8B 17
0E7B0   83 C2 04 2A C0 EE B4 10 D2 EC E4 21 0A C4 E6 21
0E7C0   2B C0 8E C0 0B DB 75 14 BF 30 00 2E A1 D8 14 26
0E7D0   89 05 2E A1 DA 14 26 89 45 02 EB 12 BF 2C 00 2E
0E7E0   A1 DC 14 26 89 05 2E A1 DE 14 26 89 45 02 07 5B
0E7F0   58 C3 0E 1F 2B C0 8E C0 BF 30 00 26 8B 05 A3 D8
0E800   14 26 8B 45 02 A3 DA 14 BF 2C 00 26 8B 05 A3 DC
0E810   14 26 8B 45 02 A3 DE 14 BF DE 02 36 8B 05 A3 E0
0E820   14 36 8B 45 02 A3 E2 14 36 C7 05 D7 1B 36 8C 4D
0E830   02 8B 1E EA 14 B8 0F 1C B9 00 04 90 8C 0F 89 4F
0E840   16 89 47 02 89 47 04 89 47 0E 03 C1 89 47 08 89
0E850   47 06 89 47 10 89 47 12 05 00 01 89 47 14 C7 47
0E860   1E 00 00 8B 1E EC 14 B8 0F 21 B9 00 04 90 8C 0F
0E870   89 4F 16 89 47 02 89 47 04 89 47 0E 03 C1 89 47
0E880   08 89 47 06 89 47 10 89 47 12 05 00 01 89 47 14
0E890   C7 47 1E 01 00 F8 CB FA 0E 1F BF DE 02 A1 E0 14
0E8A0   36 89 05 A1 E2 14 36 89 45 02 2B C0 8E C0 BF 30
0E8B0   00 A1 D8 14 26 89 05 A1 DA 14 26 89 45 02 BF 2C
0E8C0   00 A1 DC 14 26 89 05 A1 DE 14 26 89 45 02 CF 00
0E8D0   00 00 00 00 00 00 00 00 00 00 00 00 00 00 00 00
0E8E0   00 00 00 00 00 00 00 00 00 00 00 00 00 00 00 00
0E8F0   00 00 00 00 00 00 00 00 00 00 00 00 00 00 00 00
0E900   00 00 00 00 00 00 00 00 00 00 00 00 00 00 00 00
0E910   00 00 00 00 00 00 00 00 00 00 00 00 00 00 00 00
0E920   00 00 00 00 00 00 00 00 00 00 00 00 00 00 00 00
0E930   00 00 00 00 00 00 00 00 00 00 00 00 00 00 00 00
0E940   00 00 00 00 00 00 00 00 00 00 00 00 00 00 00 00
0E950   00 00 00 00 00 00 00 00 00 00 00 00 00 00 00 00
0E960   00 00 00 00 00 00 00 00 00 00 00 00 00 00 00 00
0E970   00 00 00 00 00 00 00 00 00 00 00 00 00 00 00 00
0E980   00 00 00 00 00 00 00 00 00 00 00 00 00 00 00 00
0E990   00 00 00 00 00 00 00 00 00 00 00 00 00 00 00 00
0E9A0   00 00 00 00 00 00 00 00 00 00 00 00 00 00 00 00
0E9B0   00 00 00 00 00 00 00 00 00 00 00 00 00 00 00 00
0E9C0   00 00 00 00 00 00 00 00 00 00 00 00 00 00 00 00
0E9D0   00 00 00 00 00 00 00 00 00 00 00 00 00 00 00 00
0E9E0   00 00 00 00 00 00 00 00 00 00 00 00 00 00 00 00
0E9F0   00 00 00 00 00 00 00 00 00 00 00 00 00 00 00 00
0EA00   00 00 00 00 00 00 00 00 00 00 00 00 00 00 00 00
0EA10   00 00 00 00 00 00 00 00 00 00 00 00 00 00 00 00
0EA20   00 00 00 00 00 00 00 00 00 00 00 00 00 00 00 00
0EA30   00 00 00 00 00 00 00 00 00 00 00 00 00 00 00 00
0EA40   00 00 00 00 00 00 00 00 00 00 00 00 00 00 00 00
0EA50   00 00 00 00 00 00 00 00 00 00 00 00 00 00 00 00
0EA60   00 00 00 00 00 00 00 00 00 00 00 00 00 00 00 00
0EA70   00 00 00 00 00 00 00 00 00 00 00 00 00 00 00 00
0EA80   00 00 00 00 00 00 00 00 00 00 00 00 00 00 00 00
0EA90   00 00 00 00 00 00 00 00 00 00 00 00 00 00 00 00
0EAA0   00 00 00 00 00 00 00 00 00 00 00 00 00 00 00 00
0EAB0   00 00 00 00 00 00 00 00 00 00 00 00 00 00 00 00
0EAC0   00 00 00 00 00 00 00 00 00 00 00 00 00 00 00 00
0EAD0   00 00 00 00 00 00 00 00 00 00 00 00 00 00 00 00
0EAE0   00 00 00 00 00 00 00 00 00 00 00 00 00 00 00 00
0EAF0   00 00 00 00 00 00 00 00 00 00 00 00 00 00 00 00
0EB00   00 00 00 00 00 00 00 00 00 00 00 00 00 00 00 00
0EB10   00 00 00 00 00 00 00 00 00 00 00 00 00 00 00 00
0EB20   00 00 00 00 00 00 00 00 00 00 00 00 00 00 00 00
0EB30   00 00 00 00 00 00 00 00 00 00 00 00 00 00 00 00
0EB40   00 00 00 00 00 00 00 00 00 00 00 00 00 00 00 00
0EB50   00 00 00 00 00 00 00 00 00 00 00 00 00 00 00 00
0EB60   00 00 00 00 00 00 00 00 00 00 00 00 00 00 00 00
0EB70   00 00 00 00 00 00 00 00 00 00 00 00 00 00 00 00
0EB80   00 00 00 00 00 00 00 00 00 00 00 00 00 00 00 00
0EB90   00 00 00 00 00 00 00 00 00 00 00 00 00 00 00 00
0EBA0   00 00 00 00 00 00 00 00 00 00 00 00 00 00 00 00
```

| | | | | | | | | | | | | | | | | |
|---|---|---|---|---|---|---|---|---|---|---|---|---|---|---|---|---|
| 0EBB0 | 00 | 00 | 00 | 00 | 00 | 00 | 00 | 00 | 00 | 00 | 00 | 00 | 00 | 00 | 00 | 00 |
| 0EBC0 | 00 | 00 | 00 | 00 | 00 | 00 | 00 | 00 | 00 | 00 | 00 | 00 | 00 | 00 | 00 | 00 |
| 0EBD0 | 00 | 00 | 00 | 00 | 00 | 00 | 00 | 00 | 00 | 00 | 00 | 00 | 00 | 00 | 00 | 00 |
| 0EBE0 | 00 | 00 | 00 | 00 | 00 | 00 | 00 | 00 | 00 | 00 | 00 | 00 | 00 | 00 | 00 | 00 |
| 0EBF0 | 00 | 00 | 00 | 00 | 00 | 00 | 00 | 00 | 00 | 00 | 00 | 00 | 00 | 00 | 00 | 00 |
| 0EC00 | 00 | 00 | 00 | 00 | 00 | 00 | 00 | 00 | 00 | 00 | 00 | 00 | 00 | 00 | 00 | 00 |
| 0EC10 | 00 | 00 | 00 | 00 | 00 | 00 | 00 | 00 | 00 | 00 | 00 | 00 | 00 | 00 | 00 | 00 |
| 0EC20 | 00 | 00 | 00 | 00 | 00 | 00 | 00 | 00 | 00 | 00 | 00 | 00 | 00 | 00 | 00 | 00 |
| 0EC30 | 00 | 00 | 00 | 00 | 00 | 00 | 00 | 00 | 00 | 00 | 00 | 00 | 00 | 00 | 00 | 00 |
| 0EC40 | 00 | 00 | 00 | 00 | 00 | 00 | 00 | 00 | 00 | 00 | 00 | 00 | 00 | 00 | 00 | 00 |
| 0EC50 | 00 | 00 | 00 | 00 | 00 | 00 | 00 | 00 | 00 | 00 | 00 | 00 | 00 | 00 | 00 | 00 |
| 0EC60 | 00 | 00 | 00 | 00 | 00 | 00 | 00 | 00 | 00 | 00 | 00 | 00 | 00 | 00 | 00 | 00 |
| 0EC70 | 00 | 00 | 00 | 00 | 00 | 00 | 00 | 00 | 00 | 00 | 00 | 00 | 00 | 00 | 00 | 00 |
| 0EC80 | 00 | 00 | 00 | 00 | 00 | 00 | 00 | 00 | 00 | 00 | 00 | 00 | 00 | 00 | 00 | 00 |
| 0EC90 | 00 | 00 | 00 | 00 | 00 | 00 | 00 | 00 | 00 | 00 | 00 | 00 | 00 | 00 | 00 | 00 |
| 0ECA0 | 00 | 00 | 00 | 00 | 00 | 00 | 00 | 00 | 00 | 00 | 00 | 00 | 00 | 00 | 00 | 00 |
| 0ECB0 | 00 | 00 | 00 | 00 | 00 | 00 | 00 | 00 | 00 | 00 | 00 | 00 | 00 | 00 | 00 | 00 |
| 0ECC0 | 00 | 00 | 00 | 00 | 00 | 00 | 00 | 00 | 00 | 00 | 00 | 00 | 00 | 00 | 00 | 00 |
| 0ECD0 | 00 | 00 | 00 | 00 | 00 | 00 | 00 | 00 | 00 | 00 | 00 | 00 | 00 | 00 | 00 | 00 |
| 0ECE0 | 00 | 00 | 00 | 00 | 00 | 00 | 00 | 00 | 00 | 00 | 00 | 00 | 00 | 00 | 00 | 00 |
| 0ECF0 | 00 | 00 | 00 | 00 | 00 | 00 | 00 | 00 | 00 | 00 | 00 | 00 | 00 | 00 | 00 | 00 |
| 0ED00 | 00 | 00 | 00 | 00 | 00 | 00 | 00 | 00 | 00 | 00 | 00 | 00 | 00 | 00 | 00 | 00 |
| 0ED10 | 00 | 00 | 00 | 00 | 00 | 00 | 00 | 00 | 00 | 00 | 00 | 00 | 00 | 00 | 00 | 00 |
| 0ED20 | 00 | 00 | 00 | 00 | 00 | 00 | 00 | 00 | 00 | 00 | 00 | 00 | 00 | 00 | 00 | 00 |
| 0ED30 | 00 | 00 | 00 | 00 | 00 | 00 | 00 | 00 | 00 | 00 | 00 | 00 | 00 | 00 | 00 | 00 |
| 0ED40 | 00 | 00 | 00 | 00 | 00 | 00 | 00 | 00 | 00 | 00 | 00 | 00 | 00 | 00 | 00 | 00 |
| 0ED50 | 00 | 00 | 00 | 00 | 00 | 00 | 00 | 00 | 00 | 00 | 00 | 00 | 00 | 00 | 00 | 00 |
| 0ED60 | 00 | 00 | 00 | 00 | 00 | 00 | 00 | 00 | 00 | 00 | 00 | 00 | 00 | 00 | 00 | 00 |
| 0ED70 | 00 | 00 | 00 | 00 | 00 | 00 | 00 | 00 | 00 | 00 | 00 | 00 | 00 | 00 | 00 | 00 |
| 0ED80 | 00 | 00 | 00 | 00 | 00 | 00 | 00 | 00 | 00 | 00 | 00 | 00 | 00 | 00 | 00 | 00 |
| 0ED90 | 00 | 00 | 00 | 00 | 00 | 00 | 00 | 00 | 00 | 00 | 00 | 00 | 00 | 00 | 00 | 00 |
| 0EDA0 | 00 | 00 | 00 | 00 | 00 | 00 | 00 | 00 | 00 | 00 | 00 | 00 | 00 | 00 | 00 | 00 |
| 0EDB0 | 00 | 00 | 00 | 00 | 00 | 00 | 00 | 00 | 00 | 00 | 00 | 00 | 00 | 00 | 00 | 00 |
| 0EDC0 | 00 | 00 | 00 | 00 | 00 | 00 | 00 | 00 | 00 | 00 | 00 | 00 | 00 | 00 | 00 | 00 |
| 0EDD0 | 00 | 00 | 00 | 00 | 00 | 00 | 00 | 00 | 00 | 00 | 00 | 00 | 00 | 00 | 00 | 00 |
| 0EDE0 | 00 | 00 | 00 | 00 | 00 | 00 | 00 | 00 | 00 | 00 | 00 | 00 | 00 | 00 | 00 | 00 |
| 0EDF0 | 00 | 00 | 00 | 00 | 00 | 00 | 00 | 00 | 00 | 00 | 00 | 00 | 00 | 00 | 00 | 00 |
| 0EE00 | 00 | 00 | 00 | 00 | 00 | 00 | 00 | 00 | 00 | 00 | 00 | 00 | 00 | 00 | 00 | 00 |
| 0EE10 | 00 | 00 | 00 | 00 | 00 | 00 | 00 | 00 | 00 | 00 | 00 | 00 | 00 | 00 | 00 | 00 |
| 0EE20 | 00 | 00 | 00 | 00 | 00 | 00 | 00 | 00 | 00 | 00 | 00 | 00 | 00 | 00 | 00 | 00 |
| 0EE30 | 00 | 00 | 00 | 00 | 00 | 00 | 00 | 00 | 00 | 00 | 00 | 00 | 00 | 00 | 00 | 00 |
| 0EE40 | 00 | 00 | 00 | 00 | 00 | 00 | 00 | 00 | 00 | 00 | 00 | 00 | 00 | 00 | 00 | 00 |
| 0EE50 | 00 | 00 | 00 | 00 | 00 | 00 | 00 | 00 | 00 | 00 | 00 | 00 | 00 | 00 | 00 | 00 |
| 0EE60 | 00 | 00 | 00 | 00 | 00 | 00 | 00 | 00 | 00 | 00 | 00 | 00 | 00 | 00 | 00 | 00 |
| 0EE70 | 00 | 00 | 00 | 00 | 00 | 00 | 00 | 00 | 00 | 00 | 00 | 00 | 00 | 00 | 00 | 00 |
| 0EE80 | 00 | 00 | 00 | 00 | 00 | 00 | 00 | 00 | 00 | 00 | 00 | 00 | 00 | 00 | 00 | 00 |
| 0EE90 | 00 | 00 | 00 | 00 | 00 | 00 | 00 | 00 | 00 | 00 | 00 | 00 | 00 | 00 | 00 | 00 |
| 0EEA0 | 00 | 00 | 00 | 00 | 00 | 00 | 00 | 00 | 00 | 00 | 00 | 00 | 00 | 00 | 00 | 00 |
| 0EEB0 | 00 | 00 | 00 | 00 | 00 | 00 | 00 | 00 | 00 | 00 | 00 | 00 | 00 | 00 | 00 | 00 |
| 0EEC0 | 00 | 00 | 00 | 00 | 00 | 00 | 00 | 00 | 00 | 00 | 00 | 00 | 00 | 00 | 00 | 00 |
| 0EED0 | 00 | 00 | 00 | 00 | 00 | 00 | 00 | 00 | 00 | 00 | 00 | 00 | 00 | 00 | 00 | 00 |
| 0EEE0 | 00 | 00 | 00 | 00 | 00 | 00 | 00 | 00 | 00 | 00 | 00 | 00 | 00 | 00 | 00 | 00 |
| 0EEF0 | 00 | 00 | 00 | 00 | 00 | 00 | 00 | 00 | 00 | 00 | 00 | 00 | 00 | 00 | 00 | 00 |
| 0EF00 | 00 | 00 | 00 | 00 | 00 | 00 | 00 | 00 | 00 | 00 | 00 | 00 | 00 | 00 | 00 | 00 |
| 0EF10 | 00 | 00 | 00 | 00 | 00 | 00 | 00 | 00 | 00 | 00 | 00 | 00 | 00 | 00 | 00 | 00 |
| 0EF20 | 00 | 00 | 00 | 00 | 00 | 00 | 00 | 00 | 00 | 00 | 00 | 00 | 00 | 00 | 00 | 00 |
| 0EF30 | 00 | 00 | 00 | 00 | 00 | 00 | 00 | 00 | 00 | 00 | 00 | 00 | 00 | 00 | 00 | 00 |
| 0EF40 | 00 | 00 | 00 | 00 | 00 | 00 | 00 | 00 | 00 | 00 | 00 | 00 | 00 | 00 | 00 | 00 |
| 0EF50 | 00 | 00 | 00 | 00 | 00 | 00 | 00 | 00 | 00 | 00 | 00 | 00 | 00 | 00 | 00 | 00 |
| 0EF60 | 00 | 00 | 00 | 00 | 00 | 00 | 00 | 00 | 00 | 00 | 00 | 00 | 00 | 00 | 00 | 00 |
| 0EF70 | 00 | 00 | 00 | 00 | 00 | 00 | 00 | 00 | 00 | 00 | 00 | 00 | 00 | 00 | 00 | 00 |
| 0EF80 | 00 | 00 | 00 | 00 | 00 | 00 | 00 | 00 | 00 | 00 | 00 | 00 | 00 | 00 | 00 | 00 |
| 0EF90 | 00 | 00 | 00 | 00 | 00 | 00 | 00 | 00 | 00 | 00 | 00 | 00 | 00 | 00 | 00 | 00 |
| 0EFA0 | 00 | 00 | 00 | 00 | 00 | 00 | 00 | 00 | 00 | 00 | 00 | 00 | 00 | 00 | 00 | 00 |
| 0EFB0 | 00 | 00 | 00 | 00 | 00 | 00 | 00 | 00 | 00 | 00 | 00 | 00 | 00 | 00 | 00 | 00 |

| | | | | | | | | | | | | | | | | |
|---|---|---|---|---|---|---|---|---|---|---|---|---|---|---|---|---|
| 0EFC0 | 00 | 00 | 00 | 00 | 00 | 00 | 00 | 00 | 00 | 00 | 00 | 00 | 00 | 00 | 00 | 00 |
| 0EFD0 | 00 | 00 | 00 | 00 | 00 | 00 | 00 | 00 | 00 | 00 | 00 | 00 | 00 | 00 | 00 | 00 |
| 0EFE0 | 00 | 00 | 00 | 00 | 00 | 00 | 00 | 00 | 00 | 00 | 00 | 00 | 00 | 00 | 00 | 00 |
| 0EFF0 | 00 | 00 | 00 | 00 | 00 | 00 | 00 | 00 | 00 | 00 | 00 | 00 | 00 | 00 | 00 | 00 |
| 0F000 | 00 | 00 | 00 | 00 | 00 | 00 | 00 | 00 | 00 | 00 | 00 | 00 | 00 | 00 | 00 | 00 |
| 0F010 | 00 | 00 | 00 | 00 | 00 | 00 | 00 | 00 | 00 | 00 | 00 | 00 | 00 | 00 | 00 | 00 |
| 0F020 | 00 | 00 | 00 | 00 | 00 | 00 | 00 | 00 | 00 | 00 | 00 | 00 | 00 | 00 | 00 | 00 |
| 0F030 | 00 | 00 | 00 | 00 | 00 | 00 | 00 | 00 | 00 | 00 | 00 | 00 | 00 | 00 | 00 | 00 |
| 0F040 | 00 | 00 | 00 | 00 | 00 | 00 | 00 | 00 | 00 | 00 | 00 | 00 | 00 | 00 | 00 | 00 |
| 0F050 | 00 | 00 | 00 | 00 | 00 | 00 | 00 | 00 | 00 | 00 | 00 | 00 | 00 | 00 | 00 | 00 |
| 0F060 | 00 | 00 | 00 | 00 | 00 | 00 | 00 | 00 | 00 | 00 | 00 | 00 | 00 | 00 | 00 | 00 |
| 0F070 | 00 | 00 | 00 | 00 | 00 | 00 | 00 | 00 | 00 | 00 | 00 | 00 | 00 | 00 | 00 | 00 |
| 0F080 | 00 | 00 | 00 | 00 | 00 | 00 | 00 | 00 | 00 | 00 | 00 | 00 | 00 | 00 | 00 | 00 |
| 0F090 | 00 | 00 | 00 | 00 | 00 | 00 | 00 | 00 | 00 | 00 | 00 | 00 | 00 | 00 | 00 | 00 |
| 0F0A0 | 00 | 00 | 00 | 00 | 00 | 00 | 00 | 00 | 00 | 00 | 00 | 00 | 00 | 00 | 00 | 00 |
| 0F0B0 | 00 | 00 | 00 | 00 | 00 | 00 | 00 | 00 | 00 | 00 | 00 | 00 | 00 | 00 | 00 | 00 |
| 0F0C0 | 00 | 00 | 00 | 00 | 00 | 00 | 00 | 00 | 00 | 00 | 00 | 00 | 00 | 00 | 00 | 00 |
| 0F0D0 | 00 | 00 | 00 | 00 | 00 | 00 | 00 | 00 | 00 | 00 | 00 | 00 | 00 | 00 | 00 | 00 |
| 0F0E0 | 00 | 00 | 00 | 00 | 00 | 00 | 00 | 00 | 00 | 00 | 00 | 00 | 00 | 00 | 00 | 00 |
| 0F0F0 | 00 | 00 | 00 | 00 | 00 | 00 | 00 | 00 | 00 | 00 | 00 | 00 | 00 | 00 | 00 | 00 |
| 0F100 | 00 | 00 | 00 | 00 | 00 | 00 | 00 | 00 | 00 | 00 | 00 | 00 | 00 | 00 | 00 | 00 |
| 0F110 | 00 | 00 | 00 | 00 | 00 | 00 | 00 | 00 | 00 | 00 | 00 | 00 | 00 | 00 | 00 | 00 |
| 0F120 | 00 | 00 | 00 | 00 | 00 | 00 | 00 | 00 | 00 | 00 | 00 | 00 | 00 | 00 | 00 | 00 |
| 0F130 | 00 | 00 | 00 | 00 | 00 | 00 | 00 | 00 | 00 | 00 | 00 | 00 | 00 | 00 | 00 | 00 |
| 0F140 | 00 | 00 | 00 | 00 | 00 | 00 | 00 | 00 | 00 | 00 | 00 | 00 | 00 | 00 | 00 | 00 |
| 0F150 | 00 | 00 | 00 | 00 | 00 | 00 | 00 | 00 | 00 | 00 | 00 | 00 | 00 | 00 | 00 | 00 |
| 0F160 | 00 | 00 | 00 | 00 | 00 | 00 | 00 | 00 | 00 | 00 | 00 | 00 | 00 | 00 | 00 | 00 |
| 0F170 | 00 | 00 | 00 | 00 | 00 | 00 | 00 | 00 | 00 | 00 | 00 | 00 | 00 | 00 | 00 | 00 |
| 0F180 | 00 | 00 | 00 | 00 | 00 | 00 | 00 | 00 | 00 | 00 | 00 | 00 | 00 | 00 | 00 | 00 |
| 0F190 | 00 | 00 | 00 | 00 | 00 | 00 | 00 | 00 | 00 | 00 | 00 | 00 | 00 | 00 | 00 | 00 |
| 0F1A0 | 00 | 00 | 00 | 00 | 00 | 00 | 00 | 00 | 00 | 00 | 00 | 00 | 00 | 00 | 00 | 00 |
| 0F1B0 | 00 | 00 | 00 | 00 | 00 | 00 | 00 | 00 | 00 | 00 | 00 | 00 | 00 | 00 | 00 | 00 |
| 0F1C0 | 00 | 00 | 00 | 00 | 00 | 00 | 00 | 00 | 00 | 00 | 00 | 00 | 00 | 00 | 00 | 00 |
| 0F1D0 | 00 | 00 | 00 | 00 | 00 | 00 | 00 | 00 | 00 | 00 | 00 | 00 | 00 | 00 | 00 | 00 |
| 0F1E0 | 00 | 00 | 00 | 00 | 00 | 00 | 00 | 00 | 00 | 00 | 00 | 00 | 00 | 00 | 00 | 00 |
| 0F1F0 | 00 | 00 | 00 | 00 | 00 | 00 | 00 | 00 | 00 | 00 | 00 | 00 | 00 | 00 | 00 | 00 |
| 0F200 | 00 | 00 | 00 | 00 | 00 | 00 | 00 | 00 | 00 | 00 | 00 | 00 | 00 | 00 | 00 | 00 |
| 0F210 | 00 | 00 | 00 | 00 | 00 | 00 | 00 | 00 | 00 | 00 | 00 | 00 | 00 | 00 | 00 | 00 |
| 0F220 | 00 | 00 | 00 | 00 | 00 | 00 | 00 | 00 | 00 | 00 | 00 | 00 | 00 | 00 | 00 | 00 |
| 0F230 | 00 | 00 | 00 | 00 | 00 | 00 | 00 | 00 | 00 | 00 | 00 | 00 | 00 | 00 | 00 | 00 |
| 0F240 | 00 | 00 | 00 | 00 | 00 | 00 | 00 | 00 | 00 | 00 | 00 | 00 | 00 | 00 | 00 | 00 |
| 0F250 | 00 | 00 | 00 | 00 | 00 | 00 | 00 | 00 | 00 | 00 | 00 | 00 | 00 | 00 | 00 | 00 |
| 0F260 | 00 | 00 | 00 | 00 | 00 | 00 | 00 | 00 | 00 | 00 | 00 | 00 | 00 | 00 | 00 | 00 |
| 0F270 | 00 | 00 | 00 | 00 | 00 | 00 | 00 | 00 | 00 | 00 | 00 | 00 | 00 | 00 | 00 | 00 |
| 0F280 | 00 | 00 | 00 | 00 | 00 | 00 | 00 | 00 | 00 | 00 | 00 | 00 | 00 | 00 | 00 | 00 |
| 0F290 | 00 | 00 | 00 | 00 | 00 | 00 | 00 | 00 | 00 | 00 | 00 | 00 | 00 | 00 | 00 | 00 |
| 0F2A0 | 00 | 00 | 00 | 00 | 00 | 00 | 00 | 00 | 00 | 00 | 00 | 00 | 00 | 00 | 00 | 00 |
| 0F2B0 | 00 | 00 | 00 | 00 | 00 | 00 | 00 | 00 | 00 | 00 | 00 | 00 | 00 | 00 | 00 | 00 |
| 0F2C0 | 00 | 00 | 00 | 00 | 00 | 00 | 00 | 00 | 00 | 00 | 00 | 00 | 00 | 00 | 00 | 00 |
| 0F2D0 | 57 | 72 | 69 | 74 | 65 | 20 | 50 | 72 | 6F | 74 | 65 | 63 | 74 | 20 | 45 | 72 |
| 0F2E0 | 72 | 6F | 72 | 20 | 20 | 20 | 24 | 55 | 6E | 6B | 6E | 6F | 77 | 6E | 20 | 55 |
| 0F2F0 | 6E | 69 | 74 | 20 | 20 | 20 | 24 | 44 | 72 | 69 | 76 | 65 | 20 | 4E | 6F | 74 |
| 0F300 | 20 | 52 | 65 | 61 | 64 | 79 | 20 | 20 | 20 | 24 | 55 | 6E | 6B | 6E | 6F | 77 |
| 0F310 | 6E | 20 | 43 | 6F | 6D | 6D | 61 | 6E | 64 | 20 | 20 | 20 | 24 | 44 | 61 | 74 |
| 0F320 | 61 | 20 | 45 | 72 | 72 | 6F | 72 | 28 | 43 | 52 | 43 | 29 | 20 | 20 | 20 | 24 |
| 0F330 | 42 | 61 | 64 | 20 | 52 | 65 | 71 | 75 | 65 | 73 | 74 | 20 | 53 | 74 | 72 | 75 |
| 0F340 | 63 | 74 | 75 | 72 | 65 | 20 | 20 | 20 | 24 | 53 | 65 | 65 | 6B | 20 | 45 | 72 |
| 0F380 | 24 | 50 | 72 | 69 | 6E | 74 | 65 | 72 | 20 | 4F | 75 | 74 | 20 | 4F | 66 | 20 |
| 0F390 | 50 | 61 | 70 | 65 | 72 | 20 | 20 | 20 | 24 | 57 | 72 | 69 | 74 | 65 | 20 | 46 |
| 0F3A0 | 61 | 75 | 6C | 74 | 20 | 20 | 20 | 24 | 52 | 65 | 61 | 64 | 20 | 46 | 61 | 75 |
| 0F3B0 | 6C | 74 | 20 | 20 | 20 | 24 | 44 | 4F | 53 | 20 | 45 | 72 | 72 | 6F | 72 | 20 |
| 0F3C0 | 6F | 66 | 20 | 55 | 6E | 6B | 6E | 6F | 77 | 6E | 20 | 4F | 72 | 69 | 67 | 69 |
| 0F3D0 | 6E | 20 | 20 | 20 | 24 | 4F | 6E | 20 | 44 | 72 | 69 | 76 | 65 | 20 | 24 | 44 |
| 0F3E0 | 65 | 76 | 69 | 63 | 65 | 20 | 45 | 72 | 72 | 6F | 72 | 20 | 24 | 46 | 69 | 6C |
| 0F3F0 | 65 | 20 | 41 | 6C | 6C | 6F | 63 | 61 | 74 | 69 | 6F | 6E | 20 | 54 | 61 | 62 |

```
0F400   6C 65 20 42 61 64 20 24 0A 0D 53 65 76 65 72 65
0F410   20 44 4F 53 20 45 72 72 6F 72 2E 2E 2E 55 6E 72
0F420   65 63 6F 76 65 72 61 62 6C 65 20 20 53 75 67 67
0F430   65 73 74 20 79 6F 75 20 52 65 2D 42 6F 6F 74 21
0F440   21 0A 0D 24 0D 0A 0D 0A 24 00 24 10 26 27 26 37
0F450   26 4A 26 5D 26 70 26 69 26 97 26 AD 26 C1 26 D9
0F460   26 E8 26 F6 26 0E 1F 8E 06 15 02 F6 06 41 02 FF
0F470   74 03 E9 A4 00 C6 06 41 02 FF FB FC 50 57 56 55
0F480   B4 19 CD 21 5D 5E 5F 58 26 F7 06 90 02 02 00 75
0F490   03 EB 54 90 50 0B C0 79 1E B8 1F 27 06 8E C5 26
0F4A0   F7 44 04 00 80 07 75 03 B8 2D 27 8B F0 8C DA E8
0F4B0   4D 00 58 72 64 EB 27 81 E7 FF 00 D1 E7 8B B5 8B
0F4C0   27 8C DA E8 39 00 58 72 50 50 BE 15 27 E8 2F 00
0F4D0   72 47 58 04 41 A2 89 27 BE 89 27 E8 21 00 8D 36
0F4E0   84 27 E8 1A 00 72 32 2E C6 06 41 02 00 83 C4 06
0F4F0   58 5B 59 5A 5E 5F 5D 1F 07 B0 FF F9 CA 02 00 80
0F500   3C 24 74 14 B4 06 B9 01 00 BB 00 00 9C 26 FF 1E
0F510   12 03 70 03 46 EB E8 F9 C3 8D 36 48 27 FC AC 3C
0F520   24 74 08 B4 0E B3 07 CD 10 EB F3 E8 BA 00 00 01
0F530   02 00 14 01 01 00 49 00 14 01 01 00 4F 00 14 01
0F540   01 00 52 00 00 01 03 00 16 01 2C 0F 32 00 14 01
0F550   03 00 4D 4F 43 00 00 01 04 00 14 01 01 00 31 00
0F560   14 01 01 00 32 00 00 01 05 00 14 01 01 00 3A 00
0F570   04 01 00 00 12 01 02 00 12 01 08 00 00 01 10 00
0F580   00 01 EF 03 0E 01 04 03 06 37 24 00 00 01 FF 7F
0F590   04 01 00 00 12 01 02 00 12 01 08 00 02 01 60 0F
0F5A0   00 01 EB 03 04 01 00 00 04 01 02 00 12 01 04 00
0F5B0   00 01 30 00 00 01 80 00 00 01 16 00 00 01 20 00
0F5C0   16 01 62 0F 42 00 02 01 A6 0F 02 01 A8 0F 02 01
0F5D0   AA 0F 02 01 AC 0F 16 01 AE 0F 01 00 16 01 B1 0F
0F5E0   42 00 00 01 FF FF 14 01 01 00 5C 00 14 01 01 00
0F5F0   2F 00 00 01 FB 03 14 01 01 00 41 00 14 01 01 00
0F600   5A 00 14 01 0C 00 3F 3F 3F 2E 3F 3F 3F 3F 3F 3F
0F610   3F 3F 00 01 FF 00 14 01 06 00 3E 52 49 44 3C 20
0F620   00 01 14 00 14 01 03 00 20 20 20 00 14 01 04 00
0F630   65 6C 69 46 14 01 05 00 73 65 6C 69 46 00 00 01
0F640   FC 03 18 01 00 00 42 00 18 01 44 00 01 00 18 01
0F650   47 00 01 00 14 01 01 00 2A 00 14 01 01 00 2E 00
0F660   00 01 07 00 14 01 43 00 20 29 4E 2F 59 28 20 3F
0F670   59 52 4F 54 43 45 52 49 44 20 73 69 68 74 20 6E
0F680   69 20 53 45 4C 49 46 20 4C 4C 41 20 65 74 65 6C
0F690   65 64 20 6F 74 20 74 6E 61 77 20 75 6F 79 20 65
0F6A0   72 75 73 20 75 6F 79 20 65 72 41 00 00 01 0D 00
0F6B0   14 01 01 00 59 00 14 01 01 00 3F 00 04 01 00 00
0F6C0   04 01 02 00 04 01 04 00 04 01 06 00 00 01 4D 04
0F6D0   00 01 17 00 14 01 06 00 26 23 23 30 27 3B 04 01
0F6E0   00 00 04 01 02 00 04 01 04 00 14 01 01 00 2D 00
0F6F0   14 01 05 00 23 23 23 23 3B 00 04 01 00 00 04 01
0F700   02 00 04 01 04 00 04 01 06 00 18 01 08 00 01 00
0F710   00 01 0C 00 00 01 64 00 00 01 6C 07 00 01 1F 00
0F720   00 01 06 00 00 01 08 00 04 01 00 00 00 01 F4 03
0F730   00 01 FF 03 00 01 41 00 10 01 F5 0F 18 01 00 00
0F740   50 00 18 01 52 00 50 00 04 01 A4 00 14 01 01 00
0F750   20 00 04 01 00 00 04 01 02 00 18 01 04 00 10 00
0F760   00 01 08 00 04 01 00 00 14 01 01 00 2C 00 18 01
0F770   00 00 32 00 18 01 34 00 02 00 04 01 38 00 04 01
0F780   3A 00 04 01 3C 00 04 01 3E 00 04 01 40 00 04 01
0F790   42 00 04 01 44 00 12 01 46 00 14 01 02 00 39 30
0F7A0   00 01 40 00 00 01 F5 03 0E 01 04 03 06 37 23 00
0F7B0   00 01 F7 03 00 01 E8 03 00 01 2C 01 14 01 01 00
0F7C0   53 00 14 01 01 00 4D 00 14 01 01 00 45 00 14 01
0F7D0   01 00 4E 00 14 01 02 00 53 52 14 01 02 00 53 43
0F7E0   14 01 02 00 53 44 14 01 02 00 44 43 14 01 02 00
0F7F0   46 4C 14 01 02 00 45 50 14 01 01 00 58 00 14 01
0F800   02 00 4F 46 00 01 4B 00 00 01 6E 00 00 01 96 00
```

| | | | | | | | | | | | | | | | | |
|---|---|---|---|---|---|---|---|---|---|---|---|---|---|---|---|---|
| 0F810 | 00 | 01 | 58 | 02 | 00 | 01 | B0 | 04 | 00 | 01 | 08 | 07 | 00 | 01 | 60 | 09 |
| 0F820 | 00 | 01 | C0 | 12 | 00 | 01 | 80 | 25 | 18 | 01 | 00 | 00 | 42 | 00 | 04 | 01 |
| 0F830 | 44 | 00 | 04 | 01 | 46 | 00 | 04 | 01 | 48 | 00 | 00 | 01 | 01 | 04 | 00 | 01 |
| 0F840 | F2 | 03 | 00 | 01 | 0F | 00 | 00 | 01 | 1C | 00 | 00 | 01 | F3 | 03 | 00 | 01 |
| 0F850 | 32 | 00 | 00 | 01 | 1A | 00 | 18 | 01 | 00 | 00 | 02 | 00 | 18 | 01 | 00 | 00 |
| 0F860 | 42 | 00 | 04 | 01 | 00 | 00 | 18 | 01 | 02 | 00 | 06 | 00 | 14 | 01 | 04 | 00 |
| 0F870 | 4E | 52 | 43 | 53 | 14 | 01 | 04 | 00 | 31 | 54 | 50 | 4C | 14 | 01 | 04 | 00 |
| 0F880 | 32 | 54 | 50 | 4C | 14 | 01 | 04 | 00 | 33 | 54 | 50 | 4C | 14 | 01 | 04 | 00 |
| 0F890 | 31 | 4D | 4F | 43 | 14 | 01 | 04 | 00 | 32 | 4D | 4F | 43 | 14 | 01 | 04 | 00 |
| 0F8A0 | 44 | 42 | 59 | 4B | 14 | 01 | 03 | 00 | 4E | 4F | 43 | 00 | 04 | 01 | 00 | 00 |
| 0F8B0 | 00 | 00 | 2A | 03 | 24 | 00 | B8 | 02 | 38 | 00 | A8 | 00 | 2A | 03 | 24 | 00 |
| 0F8C0 | B8 | 02 | 38 | 00 | AA | 00 | 24 | 00 | 2A | 03 | 24 | 00 | BC | 02 | 38 | 00 |
| 0F8D0 | A8 | 00 | 2A | 03 | 24 | 00 | B8 | 02 | 38 | 00 | A8 | 00 | BC | 00 | 88 | 00 |
| 0F8E0 | 7A | 06 | FC | 00 | A4 | 02 | FC | 00 | F4 | 00 | 01 | 00 | F2 | 00 | 07 | 00 |
| 0F8F0 | 64 | 01 | FC | 00 | 98 | 06 | FC | 00 | 02 | 00 | 2C | 01 | 14 | 01 | 01 | 00 |
| 0F900 | 00 | 00 | 0C | 00 | 58 | 03 | 66 | 03 | 84 | 03 | 92 | 03 | 04 | 00 | 9F | 03 |
| 0F910 | 00 | 00 | AD | 03 | 00 | 00 | 09 | 00 | B2 | 03 | 24 | 00 | 60 | 03 | 54 | 00 |
| 0F920 | 05 | 00 | 2F | 00 | 79 | 00 | 4D | 00 | 8D | 00 | 6B | 00 | A1 | 00 | FC | 00 |
| 0F930 | 06 | 00 | 24 | 00 | 10 | 00 | BC | 02 | BC | 00 | 88 | 00 | 24 | 00 | BC | 02 |
| 0F940 | 88 | 00 | 26 | 00 | B8 | 03 | 88 | 00 | 72 | 02 | 02 | 00 | FC | 00 | 06 | 00 |
| 0F950 | 24 | 00 | 10 | 00 | BC | 02 | BC | 00 | 88 | 00 | 24 | 00 | B8 | 02 | 88 | 00 |
| 0F960 | 26 | 00 | B8 | 03 | 88 | 00 | 72 | 02 | 02 | 00 | FC | 00 | 06 | 00 | 24 | 00 |
| 0F970 | 10 | 00 | BC | 02 | BC | 00 | 88 | 00 | 24 | 00 | CE | 2D | 88 | 00 | 26 | 00 |
| 0F980 | B8 | 03 | 88 | 00 | 72 | 02 | 02 | 00 | FC | 00 | 02 | 00 | 4B | C9 | CC | CC |
| 0F990 | 00 | 00 | 0C | 00 | 04 | 00 | 0C | 00 | 09 | 00 | B2 | 03 | 24 | 00 | 28 | 00 |
| 0F9A0 | 06 | 00 | C0 | 00 | D2 | 2D | AC | 00 | 2E | 00 | 1D | 00 | 0A | 00 | 24 | 00 |
| 0F9B0 | 08 | 00 | BC | 02 | BC | 00 | 88 | 00 | 24 | 00 | B8 | 02 | 88 | 00 | 26 | 00 |
| 0F9C0 | 0C | 00 | 88 | 00 | 72 | 02 | FC | 00 | 24 | 00 | 28 | 00 | 06 | 00 | C0 | 00 |
| 0F9D0 | D8 | 2D | AC | 00 | 2E | 00 | 1D | 00 | 0A | 00 | 24 | 00 | 08 | 00 | BC | 02 |
| 0F9E0 | BC | 00 | 88 | 00 | 24 | 00 | BC | 02 | 88 | 00 | 26 | 00 | 0C | 00 | 88 | 00 |
| 0F9F0 | 72 | 02 | FC | 00 | 24 | 00 | 28 | 00 | 06 | 00 | C0 | 00 | DE | 2D | AC | 00 |
| 0FA00 | 2E | 00 | 1D | 00 | 0A | 00 | 24 | 00 | 08 | 00 | BC | 02 | BC | 00 | 88 | 00 |
| 0FA10 | 24 | 00 | E4 | 2D | 88 | 00 | 26 | 00 | 0C | 00 | 88 | 00 | 72 | 02 | FC | 00 |
| 0FA20 | 02 | 00 | 22 | 02 | 0C | 55 | D3 | C5 | C6 | C9 | CC | C5 | 0A | 64 | 2C | 02 |
| 0FA30 | 00 | 00 | 0C | 00 | C4 | 03 | 04 | 00 | 0C | 00 | 09 | 00 | B2 | 03 | 06 | 00 |
| 0FA40 | 24 | 00 | 0A | 00 | 88 | 00 | 0C | 00 | 26 | 00 | 0E | 00 | 88 | 00 | 0A | 01 |
| 0FA50 | FC | 00 | 02 | 00 | 00 | 00 | 09 | 00 | B2 | 03 | 24 | 00 | 60 | 03 | 54 | 00 |
| 0FA60 | 00 | 00 | 0C | 00 | D0 | 03 | 04 | 00 | DF | 03 | 00 | 00 | ED | 03 | 00 | 00 |
| 0FA70 | 09 | 00 | B2 | 03 | E8 | 2D | 28 | 00 | 06 | 00 | C0 | 00 | 9E | 00 | FC | 00 |
| 0FA80 | 24 | 00 | 28 | 00 | E8 | 2D | 24 | 00 | E4 | 2D | D4 | 00 | EE | 2D | AC | 00 |
| 0FA90 | 28 | 00 | E8 | 2D | 24 | 00 | F6 | 2D | 24 | 00 | BC | 02 | D6 | 00 | FA | 2D |
| 0FAA0 | AC | 00 | 28 | 00 | E8 | 2D | 24 | 00 | F6 | 2D | 24 | 00 | BC | 02 | D6 | 00 |
| 0FAB0 | 00 | 2E | AC | 00 | C8 | 00 | C6 | 00 | 28 | 00 | E8 | 2D | 24 | 00 | 06 | 2E |
| 0FAC0 | 24 | 00 | BC | 02 | D6 | 00 | 0A | 2E | AC | 00 | C6 | 00 | E8 | 2D | A0 | 00 |
| 0FAD0 | 06 | 2E | B0 | 00 | C6 | 00 | 2E | 00 | 15 | 00 | E8 | 2D | 24 | 00 | 0A | 00 |
| 0FAE0 | 88 | 00 | 26 | 00 | 10 | 00 | BC | 00 | 68 | 02 | 02 | 00 | FC | 00 | 06 | 00 |
| 0FAF0 | 24 | 00 | 0A | 00 | BC | 02 | BC | 00 | 88 | 00 | 24 | 00 | E4 | 2D | 88 | 00 |
| 0FB00 | 26 | 00 | 10 | 00 | 88 | 00 | 72 | 02 | FC | 00 | 02 | 00 | 06 | 00 | C0 | 00 |
| 0FB10 | 00 | 00 | 0C | 00 | F8 | 03 | 06 | 04 | 04 | 00 | 13 | 04 | 00 | 00 | 21 | 04 |
| 0FB20 | 00 | 00 | 09 | 00 | B2 | 03 | 06 | 00 | F4 | 00 | 03 | 00 | 24 | 00 | 0C | 00 |
| 0FB30 | 88 | 00 | F4 | 00 | 03 | 00 | F4 | 00 | 03 | 00 | 26 | 00 | 12 | 00 | 88 | 00 |
| 0FB40 | 1E | 01 | FC | 00 | 02 | 00 | 24 | 00 | 08 | 00 | BC | 02 | BC | 00 | 88 | 00 |
| 0FB50 | 00 | 00 | 0C | 00 | 2C | 04 | 3A | 04 | 58 | 04 | 04 | 00 | 67 | 04 | 00 | 00 |
| 0FB60 | 75 | 04 | 00 | 00 | 09 | 00 | B2 | 03 | 24 | 00 | 34 | 04 | 54 | 00 | 05 | 00 |
| 0FB70 | 2D | 00 | 29 | 00 | 4B | 00 | 3D | 00 | 69 | 00 | 51 | 00 | FC | 00 | 06 | 00 |
| 0FB80 | 24 | 00 | 0E | 00 | BC | 02 | BC | 00 | 88 | 00 | 24 | 00 | BC | 02 | 88 | 00 |
| 0FB90 | 26 | 00 | 14 | 00 | 88 | 00 | 72 | 02 | 02 | 00 | FC | 00 | 06 | 00 | 24 | 00 |
| 0FBA0 | 0E | 00 | BC | 02 | BC | 00 | 88 | 00 | 24 | 00 | B8 | 02 | 88 | 00 | 26 | 00 |
| 0FBB0 | 14 | 00 | 88 | 00 | 72 | 02 | 02 | 00 | FC | 00 | 06 | 00 | 24 | 00 | 0E | 00 |
| 0FBC0 | BC | 02 | BC | 00 | 88 | 00 | 24 | 00 | CE | 2D | 88 | 00 | 26 | 00 | 14 | 00 |
| 0FBD0 | 88 | 00 | 72 | 02 | 02 | 00 | FC | 00 | 02 | 00 | BC | 02 | D6 | 00 | FA | 2D |
| 0FBE0 | 00 | 00 | 80 | 04 | 92 | 04 | 04 | 00 | 09 | 00 | 98 | 04 | 18 | 00 | 24 | 00 |
| 0FBF0 | 2A | 03 | 24 | 00 | 0A | 00 | BC | 02 | BC | 00 | 38 | 00 | 02 | 03 | 24 | 00 |
| 0FC00 | B8 | 02 | 38 | 00 | 1C | 2E | C6 | 00 | 1C | 2E | AE | 00 | 2E | 00 | 09 | 00 |
| 0FC10 | 24 | 00 | 20 | 2E | 4C | 00 | FC | 00 | 24 | 00 | 2A | 03 | 24 | 00 | 0A | 00 |

| | | | | | | | | | | | | | | | | |
|---|---|---|---|---|---|---|---|---|---|---|---|---|---|---|---|---|
| 0FC20 | BC | 02 | BC | 00 | 38 | 00 | 02 | 03 | 24 | 00 | D0 | 02 | 38 | 00 | 18 | 00 |
| 0FC30 | 1A | 00 | 0E | 00 | A2 | 00 | AE | 00 | 2E | 00 | 09 | 00 | 24 | 00 | 20 | 2E |
| 0FC40 | 4C | 00 | FC | 00 | 14 | 2E | 26 | 00 | 26 | 00 | 0C | 00 | 24 | 2E | C0 | 00 |
| 0FC50 | D2 | 00 | 9E | 00 | FC | 00 | 26 | 00 | 14 | 2E | 2C | 2E | B0 | 00 | 84 | 00 |
| 0FC60 | 2E | 00 | 0F | 00 | 14 | 2E | 26 | 00 | 14 | 2E | 24 | 2E | BC | 00 | 9E | 00 |
| 0FC70 | FC | 00 | 18 | 2E | 26 | 00 | 0C | 00 | 24 | 2E | C2 | 00 | 9E | 00 | FC | 00 |
| 0FC80 | 26 | 00 | 18 | 2E | 2C | 2E | B0 | 00 | 84 | 00 | 2E | 00 | 0F | 00 | 18 | 2E |
| 0FC90 | 26 | 00 | 18 | 2E | 24 | 2E | BC | 00 | 9E | 00 | FC | 00 | 24 | 00 | 18 | 00 |
| 0FCA0 | 1A | 00 | 0E | 00 | A4 | 00 | E4 | 2D | AE | 00 | 2E | 00 | 0F | 00 | 10 | 2E |
| 0FCB0 | 24 | 00 | B8 | 02 | 9E | 00 | 2A | 00 | 0B | 00 | 10 | 2E | 24 | 00 | E4 | 2D |
| 0FCC0 | 9E | 00 | FC | 00 | 0E | 00 | 10 | 2E | 0A | 00 | 26 | 00 | 14 | 2E | 8C | 00 |
| 0FCD0 | 26 | 00 | 18 | 2E | 8C | 00 | B8 | 02 | 86 | 06 | FC | 00 | 02 | 00 | 24 | 00 |
| 0FCE0 | 00 | 00 | A2 | 04 | 04 | 00 | 09 | 00 | AE | 04 | 18 | 00 | F4 | 00 | 03 | 00 |
| 0FCF0 | F4 | 00 | 03 | 00 | 24 | 00 | 08 | 00 | 88 | 00 | 26 | 00 | 0A | 00 | 88 | 00 |
| 0FD00 | 0C | 00 | 3C | 01 | FC | 00 | 02 | 00 | CE | 2D | 88 | 00 | 26 | 00 | 14 | 00 |
| 0FD10 | 00 | 00 | B8 | 04 | CA | 04 | 04 | 00 | 09 | 00 | D0 | 04 | 18 | 00 | 24 | 00 |
| 0FD20 | 2A | 03 | 24 | 00 | 0A | 00 | BC | 02 | BC | 00 | 38 | 00 | 02 | 03 | 24 | 00 |
| 0FD30 | B8 | 02 | 38 | 00 | 1C | 2E | C6 | 00 | 1C | 2E | AE | 00 | 2E | 00 | 09 | 00 |
| 0FD40 | 24 | 00 | 20 | 2E | 4C | 00 | FC | 00 | 24 | 00 | 2A | 03 | 24 | 00 | 0A | 00 |
| 0FD50 | BC | 02 | BC | 00 | 38 | 00 | 02 | 03 | 24 | 00 | D0 | 02 | 38 | 00 | 18 | 00 |
| 0FD60 | 1A | 00 | 0E | 00 | A2 | 00 | AE | 00 | 2E | 00 | 09 | 00 | 24 | 00 | 20 | 2E |
| 0FD70 | 4C | 00 | FC | 00 | 34 | 2E | 26 | 00 | 26 | 00 | 0C | 00 | 24 | 2E | C0 | 00 |
| 0FD80 | D2 | 00 | 9E | 00 | FC | 00 | 26 | 00 | 34 | 2E | 2C | 2E | B0 | 00 | 84 | 00 |
| 0FD90 | 2E | 00 | 0F | 00 | 34 | 2E | 26 | 00 | 34 | 2E | 24 | 2E | BC | 00 | 9E | 00 |
| 0FDA0 | FC | 00 | 38 | 2E | 26 | 00 | 0C | 00 | 24 | 2E | C2 | 00 | 9E | 00 | FC | 00 |
| 0FDB0 | 26 | 00 | 38 | 2E | 2C | 2E | B0 | 00 | 84 | 00 | 2E | 00 | 0F | 00 | 38 | 2E |
| 0FDC0 | 26 | 00 | 38 | 2E | 24 | 2E | BC | 00 | 9E | 00 | FC | 00 | 24 | 00 | 18 | 00 |
| 0FDD0 | 1A | 00 | 0E | 00 | A4 | 00 | E4 | 2D | AE | 00 | 2E | 00 | 0F | 00 | 30 | 2E |
| 0FDE0 | 24 | 00 | B8 | 02 | 9E | 00 | 2A | 00 | 0B | 00 | 30 | 2E | 24 | 00 | E4 | 2D |
| 0FDF0 | 9E | 00 | FC | 00 | 0E | 00 | 30 | 2E | 0A | 00 | 26 | 00 | 34 | 2E | 8C | 00 |
| 0FE00 | 26 | 00 | 38 | 2E | 8C | 00 | BC | 02 | 86 | 06 | FC | 00 | 02 | 00 | 8C | 00 |
| 0FE10 | 00 | 00 | DA | 04 | 04 | 00 | 09 | 00 | E6 | 04 | 18 | 00 | F4 | 00 | 03 | 00 |
| 0FE20 | F4 | 00 | 03 | 00 | 24 | 00 | 08 | 00 | 88 | 00 | 26 | 00 | 0A | 00 | 88 | 00 |
| 0FE30 | 0C | 00 | 50 | 01 | FC | 00 | 02 | 00 | 88 | 00 | 26 | 00 | 0A | 00 | 88 | 00 |
| 0FE40 | 00 | 00 | F1 | 04 | 00 | 00 | 05 | 00 | B8 | 02 | 24 | 00 | 08 | 00 | B8 | 02 |
| 0FE50 | AC | 00 | 2E | 00 | 0F | 00 | 54 | 00 | 01 | 00 | 58 | 00 | 8D | 00 | 2A | 00 |
| 0FE60 | 37 | 00 | 24 | 00 | 2A | 03 | 24 | 00 | 08 | 00 | BC | 02 | BC | 00 | 38 | 00 |
| 0FE70 | 02 | 03 | 24 | 00 | B8 | 02 | 38 | 00 | BC | 02 | C6 | 00 | BC | 02 | AC | 00 |
| 0FE80 | 2E | 00 | 0F | 00 | 24 | 00 | 08 | 00 | 88 | 00 | 7C | 02 | 2A | 00 | 09 | 00 |
| 0FE90 | 24 | 00 | 40 | 2E | 4C | 00 | FC | 00 | 02 | 00 | FC | 00 | 3C | 2E | 24 | 00 |
| 0FEA0 | BC | 02 | 9E | 00 | 20 | 00 | 24 | 00 | 1C | 2E | 88 | 00 | 62 | 00 | 60 | 00 |
| 0FEB0 | 2F | 00 | FC | 00 | 24 | 00 | 2A | 03 | 24 | 00 | 3C | 2E | BC | 02 | BC | 00 |
| 0FEC0 | 38 | 00 | 02 | 03 | 24 | 00 | B8 | 02 | 38 | 00 | BC | 02 | C6 | 00 | BC | 02 |
| 0FED0 | AC | 00 | 2E | 00 | 08 | 00 | 24 | 00 | 3C | 2E | 88 | 00 | 7C | 02 | FC | 00 |
| 0FEE0 | 5E | 00 | FC | 00 | 02 | 00 | 0C | 00 | 24 | 2E | C2 | 00 | 9E | 00 | FC | 00 |
| 0FEF0 | 00 | 00 | 04 | 00 | 44 | 2E | 48 | 2E | 06 | 00 | D4 | 06 | FC | 00 | 24 | 00 |
| 0FF00 | 48 | 2E | B8 | 02 | B4 | 00 | 2E | 00 | 13 | 00 | 4C | 2E | 26 | 00 | 48 | 2E |
| 0FF10 | 24 | 2E | BA | 00 | 9E | 00 | 2A | 00 | 0B | 00 | 4C | 2E | 24 | 00 | 48 | 2E |
| 0FF20 | 9E | 00 | FC | 00 | 24 | 00 | 44 | 2E | B8 | 02 | B4 | 00 | 2E | 00 | 1B | 00 |
| 0FF30 | 4C | 2E | 26 | 00 | 4C | 2E | 44 | 2E | 24 | 2E | BA | 00 | 24 | 2E | BE | 00 |
| 0FF40 | BA | 00 | 9E | 00 | 2A | 00 | 13 | 00 | 4C | 2E | 26 | 00 | 4C | 2E | 44 | 2E |
| 0FF50 | 24 | 2E | BE | 00 | BA | 00 | 9E | 00 | FC | 00 | 24 | 00 | 2A | 03 | 24 | 00 |
| 0FF60 | 06 | 00 | BC | 02 | BC | 00 | 38 | 00 | 02 | 03 | 24 | 00 | 58 | 02 | 38 | 00 |
| 0FF70 | 50 | 2E | C6 | 00 | B8 | 02 | AE | 00 | 2E | 00 | 0D | 00 | 26 | 00 | 4C | 2E |
| 0FF80 | 82 | 00 | 2A | 00 | 19 | 00 | 26 | 00 | 26 | 00 | 4C | 2E | BC | 02 | BC | 00 |
| 0FF90 | 54 | 2E | C0 | 00 | D2 | 00 | BC | 02 | BA | 00 | 82 | 00 | 02 | 00 | 2A | 00 |
| 0FFA0 | 00 | 00 | 04 | 00 | 24 | 00 | 2A | 03 | 24 | 00 | 06 | 00 | BC | 02 | BC | 00 |
| 0FFB0 | 38 | 00 | 02 | 03 | 24 | 00 | B8 | 02 | 38 | 00 | B8 | 02 | AC | 00 | 2E | 00 |
| 0FFC0 | 09 | 00 | 24 | 00 | 40 | 2E | 4C | 00 | FC | 00 | 24 | 00 | 2A | 03 | 24 | 00 |
| 0FFD0 | 06 | 00 | BC | 02 | BC | 00 | 38 | 00 | 02 | 03 | 24 | 00 | B8 | 02 | 38 | 00 |
| 0FFE0 | 5C | 2E | C6 | 00 | 2E | 00 | 13 | 00 | 26 | 00 | 22 | 00 | 24 | 00 | 06 | 00 |
| 0FFF0 | 88 | 00 | AE | 02 | 82 | 00 | 02 | 00 | FC | 00 | 26 | 00 | 2A | 03 | 24 | 00 |
| 10000 | 06 | 00 | BC | 02 | BC | 00 | 38 | 00 | 02 | 03 | 24 | 00 | C8 | 02 | 38 | 00 |
| 10010 | 2A | 03 | 24 | 00 | 06 | 00 | BC | 02 | BC | 00 | 38 | 00 | 02 | 03 | 24 | 00 |
| 10020 | CC | 02 | 38 | 00 | 24 | 2E | BE | 00 | BA | 00 | 82 | 00 | 02 | 00 | FC | 00 |

| | | | | | | | | | | | | | | | | |
|---|---|---|---|---|---|---|---|---|---|---|---|---|---|---|---|---|
| 10030 | 00 | 00 | 0D | 00 | F6 | 04 | 66 | 2E | 24 | 00 | B8 | 02 | 9E | 00 | FC | 00 |
| 10040 | 6A | 2E | 24 | 00 | B8 | 02 | 9E | 00 | FC | 00 | 72 | 2E | 24 | 00 | B8 | 02 |
| 10050 | 9E | 00 | FC | 00 | 7C | 2E | 22 | 00 | 06 | 00 | 40 | 02 | 9E | 00 | FC | 00 |
| 10060 | 24 | 00 | 7C | 2E | F6 | 04 | AC | 00 | 2E | 00 | 19 | 00 | 7C | 2E | 28 | 00 |
| 10070 | 22 | 00 | 86 | 02 | 22 | 00 | 90 | 02 | 9E | 00 | 54 | 00 | 01 | 00 | 51 | 02 |
| 10080 | 1D | 02 | FC | 00 | 72 | 2E | 24 | 00 | 7C | 2E | A0 | 00 | 9E | 00 | 20 | 00 |
| 10090 | 24 | 00 | BC | 02 | 88 | 00 | 24 | 00 | 82 | 2E | 88 | 00 | 60 | 00 | 33 | 00 |
| 100A0 | FC | 00 | 76 | 2E | 18 | 00 | 7C | 2E | 24 | 00 | 72 | 2E | 38 | 00 | 9E | 00 |
| 100B0 | FC | 00 | 24 | 00 | 76 | 2E | 0A | 2E | AC | 00 | 76 | 2E | 86 | 2E | AC | 00 |
| 100C0 | C8 | 00 | 76 | 2E | 8C | 2E | AC | 00 | C8 | 00 | 2E | 00 | 05 | 00 | 02 | 00 |
| 100D0 | FC | 00 | 5E | 00 | FC | 00 | 24 | 00 | 72 | 2E | B8 | 02 | AE | 00 | 58 | 00 |
| 100E0 | 47 | 01 | FC | 00 | 24 | 00 | 7C | 2E | A0 | 00 | CE | 2D | B4 | 00 | 2E | 00 |
| 100F0 | 09 | 00 | 24 | 00 | 92 | 2E | 4C | 00 | FC | 00 | 24 | 00 | 76 | 2E | 8C | 2E |
| 10100 | AC | 00 | 76 | 2E | 86 | 2E | AC | 00 | C8 | 00 | 58 | 00 | 7B | 00 | FC | 00 |
| 10110 | 24 | 00 | 72 | 2E | BC | 02 | AC | 00 | 2E | 00 | 15 | 00 | 7C | 2E | 28 | 00 |
| 10120 | 22 | 00 | 86 | 02 | 86 | 2E | 9E | 00 | 24 | 00 | CE | 2D | 02 | 00 | FC | 00 |
| 10130 | 24 | 00 | 72 | 2E | CE | 2D | B0 | 00 | 2E | 00 | 47 | 00 | 24 | 00 | 28 | 00 |
| 10140 | 7C | 2E | 24 | 00 | 72 | 2E | BC | 02 | BC | 00 | 24 | 00 | BC | 02 | D6 | 00 |
| 10150 | 0A | 2E | AC | 00 | 2E | 00 | 13 | 00 | 7C | 2E | 28 | 00 | 7C | 2E | 24 | 00 |
| 10160 | 72 | 2E | D4 | 00 | 9E | 00 | 2A | 00 | 13 | 00 | 7C | 2E | 28 | 00 | 7C | 2E |
| 10170 | 24 | 00 | 72 | 2E | BC | 02 | BC | 00 | D4 | 00 | 9E | 00 | 2A | 00 | 09 | 00 |
| 10180 | 24 | 00 | 92 | 2E | 4C | 00 | FC | 00 | 5A | 00 | FC | 00 | 24 | 00 | 76 | 2E |
| 10190 | 0A | 2E | AC | 00 | 58 | 00 | 43 | 00 | FC | 00 | 24 | 00 | 28 | 00 | 7C | 2E |
| 101A0 | 24 | 00 | BC | 02 | 24 | 00 | CE | 2D | D6 | 00 | 22 | 00 | 86 | 02 | AC | 00 |
| 101B0 | 2E | 00 | 15 | 00 | 7C | 2E | 28 | 00 | 22 | 00 | 86 | 02 | 22 | 00 | 90 | 02 |
| 101C0 | 9E | 00 | 2A | 00 | 13 | 00 | 7C | 2E | 28 | 00 | 28 | 00 | 7C | 2E | 24 | 00 |
| 101D0 | 72 | 2E | D4 | 00 | 86 | 2E | 9E | 00 | FC | 00 | 5A | 00 | FC | 00 | 24 | 00 |
| 101E0 | 28 | 00 | 7C | 2E | 24 | 00 | CE | 2D | 24 | 00 | BC | 02 | D6 | 00 | 0A | 2E |
| 101F0 | AC | 00 | 2E | 00 | 33 | 00 | 24 | 00 | 28 | 00 | 7C | 2E | CA | 00 | 28 | 00 |
| 10200 | 96 | 2E | CA | 00 | B4 | 00 | 28 | 00 | 7C | 2E | CA | 00 | 28 | 00 | 9C | 2E |
| 10210 | CA | 00 | B0 | 00 | C8 | 00 | 2E | 00 | 0D | 00 | 24 | 00 | 92 | 2E | 4C | 00 |
| 10220 | 2A | 00 | 05 | 00 | 02 | 00 | FC | 00 | 5A | 00 | FC | 00 | 24 | 00 | 28 | 00 |
| 10230 | 7C | 2E | 24 | 00 | BC | 02 | 24 | 00 | BC | 02 | D6 | 00 | 86 | 2E | AC | 00 |
| 10240 | 28 | 00 | 7C | 2E | 24 | 00 | BC | 02 | 24 | 00 | BC | 02 | D6 | 00 | 8C | 2E |
| 10250 | AC | 00 | C8 | 00 | 2E | 00 | 0F | 00 | 7C | 2E | 28 | 00 | 22 | 00 | 86 | 02 |
| 10260 | 7C | 2E | 9E | 00 | FC | 00 | 24 | 00 | 72 | 2E | B8 | 02 | AC | 00 | 2E | 00 |
| 10270 | 11 | 00 | 7C | 2E | 28 | 00 | 22 | 00 | 86 | 02 | 22 | 00 | 90 | 02 | 9E | 00 |
| 10280 | FC | 00 | 58 | 00 | A7 | 00 | FC | 00 | 24 | 00 | 06 | 00 | F6 | 04 | AC | 00 |
| 10290 | 2E | 00 | 0D | 00 | 60 | 2E | A2 | 2E | 9E | 00 | 2A | 00 | 09 | 00 | 60 | 2E |
| 102A0 | 06 | 00 | 9E | 00 | FC | 00 | 6E | 2E | 6A | 2E | 60 | 2E | AA | 06 | FC | 00 |
| 102B0 | 24 | 00 | 60 | 2E | F6 | 04 | AC | 00 | 2E | 00 | 05 | 00 | 02 | 00 | FC | 00 |
| 102C0 | 24 | 00 | 6A | 2E | B8 | 02 | AC | 00 | 2E | 00 | 09 | 00 | 7C | 2E | 94 | 00 |
| 102D0 | 7A | 00 | FC | 00 | 6A | 2E | 24 | 00 | B2 | 2E | 9E | 00 | FC | 00 | 60 | 2E |
| 102E0 | 94 | 00 | FC | 00 | 24 | 00 | 6E | 2E | 1C | 2E | AC | 00 | 2E | 00 | 07 | 00 |
| 102F0 | B6 | 2E | 94 | 00 | FC | 00 | 66 | 2E | 24 | 00 | 66 | 2E | BC | 02 | BA | 00 |
| 10300 | 9E | 00 | FC | 00 | 24 | 00 | 66 | 2E | F6 | 2D | C2 | 00 | B8 | 02 | AC | 00 |
| 10310 | 2E | 00 | 09 | 00 | 7A | 00 | 2A | 00 | 13 | 00 | 24 | 00 | 66 | 2E | F6 | 2D |
| 10320 | C2 | 00 | C0 | 2E | BE | 00 | 8A | 00 | D0 | 00 | FC | 00 | 5C | 00 | FC | 00 |
| 10330 | 24 | 00 | 66 | 2E | F6 | 2D | C2 | 00 | B8 | 02 | AE | 00 | 2E | 00 | 05 | 00 |
| 10340 | 7A | 00 | FC | 00 | 7A | 00 | 24 | 00 | 66 | 2E | 94 | 00 | C4 | 2E | 94 | 00 |
| 10350 | FC | 00 | 24 | 00 | 66 | 2E | BC | 02 | AC | 00 | 2E | 00 | 0D | 00 | CC | 2E |
| 10360 | 94 | 00 | 7A | 00 | 2A | 00 | 09 | 00 | D4 | 2E | 94 | 00 | 7A | 00 | FC | 00 |
| 10370 | 02 | 00 | 24 | 00 | BC | 02 | 24 | 00 | BC | 02 | D6 | 00 | 86 | 2E | AC | 00 |
| 10380 | 00 | 00 | 0C | 00 | 00 | 05 | 0C | 00 | 24 | 00 | 06 | 00 | F6 | 04 | AC | 00 |
| 10390 | 0A | 00 | F6 | 04 | AC | 00 | C8 | 00 | 2E | 00 | 09 | 00 | 24 | 00 | DE | 2E |
| 103A0 | 4C | 00 | FC | 00 | 06 | 00 | 0A | 00 | BE | 06 | FC | 00 | 02 | 00 | 2E | 00 |
| 103B0 | 00 | 00 | 0D | 00 | F6 | 04 | 24 | 00 | 06 | 00 | F6 | 04 | AC | 00 | 2E | 00 |
| 103C0 | 05 | 00 | 02 | 00 | FC | 00 | E2 | 2E | 22 | 00 | 06 | 00 | 40 | 02 | 9E | 00 |
| 103D0 | FC | 00 | 24 | 00 | 28 | 00 | E2 | 2E | 24 | 00 | 18 | 00 | 62 | 00 | E2 | 2E |
| 103E0 | 0A | 2E | C8 | 00 | BC | 02 | BA | 00 | 24 | 00 | BC | 02 | D6 | 00 | F4 | 2E |
| 103F0 | AC | 00 | 28 | 00 | E2 | 2E | 24 | 00 | 18 | 00 | 62 | 00 | E2 | 2E | FA | 2E |
| 10400 | C8 | 00 | BC | 02 | BA | 00 | 24 | 00 | BC | 02 | D6 | 00 | F4 | 2E | AC | 00 |
| 10410 | C6 | 00 | 58 | 00 | 89 | 00 | FC | 00 | 24 | 00 | 00 | 2F | 24 | 00 | 62 | 00 |
| 10420 | 40 | 00 | 94 | 00 | 7A | 00 | 04 | 2F | 94 | 00 | FC | 00 | EE | 2E | BC | 02 |
| 10430 | BE | 00 | FC | 00 | EE | 2E | 94 | 00 | FC | 00 | 24 | 00 | 28 | 00 | EE | 2E |

| | | | | | | | | | | | | | | | | |
|---|---|---|---|---|---|---|---|---|---|---|---|---|---|---|---|---|
| 10440 | CA | 00 | 4C | 2F | AC | 00 | 2E | 00 | 09 | 00 | 24 | 00 | CE | 2D | 02 | 00 |
| 10450 | FC | 00 | E8 | 2E | BC | 02 | BE | 00 | FC | 00 | E8 | 2E | 94 | 00 | FC | 00 |
| 10460 | 24 | 00 | 28 | 00 | E8 | 2E | CA | 00 | 4C | 2F | AE | 00 | 2E | 00 | 17 | 00 |
| 10470 | 24 | 00 | 00 | 2F | 24 | 00 | 62 | 00 | 40 | 00 | 94 | 00 | 54 | 00 | 01 | 00 |
| 10480 | 67 | 00 | A1 | 00 | FC | 00 | 24 | 00 | 28 | 00 | EE | 2E | C0 | 00 | 50 | 2F |
| 10490 | AE | 00 | 2E | 00 | 09 | 00 | 24 | 00 | CE | 2D | 02 | 00 | FC | 00 | 5A | 00 |
| 104A0 | FC | 00 | 24 | 00 | 18 | 00 | 62 | 00 | E2 | 2E | F4 | 2E | C8 | 00 | B8 | 02 |
| 104B0 | AE | 00 | 18 | 00 | 62 | 00 | E2 | 2E | 56 | 2F | C8 | 00 | 58 | 02 | AE | 00 |
| 104C0 | C8 | 00 | 58 | 00 | 11 | 00 | FC | 00 | E2 | 2E | 42 | 07 | FC | 00 | 24 | 00 |
| 104D0 | CE | 2D | 02 | 00 | FC | 00 | 5A | 00 | FC | 00 | E2 | 2E | B6 | 06 | FC | 00 |
| 104E0 | 02 | 00 | FC | 00 | 06 | 00 | 0A | 00 | BE | 06 | FC | 00 | 02 | 00 | 28 | 00 |
| 104F0 | 00 | 00 | 46 | 03 | F8 | 06 | FC | 00 | 28 | 00 | 46 | 03 | 82 | 00 | 02 | 00 |
| 10500 | 00 | 00 | 0E | 05 | 0C | 00 | 24 | 00 | 08 | 00 | F6 | 04 | AC | 00 | 2E | 00 |
| 10510 | 09 | 00 | 24 | 00 | 6C | 2F | 4C | 00 | FC | 00 | 26 | 00 | 28 | 00 | 08 | 00 |
| 10520 | 8E | 00 | B8 | 02 | B4 | 00 | 28 | 00 | 08 | 00 | 8E | 00 | 70 | 2F | B0 | 00 |
| 10530 | C8 | 00 | 84 | 00 | 2E | 00 | 09 | 00 | 24 | 00 | 6C | 2F | 4C | 00 | FC | 00 |
| 10540 | 5C | 2F | 24 | 00 | 18 | 00 | 62 | 00 | 08 | 00 | 0A | 2E | C8 | 00 | 9E | 00 |
| 10550 | FC | 00 | 24 | 00 | 5C | 2F | B8 | 02 | AC | 00 | 2E | 00 | 0F | 00 | 54 | 00 |
| 10560 | 01 | 00 | 73 | 00 | B5 | 00 | 2A | 00 | 0B | 00 | 54 | 00 | 01 | 00 | 9F | 00 |
| 10570 | 05 | 01 | FC | 00 | 60 | 2F | 26 | 00 | 28 | 00 | 08 | 00 | 8E | 00 | 9E | 00 |
| 10580 | FC | 00 | 64 | 2F | 24 | 00 | B8 | 02 | 9E | 00 | FC | 00 | 68 | 2F | 24 | 00 |
| 10590 | B8 | 02 | 9E | 00 | FC | 00 | 54 | 00 | 01 | 00 | 25 | 01 | 55 | 01 | FC | 00 |
| 105A0 | 60 | 2F | 26 | 00 | 28 | 00 | 08 | 00 | 8E | 00 | 9E | 00 | FC | 00 | 64 | 2F |
| 105B0 | 26 | 00 | 28 | 00 | 28 | 00 | 08 | 00 | 24 | 00 | 5C | 2F | BC | 02 | BA | 00 |
| 105C0 | 24 | 00 | CE | 2D | D6 | 00 | 8E | 00 | 9E | 00 | FC | 00 | 24 | 00 | 24 | 00 |
| 105D0 | 5C | 2F | BC | 02 | BA | 00 | 8A | 00 | 08 | 00 | 0A | 2E | C8 | 00 | B8 | 02 |
| 105E0 | AC | 00 | 2E | 00 | 0F | 00 | 68 | 2F | 24 | 00 | B8 | 02 | 9E | 00 | 2A | 00 |
| 105F0 | 2D | 00 | 68 | 2F | 26 | 00 | 28 | 00 | 28 | 00 | 08 | 00 | 24 | 00 | 24 | 00 |
| 10600 | 5C | 2F | BC | 02 | BA | 00 | 8A | 00 | 08 | 00 | 0A | 2E | C8 | 00 | BC | 02 |
| 10610 | BA | 00 | 24 | 00 | CE | 2D | D6 | 00 | 8E | 00 | 9E | 00 | FC | 00 | 46 | 03 |
| 10620 | F6 | 04 | 9E | 00 | FC | 00 | 46 | 03 | 74 | 2F | 6C | 00 | 24 | 00 | 60 | 2F |
| 10630 | 94 | 00 | 0A | 2E | 94 | 00 | 24 | 00 | 64 | 2F | 94 | 00 | 0A | 2E | 94 | 00 |
| 10640 | 24 | 00 | 68 | 2F | 94 | 00 | 1E | 00 | 1E | 00 | FC | 00 | 60 | 2F | 64 | 2F |
| 10650 | 68 | 2F | C8 | 06 | FC | 00 | 02 | 00 | FC | 00 | 26 | 00 | 28 | 00 | 08 | 00 |
| 10660 | 00 | 00 | 4C | 03 | F6 | 04 | 9E | 00 | FC | 00 | 7E | 2F | 82 | 2F | 86 | 2F |
| 10670 | EC | 06 | FC | 00 | 4C | 03 | 74 | 2F | 6C | 00 | 24 | 00 | 82 | 2F | 94 | 00 |
| 10680 | 8A | 2F | 94 | 00 | 24 | 00 | 86 | 2F | 94 | 00 | 8A | 2F | 94 | 00 | 1E | 00 |
| 10690 | 1E | 00 | FC | 00 | 4C | 03 | 90 | 2F | 6C | 00 | 24 | 00 | 7E | 2F | 94 | 00 |
| 106A0 | 1E | 00 | 1E | 00 | FC | 00 | 28 | 00 | 4C | 03 | 82 | 00 | 02 | 00 | 9F | 00 |
| 106B0 | 00 | 00 | 1A | 05 | 0C | 00 | 24 | 00 | 08 | 00 | F6 | 04 | AC | 00 | 2E | 00 |
| 106C0 | 09 | 00 | 24 | 00 | 6C | 2F | 4C | 00 | FC | 00 | 26 | 00 | 28 | 00 | 08 | 00 |
| 106D0 | 8E | 00 | B8 | 02 | B4 | 00 | 28 | 00 | 08 | 00 | 8E | 00 | B0 | 2F | B0 | 00 |
| 106E0 | C8 | 00 | 84 | 00 | 2E | 00 | 09 | 00 | 24 | 00 | 6C | 2F | 4C | 00 | FC | 00 |
| 106F0 | 9A | 2F | 24 | 00 | 18 | 00 | 62 | 00 | 08 | 00 | 8C | 2E | C8 | 00 | 9E | 00 |
| 10700 | FC | 00 | 24 | 00 | 9A | 2F | B8 | 02 | AE | 00 | 2E | 00 | 0D | 00 | AA | 2F |
| 10710 | 8C | 2E | 9E | 00 | 2A | 00 | 09 | 00 | AA | 2F | 8A | 2F | 9E | 00 | FC | 00 |
| 10720 | 9E | 2F | 26 | 00 | 28 | 00 | 08 | 00 | 8E | 00 | 9E | 00 | FC | 00 | A2 | 2F |
| 10730 | 26 | 00 | 28 | 00 | 28 | 00 | 08 | 00 | 24 | 00 | 18 | 00 | 62 | 00 | 08 | 00 |
| 10740 | AA | 2F | C8 | 00 | BC | 02 | BA | 00 | 24 | 00 | CE | 2D | D6 | 00 | 8E | 00 |
| 10750 | 9E | 00 | FC | 00 | A6 | 2F | 26 | 00 | 28 | 00 | 28 | 00 | 08 | 00 | 24 | 00 |
| 10760 | 24 | 00 | 18 | 00 | 62 | 00 | 08 | 00 | AA | 2F | C8 | 00 | BC | 02 | BA | 00 |
| 10770 | 8A | 00 | 08 | 00 | AA | 2F | C8 | 00 | BC | 02 | BA | 00 | 24 | 00 | F6 | 2D |
| 10780 | D6 | 00 | 8E | 00 | 9E | 00 | FC | 00 | 24 | 00 | A6 | 2F | B4 | 2F | B4 | 00 |
| 10790 | 2E | 00 | 0F | 00 | A6 | 2F | 24 | 00 | B8 | 2F | A6 | 2F | BA | 00 | 9E | 00 |
| 107A0 | FC | 00 | 24 | 00 | A6 | 2F | B8 | 2F | B4 | 00 | 2E | 00 | 09 | 00 | 24 | 00 |
| 107B0 | 6C | 2F | 4C | 00 | FC | 00 | 24 | 00 | A2 | 2F | BC | 2F | B0 | 00 | A2 | 2F |
| 107C0 | BC | 02 | B4 | 00 | C8 | 00 | 2E | 00 | 09 | 00 | 24 | 00 | 6C | 2F | 4C | 00 |
| 107D0 | FC | 00 | 24 | 00 | A2 | 2F | BC | 2F | AC | 00 | 2E | 00 | 2D | 00 | 24 | 00 |
| 107E0 | 9E | 2F | C0 | 02 | AC | 00 | 9E | 2F | F6 | 2D | AC | 00 | C8 | 00 | 9E | 2F |
| 107F0 | C0 | 2F | AC | 00 | C8 | 00 | 9E | 2F | C4 | 2F | AC | 00 | C8 | 00 | 2E | 00 |
| 10800 | 09 | 00 | 24 | 00 | 6C | 2F | 4C | 00 | FC | 00 | 4C | 03 | F6 | 04 | 9E | 00 |
| 10810 | FC | 00 | 4C | 03 | 74 | 2F | 6C | 00 | 24 | 00 | 9E | 2F | 94 | 00 | 8A | 2F |
| 10820 | 94 | 00 | 24 | 00 | A2 | 2F | 94 | 00 | 8A | 2F | 94 | 00 | 1E | 00 | 1E | 00 |
| 10830 | FC | 00 | 4C | 03 | 90 | 2F | 6C | 00 | 24 | 00 | A6 | 2F | 94 | 00 | 1E | 00 |
| 10840 | 1E | 00 | FC | 00 | A6 | 2F | 9E | 2F | A2 | 2F | E0 | 06 | FC | 00 | 02 | 00 |

| | | | | | | | | | | | | | | | | |
|---|---|---|---|---|---|---|---|---|---|---|---|---|---|---|---|---|
| 10850 | 00 | 00 | 04 | 00 | C8 | 2F | 24 | 00 | 06 | 00 | 9E | 00 | FC | 00 | C8 | 2F |
| 10860 | 0A | 07 | FC | 00 | 24 | 00 | C8 | 2F | 82 | 00 | 02 | 00 | FC | 00 | A2 | 2F |
| 10870 | 00 | 00 | F4 | 00 | 01 | 00 | F2 | 00 | 07 | 00 | 64 | 01 | FC | 00 | 02 | 00 |
| 10880 | 00 | 00 | 26 | 05 | 04 | 00 | 32 | 05 | 3E | 05 | 24 | 00 | 08 | 00 | BC | 02 |
| 10890 | AE | 00 | 08 | 00 | CE | 2D | AE | 00 | C6 | 00 | 2E | 00 | 09 | 00 | 24 | 00 |
| 108A0 | CC | 2F | 4C | 00 | FC | 00 | 24 | 00 | 38 | 05 | BC | 02 | BC | 00 | 88 | 00 |
| 108B0 | 08 | 00 | 00 | 07 | FC | 00 | 02 | 00 | BC | 02 | BA | 00 | 24 | 00 | F6 | 2D |
| 108C0 | 00 | 00 | 0C | 00 | 06 | 00 | 22 | 07 | FC | 00 | 02 | 00 | B4 | 2F | B4 | 00 |
| 108D0 | 00 | 00 | 0C | 00 | 06 | 00 | 2A | 07 | FC | 00 | 02 | 00 | BA | 00 | 9E | 00 |
| 108E0 | 00 | 00 | 0C | 00 | 06 | 00 | 32 | 07 | FC | 00 | 02 | 00 | 09 | 00 | 24 | 00 |
| 108F0 | 00 | 00 | 28 | 00 | 22 | 00 | 90 | 02 | 82 | 00 | 02 | 00 | B0 | 00 | A2 | 2F |
| 10900 | 00 | 00 | 28 | 00 | 22 | 00 | 86 | 02 | 82 | 00 | 02 | 00 | 6C | 2F | 4C | 00 |
| 10910 | 00 | 00 | 0C | 00 | 24 | 00 | 28 | 00 | 28 | 00 | 06 | 00 | C0 | 00 | CA | 00 |
| 10920 | 28 | 00 | 96 | 2E | CA | 00 | B4 | 00 | 28 | 00 | 28 | 00 | 06 | 00 | C0 | 00 |
| 10930 | CA | 00 | 28 | 00 | 9C | 2E | CA | 00 | B0 | 00 | C8 | 00 | 2E | 00 | 09 | 00 |
| 10940 | 24 | 00 | D0 | 2F | 4C | 00 | FC | 00 | 24 | 00 | 28 | 00 | 28 | 00 | 06 | 00 |
| 10950 | C0 | 00 | CA | 00 | D4 | 2F | BC | 00 | 88 | 00 | 3A | 07 | FC | 00 | 02 | 00 |
| 10960 | 00 | 00 | 0C | 00 | 06 | 00 | 22 | 07 | FC | 00 | 02 | 00 | 1E | 00 | 1E | 00 |
| 10970 | 00 | 00 | 02 | 00 | 90 | 2F | 6C | 00 | 24 | 00 | A6 | 2F | 94 | 00 | 1E | 00 |
| 10980 | 00 | 00 | 04 | 00 | 24 | 00 | 06 | 00 | B8 | 02 | B4 | 00 | 2E | 00 | 09 | 00 |
| 10990 | 24 | 00 | 20 | 2E | 4C | 00 | FC | 00 | D8 | 2F | 06 | 00 | 4A | 07 | FC | 00 |
| 109A0 | 26 | 00 | D8 | 2F | 82 | 00 | 02 | 00 | 82 | 00 | 02 | 00 | 24 | 00 | 24 | 00 |
| 109B0 | 00 | 00 | 0C | 00 | DC | 2F | F6 | 04 | 9E | 00 | FC | 00 | E2 | 2F | 28 | 00 |
| 109C0 | 06 | 00 | C0 | 00 | 9E | 00 | FC | 00 | E8 | 2F | 24 | 00 | BC | 02 | 9E | 00 |
| 109D0 | 20 | 00 | 24 | 00 | E2 | 2F | A0 | 00 | 88 | 00 | 62 | 00 | 60 | 00 | 3D | 00 |
| 109E0 | FC | 00 | 24 | 00 | 28 | 00 | E2 | 2F | 24 | 00 | E8 | 2F | 24 | 00 | BC | 02 |
| 109F0 | D6 | 00 | EC | 2F | AC | 00 | 2E | 00 | 0B | 00 | 54 | 00 | 01 | 00 | 6B | 00 |
| 10A00 | 65 | 00 | FC | 00 | DC | 2F | 28 | 00 | DC | 2F | 28 | 00 | E2 | 2F | 24 | 00 |
| 10A10 | E8 | 2F | 24 | 00 | BC | 02 | D6 | 00 | 9E | 00 | FC | 00 | 5E | 00 | FC | 00 |
| 10A20 | 28 | 00 | DC | 2F | 82 | 00 | 02 | 00 | FC | 00 | 02 | 00 | 82 | 2F | 94 | 00 |
| 10A30 | 00 | 00 | 0C | 00 | F2 | 2F | 24 | 00 | 18 | 00 | 62 | 00 | 06 | 00 | FA | 2E |
| 10A40 | C3 | 00 | 9E | 00 | FC | 00 | 24 | 00 | F2 | 2F | B8 | 02 | AC | 00 | 2E | 00 |
| 10A50 | 0F | 00 | F6 | 2F | 24 | 00 | C0 | 02 | 9E | 00 | 2A | 00 | 0B | 00 | F6 | 2F |
| 10A60 | 24 | 00 | F2 | 2F | 9E | 00 | FC | 00 | 24 | 00 | F6 | 2F | BC | 02 | BC | 00 |
| 10A70 | 06 | 00 | A0 | 00 | B0 | 00 | 2E | 00 | 11 | 00 | F6 | 2F | 24 | 00 | 06 | 00 |
| 10A80 | A0 | 00 | BC | 02 | BA | 00 | 9E | 00 | FC | 00 | FA | 2F | 28 | 00 | 06 | 00 |
| 10A90 | 24 | 00 | F6 | 2F | BC | 02 | BC | 00 | D4 | 00 | 9E | 00 | FC | 00 | 24 | 00 |
| 10AA0 | FA | 2F | A0 | 00 | 00 | 30 | B4 | 00 | 58 | 00 | 19 | 00 | FC | 00 | FA | 2F |
| 10AB0 | 28 | 00 | FA | 2F | EC | 2F | 9E | 00 | FC | 00 | 24 | 00 | FA | 2F | A0 | 00 |
| 10AC0 | 00 | 30 | B4 | 00 | 5C | 00 | FC | 00 | 24 | 00 | F2 | 2F | B8 | 02 | AC | 00 |
| 10AD0 | 2E | 00 | 0B | 00 | 54 | 00 | 01 | 00 | C9 | 00 | 05 | 01 | FC | 00 | FA | 2F |
| 10AE0 | 28 | 00 | FA | 2F | 28 | 00 | 06 | 00 | 24 | 00 | F2 | 2F | BC | 02 | BA | 00 |
| 10AF0 | 24 | 00 | E4 | 2D | D6 | 00 | 9E | 00 | FC | 00 | 24 | 00 | FA | 2F | A0 | 00 |
| 10B00 | C4 | 2F | B4 | 00 | 58 | 00 | 19 | 00 | FC | 00 | FA | 2F | 28 | 00 | FA | 2F |
| 10B10 | EC | 2F | 9E | 00 | FC | 00 | 24 | 00 | FA | 2F | A0 | 00 | C4 | 2F | B4 | 00 |
| 10B20 | 5C | 00 | FC | 00 | 28 | 00 | FA | 2F | 82 | 00 | 02 | 00 | 24 | 00 | BC | 02 |
| 10B30 | 00 | 00 | 0C | 00 | 04 | 00 | 04 | 00 | 2A | 03 | 24 | 00 | 08 | 00 | 38 | 00 |
| 10B40 | FA | 02 | 06 | 00 | 9E | 00 | FC | 00 | 24 | 00 | 0A | 00 | E4 | 2D | AC | 00 |
| 10B50 | 2E | 00 | 05 | 00 | 02 | 00 | FC | 00 | 2A | 03 | 24 | 00 | 08 | 00 | 38 | 00 |
| 10B60 | 02 | 03 | 24 | 00 | F6 | 2D | 38 | 00 | 24 | 00 | 18 | 00 | 2A | 03 | 24 | 00 |
| 10B70 | 08 | 00 | 38 | 00 | 0A | 03 | 24 | 00 | B8 | 02 | 1A | 00 | 38 | 00 | A8 | 00 |
| 10B80 | 9E | 00 | FC | 00 | 2A | 03 | 24 | 00 | 08 | 00 | 38 | 00 | 02 | 03 | 24 | 00 |
| 10B90 | 06 | 2E | 38 | 00 | 24 | 00 | 18 | 00 | 2A | 03 | 24 | 00 | 08 | 00 | 38 | 00 |
| 10BA0 | 0A | 03 | 24 | 00 | B8 | 02 | 1A | 00 | 38 | 00 | A8 | 00 | 9E | 00 | FC | 00 |
| 10BB0 | 2A | 03 | 24 | 00 | 08 | 00 | 38 | 00 | 02 | 03 | 24 | 00 | C0 | 2F | 38 | 00 |
| 10BC0 | 24 | 00 | B6 | 02 | 9E | 00 | FC | 00 | 02 | 00 | FA | 2F | 28 | 00 | 06 | 00 |
| 10BD0 | 00 | 00 | 0C | 00 | 04 | 00 | 04 | 30 | 24 | 00 | 08 | 00 | BC | 02 | BC | 00 |
| 10BE0 | 9E | 00 | FC | 00 | 58 | 00 | 37 | 00 | FC | 00 | 04 | 30 | 24 | 00 | 04 | 30 |
| 10BF0 | BC | 02 | BA | 00 | 9E | 00 | FC | 00 | 24 | 00 | 04 | 30 | 06 | 00 | A0 | 00 |
| 10C00 | B0 | 00 | 2E | 00 | 05 | 00 | 02 | 00 | FC | 00 | 24 | 00 | 28 | 00 | 06 | 00 |
| 10C10 | 24 | 00 | 04 | 30 | 24 | 00 | BC | 02 | D6 | 00 | 08 | 30 | AE | 00 | 5C | 00 |
| 10C20 | FC | 00 | 24 | 00 | 04 | 30 | 82 | 00 | 02 | 00 | F2 | 2F | BC | 02 | BA | 00 |
| 10C30 | 0F | 06 | 0C | 00 | 04 | 00 | 04 | 00 | 40 | 03 | 9C | 00 | FC | 00 | 0E | 30 |
| 10C40 | 06 | 00 | 9E | 00 | FC | 00 | 24 | 00 | 28 | 00 | 0E | 30 | 24 | 00 | F6 | 2D |
| 10C50 | 24 | 00 | BC | 02 | D6 | 00 | 3A | 30 | CE | 00 | B8 | 02 | AC | 00 | 2E | 00 |

```
10C60   0D 00 24 00 CC 2F 4C 00 2A 00 1F 00 2E 30 26 00
10C70   28 00 28 00 0E 30 24 00 F6 2D 24 00 BC 02 D6 00
10C80   8E 00 BC 02 BC 00 9E 00 FC 00 24 00 2E 30 B8 02
10C90   AE 00 2E 30 BC 02 AE 00 C6 00 2E 00 09 00 24 00
10CA0   CC 2F 4C 00 FC 00 24 00 24 00 40 30 24 00 2E 30
10CB0   CE 2D 8E 00 36 00 B8 02 AC 00 2E 00 09 00 24 00
10CC0   CC 2F 4C 00 FC 00 24 00 28 00 0E 30 24 00 06 2E
10CD0   24 00 BC 02 D6 00 0A 2E AE 00 2E 00 09 00 24 00
10CE0   44 30 4C 00 FC 00 26 30 24 00 C0 2F 9E 00 FC 00
10CF0   1A 30 24 00 B8 02 9E 00 20 00 24 00 E4 2D 88 00
10D00   62 00 60 00 11 01 FC 00 36 30 9C 00 FC 00 24 00
10D10   26 30 0E 30 A0 00 B0 00 2E 00 05 00 02 00 FC 00
10D20   22 30 24 00 22 00 0E 30 24 00 26 30 88 00 5E 02
10D30   9E 00 FC 00 24 00 22 30 26 30 AC 00 2E 00 15 00
10D40   40 03 24 00 1A 30 38 00 24 00 B8 02 9E 00 2A 00
10D50   59 00 24 00 28 00 0E 30 24 00 26 30 24 00 BC 02
10D60   D6 00 3A 30 CE 00 2E 00 23 00 36 30 26 00 28 00
10D70   28 00 0E 30 24 00 26 30 24 00 22 30 26 30 BC 00
10D80   D6 00 8E 00 9E 00 2A 00 21 00 40 03 24 00 1A 30
10D90   38 00 24 00 28 00 28 00 0E 30 24 00 26 30 24 00
10DA0   BC 02 D6 00 CA 00 9E 00 FC 00 26 00 36 30 B8 02
10DB0   AE 00 84 00 58 00 4D 00 FC 00 26 00 36 30 48 30
10DC0   B0 00 84 00 2E 00 09 00 24 00 50 30 4C 00 FC 00
10DD0   26 00 36 30 2C 2E B0 00 84 00 2E 00 19 00 40 03
10DE0   24 00 1A 30 38 00 26 00 36 30 24 2E BC 00 9E 00
10DF0   2A 00 11 00 40 03 24 00 1A 30 38 00 26 00 36 30
10E00   9E 00 FC 00 5A 00 FC 00 26 30 24 00 22 30 BC 02
10E10   BA 00 9E 00 FC 00 5E 00 FC 00 1A 30 24 00 F6 2D
10E20   9E 00 20 00 24 00 CC 02 88 00 24 00 CE 2D 88 00
10E30   60 00 11 01 FC 00 1E 30 24 00 B8 02 9E 00 32 30
10E40   24 00 B8 02 9E 00 FC 00 14 30 98 00 9E 00 FC 00
10E50   2A 30 24 00 98 00 9E 00 FC 00 1E 30 24 00 18 00
10E60   62 00 0E 30 14 30 C8 00 9E 00 FC 00 40 03 24 00
10E70   1A 30 38 00 24 00 1E 30 9E 00 FC 00 24 00 1E 30
10E80   CE 2D BA 00 0E 30 A0 00 B6 00 1E 30 B8 02 AE 00
10E90   C6 00 58 00 AB 00 FC 00 32 30 24 00 28 00 0E 30
10EA0   24 00 1E 30 CE 2D BA 00 24 00 BC 02 D6 00 3A 30
10EB0   CE 00 9E 00 FC 00 24 00 2A 30 BC 02 AC 00 32 30
10EC0   B8 02 AE 00 C6 00 58 00 73 00 FC 00 36 30 26 00
10ED0   28 00 28 00 0E 30 24 00 1E 30 CE 2D BA 00 24 00
10EE0   06 2E D6 00 8E 00 9E 00 FC 00 26 00 36 30 48 30
10EF0   B0 00 84 00 2E 00 09 00 24 00 50 30 4C 00 FC 00
10F00   26 00 36 30 2C 2E B0 00 84 00 2E 00 1D 00 40 03
10F10   24 00 1A 30 BC 02 BA 00 38 00 26 00 36 30 24 2E
10F20   BC 00 9E 00 2A 00 15 00 40 03 24 00 1A 30 BC 02
10F30   BA 00 38 00 26 00 36 30 9E 00 FC 00 5A 00 FC 00
10F40   5A 00 FC 00 5E 00 FC 00 36 30 24 00 B8 02 9E 00
10F50   FC 00 24 00 40 03 24 00 C0 2F 38 00 B8 02 AC 00
10F60   2E 00 27 00 40 03 24 00 00 2F 38 00 24 00 54 30
10F70   9E 00 40 03 24 00 C0 2F 38 00 24 00 C0 2F 9E 00
10F80   36 30 24 00 BC 02 9E 00 FC 00 24 00 40 03 24 00
10F90   00 30 38 00 B8 02 AC 00 2E 00 1F 00 40 03 24 00
10FA0   C0 02 38 00 24 00 54 30 9E 00 40 03 24 00 00 30
10FB0   38 00 24 00 00 30 9E 00 FC 00 26 00 40 03 24 00
10FC0   F6 2D 38 00 B8 02 AE 00 36 30 BC 02 AC 00 C6 00
10FD0   84 00 2E 00 1F 00 40 03 24 00 00 2F 38 00 24 00
10FE0   B8 02 9E 00 40 03 24 00 C0 2F 38 00 24 00 B8 02
10FF0   9E 00 FC 00 24 00 40 03 24 00 C0 02 38 00 B8 02
11000   AC 00 2E 00 11 00 40 03 24 00 00 30 38 00 24 00
11010   B8 02 9E 00 FC 00 24 00 40 03 24 00 00 2F 38 00
11020   B8 02 AC 00 2E 00 11 00 40 03 24 00 C0 2F 38 00
11030   24 00 B8 02 9E 00 FC 00 24 00 40 03 24 00 C4 2F
11040   38 00 B8 02 AC 00 2E 00 11 00 40 03 24 00 C4 02
11050   38 00 24 00 B8 02 9E 00 FC 00 24 00 40 03 24 00
11060   B6 02 38 00 B8 02 AC 00 2E 00 11 00 40 03 24 00
```

```
11070   B8 02 38 00 24 00 58 30 9E 00 FC 00 1A 30 24 00
11080   B8 02 9E 00 20 00 24 00 C0 02 88 00 62 00 60 00
11090   23 00 FC 00 22 30 24 00 98 00 9E 00 FC 00 24 00
110A0   40 03 24 00 B8 02 38 00 22 30 AC 00 2E 00 05 00
110B0   02 00 FC 00 5E 00 FC 00 24 00 1A 30 C0 02 B0 00
110C0   2E 00 09 00 24 00 50 30 4C 00 FC 00 40 03 24 00
110D0   B8 02 38 00 24 00 1A 30 9E 00 FC 00 24 00 40 03
110E0   24 00 CE 2D 38 00 B8 02 AC 00 2E 00 11 00 40 03
110F0   24 00 CE 2D 38 00 24 00 00 2F 9E 00 FC 00 24 00
11100   40 03 24 00 CE 2D 38 00 06 2E B4 00 40 03 24 00
11110   CE 2D 38 00 00 30 B0 00 C8 00 2E 00 09 00 24 00
11120   50 30 4C 00 FC 00 24 00 40 03 24 00 B8 02 38 00
11130   B8 02 AC 00 40 03 24 00 B8 02 38 00 BC 02 AC 00
11140   C8 00 2E 00 23 00 24 00 40 03 24 00 E4 2D 38 00
11150   B8 02 AC 00 2E 00 11 00 40 03 24 00 E4 2D 38 00
11160   24 00 CE 2D 9E 00 FC 00 24 00 40 03 24 00 E4 2D
11170   38 00 B8 02 AC 00 2E 00 11 00 40 03 24 00 E4 2D
11180   38 00 24 00 BC 02 9E 00 FC 00 40 03 24 00 E4 2D
11190   38 00 24 00 40 03 24 00 E4 2D 38 00 BC 02 BC 00
111A0   9E 00 FC 00 24 00 40 03 24 00 E4 2D 38 00 B8 02
111B0   B4 00 40 03 24 00 E4 2D 38 00 BC 02 B0 00 C8 00
111C0   2E 00 09 00 24 00 50 30 4C 00 FC 00 24 00 40 03
111D0   24 00 BC 02 38 00 28 00 5C 30 CA 00 AE 00 40 03
111E0   24 00 BC 02 38 00 28 00 D8 2D CA 00 AE 00 C6 00
111F0   40 03 24 00 BC 02 38 00 28 00 62 30 CA 00 AE 00
11200   C6 00 40 03 24 00 BC 02 38 00 28 00 68 30 CA 00
11210   AE 00 C6 00 40 03 24 00 BC 02 38 00 28 00 6E 30
11220   CA 00 AE 00 C6 00 2E 00 09 00 24 00 50 30 4C 00
11230   FC 00 08 00 2E 30 40 03 9E 06 FC 00 44 00 27 00
11240   74 30 B8 02 7A 30 BC 02 80 30 BC 02 86 30 BC 02
11250   8C 30 B8 02 92 30 B8 02 98 30 B8 02 9E 30 B8 02
11260   00 00 39 06 FC 00 44 00 1B 00 A4 30 A8 30 AC 30
11270   58 30 B0 30 B4 30 B8 30 BC 30 C0 30 C4 30 00 00
11280   00 00 FC 00 02 00 24 00 40 03 24 00 E4 2D 38 00
11290   00 00 0C 00 04 00 04 00 08 00 26 00 0C 00 48 30
112A0   B0 00 84 00 2E 00 09 00 24 00 DA 30 4C 00 FC 00
112B0   C8 30 22 00 06 00 40 02 9E 00 FC 00 24 00 22 00
112C0   C8 30 9A 02 B8 02 AC 00 58 00 05 02 FC 00 D6 30
112D0   24 00 C8 30 A0 00 9E 00 20 00 24 00 BC 02 88 00
112E0   24 00 82 2E 88 00 60 00 33 00 FC 00 24 00 28 00
112F0   C8 30 24 00 D6 30 24 00 BC 02 D6 00 86 2E AC 00
11300   28 00 C8 30 24 00 D6 30 24 00 BC 02 D6 00 8C 2E
11310   AC 00 C8 00 2E 00 05 00 02 00 FC 00 5E 00 FC 00
11320   24 00 D6 30 B8 02 AC 00 58 00 F1 00 FC 00 24 00
11330   28 00 C8 30 24 00 CE 2D 24 00 BC 02 D6 00 0A 2E
11340   AC 00 58 00 9D 00 FC 00 24 00 28 00 28 00 C8 30
11350   24 00 BC 02 24 00 BC 02 D6 00 CA 00 28 00 96 2E
11360   CA 00 B4 00 28 00 28 00 C8 30 24 00 BC 02 24 00
11370   BC 02 D6 00 CA 00 28 00 9C 2E CA 00 B0 00 C8 00
11380   2E 00 09 00 24 00 92 2E 4C 00 FC 00 24 00 28 00
11390   C8 30 24 00 E4 2D 24 00 BC 02 D6 00 86 2E AE 00
113A0   28 00 C8 30 24 00 E4 2D 24 00 BC 02 D6 00 8C 2E
113B0   AE 00 C6 00 2E 00 2B 00 C8 30 28 00 28 00 C8 30
113C0   24 00 CE 2D D4 00 86 2E 28 00 C8 30 24 00 C8 30
113D0   A0 00 CE 2D BC 00 D8 00 9E 00 24 00 CE 2D 02 00
113E0   FC 00 5A 00 FC 00 24 00 22 00 90 02 86 2E AC 00
113F0   2E 00 17 00 C8 30 28 00 22 00 86 02 22 00 90 02
11400   C8 30 9E 00 2A 00 15 00 C8 30 28 00 22 00 86 02
11410   22 00 90 02 86 2E C8 30 9E 00 FC 00 5A 00 FC 00
11420   24 00 D6 30 B8 02 AE 00 58 00 A1 00 FC 00 24 00
11430   28 00 C8 30 24 00 BC 02 24 00 BC 02 D6 00 86 2E
11440   AC 00 28 00 C8 30 24 00 BC 02 24 00 BC 02 D6 00
11450   8C 2E AC 00 C8 00 2E 00 11 00 C8 30 28 00 22 00
11460   86 02 C8 30 9E 00 02 00 FC 00 24 00 28 00 C8 30
11470   24 00 CE 2D 24 00 BC 02 D6 00 0A 2E AC 00 2E 00
```

```
11480   4B 00 24 00 28 00 28 00 C8 30 24 00 BC 02 24 00
11490   BC 02 D6 00 CA 00 28 00 96 2E CA 00 B2 00 28 00
114A0   28 00 C8 30 24 00 BC 02 24 00 BC 02 D6 00 CA 00
114B0   28 00 9C 2E CA 00 B6 00 C6 00 2E 00 09 00 02 00
114C0   2A 00 09 00 24 00 92 2E 4C 00 FC 00 5A 00 FC 00
114D0   5A 00 FC 00 24 00 2A 03 24 00 08 00 38 00 02 03
114E0   24 00 B8 02 38 00 BC 02 C6 00 2E 00 09 00 24 00
114F0   DE 30 4C 00 FC 00 CE 30 24 00 B8 02 9E 00 20 00
11500   24 00 E2 30 88 00 62 00 60 00 81 00 FC 00 24 00
11510   C8 30 2A 03 24 00 CE 30 38 00 FA 02 AE 00 2E 00
11520   0B 00 54 00 01 00 FB 02 81 02 FC 00 24 00 2A 03
11530   24 00 CE 30 38 00 02 03 24 00 B8 02 38 00 B8 02
11540   AC 00 2E 00 19 00 2A 03 24 00 CE 30 38 00 FA 02
11550   F6 04 9E 00 54 00 01 00 FB 02 81 02 FC 00 24 00
11560   2A 03 24 00 CE 30 38 00 02 03 24 00 B8 02 38 00
11570   E6 30 C6 00 B8 02 AC 00 2E 00 0F 00 CE 30 24 00
11580   E2 30 9E 00 2A 00 05 00 02 00 FC 00 5E 00 FC 00
11590   24 00 CE 30 1C 2E B4 00 2E 00 09 00 24 00 EA 30
115A0   4C 00 FC 00 C8 30 24 00 08 00 88 00 24 00 0A 00
115B0   28 00 54 02 FC 00 26 00 0C 00 2C 2E B0 00 84 00
115C0   2E 00 13 00 D2 30 26 00 0C 00 24 2E BC 00 9E 00
115D0   2A 00 0B 00 D2 30 26 00 0C 00 9E 00 FC 00 24 00
115E0   08 00 BC 02 BA 00 88 00 D2 30 2A 03 24 00 08 00
115F0   38 00 FA 02 0A 00 6C 06 FC 00 2A 03 24 00 08 00
11600   38 00 02 03 24 00 B8 02 38 00 24 00 2A 03 24 00
11610   08 00 38 00 02 03 24 00 B8 02 38 00 CE 2D 0A 00
11620   BC 02 BA 00 E2 00 BC 02 BA 00 C8 00 9E 00 FC 00
11630   02 00 FC 00 02 00 CE 30 24 00 B8 02 9E 00 20 00
11640   00 00 04 00 24 00 2A 03 24 00 06 00 BC 02 BC 00
11650   38 00 02 03 24 00 B8 02 38 00 EE 30 C6 00 2E 00
11660   0B 00 54 00 01 00 65 00 8D 00 FC 00 24 00 2A 03
11670   24 00 06 00 BC 02 BC 00 38 00 02 03 24 00 B0 2F
11680   38 00 B2 2E C6 00 2E 00 0B 00 54 00 01 00 65 00
11690   8D 00 FC 00 06 00 24 00 F2 30 24 00 62 00 40 00
116A0   94 00 1E 00 FC 00 06 00 06 00 2A 03 24 00 06 00
116B0   BC 02 BC 00 38 00 FA 02 F6 2D 6C 06 FC 00 2A 03
116C0   24 00 06 00 BC 02 BC 00 38 00 02 03 24 00 B8 02
116D0   38 00 24 00 B8 02 9E 00 FC 00 2A 03 24 00 06 00
116E0   BC 02 BC 00 38 00 FA 02 F6 04 9E 00 FC 00 2A 03
116F0   24 00 06 00 BC 02 BC 00 38 00 02 03 24 00 F6 2D
11700   38 00 24 00 B8 02 9E 00 FC 00 2A 03 24 00 06 00
11710   BC 02 BC 00 38 00 02 03 24 00 06 2E 38 00 24 00
11720   B8 02 9E 00 FC 00 02 00 D2 30 2A 03 24 00 08 00
11730   00 00 F6 30 12 07 FC 00 28 00 28 00 F6 30 C0 00
11740   82 00 02 00 24 00 B8 02 38 00 24 00 2A 03 24 00
11750   00 00 FC 30 1A 07 FC 00 28 00 28 00 FC 30 C0 00
11760   82 00 02 00 E2 00 BC 02 BA 00 C8 00 9E 00 FC 00
11770   07 00 0C 00 44 00 17 00 0C 31 14 31 1C 31 24 31
11780   2C 31 34 31 3C 31 44 31 00 00 00 00 FC 00 42 00
11790   00 00 FC 00 24 00 06 00 A0 00 06 2E B0 00 2E 00
117A0   09 00 24 00 B8 02 82 00 02 31 24 00 BC 02 9E 00
117B0   20 00 24 00 00 30 88 00 62 00 60 00 4D 00 FC 00
117C0   06 31 98 00 9E 00 FC 00 24 00 06 31 06 00 AC 00
117D0   2E 00 05 00 02 00 FC 00 24 00 28 00 06 00 24 00
117E0   BC 02 D8 00 0A 2E AC 00 2E 00 1F 00 24 00 06 31
117F0   28 00 06 00 24 00 06 00 A0 00 BC 02 BC 00 D4 00
11800   AC 00 2E 00 05 00 02 00 FC 00 5E 00 FC 00 24 00
11810   02 31 C0 02 AC 00 2E 00 0D 00 24 00 B8 02 82 00
11820   2A 00 09 00 24 00 BC 02 82 00 02 00 FC 00 2A 03
11830   00 00 4C 31 24 00 B8 02 9E 00 20 00 24 00 E2 30
11840   88 00 62 00 60 00 BB 00 FC 00 2A 03 24 00 4C 31
11850   38 00 02 03 24 00 BC 02 38 00 24 00 54 2E 9E 00
11860   FC 00 2A 03 24 00 4C 31 38 00 02 03 24 00 B8 02
11870   38 00 24 00 B8 02 9E 00 FC 00 2A 03 24 00 4C 31
11880   38 00 02 03 24 00 F6 2D 38 00 24 00 B8 02 9E 00
```

| | | | | | | | | | | | | | | | | |
|---|---|---|---|---|---|---|---|---|---|---|---|---|---|---|---|---|
| 11890 | FC | 00 | 2A | 03 | 24 | 00 | 4C | 31 | 38 | 00 | 02 | 03 | 24 | 00 | 06 | 2E |
| 118A0 | 38 | 00 | 24 | 00 | B8 | 02 | 9E | 00 | FC | 00 | 2A | 03 | 24 | 00 | 4C | 31 |
| 118B0 | 38 | 00 | 02 | 03 | 24 | 00 | C0 | 2F | 38 | 00 | 24 | 00 | B8 | 02 | 9E | 00 |
| 118C0 | FC | 00 | 2A | 03 | 24 | 00 | 4C | 31 | 38 | 00 | 02 | 03 | 24 | 00 | C4 | 2F |
| 118D0 | 38 | 00 | 24 | 00 | B8 | 02 | 9E | 00 | FC | 00 | 2A | 03 | 24 | 00 | 4C | 31 |
| 118E0 | 38 | 00 | 02 | 03 | 24 | 00 | B0 | 2F | 38 | 00 | 24 | 00 | B8 | 02 | 9E | 00 |
| 118F0 | FC | 00 | 2A | 03 | 24 | 00 | 4C | 31 | 38 | 00 | FA | 02 | F6 | 04 | 9E | 00 |
| 11900 | FC | 00 | 5E | 00 | FC | 00 | 02 | 00 | 24 | 00 | 06 | 31 | 06 | 00 | AC | 00 |
| 11910 | 00 | 00 | 04 | 00 | 26 | 00 | 24 | 00 | 2A | 03 | 24 | 00 | 06 | 00 | BC | 02 |
| 11920 | BC | 00 | 38 | 00 | 02 | 03 | 24 | 00 | C4 | 02 | 38 | 00 | 24 | 00 | 24 | 00 |
| 11930 | 2A | 03 | 24 | 00 | 06 | 00 | BC | 02 | BC | 00 | 38 | 00 | 02 | 03 | 24 | 00 |
| 11940 | C4 | 02 | 38 | 00 | 24 | 00 | 2A | 03 | 24 | 00 | 06 | 00 | BC | 02 | BC | 00 |
| 11950 | 38 | 00 | 02 | 03 | 24 | 00 | C0 | 02 | 38 | 00 | 34 | 00 | 58 | 2E | BA | 00 |
| 11960 | 34 | 00 | 22 | 00 | 24 | 00 | 06 | 00 | 88 | 00 | 6E | 01 | BC | 00 | 82 | 00 |
| 11970 | 02 | 00 | 4C | 31 | 24 | 00 | B8 | 02 | 9E | 00 | 20 | 00 | 24 | 00 | E2 | 30 |
| 11980 | 01 | 00 | 00 | 00 | 00 | 00 | 00 | 00 | 00 | 00 | 00 | 00 | 00 | 00 | 00 | 00 |
| 11990 | D7 | 01 | 17 | 00 | 00 | 00 | 32 | 01 | 06 | 00 | 00 | 00 | 32 | 00 | 00 | 00 |
| 119A0 | 00 | 00 | 72 | 11 | 45 | 56 | 45 | 4E | 54 | 00 | 00 | 00 | 00 | 00 | 00 | 00 |
| 119B0 | 50 | 01 | 0A | 00 | 41 | 01 | 00 | 00 | 40 | 00 | 50 | 01 | 0A | 00 | 45 | 01 |
| 119C0 | 10 | 00 | 60 | 00 | 50 | 01 | 00 | 00 | 4E | 01 | 06 | 00 | 82 | 00 | 50 | 01 |
| 119D0 | 02 | 00 | 53 | 01 | 00 | 00 | A0 | 00 | 50 | 01 | 08 | 00 | 55 | 01 | 00 | 00 |
| 119E0 | C0 | 00 | 50 | 01 | 04 | 00 | 59 | 01 | 22 | 00 | E0 | 00 | 50 | 01 | 02 | 00 |
| 119F0 | 64 | 01 | 18 | 00 | 00 | 01 | 50 | 01 | 04 | 00 | 9C | 01 | 02 | 00 | 20 | 01 |
| 11A00 | 50 | 01 | 0A | 00 | A1 | 01 | 00 | 00 | 40 | 01 | 50 | 01 | 0A | 00 | A3 | 01 |
| 11A10 | 00 | 00 | 60 | 01 | 50 | 01 | 02 | 00 | A5 | 01 | 00 | 00 | 83 | 01 | 50 | 01 |
| 11A20 | 02 | 00 | A8 | 01 | 14 | 00 | A3 | 01 | 50 | 01 | 00 | 00 | AD | 01 | 00 | 00 |
| 11A30 | C0 | 01 | 50 | 01 | 04 | 00 | AE | 01 | 02 | 00 | E0 | 01 | 50 | 01 | 04 | 00 |
| 11A40 | E8 | 01 | 02 | 00 | 00 | 02 | 50 | 01 | 02 | 00 | C8 | 01 | 00 | 00 | 20 | 02 |
| 11A50 | 50 | 01 | 02 | 00 | D0 | 01 | 00 | 00 | 40 | 02 | 50 | 01 | 00 | 00 | D4 | 01 |
| 11A60 | 00 | 00 | 60 | 02 | 00 | 00 | 54 | 01 | 01 | 03 | 0E | 00 | 48 | 01 | 0A | 00 |
| 11A70 | 22 | 00 | 00 | 00 | 1A | 01 | 00 | 00 | B6 | 01 | 02 | 01 | 54 | 01 | 02 | 01 |
| 11A80 | 56 | 01 | 02 | 01 | 58 | 01 | 5A | 01 | 12 | 00 | DC | 01 | FF | FF | 7C | 4B |
| 11A90 | 45 | 59 | 00 | 01 | 5A | 01 | 24 | 00 | EA | 01 | FF | FF | 7C | 28 | 00 | 01 |
| 11AA0 | 5A | 01 | 48 | 00 | F6 | 01 | FF | FF | 7C | 29 | 00 | 01 | 5A | 01 | 12 | 00 |
| 11AB0 | 02 | 02 | FF | FF | 7C | 54 | 49 | 4D | 45 | 52 | 00 | 01 | 5A | 01 | 24 | 00 |
| 11AC0 | 12 | 02 | FF | FF | 7C | 28 | 00 | 01 | 5A | 01 | 48 | 00 | 1E | 02 | FF | FF |
| 11AD0 | 7C | 29 | 00 | 01 | 5A | 01 | 12 | 00 | 2A | 02 | FF | FF | 7C | 4F | 46 | 46 |
| 11AE0 | 00 | 4F | 4E | 00 | 53 | 54 | 4F | 50 | 00 | 01 | 5A | 01 | 12 | 00 | 40 | 02 |
| 11AF0 | FF | FF | 7C | 28 | 00 | 01 | 5A | 01 | 36 | 00 | 4C | 02 | FF | FF | 7C | 29 |
| 11B00 | 00 | 01 | 5A | 01 | 48 | 00 | 58 | 02 | FF | FF | 7C | 4F | 46 | 46 | 00 | 4F |
| 11B10 | 4E | 00 | 53 | 54 | 4F | 50 | 00 | 01 | 5A | 01 | 12 | 00 | 6E | 02 | FF | FF |
| 11B20 | 7C | 4F | 46 | 46 | 00 | 4F | 4E | 00 | 4C | 49 | 53 | 54 | 00 | 01 | 5A | 01 |
| 11B30 | 12 | 00 | 84 | 02 | FF | FF | 7C | 50 | 4C | 41 | 59 | 00 | 01 | 00 | 5A | 01 |
| 11B40 | 24 | 00 | 94 | 02 | FF | FF | 7C | 28 | 00 | 01 | 5A | 01 | 48 | 00 | A0 | 02 |
| 11B50 | FF | FF | 7C | 29 | 00 | 01 | 5A | 01 | 12 | 00 | AC | 02 | FF | FF | 7C | 43 |
| 11B60 | 4F | 4D | 00 | 01 | 5A | 01 | 24 | 00 | BA | 02 | FF | FF | 7C | 28 | 00 | 01 |
| 11B70 | 5A | 01 | 48 | 00 | C6 | 02 | FF | FF | 7C | 29 | 00 | 01 | 5A | 01 | 12 | 00 |
| 11B80 | D2 | 02 | FF | FF | 7C | 53 | 41 | 56 | 45 | 00 | 01 | 00 | 5A | 01 | 12 | 00 |
| 11B90 | E2 | 02 | FF | FF | 7C | 52 | 45 | 53 | 54 | 4F | 52 | 45 | 00 | 01 | 5A | 01 |
| 11BA0 | 12 | 00 | F4 | 02 | FF | FF | 7C | 4F | 4E | 00 | 4F | 46 | 46 | 00 | 01 | 00 |
| 11BB0 | 5A | 01 | 12 | 00 | 06 | 03 | FF | FF | 7C | 43 | 4C | 45 | 41 | 52 | 00 | 01 |
| 11BC0 | 65 | 76 | 65 | 6E | 74 | 2E | 62 | 69 | 6E | 00 | 00 | 00 | 00 | 00 | 00 | 00 |
| 11BD0 | 0A | 4F | 4E | 4B | 45 | 59 | 00 | 00 | 8F | 00 | 08 | 4B | 45 | 59 | 00 | 00 |
| 11BE0 | 99 | 00 | 0B | 4B | 45 | 59 | 53 | 45 | 54 | 00 | 00 | A3 | 00 | 09 | 49 | 4E |
| 11BF0 | 49 | 54 | 00 | 00 | AD | 00 | 0C | 4F | 4E | 54 | 49 | 4D | 45 | 52 | 00 | 00 |
| 11C00 | B7 | 00 | 0A | 54 | 49 | 4D | 45 | 52 | 00 | 00 | C3 | 00 | 0D | 53 | 45 | 54 |
| 11C10 | 4D | 41 | 43 | 52 | 4F | 00 | 00 | CB | 00 | 0C | 4B | 45 | 59 | 4D | 4F | 44 |
| 11C20 | 45 | 00 | 00 | D5 | 00 | 0B | 53 | 45 | 54 | 41 | 4C | 54 | 00 | 00 | DD | 00 |
| 11C30 | 0D | 47 | 45 | 54 | 54 | 49 | 4D | 45 | 52 | 00 | 00 | E7 | 00 | 0B | 4F | 4E |
| 11C40 | 50 | 4C | 41 | 59 | 00 | 00 | F3 | 00 | 0A | 4F | 4E | 43 | 4F | 4D | 00 | 00 |
| 11C50 | FD | 00 | 0C | 52 | 45 | 41 | 44 | 4D | 41 | 43 | 00 | 00 | 07 | 01 | 00 | 54 |
| 11C60 | 01 | 08 | 09 | 02 | 00 | 01 | 00 | 01 | 00 | 54 | 01 | 7D | 09 | 02 | 00 | 01 |
| 11C70 | 00 | 01 | 00 | 54 | 01 | C1 | 09 | 02 | 00 | 03 | 00 | 01 | 00 | 54 | 01 | 0D |
| 11C80 | 0E | 02 | 00 | 01 | 00 | 01 | 00 | 54 | 01 | FD | 0A | 03 | 00 | 01 | 00 | 01 |
| 11C90 | 00 | 01 | 00 | 54 | 01 | 36 | 0B | 01 | 00 | 01 | 00 | 54 | 01 | EA | 09 | 02 |

| | | | | | | | | | | | | | | | | |
|---|---|---|---|---|---|---|---|---|---|---|---|---|---|---|---|---|
| 11CA0 | 00 | 03 | 00 | 01 | 00 | 54 | 01 | 8E | 0A | 01 | 00 | 01 | 00 | 54 | 01 | 24 |
| 11CB0 | 0A | 02 | 00 | 03 | 00 | 01 | 00 | 54 | 01 | DA | 0A | 03 | 00 | 01 | 00 | 01 |
| 11CC0 | 00 | 01 | 00 | 54 | 01 | 63 | 09 | 02 | 00 | 01 | 00 | 01 | 00 | 54 | 01 | 30 |
| 11CD0 | 09 | 02 | 00 | 01 | 00 | 01 | 00 | 54 | 01 | 5E | 0A | 02 | 00 | 03 | 00 | 01 |
| 11CE0 | 00 | 3B | 00 | 00 | 00 | 3C | 00 | 00 | 00 | 3D | 00 | 00 | 00 | 3E | 00 | 00 |
| 11CF0 | 00 | 3F | 00 | 00 | 00 | 40 | 00 | 00 | 00 | 41 | 00 | 00 | 00 | 42 | 00 | 00 |
| 11D00 | 00 | 43 | 00 | 00 | 00 | 44 | 00 | 00 | 00 | 48 | 00 | 00 | 00 | 4B | 00 | 00 |
| 11D10 | 00 | 4D | 00 | 00 | 00 | 50 | 00 | 00 | 00 | 00 | 00 | 00 | 00 | 00 | 00 | 00 |
| 11D20 | 00 | 00 | 00 | 00 | 00 | 00 | 00 | 00 | 00 | 00 | 00 | 00 | 00 | 00 | 00 | 00 |
| 11D30 | 00 | 00 | 00 | 00 | 00 | 00 | 00 | 00 | 00 | 00 | 00 | 00 | 00 | 00 | 00 | 00 |
| 11D40 | 00 | 3B | 3C | 3D | 3E | 3F | 40 | 41 | 42 | 43 | 44 | 48 | 4B | 4D | 50 | 4C |
| 11D50 | 49 | 53 | 54 | 20 | FF | FF | FF | FF | FF | FF | FF | FF | FF | FF | FF | FF |
| 11D60 | FF | FF | FF | FF | FF | FF | FF | FF | FF | FF | FF | FF | FF | FF | FF | FF |
| 11D70 | FF | FF | FF | FF | FF | FF | FF | FF | FF | FF | FF | FF | FF | FF | FF | 52 |
| 11D80 | 55 | 4E | 0D | FF | FF | FF | FF | FF | FF | FF | FF | FF | FF | FF | FF | FF |
| 11D90 | FF | FF | FF | FF | FF | FF | FF | FF | FF | FF | FF | FF | FF | FF | FF | FF |
| 11DA0 | FF | FF | FF | FF | FF | FF | FF | FF | FF | FF | FF | FF | FF | FF | FF | 4C |
| 11DB0 | 4F | 41 | 44 | 20 | 22 | FF | FF | FF | FF | FF | FF | FF | FF | FF | FF | FF |
| 11DC0 | FF | FF | FF | FF | FF | FF | FF | FF | FF | FF | FF | FF | FF | FF | FF | FF |
| 11DD0 | FF | FF | FF | FF | FF | FF | FF | FF | FF | FF | FF | FF | FF | FF | FF | 53 |
| 11DE0 | 41 | 56 | 45 | 20 | 22 | FF | FF | FF | FF | FF | FF | FF | FF | FF | FF | FF |
| 11DF0 | FF | FF | FF | FF | FF | FF | FF | FF | FF | FF | FF | FF | FF | FF | FF | FF |
| 11E00 | FF | FF | FF | FF | FF | FF | FF | FF | FF | FF | FF | FF | FF | FF | FF | 50 |
| 11E10 | 52 | 4F | 43 | 45 | 44 | 55 | 52 | 45 | 20 | FF | FF | FF | FF | FF | FF | FF |
| 11E20 | FF | FF | FF | FF | FF | FF | FF | FF | FF | FF | FF | FF | FF | FF | FF | FF |
| 11E30 | FF | FF | FF | FF | FF | FF | FF | FF | FF | FF | FF | FF | FF | FF | FF | 4D |
| 11E40 | 41 | 49 | 4E | 0D | FF | FF | FF | FF | FF | FF | FF | FF | FF | FF | FF | FF |
| 11E50 | FF | FF | FF | FF | FF | FF | FF | FF | FF | FF | FF | FF | FF | FF | FF | FF |
| 11E60 | FF | FF | FF | FF | FF | FF | FF | FF | FF | FF | FF | FF | FF | FF | FF | 4D |
| 11E70 | 41 | 4B | 45 | 20 | 4D | 4F | 44 | 55 | 4C | 45 | 20 | 22 | FF | FF | FF | FF |
| 11E80 | FF | FF | FF | FF | FF | FF | FF | FF | FF | FF | FF | FF | FF | FF | FF | FF |
| 11E90 | FF | FF | FF | FF | FF | FF | FF | FF | FF | FF | FF | FF | FF | FF | FF | 53 |
| 11EA0 | 41 | 56 | 45 | 20 | 4D | 4F | 44 | 55 | 4C | 45 | 20 | 22 | FF | FF | FF | FF |
| 11EB0 | FF | FF | FF | FF | FF | FF | FF | FF | FF | FF | FF | FF | FF | FF | FF | FF |
| 11EC0 | FF | FF | FF | FF | FF | FF | FF | FF | FF | FF | FF | FF | FF | FF | FF | 45 |
| 11ED0 | 44 | 49 | 54 | 20 | FF | FF | FF | FF | FF | FF | FF | FF | FF | FF | FF | FF |
| 11EE0 | FF | FF | FF | FF | FF | FF | FF | FF | FF | FF | FF | FF | FF | FF | FF | FF |
| 11EF0 | FF | FF | FF | FF | FF | FF | FF | FF | FF | FF | FF | FF | FF | FF | FF | 58 |
| 11F00 | 52 | 45 | 46 | 20 | FF | FF | FF | FF | FF | FF | FF | FF | FF | FF | FF | FF |
| 11F10 | FF | FF | FF | FF | FF | FF | FF | FF | FF | FF | FF | FF | FF | FF | FF | FF |
| 11F20 | FF | FF | FF | FF | FF | FF | FF | FF | FF | FF | FF | FF | FF | FF | FF | 41 |
| 11F30 | 55 | 54 | 4F | 20 | FF | FF | FF | FF | FF | FF | FF | FF | FF | FF | FF | FF |
| 11F40 | FF | FF | FF | FF | FF | FF | FF | FF | FF | FF | FF | FF | FF | FF | FF | FF |
| 11F50 | FF | FF | FF | FF | FF | FF | FF | FF | FF | FF | FF | FF | FF | FF | FF | 42 |
| 11F60 | 59 | 54 | 45 | 20 | 41 | 52 | 52 | 41 | 59 | 20 | 53 | 54 | 52 | 55 | 43 | 54 |
| 11F70 | 55 | 52 | 45 | 20 | FF | FF | FF | FF | FF | FF | FF | FF | FF | FF | FF | FF |
| 11F80 | FF | FF | FF | FF | FF | FF | FF | FF | FF | FF | FF | FF | FF | FF | FF | 43 |
| 11F90 | 4F | 4C | 4F | 52 | 20 | FF | FF | FF | FF | FF | FF | FF | FF | FF | FF | FF |
| 11FA0 | FF | FF | FF | FF | FF | FF | FF | FF | FF | FF | FF | FF | FF | FF | FF | FF |
| 11FB0 | FF | FF | FF | FF | FF | FF | FF | FF | FF | FF | FF | FF | FF | FF | FF | 44 |
| 11FC0 | 45 | 46 | 49 | 4E | 45 | 20 | 57 | 49 | 4E | 44 | 4F | 57 | 20 | FF | FF | FF |
| 11FD0 | FF | FF | FF | FF | FF | FF | FF | FF | FF | FF | FF | FF | FF | FF | FF | FF |
| 11FE0 | FF | FF | FF | FF | FF | FF | FF | FF | FF | FF | FF | FF | FF | FF | FF | 45 |
| 11FF0 | 4E | 44 | 20 | 53 | 54 | 52 | 55 | 43 | 54 | 55 | 52 | 45 | FF | FF | FF | FF |
| 12000 | FF | FF | FF | FF | FF | FF | FF | FF | FF | FF | FF | FF | FF | FF | FF | FF |
| 12010 | FF | FF | FF | FF | FF | FF | FF | FF | FF | FF | FF | FF | FF | FF | FF | 46 |
| 12020 | 52 | 41 | 4D | 45 | 20 | FF | FF | FF | FF | FF | FF | FF | FF | FF | FF | FF |
| 12030 | FF | FF | FF | FF | FF | FF | FF | FF | FF | FF | FF | FF | FF | FF | FF | FF |
| 12040 | FF | FF | FF | FF | FF | FF | FF | FF | FF | FF | FF | FF | FF | FF | FF | 47 |
| 12050 | 4F | 54 | 4F | 20 | FF | FF | FF | FF | FF | FF | FF | FF | FF | FF | FF | FF |
| 12060 | FF | FF | FF | FF | FF | FF | FF | FF | FF | FF | FF | FF | FF | FF | FF | FF |
| 12070 | FF | FF | FF | FF | FF | FF | FF | FF | FF | FF | FF | FF | FF | FF | FF | 48 |
| 12080 | 45 | 41 | 44 | 45 | 52 | 20 | FF | FF | FF | FF | FF | FF | FF | FF | FF | FF |
| 12090 | FF | FF | FF | FF | FF | FF | FF | FF | FF | FF | FF | FF | FF | FF | FF | FF |
| 120A0 | FF | FF | FF | FF | FF | FF | FF | FF | FF | FF | FF | FF | FF | FF | FF | 49 |

| | | | | | | | | | | | | | | | | |
|---|---|---|---|---|---|---|---|---|---|---|---|---|---|---|---|---|
| 120B0 | 4E | 50 | 55 | 54 | 20 | FF | FF | FF | FF | FF | FF | FF | FF | FF | FF | FF |
| 120C0 | FF | FF | FF | FF | FF | FF | FF | FF | FF | FF | FF | FF | FF | FF | FF | FF |
| 120D0 | FF | FF | FF | FF | FF | FF | FF | FF | FF | FF | FF | FF | FF | FF | FF | 49 |
| 120E0 | 4E | 54 | 45 | 47 | 45 | 52 | 20 | 41 | 52 | 52 | 41 | 59 | 20 | 53 | 54 | 52 |
| 120F0 | 55 | 43 | 54 | 55 | 52 | 45 | 20 | FF | FF | FF | FF | FF | FF | FF | FF | FF |
| 12100 | FF | FF | FF | FF | FF | FF | FF | FF | FF | FF | FF | FF | FF | FF | FF | 4B |
| 12110 | 45 | 59 | 20 | FF | FF | FF | FF | FF | FF | FF | FF | FF | FF | FF | FF | FF |
| 12120 | FF | FF | FF | FF | FF | FF | FF | FF | FF | FF | FF | FF | FF | FF | FF | FF |
| 12130 | FF | FF | FF | FF | FF | FF | FF | FF | FF | FF | FF | FF | FF | FF | FF | 4C |
| 12140 | 4F | 43 | 41 | 54 | 45 | 20 | FF | FF | FF | FF | FF | FF | FF | FF | FF | FF |
| 12150 | FF | FF | FF | FF | FF | FF | FF | FF | FF | FF | FF | FF | FF | FF | FF | FF |
| 12160 | FF | FF | FF | FF | FF | FF | FF | FF | FF | FF | FF | FF | FF | FF | FF | 4D |
| 12170 | 41 | 49 | 4E | 20 | FF | FF | FF | FF | FF | FF | FF | FF | FF | FF | FF | FF |
| 12180 | FF | FF | FF | FF | FF | FF | FF | FF | FF | FF | FF | FF | FF | FF | FF | FF |
| 12190 | FF | FF | FF | FF | FF | FF | FF | FF | FF | FF | FF | FF | FF | FF | FF | 4E |
| 121A0 | 45 | 58 | 54 | 20 | FF | FF | FF | FF | FF | FF | FF | FF | FF | FF | FF | FF |
| 121B0 | FF | FF | FF | FF | FF | FF | FF | FF | FF | FF | FF | FF | FF | FF | FF | FF |
| 121C0 | FF | FF | FF | FF | FF | FF | FF | FF | FF | FF | FF | FF | FF | FF | FF | 4F |
| 121D0 | 50 | 45 | 4E | 20 | FF | FF | FF | FF | FF | FF | FF | FF | FF | FF | FF | FF |
| 121E0 | FF | FF | FF | FF | FF | FF | FF | FF | FF | FF | FF | FF | FF | FF | FF | FF |
| 121F0 | FF | FF | FF | FF | FF | FF | FF | FF | FF | FF | FF | FF | FF | FF | FF | 50 |
| 12200 | 52 | 49 | 4E | 54 | 20 | FF | FF | FF | FF | FF | FF | FF | FF | FF | FF | FF |
| 12210 | FF | FF | FF | FF | FF | FF | FF | FF | FF | FF | FF | FF | FF | FF | FF | FF |
| 12220 | FF | FF | FF | FF | FF | FF | FF | FF | FF | FF | FF | FF | FF | FF | FF | 52 |
| 12230 | 45 | 41 | 4C | 20 | 46 | 55 | 4E | 43 | 54 | 49 | 4F | 4E | 20 | FF | FF | FF |
| 12240 | FF | FF | FF | FF | FF | FF | FF | FF | FF | FF | FF | FF | FF | FF | FF | FF |
| 12250 | FF | FF | FF | FF | FF | FF | FF | FF | FF | FF | FF | FF | FF | FF | FF | 52 |
| 12260 | 45 | 41 | 4C | 20 | 41 | 52 | 52 | 41 | 59 | 20 | 53 | 54 | 52 | 55 | 43 | 54 |
| 12270 | 55 | 52 | 45 | 20 | FF | FF | FF | FF | FF | FF | FF | FF | FF | FF | FF | FF |
| 12280 | FF | FF | FF | FF | FF | FF | FF | FF | FF | FF | FF | FF | FF | FF | FF | 53 |
| 12290 | 54 | 52 | 55 | 43 | 54 | 55 | 52 | 45 | 3A | 20 | FF | FF | FF | FF | FF | FF |
| 122A0 | FF | FF | FF | FF | FF | FF | FF | FF | FF | FF | FF | FF | FF | FF | FF | FF |
| 122B0 | FF | FF | FF | FF | FF | FF | FF | FF | FF | FF | FF | FF | FF | FF | FF | 54 |
| 122C0 | 48 | 45 | 4E | 20 | FF | FF | FF | FF | FF | FF | FF | FF | FF | FF | FF | FF |
| 122D0 | FF | FF | FF | FF | FF | FF | FF | FF | FF | FF | FF | FF | FF | FF | FF | FF |
| 122E0 | FF | FF | FF | FF | FF | FF | FF | FF | FF | FF | FF | FF | FF | FF | FF | 55 |
| 122F0 | 50 | 50 | 45 | 52 | 24 | 20 | FF | FF | FF | FF | FF | FF | FF | FF | FF | FF |
| 12300 | FF | FF | FF | FF | FF | FF | FF | FF | FF | FF | FF | FF | FF | FF | FF | FF |
| 12310 | FF | FF | FF | FF | FF | FF | FF | FF | FF | FF | FF | FF | FF | FF | FF | 56 |
| 12320 | 41 | 52 | 50 | 54 | 52 | 24 | 20 | FF | FF | FF | FF | FF | FF | FF | FF | FF |
| 12330 | FF | FF | FF | FF | FF | FF | FF | FF | FF | FF | FF | FF | FF | FF | FF | FF |
| 12340 | FF | FF | FF | FF | FF | FF | FF | FF | FF | FF | FF | FF | FF | FF | FF | 57 |
| 12350 | 49 | 4E | 44 | 4F | 57 | 20 | FF | FF | FF | FF | FF | FF | FF | FF | FF | FF |
| 12360 | FF | FF | FF | FF | FF | FF | FF | FF | FF | FF | FF | FF | FF | FF | FF | FF |
| 12370 | FF | FF | FF | FF | FF | FF | FF | FF | FF | FF | FF | FF | FF | FF | FF | 58 |
| 12380 | 52 | 45 | 46 | 20 | FF | FF | FF | FF | FF | FF | FF | FF | FF | FF | FF | FF |
| 12390 | FF | FF | FF | FF | FF | FF | FF | FF | FF | FF | FF | FF | FF | FF | FF | FF |
| 123A0 | FF | FF | FF | FF | FF | FF | FF | FF | FF | FF | FF | FF | FF | FF | FF | 53 |
| 123B0 | 55 | 4D | 4D | 49 | 54 | 20 | 53 | 4F | 46 | 54 | 57 | 41 | 52 | 45 | 20 | 54 |
| 123C0 | 45 | 43 | 48 | 4E | 4F | 4C | 4F | 47 | 59 | 20 | 49 | 6E | 63 | 2E | 20 | FF |
| 123D0 | FF | FF | FF | FF | FF | FF | FF | FF | FF | FF | FF | FF | FF | FF | FF | 42 |
| 123E0 | 65 | 74 | 74 | 65 | 72 | 42 | 41 | 53 | 49 | 43 | 28 | 74 | 6D | 29 | 20 | 49 |
| 123F0 | 53 | 20 | 42 | 45 | 54 | 54 | 45 | 52 | 20 | 21 | 21 | 21 | FF | FF | FF | FF |
| 12400 | FF | FF | FF | FF | FF | FF | FF | FF | FF | FF | FF | FF | 1E | 30 | 2E | 20 |
| 12410 | 12 | 21 | 22 | 23 | 17 | 24 | 25 | 26 | 32 | 31 | 18 | 19 | 10 | 13 | 1F | 14 |
| 12420 | 16 | 2F | 11 | 2D | 15 | 2C | 00 | 00 | 00 | 00 | 00 | 00 | 00 | 00 | 00 | 00 |
| 12430 | 00 | 00 | 00 | 00 | 00 | 00 | 00 | 00 | 00 | 00 | 00 | 00 | 00 | 00 | 00 | 00 |
| 12440 | 00 | 00 | 00 | 00 | 00 | 00 | 00 | 00 | 00 | 00 | 00 | 00 | 00 | 00 | 00 | 00 |
| 12450 | 00 | 00 | 00 | 00 | 00 | 00 | 00 | 00 | 00 | 00 | 00 | 00 | 00 | 00 | 00 | 00 |
| 12460 | 00 | 00 | 00 | 00 | 00 | 00 | 00 | 00 | 00 | 00 | 00 | 00 | 00 | 00 | 00 | 00 |
| 12470 | 00 | 00 | 00 | 00 | 00 | 00 | 00 | 00 | 00 | 00 | 00 | 00 | 00 | 00 | 00 | 00 |
| 12480 | 00 | 00 | 00 | 00 | 00 | 00 | 00 | 00 | 00 | 00 | 00 | 00 | 00 | 00 | 00 | 00 |
| 12490 | 00 | 00 | 00 | 00 | 00 | 00 | 00 | 00 | 00 | 00 | 00 | 00 | 00 | 00 | 00 | 00 |
| 124A0 | 00 | 00 | 00 | 00 | 00 | 00 | 56 | 08 | 56 | 08 | 01 | 9A | 40 | A8 | 05 | 6E |
| 124B0 | 2F | E2 | 06 | 6E | 2F | EC | 07 | 6E | 2F | 0D | 04 | 6E | 2F | 98 | 09 | 9E |

| | | | | | | | | | | | | | | | | |
|---|---|---|---|---|---|---|---|---|---|---|---|---|---|---|---|---|
| 124C0 | 09 | BB | 09 | 44 | 0B | 4B | 0B | 80 | 0B | 00 | 00 | 00 | 00 | 00 | 00 | 00 |
| 124D0 | 00 | 00 | 00 | 20 | 02 | A3 | 3A | 00 | 0E | 1F | C4 | 5E | B8 | 26 | 8B | 0F |
| 124E0 | 8B | 56 | A4 | C4 | 5E | A6 | 36 | A1 | 54 | 00 | 8E | D8 | 83 | C1 | 05 | B0 |
| 124F0 | 06 | F6 | E1 | 8B | F0 | 89 | 5C | 14 | 8C | 44 | 16 | 89 | 54 | 18 | F8 | CB |
| 12500 | 0E | 1F | C4 | 5E | B8 | 26 | 8B | 0F | 8B | 5E | A4 | C4 | 76 | A6 | 8C | C2 |
| 12510 | B4 | 38 | 9C | 36 | FF | 1E | E2 | 02 | F8 | CB | 0E | 1F | C4 | 5E | B8 | 26 |
| 12520 | 8B | 0F | C4 | 5E | A6 | 26 | 8B | 07 | 80 | C4 | 39 | 9C | 36 | FF | 1E | E2 |
| 12530 | 02 | F8 | CB | 0E | 1F | C4 | 5E | B8 | 26 | 8B | 0F | 8B | 5E | A4 | C4 | 76 |
| 12540 | A6 | 8C | C2 | B4 | 31 | 9C | 36 | FF | 1E | E2 | 02 | F8 | CB | 0E | 1F | C4 |
| 12550 | 5E | B8 | 26 | 8B | 37 | 4E | 8B | C6 | D1 | E6 | D1 | E6 | C4 | 5E | A6 | 26 |
| 12560 | 8B | 1F | D1 | E3 | FF | A7 | ED | 08 | 80 | A4 | 14 | 01 | F8 | CB | 80 | A4 |
| 12570 | 14 | 01 | FD | 80 | 8C | 14 | 01 | 01 | F6 | 84 | 14 | 01 | 04 | 74 | 0A | 80 |
| 12580 | A4 | 14 | 01 | FB | 8B | D8 | E8 | ED | 00 | F8 | CB | 80 | 8C | 14 | 01 | 02 |
| 12590 | CB | 0E | 1F | C4 | 5E | B8 | 26 | 8B | 37 | 4E | 8B | C6 | D1 | E6 | D1 | E6 |
| 125A0 | C4 | 5E | A0 | 26 | 8A | 07 | A8 | 03 | 74 | 02 | 0C | 03 | 88 | 84 | 12 | 01 |
| 125B0 | 26 | 8A | 47 | FF | 88 | 84 | 11 | 01 | F8 | CB | 0E | 1F | C4 | 5E | B8 | 26 |
| 125C0 | 8B | 0F | 49 | B0 | 30 | F6 | E1 | 8B | F8 | 8D | BD | 7F | 01 | C4 | 5E | A6 |
| 125D0 | 26 | 8B | 0F | 0B | C9 | 75 | 05 | C6 | 05 | FE | F8 | CB | C5 | 76 | A0 | 0E |
| 125E0 | 07 | 51 | FD | AC | FC | AA | E2 | FA | 59 | 83 | F9 | 30 | 74 | 04 | 26 | C6 |
| 125F0 | 05 | FF | F8 | CB | 0E | 1F | C4 | 5E | B8 | 26 | 8B | 0F | 49 | B0 | 30 | F6 |
| 12600 | E1 | 8B | F8 | 8D | BD | 5F | 03 | C4 | 5E | A6 | 26 | 8B | 0F | 0B | C9 | 75 |
| 12610 | 05 | C6 | 05 | FE | F8 | CB | C5 | 76 | A0 | 0E | 07 | 51 | FD | AC | FC | AA |
| 12620 | E2 | FA | 59 | 83 | F9 | 30 | 74 | 04 | 26 | C6 | 05 | FF | F8 | CB | 0E | 1F |
| 12630 | C4 | 5E | B8 | 26 | 8B | 07 | 48 | B3 | 30 | F6 | E3 | 8B | F0 | 8D | B4 | 5F |
| 12640 | 03 | C4 | 7E | A0 | B9 | 30 | 00 | FC | AC | 3C | FE | 73 | 04 | FD | AA | E2 |
| 12650 | F6 | 83 | E9 | 30 | F7 | D9 | C4 | 5E | A6 | 26 | 89 | 0F | F8 | CB | C4 | 5E |
| 12660 | B8 | 26 | 8B | 07 | 0A | C0 | 75 | 07 | 2E | 80 | 26 | DA | 08 | FE | CB | 2E |
| 12670 | 80 | 0E | DA | 08 | 01 | CB | 50 | 53 | 51 | 52 | 1E | 8E | 1E | DB | 08 | A1 |
| 12680 | 54 | 00 | 8E | D8 | 8B | CB | 81 | E1 | 0F | 00 | D1 | EB | D1 | EB | 81 | E3 |
| 12690 | FC | 00 | BA | 01 | 00 | D3 | E2 | 85 | 57 | 0E | 75 | 08 | 09 | 57 | 0C | 80 |
| 126A0 | 0E | 0A | 00 | 01 | 1F | 5A | 59 | 5B | 58 | C3 | 2B | C0 | CD | 1A | C4 | 5E |
| 126B0 | 94 | 26 | C7 | 07 | 00 | 00 | 0A | C0 | 74 | 05 | 26 | C7 | 07 | FF | FF | C4 |
| 126C0 | 5E | B8 | 26 | 89 | 17 | C4 | 5E | A6 | 26 | 89 | 0F | F8 | CB | 0E | 1F | 8B |
| 126D0 | 56 | B6 | C4 | 5E | B8 | 1E | 36 | A1 | 54 | 00 | 8E | D8 | 2B | F6 | 89 | 5C |
| 126E0 | 14 | 8C | 44 | 16 | 89 | 54 | 18 | 1F | C4 | 5E | A6 | 26 | 8B | 07 | A3 | F9 |
| 126F0 | 08 | C4 | 5E | 94 | 26 | 8B | 1F | 89 | 1E | FB | 08 | FA | A3 | FF | 08 | 89 |
| 12700 | 1E | FD | 08 | FB | F8 | CB | 0E | 1F | C4 | 5E | B8 | 26 | 8B | 1F | D1 | E3 |
| 12710 | FF | A7 | F3 | 08 | 81 | 26 | 01 | 09 | F8 | FF | C8 | 1E | 36 | A1 | 54 | 00 |
| 12720 | 8E | D8 | 83 | 3E | 16 | 00 | 00 | 1F | 75 | 05 | B8 | DC | 05 | F9 | CB | 81 |
| 12730 | 26 | 01 | 09 | FD | FF | 81 | 0E | 01 | 09 | 01 | 00 | F7 | 06 | 01 | 09 | 04 |
| 12740 | 00 | 74 | 0B | 81 | 26 | 01 | 09 | FB | FF | 2B | DB | E8 | 28 | FF | F8 | CB |
| 12750 | 81 | 8C | 04 | 09 | 02 | 00 | CB | 50 | 1E | 53 | 51 | 52 | 57 | 56 | 55 | 06 |
| 12760 | 2E | F6 | 06 | 07 | 09 | FF | 74 | 03 | E9 | C3 | 00 | 2E | C6 | 06 | 07 | 09 |
| 12770 | FF | FB | B8 | 40 | 00 | 8E | D8 | A1 | 17 | 00 | 8B | D0 | 8A | E0 | 80 | E4 |
| 12780 | 6F | 80 | E2 | 6F | F6 | C4 | 03 | 74 | 03 | 80 | CC | 03 | 0E | 1F | E4 | 60 |
| 12790 | 0A | C0 | 79 | 09 | FA | C6 | 06 | 07 | 09 | 00 | E9 | 91 | 00 | 0E | 07 | BF |
| 127A0 | 11 | 01 | B9 | 18 | 00 | 8B | D9 | 1E | 8E | 1E | DB | 08 | F7 | 06 | 90 | 02 |
| 127B0 | 02 | 00 | 1F | 74 | 09 | C6 | 06 | 07 | 09 | 00 | FA | E9 | 7F | 00 | 3A | 05 |
| 127C0 | 75 | 15 | 81 | FF | 45 | 01 | 77 | 0A | 50 | 80 | E4 | 0F | 3A | 65 | 01 | 58 |
| 127D0 | 74 | 13 | 3A | 65 | 01 | 74 | 0E | 83 | C7 | 04 | E2 | E2 | FA | C6 | 06 | 07 |
| 127E0 | 09 | 00 | EB | 59 | 90 | 2B | D9 | F6 | 45 | 03 | 01 | 75 | 09 | FA | C6 | 06 |
| 127F0 | 07 | 09 | 00 | EB | 48 | 90 | F6 | 45 | 03 | 02 | 74 | 07 | 80 | 4D | 03 | 04 |
| 12800 | EB | 07 | 90 | 83 | C3 | 05 | E8 | 6D | FE | E8 | 15 | 00 | 07 | 5D | 5E | 5F |
| 12810 | 5A | 59 | 5B | 1F | FA | B0 | 20 | E6 | 20 | 58 | 2E | C6 | 06 | 07 | 09 | 00 |
| 12820 | CF | E4 | 61 | 8A | E0 | 0C | 80 | E6 | 61 | 86 | C4 | E6 | 61 | C3 | 07 | 5D |
| 12830 | 5E | 5F | 5A | 59 | 5B | 1F | 58 | FA | 2E | FF | 2E | DD | 08 | 80 | E2 | 0F |
| 12840 | 75 | 1C | 3C | 3B | 72 | E8 | 3C | 44 | 77 | E4 | 2C | 3B | B9 | 30 | 00 | F6 |
| 12850 | E1 | 8B | F0 | 8D | B4 | 7F | 01 | 80 | 26 | DA | 08 | FD | EB | 48 | 1E | 8E |
| 12860 | 1E | DB | 08 | F7 | 06 | 90 | 02 | 02 | 00 | 1F | 74 | C2 | 80 | E2 | 0F | 80 |
| 12870 | FA | 0C | 75 | 0B | 3C | 14 | 75 | 07 | 36 | 81 | 36 | 88 | 02 | 00 | 80 | 80 |
| 12880 | E2 | 08 | 74 | AA | B9 | 1A | 00 | 8B | D9 | FC | 8D | 3E | 3C | 08 | F2 | AE |
| 12890 | 74 | 02 | EB | 9A | 41 | 2B | D9 | B0 | 30 | F6 | E3 | 8B | F0 | 8D | B4 | 5F |
| 128A0 | 03 | 80 | 0E | DA | 08 | 02 | E8 | 03 | 00 | E9 | 5D | FF | FC | B9 | 30 | 00 |
| 128B0 | 80 | 3C | FE | 75 | 04 | 56 | E9 | 75 | FF | 8B | 1E | D6 | 08 | 8B | FB | E8 |
| 128C0 | B2 | 00 | 3B | 1E | D8 | 08 | 75 | 04 | C3 | E9 | 3D | FF | AC | 3C | FF | 74 |

```
128D0   11 3C 00 75 05 E8 0B 00 73 06 88 05 89 1E D6 08
128E0   E2 D7 C3 56 51 50 83 F9 02 72 2D 8A 04 3C FE 73
128F0   27 0C 20 2C 61 72 21 3C 19 77 1D 46 B2 30 F6 E2
12900   8B F0 8D B4 5F 03 80 3C FE 73 0D B9 30 00 E8 A8
12910   FF 58 59 5E 49 46 F8 C3 58 59 5E F9 C3 53 1E 8C
12920   CB 8E DB 8B 1E D8 08 3B 1E D6 08 74 3D 50 0A E4
12930   74 0B FE CC 74 28 FE CC 74 2F 58 EB 2D 8A 07 0A
12940   C0 75 0F E8 2E 00 B4 39 3B 1E D6 08 74 09 8A 27
12950   EB 02 B4 39 E8 1D 00 89 1E D8 08 5B EB 13 40 8A
12960   07 B4 39 5B 1F 5B CA 02 00 58 1F 5B 2E FF 2E E1
12970   08 1F 5B CF 43 81 FB D6 08 72 03 BB 56 08 C3 50
12980   53 1E 0E 1F F7 06 01 09 01 00 74 39 F7 06 01 09
12990   02 00 74 08 81 0E 01 09 04 00 EB 29 FA FF 0E FD
129A0   08 75 22 83 3E FF 08 00 74 0A FF 0E FD 08 FF 0E
129B0   FF 08 EB 11 2B DB E8 BD FC A1 F9 08 A3 FF 08 A1
129C0   FB 08 A3 FD 08 FB 1F 5B 58 2E FF 2E E5 08 50 2E
129D0   A1 D6 08 2E A3 D8 08 58 2E FF 2E E9 08 0E 1F 8C
129E0   16 DB 08 BF DE 02 36 8B 05 A3 03 09 36 8B 45 02
129F0   A3 05 09 36 C7 05 BB 0E 36 8C 4D 02 8D 3E 11 01
12A00   8D 36 71 01 B9 0E 00 FC AC 88 05 C6 45 01 00 C6
12A10   45 03 00 83 C7 04 E2 F0 C7 06 01 09 00 00 C6 06
12A20   DA 08 00 2B FF 8E DF FA BF 24 00 B8 87 0B 87 05
12A30   2E A3 DD 08 8C C8 87 45 02 2E A3 DF 08 BF 70 00
12A40   B8 AF 0D 87 05 2E A3 E5 08 8C C8 87 45 02 2E A3
12A50   E7 08 BF 58 00 B8 4D 0D 87 05 2E A3 E1 08 8C C8
12A60   87 45 02 2E A3 E3 08 BF 6C 00 B8 FE 0D 87 05 2E
12A80   C7 04 11 01 C5 76 A6 8C 0C F8 CB 0E 1F BF DE 02
12A90   A1 03 09 36 89 05 A1 05 09 36 89 45 02 2B C0 8E
12AA0   C0 FA BF 24 00 A1 DD 08 26 89 05 A1 DF 08 26 89
12AB0   45 02 BF 70 00 A1 E5 08 26 89 05 A1 E7 08 26 89
12AC0   45 02 BF 58 00 A1 E1 08 26 89 05 A1 E3 08 26 89
12AD0   45 02 BF 6C 00 A1 E9 08 26 89 05 A1 EB 08 26 89
12AE0   45 02 FB F8 CA 02 00 00 00 01 00 00 00 01 18 00
12AF0   00 01 DC 05 00 01 01 00 12 01 00 00 12 01 06 00
12B00   04 01 0C 00 04 01 0E 00 0E 01 03 01 12 14 52 01
12B10   6E 01 08 00 56 00 4D 41 49 4E 00 00 0E 01 04 03
12B20   06 37 24 00 00 01 FF 7F 04 01 00 00 04 01 02 00
12B30   04 01 04 00 18 01 00 00 20 00 00 01 0A 00 00 01
12B40   0F 00 00 01 0E 00 00 01 02 00 00 01 DD 05 04 01
12B50   00 00 04 01 02 00 04 01 04 00 18 01 06 00 10 00
12B60   00 01 DE 05 52 01 B4 01 04 00 18 00 43 4F 4E 53
12B70   4F 4C 45 00 00 01 90 02 00 01 10 00 52 01 50 01
12B80   04 00 0C 00 00 01 08 00 52 01 FA 01 04 00 0C 00
12B90   00 01 FF FF 52 01 AA 01 04 00 18 00 00 01 40 00
12BA0   00 01 49 00 00 01 04 00 00 01 06 00 52 01 1E 01
12BB0   04 00 00 00 00 01 07 00 00 01 0D 00 00 01 09 00
12BC0   00 01 13 00 14 01 00 00 14 01 07 00 20 20 20 20
12BD0   20 20 20 00 04 01 00 00 00 01 1A 00 04 01 00 00
12BE0   18 01 02 00 10 00 04 01 00 00 00 01 2A 01 00 01
12BF0   C0 00 00 01 54 00 00 01 13 00 00 01 5F 00 04 01
12C00   00 00 00 01 7F 00 00 01 80 00 10 01 5A 01 00 01
12C10   17 00 00 01 03 00 14 01 05 00 20 54 53 49 4C 00
12C20   14 01 03 00 4E 55 52 00 14 01 05 00 20 44 41 4F
12C30   4C 00 00 01 22 00 14 01 05 00 20 45 56 41 53 00
12C40   00 01 05 00 14 01 0A 00 20 45 52 55 44 45 43 4F
12C50   52 50 14 01 04 00 4E 49 41 4D 14 01 0C 00 20 45
12C60   4C 55 44 4F 4D 20 45 48 41 4D 14 01 0C 00 20 45
12C70   4C 55 44 4F 4D 20 45 56 41 53 14 01 05 00 20 54
12C80   49 44 45 00 14 01 05 00 20 46 45 52 58 00 5A 01
12C90   12 00 E4 13 FF FF 7C 43 4C 45 41 52 00 01 02 01
12CA0   60 01 00 01 7F 00 00 01 80 00 10 01 5A 01 00 01
12CB0   00 00 AA 01 FC 00 02 00 05 00 20 54 53 49 4C 00
12CC0   00 00 DC 01 EA 01 04 00 F6 01 20 00 24 00 0A 00
12CD0   38 12 B4 00 0A 00 3C 12 B0 00 C8 00 2E 00 09 00
12CE0   24 00 40 12 4C 00 FC 00 0E 00 24 00 0A 00 44 12
```

| | | | | | | | | | | | | | | | | |
|---|---|---|---|---|---|---|---|---|---|---|---|---|---|---|---|---|
| 12CF0 | BC | 00 | 88 | 00 | AF | 03 | FC | 00 | 02 | 00 | 0A | 4B | C5 | D9 | 2E | C5 |
| 12D00 | 00 | 00 | 02 | 02 | 12 | 02 | 08 | 00 | 1E | 02 | 20 | 00 | 48 | 12 | 26 | 00 |
| 12D10 | 0A | 00 | 58 | 12 | BE | 00 | 9E | 00 | FC | 00 | 48 | 12 | 26 | 00 | 22 | 00 |
| 12D20 | 26 | 00 | 48 | 12 | 88 | 00 | 5E | 12 | 9E | 00 | FC | 00 | 4C | 12 | 26 | 00 |
| 12D30 | 48 | 12 | 6C | 12 | C2 | 00 | 9E | 00 | FC | 00 | 26 | 00 | 4C | 12 | 74 | 12 |
| 12D40 | B0 | 00 | 84 | 00 | 2E | 00 | 13 | 00 | 54 | 12 | 26 | 00 | 4C | 12 | 6C | 12 |
| 12D50 | BC | 00 | 9E | 00 | 2A | 00 | 0B | 00 | 54 | 12 | 26 | 00 | 4C | 12 | 9E | 00 |
| 12D60 | FC | 00 | 50 | 12 | 26 | 00 | 22 | 00 | 26 | 00 | 48 | 12 | 6C | 12 | C0 | 00 |
| 12D70 | 88 | 00 | 5E | 12 | 9E | 00 | FC | 00 | 54 | 12 | 50 | 12 | 0E | 00 | D7 | 03 |
| 12D80 | FC | 00 | 02 | 00 | 4C | 00 | FC | 00 | 0E | 00 | 24 | 00 | 0A | 00 | 44 | 12 |
| 12D90 | 00 | 00 | 80 | 12 | 78 | 12 | 7C | 12 | 07 | 04 | FC | 00 | 24 | 00 | 7C | 12 |
| 12DA0 | 38 | 12 | B4 | 00 | 2E | 00 | 0B | 00 | 54 | 00 | 01 | 00 | 37 | 00 | 65 | 00 |
| 12DB0 | FC | 00 | 26 | 00 | 78 | 12 | 6C | 12 | BE | 00 | 7C | 12 | BA | 00 | 58 | 12 |
| 12DC0 | C0 | 00 | 82 | 00 | 02 | 00 | FC | 00 | 26 | 00 | 78 | 12 | 6C | 12 | BE | 00 |
| 12DD0 | 7C | 12 | BA | 00 | 6C | 12 | BA | 00 | 58 | 12 | C0 | 00 | 82 | 00 | 02 | 00 |
| 12DE0 | 00 | 00 | 2A | 02 | 24 | 00 | 24 | 02 | 44 | 12 | BC | 00 | 88 | 00 | E3 | 03 |
| 12DF0 | FC | 00 | 02 | 00 | 2A | 00 | 08 | 00 | 54 | 12 | 26 | 00 | 4C | 12 | 9E | 00 |
| 12E00 | 00 | 00 | 40 | 02 | 04 | 00 | 4C | 02 | 58 | 02 | 24 | 00 | 08 | 00 | 38 | 12 |
| 12E10 | B4 | 00 | 08 | 00 | 3C | 12 | B0 | 00 | C8 | 00 | 2E | 00 | 09 | 00 | 24 | 00 |
| 12E20 | 40 | 12 | 4C | 00 | FC | 00 | 24 | 00 | 52 | 02 | 44 | 12 | BC | 00 | 88 | 00 |
| 12E30 | 08 | 00 | B9 | 03 | FC | 00 | 02 | 00 | 07 | 04 | FC | 00 | 24 | 00 | 7C | 12 |
| 12E40 | 00 | 00 | 04 | 00 | 0C | 00 | 24 | 00 | 06 | 00 | 44 | 12 | B4 | 00 | 06 | 00 |
| 12E50 | 3C | 12 | B0 | 00 | C8 | 00 | 06 | 00 | 8A | 12 | B0 | 00 | 06 | 00 | 8E | 12 |
| 12E60 | B4 | 00 | C6 | 00 | C8 | 00 | 2E | 00 | 09 | 00 | 24 | 00 | 40 | 12 | 4C | 00 |
| 12E70 | FC | 00 | 24 | 00 | 06 | 00 | 92 | 12 | B0 | 00 | 2E | 00 | 08 | 00 | 54 | 00 |
| 12E80 | 01 | 00 | 85 | 00 | 65 | 00 | FC | 00 | 84 | 12 | 08 | 00 | 9E | 00 | FC | 00 |
| 12E90 | 84 | 12 | 06 | 00 | EB | 03 | FC | 00 | C4 | 01 | 24 | 00 | 06 | 00 | 44 | 12 |
| 12EA0 | BC | 00 | 38 | 00 | 84 | 12 | 9E | 00 | FC | 00 | 24 | 00 | CA | 01 | 44 | 12 |
| 12EB0 | C6 | 00 | 44 | 12 | AC | 00 | 2E | 00 | 09 | 00 | F4 | 00 | 05 | 00 | 3C | 01 |
| 12EC0 | FC | 00 | 02 | 00 | FC | 00 | 24 | 00 | 08 | 00 | A0 | 00 | 96 | 12 | AE | 00 |
| 12ED0 | 2E | 00 | 09 | 00 | 24 | 00 | 9A | 12 | 4C | 00 | FC | 00 | 08 | 00 | 06 | 00 |
| 12EE0 | C3 | 03 | FC | 00 | 02 | 00 | 24 | 00 | 06 | 00 | 44 | 12 | B4 | 00 | 06 | 00 |
| 12EF0 | 00 | 00 | 6E | 02 | 24 | 00 | 68 | 02 | 54 | 00 | 05 | 00 | 21 | 00 | 3D | 00 |
| 12F00 | B3 | 00 | 2D | 01 | 4B | 03 | F9 | 02 | FC | 00 | 24 | 00 | B0 | 12 | 4C | 00 |
| 12F10 | FC | 00 | 24 | 00 | CA | 01 | 44 | 12 | C6 | 00 | 38 | 12 | AC | 00 | 2E | 00 |
| 12F20 | 05 | 00 | 02 | 00 | FC | 00 | 24 | 00 | 38 | 12 | 88 | 00 | B4 | 12 | FC | 00 |
| 12F30 | 24 | 00 | 6E | 00 | 00 | 00 | 24 | 00 | C4 | 12 | 34 | 00 | 24 | 00 | 24 | 00 |
| 12F40 | 6E | 00 | 00 | 00 | 24 | 00 | C4 | 12 | 34 | 00 | 24 | 00 | C8 | 12 | CC | 00 |
| 12F50 | C6 | 00 | 9E | 00 | FC | 00 | 24 | 00 | CA | 01 | 96 | 12 | C6 | 00 | 96 | 12 |
| 12F60 | AC | 00 | 2E | 00 | 09 | 00 | F4 | 00 | 03 | 00 | CC | 12 | FC | 00 | CA | 01 |
| 12F70 | 24 | 00 | CA | 01 | 24 | 00 | 96 | 12 | CC | 00 | C6 | 00 | 9E | 00 | FC | 00 |
| 12F80 | CA | 01 | 24 | 00 | CA | 01 | 24 | 00 | 44 | 12 | CC | 00 | C6 | 00 | 9E | 00 |
| 12F90 | FC | 00 | 24 | 00 | 68 | 02 | 44 | 12 | BC | 00 | 88 | 00 | F5 | 03 | FC | 00 |
| 12FA0 | 02 | 00 | FC | 00 | 24 | 00 | 24 | 00 | 6E | 00 | 00 | 00 | 24 | 00 | C4 | 12 |
| 12FB0 | 34 | 00 | D4 | 12 | C6 | 00 | D4 | 12 | AC | 00 | 2E | 00 | 0F | 00 | CA | 01 |
| 12FC0 | 24 | 00 | CA | 01 | 96 | 12 | C8 | 00 | 9E | 00 | FC | 00 | F4 | 00 | 03 | 00 |
| 12FD0 | CC | 12 | FC | 00 | CA | 01 | 24 | 00 | CA | 01 | 44 | 12 | C8 | 00 | 9E | 00 |
| 12FE0 | FC | 00 | 24 | 00 | 6E | 00 | 00 | 00 | 24 | 00 | C4 | 12 | 34 | 00 | 24 | 00 |
| 12FF0 | 24 | 00 | 6E | 00 | 00 | 00 | 24 | 00 | C4 | 12 | 34 | 00 | 24 | 00 | D4 | 12 |
| 13000 | CC | 00 | C6 | 00 | 9E | 00 | FC | 00 | 24 | 00 | 6E | 00 | 00 | 00 | 24 | 00 |
| 13010 | C4 | 12 | 34 | 00 | 24 | 00 | 24 | 00 | 6E | 00 | 00 | 00 | 24 | 00 | C4 | 12 |
| 13020 | 34 | 00 | C8 | 12 | C8 | 00 | 9E | 00 | FC | 00 | 24 | 00 | 68 | 02 | 44 | 12 |
| 13030 | BC | 00 | 88 | 00 | F5 | 03 | FC | 00 | A6 | 12 | 24 | 00 | 22 | 00 | D8 | 12 |
| 13040 | 9E | 00 | FC | 00 | 24 | 00 | A6 | 12 | E0 | 12 | AC | 00 | 2E | 00 | 09 | 00 |
| 13050 | 24 | 00 | 9A | 12 | 4C | 00 | FC | 00 | 24 | 00 | 38 | 12 | 88 | 00 | E4 | 12 |
| 13060 | FC | 00 | 24 | 00 | 24 | 00 | EC | 12 | 24 | 00 | F0 | 12 | 36 | 00 | F4 | 12 |
| 13070 | B4 | 00 | 24 | 00 | EC | 12 | 24 | 00 | F0 | 12 | 36 | 00 | F8 | 12 | B0 | 00 |
| 13080 | C8 | 00 | 2E | 00 | 1D | 00 | 24 | 00 | 04 | 13 | 88 | 00 | 24 | 00 | 38 | 12 |
| 13090 | 88 | 00 | F2 | 00 | 08 | 00 | F2 | 00 | 0F | 00 | F2 | 00 | 13 | 00 | FC | 12 |
| 130A0 | FC | 00 | 24 | 00 | 08 | 13 | 24 | 00 | 62 | 00 | 40 | 00 | 94 | 00 | FC | 00 |
| 130B0 | 9E | 12 | 24 | 00 | 38 | 12 | 9E | 00 | 20 | 00 | 24 | 00 | 0C | 13 | 88 | 00 |
| 130C0 | 62 | 00 | 60 | 00 | 65 | 01 | FC | 00 | AA | 12 | C4 | 01 | 24 | 00 | 9E | 12 |
| 130D0 | 38 | 00 | 9E | 00 | FC | 00 | 24 | 00 | 18 | 00 | 62 | 00 | AA | 12 | 24 | 00 |
| 130E0 | 08 | 13 | 24 | 00 | 62 | 00 | 40 | 00 | C8 | 00 | 38 | 12 | AC | 00 | 2E | 00 |
| 130F0 | 0F | 00 | 54 | 00 | 01 | 00 | 37 | 02 | 45 | 02 | 2A | 00 | 2B | 00 | AA | 12 |

```
13100   24 00 18 00 62 00 AA 12 24 00 08 13 24 00 62 00
13110   40 00 C8 00 24 00 44 12 D6 00 24 00 10 13 24 00
13120   62 00 40 00 9E 00 FC 00 24 00 9E 12 D4 12 BE 00
13130   44 12 BA 00 8A 00 D0 00 28 00 24 00 9E 12 44 12
13140   BA 00 90 00 24 00 24 00 9E 12 44 12 BA 00 90 00
13150   A0 00 44 12 BC 00 D8 00 94 00 FC 00 24 00 AA 12
13160   14 13 AC 00 2E 00 0F 00 18 13 94 00 54 00 01 00
13170   F9 02 A9 02 FC 00 24 00 24 00 EC 12 24 00 F0 12
13180   36 00 F4 12 B4 00 24 00 EC 12 24 00 F0 12 36 00
13190   F8 12 B0 00 C8 00 2E 00 1D 00 24 00 38 12 88 00
131A0   24 00 04 13 88 00 F2 00 0B 00 F2 00 0F 00 F2 00
131B0   13 00 FC 12 FC 00 24 00 AA 12 A0 00 F8 12 B4 00
131C0   2E 00 11 00 A2 12 24 00 AA 12 A0 00 9E 00 2A 00
131D0   0B 00 A2 12 24 00 F8 12 9E 00 FC 00 28 00 AA 12
131E0   24 00 A2 12 D4 00 94 00 FC 00 24 00 24 00 EC 12
131F0   24 00 F0 12 36 00 F4 12 B4 00 24 00 EC 12 24 00
13200   F0 12 36 00 F8 12 B0 00 C8 00 2E 00 1D 00 24 00
13210   04 13 88 00 24 00 38 12 88 00 F2 00 0B 00 F2 00
13220   0F 00 F2 00 13 00 FC 12 FC 00 5E 00 FC 00 24 00
13230   A6 12 88 00 E4 12 FC 00 02 00 FC 00 9E 12 24 00
13240   38 12 9E 00 20 00 24 00 0C 13 88 00 62 00 60 00
13250   11 00 FC 00 C4 01 24 00 9E 12 38 00 94 00 7A 00
13260   FC 00 5E 00 FC 00 02 00 FC 00 02 00 9E 00 2A 00
13270   00 00 0C 00 0C 00 24 13 24 00 28 00 28 00 06 00
13280   C0 00 CA 00 EC 12 BC 00 9E 00 FC 00 24 00 24 13
13290   44 12 B4 00 24 13 28 13 B0 00 C8 00 2E 00 09 00
132A0   24 00 40 12 4C 00 FC 00 08 00 24 13 FD 03 FC 00
132B0   02 00 88 00 24 00 38 12 88 00 F2 00 0B 00 F2 00
132C0   00 00 84 02 94 02 04 00 A0 02 20 00 0E 00 24 00
132D0   0A 00 F8 12 BE 00 88 00 13 04 FC 00 02 00 24 00
132E0   00 00 AC 02 BA 02 04 00 C6 02 20 00 0E 00 0A 00
132F0   1D 04 FC 00 02 00 24 00 9E 12 38 00 94 00 7A 00
13300   00 00 04 00 24 00 06 00 44 12 B4 00 06 00 8A 12
13310   B0 00 C8 00 2E 00 09 00 28 00 14 13 82 00 28 00
13320   C4 01 24 00 06 00 44 12 BC 00 38 00 82 00 02 00
13330   00 00 0C 00 2C 13 24 00 28 00 28 00 06 00 C0 00
13340   CA 00 EC 12 BC 00 9E 00 FC 00 24 00 2C 13 44 12
13350   B4 00 2C 13 28 13 B0 00 C8 00 2E 00 09 00 24 00
13360   40 12 4C 00 FC 00 30 13 2C 13 27 04 FC 00 28 00
13370   30 13 82 00 02 00 88 00 13 04 FC 00 02 00 7A 00
13380   00 00 02 00 BA 02 04 00 C6 02 20 00 0E 00 0A 00
13390   00 00 D2 02 1A 00 24 00 18 00 1A 00 08 00 A4 00
133A0   8A 12 AE 00 2E 00 09 00 24 00 40 12 4C 00 FC 00
133B0   24 00 18 00 1A 00 08 00 A2 00 3A 13 B4 00 2E 00
133C0   09 00 24 00 40 12 4C 00 FC 00 36 13 24 00 44 12
133D0   9E 00 20 00 24 00 3E 13 88 00 62 00 60 00 2F 00
133E0   FC 00 18 00 08 00 24 00 36 13 44 12 BC 00 38 00
133F0   24 00 24 00 24 00 6E 00 00 00 24 00 42 13 34 00
13400   24 00 36 13 46 13 BA 00 36 00 9E 00 FC 00 5E 00
13410   FC 00 36 13 24 00 38 12 9E 00 20 00 24 00 4A 13
13420   88 00 62 00 60 00 25 00 FC 00 18 00 08 00 24 00
13430   3E 13 36 13 BA 00 38 00 24 00 24 00 CE 01 24 00
13440   D2 01 36 13 BA 00 36 00 9E 00 FC 00 5E 00 FC 00
13450   02 00 18 00 1A 00 08 00 A2 00 3A 13 B4 00 2E 00
13460   00 00 E2 02 18 00 24 00 18 00 1A 00 08 00 A4 00
13470   8A 12 AE 00 2E 00 09 00 24 00 40 12 4C 00 FC 00
13480   24 00 18 00 1A 00 08 00 A2 00 3A 13 B4 00 2E 00
13490   09 00 24 00 40 12 4C 00 FC 00 4E 13 24 00 44 12
134A0   9E 00 20 00 24 00 3E 13 88 00 62 00 60 00 2F 00
134B0   FC 00 24 00 24 00 6E 00 00 00 24 00 42 13 34 00
134C0   24 00 4E 13 46 13 BA 00 36 00 24 00 18 00 08 00
134D0   24 00 4E 13 44 12 BC 00 38 00 9E 00 FC 00 5E 00
134E0   FC 00 4E 13 24 00 38 12 9E 00 20 00 24 00 4A 13
134F0   88 00 62 00 60 00 25 00 FC 00 24 00 CE 01 24 00
13500   D2 01 4E 13 BA 00 36 00 24 00 18 00 08 00 24 00
```

| | | | | | | | | | | | | | | | | |
|---|---|---|---|---|---|---|---|---|---|---|---|---|---|---|---|---|
| 13510 | 4E | 13 | 3E | 13 | BA | 00 | 38 | 00 | 9E | 00 | FC | 00 | 5E | 00 | FC | 00 |
| 13520 | 02 | 00 | 18 | 00 | 1A | 00 | 08 | 00 | A2 | 00 | 3A | 13 | B4 | 00 | 2E | 00 |
| 13530 | 00 | 00 | F4 | 02 | 24 | 00 | EE | 02 | 44 | 12 | AC | 00 | 2E | 00 | 37 | 00 |
| 13540 | 24 | 00 | 24 | 00 | 6E | 00 | 00 | 00 | 24 | 00 | 42 | 13 | 34 | 00 | 24 | 00 |
| 13550 | 8A | 12 | 36 | 00 | 24 | 00 | 24 | 00 | 24 | 00 | 6E | 00 | 00 | 00 | 24 | 00 |
| 13560 | 42 | 13 | 34 | 00 | 24 | 00 | 8A | 12 | 36 | 00 | 52 | 13 | C6 | 00 | 9E | 00 |
| 13570 | 2A | 00 | 33 | 00 | 24 | 00 | 24 | 00 | 6E | 00 | 00 | 00 | 24 | 00 | 42 | 13 |
| 13580 | 34 | 00 | 24 | 00 | 8A | 12 | 36 | 00 | 24 | 00 | 24 | 00 | 24 | 00 | 6E | 00 |
| 13590 | 00 | 00 | 24 | 00 | 42 | 13 | 34 | 00 | 24 | 00 | 8A | 12 | 36 | 00 | 56 | 13 |
| 135A0 | C8 | 00 | 9E | 00 | FC | 00 | 02 | 00 | 24 | 00 | 18 | 00 | 08 | 00 | 24 | 00 |
| 135B0 | 00 | 00 | E4 | 13 | EE | 13 | 24 | 00 | 38 | 12 | 9E | 00 | 20 | 00 | 24 | 00 |
| 135C0 | 5E | 13 | 88 | 00 | 62 | 00 | 60 | 00 | 1D | 00 | FC | 00 | 24 | 00 | CE | 01 |
| 135D0 | 24 | 00 | D2 | 01 | EE | 13 | BA | 00 | 62 | 13 | BA | 00 | 36 | 00 | 24 | 00 |
| 135E0 | 38 | 12 | 9E | 00 | FC | 00 | 5E | 00 | FC | 00 | 02 | 00 | 34 | 00 | 24 | 00 |
| 135F0 | 00 | 00 | CE | 01 | D2 | 01 | CD | 03 | FC | 00 | CA | 01 | 24 | 00 | CA | 01 |
| 13600 | 24 | 00 | 44 | 12 | CC | 00 | C6 | 00 | 9E | 00 | FC | 00 | 24 | 00 | 44 | 12 |
| 13610 | 88 | 00 | 66 | 13 | 32 | 01 | FC | 00 | 24 | 00 | 96 | 12 | 88 | 00 | 28 | 00 |
| 13620 | 70 | 13 | 24 | 00 | 08 | 13 | 24 | 00 | 62 | 00 | 40 | 00 | 88 | 00 | 32 | 01 |
| 13630 | FC | 00 | 24 | 00 | 62 | 13 | 88 | 00 | 28 | 00 | 78 | 13 | 24 | 00 | 82 | 13 |
| 13640 | 24 | 00 | 62 | 00 | 40 | 00 | 88 | 00 | 32 | 01 | FC | 00 | 24 | 00 | F4 | 12 |
| 13650 | 88 | 00 | 28 | 00 | 86 | 13 | 24 | 00 | 82 | 13 | 24 | 00 | 62 | 00 | 40 | 00 |
| 13660 | 88 | 00 | 32 | 01 | FC | 00 | 24 | 00 | 90 | 13 | 88 | 00 | 94 | 13 | 32 | 01 |
| 13670 | FC | 00 | 24 | 00 | F8 | 12 | 88 | 00 | 28 | 00 | A2 | 13 | 24 | 00 | 08 | 13 |
| 13680 | 24 | 00 | 62 | 00 | 40 | 00 | 88 | 00 | 32 | 01 | FC | 00 | 24 | 00 | 04 | 13 |
| 13690 | 88 | 00 | 28 | 00 | AA | 13 | 24 | 00 | 82 | 13 | 24 | 00 | 62 | 00 | 40 | 00 |
| 136A0 | 88 | 00 | 32 | 01 | FC | 00 | 24 | 00 | D4 | 12 | 88 | 00 | 28 | 00 | BA | 13 |
| 136B0 | 24 | 00 | 82 | 13 | 24 | 00 | 62 | 00 | 40 | 00 | 88 | 00 | 32 | 01 | FC | 00 |
| 136C0 | 24 | 00 | 0C | 13 | 88 | 00 | CA | 13 | 32 | 01 | FC | 00 | 24 | 00 | 8A | 12 |
| 136D0 | 88 | 00 | D4 | 13 | 32 | 01 | FC | 00 | 24 | 00 | 24 | 00 | 6E | 00 | 00 | 00 |
| 136E0 | 24 | 00 | C4 | 12 | 34 | 00 | C8 | 12 | C6 | 00 | C8 | 12 | AC | 00 | 2E | 00 |
| 136F0 | 09 | 00 | F4 | 00 | 05 | 00 | 3C | 01 | FC | 00 | 02 | 00 | 62 | 00 | 40 | 00 |
| 13700 | 01 | 00 | 00 | 00 | 00 | 00 | 00 | 00 | 00 | 00 | 00 | 00 | 00 | 00 | 00 | 00 |
| 13710 | CF | 00 | 1A | 00 | 00 | 00 | 5C | 00 | 06 | 00 | 00 | 00 | 23 | 00 | 00 | 00 |
| 13720 | 00 | 00 | 00 | 00 | 53 | 59 | 53 | 43 | 41 | 4C | 4C | 00 | 00 | 00 | 00 | 00 |
| 13730 | 50 | 01 | 02 | 00 | 6B | 00 | 06 | 00 | 40 | 00 | 50 | 01 | 00 | 00 | 6F | 00 |
| 13740 | 00 | 00 | 61 | 00 | 50 | 01 | 02 | 00 | 70 | 00 | 06 | 00 | 80 | 00 | 50 | 01 |
| 13750 | 00 | 00 | 74 | 00 | 00 | 00 | A1 | 00 | 50 | 01 | 02 | 00 | 75 | 00 | 06 | 00 |
| 13760 | C0 | 00 | 50 | 01 | 00 | 00 | 79 | 00 | 00 | 00 | E1 | 00 | 50 | 01 | 02 | 00 |
| 13770 | 7A | 00 | 06 | 00 | 00 | 01 | 50 | 01 | 00 | 00 | 7E | 00 | 00 | 00 | 21 | 01 |
| 13780 | 50 | 01 | 02 | 00 | 7F | 00 | 06 | 00 | 40 | 01 | 50 | 01 | 00 | 00 | 83 | 00 |
| 13790 | 00 | 00 | 61 | 01 | 50 | 01 | 02 | 00 | 84 | 00 | 06 | 00 | 80 | 01 | 50 | 01 |
| 137A0 | 00 | 00 | 88 | 00 | 00 | 00 | A1 | 01 | 50 | 01 | 02 | 00 | 89 | 00 | 06 | 00 |
| 137B0 | C0 | 01 | 50 | 01 | 00 | 00 | 8D | 00 | 00 | 00 | E1 | 01 | 50 | 01 | 02 | 00 |
| 137C0 | 8E | 00 | 06 | 00 | 00 | 02 | 50 | 01 | 00 | 00 | 92 | 00 | 00 | 00 | 21 | 02 |
| 137D0 | 50 | 01 | 02 | 00 | 93 | 00 | 00 | 00 | 40 | 02 | 50 | 01 | 00 | 00 | 95 | 00 |
| 137E0 | 00 | 00 | 61 | 02 | 50 | 01 | 06 | 00 | 96 | 00 | 02 | 00 | 80 | 02 | 50 | 01 |
| 137F0 | 04 | 00 | A0 | 00 | 06 | 01 | A0 | 02 | 50 | 01 | 08 | 00 | B8 | 00 | 02 | 00 |
| 13800 | C0 | 02 | 50 | 01 | 00 | 00 | C1 | 00 | 00 | 00 | E0 | 02 | 50 | 01 | 02 | 00 |
| 13810 | C2 | 00 | 00 | 00 | 03 | 03 | 50 | 01 | 02 | 00 | D6 | 00 | 00 | 00 | 21 | 03 |
| 13820 | 02 | 01 | 00 | 00 | 02 | 01 | 02 | 00 | 02 | 01 | 04 | 00 | 02 | 01 | 06 | 00 |
| 13830 | 02 | 01 | 08 | 00 | 02 | 01 | 0A | 00 | 02 | 01 | 0C | 00 | 02 | 01 | 0E | 00 |
| 13840 | 02 | 01 | 10 | 00 | 14 | 01 | 00 | 00 | 00 | 00 | 00 | 00 | 00 | 00 | 00 | 00 |
| 13850 | 73 | 79 | 73 | 63 | 61 | 6C | 6C | 2E | 62 | 69 | 6E | 00 | 00 | 00 | 00 | 00 |
| 13860 | 0B | 53 | 59 | 53 | 49 | 4E | 54 | 00 | 00 | 21 | 00 | 0A | 53 | 48 | 45 | 4C |
| 13870 | 4C | 00 | 00 | 3B | 00 | 08 | 47 | 45 | 54 | 50 | 53 | 50 | 00 | 00 | 45 | 00 |
| 13880 | 00 | 54 | 01 | 87 | 01 | 0A | 00 | 01 | 00 | 01 | 00 | 01 | 00 | 01 | 00 | 01 |
| 13890 | 00 | 01 | 00 | 01 | 00 | 01 | 00 | 01 | 00 | 01 | 00 | 54 | 01 | 47 | 02 | 02 |
| 138A0 | 00 | 04 | 00 | 04 | 00 | 54 | 01 | 51 | 03 | 01 | 00 | 01 | 00 | 00 | 00 | 00 |
| 138B0 | 00 | 00 | 00 | 00 | 00 | 00 | 00 | 00 | 00 | 00 | 00 | 00 | 00 | 00 | 00 | 00 |
| 138C0 | 00 | 00 | 00 | 00 | 00 | 00 | 00 | 00 | 00 | 42 | 50 | 42 | 50 | 42 | 50 | 42 |
| 138D0 | 50 | 42 | 50 | 42 | 50 | 42 | 50 | 42 | 50 | 42 | 50 | 42 | 50 | 42 | 50 | 42 |
| 138E0 | 50 | 42 | 50 | 42 | 50 | 42 | 50 | 42 | 50 | 42 | 50 | 42 | 50 | 42 | 50 | 42 |
| 138F0 | 50 | 42 | 50 | 42 | 50 | 42 | 50 | 42 | 50 | 42 | 50 | 42 | 50 | 42 | 50 | 42 |
| 13900 | 50 | 42 | 50 | 42 | 50 | 42 | 50 | 42 | 50 | 42 | 50 | 42 | 50 | 42 | 50 | 42 |
| 13910 | 50 | 42 | 50 | 42 | 50 | 42 | 50 | 42 | 50 | 42 | 50 | 42 | 50 | 42 | 50 | 42 |

| | | | | | | | | | | | | | | | | |
|---|---|---|---|---|---|---|---|---|---|---|---|---|---|---|---|---|
| 13920 | 50 | 42 | 50 | 42 | 50 | 42 | 50 | 42 | 50 | 42 | 50 | 42 | 50 | 42 | 50 | 42 |
| 13930 | 50 | 42 | 50 | 42 | 50 | 42 | 50 | 42 | 50 | 42 | 50 | 42 | 50 | 42 | 50 | 42 |
| 13940 | 50 | 42 | 50 | 42 | 50 | 42 | 50 | 42 | 50 | 42 | 50 | 42 | 50 | 42 | 50 | 42 |
| 13950 | 50 | 42 | 50 | 42 | 50 | 42 | 50 | 42 | 50 | 42 | 50 | 42 | 50 | 42 | 50 | 42 |
| 13960 | 50 | 42 | 50 | 42 | 50 | 42 | 50 | 42 | 50 | 42 | 50 | 42 | 50 | 42 | 50 | 42 |
| 13970 | 50 | 42 | 50 | 42 | 50 | 42 | 50 | 42 | 50 | 42 | 50 | 42 | 50 | 42 | 50 | 42 |
| 13980 | 50 | 42 | 50 | 42 | 50 | 42 | 50 | 42 | 50 | 42 | 50 | 42 | 50 | 42 | 50 | 42 |
| 13990 | 50 | 42 | 50 | 42 | 50 | 42 | 50 | 42 | 50 | 42 | 50 | 42 | 50 | 42 | 50 | 42 |
| 139A0 | 50 | 42 | 50 | 42 | 50 | 42 | 50 | 42 | 50 | 42 | 50 | 42 | 50 | 42 | 50 | 42 |
| 139B0 | 50 | 42 | 50 | 42 | 50 | 42 | 50 | 42 | 50 | 42 | 50 | 42 | 50 | 42 | 50 | 42 |
| 139C0 | 50 | 42 | 50 | 42 | 50 | 42 | 50 | 42 | 50 | 42 | 50 | 42 | 50 | 42 | 50 | 42 |
| 139D0 | 50 | 42 | 50 | 42 | 50 | 42 | 50 | 42 | 50 | 42 | 50 | 42 | 50 | 42 | 50 | 42 |
| 139E0 | 50 | 42 | 50 | 42 | 50 | 42 | 50 | C5 | 9E | 28 | FF | 8B | 1F | D1 | E3 | D1 |
| 139F0 | E3 | 2B | C0 | 8E | D8 | 8B | 07 | 2E | A3 | 4D | 00 | 8B | 47 | 02 | 2E | A3 |
| 13A00 | 4F | 00 | C5 | 5E | B8 | 8E | 07 | C5 | 5E | A6 | FF | 37 | C5 | 5E | 94 | 8B |
| 13A10 | 3F | C5 | 5E | 82 | 8B | 37 | C5 | 9E | 70 | FF | 8B | 17 | C5 | 9E | 5E | FF |
| 13A20 | 8B | 0F | C5 | 9E | 4C | FF | FF | 37 | C5 | 9E | 3A | FF | 8B | 07 | 5B | 1F |
| 13A30 | 55 | 2E | 8C | 16 | 51 | 00 | 2E | 89 | 26 | 53 | 00 | 2E | A3 | 65 | 00 | 2E |
| 13A40 | 89 | 0E | 67 | 00 | B8 | 78 | 00 | B1 | 04 | D3 | E8 | 8C | C9 | 03 | C1 | 8E |
| 13A50 | D0 | BC | 0D | 01 | 2E | A1 | 65 | 00 | 2E | 8B | 0E | 67 | 00 | FA | 9C | 2E |
| 13A60 | FF | 1E | 4D | 00 | 2E | 8E | 16 | 51 | 00 | 2E | 8B | 26 | 53 | 00 | FB | 5D |
| 13A70 | 1E | 53 | 9C | C5 | 9E | 16 | FF | 8F | 07 | C5 | 9E | 3A | FF | 89 | 07 | C5 |
| 13A80 | 9E | 4C | FF | 8F | 07 | C5 | 9E | 5E | FF | 89 | 0F | C5 | 9E | 70 | FF | 89 |
| 13A90 | 17 | C5 | 5E | 82 | 89 | 37 | C5 | 5E | 94 | 89 | 3F | C5 | 5E | A6 | 8F | 07 |
| 13AA0 | C5 | 5E | B8 | 8C | 07 | F8 | CB | 0E | 1F | 55 | B4 | 0F | CD | 10 | A2 | 55 |
| 13AB0 | 00 | 88 | 3E | 56 | 00 | B4 | 03 | CD | 10 | 89 | 16 | 57 | 00 | B8 | 03 | 00 |
| 13AC0 | CD | 10 | B4 | 14 | 9C | 36 | FF | 1E | 12 | 03 | 70 | 4D | 2B | FF | 8E | C7 |
| 13AD0 | FA | BF | 24 | 00 | 8B | 04 | 26 | 87 | 05 | 2E | A3 | 5D | 00 | 8B | 44 | 02 |
| 13AE0 | 26 | 87 | 45 | 02 | 2E | A3 | 5F | 00 | BF | 58 | 00 | 8B | 44 | 08 | 26 | 87 |
| 13AF0 | 05 | 2E | A3 | 61 | 00 | 8B | 44 | 0A | 26 | 87 | 45 | 02 | 2E | A3 | 63 | 00 |
| 13B00 | BF | 6C | 00 | 8B | 44 | 0C | 26 | 87 | 05 | 2E | A3 | 59 | 00 | 8B | 44 | 0E |
| 13B10 | 26 | 87 | 45 | 02 | FB | 2E | A3 | 5B | 00 | 5D | C5 | 56 | B8 | C4 | 5E | A6 |
| 13B20 | 55 | 2E | 8C | 16 | 51 | 00 | 2E | 89 | 26 | 53 | 00 | B8 | 78 | 00 | B1 | 04 |
| 13B30 | D3 | E8 | 8C | C9 | 03 | C1 | 8E | D0 | BC | 0D | 01 | B8 | 00 | 4B | FC | CD |
| 13B40 | 21 | 9F | FA | 2E | 8E | 16 | 51 | 00 | 2E | 8B | 26 | 53 | 00 | FB | 5D | 9E |
| 13B50 | 73 | 03 | B8 | 02 | 04 | 0E | 1F | 50 | 9C | A0 | 55 | 00 | 8A | 3E | 56 | 00 |
| 13B60 | B4 | 00 | CD | 10 | 8B | 16 | 57 | 00 | B4 | 02 | CD | 10 | B4 | 14 | 9C | 36 |
| 13B70 | FF | 1E | 12 | 03 | 70 | 38 | 0E | 1F | 2B | FF | 8E | C7 | BF | 6C | 00 | A1 |
| 13B80 | 59 | 00 | FA | 26 | 89 | 05 | A1 | 5B | 00 | 26 | 89 | 45 | 02 | BF | 24 | 00 |
| 13B90 | A1 | 5D | 00 | 26 | 89 | 05 | A1 | 5F | 00 | 26 | 89 | 45 | 02 | BF | 58 | 00 |
| 13BA0 | A1 | 61 | 00 | 26 | 89 | 05 | A1 | 63 | 00 | 26 | 89 | 45 | 02 | FB | 9D | 5B |
| 13BB0 | CB | 9C | 36 | FF | 1E | 22 | 03 | C5 | 76 | B8 | 89 | 04 | F8 | CB | 00 | 00 |
| 13BC0 | 12 | 01 | 00 | 00 | 0E | 01 | 04 | 03 | 06 | 37 | 24 | 00 | 00 | 01 | FF | 7F |
| 13BD0 | 12 | 01 | 00 | 00 | 12 | 01 | 00 | 00 | 12 | 01 | 00 | 00 | 12 | 01 | 00 | 00 |
| 13BE0 | 0E | 01 | 04 | 03 | 06 | 37 | 3F | 00 | 12 | 01 | 00 | 00 | 12 | 01 | 00 | 00 |
| 13BF0 | 12 | 01 | 00 | 00 | 04 | 01 | 00 | 00 | 00 | 01 | 0A | 00 | 00 | 01 | 02 | 04 |
| 13C00 | 00 | 01 | 01 | 00 | 00 | 00 | 1E | 00 | 01 | 00 | 0E | 00 | 42 | 01 | 1E | 00 |
| 13C10 | 01 | 00 | 00 | 00 | 1A | 01 | 12 | 00 | D6 | 05 | 10 | 01 | 30 | 00 | 00 | 00 |
| 13C20 | 0E | 00 | 01 | 01 | 0E | 00 | 44 | 01 | 07 | 00 | 02 | 00 | 00 | 00 | 1A | 01 |
| 13C30 | 36 | 00 | F0 | 05 | 00 | 00 | FF | 00 | 01 | 00 | 0E | 00 | 42 | 01 | FF | 00 |
| 13C40 | 01 | 00 | 00 | 00 | 1A | 01 | 44 | 00 | 06 | 06 | 18 | 01 | 00 | 00 | FF | 00 |
| 13C50 | 04 | 01 | 02 | 01 | 04 | 01 | 04 | 01 | 10 | 01 | 43 | 01 | 02 | 01 | 4A | 01 |
| 13C60 | 02 | 01 | 4C | 01 | 16 | 01 | 4E | 01 | 0A | 00 | 16 | 01 | 5A | 01 | 40 | 00 |
| 13C70 | 02 | 01 | 9C | 01 | 00 | 01 | 00 | 00 | 00 | 01 | 2C | 00 | 14 | 01 | 08 | 00 |
| 13C80 | 3D | 43 | 45 | 50 | 53 | 4D | 4F | 43 | 00 | 01 | 03 | 04 | 00 | 01 | 3F | 00 |
| 13C90 | 00 | 01 | 90 | 02 | 00 | 01 | 18 | 00 | 14 | 01 | 03 | 00 | 20 | 63 | 2F | 00 |
| 13CA0 | 00 | 01 | 0D | 00 | 00 | 01 | 02 | 00 | 00 | 01 | 03 | 00 | 00 | 01 | 5C | 00 |
| 13CB0 | 00 | 01 | 04 | 00 | 00 | 01 | 05 | 00 | 00 | 01 | 6C | 00 | 00 | 01 | 06 | 00 |
| 13CC0 | 04 | 01 | 00 | 00 | 16 | 01 | 4E | 01 | 0A | 00 | 16 | 01 | 5A | 01 | 40 | 00 |
| 13CD0 | 00 | 00 | 02 | 00 | 00 | 01 | 00 | 00 | 00 | 01 | 2C | 00 | 14 | 01 | 08 | 00 |
| 13CE0 | 00 | 00 | 08 | 00 | 90 | 05 | 26 | 00 | 06 | 00 | 94 | 05 | C2 | 00 | 9E | 00 |
| 13CF0 | FC | 00 | 26 | 00 | 90 | 05 | 9C | 05 | B0 | 00 | 84 | 00 | 2E | 00 | 13 | 00 |
| 13D00 | F0 | 01 | 26 | 00 | 90 | 05 | 94 | 05 | BC | 00 | 9E | 00 | 2A | 00 | 0B | 00 |
| 13D10 | F0 | 01 | 26 | 00 | 90 | 05 | 9E | 00 | FC | 00 | 02 | 00 | 01 | 0C | 58 | C6 |

```
13D20   00 00 24 00 F0 01 82 00 02 00 55 D3 C5 D3 D9 D3
13D30   00 00 08 00 A0 05 26 00 06 00 94 05 C2 00 9E 00
13D40   FC 00 26 00 A0 05 9C 05 B0 00 84 00 2E 00 13 00
13D50   F4 01 26 00 A0 05 94 05 BC 00 9E 00 2A 00 0B 00
13D60   F4 01 26 00 A0 05 9E 00 FC 00 02 00 2A 00 0B 00
13D70   00 00 24 00 F4 01 82 00 02 00 02 00 58 C6 C5 D2
13D80   00 00 08 00 A4 05 26 00 06 00 94 05 C2 00 9E 00
13D90   FC 00 26 00 A4 05 9C 05 B0 00 84 00 2E 00 13 00
13DA0   F8 01 26 00 A4 05 94 05 BC 00 9E 00 2A 00 0B 00
13DB0   F8 01 26 00 A4 05 9E 00 FC 00 02 00 2A 00 0B 00
13DC0   00 00 24 00 F8 01 82 00 02 00 02 00 50 01 5A 01
13DD0   00 00 08 00 A8 05 26 00 06 00 94 05 C2 00 9E 00
13DE0   FC 00 26 00 A8 05 9C 05 B0 00 84 00 2E 00 13 00
13DF0   FC 01 26 00 A8 05 94 05 BC 00 9E 00 2A 00 0B 00
13E00   FC 01 26 00 A8 05 9E 00 FC 00 02 00 2A 00 0B 00
13E10   00 00 24 00 FC 01 82 00 02 00 02 00 2A 00 0B 00
13E20   00 00 08 00 AC 05 26 00 06 00 B0 05 C2 00 9E 00
13E30   FC 00 26 00 AC 05 9C 05 B0 00 84 00 2E 00 13 00
13E40   00 02 26 00 AC 05 94 05 BC 00 9E 00 2A 00 0B 00
13E50   00 02 26 00 AC 05 9E 00 FC 00 02 00 2A 00 0B 00
13E60   00 00 24 00 00 02 82 00 02 00 02 00 2A 00 0B 00
13E70   00 00 08 00 B8 05 26 00 06 00 94 05 C2 00 9E 00
13E80   FC 00 26 00 B8 05 9C 05 B0 00 84 00 2E 00 13 00
13E90   04 02 26 00 B8 05 94 05 BC 00 9E 00 2A 00 0B 00
13EA0   04 02 26 00 B8 05 9E 00 FC 00 02 00 2A 00 0B 00
13EB0   00 00 24 00 04 02 82 00 02 00 02 00 2A 00 0B 00
13EC0   00 00 08 00 BC 05 26 00 06 00 94 05 C2 00 9E 00
13ED0   FC 00 26 00 BC 05 9C 05 B0 00 84 00 2E 00 13 00
13EE0   0C 02 26 00 BC 05 9C 05 BC 00 9E 00 2A 00 0B 00
13EF0   0C 02 26 00 BC 05 9E 00 FC 00 02 00 2A 00 0B 00
13F00   00 00 24 00 0C 02 82 00 02 00 02 00 2A 00 0B 00
13F10   00 00 08 00 C0 05 26 00 06 00 94 05 C2 00 9E 00
13F20   FC 00 26 00 C0 05 9C 05 B0 00 84 00 2E 00 13 00
13F30   08 02 26 00 C0 05 94 05 BC 00 9E 00 2A 00 0B 00
13F40   08 02 26 00 C0 05 9E 00 FC 00 02 00 2A 00 0B 00
13F50   00 00 24 00 08 02 82 00 02 00 02 00 2A 00 0B 00
13F60   00 00 04 00 10 02 06 00 F0 01 F4 01 F8 01 FC 01
13F70   00 02 04 02 0C 02 08 02 51 02 FC 00 02 00 9E 00
13F80   00 00 24 00 10 02 82 00 02 00 84 00 2E 00 13 00
13F90   00 00 0C 00 1A 00 04 00 24 00 18 00 1A 00 08 00
13FA0   A4 00 C8 05 AE 00 2E 00 09 00 24 00 CC 05 4C 00
13FB0   FC 00 24 00 06 00 14 02 AC 00 2E 00 09 00 24 00
13FC0   CC 05 4C 00 FC 00 24 00 18 00 1A 00 08 00 A2 00
13FD0   06 00 A0 00 B6 00 2E 00 09 00 24 00 CC 05 4C 00
13FE0   FC 00 C4 05 24 00 D0 05 9E 00 20 00 24 00 06 00
13FF0   A0 00 88 00 62 00 60 00 2D 00 FC 00 18 00 08 00
14000   14 00 0A 00 D0 05 BC 00 C4 05 BA 00 38 00 24 00
14010   28 00 28 00 06 00 24 00 C4 05 24 00 D0 05 D6 00
14020   CA 00 9E 00 FC 00 5E 00 FC 00 02 00 08 00 A2 00
14030   00 00 0D 00 14 02 20 06 24 00 24 00 6E 00 00 00
14040   24 00 60 06 34 00 64 06 C6 00 9E 00 FC 00 24 06
14050   75 02 FC 00 24 00 24 06 44 06 B4 00 2E 00 13 00
14060   EA 05 26 00 24 06 94 05 BA 00 9E 00 2A 00 0B 00
14070   EA 05 24 00 24 06 9E 00 FC 00 1A 06 06 00 9E 00
14080   FC 00 24 00 1A 06 14 02 AE 00 58 00 2B 00 FC 00
14090   1A 06 28 00 68 06 1A 06 9E 00 FC 00 28 00 1A 06
140A0   24 00 70 06 24 00 62 00 40 00 88 00 14 06 24 00
140B0   D0 05 88 00 B4 01 FC 00 5A 00 FC 00 14 06 24 00
140C0   44 06 38 00 24 00 1A 06 A0 00 9E 00 FC 00 22 00
140D0   26 00 EA 05 88 00 DC 01 E4 05 24 00 44 06 88 00
140E0   B4 01 FC 00 FE 05 24 00 44 06 38 00 24 00 44 06
140F0   9E 00 FC 00 FE 05 24 00 D0 05 38 C0 24 00 14 06
14100   A8 00 9E 00 FC 00 FE 05 24 00 74 06 38 00 24 00
14110   14 06 AA 00 9E 00 FC 00 FE 05 24 00 78 06 38 00
14120   24 00 7C 06 9E 00 FC 00 FE 05 24 00 80 06 38 00
```

| | | | | | | | | | | | | | | | | |
|---|---|---|---|---|---|---|---|---|---|---|---|---|---|---|---|---|
| 14130 | 26 | 00 | EA | 05 | 9E | 00 | FC | 00 | FE | 05 | 24 | 00 | 84 | 06 | 38 | 00 |
| 14140 | 24 | 00 | 38 | 06 | 9E | 00 | FC | 00 | FE | 05 | 24 | 00 | 8C | 06 | 38 | 00 |
| 14150 | 26 | 00 | EA | 05 | 9E | 00 | FC | 00 | FE | 05 | E4 | 05 | 6B | 02 | FC | 00 |
| 14160 | 24 | 00 | 6E | 00 | 00 | 00 | 24 | 00 | 60 | 06 | 34 | 00 | 24 | 00 | 24 | 00 |
| 14170 | 6E | 00 | 00 | 00 | 24 | 00 | 60 | 06 | 34 | 00 | 24 | 00 | 64 | 06 | CC | 00 |
| 14180 | C6 | 00 | 9E | 00 | FC | 00 | 24 | 00 | 6E | 00 | 00 | 00 | 24 | 00 | 60 | 06 |
| 14190 | 34 | 00 | 24 | 00 | 24 | 00 | 6E | 00 | 00 | 00 | 24 | 00 | 60 | 06 | 34 | 00 |
| 141A0 | 20 | 06 | C8 | 00 | 9E | 00 | FC | 00 | 02 | 00 | 24 | 00 | 8C | 06 | 38 | 00 |
| 141B0 | 00 | 00 | 18 | 00 | 04 | 00 | 04 | 00 | 0E | 00 | 24 | 00 | 18 | 00 | 1A | 00 |
| 141C0 | 06 | 00 | A4 | 00 | C8 | 05 | AE | 00 | 2E | 00 | 09 | 00 | 24 | 00 | CC | 05 |
| 141D0 | 4C | 00 | FC | 00 | 24 | 00 | 18 | 00 | 1A | 00 | 06 | 00 | A2 | 00 | 0A | 00 |
| 141E0 | B4 | 00 | 2E | 00 | 09 | 00 | 24 | 00 | CC | 05 | 4C | 00 | FC | 00 | 0C | 00 |
| 141F0 | 14 | 02 | 9E | 00 | FC | 00 | 90 | 06 | 24 | 00 | D0 | 05 | 9E | 00 | 20 | 00 |
| 14200 | 24 | 00 | 0A | 00 | 88 | 00 | 62 | 00 | 60 | 00 | 23 | 00 | FC | 00 | 0C | 00 |
| 14210 | 24 | 00 | 18 | 00 | 06 | 00 | 24 | 00 | 08 | 00 | D0 | 05 | BC | 00 | 90 | 06 |
| 14220 | BA | 00 | 38 | 00 | 24 | 00 | 62 | 00 | 40 | 00 | BA | 00 | FC | 00 | 5E | 00 |
| 14230 | FC | 00 | 02 | 00 | 24 | 00 | 18 | 00 | 1A | 00 | 06 | 00 | A2 | 00 | 0A | 00 |
| 14240 | 00 | 00 | 02 | 00 | 09 | 00 | 24 | 00 | CC | 05 | 4C | 00 | FC | 00 | 0C | 00 |
| 14250 | 00 | 00 | 08 | 00 | 28 | 06 | 24 | 00 | 26 | 00 | 06 | 00 | 84 | 00 | 24 | 00 |
| 14260 | 48 | 06 | 34 | 00 | 9E | 00 | FC | 00 | 34 | 06 | 4C | 06 | 9E | 00 | FC | 00 |
| 14270 | 30 | 06 | 24 | 00 | 44 | 06 | 9E | 00 | FC | 00 | 58 | 00 | 91 | 00 | FC | 00 |
| 14280 | 2C | 06 | 24 | 00 | D0 | 05 | 9E | 00 | 20 | 00 | 24 | 00 | 34 | 06 | A0 | 00 |
| 14290 | 88 | 00 | 62 | 00 | 60 | 00 | 38 | 00 | FC | 00 | 24 | 00 | 26 | 00 | 28 | 06 |
| 142A0 | 64 | 00 | 24 | 00 | 30 | 06 | 36 | 00 | 28 | 00 | 28 | 00 | 34 | 06 | 24 | 00 |
| 142B0 | 2C | 06 | 24 | 00 | D0 | 05 | D6 | 00 | CA | 00 | AE | 00 | 2E | 00 | 05 | 00 |
| 142C0 | 02 | 00 | FC | 00 | 30 | 06 | 24 | 00 | 30 | 06 | D0 | 05 | BA | 00 | 9E | 00 |
| 142D0 | FC | 00 | 5E | 00 | FC | 00 | 24 | 00 | 2C | 06 | 34 | 06 | A0 | 00 | B0 | 00 |
| 142E0 | 2E | 00 | 05 | 00 | 02 | 00 | FC | 00 | 30 | 06 | 24 | 00 | 22 | 00 | 24 | 00 |
| 142F0 | 30 | 06 | 88 | 00 | E6 | 01 | 9E | 00 | FC | 00 | 24 | 00 | 30 | 06 | 44 | 06 |
| 14300 | AC | 00 | 2E | 00 | 09 | 00 | 24 | 00 | 58 | 06 | 4C | 00 | FC | 00 | 5C | 00 |
| 14310 | FC | 00 | 3A | 06 | 14 | 02 | 9E | 00 | FC | 00 | 2C | 06 | 24 | 00 | 44 | 06 |
| 14320 | 9E | 00 | 20 | 00 | 24 | 00 | 5C | 06 | 88 | 00 | 62 | 00 | 60 | 00 | 49 | 00 |
| 14330 | FC | 00 | 3A | 06 | 24 | 00 | 26 | 00 | 28 | 06 | 84 | 00 | 24 | 00 | 30 | 06 |
| 14340 | 36 | 00 | 24 | 00 | 62 | 00 | 40 | 00 | BA | 00 | FC | 00 | 24 | 00 | 26 | 00 |
| 14350 | 28 | 06 | 84 | 00 | 24 | 00 | 30 | 06 | D0 | 05 | BA | 00 | 36 | 00 | 44 | 06 |
| 14360 | AC | 00 | 2E | 00 | 05 | 00 | 02 | 00 | FC | 00 | 30 | 06 | 24 | 00 | 30 | 06 |
| 14370 | D0 | 05 | BA | 00 | 9E | 00 | FC | 00 | 5E | 00 | FC | 00 | 28 | 00 | 3A | 06 |
| 14380 | 82 | 00 | 02 | 00 | 24 | 00 | 5C | 06 | 88 | 00 | 62 | 00 | 60 | 00 | 49 | 00 |
| 14390 | 00 | 00 | 04 | 00 | 40 | 06 | 24 | 00 | 06 | 00 | 9E | 00 | FC | 00 | 58 | 00 |
| 143A0 | 28 | 00 | FC | 00 | 24 | 00 | 26 | 00 | 28 | 06 | 84 | 00 | 24 | 00 | 40 | 06 |
| 143B0 | 36 | 00 | 44 | 06 | AC | 00 | 2E | 00 | 05 | 00 | 02 | 00 | FC | 00 | 40 | 06 |
| 143C0 | 24 | 00 | 40 | 06 | D0 | 05 | BA | 00 | 9E | 00 | FC | 00 | 5C | 00 | FC | 00 |
| 143D0 | 24 | 00 | 26 | 00 | 28 | 06 | 84 | 00 | 24 | 00 | 40 | 06 | D0 | 05 | BA | 00 |
| 143E0 | 36 | 00 | 44 | 06 | AC | 00 | 2E | 00 | 0D | 00 | 24 | 00 | 44 | 06 | 82 | 00 |
| 143F0 | 2A | 00 | 0D | 00 | 24 | 00 | 40 | 06 | D0 | 05 | BA | 00 | 82 | 00 | 02 | 00 |
| 14400 | 01 | 00 | 00 | 00 | 00 | 00 | 00 | 00 | 00 | 00 | 00 | 00 | 00 | 00 | 00 | 00 |
| 14410 | 1C | 1C | C1 | 09 | 00 | 00 | 57 | 04 | 06 | 00 | 00 | 00 | B1 | 00 | 00 | 00 |
| 14420 | 00 | 00 | 14 | 24 | 00 | 00 | 00 | 00 | 00 | 00 | 00 | 00 | 00 | 00 | 00 | 00 |
| 14430 | 50 | 01 | 02 | 00 | 9D | 04 | 00 | 00 | 40 | 00 | 50 | 01 | 08 | 00 | 1B | 05 |
| 14440 | 00 | 00 | 60 | 00 | 50 | 01 | 06 | 00 | 6D | 05 | 00 | 00 | 80 | 00 | 50 | 01 |
| 14450 | 00 | 00 | 79 | 05 | 00 | 00 | A1 | 00 | 50 | 01 | 04 | 00 | 8E | 05 | 00 | 00 |
| 14460 | C0 | 00 | 50 | 01 | 06 | 00 | 98 | 05 | 00 | 00 | E1 | 00 | 50 | 01 | 02 | 00 |
| 14470 | A4 | 05 | 00 | 00 | 01 | 01 | 50 | 01 | 00 | 00 | B1 | 05 | 00 | 00 | 21 | 01 |
| 14480 | 50 | 01 | 02 | 00 | B6 | 05 | 00 | 00 | 40 | 01 | 50 | 01 | 02 | 00 | E2 | 05 |
| 14490 | 00 | 00 | 60 | 01 | 50 | 01 | 04 | 00 | E8 | 05 | 00 | 00 | 80 | 01 | 50 | 01 |
| 144A0 | 00 | 00 | 0E | 06 | 00 | 00 | A0 | 01 | 50 | 01 | 10 | 00 | 41 | 08 | 00 | 00 |
| 144B0 | C0 | 01 | 50 | 01 | 0C | 00 | 4E | 08 | 00 | 00 | E1 | 01 | 50 | 01 | 00 | 00 |
| 144C0 | 57 | 08 | 00 | 00 | 00 | 02 | 50 | 01 | 00 | 00 | 52 | 0A | 00 | 00 | 20 | 02 |
| 144D0 | 50 | 01 | 02 | 00 | 6E | 0A | 00 | 00 | 43 | 02 | 50 | 01 | 00 | 00 | 74 | 0A |
| 144E0 | 00 | 00 | 61 | 02 | 50 | 01 | 02 | 00 | 9A | 0A | 00 | 00 | 80 | 02 | 50 | 01 |
| 144F0 | 00 | 00 | AB | 0A | 00 | 00 | A0 | 02 | 50 | 01 | 04 | 00 | CD | 0C | 00 | 00 |
| 14500 | C0 | 02 | 50 | 01 | 06 | 00 | 95 | 0D | 00 | 00 | E0 | 02 | 50 | 01 | 00 | 00 |
| 14510 | A0 | 0D | 00 | 00 | 01 | 03 | 50 | 01 | 02 | 00 | A4 | 0D | 00 | 00 | 20 | 03 |
| 14520 | 50 | 01 | 00 | 00 | C2 | 0D | 00 | 00 | 40 | 03 | 50 | 01 | 02 | 00 | CD | 0D |
| 14530 | 00 | 00 | 60 | 03 | 50 | 01 | 02 | 00 | D1 | 0D | 00 | 00 | 80 | 03 | 50 | 01 |

```
14540   00 00 D6 0D 00 00 A0 03 50 01 00 00 F4 0D 00 00
14550   C1 03 50 01 00 00 F7 0D 00 00 E0 03 50 01 02 00
14560   19 0E 00 00 00 04 50 01 04 00 1E 0E 00 00 20 04
14570   50 01 04 00 27 0E 00 00 40 04 50 01 02 00 2D 0E
14580   00 00 61 04 50 01 00 00 30 0E 00 00 80 04 50 01
14590   02 00 A6 10 00 00 A1 04 50 01 04 00 AA 10 00 00
145A0   C0 04 50 01 02 00 AD 10 00 00 E1 04 50 01 00 00
145B0   B5 10 00 00 00 05 50 01 02 00 F6 11 00 00 21 05
145C0   50 01 00 00 FD 11 00 00 40 05 50 01 00 00 0A 12
145D0   00 00 60 05 50 01 04 00 3E 12 00 00 81 05 50 01
145E0   02 00 5A 12 00 00 A1 05 50 01 00 00 5D 12 00 00
145F0   C0 05 50 01 00 00 6B 12 00 00 E0 05 50 01 02 00
14600   74 12 00 00 00 06 50 01 02 00 91 12 00 00 21 06
14610   50 01 00 00 A9 12 00 00 40 06 50 01 08 00 0E 13
14620   00 00 60 06 50 01 06 00 A2 13 00 00 81 06 50 01
14630   08 00 A8 13 00 00 A0 06 50 01 08 00 AD 13 00 00
14640   C0 06 50 01 04 00 BE 13 00 00 E0 06 50 01 04 00
14650   C3 13 00 00 00 07 50 01 02 00 CD 13 00 00 21 07
14660   50 01 00 00 D1 13 00 00 40 07 50 01 06 00 DF 13
14670   00 00 60 07 50 01 04 00 10 14 00 00 80 07 50 01
14680   02 00 5E 14 00 00 A3 07 50 01 04 00 7E 14 00 00
14690   C0 07 50 01 00 00 E2 14 00 00 E0 07 50 01 06 00
146A0   EB 14 00 00 00 08 50 01 02 00 F4 14 00 00 20 08
146B0   50 01 00 00 FA 14 00 00 44 08 50 01 06 00 4B 15
146C0   00 00 60 08 50 01 02 00 54 15 00 00 80 08 50 01
146D0   00 00 60 15 00 00 A1 08 50 01 00 00 69 15 00 00
146E0   C0 08 50 01 02 00 6D 15 00 00 E0 08 50 01 00 00
146F0   85 15 00 00 00 09 50 01 00 00 96 15 00 00 20 09
14700   50 01 04 00 A8 15 00 00 40 09 50 01 00 00 BF 15
14710   00 00 60 09 50 01 04 00 C8 15 00 00 80 09 50 01
14720   00 00 DD 15 00 00 A1 09 50 01 00 00 E1 15 00 00
14730   C0 09 50 01 00 00 E5 15 01 00 E1 09 50 01 00 00
14740   ED 15 00 00 00 0A 50 01 00 00 FF 15 00 00 20 0A
14750   50 01 02 00 26 16 00 00 40 0A 50 01 00 00 34 16
14760   00 00 60 0A 50 01 00 00 62 16 00 00 80 0A 50 01
14770   00 00 72 16 00 00 A0 0A 50 01 00 00 8F 16 00 00
14780   C0 0A 50 01 00 00 9A 16 00 00 E0 0A 50 01 00 00
14790   A1 16 00 00 00 0B 50 01 00 00 AA 16 00 00 20 0B
147A0   50 01 00 00 BB 16 00 00 40 0B 50 01 04 00 BF 16
147B0   00 00 60 0B 50 01 00 00 D5 16 00 00 81 0B 50 01
147C0   00 00 DB 16 00 00 A0 0B 50 01 02 00 DF 16 00 00
147D0   C0 0B 50 01 00 00 E1 16 00 00 E0 0B 50 01 00 00
147E0   11 17 00 00 00 0C 50 01 00 00 67 17 00 00 20 0C
147F0   50 01 00 00 98 17 00 00 40 0C 50 01 00 00 09 18
14800   00 00 60 0C 50 01 00 00 90 18 00 00 80 0C 50 01
14810   00 00 AA 18 00 00 A0 0C 50 01 00 00 08 19 00 00
14820   C0 0C 50 01 00 00 54 19 00 00 E0 0C 50 01 00 00
14830   B6 19 00 00 00 0D 50 01 00 00 EF 19 00 00 20 0D
14840   50 01 00 00 29 1A 00 00 40 0D 50 01 00 00 9D 1A
14850   00 00 64 0D 50 01 00 00 2D 1B 00 00 80 0D 50 01
14860   00 00 A7 1B 00 00 A0 0D 50 01 04 00 02 1C 00 00
14870   C0 0D 50 01 00 00 17 1C 00 00 E0 0D 50 01 00 00
14880   20 1C 00 00 01 0E 50 01 00 00 26 1C 00 00 20 0E
14890   08 01 00 00 08 01 01 00 08 01 02 00 08 01 03 00
148A0   08 01 04 00 08 01 05 00 08 01 06 00 08 01 07 00
148B0   08 01 08 00 08 01 09 00 08 01 0A 00 08 01 0B 00
148C0   08 01 0C 00 08 01 0D 00 08 01 0E 00 10 01 0F 00
148D0   10 01 15 00 02 01 1C 00 02 01 1E 00 02 01 20 00
148E0   02 01 22 00 02 01 24 00 02 01 26 00 02 01 28 00
148F0   02 01 2A 00 02 01 2C 00 02 01 2E 00 02 01 30 00
14900   02 01 32 00 02 01 34 00 02 01 36 00 00 00 20 01
14910   01 01 0E 00 44 01 90 00 02 00 00 00 1A 01 38 00
14920   DE 05 1A 01 58 01 DE 05 00 00 50 00 02 01 16 00
14930   44 01 14 00 02 00 00 00 40 01 02 00 28 00 00 00
14940   1A 01 78 02 FA 05 00 00 30 11 01 01 0E 00 44 01
14950   98 06 02 00 00 00 1A 01 C8 02 18 06 00 00 64 00
14960   02 00 16 00 42 01 0A 00 01 00 00 00 40 01 0A 00
```

```
14970   0A 00 00 00 1A 01 F8 13 2E 06 1A 01 5C 14 2E 06
14980   00 00 1E 00 03 00 1E 00 42 01 02 00 01 00 00 00
14990   40 01 03 00 02 00 00 00 40 01 05 00 06 00 00 00
149A0   1A 01 C0 14 52 06 00 00 A4 01 02 00 16 00 42 01
149B0   14 00 01 00 00 00 40 01 15 00 14 00 00 00 1A 01
149C0   DE 14 78 06 00 00 0B 00 01 00 0E 00 42 01 0B 00
149D0   01 00 00 00 1A 01 82 16 96 06 00 00 05 00 01 00
149E0   0E 00 42 01 05 00 01 00 00 00 1A 01 8D 16 AC 06
149F0   00 00 90 00 01 00 0E 00 42 01 90 00 01 00 00 00
14A00   1A 01 92 16 C2 06 1A 01 22 17 C2 06 1A 01 B2 17
14A10   C2 06 1A 01 42 18 C2 06 00 00 90 00 01 00 0E 00
14A20   42 01 90 00 01 00 00 00 1A 01 D2 18 EA 06 1A 01
14A30   62 19 EA 06 1A 01 F2 19 EA 06 00 00 90 00 01 00
14A40   0E 00 42 01 90 00 01 00 00 00 1A 01 82 1A 0C 07
14A50   1A 01 12 1B 0C 07 1A 01 A2 1B 0C 07 00 00 A3 0F
14A60   01 00 0E 00 42 01 A3 0F 01 00 00 00 1A 01 32 1C
14A70   2E 07 00 00 20 0A 01 03 0E 00 48 01 90 00 12 00
14A80   00 00 1A 01 D5 2B 44 07 00 00 20 0A 01 03 0E 00
14A90   48 01 90 00 12 00 00 00 1A 01 F5 35 5A 07 00 00
14AA0   20 0A 01 03 0E 00 48 01 90 00 12 00 00 00 1A 01
14AB0   15 40 70 07 00 00 C0 06 01 03 0E 00 48 01 90 00
14AC0   0C 00 00 00 1A 01 35 4A 86 07 00 00 C0 06 01 03
14AD0   0E 00 48 01 90 00 0C 00 00 00 1A 01 F5 50 9C 07
14AE0   16 01 B5 57 28 00 16 01 DF 57 0A 00 00 00 5A 00
14AF0   01 03 0E 00 48 01 05 00 12 00 00 00 1A 01 EB 57
14B00   BE 07 16 01 45 58 01 00 16 01 48 58 00 10 16 01
14B10   4A 68 01 00 16 01 4D 68 01 00 16 01 50 68 15 00
14B20   16 01 67 68 01 00 16 01 6A 68 01 00 16 01 6D 68
14B30   01 00 16 01 70 68 02 00 16 01 74 68 01 00 16 01
14B40   77 68 50 00 16 01 C9 68 04 00 16 01 CF 68 26 00
14B50   16 01 F7 68 01 00 16 01 FA 68 08 00 16 01 04 69
14B60   06 00 16 01 0C 69 01 00 16 01 0F 69 01 00 16 01
14B70   12 69 01 00 16 01 15 69 01 00 16 01 18 69 01 00
14B80   16 01 1B 69 05 00 16 01 22 69 10 00 00 00 60 03
14B90   01 02 0E 00 46 01 90 00 06 00 00 00 1A 01 34 69
14BA0   5E 08 1A 01 94 6C 5E 08 1A 01 F4 6F 5E 08 1A 01
14BB0   54 73 5E 08 51 00 0A 0F 56 00 46 01 00 00 06 00
14BC0   00 00 42 01 06 00 01 00 00 00 42 01 07 00 01 00
14BD0   00 00 42 01 08 00 01 00 00 00 48 01 09 00 0C 00
14BE0   00 00 48 01 15 00 0C 00 00 00 48 01 21 00 12 00
14BF0   00 00 48 01 33 00 12 00 00 00 46 01 45 00 06 00
14C00   00 00 46 01 4B 00 06 00 00 00 00 00 7E 00 01 02
14C10   0E 00 46 01 15 00 06 00 00 00 00 00 2A 00 01 01
14C20   0E 00 44 01 15 00 02 00 00 00 AA 00 04 0F 26 00
14C30   4C 01 00 00 7E 00 DC 08 4C 01 7E 00 2A 00 EC 08
14C40   42 01 A8 00 01 00 00 00 42 01 A9 00 01 00 00 00
14C50   20 01 B4 76 FA 08 20 01 5E 77 84 08 00 00 40 00
14C60   01 01 0E 00 44 01 20 00 02 00 00 00 00 00 40 00
14C70   01 01 0E 00 44 01 20 00 02 00 00 00 00 00 C0 01
14C80   01 03 0E 00 48 01 20 00 0E 00 00 00 40 02 03 0F
14C90   1E 00 4C 01 00 00 40 00 2E 09 4C 01 40 00 40 00
14CA0   3E 09 4C 01 80 00 C0 01 4E 09 20 01 AF 77 5C 09
14CB0   02 01 F0 79 16 01 F2 79 14 1E 08 01 08 98 03 01
14CC0   09 98 5A 01 12 00 98 09 FF FF 5C 43 4F 4E 4E 45
14CD0   43 54 00 44 49 53 43 00 54 4F 4E 45 00 4E 4F 54
14CE0   4F 4E 45 01 00 01 00 00 00 01 04 00 5A 01 12 00
14CF0   C2 09 FF FF 5C 57 52 49 54 45 00 53 45 54 43 4C
14D00   4B 00 43 4F 4E 54 52 45 47 01 5A 01 48 00 E0 09
14D10   FF FF 5C 54 4F 4E 45 01 5A 01 12 00 EE 09 FF FF
14D20   5C 53 54 41 54 55 53 01 5A 01 36 00 FE 09 FF FF
14D30   5C 54 4F 4E 45 01 5A 01 12 00 0C 0A FF FF 5C 43
14D40   41 52 44 53 01 00 5A 01 12 00 1C 0A FF FF 5C 4C
14D50   49 4E 45 01 5A 01 12 00 2A 0A FF FF 5C 43 4F 4E
14D60   4E 45 43 54 00 44 49 53 43 01 00 00 64 00 02 00
14D70   16 00 42 01 0A 00 01 00 00 00 40 01 0A 00 0A 00
```

| | | | | | | | | | | | | | | | | |
|---|---|---|---|---|---|---|---|---|---|---|---|---|---|---|---|---|
| 14D80 | 00 | 00 | 5A | 01 | 12 | 00 | 3C | 0A | 14 | 01 | 01 | 00 | 20 | 00 | 5A | 01 |
| 14D90 | 36 | 00 | 64 | 0A | FF | FF | 5C | 55 | 50 | 01 | 00 | 01 | 0F | 00 | 5A | 01 |
| 14DA0 | 12 | 00 | 74 | 0A | FF | FF | 5C | 44 | 49 | 53 | 50 | 4C | 41 | 59 | 00 | 47 |
| 14DB0 | 45 | 54 | 5F | 46 | 44 | 54 | 00 | 41 | 44 | 44 | 00 | 55 | 50 | 44 | 41 | 54 |
| 14DC0 | 45 | 00 | 44 | 49 | 53 | 50 | 4C | 41 | 59 | 5F | 42 | 55 | 46 | 46 | 45 | 52 |
| 14DD0 | 00 | 53 | 49 | 4E | 47 | 4C | 45 | 5F | 46 | 49 | 45 | 4C | 44 | 5F | 49 | 4E |
| 14DE0 | 50 | 55 | 54 | 00 | 53 | 4F | 52 | 54 | 00 | 47 | 45 | 54 | 5F | 55 | 53 | 45 |
| 14DF0 | 52 | 5F | 46 | 49 | 45 | 4C | 44 | 00 | 49 | 4E | 49 | 54 | 01 | 00 | 5A | 01 |
| 14E00 | 12 | 00 | D4 | 0A | FF | FF | 5C | 46 | 4C | 41 | 47 | 01 | 5A | 01 | 12 | 00 |
| 14E10 | E2 | 0A | FF | FF | 5C | 46 | 4C | 41 | 47 | 01 | 5A | 01 | 24 | 00 | F0 | 0A |
| 14E20 | FF | FF | 5C | 4F | 46 | 46 | 00 | 4F | 4E | 01 | 00 | 00 | 00 | 00 | 00 | 00 |
| 14E30 | 73 | 67 | 2E | 62 | 69 | 6E | 00 | 00 | 00 | 00 | 00 | 00 | 00 | 00 | 00 | 00 |
| 14E40 | 07 | 53 | 47 | 00 | 00 | 08 | 00 | 00 | 54 | 01 | 1C | 00 | 07 | 00 | 03 | 00 |
| 14E50 | 03 | 00 | 03 | 00 | 03 | 00 | 03 | 00 | 03 | 00 | 03 | 00 | E9 | 08 | 11 | 92 |
| 14E60 | 16 | EA | 16 | 41 | 17 | 9E | 17 | FB | 17 | 58 | 18 | AF | 18 | 06 | 19 | 00 |
| 14E70 | 00 | 00 | 00 | 00 | 00 | 00 | 00 | 00 | 00 | 00 | 00 | 00 | 00 | 00 | 00 | 00 |
| 14E80 | 00 | 00 | 00 | 00 | 00 | 00 | 00 | 00 | 00 | 00 | 00 | 01 | 00 | 00 | 00 | 00 |
| 14E90 | 00 | 00 | 00 | 00 | 00 | 00 | 00 | 00 | 00 | 00 | 00 | 00 | 00 | 00 | 00 | 00 |
| 14EA0 | 00 | 00 | 20 | 20 | 20 | 20 | 20 | 20 | 20 | 20 | 20 | 20 | 20 | 20 | 20 | 20 |
| 14EB0 | 20 | 20 | 20 | 20 | 20 | 20 | 20 | 20 | 20 | 20 | 20 | 20 | 20 | 20 | 20 | 20 |
| 14EC0 | 20 | 20 | 20 | 20 | 20 | 20 | 20 | 20 | 20 | 20 | 20 | 20 | 20 | 20 | 20 | 00 |
| 14ED0 | 20 | 20 | 20 | 20 | 20 | 20 | 20 | 20 | 00 | 00 | 20 | 20 | 20 | 20 | 20 | 20 |
| 14EE0 | 20 | 20 | 20 | 20 | 20 | 20 | 20 | 20 | 01 | 01 | 01 | 01 | 01 | 01 | 20 | 20 |
| 14EF0 | 20 | 20 | 20 | 20 | 20 | 20 | 20 | 20 | 20 | 20 | 20 | 20 | 20 | 20 | 20 | 20 |
| 14F00 | 20 | 20 | 20 | 20 | 20 | 20 | 20 | 20 | 20 | 20 | 20 | 20 | 20 | 20 | 20 | 20 |
| 14F10 | 20 | 20 | 20 | 20 | 20 | 20 | 20 | 20 | 20 | 20 | 20 | 20 | 20 | 20 | 20 | 20 |
| 14F20 | 20 | 20 | 20 | 20 | 20 | 20 | 20 | 20 | 20 | 20 | 20 | 20 | 20 | 20 | 20 | 20 |
| 14F30 | 20 | 20 | 20 | 20 | 20 | 20 | 20 | 20 | 20 | 20 | 20 | 20 | 20 | 20 | 00 | 00 |
| 14F40 | 00 | 00 | 00 | 00 | 00 | 20 | 20 | 20 | 20 | 20 | 20 | 20 | 20 | 20 | 20 | 20 |
| 14F50 | 20 | 20 | 20 | 20 | 20 | 20 | 20 | 20 | 20 | 20 | 20 | 20 | 20 | 20 | 20 | 20 |
| 14F60 | 20 | 20 | 20 | 20 | 20 | 20 | 20 | 20 | 20 | 20 | 20 | 20 | 20 | 20 | 20 | 20 |
| 14F70 | 20 | 20 | 20 | 20 | 20 | 20 | 20 | 20 | 20 | 20 | 20 | 20 | 20 | 20 | 20 | 20 |
| 14F80 | 20 | 20 | 20 | 20 | 20 | 20 | 20 | 20 | 20 | 20 | 20 | 20 | 20 | 20 | 20 | 20 |
| 14F90 | 20 | 20 | 20 | 20 | 20 | 20 | 20 | 20 | 20 | 20 | 20 | 20 | 20 | 20 | 20 | 20 |
| 14FA0 | 20 | 20 | 20 | 20 | 20 | 20 | 20 | 20 | 20 | 20 | 20 | 20 | 20 | 20 | 20 | 20 |
| 14FB0 | 20 | 20 | 20 | 20 | 20 | 20 | 20 | 20 | 20 | 20 | 20 | 20 | 20 | 20 | 20 | 20 |
| 14FC0 | 20 | 20 | 20 | 20 | 20 | 20 | 20 | 20 | 20 | 20 | 20 | 20 | 20 | 20 | 20 | 20 |
| 14FD0 | 20 | 20 | 20 | 20 | 20 | 20 | 20 | 20 | 20 | 20 | 20 | 20 | 20 | 20 | 20 | 20 |
| 14FE0 | 20 | 20 | 20 | 20 | 20 | 20 | 20 | 20 | 20 | 20 | 20 | 20 | 20 | 20 | 20 | 20 |
| 14FF0 | 20 | 20 | 20 | 20 | 20 | 20 | 20 | 20 | 20 | 20 | 20 | 20 | 20 | 20 | 20 | 20 |
| 15000 | 20 | 20 | 20 | 20 | 20 | 20 | 20 | 20 | 20 | 20 | 20 | 20 | 20 | 20 | 20 | 20 |
| 15010 | 20 | 20 | 20 | 20 | 20 | 20 | 20 | 20 | 20 | 20 | 20 | 20 | 20 | 20 | 20 | 20 |
| 15020 | 20 | 20 | 20 | 20 | 20 | 20 | 20 | 20 | 20 | 20 | 20 | 20 | 20 | 20 | 20 | 20 |
| 15030 | 20 | 20 | 20 | 20 | 20 | 20 | 20 | 20 | 20 | 20 | 20 | 20 | 20 | 20 | 20 | 20 |
| 15040 | 20 | 20 | 20 | 20 | 20 | 20 | 20 | 20 | 20 | 20 | 20 | 20 | 20 | 20 | 20 | 20 |
| 15050 | 20 | 20 | 20 | 20 | 20 | 20 | 20 | 20 | 20 | 20 | 20 | 20 | 20 | 20 | 20 | 20 |
| 15060 | 20 | 20 | 20 | 20 | 20 | 20 | 20 | 20 | 20 | 20 | 20 | 20 | 20 | 20 | 20 | 20 |
| 15070 | 20 | 20 | 20 | 20 | 20 | 20 | 20 | 20 | 20 | 20 | 20 | 20 | 20 | 20 | 20 | 20 |
| 15080 | 20 | 20 | 20 | 20 | 20 | 20 | 20 | 20 | 20 | 20 | 20 | 20 | 20 | 20 | 20 | 20 |
| 15090 | 20 | 20 | 20 | 20 | 20 | 20 | 20 | 20 | 20 | 20 | 20 | 20 | 20 | 20 | 20 | 20 |
| 150A0 | 20 | 20 | 20 | 20 | 20 | 20 | 20 | 20 | 20 | 20 | 20 | 20 | 20 | 20 | 20 | 20 |
| 150B0 | 20 | 20 | 20 | 20 | 20 | 20 | 20 | 20 | 20 | 20 | 20 | 20 | 20 | 20 | 20 | 20 |
| 150C0 | 20 | 20 | 20 | 20 | 20 | 20 | 20 | 20 | 20 | 20 | 20 | 20 | 20 | 20 | 20 | 20 |
| 150D0 | 20 | 20 | 20 | 20 | 20 | 20 | 20 | 20 | 20 | 20 | 20 | 20 | 20 | 20 | 20 | 20 |
| 150E0 | 20 | 20 | 20 | 20 | 20 | 20 | 20 | 20 | 20 | 20 | 20 | 20 | 20 | 20 | 20 | 20 |
| 150F0 | 20 | 20 | 20 | 20 | 20 | 20 | 20 | 20 | 20 | 20 | 20 | 20 | 20 | 20 | 20 | 20 |
| 15100 | 20 | 20 | 20 | 20 | 20 | 20 | 20 | 20 | 20 | 20 | 20 | 20 | 20 | 20 | 20 | 20 |
| 15110 | 20 | 20 | 20 | 20 | 20 | 20 | 20 | 20 | 20 | 20 | 20 | 20 | 20 | 20 | 20 | 20 |
| 15120 | 20 | 20 | 20 | 20 | 20 | 20 | 20 | 20 | 20 | 20 | 20 | 20 | 20 | 20 | 20 | 20 |
| 15130 | 20 | 20 | 20 | 20 | 20 | 20 | 20 | 20 | 20 | 20 | 20 | 20 | 20 | 20 | 20 | 20 |
| 15140 | 20 | 20 | 20 | 20 | 20 | 20 | 20 | 20 | 20 | 20 | 20 | 20 | 20 | 20 | 20 | 20 |
| 15150 | 20 | 20 | 20 | 20 | 20 | 20 | 20 | 20 | 20 | 20 | 20 | 20 | 20 | 20 | 20 | 20 |
| 15160 | 20 | 20 | 20 | 20 | 20 | 20 | 20 | 20 | 20 | 20 | 20 | 20 | 20 | 20 | 20 | 20 |
| 15170 | 20 | 20 | 20 | 20 | 20 | 20 | 20 | 20 | 20 | 20 | 20 | 20 | 20 | 20 | 20 | 20 |
| 15180 | 20 | 20 | 20 | 20 | 20 | 20 | 20 | 20 | 20 | 20 | 20 | 20 | 20 | 20 | 20 | 20 |

| | | | | | | | | | | | | | | | | |
|---|---|---|---|---|---|---|---|---|---|---|---|---|---|---|---|---|
| 15190 | 20 | 20 | 20 | 20 | 20 | 20 | 20 | 20 | 20 | 20 | 20 | 20 | 20 | 20 | 20 | 20 |
| 151A0 | 20 | 20 | 20 | 20 | 20 | 20 | 20 | 20 | 20 | 20 | 20 | 20 | 20 | 20 | 20 | 20 |
| 151B0 | 20 | 20 | 20 | 20 | 20 | 20 | 20 | 20 | 20 | 20 | 20 | 20 | 20 | 20 | 20 | 20 |
| 151C0 | 20 | 20 | 20 | 20 | 20 | 20 | 20 | 20 | 20 | 20 | 20 | 20 | 20 | 20 | 20 | 20 |
| 151D0 | 20 | 20 | 20 | 20 | 20 | 20 | 20 | 20 | 20 | 20 | 20 | 20 | 20 | 20 | 20 | 20 |
| 151E0 | 20 | 20 | 20 | 20 | 20 | 20 | 20 | 20 | 20 | 20 | 20 | 20 | 20 | 20 | 20 | 20 |
| 151F0 | 20 | 20 | 20 | 20 | 20 | 20 | 20 | 20 | 20 | 20 | 20 | 20 | 20 | 20 | 20 | 20 |
| 15200 | 20 | 20 | 20 | 20 | 20 | 20 | 20 | 20 | 20 | 20 | 20 | 20 | 20 | 20 | 20 | 20 |
| 15210 | 20 | 20 | 20 | 20 | 20 | 20 | 20 | 20 | 20 | 20 | 20 | 20 | 20 | 20 | 20 | 20 |
| 15220 | 20 | 20 | 20 | 20 | 20 | 20 | 20 | 20 | 20 | 20 | 20 | 20 | 20 | 20 | 20 | 20 |
| 15230 | 20 | 20 | 20 | 20 | 20 | 20 | 20 | 20 | 20 | 20 | 20 | 20 | 20 | 20 | 20 | 20 |
| 15240 | 20 | 20 | 20 | 20 | 20 | 20 | 20 | 20 | 20 | 20 | 20 | 20 | 20 | 20 | 20 | 20 |
| 15250 | 20 | 20 | 20 | 20 | 20 | 20 | 20 | 20 | 20 | 20 | 20 | 20 | 20 | 20 | 20 | 20 |
| 15260 | 20 | 20 | 20 | 20 | 20 | 20 | 20 | 20 | 20 | 20 | 20 | 20 | 20 | 20 | 20 | 20 |
| 15270 | 20 | 20 | 20 | 20 | 20 | 20 | 20 | 20 | 20 | 20 | 20 | 20 | 20 | 20 | 20 | 20 |
| 15280 | 20 | 20 | 20 | 20 | 20 | 20 | 20 | 20 | 20 | 20 | 20 | 20 | 20 | 20 | 20 | 20 |
| 15290 | 20 | 20 | 20 | 20 | 20 | 20 | 20 | 20 | 20 | 20 | 20 | 20 | 20 | 20 | 20 | 20 |
| 152A0 | 20 | 20 | 20 | 20 | 20 | 20 | 20 | 20 | 20 | 20 | 20 | 20 | 20 | 20 | 20 | 20 |
| 152B0 | 20 | 20 | 20 | 20 | 20 | 20 | 20 | 20 | 20 | 20 | 20 | 20 | 20 | 20 | 20 | 20 |
| 152C0 | 20 | 20 | 20 | 20 | 20 | 20 | 20 | 20 | 20 | 20 | 20 | 20 | 20 | 20 | 20 | 20 |
| 152D0 | 20 | 20 | 20 | 20 | 20 | 20 | 20 | 20 | 20 | 20 | 20 | 20 | 20 | 20 | 20 | 20 |
| 152E0 | 20 | 20 | 20 | 20 | 20 | 20 | 20 | 20 | 20 | 20 | 20 | 20 | 20 | 20 | 20 | 20 |
| 152F0 | 20 | 20 | 20 | 20 | 20 | 20 | 20 | 20 | 20 | 20 | 20 | 20 | 20 | 20 | 20 | 20 |
| 15300 | 20 | 20 | 20 | 20 | 20 | 20 | 20 | 20 | 20 | 20 | 20 | 20 | 20 | 20 | 20 | 20 |
| 15310 | 20 | 20 | 20 | 20 | 20 | 20 | 20 | 20 | 20 | 20 | 20 | 20 | 20 | 20 | 20 | 20 |
| 15320 | 20 | 20 | 20 | 20 | 20 | 20 | 20 | 20 | 20 | 20 | 20 | 20 | 20 | 20 | 20 | 20 |
| 15330 | 20 | 20 | 20 | 20 | 20 | 20 | 20 | 20 | 20 | 20 | 20 | 20 | 20 | 20 | 20 | 20 |
| 15340 | 20 | 20 | 20 | 20 | 20 | 20 | 20 | 20 | 20 | 20 | 20 | 20 | 20 | 20 | 20 | 20 |
| 15350 | 20 | 20 | 20 | 20 | 20 | 20 | 20 | 20 | 20 | 20 | 20 | 20 | 20 | 20 | 20 | 20 |
| 15360 | 20 | 20 | 20 | 20 | 20 | 20 | 20 | 20 | 20 | 20 | 20 | 20 | 20 | 20 | 20 | 20 |
| 15370 | 20 | 20 | 20 | 20 | 20 | 20 | 20 | 20 | 20 | 20 | 20 | 20 | 20 | 20 | 20 | 20 |
| 15380 | 20 | 20 | 20 | 20 | 20 | 20 | 20 | 20 | 20 | 20 | 20 | 20 | 20 | 20 | 20 | 20 |
| 15390 | 20 | 20 | 20 | 20 | 20 | 20 | 20 | 20 | 20 | 20 | 20 | 20 | 20 | 20 | 20 | 20 |
| 153A0 | 20 | 20 | 20 | 20 | 20 | 20 | 20 | 20 | 20 | 20 | 20 | 20 | 20 | 20 | 20 | 20 |
| 153B0 | 20 | 20 | 20 | 20 | 20 | 20 | 20 | 20 | 20 | 20 | 20 | 20 | 20 | 20 | 20 | 20 |
| 153C0 | 20 | 20 | 20 | 20 | 20 | 20 | 20 | 20 | 20 | 20 | 20 | 20 | 20 | 20 | 20 | 20 |
| 153D0 | 20 | 20 | 20 | 20 | 20 | 20 | 20 | 20 | 20 | 20 | 20 | 20 | 20 | 20 | 20 | 20 |
| 153E0 | 20 | 20 | 20 | 20 | 20 | 20 | 20 | 20 | 20 | 20 | 20 | 20 | 20 | 20 | 20 | 20 |
| 153F0 | 20 | 20 | 20 | 20 | 20 | 20 | 20 | 20 | 20 | 20 | 20 | 20 | 20 | 20 | 20 | 20 |
| 15400 | 20 | 20 | 20 | 20 | 20 | 20 | 20 | 20 | 20 | 20 | 20 | 20 | 20 | 20 | 20 | 20 |
| 15410 | 20 | 20 | 20 | 20 | 20 | 20 | 20 | 20 | 20 | 20 | 20 | 20 | 20 | 20 | 20 | 20 |
| 15420 | 20 | 20 | 20 | 20 | 20 | 20 | 20 | 20 | 20 | 20 | 20 | 20 | 20 | 20 | 20 | 20 |
| 15430 | 20 | 20 | 20 | 20 | 20 | 20 | 20 | 20 | 20 | 20 | 20 | 20 | 20 | 20 | 20 | 20 |
| 15440 | 20 | 20 | 20 | 20 | 20 | 20 | 20 | 20 | 20 | 20 | 20 | 20 | 20 | 20 | 20 | 20 |
| 15450 | 20 | 20 | 20 | 20 | 20 | 20 | 20 | 20 | 20 | 20 | 20 | 20 | 20 | 20 | 20 | 20 |
| 15460 | 20 | 20 | 20 | 20 | 20 | 20 | 20 | 20 | 20 | 20 | 20 | 20 | 20 | 20 | 20 | 20 |
| 15470 | 20 | 20 | 20 | 20 | 20 | 20 | 20 | 20 | 20 | 20 | 20 | 20 | 20 | 20 | 20 | 20 |
| 15480 | 20 | 20 | 20 | 20 | 20 | 20 | 20 | 20 | 20 | 20 | 20 | 20 | 20 | 20 | 20 | 20 |
| 15490 | 20 | 20 | 20 | 20 | 20 | 20 | 20 | 20 | 20 | 20 | 20 | 20 | 20 | 20 | 20 | 20 |
| 154A0 | 20 | 20 | 20 | 20 | 20 | 20 | 20 | 20 | 20 | 20 | 20 | 20 | 20 | 20 | 20 | 20 |
| 154B0 | 20 | 20 | 20 | 20 | 20 | 20 | 20 | 20 | 20 | 20 | 20 | 20 | 20 | 20 | 20 | 20 |
| 154C0 | 20 | 20 | 20 | 20 | 20 | 20 | 20 | 20 | 20 | 20 | 20 | 20 | 20 | 20 | 20 | 20 |
| 154D0 | 20 | 20 | 20 | 20 | 20 | 20 | 20 | 20 | 20 | 20 | 20 | 20 | 20 | 20 | 20 | 20 |
| 154E0 | 20 | 20 | 20 | 20 | 20 | 20 | 20 | 20 | 20 | 20 | 20 | 20 | 20 | 20 | 20 | 20 |
| 154F0 | 20 | 20 | 20 | 20 | 20 | 20 | 20 | 20 | 20 | 20 | 20 | 20 | 20 | 20 | 20 | 20 |
| 15500 | 20 | 20 | 20 | 20 | 20 | 20 | 20 | 20 | 20 | 20 | 20 | 20 | 20 | 20 | 20 | 20 |
| 15510 | 20 | 20 | 20 | 20 | 20 | 20 | 20 | 20 | 20 | 20 | 20 | 20 | 20 | 20 | 20 | 20 |
| 15520 | 20 | 20 | 20 | 20 | 20 | 20 | 20 | 20 | 20 | 20 | 20 | 20 | 20 | 20 | 20 | 20 |
| 15530 | 20 | 20 | 20 | 20 | 20 | 20 | 20 | 20 | 20 | 20 | 20 | 20 | 20 | 20 | 20 | 20 |
| 15540 | 20 | 20 | 20 | 20 | 20 | 20 | 20 | 20 | 20 | 20 | 20 | 20 | 20 | 20 | 20 | 20 |
| 15550 | 20 | 20 | 20 | 20 | 20 | 20 | 20 | 20 | 20 | 20 | 20 | 20 | 20 | 20 | 20 | 20 |
| 15560 | 20 | 20 | 20 | 20 | 20 | 20 | 20 | 20 | 20 | 20 | 20 | 20 | 20 | 20 | 20 | 20 |
| 15570 | 20 | 20 | 20 | 20 | 20 | 20 | 20 | 20 | 20 | 20 | 20 | 20 | 20 | 20 | 20 | 20 |
| 15580 | 20 | 20 | 20 | 20 | 20 | 20 | 20 | 20 | 20 | 20 | 20 | 20 | 20 | 20 | 20 | 20 |
| 15590 | 20 | 20 | 20 | 20 | 20 | 20 | 20 | 20 | 20 | 20 | 20 | 20 | 20 | 20 | 20 | 20 |

| | | | | | | | | | | | | | | | | |
|---|---|---|---|---|---|---|---|---|---|---|---|---|---|---|---|---|
| 155A0 | 20 | 20 | 20 | 20 | 20 | 20 | 20 | 20 | 20 | 20 | 20 | 20 | 20 | 20 | 20 | 20 |
| 155B0 | 20 | 20 | 20 | 20 | 20 | 20 | 20 | 20 | 20 | 20 | 20 | 20 | 20 | 20 | 20 | 20 |
| 155C0 | 20 | 20 | 20 | 20 | 20 | 20 | 20 | 20 | 20 | 20 | 20 | 20 | 20 | 20 | 20 | 20 |
| 155D0 | 20 | 20 | 20 | 20 | 20 | 20 | 20 | 20 | 20 | 20 | 20 | 20 | 20 | 20 | 20 | 20 |
| 155E0 | 20 | 20 | 20 | 20 | 20 | 20 | 20 | 20 | 20 | 20 | 20 | 20 | 20 | 20 | 20 | 20 |
| 155F0 | 20 | 20 | 20 | 20 | 20 | 20 | 20 | 20 | 20 | 20 | 20 | 20 | 20 | 20 | 20 | 20 |
| 15600 | 20 | 20 | 20 | 20 | 20 | 20 | 20 | 20 | 20 | 20 | 20 | 20 | 20 | 20 | 20 | 20 |
| 15610 | 20 | 20 | 20 | 20 | 20 | 20 | 20 | 20 | 20 | 20 | 20 | 20 | 20 | 20 | 20 | 20 |
| 15620 | 20 | 20 | 20 | 20 | 20 | 20 | 20 | 20 | 20 | 20 | 20 | 20 | 20 | 20 | 20 | 20 |
| 15630 | 20 | 20 | 20 | 20 | 20 | 20 | 20 | 20 | 20 | 20 | 20 | 20 | 20 | 20 | 20 | 20 |
| 15640 | 20 | 20 | 20 | 20 | 20 | 20 | 20 | 20 | 20 | 20 | 20 | 20 | 20 | 20 | 20 | 20 |
| 15650 | 20 | 20 | 20 | 20 | 20 | 20 | 20 | 20 | 20 | 20 | 20 | 20 | 20 | 20 | 20 | 20 |
| 15660 | 20 | 20 | 20 | 20 | 20 | 20 | 20 | 20 | 20 | 20 | 20 | 20 | 20 | 20 | 20 | 20 |
| 15670 | 20 | 20 | 20 | 20 | 20 | 20 | 20 | 20 | 20 | 20 | 20 | 20 | 20 | 20 | 20 | 20 |
| 15680 | 20 | 20 | 20 | 20 | 20 | 20 | 20 | 20 | 20 | 20 | 20 | 20 | 20 | 20 | 20 | 20 |
| 15690 | 20 | 20 | 20 | 20 | 20 | 20 | 20 | 20 | 20 | 20 | 20 | 20 | 20 | 20 | 20 | 20 |
| 156A0 | 20 | 20 | 20 | 20 | 20 | 20 | 20 | 20 | 20 | 20 | 20 | 20 | 20 | 20 | 20 | 20 |
| 156B0 | 20 | 20 | 20 | 20 | 20 | 20 | 20 | 20 | 20 | 20 | 20 | 20 | 20 | 20 | 20 | 20 |
| 156C0 | 20 | 20 | 20 | 20 | 20 | 20 | 20 | 20 | 20 | 20 | 20 | 20 | 20 | 20 | 20 | 20 |
| 156D0 | 20 | 20 | 20 | 20 | 20 | 20 | 20 | 20 | 20 | 20 | 20 | 20 | 20 | 20 | 20 | 20 |
| 156E0 | 20 | 20 | 20 | 20 | 20 | 20 | 20 | 20 | 20 | 20 | 20 | 20 | 20 | 20 | 20 | 20 |
| 156F0 | 20 | 20 | 20 | 20 | 20 | 20 | 20 | 20 | 20 | 20 | 20 | 20 | 20 | 20 | 20 | 20 |
| 15700 | 20 | 20 | 20 | 20 | 20 | 20 | 20 | 20 | 20 | 20 | 20 | 20 | 20 | 20 | 20 | 20 |
| 15710 | 20 | 20 | 20 | 20 | 20 | 20 | 20 | 20 | 20 | 20 | 20 | 20 | 20 | 20 | 20 | 20 |
| 15720 | 20 | 20 | 20 | 20 | 20 | 20 | 20 | 20 | 20 | 20 | 20 | 20 | 20 | 20 | 20 | 20 |
| 15730 | 20 | 20 | 20 | 20 | 20 | 20 | 20 | 20 | 20 | 20 | 20 | 20 | 20 | 20 | 20 | 20 |
| 15740 | 20 | 20 | 20 | 20 | 20 | 20 | 20 | 20 | 20 | 20 | 20 | 20 | 20 | 20 | 20 | 20 |
| 15750 | 20 | 20 | 20 | 20 | 20 | 20 | 20 | 20 | 20 | 20 | 20 | 20 | 20 | 20 | 20 | 20 |
| 15760 | 20 | 20 | 20 | 20 | 20 | 20 | 20 | 20 | 20 | 20 | 20 | 20 | 20 | 20 | 20 | 20 |
| 15770 | 20 | 20 | 20 | 20 | 20 | 20 | 20 | 20 | 20 | 20 | 20 | 20 | 20 | 20 | 20 | 20 |
| 15780 | 20 | 20 | 20 | 20 | 20 | 20 | 20 | 20 | 20 | 20 | 20 | 20 | 20 | 20 | 20 | 20 |
| 15790 | 20 | 20 | 20 | 20 | 20 | 20 | 20 | 20 | 20 | 20 | 20 | 20 | 20 | 20 | 20 | 20 |
| 157A0 | 20 | 20 | 20 | 20 | 20 | 20 | 20 | 20 | 20 | 20 | 20 | 20 | 20 | 20 | 20 | 20 |
| 157B0 | 20 | 20 | 20 | 20 | 20 | 20 | 20 | 20 | 20 | 20 | 20 | 20 | 20 | 20 | 20 | 20 |
| 157C0 | 20 | 20 | 20 | 20 | 20 | 20 | 20 | 20 | 20 | 20 | 20 | 20 | 20 | 20 | 20 | 20 |
| 157D0 | 20 | 20 | 20 | 20 | 20 | 20 | 20 | 20 | 20 | 20 | 20 | 20 | 20 | 20 | 20 | 20 |
| 157E0 | 20 | 20 | 20 | 20 | 20 | 20 | 20 | 20 | 20 | 20 | 20 | 20 | 20 | 20 | 20 | 20 |
| 157F0 | 20 | 20 | 20 | 20 | 20 | 20 | 20 | 20 | 20 | 20 | 20 | 20 | 20 | 20 | 20 | 20 |
| 15800 | 20 | 20 | 20 | 20 | 20 | 20 | 20 | 20 | 20 | 20 | 20 | 20 | 20 | 20 | 20 | 20 |
| 15810 | 20 | 20 | 20 | 20 | 20 | 20 | 20 | 20 | 20 | 20 | 20 | 20 | 20 | 20 | 20 | 20 |
| 15820 | 20 | 20 | 20 | 20 | 20 | 20 | 20 | 20 | 20 | 20 | 20 | 20 | 20 | 20 | 20 | 20 |
| 15830 | 20 | 20 | 20 | 20 | 20 | 20 | 20 | 20 | 20 | 20 | 20 | 20 | 20 | 20 | 20 | 20 |
| 15840 | 20 | 20 | 20 | 20 | 20 | 20 | 20 | 20 | 20 | 20 | 20 | 20 | 20 | 20 | 20 | 20 |
| 15850 | 20 | 20 | 20 | 20 | 20 | 20 | 20 | 20 | 20 | 20 | 20 | 20 | 20 | 20 | 20 | 20 |
| 15860 | 20 | 20 | 20 | 20 | 20 | 20 | 20 | 20 | 20 | 20 | 20 | 20 | 20 | 20 | 20 | 20 |
| 15870 | 20 | 20 | 20 | 20 | 20 | 20 | 20 | 20 | 20 | 20 | 20 | 20 | 20 | 20 | 20 | 20 |
| 15880 | 20 | 20 | 20 | 20 | 20 | 20 | 20 | 20 | 20 | 20 | 20 | 20 | 20 | 20 | 20 | 20 |
| 15890 | 20 | 20 | 20 | 20 | 20 | 20 | 20 | 20 | 20 | 20 | 20 | 20 | 20 | 20 | 20 | 20 |
| 158A0 | 20 | 20 | 20 | 20 | 20 | 20 | 20 | 20 | 20 | 20 | 20 | 20 | 20 | 20 | 20 | 20 |
| 158B0 | 20 | 20 | 20 | 20 | 20 | 20 | 20 | 20 | 20 | 20 | 20 | 20 | 20 | 20 | 20 | 20 |
| 158C0 | 20 | 20 | 20 | 20 | 20 | 20 | 20 | 20 | 20 | 20 | 20 | 20 | 20 | 20 | 20 | 20 |
| 158D0 | 20 | 20 | 20 | 20 | 20 | 20 | 20 | 20 | 20 | 20 | 20 | 20 | 20 | 20 | 20 | 20 |
| 158E0 | 20 | 20 | 20 | 20 | 20 | 20 | 20 | 20 | 20 | 20 | 20 | 20 | 20 | 20 | 20 | 20 |
| 158F0 | 20 | 20 | 20 | 20 | 20 | 20 | 20 | 20 | 20 | 20 | 20 | 20 | 20 | 20 | 20 | 20 |
| 15900 | 20 | 20 | 20 | 20 | 20 | 20 | 20 | 20 | 20 | 20 | 20 | 20 | 20 | 20 | 20 | 20 |
| 15910 | 20 | 20 | 20 | 20 | 20 | 20 | 20 | 20 | 20 | 20 | 20 | 20 | 20 | 20 | 20 | 20 |
| 15920 | 20 | 20 | 20 | 20 | 20 | 20 | 20 | 20 | 20 | 20 | 20 | 20 | 20 | 20 | 20 | 20 |
| 15930 | 20 | 20 | 20 | 20 | 20 | 20 | 20 | 20 | 20 | 20 | 20 | 20 | 20 | 20 | 20 | 20 |
| 15940 | 20 | 20 | 20 | 20 | 20 | 20 | 20 | 20 | 20 | 20 | 20 | 20 | 20 | 20 | 20 | 20 |
| 15950 | 20 | 20 | 20 | 20 | 20 | 20 | 20 | 20 | 20 | 20 | 20 | 20 | 20 | 20 | 20 | 20 |
| 15960 | 20 | 20 | 20 | 20 | 20 | 20 | 20 | 20 | 20 | 20 | 20 | 20 | 20 | 20 | 20 | 20 |
| 15970 | 20 | 20 | 20 | 20 | 20 | 20 | 20 | 20 | 20 | 20 | 20 | 20 | 20 | 20 | 20 | 20 |
| 15980 | 20 | 20 | 20 | 20 | 20 | 20 | 20 | 20 | 20 | 20 | 20 | 20 | 20 | 20 | 20 | 20 |
| 15990 | 20 | 20 | 20 | 20 | 20 | 20 | 20 | 20 | 20 | 20 | 20 | 20 | 20 | 20 | 20 | 20 |
| 159A0 | 20 | 20 | 20 | 20 | 20 | 20 | 20 | 20 | 20 | 20 | 20 | 20 | 20 | 20 | 20 | 20 |

| | | | | | | | | | | | | | | | | |
|---|---|---|---|---|---|---|---|---|---|---|---|---|---|---|---|---|
| 159B0 | 20 | 20 | 20 | 20 | 20 | 20 | 20 | 20 | 20 | 20 | 20 | 20 | 20 | 20 | 20 | 20 |
| 159C0 | 20 | 20 | 20 | 20 | 20 | 20 | 20 | 20 | 20 | 20 | 20 | 20 | 20 | 20 | 20 | 20 |
| 159D0 | 20 | 20 | 20 | 20 | 20 | 20 | 20 | 20 | 20 | 20 | 20 | 20 | 20 | 20 | 20 | 20 |
| 159E0 | 20 | 20 | 20 | 20 | 20 | 20 | 20 | 20 | 20 | 20 | 20 | 20 | 20 | 20 | 20 | 20 |
| 159F0 | 20 | 20 | 20 | 20 | 20 | 20 | 20 | 20 | 20 | 20 | 20 | 20 | 20 | 20 | 20 | 20 |
| 15A00 | 20 | 20 | 20 | 20 | 20 | 20 | 20 | 20 | 20 | 20 | 20 | 20 | 20 | 20 | 20 | 20 |
| 15A10 | 20 | 20 | 20 | 20 | 20 | 20 | 20 | 20 | 20 | 20 | 20 | 20 | 20 | 20 | 20 | 20 |
| 15A20 | 20 | 20 | 20 | 20 | 20 | 20 | 20 | 20 | 20 | 20 | 20 | 20 | 20 | 20 | 20 | 20 |
| 15A30 | 20 | 20 | 20 | 20 | 20 | 20 | 20 | 20 | 20 | 20 | 20 | 20 | 20 | 20 | 20 | 20 |
| 15A40 | 20 | 20 | 20 | 20 | 20 | 20 | 20 | 20 | 20 | 20 | 20 | 20 | 20 | 20 | 20 | 20 |
| 15A50 | 20 | 20 | 20 | 20 | 20 | 20 | 20 | 20 | 20 | 20 | 20 | 20 | 20 | 20 | 20 | 20 |
| 15A60 | 20 | 20 | 20 | 20 | 20 | 20 | 20 | 20 | 20 | 20 | 20 | 20 | 20 | 20 | 20 | 20 |
| 15A70 | 20 | 20 | 20 | 20 | 20 | 20 | 20 | 20 | 20 | 20 | 20 | 20 | 20 | 20 | 20 | 20 |
| 15A80 | 20 | 20 | 20 | 20 | 20 | 20 | 20 | 20 | 20 | 20 | 20 | 20 | 20 | 20 | 20 | 20 |
| 15A90 | 20 | 20 | 20 | 20 | 20 | 20 | 20 | 20 | 20 | 20 | 20 | 20 | 20 | 20 | 20 | 20 |
| 15AA0 | 20 | 20 | 20 | 20 | 20 | 20 | 20 | 20 | 20 | 20 | 20 | 20 | 20 | 20 | 20 | 20 |
| 15AB0 | 20 | 20 | 20 | 20 | 20 | 20 | 20 | 20 | 20 | 20 | 20 | 20 | 20 | 20 | 20 | 20 |
| 15AC0 | 20 | 20 | 20 | 20 | 20 | 20 | 20 | 20 | 20 | 20 | 20 | 20 | 20 | 20 | 20 | 20 |
| 15AD0 | 20 | 20 | 20 | 20 | 20 | 20 | 20 | 20 | 20 | 20 | 20 | 20 | 20 | 20 | 20 | 20 |
| 15AE0 | 20 | 20 | 20 | 20 | 20 | 20 | 20 | 20 | 20 | 20 | 20 | 20 | 20 | 20 | 20 | 20 |
| 15AF0 | 20 | 20 | 20 | 20 | 20 | 20 | 20 | 20 | 20 | 20 | 20 | 20 | 20 | 20 | 20 | 20 |
| 15B00 | 20 | 20 | 20 | 20 | 20 | 20 | 20 | 20 | 20 | 20 | 20 | 20 | 20 | 20 | 20 | 20 |
| 15B10 | 20 | 20 | 20 | 20 | 20 | 20 | 20 | 20 | 20 | 20 | 20 | 20 | 20 | 20 | 20 | 20 |
| 15B20 | 20 | 20 | 20 | 20 | 20 | 20 | 20 | 20 | 20 | 20 | 20 | 20 | 20 | 20 | 20 | 20 |
| 15B30 | 20 | 20 | 20 | 20 | 20 | 20 | 20 | 20 | 20 | 20 | 20 | 20 | 20 | 20 | 20 | 20 |
| 15B40 | 20 | 20 | 20 | 20 | 20 | 20 | 20 | 20 | 20 | 20 | 20 | 20 | 20 | 20 | 20 | 20 |
| 15B50 | 20 | 20 | 20 | 20 | 20 | 20 | 20 | 20 | 20 | 20 | 20 | 20 | 20 | 20 | 20 | 20 |
| 15B60 | 20 | 20 | 20 | 20 | 20 | 20 | 20 | 20 | 20 | 20 | 20 | 20 | 20 | 20 | 20 | 20 |
| 15B70 | 20 | 20 | 20 | 20 | 20 | 20 | 20 | 20 | 20 | 20 | 20 | 20 | 20 | 20 | 20 | 20 |
| 15B80 | 20 | 20 | 20 | 20 | 20 | 20 | 20 | 20 | 20 | 20 | 20 | 20 | 20 | 20 | 20 | 20 |
| 15B90 | 20 | 20 | 20 | 20 | 20 | 20 | 20 | 20 | 20 | 20 | 20 | 20 | 20 | 20 | 20 | 20 |
| 15BA0 | 20 | 20 | 20 | 20 | 20 | 20 | 20 | 20 | 20 | 20 | 20 | 20 | 20 | 20 | 20 | 20 |
| 15BB0 | 20 | 20 | 20 | 20 | 20 | 20 | 20 | 20 | 20 | 20 | 20 | 20 | 20 | 20 | 20 | 20 |
| 15BC0 | 20 | 20 | 20 | 20 | 20 | 20 | 20 | 20 | 20 | 20 | 20 | 20 | 20 | 20 | 20 | 20 |
| 15BD0 | 20 | 20 | 20 | 20 | 20 | 20 | 20 | 20 | 20 | 20 | 20 | 20 | 20 | 20 | 20 | 20 |
| 15BE0 | 20 | 20 | 20 | 20 | 20 | 20 | 20 | 20 | 20 | 20 | 20 | 20 | 20 | 20 | 20 | 20 |
| 15BF0 | 20 | 20 | 20 | 20 | 20 | 20 | 20 | 20 | 20 | 20 | 20 | 20 | 20 | 20 | 20 | 20 |
| 15C00 | 20 | 20 | 20 | 20 | 20 | 20 | 20 | 20 | 20 | 20 | 20 | 20 | 20 | 20 | 20 | 20 |
| 15C10 | 20 | 20 | 20 | 20 | 20 | 20 | 20 | 20 | 20 | 20 | 20 | 20 | 20 | 20 | 20 | 20 |
| 15C20 | 20 | 20 | 20 | 20 | 20 | 20 | 20 | 20 | 20 | 20 | 20 | 20 | 20 | 20 | 20 | 20 |
| 15C30 | 20 | 20 | 20 | 20 | 20 | 20 | 20 | 20 | 20 | 20 | 20 | 20 | 20 | 20 | 20 | 20 |
| 15C40 | 20 | 20 | 20 | 20 | 20 | 20 | 20 | 20 | 20 | 20 | 20 | 20 | 20 | 20 | 20 | 20 |
| 15C50 | 20 | 20 | 20 | 20 | 20 | 20 | 20 | 20 | 20 | 20 | 20 | 20 | 20 | 20 | 20 | 20 |
| 15C60 | 20 | 20 | 20 | 20 | 20 | 20 | 20 | 20 | 20 | 20 | 20 | 20 | 20 | 20 | 20 | 20 |
| 15C70 | 20 | 20 | 20 | 20 | 20 | 20 | 20 | 20 | 20 | 20 | 20 | 20 | 20 | 20 | 20 | 20 |
| 15C80 | 20 | 20 | 20 | 20 | 20 | 20 | 20 | 20 | 20 | 20 | 20 | 20 | 20 | 20 | 20 | 20 |
| 15C90 | 20 | 20 | 20 | 20 | 20 | 20 | 20 | 20 | 20 | 20 | 20 | 20 | 20 | 20 | 20 | 20 |
| 15CA0 | 20 | 20 | 20 | 20 | 20 | 20 | 20 | 20 | 20 | 20 | 20 | 20 | 20 | 20 | 20 | 20 |
| 15CB0 | 20 | 20 | 20 | 20 | 20 | 20 | 20 | 20 | 20 | 20 | 20 | 20 | 20 | 20 | 20 | 20 |
| 15CC0 | 20 | 20 | 20 | 20 | 20 | 20 | 20 | 20 | 20 | 20 | 20 | 20 | 20 | 20 | 20 | 20 |
| 15CD0 | 20 | 20 | 20 | 20 | 20 | 20 | 20 | 20 | 20 | 20 | 20 | 20 | 20 | 20 | 20 | 20 |
| 15CE0 | 20 | 20 | 20 | 20 | 20 | 20 | 20 | 20 | 20 | 20 | 20 | 20 | 20 | 20 | 20 | 20 |
| 15CF0 | 20 | 20 | 20 | 20 | 20 | 20 | 20 | 20 | 20 | 20 | 20 | 20 | 20 | 20 | 20 | 20 |
| 15D00 | 20 | 20 | 20 | 20 | 20 | 20 | 20 | 20 | 20 | 20 | 20 | 20 | 20 | 20 | 20 | 20 |
| 15D10 | 20 | 20 | 20 | 20 | 20 | 20 | 20 | 20 | 20 | 20 | 20 | 20 | 20 | 20 | 20 | 20 |
| 15D20 | 20 | 20 | 20 | 20 | 20 | 20 | 20 | 20 | 20 | 20 | 20 | 20 | 20 | 20 | 20 | 20 |
| 15D30 | 20 | 20 | 20 | 20 | 20 | 20 | 20 | 20 | 20 | 20 | 20 | 20 | 20 | 20 | 20 | 20 |
| 15D40 | 20 | 20 | 20 | 20 | 20 | 20 | 20 | 20 | 20 | 20 | 20 | 20 | 20 | 20 | 20 | 20 |
| 15D50 | 20 | 20 | 20 | 20 | 20 | 20 | 20 | 20 | 20 | 20 | 20 | 20 | 20 | 20 | 20 | 20 |
| 15D60 | 20 | 20 | 20 | 20 | 20 | 20 | 20 | 20 | 20 | 20 | 20 | 20 | 20 | 20 | 20 | 20 |
| 15D70 | 20 | 20 | 20 | 20 | 20 | 20 | 20 | 20 | 20 | 20 | 20 | 20 | 20 | 20 | 20 | 20 |
| 15D80 | 20 | 20 | 20 | 20 | 20 | 20 | 20 | 20 | 20 | 20 | 20 | 20 | 20 | 20 | 20 | 20 |
| 15D90 | 20 | 20 | 20 | 20 | 20 | 20 | 20 | 20 | 20 | 20 | 20 | 20 | 20 | 20 | 20 | 20 |
| 15DA0 | 20 | 20 | 20 | 20 | 20 | 20 | 20 | 20 | 20 | 20 | 20 | 20 | 20 | 20 | 20 | 20 |
| 15DB0 | 20 | 20 | 20 | 20 | 20 | 20 | 20 | 20 | 20 | 20 | 20 | 20 | 20 | 20 | 20 | 20 |

```
15DC0   20 20 20 20 20 20 20 20 20 20 20 20 20 20 20 20
15DD0   20 20 20 20 20 20 20 20 20 20 20 20 20 20 20 20
15DE0   20 20 20 20 20 20 20 20 20 20 20 20 20 20 20 20
15DF0   20 20 20 20 20 20 20 20 20 20 20 20 20 20 20 20
15E00   20 20 20 20 20 20 20 20 20 20 20 20 20 20 20 20
15E10   20 20 20 20 20 20 20 20 20 20 20 20 20 20 20 20
15E20   20 20 20 20 20 20 20 20 20 20 20 20 20 20 20 20
15E30   20 20 20 20 20 20 20 20 20 20 20 20 20 20 20 20
15E40   20 20 20 20 20 20 20 20 20 20 20 20 20 20 20 20
15E50   20 20 20 20 20 20 20 20 20 20 20 20 20 20 20 20
15E60   20 20 20 20 20 20 20 20 20 20 20 20 20 20 20 20
15E70   20 20 20 20 20 20 20 20 20 20 20 20 20 20 20 20
15E80   20 20 20 20 20 20 20 20 20 20 20 20 20 20 20 20
15E90   20 20 20 20 20 20 20 20 20 20 20 20 20 20 20 20
15EA0   20 20 20 20 20 20 20 20 20 20 20 20 20 20 20 20
15EB0   20 20 20 20 20 20 20 20 20 20 20 20 20 20 20 20
15EC0   20 20 20 20 20 20 20 20 20 20 20 20 20 20 20 20
15ED0   20 20 20 20 20 20 20 20 20 20 20 20 20 20 20 20
15EE0   20 20 20 20 20 20 20 20 20 20 20 20 20 20 20 20
15EF0   20 20 20 20 20 20 20 20 20 20 20 20 20 20 20 20
15F00   20 20 20 20 20 20 20 20 20 20 20 20 20 20 20 20
15F10   20 20 20 20 20 20 20 20 20 20 20 20 20 20 20 20
15F20   20 20 20 20 20 20 20 20 20 20 20 20 20 20 20 20
15F30   20 20 20 20 20 20 20 20 20 20 20 20 20 20 20 20
15F40   20 20 20 20 20 00 00 7D 11 34 12 7E 12 10 13 A2
15F50   13 C9 13 5B 14 81 14 41 15 58 15 84 15 C5 15 06
15F60   16 09 16 4A 16 4D 16 8C C8 8E C0 26 89 26 05 11
15F70   C5 B6 46 FF 8A 04 26 A2 4B 00 3C 00 77 03 E9 39
15F80   05 3C 09 72 03 E9 32 05 FC B9 01 00 26 8D 3E FF
15F90   00 B0 20 F3 AA C5 5E B8 8B 0F C5 76 B2 BB 00 00
15FA0   8A 04 26 88 87 FF 00 43 4E E2 F5 33 DB 26 8A 1E
15FB0   4B 00 FE CB D0 E3 26 8B 9F 07 11 FF E3 FC B9 08
15FC0   00 26 8D 3E 90 00 B0 20 F3 AA C5 9E 5E FF 8B 0F
15FD0   C5 B6 58 FF BB 00 00 8A 04 26 88 87 90 00 43 4E
15FE0   E2 F5 FC B9 08 00 26 8D 3E 9A 00 B0 20 F3 AA C5
15FF0   9E 70 FF 8B 0F C5 B6 6A FF BB 00 00 8A 04 26 88
16000   87 9A 00 43 4E E2 F5 FC B9 01 00 26 8D 3E 62 00
16010   B0 20 F3 AA C5 5E 82 8B 0F C5 B6 7C FF BB 00 00
16020   8A 04 26 88 87 62 00 43 4E E2 F5 FC B9 06 00 26
16030   8D 3E A2 00 B0 20 F3 AA C5 5E 94 8B 0F C5 76 8E
16040   BB 00 00 8A 04 26 88 87 A2 00 43 4E E2 F5 FC B9
16050   04 00 26 8D 3E 65 00 B0 20 F3 AA C5 5E A6 8B 0F
16060   C5 76 A0 BB 00 00 8A 04 26 88 87 65 00 43 4E E2
16070   F5 E9 DF 02 FC B9 26 00 26 8D 3E 69 00 B0 20 F3
16080   AA C5 5E 82 8B 0F C5 B6 7C FF BB 00 00 8A 04 26
16090   88 87 69 00 43 4E E2 F5 FC B9 01 00 26 8D 3E 8F
160A0   00 B0 20 F3 AA C5 5E 94 8B 0F C5 76 8E BB 00 00
160B0   8A 04 26 88 87 8F 00 43 4E E2 F5 E9 95 02 FC B9
160C0   15 00 26 8D 3E 4C 00 B0 20 F3 AA C5 9E 70 FF 8B
160D0   0F C5 B6 6A FF BB 00 00 8A 04 26 88 87 4C 00 43
160E0   4E E2 F5 FC B9 00 10 26 8D 3E 05 01 B0 20 F3 AA
160F0   C5 5E 82 8B 0F C5 B6 7C FF BB 00 00 8A 04 26 88
16100   87 05 01 43 4E E2 F5 FC B9 01 00 26 8D 3E 8F 00
16110   B0 20 F3 AA C5 5E 94 8B 0F C5 76 8E BB 00 00 8A
16120   04 26 88 87 8F 00 43 4E E2 F5 FC B9 02 00 26 8D
16130   3E 63 00 B0 20 F3 AA C5 5E A6 8B 0F C5 76 A0 BB
16140   00 00 8A 04 26 88 87 63 00 43 4E E2 F5 E9 03 02
16150   FC B9 15 00 26 8D 3E 4C 00 B0 20 F3 AA C5 9E 70
16160   FF 8B 0F C5 B6 6A FF BB 00 00 8A 04 26 88 87 4C
16170   00 43 4E E2 F5 FC B9 00 10 26 8D 3E 05 01 B0 20
16180   F3 AA C5 5E 82 8B 0F C5 B6 7C FF BB 00 00 8A 04
16190   26 88 87 05 01 43 4E E2 F5 FC B9 01 00 26 8D 3E
161A0   8F 00 B0 20 F3 AA C5 5E 94 8B 0F C5 76 8E BB 00
161B0   00 8A 04 26 88 87 8F 00 43 4E E2 F5 FC B9 02 00
161C0   26 8D 3E 63 00 B0 20 F3 AA C5 5E A6 8B 0F C5 76
161D0   A0 BB 00 00 8A 04 26 88 87 63 00 43 4E E2 F5 E9
```

| | | | | | | | | | | | | | | | | |
|---|---|---|---|---|---|---|---|---|---|---|---|---|---|---|---|---|
| 161E0 | 71 | 01 | FC | B9 | 00 | 10 | 26 | 8D | 3E | 05 | 01 | B0 | 20 | F3 | AA | C5 |
| 161F0 | 5E | 82 | 8B | 0F | C5 | B6 | 7C | FF | BB | 00 | 00 | 8A | 04 | 26 | 88 | 87 |
| 16200 | 05 | 01 | 43 | 4E | E2 | F5 | E9 | 4A | 01 | FC | B9 | 15 | 00 | 26 | 8D | 3E |
| 16210 | 4C | 00 | B0 | 20 | F3 | AA | C5 | 9E | 70 | FF | 8B | 0F | C5 | B6 | 6A | FF |
| 16220 | BB | 00 | 00 | 8A | 04 | 26 | 88 | 87 | 4C | 00 | 43 | 4E | E2 | F5 | FC | B9 |
| 16230 | 50 | 00 | 26 | 8D | 3E | AE | 00 | B0 | 20 | F3 | AA | C5 | 5E | 82 | 8B | 0F |
| 16240 | C5 | B6 | 7C | FF | BB | 00 | 00 | 8A | 04 | 26 | 88 | 87 | AE | 00 | 43 | 4E |
| 16250 | E2 | F5 | FC | B9 | 01 | 00 | 26 | 8D | 3E | 8F | 00 | B0 | 20 | F3 | AA | C5 |
| 16260 | 5E | 94 | 8B | 0F | C5 | 76 | 8E | BB | 00 | 00 | 8A | 04 | 26 | 88 | 87 | 8F |
| 16270 | 00 | 43 | 4E | E2 | F5 | FC | B9 | 02 | 00 | 26 | 8D | 3E | 63 | 00 | B0 | 20 |
| 16280 | F3 | AA | C5 | 5E | A6 | 8B | 0F | C5 | 76 | A0 | BB | 00 | 00 | 8A | 04 | 26 |
| 16290 | 88 | 87 | 63 | 00 | 43 | 4E | E2 | F5 | E9 | B8 | 00 | FC | B9 | 01 | 00 | 26 |
| 162A0 | 8D | 3E | FE | 00 | B0 | 20 | F3 | AA | C5 | 5E | 94 | 8B | 0F | C5 | 76 | 8E |
| 162B0 | BB | 00 | 00 | 8A | 04 | 26 | 88 | 87 | FE | 00 | 43 | 4E | E2 | F5 | E9 | 92 |
| 162C0 | 00 | FC | B9 | 15 | 00 | 26 | 8D | 3E | 4C | 00 | B0 | 20 | F3 | AA | C5 | 9E |
| 162D0 | 70 | FF | 8B | 0F | C5 | B6 | 6A | FF | BB | 00 | 00 | 8A | 04 | 26 | 88 | 87 |
| 162E0 | 4C | 00 | 43 | 4E | E2 | F5 | FC | B9 | 50 | 00 | 26 | 8D | 3E | AE | 00 | B0 |
| 162F0 | 20 | F3 | AA | C5 | 5E | 82 | 8B | 0F | C5 | B6 | 7C | FF | BB | 00 | 00 | 8A |
| 16300 | 04 | 26 | 88 | 87 | AE | 00 | 43 | 4E | E2 | F5 | FC | B9 | 05 | 00 | 26 | 8D |
| 16310 | 3E | 00 | 01 | B0 | 20 | F3 | AA | C5 | 5E | 94 | 8B | 0F | C5 | 76 | 8E | BB |
| 16320 | 00 | 00 | 8A | 04 | 26 | 88 | 87 | 00 | 01 | 43 | 4E | E2 | F5 | FC | B9 | 02 |
| 16330 | 00 | 26 | 8D | 3E | 63 | 00 | B0 | 20 | F3 | AA | C5 | 5E | A6 | 8B | 0F | C5 |
| 16340 | 76 | A0 | BB | 00 | 00 | 8A | 04 | 26 | 88 | 87 | 63 | 00 | 43 | 4E | E2 | F5 |
| 16350 | EB | 01 | 90 | 90 | 8C | C8 | 8E | D8 | E8 | 66 | 01 | B9 | 01 | 00 | C5 | 76 |
| 16360 | B2 | BB | 00 | 00 | 26 | 8A | 87 | FF | 00 | 88 | 04 | 43 | 4E | E2 | F5 | 33 |
| 16370 | DB | 26 | 8A | 1E | 4B | 00 | FE | CB | D0 | E3 | 26 | 8B | 9F | 17 | 11 | FF |
| 16380 | E3 | B9 | 04 | 00 | C5 | 76 | A0 | BB | 00 | 00 | 26 | 8A | 87 | 65 | 00 | 88 |
| 16390 | 04 | 43 | 4E | E2 | F5 | E9 | 22 | 01 | B9 | 26 | 00 | C5 | B6 | 7C | FF | BB |
| 163A0 | 00 | 00 | 26 | 8A | 87 | 69 | 00 | 88 | 04 | 43 | 4E | E2 | F5 | B9 | 01 | 00 |
| 163B0 | C5 | 76 | 8E | BB | 00 | 00 | 26 | 8A | 87 | 8F | 00 | 88 | 04 | 43 | 4E | E2 |
| 163C0 | F5 | E9 | F6 | 00 | B9 | 15 | 00 | C5 | B6 | 6A | FF | BB | 00 | 00 | 26 | 8A |
| 163D0 | 87 | 4C | 00 | 88 | 04 | 43 | 4E | E2 | F5 | B9 | 00 | 10 | C5 | B6 | 7C | FF |
| 163E0 | BB | 00 | 00 | 26 | 8A | 87 | 05 | 01 | 88 | 04 | 43 | 4E | E2 | F5 | B9 | 01 |
| 163F0 | 00 | C5 | 76 | 8E | BB | 00 | 00 | 26 | 8A | 87 | 8F | 00 | 88 | 04 | 43 | 4E |
| 16400 | E2 | F5 | E9 | B5 | 00 | B9 | 15 | 00 | C5 | B6 | 6A | FF | BB | 00 | 00 | 26 |
| 16410 | 8A | 87 | 4C | 00 | 88 | 04 | 43 | 4E | E2 | F5 | B9 | 00 | 10 | C5 | B6 | 7C |
| 16420 | FF | BB | 00 | 00 | 26 | 8A | 87 | 05 | 01 | 88 | 04 | 43 | 4E | E2 | F5 | B9 |
| 16430 | 01 | 00 | C5 | 76 | 8E | BB | 00 | 00 | 26 | 8A | 87 | 8F | 00 | 88 | 04 | 43 |
| 16440 | 4E | E2 | F5 | EB | 75 | 90 | EB | 72 | 90 | B9 | 15 | 00 | C5 | B6 | 6A | FF |
| 16450 | BB | 00 | 00 | 26 | 8A | 87 | 4C | 00 | 88 | 04 | 43 | 4E | E2 | F5 | B9 | 50 |
| 16460 | 00 | C5 | B6 | 7C | FF | BB | 00 | 00 | 26 | 8A | 87 | AE | 00 | 88 | 04 | 43 |
| 16470 | 4E | E2 | F5 | B9 | 01 | 00 | C5 | 76 | 8E | BB | 00 | 00 | 26 | 8A | 87 | 8F |
| 16480 | 00 | 88 | 04 | 43 | 4E | E2 | F5 | EB | 31 | 90 | EB | 2E | 90 | B9 | 15 | 00 |
| 16490 | C5 | B6 | 6A | FF | BB | 00 | 00 | 26 | 8A | 87 | 4C | 00 | 88 | 04 | 43 | 4E |
| 164A0 | E2 | F5 | B9 | 50 | 00 | C5 | B6 | 7C | FF | BB | 00 | 00 | 26 | 8A | 87 | AE |
| 164B0 | 00 | 88 | 04 | 43 | 4E | E2 | F5 | EB | 01 | 90 | 26 | 8B | 26 | 05 | 11 | F8 |
| 164C0 | CB | 53 | 33 | DB | 8A | 1E | 4B | 00 | FE | CB | D0 | E3 | 8B | 9F | 1F | 00 |
| 164D0 | FF | E3 | 90 | C7 | 06 | 31 | 00 | 4B | 00 | C7 | 06 | 2F | 00 | 01 | 00 | C7 |
| 164E0 | 06 | 35 | 00 | 90 | 00 | C7 | 06 | 33 | 00 | 08 | 00 | C7 | 06 | 39 | 00 | 9A |
| 164F0 | 00 | C7 | 06 | 37 | 00 | 08 | 00 | C7 | 06 | 3D | 00 | 62 | 00 | C7 | 06 | 3B |
| 16500 | 00 | 01 | 00 | C7 | 06 | 41 | 00 | A2 | 00 | C7 | 06 | 3F | 00 | 06 | 00 | C7 |
| 16510 | 06 | 45 | 00 | 65 | 00 | C7 | 06 | 43 | 00 | 04 | 00 | C7 | 06 | 49 | 00 | FF |
| 16520 | 00 | C7 | 06 | 47 | 00 | 01 | 00 | E9 | 70 | 02 | C7 | 06 | 31 | 00 | 4B | 00 |
| 16530 | C7 | 06 | 2F | 00 | 01 | 00 | C7 | 06 | 35 | 00 | 61 | 00 | C7 | 06 | 33 | 00 |
| 16540 | 01 | 00 | C7 | 06 | 39 | 00 | 61 | 00 | C7 | 06 | 37 | 00 | 01 | 00 | C7 | 06 |
| 16550 | 3D | 00 | 69 | 00 | C7 | 06 | 3B | 00 | 26 | 00 | C7 | 06 | 41 | 00 | 8F | 00 |
| 16560 | C7 | 06 | 3F | 00 | 01 | 00 | C7 | 06 | 45 | 00 | 61 | 00 | C7 | 06 | 43 | 00 |
| 16570 | 01 | 00 | C7 | 06 | 49 | 00 | FF | 00 | C7 | 06 | 47 | 00 | 01 | 00 | E9 | 19 |
| 16580 | 02 | C7 | 06 | 31 | 00 | 4B | 00 | C7 | 06 | 2F | 00 | 01 | 00 | C7 | 06 | 35 |
| 16590 | 00 | 61 | 00 | C7 | 06 | 33 | 00 | 01 | 00 | C7 | 06 | 39 | 00 | 4C | 00 | C7 |
| 165A0 | 06 | 37 | 00 | 15 | 00 | C7 | 06 | 3D | 00 | 05 | 01 | C7 | 06 | 3B | 00 | 00 |
| 165B0 | 10 | C7 | 06 | 41 | 00 | 8F | 00 | C7 | 06 | 3F | 00 | 01 | 00 | C7 | 06 | 45 |
| 165C0 | 00 | 63 | 00 | C7 | 06 | 43 | 00 | 02 | 00 | C7 | 06 | 49 | 00 | FF | 00 | C7 |
| 165D0 | 06 | 47 | 00 | 01 | 00 | A1 | 98 | 00 | A3 | 3B | 00 | E9 | BC | 01 | C7 | 06 |
| 165E0 | 31 | 00 | 4B | 00 | C7 | 06 | 2F | 00 | 01 | 00 | C7 | 06 | 35 | 00 | 61 | 00 |

```
165F0   C7 06 33 00 01 00 C7 06 39 00 4C 00 C7 06 37 00
16600   15 00 C7 06 3D 00 05 01 C7 06 3B 00 00 10 C7 06
16610   41 00 8F 00 C7 06 3F 00 01 00 C7 06 45 00 63 00
16620   C7 06 43 00 02 00 C7 06 49 00 FF 00 C7 06 47 00
16630   01 00 A1 98 00 A3 3B 00 E9 5F 01 C7 06 31 00 4B
16640   00 C7 06 2F 00 01 00 C7 06 35 00 61 00 C7 06 33
16650   00 01 00 C7 06 39 00 61 00 C7 06 37 00 01 00 C7
16660   06 3D 00 05 01 C7 06 3B 00 00 10 C7 06 41 00 61
16670   00 C7 06 3F 00 01 00 C7 06 45 00 61 00 C7 06 43
16680   00 01 00 C7 06 49 00 FF 00 C7 06 47 00 01 00 A1
16690   98 00 A3 3B 00 E9 02 01 C7 06 31 00 4B 00 C7 06
166A0   2F 00 01 00 C7 06 35 00 61 00 C7 06 33 00 01 00
166B0   C7 06 39 00 4C 00 C7 06 37 00 15 00 C7 06 3D 00
166C0   AE 00 C7 06 3B 00 50 00 C7 06 41 00 8F 00 C7 06
166D0   3F 00 01 00 C7 06 45 00 63 00 C7 06 43 00 02 00
166E0   C7 06 49 00 FF 00 C7 06 47 00 01 00 E9 AB 00 C7
166F0   06 31 00 4B 00 C7 06 2F 00 01 00 C7 06 35 00 61
16700   00 C7 06 33 00 01 00 C7 06 39 00 61 00 C7 06 37
16710   00 01 00 C7 06 3D 00 61 00 C7 06 3B 00 01 00 C7
16720   06 41 00 FE 00 C7 06 3F 00 01 00 C7 06 45 00 61
16730   00 C7 06 43 00 01 00 C7 06 49 00 FF 00 C7 06 47
16740   00 01 00 EB 55 90 C7 06 31 00 4B 00 C7 06 2F 00
16750   01 00 C7 06 35 00 61 00 C7 06 33 00 01 00 C7 06
16760   39 00 4C 00 C7 06 37 00 15 00 C7 06 3D 00 AE 00
16770   C7 06 3B 00 50 00 C7 06 41 00 00 01 C7 06 3F 00
16780   05 00 C7 06 45 00 63 00 C7 06 43 00 02 00 C7 06
16790   49 00 FF 00 C7 06 47 00 01 00 8D 06 2F 00 50 8D
167A0   06 33 00 50 8D 06 37 00 50 8D 06 3B 00 50 8D 06
167B0   3F 00 50 8D 06 43 00 50 8D 06 47 00 50 1E B8 00
167C0   00 8E D8 BB 7A 00 D1 E3 D1 E3 B8 00 00 39 07 74
167D0   10 8B 47 02 8E D8 BB 07 01 B0 02 88 07 1F EB 0A
167E0   90 1F C6 06 FF 00 14 EB 0D 90 CD 7A 80 3E 4B 00
167F0   01 75 03 E8 09 00 90 39 07 00 58 E2 FD 5B C3 1E
16800   53 BB 00 00 8E DB BB F0 04 8B 1F 26 89 1E 98 00
16810   5B 1F C3 00 08 01 0A 98 08 01 0B 98 02 01 0C 98
16820   14 01 0B 00 72 6F 72 72 65 20 6D 72 61 6C 41 00
16830   52 01 AA 01 04 00 14 00 43 4F 4E 53 4F 4C 45 00
16840   00 01 03 00 52 01 00 01 04 00 26 00 00 01 01 00
16850   14 01 0D 00 23 20 67 61 6C 46 20 6D 72 61 6C 41
16860   20 00 00 01 02 00 00 01 1C 00 52 01 E6 01 08 00
16870   DC 00 4D 41 49 4E 00 00 00 01 0A 00 00 01 08 00
16880   00 01 10 00 00 01 05 00 00 01 0E 00 00 01 09 00
16890   00 01 0D 00 00 01 FF 00 00 01 2A 00 00 01 1A 00
168A0   00 01 1B 00 00 01 EA 01 00 01 F3 01 00 00 10 00
168B0   02 00 16 00 42 01 04 00 01 00 00 00 40 01 04 00
168C0   04 00 00 00 1A 01 0E 98 7E 25 08 01 1E 98 08 01
168D0   1F 98 00 01 43 00 00 01 17 00 00 01 15 00 00 01
168E0   30 00 00 01 06 00 08 01 20 98 00 01 3D 00 00 01
168F0   32 00 56 01 31 98 00 00 14 01 01 00 31 00 14 01
16900   04 00 30 30 38 31 14 01 04 00 31 31 34 31 14 01
16910   01 00 30 00 14 01 03 00 31 31 34 00 00 01 07 00
16920   14 01 03 00 31 31 30 00 08 01 33 98 14 01 0A 00
16930   32 30 30 32 20 72 6F 72 72 45 00 01 13 00 02 01
16940   34 98 08 01 36 98 52 01 3C 01 0C 00 E0 00 46 49
16950   4C 45 00 00 00 01 FF FF 08 01 37 98 08 01 38 98
16960   08 01 39 98 08 01 3A 98 00 01 0C 00 00 01 12 00
16970   00 01 39 00 00 01 3A 00 00 01 3B 00 00 01 3C 00
16980   00 01 23 00 00 01 20 00 08 01 3B 98 00 01 C8 05
16990   00 01 1E 01 00 01 1E 00 14 01 01 00 47 00 00 01
169A0   88 00 14 01 04 00 43 43 43 43 14 01 01 00 41 00
169B0   08 01 3C 98 08 01 3D 98 08 01 3E 98 5A 01 12 00
169C0   92 26 FF FF 5C 41 47 41 49 4E 01 00 14 01 0D 00
169D0   65 73 61 65 6C 65 72 20 6B 6E 75 72 54 00 08 01
169E0   3F 98 08 01 40 98 08 01 41 98 16 01 42 98 10 00
169F0   00 01 0B 00 14 01 01 00 2A 00 14 01 01 00 23 00
```

```
16A00   14 01 08 00 65 74 61 64 69 6C 61 56 14 01 09 00
16A10   72 6F 72 72 45 20 44 49 44 00 14 01 07 00 64 65
16A20   64 6F 63 65 64 00 52 01 A0 01 0C 00 24 01 14 01
16A30   0A 00 65 6C 69 66 20 64 6E 75 6F 46 00 01 0E 27
16A40   00 01 38 00 00 01 37 00 00 01 DE 00 00 01 64 00
16A50   14 01 08 00 58 54 20 64 6E 75 6F 46 00 01 10 27
16A60   14 01 0C 00 73 65 6E 6F 74 20 74 75 70 74 75 4F
16A70   00 01 61 00 00 01 68 00 14 01 02 00 39 39 00 01
16A80   31 00 00 01 14 00 14 01 10 00 64 65 76 69 65 63
16A90   65 72 20 74 63 65 6E 6E 6F 43 14 01 14 00 64 65
16AA0   76 69 65 63 65 72 20 74 6F 6E 20 74 63 65 6E 6E
16AB0   6F 43 00 01 62 00 00 01 19 00 00 01 35 00 00 01
16AC0   66 00 00 01 3E 00 14 01 02 00 39 31 14 01 00 00
16AD0   00 01 11 00 00 01 16 00 00 01 25 00 00 01 18 00
16AE0   14 01 05 00 20 6C 61 69 44 00 14 01 09 00 6B 6E
16AF0   75 72 74 20 6E 6F 20 00 14 01 08 00 6B 6E 75 72
16B00   74 20 46 4D 14 01 0A 00 6C 69 61 66 20 6C 61 69
16B10   64 20 14 01 04 00 43 43 43 42 00 01 1F 00 14 01
16B20   0F 00 64 65 74 61 6E 69 6D 72 65 74 20 6C 6C 61
16B30   43 00 14 01 03 00 6F 74 20 00 00 01 1D 00 00 01
16B40   0F 27 00 01 21 00 00 01 22 00 52 01 46 01 0C 00
16B50   08 00 52 01 5A 01 0C 00 EC 00 00 01 2C 00 14 01
16B60   14 00 74 73 75 63 20 6D 6F 72 66 20 65 67 61 70
16B70   20 65 72 6F 74 53 14 01 08 00 6B 6E 61 74 20 6E
16B80   69 20 00 01 24 00 00 01 41 00 00 01 40 00 08 01
16B90   54 98 08 01 55 98 0A 01 00 00 14 01 09 00 72 6F
16BA0   72 72 45 20 44 4F 44 00 14 01 13 00 6B 6E 75 72
16BB0   74 20 64 6F 64 20 65 68 74 20 65 7A 65 69 53 00
16BC0   14 01 08 00 20 64 65 64 6F 63 65 64 14 01 0A 00
16BD0   65 6C 69 66 20 64 6E 75 6F 66 14 01 06 00 74 61
16BE0   6D 72 6F 66 14 01 0D 00 20 73 65 6E 6F 74 20 74
16BF0   75 70 74 75 6F 00 14 01 14 00 64 65 76 65 69 63
16C00   65 72 20 74 6F 6E 20 74 63 65 6E 6E 6F 43 14 01
16C10   02 00 34 34 14 01 04 00 23 23 23 23 14 01 13 00
16C20   64 65 76 69 65 63 65 72 20 74 63 65 6E 6E 6F 63
16C30   73 69 44 00 14 01 02 00 23 2A 00 01 2C 01 52 01
16C40   5A 01 08 00 1E 00 14 01 02 00 39 38 02 01 56 98
16C50   02 01 58 98 02 01 5A 98 08 01 5C 98 52 01 B4 01
16C60   04 00 9E 00 14 01 1D 00 74 6E 69 72 70 20 6F 74
16C70   20 72 65 6D 6F 74 73 75 63 20 74 73 72 69 66 20
16C80   72 65 74 6E 45 00 14 01 1C 00 74 6E 69 72 70 20
16C90   6F 74 20 72 65 6D 6F 74 73 75 63 20 74 73 61 6C
16CA0   20 72 65 74 6E 45 14 01 32 00 3F 29 4E 20 72 6F
16CB0   20 59 28 20 67 6E 69 74 6E 69 72 70 20 72 65 74
16CC0   66 61 20 73 72 65 74 73 69 67 65 72 20 65 67 61
16CD0   65 73 75 20 65 68 74 20 6F 72 65 5A 14 01 01 00
16CE0   59 00 14 01 01 00 79 00 14 01 01 00 4E 00 00 01
16CF0   2D 00 00 01 42 00 00 01 4B 00 52 01 50 01 0C 00
16D00   30 00 16 01 5D 98 10 00 08 01 6F 98 56 01 80 98
16D10   00 00 08 01 82 98 02 01 84 98 08 01 86 98 14 01
16D20   08 00 23 20 74 65 6B 63 6F 50 52 01 14 01 04 00
16D30   E8 00 00 01 28 00 14 01 04 00 3D 66 76 6F 14 01
16D40   11 00 73 64 72 6F 63 65 72 20 66 6F 20 72 65 62
16D50   6D 75 6E 00 02 01 88 98 16 01 8A 98 0A 00 08 01
16D60   96 98 08 01 97 98 08 01 98 98 08 01 99 98 08 01
16D70   9A 98 08 01 9B 98 08 01 9C 98 08 01 9D 98 08 01
16D80   9E 98 08 01 9F 98 20 01 A0 98 84 08 20 01 F1 98
16D90   FA 08 02 01 9C 99 14 01 34 00 64 65 73 61 72 65
16DA0   20 65 62 20 6C 6C 69 77 20 79 65 68 74 20 74 73
16DB0   69 78 65 20 73 65 6C 69 66 20 72 65 6D 6F 74 73
16DC0   75 63 20 66 49 20 3A 47 4E 49 4E 52 41 57 14 01
16DD0   27 00 74 69 78 65 20 6F 74 20 79 65 6B 20 72 65
16DE0   68 74 6F 20 79 6E 61 20 6E 6F 20 6F 67 20 6F 74
16DF0   20 27 47 27 20 65 70 79 54 00 14 01 13 00 6E 65
16E00   74 74 69 72 77 20 67 6E 69 65 62 20 73 65 6C 69
```

| | | | | | | | | | | | | | | | | |
|---|---|---|---|---|---|---|---|---|---|---|---|---|---|---|---|---|
| 16E10 | 46 | 00 | 52 | 01 | 64 | 01 | 0C | 00 | 08 | 00 | 52 | 01 | 28 | 01 | 0C | 00 |
| 16E20 | 10 | 01 | 14 | 01 | 05 | 00 | 58 | 45 | 44 | 4E | 49 | 00 | 00 | 01 | AA | 00 |
| 16E30 | 14 | 01 | 09 | 00 | 53 | 52 | 45 | 4D | 4F | 54 | 53 | 55 | 43 | 00 | 00 | 01 |
| 16E40 | 51 | 00 | 08 | 01 | 9E | 99 | 08 | 01 | 9F | 99 | 02 | 01 | A0 | 99 | 02 | 01 |
| 16E50 | A2 | 99 | 14 | 01 | 15 | 00 | 72 | 65 | 74 | 6E | 65 | 65 | 72 | 20 | 2D | 20 |
| 16E60 | 72 | 6F | 72 | 72 | 65 | 20 | 65 | 75 | 6C | 61 | 56 | 00 | 14 | 01 | 14 | 00 |
| 16E70 | 23 | 74 | 73 | 75 | 63 | 20 | 73 | 61 | 20 | 65 | 6D | 61 | 73 | 20 | 3A | 52 |
| 16E80 | 4F | 52 | 52 | 45 | 02 | 01 | A4 | 99 | 56 | 01 | B6 | 99 | 00 | 00 | 02 | 01 |
| 16E90 | B8 | 99 | 16 | 01 | BA | 99 | 10 | 00 | 56 | 01 | DC | 99 | 00 | 00 | 02 | 01 |
| 16EA0 | DE | 99 | 00 | 01 | F0 | 00 | 00 | 01 | 6F | 00 | 00 | 01 | E7 | 03 | 14 | 01 |
| 16EB0 | 04 | 00 | 23 | 23 | 23 | 3B | 14 | 01 | 04 | 00 | 30 | 52 | 43 | 4C | 00 | 01 |
| 16EC0 | 43 | 01 | 14 | 01 | 04 | 00 | 31 | 52 | 43 | 4C | 14 | 01 | 19 | 00 | 29 | 30 |
| 16ED0 | 32 | 2D | 31 | 28 | 20 | 72 | 65 | 62 | 6D | 75 | 6E | 20 | 65 | 6C | 62 | 61 |
| 16EE0 | 74 | 20 | 72 | 65 | 74 | 6E | 45 | 00 | 00 | 01 | 5E | 01 | 00 | 01 | FA | 00 |
| 16EF0 | 14 | 01 | 04 | 00 | 32 | 52 | 43 | 4C | 14 | 01 | 04 | 00 | 33 | 52 | 43 | 4C |
| 16F00 | 00 | 01 | B6 | 1C | 00 | 01 | BA | 00 | 14 | 01 | 04 | 00 | 34 | 52 | 43 | 4C |
| 16F10 | 08 | 01 | E0 | 99 | 08 | 01 | E1 | 99 | 08 | 01 | E2 | 99 | 14 | 01 | 06 | 00 |
| 16F20 | 53 | 4D | 52 | 41 | 4C | 41 | 00 | 01 | 8F | 00 | 52 | 01 | 4A | 02 | 04 | 00 |
| 16F30 | 7E | 00 | 10 | 01 | E3 | 99 | 14 | 01 | 1A | 00 | 20 | 49 | 4E | 41 | 20 | 72 |
| 16F40 | 6F | 20 | 72 | 65 | 62 | 6D | 75 | 6E | 20 | 65 | 6E | 6F | 68 | 70 | 20 | 72 |
| 16F50 | 65 | 74 | 6E | 45 | 14 | 01 | 16 | 00 | 20 | 72 | 65 | 62 | 6D | 75 | 6E | 20 |
| 16F60 | 72 | 65 | 6D | 6F | 74 | 73 | 75 | 63 | 20 | 72 | 65 | 74 | 6E | 45 | 14 | 01 |
| 16F70 | 0A | 00 | 58 | 45 | 44 | 4E | 49 | 20 | 4F | 44 | 45 | 52 | 14 | 01 | 08 | 00 |
| 16F80 | 4B | 43 | 41 | 42 | 50 | 4F | 4F | 4C | 14 | 01 | 04 | 00 | 50 | 4D | 55 | 44 |
| 16F90 | 14 | 01 | 03 | 00 | 50 | 41 | 4D | 00 | 14 | 01 | 04 | 00 | 54 | 53 | 45 | 54 |
| 16FA0 | 14 | 01 | 04 | 00 | 54 | 49 | 58 | 45 | 52 | 01 | 46 | 01 | 04 | 00 | 72 | 00 |
| 16FB0 | 14 | 01 | 1E | 00 | 3F | 29 | 4E | 20 | 72 | 6F | 20 | 59 | 28 | 20 | 3F | 73 |
| 16FC0 | 68 | 6E | 75 | 72 | 74 | 20 | 44 | 49 | 44 | 20 | 74 | 75 | 6F | 20 | 79 | 73 |
| 16FD0 | 75 | 42 | 14 | 01 | 08 | 00 | 65 | 6E | 69 | 6C | 20 | 66 | 66 | 4F | 14 | 01 |
| 16FE0 | 05 | 00 | 47 | 55 | 42 | 45 | 44 | C0 | 14 | 01 | 0C | 00 | 53 | 45 | 4C | 49 |
| 16FF0 | 46 | 5F | 45 | 54 | 41 | 45 | 52 | 43 | 14 | 01 | 04 | 00 | 45 | 4D | 49 | 54 |
| 17000 | 14 | 01 | 15 | 00 | 29 | 53 | 53 | 3A | 4D | 4D | 3A | 48 | 48 | 28 | 20 | 65 |
| 17010 | 6D | 69 | 54 | 20 | 72 | 65 | 74 | 6E | 45 | 00 | 52 | 01 | AA | 01 | 0C | 00 |
| 17020 | 22 | 00 | 14 | 01 | 13 | 00 | 29 | 59 | 59 | 2F | 44 | 44 | 2F | 4D | 4D | 28 |
| 17030 | 20 | 65 | 74 | 61 | 44 | 20 | 72 | 65 | 74 | 6E | 45 | 00 | 52 | 01 | BE | 01 |
| 17040 | 0C | 00 | 7A | 00 | 14 | 01 | 08 | 00 | 72 | 65 | 6D | 6F | 74 | 73 | 75 | 63 |
| 17050 | 14 | 01 | 09 | 00 | 20 | 20 | 20 | 20 | 20 | 20 | 20 | 20 | 20 | 00 | 14 | 01 |
| 17060 | 05 | 00 | 67 | 75 | 62 | 65 | 64 | 00 | 14 | 01 | 01 | 00 | 4C | 00 | 14 | 01 |
| 17070 | 01 | 00 | 49 | 00 | 14 | 01 | 01 | 00 | 54 | 00 | 14 | 01 | 01 | 00 | 45 | 00 |
| 17080 | 14 | 01 | 05 | 00 | 43 | 45 | 44 | 4F | 43 | 00 | 14 | 01 | 02 | 00 | 2D | 20 |
| 17090 | 00 | 01 | 4D | 00 | 14 | 01 | 1D | 00 | 29 | 70 | 6C | 65 | 68 | 20 | 72 | 6F |
| 170A0 | 66 | 20 | 3F | 28 | 20 | 65 | 70 | 79 | 74 | 20 | 64 | 72 | 61 | 6F | 62 | 20 |
| 170B0 | 72 | 65 | 74 | 6E | 45 | 00 | 52 | 01 | D2 | 01 | 04 | 00 | 12 | 00 | 00 | 01 |
| 170C0 | 4F | 00 | 14 | 01 | 01 | 00 | 3F | 00 | 52 | 01 | C8 | 01 | 04 | 00 | 60 | 02 |
| 170D0 | 14 | 01 | 07 | 00 | 53 | 50 | 59 | 54 | 44 | 52 | 42 | 00 | 00 | 01 | 46 | 00 |
| 170E0 | 14 | 01 | 14 | 00 | 20 | 73 | 73 | 65 | 72 | 64 | 64 | 61 | 20 | 63 | 65 | 64 |
| 170F0 | 6F | 63 | 20 | 72 | 65 | 74 | 6E | 45 | 14 | 01 | 05 | 00 | 52 | 4F | 52 | 52 |
| 17100 | 45 | 00 | 00 | 01 | F4 | 01 | 14 | 01 | 0D | 00 | 6E | 6F | 69 | 74 | 61 | 74 |
| 17110 | 73 | 20 | 72 | 65 | 74 | 6E | 45 | 00 | 14 | 01 | 04 | 00 | 20 | 44 | 49 | 20 |
| 17120 | 14 | 01 | 0B | 00 | 6B | 6E | 75 | 72 | 74 | 20 | 72 | 65 | 74 | 6E | 45 | 00 |
| 17130 | 14 | 01 | 0F | 00 | 20 | 73 | 74 | 69 | 67 | 69 | 64 | 20 | 78 | 69 | 66 | 65 |
| 17140 | 72 | 70 | 20 | 00 | 14 | 01 | 06 | 00 | 23 | 23 | 23 | 23 | 2D | 2D | 14 | 01 |
| 17150 | 0A | 00 | 20 | 20 | 20 | 20 | 20 | 20 | 20 | 20 | 20 | 20 | 14 | 01 | 07 | 00 |
| 17160 | 32 | 6E | 6F | 69 | 74 | 70 | 6F | 00 | 00 | 01 | 29 | 00 | 00 | 01 | 2E | 00 |
| 17170 | 00 | 01 | 33 | 00 | 00 | 01 | 60 | 00 | 00 | 01 | 56 | 00 | 00 | 01 | 47 | 00 |
| 17180 | 00 | 01 | 4C | 00 | 00 | 01 | 5B | 00 | 14 | 01 | 01 | 00 | 33 | 00 | 14 | 01 |
| 17190 | 06 | 00 | 20 | 65 | 6C | 64 | 49 | 20 | 14 | 01 | 07 | 00 | 20 | 6B | 6E | 75 |
| 171A0 | 72 | 54 | 20 | 00 | 14 | 01 | 05 | 00 | 70 | 75 | 6F | 72 | 67 | 00 | 14 | 01 |
| 171B0 | 2F | 00 | 65 | 67 | 6E | 61 | 68 | 63 | 20 | 6F | 6E | 20 | 72 | 6F | 66 | 20 |
| 171C0 | 3E | 4E | 52 | 55 | 54 | 45 | 52 | 3C | 20 | 72 | 6F | 20 | 65 | 67 | 6E | 61 |
| 171D0 | 68 | 63 | 20 | 6F | 74 | 20 | 70 | 75 | 6F | 72 | 67 | 20 | 72 | 65 | 74 | 6E |
| 171E0 | 45 | 00 | 14 | 01 | 05 | 00 | 72 | 65 | 74 | 6E | 45 | 00 | 14 | 01 | 31 | 00 |
| 171F0 | 2E | 65 | 6E | 6F | 20 | 68 | 63 | 61 | 65 | 20 | 72 | 65 | 74 | 66 | 61 | 20 |
| 17200 | 3E | 4E | 52 | 55 | 54 | 45 | 52 | 3C | 20 | 73 | 73 | 65 | 72 | 50 | 20 | 2E |
| 17210 | 73 | 72 | 65 | 62 | 6D | 75 | 6E | 20 | 74 | 6E | 65 | 6D | 70 | 69 | 75 | 71 |
| 17220 | 65 | 00 | 14 | 01 | 26 | 00 | 72 | 65 | 62 | 6D | 75 | 6E | 20 | 74 | 73 | 61 |

| | | | | | | | | | | | | | | | | |
|---|---|---|---|---|---|---|---|---|---|---|---|---|---|---|---|---|
| 17230 | 6C | 20 | 72 | 65 | 74 | 66 | 61 | 20 | 6E | 69 | 61 | 67 | 61 | 20 | 3E | 4E |
| 17240 | 52 | 55 | 54 | 45 | 52 | 3C | 20 | 73 | 73 | 65 | 72 | 50 | 14 | 01 | 0E | 00 |
| 17250 | 52 | 45 | 42 | 4D | 55 | 4E | 20 | 44 | 49 | 4C | 41 | 56 | 4E | 49 | 14 | 01 |
| 17260 | 1E | 00 | 29 | 53 | 4F | 43 | 28 | 20 | 73 | 6E | 6F | 69 | 74 | 70 | 6F | 20 |
| 17270 | 65 | 63 | 69 | 76 | 72 | 65 | 73 | 20 | 66 | 6F | 20 | 73 | 73 | 61 | 6C | 43 |
| 17280 | 14 | 01 | 03 | 00 | 53 | 4F | 43 | 00 | 14 | 01 | 31 | 00 | 2E | 74 | 69 | 78 |
| 17290 | 65 | 20 | 6F | 74 | 20 | 3E | 4E | 52 | 55 | 54 | 45 | 52 | 3C | 20 | 72 | 6F |
| 172A0 | 20 | 29 | 30 | 32 | 2D | 31 | 28 | 20 | 65 | 67 | 6E | 61 | 68 | 63 | 20 | 6F |
| 172B0 | 74 | 20 | 73 | 73 | 61 | 6C | 43 | 20 | 72 | 65 | 74 | 6E | 45 | 00 | 14 | 01 |
| 172C0 | 23 | 00 | 29 | 33 | 34 | 31 | 2D | 30 | 28 | 20 | 65 | 67 | 6E | 61 | 68 | 63 |
| 172D0 | 20 | 6F | 74 | 20 | 6E | 6F | 69 | 74 | 70 | 6F | 20 | 72 | 65 | 74 | 6E | 45 |
| 172E0 | 20 | 20 | 20 | 20 | 20 | 00 | 14 | 01 | 04 | 00 | 4B | 4E | 49 | 4C | 0E | 01 |
| 172F0 | 02 | 01 | 06 | 00 | 14 | 01 | 0E | 00 | 73 | 65 | 67 | 6E | 61 | 68 | 63 | 20 |
| 17300 | 67 | 6E | 69 | 76 | 61 | 53 | 14 | 01 | 06 | 00 | 6D | 65 | 74 | 73 | 79 | 73 |
| 17310 | 00 | 01 | 30 | 11 | 00 | 01 | E8 | 03 | 00 | 01 | 4C | 04 | 00 | 01 | C8 | 00 |
| 17320 | 00 | 01 | 58 | 01 | 00 | 01 | 8C | 00 | 52 | 01 | 00 | 01 | 0C | 00 | 28 | 00 |
| 17330 | 14 | 01 | 04 | 00 | 24 | 58 | 55 | 41 | 14 | 01 | 04 | 00 | 24 | 52 | 43 | 4C |
| 17340 | 00 | 01 | 14 | 1E | 14 | 01 | 03 | 00 | 53 | 42 | 4D | 00 | 00 | 01 | 34 | 00 |
| 17350 | 52 | 01 | 50 | 01 | 08 | 00 | 3E | 00 | 00 | 01 | 36 | 00 | 14 | 01 | 01 | 00 |
| 17360 | 68 | 00 | 14 | 01 | 18 | 00 | 20 | 20 | 20 | 20 | 20 | 20 | 65 | 75 | 6C | 61 |
| 17370 | 76 | 20 | 77 | 65 | 6E | 20 | 72 | 65 | 74 | 6E | 45 | 20 | 20 | 20 | 00 | 01 |
| 17380 | E9 | 01 | 08 | 01 | E9 | 99 | 02 | 01 | EA | 99 | 02 | 01 | EC | 99 | 52 | 01 |
| 17390 | 82 | 01 | 08 | 00 | 60 | 00 | 00 | 01 | 00 | 10 | 00 | 01 | 26 | 00 | 00 | 01 |
| 173A0 | 50 | 00 | 14 | 01 | 09 | 00 | 73 | 72 | 65 | 6D | 6F | 74 | 73 | 75 | 63 | 00 |
| 173B0 | 14 | 01 | 0A | 00 | 52 | 4F | 52 | 52 | 45 | 20 | 54 | 49 | 4E | 49 | 14 | 01 |
| 173C0 | 03 | 00 | 52 | 4E | 54 | 00 | 00 | 01 | 40 | 02 | 00 | 01 | 49 | 00 | 00 | 01 |
| 173D0 | 48 | 00 | 00 | 01 | 3F | 00 | 14 | 01 | 04 | 00 | 32 | 34 | 43 | 38 | 14 | 01 |
| 173E0 | 04 | 00 | 32 | 34 | 43 | 39 | 14 | 01 | 04 | 00 | 32 | 34 | 43 | 41 | 52 | 01 |
| 173F0 | 00 | 01 | 1C | 00 | 14 | 00 | 53 | 59 | 53 | 43 | 41 | 4C | 4C | 00 | 00 | 01 |
| 17400 | 00 | 0B | 52 | 01 | A0 | 01 | 1C | 00 | 06 | 00 | 52 | 01 | 0A | 01 | 1C | 00 |
| 17410 | 16 | 00 | 14 | 01 | 09 | 00 | 72 | 6F | 72 | 72 | 65 | 20 | 67 | 6F | 4C | 00 |
| 17420 | 52 | 01 | 1E | 01 | 14 | 00 | 1C | 00 | 45 | 56 | 45 | 4E | 54 | 00 | 14 | 01 |
| 17430 | 09 | 00 | 20 | 20 | 20 | 20 | 20 | 20 | 4E | 4F | 43 | 00 | 52 | 01 | 78 | 01 |
| 17440 | 0C | 00 | 12 | 01 | 0E | 01 | 02 | 03 | 23 | 00 | 00 | 01 | 67 | 00 | 00 | 01 |
| 17450 | 23 | 00 | 00 | 01 | 69 | 00 | 00 | 01 | 45 | 00 | 02 | 01 | EE | 99 | 10 | 01 |
| 17460 | F0 | 99 | 08 | 01 | F6 | 99 | 08 | 01 | F7 | 99 | 14 | 01 | 0D | 00 | 74 | 73 |
| 17470 | 65 | 74 | 20 | 6B | 63 | 61 | 62 | 70 | 6F | 6F | 4C | 00 | 14 | 01 | 10 | 00 |
| 17480 | 29 | 33 | 2D | 31 | 28 | 72 | 65 | 62 | 6D | 75 | 6E | 20 | 65 | 67 | 61 | 43 |
| 17490 | 14 | 01 | 17 | 00 | 20 | 79 | 72 | 61 | 64 | 6E | 6F | 63 | 65 | 29 | 53 | 28 |
| 174A0 | 20 | 72 | 6F | 20 | 79 | 72 | 61 | 6D | 69 | 72 | 29 | 50 | 28 | 00 | 00 | 01 |
| 174B0 | 53 | 00 | 14 | 01 | 01 | 00 | 50 | 00 | 14 | 01 | 01 | 00 | 53 | 00 | 14 | 01 |
| 174C0 | 0D | 00 | 20 | 74 | 6E | 65 | 53 | 20 | 2D | 20 | 72 | 6F | 72 | 72 | 45 | 00 |
| 174D0 | 14 | 01 | 0A | 00 | 20 | 64 | 65 | 76 | 69 | 65 | 63 | 65 | 72 | 20 | 14 | 01 |
| 174E0 | 04 | 00 | 20 | 74 | 61 | 20 | 00 | 01 | 55 | 00 | 08 | 01 | F8 | 99 | 08 | 01 |
| 174F0 | F9 | 99 | 08 | 01 | FA | 99 | 08 | 01 | FB | 99 | 08 | 01 | FC | 99 | 08 | 01 |
| 17500 | FD | 99 | 14 | 01 | 0D | 00 | 33 | 20 | 52 | 4F | 20 | 32 | 2C | 31 | 20 | 45 |
| 17510 | 47 | 41 | 43 | 00 | 14 | 01 | 0F | 00 | 3F | 20 | 32 | 23 | 20 | 52 | 4F | 20 |
| 17520 | 31 | 23 | 20 | 43 | 49 | 4C | 44 | 00 | 00 | 01 | 27 | 00 | 00 | 01 | 80 | 00 |
| 17530 | 00 | 01 | FE | 00 | 14 | 01 | 0B | 00 | 45 | 47 | 41 | 43 | 20 | 46 | 4F | 20 |
| 17540 | 50 | 41 | 4D | 00 | 14 | 01 | 05 | 00 | 43 | 49 | 4C | 44 | 20 | 00 | 52 | 01 |
| 17550 | 5A | 01 | 04 | 00 | 06 | 05 | 08 | 01 | FE | 99 | 14 | 01 | 0D | 00 | 72 | 6F |
| 17560 | 72 | 72 | 45 | 20 | 6F | 69 | 64 | 75 | 41 | 62 | 4D | 00 | 08 | 01 | FF | 99 |
| 17570 | 08 | 01 | 00 | 9A | 14 | 01 | 19 | 00 | 4C | 45 | 4E | 4E | 41 | 48 | 43 | 20 |
| 17580 | 4E | 4F | 20 | 44 | 45 | 4B | 43 | 41 | 52 | 54 | 20 | 45 | 4C | 49 | 42 | 4F |
| 17590 | 4D | 00 | 08 | 01 | 01 | 9A | 08 | 01 | 02 | 9A | 08 | 01 | 03 | 9A | 14 | 01 |
| 175A0 | 01 | 00 | 21 | 00 | 14 | 01 | 10 | 00 | 20 | 64 | 65 | 76 | 69 | 65 | 63 | 65 |
| 175B0 | 72 | 20 | 73 | 74 | 69 | 67 | 69 | 44 | 14 | 01 | 08 | 00 | 72 | 6F | 72 | 72 |
| 175C0 | 45 | 20 | 42 | 4D | 14 | 01 | 09 | 00 | 23 | 68 | 63 | 20 | 6E | 6F | 20 | 44 |
| 175D0 | 49 | 00 | 14 | 01 | 07 | 00 | 38 | 39 | 39 | 39 | 39 | 39 | 39 | 00 | 14 | 01 |
| 175E0 | 02 | 00 | 68 | 43 | 14 | 01 | 05 | 00 | 20 | 49 | 4E | 41 | 20 | 00 | 14 | 01 |
| 175F0 | 16 | 00 | 6E | 6F | 20 | 72 | 6F | 72 | 72 | 65 | 20 | 6D | 75 | 73 | 6B | 63 |
| 17600 | 65 | 68 | 43 | 20 | 53 | 54 | 4D | 49 | 14 | 01 | 02 | 00 | 36 | 33 | 14 | 01 |
| 17610 | 01 | 00 | 37 | 00 | 14 | 01 | 02 | 00 | 32 | 37 | 14 | 01 | 02 | 00 | 33 | 37 |
| 17620 | 14 | 01 | 0E | 00 | 6B | 6E | 75 | 72 | 74 | 20 | 6F | 74 | 20 | 65 | 74 | 75 |
| 17630 | 6F | 52 | 14 | 01 | 0A | 00 | 6C | 69 | 61 | 66 | 20 | 6B | 6E | 69 | 77 | 20 |

```
17640   14 01 0A 00 6C 69 61 66 20 6C 6C 69 42 20 14 01
17650   0F 00 6C 69 61 66 20 64 61 6F 6C 20 6C 6C 69 42
17660   20 00 14 01 18 00 6E 6F 69 74 61 64 69 6C 61 76
17670   20 2E 4F 2E 43 20 64 65 76 69 65 63 65 52 14 01
17680   01 00 36 00 14 01 01 00 35 00 14 01 16 00 23 68
17690   63 20 6E 6F 20 64 65 74 61 6E 69 6D 72 65 74 20
176A0   6C 6C 61 43 14 01 02 00 33 35 14 01 02 00 66 4D
176B0   14 01 0E 00 65 73 61 65 6C 65 72 20 6B 6E 75 72
176C0   74 20 14 01 0D 00 20 53 45 4E 4F 54 20 54 55 50
176D0   54 55 4F 00 14 01 14 00 44 45 56 49 45 43 45 52
176E0   20 54 4F 4E 20 54 43 45 4E 4E 4F 43 14 01 02 00
176F0   35 36 08 01 04 9A 14 01 02 00 38 32 14 01 02 00
17700   30 34 08 01 05 9A 5A 01 12 00 DC 33 FF FF 5C 41
17710   47 41 49 4E 01 00 08 01 06 9A 08 01 07 9A 08 01
17720   08 9A 16 01 09 9A 10 00 14 01 08 00 72 6F 72 72
17730   45 20 46 4D 14 01 0C 00 6C 69 61 66 20 6B 6E 69
17740   77 20 46 4D 14 01 0D 00 6C 69 61 66 20 74 69 67
17750   69 64 20 46 4D 00 14 01 14 00 6C 69 61 66 20 6B
17760   6E 69 77 20 6C 6C 69 42 20 4F 43 20 46 4D 14 01
17770   16 00 6C 69 61 66 20 64 61 6F 6C 20 61 74 61 64
17780   20 6C 6C 69 42 20 46 4D 14 01 0F 00 74 61 6D 72
17790   6F 46 20 2D 20 72 65 6D 61 6F 52 00 14 01 05 00
177A0   74 73 65 44 20 00 14 01 0A 00 20 65 64 6F 43 20
177B0   70 61 43 20 14 01 0A 00 20 20 20 20 20 20 20 4E
177C0   4F 43 14 01 0A 00 20 20 20 20 20 20 20 58 55 41
177D0   14 01 0A 00 20 20 20 20 4C 41 49 52 45 53 14 01
177E0   0D 00 38 2C 4E 2C 30 30 32 31 3A 31 4D 4F 43 00
177F0   00 01 84 03 00 01 63 00 14 01 15 00 74 73 75 63
17800   20 6D 6F 72 66 20 65 67 61 70 20 6C 6C 61 63 65
17810   52 00 14 01 0E 00 6B 6E 61 74 20 6E 69 20 64 65
17820   76 61 73 20 14 01 04 00 72 6F 66 20 14 01 08 00
17830   73 64 6E 6F 63 65 73 20 14 01 0D 00 20 73 65 6E
17840   6F 74 20 74 75 70 74 75 4F 00 14 01 13 00 68 6E
17850   61 74 20 65 63 69 6F 76 20 6B 63 61 62 79 61 6C
17860   50 00 08 01 1B 9A 08 01 1C 9A 08 01 1D 9A 56 01
17870   2E 9A 00 00 02 01 30 9A 16 01 32 9A 01 00 00 01
17880   7C 00 00 01 D2 00 00 01 D8 00 00 01 98 00 00 01
17890   5A 00 00 01 8E 00 00 01 7A 00 00 01 57 00 00 01
178A0   6D 00 00 01 7D 00 00 01 B0 00 00 01 E6 00 08 01
178B0   35 9A 56 01 46 9A 00 00 08 01 48 9A 08 01 49 9A
178C0   08 01 4A 9A 16 01 4B 9A 03 00 16 01 50 9A 03 00
178D0   16 01 55 9A 03 00 08 01 5A 9A 56 01 6B 9A 00 00
178E0   08 01 6D 9A 56 01 7E 9A 00 00 16 01 80 9A 03 00
178F0   16 01 85 9A 10 00 08 01 97 9A 08 01 98 9A 08 01
17900   99 9A 00 01 63 1D 00 01 65 1D 00 01 67 1D 00 01
17910   60 1D 00 01 DD 00 00 01 A5 1C 14 01 0A 00 20 65
17920   74 75 6F 52 20 52 43 4C 14 01 12 00 65 6C 62 61
17930   74 20 65 64 6F 43 20 65 63 69 66 66 4F 20 14 01
17940   13 00 72 65 62 6D 75 6E 20 6E 6F 69 74 69 73 6F
17950   70 20 74 61 20 00 14 01 07 00 65 63 69 6F 68 43
17960   20 00 14 01 08 00 20 73 74 69 67 69 44 20 08 01
17970   9A 9A 08 01 9B 9A 08 01 9C 9A 08 01 9D 9A 08 01
17980   9E 9A 00 01 5F 00 00 01 BD 00 00 01 70 00 00 01
17990   F4 00 00 01 87 00 00 01 92 00 00 01 A5 00 00 01
179A0   F9 00 00 01 A7 00 00 01 78 00 00 01 DF 00 00 01
179B0   DB 00 00 01 7B 00 00 01 C1 00 00 01 A4 00 00 01
179C0   D0 00 00 01 5E 00 00 01 E9 00 00 01 F6 00 00 01
179D0   8B 00 00 01 9B 00 00 01 00 01 00 01 2F 00 C0 01
179E0   8A 00 00 01 CD 00 00 01 FB 00 00 01 E0 00 00 01
179F0   A9 00 00 01 A1 00 00 01 96 00 00 01 F1 00 00 01
17A00   BC 00 08 01 9F 9A 08 01 A0 9A 08 01 A1 9A 14 01
17A10   03 00 2A 34 32 00 14 01 07 00 39 39 39 39 39 39
17A20   39 00 14 01 03 00 23 34 32 00 14 01 02 00 34 32
17A30   14 01 17 00 6E 6F 69 74 63 6E 75 66 20 65 73 6E
17A40   65 73 20 6E 69 20 72 6F 72 72 45 00 08 01 A2 9A
```

```
17A50   00 01 20 1C 52 01 1E 01 04 00 6E 00 14 01 18 00
17A60   2E 2E 2E 64 65 64 61 6F 6C 20 74 6F 6E 20 73 69
17A70   20 45 58 45 2E 58 47 53 14 01 12 00 2E 2E 2E 64
17A80   65 74 73 65 75 71 65 52 20 74 72 6F 62 41 14 01
17A90   0A 00 3D 4E 4F 49 54 41 52 45 50 4F 14 01 07 00
17AA0   3D 52 4F 52 52 45 20 00 14 01 08 00 30 34 32 57
17AB0   54 52 43 53 14 01 02 00 3A 44 14 01 04 00 20 20
17AC0   20 20 52 01 96 01 08 00 5E 00 00 01 84 00 00 01
17AD0   44 00 08 01 A3 9A 08 01 A4 9A 08 01 A5 9A 08 01
17AE0   A6 9A 08 01 A7 9A 08 01 A8 9A 16 01 A9 9A 10 00
17AF0   14 01 07 00 20 6C 61 6E 67 69 53 00 14 01 02 00
17B00   32 33 08 01 BB 9A 08 01 BC 9A 08 01 BD 9A 08 01
17B10   BE 9A 02 01 C0 9A 02 01 C2 9A 16 01 C4 9A 04 00
17B20   52 01 D2 01 08 00 44 00 00 01 B8 0B 0E 01 02 00
17B30   05 00 14 01 01 00 39 00 08 01 CA 9A 08 01 CB 9A
17B40   08 01 CC 9A 08 01 CD 9A 14 01 0E 00 72 6F 72 72
17B50   65 20 65 64 6F 43 20 70 61 43 00 01 65 00 14 01
17B60   01 00 46 00 52 01 14 01 14 00 18 01 0E 01 03 01
17B70   01 32 08 01 CE 9A 08 01 CF 9A 08 01 D0 9A 16 01
17B80   D1 9A 03 00 16 01 D6 9A 01 00 08 01 D9 9A 08 01
17B90   DA 9A 5A 01 12 00 68 38 FF FF 5C 41 47 41 49 4E
17BA0   01 00 08 01 DB 9A 08 01 DC 9A 08 01 DD 9A 16 01
17BB0   DE 9A 10 00 14 01 0E 00 20 45 53 41 45 4C 45 52
17BC0   20 4B 4E 55 52 54 14 01 09 00 20 45 54 41 44 49
17BD0   4C 41 56 00 14 01 09 00 4B 4E 55 52 54 20 44 49
17BE0   44 00 14 01 0E 00 53 4B 4E 55 52 54 20 4E 41 43
17BF0   53 20 20 31 14 01 0D 00 44 52 41 43 20 54 45 53
17C00   45 52 20 20 32 00 14 01 07 00 54 49 58 45 20 20
17C10   33 00 14 01 0C 00 52 45 42 4D 55 4E 20 52 45 54
17C20   4E 45 14 01 03 00 20 20 20 00 14 01 0F 00 53 4B
17C30   4E 55 52 54 20 47 4E 49 4E 4E 41 43 53 00 14 01
17C40   08 00 20 23 20 4B 4E 55 52 54 14 01 0A 00 20 20
17C50   44 45 44 4F 43 45 44 20 08 01 F0 9A 08 01 F1 9A
17C60   08 01 F2 9A 08 01 F3 9A 16 01 F4 9A 0E 00 16 01
17C70   04 9B 02 00 02 01 08 9B 08 01 0A 9B 52 01 96 01
17C80   04 00 D4 00 14 01 04 00 45 47 41 43 14 01 0B 00
17C90   4C 4F 52 54 4E 4F 43 20 4D 43 50 00 14 01 0E 00
17CA0   4C 45 4E 4E 41 48 43 20 45 4C 47 4E 49 53 14 01
17CB0   0B 00 4C 45 4E 4E 41 48 43 20 4F 57 54 00 14 01
17CC0   0E 00 43 45 44 2F 43 4E 45 20 45 4C 49 42 4F 4D
17CD0   14 01 09 00 4B 4E 55 52 54 20 44 4F 44 00 14 01
17CE0   0A 00 4B 4E 55 52 54 20 41 44 4F 44 14 01 0A 00
17CF0   48 54 4E 59 53 20 45 4E 4F 54 14 01 0E 00 47 4E
17D00   49 47 41 50 20 4C 41 54 49 47 49 44 14 01 10 00
17D10   45 47 41 50 20 53 42 4D 20 4C 41 54 49 47 49 44
17D20   14 01 0D 00 45 47 41 53 53 45 4D 20 45 43 49 4F
17D30   56 00 14 01 08 00 4B 4E 55 52 54 20 46 4D 14 01
17D40   0D 00 45 47 41 52 4F 54 53 20 45 43 49 4F 56 00
17D50   52 01 2C 02 04 00 94 05 14 01 01 00 6E 00 14 01
17D60   01 00 70 00 08 01 0B 9B 08 01 0C 9B 16 01 0D 9B
17D70   03 00 16 01 12 9B 01 00 14 01 07 00 4C 41 54 49
17D80   47 49 44 00 14 01 12 00 54 53 45 54 20 4B 43 41
17D90   42 50 4F 4F 4C 20 4F 46 49 46 14 01 0D 00 20 54
17DA0   4E 45 53 20 2D 20 52 4F 52 52 45 00 14 01 0A 00
17DB0   20 44 45 56 49 45 43 45 52 20 14 01 02 00 20 20
17DC0   14 01 08 00 4C 49 41 46 20 4D 41 52 14 01 0C 00
17DD0   21 21 21 20 2E 4B 2E 4F 20 4D 41 52 16 01 15 9B
17DE0   03 00 08 01 1A 9B 16 01 1B 9B 01 00 08 01 1E 9B
17DF0   16 01 1F 9B 10 00 08 01 31 9B 14 01 08 00 54 53
17E00   45 54 41 44 4F 44 14 01 19 00 20 29 34 2D 31 28
17E10   20 72 65 62 6D 75 6E 20 6B 6E 75 72 54 20 72 65
17E20   74 6E 45 00 14 01 09 00 20 74 73 65 74 20 4D 41
17E30   52 00 14 01 04 00 73 73 61 50 14 01 04 00 6C 69
17E40   61 46 14 01 08 00 54 41 54 53 41 44 4F 44 14 01
.7E50   15 00 20 64 6E 65 73 20 6F 74 20 73 74 69 67 69
.7E60   64 20 72 65 74 6E 45 00 14 01 01 00 43 00 14 01
```

17E70 08 00 20 3A 73 74 69 67 69 44 14 01 0B 00 74 6E
17E80 65 53 20 3A 72 6F 72 72 45 00 14 01 09 00 64 65
17E90 76 69 65 63 65 52 20 00 14 01 2F 00 20 74 6C 75
17EA0 61 66 65 64 20 72 6F 66 20 3E 4E 52 55 54 45 52
17EB0 3C 20 72 6F 20 73 74 69 67 69 64 20 66 6F 20 72
17EC0 65 62 6D 75 6E 20 72 65 74 6E 45 00 16 01 32 9B
17ED0 03 00 16 01 37 9B 01 00 16 01 3A 9B 10 00 08 01
17EE0 4C 9B 08 01 4D 9B 14 01 07 00 54 53 45 54 44 4F
17EF0 44 00 14 01 14 00 20 29 33 2D 31 28 20 23 20 4B
17F00 4E 55 52 54 20 52 45 54 4E 45 14 01 15 00 20 44
17F10 4E 45 53 20 4F 54 20 53 54 49 47 49 44 20 52 45
17F20 54 4E 45 00 00 01 D6 00 00 01 C4 00 00 01 B7 00
17F30 14 01 14 00 20 20 20 27 53 55 54 41 54 53 20 4B
17F40 4E 55 52 54 20 20 20 20 00 01 C7 00 00 01 B6 00
17F50 14 01 08 00 45 56 49 54 43 41 20 20 14 01 08 00
17F60 45 56 49 54 43 41 4E 49 14 01 08 00 23 20 4B 4E
17F70 55 52 54 20 00 01 D3 00 14 01 14 00 20 20 20 27
17F80 53 55 54 41 54 53 20 4D 52 41 4C 41 20 20 20 20
17F90 14 01 04 00 2E 4B 2E 4F 14 01 04 00 4C 49 41 46
17FA0 14 01 09 00 23 20 4B 4E 55 52 54 20 20 00 08 01
17FB0 4E 9B 08 01 4F 9B 08 01 50 9B 08 01 51 9B 08 01
17FC0 52 9B 10 01 53 9B 16 01 59 9B 01 00 16 01 5C 9B
17FD0 03 00 14 01 0B 00 21 21 21 20 4B 4F 20 20 4D 41
17FE0 52 00 14 01 0B 00 4C 49 41 46 20 53 55 54 41 54
17FF0 53 00 14 01 06 00 54 53 45 54 42 4D 14 01 16 00
18000 20 29 34 2D 31 28 20 23 20 4C 45 4E 4E 41 48 43
18010 20 52 45 54 4E 45 14 01 37 00 54 43 45 4E 4E 4F
18020 43 53 49 44 20 53 54 4D 49 3D 34 20 20 54 43 45
18030 4E 4E 4F 43 20 53 54 4D 49 3D 33 20 20 44 52 41
18040 55 47 20 53 54 4D 49 3D 32 20 20 35 30 38 32 3D
18050 31 00 14 01 14 00 54 53 45 54 20 4B 43 41 42 50
18060 4F 4F 4C 20 45 4C 49 42 4F 4D 14 01 15 00 21 21
18070 21 20 44 45 56 49 45 43 45 52 20 54 4F 4E 20 41
18080 54 41 44 00 14 01 05 00 20 54 4E 45 53 00 14 01
18090 07 00 53 52 4F 52 52 45 20 00 08 01 61 9B 08 01
180A0 62 9B 16 01 63 9B 01 00 16 01 66 9B 03 00 14 01
180B0 02 00 46 4D 14 01 0E 00 4B 4E 55 52 54 20 44 41
180C0 45 4C 20 27 45 27 14 01 07 00 45 56 49 54 43 41
180D0 20 00 14 01 09 00 45 56 49 54 43 41 4E 49 20 00
180E0 08 01 6B 9B 08 01 6C 9B 16 01 6D 9B 01 00 16 01
180F0 70 9B 03 00 14 01 05 00 48 43 45 4E 4F 00 14 01
18100 0C 00 20 20 54 53 45 54 20 52 4F 43 20 20 14 01
18110 06 00 44 45 53 53 41 50 14 01 06 00 44 45 4C 49
18120 41 46 14 01 16 00 20 20 20 20 53 27 53 55 54 41
18130 54 53 20 4D 52 41 4C 41 20 20 20 20 10 01 75 9B
18140 14 01 03 00 4E 4F 20 00 14 01 03 00 46 46 4F 00
18150 14 01 08 00 4C 49 41 46 20 52 4F 43 14 01 0C 00
18160 4C 49 41 46 20 50 4F 4F 4C 20 58 54 14 01 0A 00
18170 4C 49 41 46 20 4F 49 44 55 41 14 01 09 00 4D 52
18180 41 4C 41 20 54 53 45 00 08 01 7B 9B 08 01 7C 9B
18190 08 01 7D 9B 16 01 7E 9B 03 00 14 01 07 00 54 53
181A0 45 54 4D 43 50 00 14 01 08 00 53 45 4E 4F 54 4D
181B0 43 50 14 01 13 00 20 23 20 50 49 55 51 45 20 54
181C0 53 45 44 20 52 45 54 4E 45 00 02 01 84 9B 02 01
181D0 86 9B 08 01 88 9B 08 01 89 9B 16 01 8A 9B 10 00
181E0 16 01 9C 9B 01 00 16 01 9F 9B 03 00 14 01 04 00
181F0 45 4E 4F 54 14 01 17 00 20 53 45 4E 4F 54 20 28
18200 20 4C 4F 43 4F 54 4F 52 50 20 72 65 74 6E 45 00
18210 14 01 14 00 20 20 20 20 20 20 20 20 20 20 20 20
18220 20 20 20 20 20 20 20 20 14 01 29 00 20 20 20 20
18230 20 20 20 20 20 20 20 20 20 20 20 20 20 20 20 20
18240 54 41 45 50 45 52 20 4F 4E 3D 31 20 20 54 41 45
18250 50 45 52 3D 30 00 08 01 A4 9B 08 01 A5 9B 16 01
18260 A6 9B 01 00 16 01 A9 9B 10 00 14 01 05 00 48 43
18270 4F 57 54 00 14 01 11 00 4C 45 4E 4E 41 48 43 20
18280 48 43 54 41 4C 20 52 4F 43 00 14 01 0C 00 20 53

| | | | | | | | | | | | | | | | | |
|---|---|---|---|---|---|---|---|---|---|---|---|---|---|---|---|---|
| 18290 | 55 | 54 | 41 | 54 | 53 | 20 | 52 | 4F | 43 | 20 | 14 | 01 | 04 | 00 | 52 | 4F |
| 182A0 | 43 | 20 | 14 | 01 | 03 | 00 | 48 | 43 | 20 | 00 | 14 | 01 | 0D | 00 | 20 | 20 |
| 182B0 | 59 | 53 | 55 | 42 | 2F | 4D | 52 | 41 | 4C | 41 | 20 | 00 | 14 | 01 | 0C | 00 |
| 182C0 | 48 | 43 | 20 | 45 | 4E | 4F | 54 | 20 | 54 | 41 | 53 | 20 | 08 | 01 | BB | 9B |
| 182D0 | 08 | 01 | BC | 9B | 08 | 01 | BD | 9B | 16 | 01 | BE | 9B | 01 | 00 | 16 | 01 |
| 182E0 | C1 | 9B | 03 | 00 | 52 | 01 | 0E | 02 | 04 | 00 | 14 | 00 | 14 | 01 | 07 | 00 |
| 182F0 | 59 | 54 | 49 | 4C | 49 | 54 | 55 | 00 | 52 | 01 | F0 | 01 | 04 | 00 | 1A | 01 |
| 18300 | 14 | 01 | 0F | 00 | 20 | 23 | 20 | 50 | 49 | 55 | 51 | 45 | 20 | 45 | 43 | 52 |
| 18310 | 55 | 4F | 53 | 00 | 14 | 01 | 0D | 00 | 20 | 23 | 20 | 50 | 49 | 55 | 51 | 45 |
| 18320 | 20 | 54 | 53 | 45 | 44 | 00 | 14 | 01 | 0E | 00 | 47 | 41 | 4C | 46 | 20 | 4E |
| 18330 | 4F | 20 | 4E | 52 | 55 | 54 | 20 | 31 | 14 | 01 | 0F | 00 | 47 | 41 | 4C | 46 |
| 18340 | 20 | 46 | 46 | 4F | 20 | 4E | 52 | 55 | 54 | 20 | 32 | 00 | 14 | 01 | 0D | 00 |
| 18350 | 20 | 23 | 20 | 47 | 41 | 4C | 46 | 20 | 52 | 45 | 54 | 4E | 45 | 00 | 14 | 01 |
| 18360 | 11 | 00 | 29 | 6C | 6C | 29 | 41 | 28 | 20 | 72 | 6F | 20 | 72 | 65 | 62 | 6D |
| 18370 | 75 | 4E | 28 | 00 | 14 | 01 | 0E | 00 | 20 | 23 | 20 | 45 | 53 | 4E | 45 | 53 |
| 18380 | 20 | 52 | 45 | 54 | 4E | 45 | 14 | 01 | 08 | 00 | 20 | 3D | 20 | 45 | 53 | 4E |
| 18390 | 45 | 53 | 14 | 01 | 12 | 00 | 20 | 52 | 45 | 42 | 4D | 55 | 4E | 20 | 45 | 47 |
| 183A0 | 41 | 43 | 20 | 52 | 45 | 54 | 4E | 45 | 14 | 01 | 3B | 00 | 2E | 2E | 2E | 54 |
| 183B0 | 49 | 41 | 57 | 20 | 45 | 53 | 41 | 45 | 4C | 50 | 20 | 20 | 20 | 53 | 53 | 45 |
| 183C0 | 52 | 47 | 4F | 52 | 50 | 20 | 4E | 49 | 20 | 54 | 45 | 53 | 45 | 52 | 20 | 44 |
| 183D0 | 52 | 41 | 43 | 20 | 20 | 20 | 20 | 20 | 20 | 20 | 20 | 20 | 20 | 20 | 20 | 20 |
| 183E0 | 20 | 20 | 20 | 20 | 20 | 20 | 20 | 00 | 14 | 01 | 0E | 00 | 2E | 2E | 2E | 20 |
| 183F0 | 53 | 44 | 41 | 45 | 52 | 20 | 54 | 52 | 4F | 50 | 14 | 01 | 01 | 00 | 44 | 00 |
| 18400 | 14 | 01 | 01 | 00 | 64 | 00 | 14 | 01 | 01 | 00 | 42 | 00 | 14 | 01 | 01 | 00 |
| 18410 | 62 | 00 | 52 | 01 | 3C | 01 | 08 | 00 | FE | 01 | 14 | 01 | 0B | 00 | 4C | 41 |
| 18420 | 4D | 49 | 43 | 45 | 44 | 20 | 3D | 20 | 44 | 00 | 14 | 01 | 07 | 00 | 58 | 45 |
| 18430 | 48 | 20 | 3D | 20 | 48 | 00 | 14 | 01 | 0A | 00 | 59 | 52 | 41 | 4E | 49 | 42 |
| 18440 | 20 | 3D | 20 | 42 | 14 | 01 | 13 | 00 | 20 | 44 | 4E | 45 | 53 | 20 | 4F | 54 |
| 18450 | 20 | 41 | 54 | 41 | 44 | 20 | 52 | 45 | 54 | 4E | 45 | 00 | 08 | 01 | C6 | 9B |
| 18460 | 08 | 01 | C7 | 9B | 08 | 01 | C8 | 9B | 08 | 01 | C9 | 9B | 08 | 01 | CA | 9B |
| 18470 | 00 | 00 | 11 | 00 | 01 | 00 | 0E | 00 | 42 | 01 | 11 | 00 | 01 | 00 | 00 | 00 |
| 18480 | 1A | 01 | CB | 9B | 42 | 41 | 16 | 01 | DC | 9B | 01 | 00 | 16 | 01 | DF | 9B |
| 18490 | 03 | 00 | 14 | 01 | 08 | 00 | 47 | 53 | 4D | 45 | 43 | 49 | 4F | 56 | 14 | 01 |
| 184A0 | 1E | 00 | 20 | 29 | 32 | 20 | 72 | 6F | 20 | 31 | 28 | 20 | 52 | 45 | 5A | 49 |
| 184B0 | 53 | 45 | 48 | 54 | 4E | 59 | 53 | 20 | 52 | 45 | 54 | 4E | 45 | 00 | 14 | 01 |
| 184C0 | 13 | 00 | 52 | 4F | 52 | 52 | 45 | 20 | 45 | 55 | 4C | 41 | 56 | 20 | 45 | 47 |
| 184D0 | 41 | 53 | 53 | 45 | 4D | 00 | 14 | 01 | 1B | 00 | 20 | 29 | 35 | 35 | 32 | 20 |
| 184E0 | 4F | 54 | 20 | 30 | 28 | 20 | 23 | 20 | 45 | 47 | 41 | 53 | 53 | 45 | 4D | 20 |
| 184F0 | 54 | 55 | 50 | 4E | 49 | 00 | 14 | 01 | 1F | 00 | 45 | 47 | 41 | 53 | 53 | 45 |
| 18500 | 4D | 20 | 45 | 4D | 41 | 53 | 20 | 54 | 55 | 50 | 54 | 55 | 4F | 20 | 20 | 20 |
| 18510 | 52 | 41 | 42 | 20 | 45 | 43 | 41 | 50 | 53 | 00 | 14 | 01 | 24 | 00 | 31 | 20 |
| 18520 | 59 | 42 | 20 | 23 | 20 | 45 | 47 | 41 | 53 | 53 | 45 | 4D | 20 | 54 | 4E | 45 |
| 18530 | 4D | 45 | 52 | 43 | 45 | 44 | 20 | 20 | 20 | 20 | 20 | 20 | 20 | 20 | 20 | 20 |
| 18540 | 20 | 3C | 14 | 01 | 24 | 00 | 31 | 20 | 59 | 42 | 20 | 23 | 20 | 45 | 47 | 41 |
| 18550 | 53 | 53 | 45 | 4D | 20 | 54 | 4E | 45 | 4D | 45 | 52 | 43 | 4E | 49 | 20 | 20 |
| 18560 | 20 | 20 | 20 | 20 | 20 | 20 | 20 | 20 | 20 | 3E | 14 | 01 | 1D | 00 | 45 | 47 |
| 18570 | 41 | 53 | 53 | 45 | 4D | 20 | 57 | 45 | 4E | 20 | 52 | 45 | 54 | 4E | 45 | 20 |
| 18580 | 20 | 20 | 20 | 20 | 20 | 20 | 20 | 20 | 20 | 20 | 2A | 00 | 14 | 01 | 1A | 00 |
| 18590 | 55 | 4E | 45 | 4D | 20 | 4F | 54 | 20 | 4E | 52 | 55 | 54 | 45 | 52 | 20 | 20 |
| 185A0 | 20 | 20 | 20 | 20 | 20 | 20 | 20 | 20 | 20 | 4D | 14 | 01 | 11 | 00 | 20 | 20 |
| 185B0 | 20 | 20 | 20 | 20 | 20 | 20 | 20 | 20 | 20 | 20 | 20 | 20 | 20 | 20 | 20 | 00 |
| 185C0 | 14 | 01 | 13 | 00 | 20 | 20 | 20 | 20 | 20 | 20 | 20 | 20 | 20 | 20 | 20 | 20 |
| 185D0 | 20 | 20 | 20 | 20 | 20 | 20 | 20 | 00 | 14 | 01 | 10 | 00 | 23 | 20 | 45 | 47 |
| 185E0 | 41 | 53 | 53 | 45 | 4D | 20 | 54 | 55 | 50 | 54 | 55 | 4F | 14 | 01 | 01 | 00 |
| 185F0 | 2C | 00 | 14 | 01 | 01 | 00 | 2E | 00 | 14 | 01 | 01 | 00 | 4D | 00 | 14 | 01 |
| 18600 | 01 | 00 | 6D | 00 | 14 | 01 | 07 | 00 | 3A | 53 | 55 | 54 | 41 | 54 | 53 | 00 |
| 18610 | 52 | 01 | 00 | 01 | 08 | 00 | F8 | 01 | 14 | 01 | 06 | 00 | 50 | 4C | 45 | 48 |
| 18620 | 4D | 56 | 14 | 01 | 26 | 00 | 52 | 45 | 4B | 4C | 41 | 54 | 49 | 47 | 49 | 44 |
| 18630 | 20 | 45 | 48 | 54 | 20 | 45 | 54 | 41 | 56 | 49 | 54 | 43 | 41 | 20 | 4F | 54 |
| 18640 | 20 | 27 | 30 | 60 | 20 | 41 | 20 | 52 | 45 | 54 | 4E | 45 | 14 | 01 | 14 | 00 |
| 18650 | 29 | 35 | 35 | 32 | 2D | 31 | 28 | 20 | 23 | 20 | 44 | 52 | 4F | 57 | 20 | 52 |
| 18660 | 45 | 54 | 4E | 45 | 14 | 01 | 1B | 00 | 45 | 47 | 41 | 53 | 53 | 45 | 4D | 20 |
| 18670 | 54 | 41 | 45 | 50 | 45 | 52 | 20 | 2E | 2E | 2E | 2E | 2E | 2E | 2E | 2E | 2E |
| 18680 | 2E | 20 | 52 | 00 | 14 | 01 | 1E | 00 | 45 | 47 | 41 | 53 | 53 | 45 | 4D | 20 |
| 18690 | 57 | 45 | 4E | 20 | 52 | 45 | 54 | 4E | 45 | 20 | 2E | 2E | 2E | 2E | 2E | 2E |
| 186A0 | 2E | 2E | 2E | 2E | 20 | 4E | 14 | 01 | 20 | 00 | 55 | 4E | 45 | 4D | 20 | 4E |

```
186B0   49 41 4D 20 4F 54 20 4E 52 55 54 45 52 20 2E 2E
186C0   2E 2E 2E 2E 2E 2E 2E 2E 20 2A 14 01 01 00 72 00
186D0   14 01 01 00 52 00 08 01 E4 9B 08 01 E5 9B 08 01
186E0   E6 9B 08 01 E7 9B 16 01 E8 9B 03 00 14 01 12 00
186F0   47 4E 49 44 52 4F 43 45 52 20 54 52 41 54 53 20
18700   20 31 14 01 11 00 4B 43 41 42 59 41 4C 50 20 54
18710   52 41 54 53 20 20 32 00 14 01 18 00 44 52 4F 43
18720   45 52 20 52 4F 46 20 45 43 52 55 4F 53 20 54 45
18730   53 20 20 33 14 01 1F 00 4B 43 41 42 59 41 4C 50
18740   20 52 4F 46 20 4E 4F 49 54 41 4E 49 54 53 45 44
18750   20 54 45 53 20 20 34 00 14 01 08 00 54 45 53 45
18760   52 20 20 35 14 01 07 00 54 49 58 45 20 20 36 00
18770   14 01 09 00 47 4E 49 44 52 4F 43 45 52 00 14 01
18780   15 00 29 34 2D 31 28 20 23 20 4C 45 4E 4E 41 48
18790   43 20 52 45 54 4E 45 00 14 01 08 00 4B 43 41 42
187A0   59 41 4C 50 14 01 19 00 20 23 20 54 4E 45 4D 50
187B0   49 55 51 45 20 45 43 52 55 4F 53 20 52 45 54 4E
187C0   45 00 14 01 0E 00 20 47 4E 49 44 52 4F 43 45 52
187D0   20 52 4F 46 14 01 1E 00 20 23 20 54 4E 45 4D 50
187E0   49 55 51 45 20 4E 4F 49 54 41 4E 49 54 53 45 44
187F0   20 52 45 54 4E 45 14 01 0D 00 20 4B 43 41 42 59
18800   41 4C 50 20 52 4F 46 00 52 01 00 01 14 00 0E 00
18810   52 01 28 01 14 00 36 00 00 01 90 00 08 01 ED 9B
18820   02 01 EE 9B 08 01 F0 9B 08 01 F1 9B 08 01 F2 9B
18830   08 01 F3 9B 08 01 F4 9B 14 01 0A 00 72 6F 72 72
18840   45 20 6B 63 69 54 52 01 B4 01 0C 00 16 00 14 01
18850   05 00 2E 63 65 53 20 00 00 01 00 02 52 01 32 01
18860   1C 00 0E 00 14 01 01 00 3A 00 52 01 46 01 1C 00
18870   D2 00 00 01 00 04 14 01 01 C0 2D 00 00 01 C0 02
18880   00 01 A2 02 14 01 03 00 4E 52 50 00 14 01 04 00
18890   31 54 50 4C 14 01 0D 00 20 64 65 72 61 65 6C 63
188A0   20 6B 6E 69 4C 00 08 01 F5 9B 14 01 0B 00 23 68
188B0   63 20 6E 6F 20 65 6C 64 49 00 08 01 F6 9B 08 01
188C0   F7 9B 08 01 F8 9B 08 01 F9 9B 08 01 FA 9B 14 01
188D0   04 00 65 6C 69 46 0E 01 03 01 02 32 02 01 FC 9B
188E0   08 01 FE 9B 08 01 FF 9B 02 01 00 9C 08 01 02 9C
188F0   08 01 03 9C 14 01 0C 00 77 6F 6C 66 72 65 76 6F
18900   20 52 4E 54 08 01 04 9C 14 01 0A 00 31 30 30 32
18910   20 72 6F 72 72 45 14 01 22 00 30 36 32 2E 31 20
18920   20 20 20 20 20 73 6E 6F 69 74 61 63 69 6E 75 6D
18930   6D 6F 63 65 6C 65 54 20 41 53 45 20 52 01 0A 01
18940   14 00 1E 00 14 01 05 00 72 6F 72 72 45 00 14 01
18950   07 00 65 6E 69 6C 20 6E 6F 00 52 01 3C 01 14 00
18960   08 00 52 01 32 01 14 00 00 00 14 01 0A 00 72 6F
18970   72 72 45 20 6E 69 61 4D 08 01 05 9C 2E 2E 2E 54
18980   00 00 9C 00 B0 07 E6 45 9E 00 FC 00 78 2C F4 00
18990   03 00 24 00 10 25 88 00 24 00 AC 27 88 00 24 00
189A0   B4 09 88 00 24 00 AC 27 88 00 24 00 8E 2D 88 00
189B0   F4 00 03 00 F4 00 03 00 F4 00 11 00 F4 00 01 00
189C0   4C 39 80 05 24 00 1C 25 9E 00 FC 00 F4 00 03 00
189D0   F4 00 03 00 24 00 1C 25 8E 00 F4 00 03 00 3E 00
189E0   80 03 0C 46 F4 00 05 00 F0 30 FC 00 16 00 13 00
189F0   14 46 94 00 24 00 64 00 3C 00 94 00 7A 00 F8 00
18A00   FC 00 F4 00 01 00 C8 01 FC 00 78 2C 1E 46 94 00
18A10   7A 00 F4 00 03 00 F4 00 03 00 24 00 1C 25 8E 00
18A20   F4 00 03 00 3E 00 80 03 0C 46 F4 00 05 00 F0 30
18A30   FC 00 F4 00 03 00 2A 46 24 00 1C 25 88 00 28 00
18A40   AE 2C 24 00 60 25 24 00 62 00 40 00 88 00 32 46
18A50   24 00 32 25 88 00 70 2C 32 46 24 00 B8 09 88 00
18A60   28 00 68 2C 24 00 60 25 24 00 62 00 40 00 88 00
18A70   32 46 FC 00 24 00 80 09 B4 09 AC 00 2E 00 1F 00
18A80   24 00 10 25 88 00 28 00 C8 2C 24 00 60 25 24 00
18A90   62 00 40 00 88 00 32 46 2A 00 0D 00 24 00 10 25
18AA0   88 00 9C 27 32 46 FC 00 24 00 B2 25 88 00 9C 27
18AB0   32 46 24 00 EC 25 88 00 9C 27 32 46 24 00 4C 25
```

```
18AC0   88 00 9C 27 32 46 24 00 5C 25 88 00 9C 27 32 46
18AD0   24 00 48 25 68 00 9C 27 32 46 FC 00 24 00 54 25
18AE0   88 00 28 00 4C 2C 24 00 60 25 24 00 62 00 40 00
18AF0   88 00 32 46 FC 00 58 00 01 02 FC 00 16 00 13 00
18B00   3A 46 94 00 24 00 64 00 3C 00 94 00 7A 00 F8 00
18B10   FC 00 60 05 24 00 58 09 9E 00 20 00 24 00 90 05
18B20   88 00 62 00 60 00 7B 01 FC 00 24 00 D6 06 24 00
18B30   60 05 38 00 58 00 3F 01 FC 00 24 00 D6 06 24 00
18B40   60 05 38 00 48 25 AC 00 22 00 24 00 E2 06 24 00
18B50   60 05 38 00 68 00 D2 00 26 03 20 07 24 00 60 05
18B60   38 00 60 05 AC 00 C8 00 C6 00 2E 00 05 00 6E 01
18B70   FC 00 24 00 D6 06 24 00 60 05 38 00 38 26 AC 00
18B80   D6 06 24 00 60 05 38 00 60 25 AC 00 C8 00 22 00
18B90   24 00 E2 06 24 00 60 05 38 00 E8 00 D2 00 26 03
18BA0   20 07 24 00 60 05 38 00 B4 09 AC 00 C6 00 20 07
18BB0   24 00 60 05 38 00 60 05 AC 00 C8 00 C6 00 2E 00
18BC0   05 00 8C 01 FC 00 24 00 D6 06 24 00 60 05 38 00
18BD0   58 25 AC 00 22 00 24 00 E2 06 24 00 60 05 38 00
18BE0   88 00 D2 00 26 03 20 07 24 00 60 05 38 00 B4 09
18BF0   AC 00 C6 00 20 07 24 00 60 05 38 00 60 05 AC 00
18C00   C8 00 C6 00 2E 00 05 00 7C 02 FC 00 24 00 D6 06
18C10   24 00 60 05 38 00 32 25 AC 00 22 00 24 00 E2 06
18C20   24 00 60 05 38 00 88 00 D2 00 26 03 20 07 24 00
18C30   60 05 38 00 C0 26 B4 00 C6 00 20 07 24 00 60 05
18C40   38 00 60 05 AC 00 C8 00 C6 00 2E 00 05 00 54 02
18C50   FC 00 24 00 D6 06 24 00 60 05 38 00 2A 28 AC 00
18C60   20 07 24 00 60 05 38 00 60 05 AC 00 C6 00 2E 00
18C70   05 00 9A 02 FC 00 5A 00 FC 00 24 00 20 07 24 00
18C80   60 05 38 00 60 05 AC 00 2E 00 17 00 24 00 D6 06
18C90   24 00 60 05 38 00 B4 09 AC 00 2E 00 05 00 9A 02
18CA0   FC 00 5E 00 FC 00 78 05 24 00 1C 25 9E 00 20 00
18CB0   24 00 48 25 68 00 62 00 60 00 21 00 FC 00 24 00
18CC0   A4 06 24 00 78 05 38 00 B4 09 AC 00 2E 00 0D 00
18CD0   24 00 78 05 88 00 D2 00 94 03 FC 00 5E 00 FC 00
18CE0   24 00 22 00 DC 01 2E 00 11 00 F4 00 03 00 F0 30
18CF0   BE 01 F4 00 05 00 F0 30 FC 00 5C 00 FC 00 02 00
18D00   00 00 00 00 16 00 1B 00 F0 24 94 00 24 00 64 00
18D10   3C 00 94 00 24 00 06 00 94 00 7A 00 02 00 F8 00
18D20   FC 00 24 00 74 05 2E 00 49 00 24 00 10 25 88 00
18D30   00 25 24 00 1C 25 88 00 24 00 1C 25 68 00 F2 00
18D40   0B 00 F2 00 0F 00 F2 00 13 00 14 25 20 25 94 00
18D50   24 00 06 00 32 25 C0 00 1C 25 BA 00 94 00 24 00
18D60   36 25 8A 00 CA 00 3A 25 24 00 1C 25 88 00 00 25
18D70   FC 00 24 00 D6 06 24 00 06 00 38 00 32 25 AC 00
18D80   58 00 0B 01 FC 00 24 00 B4 09 88 00 D2 00 24 00
18D90   E2 06 24 00 06 00 38 00 1C 25 BA 00 68 00 D2 00
18DA0   F4 00 01 00 FE 02 FC 00 E4 24 24 00 24 00 A8 05
18DB0   30 00 9E 00 56 00 01 00 D9 06 E9 03 FC 00 24 00
18DC0   E4 24 1C 25 C6 00 1C 25 AC 00 E4 24 58 09 C6 00
18DD0   B8 09 AC 00 C8 00 58 00 41 00 FC 00 E8 24 24 00
18DE0   1C 25 9E 00 20 00 24 00 48 25 86 00 62 00 60 00
18DF0   25 00 FC 00 24 00 A4 06 24 00 E8 24 38 00 06 00
18E00   AC 00 2E 00 11 00 24 00 06 00 88 00 D2 00 F4 00
18E10   03 00 D0 03 FC 00 5E 00 FC 00 5A 00 FC 00 24 00
18E20   E4 24 32 25 C6 00 32 25 AC 00 E4 24 4C 25 C6 00
18E30   4C 25 AC 00 C8 00 58 00 49 00 FC 00 E8 24 24 00
18E40   1C 25 9E 00 20 00 24 00 48 25 88 00 62 00 60 00
18E50   2D 00 FC 00 24 00 A4 06 24 00 E8 24 38 00 06 00
18E60   1C 25 BA 00 AC 00 2E 00 15 00 24 00 06 00 1C 25
18E70   BA 00 88 00 D2 00 F4 00 03 00 D0 03 FC 00 5E 00
18E80   FC 00 5A 00 FC 00 24 00 32 25 02 00 FC 00 5A 00
18E90   FC 00 24 00 D6 06 24 00 06 00 38 00 B8 09 AC 00
18EA0   58 00 91 00 FC 00 56 00 01 00 9F 07 89 04 FC 00
18EB0   24 00 50 25 88 00 D2 00 24 00 E2 06 24 00 06 00
18EC0   38 00 1C 25 BA 00 88 00 D2 00 F4 00 01 00 FE 02
```

```
18ED0   24 00 1C 25 88 00 D2 00 24 00 E2 06 24 00 06 00
18EE0   38 00 88 00 D2 00 F4 00 01 00 FE 02 FC 00 E8 24
18EF0   24 00 1C 25 9E 00 20 00 24 00 48 25 88 00 62 00
18F00   60 00 27 00 FC 00 24 00 A4 06 24 00 E8 24 38 00
18F10   2E 00 17 00 24 00 A4 06 24 00 E8 24 38 00 88 00
18F20   D2 00 F4 00 03 00 D0 03 FC 00 5E 00 24 00 32 25
18F30   02 00 FC 00 5A 00 FC 00 24 00 D6 06 24 00 06 00
18F40   38 00 54 25 AC 00 D6 06 24 00 06 00 32 25 BA 00
18F50   38 00 54 25 AC 00 C6 00 2E 00 2B 00 80 05 24 00
18F60   80 05 1C 25 CA 00 9E 00 24 00 10 25 80 05 BC 00
18F70   88 00 D2 00 24 00 1C 25 88 00 D2 00 F4 00 01 00
18F80   FE 02 02 00 FC 00 24 00 D6 06 24 00 06 00 38 00
18F90   54 25 AC 00 2E 00 69 00 24 00 B4 09 88 00 D2 00
18FA0   24 00 E2 06 24 00 06 00 38 00 1C 25 BA 00 88 00
18FB0   D2 00 F4 00 01 00 FE 02 E4 24 24 00 24 00 A8 05
18FC0   30 00 50 25 C6 00 9E 00 56 00 01 00 D9 06 E9 03
18FD0   24 00 32 25 88 00 D2 00 24 00 1C 25 88 00 D2 00
18FE0   F4 00 01 00 FE 02 24 00 1C 25 88 00 D2 00 24 00
18FF0   1C 25 88 00 D2 00 F4 00 01 00 FE 02 02 00 FC 00
19000   24 00 D6 06 24 00 06 00 38 00 48 25 AC 00 58 00
19010   15 01 FC 00 24 00 58 25 88 00 D2 00 24 00 E2 06
19020   24 00 06 00 38 00 88 00 D2 00 F4 00 03 00 FE 02
19030   24 00 A4 05 24 00 5C 25 32 00 E4 24 24 00 24 00
19040   A8 05 30 00 6A 0A C6 00 9E 00 FC 00 56 00 01 00
19050   D9 06 E9 03 FC 00 24 00 E4 24 6A 0A AC 00 2E 00
19060   25 00 F4 00 03 00 24 00 E2 06 24 00 06 00 38 00
19070   88 00 D2 00 6C 03 56 00 01 00 91 06 AD 03 24 00
19080   32 25 02 00 FC 00 E8 24 24 00 B4 09 9E 00 20 00
19090   24 00 10 25 88 00 62 00 60 00 6B 00 FC 00 24 00
190A0   E4 24 32 25 E8 24 E2 00 C6 00 58 00 55 00 FC 00
190B0   24 00 A4 05 24 00 58 25 32 00 24 00 A4 05 24 00
190C0   54 25 E8 24 BA 00 32 00 24 00 A4 05 24 00 1C 25
190D0   E8 24 BA 00 32 00 24 00 48 25 88 00 5A 01 FC 00
190E0   24 00 24 00 A8 05 30 00 6A 0A C6 00 54 25 C8 00
190F0   54 25 AE 00 2E 00 0B 00 56 00 01 00 91 06 AD 03
19100   FC 00 5A 00 FC 00 5E 00 FC 00 F4 00 03 00 24 00
19110   E2 06 24 00 06 00 38 00 88 00 D2 00 6C 03 24 00
19120   32 25 02 00 FC 00 5A 00 FC 00 24 00 D6 06 24 00
19130   06 00 38 00 60 25 AC 00 58 00 A1 00 FC 00 E8 24
19140   24 00 B4 09 9E 00 20 00 24 00 10 25 88 00 62 00
19150   60 00 85 00 FC 00 24 00 E8 24 B8 09 BA 00 88 00
19160   D2 00 24 00 E2 06 24 00 06 00 38 00 88 00 D2 00
19170   F4 00 01 00 FE 02 24 00 64 25 88 00 D2 00 24 00
19180   E2 06 24 00 06 00 38 00 88 00 D2 00 F4 00 01 00
19190   FE 02 FC 00 24 00 24 00 A8 05 30 00 50 25 C6 00
191A0   26 07 24 00 06 00 E8 24 BA 00 38 00 64 25 B4 00
191B0   C6 00 2E 00 23 00 26 07 24 00 06 00 E8 24 BA 00
191C0   38 00 24 00 26 07 24 00 06 00 E8 24 BA 00 38 00
191D0   1C 25 BA 00 9E 00 FC 00 5E 00 FC 00 5A 00 FC 00
191E0   24 00 D6 06 24 00 06 00 38 00 58 25 AC 00 58 00
191F0   53 00 FC 00 24 00 50 25 88 00 D2 00 24 00 E2 06
19200   24 00 06 00 38 00 1C 25 BA 00 88 00 D2 00 F4 00
19210   01 00 FE 02 24 00 84 05 88 00 D2 00 24 00 E2 06
19220   24 00 06 00 38 00 88 00 D2 00 F4 00 01 00 FE 02
19230   FC 00 56 00 01 00 9F 07 89 04 FC 00 24 00 32 25
19240   02 00 FC 00 5A 00 FC 00 24 00 D6 06 24 00 06 00
19250   38 00 6E 25 AC 00 2E 00 79 00 24 00 1C 25 88 00
19260   D2 00 24 00 E2 06 24 00 06 00 38 00 1C 25 BA 00
19270   88 00 D2 00 F4 00 01 00 FE 02 E4 24 24 00 24 00
19280   A8 05 30 00 10 25 C6 00 9E 00 56 00 01 00 D9 06
19290   E9 03 24 00 B4 09 88 00 D2 00 24 00 E2 06 24 00
192A0   06 00 38 00 88 00 D2 00 F4 00 01 00 FE 02 24 00
192B0   B4 09 88 00 D2 00 24 00 E2 06 24 00 06 00 38 00
192C0   1C 25 BA 00 88 00 D2 00 F4 00 01 00 FE 02 02 00
192D0   FC 00 24 00 D6 06 24 00 06 00 38 00 6C 25 AC 00
192E0   2E 00 17 00 24 00 06 00 88 00 D2 00 CC 02 56 00
```

| | | | | | | | | | | | | | | | | |
|---|---|---|---|---|---|---|---|---|---|---|---|---|---|---|---|---|
| 192F0 | 01 | 00 | 9F | 07 | 89 | 04 | 02 | 00 | FC | 00 | 24 | 00 | D6 | 06 | 24 | 00 |
| 19300 | 06 | 00 | 38 | 00 | 70 | 25 | AC | 00 | 2E | 00 | 7B | 00 | 24 | 00 | 50 | 25 |
| 19310 | 68 | 00 | D2 | 00 | 24 | 00 | E2 | 06 | 24 | 00 | 06 | 00 | 38 | 00 | 1C | 25 |
| 19320 | BA | 00 | 88 | 00 | D2 | 00 | F4 | 00 | 01 | 00 | FE | 02 | EC | 24 | 24 | 00 |
| 19330 | 74 | 25 | 9E | 00 | 20 | 00 | 24 | 00 | 78 | 25 | 89 | 00 | 62 | 00 | 60 | 00 |
| 19340 | 23 | 00 | 24 | 00 | 26 | 06 | 24 | 00 | EC | 24 | 38 | 00 | 88 | 00 | D2 | 00 |
| 19350 | 24 | 00 | E2 | 06 | 24 | 00 | 06 | 00 | 38 | 00 | 88 | 00 | D2 | 00 | F4 | 00 |
| 19360 | 03 | 00 | FE | 02 | 5E | 00 | F4 | 00 | 01 | 00 | 24 | 00 | E2 | 06 | 24 | 00 |
| 19370 | 06 | 00 | 38 | 00 | 68 | 00 | D2 | 00 | 6C | 03 | 56 | 00 | 01 | 00 | 9F | 07 |
| 19380 | 89 | 04 | 02 | 00 | FC | 00 | 56 | 00 | 01 | 00 | 9F | 07 | 89 | 04 | 02 | 00 |
| 19390 | FC | 00 | 24 | 00 | 50 | 25 | 88 | 00 | D2 | 00 | 24 | 00 | E2 | 06 | 24 | 00 |
| 193A0 | 06 | 00 | 38 | 00 | 1C | 25 | BA | 00 | 88 | 00 | D2 | 00 | F4 | 00 | 01 | 00 |
| 193B0 | FE | 02 | 24 | 00 | 1C | 27 | 88 | 00 | 5A | 01 | 24 | 00 | C4 | 05 | 88 | 00 |
| 193C0 | D2 | 00 | 24 | 00 | E2 | 06 | 24 | 00 | 06 | 00 | 38 | 00 | 88 | 00 | D2 | 00 |
| 193D0 | F4 | 00 | 01 | 00 | FE | 02 | 46 | 00 | FC | 00 | 16 | 00 | 07 | 00 | 46 | 00 |
| 193E0 | F8 | 00 | FC | 00 | 24 | 00 | E4 | 24 | 1C | 25 | C6 | 00 | 2E | 00 | 1D | 00 |
| 193F0 | 26 | 07 | 24 | 00 | 06 | 00 | 38 | 00 | 24 | 00 | 26 | 07 | 24 | 00 | 06 | 00 |
| 19400 | 38 | 00 | 1C | 25 | BA | 00 | 9E | 00 | 46 | 00 | FC | 00 | 24 | 00 | E4 | 24 |
| 19410 | 32 | 25 | C6 | 00 | 2E | 00 | 25 | 00 | 26 | 07 | 24 | 00 | 06 | 00 | 1C | 25 |
| 19420 | BA | 00 | 38 | 00 | 24 | 00 | 26 | 07 | 24 | 00 | 06 | 00 | 1C | 25 | BA | 00 |
| 19430 | 38 | 00 | 1C | 25 | BA | 00 | 9E | 00 | 46 | 00 | FC | 00 | 24 | 00 | E4 | 24 |
| 19440 | B8 | 09 | C6 | 00 | 2E | 00 | 25 | 00 | 26 | 07 | 24 | 00 | 06 | 00 | 32 | 25 |
| 19450 | BA | 00 | 38 | 00 | 24 | 00 | 26 | 07 | 24 | 00 | 06 | 00 | 32 | 25 | BA | 00 |
| 19460 | 38 | 00 | 1C | 25 | BA | 00 | 9E | 00 | 46 | 00 | FC | 00 | 24 | 00 | E4 | 24 |
| 19470 | 4C | 25 | C6 | 00 | 2E | 00 | 25 | 00 | 26 | 07 | 24 | 00 | 06 | 00 | 10 | 25 |
| 19480 | BA | 00 | 38 | 00 | 24 | 00 | 26 | 07 | 24 | 00 | 06 | 00 | 10 | 25 | BA | 00 |
| 19490 | 38 | 00 | 1C | 25 | BA | 00 | 9E | 00 | 46 | 00 | FC | 00 | 46 | 00 | FC | 00 |
| 194A0 | 24 | 00 | 26 | 07 | 24 | 00 | 06 | 00 | 38 | 00 | 64 | 25 | B4 | 00 | 2E | 00 |
| 194B0 | 1B | 00 | 26 | 07 | 24 | 00 | 06 | 00 | 38 | 00 | 24 | 00 | 26 | 07 | 24 | 00 |
| 194C0 | 06 | 00 | 38 | 00 | 1C | 25 | BA | 00 | 9E | 00 | FC | 00 | 46 | 00 | FC | 00 |
| 194D0 | 02 | 00 | 27 | 00 | FC | 00 | 24 | 00 | A4 | 06 | 24 | 00 | E8 | 24 | 38 | 00 |
| 194E0 | 00 | 00 | 98 | 09 | 00 | 00 | 01 | 00 | B4 | 09 | 24 | 00 | 94 | 25 | 24 | 00 |
| 194F0 | B4 | 09 | 38 | 00 | 24 | 00 | B4 | 09 | 38 | 00 | A2 | 25 | AE | 00 | 58 | 00 |
| 19500 | BD | 00 | FC | 00 | 94 | 25 | 24 | 00 | B4 | 09 | 38 | 00 | 24 | 00 | B4 | 09 |
| 19510 | 38 | 00 | 24 | 00 | A2 | 25 | 9E | 00 | 94 | 25 | 24 | 00 | B4 | 09 | 38 | 00 |
| 19520 | 24 | 00 | 1C | 25 | 38 | 00 | 24 | 00 | 1C | 25 | 9E | 00 | 94 | 25 | 24 | 00 |
| 19530 | B4 | 09 | 38 | 00 | 24 | 00 | 32 | 25 | 38 | 00 | 24 | 00 | A6 | 25 | 9E | 00 |
| 19540 | FC | 00 | 94 | 25 | 24 | 00 | 1C | 25 | 38 | 00 | 24 | 00 | B4 | 09 | 38 | 00 |
| 19550 | 24 | 00 | 1C | 25 | 9E | 00 | 94 | 25 | 24 | 00 | 1C | 25 | 38 | 00 | 24 | 00 |
| 19560 | 1C | 25 | 38 | 00 | 24 | 00 | A2 | 25 | 9E | 00 | 94 | 25 | 24 | 00 | 1C | 25 |
| 19570 | 38 | 00 | 24 | 00 | 32 | 25 | 38 | 00 | 24 | 00 | AA | 25 | 9E | 00 | FC | 00 |
| 19580 | 94 | 25 | 24 | 00 | 32 | 25 | 38 | 00 | 24 | 00 | B4 | 09 | 38 | 00 | 24 | 00 |
| 19590 | A6 | 25 | 9E | 00 | 94 | 25 | 24 | 00 | 32 | 25 | 38 | 00 | 24 | 00 | 1C | 25 |
| 195A0 | 38 | 00 | 24 | 00 | 10 | 25 | 9E | 00 | 94 | 25 | 24 | 00 | 32 | 25 | 38 | 00 |
| 195B0 | 24 | 00 | 32 | 25 | 38 | 00 | 24 | 00 | A2 | 25 | 9E | 00 | FC | 00 | 5A | 00 |
| 195C0 | FC | 00 | 9A | 25 | 24 | 00 | 08 | 00 | AE | 25 | C0 | 00 | 9E | 00 | 9E | 25 |
| 195D0 | 24 | 00 | 0A | 00 | AE | 25 | C0 | 00 | 9E | 00 | FC | 00 | 24 | 00 | 92 | 09 |
| 195E0 | 54 | 00 | 07 | 00 | 15 | 01 | 8D | 00 | B3 | 02 | DD | 00 | 35 | 04 | 2D | 01 |
| 195F0 | AD | 04 | 55 | 01 | FC | 00 | F4 | 00 | 03 | 00 | 24 | 00 | D0 | 06 | 24 | 00 |
| 19600 | 08 | 00 | 38 | 00 | 32 | 25 | BE | 00 | 1C | 25 | BA | 00 | 88 | 00 | D2 | 00 |
| 19610 | 24 | 00 | D0 | 06 | 24 | 00 | 0A | 00 | 38 | 00 | 4C | 25 | BE | 00 | 94 | 25 |
| 19620 | 24 | 00 | 9A | 25 | 38 | 00 | 24 | 00 | 9E | 25 | 38 | 00 | 48 | 25 | C2 | 00 |
| 19630 | BA | 00 | 88 | 00 | D2 | 00 | F4 | 00 | 01 | 00 | 24 | 00 | 9A | 25 | 88 | 00 |
| 19640 | D2 | 00 | 78 | 01 | FC | 00 | F4 | 00 | 03 | 00 | 24 | 00 | 64 | 25 | 88 | 00 |
| 19650 | D2 | 00 | 24 | 00 | D0 | 06 | 24 | 00 | 08 | 00 | 38 | 00 | 4C | 25 | BE | 00 |
| 19660 | B2 | 25 | BA | 00 | 88 | 00 | D2 | 00 | F4 | 00 | 01 | 00 | 24 | 00 | 9A | 25 |
| 19670 | 88 | 00 | D2 | 00 | 78 | 01 | FC | 00 | F4 | 00 | 03 | 00 | 24 | 00 | D0 | 06 |
| 19680 | 24 | 00 | 08 | 00 | 38 | 00 | 32 | 25 | BE | 00 | 88 | 00 | D2 | 00 | 24 | 00 |
| 19690 | D0 | 06 | 24 | 00 | 08 | 00 | 38 | 00 | 4C | 25 | BE | 00 | 94 | 25 | 24 | 00 |
| 196A0 | 9A | 25 | 38 | 00 | 24 | 00 | 9E | 25 | 38 | 00 | 48 | 25 | C0 | 00 | BA | 00 |
| 196B0 | 88 | 00 | D2 | 00 | F4 | 00 | 01 | 00 | 24 | 00 | 9A | 25 | 88 | 00 | D2 | 00 |
| 196C0 | 78 | 01 | FC | 00 | F4 | 00 | 03 | 00 | 24 | 00 | D0 | 06 | 24 | 00 | 0A | 00 |
| 196D0 | 38 | 00 | 32 | 25 | BE | 00 | 1C | 25 | BA | 00 | 88 | 00 | D2 | 00 | 24 | 00 |
| 196E0 | D0 | 06 | 24 | 00 | 08 | 00 | 38 | 00 | 4C | 25 | BE | 00 | 94 | 25 | 24 | 00 |
| 196F0 | 9E | 25 | 38 | 00 | 24 | 00 | 9A | 25 | 38 | 00 | 48 | 25 | C2 | 00 | BA | 00 |

```
19700   88 00 D2 00 F4 00 01 00 24 00 9E 25 88 00 D2 00
19710   78 01 FC 00 F4 00 03 00 24 00 64 25 88 00 D2 00
19720   24 00 D0 06 24 00 0A 00 38 00 4C 25 BE 00 B2 25
19730   BA 00 88 00 D2 00 F4 00 01 00 24 00 9E 25 88 00
19740   D2 00 78 01 FC 00 F4 00 03 00 24 00 D0 06 24 00
19750   0A 00 38 00 32 25 BE 00 88 00 D2 00 24 00 D0 06
19760   24 00 0A 00 38 00 4C 25 BE 00 94 25 24 00 9E 25
19770   38 00 24 00 9A 25 38 00 48 25 C0 00 BA 00 88 00
19780   D2 00 F4 00 01 00 24 00 9E 25 88 00 D2 00 78 01
19790   02 00 FC 00 F4 00 03 00 24 00 64 25 88 00 D2 00
197A0   24 00 D0 06 24 00 08 00 38 00 4C 25 BE 00 94 25
197B0   24 00 9A 25 38 00 24 00 9E 25 38 00 48 25 C0 00
197C0   BA 00 88 00 D2 00 F4 00 01 00 24 00 9A 25 88 00
197D0   D2 00 78 01 FC 00 F4 00 03 00 24 00 64 25 88 00
197E0   D2 00 24 00 D0 06 24 00 0A 00 38 00 4C 25 BE 00
197F0   94 25 24 00 9E 25 38 00 24 00 9A 25 38 00 48 25
19800   C2 00 BA 00 88 00 D2 00 F4 00 01 00 24 00 9A 25
19810   88 00 D2 00 78 01 FC 00 F4 00 03 00 24 00 D0 06
19820   24 00 08 00 38 00 32 25 BE 00 88 00 D2 00 24 00
19830   D0 06 24 00 08 00 38 00 4C 25 BE 00 B2 25 BA 00
19840   88 00 D2 00 F4 00 01 00 24 00 9A 25 88 00 D2 00
19850   78 01 FC 00 F4 00 03 00 24 00 64 25 88 00 D2 00
19860   24 00 D0 06 24 00 0A 00 38 00 4C 25 BE 00 94 25
19870   24 00 9E 25 38 00 24 00 9A 25 38 00 48 25 C0 00
19880   BA 00 88 00 D2 00 F4 00 01 00 24 00 9E 25 88 00
19890   D2 00 78 01 FC 00 F4 00 03 00 24 00 64 25 88 00
198A0   D2 00 24 00 D0 06 24 00 08 00 38 00 4C 25 BE 00
198B0   94 25 24 00 9A 25 38 00 24 00 9E 25 38 00 48 25
198C0   C2 00 BA 00 88 00 D2 00 F4 00 01 00 24 00 9E 25
198D0   88 00 D2 00 78 01 FC 00 F4 00 03 00 24 00 D0 06
198E0   24 00 0A 00 38 00 32 25 BE 00 88 00 D2 00 24 00
198F0   D0 06 24 00 0A 00 38 00 4C 25 BE 00 B2 25 BA 00
19900   88 00 D2 00 F4 00 01 00 24 00 9E 25 88 00 D2 00
19910   78 01 02 00 FC 00 F4 00 03 00 24 00 D0 06 24 00
19920   08 00 38 00 32 25 BE 00 1C 25 BA 00 88 00 D2 00
19930   24 00 D0 06 24 00 08 00 38 00 4C 25 BE 00 54 25
19940   BA 00 88 00 D2 00 F4 00 01 00 24 00 9A 25 88 00
19950   D2 00 78 01 FC 00 F4 00 03 00 24 00 0A 00 32 25
19960   BE 00 88 00 D2 00 24 00 D0 06 24 00 08 00 38 00
19970   4C 25 BE 00 B8 09 BA 00 88 00 D2 00 F4 00 03 00
19980   24 00 9A 25 88 00 D2 00 78 01 02 00 FC 00 F4 00
19990   03 00 24 00 64 25 88 00 D2 00 24 00 D0 06 24 00
199A0   08 00 38 00 4C 25 BE 00 B8 09 BA 00 88 00 D2 00
199B0   F4 00 03 00 24 00 9A 25 88 00 D2 00 78 01 FC 00
199C0   F4 00 03 00 24 00 64 25 88 00 D2 00 24 00 D0 06
199D0   24 00 08 00 38 00 4C 25 BE 00 54 25 BA 00 88 00
199E0   D2 00 F4 00 01 00 24 00 9A 25 88 00 D2 00 78 01
199F0   FC 00 02 00 24 00 26 07 24 00 06 00 1C 25 BA 00
19A00   00 00 00 00 01 00 B8 09 24 00 22 00 24 00 BA 25
19A10   88 00 D2 00 F2 00 05 00 32 01 08 00 B4 09 B0 00
19A20   C6 00 2E 00 05 00 02 00 FC 00 24 00 08 00 B4 09
19A30   AC 00 2E 00 0F 00 B6 25 24 00 B8 09 9E 00 2A 00
19A40   0B 00 B6 25 24 00 08 00 9E 00 FC 00 F4 00 05 00
19A50   24 00 60 05 88 00 D2 00 24 00 FE 06 24 00 60 05
19A60   38 00 88 00 D2 00 0A 01 F4 00 07 00 24 00 06 00
19A70   88 00 D2 00 24 00 B6 25 88 00 D2 00 0A 01 FC 00
19A80   24 00 BE 25 88 00 5A 01 F4 00 09 00 24 00 06 00
19A90   88 00 D2 00 F2 00 07 00 0A 01 F4 00 03 00 24 00
19AA0   60 05 88 00 D2 00 24 00 FE 06 24 00 60 05 38 00
19AB0   88 00 D2 00 0A 01 FC 00 02 00 24 00 94 25 24 00
19AC0   00 00 68 07 24 00 60 05 38 00 C2 25 00 00 FC 00
19AD0   24 00 22 00 24 00 10 25 88 00 D2 00 F2 00 05 00
19AE0   32 01 28 00 C2 25 24 00 1C 25 D4 00 C8 25 AC 00
19AF0   C6 00 28 00 C2 25 24 00 B8 09 D4 00 CE 25 AE 00
19B00   C6 00 28 00 C2 25 24 00 B8 09 D4 00 D6 25 AE 00
```

```
19B10   C6 00 2E 00 09 00 24 00 B4 09 82 00 24 00 22 00
19B20   24 00 B8 09 88 00 D2 00 F2 00 05 00 32 01 28 00
19B30   C2 25 24 00 1C 25 D4 00 DE 25 AC 00 C6 00 2E 00
19B40   09 00 24 00 B4 09 82 00 24 00 22 00 24 00 54 25
19B50   88 00 D2 00 F2 00 05 00 32 01 28 00 C2 25 24 00
19B60   B8 09 D4 00 CE 25 AC 00 C6 00 2E 00 09 00 24 00
19B70   B4 09 82 00 24 00 22 00 24 00 B2 25 88 00 D2 00
19B80   F2 00 05 00 32 01 28 00 C2 25 24 00 10 25 D4 00
19B90   E4 25 AC 00 28 00 C2 25 24 00 32 25 24 00 10 25
19BA0   D6 00 E4 25 AC 00 C8 00 C6 00 2E 00 09 00 24 00
19BB0   B4 09 82 00 24 00 22 00 24 00 EC 25 88 00 D2 00
19BC0   F2 00 05 00 32 01 C2 25 A0 00 4C 25 B0 00 C6 00
19BD0   2E 00 09 00 24 00 B4 09 82 00 24 00 22 00 24 00
19BE0   4C 25 88 00 D2 00 F2 00 05 00 32 01 28 00 C2 25
19BF0   24 00 10 25 D4 00 F0 25 AC 00 C6 00 2E 00 09 00
19C00   24 00 B4 09 82 00 24 00 1C 25 82 00 02 00 88 00
19C10   00 00 00 00 00 00 EC 05 24 00 08 00 38 00 24 00
19C20   EC 05 24 00 06 00 38 00 9E 00 20 07 24 00 08 00
19C30   38 00 24 00 20 07 24 00 06 00 38 00 9E 00 F8 06
19C40   24 00 08 00 38 00 24 00 F8 06 24 00 06 00 38 00
19C50   9E 00 FC 00 FE 06 24 00 08 00 38 00 24 00 FE 06
19C60   24 00 06 00 38 00 9E 00 52 07 24 00 08 00 38 00
19C70   52 07 24 00 06 00 38 00 9E 00 FC 00 04 07 24 00
19C80   08 00 38 00 24 00 04 07 24 00 06 00 38 00 9E 00
17C90   68 07 24 00 08 00 38 00 68 07 24 00 06 00 38 00
19CA0   9E 00 FC 00 02 00 1C 25 BA 00 88 00 D2 00 24 00
19CB0   00 00 00 00 01 00 60 05 16 00 2B 00 FC 25 94 00
19CC0   24 00 F5 06 24 00 60 05 38 00 94 00 24 00 06 00
19CD0   94 00 24 00 EC 05 24 00 60 05 38 00 94 00 7A 00
19CE0   02 00 F8 00 FC 00 F8 25 24 00 B4 09 9E 00 20 00
19CF0   24 00 0A 26 88 00 62 00 60 00 65 00 FC 00 24 00
19D00   8E 06 24 00 F8 06 24 00 08 00 38 00 38 00 24 00
19D10   F8 25 38 00 06 00 AC 00 2E 00 09 00 24 00 1C 25
19D20   82 00 24 00 8E 06 24 00 F8 06 24 00 08 00 38 00
19D30   38 00 24 00 F8 25 38 00 B4 09 AC 00 8E 06 24 00
19D40   F8 06 24 00 08 00 38 00 38 00 24 00 F8 25 38 00
19D50   06 00 B0 00 C8 00 2E 00 09 00 24 00 B4 09 82 00
19D60   5E 00 FC 00 24 00 B4 09 82 00 02 00 88 00 D2 00
19D70   00 00 08 00 9C 00 FC 00 0E 26 24 00 22 00 26 00
19D80   06 00 88 00 AE 02 9E 00 FC 00 F4 00 03 00 F4 00
19D90   03 00 24 00 1C 25 88 00 24 00 0E 26 8E 00 20 09
19DA0   16 26 FC 00 24 00 20 09 18 09 B4 09 AC 00 2E 00
19DB0   09 00 24 00 24 26 82 00 12 26 24 00 B4 09 9E 00
19DC0   20 00 24 00 20 09 18 09 1C 25 BC 00 88 00 62 00
19DD0   60 00 27 00 FC 00 26 00 20 09 00 09 24 00 12 26
19DE0   38 00 06 00 AC 00 84 00 2E 00 11 00 24 00 20 09
19DF0   08 09 24 00 12 26 38 00 82 00 5E 00 FC 00 24 00
19E00   20 09 10 09 B4 09 AC 00 2E 00 09 00 24 00 24 26
19E10   82 00 0E 26 24 00 0E 26 1C 25 BA 00 9E 00 24 00
19E20   0E 26 D8 05 B0 00 2E 00 0B 00 0E 26 24 00 1C 25
19E30   9E 00 FC 00 54 00 01 00 19 00 29 00 FC 00 02 00
19E40   00 00 28 26 24 00 50 25 9E 00 20 00 24 00 90 05
19E50   88 00 62 00 60 00 29 00 FC 00 24 00 EC 05 24 00
19E60   28 26 38 00 EC 05 24 00 60 05 38 00 AC 00 60 05
19E70   28 26 AE 00 C6 00 2E 00 09 00 24 00 28 26 82 00
19E80   5E 00 FC 00 02 00 38 00 24 00 9E 25 38 00 48 25
19E90   00 00 00 00 24 00 D6 06 24 00 06 00 38 00 38 26
19EA0   AC 00 2E 00 1B 00 34 26 24 00 B4 09 9E 00 30 26
19EB0   24 00 50 25 9E 00 54 00 01 00 0D 01 8D 00 FC 00
19EC0   34 26 24 00 1C 25 9E 00 FC 00 24 00 B8 09 DC 06
19ED0   24 00 06 00 38 00 BA 00 88 00 D2 00 24 00 E2 06
.9EE0   24 00 06 00 38 00 68 00 D2 00 F4 00 01 00 FE 02
.9EF0   24 00 64 25 88 00 D2 00 24 00 E2 06 24 00 06 00
.9F00   38 00 68 00 D2 00 F4 00 01 00 FE 02 FC 00 24 00
.9F10   24 00 A8 05 30 00 B2 25 AC 00 2E 00 11 00 68 07
9F20    24 00 06 00 38 00 58 0A 9E 00 02 00 FC 00 24 00
```

| | | | | | | | | | | | | | | | | |
|---|---|---|---|---|---|---|---|---|---|---|---|---|---|---|---|---|
| 19F30 | 24 | 00 | A8 | 05 | 30 | 00 | 1C | 25 | AE | 00 | 2E | 00 | 05 | 00 | 02 | 00 |
| 19F40 | FC | 00 | 24 | 00 | 3C | 26 | DC | 06 | 24 | 00 | 06 | 00 | 38 | 00 | BA | 00 |
| 19F50 | 88 | 00 | D2 | 00 | 24 | 00 | E2 | 06 | 24 | 00 | 06 | 00 | 38 | 00 | 88 | 00 |
| 19F60 | D2 | 00 | F4 | 00 | 01 | 00 | FE | 02 | 24 | 00 | 64 | 25 | 88 | 00 | D2 | 00 |
| 19F70 | 24 | 00 | E2 | 06 | 24 | 00 | 06 | 00 | 38 | 00 | 88 | 00 | D2 | 00 | F4 | 00 |
| 19F80 | 01 | 00 | FE | 02 | FC | 00 | 30 | 26 | 24 | 00 | 24 | 00 | A8 | 05 | 30 | 00 |
| 19F90 | 9E | 00 | 68 | 07 | 24 | 00 | 06 | 00 | 38 | 00 | 9C | 00 | FC | 00 | 24 | 00 |
| 19FA0 | 30 | 26 | 88 | 00 | 58 | 00 | A1 | 01 | 52 | 00 | FC | 00 | 24 | 00 | 34 | 26 |
| 19FB0 | B4 | 09 | AC | 00 | 58 | 00 | A3 | 00 | FC | 00 | 24 | 00 | 22 | 00 | 24 | 00 |
| 19FC0 | E2 | 06 | 24 | 00 | 06 | 00 | 38 | 00 | 88 | 00 | D2 | 00 | 26 | 03 | B4 | 09 |
| 19FD0 | AC | 00 | 2E | 00 | 09 | 00 | 24 | 00 | 32 | 25 | 02 | 00 | FC | 00 | 24 | 00 |
| 19FE0 | 38 | 09 | DC | 06 | 24 | 00 | 06 | 00 | 38 | 00 | BA | 00 | 88 | 00 | D2 | 00 |
| 19FF0 | 24 | 00 | E2 | 06 | 24 | 00 | 06 | 00 | 38 | 00 | 88 | 00 | D2 | 00 | F4 | 00 |
| 1A000 | 03 | 00 | FE | 02 | FC | 00 | 24 | 00 | 24 | 00 | A8 | 05 | 30 | 00 | 1C | 25 |
| 1A010 | C6 | 00 | B4 | 09 | AC | 00 | 2E | 00 | 1D | 00 | F4 | 00 | 03 | 00 | 24 | 00 |
| 1A020 | E2 | 06 | 24 | 00 | 06 | 00 | 38 | 00 | 88 | 00 | D2 | 00 | 6C | 03 | 24 | 00 |
| 1A030 | 32 | 25 | 02 | 00 | FC | 00 | 24 | 00 | 32 | 25 | 88 | 00 | 58 | 00 | 17 | 00 |
| 1A040 | 52 | 00 | 24 | 00 | A4 | 05 | 24 | 00 | DC | 06 | 24 | 00 | 06 | 00 | 38 | 00 |
| 1A050 | 38 | 26 | BA | 00 | 32 | 00 | 5C | 00 | FC | 00 | 5A | 00 | FC | 00 | 24 | 00 |
| 1A060 | 34 | 26 | 2E | 00 | 1F | 00 | 24 | 00 | 64 | 25 | 88 | 00 | D2 | 00 | 24 | 00 |
| 1A070 | E2 | 06 | 24 | 00 | 06 | 00 | 38 | 00 | 88 | 00 | D2 | 00 | F4 | 00 | 01 | 00 |
| 1A080 | FE | 02 | FC | 00 | 2C | 26 | 24 | 00 | AE | 25 | 24 | 00 | A8 | 05 | 30 | 00 |
| 1A090 | 6A | 0A | C6 | 00 | BA | 00 | 9E | 00 | FC | 00 | 24 | 00 | 2C | 26 | 40 | 26 |
| 1A0A0 | B0 | 00 | 58 | 00 | 5B | 00 | FC | 00 | 24 | 00 | 2C | 26 | 44 | 26 | AC | 00 |
| 1A0B0 | 2E | 00 | 0B | 00 | 2C | 26 | 24 | 00 | AE | 25 | 9E | 00 | FC | 00 | 24 | 00 |
| 1A0C0 | 2C | 26 | 48 | 26 | AC | 00 | 2E | 00 | 0B | 00 | 2C | 26 | 24 | 00 | 68 | 25 |
| 1A0D0 | 9E | 00 | FC | 00 | 24 | 00 | 2C | 26 | 4C | 26 | AC | 00 | 2E | 00 | 0B | 00 |
| 1A0E0 | 2C | 26 | 24 | 00 | 50 | 26 | 9E | 00 | FC | 00 | 24 | 00 | 2C | 26 | 4C | 26 |
| 1A0F0 | B0 | 00 | 2E | 00 | 0B | 00 | 2C | 26 | 24 | 00 | 54 | 26 | 9E | 00 | FC | 00 |
| 1A100 | 5A | 00 | FC | 00 | 68 | 07 | 24 | 00 | 06 | 00 | 38 | 00 | 28 | 00 | 68 | 07 |
| 1A110 | 24 | 00 | 06 | 00 | 38 | 00 | 24 | 00 | 2C | 26 | 24 | 00 | 62 | 00 | 40 | 00 |
| 1A120 | 9E | 00 | FC | 00 | F4 | 00 | 03 | 00 | 24 | 00 | E2 | 06 | 24 | 00 | 06 | 00 |
| 1A130 | 38 | 00 | 88 | 00 | D2 | 00 | 6C | 03 | 6C | 08 | 24 | 00 | 06 | 00 | 38 | 00 |
| 1A140 | 26 | 00 | A0 | 05 | 9E | 00 | FC | 00 | 5C | 00 | FC | 00 | 02 | 00 | D2 | 00 |
| 1A150 | 00 | 00 | 04 | 00 | 24 | 00 | A4 | 05 | 5C | 26 | AC | 00 | 2E | 00 | 0F | 00 |
| 1A160 | 58 | 26 | 24 | 00 | 10 | 25 | 9E | 00 | 2A | 00 | 0B | 00 | 58 | 26 | 24 | 00 |
| 1A170 | 32 | 25 | 9E | 00 | FC | 00 | 24 | 00 | 80 | 09 | 60 | 26 | AC | 00 | 2E | 00 |
| 1A180 | 0B | 00 | 58 | 26 | 24 | 00 | 64 | 26 | 9E | 00 | FC | 00 | 24 | 00 | 06 | 00 |
| 1A190 | 68 | 00 | 58 | 00 | 11 | 00 | 52 | 00 | 24 | 00 | 58 | 26 | 88 | 00 | 58 | 00 |
| 1A1A0 | 03 | 00 | 52 | 00 | 5C | 00 | 5C | 00 | FC | 00 | 02 | 00 | 22 | 00 | 24 | 00 |
| 1A1B0 | 00 | 00 | 0E | 00 | 00 | 00 | F4 | 00 | 07 | 00 | 24 | 00 | 08 | 00 | 68 | 00 |
| 1A1C0 | D2 | 00 | 24 | 00 | 1C | 25 | 68 | 00 | D2 | 00 | 0A | 01 | F4 | 00 | 09 | 00 |
| 1A1D0 | 24 | 00 | 08 | 00 | 88 | 00 | D2 | 00 | F2 | 00 | 07 | 00 | 0A | 01 | FC | 00 |
| 1A1E0 | 24 | 00 | D6 | 06 | 24 | 00 | 08 | 00 | 38 | 00 | 58 | 25 | AC | 00 | 84 | 05 |
| 1A1F0 | 1C | 25 | AC | 00 | C6 | 00 | EC | 05 | 24 | 00 | 60 | 05 | 38 | 00 | B4 | 09 |
| 1A200 | B0 | 00 | C6 | 00 | 2E | 00 | 21 | 00 | F4 | 00 | 03 | 00 | F4 | 00 | 03 | 00 |
| 1A210 | 24 | 00 | 32 | 25 | 88 | 00 | 24 | 00 | EC | 05 | 24 | 00 | 60 | 05 | 38 | 00 |
| 1A220 | 8E | 00 | 26 | 09 | 16 | 26 | FC | 00 | 24 | 00 | 28 | 00 | AA | 07 | 24 | 00 |
| 1A230 | 08 | 00 | 38 | 00 | 24 | 00 | 1C | 25 | D8 | 00 | 68 | 26 | AC | 00 | 2E | 00 |
| 1A240 | 2D | 00 | 24 | 00 | 6E | 26 | DC | 06 | 24 | 00 | 08 | 00 | 38 | 00 | BA | 00 |
| 1A250 | 88 | 00 | D2 | 00 | 24 | 00 | E2 | 06 | 24 | 00 | 08 | 00 | 38 | 00 | 88 | 00 |
| 1A260 | D2 | 00 | F4 | 00 | 03 | 00 | FE | 02 | 2A | 00 | 29 | 00 | 24 | 00 | 4C | 25 |
| 1A270 | DC | 06 | 24 | 00 | 08 | 00 | 38 | 00 | BA | 00 | 88 | 00 | D2 | 00 | 24 | 00 |
| 1A280 | E2 | 06 | 24 | 00 | 08 | 00 | 38 | 00 | 88 | 00 | D2 | 00 | F4 | 00 | 03 | 00 |
| 1A290 | FE | 02 | FC | 00 | 24 | 00 | D6 | 06 | 24 | 00 | 08 | 00 | 38 | 00 | 38 | 26 |
| 1A2A0 | AC | 00 | 2E | 00 | 21 | 00 | 28 | 00 | 72 | 26 | 06 | 00 | 88 | 00 | 24 | 00 |
| 1A2B0 | E2 | 06 | 24 | 00 | 08 | 00 | 38 | 00 | 88 | 00 | D2 | 00 | F2 | 00 | 07 | 00 |
| 1A2C0 | 08 | 03 | 02 | 00 | FC | 00 | 24 | 00 | D6 | 06 | 24 | 00 | 08 | 00 | 38 | 00 |

| | | | | | | | | | | | | | | | | |
|---|---|---|---|---|---|---|---|---|---|---|---|---|---|---|---|---|
| 1A2D0 | 60 | 25 | AC | 00 | 2E | 00 | 1B | 00 | 06 | 00 | 24 | 00 | E2 | 06 | 24 | 00 |
| 1A2E0 | 08 | 00 | 38 | 00 | 88 | 00 | D2 | 00 | F2 | 00 | 07 | 00 | 08 | 03 | 02 | 00 |
| 1A2F0 | FC | 00 | 24 | 00 | 84 | 05 | 10 | 25 | AC | 00 | 84 | 05 | 54 | 25 | AC | 00 |
| 1A300 | C8 | 00 | 58 | 00 | E5 | 00 | FC | 00 | 26 | 00 | 26 | 09 | 8A | 08 | B4 | 09 |
| 1A310 | AC | 00 | 28 | 00 | 06 | 00 | 24 | 00 | 1C | 25 | D4 | 00 | C8 | 25 | AC | 00 |
| 1A320 | C6 | 00 | 84 | 00 | 2E | 00 | 0F | 00 | 06 | 00 | 24 | 00 | 1C | 25 | D4 | 00 |
| 1A330 | DE | 25 | 9E | 00 | FC | 00 | 28 | 00 | 06 | 00 | 7A | 26 | 88 | 00 | 24 | 00 |
| 1A340 | E2 | 06 | 24 | 00 | 08 | 00 | 38 | 00 | 88 | 00 | D2 | 00 | F2 | 00 | 07 | 00 |
| 1A350 | 08 | 03 | FC | 00 | 26 | 00 | EC | 05 | 24 | 00 | 60 | 05 | 38 | 00 | B4 | 09 |
| 1A360 | B0 | 00 | 26 | 09 | 8A | 08 | B4 | 09 | B0 | 00 | C6 | 00 | 84 | 00 | 58 | 00 |
| 1A370 | 47 | 00 | FC | 00 | 28 | 00 | DE | 25 | 26 | 00 | 26 | 09 | 8A | 08 | 90 | 00 |
| 1A380 | 88 | 00 | 24 | 00 | E2 | 06 | 24 | 00 | 08 | 00 | 38 | 00 | 88 | 00 | D2 | 00 |
| 1A390 | F2 | 00 | 07 | 00 | 08 | 03 | 24 | 00 | 74 | 05 | 2E | 00 | 13 | 00 | 28 | 00 |
| 1A3A0 | DE | 25 | 26 | 00 | 26 | 09 | 8A | 08 | 90 | 00 | 94 | 00 | 7A | 00 | FC | 00 |
| 1A3B0 | 24 | 00 | 10 | 25 | 02 | 00 | FC | 00 | 5A | 00 | FC | 00 | C8 | 25 | 24 | 00 |
| 1A3C0 | E2 | 06 | 24 | 00 | 08 | 00 | 38 | 00 | 88 | 00 | D2 | 00 | F2 | 00 | 07 | 00 |
| 1A3D0 | 08 | 03 | 24 | 00 | 74 | 05 | 2E | 00 | 09 | 00 | C8 | 25 | 94 | 00 | 7A | 00 |
| 1A3E0 | FC | 00 | 24 | 00 | 32 | 25 | 02 | 00 | FC | 00 | 5A | 00 | FC | 00 | 06 | 00 |
| 1A3F0 | 24 | 00 | E2 | 06 | 24 | 00 | 08 | 00 | 38 | 00 | 88 | 00 | D2 | 00 | F2 | 00 |
| 1A400 | 07 | 00 | 08 | 03 | FC | 00 | 02 | 00 | 19 | 00 | 29 | 00 | FC | 00 | 02 | 00 |
| 1A410 | 00 | 00 | 16 | 00 | 31 | 00 | DC | 26 | 94 | 00 | 24 | 00 | 60 | 05 | 94 | 00 |
| 1A420 | 24 | 00 | F2 | 05 | 24 | 00 | 60 | 05 | 38 | 00 | 94 | 00 | 24 | 00 | 64 | 00 |
| 1A430 | 3C | 00 | 94 | 00 | 24 | 00 | EC | 05 | 24 | 00 | 60 | 05 | 38 | 00 | 94 | 00 |
| 1A440 | 7A | 00 | F8 | 00 | FC | 00 | 80 | 26 | 24 | 00 | 22 | 00 | EE | 03 | 9E | 00 |
| 1A450 | 24 | 00 | 80 | 26 | B8 | 09 | AC | 00 | 2E | 00 | 0D | 00 | 80 | 26 | 24 | 00 |
| 1A460 | 22 | 00 | EE | 03 | 9E | 00 | FC | 00 | 24 | 00 | 20 | 07 | 24 | 00 | 60 | 05 |
| 1A470 | 38 | 00 | 60 | 05 | AE | 00 | 2E | 00 | 27 | 00 | 24 | 00 | 80 | 26 | B4 | 09 |
| 1A480 | AC | 00 | 80 | 26 | 32 | 25 | AC | 00 | EC | 05 | 24 | 00 | 60 | 05 | 38 | 00 |
| 1A490 | B4 | 09 | AC | 00 | C6 | 00 | C8 | 00 | 2E | 00 | 05 | 00 | 02 | 00 | FC | 00 |
| 1A4A0 | 24 | 00 | 80 | 26 | B4 | 09 | AC | 00 | 2E | 00 | 0B | 00 | 80 | 26 | 24 | 00 |
| 1A4B0 | B8 | 09 | 9E | 00 | FC | 00 | 24 | 00 | 80 | 26 | 1C | 25 | AC | 00 | 2E | 00 |
| 1A4C0 | 0B | 00 | 54 | 00 | 01 | 00 | 2F | 01 | A1 | 00 | FC | 00 | 24 | 00 | 80 | 26 |
| 1A4D0 | B8 | 09 | AC | 00 | EC | 05 | 24 | 00 | 60 | 05 | 38 | 00 | B4 | 09 | AC | 00 |
| 1A4E0 | C6 | 00 | 2E | 00 | 07 | 00 | DA | 03 | 02 | 00 | FC | 00 | 24 | 00 | 80 | 26 |
| 1A4F0 | B2 | 25 | B4 | 00 | 2E | 00 | 0B | 00 | 54 | 00 | 01 | 00 | 6D | 01 | C9 | 00 |
| 1A500 | FC | 00 | 24 | 00 | 80 | 26 | B2 | 25 | AC | 00 | 22 | 00 | 24 | 00 | E2 | 06 |
| 1A510 | 24 | 00 | 60 | 05 | 38 | 00 | 88 | 00 | D2 | 00 | 26 | 03 | B4 | 09 | AC | 00 |
| 1A520 | C6 | 00 | 2E | 00 | 19 | 00 | F8 | 03 | 80 | 26 | 24 | 00 | 10 | 25 | 9E | 00 |
| 1A530 | 54 | 00 | 01 | 00 | 6D | 01 | C9 | 00 | 2A | 00 | 05 | 00 | 02 | 00 | FC | 00 |
| 1A540 | 24 | 00 | F2 | 05 | 24 | 00 | 60 | 05 | 38 | 00 | B4 | 09 | AC | 00 | 2E | 00 |
| 1A550 | 0D | 00 | F4 | 00 | 01 | 00 | E4 | 03 | 2A | 00 | 09 | 00 | F4 | 00 | 03 | 00 |
| 1A560 | E4 | 03 | FC | 00 | 24 | 00 | 74 | 05 | 2E | 00 | 13 | 00 | EA | 26 | 94 | 00 |
| 1A570 | 68 | 07 | 24 | 00 | 60 | 05 | 38 | 00 | 94 | 00 | 7A | 00 | FC | 00 | 24 | 00 |
| 1A580 | F2 | 05 | 24 | 00 | 60 | 05 | 38 | 00 | 54 | 00 | 49 | 00 | 31 | 03 | 55 | 01 |
| 1A590 | 67 | 04 | A5 | 01 | 2B | 06 | 31 | 02 | 07 | 07 | 95 | 02 | AB | 07 | F9 | 02 |
| 1A5A0 | 1B | 08 | 35 | 03 | A3 | 08 | 85 | 03 | C3 | 08 | 99 | 03 | F1 | 08 | C1 | 03 |
| 1A5B0 | 2B | 0A | 75 | 04 | 5D | 0B | 3D | 05 | 5B | 0C | A1 | 05 | 65 | 0D | 2D | 06 |
| 1A5C0 | 11 | 10 | 59 | 07 | 89 | 10 | F9 | 07 | D7 | 10 | 21 | 08 | 63 | 11 | 71 | 08 |
| 1A5D0 | A9 | 11 | 99 | 08 | 1F | 12 | FD | 08 | 5D | 12 | 25 | 09 | 9B | 12 | 4D | 09 |
| 1A5E0 | 11 | 13 | 89 | 09 | 41 | 15 | 19 | 10 | 23 | 16 | 91 | 10 | 51 | 16 | A5 | 10 |
| 1A5F0 | 8D | 17 | 5D | 12 | E9 | 19 | C5 | 13 | AD | 1C | AD | 17 | FB | 1C | D5 | 17 |
| 1A600 | F3 | 1D | 75 | 18 | 55 | 1E | 9D | 18 | A3 | 1E | C5 | 18 | 47 | 1F | 29 | 19 |
| 1A610 | 85 | 1F | 51 | 19 | B1 | 21 | 35 | 21 | FD | 22 | FD | 21 | E1 | 15 | 7D | 10 |
| 1A620 | FC | 00 | 20 | 07 | 24 | 00 | 60 | 05 | 38 | 00 | 24 | 00 | 60 | 05 | 9E | 00 |
| 1A630 | FC | 00 | 24 | 00 | 68 | 07 | 24 | 00 | 60 | 05 | 38 | 00 | A0 | 00 | C4 | 05 |
| 1A640 | AE | 00 | 2E | 00 | 2F | 00 | F4 | 00 | 07 | 00 | 24 | 00 | 60 | 05 | 58 | 00 |
| 1A650 | D2 | 00 | 24 | 00 | 1C | 25 | 88 | 00 | D2 | 00 | 0A | 01 | EC | 05 | 24 | 00 |
| 1A660 | 60 | 05 | 38 | 00 | 24 | 00 | 1C | 25 | 9E | 00 | 54 | 00 | 01 | 00 | EF | 0F |
| 1A670 | 45 | 07 | FC | 00 | 7E | 08 | 24 | 00 | 60 | 05 | 38 | 00 | 26 | 00 | A0 | 05 |
| 1A680 | 9E | 00 | 94 | 07 | 24 | 00 | 60 | 05 | 38 | 00 | 22 | 00 | F6 | 26 | 9E | 00 |
| 1A690 | FC | 00 | F4 | 00 | 07 | 00 | 24 | 00 | 60 | 05 | 88 | 00 | D2 | 00 | 24 | 00 |
| 1A6A0 | 10 | 25 | 88 | 00 | D2 | 00 | 0A | 01 | FC | 00 | 26 | 00 | 28 | 00 | AA | 07 |
| 1A6B0 | 24 | 00 | 60 | 05 | 38 | 00 | 68 | 07 | 24 | 00 | 60 | 05 | 38 | 00 | 8E | 00 |
| 1A6C0 | 88 | 00 | 04 | 02 | FC | 00 | 24 | 00 | 74 | 05 | 2E | 00 | 15 | 00 | FE | 26 |
| 1A6D0 | 94 | 00 | 24 | 00 | EC | 05 | 24 | 00 | 60 | 05 | 38 | 00 | 94 | 00 | 7A | 00 |

| | | | | | | | | | | | | | | | | |
|---|---|---|---|---|---|---|---|---|---|---|---|---|---|---|---|---|
| 1A6E0 | FC | 00 | 24 | 00 | EC | 05 | 24 | 00 | 60 | 05 | 38 | 00 | 1C | 25 | B4 | 00 |
| 1A6F0 | EC | 05 | 24 | 00 | 60 | 05 | 38 | 00 | 0C | 27 | B0 | 00 | C8 | 00 | 22 | 00 |
| 1A700 | 24 | 00 | 1C | 25 | 88 | 00 | D2 | 00 | F2 | 00 | 05 | 00 | 32 | 01 | C8 | 00 |
| 1A710 | F8 | 06 | 24 | 00 | 60 | 05 | 38 | 00 | B4 | 09 | AC | 00 | C8 | 00 | 2E | 00 |
| 1A720 | 21 | 00 | F4 | 00 | 07 | 00 | 24 | 00 | 60 | 05 | 88 | 00 | D2 | 00 | 24 | 00 |
| 1A730 | 32 | 25 | 88 | 00 | D2 | 00 | 0A | 01 | 54 | 00 | 01 | 00 | EF | 0F | 45 | 07 |
| 1A740 | FC | 00 | 24 | 00 | 80 | 26 | B8 | 09 | AC | 00 | 2E | 00 | 0B | 00 | 54 | 00 |
| 1A750 | 01 | 00 | A1 | 0F | 09 | 07 | FC | 00 | 24 | 00 | 22 | 00 | 24 | 00 | E2 | 06 |
| 1A760 | 24 | 00 | 60 | 05 | 38 | 00 | 88 | 00 | D2 | 00 | 26 | 03 | B4 | 09 | AC | 00 |
| 1A770 | 2E | 00 | 09 | 00 | F8 | 03 | 2A | 00 | 13 | 00 | F2 | 05 | 24 | 00 | 60 | 05 |
| 1A780 | 38 | 00 | 24 | 00 | 1C | 25 | 9E | 00 | 02 | 00 | FC | 00 | 24 | 00 | 04 | 07 |
| 1A790 | 24 | 00 | 60 | 05 | 38 | 00 | B4 | 09 | AC | 00 | 2E | 00 | 33 | 00 | 24 | 00 |
| 1A7A0 | 22 | 00 | 24 | 00 | 10 | 27 | 88 | 00 | D2 | 00 | F2 | 00 | 05 | 00 | 32 | 01 |
| 1A7B0 | 22 | 00 | 24 | 00 | 40 | 26 | 88 | 00 | D2 | 00 | F2 | 00 | 05 | 00 | 32 | 01 |
| 1A7C0 | C8 | 00 | 2E | 00 | 0B | 00 | 54 | 00 | 01 | 00 | 3B | 13 | A1 | 0F | FC | 00 |
| 1A7D0 | 24 | 00 | 22 | 00 | 24 | 00 | 14 | 27 | 88 | 00 | D2 | 00 | F2 | 00 | 05 | 00 |
| 1A7E0 | 32 | 01 | 2E | 00 | 0B | 00 | 54 | 00 | 01 | 00 | 3B | 13 | A1 | 0F | FC | 00 |
| 1A7F0 | 24 | 00 | 04 | 07 | 24 | 00 | 60 | 05 | 38 | 00 | 18 | 27 | AC | 00 | 2E | 00 |
| 1A800 | 0B | 00 | 54 | 00 | 01 | 00 | 7B | 1C | 71 | 17 | FC | 00 | 24 | 00 | 04 | 07 |
| 1A810 | 24 | 00 | 60 | 05 | 38 | 00 | 48 | 25 | C2 | 00 | 54 | 00 | 09 | 00 | 23 | 04 |
| 1A820 | 91 | 01 | 23 | 04 | 91 | 01 | 73 | 08 | 5D | 03 | 73 | 08 | 5D | 03 | 73 | 08 |
| 1A830 | 5D | 03 | FC | 00 | 24 | 00 | 04 | 07 | 24 | 00 | 60 | 05 | 38 | 00 | 48 | 25 |
| 1A840 | C0 | 00 | 54 | 00 | 17 | 00 | 67 | 04 | A5 | 01 | 67 | 04 | A5 | 01 | 67 | 04 |
| 1A850 | A5 | 01 | 67 | 04 | A5 | 01 | 67 | 04 | A5 | 01 | F5 | 1F | 41 | 1F | F5 | 1F |
| 1A860 | 41 | 1F | F5 | 1F | 41 | 1F | F5 | 1F | 41 | 1F | AD | 09 | 39 | 04 | 67 | 04 |
| 1A870 | A5 | 01 | AD | 09 | 39 | 04 | FC | 00 | 24 | 00 | 22 | 00 | 46 | 01 | 04 | 07 |
| 1A880 | 24 | 00 | 60 | 05 | 38 | 00 | 48 | 25 | C2 | 00 | EC | 25 | B0 | 00 | C6 | 00 |
| 1A890 | 2E | 00 | 21 | 00 | F4 | 00 | 07 | 00 | 24 | 00 | 60 | 05 | 88 | 00 | D2 | 00 |
| 1A8A0 | 24 | 00 | 32 | 25 | 88 | 00 | D2 | 00 | 0A | 01 | 54 | 00 | 01 | 00 | EF | 0F |
| 1A8B0 | 45 | 07 | FC | 00 | F2 | 05 | 24 | 00 | 60 | 05 | 38 | 00 | 24 | 00 | 32 | 25 |
| 1A8C0 | 9E | 00 | 24 | 00 | 22 | 00 | 24 | 00 | FE | 06 | 24 | 00 | 60 | 05 | 38 | 00 |
| 1A8D0 | 88 | 00 | D2 | 00 | D6 | 02 | B4 | 09 | AC | 00 | 2E | 00 | 19 | 00 | 24 | 00 |
| 1A8E0 | 22 | 00 | AA | 01 | B4 | 09 | B0 | 00 | 2E | 00 | 0B | 00 | 54 | 00 | 01 | 00 |
| 1A8F0 | 81 | 05 | E1 | 01 | FC | 00 | 24 | 00 | 04 | 07 | 24 | 00 | 60 | 05 | 38 | 00 |
| 1A900 | 48 | 25 | C2 | 00 | 54 | 25 | B4 | 00 | 04 | 07 | 24 | 00 | 60 | 05 | 38 | 00 |
| 1A910 | 48 | 25 | C2 | 00 | 32 | 25 | AE | 00 | C6 | 00 | 22 | 00 | 24 | 00 | 1C | 27 |
| 1A920 | 88 | 00 | D2 | 00 | F2 | 00 | 05 | 00 | 32 | 01 | B4 | 09 | AC | 00 | C6 | 00 |
| 1A930 | 2E | 00 | 0F | 00 | 54 | 00 | 01 | 00 | F5 | 1F | 41 | 1F | 2A | 00 | 17 | 00 |
| 1A940 | 24 | 00 | 80 | 26 | B8 | 09 | AC | 00 | 2E | 00 | 0B | 00 | 54 | 00 | 01 | 00 |
| 1A950 | 31 | 10 | 6D | 07 | FC | 00 | 24 | 00 | 04 | 07 | 24 | 00 | 60 | 05 | 38 | 00 |
| 1A960 | 48 | 25 | C2 | 00 | EC | 25 | B0 | 00 | 2E | 00 | 25 | 00 | F4 | 00 | 07 | 00 |
| 1A970 | 24 | 00 | 60 | 05 | 88 | 00 | D2 | 00 | 24 | 00 | 32 | 25 | 88 | 00 | D2 | 00 |
| 1A980 | 0A | 01 | 54 | 00 | 01 | 00 | EF | 0F | 45 | 07 | 2A | 00 | 05 | 00 | 02 | 00 |
| 1A990 | FC | 00 | 24 | 00 | 74 | 05 | 2E | 00 | 15 | 00 | 20 | 27 | 94 | 00 | 24 | 00 |
| 1A9A0 | FE | 06 | 24 | 00 | 60 | 05 | 38 | 00 | 94 | 00 | 7A | 00 | FC | 00 | 1A | 07 |
| 1A9B0 | 24 | 00 | 60 | 05 | 38 | 00 | 24 | 00 | B4 | 09 | 9E | 00 | F2 | 05 | 24 | 00 |
| 1A9C0 | 60 | 05 | 38 | 00 | 24 | 00 | 10 | 25 | 9E | 00 | 26 | 00 | 26 | 00 | 28 | 00 |
| 1A9D0 | 52 | 07 | 24 | 00 | 60 | 05 | 38 | 00 | 8E | 00 | 2C | 27 | C0 | 00 | D2 | 00 |
| 1A9E0 | 5C | 25 | AC | 00 | 84 | 00 | 2E | 00 | 19 | 00 | 52 | 07 | 24 | 00 | 60 | 05 |
| 1A9F0 | 38 | 00 | 22 | 00 | 52 | 07 | 24 | 00 | 60 | 05 | 38 | 00 | 4E | 03 | 9E | 00 |
| 1AA00 | FC | 00 | 24 | 00 | 74 | 05 | 2E | 00 | 13 | 00 | 30 | 27 | 94 | 00 | 52 | 07 |
| 1AA10 | 24 | 00 | 60 | 05 | 38 | 00 | 94 | 00 | 7A | 00 | FC | 00 | 7E | 08 | 24 | 00 |
| 1AA20 | 60 | 05 | 38 | 00 | 26 | 00 | A0 | 05 | 9E | 00 | 94 | 07 | 24 | 00 | 60 | 05 |
| 1AA30 | 38 | 00 | 22 | 00 | F6 | 26 | 9E | 00 | 02 | 00 | FC | 00 | F2 | 00 | 03 | 00 |
| 1AA40 | 58 | 03 | 24 | 00 | 1A | 07 | 24 | 00 | 60 | 05 | 38 | 00 | B4 | 09 | B0 | 00 |
| 1AA50 | 2E | 00 | 05 | 00 | 02 | 00 | FC | 00 | 24 | 00 | 22 | 00 | 24 | 00 | 40 | 27 |
| 1AA60 | 88 | 00 | D2 | 00 | F2 | 00 | 05 | 00 | 32 | 01 | 2E | 00 | 57 | 00 | F4 | 00 |
| 1AA70 | 03 | 00 | F4 | 00 | 03 | 00 | 24 | 00 | 32 | 25 | 88 | 00 | 24 | 00 | EC | 05 |
| 1AA80 | 24 | 00 | 60 | 05 | 38 | 00 | 8E | 00 | 26 | 09 | 16 | 26 | 24 | 00 | FE | 06 |
| 1AA90 | 24 | 00 | 60 | 05 | 38 | 00 | 88 | 00 | D2 | 00 | F4 | 00 | 03 | 00 | D0 | 03 |
| 1AAA0 | EC | 05 | 24 | 00 | 60 | 05 | 38 | 00 | 26 | 00 | 28 | 00 | 26 | 09 | C2 | 08 |
| 1AAB0 | 8E | 00 | 9E | 00 | C2 | 02 | 54 | 00 | 01 | 00 | 85 | 02 | 2D | 01 | 2A | 00 |
| 1AAC0 | 15 | 00 | F4 | 00 | 09 | 00 | 24 | 00 | 60 | 05 | 88 | 00 | D2 | 00 | F2 | 00 |
| 1AAD0 | 07 | 00 | 0A | 01 | FC | 00 | 24 | 00 | 04 | 07 | 24 | 00 | 60 | 05 | 38 | 00 |
| 1AAE0 | 48 | 25 | C2 | 00 | 54 | 00 | 11 | 00 | 07 | 07 | BD | 02 | 07 | 07 | BD | 02 |
| 1AAF0 | FD | 06 | 6D | 02 | FD | 06 | 6D | 02 | FD | 06 | 6D | 02 | FD | 06 | 6D | 02 |

| | | | | | | | | | | | | | | | | |
|---|---|---|---|---|---|---|---|---|---|---|---|---|---|---|---|---|
| 1AB00 | FD | 06 | 6D | 02 | A3 | 0A | D9 | 04 | A3 | 0A | D9 | 04 | FC | 00 | 54 | 00 |
| 1AB10 | 01 | 00 | CB | 07 | 0D | 03 | FC | 00 | 1A | 07 | 24 | 00 | 60 | 05 | 38 | 00 |
| 1AB20 | 24 | 00 | B4 | 09 | 9E | 00 | 58 | 00 | 23 | 00 | 1C | 00 | 12 | 00 | 24 | 00 |
| 1AB30 | 1A | 07 | 24 | 00 | 60 | 05 | 38 | 00 | B4 | 09 | AC | 00 | 3C | 00 | 24 | 00 |
| 1AB40 | 10 | 25 | 68 | 00 | D2 | 00 | F2 | 00 | 07 | 00 | EA | 02 | 5C | 00 | FC | 00 |
| 1AB50 | F4 | 00 | 03 | 00 | 24 | 00 | 60 | 05 | 88 | 00 | D2 | 00 | 24 | 00 | FE | 06 |
| 1AB60 | 24 | 00 | 60 | 05 | 38 | 00 | 68 | 00 | D2 | 00 | 0A | 01 | FC | 00 | 6C | 08 |
| 1AB70 | 24 | 00 | 60 | 05 | 38 | 00 | 26 | 00 | A0 | 05 | AC | 05 | BA | 00 | 9E | 00 |
| 1AB80 | F2 | 05 | 24 | 00 | 60 | 05 | 38 | 00 | 24 | 00 | 54 | 25 | 9E | 00 | 24 | 00 |
| 1AB90 | 22 | 00 | 24 | 00 | 44 | 27 | 88 | 00 | D2 | 00 | F2 | 00 | 05 | 00 | 32 | 01 |
| 1ABA0 | 2E | 00 | 19 | 00 | 6C | 08 | 24 | 00 | 60 | 05 | 38 | 00 | 26 | 00 | A0 | 05 |
| 1ABB0 | AC | 05 | 10 | 25 | BE | 00 | BA | 00 | 9E | 00 | FC | 00 | 26 | 00 | 6C | 08 |
| 1ABC0 | 24 | 00 | 60 | 05 | 38 | 00 | A0 | 05 | B0 | 00 | 80 | 26 | B8 | 09 | AE | 00 |
| 1ABD0 | C6 | 00 | 84 | 00 | 2E | 00 | 05 | 00 | 02 | 00 | FC | 00 | F4 | 00 | 05 | 00 |
| 1ABE0 | 24 | 00 | 60 | 05 | 68 | 00 | D2 | 00 | 24 | 00 | FE | 06 | 24 | 00 | 60 | 05 |
| 1ABF0 | 38 | 00 | 68 | 00 | D2 | 00 | 0A | 01 | 24 | 00 | FE | 06 | 24 | 00 | 60 | 05 |
| 1AC00 | 38 | 00 | 88 | 00 | D2 | 00 | F4 | 00 | 03 | 00 | D0 | 03 | FC | 00 | F2 | 05 |
| 1AC10 | 24 | 00 | 60 | 05 | 38 | 00 | 24 | 00 | B2 | 25 | 9E | 00 | 1A | 07 | 24 | 00 |
| 1AC20 | 60 | 05 | 38 | 00 | 24 | 00 | B4 | 09 | 9E | 00 | FC | 00 | 24 | 00 | B8 | 09 |
| 1AC30 | 88 | 00 | D2 | 00 | F2 | 00 | 07 | 00 | EA | 02 | 24 | 00 | 1A | 07 | 24 | 00 |
| 1AC40 | 60 | 05 | 38 | 00 | B4 | 09 | B0 | 00 | 2E | 00 | 05 | 00 | 02 | 00 | FC | 00 |
| 1AC50 | F0 | 01 | 48 | 27 | E6 | 01 | FC | 00 | 24 | 00 | 22 | 00 | 24 | 00 | 4E | 27 |
| 1AC60 | 88 | 00 | D2 | 00 | F2 | 00 | 05 | 00 | 32 | 01 | 2E | 00 | 0F | 00 | 54 | 00 |
| 1AC70 | 01 | 00 | 59 | 10 | D1 | 07 | 2A | 00 | 0B | 00 | 54 | 00 | 01 | 00 | EF | 0F |
| 1AC80 | 45 | 07 | FC | 00 | F4 | 00 | 09 | 00 | 24 | 00 | 60 | 05 | 88 | 00 | D2 | 00 |
| 1AC90 | F2 | 00 | 07 | 00 | 0A | 01 | F2 | 05 | 24 | 00 | 60 | 05 | 38 | 00 | 24 | 00 |
| 1ACA0 | EC | 25 | 9E | 00 | 1A | 07 | 24 | 00 | 60 | 05 | 38 | 00 | 24 | 00 | B4 | 09 |
| 1ACB0 | 9E | 00 | FC | 00 | 24 | 00 | EC | 25 | 88 | 00 | D2 | 00 | F2 | 00 | 07 | 00 |
| 1ACC0 | EA | 02 | 24 | 00 | 1A | 07 | 24 | 00 | 60 | 05 | 38 | 00 | 2E | 00 | 05 | 00 |
| 1ACD0 | 02 | 00 | FC | 00 | F2 | 05 | 24 | 00 | 60 | 05 | 38 | 00 | 24 | 00 | 5C | 25 |
| 1ACE0 | 9E | 00 | 68 | 07 | 24 | 00 | 60 | 05 | 38 | 00 | 9C | 00 | 72 | 08 | 24 | 00 |
| 1ACF0 | 60 | 05 | 38 | 00 | 26 | 00 | A0 | 05 | 52 | 27 | BA | 00 | 9E | 00 | 02 | 00 |
| 1AD00 | FC | 00 | 24 | 00 | 80 | 26 | 1C | 25 | AC | 00 | 80 | 26 | B8 | 09 | AC | 00 |
| 1AD10 | C8 | 00 | 2E | 00 | 08 | 00 | 54 | 00 | 01 | 00 | 27 | 09 | E9 | 03 | FC | 00 |
| 1AD20 | 26 | 00 | 72 | 08 | 24 | 00 | 60 | 05 | 38 | 00 | A0 | 05 | B0 | 00 | 84 | 00 |
| 1AD30 | 2E | 00 | 05 | 00 | 02 | 00 | FC | 00 | 24 | 00 | 68 | 07 | 24 | 00 | 60 | 05 |
| 1AD40 | 38 | 00 | A0 | 00 | B8 | 09 | B4 | 00 | 2E | 00 | 19 | 00 | 68 | 07 | 24 | 00 |
| 1AD50 | 60 | 05 | 38 | 00 | 28 | 00 | 68 | 07 | 24 | 00 | 60 | 05 | 38 | 00 | 72 | 26 |
| 1AD60 | 9E | 00 | FC | 00 | 24 | 00 | 22 | 00 | 24 | 00 | E2 | 06 | 24 | 00 | 60 | 05 |
| 1AD70 | 38 | 00 | 88 | 00 | D2 | 00 | 26 | 03 | B4 | 09 | AC | 00 | 2E | 00 | 05 | 00 |
| 1AD80 | F8 | 03 | FC | 00 | F4 | 00 | 07 | 00 | 24 | 00 | 60 | 05 | 88 | 00 | D2 | 00 |
| 1AD90 | 24 | 00 | 88 | 09 | 88 | 00 | D2 | 00 | 0A | 01 | 24 | 00 | BE | 25 | 88 | 00 |
| 1ADA0 | 5A | 01 | F4 | 00 | 09 | 00 | 24 | 00 | 60 | 05 | 88 | 00 | D2 | 00 | F2 | 00 |
| 1ADB0 | 07 | 00 | 0A | 01 | 54 | 00 | 01 | 00 | 23 | 04 | 91 | 01 | FC | 00 | 24 | 00 |
| 1ADC0 | 22 | 00 | 46 | 01 | 2E | 00 | 21 | 00 | F4 | 00 | 07 | 00 | 24 | 00 | 60 | 05 |
| 1ADD0 | 88 | 00 | D2 | 00 | 24 | 00 | 32 | 25 | 88 | 00 | D2 | 00 | 0A | 01 | 54 | 00 |
| 1ADE0 | 01 | 00 | EF | 0F | 45 | 07 | FC | 00 | 24 | 00 | 22 | 00 | AA | 01 | B4 | 09 |
| 1ADF0 | AC | 00 | 2E | 00 | 21 | 00 | F4 | 00 | 07 | 00 | 24 | 00 | 60 | 05 | 88 | 00 |
| 1AE00 | D2 | 00 | 24 | 00 | 32 | 25 | 88 | 00 | D2 | 00 | 0A | 01 | 54 | 00 | 01 | 00 |
| 1AE10 | EF | 0F | 45 | 07 | FC | 00 | F2 | 05 | 24 | 00 | 60 | 05 | 38 | 00 | 24 | 00 |
| 1AE20 | 48 | 25 | 9E | 00 | 1A | 07 | 24 | 00 | 60 | 05 | 38 | 00 | 24 | 00 | B4 | 09 |
| 1AE30 | 9E | 00 | 80 | 26 | 24 | 00 | B4 | 09 | 9E | 00 | FC | 00 | 24 | 00 | 80 | 26 |
| 1AE40 | B8 | 09 | AC | 00 | 2E | 00 | 0B | 00 | 54 | 00 | 01 | 00 | 71 | 0E | A5 | 06 |
| 1AE50 | FC | 00 | F2 | 00 | 03 | 00 | 44 | 03 | 24 | 00 | 1A | 07 | 24 | 00 | 60 | 05 |
| 1AE60 | 38 | 00 | 2E | 00 | 05 | 00 | 02 | 00 | FC | 00 | 24 | 00 | 74 | 05 | 68 | 05 |
| 1AE70 | C6 | 00 | 2E | 00 | 09 | 00 | 56 | 27 | 94 | 00 | 7A | 00 | FC | 00 | 24 | 00 |
| 1AE80 | 74 | 05 | 68 | 05 | B4 | 09 | AC | 00 | C6 | 00 | 2E | 00 | 09 | 00 | 6A | 27 |
| 1AE90 | 94 | 00 | 7A | 00 | FC | 00 | 24 | 00 | 68 | 05 | 2E | 00 | 0F | 00 | 54 | 00 |
| 1AEA0 | 01 | 00 | 9D | 0C | C9 | 05 | 2A | 00 | 0B | 00 | 54 | 00 | 01 | 00 | 0B | 0C |
| 1AEB0 | 83 | 05 | FC | 00 | F4 | 00 | 07 | 00 | 24 | 00 | FE | 06 | 24 | 00 | 60 | 05 |
| 1AEC0 | 38 | 00 | 88 | 00 | D2 | 00 | 24 | 00 | 10 | 25 | 88 | 00 | D2 | 00 | 0A | 01 |
| 1AED0 | FC | 00 | 7E | 08 | 24 | 00 | 60 | 05 | 38 | 00 | 9C | 00 | 94 | 07 | 24 | 00 |
| 1AEE0 | 60 | 05 | 38 | 00 | 9C | 00 | FC | 00 | F4 | 00 | 07 | 00 | 24 | 00 | 60 | 05 |
| 1AEF0 | 88 | 00 | D2 | 00 | 24 | 00 | 10 | 25 | 88 | 00 | D2 | 00 | 0A | 01 | 6C | 08 |
| 1AF00 | 24 | 00 | 60 | 05 | 38 | 00 | 26 | 00 | A0 | 05 | CC | 05 | 24 | 00 | 1C | 25 |

```
1AF10   22 00 24 00 48 26 68 00 D2 00 F2 00 05 00 32 01
1AF20   BA 00 88 00 BE 00 BA 00 9E 00 F2 05 24 00 60 05
1AF30   38 00 24 00 C0 26 9E 00 FC 00 24 00 22 00 24 00
1AF40   5C 25 88 00 D2 00 F2 00 05 00 32 01 2E 00 1F 00
1AF50   22 00 7E 07 24 00 60 05 38 00 A0 01 24 00 FE 06
1AF60   24 00 60 05 38 00 88 00 D2 00 1C 03 FC 00 24 00
1AF70   22 00 24 00 82 27 68 00 D2 00 F2 00 05 00 32 01
1AF80   22 00 24 00 5C 25 88 00 D2 00 F2 00 05 00 32 01
1AF90   B4 09 AC 00 22 00 24 00 FE 06 24 00 60 05 38 00
1AFA0   88 00 D2 00 D6 02 C6 00 C8 00 2E 00 0B 00 54 00
1AFB0   01 00 9D 0C C9 05 FC 00 24 00 22 00 24 00 FE 06
1AFC0   24 00 60 05 38 00 88 00 D2 00 72 02 5C 25 AC 00
1AFD0   2E 00 1B 00 24 00 FE 06 24 00 60 05 38 00 68 00
1AFE0   D2 00 68 02 54 00 01 00 9D 0C C9 05 FC 00 24 00
1AFF0   80 26 B8 09 AC 00 2E 00 0B 00 54 00 01 00 71 0E
1B000   A5 06 FC 00 26 00 6C 08 24 00 60 05 38 00 A0 05
1B010   B0 00 84 00 2E 00 05 00 02 00 FC 00 F4 00 09 00
1B020   24 00 60 05 88 00 D2 00 F2 00 07 00 0A 01 24 00
1B030   22 00 24 00 40 26 88 00 D2 00 F2 00 05 00 32 01
1B040   2E 00 0B 00 54 00 01 00 71 0E A5 06 FC 00 1A 07
1B050   24 00 60 05 38 00 24 00 B4 09 9E 00 F2 05 24 00
1B060   60 05 38 00 24 00 38 26 9E 00 FC 00 24 00 48 25
1B070   88 00 D2 00 F2 00 07 00 EA 02 24 00 80 26 B8 09
1B080   AC 00 2E 00 0D 00 F2 00 03 00 F2 00 07 00 EA 02
1B090   FC 00 24 00 1A 07 24 00 60 05 38 00 2E 00 05 00
1B0A0   02 00 FC 00 54 00 01 00 71 0E A5 06 FC 00 F4 00
1B0B0   09 00 24 00 60 05 88 00 D2 00 F2 00 07 00 0A 01
1B0C0   F4 00 09 00 24 00 FE 06 24 00 60 05 38 00 88 00
1B0D0   D2 00 F2 00 07 00 0A 01 F4 00 03 00 24 00 60 05
1B0E0   88 00 D2 00 24 00 FE 06 24 00 60 05 38 00 88 00
1B0F0   D2 00 0A 01 FC 00 24 00 74 05 2E 00 09 00 56 27
1B100   94 00 7A 00 FC 00 24 00 22 00 24 00 6A 0A 88 00
1B110   D2 00 F2 00 05 00 32 01 2E 00 13 00 24 00 FE 06
1B120   24 00 60 05 38 00 68 00 D2 00 2C 02 FC 00 F2 05
1B130   24 00 60 05 38 00 24 00 60 25 9E 00 30 03 72 08
1B140   24 00 60 05 38 00 26 00 6C 08 24 00 60 05 38 00
1B150   64 26 BC 00 9E 00 FC 00 7E 08 24 00 60 05 38 00
1B160   26 00 A0 05 9E 00 94 07 24 00 60 05 38 00 22 00
1B170   F6 26 9E 00 FC 00 24 00 80 26 B8 09 AC 00 2E 00
1B180   0B 00 54 00 01 00 71 0E A5 06 FC 00 26 00 72 08
1B190   24 00 60 05 38 00 A0 05 B4 00 84 00 58 00 83 00
1B1A0   FC 00 26 00 6C 08 24 00 60 05 38 00 A0 05 B0 00
1B1B0   84 00 2E 00 2B 00 24 00 FE 06 24 00 60 05 38 00
1B1C0   88 00 D2 00 F2 00 05 00 14 01 72 08 24 00 60 05
1B1D0   38 00 26 00 A0 05 54 25 BA 00 9E 00 02 00 FC 00
1B1E0   24 00 32 25 68 00 58 00 23 00 52 00 24 00 86 27
1B1F0   88 00 5A 01 24 00 FE 06 24 00 60 05 38 00 88 00
1B200.  D2 00 24 00 54 25 88 00 D2 00 14 01 5C 00 72 08
1B210   24 00 60 05 38 00 26 00 A0 05 48 25 BA 00 9E 00
1B220   FC 00 5A 00 FC 00 26 00 6C 08 24 00 60 05 38 00
1B230   A0 05 B0 00 84 00 2E 00 05 00 02 00 FC 00 26 00
1B240   22 00 24 00 8A 27 68 00 D2 00 F2 00 05 00 32 01
1B250   22 00 24 00 4C 26 88 00 D2 00 F2 00 05 00 32 01
1B260   6C 08 24 00 60 05 38 00 B4 05 BA 00 B0 05 BC 00
1B270   A0 05 B0 00 C6 00 C8 00 84 00 2E 00 05 00 02 00
1B280   FC 00 F4 00 05 00 24 00 60 05 88 00 D2 00 24 00
1B290   FE 06 24 00 60 05 38 00 88 00 D2 00 0A 01 F4 00
1B2A0   09 00 24 00 FE 06 24 00 60 05 38 00 88 00 D2 00
1B2B0   F2 00 07 00 0A 01 FC 00 24 00 F2 05 24 00 60 05
1B2C0   38 00 60 25 AC 00 22 00 24 00 8E 27 88 00 D2 00
1B2D0   F2 00 05 00 32 01 C6 00 2E 00 6D 00 F4 00 07 00
1B2E0   24 00 FE 06 24 00 60 05 38 00 88 00 D2 00 24 00
1B2F0   1C 25 88 00 D2 00 0A 01 20 07 24 00 FE 06 24 00
1B300   60 05 38 00 38 00 24 00 FE 06 24 00 60 05 38 00
1B310   9E 00 F2 05 24 00 FE 06 24 00 60 05 38 00 38 00
```

```
1B320   24 00 54 26 9E 00 6C 08 24 00 FE 06 24 00 60 05
1B330   38 00 38 00 26 00 A0 05 10 25 BA 00 9E 00 54 00
1B340   01 00 E7 0F 1D 07 FC 00 24 00 FE 06 24 00 60 05
1B350   38 00 88 00 D2 00 F4 00 03 00 D0 03 24 00 FE 06
1B360   24 00 60 05 38 00 88 00 D2 00 68 02 FC 00 24 00
1B370   F2 05 24 00 60 05 38 00 60 25 AC 00 2E 00 0B 00
1B380   54 00 01 00 E7 0F 1D 07 FC 00 24 00 80 26 B8 09
1B390   AE 00 22 00 24 00 40 26 88 00 D2 00 F2 00 05 00
1B3A0   32 01 C6 00 2E 00 0B 00 54 00 01 00 3B 13 A1 0F
1B3B0   FC 00 24 00 22 00 24 00 4E 27 88 00 D2 00 F2 00
1B3C0   05 00 32 01 2E 00 0F 00 54 00 01 00 59 10 D1 07
1B3D0   2A 00 25 00 24 00 22 00 24 00 92 27 88 00 D2 00
1B3E0   F2 00 05 00 32 01 B4 09 AC 00 2E 00 0B 00 54 00
1B3F0   01 00 EF 0F 45 07 FC 00 F0 01 96 27 E6 01 FC 00
1B400   F2 05 24 00 60 05 38 00 24 00 58 25 9E 00 6C 08
1B410   24 00 60 05 38 00 26 00 A0 05 54 25 BA 00 9E 00
1B420   FC 00 26 00 6C 08 24 00 60 05 38 00 A0 05 B0 00
1B430   80 26 B8 09 AE 00 C6 00 84 00 2E 00 05 00 02 00
1B440   FC 00 F4 00 03 00 F2 00 05 00 D2 01 FC 00 F4 00
1B450   09 00 24 00 60 05 88 00 D2 00 F2 00 07 00 0A 01
1B460   FC 00 DA 03 FC 00 02 00 FC 00 F4 00 09 00 24 00
1B470   60 05 88 00 D2 00 F2 00 07 00 0A 01 1A 07 24 00
1B480   60 05 38 00 24 00 B4 09 9E 00 F2 05 24 00 60 05
1B490   38 00 24 00 6A 0A 9E 00 FC 00 24 00 EC 25 88 00
1B4A0   D2 00 F2 00 07 00 EA 02 24 00 1A 07 24 00 60 05
1B4B0   38 00 2E 00 05 00 02 00 FC 00 F2 05 24 00 60 05
1B4C0   38 00 24 00 50 25 9E 00 68 07 24 00 60 05 38 00
1B4D0   9C 27 9E 00 72 08 24 00 60 05 38 00 26 00 A0 05
1B4E0   52 27 BA 00 9E 00 FC 00 24 00 80 26 1C 25 AC 00
1B4F0   2E 00 0B 00 54 00 01 00 27 11 49 08 FC 00 24 00
1B500   80 26 B8 09 AC 00 2E 00 0B 00 54 00 01 00 C9 11
1B510   AD 08 FC 00 26 00 72 08 24 00 60 05 38 00 A0 05
1B520   B0 00 84 00 2E 00 09 00 02 00 2A 00 0B 00 54 00
1B530   01 00 8B 11 85 08 FC 00 24 00 68 07 24 00 60 05
1B540   38 00 C4 26 AC 00 2E 00 0B 00 54 00 01 00 D3 11
1B550   C1 08 FC 00 C6 03 F2 05 24 00 60 05 38 00 24 00
1B560   A0 27 9E 00 1A 07 24 00 60 05 38 00 24 00 B4 09
1B570   9E 00 FC 00 F2 00 03 00 28 00 68 07 24 00 60 05
1B580   38 00 24 00 38 26 D4 00 EA 02 24 00 1A 07 24 00
1B590   60 05 38 00 2E 00 05 00 02 00 FC 00 1A 07 24 00
1B5A0   60 05 38 00 24 00 B4 09 9E 00 F2 05 24 00 60 05
1B5B0   38 00 24 00 3C 26 9E 00 FC 00 24 00 32 25 88 00
1B5C0   D2 00 F2 00 07 00 EA 02 24 00 1A 07 24 00 60 05
1B5D0   38 00 2E 00 05 00 02 00 FC 00 54 00 01 00 E7 0F
1B5E0   1D 07 FC 00 BC 03 24 00 68 07 24 00 60 05 38 00
1B5F0   9C 27 AC 00 2E 00 0B 00 54 00 01 00 F3 12 75 09
1B600   FC 00 6C 08 24 00 60 05 38 00 24 00 1C 25 9E 00
1B610   FC 00 1A 07 24 00 60 05 38 00 24 00 B4 09 9E 00
1B620   F2 05 24 00 60 05 38 00 24 00 0A 26 9E 00 FC 00
1B630   24 00 38 26 88 00 D2 00 F2 00 07 00 EA 02 24 00
1B640   1A 07 24 00 60 05 38 00 2E 00 05 00 02 00 FC 00
1B650   1A 07 24 00 60 05 38 00 24 00 B4 09 9E 00 F2 05
1B660   24 00 60 05 38 00 24 00 52 27 9E 00 FC 00 F2 00
1B670   03 00 68 07 24 00 60 05 38 00 EA 02 24 00 1A 07
1B680   24 00 60 05 38 00 2E 00 05 00 02 00 FC 00 1A 07
1B690   24 00 60 05 38 00 24 00 B4 09 9E 00 F2 05 24 00
1B6A0   60 05 38 00 24 00 AA 25 9E 00 FC 00 24 00 C0 26
1B6B0   88 00 D2 00 F2 00 07 00 EA 02 24 00 1A 07 24 00
1B6C0   60 05 38 00 2E 00 05 00 02 00 FC 00 26 00 6C 08
1B6D0   24 00 60 05 38 00 1C 25 AC 00 84 00 2E 00 1D 00
1B6E0   6C 08 24 00 60 05 38 00 24 00 32 25 9E 00 54 00
1B6F0   01 00 01 12 E9 08 2A 00 0B 00 54 00 01 00 D3 11
1B700   C1 08 FC 00 1A 07 24 00 60 05 38 00 24 00 B4 09
1B710   9E 00 F2 05 24 00 60 05 38 00 24 00 A4 27 9E 00
1B720   FC 00 24 00 32 25 88 00 D2 00 F2 00 07 00 EA 02
1B730   24 00 1A 07 24 00 60 05 38 00 2E 00 05 00 02 00
```

| | | | | | | | | | | | | | | | | |
|---|---|---|---|---|---|---|---|---|---|---|---|---|---|---|---|---|
| 1B740 | FC | 00 | 54 | 00 | 01 | 00 | C9 | 11 | AD | 08 | FC | 00 | 24 | 00 | 22 | 00 |
| 1B750 | 24 | 00 | 10 | 27 | 88 | 00 | D2 | 00 | F2 | 00 | 05 | 00 | 32 | 01 | 2E | 00 |
| 1B760 | 0B | 00 | 54 | 00 | 01 | 00 | B1 | 14 | DD | 0F | FC | 00 | F4 | 00 | 03 | 00 |
| 1B770 | F4 | 00 | 03 | 00 | 24 | 00 | 32 | 25 | 88 | 00 | 24 | 00 | EC | 05 | 24 | 00 |
| 1B780 | 60 | 05 | 38 | 00 | 8E | 00 | 26 | 09 | 16 | 26 | 68 | 07 | 24 | 00 | 60 | 05 |
| 1B790 | 38 | 00 | 26 | 09 | C2 | 08 | 9E | 00 | 24 | 00 | 26 | 09 | C2 | 08 | DE | 25 |
| 1B7A0 | B4 | 00 | 2E | 00 | 0B | 00 | 54 | 00 | 01 | 00 | FB | 03 | 7D | 01 | FC | 00 |
| 1B7B0 | 24 | 00 | 22 | 00 | 24 | 00 | 14 | 27 | 88 | 00 | D2 | 00 | F2 | 00 | 05 | 00 |
| 1B7C0 | 32 | 01 | 2E | 00 | 19 | 00 | 04 | 07 | 24 | 00 | 60 | 05 | 38 | 00 | 24 | 00 |
| 1B7D0 | 14 | 27 | 9E | 00 | 54 | 00 | 01 | 00 | A7 | 16 | 31 | 11 | FC | 00 | 24 | 00 |
| 1B7E0 | 22 | 00 | 24 | 00 | 40 | 26 | 88 | 00 | D2 | 00 | F2 | 00 | 05 | 00 | 32 | 01 |
| 1B7F0 | 2E | 00 | 71 | 00 | 04 | 07 | 24 | 00 | 60 | 05 | 38 | 00 | 24 | 00 | 40 | 26 |
| 1B800 | 9E | 00 | FE | 06 | 24 | 00 | 60 | 05 | 38 | 00 | 26 | 00 | 28 | 00 | 28 | 00 |
| 1B810 | 68 | 07 | 24 | 00 | 60 | 05 | 38 | 00 | 24 | 00 | 10 | 25 | D4 | 00 | 8E | 00 |
| 1B820 | 9E | 00 | 68 | 07 | 24 | 00 | 60 | 05 | 38 | 00 | 28 | 00 | 68 | 07 | 24 | 00 |
| 1B830 | 60 | 05 | 38 | 00 | 24 | 00 | B8 | 09 | 24 | 00 | 50 | 25 | D6 | 00 | 9E | 00 |
| 1B840 | 84 | 26 | 24 | 00 | FE | 06 | 24 | 00 | 60 | 05 | 38 | 00 | 9E | 00 | 24 | 00 |
| 1B850 | 84 | 26 | 48 | 25 | B0 | 00 | 2E | 00 | 0B | 00 | 54 | 00 | 01 | 00 | AB | 16 |
| 1B860 | 59 | 11 | FC | 00 | 84 | 26 | 24 | 00 | 22 | 00 | 4A | 06 | 24 | 00 | 84 | 26 |
| 1B870 | 1C | 25 | BC | 00 | 88 | 00 | D2 | 00 | A4 | 02 | 9E | 00 | 24 | 00 | 84 | 26 |
| 1B880 | B4 | 09 | AC | 00 | 2E | 00 | 25 | 00 | F4 | 00 | 07 | 00 | 24 | 00 | 60 | 05 |
| 1B890 | 88 | 00 | D2 | 00 | 24 | 00 | 32 | 25 | 88 | 00 | D2 | 00 | 0A | 01 | 54 | 00 |
| 1B8A0 | 01 | 00 | EF | 0F | 45 | 07 | 2A | 00 | 19 | 00 | FE | 06 | 24 | 00 | 60 | 05 |
| 1B8B0 | 38 | 00 | 24 | 00 | 84 | 26 | 9E | 00 | 54 | 00 | 01 | 00 | AB | 16 | 59 | 11 |
| 1B8C0 | FC | 00 | 04 | 07 | 24 | 00 | 60 | 05 | 38 | 00 | 24 | 00 | 10 | 27 | 9E | 00 |
| 1B8D0 | 80 | 26 | 24 | 00 | 10 | 25 | 9E | 00 | 24 | 00 | 7E | 07 | 24 | 00 | 60 | 05 |
| 1B8E0 | 38 | 00 | DE | 25 | B4 | 00 | 2E | 00 | 0B | 00 | 54 | 00 | 01 | 00 | CF | 15 |
| 1B8F0 | 69 | 10 | FC | 00 | F4 | 00 | 07 | 00 | 24 | 00 | 60 | 05 | 88 | 00 | D2 | 00 |
| 1B900 | 24 | 00 | B8 | 09 | 88 | 00 | D2 | 00 | 0A | 01 | 24 | 00 | 1C | 27 | 88 | 00 |
| 1B910 | 3A | 01 | F4 | 00 | 09 | 00 | 24 | 00 | 60 | 05 | 88 | 00 | D2 | 00 | F2 | 00 |
| 1B920 | 07 | 00 | 0A | 01 | FC | 00 | 68 | 07 | 24 | 00 | 60 | 05 | 38 | 00 | 9C | 00 |
| 1B930 | 72 | 08 | 24 | 00 | 60 | 05 | 38 | 00 | 26 | 00 | A0 | 05 | 52 | 27 | BA | 00 |
| 1B940 | 9E | 00 | F2 | 05 | 24 | 00 | 60 | 05 | 38 | 00 | 24 | 00 | A6 | 25 | 9E | 00 |
| 1B950 | FC | 00 | 24 | 00 | 80 | 26 | 1C | 25 | AC | 00 | 2E | 00 | CB | 00 | 54 | 00 |
| 1B960 | 01 | 00 | 97 | 15 | 55 | 10 | FC | 00 | 26 | 00 | 80 | 26 | B8 | 09 | AE | 00 |
| 1B970 | 72 | 08 | 24 | 00 | 60 | 05 | 38 | 00 | A0 | 05 | B0 | 00 | C6 | 00 | 84 | 00 |
| 1B980 | 2E | 00 | 05 | 00 | 02 | 00 | FC | 00 | F4 | 00 | 07 | 00 | 24 | 00 | 60 | 05 |
| 1B990 | 88 | 00 | D2 | 00 | 24 | 00 | 1C | 25 | 88 | 00 | D2 | 00 | 0A | 01 | 54 | 00 |
| 1B9A0 | 01 | 00 | EF | 0F | 45 | 07 | FC | 00 | 24 | 00 | 68 | 07 | 24 | 00 | 60 | 05 |
| 1B9B0 | 38 | 00 | 7E | 07 | 24 | 00 | 60 | 05 | 38 | 00 | AE | 00 | 2E | 00 | 21 | 00 |
| 1B9C0 | F4 | 00 | 07 | 00 | 24 | 00 | 60 | 05 | 88 | 00 | D2 | 00 | 24 | 00 | 1C | 25 |
| 1B9D0 | 88 | 00 | D2 | 00 | 0A | 01 | 54 | 00 | 01 | 00 | EF | 0F | 45 | 07 | FC | 00 |
| 1B9E0 | F2 | 05 | 24 | 00 | 60 | 05 | 38 | 00 | 24 | 00 | A8 | 27 | 9E | 00 | 02 | 00 |
| 1B9F0 | FC | 00 | F4 | 00 | 07 | 00 | 24 | 00 | 60 | 05 | 88 | 00 | D2 | 00 | 24 | 00 |
| 1BA00 | B4 | 09 | 88 | 00 | D2 | 00 | 0A | 01 | 68 | 07 | 24 | 00 | 60 | 05 | 38 | 00 |
| 1BA10 | 9C | 00 | 72 | 08 | 24 | 00 | 60 | 05 | 38 | 00 | 26 | 00 | A0 | 05 | 52 | 27 |
| 1BA20 | BA | 00 | 9E | 00 | F2 | 05 | 24 | 00 | 60 | 05 | 38 | 00 | 24 | 00 | AC | 27 |
| 1BA30 | 9E | 00 | FC | 00 | 24 | 00 | 80 | 26 | 10 | 25 | AE | 00 | 2E | 00 | 23 | 00 |
| 1BA40 | F4 | 00 | 09 | 00 | 24 | 00 | 60 | 05 | 88 | 00 | D2 | 00 | F2 | 00 | 07 | 00 |
| 1BA50 | 0A | 01 | F2 | 05 | 24 | 00 | 60 | 05 | 38 | 00 | 24 | 00 | 86 | 27 | 9E | 00 |
| 1BA60 | FC | 00 | 24 | 00 | 80 | 26 | 1C | 25 | AC | 00 | 2E | 00 | 0B | 00 | 54 | 00 |
| 1BA70 | 01 | 00 | A7 | 16 | 31 | 11 | FC | 00 | 26 | 00 | 80 | 26 | B8 | 07 | AE | 00 |
| 1BA80 | 72 | 08 | 24 | 00 | 60 | 05 | 38 | 00 | A0 | 05 | B0 | 00 | C6 | 00 | 84 | 00 |
| 1BA90 | 2E | 00 | 05 | 00 | 02 | 00 | FC | 00 | F4 | 00 | 07 | 00 | 24 | 00 | 60 | 05 |
| 1BAA0 | 88 | 00 | D2 | 00 | 24 | 00 | 1C | 25 | 88 | 00 | D2 | 00 | 0A | 01 | 54 | 00 |
| 1BAB0 | 01 | 00 | EF | 0F | 45 | 07 | FC | 00 | E0 | 02 | FC | 00 | 24 | 00 | FE | 06 |
| 1BAC0 | 24 | 00 | 60 | 05 | 38 | 00 | B4 | 09 | AC | 00 | FE | 06 | 24 | 00 | 60 | 05 |
| 1BAD0 | 38 | 00 | 90 | 05 | B0 | 00 | C8 | 00 | 22 | 00 | 1E | 01 | B4 | 09 | AC | 00 |
| 1BAE0 | C8 | 00 | 2E | 00 | 21 | 00 | F4 | 00 | 07 | 00 | 24 | 00 | 60 | 05 | 88 | 00 |
| 1BAF0 | D2 | 00 | 24 | 00 | 32 | 25 | 88 | 00 | D2 | 00 | 0A | 01 | 54 | 00 | 01 | 00 |
| 1BB00 | EF | 0F | 45 | 07 | FC | 00 | 24 | 00 | 68 | 07 | 24 | 00 | 60 | 05 | 38 | 00 |
| 1BB10 | DE | 25 | B4 | 00 | 2E | 00 | 0B | 00 | 54 | 00 | 01 | 00 | EF | 0F | 45 | 07 |
| 1BB20 | FC | 00 | 68 | 07 | 24 | 00 | 60 | 05 | 38 | 00 | 24 | 00 | FE | 06 | 24 | 00 |
| 1BB30 | 60 | 05 | 38 | 00 | 88 | 00 | D2 | 00 | 64 | 01 | FC | 00 | 24 | 00 | 74 | 05 |
| 1BB40 | 2E | 00 | 23 | 00 | B0 | 27 | 94 | 00 | 68 | 07 | 24 | 00 | 60 | 05 | 38 | 00 |

```
1BB50   94 00 BA 27 94 00 24 00 FE 06 24 00 60 05 38 00
1BB60   94 00 7A 00 FC 00 20 07 24 00 FE 06 24 00 60 05
1BB70   38 00 38 00 24 00 60 05 9E 00 FC 00 F2 05 24 00
1BB80   60 05 38 00 24 00 6C 25 9E 00 6C 08 24 00 60 05
1BB90   38 00 26 00 A0 05 54 25 BA 00 9E 00 FC 00 24 00
1BBA0   D6 06 24 00 FE 06 24 00 60 05 38 00 38 00 38 26
1BBB0   AC 00 58 00 4F 00 FC 00 26 00 22 00 24 00 E2 06
1BBC0   24 00 FE 06 24 00 60 05 38 00 38 00 1C 25 BA 00
1BBD0   88 00 D2 00 26 03 6C 08 24 00 60 05 38 00 A0 05
1BBE0   B0 00 C6 00 84 00 2E 00 09 00 24 00 32 25 02 00
1BBF0   FC 00 24 00 FE 06 24 00 60 05 38 00 88 00 D2 00
1BC00   50 01 FC 00 5A 00 FC 00 24 00 D6 06 24 00 FE 06
1BC10   24 00 60 05 38 00 38 00 60 25 AC 00 58 00 81 00
1BC20   FC 00 24 00 B8 09 DC 06 24 00 FE 06 24 00 60 05
1BC30   38 00 38 00 BA 00 68 00 D2 00 24 00 E2 06 24 00
1BC40   FE 06 24 00 60 05 38 00 38 00 88 00 D2 00 F4 00
1BC50   01 00 FE 02 24 00 64 25 88 00 D2 00 24 00 E2 06
1BC60   24 00 FE 06 24 00 60 05 38 00 38 00 88 00 D2 00
1BC70   F4 00 01 00 FE 02 FC 00 26 00 24 00 A8 05 30 00
1BC80   32 25 AC 00 6C 08 24 00 60 05 38 00 A0 05 B0 00
1BC90   C6 00 84 00 2E 00 09 00 24 00 32 25 02 00 FC 00
1BCA0   5A 00 FC 00 24 00 D6 06 24 00 FE 06 24 00 60 05
1BCB0   38 00 38 00 58 25 AC 00 58 00 5F 00 FC 00 24 00
1BCC0   22 00 24 00 FE 06 24 00 60 05 38 00 88 00 D2 00
1BCD0   86 02 B4 09 AC 00 2E 00 09 00 24 00 32 25 02 00
1BCE0   FC 00 24 00 22 00 24 00 FE 06 24 00 60 05 38 00
1BCF0   88 00 D2 00 86 02 EC 25 AC 00 74 05 C6 00 2E 00
1BD00   19 00 C8 27 94 00 24 00 FE 06 24 00 60 05 38 00
1BD10   94 00 D4 27 94 00 7A 00 FC 00 5A 00 FC 00 24 00
1BD20   D6 06 24 00 FE 06 24 00 60 05 38 00 38 00 58 25
1BD30   AC 00 22 00 24 00 FE 06 24 00 60 05 38 00 88 00
1BD40   D2 00 86 02 EC 25 AC 00 C6 00 2E 00 19 00 7E 08
1BD50   24 00 60 05 38 00 24 00 B4 09 9E 00 54 00 01 00
1BD60   E9 1A E1 15 FC 00 F4 00 09 00 24 00 60 05 88 00
1BD70   D2 00 F2 00 07 00 0A 01 F4 00 03 00 24 00 60 05
1BD80   88 00 D2 00 24 00 FE 06 24 00 60 05 38 00 88 00
1BD90   D2 00 0A 01 7E 08 24 00 60 05 38 00 26 00 A0 05
1BDA0   9E 00 94 07 24 00 60 05 38 00 22 00 F6 26 9E 00
1BDB0   FC 00 F2 05 24 00 60 05 38 00 24 00 70 25 9E 00
1BDC0   30 03 72 08 24 00 60 05 38 00 26 00 6C 08 24 00
1BDD0   60 05 38 00 64 26 BC 00 9E 00 FC 00 7E 08 24 00
1BDE0   60 05 38 00 26 00 A0 05 9E 00 94 07 24 00 60 05
1BDF0   38 00 22 00 F6 26 9E 00 FC 00 24 00 80 26 B8 09
1BE00   AC 00 2E 00 08 00 54 00 01 00 E9 1A E1 15 FC 00
1BE10   26 00 72 08 24 00 60 05 38 00 A0 05 B4 00 84 00
1BE20   58 00 77 00 FC 00 26 00 6C 08 24 00 60 05 38 00
1BE30   A0 05 B0 00 84 00 2E 00 25 00 24 00 60 05 88 00
1BE40   D2 00 F2 00 05 00 14 01 72 08 24 00 60 05 38 00
1BE50   26 00 A0 05 54 25 BA 00 9E 00 02 00 FC 00 24 00
1BE60   32 25 88 00 58 00 1D 00 52 00 24 00 86 27 88 00
1BE70   5A 01 24 00 60 05 88 00 D2 00 24 00 54 25 88 00
1BE80   D2 00 14 01 5C 00 72 08 24 00 60 05 38 00 26 00
1BE90   A0 05 48 25 BA 00 9E 00 FC 00 5A 00 FC 00 26 00
1BEA0   6C 08 24 00 60 05 38 00 A0 05 B0 00 84 00 2E 00
1BEB0   05 00 02 00 FC 00 26 00 22 00 24 00 8A 27 88 00
1BEC0   D2 00 F2 00 05 00 32 01 22 00 24 00 4C 26 88 00
1BED0   D2 00 F2 00 05 00 32 01 6C 08 24 00 60 05 38 00
1BEE0   B4 05 BA 00 B0 05 BC 00 A0 05 B0 00 C6 00 C8 00
1BEF0   84 00 2E 00 05 00 02 00 FC 00 24 00 FE 06 24 00
1BF00   60 05 38 00 B4 09 AC 00 2E 00 0B 00 54 00 01 00
1BF10   EF 0F 45 07 FC 00 F4 00 05 00 24 00 60 05 88 00
1BF20   D2 00 24 00 FE 06 24 00 60 05 38 00 88 00 D2 00
1BF30   0A 01 F4 00 03 00 24 00 FE 06 24 00 60 05 38 00
1BF40   88 00 D2 00 D2 01 FC 00 24 00 28 00 68 07 24 00
1BF50   60 05 38 00 24 00 B8 09 D4 00 E2 27 AC 00 58 00
```

```
1BF60   61 00 FC 00 F2 05 24 00 FE 06 24 00 60 05 38 00
1BF70   38 00 24 00 EA 27 9E 00 20 07 24 00 FE 06 24 00
1BF80   60 05 38 00 38 00 24 00 FE 06 24 00 60 05 38 00
1BF90   9E 00 FC 00 6C 08 24 00 FE 06 24 00 60 05 38 00
1BFA0   38 00 26 00 A0 05 64 26 BA 00 9E 00 1A 07 24 00
1BFB0   FE 06 24 00 60 05 38 00 38 00 24 00 60 05 9E 00
1BFC0   FC 00 5A 00 FC 00 24 00 28 00 68 07 24 00 60 05
1BFD0   38 00 24 00 B8 09 D4 00 E2 27 AE 00 2E 00 31 00
1BFE0   24 00 DC 06 24 00 FE 06 24 00 60 05 38 00 38 00
1BFF0   88 00 D2 00 24 00 E2 06 24 00 FE 06 24 00 60 05
1C000   38 00 38 00 88 00 D2 00 F4 00 01 00 FE 02 FC 00
1C010   24 00 74 05 2E 00 1F 00 EE 27 94 00 24 00 60 05
1C020   94 00 02 28 94 00 24 00 FE 06 24 00 60 05 38 00
1C030   94 00 7A 00 FC 00 26 00 A0 05 7E 08 24 00 60 05
1C040   38 00 BC 00 48 25 B0 00 22 00 24 00 92 27 88 00
1C050   D2 00 F2 00 05 00 32 01 C8 00 84 00 58 00 1F 00
1C060   FC 00 F0 01 FC 00 28 00 24 00 04 07 24 00 60 05
1C070   38 00 90 00 24 00 32 25 D8 00 E6 01 FC 00 5A 00
1C080   FC 00 54 00 01 00 EF 0F 45 07 FC 00 F4 00 09 00
1C090   24 00 60 05 88 00 D2 00 F2 00 07 00 0A 01 FC 00
1C0A0   F2 05 24 00 60 05 38 00 24 00 36 25 9E 00 1A 07
1C0B0   24 00 60 05 38 00 24 00 B4 09 9E 00 FC 00 24 00
1C0C0   54 25 88 00 D2 00 F2 00 07 00 EA 02 24 00 1A 07
1C0D0   24 00 60 05 38 00 2E 00 05 00 02 00 FC 00 F2 05
1C0E0   24 00 60 05 38 00 24 00 0A 28 9E 00 68 07 24 00
1C0F0   60 05 38 00 9C 27 9E 00 72 08 24 00 60 05 38 00
1C100   26 00 A0 05 52 27 BA 00 9E 00 FC 00 24 00 80 26
1C110   1C 25 AC 00 2E 00 0B 00 54 00 01 00 51 1D 39 18
1C120   FC 00 26 00 80 26 B8 09 AE 00 72 08 24 00 60 05
1C130   38 00 A0 05 B0 00 C6 00 84 00 2E 00 05 00 02 00
1C140   FC 00 F4 00 07 00 24 00 60 05 88 00 D2 00 24 00
1C150   1C 25 88 00 D2 00 0A 01 54 00 01 00 EF 0F 45 07
1C160   FC 00 EC 05 24 00 60 05 38 00 26 00 28 00 68 07
1C170   24 00 60 05 38 00 8E 00 9E 00 F4 00 03 00 F4 00
1C180   03 00 24 00 32 25 88 00 24 00 EC 05 24 00 60 05
1C190   38 00 8E 00 26 09 16 26 F8 06 24 00 60 05 38 00
1C1A0   24 00 26 09 9A 08 9E 00 FC 00 24 00 EC 05 24 00
1C1B0   60 05 38 00 B4 09 B0 00 EC 05 24 00 60 05 38 00
1C1C0   0E 28 B4 00 C6 00 22 00 24 00 14 27 88 00 D2 00
1C1D0   F2 00 05 00 32 01 C6 00 2E 00 0B 00 54 00 01 00
1C1E0   35 1E 89 18 FC 00 F2 05 24 00 60 05 38 00 24 00
1C1F0   64 26 9E 00 1A 07 24 00 60 05 38 00 24 00 B4 09
1C200   9E 00 FC 00 24 00 1C 25 88 00 D2 00 F2 00 07 00
1C210   EA 02 24 00 1A 07 24 00 60 05 38 00 2E 00 09 00
1C220   02 00 2A 00 21 00 F4 00 07 00 24 00 60 05 88 00
1C230   D2 00 24 00 1C 25 88 00 D2 00 0A 01 54 00 01 00
1C240   EF 0F 45 07 FC 00 F2 05 24 00 60 05 38 00 24 00
1C250   EA 27 9E 00 1A 07 24 00 60 05 38 00 24 00 B4 09
1C260   9E 00 F8 03 FC 00 24 00 EC 25 88 00 D2 00 F2 00
1C270   07 00 EA 02 24 00 1A 07 24 00 60 05 38 00 2E 00
1C280   05 00 02 00 FC 00 68 07 24 00 60 05 38 00 9C 27
1C290   9E 00 F2 05 24 00 60 05 38 00 24 00 54 26 9E 00
1C2A0   72 08 24 00 60 05 38 00 26 00 A0 05 52 27 BA 00
1C2B0   9E 00 FC 00 24 00 80 26 1C 25 AC 00 2E 00 0B 00
1C2C0   54 00 01 00 E3 1E 01 19 FC 00 26 00 80 26 B8 09
1C2D0   AE 00 72 08 24 00 60 05 38 00 A0 05 B0 00 C6 00
1C2E0   84 00 2E 00 05 00 02 00 FC 00 54 00 01 00 A5 1F
1C2F0   65 19 FC 00 24 00 28 00 68 07 24 00 60 05 38 00
1C300   24 00 1C 25 D8 00 C4 26 AC 00 2E 00 2D 00 68 07
1C310   24 00 60 05 38 00 28 00 68 07 24 00 60 05 38 00
1C320   24 00 1C 25 24 00 68 07 24 00 60 05 38 00 A0 00
1C330   1C 25 BC 00 D6 00 9E 00 FC 00 1A 07 24 00 60 05
1C340   38 00 24 00 B4 09 9E 00 F2 05 24 00 60 05 38 00
1C350   24 00 12 28 9E 00 FC 00 F2 00 03 00 68 07 24 00
1C360   60 05 38 00 EA 02 24 00 1A 07 24 00 60 05 38 00
1C370   2E 00 05 00 02 00 FC 00 1A 07 24 00 60 05 38 00
```

```
1C380   24 00 B4 09 9E 00 F2 05 24 00 60 05 38 00 24 00
1C390   16 28 9E 00 FC 00 24 00 32 25 88 00 D2 00 F2 00
1C3A0   07 00 EA 02 24 00 1A 07 24 00 60 05 38 00 2E 00
1C3B0   05 00 02 00 FC 00 F4 00 03 00 24 00 32 25 88 00
1C3C0   24 00 EC 05 24 00 60 05 38 00 8E 00 26 09 1A 28
1C3D0   FC 00 26 09 C2 08 68 07 24 00 60 05 38 00 9E 00
1C3E0   F4 00 03 00 24 00 32 25 88 00 24 00 EC 05 24 00
1C3F0   60 05 38 00 8E 00 26 09 22 28 FC 00 54 00 01 00
1C400   EF 0F 45 07 FC 00 24 00 04 07 24 00 60 05 38 00
1C410   48 25 C2 00 1C 25 AC 00 2E 00 29 00 88 26 24 00
1C420   22 00 24 00 2A 28 88 00 D2 00 24 00 B8 09 88 00
1C430   D2 00 24 00 90 05 88 00 D2 00 F4 02 9E 00 2A 00
1C440   25 00 88 26 24 00 22 00 24 00 B4 09 88 00 D2 00
1C450   24 00 B8 09 88 00 D2 00 24 00 90 05 88 00 D2 00
1C460   F4 02 9E 00 FC 00 24 00 88 26 B4 09 AC 00 2E 00
1C470   25 00 F4 00 07 00 24 00 60 05 88 00 D2 00 24 00
1C480   32 25 88 00 D2 00 0A 01 54 00 01 00 EF 0F 45 07
1C490   2A 00 15 00 24 00 60 05 88 00 D2 00 24 00 88 26
1C4A0   88 00 D2 00 28 01 FC 00 94 07 24 00 88 26 38 00
1C4B0   22 00 F6 26 9E 00 FC 00 F4 00 09 00 24 00 60 05
1C4C0   88 00 D2 00 F2 00 07 00 0A 01 FC 00 24 00 04 07
1C4D0   24 00 60 05 38 00 48 25 C2 00 1C 25 AE 00 2E 00
1C4E0   08 00 54 00 01 00 19 22 AD 21 FC 00 1A 07 24 00
1C4F0   60 05 38 00 24 00 B4 09 9E 00 58 00 23 00 1C 00
1C500   12 00 24 00 1A 07 24 00 60 05 38 00 B4 09 AC 00
1C510   3C 00 24 00 10 25 88 00 D2 00 F2 00 07 00 EA 02
1C520   5C 00 FC 00 F4 00 03 00 24 00 60 05 88 00 D2 00
1C530   24 00 88 26 88 00 D2 00 0A 01 1A 07 24 00 60 05
1C540   38 00 24 00 88 26 9E 00 72 08 24 00 60 05 38 00
1C550   26 00 A0 05 9E 00 FC 00 24 00 4C 25 DC 06 24 00
1C560   88 26 38 00 BA 00 88 00 D2 00 24 00 E2 06 24 00
1C570   88 26 38 00 88 00 D2 00 F4 00 01 00 FE 02 FC 00
1C580   6C 08 24 00 60 05 38 00 26 00 A0 05 4C 25 BA 00
1C590   9E 00 24 00 AC 05 4C 25 B4 00 2E 00 15 00 6C 08
1C5A0   24 00 60 05 38 00 26 00 A0 05 AC 05 BA 00 9E 00
1C5B0   FC 00 F2 05 24 00 60 05 38 00 24 00 50 26 9E 00
1C5C0   FC 00 26 00 80 26 B8 09 AE 00 6C 08 24 00 60 05
1C5D0   38 00 A0 05 B0 00 C6 00 84 00 2E 00 05 00 02 00
1C5E0   FC 00 88 26 24 00 1A 07 24 00 60 05 38 00 9E 00
1C5F0   F4 00 05 00 24 00 60 05 88 00 D2 00 24 00 88 26
1C600   88 00 D2 00 0A 01 24 00 DC 06 24 00 88 26 38 00
1C610   88 00 D2 00 24 00 E2 06 24 00 88 26 38 00 88 00
1C620   D2 00 F4 00 01 00 FE 02 FC 00 24 00 74 05 2E 00
1C630   1F 00 2E 28 94 00 24 00 EC 05 24 00 60 05 38 00
1C640   94 00 46 28 94 00 24 00 88 26 94 00 7A 00 FC 00
1C650   20 07 24 00 88 26 38 00 24 00 88 26 9E 00 6C 08
1C660   24 00 88 26 38 00 26 00 A0 05 9E 00 FC 00 72 08
1C670   24 00 88 26 38 00 26 00 A0 05 72 08 24 00 60 05
1C680   38 00 BC 00 9E 00 24 00 80 26 B8 09 AC 00 2E 00
1C690   08 00 54 00 01 00 31 10 6D 07 FC 00 24 00 22 00
1C6A0   24 00 40 27 88 00 D2 00 F2 00 05 00 32 01 2E 00
1C6B0   3F 00 F4 00 03 00 F4 00 03 00 24 00 32 25 88 00
1C6C0   24 00 EC 05 24 00 60 05 38 00 8E 00 26 09 16 26
1C6D0   EC 05 24 00 60 05 38 00 26 00 28 00 26 09 C2 08
1C6E0   8E 00 9E 00 C2 02 54 00 01 00 B5 02 2D 01 FC 00
1C6F0   1A 07 24 00 60 05 38 00 24 00 B4 09 9E 00 F2 05
1C700   24 00 60 05 38 00 24 00 52 28 9E 00 FC 00 24 00
1C710   B8 09 88 00 D2 00 F2 00 07 00 EA 02 24 00 1A 07
1C720   24 00 60 05 38 00 2E 00 05 00 02 00 FC 00 54 00
1C730   01 00 A1 0F 09 07 FC 00 02 00 26 00 28 00 68 07
1C740   00 00 C2 09 00 00 01 00 B4 09 E1 09 00 00 01 00
1C750   B4 09 F4 00 03 00 24 00 0E 00 AC 27 BE 00 88 00
1C760   D2 00 8A 03 24 00 A4 05 24 00 DA 09 1C 25 BA 00
1C770   32 00 FC 00 24 00 BC 09 54 00 05 00 49 00 3D 00
1C780   7B 00 51 00 99 00 65 00 FC 00 24 00 A4 05 24 00
1C790   1C 25 32 00 24 00 A4 05 24 00 0A 00 32 00 24 00
```

| | | | | | | | | | | | | | | | | |
|---|---|---|---|---|---|---|---|---|---|---|---|---|---|---|---|---|
| 1C7A0 | A4 | 05 | 24 | 00 | 56 | 28 | 32 | 00 | 24 | 00 | A4 | 05 | 24 | 00 | 08 | 00 |
| 1C7B0 | 32 | 00 | 54 | 00 | 01 | 00 | AF | 00 | 79 | 00 | FC | 00 | 24 | 00 | A4 | 05 |
| 1C7C0 | 24 | 00 | EC | 25 | 32 | 00 | 24 | 00 | A4 | 05 | 24 | 00 | 08 | 00 | 32 | 00 |
| 1C7D0 | 54 | 00 | 01 | 00 | AF | 00 | 79 | 00 | FC | 00 | 24 | 00 | A4 | 05 | 24 | 00 |
| 1C7E0 | 5C | 25 | 32 | 00 | 24 | 00 | A4 | 05 | 24 | 00 | 08 | 00 | 32 | 00 | FC | 00 |
| 1C7F0 | F4 | 00 | 03 | 00 | 24 | 00 | 0E | 00 | AC | 27 | BE | 00 | 88 | 00 | D2 | 00 |
| 1C800 | 6C | 03 | FC | 00 | 02 | 00 | 88 | 00 | D2 | 00 | 0A | 01 | 54 | 00 | 01 | 00 |
| 1C810 | 00 | 00 | EF | 09 | 00 | 00 | 01 | 00 | B4 | 09 | FF | 09 | 00 | 00 | F4 | 00 |
| 1C820 | 03 | 00 | 24 | 00 | B4 | 09 | 88 | 00 | D2 | 00 | 8A | 03 | 24 | 00 | A4 | 05 |
| 1C830 | 24 | 00 | F8 | 09 | 1C | 25 | BA | 00 | 32 | 00 | FC | 00 | 24 | 00 | E8 | 09 |
| 1C840 | 2E | 00 | 11 | 00 | 24 | 00 | A4 | 05 | 24 | 00 | B4 | 09 | 32 | 00 | 2A | 00 |
| 1C850 | 21 | 00 | 24 | 00 | A4 | 05 | 24 | 00 | 1C | 25 | 32 | 00 | 24 | 00 | A4 | 05 |
| 1C860 | 24 | 00 | 08 | 00 | 32 | 00 | 24 | 00 | A4 | 05 | 24 | 00 | 5A | 28 | 32 | 00 |
| 1C870 | FC | 00 | 24 | 00 | A4 | 05 | 24 | 00 | B4 | 09 | 32 | 00 | 24 | 00 | 24 | 00 |
| 1C880 | A8 | 05 | 30 | 00 | 82 | 00 | F4 | 00 | 03 | 00 | 24 | 00 | B4 | 09 | 88 | 00 |
| 1C890 | D2 | 00 | 6C | 03 | FC | 00 | 02 | 00 | FC | 00 | 26 | 00 | 80 | 26 | B8 | 09 |
| 1C8A0 | 00 | 00 | 16 | 00 | 31 | 00 | 6A | 28 | 94 | 00 | 24 | 00 | 60 | 05 | 94 | 00 |
| 1C8B0 | 24 | 00 | F2 | 05 | 24 | 00 | 60 | 05 | 38 | 00 | 94 | 00 | 24 | 00 | 64 | 00 |
| 1C8C0 | 3C | 00 | 94 | 00 | 24 | 00 | EC | 05 | 24 | 00 | 60 | 05 | 38 | 00 | 94 | 00 |
| 1C8D0 | 7A | 00 | F8 | 00 | FC | 00 | 24 | 00 | F2 | 05 | 24 | 00 | 60 | 05 | 38 | 00 |
| 1C8E0 | 54 | 00 | 49 | 00 | A1 | 01 | 61 | 18 | F1 | 01 | 15 | 17 | 4B | 06 | 19 | 1A |
| 1C8F0 | 89 | 06 | 2D | 1A | CB | 06 | 41 | 1A | 31 | 08 | E1 | 1A | 33 | 09 | 31 | 1B |
| 1C900 | 15 | 0A | A9 | 1B | 7D | 0A | E5 | 1B | EF | 0A | FD | 1C | DF | 0B | 25 | 1D |
| 1C910 | A7 | 0C | 43 | 1D | 5F | 0E | 7F | 1D | 63 | 10 | A9 | 1D | C7 | 10 | B1 | 1D |
| 1C920 | F9 | 10 | D9 | 1D | 5B | 11 | 29 | 1E | B7 | 04 | DD | 19 | 0F | 05 | E7 | 19 |
| 1C930 | 71 | 12 | 55 | 1F | AF | 12 | 69 | 1F | F1 | 12 | 7D | 1F | 73 | 13 | B9 | 1F |
| 1C940 | D9 | 13 | CD | 1F | 4F | 14 | 59 | 20 | 8D | 14 | 81 | 20 | CB | 14 | A9 | 20 |
| 1C950 | 41 | 15 | E5 | 20 | 11 | 17 | 05 | 29 | 41 | 18 | CD | 29 | 6B | 18 | E1 | 2E |
| 1C960 | 0D | 19 | 15 | 37 | 9B | 19 | 8D | 37 | CB | 1A | 81 | 39 | 6D | 1C | D5 | 3A |
| 1C970 | 49 | 1F | 81 | 3E | 8B | 1F | BD | 3E | FC | 00 | 24 | 00 | 22 | 00 | 02 | 04 |
| 1C980 | B4 | 09 | AC | 00 | 2E | 00 | 05 | 00 | 02 | 00 | FC | 00 | 24 | 00 | D6 | 06 |
| 1C990 | 24 | 00 | 60 | 05 | 38 | 00 | 38 | 26 | AC | 00 | 2E | 00 | 2D | 00 | 24 | 00 |
| 1C9A0 | DC | 06 | 24 | 00 | 60 | 05 | 38 | 00 | 4C | 25 | BA | 00 | 88 | 00 | D2 | 00 |
| 1C9B0 | 24 | 00 | E2 | 06 | 24 | 00 | 60 | 05 | 38 | 00 | 88 | 00 | D2 | 00 | F4 | 00 |
| 1C9C0 | 01 | 00 | FE | 02 | 2A | 00 | 29 | 00 | 24 | 00 | DC | 06 | 24 | 00 | 60 | 05 |
| 1C9D0 | 38 | 00 | 38 | 26 | BA | 00 | 88 | 00 | D2 | 00 | 24 | 00 | E2 | 06 | 24 | 00 |
| 1C9E0 | 60 | 05 | 38 | 00 | 88 | 00 | D2 | 00 | F4 | 00 | 01 | 00 | FE | 02 | FC | 00 |
| 1C9F0 | 24 | 00 | 74 | 05 | 2E | 00 | 11 | 00 | 78 | 28 | 94 | 00 | 7C | 00 | 24 | 00 |
| 1CA00 | 60 | 05 | 94 | 00 | 7A | 00 | FC | 00 | 20 | 07 | 24 | 00 | 60 | 05 | 38 | 00 |
| 1CA10 | 24 | 00 | 60 | 05 | 9E | 00 | F2 | 05 | 24 | 00 | 60 | 05 | 38 | 00 | 24 | 00 |
| 1CA20 | 1C | 25 | 9E | 00 | 1A | 07 | 24 | 00 | 60 | 05 | 38 | 00 | 24 | 00 | B4 | 09 |
| 1CA30 | 9E | 00 | EC | 05 | 24 | 00 | 60 | 05 | 38 | 00 | 24 | 00 | 24 | 26 | 9E | 00 |
| 1CA40 | FC | 00 | 24 | 00 | 54 | 25 | 88 | 00 | D2 | 00 | F2 | 00 | 07 | 00 | EA | 02 |
| 1CA50 | 24 | 00 | 1A | 07 | 24 | 00 | 60 | 05 | 38 | 00 | B4 | 09 | B0 | 00 | 2E | 00 |
| 1CA60 | 05 | 00 | 02 | 00 | FC | 00 | 6C | 08 | 24 | 00 | 60 | 05 | 38 | 00 | 26 | 00 |
| 1CA70 | A0 | 05 | 9E | 00 | FC | 00 | F2 | 05 | 24 | 00 | 60 | 05 | 38 | 00 | 24 | 00 |
| 1CA80 | 32 | 25 | 9E | 00 | 68 | 07 | 24 | 00 | 60 | 05 | 38 | 00 | 9C | 27 | 9E | 00 |
| 1CA90 | FC | 00 | 24 | 00 | 60 | 05 | 88 | 00 | D2 | 00 | 50 | 01 | 5E | 28 | 24 | 00 |
| 1CAA0 | 68 | 07 | 24 | 00 | 60 | 05 | 38 | 00 | A0 | 00 | 9E | 00 | FC | 00 | 24 | 00 |
| 1CAB0 | 5E | 28 | 24 | 00 | C0 | 05 | D0 | 00 | B4 | 00 | 58 | 00 | 65 | 00 | FC | 00 |
| 1CAC0 | 26 | 00 | 5E | 28 | B4 | 09 | AC | 00 | 6C | 08 | 24 | 00 | 60 | 05 | 38 | 00 |
| 1CAD0 | A0 | 05 | 52 | 27 | BC | 00 | B4 | 00 | C6 | 00 | 84 | 00 | 2E | 00 | 17 | 00 |
| 1CAE0 | F2 | 05 | 24 | 00 | 60 | 05 | 38 | 00 | 24 | 00 | 6A | 0A | 9E | 00 | 24 | 00 |
| 1CAF0 | 32 | 25 | 02 | 00 | FC | 00 | 26 | 00 | 5E | 28 | B4 | 09 | B0 | 00 | 6C | 08 |
| 1CB00 | 24 | 00 | 60 | 05 | 38 | 00 | A0 | 05 | 54 | 25 | BC | 00 | B4 | 00 | C6 | 00 |
| 1CB10 | 84 | 00 | 2E | 00 | 05 | 00 | 02 | 00 | FC | 00 | 24 | 00 | 32 | 25 | 02 | 00 |
| 1CB20 | FC | 00 | 5A | 00 | FC | 00 | 24 | 00 | 74 | 05 | 2E | 00 | 13 | 00 | 90 | 28 |
| 1CB30 | 94 | 00 | 68 | 07 | 24 | 00 | 60 | 05 | 38 | 00 | 94 | 00 | 7A | 00 | FC | 00 |
| 1CB40 | 7E | 08 | 24 | 00 | 60 | 05 | 38 | 00 | 26 | 00 | A0 | 05 | 9E | 00 | 94 | 07 |
| 1CB50 | 24 | 00 | 60 | 05 | 38 | 00 | 22 | 00 | F6 | 26 | 9E | 00 | FC | 00 | F4 | 00 |
| 1CB60 | 07 | 00 | 24 | 00 | 60 | 05 | 88 | 00 | D2 | 00 | 24 | 00 | B8 | 09 | 88 | 00 |
| 1CB70 | D2 | 00 | 0A | 01 | 24 | 00 | 1C | 27 | 88 | 00 | 5A | 01 | F4 | 00 | 07 | 00 |
| 1CB80 | 24 | 00 | 60 | 05 | 88 | 00 | D2 | 00 | 24 | 00 | 10 | 25 | 88 | 00 | D2 | 00 |
| 1CB90 | 0A | 01 | FC | 00 | 26 | 00 | 28 | 00 | 26 | 00 | 28 | 00 | AA | 07 | 24 | 00 |
| 1CBA0 | 60 | 05 | 38 | 00 | 8E | 00 | 90 | 00 | 68 | 07 | 24 | 00 | 60 | 05 | 38 | 00 |
| 1CBB0 | 8E | 00 | 88 | 00 | 04 | 02 | 24 | 00 | 74 | 05 | 2E | 00 | 15 | 00 | 9C | 28 |

| | | | | | | | | | | | | | | | | |
|---|---|---|---|---|---|---|---|---|---|---|---|---|---|---|---|---|
| 1CBC0 | 94 | 00 | 24 | 00 | EC | 05 | 24 | 00 | 60 | 05 | 38 | 00 | 94 | 00 | 7A | 00 |
| 1CBD0 | FC | 00 | 24 | 00 | EC | 05 | 24 | 00 | 60 | 05 | 38 | 00 | 1C | 25 | B4 | 00 |
| 1CBE0 | EC | 05 | 24 | 00 | 60 | 05 | 38 | 00 | 0C | 27 | B0 | 00 | C8 | 00 | 22 | 00 |
| 1CBF0 | 24 | 00 | 1C | 25 | 88 | 00 | D2 | 00 | F2 | 00 | 05 | 00 | 32 | 01 | C8 | 00 |
| 1CC00 | F8 | 06 | 24 | 00 | 60 | 05 | 38 | 00 | B4 | 09 | AC | 00 | C8 | 00 | 2E | 00 |
| 1CC10 | 0B | 00 | 54 | 00 | 01 | 00 | C7 | 10 | B1 | 1D | FC | 00 | 24 | 00 | 22 | 00 |
| 1CC20 | 24 | 00 | 10 | 27 | 88 | 00 | D2 | 00 | F2 | 00 | 05 | 00 | 32 | 01 | 2E | 00 |
| 1CC30 | 0B | 00 | 54 | 00 | 01 | 00 | 8D | 18 | B1 | 36 | FC | 00 | 24 | 00 | 74 | 05 |
| 1CC40 | 2E | 00 | 19 | 00 | AA | 28 | 94 | 00 | 24 | 00 | 04 | 07 | 24 | 00 | 60 | 05 |
| 1CC50 | 38 | 00 | 48 | 25 | C0 | 00 | 94 | 00 | 7A | 00 | FC | 00 | 24 | 00 | 04 | 07 |
| 1CC60 | 24 | 00 | 60 | 05 | 38 | 00 | 48 | 25 | C2 | 00 | EC | 25 | B0 | 00 | 22 | 00 |
| 1CC70 | 46 | 01 | C6 | 00 | 2E | 00 | 0B | 00 | 54 | 00 | 01 | 00 | 23 | 11 | 15 | 1E |
| 1CC80 | FC | 00 | 24 | 00 | 04 | 07 | 24 | 00 | 60 | 05 | 38 | 00 | 48 | 25 | C2 | 00 |
| 1CC90 | 54 | 00 | 09 | 00 | 0F | 05 | E7 | 19 | CF | 05 | E7 | 19 | 05 | 06 | 05 | 1A |
| 1CCA0 | 05 | 06 | 05 | 1A | 05 | 06 | 05 | 1A | FC | 00 | 24 | 00 | 04 | 07 | 24 | 00 |
| 1CCB0 | 60 | 05 | 38 | 00 | 48 | 25 | C2 | 00 | B4 | 09 | AC | 00 | 2E | 00 | 0B | 00 |
| 1CCC0 | 54 | 00 | 01 | 00 | 0F | 05 | E7 | 19 | FC | 00 | 24 | 00 | 22 | 00 | AA | 01 |
| 1CCD0 | 2E | 00 | 0F | 00 | 54 | 00 | 01 | 00 | 8D | 05 | F1 | 19 | 2A | 00 | 49 | 00 |
| 1CCE0 | 24 | 00 | 04 | 07 | 24 | 00 | 60 | 05 | 38 | 00 | 48 | 25 | C2 | 00 | 32 | 25 |
| 1CCF0 | AE | 00 | 04 | 07 | 24 | 00 | 60 | 05 | 38 | 00 | 48 | 25 | C2 | 00 | 54 | 25 |
| 1CD00 | B4 | 00 | C6 | 00 | 22 | 00 | 24 | 00 | 1C | 27 | 88 | 00 | D2 | 00 | F2 | 00 |
| 1CD10 | 05 | 00 | 32 | 01 | B4 | 09 | AC | 00 | C6 | 00 | 2E | 00 | 0B | 00 | 54 | 00 |
| 1CD20 | 01 | 00 | 6B | 15 | 11 | 27 | FC | 00 | F4 | 00 | 09 | 00 | 24 | 00 | 60 | 05 |
| 1CD30 | 88 | 00 | D2 | 00 | F2 | 00 | 07 | 00 | 0A | 01 | 1A | 07 | 24 | 00 | 60 | 05 |
| 1CD40 | 38 | 00 | 24 | 00 | B4 | 09 | 9E | 00 | F2 | 05 | 24 | 00 | 60 | 05 | 38 | 00 |
| 1CD50 | 24 | 00 | 3C | 26 | 9E | 00 | FC | 00 | 24 | 00 | 3C | 26 | 88 | 00 | D2 | 00 |
| 1CD60 | F2 | 00 | 07 | 00 | EA | 02 | 24 | 00 | 1A | 07 | 24 | 00 | 60 | 05 | 38 | 00 |
| 1CD70 | 2E | 00 | 05 | 00 | 02 | 00 | FC | 00 | 72 | 08 | 24 | 00 | 60 | 05 | 38 | 00 |
| 1CD80 | 26 | 00 | A0 | 05 | 64 | 26 | BA | 00 | 9E | 00 | F4 | 00 | 07 | 00 | 24 | 00 |
| 1CD90 | 60 | 05 | 88 | 00 | D2 | 00 | 24 | 00 | 10 | 25 | 88 | 00 | D2 | 00 | 0A | 01 |
| 1CDA0 | F2 | 05 | 24 | 00 | 60 | 05 | 38 | 00 | 24 | 00 | 0A | 26 | 9E | 00 | FC | 00 |
| 1CDB0 | 24 | 00 | 22 | 00 | AA | 01 | 2E | 00 | 0B | 00 | 54 | 00 | 01 | 00 | 8D | 05 |
| 1CDC0 | F1 | 19 | FC | 00 | 68 | 07 | 24 | 00 | 60 | 05 | 38 | 00 | 9C | 00 | 24 | 00 |
| 1CDD0 | 60 | 05 | 88 | 00 | D2 | 00 | 50 | 01 | 24 | 00 | 68 | 07 | 24 | 00 | 60 | 05 |
| 1CDE0 | 38 | 00 | C4 | 26 | AC | 00 | 2E | 00 | 0B | 00 | 54 | 00 | 01 | 00 | 29 | 04 |
| 1CDF0 | D7 | 19 | FC | 00 | 26 | 00 | 72 | 08 | 24 | 00 | 60 | 05 | 38 | 00 | A0 | 05 |
| 1CE00 | B4 | 00 | 84 | 00 | 2E | 00 | 25 | 00 | F4 | 00 | 07 | 00 | 24 | 00 | 60 | 05 |
| 1CE10 | 88 | 00 | D2 | 00 | 24 | 00 | 32 | 25 | 88 | 00 | D2 | 00 | 0A | 01 | 54 | 00 |
| 1CE20 | 01 | 00 | 23 | 11 | 15 | 1E | 2A | 00 | 05 | 00 | 02 | 00 | FC | 00 | 24 | 00 |
| 1CE30 | 04 | 07 | 24 | 00 | 60 | 05 | 38 | 00 | 48 | 25 | C0 | 00 | 54 | 00 | 17 | 00 |
| 1CE40 | 9F | 07 | 91 | 1A | 9F | 07 | 91 | 1A | 9F | 07 | 91 | 1A | 9F | 07 | 91 | 1A |
| 1CE50 | 9F | 07 | 91 | 1A | 6B | 15 | 11 | 27 | 6B | 15 | 11 | 27 | 6B | 15 | 11 | 27 |
| 1CE60 | 6B | 15 | 11 | 27 | D1 | 0A | E9 | 1C | 9F | 07 | 91 | 1A | D1 | 0A | E9 | 1C |
| 1CE70 | FC | 00 | F4 | 00 | 07 | 00 | 24 | 00 | 60 | 05 | 88 | 00 | D2 | 00 | 24 | 00 |
| 1CE80 | 1C | 25 | 88 | 00 | D2 | 00 | 0A | 01 | 24 | 00 | FE | 06 | 24 | 00 | 60 | 05 |
| 1CE90 | 38 | 00 | 88 | 00 | D2 | 00 | F4 | 00 | 03 | 00 | D0 | 03 | 54 | 00 | 01 | 00 |
| 1CEA0 | 23 | 11 | 15 | 1E | FC | 00 | F4 | 00 | 09 | 00 | 24 | 00 | 60 | 05 | 88 | 00 |
| 1CEB0 | D2 | 00 | F2 | 00 | 07 | 00 | 0A | 01 | F2 | 05 | 24 | 00 | 60 | 05 | 38 | 00 |
| 1CEC0 | 24 | 00 | 10 | 25 | 9E | 00 | 1A | 07 | 24 | 00 | 60 | 05 | 38 | 00 | 24 | 00 |
| 1CED0 | B4 | 09 | 9E | 00 | 24 | 00 | 60 | 05 | 88 | 00 | D2 | 00 | 50 | 01 | 68 | 07 |
| 1CEE0 | 24 | 00 | 60 | 05 | 38 | 00 | 9C | 27 | 9E | 00 | FC | 00 | 24 | 00 | EC | 25 |
| 1CEF0 | 88 | 00 | D2 | 00 | F2 | 00 | 07 | 00 | EA | 02 | 24 | 00 | 1A | 07 | 24 | 00 |
| 1CF00 | 60 | 05 | 38 | 00 | 2E | 00 | 05 | 00 | 02 | 00 | FC | 00 | F2 | 05 | 24 | 00 |
| 1CF10 | 60 | 05 | 38 | 00 | 24 | 00 | B8 | 09 | 9E | 00 | 1A | 07 | 24 | 00 | 60 | 05 |
| 1CF20 | 38 | 00 | 24 | 00 | B4 | 09 | 9E | 00 | FC | 00 | 24 | 00 | 4C | 25 | 88 | 00 |
| 1CF30 | D2 | 00 | F2 | 00 | 07 | 00 | EA | 02 | 24 | 00 | 1A | 07 | 24 | 00 | 60 | 05 |
| 1CF40 | 38 | 00 | 2E | 00 | 05 | 00 | 02 | 00 | FC | 00 | F2 | 05 | 24 | 00 | 60 | 05 |
| 1CF50 | 38 | 00 | 24 | 00 | 54 | 25 | 9E | 00 | 72 | 08 | 24 | 00 | 60 | 05 | 38 | 00 |
| 1CF60 | 26 | 00 | A0 | 05 | 52 | 27 | BA | 00 | 9E | 00 | FC | 00 | 24 | 00 | 60 | 05 |
| 1CF70 | 88 | 00 | D2 | 00 | 50 | 01 | FC | 00 | 24 | 00 | 28 | 00 | 68 | 07 | 24 | 00 |

```
1CF80  60 05 38 00 24 00 1C 25 D8 00 CA 26 AC 00 2E 00
1CF90  31 00 68 07 24 00 60 05 38 00 28 00 68 07 24 00
1CFA0  60 05 38 00 24 00 68 07 24 00 60 05 38 00 A0 00
1CFB0  1C 25 BC 00 D4 00 9E 00 54 00 01 00 39 07 5F 1A
1CFC0  FC 00 26 00 72 08 24 00 60 05 38 00 A0 05 B0 00
1CFD0  84 00 2E 00 05 00 02 00 FC 00 24 00 68 07 24 00
1CFE0  60 05 38 00 A0 00 B8 09 B4 00 2E 00 19 00 68 07
1CFF0  24 00 60 05 38 00 28 00 68 07 24 00 60 05 38 00
1D000  72 26 9E 00 FC 00 F4 00 07 00 24 00 60 05 88 00
1D010  D2 00 24 00 B8 09 88 00 D2 00 0A 01 24 00 BE 25
1D020  88 00 5A 01 F4 00 09 00 24 00 60 05 88 00 D2 00
1D030  F2 00 07 00 0A 01 54 00 01 00 8D 05 F1 19 FC 00
1D040  7E 08 24 00 60 05 38 00 26 00 A0 05 9E 00 94 07
1D050  24 00 60 05 38 00 22 00 F6 26 9E 00 FC 00 26 00
1D060  26 00 28 00 52 07 24 00 60 05 38 00 8E 00 2C 27
1D070  C0 00 D2 00 5C 25 AC 00 84 00 2E 00 19 00 52 07
1D080  24 00 60 05 38 00 22 00 52 07 24 00 60 05 38 00
1D090  4E 03 9E 00 FC 00 1A 07 24 00 60 05 38 00 24 00
1D0A0  B4 09 9E 00 F2 05 24 00 60 05 38 00 24 00 B2 25
1D0B0  9E 00 FC 00 24 00 74 05 2E 00 13 00 B4 28 94 00
1D0C0  52 07 24 00 60 05 38 00 94 00 7A 00 FC 00 02 00
1D0D0  FC 00 F2 00 03 00 58 03 24 00 1A 07 24 00 60 05
1D0E0  38 00 B4 09 B0 00 2E 00 05 00 02 00 FC 00 24 00
1D0F0  22 00 24 00 40 27 88 00 D2 00 F2 00 05 00 32 01
1D100  2E 00 53 00 F4 00 03 00 F4 00 03 00 24 00 32 25
1D110  88 00 24 00 EC 05 24 00 60 05 38 00 8E 00 26 09
1D120  16 26 24 00 FE 06 24 00 60 05 38 00 88 00 D2 00
1D130  F4 00 03 00 D0 03 EC 05 24 00 60 05 38 00 26 00
1D140  28 00 26 09 C2 08 8E 00 9E 00 C2 02 54 00 01 00
1D150  31 03 8D 19 FC 00 24 00 04 07 24 00 60 05 38 00
1D160  48 25 C2 00 54 00 11 00 5D 09 59 1B 5D 09 59 1B
1D170  ED 08 09 1B ED 08 09 1B ED 08 09 1B ED 08 09 1B
1D180  ED 08 09 1B 3D 0B 11 1D 3D 0B 11 1D FC 00 F4 00
1D190  09 00 24 00 60 05 88 00 D2 00 F2 00 07 00 0A 01
1D1A0  FC 00 24 00 FE 06 24 00 60 05 38 00 88 00 D2 00
1D1B0  F4 00 03 00 D0 03 1A 07 24 00 60 05 38 00 24 00
1D1C0  B4 09 9E 00 F2 05 24 00 60 05 38 00 24 00 EC 25
1D1D0  9E 00 FC 00 24 00 32 25 88 00 D2 00 F2 00 07 00
1D1E0  EA 02 24 00 1A 07 24 00 60 05 38 00 2E 00 05 00
1D1F0  02 00 FC 00 54 00 01 00 9D 0A F9 1B FC 00 F4 00
1D200  09 00 24 00 60 05 88 00 D2 00 F2 00 07 00 0A 01
1D210  1A 07 24 00 60 05 38 00 24 00 B4 09 9E 00 FC 00
1D220  58 00 23 00 1C 00 12 00 24 00 1A 07 24 00 60 05
1D230  38 00 B4 09 AC 00 3C 00 24 00 10 25 88 00 D2 00
1D240  F2 00 07 00 EA 02 5C 00 FC 00 F4 00 03 00 24 00
1D250  60 05 88 00 D2 00 24 00 FE 06 24 00 60 05 38 00
1D260  88 00 D2 00 0A 01 FC 00 6C 08 24 00 60 05 38 00
1D270  26 00 A0 05 AC 05 BA 00 9E 00 F2 05 24 00 60 05
1D280  38 00 24 00 4C 25 9E 00 24 00 22 00 24 00 44 27
1D290  88 00 D2 00 F2 00 05 00 32 01 2E 00 19 00 6C 08
1D2A0  24 00 60 05 38 00 26 00 A0 05 AC 05 10 25 BE 00
1D2B0  BA 00 9E 00 FC 00 26 00 6C 08 24 00 60 05 38 00
1D2C0  A0 05 B0 00 84 00 2E 00 05 00 02 00 FC 00 F4 00
1D2D0  05 00 24 00 60 05 88 00 D2 00 24 00 FE 06 24 00
1D2E0  60 05 38 00 88 00 D2 00 0A 01 FC 00 24 00 FE 06
1D2F0  24 00 60 05 38 00 58 00 D2 00 F4 00 03 00 D0 03
1D300  1A 07 24 00 60 05 38 00 24 00 B4 09 9E 00 F2 05
1D310  24 00 60 05 38 00 24 00 5C 25 9E 00 FC 00 24 00
1D320  B8 09 88 00 D2 00 F2 00 07 00 EA 02 24 00 1A 07
1D330  24 00 60 05 38 00 2E 00 05 00 02 00 FC 00 F0 01
1D340  48 27 E6 01 FC 00 24 00 22 00 24 00 4E 27 88 00
1D350  D2 00 F2 00 05 00 32 01 2E 00 0F 00 54 00 01 00
1D360  3D 12 41 1F 2A 00 0B 00 54 00 01 00 8F 11 79 1E
1D370  FC 00 F2 05 24 00 60 05 38 00 24 00 48 25 9E 00
1D380  1A 07 24 00 60 05 38 00 24 00 B4 09 9E 00 FC 00
```

```
1D390   F2 00 03 00 44 03 24 00 1A 07 24 00 60 05 38 00
1D3A0   2E 00 05 00 02 00 FC 00 24 00 74 05 68 05 B4 09
1D3B0   AC 00 C6 00 2E 00 09 00 C6 28 94 00 7A 00 FC 00
1D3C0   24 00 68 05 2E 00 0F 00 54 00 01 00 F3 0C 61 1D
1D3D0   2A 00 08 00 54 00 01 00 77 0C 39 1D FC 00 F4 00
1D3E0   07 00 24 00 FE 06 24 00 60 05 38 00 88 00 D2 00
1D3F0   24 00 10 25 88 00 D2 00 0A 01 6C 08 24 00 60 05
1D400   38 00 26 00 A0 05 CC 05 24 00 1C 25 22 C0 24 00
1D410   48 26 88 00 D2 00 F2 00 05 00 32 01 BA 00 88 00
1D420   BE 00 BA 00 9E 00 F2 05 24 00 60 05 38 00 24 00
1D430   C0 26 9E 00 FC 00 7E 08 24 00 60 05 38 00 9C 00
1D440   94 07 24 00 60 05 38 00 9C 00 FC 00 24 00 22 00
1D450   24 00 5C 25 88 00 D2 00 F2 00 05 00 32 01 2E 00
1D460   1F 00 22 00 7E 07 24 00 60 05 38 00 A0 01 24 00
1D470   FE 06 24 00 60 05 38 00 88 00 D2 00 1C 03 FC 00
1D480   24 00 22 00 24 00 82 27 88 00 D2 00 F2 00 05 00
1D490   32 01 22 00 24 00 5C 25 88 00 D2 00 F2 00 05 00
1D4A0   32 01 B4 09 AC 00 22 00 24 00 FE 06 24 00 60 05
1D4B0   38 00 88 00 D2 00 D6 02 C6 00 C8 00 2E 00 08 00
1D4C0   54 00 01 00 F3 0C 61 1D FC 00 24 00 22 00 24 00
1D4D0   FE 06 24 00 60 05 38 00 88 00 D2 00 72 02 5C 25
1D4E0   AC 00 2E 00 1B 00 24 00 FE 06 24 00 60 05 38 00
1D4F0   88 00 D2 00 68 02 54 00 01 00 F3 0C 61 1D FC 00
1D500   26 00 6C 08 24 00 60 05 38 00 A0 05 B0 00 84 00
1D510   2E 00 05 00 02 00 FC 00 F4 00 09 00 24 00 60 05
1D520   88 00 D2 00 F2 00 07 00 0A 01 F2 05 24 00 60 05
1D530   38 00 24 00 38 26 9E 00 1A 07 24 00 60 05 38 00
1D540   24 00 B4 09 9E 00 FC 00 24 00 48 25 88 00 D2 00
1D550   F2 00 07 00 EA 02 24 00 1A 07 24 00 60 05 38 00
1D560   2E 00 05 00 02 00 FC 00 F4 00 09 00 24 00 FE 06
1D570   24 00 60 05 38 00 88 00 D2 00 F2 00 07 00 0A 01
1D580   7E 08 24 00 60 05 38 00 9C 00 54 00 01 00 7B 10
1D590   AB 1D FC 00 F4 00 09 00 24 00 FE 06 24 00 60 05
1D5A0   38 00 88 00 D2 00 F2 00 07 00 0A 01 F4 00 09 00
1D5B0   24 00 60 05 88 00 D2 00 F2 00 07 00 0A 01 F4 00
1D5C0   03 00 24 00 60 05 88 00 D2 00 24 00 FE 06 24 00
1D5D0   60 05 38 00 88 00 D2 00 0A 01 7E 08 24 00 60 05
1D5E0   38 00 26 00 A0 05 9E 00 94 07 24 00 60 05 38 00
1D5F0   22 00 F6 26 9E 00 24 00 74 05 2E 00 09 00 56 27
1D600   94 00 7A 00 FC 00 58 00 A1 00 FC 00 24 00 04 07
1D610   24 00 60 05 38 00 48 25 C0 00 48 25 AC 00 2E 00
1D620   13 00 24 00 FE 06 24 00 60 05 38 00 88 00 D2 00
1D630   68 02 FC 00 24 00 04 07 24 00 60 05 38 00 48 25
1D640   C0 00 38 26 AC 00 2E 00 17 00 DE 28 24 00 FE 06
1D650   24 00 60 05 38 00 88 00 D2 00 40 02 02 00 FC 00
1D660   24 00 22 00 24 00 48 25 88 00 D2 00 F2 00 05 00
1D670   32 01 2E 00 23 00 22 00 7E 07 24 00 60 05 38 00
1D680   A0 01 24 00 FE 06 24 00 60 05 38 00 88 00 D2 00
1D690   1C 03 2A 00 15 00 E4 28 24 00 FE 06 24 00 60 05
1D6A0   38 00 88 00 D2 00 1C 03 FC 00 5A 00 FC 00 F2 05
1D6B0   24 00 60 05 38 00 24 00 60 25 9E 00 30 03 72 08
1D6C0   24 00 60 05 38 00 26 00 6C 08 24 00 60 05 38 00
1D6D0   64 26 BC 00 9E 00 FC 00 24 00 22 00 24 00 6A 0A
1D6E0   88 00 D2 00 F2 00 05 00 32 01 2E 00 13 00 24 00
1D6F0   FE 06 24 00 60 05 38 00 88 00 D2 00 2C 02 FC 00
1D700   26 00 22 00 24 00 FE 06 24 00 60 05 38 00 88 00
1D710   D2 00 D6 02 78 08 24 00 60 05 38 00 B4 09 AC 00
1D720   C8 00 84 00 58 00 43 00 FC 00 24 00 04 07 24 00
1D730   60 05 38 00 48 25 C2 00 4C 25 AC 00 2E 00 19 00
1D740   78 08 24 00 60 05 38 00 26 00 A0 05 C8 05 BA 00
1D750   9E 00 2A 00 15 00 78 08 24 00 60 05 38 00 26 00
1D760   A0 05 96 05 BA 00 9E 00 FC 00 5A 00 FC 00 26 00
1D770   78 08 24 00 60 05 38 00 A0 05 B4 00 22 00 24 00
1D780   FE 06 24 00 60 05 38 00 88 00 D2 00 72 02 5C 25
1D790   AC 00 C8 00 84 00 2E 00 0B 00 54 00 01 00 27 10
```

```
1D7A0   A7 1D FC 00 26 00 72 08 24 00 60 05 38 00 A0 05
1D7B0   B4 00 84 00 58 00 83 00 FC 00 26 00 6C 08 24 00
1D7C0   60 05 38 00 A0 05 B0 00 84 00 2E 00 2B 00 24 00
1D7D0   FE 06 24 00 60 05 38 00 88 00 D2 00 F2 00 05 00
1D7E0   14 01 72 08 24 00 60 05 38 00 26 00 A0 05 54 25
1D7F0   BA 00 9E 00 02 00 FC 00 24 00 32 25 88 00 58 00
1D800   23 00 52 00 24 00 86 27 88 00 5A 01 24 00 FE 06
1D810   24 00 60 05 38 00 88 00 D2 00 24 00 54 25 88 00
1D820   D2 00 14 01 5C 00 72 08 24 00 60 05 38 00 26 00
1D830   A0 05 48 25 BA 00 9E 00 FC 00 5A 00 FC 00 26 00
1D840   78 08 24 00 60 05 38 00 B8 09 BC 00 A0 05 B4 00
1D850   B4 00 2E 00 17 00 24 00 FE 06 24 00 60 05 38 00
1D860   68 00 D2 00 F2 00 05 00 14 01 FC 00 26 00 6C 08
1D870   24 00 60 05 38 00 A0 05 B0 00 84 00 2E 00 05 00
1D880   02 00 FC 00 26 00 22 00 24 00 8A 27 88 00 D2 00
1D890   F2 00 05 00 32 01 22 00 24 00 4C 26 88 00 D2 00
1D8A0   F2 00 05 00 32 01 6C 08 24 00 60 05 38 00 B4 05
1D8B0   BA 00 B0 05 BC 00 A0 05 B0 00 C6 00 C8 00 84 00
1D8C0   2E 00 05 00 02 00 FC 00 6C 08 24 00 60 05 38 00
1D8D0   26 00 A0 05 32 25 BA 00 9E 00 F2 05 24 00 60 05
1D8E0   38 00 24 00 58 25 9E 00 24 00 74 05 2E 00 15 00
1D8F0   EC 28 94 00 24 00 FE 06 24 00 60 05 38 00 94 00
1D900   7A 00 FC 00 26 00 6C 08 24 00 60 05 38 00 A0 05
1D910   B0 00 84 00 2E 00 05 00 02 00 FC 00 24 00 FE 06
1D920   24 00 60 05 38 00 88 00 D2 00 F4 00 03 00 D0 03
1D930   24 00 FE 06 24 00 60 05 38 00 88 00 D2 00 68 02
1D940   FC 00 F4 00 05 00 24 00 60 05 88 00 D2 00 24 00
1D950   FE 06 24 00 60 05 38 00 88 00 D2 00 0A 01 54 00
1D960   01 00 8F 11 79 1E FC 00 F4 00 09 00 24 00 60 05
1D970   88 00 D2 00 F2 00 07 00 0A 01 FC 00 1A 07 24 00
1D980   60 05 38 00 24 00 B4 09 9E 00 F2 05 24 00 60 05
1D990   38 00 24 00 50 25 9E 00 FC 00 24 00 1C 25 88 00
1D9A0   D2 00 F2 00 07 00 EA 02 24 00 1A 07 24 00 60 05
1D9B0   38 00 2E 00 05 00 02 00 FC 00 54 00 01 00 09 12
1D9C0   DD 1E FC 00 F4 00 07 00 24 00 60 05 88 00 D2 00
1D9D0   24 00 32 25 88 00 D2 00 0A 01 6C 08 24 00 60 05
1D9E0   38 00 26 00 A0 05 54 25 BA 00 9E 00 F2 05 24 00
1D9F0   60 05 38 00 24 00 A0 27 9E 00 FC 00 26 00 6C 08
1DA00   24 00 60 05 38 00 A0 05 B0 00 84 00 2E 00 05 00
1DA10   02 00 FC 00 F4 00 09 00 24 00 60 05 88 00 D2 00
1DA20   F2 00 07 00 0A 01 54 00 01 00 09 12 DD 1E FC 00
1DA30   24 00 F2 05 24 00 60 05 38 00 60 25 AC 00 F2 05
1DA40   24 00 60 05 38 00 58 25 AC 00 C8 00 2E 00 0B 00
1DA50   54 00 01 00 FF 11 B5 1E FC 00 24 00 22 00 24 00
1DA60   4E 27 88 00 D2 00 F2 00 05 00 32 01 2E 00 0F 00
1DA70   54 00 01 00 3D 12 41 1F 2A 00 25 00 24 00 22 00
1DA80   24 00 92 27 88 00 D2 00 F2 00 05 00 32 01 B4 09
1DA90   AC 00 2E 00 0B 00 54 00 01 00 09 12 DD 1E FC 00
1DAA0   F0 01 FC 00 96 27 E6 01 FC 00 F4 00 03 00 F2 00
1DAB0   05 00 D2 01 FC 00 24 00 DC 06 24 00 60 05 38 00
1DAC0   88 00 D2 00 24 00 E2 06 24 00 60 05 38 00 88 00
1DAD0   D2 00 F4 00 01 00 FE 02 FC 00 02 00 FC 00 1A 07
1DAE0   24 00 60 05 38 00 24 00 B4 09 9E 00 F2 05 24 00
1DAF0   60 05 38 00 24 00 52 27 9E 00 24 00 60 05 88 00
1DB00   D2 00 50 01 68 07 24 00 60 05 38 00 9C 27 9E 00
1DB10   FC 00 24 00 EC 25 88 00 D2 00 F2 00 07 00 EA 02
1DB20   24 00 1A 07 24 00 60 05 38 00 2E 00 05 00 02 00
1DB30   FC 00 1A 07 24 00 60 05 38 00 24 00 B4 09 9E 00
1DB40   F2 05 24 00 60 05 38 00 24 00 AA 25 9E 00 FC 00
1DB50   24 00 4C 25 88 00 D2 00 F2 00 07 00 EA 02 24 00
1DB60   1A 07 24 00 60 05 38 00 2E 00 05 00 02 00 FC 00
1DB70   F2 05 24 00 60 05 38 00 24 00 A4 27 9E 00 72 08
1DB80   24 00 60 05 38 00 26 00 A0 05 52 27 BA 00 9E 00
1DB90   FC 00 24 00 60 05 88 00 D2 00 50 01 FC 00 24 00
1DBA0   28 00 68 07 24 00 60 05 38 00 24 00 1C 25 D8 00
```

| | | | | | | | | | | | | | | | | |
|---|---|---|---|---|---|---|---|---|---|---|---|---|---|---|---|---|
| 1DBB0 | CA | 26 | AC | 00 | 2E | 00 | 0B | 00 | 54 | 00 | 01 | 00 | 39 | 13 | 9B | 1F |
| 1DBC0 | FC | 00 | 26 | 00 | 72 | 08 | 24 | 00 | 60 | 05 | 38 | 00 | A0 | 05 | B0 | 00 |
| 1DBD0 | 84 | 00 | 2E | 00 | 05 | 00 | 02 | 00 | FC | 00 | 24 | 00 | 68 | 07 | 24 | 00 |
| 1DBE0 | 60 | 05 | 38 | 00 | A0 | 00 | 32 | 25 | B4 | 00 | 2E | 00 | 0B | 00 | 54 | 00 |
| 1DBF0 | 01 | 00 | 09 | 12 | DD | 1E | FC | 00 | 24 | 00 | 68 | 07 | 24 | 00 | 60 | 05 |
| 1DC00 | 38 | 00 | 04 | 29 | AC | 00 | 2E | 00 | 0B | 00 | 54 | 00 | 01 | 00 | 03 | 14 |
| 1DC10 | 09 | 20 | FC | 00 | C6 | 03 | 1A | 07 | 24 | 00 | 60 | 05 | 38 | 00 | 24 | 00 |
| 1DC20 | B4 | 09 | 9E | 00 | F2 | 05 | 24 | 00 | 60 | 05 | 38 | 00 | 24 | 00 | A6 | 25 |
| 1DC30 | 9E | 00 | FC | 00 | F2 | 00 | 03 | 00 | 28 | 00 | 68 | 07 | 24 | 00 | 60 | 05 |
| 1DC40 | 38 | 00 | 24 | 00 | 38 | 26 | D4 | 00 | EA | 02 | 24 | 00 | 1A | 07 | 24 | 00 |
| 1DC50 | 60 | 05 | 38 | 00 | 2E | 00 | 05 | 00 | 02 | 00 | FC | 00 | 1A | 07 | 24 | 00 |
| 1DC60 | 60 | 05 | 38 | 00 | 24 | 00 | B4 | 09 | 9E | 00 | F2 | 05 | 24 | 00 | 60 | 05 |
| 1DC70 | 38 | 00 | 24 | 00 | AC | 27 | 9E | 00 | FC | 00 | 24 | 00 | 32 | 25 | 88 | 00 |
| 1DC80 | D2 | 00 | F2 | 00 | 07 | 00 | EA | 02 | 24 | 00 | 1A | 07 | 24 | 00 | 60 | 05 |
| 1DC90 | 38 | 00 | 2E | 00 | 05 | 00 | 02 | 00 | FC | 00 | 54 | 00 | 01 | 00 | 09 | 12 |
| 1DCA0 | DD | 1E | FC | 00 | BC | 03 | 24 | 00 | 68 | 07 | 24 | 00 | 60 | 05 | 38 | 00 |
| 1DCB0 | 9C | 27 | AC | 00 | 2E | 00 | 0B | 00 | 54 | 00 | 01 | 00 | 23 | 15 | D1 | 20 |
| 1DCC0 | FC | 00 | 6C | 08 | 24 | 00 | 60 | 05 | 38 | 00 | 24 | 00 | 1C | 25 | 9E | 00 |
| 1DCD0 | FC | 00 | 1A | 07 | 24 | 00 | 60 | 05 | 38 | 00 | 24 | 00 | B4 | 09 | 9E | 00 |
| 1DCE0 | F2 | 05 | 24 | 00 | 60 | 05 | 38 | 00 | 24 | 00 | 86 | 27 | 9E | 00 | FC | 00 |
| 1DCF0 | 24 | 00 | 38 | 26 | 88 | 00 | D2 | 00 | F2 | 00 | 07 | 00 | EA | 02 | 24 | 00 |
| 1DD00 | 1A | 07 | 24 | 00 | 60 | 05 | 38 | 00 | 2E | 00 | 05 | 00 | 02 | 00 | FC | 00 |
| 1DD10 | 1A | 07 | 24 | 00 | 60 | 05 | 38 | 00 | 24 | 00 | B4 | 09 | 9E | 00 | F2 | 05 |
| 1DD20 | 24 | 00 | 60 | 05 | 38 | 00 | 24 | 00 | 6C | 25 | 9E | 00 | FC | 00 | F2 | 00 |
| 1DD30 | 03 | 00 | 68 | 07 | 24 | 00 | 60 | 05 | 38 | 00 | EA | 02 | 24 | 00 | 1A | 07 |
| 1DD40 | 24 | 00 | 60 | 05 | 38 | 00 | 2E | 00 | 05 | 00 | 02 | 00 | FC | 00 | 1A | 07 |
| 1DD50 | 24 | 00 | 60 | 05 | 38 | 00 | 24 | 00 | B4 | 09 | 9E | 00 | F2 | 05 | 24 | 00 |
| 1DD60 | 60 | 05 | 38 | 00 | 24 | 00 | 70 | 25 | 9E | 00 | FC | 00 | 24 | 00 | C0 | 26 |
| 1DD70 | 88 | 00 | D2 | 00 | F2 | 00 | 07 | 00 | EA | 02 | 24 | 00 | 1A | 07 | 24 | 00 |
| 1DD80 | 60 | 05 | 38 | 00 | 2E | 00 | 05 | 00 | 02 | 00 | FC | 00 | 26 | 00 | 6C | 08 |
| 1DD90 | 24 | 00 | 60 | 05 | 38 | 00 | 1C | 25 | AC | 00 | 84 | 00 | 2E | 00 | 1D | 00 |
| 1DDA0 | 6C | 08 | 24 | 00 | 60 | 05 | 38 | 00 | 24 | 00 | 32 | 25 | 9E | 00 | 54 | 00 |
| 1DDB0 | 01 | 00 | 31 | 14 | 45 | 20 | 2A | 00 | 0B | 00 | 54 | 00 | 01 | 00 | 03 | 14 |
| 1DDC0 | 09 | 20 | FC | 00 | 1A | 07 | 24 | 00 | 60 | 05 | 38 | 00 | 24 | 00 | B4 | 09 |
| 1DDD0 | 9E | 00 | F2 | 05 | 24 | 00 | 60 | 05 | 38 | 00 | 24 | 00 | 36 | 25 | 9E | 00 |
| 1DDE0 | FC | 00 | 24 | 00 | 32 | 25 | 88 | 00 | D2 | 00 | F2 | 00 | 07 | 00 | EA | 02 |
| 1DDF0 | 24 | 00 | 1A | 07 | 24 | 00 | 60 | 05 | 38 | 00 | 2E | 00 | 05 | 00 | 02 | 00 |
| 1DE00 | FC | 00 | 54 | 00 | 01 | 00 | 09 | 12 | D0 | 1E | FC | 00 | 24 | 00 | 04 | 07 |
| 1DE10 | 24 | 00 | 60 | 05 | 38 | 00 | 48 | 25 | C2 | 00 | 1C | 25 | AC | 00 | 2E | 00 |
| 1DE20 | 29 | 00 | 62 | 28 | 24 | 00 | 22 | 00 | 24 | 00 | 2A | 28 | 88 | 00 | D2 | 00 |
| 1DE30 | 24 | 00 | B8 | 09 | 88 | 00 | D2 | 00 | 24 | 00 | 90 | 05 | 88 | 00 | D2 | 00 |
| 1DE40 | F4 | 02 | 9E | 00 | 2A | 00 | 25 | 00 | 62 | 28 | 24 | 00 | 22 | 00 | 24 | 00 |
| 1DE50 | 84 | 09 | 88 | 00 | D2 | 00 | 24 | 00 | B8 | 09 | 88 | 00 | D2 | 00 | 24 | 00 |
| 1DE60 | 90 | 05 | 88 | 00 | D2 | 00 | F4 | 02 | 9E | 00 | FC | 00 | 24 | 00 | 62 | 28 |
| 1DE70 | B4 | 09 | AC | 00 | 2E | 00 | 0F | 00 | 54 | 00 | 01 | 00 | 23 | 11 | 15 | 1E |
| 1DE80 | 2A | 00 | 15 | 00 | 24 | 00 | 60 | 05 | 88 | 00 | D2 | 00 | 24 | 00 | 62 | 28 |
| 1DE90 | 88 | 00 | D2 | 00 | 28 | 01 | FC | 00 | 94 | 07 | 24 | 00 | 62 | 28 | 38 | 00 |
| 1DEA0 | 22 | 00 | F6 | 26 | 9E | 00 | FC | 00 | F4 | 00 | 09 | 00 | 24 | 00 | 60 | 05 |
| 1DEB0 | 88 | 00 | D2 | 00 | F2 | 00 | 07 | 00 | 0A | 01 | FC | 00 | 24 | 00 | 04 | 07 |
| 1DEC0 | 24 | 00 | 60 | 05 | 38 | 00 | 48 | 25 | C2 | 00 | 1C | 25 | AE | 00 | 2E | 00 |
| 1DED0 | 0B | 00 | 54 | 00 | 01 | 00 | 71 | 17 | 7D | 29 | FC | 00 | 1A | 07 | 24 | 00 |
| 1DEE0 | 60 | 05 | 38 | 00 | 24 | 00 | B4 | 09 | 9E | 00 | 58 | 00 | 23 | 00 | 1C | 00 |
| 1DEF0 | 12 | 00 | 24 | 00 | 1A | 07 | 24 | 00 | 60 | 05 | 38 | 00 | B4 | 09 | AC | 00 |
| 1DF00 | 3C | 00 | 24 | 00 | 10 | 25 | 88 | 00 | D2 | 00 | F2 | 00 | 07 | 00 | EA | 02 |
| 1DF10 | 5C | 00 | FC | 00 | F4 | 00 | 03 | 00 | 24 | 00 | 60 | 05 | 88 | 00 | D2 | 00 |
| 1DF20 | 24 | 00 | 62 | 28 | 88 | 00 | D2 | 00 | 0A | 01 | 1A | 07 | 24 | 00 | 60 | 05 |
| 1DF30 | 38 | 00 | 24 | 00 | 62 | 28 | 9E | 00 | 72 | 08 | 24 | 00 | 60 | 05 | 38 | 00 |
| 1DF40 | 26 | 00 | A0 | 05 | 9E | 00 | FC | 00 | 24 | 00 | 4C | 25 | DC | 06 | 24 | 00 |
| 1DF50 | 62 | 28 | 38 | 00 | BA | 00 | 88 | 00 | D2 | 00 | 24 | 00 | E2 | 06 | 24 | 00 |
| 1DF60 | 62 | 28 | 38 | 00 | 88 | 00 | D2 | 00 | F4 | 00 | 01 | 00 | FE | 02 | FC | 00 |
| 1DF70 | 6C | 08 | 24 | 00 | 60 | 05 | 38 | 00 | 26 | 00 | A0 | 05 | 4C | 25 | BA | 00 |
| 1DF80 | 9E | 00 | 24 | 00 | AC | 05 | 4C | 25 | B4 | 00 | 2E | 00 | 15 | 00 | 6C | 08 |
| 1DF90 | 24 | 00 | 60 | 05 | 38 | 00 | 26 | 00 | A0 | 05 | AC | 05 | BA | 00 | 9E | 00 |
| 1DFA0 | FC | 00 | F2 | 05 | 24 | 00 | 60 | 05 | 38 | 00 | 24 | 00 | 0A | 28 | 9E | 00 |
| 1DFB0 | FC | 00 | 26 | 00 | 6C | 08 | 24 | 00 | 60 | 05 | 38 | 00 | A0 | 05 | B0 | 00 |

```
1DFC0   84 00 2E 00 05 00 02 00 FC 00 62 28 24 00 1A 07
1DFD0   24 00 60 05 38 00 9E 00 F4 00 05 00 24 00 60 05
1DFE0   88 00 D2 00 24 00 62 28 88 00 D2 00 0A 01 24 00
1DFF0   DC 06 24 00 62 28 38 00 88 00 D2 00 24 00 E2 06
1E000   24 00 62 28 38 00 88 00 D2 00 F4 00 01 00 FE 02
1E010   FC 00 24 00 74 05 2E 00 1F 00 2E 28 94 00 24 00
1E020   EC 05 24 00 60 05 38 00 94 00 46 28 94 00 24 00
1E030   62 28 94 00 7A 00 FC 00 20 07 24 00 62 28 38 00
1E040   24 00 62 28 9E 00 6C 08 24 00 62 28 38 00 26 00
1E050   A0 05 9E 00 FC 00 24 00 22 00 24 00 40 27 88 00
1E060   D2 00 F2 00 05 00 32 01 2E 00 3F 00 F4 00 03 00
1E070   F4 00 03 00 24 00 32 25 88 00 24 00 EC 05 24 00
1E080   60 05 38 00 8E 00 26 09 16 26 EC 05 24 00 60 05
1E090   38 00 26 00 28 00 26 09 C2 08 8E 00 9E 00 C2 02
1E0A0   54 00 01 00 31 03 8D 19 FC 00 72 08 24 00 62 28
1E0B0   38 00 26 00 A0 05 72 08 24 00 60 05 38 00 BC 00
1E0C0   9E 00 FC 00 1A 07 24 00 60 05 38 00 24 00 B4 09
1E0D0   9E 00 F2 05 24 00 60 05 38 00 24 00 64 26 9E 00
1E0E0   FC 00 24 00 B8 09 88 00 D2 00 F2 00 07 00 EA 02
1E0F0   24 00 1A 07 24 00 60 05 38 00 2E 00 05 00 02 00
1E100   FC 00 54 00 01 00 09 12 DD 1E FC 00 26 00 6C 08
1E110   24 00 60 05 38 00 A0 05 B0 00 84 00 2E 00 05 00
1E120   02 00 FC 00 54 00 01 00 09 12 DD 1E FC 00 04 07
1E130   24 00 60 05 38 00 24 00 10 27 9E 00 FC 00 24 00
1E140   7E 07 24 00 60 05 38 00 DE 25 B4 00 2E 00 0B 00
1E150   54 00 01 00 57 19 79 37 FC 00 F4 00 09 00 24 00
1E160   60 05 88 00 D2 00 F2 00 07 00 0A 01 FC 00 72 08
1E170   24 00 60 05 38 00 26 00 A0 05 52 27 BA 00 9E 00
1E180   68 07 24 00 60 05 38 00 9C 27 9E 00 F2 05 24 00
1E190   60 05 38 00 24 00 54 26 9E 00 6C 08 24 00 60 05
1E1A0   38 00 26 00 A0 05 48 25 BA 00 9E 00 FC 00 24 00
1E1B0   60 05 88 00 D2 00 50 01 FC 00 26 00 6C 08 24 00
1E1C0   60 05 38 00 A0 05 54 25 BC 00 B0 00 84 00 2E 00
1E1D0   05 00 02 00 FC 00 24 00 68 07 24 00 60 05 38 00
1E1E0   7E 07 24 00 60 05 38 00 AE 00 2E 00 0B 00 54 00
1E1F0   01 00 C7 10 B1 1D FC 00 F4 00 07 00 24 00 60 05
1E200   88 00 D2 00 24 00 B4 09 88 00 D2 00 0A 01 68 07
1E210   24 00 60 05 38 00 9C 27 9E 00 F2 05 24 00 60 05
1E220   38 00 24 00 12 28 9E 00 6C 08 24 00 60 05 38 00
1E230   26 00 A0 05 6A 0A BA 00 9E 00 FC 00 24 00 60 05
1E240   88 00 D2 00 50 01 FC 00 24 00 68 07 24 00 60 05
1E250   38 00 9C 27 B0 00 2E 00 15 00 F4 00 09 00 24 00
1E260   60 05 88 00 D2 00 F2 00 07 00 0A 01 FC 00 26 00
1E270   6C 08 24 00 60 05 38 00 A0 05 54 25 BC 00 B0 00
1E280   84 00 2E 00 05 00 02 00 FC 00 E0 02 FC 00 24 00
1E290   FE 06 24 00 60 05 38 00 B4 09 AC 00 FE 06 24 00
1E2A0   60 05 38 00 90 05 B0 00 C8 00 22 00 1E 01 B4 09
1E2B0   AC 00 C8 00 2E 00 08 00 54 00 01 00 23 11 15 1E
1E2C0   FC 00 24 00 68 07 24 00 60 05 38 00 DE 25 B4 00
1E2D0   2E 00 0B 00 54 00 01 00 23 11 15 1E FC 00 68 07
1E2E0   24 00 60 05 38 00 24 00 FE 06 24 00 60 05 38 00
1E2F0   88 00 D2 00 64 01 52 07 24 00 60 05 38 00 68 07
1E300   24 00 60 05 38 00 9E 00 FC 00 24 00 74 05 2E 00
1E310   23 00 B0 27 94 00 68 07 24 00 60 05 38 00 94 00
1E320   BA 27 94 00 24 00 FE 06 24 00 60 05 38 00 94 00
1E330   7A 00 FC 00 20 07 24 00 FE 06 24 00 60 05 38 00
1E340   38 00 24 00 60 05 9E 00 FC 00 F2 05 24 00 60 05
1E350   38 00 24 00 16 28 9E 00 6C 08 24 00 60 05 38 00
1E360   26 00 A0 05 54 25 BA 00 9E 00 FC 00 24 00 D6 06
1E370   24 00 FE 06 24 00 60 05 38 00 38 00 38 26 AC 00
1E380   58 00 4F 00 FC 00 26 00 22 00 24 00 E2 06 24 00
1E390   FE 06 24 00 60 05 38 00 38 00 1C 25 BA 00 88 00
1E3A0   D2 00 26 03 6C 08 24 00 60 05 38 00 A0 05 B0 00
1E3B0   C6 00 84 00 2E 00 09 00 24 00 32 25 02 00 FC 00
1E3C0   24 00 FE 06 24 00 60 05 38 00 88 00 D2 00 50 01
```

```
1E3D0   FC 00 5A 00 FC 00 24 00 D6 06 24 00 FE 06 24 00
1E3E0   60 05 38 00 38 00 60 25 AC 00 58 00 81 00 FC 00
1E3F0   24 00 B8 09 DC 06 24 00 FE 06 24 00 60 05 38 00
1E400   38 00 BA 00 88 00 D2 00 24 00 E2 06 24 00 FE 06
1E410   24 00 60 05 38 00 38 00 88 00 D2 00 F4 00 01 00
1E420   FE 02 24 00 64 25 88 00 D2 00 24 00 E2 06 24 00
1E430   FE 06 24 00 60 05 38 00 38 00 88 00 D2 00 F4 00
1E440   01 00 FE 02 FC 00 26 00 24 00 A8 05 30 00 32 25
1E450   AC 00 6C 08 24 00 60 05 38 00 A0 05 B0 00 C6 00
1E460   84 00 2E 00 09 00 24 00 32 25 02 00 FC 00 5A 00
1E470   FC 00 24 00 60 05 88 00 D2 00 50 01 68 07 24 00
1E480   60 05 38 00 9C 27 9E 00 FC 00 F4 00 03 00 24 00
1E490   60 05 88 00 D2 00 24 00 FE 06 24 00 60 05 38 00
1E4A0   88 00 D2 00 0A 01 FC 00 30 03 72 08 24 00 60 05
1E4B0   38 00 26 00 6C 08 24 00 60 05 38 00 64 26 BC 00
1E4C0   9E 00 78 08 24 00 60 05 38 00 26 00 A0 05 0A 29
1E4D0   BA 00 9E 00 F2 05 24 00 60 05 38 00 24 00 50 26
1E4E0   9E 00 FC 00 7E 08 24 00 60 05 38 00 26 00 A0 05
1E4F0   9E 00 94 07 24 00 60 05 38 00 22 00 F6 26 7E 00
1E500   68 07 24 00 60 05 38 00 9C 27 9E 00 FC 00 26 00
1E510   78 08 24 00 60 05 38 00 A0 05 B4 00 84 00 2E 00
1E520   0B 00 54 00 01 00 57 1E 29 3C FC 00 26 00 72 08
1E530   24 00 60 05 38 00 A0 05 B4 00 84 00 58 00 6F 00
1E540   FC 00 26 00 6C 08 24 00 60 05 38 00 A0 05 B0 00
1E550   84 00 2E 00 25 00 24 00 60 05 88 00 D2 00 F2 00
1E560   05 00 14 01 72 03 24 00 60 05 38 00 26 00 A0 05
1E570   54 25 BA 00 9E 00 02 00 FC 00 24 00 32 25 88 00
1E580   58 00 15 00 52 00 24 00 60 05 88 00 D2 00 24 00
1E590   54 25 88 00 D2 00 14 01 5C 00 72 08 24 00 60 05
1E5A0   38 00 26 00 A0 05 48 25 BA 00 9E 00 FC 00 5A 00
1E5B0   FC 00 68 07 24 00 60 05 38 00 9C 27 9E 00 FC 00
1E5C0   6C 08 24 00 60 05 38 00 6C 08 24 00 FE 06 24 00
1E5D0   60 05 38 00 38 00 0E 29 24 00 60 05 88 00 D2 00
1E5E0   50 01 6C 08 24 00 60 05 38 00 6C 08 24 00 FE 06
1E5F0   24 00 60 05 38 00 38 00 0E 29 FC 00 24 00 FE 06
1E600   24 00 60 05 38 00 88 00 D2 00 50 01 FC 00 24 00
1E610   68 07 24 00 60 05 38 00 CA 26 AC 00 2E 00 0B 00
1E620   54 00 01 00 57 1E 29 3C FC 00 24 00 68 07 24 00
1E630   60 05 38 00 C4 26 AC 00 2E 00 15 00 78 08 24 00
1E640   60 05 38 00 26 00 A0 05 0A 29 BA 00 9E 00 FC 00
1E650   26 00 78 08 24 00 60 05 38 00 A0 05 64 26 BA 00
1E660   AC 00 84 00 58 00 33 00 FC 00 24 00 10 25 88 00
1E670   58 00 11 00 52 00 24 00 60 05 88 00 D2 00 F2 00
1E680   05 00 14 01 5C 00 78 08 24 00 60 05 38 00 26 00
1E690   A0 05 0A 28 BA 00 9E 00 FC 00 5A 00 26 00 6C 08
1E6A0   24 00 60 05 38 00 A0 05 B0 00 84 00 2E 00 05 00
1E6B0   02 00 FC 00 26 00 22 00 24 00 8A 27 88 00 D2 00
1E6C0   F2 00 05 00 32 01 22 00 24 00 4C 26 88 00 D2 00
1E6D0   F2 00 05 00 32 01 6C 08 24 00 60 05 38 00 B4 05
1E6E0   BA 00 B0 05 BC 00 A0 05 B0 00 C6 00 C8 00 84 00
1E6F0   2E 00 05 00 02 00 FC 00 F4 00 05 00 24 00 60 05
1E700   88 00 D2 00 24 00 FE 06 24 00 60 05 38 00 88 00
1E710   D2 00 0A 01 F4 00 03 00 24 00 FE 06 24 00 60 05
1E720   38 00 88 00 D2 00 D2 01 FC 00 24 00 DC 06 24 00
1E730   FE 06 24 00 60 05 38 00 38 00 88 00 D2 00 24 00
1E740   E2 06 24 00 FE 06 24 00 60 05 38 00 38 00 88 00
1E750   D2 00 F4 00 01 00 FE 02 FC 00 24 00 74 05 2E 00
1E760   1F 00 EE 27 94 00 24 00 60 05 94 00 02 28 94 00
1E770   24 00 FE 06 24 00 60 05 38 00 94 00 7A 00 FC 00
1E780   26 00 A0 05 7E 08 24 00 60 05 38 00 BC 00 48 25
1E790   B0 00 22 00 24 00 92 27 88 00 D2 00 F2 00 05 00
1E7A0   32 01 C8 00 84 00 58 00 33 00 FC 00 68 07 24 00
1E7B0   60 05 38 00 52 07 24 00 60 05 38 00 9E 00 FC 00
1E7C0   F0 01 FC 00 28 00 24 00 04 07 24 00 60 05 38 00
```

```
1E7D0   90 00 24 00 32 25 D8 00 E6 01 FC 00 5A 00 FC 00
1E7E0   54 00 01 00 09 12 DD 1E FC 00 68 07 24 00 60 05
1E7F0   38 00 16 29 9E 00 68 07 24 00 60 05 38 00 24 00
1E800   60 05 88 00 D2 00 64 01 FC 00 6C 08 24 00 60 05
1E810   38 00 26 00 A0 05 32 25 BA 00 9E 00 F2 05 24 00
1E820   60 05 38 00 24 00 A8 27 9E 00 FC 00 26 00 6C 08
1E830   24 00 60 05 38 00 A0 05 B0 00 84 00 2E 00 05 00
1E840   02 00 FC 00 54 00 01 00 09 12 DD 1E FC 00 02 00
1E850   00 00 16 00 07 00 02 00 F8 00 FC 00 F2 00 03 00
1E860   2C 29 34 29 94 00 4A 00 68 00 72 00 20 29 74 00
1E870   FC 00 56 29 94 00 4A 00 68 00 72 00 24 29 74 00
1E880   FC 00 76 29 94 00 FC 00 56 08 6A 00 1C 25 CE 00
1E890   9E 00 24 00 56 08 AC 29 AC 00 56 08 B2 29 AC 00
1E8A0   C8 00 2E 00 15 00 AC 29 94 00 7A 00 28 29 24 00
1E8B0   1C 25 9E 00 2A 00 11 00 B8 29 94 00 7A 00 28 29
1E8C0   24 00 B4 09 9E 00 FC 00 1C 29 24 00 20 29 9E 00
1E8D0   20 00 24 00 24 29 88 00 62 00 60 00 2D 01 FC 00
1E8E0   F4 00 03 00 F4 00 03 00 24 00 32 25 88 00 24 00
1E8F0   1C 29 8E 00 26 09 16 26 FC 00 54 25 24 00 1C 29
1E900   94 00 1E 00 FC 00 54 25 24 00 B2 25 8A 00 D0 00
1E910   26 00 26 09 8A 08 94 00 1E 00 FC 00 54 25 24 00
1E920   6A 0A 8A 00 D0 00 24 00 26 09 92 08 94 00 1E 00
1E930   FC 00 54 25 24 00 0A 26 8A 00 D0 00 24 00 26 09
1E940   9A 08 94 00 1E 00 FC 00 54 25 24 00 A4 27 8A 00
1E950   D0 00 24 00 26 09 A2 08 94 00 1E 00 FC 00 54 25
1E960   24 00 6C 25 8A 00 D0 00 26 09 AA 08 94 00 1E 00
1E970   FC 00 54 25 24 00 52 28 8A 00 D0 00 26 09 B2 08
1E980   94 00 1E 00 FC 00 54 25 24 00 BE 29 8A 00 D0 00
1E990   26 09 BA 08 94 00 1E 00 FC 00 54 25 24 00 14 27
1E9A0   8A 00 D0 00 26 09 C2 08 94 00 1E 00 FC 00 54 25
1E9B0   24 00 C2 29 8A 00 D0 00 26 00 26 09 CA 08 94 00
1E9C0   1E 00 FC 00 54 25 24 00 C6 29 8A 00 D0 00 26 00
1E9D0   26 09 D2 08 94 00 7A 00 1E 00 FC 00 24 00 28 29
1E9E0   2E 00 27 00 26 09 CA 08 9C 00 26 09 D2 08 9C 00
1E9F0   F4 00 03 00 F4 00 03 00 24 00 32 25 88 00 24 00
1EA00   1C 29 8E 00 26 09 CA 29 FC 00 5E 00 FC 00 02 00
1EA10   00 00 0C 00 D2 29 06 00 9E 00 FC 00 D8 29 24 00
1EA20   1C 25 9E 00 20 00 24 00 D2 29 A0 00 88 00 62 00
1EA30   60 00 2D 00 FC 00 24 00 28 00 D2 29 24 00 D8 29
1EA40   24 00 1C 25 D6 00 DE 25 AC 00 2E 00 13 00 D2 29
1EA50   24 00 D8 29 24 00 1C 25 D6 00 7A 26 9E 00 FC 00
1EA60   5E 00 28 00 D2 29 82 00 02 00 24 00 60 05 38 00
1EA70   00 00 16 00 07 00 02 00 F8 00 FC 00 FE 06 24 00
1EA80   60 05 38 00 DC 29 00 00 24 00 DC 29 C0 26 B4 00
1EA90   58 00 A7 00 FC 00 24 00 A4 06 24 00 DC 29 38 00
1EAA0   B4 09 AC 00 DC 29 B4 09 AC 00 C8 00 2E 00 09 00
1EAB0   24 00 B4 09 82 00 E2 29 24 00 A4 06 24 00 DC 29
1EAC0   38 00 9E 00 24 00 D6 06 24 00 E2 29 38 00 32 25
1EAD0   AC 00 2E 00 1B 00 24 00 22 00 24 00 E2 29 88 00
1EAE0   D2 00 D6 02 2E 00 09 00 24 00 B4 09 82 00 24 00
1EAF0   04 07 24 00 60 05 38 00 48 25 C0 00 38 26 AE 00
1EB00   2E 00 0D 00 24 00 DC 29 88 00 D2 00 76 03 FC 00
1EB10   A4 06 24 00 DC 29 38 00 24 00 B4 09 9E 00 DC 29
1EB20   24 00 E2 29 9E 00 20 07 24 00 DC 29 38 00 24 00
1EB30   60 05 9E 00 24 00 DC 29 82 00 5A 00 FC 00 24 00
1EB40   D6 06 24 00 DC 29 38 00 6C 25 AC 00 2E 00 1B 00
1EB50   24 00 22 00 24 00 DC 29 88 00 D2 00 D6 02 2E 00
1EB60   09 00 24 00 B4 09 82 00 24 00 D6 06 24 00 DC 29
1EB70   38 00 32 25 AC 00 2E 00 1B 00 24 00 22 00 24 00
1EB80   DC 29 88 00 D2 00 D6 02 2E 00 09 00 24 00 B4 09
1EB90   82 00 24 00 D6 06 24 00 DC 29 38 00 32 25 AC 00
1EBA0   94 05 C6 00 2E 00 43 00 24 00 B4 09 88 00 D2 00
1EBB0   24 00 E2 06 24 00 DC 29 38 00 1C 25 BA 00 88 00
1EBC0   D2 00 F4 00 01 00 FE 02 24 00 24 00 A8 05 30 00
1EBD0   1C 25 DC 06 24 00 DC 29 38 00 BA 00 C6 00 2E 00
```

```
1EBE0    09 00 24 00 B4 09 82 00 24 00 20 07 24 00 DC 29
1EBF0    38 00 B4 09 B0 00 20 07 24 00 DC 29 38 00 C0 26
1EC00    B4 00 C6 00 04 07 24 00 60 05 38 00 48 25 C0 00
1EC10    38 26 AE 00 C6 00 2E 00 13 00 24 00 20 07 24 00
1EC20    DC 29 38 00 88 00 D2 00 76 03 FC 00 24 00 20 07
1EC30    24 00 DC 29 38 00 48 25 B0 00 20 07 24 00 DC 29
1EC40    38 00 60 05 AE 00 C6 00 2E 00 09 00 24 00 B4 09
1EC50    82 00 24 00 D6 06 24 00 DC 29 38 00 6C 25 AC 00
1EC60    04 07 24 00 60 05 38 00 48 25 C0 00 54 25 B0 00
1EC70    C6 00 2E 00 17 00 20 07 24 00 DC 29 38 00 24 00
1EC80    60 05 9E 00 24 00 DC 29 82 00 24 00 20 07 24 00
1EC90    DC 29 38 00 60 05 AE 00 2E 00 1F 00 24 00 DC 29
1ECA0    88 00 D2 00 F4 00 05 00 D0 03 20 07 24 00 DC 29
1ECB0    38 00 24 00 60 05 9E 00 FC 00 24 00 DC 29 82 00
1ECC0    02 00 05 00 02 00 FC 00 F4 00 05 00 24 00 60 05
1ECD0    00 00 08 00 F2 00 03 00 2C 29 FC 00 E6 29 24 00
1ECE0    22 00 26 00 06 00 88 00 AE 02 9E 00 FC 00 F4 00
1ECF0    03 00 F4 00 03 00 24 00 1C 25 88 00 24 00 E6 29
1ED00    8E 00 20 09 16 26 FC 00 EE 29 94 00 24 00 E6 29
1ED10    94 00 7A 00 FC 00 EA 29 24 00 B4 09 9E 00 20 00
1ED20    24 00 48 25 88 00 62 00 60 00 91 00 FC 00 24 00
1ED30    EA 29 94 00 7C 00 26 00 20 09 00 09 24 00 EA 29
1ED40    38 00 94 00 7C 00 24 00 20 09 08 09 24 00 EA 29
1ED50    38 00 94 00 7A 00 24 00 EA 29 48 25 AC 00 2E 00
1ED60    05 00 02 00 FC 00 24 00 22 00 FA 29 1C 25 BC 00
1ED70    88 00 24 00 02 2A 88 00 F2 00 0B 00 F2 00 0F 00
1ED80    F2 00 13 00 14 25 24 00 EA 29 48 25 BA 00 94 00
1ED90    7C 00 26 00 20 09 00 09 24 00 EA 29 48 25 BA 00
1EDA0    38 00 94 00 7C 00 24 00 20 09 08 09 24 00 EA 29
1EDB0    48 25 BA 00 38 00 94 00 7A 00 FC 00 5E 00 FC 00
1EDC0    06 2A 94 00 24 00 20 09 10 09 94 00 7C 00 0E 2A
1EDD0    94 00 24 00 20 09 18 09 94 00 7A 00 FC 00 02 00
1EDE0    00 00 16 00 0D 00 70 05 9C 00 2E 2A 9C 00 F8 00
1EDF0    FC 00 24 00 2E 2A 54 00 2D 00 D5 00 65 00 75 06
1EE00    49 03 A7 07 01 05 03 0A 7D 06 B3 0A E1 06 05 0C
1EE10    5D 08 8D 00 51 00 8D 00 51 00 3D 13 B1 0E 3D 14
1EE20    65 0F B9 15 A5 10 39 16 1D 11 0B 1B 31 16 1D 18
1EE30    45 16 5B 18 81 16 2F 0E B1 09 0B 0F 3D 0A 8D 00
1EE40    51 00 8D 00 51 00 8D 00 51 00 F3 17 81 11 2F 21
1EE50    CD 1A C1 21 1D 1B FC 00 F2 00 03 00 2C 29 16 00
1EE60    0D 00 56 2A 9C 00 3E 2A 9C 00 F8 00 FC 00 F2 00
1EE70    03 00 2C 29 24 00 52 27 88 00 24 00 48 25 88 00
1EE80    24 00 1C 25 88 00 F2 00 0F 00 F2 00 13 00 14 25
1EE90    70 05 24 00 B4 09 9E 00 2E 2A 24 00 1C 25 9E 00
1EEA0    24 00 3E 2A 2E 00 0B 00 06 2C 94 00 2A 00 07 00
1EEB0    24 2C 94 00 FC 00 24 00 22 00 DC 01 2E 00 09 00
1EEC0    B8 02 2A 00 05 00 02 00 FC 00 24 00 56 08 24 00
1EED0    70 25 24 00 62 00 40 00 AC 00 2E 00 17 00 3E 2A
1EEE0    24 00 1C 25 3E 2A CA 00 9E 00 54 00 01 00 8D 00
1EEF0    51 00 FC 00 24 00 6C 05 60 25 AE 00 2E 00 0F 00
1EF00    54 00 01 00 D5 00 65 00 2A 00 19 00 26 00 9C 05
1EF10    B4 09 B0 00 84 00 2E 00 0B 00 54 00 01 00 ED 03
1EF20    B9 01 FC 00 24 00 56 08 3E 2C AC 00 58 00 DB 00
1EF30    FC 00 5C 2A 9C 00 FC 00 24 2A 24 00 1C 25 9E 00
1EF40    20 00 24 00 D8 05 88 00 62 00 60 00 1D 00 FC 00
1EF50    F4 00 03 00 F4 00 03 00 24 00 1C 25 88 00 24 00
1EF60    24 2A 8E 00 5C 2A CA 29 FC 00 5E 00 FC 00 24 2A
1EF70    24 00 1C 25 9E 00 20 00 24 00 0E 28 88 00 62 00
1EF80    60 00 73 00 FC 00 F4 00 03 00 F4 00 03 00 24 00
1EF90    32 25 88 00 24 00 24 2A 8E 00 56 2A 16 26 FC 00
1EFA0    24 00 24 2A 94 00 7C 00 26 00 56 2A 8A 08 94 00
1EFB0    7C 00 56 2A B2 08 94 00 7A 00 FC 00 26 00 56 2A
1EFC0    8A 08 B4 09 B0 00 84 00 2E 00 0D 00 26 00 56 2A
1EFD0    8A 08 88 00 20 04 FC 00 24 00 56 2A B2 08 9C 27
1EFE0    AE 00 2E 00 11 00 26 00 28 00 56 2A B2 08 8E 00
```

| | | | | | | | | | | | | | | | | |
|---|---|---|---|---|---|---|---|---|---|---|---|---|---|---|---|---|
| 1EFF0 | 88 | 00 | 20 | 04 | FC | 00 | 5E | 00 | FC | 00 | 9C | 05 | 24 | 00 | B4 | 09 |
| 1F000 | 9E | 00 | 56 | 08 | 9C | 27 | 9E | 00 | FC | 00 | 5A | 00 | FC | 00 | 24 | 00 |
| 1F010 | 56 | 08 | 4C | 2C | AC | 00 | 2E | 00 | 0D | 00 | 0E | 02 | 54 | 00 | 01 | 00 |
| 1F020 | 8D | 00 | 51 | 00 | FC | 00 | 24 | 00 | 56 | 08 | EC | 2B | AC | 00 | 2E | 00 |
| 1F030 | 0D | 00 | 34 | 04 | 54 | 00 | 01 | 00 | 8D | 00 | 51 | 00 | FC | 00 | 24 | 00 |
| 1F040 | 56 | 08 | 58 | 2C | AC | 00 | 2E | 00 | 0D | 00 | 96 | 01 | 54 | 00 | 01 | 00 |
| 1F050 | 8D | 00 | 51 | 00 | FC | 00 | 24 | 00 | 56 | 08 | 60 | 2C | AC | 00 | 2E | 00 |
| 1F060 | 0D | 00 | 22 | 02 | 54 | 00 | 01 | 00 | 8D | 00 | 51 | 00 | FC | 00 | 24 | 00 |
| 1F070 | 56 | 08 | 68 | 2C | AC | 00 | 2E | 00 | 13 | 00 | 62 | 03 | 56 | 08 | 9C | 27 |
| 1F080 | 9E | 00 | 54 | 00 | 01 | 00 | 8D | 00 | 51 | 00 | FC | 00 | 24 | 00 | 56 | 08 |
| 1F090 | 70 | 2C | AC | 00 | 58 | 00 | B3 | 00 | 78 | 2C | F4 | 00 | 01 | 00 | F2 | 00 |
| 1F0A0 | 07 | 00 | E2 | 2A | FC | 00 | 80 | 2C | 94 | 00 | 56 | 08 | 6A | 00 | 1C | 25 |
| 1F0B0 | CE | 00 | 9E | 00 | FC | 00 | 24 | 00 | 56 | 08 | AC | 29 | AC | 00 | 56 | 08 |
| 1F0C0 | B2 | 29 | AC | 00 | C8 | 00 | 58 | 00 | 73 | 00 | FC | 00 | 42 | 2A | 24 | 00 |
| 1F0D0 | 50 | 25 | 9E | 00 | 20 | 00 | 24 | 00 | F6 | 2B | 88 | 00 | 62 | 00 | 60 | 00 |
| 1F0E0 | 57 | 00 | 24 | 00 | D6 | 06 | 24 | 00 | 42 | 2A | 38 | 00 | 48 | 25 | AC | 00 |
| 1F0F0 | 2E | 00 | 45 | 00 | 24 | 00 | 58 | 25 | 88 | 00 | D2 | 00 | 24 | 00 | E2 | 06 |
| 1F100 | 24 | 00 | 42 | 2A | 38 | 00 | 88 | 00 | D2 | 00 | F4 | 00 | 01 | 00 | FE | 02 |
| 1F110 | 24 | 00 | 1C | 25 | DC | 06 | 24 | 00 | 42 | 2A | 38 | 00 | BA | 00 | 88 | 00 |
| 1F120 | D2 | 00 | 24 | 00 | E2 | 06 | 24 | 00 | 42 | 2A | 38 | 00 | 88 | 00 | D2 | 00 |
| 1F130 | F4 | 00 | 01 | 00 | FE | 02 | FC | 00 | 5E | 00 | FC | 00 | 5A | 00 | 78 | 2C |
| 1F140 | A2 | 2C | 94 | 00 | 7A | 00 | 82 | 00 | FC | 00 | 5A | 00 | FC | 00 | 24 | 00 |
| 1F150 | 56 | 08 | AE | 2C | AC | 00 | 2E | 00 | 0B | 00 | 54 | 00 | 01 | 00 | 69 | 07 |
| 1F160 | FD | 03 | FC | 00 | 24 | 00 | 56 | 08 | B8 | 2C | AC | 00 | 2E | 00 | 0D | 00 |
| 1F170 | 0C | 04 | 54 | 00 | 01 | 00 | 8D | 00 | 51 | 00 | FC | 00 | 24 | 00 | 56 | 08 |
| 1F180 | C8 | 2C | AC | 00 | 58 | 00 | 43 | 00 | FC | 00 | 16 | 00 | 0B | 00 | 54 | 00 |
| 1F190 | 01 | 00 | E9 | 03 | A5 | 01 | F2 | 00 | 03 | 00 | 2C | 29 | D0 | 2C | 94 | 00 |
| 1F1A0 | 4A | 00 | 68 | 00 | 72 | 00 | 56 | 08 | 78 | 00 | F4 | 00 | 03 | 00 | 56 | 08 |
| 1F1B0 | EA | 2C | F2 | 2C | 94 | 00 | 4A | 00 | 68 | 00 | 72 | 00 | 56 | 08 | 78 | 00 |
| 1F1C0 | F4 | 00 | 03 | 00 | 56 | 08 | 0C | 2D | FC | 00 | 5A | 00 | FC | 00 | 26 | 00 |
| 1F1D0 | 3E | 2A | B4 | 09 | AC | 00 | 9C | 05 | B4 | 09 | B6 | 00 | 9C | 05 | D8 | 05 |
| 1F1E0 | 48 | 25 | BE | 00 | B0 | 00 | C8 | 00 | C6 | 00 | 84 | 00 | 2E | 00 | 0B | 00 |
| 1F1F0 | 54 | 00 | 01 | 00 | 8D | 00 | 51 | 00 | FC | 00 | 26 | 00 | 3E | 2A | 1C | 25 |
| 1F200 | AC | 00 | 9C | 05 | B4 | 09 | B4 | 00 | C6 | 00 | 84 | 00 | 2E | 00 | 0B | 00 |
| 1F210 | 54 | 00 | 01 | 00 | 8D | 00 | 51 | 00 | FC | 00 | 32 | 2A | 24 | 00 | B4 | 09 |
| 1F220 | 9E | 00 | 24 | 00 | 3E | 2A | 2E | 00 | 17 | 00 | 24 | 2A | 24 | 00 | 22 | 00 |
| 1F230 | 26 | 00 | 9C | 05 | 88 | 00 | 3C | 01 | 9E | 00 | 2A | 00 | 0B | 00 | 24 | 2A |
| 1F240 | 26 | 00 | 9C | 05 | 9E | 00 | FC | 00 | 24 | 00 | 24 | 2A | 24 | 26 | AC | 00 |
| 1F250 | 2E | 00 | 0B | 00 | 54 | 00 | 01 | 00 | 8D | 00 | 51 | 00 | FC | 00 | F4 | 00 |
| 1F260 | 03 | 00 | F4 | 00 | 03 | 00 | 24 | 00 | 32 | 25 | 88 | 00 | 24 | 00 | 24 | 2A |
| 1F270 | 8E | 00 | 56 | 2A | 16 | 26 | FC | 00 | F2 | 00 | 03 | 00 | 2C | 29 | 16 | 00 |
| 1F280 | 09 | 00 | 56 | 2A | 9C | 00 | F8 | 00 | FC | 00 | F4 | 00 | 03 | 00 | 14 | 2D |
| 1F290 | 3A | 03 | FC | 00 | 24 | 00 | 32 | 25 | 88 | 00 | 24 | 00 | 6C | 25 | 88 | 00 |
| 1F2A0 | F2 | 00 | 0B | 00 | F2 | 00 | 0F | 00 | F2 | 00 | 13 | 00 | 14 | 25 | 24 | 00 |
| 1F2B0 | 24 | 2A | 94 | 00 | FC | 00 | 24 | 00 | B8 | 09 | 88 | 00 | 24 | 00 | 6C | 25 |
| 1F2C0 | 88 | 00 | F2 | 00 | 0B | 00 | F2 | 00 | 0F | 00 | F2 | 00 | 13 | 00 | 14 | 25 |
| 1F2D0 | 26 | 00 | 56 | 2A | 8A | 08 | 94 | 00 | FC | 00 | 24 | 00 | B2 | 25 | 88 | 00 |
| 1F2E0 | 24 | 00 | 6C | 25 | 88 | 00 | F2 | 00 | 0B | 00 | F2 | 00 | 0F | 00 | F2 | 00 |
| 1F2F0 | 13 | 00 | 14 | 25 | 24 | 00 | 56 | 2A | 92 | 08 | 94 | 00 | FC | 00 | 24 | 00 |
| 1F300 | 40 | 25 | 88 | 00 | 24 | 00 | 6C | 25 | 88 | 00 | F2 | 00 | 0B | 00 | F2 | 00 |
| 1F310 | 0F | 00 | F2 | 00 | 13 | 00 | 14 | 25 | 24 | 00 | 56 | 2A | 9A | 08 | 94 | 00 |
| 1F320 | FC | 00 | 24 | 00 | 48 | 25 | 88 | 00 | 24 | 00 | 6C | 25 | 88 | 00 | F2 | 00 |
| 1F330 | 0B | 00 | F2 | 00 | 0F | 00 | F2 | 00 | 13 | 00 | 14 | 25 | 24 | 00 | 56 | 2A |
| 1F340 | A2 | 08 | 94 | 00 | FC | 00 | 24 | 00 | 38 | 26 | 88 | 00 | 24 | 00 | 70 | 25 |
| 1F350 | 88 | 00 | F2 | 00 | 0B | 00 | F2 | 00 | 0F | 00 | F2 | 00 | 13 | 00 | 14 | 25 |
| 1F360 | 56 | 2A | AA | 08 | 94 | 00 | FC | 00 | 24 | 00 | 58 | 25 | 88 | 00 | 24 | 00 |
| 1F370 | 70 | 25 | 88 | 00 | F2 | 00 | 0B | 00 | F2 | 00 | 0F | 00 | F2 | 00 | 13 | 00 |
| 1F380 | 14 | 25 | 56 | 2A | B2 | 08 | 94 | 00 | FC | 00 | 24 | 00 | 50 | 25 | 88 | 00 |
| 1F390 | 24 | 00 | 70 | 25 | 88 | 00 | F2 | 00 | 0B | 00 | F2 | 00 | 0F | 00 | F2 | 00 |
| 1F3A0 | 13 | 00 | 14 | 25 | 56 | 2A | BA | 08 | 94 | 00 | FC | 00 | 24 | 00 | 3C | 26 |
| 1F3B0 | 88 | 00 | 24 | 00 | 70 | 25 | 88 | 00 | F2 | 00 | 0B | 00 | F2 | 00 | 0F | 00 |
| 1F3C0 | F2 | 00 | 13 | 00 | 14 | 25 | 56 | 2A | C2 | 08 | 94 | 00 | FC | 00 | 24 | 00 |
| 1F3D0 | 52 | 27 | 88 | 00 | 24 | 00 | 6C | 25 | 88 | 00 | F2 | 00 | 0B | 00 | F2 | 00 |
| 1F3E0 | 0F | 00 | F2 | 00 | 13 | 00 | 14 | 25 | 26 | 00 | 56 | 2A | CA | 08 | 94 | 00 |
| 1F3F0 | FC | 00 | 24 | 00 | A4 | 27 | 88 | 00 | 24 | 00 | 6C | 25 | 88 | 00 | F2 | 00 |

```
1F400   0B 00 F2 00 0F 00 F2 00 13 00 14 25 26 00 56 2A
1F410   D2 08 94 00 FC 00 36 2A 9C 00 3A 2A 9C 00 32 2A
1F420   24 00 B8 09 9E 00 4E 00 FC 00 24 00 32 2A 88 00
1F430   24 00 70 25 88 00 F2 00 0B 00 F2 00 0F 00 F2 00
1F440   13 00 14 25 2E 2A 24 00 32 25 9E 00 70 05 24 00
1F450   B4 09 9E 00 FC 00 24 00 22 00 DC 01 2E 00 09 00
1F460   B8 02 2A 00 05 00 02 00 FC 00 24 00 6C 05 70 25
1F470   AC 00 2E 00 0B 00 54 00 01 00 19 07 AD 03 FC 00
1F480   24 00 6C 05 60 25 AE 00 2E 00 0B 00 54 00 01 00
1F490   75 06 49 03 FC 00 24 00 70 05 B4 09 AC 00 2E 00
1F4A0   0F 00 54 00 01 00 F5 06 85 03 2A 00 29 00 24 00
1F4B0   32 2A 88 00 24 00 70 25 88 00 F2 00 0B 00 F2 00
1F4C0   0F 00 F2 00 13 00 14 25 56 08 94 00 7C 00 20 2D
1F4D0   94 00 16 04 FC 00 32 2A 24 00 32 2A 32 25 BA 00
1F4E0   9E 00 FC 00 24 00 32 2A AC 27 B4 00 2E 00 0B 00
1F4F0   54 00 01 00 49 06 35 03 FC 00 F4 00 03 00 F4 00
1F500   03 00 24 00 32 25 88 00 24 00 24 2A 8E 00 56 2A
1F510   CA 29 FC 00 24 00 36 2A 2E 00 0D 00 26 00 56 2A
1F520   8A 08 88 00 20 04 FC 00 24 00 3A 2A 2E 00 11 00
1F530   26 00 28 00 56 2A B2 08 8E 00 88 00 20 04 FC 00
1F540   54 00 01 00 8D 00 51 00 FC 00 F2 00 03 00 2C 29
1F550   F4 00 03 00 2E 2D 3A 03 24 00 53 25 88 00 24 00
1F560   52 28 88 00 24 00 1C 25 88 00 F2 00 0F 00 F2 00
1F570   13 00 14 25 FC 00 2E 2A 24 00 10 25 9E 00 70 05
1F580   24 00 B4 09 9E 00 FC 00 24 00 22 00 DC 01 2E 00
1F590   09 00 B8 02 2A 00 05 00 02 00 FC 00 24 00 56 08
1F5A0   38 2D AC 00 2E 00 0B 00 54 00 01 00 FF 17 39 13
1F5B0   FC 00 24 00 56 08 3E 2D AC 00 2E 00 29 00 4A 00
1F5C0   58 0A 94 00 72 00 24 2A 74 00 24 00 24 2A 8E 00
1F5D0   B4 01 56 08 6A 00 1C 25 CE 00 9E 00 54 00 01 00
1F5E0   69 07 FD 03 FC 00 24 00 56 08 44 2D AC 00 2E 00
1F5F0   29 00 4A 00 58 0A 94 00 72 00 24 2A 74 00 24 00
1F600   24 2A 88 00 B2 03 56 08 6A 00 1C 25 CE 00 9E 00
1F610   54 00 01 00 69 07 FD 03 FC 00 36 00 28 00 DE 25
1F620   56 08 4A 2D 8E 00 84 00 54 00 13 00 7F 08 51 05
1F630   77 0F A1 0A 6D 12 FD 0D 6D 12 FD 0D 17 15 DD 0F
1F640   F3 17 81 11 39 1B 59 16 81 1B A9 16 97 1E BD 16
1F650   89 20 F1 19 FC 00 54 00 01 00 8D 00 51 00 FC 00
1F660   32 2A 24 00 B4 09 9E 00 4E 2A 24 00 B4 09 9E 00
1F670   FC 00 F2 00 03 00 2C 29 16 00 0B 00 54 00 01 00
1F680   69 07 FD 03 FC 00 F4 00 03 00 28 00 50 2D 28 00
1F690   24 00 32 2A 90 00 24 00 32 25 24 00 32 25 D6 00
1F6A0   88 00 3A 03 FC 00 42 2A 24 00 B4 09 9E 00 20 00
1F6B0   24 00 32 25 88 00 62 00 60 00 F7 00 FC 00 46 2A
1F6C0   24 00 B4 09 9E 00 20 00 24 00 6A 0A 88 00 62 00
1F6D0   60 00 DB 00 FC 00 24 00 D6 06 24 00 4E 2A 38 00
1F6E0   2E 00 39 00 24 00 46 2A 10 25 BA 00 88 00 24 00
1F6F0   42 2A 6C 25 BE 00 B2 25 BA 00 88 00 F2 00 0B 00
1F700   F2 00 0F 00 F2 00 13 00 14 25 24 00 D6 06 24 00
1F710   4E 2A 38 00 94 00 2A 00 0B 00 54 00 01 00 BF 09
1F720   23 06 FC 00 24 00 46 2A 10 25 BA 00 88 00 24 00
1F730   42 2A 6C 25 BE 00 48 25 BA 00 88 00 F2 00 0B 00
1F740   F2 00 0F 00 F2 00 13 00 14 25 24 00 D6 06 24 00
1F750   4E 2A 38 00 2E 00 13 00 24 00 D0 06 24 00 4E 2A
1F760   38 00 94 00 2A 00 07 00 5A 2D 94 00 FC 00 24 00
1F770   46 2A 10 25 BA 00 88 00 24 00 42 2A 6C 25 BE 00
1F780   50 25 BA 00 88 00 F2 00 0B 00 F2 00 0F 00 F2 00
1F790   13 00 14 25 AA 07 24 00 4E 2A 38 00 94 00 FC 00
1F7A0   4E 2A 24 00 4E 2A 1C 25 BA 00 9E 00 FC 00 5E 00
1F7B0   FC 00 5E 00 FC 00 24 00 0A 26 88 00 24 00 60 20
1F7C0   88 00 F2 00 0B 00 F2 00 0F 00 F2 00 13 00 14 25
1F7D0   FC 00 70 05 24 00 B4 09 9E 00 2E 2A 24 00 B8 09
1F7E0   9E 00 FC 00 24 00 22 00 DC 01 2E 00 09 00 B8 02
1F7F0   2A 00 05 00 02 00 FC 00 24 00 56 08 58 0A AC 00
1F800   2E 00 17 00 32 2A 24 00 32 2A AE 25 BA 00 9E 00
```

```
1F810   54 00 01 00 91 08 79 05 FC 00 24 00 6C 05 60 25
1F820   AE 00 2E 00 0B 00 54 00 01 00 03 0A 7D 06 FC 00
1F830   26 00 56 08 9C 27 AC 00 9C 05 F6 2B B0 00 C8 00
1F840   84 00 2E 00 0F 00 54 00 01 00 69 07 FD 03 2A 00
1F850   0B 00 4E 2A 26 00 9C 05 9E 00 FC 00 24 00 52 27
1F860   88 00 24 00 32 25 88 00 F2 00 0B 00 F2 00 0F 00
1F870   F2 00 13 00 14 25 64 2D 94 00 70 05 24 00 B4 09
1F880   9E 00 2E 2A 24 00 54 25 9E 00 42 2A 24 00 B4 09
1F890   9E 00 FC 00 24 00 22 00 DC 01 2E 00 09 00 B8 02
1F8A0   2A 00 05 00 02 00 FC 00 24 00 42 2A 1C 25 AC 00
1F8B0   2E 00 2F 00 F4 00 03 00 24 00 B4 09 88 00 24 00
1F8C0   B4 09 88 00 24 00 A6 25 88 00 24 00 8E 2D 88 00
1F8D0   3C 07 86 2D 42 2A 24 00 B4 09 9E 00 56 08 94 00
1F8E0   FC 00 24 00 56 08 92 2D AC 00 58 00 49 00 FC 00
1F8F0   F4 00 03 00 24 00 B4 09 88 00 24 00 B4 09 88 00
1F900   24 00 A6 25 88 00 24 00 8E 2D 88 00 3C 07 98 2D
1F910   FC 00 F4 00 03 00 A0 2D 3A 03 FC 00 42 2A 24 00
1F920   1C 25 9E 00 FC 00 56 08 9C 27 9E 00 70 05 24 00
1F930   B4 09 9E 00 FC 00 5A 00 FC 00 24 00 6C 05 60 25
1F940   AE 00 2E 00 0B 00 54 00 01 00 B3 0A E1 06 FC 00
1F950   26 00 9C 05 2A 28 B0 00 84 00 2E 00 0F 00 54 00
1F960   01 00 78 0A CD 06 2A 00 0B 00 42 2A 26 00 9C 05
1F970   9E 00 FC 00 24 00 52 27 88 00 24 00 1C 25 88 00
1F980   F2 00 06 00 F2 00 0F 00 F2 00 13 00 14 25 24 00
1F990   AC 2D 8A 00 CA 00 FC 00 24 00 42 2A 54 25 AC 00
1F9A0   2E 00 13 00 46 2A 24 00 B4 09 9E 00 54 00 01 00
1F9B0   53 0C 99 08 FC 00 24 00 52 27 88 00 24 00 32 25
1F9C0   88 00 F2 00 0B 00 F2 00 0F 00 F2 00 13 00 14 25
1F9D0   B0 2D 94 00 70 05 24 00 B4 09 9E 00 2E 2A 24 00
1F9E0   B2 25 9E 00 FC 00 24 00 22 00 DC 01 2E 00 09 00
1F9F0   B8 02 2A 00 05 00 02 00 FC 00 24 00 6C 05 60 25
1FA00   AE 00 2E 00 0B 00 54 00 01 00 05 0C 5D 08 FC 00
1FA10   26 00 9C 05 54 26 B4 00 84 00 2E 00 0F 00 46 2A
1FA20   26 00 9C 05 9E 00 2A 00 0B 00 54 00 01 00 93 0B
1FA30   35 08 FC 00 4A 2A 24 00 B4 09 9E 00 FC 00 24 00
1FA40   42 2A 1C 25 AC 00 42 2A B4 09 AC 00 C8 00 42 2A
1FA50   54 25 AC 00 C8 00 42 2A 6C 25 AC 00 C8 00 42 2A
1FA60   70 25 AC 00 C8 00 2E 00 0B 00 4A 2A 24 00 1C 25
1FA70   9E 00 FC 00 24 00 42 2A 32 25 AC 00 42 2A 58 25
1FA80   AC 00 C8 00 42 2A 68 25 AC 00 C8 00 2E 00 0B 00
1FA90   4A 2A 24 00 32 25 9E 00 FC 00 24 00 42 2A 38 26
1FAA0   AC 00 42 2A 52 27 AC 00 C8 00 2E 00 0B 00 4A 2A
1FAB0   24 00 10 25 9E 00 FC 00 24 00 42 2A 48 25 AC 00
1FAC0   42 2A B8 09 AC 00 C8 00 42 2A 2A 28 AC 00 C8 00
1FAD0   42 2A 60 25 AC 00 C8 00 2E 00 0B 00 4A 2A 24 00
1FAE0   B8 09 9E 00 FC 00 24 00 4A 2A B4 09 AC 00 2E 00
1FAF0   19 00 C8 2D 94 00 7A 00 24 00 D2 2D 88 00 5A 01
1FB00   54 00 01 00 7B 0A CD 06 FC 00 52 2A 24 00 B4 09
1FB10   9E 00 20 00 24 00 4A 2A 1C 25 BC 00 68 00 62 00
1FB20   60 00 41 00 FC 00 D6 06 24 00 4E 2A 52 2A BA 00
1FB30   38 00 24 00 42 2A 9E 00 FC 00 D0 06 24 00 4E 2A
1FB40   52 2A BA 00 38 00 24 00 46 2A 52 2A BA 00 9E 00
1FB50   FC 00 AA 07 24 00 4E 2A 52 2A BA 00 38 00 9C 27
1FB60   9E 00 FC 00 5E 00 FC 00 24 00 42 2A 52 27 AC 00
1FB70   2E 00 35 00 D6 06 24 00 4E 2A 38 00 24 00 AA 25
1FB80   9E 00 D6 06 24 00 4E 2A 1C 25 BA 00 38 00 24 00
1FB90   A4 27 9E 00 D6 06 24 00 4E 2A 32 25 BA 00 38 00
1FBA0   24 00 A6 25 9E 00 FC 00 24 00 D6 06 24 00 4E 2A
1FBB0   38 00 32 25 AE 00 2E 00 0B 00 54 00 01 00 95 0E
1FBC0   01 0A FC 00 42 2A 24 00 B4 09 9E 00 FC 00 24 00
1FBD0   AA 25 42 2A BA 00 88 00 24 00 32 25 88 00 F2 00
1FBE0   0B 00 F2 00 0F 00 F2 00 13 00 14 25 D6 2D 94 00
1FBF0   24 00 4E 2A 42 2A BA 00 94 00 E8 2D 94 00 70 05
1FC00   24 00 B4 09 9E 00 2E 2A 24 00 50 25 9E 00 FC 00
1FC10   24 00 22 00 DC 01 2E 00 09 00 B8 02 2A 00 05 00
1FC20   02 00 FC 00 24 00 6C 05 60 25 AE 00 2E 00 0B 00
```

```
1FC30   54 00 01 00 2F 0E B1 09 FC 00 AA 07 24 00 4E 2A
1FC40   42 2A BA 00 38 00 28 00 56 08 C0 00 9E 00 FC 00
1FC50   24 00 4A 2A 32 25 AC 00 42 2A B4 09 AC 00 C6 00
1FC60   2E 00 13 00 42 2A 24 00 1C 25 9E 00 54 00 01 00
1FC70   ED 0D 9D 09 FC 00 24 00 D6 06 24 00 4E 2A 38 00
1FC80   48 25 B4 00 D6 06 24 00 4E 2A 38 00 58 25 B0 00
1FC90   C8 00 2E 00 0B 00 54 00 01 00 6D 0F 8D 0A FC 00
1FCA0   42 2A 24 00 B4 09 9E 00 FC 00 24 00 AA 25 42 2A
1FCB0   BA 00 88 00 24 00 32 25 88 00 F2 00 0B 00 F2 00
1FCC0   0F 00 F2 00 13 00 14 25 F0 2D 94 00 24 00 4E 2A
1FCD0   42 2A BA 00 94 00 00 2E 94 00 70 05 24 00 B4 09
1FCE0   9E 00 2E 2A 24 00 A0 27 9E 00 FC 00 24 00 22 00
1FCF0   DC 01 2E 00 09 00 B8 02 2A 00 05 00 02 00 FC 00
1FD00   24 00 6C 05 60 25 AE 00 2E 00 0B 00 54 00 01 00
1FD10   0B 0F 3D 0A FC 00 AA 07 24 00 4E 2A 42 2A BA 00
1FD20   38 00 56 08 9E 00 FC 00 24 00 42 2A 4A 2A 1C 25
1FD30   8C 00 B4 00 2E 00 17 00 42 2A 24 00 42 2A 1C 25
1FD40   BA 00 9E 00 54 00 01 00 C9 0E 29 0A FC 00 54 00
1FD50   01 00 7F 08 51 05 FC 00 D8 07 9C 00 FC 00 D8 07
1FD60   14 2E 6C 00 24 00 AC 05 94 00 24 00 B0 05 94 00
1FD70   24 00 C8 05 94 00 24 00 88 05 94 00 24 00 B4 05
1FD80   94 00 24 00 98 05 94 00 24 00 CC 05 94 00 24 00
1FD90   D0 05 94 00 24 00 B8 05 94 00 24 00 BC 05 94 00
1FDA0   24 00 7C 05 94 00 24 00 C4 05 94 00 24 00 C0 05
1FDB0   94 00 24 00 84 05 94 00 24 00 A4 05 94 00 24 00
1FDC0   80 09 94 00 24 00 8A 09 94 00 24 00 94 05 94 00
1FDD0   24 00 8E 09 94 00 1E 00 1E 00 FC 00 D8 07 AA 07
1FDE0   24 00 1C 25 38 00 94 00 1E 2E 94 00 7A 00 1E 00
1FDF0   FC 00 F2 00 03 00 2C 29 F4 00 03 00 2C 2E 3A 03
1FE00   FC 00 F0 07 24 00 1C 25 24 00 62 00 40 00 9E 00
1FE10   FC 00 F4 00 09 00 F2 00 05 00 3A 03 FC 00 AC 05
1FE20   26 00 28 00 28 00 D8 07 24 00 1C 25 24 00 54 25
1FE30   D6 00 8E 00 9E 00 FC 00 B0 05 26 00 28 00 28 00
1FE40   D8 07 24 00 B2 25 24 00 54 25 D6 00 8E 00 9E 00
1FE50   FC 00 B4 05 26 00 28 00 28 00 D8 07 24 00 AA 25
1FE60   24 00 54 25 D6 00 8E 00 9E 00 FC 00 B8 05 26 00
1FE70   28 00 28 00 D8 07 24 00 38 2E 24 00 54 25 D6 00
1FE80   8E 00 9E 00 FC 00 BC 05 26 00 28 00 28 00 D8 07
1FE90   24 00 3C 2E 24 00 54 25 D6 00 8E 00 9E 00 FC 00
1FEA0   C4 05 26 00 28 00 28 00 D8 07 24 00 10 27 24 00
1FEB0   54 25 D6 00 8E 00 9E 00 FC 00 C0 05 26 00 28 00
1FEC0   28 00 D8 07 24 00 BA 25 24 00 54 25 D6 00 8E 00
1FED0   9E 00 FC 00 C8 05 26 00 28 00 28 00 D8 07 24 00
1FEE0   C0 26 24 00 54 25 D6 00 8E 00 9E 00 FC 00 CC 05
1FEF0   26 00 28 00 28 00 D8 07 24 00 EA 27 24 00 54 25
1FF00   D6 00 8E 00 9E 00 FC 00 D0 05 26 00 28 00 28 00
1FF10   D8 07 24 00 52 28 24 00 54 25 D6 00 8E 00 9E 00
1FF20   FC 00 D4 05 24 00 1C 25 9E 00 FC 00 7C 05 26 00
1FF30   28 00 28 00 D8 07 24 00 40 2E 24 00 54 25 D6 00
1FF40   8E 00 9E 00 FC 00 AA 07 24 00 1C 25 38 00 28 00
1FF50   28 00 D8 07 24 00 44 2E 24 00 48 25 D6 00 C0 00
1FF60   9E 00 F4 00 03 00 24 00 54 25 88 00 E2 2A FC 00
1FF70   90 02 FC 00 84 05 26 00 28 00 28 00 D8 07 24 00
1FF80   C2 29 24 00 54 25 D6 00 8E 00 9E 00 FC 00 88 05
1FF90   26 00 28 00 28 00 D8 07 24 00 50 25 24 00 54 25
1FFA0   D6 00 8E 00 9E 00 FC 00 94 05 26 00 28 00 28 00
1FFB0   D8 07 24 00 48 2E 24 00 54 25 D6 00 8E 00 9E 00
1FFC0   FC 00 98 05 26 00 28 00 28 00 D8 07 24 00 6C 25
1FFD0   24 00 54 25 D6 00 8E 00 9E 00 FC 00 A4 05 26 00
1FFE0   28 00 28 00 D8 07 24 00 4C 2E 24 00 54 25 D6 00
1FFF0   8E 00 9E 00 FC 00 80 09 26 00 28 00 28 00 D8 07
20000   24 00 50 2E 24 00 54 25 D6 00 8E 00 9E 00 FC 00
20010   8A 09 26 00 28 00 28 00 D8 07 24 00 0E 2B 24 00
20020   54 25 D6 00 8E 00 9E 00 FC 00 8E 09 26 00 28 00
20030   28 00 D8 07 24 00 54 2E 24 00 54 25 D6 00 8E 00
```

```
20040   9E 00 FC 00 54 00 01 00 69 07 FD 03 FC 00 24 00
20050   56 08 58 2E AC 00 2E 00 0D 00 28 2A 5E 2E 9E 00
20060   2A 00 09 00 28 2A 68 2E 9E 00 FC 00 F2 00 03 00
20070   2C 29 FC 00 42 2A 24 00 1C 25 9E 00 20 00 24 00
20080   48 25 88 00 62 00 60 00 75 00 28 2A 94 00 74 2E
20090   94 00 24 00 42 2A 94 00 7C 00 FC 00 46 2A 24 00
200A0   1C 25 9E 00 20 00 24 00 48 25 88 00 62 00 60 00
200B0   47 00 24 00 28 2A 5E 2E AC 00 2E 00 21 00 24 00
200C0   44 06 24 00 42 2A 1C 25 BC 00 38 00 24 00 46 2A
200D0   1C 25 BC 00 38 00 94 00 2A 00 1D 00 24 00 4A 06
200E0   24 00 42 2A 1C 25 BC 00 38 00 24 00 46 2A 1C 25
200F0   BC 00 38 00 94 00 FC 00 5E 00 7A 00 FC 00 5E 00
20100   FC 00 7A 00 7E 2E 94 00 7A 00 FC 00 2E 2A 24 00
20110   5C 25 9E 00 70 05 24 00 B4 09 9E 00 FC 00 24 00
20120   22 00 DC 01 2E 00 09 00 B8 02 2A 00 05 00 02 00
20130   FC 00 24 00 6C 05 60 25 AE 00 2E 00 0B 00 54 00
20140   01 00 3D 13 B1 0E FC 00 24 00 56 08 9C 27 AC 00
20150   2E 00 0B 00 54 00 01 00 69 07 FD 03 FC 00 26 00
20160   9C 05 1C 25 B4 00 9C 05 48 25 B0 00 C8 00 84 00
20170   2E 00 0B 00 54 00 01 00 8B 12 25 0E FC 00 42 2A
20180   24 00 B4 09 9E 00 20 00 24 00 5C 25 88 00 62 00
20190   60 00 47 00 24 00 28 2A 5E 2E AC 00 2E 00 21 00
201A0   44 06 26 00 9C 05 1C 25 BC 00 84 00 38 00 24 00
201B0   42 2A 38 00 24 00 B4 09 9E 00 2A 00 1D 00 4A 06
201C0   26 00 9C 05 1C 25 BC 00 84 00 38 00 24 00 42 2A
201D0   38 00 24 00 B4 09 9E 00 FC 00 5E 00 FC 00 32 2A
201E0   26 00 9C 05 9E 00 F2 00 03 00 2C 29 B2 2E 94 00
201F0   28 2A 94 00 BC 2E 94 00 7A 00 FC 00 42 2A 24 00
20200   B4 09 9E 00 F2 2E 94 00 7A 00 FC 00 2E 2A 24 00
20210   48 25 9E 00 70 05 24 00 B4 09 9E 00 FC 00 24 00
20220   22 00 DC 01 2E 00 09 00 B8 02 2A 00 05 00 02 00
20230   FC 00 24 00 6C 05 60 25 AE 00 2E 00 0B 00 54 00
20240   01 00 3D 14 65 0F FC 00 24 00 56 08 9C 27 AC 00
20250   2E 00 0B 00 54 00 01 00 8B 12 25 0E FC 00 26 00
20260   9C 05 B4 09 B4 00 9C 05 F6 2B B0 00 C8 00 84 00
20270   2E 00 11 00 1C 2F 94 00 7A 00 54 00 01 00 2B 14
20280   51 0F FC 00 24 00 28 2A 5E 2E AC 00 2E 00 1F 00
20290   44 06 24 00 32 2A 1C 25 BC 00 38 00 24 00 42 2A
202A0   38 00 26 00 9C 05 9E 00 2A 00 1B 00 4A 06 24 00
202B0   32 2A 1C 25 BC 00 38 00 24 00 42 2A 38 00 26 00
202C0   9C 05 9E 00 FC 00 42 2A 24 00 42 2A 1C 25 BA 00
202D0   9E 00 58 0A 94 00 24 00 42 2A 48 25 AC 00 2E 00
202E0   0F 00 54 00 01 00 8B 12 25 0E 2A 00 0B 00 54 00
202F0   01 00 2B 14 51 0F FC 00 F2 00 03 00 2C 29 2E 2F
20300   94 00 7A 00 FC 00 42 2A 24 00 1C 25 9E 00 20 00
20310   24 00 52 27 88 00 62 00 60 00 5F 00 FC 00 50 2F
20320   94 00 24 00 42 2A 94 00 58 0A 94 00 FC 00 46 2A
20330   24 00 B4 09 9E 00 20 00 24 00 0A 26 88 00 62 00
20340   60 00 31 00 FC 00 24 00 8E 06 24 00 42 2A 38 00
20350   24 00 46 2A 38 00 2E 00 19 00 24 00 8E 06 24 00
20360   42 2A 38 00 24 00 46 2A 38 00 94 00 2A 00 05 00
20370   02 00 FC 00 5E 00 7A 00 FC 00 5E 00 FC 00 7A 00
20380   58 2F 94 00 7A 00 FC 00 2E 2A 24 00 C0 26 9E 00
20390   70 05 24 00 B4 09 9E 00 FC 00 24 00 22 00 DC 01
203A0   2E 00 09 00 B8 02 2A 00 05 00 02 00 FC 00 24 00
203B0   6C 05 60 25 AE 00 2E 00 0B 00 54 00 01 00 69 15
203C0   A5 10 FC 00 24 00 56 08 9C 27 AC 00 2E 00 0B 00
203D0   54 00 01 00 69 07 FD 03 FC 00 26 00 9C 05 1C 25
203E0   B4 00 9C 05 52 27 B0 00 C8 00 84 00 2E 00 0B 00
203F0   54 00 01 00 17 15 DD 0F FC 00 32 2A 26 00 9C 05
20400   9E 00 8E 2F 94 00 FC 00 2E 2A 24 00 38 26 9E 00
20410   70 05 24 00 B4 09 9E 00 FC 00 24 00 22 00 DC 01
20420   2E 00 09 00 B8 02 2A 00 05 00 02 00 FC 00 24 00
20430   6C 05 60 25 AE 00 2E 00 0B 00 54 00 01 00 39 16
20440   1D 11 FC 00 26 00 9C 05 4E 27 AC 00 26 06 24 00
```

```
20450   0A 26 38 00 1C 25 AC 00 C6 00 9C 05 1C 25 B4 00
20460   C8 00 9C 05 F6 2B B0 00 C8 00 84 00 2E 00 0B 00
20470   54 00 01 00 17 15 DD 0F FC 00 42 2A 24 00 B4 09
20480   9E 00 20 00 24 00 0A 26 88 00 62 00 60 00 37 01
20490   FC 00 26 00 8E 06 24 00 32 2A 38 00 24 00 42 2A
204A0   38 00 9C 05 AC 00 84 00 58 00 61 00 FC 00 46 2A
204B0   24 00 42 2A 9E 00 20 00 24 00 3C 26 88 00 62 00
204C0   60 00 29 00 FC 00 8E 06 24 00 32 2A 38 00 24 00
204D0   46 2A 38 00 24 00 8E 06 24 00 32 2A 38 00 24 00
204E0   46 2A 1C 25 BA 00 38 00 9E 00 FC 00 5E 00 FC 00
204F0   8E 06 24 00 32 2A 38 00 24 00 0A 26 38 00 24 00
20500   B4 09 9E 00 24 00 32 25 02 00 FC 00 5A 00 FC 00
20510   26 00 8E 06 24 00 32 2A 38 00 24 00 42 2A 38 00
20520   9C 05 B0 00 84 00 58 00 69 00 FC 00 46 2A 24 00
20530   0A 26 9E 00 20 00 24 00 42 2A 1C 25 BA 00 88 00
20540   24 00 24 26 88 00 60 00 29 00 FC 00 8E 06 24 00
20550   32 2A 38 00 24 00 46 2A 38 00 24 00 8E 06 24 00
20560   32 2A 38 00 24 00 46 2A 1C 25 BC 00 38 00 9E 00
20570   FC 00 5E 00 FC 00 8E 06 24 00 32 2A 38 00 24 00
20580   42 2A 38 00 26 00 9C 05 9E 00 24 00 32 25 02 00
20590   FC 00 5A 00 FC 00 24 00 8E 06 24 00 32 2A 38 00
205A0   24 00 42 2A 38 00 B4 09 AC 00 2E 00 19 00 8E 06
205B0   24 00 32 2A 38 00 24 00 42 2A 38 00 26 00 9C 05
205C0   9E 00 02 00 FC 00 5E 00 FC 00 54 00 01 00 17 15
205D0   DD 0F FC 00 2A 04 54 00 01 00 69 07 FD 03 FC 00
205E0   F2 00 03 00 2C 29 46 2A 9C 00 FC 00 F4 00 03 00
205F0   B6 2F 3A 03 FC 00 24 00 A0 27 88 00 24 00 40 25
20600   88 00 F2 00 0B 00 F2 00 0F 00 F2 00 13 00 14 25
20610   26 00 A0 05 94 00 FC 00 42 2A 24 00 B8 09 9E 00
20620   20 00 24 00 90 05 88 00 62 00 60 00 BB 02 FC 00
20630   24 00 20 07 24 00 42 2A 38 00 B4 09 B0 00 58 00
20640   A3 02 FC 00 46 2A 24 00 46 2A 48 25 BA 00 9E 00
20650   FC 00 24 00 1C 25 88 00 24 00 46 2A 88 00 F2 00
20660   0B 00 F2 00 0F 00 F2 00 13 00 14 25 24 00 42 2A
20670   94 00 7A 00 FC 00 24 00 32 25 88 00 24 00 46 2A
20680   88 00 F2 00 0B 00 F2 00 0F 00 F2 00 13 00 14 25
20690   24 00 EC 05 24 00 42 2A 38 00 94 00 7A 00 FC 00
206A0   24 00 10 25 88 00 24 00 46 2A 88 00 F2 00 0B 00
206B0   F2 00 0F 00 F2 00 13 00 14 25 24 00 F2 05 24 00
206C0   42 2A 38 00 94 00 7A 00 FC 00 24 00 B8 09 88 00
206D0   24 00 46 2A 88 00 F2 00 0B 00 F2 00 0F 00 F2 00
206E0   13 00 14 25 24 00 04 07 24 00 42 2A 38 00 94 00
206F0   7A 00 FC 00 24 00 54 25 88 00 24 00 46 2A 88 00
20700   F2 00 0B 00 F2 00 0F 00 F2 00 13 00 14 25 24 00
20710   FE 06 24 00 42 2A 38 00 94 00 7A 00 FC 00 26 00
20720   BE 2F 8C 00 24 00 46 2A 88 00 F2 00 0B 00 F2 00
20730   0F 00 F2 00 13 00 14 25 24 00 F8 06 24 00 42 2A
20740   38 00 94 00 7A 00 FC 00 24 00 EC 25 88 00 24 00
20750   46 2A 88 00 F2 00 0B 00 F2 00 0F 00 F2 00 13 00
20760   14 25 26 00 78 08 24 00 42 2A 38 00 94 00 7A 00
20770   FC 00 24 00 40 25 88 00 24 00 46 2A 88 00 F2 00
20780   0B 00 F2 00 0F 00 F2 00 13 00 14 25 26 00 7E 08
20790   24 00 42 2A 38 00 94 00 7A 00 FC 00 24 00 5C 25
207A0   88 00 24 00 46 2A 88 00 F2 00 0B 00 F2 00 0F 00
207B0   F2 00 13 00 14 25 94 07 24 00 42 2A 38 00 94 00
207C0   7A 00 FC 00 24 00 48 25 88 00 24 00 46 2A 88 00
207D0   F2 00 0B 00 F2 00 0F 00 F2 00 13 00 14 25 68 07
207E0   24 00 42 2A 38 00 94 00 7A 00 FC 00 24 00 C0 26
207F0   88 00 24 00 46 2A 88 00 F2 00 0B 00 F2 00 0F 00
20800   F2 00 13 00 14 25 7E 07 24 00 42 2A 38 00 94 00
20810   7A 00 FC 00 24 00 38 26 88 00 24 00 46 2A 88 00
20820   F2 00 0B 00 F2 00 0F 00 F2 00 13 00 14 25 52 07
20830   24 00 42 2A 38 00 94 00 7A 00 FC 00 24 00 60 25
20840   88 00 24 00 46 2A 88 00 F2 00 0B 00 F2 00 0F 00
20850   F2 00 13 00 14 25 26 00 6C 08 24 00 42 2A 38 00
```

```
20860   94 00 7A 00 FC 00 24 00 58 25 88 00 24 00 46 2A
20870   88 00 F2 00 0B 00 F2 00 0F 00 F2 00 13 00 14 25
20880   26 00 72 08 24 00 42 2A 38 00 94 00 7A 00 FC 00
20890   24 00 6A 0A 88 00 24 00 46 2A 88 00 F2 00 0B 00
208A0   F2 00 0F 00 F2 00 13 00 14 25 24 00 1A 07 24 00
208B0   42 2A 38 00 94 00 7A 00 FC 00 24 00 50 25 88 00
208C0   24 00 46 2A 88 00 F2 00 0B 00 F2 00 0F 00 F2 00
208D0   13 00 14 25 24 00 20 07 24 00 42 2A 38 00 94 00
208E0   7A 00 FC 00 5A 00 FC 00 5E 00 FC 00 2E 2A 24 00
208F0   58 25 9E 00 70 05 24 00 B4 09 9E 00 FC 00 24 00
20900   22 00 DC 01 2E 00 11 00 B8 02 54 00 01 00 69 07
20910   FD 03 2A 00 05 00 02 00 FC 00 74 05 24 00 1C 25
20920   9E 00 F2 00 03 00 2C 29 FC 00 2E 2A 24 00 6A 0A
20930   9E 00 70 05 24 00 B4 09 9E 00 FC 00 24 00 22 00
20940   DC 01 2E 00 09 00 B8 02 2A 00 05 00 02 00 FC 00
20950   74 05 24 00 B4 09 9E 00 54 00 01 00 69 07 FD 03
20960   FC 00 F2 00 03 00 2C 29 F4 00 03 00 C8 01 54 00
20970   01 00 69 07 FD 03 FC 00 F2 00 03 00 2C 29 24 00
20980   48 25 88 00 24 00 64 26 88 00 24 00 B4 09 88 00
20990   F2 00 0F 00 F2 00 13 00 14 25 C4 2F 94 00 FC 00
209A0   D6 2F F4 00 03 00 F4 00 03 00 24 00 10 25 88 00
209B0   F4 00 03 00 F4 00 03 00 24 00 E0 2F 8E 00 EA 2A
209C0   26 06 24 00 B4 09 38 00 24 00 64 25 9E 00 FC 00
209D0   26 06 24 00 1C 25 38 00 24 00 AC 05 9E 00 FC 00
209E0   26 06 24 00 32 25 38 00 24 00 B0 05 9E 00 FC 00
209F0   26 06 24 00 10 25 38 00 24 00 B4 05 9E 00 FC 00
20A00   26 06 24 00 B8 09 38 00 24 00 B8 05 9E 00 FC 00
20A10   26 06 24 00 54 25 38 00 24 00 BC 05 9E 00 FC 00
20A20   26 06 24 00 B2 25 38 00 24 00 C4 05 9E 00 FC 00
20A30   26 06 24 00 EC 25 38 00 24 00 C0 05 9E 00 FC 00
20A40   26 06 24 00 4C 25 38 00 24 00 C8 05 9E 00 FC 00
20A50   26 06 24 00 5C 25 38 00 24 00 CC 05 9E 00 FC 00
20A60   26 06 24 00 48 25 38 00 24 00 D0 05 9E 00 FC 00
20A70   26 06 24 00 C0 26 38 00 24 00 D4 05 9E 00 FC 00
20A80   26 06 24 00 38 26 38 00 24 00 7C 05 9E 00 FC 00
20A90   26 06 24 00 60 25 38 00 24 00 84 05 9E 00 FC 00
20AA0   26 06 24 00 58 25 38 00 24 00 88 05 9E 00 FC 00
20AB0   26 06 24 00 6A 0A 38 00 24 00 94 05 9E 00 FC 00
20AC0   26 06 24 00 50 25 38 00 24 00 98 05 9E 00 FC 00
20AD0   26 06 24 00 A0 27 38 00 24 00 A4 05 9E 00 FC 00
20AE0   26 06 24 00 3C 26 38 00 24 00 80 09 9E 00 FC 00
20AF0   26 06 24 00 52 27 38 00 24 00 8A 09 9E 00 FC 00
20B00   26 06 24 00 AA 25 38 00 24 00 8E 09 9E 00 FC 00
20B10   42 2A 24 00 B4 09 9E 00 20 00 24 00 5C 25 88 00
20B20   62 00 60 00 6F 00 FC 00 46 2A 24 00 B4 09 9E 00
20B30   20 00 24 00 5C 25 88 00 62 00 60 00 53 00 FC 00
20B40   26 06 24 00 E4 2F 42 2A 48 25 BE 00 BA 00 46 2A
20B50   BA 00 38 00 24 00 44 06 24 00 42 2A 38 00 24 00
20B60   46 2A 38 00 9E 00 FC 00 26 06 24 00 E8 2F 42 2A
20B70   48 25 BE 00 BA 00 46 2A BA 00 38 00 24 00 4A 06
20B80   24 00 42 2A 38 00 24 00 46 2A 38 00 9E 00 FC 00
20B90   5E 00 FC 00 5E 00 FC 00 42 2A 24 00 B4 09 9E 00
20BA0   20 00 24 00 F6 2B 88 00 62 00 60 00 37 00 FC 00
20BB0   26 06 24 00 EC 2F 42 2A BA 00 38 00 24 00 D6 06
20BC0   24 00 42 2A 38 00 9E 00 FC 00 26 06 24 00 F0 2F
20BD0   42 2A BA 00 38 00 24 00 D0 06 24 00 42 2A 38 00
20BE0   9E 00 FC 00 5E 00 FC 00 42 2A 24 00 B4 09 9E 00
20BF0   20 00 24 00 1C 25 88 00 62 00 60 00 47 00 FC 00
20C00   46 2A 24 00 B4 09 9E 00 20 00 24 00 0A 26 88 00
20C10   62 00 60 00 2B 00 FC 00 26 06 24 00 1C 27 42 2A
20C20   52 27 BE 00 BA 00 46 2A BA 00 38 00 24 00 10 06
20C30   24 00 42 2A 38 00 24 00 46 2A 38 00 9E 00 FC 00
20C40   5E 00 FC 00 5E 00 FC 00 42 2A 24 00 B4 09 9E 00
20C50   20 00 24 00 B8 09 88 00 62 00 60 00 71 00 FC 00
20C60   46 2A 24 00 B4 09 9E 00 20 00 24 00 32 25 88 00
```

```
20C70   62 00 60 00 55 00 FC 00 4A 2A 24 00 B4 09 9E 00
20C80   20 00 24 00 1C 25 88 00 62 00 60 00 39 00 FC 00
20C90   26 06 24 00 F4 2F 42 2A B2 25 BE 00 BA 00 46 2A
20CA0   32 25 BE 00 BA 00 4A 2A BA 00 38 00 24 00 70 06
20CB0   24 00 42 2A 38 00 24 00 46 2A 38 00 24 00 4A 2A
20CC0   38 00 9E 00 FC 00 5E 00 FC 00 5E 00 FC 00 5E 00
20CD0   FC 00 42 2A 24 00 B4 09 9E 00 20 00 24 00 B8 09
20CE0   88 00 62 00 60 00 19 00 26 06 24 00 FC 2A 42 2A
20CF0   BA 00 38 00 24 00 BA 06 24 00 42 2A 38 00 9E 00
20D00   5E 00 FC 00 42 2A 24 00 B4 09 9E 00 20 00 24 00
20D10   52 27 88 00 62 00 60 00 47 00 FC 00 46 2A 24 00
20D20   B4 09 9E 00 20 00 24 00 0A 26 88 00 62 00 60 00
20D30   2B 00 FC 00 26 06 24 00 D2 2D 42 2A 52 27 BE 00
20D40   BA 00 46 2A BA 00 38 00 24 00 8E 06 24 00 42 2A
20D50   38 00 24 00 46 2A 38 00 9E 00 FC 00 5E 00 FC 00
20D60   5E 00 FC 00 F4 00 03 00 F4 00 03 00 24 00 10 25
20D70   88 00 24 00 1C 25 8E 00 26 06 CA 29 FC 00 F4 00
20D80   03 00 24 00 10 25 88 00 E2 2A FC 00 00 30 F4 00
20D90   03 00 F4 00 03 00 F4 00 03 00 F4 00 03 00 24 00
20DA0   10 25 88 00 F4 00 01 00 F4 00 01 00 F2 00 17 00
20DB0   F8 2F FC 00 42 2A 24 00 1C 25 9E 00 20 00 24 00
20DC0   F6 2B 88 00 62 00 60 00 11 00 10 25 AA 07 24 00
20DD0   42 2A 38 00 94 00 7A 00 1E 00 5E 00 FC 00 42 2A
20DE0   24 00 B4 09 9E 00 20 00 24 00 B8 09 88 00 62 00
20DF0   60 00 11 00 10 25 CC 07 24 00 42 2A 38 00 94 00
20E00   7A 00 1E 00 5E 00 FC 00 F4 00 03 00 24 00 10 25
20E10   88 00 E2 2A FC 00 08 30 F4 00 03 00 F4 00 03 00
20E20   24 00 10 25 88 00 F4 00 03 00 F4 00 03 00 24 00
20E30   10 30 8E 00 EA 2A FC 00 F4 00 03 00 F4 00 03 00
20E40   24 00 10 25 88 00 24 00 1C 25 8E 00 84 09 CA 29
20E50   FC 00 F4 00 03 00 24 00 10 25 88 00 E2 2A FC 00
20E60   54 00 01 00 69 07 FD 03 FC 00 F2 00 03 00 2C 29
20E70   16 00 0B 00 54 00 01 00 69 07 FD 03 FC 00 F4 00
20E80   03 00 14 30 3A 03 FC 00 42 2A 24 00 B4 09 9E 00
20E90   20 00 24 00 5C 25 88 00 62 00 60 00 41 00 FC 00
20EA0   24 00 82 25 42 2A BA 00 88 00 24 00 1C 30 88 00
20EB0   F2 00 0B 00 F2 00 0F 00 F2 00 13 00 14 25 28 00
20EC0   22 00 24 00 26 06 24 00 74 25 42 2A BA 00 38 00
20ED0   88 00 20 30 24 00 32 25 D8 00 94 00 FC 00 5E 00
20EE0   FC 00 24 00 3C 26 88 00 24 00 28 30 88 00 F2 00
20EF0   0B 00 F2 00 0F 00 F2 00 13 00 14 25 FC 00 2E 2A
20F00   24 00 A4 27 9E 00 70 05 24 00 B4 09 9E 00 FC 00
20F10   24 00 22 00 DC 01 2E 00 09 00 B8 02 2A 00 05 00
20F20   02 00 FC 00 7A 00 46 2A 26 00 28 00 DE 25 56 08
20F30   2C 30 8E 00 9E 00 FC 00 24 00 46 2A B4 09 AC 00
20F40   46 2A 48 25 B0 00 C8 00 2E 00 0B 00 54 00 01 00
20F50   69 07 FD 03 FC 00 24 00 3C 26 88 00 24 00 EA 27
20F60   88 00 F2 00 0B 00 F2 00 0F 00 F2 00 13 00 14 25
20F70   32 30 94 00 FC 00 24 00 3C 26 88 00 24 00 BE 25
20F80   88 00 F2 00 0B 00 F2 00 0F 00 F2 00 13 00 14 25
20F90   70 05 24 00 B4 09 9E 00 2E 2A 24 00 A6 25 9E 00
20FA0   FC 00 24 00 22 00 DC 01 2E 00 09 00 B8 02 2A 00
20FB0   05 00 02 00 FC 00 24 00 70 05 32 25 B4 00 2E 00
20FC0   0B 00 54 00 01 00 C1 21 1D 1B FC 00 26 06 24 00
20FD0   4E 30 46 2A BA 00 38 00 26 00 28 00 DE 25 56 08
20FE0   2C 30 8E 00 9E 00 FC 00 54 00 01 00 89 20 F1 19
20FF0   FC 00 02 00 B2 25 38 00 24 00 C4 05 9E 00 FC 00
21000   00 00 0D 0A 00 00 24 00 06 0A B4 09 AC 00 58 00
21010   E9 05 FC 00 D8 07 22 00 24 00 66 30 88 00 5E 30
21020   9E 00 1A 08 22 00 24 00 6A 30 88 00 5E 30 9E 00
21030   0E 08 22 00 24 00 6E 30 88 00 5E 30 9E 00 F4 00
21040   13 00 F2 00 05 00 3A 03 FC 00 D8 05 24 00 E4 2F
21050   9E 00 F4 00 01 00 F2 00 07 00 E2 2A FC 00 F2 2A
21060   F4 00 03 00 F4 00 03 00 24 00 1C 25 88 00 F4 00
21070   03 00 F4 00 03 00 24 00 FC 2A 8E 00 EA 2A FC 00
```

| | | | | | | | | | | | | | | | | |
|---|---|---|---|---|---|---|---|---|---|---|---|---|---|---|---|---|
| 21080 | 72 | 30 | F4 | 00 | 03 | 00 | F4 | 00 | 03 | 00 | 24 | 00 | 32 | 25 | 88 | 00 |
| 21090 | F4 | 00 | 03 | 00 | F4 | 00 | 03 | 00 | 24 | 00 | 0E | 2B | 8E | 00 | EA | 2A |
| 210A0 | FC | 00 | D6 | 2F | F4 | 00 | 03 | 00 | F4 | 00 | 03 | 00 | 24 | 00 | 10 | 25 |
| 210B0 | 88 | 00 | F4 | 00 | 03 | 00 | F4 | 00 | 03 | 00 | 24 | 00 | E0 | 2F | 8E | 00 |
| 210C0 | EA | 2A | FC | 00 | F4 | 00 | 03 | 00 | F4 | 00 | 03 | 00 | 24 | 00 | 10 | 25 |
| 210D0 | 88 | 00 | 24 | 00 | 1C | 25 | 8E | 00 | 26 | 06 | 16 | 26 | FC | 00 | 24 | 00 |
| 210E0 | 26 | 06 | 24 | 00 | B4 | 09 | 38 | 00 | 64 | 25 | AE | 00 | 2E | 00 | 15 | 00 |
| 210F0 | 26 | 06 | 9C | 00 | 26 | 06 | 24 | 00 | B4 | 09 | 38 | 00 | 24 | 00 | 64 | 25 |
| 21100 | 9E | 00 | FC | 00 | AC | 05 | 24 | 00 | 26 | 06 | 24 | 00 | 1C | 25 | 38 | 00 |
| 21110 | 9E | 00 | FC | 00 | B0 | 05 | 24 | 00 | 26 | 06 | 24 | 00 | 32 | 25 | 38 | 00 |
| 21120 | 9E | 00 | FC | 00 | B4 | 05 | 24 | 00 | 26 | 06 | 24 | 00 | 10 | 25 | 38 | 00 |
| 21130 | 9E | 00 | FC | 00 | B8 | 05 | 24 | 00 | 26 | 06 | 24 | 00 | B8 | 07 | 38 | 00 |
| 21140 | 9E | 00 | FC | 00 | BC | 05 | 24 | 00 | 26 | 06 | 24 | 00 | 54 | 25 | 38 | 00 |
| 21150 | 9E | 00 | FC | 00 | C4 | 05 | 24 | 00 | 26 | 06 | 24 | 00 | B2 | 25 | 38 | 00 |
| 21160 | 9E | 00 | FC | 00 | C0 | 05 | 24 | 00 | 26 | 06 | 24 | 00 | EC | 25 | 38 | 00 |
| 21170 | 9E | 00 | FC | 00 | C8 | 05 | 24 | 00 | 26 | 06 | 24 | 00 | 4C | 25 | 38 | 00 |
| 21180 | 9E | 00 | FC | 00 | CC | 05 | 24 | 00 | 26 | 06 | 24 | 00 | 5C | 25 | 38 | 00 |
| 21190 | 9E | 00 | FC | 00 | D0 | 05 | 24 | 00 | 26 | 06 | 24 | 00 | 48 | 25 | 38 | 00 |
| 211A0 | 9E | 00 | FC | 00 | D4 | 05 | 24 | 00 | 26 | 06 | 24 | 00 | C0 | 26 | 38 | 00 |
| 211B0 | 9E | 00 | FC | 00 | 7C | 05 | 24 | 00 | 26 | 06 | 24 | 00 | 38 | 26 | 38 | 00 |
| 211C0 | 9E | 00 | FC | 00 | 84 | 05 | 24 | 00 | 26 | 06 | 24 | 00 | 60 | 25 | 38 | 00 |
| 211D0 | 9E | 00 | FC | 00 | 88 | 05 | 24 | 00 | 26 | 06 | 24 | 00 | 58 | 25 | 38 | 00 |
| 211E0 | 9E | 00 | FC | 00 | 94 | 05 | 24 | 00 | 26 | 06 | 24 | 00 | 6A | 0A | 38 | 00 |
| 211F0 | 9E | 00 | FC | 00 | 98 | 05 | 24 | 00 | 26 | 06 | 24 | 00 | 50 | 25 | 38 | 00 |
| 21200 | 9E | 00 | FC | 00 | A4 | 05 | 24 | 00 | 26 | 06 | 24 | 00 | A0 | 27 | 38 | 00 |
| 21210 | 9E | 00 | 24 | 00 | A4 | 05 | B4 | 09 | AC | 00 | 2E | 00 | 0B | 00 | A4 | 05 |
| 21220 | 24 | 00 | 5C | 26 | 9E | 00 | FC | 00 | 80 | 09 | 24 | 00 | 26 | 06 | 24 | 00 |
| 21230 | 3C | 26 | 38 | 00 | 9E | 00 | FC | 00 | 8A | 09 | 24 | 00 | 26 | 06 | 24 | 00 |
| 21240 | 52 | 27 | 38 | 00 | 9E | 00 | FC | 00 | 8E | 09 | 24 | 00 | 26 | 06 | 24 | 00 |
| 21250 | AA | 25 | 38 | 00 | 9E | 00 | FC | 00 | 56 | 30 | 24 | 00 | B4 | 09 | 9E | 00 |
| 21260 | 20 | 00 | 24 | 00 | 5C | 25 | 88 | 00 | 62 | 00 | 60 | 00 | 6D | 00 | FC | 00 |
| 21270 | 3A | 30 | 24 | 00 | B4 | 09 | 9E | 00 | 20 | 00 | 24 | 00 | 5C | 25 | 88 | 00 |
| 21280 | 62 | 00 | 60 | 00 | 53 | 00 | FC | 00 | 44 | 06 | 24 | 00 | 56 | 30 | 38 | 00 |
| 21290 | 24 | 00 | 5A | 30 | 38 | 00 | 24 | 00 | 26 | 06 | 24 | 00 | E4 | 2F | 56 | 30 |
| 212A0 | 48 | 25 | BE | 00 | BA | 00 | 5A | 30 | BA | 00 | 38 | 00 | 9E | 00 | FC | 00 |
| 212B0 | 4A | 06 | 24 | 00 | 56 | 30 | 38 | 00 | 24 | 00 | 5A | 30 | 38 | 00 | 24 | 00 |
| 212C0 | 26 | 06 | 24 | 00 | E8 | 2F | 56 | 30 | 48 | 25 | BE | 00 | BA | 00 | 5A | 30 |
| 212D0 | BA | 00 | 38 | 00 | 9E | 00 | FC | 00 | 5E | 00 | 5E | 00 | FC | 00 | 56 | 30 |
| 212E0 | 24 | 00 | B4 | 09 | 9E | 00 | 20 | 00 | 24 | 00 | F6 | 2B | 88 | 00 | 62 | 00 |
| 212F0 | 60 | 00 | 37 | 00 | FC | 00 | D6 | 06 | 24 | 00 | 56 | 30 | 38 | 00 | 24 | 00 |
| 21300 | 26 | 06 | 24 | 00 | EC | 2F | 56 | 30 | BA | 00 | 38 | 00 | 9E | 00 | FC | 00 |
| 21310 | D0 | 06 | 24 | 00 | 56 | 30 | 38 | 00 | 24 | 00 | 26 | 06 | 24 | 00 | F0 | 2F |
| 21320 | 56 | 30 | BA | 00 | 38 | 00 | 9E | 00 | FC | 00 | 5E | 00 | FC | 00 | 56 | 30 |
| 21330 | 24 | 00 | B4 | 09 | 9E | 00 | 20 | 00 | 24 | 00 | 1C | 25 | 88 | 00 | 62 | 00 |
| 21340 | 60 | 00 | 47 | 00 | FC | 00 | 5A | 30 | 24 | 00 | B4 | 09 | 9E | 00 | 20 | 00 |
| 21350 | 24 | 00 | 0A | 26 | 88 | 00 | 62 | 00 | 60 | 00 | 2B | 00 | FC | 00 | 10 | 06 |
| 21360 | 24 | 00 | 56 | 30 | 38 | 00 | 24 | 00 | 5A | 30 | 38 | 00 | 24 | 00 | 26 | 06 |
| 21370 | 24 | 00 | 1C | 27 | 56 | 30 | 52 | 27 | BE | 00 | BA | 00 | 5A | 30 | BA | 00 |
| 21380 | 38 | 00 | 9E | 00 | FC | 00 | 5E | 00 | FC | 00 | 5E | 00 | FC | 00 | 56 | 30 |
| 21390 | 24 | 00 | B4 | 09 | 9E | 00 | 20 | 00 | 24 | 00 | B8 | 09 | 88 | 00 | 62 | 00 |
| 213A0 | 60 | 00 | 71 | 00 | FC | 00 | 5A | 30 | 24 | 00 | B4 | 09 | 9E | 00 | 20 | 00 |
| 213B0 | 24 | 00 | 32 | 25 | 88 | 00 | 62 | 00 | 60 | 00 | 55 | 00 | FC | 00 | 52 | 30 |
| 213C0 | 24 | 00 | B4 | 09 | 9E | 00 | 20 | 00 | 24 | 00 | 1C | 25 | 88 | 00 | 62 | 00 |
| 213D0 | 60 | 00 | 39 | 00 | FC | 00 | 70 | 06 | 24 | 00 | 56 | 30 | 38 | 00 | 24 | 00 |
| 213E0 | 5A | 30 | 38 | 00 | 24 | 00 | 52 | 30 | 38 | 00 | 24 | 00 | 26 | 06 | 24 | 00 |
| 213F0 | F4 | 2F | 56 | 30 | B2 | 25 | BE | 00 | BA | 00 | 5A | 30 | 32 | 25 | BE | 00 |
| 21400 | BA | 00 | 52 | 30 | BA | 00 | 38 | 00 | 9E | 00 | FC | 00 | 5E | 00 | FC | 00 |
| 21410 | 5E | 00 | FC | 00 | 5E | 00 | FC | 00 | 56 | 30 | 24 | 00 | B4 | 09 | 9E | 00 |
| 21420 | 20 | 00 | 24 | 00 | B8 | 09 | 88 | 00 | 62 | 00 | 60 | 00 | 1D | 00 | FC | 00 |
| 21430 | BA | 06 | 24 | 00 | 56 | 30 | 38 | 00 | 24 | 00 | 26 | 06 | 24 | 00 | FC | 2A |
| 21440 | 56 | 30 | BA | 00 | 38 | 00 | 9E | 00 | FC | 00 | 5E | 00 | FC | 00 | 56 | 30 |
| 21450 | 24 | 00 | B4 | 09 | 9E | 00 | 20 | 00 | 24 | 00 | 52 | 27 | 58 | 00 | 62 | 00 |
| 21460 | 60 | 00 | 47 | 00 | FC | 00 | 5A | 30 | 24 | 00 | B4 | 09 | 9E | 00 | 20 | 00 |
| 21470 | 24 | 00 | 0A | 26 | 88 | 00 | 62 | 00 | 60 | 00 | 2B | 00 | FC | 00 | 8E | 06 |
| 21480 | 24 | 00 | 56 | 30 | 38 | 00 | 24 | 00 | 5A | 30 | 38 | 00 | 24 | 00 | 26 | 06 |

| | | | | | | | | | | | | | | | | |
|---|---|---|---|---|---|---|---|---|---|---|---|---|---|---|---|---|
| 21490 | 24 | 00 | D2 | 2D | 56 | 30 | 52 | 27 | BE | 00 | BA | 00 | 5A | 30 | BA | 00 |
| 214A0 | 38 | 00 | 9E | 00 | FC | 00 | 5E | 00 | FC | 00 | 5E | 00 | FC | 00 | F4 | 00 |
| 214B0 | 03 | 00 | 24 | 00 | 10 | 25 | 88 | 00 | E2 | 2A | FC | 00 | 08 | 30 | F4 | 00 |
| 214C0 | 03 | 00 | F4 | 00 | 03 | 00 | 24 | 00 | 10 | 25 | 88 | 00 | F4 | 00 | 03 | 00 |
| 214D0 | F4 | 00 | 03 | 00 | 24 | 00 | 10 | 30 | 8E | 00 | EA | 2A | FC | 00 | F4 | 00 |
| 214E0 | 03 | 00 | F4 | 00 | 03 | 00 | 24 | 00 | 10 | 25 | 88 | 00 | 24 | 00 | 1C | 25 |
| 214F0 | 8E | 00 | 84 | 09 | 16 | 26 | FC | 00 | F4 | 00 | 03 | 00 | 24 | 00 | 10 | 25 |
| 21500 | 88 | 00 | E2 | 2A | FC | 00 | 56 | 30 | 24 | 00 | B4 | 09 | 9E | 00 | 20 | 00 |
| 21510 | 24 | 00 | 4C | 2E | 88 | 00 | 62 | 00 | 60 | 00 | 0F | 00 | F4 | 00 | 03 | 00 |
| 21520 | 24 | 00 | 56 | 30 | 88 | 00 | D2 | 00 | 6C | 03 | 5E | 00 | FC | 00 | 16 | 00 |
| 21530 | 13 | 00 | 80 | 30 | 94 | 00 | 24 | 00 | 64 | 00 | 3C | 00 | 94 | 00 | 7A | 00 |
| 21540 | F8 | 00 | FC | 00 | 8E | 30 | F4 | 00 | 03 | 00 | F4 | 00 | 03 | 00 | 24 | 00 |
| 21550 | B8 | 09 | 88 | 00 | F4 | 00 | 03 | 00 | F4 | 00 | 03 | 00 | 24 | 00 | 96 | 30 |
| 21560 | 8E | 00 | EA | 2A | FC | 00 | 00 | 30 | F4 | 00 | 03 | 00 | F4 | 00 | 05 | 00 |
| 21570 | F4 | 00 | 03 | 00 | F4 | 00 | 03 | 00 | 24 | 00 | 54 | 25 | 88 | 00 | F4 | 00 |
| 21580 | 01 | 00 | F4 | 00 | 01 | 00 | F2 | 00 | 17 | 00 | F8 | 2F | FC | 00 | 56 | 30 |
| 21590 | 24 | 00 | 1C | 25 | 9E | 00 | 20 | 00 | 24 | 00 | F6 | 2B | 88 | 00 | 62 | 00 |
| 215A0 | 60 | 00 | 11 | 00 | 4A | 00 | 54 | 25 | 72 | 00 | AA | 07 | 24 | 00 | 56 | 30 |
| 215B0 | 38 | 00 | 78 | 00 | 5E | 00 | FC | 00 | 56 | 30 | 24 | 00 | B4 | 09 | 9E | 00 |
| 215C0 | 20 | 00 | 24 | 00 | B8 | 09 | 88 | 00 | 62 | 00 | 60 | 00 | 15 | 00 | FC | 00 |
| 215D0 | 4A | 00 | 54 | 25 | 72 | 00 | CC | 07 | 24 | 00 | 56 | 30 | 38 | 00 | 78 | 00 |
| 215E0 | FC | 00 | 5E | 00 | FC | 00 | F4 | 00 | 03 | 00 | 24 | 00 | 54 | 25 | 88 | 00 |
| 215F0 | E2 | 2A | 4E | 00 | FC | 00 | 90 | 02 | FC | 00 | 5A | 00 | FC | 00 | 24 | 00 |
| 21600 | 32 | 25 | 88 | 00 | D2 | 00 | 24 | 00 | 9A | 30 | 88 | 00 | D2 | 00 | F4 | 00 |
| 21610 | 03 | 00 | FE | 02 | 24 | 00 | B8 | 09 | 88 | 00 | D2 | 00 | 24 | 00 | 9A | 30 |
| 21620 | 88 | 00 | D2 | 00 | F4 | 00 | 01 | 00 | FE | 02 | 80 | 05 | 24 | 00 | 1C | 25 |
| 21630 | 9E | 00 | FC | 00 | F4 | 00 | 05 | 00 | 24 | 00 | 64 | 25 | 88 | 00 | D2 | 00 |
| 21640 | F2 | 00 | 07 | 00 | F4 | 00 | 01 | 00 | 24 | 00 | 10 | 25 | 88 | 00 | D2 | 00 |
| 21650 | 78 | 01 | F4 | 00 | 05 | 00 | 24 | 00 | 64 | 25 | 88 | 00 | D2 | 00 | 24 | 00 |
| 21660 | B4 | 09 | 88 | 00 | D2 | 00 | F4 | 00 | 03 | 00 | 24 | 00 | 10 | 25 | 88 | 00 |
| 21670 | D2 | 00 | 78 | 01 | FC | 00 | 5A | 30 | 24 | 00 | B4 | 09 | 9E | 00 | 20 | 00 |
| 21680 | 24 | 00 | 64 | 25 | 88 | 00 | 62 | 00 | 60 | 00 | 49 | 00 | FC | 00 | F4 | 00 |
| 21690 | 03 | 00 | 24 | 00 | 64 | 25 | 88 | 00 | D2 | 00 | 24 | 00 | 5A | 30 | 88 | 00 |
| 216A0 | D2 | 00 | F4 | 00 | 01 | 00 | 24 | 00 | 10 | 25 | 88 | 00 | D2 | 00 | 78 | 01 |
| 216B0 | F4 | 00 | 03 | 00 | 24 | 00 | 64 | 25 | 88 | 00 | D2 | 00 | 24 | 00 | 5A | 30 |
| 216C0 | 88 | 00 | D2 | 00 | F4 | 00 | 03 | 00 | 24 | 00 | 10 | 25 | 88 | 00 | D2 | 00 |
| 216D0 | 78 | 01 | FC | 00 | 5E | 00 | FC | 00 | F4 | 00 | 07 | 00 | 24 | 00 | 1C | 25 |
| 216E0 | 88 | 00 | D2 | 00 | F2 | 00 | 07 | 00 | F4 | 00 | 01 | 00 | 24 | 00 | 10 | 25 |
| 216F0 | 88 | 00 | D2 | 00 | 78 | 01 | F4 | 00 | 07 | 00 | 24 | 00 | 1C | 25 | 88 | 00 |
| 21700 | D2 | 00 | 24 | 00 | B4 | 09 | 88 | 00 | D2 | 00 | F4 | 00 | 03 | 00 | 24 | 00 |
| 21710 | 10 | 25 | 88 | 00 | D2 | 00 | 78 | 01 | FC | 00 | 24 | 00 | 54 | 25 | 88 | 00 |
| 21720 | D2 | 00 | 24 | 00 | 9A | 30 | 88 | 00 | D2 | 00 | F4 | 00 | 01 | 00 | FE | 02 |
| 21730 | 24 | 00 | 1C | 25 | 88 | 00 | D2 | 00 | 24 | 00 | 9E | 30 | 88 | 00 | D2 | 00 |
| 21740 | F4 | 00 | 03 | 00 | FE | 02 | FC | 00 | 56 | 30 | 24 | 00 | 1C | 25 | 9E | 00 |
| 21750 | 20 | 00 | 24 | 00 | A2 | 30 | 88 | 00 | 24 | 00 | 32 | 25 | 88 | 00 | 60 | 00 |
| 21760 | 57 | 00 | FC | 00 | 24 | 00 | A4 | 05 | 24 | 00 | A2 | 25 | 32 | 00 | 24 | 00 |
| 21770 | A4 | 05 | 24 | 00 | 4C | 25 | 32 | 00 | 24 | 00 | A4 | 05 | 24 | 00 | 10 | 25 |
| 21780 | 32 | 00 | 24 | 00 | A4 | 05 | 24 | 00 | 56 | 30 | 32 | 00 | FC | 00 | 24 | 00 |
| 21790 | A4 | 05 | 24 | 00 | A2 | 25 | 32 | 00 | 24 | 00 | A4 | 05 | 24 | 00 | B4 | 09 |
| 217A0 | 32 | 00 | 24 | 00 | A4 | 05 | 24 | 00 | 10 | 25 | 32 | 00 | 24 | 00 | A4 | 05 |
| 217B0 | 24 | 00 | 56 | 30 | 32 | 00 | FC | 00 | 5E | 00 | F4 | 00 | 03 | 00 | 24 | 00 |
| 217C0 | 9E | 30 | 88 | 00 | D2 | 00 | 6C | 03 | 24 | 00 | B8 | 09 | 88 | 00 | D2 | 00 |
| 217D0 | 24 | 00 | 9A | 30 | 88 | 00 | D2 | 00 | F4 | 00 | 01 | 00 | FE | 02 | FC | 00 |
| 217E0 | 56 | 30 | 24 | 00 | B4 | 09 | 9E | 00 | 20 | 00 | 24 | 00 | EA | 27 | 88 | 00 |
| 217F0 | 62 | 00 | 60 | 00 | 33 | 00 | FC | 00 | F4 | 00 | 03 | 00 | 24 | 00 | 56 | 30 |
| 21800 | 32 | 25 | BE | 00 | 88 | 00 | D2 | 00 | 24 | 00 | 56 | 30 | 4C | 25 | BE | 00 |
| 21810 | B2 | 25 | BA | 00 | 88 | 00 | D2 | 00 | F4 | 00 | 01 | 00 | 24 | 00 | 10 | 25 |
| 21820 | 88 | 00 | D2 | 00 | 78 | 01 | FC | 00 | 5E | 00 | FC | 00 | 56 | 30 | 24 | 00 |
| 21830 | B8 | 09 | 9E | 00 | 20 | 00 | 24 | 00 | F6 | 2B | 88 | 00 | 62 | 00 | 60 | 00 |
| 21840 | 67 | 00 | FC | 00 | 24 | 00 | D6 | 06 | 24 | 00 | 56 | 30 | 38 | 00 | B4 | 09 |
| 21850 | AC | 00 | 2E | 00 | 0B | 00 | 54 | 00 | 01 | 00 | A7 | 08 | 09 | 07 | FC | 00 |
| 21860 | E2 | 06 | 24 | 00 | 56 | 30 | 38 | 00 | 24 | 00 | 56 | 30 | B8 | 09 | C0 | 00 |
| 21870 | 32 | 25 | BE | 00 | 9E | 00 | DC | 06 | 24 | 00 | 56 | 30 | 38 | 00 | 24 | 00 |
| 21880 | 56 | 30 | B8 | 09 | C2 | 00 | 9E | 00 | 90 | 05 | 24 | 00 | 56 | 30 | 9E | 00 |
| 21890 | FC | 00 | 24 | 00 | 90 | 05 | B4 | 09 | AC | 00 | 2E | 00 | 0B | 00 | 90 | 05 |
| 218A0 | 24 | 00 | F6 | 2B | 9E | 00 | FC | 00 | 5E | 00 | FC | 00 | 56 | 30 | 24 | 00 |

```
218B0   B8 09 9E 00 20 00 24 00 90 05 88 00 24 00 BE 09
218C0   88 00 60 00 77 03 FC 00 24 00 D6 06 24 00 56 30
218D0   38 00 B4 09 AC 00 2E 00 0B 00 54 00 01 00 38 0C
218E0   49 08 FC 00 24 00 D6 06 24 00 56 30 38 00 48 25
218F0   AC 00 2E 00 47 00 24 00 50 25 88 00 D2 00 24 00
21900   E2 06 24 00 56 30 38 00 1C 25 BA 00 88 00 D2 00
21910   F4 00 01 00 FE 02 24 00 1C 27 88 00 5A 01 24 00
21920   C4 05 88 00 D2 00 24 00 E2 06 24 00 56 30 38 00
21930   88 00 D2 00 F4 00 01 00 FE 02 FC 00 24 00 D6 06
21940   24 00 56 30 38 00 38 26 AC 00 58 00 71 00 FC 00
21950   A6 30 24 00 E2 06 24 00 56 30 38 00 88 00 D2 00
21960   F2 00 07 00 08 03 AE 30 24 00 E2 06 24 00 56 30
21970   38 00 88 00 D2 00 F2 00 07 00 08 03 B6 30 24 00
21980   E2 06 24 00 56 30 38 00 88 00 D2 00 F2 00 07 00
21990   08 03 24 00 E4 2F 88 00 5A 01 FC 00 24 00 B8 09
219A0   88 00 D2 00 24 00 E2 06 24 00 56 30 38 00 1C 25
219B0   BA 00 88 00 D2 00 F4 00 01 00 FE 02 FC 00 5A 00
219C0   FC 00 24 00 D6 06 24 00 56 30 38 00 60 25 AC 00
219D0   2E 00 4B 00 24 00 50 25 88 00 D2 00 24 00 E2 06
219E0   24 00 56 30 38 00 1C 25 BA 00 88 00 D2 00 F4 00
219F0   01 00 FE 02 24 00 E4 2F 88 00 5A 01 24 00 24 00
21A00   C0 05 D0 00 88 00 D2 00 24 00 E2 06 24 00 56 30
21A10   38 00 88 00 D2 00 F4 00 01 00 FE 02 FC 00 24 00
21A20   D6 06 24 00 56 30 38 00 58 25 AC 00 58 00 41 00
21A30   FC 00 24 00 50 25 88 00 D2 00 24 00 E2 06 24 00
21A40   56 30 38 00 1C 25 BA 00 88 00 D2 00 F4 00 01 00
21A50   FE 02 24 00 84 05 88 00 D2 00 24 00 E2 06 24 00
21A60   56 30 38 00 88 00 D2 00 F4 00 01 00 FE 02 FC 00
21A70   5A 00 FC 00 24 00 D6 06 24 00 56 30 38 00 AA 25
21A80   AC 00 2E 00 1F 00 24 00 A0 27 88 00 D2 00 24 00
21A90   E2 06 24 00 56 30 38 00 88 00 D2 00 F4 00 01 00
21AA0   FE 02 FC 00 24 00 D6 06 24 00 56 30 38 00 68 25
21AB0   AC 00 2E 00 3F 00 24 00 B4 09 88 00 D2 00 24 00
21AC0   E2 06 24 00 56 30 38 00 88 00 D2 00 F4 00 01 00
21AD0   FE 02 24 00 54 09 88 00 D2 00 24 00 E2 06 24 00
21AE0   56 30 38 00 1C 25 BA 00 88 00 D2 00 F4 00 01 00
21AF0   FE 02 FC 00 24 00 D6 06 24 00 56 30 38 00 2A 28
21B00   AC 00 2E 00 23 00 24 00 50 25 88 00 D2 00 24 00
21B10   E2 06 24 00 56 30 38 00 1C 25 BA 00 88 00 D2 00
21B20   F4 00 01 00 FE 02 FC 00 24 00 D6 06 24 00 56 30
21B30   38 00 6C 25 AC 00 2E 00 0D 00 24 00 56 30 88 00
21B40   D2 00 CC 02 FC 00 24 00 D6 06 24 00 56 30 38 00
21B50   70 25 AC 00 2E 00 71 00 24 00 50 25 88 00 D2 00
21B60   24 00 E2 06 24 00 56 30 38 00 1C 25 BA 00 88 00
21B70   D2 00 F4 00 01 00 FE 02 5A 30 24 00 74 25 9E 00
21B80   20 00 24 00 78 25 88 00 62 00 60 00 23 00 24 00
21B90   26 06 24 00 5A 30 38 00 88 00 D2 00 24 00 E2 06
21BA0   24 00 56 30 38 00 88 00 D2 00 F4 00 03 00 FE 02
21BB0   5E 00 F4 00 01 00 24 00 E2 06 24 00 56 30 38 00
21BC0   88 00 D2 00 6C 03 FC 00 24 00 D6 06 24 00 56 30
21BD0   38 00 32 25 AC 00 2E 00 63 00 24 00 50 25 88 00
21BE0   D2 00 24 00 22 00 24 00 56 30 88 00 D2 00 4A 02
21BF0   1C 25 BA 00 88 00 D2 00 F4 00 01 00 FE 02 24 00
21C00   1C 25 88 00 D2 00 24 00 22 00 24 00 56 30 88 00
21C10   D2 00 4A 02 88 00 D2 00 F4 00 01 00 FE 02 24 00
21C20   50 25 88 00 D2 00 24 00 E2 06 24 00 56 30 38 00
21C30   88 00 D2 00 F4 00 01 00 FE 02 FC 00 5E 00 FC 00
21C40   A0 05 9C 00 8C 05 9C 00 A4 06 9C 00 FC 00 60 05
21C50   24 00 B4 09 9E 00 20 00 24 00 90 05 88 00 62 00
21C60   60 00 0F 00 FC 00 F4 00 03 00 F2 00 05 00 D2 01
21C70   FC 00 5E 00 FC 00 02 00 10 25 88 00 D2 00 78 01
21C80   00 00 1C 0A 01 00 60 05 20 07 24 00 08 00 38 00
21C90   9C 00 EC 05 24 00 08 00 38 00 9C 00 04 07 24 00
21CA0   08 00 38 00 9C 00 F8 06 24 00 08 00 38 00 9C 00
21CB0   FE 06 24 00 08 00 38 00 9C 00 1A 07 24 00 08 00
```

```
21CC0   38 00 9C 00 F2 05 24 00 08 00 38 00 9C 00 FC 00
21CD0   6C 08 24 00 08 00 38 00 9C 00 72 08 24 00 08 00
21CE0   38 00 9C 00 7E 07 24 00 08 00 38 00 9C 00 52 07
21CF0   24 00 08 00 38 00 9C 00 94 07 24 00 08 00 36 00
21D00   9C 00 68 07 24 00 08 00 38 00 9C 00 78 08 24 00
21D10   08 00 38 00 9C 00 7E 08 24 00 08 00 38 00 9C 00
21D20   FC 00 02 00 A2 30 88 00 24 00 32 25 88 00 60 00
21D30   00 00 F4 00 03 00 F0 30 FC 00 24 00 CE 30 8E 00
21D40   BE 30 24 00 12 28 88 00 D2 30 FC 00 48 46 24 00
21D50   22 00 DA 30 1C 25 C6 00 9E 00 FC 00 F4 00 05 00
21D60   F0 30 24 00 48 46 82 00 02 00 A4 05 24 00 84 09
21D70   00 00 0C 00 16 00 11 00 E2 30 94 00 7A 00 F4 00
21D80   05 00 F0 30 F8 00 FC 00 24 00 AA 07 24 00 1C 25
21D90   38 00 FE 30 AC 00 74 05 1C 25 AE 00 C6 00 2E 00
21DA0   05 00 02 00 FC 00 26 00 22 00 24 00 54 25 88 00
21DB0   0C 31 14 31 B0 00 22 00 24 00 BE 25 88 00 D2 00
21DC0   F2 00 05 00 32 01 C8 00 84 00 2E 00 05 00 02 00
21DD0   FC 00 24 00 22 00 24 00 1A 31 88 00 D2 00 F2 00
21DE0   05 00 32 01 2E 00 35 00 F4 00 03 00 F4 00 03 00
21DF0   24 00 32 25 88 00 24 00 EC 05 24 00 60 05 38 00
21E00   8E 00 26 09 16 26 54 25 24 00 1C 25 8A 00 D0 00
21E10   26 09 BA 08 94 00 7A 00 1E 00 FC 00 54 25 24 00
21E20   1C 25 8A 00 D0 00 06 00 94 00 24 00 B8 09 8A 00
21E30   D0 00 B6 07 94 00 24 00 6A 0A 8A 00 D0 00 94 07
21E40   24 00 60 05 38 00 94 00 24 00 AC 27 8A 00 D0 00
21E50   22 00 F6 26 94 00 24 00 54 26 8A 00 D0 00 24 00
21E60   FE 06 24 00 60 05 38 00 94 00 24 00 50 26 8A 00
21E70   D0 00 24 00 60 05 94 00 24 00 6A 30 8A 00 D0 00
21E80   24 00 EC 05 24 00 60 05 38 00 94 00 24 00 1E 31
21E90   8A 00 D0 00 26 00 A0 05 7E 08 24 00 60 05 38 00
21EA0   BC 00 94 00 1E 00 FC 00 24 00 06 00 96 27 AE 00
21EB0   2E 00 19 00 54 25 24 00 40 2E 8A 00 D0 00 68 07
21EC0   24 00 60 05 38 00 94 00 1E 00 FC 00 24 00 06 00
21ED0   96 27 AC 00 22 00 24 00 22 31 88 00 D2 00 F2 00
21EE0   05 00 32 01 C6 00 2E 00 19 00 54 25 24 00 26 31
21EF0   8A 00 D0 00 7E 07 24 00 60 05 38 00 94 00 1E 00
21F00   FC 00 54 25 7A 00 1E 00 FC 00 24 00 10 25 88 00
21F10   00 25 24 00 1C 25 88 00 24 00 BE 29 88 00 F2 00
21F20   0B 00 F2 00 0F 00 F2 00 13 00 14 25 26 00 22 00
21F30   24 00 54 25 88 00 0C 31 94 00 24 00 1C 25 88 00
21F40   00 25 F4 00 05 00 F0 30 FC 00 02 00 B6 30 24 00
21F50   00 00 F4 00 03 00 F4 00 03 00 24 00 32 25 88 00
21F60   24 00 EC 05 24 00 60 05 38 00 8E 00 26 09 16 26
21F70   FC 00 26 09 D2 08 26 00 26 09 D2 08 1C 25 BA 00
21F80   9E 00 26 00 7E 08 24 00 60 05 38 00 B4 09 AC 00
21F90   84 00 2E 00 1F 00 7E 08 24 00 60 05 38 00 26 00
21FA0   A0 05 9E 00 94 07 24 00 60 05 38 00 22 00 F6 26
21FB0   9E 00 FC 00 26 09 CA 08 26 00 26 09 CA 08 A0 05
21FC0   BA 00 7E 08 24 00 60 05 38 00 BC 00 9E 00 FC 00
21FD0   F4 00 03 00 F4 00 03 00 24 00 32 25 88 00 24 00
21FE0   EC 05 24 00 60 05 36 00 8E 00 26 09 CA 29 FC 00
21FF0   02 00 24 00 56 30 38 00 58 25 AC 00 58 00 41 00
22000   00 00 0C 00 2A 31 24 00 1C 25 9E 00 20 00 24 00
22010   06 00 A0 00 88 00 62 00 60 00 19 00 FC 00 24 00
22020   28 00 28 00 06 00 24 00 2A 31 24 00 1C 25 D6 00
22030   CA 00 94 00 5E 00 FC 00 02 00 01 00 FE 02 FC 00
22040   00 00 08 00 EC 05 24 00 60 05 38 00 24 00 22 00
22050   26 00 06 00 88 00 3C 01 9E 00 FC 00 24 00 EC 05
22060   24 00 60 05 38 00 1C 25 B4 00 2E 00 11 00 EC 05
22070   24 00 60 05 38 00 24 00 0E 28 9E 00 FC 00 C2 02
22080   FC 00 02 00 3F 00 24 00 B4 09 88 00 D2 00 24 00
22090   73 01 2E 31 9C 00 F2 00 03 00 2C 29 3A 31 94 00
220A0   7A 00 FC 00 4C 31 94 00 36 31 26 00 28 00 6A 00
220B0   1C 25 CE 00 8E 00 9E 00 FC 00 24 00 36 31 B4 09
220C0   AC 00 2E 00 0F 00 36 31 24 00 1C 25 9E 00 2A 00
```

```
220D0   17 00 24 00 36 31 10 25 B0 00 2E 00 0B 00 54 00
220E0   01 00 01 00 15 00 FC 00 24 00 36 31 94 00 7A 00
220F0   FC 00 60 31 94 00 24 00 28 00 6A 00 1C 25 CE 00
22100   CA 00 7E 31 C6 00 7E 31 AE 00 2E 00 23 00 24 00
22110   32 25 88 00 D2 00 24 00 9A 30 88 00 D2 00 F4 00
22120   01 00 FE 02 82 31 94 00 7A 00 2A 00 1F 00 24 00
22130   10 25 88 00 D2 00 24 00 9A 30 88 00 D2 00 F4 00
22140   01 00 FE 02 88 31 94 00 7A 00 FC 00 24 00 10 25
22150   88 00 D2 00 24 00 36 31 1C 25 BC 00 AC 27 BE 00
22160   88 00 D2 00 F4 00 03 00 FE 02 FC 00 58 00 8D 00
22170   FC 00 16 00 09 00 42 00 00 00 F8 00 FC 00 32 31
22180   24 00 98 00 9E 00 FC 00 24 00 A4 05 24 00 32 31
22190   32 00 FC 00 24 00 24 00 A8 05 30 00 32 31 AE 00
221A0   2E 00 4F 00 2E 31 26 00 2E 31 1C 25 BA 00 9E 00
221B0   8E 31 94 00 28 00 22 00 24 00 32 31 88 00 20 30
221C0   24 00 32 25 D8 00 94 00 A0 31 94 00 28 00 22 00
221D0   24 00 24 00 A8 05 30 00 88 00 20 30 24 00 32 25
221E0   D8 00 94 00 AE 31 94 00 22 00 F6 26 94 00 7A 00
221F0   FC 00 24 00 22 00 DC 01 B4 09 AC 00 5C 00 FC 00
22200   44 00 0F 00 B4 09 B6 31 FC 2A 64 25 00 00 00 00
22210   FC 00 F4 00 03 00 24 00 36 31 1C 25 BC 00 AC 27
22220   BE 00 88 00 D2 00 6C 03 FC 00 24 00 80 05 2E 00
22230   1D 00 24 00 32 25 88 00 D2 00 24 00 9A 30 88 00
22240   D2 00 F4 00 01 00 FE 02 2A 00 19 00 24 00 10 25
22250   88 00 D2 00 24 00 9A 30 88 00 D2 00 F4 00 01 00
22260   FE 02 FC 00 02 00 08 00 38 00 9C 00 04 07 24 00
22270   00 00 24 00 22 00 24 00 60 05 88 00 D2 00 4A 02
22280   32 25 BE 00 22 00 24 00 60 05 88 00 D2 00 5E 02
22290   BA 00 62 00 02 00 24 00 08 00 32 00 9C 00 FC 00
222A0   00 00 F2 00 03 00 2C 29 D2 31 94 00 7A 00 CA 31
222B0   26 00 28 00 6A 00 1C 25 CE 00 8E 00 9E 00 FC 00
222C0   24 00 CA 31 B4 09 AC 00 2E 00 0F 00 CA 31 24 00
222D0   1C 25 9E 00 2A 00 17 00 24 00 CA 31 10 25 B0 00
222E0   2E 00 0B 00 54 00 01 00 01 00 0B 00 FC 00 F2 00
222F0   03 00 2C 29 E4 31 94 00 7A 00 BA 31 26 00 28 00
22300   6A 00 1C 25 CE 00 8E 00 9E 00 FC 00 24 00 BA 31
22310   1C 25 B4 00 2E 00 0F 00 BA 31 24 00 1C 25 9E 00
22320   2A 00 17 00 24 00 BA 31 32 25 B0 00 2E 00 0B 00
22330   54 00 01 00 4D 00 15 00 FC 00 F2 00 03 00 2C 29
22340   F4 00 03 00 60 2C 3A 03 FC 00 24 00 BA 31 88 00
22350   D2 00 24 00 CA 31 1C 25 BC 00 AC 27 BE 00 88 00
22360   D2 00 F4 00 03 00 FE 02 FC 00 BE 31 24 00 B4 09
22370   9E 00 20 00 24 00 6A 0A 88 00 62 00 60 00 CF 00
22380   FC 00 C6 31 24 00 B4 09 9E 00 20 00 24 00 1C 25
22390   88 00 62 00 60 00 B3 00 CE 31 24 00 C6 31 F8 31
223A0   BE 00 1C 25 BA 00 9E 00 FC 00 C2 31 24 00 B4 09
223B0   9E 00 20 00 24 00 EC 25 88 00 62 00 60 00 87 00
223C0   FC 00 24 00 A4 05 24 00 1C 25 32 00 24 00 A4 05
223D0   24 00 BE 31 4C 25 BE 00 C6 31 FC 31 BE 00 BA 00
223E0   C2 31 BA 00 32 00 24 00 A4 05 24 00 5A 28 32 00
223F0   24 00 A4 05 24 00 B4 09 32 00 FC 00 24 00 24 00
22400   A8 05 30 00 00 32 B4 00 2E 00 3B 00 24 00 10 25
22410   BE 31 BA 00 88 00 24 00 CE 31 54 25 BA 00 C2 31
22420   B8 09 BE 00 BA 00 88 00 F2 00 0B 00 F2 00 0F 00
22430   F2 00 13 00 14 25 24 00 24 00 A8 05 30 00 24 26
22440   E4 00 94 00 FC 00 5E 00 FC 00 5E 00 FC 00 5E 00
22450   FC 00 7A 00 24 00 A4 27 88 00 24 00 1C 25 88 00
22460   F2 00 0B 00 F2 00 0F 00 F2 00 13 00 14 25 04 32
22470   94 00 24 00 CA 31 94 00 14 32 94 00 24 00 BA 31
22480   94 00 FC 00 F4 00 01 00 24 00 CA 31 1C 25 BC 00
22490   AC 27 BE 00 88 00 D2 00 6C 03 FC 00 24 00 22 00
224A0   1E 32 9C 27 AC 00 2E 00 0B 00 54 00 01 00 FB 01
224B0   19 01 FC 00 02 00 2E 00 19 00 54 25 24 00 26 31
224C0   00 00 00 00 24 00 D6 06 24 00 06 00 38 00 32 25
224D0   AE 00 2E 00 05 00 02 00 FC 00 24 00 B2 25 DC 06
```

| | | | | | | | | | | | | | | | | |
|---|---|---|---|---|---|---|---|---|---|---|---|---|---|---|---|---|
| 224E0 | 24 | 00 | 06 | 00 | 38 | 00 | BA | 00 | 88 | 00 | D2 | 00 | 24 | 00 | E2 | 06 |
| 224F0 | 24 | 00 | 06 | 00 | 38 | 00 | 88 | 00 | D2 | 00 | F4 | 00 | 01 | 00 | FE | 02 |
| 22500 | FC | 00 | 02 | 00 | 88 | 00 | 0C | 31 | 94 | 00 | 24 | 00 | 1C | 25 | 88 | 00 |
| 22510 | 00 | 00 | 2A | 0A | 00 | 00 | 16 | 00 | 19 | 00 | 2A | 32 | 94 | 00 | 24 | 00 |
| 22520 | 08 | 00 | 94 | 00 | 24 | 00 | 64 | 00 | 3C | 00 | 94 | 00 | 7A | 00 | F8 | 00 |
| 22530 | FC | 00 | 24 | 00 | 24 | 0A | 1C | 25 | AC | 00 | 2E | 00 | 1D | 00 | 26 | 32 |
| 22540 | 24 | 00 | D0 | 06 | 24 | 00 | 08 | 00 | 38 | 00 | 32 | 25 | BE | 00 | 1C | 25 |
| 22550 | BA | 00 | 9E | 00 | 2A | 00 | 0B | 00 | 26 | 32 | 24 | 00 | 64 | 25 | 9E | 00 |
| 22560 | FC | 00 | F4 | 00 | 03 | 00 | 24 | 00 | 26 | 32 | 88 | 00 | D2 | 00 | 24 | 00 |
| 22570 | D0 | 06 | 24 | 00 | 08 | 00 | 38 | 00 | B8 | 09 | BA | 00 | 4C | 25 | BE | 00 |
| 22580 | EC | 25 | BA | 00 | 88 | 00 | D2 | 00 | F4 | 00 | 01 | 00 | 24 | 00 | 08 | 00 |
| 22590 | AE | 25 | C0 | 00 | 88 | 00 | D2 | 00 | 78 | 01 | FC | 00 | 02 | 00 | FC | 00 |
| 225A0 | 00 | 00 | 0C | 00 | 00 | 00 | 28 | 00 | 28 | 00 | 22 | 00 | 26 | 00 | 28 | 00 |
| 225B0 | 28 | 00 | 06 | 00 | 24 | 00 | 32 | 25 | D4 | 00 | 8E | 00 | 22 | 00 | 24 | 00 |
| 225C0 | 08 | 00 | 88 | 00 | D2 | 00 | 5E | 02 | BA | 00 | 8C | 00 | 20 | 30 | 24 | 00 |
| 225D0 | 32 | 25 | D8 | 00 | 28 | 00 | 06 | 00 | 24 | 00 | 10 | 25 | 24 | 00 | 50 | 25 |
| 225E0 | D6 | 00 | 88 | 00 | 24 | 00 | 22 | 00 | 24 | 00 | 08 | 00 | 83 | 00 | D2 | 00 |
| 225F0 | 4A | 02 | 88 | 00 | D2 | 00 | F2 | 00 | 07 | 00 | 08 | 03 | FC | 00 | 02 | 00 |
| 22600 | 00 | 00 | 00 | 00 | 24 | 00 | 06 | 00 | AE | 25 | C2 | 00 | 4C | 25 | C0 | 00 |
| 22610 | 32 | 25 | BC | 00 | 32 | 25 | BE | 00 | 06 | 00 | AE | 25 | C0 | 00 | AC | 27 |
| 22620 | BE | 00 | BA | 00 | 82 | 00 | 02 | 00 | 9E | 00 | FC | 00 | 24 | 00 | EC | 05 |
| 22630 | 00 | 00 | 16 | 00 | 31 | 00 | 88 | 32 | 94 | 00 | 24 | 00 | 60 | 05 | 94 | 00 |
| 22640 | 24 | 00 | F2 | 05 | 24 | 00 | 60 | 05 | 38 | 00 | 94 | 00 | 24 | 00 | 64 | 00 |
| 22650 | 3C | 00 | 94 | 00 | 24 | 00 | EC | 05 | 24 | 00 | 60 | 05 | 38 | 00 | 94 | 00 |
| 22660 | 7A | 00 | F8 | 00 | FC | 00 | 24 | 00 | F2 | 05 | 24 | 00 | 60 | 05 | 38 | 00 |
| 22670 | 8C | 2B | B0 | 00 | 58 | 00 | FB | 00 | FC | 00 | 24 | 00 | F2 | 05 | 24 | 00 |
| 22680 | 60 | 05 | 38 | 00 | 00 | 32 | AC | 00 | 2E | 00 | 0B | 00 | 54 | 00 | 01 | 00 |
| 22690 | 03 | 01 | 2D | 01 | FC | 00 | 24 | 00 | B4 | 09 | 88 | 00 | D2 | 00 | 24 | 00 |
| 226A0 | E2 | 06 | 24 | 00 | 60 | 05 | 38 | 00 | 1C | 25 | BA | 00 | 88 | 00 | D2 | 00 |
| 226B0 | F4 | 00 | 01 | 00 | FE | 02 | 24 | 00 | 24 | 00 | A8 | 05 | 30 | 00 | 1C | 25 |
| 226C0 | DC | 06 | 24 | 00 | 60 | 05 | 38 | 00 | BA | 00 | C6 | 00 | 2E | 00 | 0B | 00 |
| 226D0 | 54 | 00 | 01 | 00 | 27 | 01 | 41 | 01 | FC | 00 | 24 | 00 | AA | 07 | 24 | 00 |
| 226E0 | 60 | 05 | 38 | 00 | 9C | 27 | AC | 00 | 2E | 00 | 0B | 00 | 54 | 00 | 01 | 00 |
| 226F0 | 27 | 01 | 41 | 01 | FC | 00 | 24 | 00 | 74 | 05 | 2E | 00 | 19 | 00 | 94 | 32 |
| 22700 | 94 | 00 | 24 | 00 | 60 | 05 | 94 | 00 | AE | 31 | 94 | 00 | 22 | 00 | F6 | 26 |
| 22710 | 94 | 00 | 7A | 00 | FC | 00 | 24 | 00 | 60 | 05 | 88 | 00 | D2 | 00 | F4 | 00 |
| 22720 | 05 | 00 | D0 | 03 | F2 | 05 | 24 | 00 | 60 | 05 | 38 | 00 | 24 | 00 | 00 | 32 |
| 22730 | 9E | 00 | FC | 00 | 24 | 00 | B4 | 09 | 88 | 00 | D2 | 00 | AA | 07 | 24 | 00 |
| 22740 | 60 | 05 | 38 | 00 | EA | 02 | 24 | 00 | 1A | 07 | 24 | 00 | 60 | 05 | 38 | 00 |
| 22750 | 2E | 00 | 05 | 00 | 02 | 00 | FC | 00 | 24 | 00 | 60 | 05 | 88 | 00 | D2 | 00 |
| 22760 | F4 | 00 | 03 | 00 | D0 | 03 | F4 | 00 | 03 | 00 | F2 | 00 | 05 | 00 | D2 | 01 |
| 22770 | FC | 00 | 5A | 00 | FC | 00 | 24 | 00 | F2 | 05 | 24 | 00 | 60 | 05 | 38 | 00 |
| 22780 | EC | 2B | B0 | 00 | 2E | 00 | 05 | 00 | 02 | 00 | FC | 00 | 3C | 32 | 24 | 00 |
| 22790 | 22 | 00 | 24 | 00 | 60 | 05 | 88 | 00 | D2 | 00 | D6 | 02 | 9E | 00 | 24 | 00 |
| 227A0 | 3C | 32 | B4 | 09 | AC | 00 | 20 | 07 | 24 | 00 | 60 | 05 | 38 | 00 | 60 | 05 |
| 227B0 | AE | 00 | C6 | 00 | 2E | 00 | 05 | 00 | 02 | 00 | FC | 00 | 24 | 00 | F2 | 05 |
| 227C0 | 24 | 00 | 60 | 05 | 38 | 00 | EC | 25 | AC | 00 | 2E | 00 | 0B | 00 | 54 | 00 |
| 227D0 | 01 | 00 | 55 | 13 | 8F | 26 | FC | 00 | 24 | 00 | 3C | 32 | F2 | 05 | 24 | 00 |
| 227E0 | 60 | 05 | 38 | 00 | B4 | 09 | B0 | 00 | C6 | 00 | F2 | 05 | 24 | 00 | 60 | 05 |
| 227F0 | 38 | 00 | B2 | 25 | AE | 00 | C6 | 00 | F2 | 05 | 24 | 00 | 60 | 05 | 38 | 00 |
| 22800 | 38 | 26 | B4 | 00 | C6 | 00 | 58 | 00 | 43 | 00 | FC | 00 | 24 | 00 | 04 | 07 |
| 22810 | 24 | 00 | 60 | 05 | 38 | 00 | 48 | 25 | C2 | 00 | 4C | 25 | AC | 00 | 2E | 00 |
| 22820 | 19 | 00 | 78 | 08 | 24 | 00 | 60 | 05 | 38 | 00 | 26 | 00 | A0 | 05 | C8 | 05 |
| 22830 | BA | 00 | 9E | 00 | 2A | 00 | 15 | 00 | 78 | 08 | 24 | 00 | 60 | 05 | 38 | 00 |
| 22840 | 26 | 00 | A0 | 05 | 98 | 05 | BA | 00 | 9E | 00 | FC | 00 | 5A | 00 | FC | 00 |
| 22850 | 26 | 00 | F2 | 05 | 24 | 00 | 60 | 05 | 38 | 00 | F2 | 05 | 24 | 00 | 60 | 05 |
| 22860 | 38 | 00 | 54 | 25 | AE | 00 | C6 | 00 | F2 | 05 | 24 | 00 | 60 | 05 | 38 | 00 |
| 22870 | 38 | 26 | B4 | 00 | C6 | 00 | 78 | 08 | 24 | 00 | 60 | 05 | 38 | 00 | A0 | 05 |
| 22880 | B4 | 00 | C6 | 00 | 84 | 00 | 2E | 00 | 0B | 00 | 54 | 00 | 01 | 00 | 11 | 13 |
| 22890 | 85 | 26 | FC | 00 | 24 | 00 | F2 | 05 | 24 | 00 | 60 | 05 | 38 | 00 | 54 | 00 |
| 228A0 | 43 | 00 | B7 | 03 | 09 | 20 | 67 | 06 | D1 | 20 | F1 | 06 | DB | 20 | 87 | 09 |
| 228B0 | F3 | 21 | 19 | 0D | F7 | 22 | A3 | 11 | 8B | 25 | 55 | 13 | 8F | 26 | 15 | 06 |
| 228C0 | BD | 20 | 43 | 17 | 01 | 28 | 85 | 17 | 29 | 28 | D1 | 18 | B5 | 28 | 6D | 1A |
| 228D0 | FB | 28 | C5 | 1B | CD | 29 | C5 | 1B | CD | 29 | 3F | 1C | 09 | 2A | BD | 1C |

```
228E0   59 2A 85 1D BD 2A 6F 1E 21 2B 8B 20 4D 2C CF 20
228F0   93 2C 5D 0F 47 23 9F 0F 5B 23 65 10 A1 23 A3 10
22900   B5 23 E1 10 C9 23 57 11 FB 23 A1 13 B7 26 FD 22
22910   1D 2F 4B 23 45 2F BD 23 95 2F FB 23 BD 2F 71 24
22920   71 30 51 26 A5 38 2F 27 6D 39 FC 00 26 00 88 05
22930   B4 09 B0 00 6C 08 24 00 60 05 38 00 B4 09 AC 00
22940   C6 00 84 00 2E 00 23 00 6C 08 24 00 60 05 38 00
22950   26 00 A0 05 88 05 BA 00 9E 00 20 07 24 00 60 05
22960   38 00 24 00 60 05 9E 00 FC 00 26 00 6C 08 24 00
22970   60 05 38 00 B4 09 B0 00 6C 08 24 00 60 05 38 00
22980   A0 05 B6 00 C6 00 84 00 2E 00 17 00 7E 07 24 00
22790   60 05 38 00 A2 32 9E 00 54 00 01 00 2F 04 95 20
229A0   FC 00 24 00 3C 32 B4 09 AC 00 2E 00 27 00 24 00
229B0   60 05 88 00 D2 00 F4 00 03 00 D0 03 F4 00 03 00
229C0   F2 00 05 00 D2 01 24 00 60 05 88 00 D2 00 68 02
229D0   02 00 FC 00 78 08 24 00 60 05 38 00 26 00 A0 05
229E0   B2 25 BA 00 9E 00 FC 00 3C 32 24 00 22 00 24 00
229F0   60 05 88 00 D2 00 72 02 9E 00 24 00 3C 32 2E 00
22A00   1F 00 20 07 24 00 60 05 38 00 24 00 60 05 9E 00
22A10   F2 05 24 00 60 05 38 00 24 00 1C 25 9E 00 FC 00
22A20   24 00 3C 32 10 25 AE 00 2E 00 05 00 02 00 FC 00
22A30   24 00 74 05 2E 00 11 00 AE 32 94 00 24 00 60 05
22A40   94 00 B4 32 94 00 FC 00 66 04 FC 00 7E 07 24 00
22A50   60 05 38 00 68 07 24 00 60 05 38 00 9E 00 FC 00
22A60   24 00 60 05 58 00 D2 00 F4 00 05 00 D0 03 20 07
22A70   24 00 60 05 38 00 24 00 60 05 9E 00 FC 00 24 00
22A80   74 05 18 00 62 00 7E 07 24 00 60 05 38 00 6E 32
22P90   C8 00 C6 00 2E 00 0F 00 BE 32 94 00 24 00 60 05
22AA0   94 00 7A 00 FC 00 D8 32 24 00 60 05 88 00 D2 00
22AB0   40 02 F4 00 05 00 24 00 60 05 88 00 D2 00 36 02
22AC0   24 00 18 00 62 00 7E 07 24 00 60 05 38 00 6E 32
22AD0   C8 00 2E 00 0B 00 54 00 01 00 11 13 85 26 FC 00
22AE0   F4 00 07 00 24 00 60 05 88 00 D2 00 24 00 B4 09
22AF0   88 00 D2 00 0A 01 68 07 24 00 60 05 38 00 7E 07
22B00   24 00 60 05 38 00 9E 00 26 00 28 00 7E 07 24 00
22B10   60 05 38 00 8E 00 88 00 04 02 FC 00 24 00 EC 05
22B20   24 00 60 05 38 00 0E 28 AC 00 2E 00 2F 00 26 00
22B30   28 00 28 00 68 07 24 00 60 05 38 00 24 00 10 25
22B40   D4 00 8E 00 88 00 04 02 7E 07 24 00 60 05 38 00
22B50   68 07 24 00 60 05 38 00 9E 00 FC 00 FE 06 24 00
22B60   60 05 38 00 24 00 B4 09 9E 00 FC 00 24 00 74 05
22B70   2E 00 15 00 FE 26 94 00 24 00 EC 05 24 00 60 05
22B80   38 00 94 00 7A 00 FC 00 24 00 22 00 24 00 6A 0A
22B90   88 00 D2 00 F2 00 05 00 32 01 2E 00 0D 00 24 00
22BA0   60 05 88 00 D2 00 2C 02 FC 00 24 00 EC 05 24 00
22BB0   60 05 38 00 B4 09 B0 00 F8 06 24 00 60 05 38 00
22BC0   B4 09 B0 00 C6 00 22 00 24 00 32 25 88 00 D2 00
22BD0   F2 00 05 00 32 01 B4 09 AC 00 C6 00 22 00 24 00
22BE0   60 05 83 00 D2 00 F2 00 05 00 32 01 B4 09 AC 00
22BF0   C6 00 68 07 24 00 60 05 38 00 7E 07 24 00 60 05
22C00   38 00 AC 00 C6 00 2E 00 0D 00 5C 04 54 00 01 00
22C10   67 06 D1 20 FC 00 F4 00 09 00 24 00 60 05 88 00
22C20   D2 00 F2 0C 07 00 0A 01 1A 07 24 00 60 05 38 00
22C30   24 00 B4 09 9E 00 F2 05 24 00 60 05 38 00 24 00
22C40   4C 25 9E 00 FC 00 24 00 0A 26 88 00 D2 00 F2 00
22C50   07 00 EA 02 24 00 1A 07 24 00 60 05 38 00 2E 00
22C60   17 00 78 08 24 00 60 05 38 00 26 00 A0 05 54 25
22C70   BA 00 9E 00 02 00 FC 00 F4 00 07 00 24 00 60 05
22C80   88 00 D2 00 24 00 1C 25 88 00 D2 00 0A 01 54 00
22C90   01 00 81 11 81 25 FC 00 F2 05 24 00 60 05 38 00
22CA0   24 00 32 25 9E 00 7E 08 24 00 60 05 38 00 26 00
22CB0   A0 05 9E 00 94 07 24 00 60 05 38 00 22 00 F6 26
22CC0   9E 00 FC 00 24 00 22 00 24 00 40 2E 88 00 D2 00
22CD0   F2 00 05 00 32 01 2E 00 49 00 F4 00 03 00 F4 00
22CE0   03 00 24 00 32 25 88 00 24 00 EC 05 24 00 60 05
```

```
22CF0  38 00 8E 00 26 09 16 26 68 07 24 00 60 05 38 00
22D00  26 09 C2 08 9E 00 78 08 24 00 60 05 38 00 26 00
22D10  A0 05 B2 25 BA 00 9E 00 54 00 01 00 C9 07 71 21
22D20  FC 00 3C 32 24 00 22 00 24 00 60 05 88 00 D2 00
22D30  72 02 9E 00 24 00 3C 32 48 25 AC 00 2E 00 21 00
22D40  F4 00 07 00 24 00 60 05 88 00 D2 00 24 00 32 25
22D50  88 00 D2 00 0A 01 54 00 01 00 81 11 81 25 FC 00
22D60  24 00 3C 32 5C 25 AC 00 2E 00 1D 00 F4 00 09 00
22D70  24 00 60 05 88 00 D2 00 F2 00 07 00 0A 01 54 00
22D80  01 00 11 13 85 26 FC 00 24 00 F2 05 24 00 60 05
22D90  38 00 32 25 AC 00 3C 32 EC 25 AC 00 3C 32 4C 25
22DA0  AC 00 C8 00 C6 00 2E 00 23 00 F4 00 09 00 24 00
22DB0  60 05 88 00 D2 00 F2 00 07 00 0A 01 F2 05 24 00
22DC0  60 05 38 00 24 00 10 25 9E 00 FC 00 24 00 3C 32
22DD0  4C 25 AE 00 2E 00 05 00 02 00 FC 00 66 04 FC 00
22DE0  F4 00 03 00 24 00 22 00 24 00 60 05 88 00 D2 00
22DF0  4A 02 88 00 D2 00 6C 03 FC 00 F4 00 07 00 24 00
22E00  60 05 88 00 D2 00 24 00 B8 09 88 00 D2 00 0A 01
22E10  24 00 1C 27 88 00 5A 01 F4 00 09 00 24 00 60 05
22E20  88 00 D2 00 F2 00 07 00 0A 01 FC 00 24 00 22 00
22E30  24 00 4E 27 88 00 D2 00 F2 00 05 00 32 01 1C 25
22E40  AC 00 68 07 24 00 60 05 38 00 DE 32 AC 00 C6 00
22E50  2E 00 0B 00 54 00 01 00 27 0F 29 23 FC 00 24 00
22E60  22 00 24 00 14 27 88 00 D2 00 F2 00 05 00 32 01
22E70  68 07 24 00 60 05 38 00 E4 32 AC 00 C6 00 2E 00
22E80  0B 00 54 00 01 00 CB 22 E1 2E FC 00 24 00 22 00
22E90  24 00 14 27 88 00 D2 00 F2 00 05 00 32 01 68 07
22EA0  24 00 60 05 38 00 EA 32 AC 00 C6 00 2E 00 17 00
22EB0  68 07 24 00 60 05 38 00 9C 27 9E 00 54 00 01 00
22EC0  DD 23 A9 2F FC 00 E0 02 24 00 FE 06 24 00 60 05
22ED0  38 00 64 25 AC 00 2E 00 0B 00 54 00 01 00 37 15
22EE0  11 27 FC 00 24 00 FE 06 24 00 60 05 38 00 B4 09
22EF0  AC 00 22 00 1E 01 B4 09 AC 00 C8 00 2E 00 21 00
22F00  F4 00 07 00 24 00 60 05 88 00 D2 00 24 00 1C 25
22F10  88 00 D2 00 0A 01 54 00 01 00 81 11 81 25 FC 00
22F20  24 00 74 05 2E 00 15 00 F0 32 94 00 24 00 FE 06
22F30  24 00 60 05 38 00 94 00 7A 00 FC 00 68 07 24 00
22F40  60 05 38 00 24 00 FE 06 24 00 60 05 38 00 88 00
22F50  D2 00 64 01 FC 00 24 00 74 05 2E 00 23 00 B0 27
22F60  94 00 68 07 24 00 60 05 38 00 94 00 BA 27 94 00
22F70  24 00 FE 06 24 00 60 05 38 00 94 00 7A 00 FC 00
22F80  20 07 24 00 FE 06 24 00 60 05 38 00 38 00 24 00
22F90  60 05 9E 00 FC 00 F2 05 24 00 60 05 38 00 24 00
22FA0  B8 09 9E 00 6C 08 24 00 60 05 38 00 26 00 A0 05
22FB0  54 25 BA 00 9E 00 FC 00 24 00 D6 06 24 00 FE 06
22FC0  24 00 60 05 38 00 38 00 58 25 B4 00 58 00 E1 00
22FD0  FC 00 24 00 D6 06 24 00 FE 06 24 00 60 05 38 00
22FE0  38 00 60 25 AC 00 2E 00 67 00 24 00 B8 09 DC 06
22FF0  24 00 FE 06 24 00 60 05 38 00 38 00 BA 00 88 00
23000  D2 00 24 00 E2 06 24 00 FE 06 24 00 60 05 38 00
23010  38 00 88 00 D2 00 F4 00 01 00 FE 02 24 00 64 25
23020  88 00 D2 00 24 00 E2 06 24 00 FE 06 24 00 60 05
23030  38 00 38 00 88 00 D2 00 F4 00 01 00 FE 02 3C 32
23040  24 00 24 00 A8 05 30 00 9E 00 2A 00 0B 00 3C 32
23050  24 00 B4 09 9E 00 FC 00 26 00 24 00 3C 32 32 25
23060  AC 00 22 00 24 00 E2 06 24 00 FE 06 24 00 60 05
23070  38 00 38 00 1C 25 BA 00 88 00 D2 00 26 03 C8 00
23080  88 00 6C 08 24 00 60 05 38 00 A0 05 B0 00 C6 00
23090  84 00 2E 00 09 00 24 00 32 25 02 00 FC 00 24 00
230A0  FE 06 24 00 60 05 38 00 88 00 D2 00 50 01 FC 00
230B0  5A 00 FC 00 24 00 D6 06 24 00 FE 06 24 00 60 05
230C0  38 00 38 00 58 25 AC 00 58 00 A9 00 3C 32 24 00
230D0  22 00 24 00 FE 06 24 00 60 05 38 00 88 00 D2 00
230E0  86 02 9E 00 FC 00 24 00 3C 32 B4 09 AC 00 2E 00
230F0  09 00 24 00 32 25 02 00 FC 00 24 00 74 05 58 00
```

```
23100  6F 00 FC 00 24 00 3C 32 EC 25 AC 00 2E 00 19 00
23110  C8 27 94 00 24 00 FE 06 24 00 60 05 38 00 94 00
23120  02 33 94 00 7A 00 FC 00 24 00 3C 32 5C 25 AC 00
23130  2E 00 19 00 C8 27 94 00 24 00 FE 06 24 00 60 05
23140  38 00 94 00 10 33 94 00 7A 00 FC 00 24 00 3C 32
23150  48 25 AC 00 2E 00 19 00 C8 27 94 00 24 00 FE 06
23160  24 00 60 05 38 00 94 00 1E 33 94 00 7A 00 FC 00
23170  5A 00 FC 00 5A 00 FC 00 24 00 D6 06 24 00 FE 06
23180  24 00 60 05 38 00 38 00 58 25 AC 00 22 00 24 00
23190  FE 06 24 00 60 05 38 00 88 00 D2 00 86 02 B2 25
231A0  B0 00 C6 00 2E 00 2F 00 7E 08 24 00 60 05 38 00
231B0  24 00 B4 09 9E 00 F4 00 07 00 24 00 60 05 88 00
231C0  D2 00 24 00 1C 25 88 00 D2 00 0A 01 54 00 01 00
231D0  81 11 81 25 FC 00 24 00 22 00 24 00 4E 27 88 00
231E0  D2 00 F2 00 05 00 32 01 1C 25 AC 00 22 00 9E 03
231F0  B4 09 B0 00 C6 00 58 00 29 00 FC 00 24 00 10 25
23200  88 00 58 00 19 00 52 00 24 00 60 05 88 00 D2 00
23210  F2 00 05 00 14 01 24 00 86 27 88 00 5A 01 5C 00
23220  FC 00 5A 00 FC 00 F4 00 03 00 24 00 60 05 88 00
23230  D2 00 24 00 FE 06 24 00 60 05 38 00 88 00 D2 00
23240  0A 01 24 00 D6 06 24 00 FE 06 24 00 60 05 38 00
23250  38 00 58 25 AE 00 2E 00 23 00 7E 08 24 00 60 05
23260  38 00 26 00 A0 05 9E 00 94 07 24 00 60 05 38 00
23270  22 00 F6 26 9E 00 2A 00 11 00 7E 08 24 00 60 05
23280  38 00 24 00 B4 09 9E 00 FC 00 58 00 8B 00 FC 00
23290  24 00 04 07 24 00 60 05 38 00 48 25 C0 00 48 25
232A0  AC 00 2E 00 0F 00 DE 28 24 00 60 05 88 00 D2 00
232B0  40 02 FC 00 24 00 04 07 24 00 60 05 38 00 48 25
232C0  C0 00 38 26 AC 00 2E 00 11 00 DE 28 24 00 60 05
232D0  88 00 D2 00 40 02 02 00 FC 00 24 00 22 00 24 00
232E0  48 25 88 00 D2 00 F2 00 05 00 32 01 2E 00 1D 00
232F0  22 00 7E 07 24 00 60 05 38 00 A0 01 24 00 60 05
23300  88 00 D2 00 1C 03 2A 00 0F 00 E4 28 24 00 60 05
23310  88 00 D2 00 1C 03 FC 00 5A 00 FC 00 30 03 FC 00
23320  72 08 24 00 60 05 38 00 26 00 6C 08 24 00 60 05
23330  38 00 64 26 BC 00 9E 00 FC 00 F2 05 24 00 60 05
23340  38 00 24 00 54 25 9E 00 FC 00 24 00 22 00 24 00
23350  60 05 88 00 D2 00 72 02 5C 25 AC 00 2E 00 0B 00
23360  54 00 01 00 3D 12 49 26 FC 00 24 00 D6 06 24 00
23370  FE 06 24 00 60 05 38 00 38 00 58 25 AC 00 22 00
23380  24 00 FE 06 24 00 60 05 38 00 88 00 D2 00 86 02
23390  54 25 AC 00 C6 00 2E 00 0B 00 54 00 01 00 3D 12
233A0  49 26 FC 00 26 00 D6 06 24 00 FE 06 24 00 60 05
233B0  38 00 38 00 58 25 AC 00 7E 08 24 00 60 05 38 00
233C0  B4 09 AC 00 C6 00 84 00 2E 00 5D 00 3C 32 24 00
233D0  22 00 24 00 FE 06 24 00 60 05 38 00 88 00 D2 00
233E0  86 02 9E 00 24 00 3C 32 B8 09 AC 00 2E 00 39 00
233F0  7E 08 24 00 60 05 38 00 26 00 A0 05 9E 00 94 07
23400  24 00 60 05 38 00 22 00 F6 26 9E 00 24 00 74 05
23410  2E 00 15 00 32 33 94 00 24 00 FE 06 24 00 60 05
23420  38 00 94 00 7A 00 FC 00 26 00 72 08 24 00 60 05
23430  38 00 A0 05 B4 00 84 00 58 00 77 00 FC 00 26 00
23440  6C 08 24 00 60 05 38 00 A0 05 B0 00 84 00 2E 00
23450  25 00 24 00 60 05 88 00 D2 00 F2 00 05 00 14 01
23460  72 08 24 00 60 05 38 00 26 00 A0 05 54 25 BA 00
23470  9E 00 02 00 FC 00 24 00 32 25 88 00 58 00 1D 00
23480  52 00 24 00 86 27 88 00 5A 01 24 00 60 05 88 00
23490  D2 00 24 00 54 25 88 00 D2 00 14 01 5C 00 72 08
234A0  24 00 60 05 38 00 26 00 A0 05 48 25 BA 00 9E 00
234B0  FC 00 5A 00 FC 00 26 00 78 08 24 00 60 05 38 00
234C0  B8 09 BC 00 A0 05 B4 00 84 00 2E 00 11 00 24 00
234D0  60 05 88 00 D2 00 F2 00 05 00 14 01 FC 00 26 00
234E0  78 08 24 00 60 05 38 00 A0 05 B4 00 84 00 2E 00
234F0  08 00 54 00 01 00 3D 12 49 26 FC 00 26 00 6C 08
23500  24 00 60 05 38 00 A0 05 B0 00 84 00 2E 00 05 00
```

| | | | | | | | | | | | | | | | | |
|---|---|---|---|---|---|---|---|---|---|---|---|---|---|---|---|---|
| 23510 | 02 | 00 | FC | 00 | 26 | 00 | 22 | 00 | 24 | 00 | 8A | 27 | 88 | 00 | D2 | 00 |
| 23520 | F2 | 00 | 05 | 00 | 32 | 01 | 22 | 00 | 24 | 00 | 4C | 26 | 88 | 00 | D2 | 00 |
| 23530 | F2 | 00 | 05 | 00 | 32 | 01 | B4 | 05 | BA | 00 | B0 | 05 | BC | 00 | A0 | 05 |
| 23540 | B0 | 00 | C8 | 00 | 84 | 00 | 2E | 00 | 05 | 00 | 02 | 00 | FC | 00 | 54 | 00 |
| 23550 | 01 | 00 | 3D | 12 | 49 | 26 | FC | 00 | 24 | 00 | 22 | 00 | 9E | 03 | B4 | 09 |
| 23560 | AC | 00 | 2E | 00 | 0B | 00 | 54 | 00 | 01 | 00 | 39 | 11 | F1 | 23 | FC | 00 |
| 23570 | 1A | 07 | 24 | 00 | 60 | 05 | 38 | 00 | 24 | 00 | B4 | 09 | 9E | 00 | F2 | 05 |
| 23580 | 24 | 00 | 60 | 05 | 38 | 00 | 24 | 00 | AA | 25 | 9E | 00 | FC | 00 | 24 | 00 |
| 23590 | 58 | 25 | 88 | 00 | D2 | 00 | F2 | 00 | 07 | 00 | EA | 02 | 24 | 00 | 1A | 07 |
| 235A0 | 24 | 00 | 60 | 05 | 38 | 00 | 2E | 00 | 05 | 00 | 02 | 00 | FC | 00 | F2 | 05 |
| 235B0 | 24 | 00 | 60 | 05 | 38 | 00 | 24 | 00 | A4 | 27 | 9E | 00 | F2 | 00 | 03 | 00 |
| 235C0 | 68 | 02 | D8 | 32 | 24 | 00 | 60 | 05 | 88 | 00 | D2 | 00 | 40 | 02 | FC | 00 |
| 235D0 | 3C | 32 | 24 | 00 | 22 | 00 | 24 | 00 | 60 | 05 | 88 | 00 | D2 | 00 | 72 | 02 |
| 235E0 | 9E | 00 | 24 | 00 | 3C | 32 | 5C | 25 | AC | 00 | 3C | 32 | 48 | 25 | AC | 00 |
| 235F0 | C8 | 00 | 2E | 00 | 0B | 00 | 54 | 00 | 01 | 00 | 11 | 13 | 85 | 26 | FC | 00 |
| 23600 | 24 | 00 | 3C | 32 | 4C | 25 | AE | 00 | 2E | 00 | 05 | 00 | 02 | 00 | FC | 00 |
| 23610 | 66 | 04 | 24 | 00 | 68 | 07 | 24 | 00 | 60 | 05 | 38 | 00 | 4E | 33 | AC | 00 |
| 23620 | 2E | 00 | 0B | 00 | 54 | 00 | 01 | 00 | 11 | 13 | 85 | 26 | FC | 00 | 24 | 00 |
| 23630 | 68 | 07 | 24 | 00 | 60 | 05 | 38 | 00 | 54 | 33 | AE | 00 | 2E | 00 | 0B | 00 |
| 23640 | 54 | 00 | 01 | 00 | 3F | 0F | 3D | 23 | FC | 00 | BC | 03 | 24 | 00 | 68 | 07 |
| 23650 | 24 | 00 | 60 | 05 | 38 | 00 | 9C | 27 | AC | 00 | 2E | 00 | 0B | 00 | 54 | 00 |
| 23660 | 01 | 00 | 11 | 13 | 85 | 26 | FC | 00 | 6C | 08 | 24 | 00 | 60 | 05 | 38 | 00 |
| 23670 | 24 | 00 | 1C | 25 | 9E | 00 | FC | 00 | 1A | 07 | 24 | 00 | 60 | 05 | 38 | 00 |
| 23680 | 24 | 00 | B4 | 09 | 9E | 00 | F2 | 05 | 24 | 00 | 60 | 05 | 38 | 00 | 24 | 00 |
| 23690 | A6 | 25 | 9E | 00 | FC | 00 | 24 | 00 | 38 | 26 | 88 | 00 | D2 | 00 | F2 | 00 |
| 236A0 | 07 | 00 | EA | 02 | 24 | 00 | 1A | 07 | 24 | 00 | 60 | 05 | 38 | 00 | 2E | 00 |
| 236B0 | 05 | 00 | 02 | 00 | FC | 00 | 1A | 07 | 24 | 00 | 60 | 05 | 38 | 00 | 24 | 00 |
| 236C0 | B4 | 09 | 9E | 00 | F2 | 05 | 24 | 00 | 60 | 05 | 38 | 00 | 24 | 00 | AC | 27 |
| 236D0 | 9E | 00 | FC | 00 | F2 | 00 | 03 | 00 | 68 | 07 | 24 | 00 | 60 | 05 | 38 | 00 |
| 236E0 | EA | 02 | 24 | 00 | 1A | 07 | 24 | 00 | 60 | 05 | 38 | 00 | 2E | 00 | 05 | 00 |
| 236F0 | 02 | 00 | FC | 00 | 1A | 07 | 24 | 00 | 60 | 05 | 38 | 00 | 24 | 00 | B4 | 09 |
| 23700 | 9E | 00 | F2 | 05 | 24 | 00 | 60 | 05 | 38 | 00 | 24 | 00 | 86 | 27 | 9E | 00 |
| 23710 | FC | 00 | 24 | 00 | C0 | 26 | 88 | 00 | D2 | 00 | F2 | 00 | 07 | 00 | EA | 02 |
| 23720 | 24 | 00 | 1A | 07 | 24 | 00 | 60 | 05 | 38 | 00 | 2E | 00 | 05 | 00 | 02 | 00 |
| 23730 | FC | 00 | 26 | 00 | 6C | 08 | 24 | 00 | 60 | 05 | 38 | 00 | 32 | 25 | AC | 00 |
| 23740 | 84 | 00 | 2E | 00 | 0F | 00 | 54 | 00 | 01 | 00 | 19 | 10 | 83 | 23 | 2A | 00 |
| 23750 | 19 | 00 | 6C | 08 | 24 | 00 | 60 | 05 | 38 | 00 | 24 | 00 | 32 | 25 | 9E | 00 |
| 23760 | 54 | 00 | 01 | 00 | 85 | 10 | AB | 23 | FC | 00 | 1A | 07 | 24 | 00 | 60 | 05 |
| 23770 | 38 | 00 | 24 | 00 | B4 | 09 | 9E | 00 | F2 | 05 | 24 | 00 | 60 | 05 | 38 | 00 |
| 23780 | 24 | 00 | 6C | 25 | 9E | 00 | FC | 00 | 24 | 00 | 60 | 25 | 88 | 00 | D2 | 00 |
| 23790 | F2 | 00 | 07 | 00 | EA | 02 | 24 | 00 | 1A | 07 | 24 | 00 | 60 | 05 | 38 | 00 |
| 237A0 | 2E | 00 | 05 | 00 | 02 | 00 | FC | 00 | 54 | 00 | 01 | 00 | 11 | 13 | 85 | 26 |
| 237B0 | FC | 00 | 78 | 08 | 24 | 00 | 60 | 05 | 38 | 00 | 26 | 00 | A0 | 05 | 52 | 27 |
| 237C0 | BA | 00 | 9E | 00 | F2 | 05 | 24 | 00 | 60 | 05 | 38 | 00 | 24 | 00 | B2 | 25 |
| 237D0 | 9E | 00 | FC | 00 | 3C | 32 | 24 | 00 | 22 | 00 | 24 | 00 | 60 | 05 | 88 | 00 |
| 237E0 | D2 | 00 | D6 | 02 | 9E | 00 | 24 | 00 | C8 | 05 | B4 | 09 | AC | 00 | 3C | 32 |
| 237F0 | B4 | 09 | AC | 00 | C6 | 00 | 2E | 00 | 0B | 00 | 54 | 00 | 01 | 00 | 1F | 12 |
| 23800 | A9 | 25 | FC | 00 | 26 | 00 | 3C | 32 | B4 | 09 | AC | 00 | 78 | 08 | 24 | 00 |
| 23810 | 60 | 05 | 38 | 00 | A0 | 05 | 54 | 25 | BA | 00 | B0 | 00 | C6 | 00 | 84 | 00 |
| 23820 | 2E | 00 | 15 | 00 | 78 | 08 | 24 | 00 | 60 | 05 | 38 | 00 | 26 | 00 | A0 | 05 |
| 23830 | 10 | 25 | BA | 00 | 9E | 00 | FC | 00 | 26 | 00 | 78 | 08 | 24 | 00 | 60 | 05 |
| 23840 | 38 | 00 | A0 | 05 | B0 | 00 | 64 | 00 | 2E | 00 | 05 | 00 | 02 | 00 | FC | 00 |
| 23850 | F4 | 00 | 09 | 00 | 24 | 00 | 60 | 05 | 88 | 00 | D2 | 00 | F2 | 00 | 07 | 00 |
| 23860 | 0A | 01 | FC | 00 | 54 | 00 | 01 | 00 | BB | 12 | 67 | 26 | FC | 00 | 24 | 00 |
| 23870 | FE | 06 | 24 | 00 | 60 | 05 | 38 | 00 | 2E | 00 | 4D | 00 | 24 | 00 | DC | 06 |
| 23880 | 24 | 00 | FE | 06 | 24 | 00 | 60 | 05 | 38 | 00 | 38 | 00 | 88 | 00 | D2 | 00 |
| 23890 | 24 | 00 | E2 | 06 | 24 | 00 | FE | 06 | 24 | 00 | 60 | 05 | 38 | 00 | 38 | 00 |
| 238A0 | 88 | 00 | D2 | 00 | F4 | 00 | 01 | 00 | FE | 02 | F4 | 00 | 05 | 00 | 24 | 00 |
| 238B0 | 60 | 05 | 88 | 00 | D2 | 00 | 24 | 00 | FE | 06 | 24 | 00 | 60 | 05 | 38 | 00 |
| 238C0 | 88 | 00 | D2 | 00 | 0A | 01 | FC | 00 | 24 | 00 | 74 | 05 | EC | 05 | 24 | 00 |
| 238D0 | 60 | 05 | 38 | 00 | B4 | 09 | B0 | 00 | C6 | 00 | 2E | 00 | 0F | 00 | 5A | 33 |
| 238E0 | 94 | 00 | 24 | 00 | 60 | 05 | 94 | 00 | 7A | 00 | FC | 00 | 26 | 00 | EC | 05 |
| 238F0 | 24 | 00 | 60 | 05 | 38 | 00 | B4 | 09 | B0 | 00 | 7E | 08 | 24 | 00 | 60 | 05 |
| 23900 | 38 | 00 | B4 | 09 | B0 | 00 | C6 | 00 | A0 | 05 | 7E | 08 | 24 | 00 | 60 | 05 |
| 23910 | 38 | 00 | BC | 00 | 48 | 25 | B0 | 00 | 22 | 00 | 24 | 00 | 92 | 27 | 88 | 00 |

| | | | | | | | | | | | | | | | | |
|---|---|---|---|---|---|---|---|---|---|---|---|---|---|---|---|---|
| 23920 | D2 | 00 | F2 | 00 | 05 | 00 | 32 | 01 | C8 | 00 | C6 | 00 | 84 | 00 | 58 | 00 |
| 23930 | 0D | 00 | FC | 00 | F0 | 01 | FC | 00 | 74 | 33 | E6 | 01 | FC | 00 | 5A | 00 |
| 23940 | FC | 00 | 24 | 00 | 22 | 00 | 24 | 00 | 60 | 05 | 88 | 00 | D2 | 00 | D6 | 02 |
| 23950 | B4 | 09 | AC | 00 | 2E | 00 | 0F | 00 | 54 | 00 | 01 | 00 | 6D | 13 | AD | 26 |
| 23960 | 2A | 00 | 23 | 00 | 6C | 08 | 24 | 00 | 60 | 05 | 38 | 00 | 26 | 00 | A0 | 05 |
| 23970 | 32 | 25 | BA | 00 | 9E | 00 | F2 | 05 | 24 | 00 | 60 | 05 | 38 | 00 | 24 | 00 |
| 23980 | EC | 25 | 9E | 00 | FC | 00 | 26 | 00 | 6C | 08 | 24 | 00 | 60 | 05 | 38 | 00 |
| 23990 | A0 | 05 | B0 | 00 | 84 | 00 | 2E | 00 | 05 | 00 | 02 | 00 | FC | 00 | F4 | 00 |
| 239A0 | 05 | 00 | 24 | 00 | 60 | 05 | 88 | 00 | D2 | 00 | 24 | 00 | FE | 06 | 24 | 00 |
| 239B0 | 60 | 05 | 38 | 00 | 88 | 00 | D2 | 00 | 0A | 01 | F4 | 00 | 07 | 00 | 24 | 00 |
| 239C0 | 60 | 05 | 88 | 00 | D2 | 00 | 24 | 00 | 1C | 25 | 88 | 00 | D2 | 00 | 0A | 01 |
| 239D0 | FC | 00 | 24 | 00 | D6 | 06 | 24 | 00 | FE | 06 | 24 | 00 | 60 | 05 | 38 | 00 |
| 239E0 | 38 | 00 | 58 | 25 | AC | 00 | 58 | 00 | 99 | 00 | FC | 00 | 24 | 00 | DC | 06 |
| 239F0 | 24 | 00 | FE | 06 | 24 | 00 | 60 | 05 | 38 | 00 | 38 | 00 | 88 | 00 | D2 | 00 |
| 23A00 | 24 | 00 | E2 | 06 | 24 | 00 | FE | 06 | 24 | 00 | 60 | 05 | 38 | 00 | 38 | 00 |
| 23A10 | 88 | 00 | D2 | 00 | F4 | 00 | 01 | 00 | FE | 02 | FC | 00 | 24 | 00 | 22 | 00 |
| 23A20 | 24 | 00 | FE | 06 | 24 | 00 | 60 | 05 | 38 | 00 | E8 | 00 | D2 | 00 | 86 | 02 |
| 23A30 | B4 | 09 | AE | 00 | 2E | 00 | 2B | 00 | 20 | 07 | 24 | 00 | FE | 06 | 24 | 00 |
| 23A40 | 60 | 05 | 38 | 00 | 38 | 00 | 24 | 00 | FE | 06 | 24 | 00 | 60 | 05 | 38 | 00 |
| 23A50 | 9E | 00 | FE | 06 | 24 | 00 | 60 | 05 | 38 | 00 | 24 | 00 | B4 | 09 | 9E | 00 |
| 23A60 | FC | 00 | 24 | 00 | 74 | 05 | 2E | 00 | 19 | 00 | 7A | 33 | 94 | 00 | 24 | 00 |
| 23A70 | FE | 06 | 24 | 00 | 60 | 05 | 38 | 00 | 94 | 00 | 80 | 33 | 94 | 00 | 7A | 00 |
| 23A80 | FC | 00 | 5A | 00 | FC | 00 | 24 | 00 | FE | 06 | 24 | 00 | 60 | 05 | 38 | 00 |
| 23A90 | 2E | 00 | 17 | 00 | 20 | 07 | 24 | 00 | FE | 06 | 24 | 00 | 60 | 05 | 38 | 00 |
| 23AA0 | 38 | 00 | 24 | 00 | B4 | 09 | 9E | 00 | FC | 00 | 24 | 00 | 28 | 00 | 68 | 07 |
| 23AB0 | 24 | 00 | 60 | 05 | 38 | 00 | 24 | 00 | B8 | 09 | D4 | 00 | E2 | 27 | AC | 00 |
| 23AC0 | 2E | 00 | 5D | 00 | F2 | 05 | 24 | 00 | FE | 06 | 24 | 00 | 60 | 05 | 38 | 00 |
| 23AD0 | 38 | 00 | 24 | 00 | EA | 27 | 9E | 00 | 20 | 07 | 24 | 00 | FE | 06 | 24 | 00 |
| 23AE0 | 60 | 05 | 38 | 00 | 38 | 00 | 24 | 00 | FE | 06 | 24 | 00 | 60 | 05 | 38 | 00 |
| 23AF0 | 9E | 00 | 6C | 08 | 24 | 00 | FE | 06 | 24 | 00 | 60 | 05 | 38 | 00 | 38 | 00 |
| 23B00 | 26 | 00 | A0 | 05 | 64 | 26 | BA | 00 | 9E | 00 | 1A | 07 | 24 | 00 | FE | 06 |
| 23B10 | 24 | 00 | 60 | 05 | 38 | 00 | 38 | 00 | 24 | 00 | 60 | 05 | 9E | 00 | FC | 00 |
| 23B20 | 24 | 00 | 60 | 05 | 88 | 00 | D2 | 00 | F4 | 00 | 03 | 00 | D0 | 03 | F2 | 00 |
| 23B30 | 03 | 00 | 68 | 02 | F4 | 00 | 03 | 00 | F2 | 00 | 05 | 00 | D2 | 01 | F4 | 00 |
| 23B40 | 03 | 00 | 24 | 00 | 22 | 00 | 18 | 02 | 88 | 00 | D2 | 00 | D2 | 01 | FC | 00 |
| 23B50 | F4 | 00 | 09 | 00 | 24 | 00 | 60 | 05 | 88 | 00 | D2 | 00 | F2 | 00 | 07 | 00 |
| 23B60 | 0A | 01 | FC | 00 | 02 | 00 | FC | 00 | FE | 06 | 24 | 00 | 60 | 05 | 38 | 00 |
| 23B70 | 24 | 00 | 60 | 05 | 9E | 00 | EC | 05 | 24 | 00 | 22 | 00 | 18 | 02 | 38 | 00 |
| 23B80 | 26 | 00 | 28 | 00 | 68 | 07 | 24 | 00 | 60 | 05 | 38 | 00 | 8E | 00 | 9E | 00 |
| 23B90 | 24 | 00 | EC | 05 | 24 | 00 | 22 | 00 | 18 | 02 | 38 | 00 | 1C | 25 | B4 | 00 |
| 23BA0 | 2E | 00 | 21 | 00 | F4 | 00 | 07 | 00 | 24 | 00 | 60 | 05 | 88 | 00 | D2 | 00 |
| 23BB0 | 24 | 00 | 1C | 25 | 88 | 00 | D2 | 00 | 0A | 01 | 54 | 00 | 01 | 00 | 81 | 11 |
| 23BC0 | 81 | 25 | FC | 00 | F4 | 00 | 03 | 00 | F4 | 00 | 03 | 00 | 24 | 00 | 32 | 25 |
| 23BD0 | 88 | 00 | 24 | 00 | EC | 05 | 24 | 00 | 22 | 00 | 18 | 02 | 38 | 00 | 8E | 00 |
| 23BE0 | 26 | 09 | 16 | 26 | FC | 00 | 24 | 00 | 22 | 00 | 24 | 00 | AE | 25 | 88 | 00 |
| 23BF0 | D2 | 00 | F2 | 00 | 05 | 00 | 32 | 01 | 26 | 09 | 92 | 08 | B4 | 09 | AC | 00 |
| 23C00 | C8 | 00 | 2E | 00 | 21 | 00 | F4 | 00 | 07 | 00 | 24 | 00 | 60 | 05 | 88 | 00 |
| 23C10 | D2 | 00 | 24 | 00 | 1C | 25 | 88 | 00 | D2 | 00 | 0A | 01 | 54 | 00 | 01 | 00 |
| 23C20 | 81 | 11 | 81 | 25 | FC | 00 | 04 | 07 | 24 | 00 | 22 | 00 | 18 | 02 | 38 | 00 |
| 23C30 | 24 | 00 | 26 | 09 | 92 | 08 | 9E | 00 | F8 | 06 | 24 | 00 | 22 | 00 | 18 | 02 |
| 23C40 | 38 | 00 | 24 | 00 | 26 | 09 | 9A | 08 | 9E | 00 | FE | 06 | 24 | 00 | 22 | 00 |
| 23C50 | 18 | 02 | 38 | 00 | 24 | 00 | 26 | 09 | A2 | 08 | 9E | 00 | FC | 00 | 52 | 07 |
| 23C60 | 24 | 00 | 22 | 00 | 18 | 02 | 38 | 00 | 26 | 09 | AA | 08 | 9E | 00 | 7E | 07 |
| 23C70 | 24 | 00 | 22 | 00 | 18 | 02 | 38 | 00 | 26 | 09 | B2 | 08 | 9E | 00 | 20 | 07 |
| 23C80 | 24 | 00 | 22 | 00 | 18 | 02 | 38 | 00 | 24 | 00 | 60 | 05 | 9E | 00 | FC | 00 |
| 23C90 | 24 | 00 | 22 | 00 | 24 | 00 | 1C | 30 | 88 | 00 | D2 | 00 | 24 | 00 | 22 | 00 |
| 23CA0 | 18 | 02 | 88 | 00 | D2 | 00 | 32 | 01 | 2E | 00 | 13 | 00 | FE | 06 | 24 | 00 |
| 23CB0 | 22 | 00 | 18 | 02 | 38 | 00 | 24 | 00 | 60 | 05 | 9E | 00 | FC | 00 | FE | 06 |
| 23CC0 | 24 | 00 | 60 | 05 | 38 | 00 | 24 | 00 | FE | 06 | 24 | 00 | 22 | 00 | 18 | 02 |
| 23CD0 | 38 | 00 | 9E | 00 | 68 | 07 | 24 | 00 | 60 | 05 | 38 | 00 | 9C | 27 | 9E | 00 |
| 23CE0 | FC | 00 | 24 | 00 | 04 | 07 | 24 | 00 | 22 | 00 | 18 | 02 | 38 | 00 | 48 | 25 |
| 23CF0 | C2 | 00 | 54 | 00 | 11 | 00 | D5 | 17 | 65 | 28 | F9 | 17 | A1 | 28 | F5 | 16 |
| 23D00 | D9 | 27 | F5 | 16 | D9 | 27 | F5 | 16 | D9 | 27 | D5 | 17 | 65 | 28 | D5 | 17 |
| 23D10 | 65 | 28 | F9 | 17 | A1 | 28 | F9 | 17 | A1 | 28 | FC | 00 | 54 | 00 | 01 | 00 |
| 23D20 | D5 | 17 | 65 | 28 | FC | 00 | 68 | 07 | 24 | 00 | 60 | 05 | 38 | 00 | 9C | 27 |

| | | | | | | | | | | | | | | | | |
|---|---|---|---|---|---|---|---|---|---|---|---|---|---|---|---|---|
| 23D30 | 9E | 00 | F4 | 00 | 09 | 00 | 24 | 00 | 60 | 05 | 88 | 00 | D2 | 00 | F2 | 00 |
| 23D40 | 07 | 00 | 0A | 01 | F2 | 05 | 24 | 00 | 60 | 05 | 38 | 00 | 24 | 00 | 5C | 25 |
| 23D50 | 9E | 00 | 1A | 07 | 24 | 00 | 60 | 05 | 38 | 00 | 24 | 00 | B4 | 09 | 9E | 00 |
| 23D60 | 78 | 08 | 24 | 00 | 60 | 05 | 38 | 00 | 26 | 00 | A0 | 05 | B2 | 25 | BA | 00 |
| 23D70 | 9E | 00 | FC | 00 | 24 | 00 | EC | 25 | 88 | 00 | D2 | 00 | F2 | 00 | 07 | 00 |
| 23D80 | EA | 02 | 24 | 00 | 1A | 07 | 24 | 00 | 60 | 05 | 38 | 00 | 2E | 00 | 05 | 00 |
| 23D90 | 02 | 00 | FC | 00 | F2 | 05 | 24 | 00 | 60 | 05 | 38 | 00 | 24 | 00 | 48 | 25 |
| 23DA0 | 9E | 00 | F2 | 00 | 03 | 00 | 68 | 02 | D8 | 32 | 24 | 00 | 60 | 05 | 88 | 00 |
| 23DB0 | D2 | 00 | 40 | 02 | FC | 00 | 3C | 32 | 24 | 00 | 22 | 00 | 24 | 00 | 60 | 05 |
| 23DC0 | 88 | 00 | D2 | 00 | 72 | 02 | 9E | 00 | 24 | 00 | 3C | 32 | 5C | 25 | AC | 00 |
| 23DD0 | 3C | 32 | 48 | 25 | AC | 00 | C8 | 00 | 2E | 00 | 17 | 00 | 68 | 07 | 24 | 00 |
| 23DE0 | 60 | 05 | 38 | 00 | 72 | 26 | 9E | 00 | 54 | 00 | 01 | 00 | F9 | 17 | A1 | 28 |
| 23DF0 | FC | 00 | 24 | 00 | 3C | 32 | 4C | 25 | AE | 00 | 2E | 00 | 05 | 00 | 02 | 00 |
| 23E00 | FC | 00 | 66 | 04 | FC | 00 | 24 | 00 | 22 | 00 | 24 | 00 | 1C | 27 | 86 | 00 |
| 23E10 | D2 | 00 | F2 | 00 | 05 | 00 | 32 | 01 | B4 | 09 | AC | 00 | 2E | 00 | 0B | 00 |
| 23E20 | 54 | 00 | 01 | 00 | 95 | 24 | B1 | 36 | FC | 00 | 24 | 00 | 22 | 00 | 46 | 01 |
| 23E30 | 2E | 00 | 21 | 00 | F4 | 00 | 07 | 00 | 24 | 00 | 60 | 05 | 88 | 00 | D2 | 00 |
| 23E40 | 24 | 00 | 32 | 25 | 83 | 00 | D2 | 00 | 0A | 01 | 54 | 00 | 01 | 00 | 81 | 11 |
| 23E50 | 81 | 25 | FC | 00 | 24 | 00 | FE | 06 | 24 | 00 | 60 | 05 | 38 | 00 | 60 | 05 |
| 23E60 | AE | 00 | 2E | 00 | 5D | 00 | 3C | 32 | 24 | 00 | 22 | 00 | AA | 01 | 9E | 00 |
| 23E70 | FE | 06 | 24 | 00 | 22 | 00 | 18 | 02 | 38 | 00 | 24 | 00 | 3C | 32 | 9E | 00 |
| 23E80 | F4 | 00 | 07 | 00 | 24 | 00 | 60 | 05 | 88 | 00 | D2 | 00 | 24 | 00 | 10 | 25 |
| 23E90 | 88 | 00 | D2 | 00 | 0A | 01 | 24 | 00 | 3C | 32 | B4 | 09 | AC | 00 | 2E | 00 |
| 23EA0 | 21 | 00 | F4 | 00 | 07 | 00 | 24 | 00 | 60 | 05 | 88 | 00 | D2 | 00 | 24 | 00 |
| 23EB0 | 32 | 25 | 88 | 00 | D2 | 00 | 0A | 01 | 54 | 00 | 01 | 00 | 81 | 11 | 81 | 25 |
| 23EC0 | FC | 00 | 24 | 00 | FE | 06 | 24 | 00 | 60 | 05 | 38 | 00 | 60 | 05 | AE | 00 |
| 23ED0 | 04 | 07 | 24 | 00 | 60 | 05 | 38 | 00 | 48 | 25 | C2 | 00 | 5C | 25 | AE | 00 |
| 23EE0 | C8 | 00 | 2E | 00 | 0F | 00 | 54 | 00 | 01 | 00 | E9 | 18 | BF | 28 | 2A | 00 |
| 23EF0 | 11 | 00 | F2 | 05 | 24 | 00 | 60 | 05 | 38 | 00 | 24 | 00 | C0 | 26 | 9E | 00 |
| 23F00 | FC | 00 | 52 | 04 | 24 | 00 | 22 | 00 | 24 | 00 | 60 | 05 | 88 | 00 | D2 | 00 |
| 23F10 | D6 | 02 | 2E | 00 | 05 | 00 | 02 | 00 | FC | 00 | 24 | 00 | FE | 06 | 24 | 00 |
| 23F20 | 60 | 05 | 38 | 00 | 60 | 05 | AC | 00 | 22 | 00 | 24 | 00 | 6A | 0A | 88 | 00 |
| 23F30 | D2 | 00 | F2 | 00 | 05 | 00 | 32 | 01 | C6 | 00 | D6 | 06 | 24 | 00 | 60 | 05 |
| 23F40 | 38 | 00 | 32 | 25 | AC | 00 | C6 | 00 | 2E | 00 | 29 | 00 | 24 | 00 | B2 | 25 |
| 23F50 | DC | 06 | 24 | 00 | 60 | 05 | 38 | 00 | BA | 00 | 88 | 00 | D2 | 00 | 24 | 00 |
| 23F60 | E2 | 06 | 24 | 00 | 60 | 05 | 38 | 00 | 88 | 00 | D2 | 00 | F4 | 00 | 01 | 00 |
| 23F70 | FE | 02 | FC | 00 | 24 | 00 | 04 | 07 | 24 | 00 | 22 | 00 | 18 | 02 | 38 | 00 |
| 23F80 | 48 | 25 | C0 | 00 | 54 | 00 | 17 | 00 | E5 | 19 | DD | 28 | E5 | 19 | DD | 28 |
| 23F90 | E5 | 19 | DD | 28 | E5 | 19 | DD | 28 | E5 | 19 | DD | 28 | E5 | 19 | DD | 28 |
| 23FA0 | 95 | 24 | B1 | 36 | 95 | 24 | B1 | 36 | 95 | 24 | B1 | 36 | 6F | 1C | 31 | 2A |
| 23FB0 | E5 | 19 | DD | 28 | 6F | 1C | 31 | 2A | FC | 00 | 24 | 00 | FE | 06 | 24 | 00 |
| 23FC0 | 60 | 05 | 38 | 00 | 60 | 05 | AE | 00 | 2E | 00 | 28 | 00 | 24 | 00 | FE | 06 |
| 23FD0 | 24 | 00 | 60 | 05 | 38 | 00 | 88 | 00 | D2 | 00 | F4 | 00 | 03 | 00 | D0 | 03 |
| 23FE0 | F4 | 00 | 03 | 00 | 24 | 00 | FE | 06 | 24 | 00 | 60 | 05 | 38 | 00 | 88 | 00 |
| 23FF0 | D2 | 00 | D2 | 01 | FC | 00 | F4 | 00 | 07 | 00 | 24 | 00 | 60 | 05 | 88 | 00 |
| 24000 | D2 | 00 | 24 | 00 | 1C | 25 | 88 | 00 | D2 | 00 | 0A | 01 | 54 | 00 | 01 | 00 |
| 24010 | 81 | 11 | 81 | 25 | FC | 00 | 24 | 00 | 74 | 05 | 2E | 00 | 17 | 00 | 92 | 33 |
| 24020 | 94 | 00 | 7C | 00 | 52 | 07 | 24 | 00 | 22 | 00 | 18 | 02 | 38 | 00 | 94 | 00 |
| 24030 | 7A | 00 | FC | 00 | F2 | 05 | 24 | 00 | 60 | 05 | 38 | 00 | 24 | 00 | 38 | 26 |
| 24040 | 9E | 00 | 1A | 07 | 24 | 00 | 60 | 05 | 38 | 00 | 24 | 00 | B4 | 09 | 9E | 00 |
| 24050 | 7E | 08 | 24 | 00 | 60 | 05 | 38 | 00 | 26 | 00 | A0 | 05 | 9E | 00 | 94 | 07 |
| 24060 | 24 | 00 | 60 | 05 | 38 | 00 | 22 | 00 | F6 | 26 | 9E | 00 | 78 | 08 | 24 | 00 |
| 24070 | 60 | 05 | 38 | 00 | 26 | 00 | 54 | 25 | CC | 05 | 24 | 00 | 1C | 25 | 22 | 00 |
| 24080 | 24 | 00 | 48 | 26 | 88 | 00 | D2 | 00 | F2 | 00 | 05 | 00 | 32 | 01 | BA | 00 |
| 24090 | 88 | 00 | BE | 00 | BA | 00 | A0 | 05 | BA | 00 | 9E | 00 | FC | 00 | 24 | 00 |
| 240A0 | 22 | 00 | 18 | 02 | 88 | 00 | D2 | 00 | 58 | 03 | 24 | 00 | 1A | 07 | 24 | 00 |
| 240B0 | 60 | 05 | 38 | 00 | 2E | 00 | 05 | 00 | 02 | 00 | FC | 00 | 24 | 00 | 04 | 07 |
| 240C0 | 24 | 00 | 22 | 00 | 18 | 02 | 38 | 00 | 48 | 25 | C2 | 00 | 54 | 00 | 11 | 00 |
| 240D0 | 0D | 1B | 69 | 29 | 0D | 1B | 69 | 29 | C5 | 1A | 0F | 29 | C5 | 1A | 0F | 29 |
| 240E0 | C5 | 1A | 0F | 29 | C5 | 1A | 0F | 29 | C5 | 1A | 0F | 29 | C5 | 1D | F9 | 2A |
| 240F0 | C5 | 1D | F9 | 2A | FC | 00 | F4 | 00 | 09 | 00 | 24 | 00 | 60 | 05 | 88 | 00 |
| 24100 | D2 | 00 | F2 | 00 | 07 | 00 | 0A | 01 | 24 | 00 | FE | 06 | 24 | 00 | 22 | 00 |
| 24110 | 18 | 02 | 38 | 00 | 60 | 05 | AE | 00 | 2E | 00 | 19 | 00 | 24 | 00 | FE | 06 |
| 24120 | 24 | 00 | 22 | 00 | 18 | 02 | 38 | 00 | 88 | 00 | D2 | 00 | F4 | 00 | 03 | 00 |
| 24130 | D0 | 03 | FC | 00 | 54 | 00 | 01 | 00 | 21 | 1C | F5 | 29 | FC | 00 | F4 | 00 |

```
24140   09 00 24 00 60 05 88 00 D2 00 F2 00 07 00 0A 01
24150   1A 07 24 00 60 05 38 00 24 00 B4 09 9E 00 FC 00
24160   58 00 23 00 1C 00 12 00 24 00 1A 07 24 00 60 05
24170   38 00 B4 09 AC 00 3C 00 24 00 10 25 88 00 D2 00
24180   F2 00 07 00 EA 02 5C 00 FC 00 F4 00 03 00 24 00
24190   60 05 88 00 D2 00 24 00 FE 06 24 00 60 05 38 00
241A0   88 00 D2 00 0A 01 FC 00 6C 08 24 00 60 05 38 00
241B0   26 00 AC 05 A0 05 BA 00 9E 00 F2 05 24 00 60 05
241C0   38 00 24 00 58 25 9E 00 24 00 22 00 24 00 44 27
241D0   88 00 D2 00 F2 00 05 00 32 01 2E 00 19 00 6C 08
241E0   24 00 60 05 38 00 26 00 A0 05 AC 05 10 25 BE 00
241F0   BA 00 9E 00 FC 00 26 00 6C 08 24 00 60 05 38 00
24200   A0 05 B0 00 84 00 2E 00 05 00 02 00 FC 00 F4 00
24210   05 00 24 00 60 05 88 00 D2 00 24 00 FE 06 24 00
24220   60 05 38 00 88 00 D2 00 0A 01 24 00 FE 06 24 00
24230   60 05 38 00 60 05 AE 00 2E 00 17 00 24 00 FE 06
24240   24 00 60 05 38 00 88 00 D2 00 F4 00 03 00 D0 03
24250   FC 00 1A 07 24 00 60 05 38 00 24 00 B4 09 9E 00
24260   F2 05 24 00 60 05 38 00 24 00 6A 0A 9E 00 FC 00
24270   24 00 B8 09 88 00 D2 00 F2 00 07 00 EA 02 24 00
24280   1A 07 24 00 60 05 38 00 2E 00 05 00 02 00 FC 00
24290   F0 01 48 27 E6 01 54 00 01 00 11 13 85 26 FC 00
242A0   F2 05 24 00 60 05 38 00 24 00 50 25 9E 00 1A 07
242B0   24 00 60 05 38 00 24 00 B4 09 9E 00 78 08 24 00
242C0   60 05 38 00 26 00 6A 0A CC 05 24 00 1C 25 22 00
242D0   24 00 48 26 88 00 D2 00 F2 00 05 00 32 01 BA 00
242E0   88 00 BE 00 BA 00 A0 05 BA 00 9E 00 FC 00 24 00
242F0   22 00 18 02 88 00 D2 00 44 03 24 00 1A 07 24 00
24300   60 05 38 00 2E 00 05 00 02 00 FC 00 24 00 74 05
24310   68 05 B4 09 AC 00 C6 00 2E 00 09 00 A4 33 94 00
24320   7A 00 FC 00 24 00 68 05 2E 00 0B 00 54 00 01 00
24330   F7 1E C1 2B FC 00 24 00 FE 06 24 00 60 05 38 00
24340   60 05 AE 00 2E 00 27 00 24 00 FE 06 24 00 60 05
24350   38 00 88 00 D2 00 F4 00 03 00 D0 03 24 00 FE 06
24360   24 00 60 05 38 00 88 00 D2 00 68 02 FC 00 F4 00
24370   09 00 24 00 FE 06 24 00 60 05 38 00 88 00 D2 00
24380   F2 00 07 00 0A 01 F4 00 09 00 24 00 60 05 88 00
24390   D2 00 F2 00 07 00 0A 01 F2 05 24 00 60 05 38 00
243A0   24 00 A0 27 9E 00 1A 07 24 00 60 05 38 00 24 00
243B0   B4 09 9E 00 FC 00 24 00 48 25 88 00 D2 00 F2 00
243C0   07 00 EA 02 24 00 1A 07 24 00 60 05 38 00 2E 00
243D0   05 00 02 00 FC 00 F4 00 07 00 24 00 60 05 88 00
243E0   D2 00 24 00 1C 25 88 00 D2 00 0A 01 54 00 01 00
243F0   81 11 81 25 FC 00 6C 08 24 00 60 05 38 00 26 00
24400   CC 05 24 00 1C 25 22 00 24 00 48 26 88 00 D2 00
24410   F2 00 05 00 32 01 BA 00 88 00 BE 00 A0 05 BA 00
24420   9E 00 F2 05 24 00 60 05 38 00 24 00 3C 26 9E 00
24430   F4 00 07 00 24 00 FE 06 24 00 60 05 38 00 88 00
24440   D2 00 24 00 10 25 88 00 D2 00 0A 01 FC 00 7E 06
24450   24 00 60 05 38 00 9C 00 94 07 24 00 60 05 38 00
24460   9C 00 FC 00 24 00 22 00 24 00 5C 25 88 00 D2 00
24470   24 00 22 00 18 02 88 00 D2 00 32 01 2E 00 21 00
24480   22 00 7E 07 24 00 22 00 18 02 38 00 A0 01 24 00
24490   FE 06 24 00 60 05 38 00 88 00 D2 00 1C 03 FC 00
244A0   24 00 22 00 24 00 FE 06 24 00 60 05 38 00 88 00
244B0   D2 00 72 02 5C 25 AC 00 22 00 24 00 5C 25 88 00
244C0   D2 00 24 00 22 00 18 02 88 00 D2 00 32 01 B4 09
244D0   AC 00 22 00 24 00 FE 06 24 00 60 05 38 00 88 00
244E0   D2 00 D6 02 C6 00 D8 00 2E 00 13 00 68 05 24 00
244F0   1C 25 9E 00 54 00 01 00 F7 1E C1 2B FC 00 26 00
24500   6C 08 24 00 60 05 38 00 A0 05 B0 00 84 00 2E 00
24510   05 00 02 00 FC 00 68 05 24 00 B4 09 9E 00 54 00
24520   01 00 DB 1C 77 2A FC 00 24 00 74 05 68 05 C6 00
24530   2E 00 09 00 36 27 94 00 7A 00 FC 00 F4 00 09 00
24540   24 00 60 05 88 00 D2 00 F2 00 07 00 0A 01 F4 00
```

| | | | | | | | | | | | | | | | | |
|---|---|---|---|---|---|---|---|---|---|---|---|---|---|---|---|---|
| 24550 | 09 | 00 | 24 | 00 | FE | 06 | 24 | 00 | 60 | 05 | 38 | 00 | 88 | 00 | D2 | 00 |
| 24560 | F2 | 00 | 07 | 00 | 0A | 01 | FC | 00 | 7E | 08 | 24 | 00 | 60 | 05 | 38 | 00 |
| 24570 | 26 | 00 | A0 | 05 | 9E | 00 | 94 | 07 | 24 | 00 | 60 | 05 | 38 | 00 | 22 | 00 |
| 24580 | F6 | 26 | 9E | 00 | FC | 00 | 24 | 00 | 22 | 00 | 24 | 00 | 6A | 0A | 88 | 00 |
| 24590 | D2 | 00 | 24 | 00 | 22 | 00 | 18 | 02 | 88 | 00 | D2 | 00 | 32 | 01 | FE | 06 |
| 245A0 | 24 | 00 | 60 | 05 | 38 | 00 | 60 | 05 | AE | 00 | 22 | 00 | 24 | 00 | 6A | 0A |
| 245B0 | 88 | 00 | D2 | 00 | F2 | 00 | 05 | 00 | 32 | 01 | C8 | 00 | C6 | 00 | 2E | 00 |
| 245C0 | 13 | 00 | 24 | 00 | FE | 06 | 24 | 00 | 60 | 05 | 38 | 00 | 88 | 00 | D2 | 00 |
| 245D0 | 2C | 02 | FC | 00 | 58 | 00 | 83 | 00 | FC | 00 | 24 | 00 | 60 | 05 | 88 | 00 |
| 245E0 | D2 | 00 | 68 | 02 | 24 | 00 | FE | 06 | 24 | 00 | 60 | 05 | 38 | 00 | 88 | 00 |
| 245F0 | D2 | 00 | 68 | 02 | FC | 00 | 24 | 00 | 04 | 07 | 24 | 00 | 60 | 05 | 38 | 00 |
| 24600 | 48 | 25 | C0 | 00 | 38 | 26 | AC | 00 | 2E | 00 | 11 | 00 | DE | 28 | 24 | 00 |
| 24610 | 60 | 05 | 88 | 00 | D2 | 00 | 40 | 02 | 02 | 00 | FC | 00 | 24 | 00 | 22 | 00 |
| 24620 | 24 | 00 | 48 | 25 | 88 | 00 | D2 | 00 | F2 | 00 | 05 | 00 | 32 | 01 | 2E | 00 |
| 24630 | 1D | 00 | 22 | 00 | 7E | 07 | 24 | 00 | 60 | 05 | 38 | 00 | A0 | 01 | 24 | 00 |
| 24640 | 60 | 05 | 88 | 00 | D2 | 00 | 1C | 03 | 2A | 00 | 0F | 00 | E4 | 28 | 24 | 00 |
| 24650 | 60 | 05 | 88 | 00 | D2 | 00 | 1C | 03 | FC | 00 | 5A | 00 | FC | 00 | 30 | 03 |
| 24660 | 72 | 08 | 24 | 00 | 60 | 05 | 38 | 00 | 26 | 00 | 6C | 08 | 24 | 00 | 60 | 05 |
| 24670 | 38 | 00 | 64 | 26 | BC | 00 | 9E | 00 | FC | 00 | 24 | 00 | 04 | 07 | 24 | 00 |
| 24680 | 22 | 00 | 18 | 02 | 38 | 00 | 48 | 25 | C2 | 00 | 5C | 25 | AE | 00 | FE | 06 |
| 24690 | 24 | 00 | 60 | 05 | 38 | 00 | 60 | 05 | AE | 00 | C8 | 00 | 2E | 00 | 0F | 00 |
| 246A0 | 54 | 00 | 01 | 00 | A3 | 20 | 89 | 2C | 2A | 00 | 11 | 00 | F2 | 05 | 24 | 00 |
| 246B0 | 60 | 05 | 38 | 00 | 24 | 00 | 0A | 26 | 9E | 00 | FC | 00 | 52 | 04 | 24 | 00 |
| 246C0 | 22 | 00 | 24 | 00 | 60 | 05 | 88 | 00 | D2 | 00 | D6 | 02 | 2E | 00 | 05 | 00 |
| 246D0 | 02 | 00 | FC | 00 | F4 | 00 | 03 | 00 | 24 | 00 | 60 | 05 | 88 | 00 | D2 | 00 |
| 246E0 | 24 | 00 | FE | 06 | 24 | 00 | 60 | 05 | 38 | 00 | 88 | 00 | D2 | 00 | 0A | 01 |
| 246F0 | F2 | 05 | 24 | 00 | 60 | 05 | 38 | 00 | 24 | 00 | 52 | 27 | 9E | 00 | FC | 00 |
| 24700 | 24 | 00 | 22 | 00 | 24 | 00 | 60 | 05 | 88 | 00 | D2 | 00 | D6 | 02 | 22 | 00 |
| 24710 | 24 | 00 | FE | 06 | 24 | 00 | 60 | 05 | 38 | 00 | 88 | 00 | D2 | 00 | D6 | 02 |
| 24720 | C8 | 00 | 2E | 00 | 15 | 00 | 78 | 08 | 24 | 00 | 60 | 05 | 38 | 00 | 26 | 00 |
| 24730 | A0 | 05 | 6A | 0A | BA | 00 | 9E | 00 | FC | 00 | 26 | 00 | 78 | 08 | 24 | 00 |
| 24740 | 60 | 05 | 38 | 00 | A0 | 05 | B4 | 00 | 22 | 00 | 24 | 00 | 60 | 05 | 88 | 00 |
| 24750 | D2 | 00 | 72 | 02 | 5C | 25 | AC | 00 | C8 | 00 | 84 | 00 | 2E | 00 | 0B | 00 |
| 24760 | 54 | 00 | 01 | 00 | 41 | 22 | ED | 2C | FC | 00 | 26 | 00 | 72 | 08 | 24 | 00 |
| 24770 | 60 | 05 | 38 | 00 | A0 | 05 | B4 | 00 | 84 | 00 | 58 | 00 | 77 | 00 | FC | 00 |
| 24780 | 26 | 00 | 6C | 08 | 24 | 00 | 60 | 05 | 38 | 00 | A0 | 05 | B0 | 00 | 84 | 00 |
| 24790 | 2E | 00 | 25 | 00 | 24 | 00 | 60 | 05 | 88 | 00 | D2 | 00 | F2 | 00 | 05 | 00 |
| 247A0 | 14 | 01 | 72 | 08 | 24 | 00 | 60 | 05 | 38 | 00 | 26 | 00 | A0 | 05 | 54 | 25 |
| 247B0 | BA | 00 | 9E | 00 | 02 | 00 | FC | 00 | 24 | 00 | 32 | 25 | 88 | 00 | 58 | 00 |
| 247C0 | 1D | 00 | 52 | 00 | 24 | 00 | 86 | 27 | 88 | 00 | 5A | 01 | 24 | 00 | 60 | 05 |
| 247D0 | 88 | 00 | D2 | 00 | 24 | 00 | 54 | 25 | 88 | 00 | D2 | 00 | 14 | 01 | 5C | 00 |
| 247E0 | 72 | 08 | 24 | 00 | 60 | 05 | 38 | 00 | 26 | 00 | A0 | 05 | 48 | 25 | BA | 00 |
| 247F0 | 9E | 00 | FC | 00 | 5A | 00 | FC | 00 | 26 | 00 | 78 | 08 | 24 | 00 | 60 | 05 |
| 24800 | 38 | 00 | B8 | 09 | BC | 00 | A0 | 05 | B4 | 00 | 84 | 00 | 2E | 00 | 11 | 00 |
| 24810 | 24 | 00 | 60 | 05 | 88 | 00 | D2 | 00 | F2 | 00 | 05 | 00 | 14 | 01 | FC | 00 |
| 24820 | 26 | 00 | 6C | 08 | 24 | 00 | 60 | 05 | 38 | 00 | A0 | 05 | B0 | 00 | 84 | 00 |
| 24830 | 2E | 00 | 05 | 00 | 02 | 00 | FC | 00 | 26 | 00 | 22 | 00 | 24 | 00 | 8A | 27 |
| 24840 | 88 | 00 | D2 | 00 | F2 | 00 | 05 | 00 | 32 | 01 | 22 | 00 | 24 | 00 | 4C | 26 |
| 24850 | 88 | 00 | D2 | 00 | F2 | 00 | 05 | 00 | 32 | 01 | B4 | 05 | BA | 00 | B0 | 05 |
| 24860 | BC | 00 | A0 | 05 | B0 | 00 | C8 | 00 | 84 | 00 | 2E | 00 | 05 | 00 | 02 | 00 |
| 24870 | FC | 00 | 24 | 00 | FE | 06 | 24 | 00 | 60 | 05 | 38 | 00 | 60 | 05 | AE | 00 |
| 24880 | 2E | 00 | 27 | 00 | 24 | 00 | FE | 06 | 24 | 00 | 60 | 05 | 38 | 00 | 88 | 00 |
| 24890 | D2 | 00 | F4 | 00 | 03 | 00 | D0 | 03 | 24 | 00 | FE | 06 | 24 | 00 | 60 | 05 |
| 248A0 | 38 | 00 | 88 | 00 | D2 | 00 | 68 | 02 | FC | 00 | 24 | 00 | EC | 05 | 24 | 00 |
| 248B0 | 22 | 00 | 18 | 02 | 38 | 00 | B4 | 09 | AC | 00 | 2E | 00 | 0B | 00 | 54 | 00 |
| 248C0 | 01 | 00 | C1 | 22 | 41 | 2E | FC | 00 | 24 | 00 | 32 | 25 | 88 | 00 | 58 | 00 |
| 248D0 | 1D | 00 | 52 | 00 | F0 | 01 | BC | 33 | E6 | 01 | EC | 05 | 24 | 00 | 60 | 05 |
| 248E0 | 38 | 00 | EC | 05 | 24 | 00 | 22 | 00 | 18 | 02 | 38 | 00 | 0E | 29 | 5C | 00 |
| 248F0 | FC | 00 | 54 | 00 | 01 | 00 | 11 | 13 | 85 | 26 | FC | 00 | F2 | 00 | 03 | 00 |
| 24900 | 68 | 02 | D8 | 32 | 24 | 00 | 60 | 05 | 88 | 00 | D2 | 00 | 40 | 02 | FC | 00 |
| 24910 | 1A | 07 | 24 | 00 | 60 | 05 | 38 | 00 | 24 | 00 | B4 | 09 | 9E | 00 | F2 | 05 |
| 24920 | 24 | 00 | 60 | 05 | 38 | 00 | 24 | 00 | 36 | 25 | 9E | 00 | FC | 00 | 24 | 00 |
| 24930 | EC | 25 | 88 | 00 | D2 | 00 | F2 | 00 | 07 | 00 | EA | 02 | 24 | 00 | 1A | 07 |
| 24940 | 24 | 00 | 60 | 05 | 38 | 00 | 2E | 00 | 05 | 00 | 02 | 00 | FC | 00 | F2 | 05 |
| 24950 | 24 | 00 | 60 | 05 | 38 | 00 | 24 | 00 | 0A | 28 | 9E | 00 | 68 | 07 | 24 | 00 |

```
24960   60 05 38 00 9C 27 9E 00 6C 08 24 00 60 05 38 00
24970   26 00 A0 05 52 27 BA 00 9E 00 FC 00 3C 32 24 00
24980   22 00 24 00 60 05 88 00 D2 00 72 02 9E 00 26 00
24990   6C 08 24 00 60 05 38 00 A0 05 B4 00 3C 32 5C 25
249A0   AC 00 C8 00 3C 32 48 25 AC 00 C8 00 84 00 2E 00
249B0   0B 00 54 00 01 00 81 11 81 25 FC 00 24 00 3C 32
249C0   4C 25 AE 00 2E 00 05 00 02 00 FC 00 66 04 FC 00
249D0   F2 05 24 00 60 05 38 00 24 00 64 26 9E 00 1A 07
249E0   24 00 60 05 38 00 24 00 B4 09 9E 00 FC 00 F2 00
249F0   03 00 68 07 24 00 60 05 38 00 EA 02 24 00 1A 07
24A00   24 00 60 05 38 00 2E 00 05 00 02 00 FC 00 F2 05
24A10   24 00 60 05 38 00 24 00 EA 27 9E 00 1A 07 24 00
24A20   60 05 38 00 24 00 B4 09 9E 00 FC 00 24 00 B8 09
24A30   88 00 D2 00 F2 00 07 00 EA 02 24 00 1A 07 24 00
24A40   60 05 38 00 2E 00 05 00 02 00 FC 00 F4 00 03 00
24A50   F4 00 03 00 24 00 32 25 88 00 24 00 EC 05 24 00
24A60   60 05 38 00 8E 00 26 09 16 26 26 09 C2 08 68 07
24A70   24 00 60 05 38 00 9E 00 FC 00 F4 00 03 00 F4 00
24A80   03 00 24 00 32 25 88 00 24 00 EC 05 24 00 60 05
24A90   38 00 8E 00 26 09 CA 29 54 00 01 00 81 11 81 25
24AA0   FC 00 26 00 6C 08 24 00 60 05 38 00 A0 05 B0 00
24AB0   84 00 2E 00 09 00 02 00 2A 00 0B 00 54 00 01 00
24AC0   EF 14 E9 26 FC 00 24 00 04 07 24 00 60 05 38 00
24AD0   48 25 C2 00 1C 25 AC 00 2E 00 29 00 40 32 24 00
24AE0   22 00 24 00 2A 28 88 00 D2 00 24 00 B8 09 88 00
24AF0   D2 00 24 00 90 05 88 00 D2 00 F4 02 9E 00 2A 00
24B00   25 00 40 32 24 00 22 00 24 00 B4 09 88 00 D2 00
24B10   24 00 B8 09 88 00 D2 00 24 00 90 05 88 00 D2 00
24B20   F4 02 9E 00 FC 00 24 00 40 32 B4 09 AC 00 2E 00
24B30   0F 00 54 00 01 00 11 13 85 26 2A 00 29 00 24 00
24B40   22 00 18 02 88 00 D2 00 24 00 40 32 88 00 D2 00
24B50   28 01 68 07 24 00 40 32 38 00 68 07 24 00 60 05
24B60   38 00 9E 00 FC 00 94 07 24 00 40 32 38 00 22 00
24B70   F6 26 9E 00 FC 00 F4 00 09 00 24 00 60 05 68 00
24B80   D2 00 F2 00 07 00 0A 01 FC 00 24 00 04 07 24 00
24B90   22 00 18 02 38 00 48 25 C2 00 1C 25 AE 00 2E 00
24BA0   0B 00 54 00 01 00 B1 26 1D 39 FC 00 1A 07 24 00
24BB0   60 05 38 00 24 00 B4 09 9E 00 58 00 23 00 1C 00
24BC0   12 00 24 00 1A 07 24 00 60 05 38 00 B4 09 AC 00
24BD0   3C 00 24 00 10 25 88 00 D2 00 F2 00 07 00 EA 02
24BE0   5C 00 FC 00 F4 00 03 00 24 00 60 05 88 00 D2 00
24BF0   24 00 40 32 68 00 D2 00 0A 01 1A 07 24 00 60 05
24C00   38 00 24 00 40 32 9E 00 72 08 24 00 60 05 38 00
24C10   26 00 A0 05 9E 00 FC 00 24 00 4C 25 DC 06 24 00
24C20   40 32 38 00 BA 00 88 00 D2 00 24 00 E2 06 24 00
24C30   40 32 38 00 88 00 D2 00 F4 00 01 00 FE 02 FC 00
24C40   6C 08 24 00 60 05 38 00 26 00 A0 05 4C 25 BA 00
24C50   9E 00 24 00 AC 05 4C 25 B4 00 2E 00 15 00 6C 08
24C60   24 00 60 05 38 00 26 00 A0 05 AC 05 BA 00 9E 00
24C70   FC 00 F2 05 24 00 60 05 38 00 24 00 12 28 9E 00
24C80   FC 00 26 00 6C 08 24 00 60 05 38 00 A0 05 B0 00
24C90   84 00 2E 00 05 00 02 00 FC 00 40 32 24 00 1A 07
24CA0   24 00 60 05 38 00 9E 00 F4 00 05 00 24 00 60 05
24CB0   88 00 D2 00 24 00 40 32 88 00 D2 00 0A 01 24 00
24CC0   DC 06 24 00 40 32 38 00 88 00 D2 00 24 00 E2 06
24CD0   24 00 40 32 38 00 88 00 D2 00 F4 00 01 00 FE 02
24CE0   FC 00 24 00 74 05 2E 00 21 00 2E 28 94 00 24 00
24CF0   EC 05 24 00 22 00 18 02 38 00 94 00 46 28 94 00
24D00   24 00 40 32 94 00 7A 00 FC 00 20 07 24 00 40 32
24D10   38 00 24 00 40 32 9E 00 6C 08 24 00 40 32 38 00
24D20   26 00 A0 05 9E 00 FC 00 72 08 24 00 40 32 38 00
24D30   26 00 A0 05 72 08 24 00 60 05 38 00 BC 00 9E 00
24D40   FC 00 1A 07 24 00 60 05 38 00 24 00 B4 09 9E 00
24D50   F2 05 24 00 60 05 38 00 24 00 16 28 9E 00 FC 00
24D60   24 00 B8 09 88 00 D2 00 F2 00 07 00 EA 02 24 00
```

| | | | | | | | | | | | | | | | | |
|---|---|---|---|---|---|---|---|---|---|---|---|---|---|---|---|---|
| 24D70 | 1A | 07 | 24 | 00 | 60 | 05 | 38 | 00 | 2E | 00 | 05 | 00 | 02 | 00 | FC | 00 |
| 24D80 | 54 | 00 | 01 | 00 | 11 | 13 | 85 | 26 | FC | 00 | 02 | 00 | 88 | 00 | 58 | 00 |
| 24D90 | 00 | 00 | 00 | 00 | C2 | 33 | 24 | 00 | 06 | 00 | 4C | 25 | C2 | 00 | 9E | 00 |
| 24DA0 | 24 | 00 | C2 | 33 | 10 | 25 | B0 | 00 | 2E | 00 | 0F | 00 | C2 | 33 | 24 | 00 |
| 24DB0 | C2 | 33 | 32 | 25 | BC | 00 | 9E | 00 | FC | 00 | 24 | 00 | C2 | 33 | 62 | 00 |
| 24DC0 | 02 | 00 | FC | 00 | 5A | 00 | FC | 00 | 26 | 00 | 78 | 08 | 24 | 00 | 60 | 05 |
| 24DD0 | 00 | 00 | 01 | 00 | 60 | 05 | C6 | 33 | 24 | 00 | 06 | 00 | 88 | 00 | D2 | 00 |
| 24DE0 | 40 | 02 | FC | 00 | 24 | 00 | 8C | 05 | 60 | 05 | AC | 00 | 2E | 00 | 0B | 00 |
| 24DF0 | 8C | 05 | 24 | 00 | B4 | 09 | 9E | 00 | FC | 00 | 02 | 00 | B0 | 00 | 84 | 00 |
| 24E00 | 00 | 00 | 00 | 00 | 24 | 00 | D6 | 06 | 24 | 00 | 22 | 00 | 24 | 00 | 06 | 00 |
| 24E10 | 88 | 00 | D2 | 00 | 4A | 02 | 32 | 25 | BE | 00 | 22 | 00 | 24 | 00 | 06 | 00 |
| 24E20 | 88 | 00 | D2 | 00 | 5E | 02 | BA | 00 | 38 | 00 | B8 | 09 | AE | 00 | 2E | 00 |
| 24E30 | 09 | 00 | 24 | 00 | B4 | 09 | 82 | 00 | CC | 33 | 24 | 00 | 06 | 00 | 88 | 00 |
| 24E40 | D2 | 00 | 40 | 02 | 24 | 00 | 50 | 25 | 88 | 00 | D2 | 00 | 24 | 00 | 22 | 00 |
| 24E50 | 24 | 00 | 06 | 00 | 88 | 00 | D2 | 00 | 4A | 02 | 88 | 00 | D2 | 00 | F4 | 00 |
| 24E60 | 01 | 00 | FE | 02 | FC | 00 | 24 | 00 | 24 | 00 | A8 | 05 | 30 | 00 | 6A | 0A |
| 24E70 | C6 | 00 | 82 | 00 | 02 | 00 | 68 | 02 | FC | 00 | 24 | 00 | EC | 05 | 24 | 00 |
| 24E80 | 00 | 00 | 16 | 00 | 31 | 00 | F8 | 33 | 94 | 00 | 24 | 00 | 60 | 05 | 94 | 00 |
| 24E90 | 24 | 00 | F2 | 05 | 24 | 00 | 60 | 05 | 38 | 00 | 94 | 00 | 24 | 00 | 64 | 00 |
| 24EA0 | 3C | 00 | 94 | 00 | 24 | 00 | EC | 05 | 24 | 00 | 60 | 05 | 38 | 00 | 94 | 00 |
| 24EB0 | 7A | 00 | F8 | 00 | FC | 00 | D2 | 33 | 24 | 00 | 22 | 00 | 84 | 04 | 9E | 00 |
| 24EC0 | FC | 00 | 24 | 00 | D2 | 33 | B4 | 09 | AC | 00 | D2 | 33 | 32 | 25 | AC | 00 |
| 24ED0 | EC | 05 | 24 | 00 | 60 | 05 | 38 | 00 | B4 | 09 | AC | 00 | C6 | 00 | C8 | 00 |
| 24EE0 | 2E | 00 | 05 | 00 | 02 | 00 | FC | 00 | 24 | 00 | 74 | 05 | 58 | 00 | 6B | 00 |
| 24EF0 | FC | 00 | 24 | 00 | D2 | 33 | EC | 25 | AC | 00 | 2E | 00 | 0F | 00 | 04 | 34 |
| 24F00 | 94 | 00 | 24 | 00 | 60 | 05 | 94 | 00 | 7A | 00 | FC | 00 | 24 | 00 | D2 | 33 |
| 24F10 | 4C | 25 | AC | 00 | 2E | 00 | 0F | 00 | 14 | 34 | 94 | 00 | 24 | 00 | 60 | 05 |
| 24F20 | 94 | 00 | 7A | 00 | FC | 00 | 24 | 00 | D2 | 33 | 5C | 25 | AC | 00 | 2E | 00 |
| 24F30 | 0F | 00 | 26 | 34 | 94 | 00 | 24 | 00 | 60 | 05 | 94 | 00 | 7A | 00 | FC | 00 |
| 24F40 | 24 | 00 | D2 | 33 | 48 | 25 | AC | 00 | 2E | 00 | 0F | 00 | 3E | 34 | 94 | 00 |
| 24F50 | 24 | 00 | 60 | 05 | 94 | 00 | 7A | 00 | FC | 00 | 5A | 00 | FC | 00 | 24 | 00 |
| 24F60 | D2 | 33 | 1C | 25 | AC | 00 | 2E | 00 | 0B | 00 | 54 | 00 | 01 | 00 | 48 | 01 |
| 24F70 | 8D | 00 | FC | 00 | 24 | 00 | D2 | 33 | 54 | 25 | AC | 00 | EC | 05 | 24 | 00 |
| 24F80 | 60 | 05 | 38 | 00 | B4 | 09 | AC | 00 | C6 | 00 | 2E | 00 | 07 | 00 | 70 | 04 |
| 24F90 | 02 | 00 | FC | 00 | 24 | 00 | D2 | 33 | B2 | 25 | AC | 00 | EC | 05 | 24 | 00 |
| 24FA0 | 60 | 05 | 38 | 00 | B4 | 09 | AC | 00 | C6 | 00 | 2E | 00 | 05 | 00 | 02 | 00 |
| 24FB0 | FC | 00 | 24 | 00 | D2 | 33 | 5C | 25 | B4 | 00 | 2E | 00 | 0B | 00 | 54 | 00 |
| 24FC0 | 01 | 00 | 89 | 01 | C9 | 00 | FC | 00 | 02 | 00 | FC | 00 | 24 | 00 | F2 | 05 |
| 24FD0 | 24 | 00 | 60 | 05 | 38 | 00 | B4 | 09 | AC | 00 | 2E | 00 | 0D | 00 | F4 | 00 |
| 24FE0 | 01 | 00 | 7A | 04 | 2A | 00 | 09 | 00 | F4 | 00 | 03 | 00 | 7A | 04 | FC | 00 |
| 24FF0 | 24 | 00 | 74 | 05 | 2E | 00 | 13 | 00 | EA | 26 | 94 | 00 | 68 | 07 | 24 | 00 |
| 25000 | 60 | 05 | 38 | 00 | 94 | 00 | 7A | 00 | FC | 00 | 24 | 00 | F2 | 05 | 24 | 00 |
| 25010 | 60 | 05 | 38 | 00 | 54 | 00 | 33 | 00 | 01 | 02 | DD | 00 | 01 | 02 | DD | 00 |
| 25020 | AD | 05 | 1D | 02 | CF | 06 | 95 | 02 | C3 | 07 | 5D | 03 | 33 | 08 | 99 | 03 |
| 25030 | B3 | 08 | 11 | 04 | 01 | 02 | DD | 00 | FF | 08 | 4D | 04 | EB | 09 | ED | 04 |
| 25040 | 1D | 0B | DD | 05 | FB | 0B | 41 | 06 | 07 | 0D | CD | 06 | FD | 0E | D5 | 08 |
| 25050 | 6F | 0F | C9 | 0F | BD | 0F | F1 | 0F | 33 | 10 | 41 | 10 | 79 | 10 | 69 | 10 |
| 25060 | 27 | 11 | 6D | 11 | 65 | 11 | 95 | 11 | A3 | 11 | BD | 11 | 19 | 12 | 0D | 12 |
| 25070 | D3 | 12 | D9 | 13 | 11 | 13 | 01 | 14 | 4F | 13 | 29 | 14 | 8D | 13 | 65 | 14 |
| 25080 | FC | 00 | 20 | 07 | 24 | 00 | 60 | 05 | 38 | 00 | 24 | 00 | 60 | 05 | 9E | 00 |
| 25090 | FC | 00 | 24 | 00 | D2 | 33 | EC | 25 | AC | 00 | D2 | 33 | 4C | 25 | AC | 00 |
| 250A0 | C8 | 00 | 2E | 00 | 21 | 00 | F4 | 00 | 07 | 00 | 24 | 00 | 60 | 05 | 28 | 00 |
| 250B0 | D2 | 00 | 24 | 00 | 1C | 25 | 68 | 00 | D2 | 00 | 0A | 01 | 54 | 00 | 01 | 00 |
| 250C0 | DB | 0E | C1 | 08 | FC | 00 | F4 | 00 | 07 | 00 | 24 | 00 | 60 | 05 | 88 | 00 |
| 250D0 | D2 | 00 | 24 | 00 | 10 | 25 | 88 | 00 | D2 | 00 | 0A | 01 | FC | 00 | 24 | 00 |
| 250E0 | 68 | 07 | 24 | 00 | 60 | 05 | 38 | 00 | A0 | 00 | 60 | 25 | AE | 00 | 2E | 00 |
| 250F0 | 0B | 00 | 54 | 00 | 01 | 00 | 2B | 03 | 19 | 01 | FC | 00 | 24 | 00 | 0C | 27 |
| 25100 | 8E | 00 | 04 | 02 | 04 | 07 | 24 | 00 | 60 | 05 | 38 | 00 | 26 | 00 | 28 | 00 |
| 25110 | 28 | 00 | 68 | 07 | 24 | 00 | 60 | 05 | 38 | 00 | 24 | 00 | 10 | 25 | D4 | 00 |
| 25120 | 8E | 00 | 9E | 00 | FE | 06 | 24 | 00 | 60 | 05 | 38 | 00 | 26 | 00 | 28 | 00 |
| 25130 | 28 | 00 | 68 | 07 | 24 | 00 | 60 | 05 | 38 | 00 | 24 | 00 | B8 | 09 | 24 | 00 |
| 25140 | 10 | 25 | D6 | 00 | 8E | 00 | 9E | 00 | 52 | 07 | 24 | 00 | 60 | 05 | 38 | 00 |
| 25150 | 28 | 00 | 68 | 07 | 24 | 00 | 60 | 05 | 38 | 00 | 24 | 00 | EC | 25 | 24 | 00 |
| 25160 | 4C | 25 | D6 | 00 | 9E | 00 | FC | 00 | 24 | 00 | 74 | 05 | 2E | 00 | 33 | 00 |
| 25170 | 58 | 34 | 94 | 00 | 24 | 00 | 04 | 07 | 24 | 00 | 60 | 05 | 38 | 00 | 94 | 00 |

```
25180   6C 34 94 00 24 00 FE 06 24 00 60 05 38 00 94 00
25190   76 34 94 00 52 07 24 00 60 05 38 00 94 00 7A 00
251A0   FC 00 54 00 01 00 63 03 41 01 FC 00 26 00 28 00
251B0   AA 07 24 00 60 05 38 00 68 07 24 00 60 05 38 00
251C0   8E 00 88 00 04 02 FC 00 24 00 74 05 2E 00 15 00
251D0   FE 26 94 00 24 00 EC 05 24 00 60 05 38 00 94 00
251E0   7A 00 FC 00 24 00 EC 05 24 00 60 05 38 00 1C 25
251F0   B4 00 EC 05 24 00 60 05 38 00 0C 27 B0 00 C8 00
25200   22 00 24 00 1C 25 88 00 D2 00 F2 00 05 00 32 01
25210   C8 00 F8 06 24 00 60 05 38 00 B4 09 AC 00 C8 00
25220   2E 00 21 00 F4 00 07 00 24 00 60 05 88 00 D2 00
25230   24 00 32 25 88 00 D2 00 0A 01 54 00 01 00 DE 0E
25240   C1 08 FC 00 24 00 04 07 24 00 60 05 38 00 48 25
25250   C2 00 4C 25 B4 00 2E 00 05 00 8E 04 FC 00 24 00
25260   04 07 24 00 60 05 38 00 48 25 C2 00 54 00 09 00
25270   05 04 69 01 05 04 69 01 83 08 E9 03 83 08 E9 03
25280   83 08 E9 03 FC 00 24 00 04 07 24 00 60 05 38 00
25290   48 25 C0 00 54 00 19 00 6D 04 91 01 6D 04 91 01
252A0   6D 04 91 01 6D 04 91 01 6D 04 91 01 6D 04 91 01
252B0   6D 04 91 01 13 0E D1 07 13 0E D1 07 6D 09 B1 04
252C0   6D 04 91 01 6D 09 B1 04 43 12 69 13 FC 00 F4 00
252D0   07 00 24 00 60 05 88 00 D2 00 24 00 1C 25 88 00
252E0   D2 00 0A 01 54 00 01 00 DB 0E C1 08 FC 00 24 00
252F0   22 00 46 01 04 07 24 00 60 05 38 00 48 25 C2 00
25300   EC 25 B0 00 C6 00 2E 00 21 00 F4 00 07 00 24 00
25310   60 05 88 00 D2 00 24 00 32 25 88 00 D2 00 0A 01
25320   54 00 01 00 D8 0E C1 08 FC 00 24 00 22 00 24 00
25330   FE 06 24 00 60 05 38 00 68 00 D2 00 D6 02 B4 09
25340   AC 00 22 00 AA 01 B4 09 B0 00 C6 00 2E 00 0B 00
25350   54 00 01 00 03 05 CD 01 FC 00 24 00 D2 33 54 25
25360   AC 00 2E 00 0F 00 54 00 01 00 25 0F E9 08 2A 00
25370   13 00 F2 05 24 00 60 05 38 00 24 00 32 25 9E 00
25380   02 00 FC 00 24 00 74 05 2E 00 15 00 20 27 94 00
25390   24 00 FE 06 24 00 60 05 38 00 94 00 7A 00 FC 00
253A0   1A 07 24 00 60 05 38 00 24 00 B4 09 9E 00 F2 05
253B0   24 00 60 05 38 00 24 00 10 25 9E 00 26 00 26 00
253C0   28 00 52 07 24 00 60 05 38 00 8E 00 2C 27 C0 00
253D0   D2 00 5C 25 AC 00 84 00 2E 00 19 00 52 07 24 00
253E0   60 05 38 00 22 00 52 07 24 00 60 05 38 00 4E 03
253F0   9E 00 FC 00 24 00 74 05 2E 00 13 00 30 27 94 00
25400   52 07 24 00 60 05 38 00 94 00 7A 00 FC 00 7E 08
25410   24 00 60 05 38 00 26 00 A0 05 9E 00 94 07 24 00
25420   60 05 38 00 22 00 F6 26 9E 00 02 00 FC 00 F2 00
25430   03 00 58 03 24 00 1A 07 24 00 60 05 38 00 B4 09
25440   B0 00 2E 00 05 00 02 00 FC 00 24 00 22 00 24 00
25450   40 27 88 00 D2 00 F2 00 05 00 32 01 2E 00 57 00
25460   F4 00 03 00 F4 00 03 00 24 00 32 25 88 00 24 00
25470   EC 05 24 00 60 05 38 00 8E 00 26 09 16 26 24 00
25480   FE 06 24 00 60 05 38 00 88 00 D2 00 F4 00 03 00
25490   D0 03 EC 05 24 00 60 05 38 00 26 00 28 00 26 09
254A0   C2 08 8E 00 9E 00 C2 02 54 00 01 00 47 03 2D 01
254B0   2A 00 15 00 F4 00 09 00 24 00 60 05 88 00 D2 00
254C0   F2 00 07 00 0A 01 FC 00 24 00 04 07 24 00 60 05
254D0   38 00 48 25 C2 00 54 00 11 00 1F 07 21 03 1F 07
254E0   21 03 7F 06 6D 02 7F 06 6D 02 7F 06 6D 02 7F 06
254F0   6D 02 7F 06 6D 02 63 0A 79 05 63 0A 79 05 FC 00
25500   F4 00 05 00 24 00 60 05 88 00 D2 00 24 00 FE 06
25510   24 00 60 05 38 00 88 00 D2 00 0A 01 24 00 FE 06
25520   24 00 60 05 38 00 88 00 D2 00 F4 00 03 00 D0 03
25530   FC 00 1A 07 24 00 60 05 38 00 24 00 B4 09 9E 00
25540   F2 05 24 00 60 05 38 00 24 00 B8 09 9E 00 FC 00
25550   24 00 32 25 88 00 D2 00 F2 00 07 00 EA 02 24 00
25560   1A 07 24 00 60 05 38 00 B4 09 B0 00 2E 00 05 00
25570   02 00 FC 00 24 00 22 00 24 00 4E 27 88 00 D2 00
25580   F2 00 05 00 32 01 2E 00 0F 00 54 00 01 00 4D 0F
```

```
25590   A1 0F 2A 00 0B 00 54 00 01 00 D3 0E 99 08 FC 00
255A0   1A 07 24 00 60 05 38 00 24 00 B4 09 9E 00 58 00
255B0   23 00 1C 00 12 00 24 00 1A 07 24 00 60 05 38 00
255C0   B4 09 AC 00 3C 00 24 00 10 25 88 00 D2 00 F2 00
255D0   07 00 EA 02 5C 00 FC 00 F4 00 03 00 24 00 60 05
255E0   88 00 D2 00 24 00 FE 06 24 00 60 05 38 00 88 00
255F0   D2 00 0A 01 FC 00 6C 08 24 00 60 05 38 00 26 00
25600   A0 05 AC 05 BA 00 9E 00 F2 05 24 00 60 05 38 00
25610   24 00 54 25 9E 00 24 00 22 00 24 00 44 27 88 00
25620   D2 00 F2 00 05 00 32 01 2E 00 19 00 6C 08 24 00
25630   60 05 38 00 26 00 A0 05 AC 05 10 25 BE 00 BA 00
25640   9E 00 FC 00 26 00 6C 08 24 00 60 05 38 00 A0 05
25650   B0 00 D2 33 B8 09 AE 00 C6 00 84 00 2E 00 03 00
25660   02 00 FC 00 F4 00 05 00 24 00 60 05 88 00 D2 00
25670   24 00 FE 06 24 00 60 05 38 00 88 00 D2 00 0A 01
25680   24 00 FE 06 24 00 60 05 38 00 88 00 D2 00 F4 00
25690   03 00 D0 03 FC 00 F2 05 24 00 60 05 38 00 24 00
256A0   B2 25 9E 00 1A 07 24 00 60 05 38 00 24 00 B4 09
256B0   9E 00 FC 00 24 00 B8 09 88 00 D2 00 F2 00 07 00
256C0   EA 02 24 00 1A 07 24 00 60 05 38 00 B4 09 B0 00
256D0   2E 00 05 00 02 00 FC 00 24 00 22 00 24 00 4E 27
256E0   88 00 D2 00 F2 00 05 00 32 01 2E 00 0F 00 54 00
256F0   01 00 4D 0F A1 0F 2A 00 0B 00 54 00 01 00 D3 0E
25700   99 08 FC 00 F4 00 09 00 24 00 60 05 88 00 D2 00
25710   F2 00 07 00 0A 01 F2 05 24 00 60 05 38 00 24 00
25720   EC 25 9E 00 1A 07 24 00 60 05 38 00 24 00 B4 09
25730   9E 00 FC 00 24 00 EC 25 88 00 D2 00 F2 00 07 00
25740   EA 02 24 00 1A 07 24 00 60 05 38 00 2E 00 05 00
25750   02 00 FC 00 F2 05 24 00 60 05 38 00 24 00 5C 25
25760   9E 00 68 07 24 00 60 05 38 00 9C 00 72 08 24 00
25770   60 05 38 00 26 00 A0 05 52 27 BA 00 9E 00 FC 00
25780   24 00 D2 33 1C 25 AC 00 D2 33 54 25 AC 00 C8 00
25790   2E 00 0B 00 54 00 01 00 35 09 75 04 FC 00 26 00
257A0   72 08 24 00 60 05 38 00 A0 05 B0 00 84 00 2E 00
257B0   05 00 02 00 FC 00 24 00 68 07 24 00 60 05 38 00
257C0   A0 00 B8 09 B4 00 2E 00 19 00 68 07 24 00 60 05
257D0   38 00 28 00 68 07 24 00 60 05 38 00 72 26 9E 00
257E0   FC 00 8E 04 54 00 01 00 05 04 69 01 FC 00 24 00
257F0   22 00 46 01 2E 00 21 00 F4 00 07 00 24 00 60 05
25800   88 00 D2 00 24 00 32 25 88 00 D2 00 0A 01 54 00
25810   01 00 DB 0E C1 08 FC 00 24 00 22 00 AA 01 B4 09
25820   AC 00 2E 00 21 00 F4 00 07 00 24 00 60 05 88 00
25830   D2 00 24 00 32 25 88 00 D2 00 0A 01 54 00 01 00
25840   DB 0E C1 08 FC 00 F2 05 24 00 60 05 38 00 24 00
25850   48 25 9E 00 1A 07 24 00 60 05 38 00 24 00 B4 09
25860   9E 00 D2 33 24 00 B4 09 9E 00 FC 00 24 00 D2 33
25870   54 25 AC 00 2E 00 0B 00 54 00 01 00 13 0E D1 07
25880   FC 00 F2 00 03 00 44 03 24 00 1A 07 24 00 60 05
25890   38 00 2E 00 05 00 02 00 FC 00 24 00 74 05 68 05
258A0   C6 00 2E 00 09 00 56 27 94 00 7A 00 FC 00 24 00
258B0   74 05 68 05 B4 09 AC 00 C6 00 2E 00 09 00 6A 27
258C0   94 00 7A 00 FC 00 24 00 68 05 2E 00 0F 00 54 00
258D0   01 00 3D 0C 69 06 2A 00 0B 00 54 00 01 00 CB 0B
258E0   2D 06 FC 00 F4 00 07 00 24 00 FE 06 24 00 60 05
258F0   38 00 88 00 D2 00 24 00 10 25 88 00 D2 00 0A 01
25900   FC 00 7E 08 24 00 60 05 38 00 9C 00 94 07 24 00
25910   60 05 38 00 9C 00 FC 00 F4 00 07 00 24 00 60 05
25920   88 00 D2 00 24 00 10 25 88 00 D2 00 0A 01 6C 08
25930   24 00 60 05 38 00 26 00 A0 05 CC 05 24 00 1C 25
25940   22 00 24 00 48 26 88 00 D2 00 F2 00 05 00 32 01
25950   BA 00 88 00 BE 00 BA 00 9E 00 F2 05 24 00 60 05
25960   38 00 24 00 C0 26 9E 00 FC 00 24 00 22 00 24 00
25970   5C 25 88 00 D2 00 F2 00 05 00 32 01 2E 00 1F 00
25980   22 00 7E 07 24 00 60 05 38 00 A0 01 24 00 FE 06
25990   24 00 60 05 38 00 88 00 D2 00 1C 03 FC 00 24 00
```

```
259A0   22 00 24 00 82 27 88 00 D2 00 F2 00 05 00 32 01
259B0   22 00 24 00 5C 25 88 00 D2 00 F2 00 05 00 32 01
259C0   B4 09 AC 00 22 00 24 00 FE 06 24 00 60 05 38 00
259D0   88 00 D2 00 D6 02 C6 00 C8 00 2E 00 0B 00 54 00
259E0   01 00 3D 0C 69 06 FC 00 24 00 22 00 24 00 FE 06
259F0   24 00 60 05 38 00 88 00 D2 00 72 02 5C 25 AC 00
25A00   2E 00 1B 00 24 00 FE 06 24 00 60 05 38 00 88 00
25A10   D2 00 68 02 54 00 01 00 3D 0C 69 06 FC 00 24 00
25A20   D2 33 54 25 AC 00 2E 00 0B 00 54 00 01 00 13 0E
25A30   D1 07 FC 00 26 00 6C 08 24 00 60 05 38 00 A0 05
25A40   B0 00 84 00 2E 00 05 00 02 00 FC 00 F4 00 09 00
25A50   24 00 60 05 88 00 D2 00 F2 00 07 00 0A 01 1A 07
25A60   24 00 60 05 38 00 24 00 B4 09 9E 00 F2 05 24 00
25A70   60 05 38 00 24 00 38 26 9E 00 FC 00 24 00 48 25
25A80   88 00 D2 00 F2 00 07 00 EA 02 24 00 D2 33 54 25
25A90   AC 00 2E 00 0D 00 F2 00 03 00 F2 00 07 00 EA 02
25AA0   FC 00 24 00 1A 07 24 00 60 05 38 00 2E 00 05 00
25AB0   02 00 FC 00 54 00 01 00 13 0E D1 07 FC 00 8E 04
25AC0   F4 00 09 00 24 00 60 05 88 00 D2 00 F2 00 07 00
25AD0   0A 01 F4 00 09 00 24 00 FE 06 24 00 60 05 38 00
25AE0   88 00 D2 00 F2 00 07 00 0A 01 F4 00 03 00 24 00
25AF0   60 05 88 00 D2 00 24 00 FE 06 24 00 60 05 38 00
25B00   88 00 D2 00 0A 01 FC 00 24 00 74 05 2E 00 09 00
25B10   56 27 94 00 7A 00 FC 00 24 00 22 00 24 00 6A 0A
25B20   88 00 D2 00 F2 00 05 00 32 01 2E 00 13 00 24 00
25B30   FE 06 24 00 60 05 38 00 88 00 D2 00 2C 02 FC 00
25B40   F2 05 24 00 60 05 38 00 24 00 60 25 9E 00 30 03
25B50   72 08 24 00 60 05 38 00 26 00 6C 08 24 00 60 05
25B60   38 00 64 26 BC 00 9E 00 FC 00 7E 08 24 00 60 05
25B70   38 00 26 00 A0 05 9E 00 94 07 24 00 60 05 38 00
25B80   22 00 F6 26 9E 00 FC 00 24 00 D2 33 54 25 AC 00
25B90   2E 00 0B 00 54 00 01 00 13 0E D1 07 FC 00 26 00
25BA0   72 08 24 00 60 05 38 00 A0 05 B4 00 84 00 58 00
25BB0   83 00 FC 00 26 00 6C 08 24 00 60 05 38 00 A0 05
25BC0   B0 00 84 00 2E 00 2B 00 24 00 FE 06 24 00 60 05
25BD0   38 00 88 00 D2 00 F2 00 05 00 14 01 72 08 24 00
25BE0   60 05 38 00 26 00 A0 05 54 25 BA 00 9E 00 02 00
25BF0   FC 00 24 00 32 25 88 00 58 00 23 00 52 00 24 00
25C00   86 27 88 00 5A 01 24 00 FE 06 24 00 60 05 38 00
25C10   88 00 D2 00 24 00 54 25 88 00 D2 00 14 01 5C 00
25C20   72 08 24 00 60 05 38 00 26 00 A0 05 48 25 BA 00
25C30   9E 00 FC 00 5A 00 FC 00 26 00 6C 08 24 00 60 05
25C40   38 00 A0 05 B0 00 84 00 2E 00 05 00 02 00 FC 00
25C50   26 00 22 00 24 00 8A 27 88 00 D2 00 F2 00 05 00
25C60   32 01 22 00 24 00 4C 26 86 00 D2 00 F2 00 05 00
25C70   32 01 6C 08 24 00 60 05 38 00 B4 05 BA 00 B0 05
25C80   BC 00 A0 05 B0 00 C6 00 C8 00 84 00 2E 00 05 00
25C90   02 00 FC 00 F4 00 05 00 24 00 60 05 88 00 D2 00
25CA0   24 00 FE 06 24 00 60 05 38 00 88 00 D2 00 0A 01
25CB0   F4 00 09 00 24 00 FE 06 24 00 60 05 38 00 88 00
25CC0   D2 00 F2 00 07 00 0A 01 FC 00 24 00 FE 06 24 00
25CD0   60 05 38 00 88 00 D2 00 F4 00 03 00 D0 03 FC 00
25CE0   24 00 FE 06 24 00 60 05 38 00 88 00 D2 00 68 02
25CF0   FC 00 24 00 F2 05 24 00 60 05 38 00 60 25 AC 00
25D00   2E 00 0B 00 54 00 01 00 D3 0E 99 08 FC 00 24 00
25D10   22 00 24 00 4E 27 88 00 D2 00 F2 00 05 00 32 01
25D20   2E 00 0F 00 54 00 01 00 4D 0F A1 0F 2A 00 25 00
25D30   24 00 22 00 24 00 92 27 88 00 D2 00 F2 00 05 00
25D40   32 01 B4 09 AC 00 2E 00 0B 00 54 00 01 00 DB 0E
25D50   C1 08 FC 00 F0 01 96 27 E6 01 FC 00 F2 05 24 00
25D60   60 05 38 00 24 00 58 25 9E 00 6C 08 24 00 60 05
25D70   38 00 26 00 A0 05 54 25 BA 00 9E 00 FC 00 24 00
25D80   D2 33 B2 25 AC 00 6C 08 24 00 60 05 38 00 A0 05
25D90   B0 00 D2 33 54 25 AE 00 C6 00 C8 00 84 00 2E 00
25DA0   05 00 02 00 FC 00 F4 00 03 00 F2 00 05 00 D2 01
```

| | | | | | | | | | | | | | | | | |
|---|---|---|---|---|---|---|---|---|---|---|---|---|---|---|---|---|
| 25DB0 | FC | 00 | F4 | 00 | 09 | 00 | 24 | 00 | 60 | 05 | 88 | 00 | D2 | 00 | F2 | 00 |
| 25DC0 | 07 | 00 | 0A | 01 | FC | 00 | 70 | 04 | FC | 00 | 02 | 00 | FC | 00 | 8E | 04 |
| 25DD0 | FC | 00 | 1A | 07 | 24 | 00 | 60 | 05 | 38 | 00 | 24 | 00 | B4 | 09 | 9E | 00 |
| 25DE0 | F2 | 05 | 24 | 00 | 60 | 05 | 38 | 00 | 24 | 00 | 6A | 0A | 9E | 00 | FC | 00 |
| 25DF0 | 24 | 00 | EC | 25 | 88 | 00 | D2 | 00 | F2 | 00 | 07 | 00 | EA | 02 | 24 | 00 |
| 25E00 | 1A | 07 | 24 | 00 | 60 | 05 | 38 | 00 | 2E | 00 | 05 | 00 | 02 | 00 | FC | 00 |
| 25E10 | F2 | 05 | 24 | 00 | 60 | 05 | 38 | 00 | 24 | 00 | 50 | 25 | 9E | 00 | 68 | 07 |
| 25E20 | 24 | 00 | 60 | 05 | 38 | 00 | 9C | 27 | 9E | 00 | 72 | 08 | 24 | 00 | 60 | 05 |
| 25E30 | 38 | 00 | 26 | 00 | A0 | 05 | 52 | 27 | BA | 00 | 9E | 00 | FC | 00 | 24 | 00 |
| 25E40 | D2 | 33 | 1C | 25 | AC | 00 | 2E | 00 | 0B | 00 | 54 | 00 | 01 | 00 | F7 | 0F |
| 25E50 | 19 | 10 | FC | 00 | 26 | 00 | 72 | 08 | 24 | 00 | 60 | 05 | 38 | 00 | A0 | 05 |
| 25E60 | B0 | 00 | 84 | 00 | 2E | 00 | 09 | 00 | 02 | 00 | 2A | 00 | 0B | 00 | 54 | 00 |
| 25E70 | 01 | 00 | 5B | 10 | 55 | 10 | FC | 00 | 24 | 00 | 68 | 07 | 24 | 00 | 60 | 05 |
| 25E80 | 38 | 00 | C4 | 26 | AC | 00 | 2E | 00 | 0B | 00 | 54 | 00 | 01 | 00 | DB | 10 |
| 25E90 | 31 | 11 | FC | 00 | C6 | 03 | F2 | 05 | 24 | 00 | 60 | 05 | 38 | 00 | 24 | 00 |
| 25EA0 | A0 | 27 | 9E | 00 | 1A | 07 | 24 | 00 | 60 | 05 | 38 | 00 | 24 | 00 | B4 | 09 |
| 25EB0 | 9E | 00 | FC | 00 | F2 | 00 | 03 | 00 | 28 | 00 | 68 | 07 | 24 | 00 | 60 | 05 |
| 25EC0 | 38 | 00 | 24 | 00 | 38 | 26 | D4 | 00 | EA | 02 | 24 | 00 | 1A | 07 | 24 | 00 |
| 25ED0 | 60 | 05 | 38 | 00 | 2E | 00 | 05 | 00 | 02 | 00 | FC | 00 | 1A | 07 | 24 | 00 |
| 25EE0 | 60 | 05 | 38 | 00 | 24 | 00 | B4 | 09 | 9E | 00 | F2 | 05 | 24 | 00 | 60 | 05 |
| 25EF0 | 38 | 00 | 24 | 00 | 3C | 26 | 9E | 00 | FC | 00 | 24 | 00 | 32 | 25 | 88 | 00 |
| 25F00 | D2 | 00 | F2 | 00 | 07 | 00 | EA | 02 | 24 | 00 | 1A | 07 | 24 | 00 | 60 | 05 |
| 25F10 | 38 | 00 | 2E | 00 | 05 | 00 | 02 | 00 | FC | 00 | 24 | 00 | 04 | 07 | 24 | 00 |
| 25F20 | 60 | 05 | 38 | 00 | 48 | 25 | C2 | 00 | 4C | 25 | B4 | 00 | 22 | 00 | 24 | 00 |
| 25F30 | 92 | 27 | 88 | 00 | D2 | 00 | F2 | 00 | 05 | 00 | 32 | 01 | 1C | 25 | AC | 00 |
| 25F40 | C8 | 00 | 2E | 00 | 0F | 00 | 54 | 00 | 01 | 00 | D3 | 0E | 99 | 08 | 2A | 00 |
| 25F50 | 0B | 00 | 54 | 00 | 01 | 00 | DB | 0E | C1 | 08 | FC | 00 | BC | 03 | 24 | 00 |
| 25F60 | 68 | 07 | 24 | 00 | 60 | 05 | 38 | 00 | 9C | 27 | AC | 00 | 2E | 00 | 0B | 00 |
| 25F70 | 54 | 00 | 01 | 00 | FB | 11 | F9 | 11 | FC | 00 | 6C | 08 | 24 | 00 | 60 | 05 |
| 25F80 | 38 | 00 | 24 | 00 | 1C | 25 | 9E | 00 | FC | 00 | 1A | 07 | 24 | 00 | 60 | 05 |
| 25F90 | 38 | 00 | 24 | 00 | B4 | 09 | 9E | 00 | F2 | 05 | 24 | 00 | 60 | 05 | 38 | 00 |
| 25FA0 | 24 | 00 | 0A | 26 | 9E | 00 | FC | 00 | 24 | 00 | 38 | 26 | 88 | 00 | D2 | 00 |
| 25FB0 | F2 | 00 | 07 | 00 | EA | 02 | 24 | 00 | 1A | 07 | 24 | 00 | 60 | 05 | 38 | 00 |
| 25FC0 | 2E | 00 | 05 | 00 | 02 | 00 | FC | 00 | 1A | 07 | 24 | 00 | 60 | 05 | 38 | 00 |
| 25FD0 | 24 | 00 | B4 | 09 | 9E | 00 | F2 | 05 | 24 | 00 | 60 | 05 | 38 | 00 | 24 | 00 |
| 25FE0 | 52 | 27 | 9E | 00 | FC | 00 | F2 | 00 | 03 | 00 | 68 | 07 | 24 | 00 | 60 | 05 |
| 25FF0 | 38 | 00 | EA | 02 | 24 | 00 | 1A | 07 | 24 | 00 | 60 | 05 | 38 | 00 | 2E | 00 |
| 26000 | 05 | 00 | 02 | 00 | FC | 00 | 1A | 07 | 24 | 00 | 60 | 05 | 38 | 00 | 24 | 00 |
| 26010 | B4 | 09 | 9E | 00 | F2 | 05 | 24 | 00 | 60 | 05 | 38 | 00 | 24 | 00 | AA | 25 |
| 26020 | 9E | 00 | FC | 00 | 24 | 00 | C0 | 26 | 88 | 00 | D2 | 00 | F2 | 00 | 07 | 00 |
| 26030 | EA | 02 | 24 | 00 | 1A | 07 | 24 | 00 | 60 | 05 | 38 | 00 | 2E | 00 | 05 | 00 |
| 26040 | 02 | 00 | FC | 00 | 26 | 00 | 6C | 08 | 24 | 00 | 60 | 05 | 38 | 00 | 1C | 25 |
| 26050 | AC | 00 | 84 | 00 | 2E | 00 | 1D | 00 | 6C | 08 | 24 | 00 | 60 | 05 | 38 | 00 |
| 26060 | 24 | 00 | 32 | 25 | 9E | 00 | 54 | 00 | 01 | 00 | 09 | 11 | 59 | 11 | 2A | 00 |
| 26070 | 0B | 00 | 54 | 00 | 01 | 00 | DB | 10 | 31 | 11 | FC | 00 | 1A | 07 | 24 | 00 |
| 26080 | 60 | 05 | 38 | 00 | 24 | 00 | B4 | 09 | 9E | 00 | F2 | 05 | 24 | 00 | 60 | 05 |
| 26090 | 38 | 00 | 24 | 00 | A4 | 27 | 9E | 00 | FC | 00 | 24 | 00 | 32 | 25 | 88 | 00 |
| 260A0 | D2 | 00 | F2 | 00 | 07 | 00 | EA | 02 | 24 | 00 | 1A | 07 | 24 | 00 | 60 | 05 |
| 260B0 | 38 | 00 | 2E | 00 | 05 | 00 | 02 | 00 | FC | 00 | 54 | 00 | 01 | 00 | 99 | 10 |
| 260C0 | 7D | 10 | FC | 00 | F4 | 00 | 09 | 00 | 24 | 00 | 60 | 05 | 88 | 00 | D2 | 00 |
| 260D0 | F2 | 00 | 07 | 00 | 0A | 01 | FC | 00 | F4 | 00 | 03 | 00 | F4 | 00 | 03 | 00 |
| 260E0 | 24 | 00 | 32 | 25 | 88 | 00 | 24 | 00 | EC | 05 | 24 | 00 | 60 | 05 | 38 | 00 |
| 260F0 | 8E | 00 | 26 | 09 | 16 | 26 | 52 | 07 | 24 | 00 | 60 | 05 | 38 | 00 | 26 | 09 |
| 26100 | C2 | 08 | 9E | 00 | 72 | 08 | 24 | 00 | 60 | 05 | 38 | 00 | 24 | 00 | 1C | 25 |
| 26110 | 9E | 00 | FC | 00 | 26 | 00 | 28 | 00 | 52 | 07 | 24 | 00 | 60 | 05 | 38 | 00 |
| 26120 | 8E | 00 | 1C | 25 | B4 | 00 | 84 | 00 | 2E | 00 | 0B | 00 | 54 | 00 | 01 | 00 |
| 26130 | E5 | 13 | B5 | 14 | FC | 00 | F2 | 05 | 24 | 00 | 60 | 05 | 38 | 00 | 24 | 00 |
| 26140 | A6 | 25 | 9E | 00 | 1A | 07 | 24 | 00 | 60 | 05 | 38 | 00 | 24 | 00 | B4 | 09 |
| 26150 | 9E | 00 | FC | 00 | 24 | 00 | 6A | 0A | 88 | 00 | D2 | 00 | F2 | 00 | 07 | 00 |
| 26160 | EA | 02 | 24 | 00 | 1A | 07 | 24 | 00 | 60 | 05 | 38 | 00 | 2E | 00 | 05 | 00 |
| 26170 | 02 | 00 | FC | 00 | F2 | 05 | 24 | 00 | 60 | 05 | 38 | 00 | 24 | 00 | AC | 27 |
| 26180 | 9E | 00 | 1A | 07 | 24 | 00 | 60 | 05 | 38 | 00 | 24 | 00 | B4 | 09 | 9E | 00 |
| 26190 | FC | 00 | F2 | 00 | 03 | 00 | 68 | 07 | 24 | 00 | 60 | 05 | 38 | 00 | EA | 02 |
| 261A0 | 24 | 00 | 1A | 07 | 24 | 00 | 60 | 05 | 38 | 00 | 2E | 00 | 05 | 00 | 02 | 00 |
| 261B0 | FC | 00 | F2 | 05 | 24 | 00 | 60 | 05 | 38 | 00 | 24 | 00 | 86 | 27 | 9E | 00 |

```
26100   1A 07 24 00 60 05 38 00 24 00 B4 09 9E 00 FC 00
261D0   24 00 50 25 88 00 D2 00 F2 00 07 00 EA 02 24 00
261E0   1A 07 24 00 60 05 38 00 2E 00 05 00 02 00 FC 00
261F0   F2 05 24 00 60 05 38 00 24 00 6C 25 9E 00 1A 07
26200   24 00 60 05 38 00 24 00 B4 09 9E 00 FC 00 F2 00
26210   03 00 52 07 24 00 60 05 38 00 EA 02 24 00 1A 07
26220   24 00 60 05 38 00 2E 00 05 00 02 00 FC 00 72 08
26230   24 00 60 05 38 00 26 00 72 08 24 00 60 05 38 00
26240   1C 25 BA 00 9E 00 FC 00 26 00 72 08 24 00 60 05
26250   38 00 B8 09 B4 00 84 00 2E 00 0B 00 54 00 01 00
26260   B5 12 C5 13 FC 00 F4 00 07 00 24 00 60 05 88 00
26270   D2 00 24 00 1C 25 88 00 D2 00 0A 01 54 00 01 00
26280   DB 0E C1 08 FC 00 02 00 24 00 60 05 38 00 88 00
26290   00 00 00 00 24 00 D6 06 24 00 06 00 38 00 58 25
262A0   AE 00 2E 00 05 00 02 00 FC 00 24 00 54 25 DC 06
262B0   24 00 06 00 38 00 BA 00 88 00 D2 00 24 00 E2 06
262C0   24 00 06 00 38 00 88 00 D2 00 F4 00 01 00 FE 02
262D0   24 00 50 25 88 00 D2 00 24 00 E2 06 24 00 06 00
262E0   38 00 88 00 D2 00 F4 00 01 00 FE 02 FC 00 24 00
262F0   6A 0A 24 00 A8 05 30 00 C6 00 82 00 02 00 25 00
26300   00 00 24 00 AA 07 24 00 1C 25 38 00 84 34 AC 00
26310   AA 07 24 00 1C 25 38 00 92 34 AC 00 C8 00 58 00
26320   2F 00 FC 00 AA 07 24 00 1C 25 38 00 F4 00 03 00
26330   F4 00 03 00 24 00 54 25 88 00 F4 00 01 00 F4 00
26340   01 00 F2 00 13 00 EA 2A 24 00 32 25 02 00 FC 00
26350   5A 00 FC 00 24 00 AA 07 24 00 1C 25 38 00 A0 34
26360   AC 00 58 00 29 00 FC 00 AE 34 F4 00 03 00 F4 00
26370   03 00 24 00 54 25 88 00 F4 00 01 00 F4 00 01 00
26380   F2 00 13 00 EA 2A 24 00 32 25 02 00 FC 00 5A 00
26390   FC 00 AA 07 24 00 1C 25 38 00 F4 00 03 00 F4 00
263A0   07 00 F4 00 03 00 F4 00 03 00 24 00 54 25 88 00
263B0   F4 00 01 00 F4 00 01 00 F2 00 17 00 F8 2F FC 00
263C0   02 00 EC 25 88 00 D2 00 F2 00 07 00 EA 02 24 00
263D0   00 00 24 00 F2 05 24 00 60 05 38 00 54 00 05 00
263E0   B5 01 05 01 0F 02 41 01 AD 02 B9 01 FC 00 26 00
263F0   6C 02 24 00 60 05 38 00 A0 05 C0 34 BC 00 B4 00
26400   84 00 2E 00 0F 00 F4 00 03 00 F2 00 05 00 D2 01
26410   02 00 FC 00 24 00 04 07 24 00 60 05 38 00 48 25
26420   C0 00 54 25 B0 00 2E 00 CB 00 54 00 01 00 B5 01
26430   05 01 FC 00 24 00 22 00 AA 01 B4 09 AC 00 58 00
26440   83 00 FC 00 16 00 0B 00 24 00 32 25 02 00 F8 00
26450   FC 00 26 00 22 00 24 00 C4 34 88 00 D2 00 24 00
26460   20 07 24 00 FE 06 24 00 60 05 38 00 38 00 88 00
26470   D2 00 32 01 1C 25 AC 00 7E 08 24 00 60 05 38 00
26480   A0 05 EC 00 B4 09 B4 00 C6 00 84 00 2E 00 2D 00
26490   24 00 FE 06 24 00 60 05 38 00 88 00 D2 00 24 00
264A0   EC 25 88 00 D2 00 14 01 7E 08 24 00 60 05 38 00
264B0   26 00 A0 05 48 25 BA 00 9E 00 FC 00 24 00 32 25
264C0   02 00 FC 00 5A 00 FC 00 24 00 74 05 2E 00 37 00
264D0   C8 34 94 00 24 00 EC 05 24 00 60 05 38 00 94 00
264E0   E2 34 94 00 24 00 60 05 94 00 F4 34 94 00 26 00
264F0   A0 05 6C 08 24 00 60 05 38 00 BC 00 94 00 FC 34
26500   94 00 7A 00 FC 00 7E 08 24 00 60 05 38 00 26 00
26510   A0 05 9E 00 FC 00 26 00 26 00 28 00 52 07 24 00
26520   60 05 38 00 8E 00 2C 27 C0 00 D2 00 5C 25 AC 00
26530   84 00 2E 00 19 00 52 07 24 00 60 05 38 00 22 00
26540   52 07 24 00 60 05 38 00 4E 03 9E 00 FC 00 1A 07
26550   24 00 60 05 38 00 24 00 B4 09 9E 00 F2 05 24 00
26560   60 05 38 00 24 00 1C 25 9E 00 FC 00 24 00 74 05
26570   2E 00 13 00 08 35 94 00 52 07 24 00 60 05 38 00
26580   94 00 7A 00 FC 00 F2 00 03 00 56 03 24 00 1A 07
26590   24 00 60 05 38 00 2E 00 05 00 02 00 FC 00 24 00
265A0   04 07 24 00 60 05 38 00 48 25 C2 00 1C 25 AE 00
265B0   2E 00 0B 00 54 00 01 00 09 03 E1 01 FC 00 F2 05
265C0   24 00 60 05 38 00 24 00 32 25 9E 00 6C 08 24 00
```

```
265D0   60 05 38 00 26 00 A0 05 32 25 BA 00 9E 00 FC 00
265E0   26 00 6C 08 24 00 60 05 38 00 A0 05 B0 00 84 00
265F0   2E 00 05 00 02 00 FC 00 6C 08 24 00 60 05 38 00
26600   26 00 72 08 24 00 60 05 38 00 A0 05 BA 00 9E 00
26610   FC 00 24 00 74 05 2E 00 0F 00 1A 35 94 00 24 00
26620   60 05 94 00 7A 00 FC 00 F2 05 24 00 60 05 38 00
26630   24 00 10 25 9E 00 FC 00 F4 00 03 00 24 00 60 05
26640   88 00 D2 00 24 00 FE 06 24 00 60 05 38 00 88 00
26650   D2 00 0A 01 FC 00 24 00 38 26 DC 06 24 00 60 05
26660   38 00 BA 00 88 00 D2 00 24 00 E2 06 24 00 60 05
26670   38 00 88 00 D2 00 F4 00 01 00 FE 02 FC 00 26 00
26680   6C 08 24 00 60 05 38 00 A0 05 B0 00 84 00 2E 00
26690   05 00 02 00 FC 00 F4 00 05 00 24 00 60 05 88 00
266A0   D2 00 24 00 FE 06 24 00 60 05 38 00 88 00 D2 00
266B0   0A 01 24 00 B8 09 DC 06 24 00 60 05 38 00 BA 00
266C0   88 00 D2 00 24 00 E2 06 24 00 60 05 38 00 88 00
266D0   D2 00 F4 00 01 00 FE 02 FC 00 24 00 FE 06 24 00
266E0   60 05 38 00 88 00 D2 00 F4 00 03 00 D0 03 FC 00
266F0   F0 01 FC 00 48 27 E6 01 FC 00 F4 00 03 00 F2 00
26700   05 00 D2 01 FC 00 02 00 FC 00 02 00 38 00 24 00
26710   00 00 3C 0A 00 00 32 35 24 00 B4 09 9E 00 36 35
26720   24 00 B4 09 9E 00 16 00 0B 00 24 00 B4 09 82 00
26730   FE 00 FC 00 36 35 24 00 B4 09 9E 00 20 00 24 00
26740   5C 25 88 00 62 00 60 00 C7 00 FC 00 52 0A 24 00
26750   08 00 38 00 24 00 36 35 38 00 3E 35 00 00 FC 00
26760   24 00 3E 35 B4 09 AC 00 2E 00 05 00 02 00 FC 00
26770   24 00 32 35 B4 09 AC 00 20 07 24 00 3E 35 28 00
26780   B4 09 AC 00 C6 00 22 00 24 00 3E 35 88 00 D2 00
26790   F2 00 05 00 32 01 B4 09 AC 00 C6 00 2E 00 0F 00
267A0   32 35 24 00 3E 35 9E 00 2A 00 08 00 54 00 01 00
267B0   FF 00 79 00 FC 00 24 00 D6 06 24 00 3E 35 38 00
267C0   32 25 AC 00 94 03 C6 00 2E 00 45 00 24 00 B4 09
267D0   88 00 D2 00 24 00 E2 06 24 00 3E 35 38 00 1C 25
267E0   BA 00 88 00 D2 00 F4 00 01 00 FE 02 24 00 24 00
267F0   A8 05 30 00 1C 25 DC 06 24 00 3E 35 38 00 BA 00
26800   C6 00 2E 00 08 00 32 35 24 00 B4 09 9E 00 FC 00
26810   5E 00 3A 35 24 00 36 35 9E 00 FC 00 24 00 3A 35
26820   1C 25 B0 00 52 0A 24 00 08 00 38 00 24 00 B4 09
26830   38 00 52 0A 24 00 08 00 38 00 24 00 3A 35 1C 25
26840   BC 00 38 00 AC 00 C6 00 58 00 60 00 FC 00 36 35
26850   24 00 B4 09 9E 00 20 00 24 00 3A 35 32 25 BC 00
26860   88 00 62 00 60 00 29 00 FC 00 52 0A 24 00 08 00
26870   38 00 24 00 36 35 38 00 24 00 52 0A 24 00 08 00
26880   38 00 24 00 36 35 1C 25 BA 00 38 00 9E 00 FC 00
26890   5E 00 52 0A 24 00 08 00 38 00 24 00 3A 35 1C 25
268A0   BC 00 38 00 24 00 52 0A 24 00 08 00 38 00 24 00
268B0   B4 09 38 00 9E 00 FC 00 5A 00 FC 00 24 00 32 35
268C0   32 00 02 00 A8 05 30 00 C6 00 82 00 02 00 9E 00
268D0   00 00 08 00 44 35 26 00 06 00 D8 05 C2 00 9E 00
268E0   FC 00 24 00 44 35 2E 00 0D 00 24 00 44 35 82 00
268F0   2A 00 09 00 24 00 D8 05 82 00 02 00 F4 00 03 00
26900   00 00 24 00 70 05 B4 09 AC 00 2E 00 0B 00 9C 05
26910   9C 00 56 08 9C 00 FC 00 48 35 28 00 22 00 1E 32
26920   C0 00 9E 00 24 00 48 35 9C 27 AC 00 2E 00 05 00
26930   02 00 FC 00 6C 05 24 00 28 00 48 35 CA 00 9E 00
26940   24 00 6C 05 60 25 AC 00 2E 00 17 00 9C 05 26 00
26950   28 00 56 08 8E 00 9E 00 54 00 01 00 17 00 15 00
26960   FC 00 24 00 6C 05 B4 09 AC 00 2E 00 05 00 02 00
26970   FC 00 24 00 6C 05 4C 25 AC 00 70 05 B4 09 B0 00
26980   C6 00 2E 00 29 00 48 35 94 00 70 05 24 00 70 05
26990   1C 25 BC 00 9E 00 56 08 28 00 56 08 24 00 70 05
269A0   D4 00 9E 00 54 00 01 00 17 00 15 00 FC 00 56 08
269B0   28 00 56 08 48 35 9E 00 48 35 94 00 70 05 24 00
269C0   70 05 1C 25 BA 00 9E 00 54 00 01 00 17 00 15 00
269D0   FC 00 02 00 0F 00 F4 00 03 00 F2 00 05 00 D2 01
```

```
269E0   00 00 24 00 EC 05 24 00 60 05 38 00 B4 09 AC 00
269F0   2E 00 05 00 02 00 FC 00 F4 00 03 00 F4 00 03 00
26A00   24 00 32 25 88 00 24 00 EC 05 24 00 60 05 38 00
26A10   8E 00 26 09 16 26 FC 00 F8 06 24 00 60 05 38 00
26A20   24 00 26 09 9A 08 9E 00 FC 00 04 07 24 00 60 05
26A30   38 00 24 00 26 09 92 08 9E 00 FE 06 24 00 60 05
26A40   38 00 24 00 26 09 A2 08 9E 00 FC 00 52 07 24 00
26A50   60 05 38 00 26 09 AA 08 9E 00 7E 07 24 00 60 05
26A60   38 00 26 09 B2 08 9E 00 FC 00 02 00 D2 00 24 00
26A70   00 00 00 00 42 00 00 00 FC 00 24 00 50 25 88 00
26A80   D2 00 24 00 E2 06 24 00 06 00 38 00 1C 25 BA 00
26A90   88 00 D2 00 F4 00 01 00 FE 02 FC 00 24 00 1C 25
26AA0   88 00 D2 00 24 00 E2 06 24 00 06 00 38 00 88 00
26AB0   D2 00 F4 00 01 00 FE 02 24 00 1C 27 88 00 5A 01
26AC0   FC 00 F4 00 03 00 24 00 E2 06 24 00 06 00 38 00
26AD0   88 00 D2 00 8A 03 FC 00 24 00 8A 09 54 00 07 00
26AE0   81 00 79 00 B3 00 8D 00 E5 00 A1 00 17 01 B5 00
26AF0   FC 00 24 00 A4 05 24 00 4E 35 32 00 24 00 A4 05
26B00   24 00 52 35 32 00 24 00 A4 05 24 00 AA 25 32 00
26B10   24 00 A4 05 24 00 56 35 32 00 54 00 01 00 41 01
26B20   C9 00 FC 00 24 00 A4 05 24 00 4E 35 32 00 24 00
26B30   A4 05 24 00 5A 35 32 00 24 00 A4 05 24 00 5E 35
26B40   32 00 24 00 A4 05 24 00 62 35 32 00 54 00 01 00
26B50   41 01 C9 00 FC 00 24 00 A4 05 24 00 66 35 32 00
26B60   24 00 A4 05 24 00 6A 35 32 00 24 00 A4 05 24 00
26B70   50 25 32 00 24 00 A4 05 24 00 6E 35 32 00 54 00
26B80   01 00 41 01 C9 00 FC 00 24 00 A4 05 24 00 72 35
26B90   32 00 24 00 A4 05 24 00 3C 26 32 00 24 00 A4 05
26BA0   24 00 76 35 32 00 24 00 A4 05 24 00 7A 35 32 00
26BB0   FC 00 F4 00 03 00 24 00 E2 06 24 00 06 00 38 00
26BC0   88 00 D2 00 6C 03 24 00 1C 27 88 00 5A 01 FC 00
26BD0   F4 00 03 00 24 00 E2 06 24 00 06 00 38 00 88 00
26BE0   D2 00 8A 03 FC 00 24 00 8E 09 54 00 01 00 83 01
26BF0   05 01 FC 00 24 00 A4 05 24 00 4E 35 32 00 24 00
26C00   A4 05 24 00 52 35 32 00 24 00 A4 05 24 00 AA 25
26C10   32 00 24 00 A4 05 24 00 56 35 32 00 54 00 01 00
26C20   B5 01 69 01 FC 00 F4 00 03 00 24 00 E2 06 24 00
26C30   06 00 38 00 88 00 D2 00 6C 03 FC 00 02 00 60 05
26C40   00 00 00 00 16 00 0B 00 24 00 B4 09 82 00 F8 00
26C50   FC 00 24 00 D6 06 24 00 06 00 38 00 54 00 03 00
26C60   41 00 51 00 67 00 65 00 FC 00 24 00 D6 06 24 00
26C70   06 00 38 00 6C 25 AE 00 2E 00 09 00 24 00 B4 09
26C80   82 00 24 00 22 00 24 00 E2 06 24 00 06 00 38 00
26C90   88 00 D2 00 26 03 2E 00 0D 00 24 00 1C 25 82 00
26CA0   2A 00 05 00 02 00 FC 00 24 00 94 05 2E 00 4D 00
26CB0   24 00 B4 09 88 00 D2 00 24 00 E2 06 24 00 06 00
26CC0   38 00 1C 25 BA 00 88 00 D2 00 F4 00 01 00 FE 02
26CD0   24 00 24 00 A8 05 30 00 1C 25 DC 06 24 00 06 00
26CE0   38 00 BA 00 C6 00 2E 00 13 00 24 00 06 00 88 00
26CF0   D2 00 68 02 24 00 B4 09 82 00 24 00 C0 26 88 00
26D00   D2 00 24 00 E2 06 24 00 06 00 38 00 88 00 D2 00
26D10   F4 00 01 00 FE 02 7E 35 24 00 24 00 A8 05 30 00
26D20   9E 00 FC 00 24 00 DC 06 24 00 06 00 38 00 B4 09
26D30   AC 00 7E 35 32 25 C6 00 C6 00 2E 00 1F 00 24 00
26D40   48 25 88 00 D2 00 24 00 E2 06 24 00 06 00 38 00
26D50   88 00 D2 00 F4 00 01 00 FE 02 FC 00 24 00 DC 06
26D60   24 00 06 00 38 00 1C 25 AC 00 7E 35 1C 25 C6 00
26D70   C6 00 2E 00 1F 00 24 00 5C 25 88 00 D2 00 24 00
26D80   E2 06 24 00 06 00 38 00 88 00 D2 00 F4 00 01 00
26D90   FE 02 FC 00 24 00 7E 35 DC 06 24 00 06 00 38 00
26DA0   1C 25 BA 00 C6 00 2E 00 09 00 24 00 1C 25 82 00
26DB0   02 00 88 00 D2 00 F4 00 01 00 FE 02 24 00 24 00
26DC0   00 00 24 00 68 07 24 00 60 05 38 00 DE 25 AC 00
26DD0   2E 00 1D 00 94 35 28 00 84 09 24 00 D2 35 24 00
26DE0   32 25 D6 00 9E 00 54 00 01 00 D9 02 7D 01 FC 00
```

| | | | | | | | | | | | | | | | | |
|---|---|---|---|---|---|---|---|---|---|---|---|---|---|---|---|---|
| 26DF0 | 24 | 00 | 28 | 00 | 68 | 07 | 24 | 00 | 60 | 05 | 38 | 00 | 24 | 00 | 1C | 25 |
| 26E00 | D4 | 00 | DE | 25 | AC | 00 | 2E | 00 | 1D | 00 | 94 | 35 | 28 | 00 | 84 | 09 |
| 26E10 | 24 | 00 | D6 | 35 | 24 | 00 | 32 | 25 | D6 | 00 | 9E | 00 | 54 | 00 | 01 | 00 |
| 26E20 | 09 | 02 | 70 | 01 | FC | 00 | 24 | 00 | 28 | 00 | 68 | 07 | 24 | 00 | 60 | 05 |
| 26E30 | 38 | 00 | 24 | 00 | 10 | 25 | D4 | 00 | 28 | 00 | 84 | 09 | 24 | 00 | DA | 35 |
| 26E40 | 24 | 00 | 1C | 25 | D6 | 00 | AC | 00 | 2E | 00 | 2D | 00 | FE | 06 | 24 | 00 |
| 26E50 | 60 | 05 | 38 | 00 | 24 | 00 | 64 | 25 | 9E | 00 | 68 | 07 | 24 | 00 | 60 | 05 |
| 26E60 | 38 | 00 | 28 | 00 | 68 | 07 | 24 | 00 | 60 | 05 | 38 | 00 | 24 | 00 | B8 | 09 |
| 26E70 | D8 | 00 | 9E | 00 | 02 | 00 | FC | 00 | 24 | 00 | 28 | 00 | 68 | 07 | 24 | 00 |
| 26E80 | 60 | 05 | 38 | 00 | 24 | 00 | 1C | 25 | D4 | 00 | C8 | 23 | AC | 00 | 2E | 00 |
| 26E90 | 2D | 00 | 68 | 07 | 24 | 00 | 60 | 05 | 38 | 00 | 28 | 00 | 68 | 07 | 24 | 00 |
| 26EA0 | 60 | 05 | 38 | 00 | 24 | 00 | 32 | 25 | 24 | 00 | 6A | 0A | D6 | 00 | 9E | 00 |
| 26EB0 | CA | 35 | 24 | 00 | 1C | 25 | 9E | 00 | 2A | 00 | 0B | 00 | CA | 35 | 24 | 00 |
| 26EC0 | B4 | 09 | 9E | 00 | FC | 00 | 24 | 00 | 68 | 07 | 24 | 00 | 60 | 05 | 38 | 00 |
| 26ED0 | A0 | 00 | 48 | 25 | B4 | 00 | 2E | 00 | 31 | 00 | 68 | 07 | 24 | 00 | 60 | 05 |
| 26EE0 | 38 | 00 | 28 | 00 | 28 | 00 | 84 | 09 | 24 | 00 | DE | 35 | 24 | 00 | 10 | 25 |
| 26EF0 | D6 | 00 | 68 | 07 | 24 | 00 | 60 | 05 | 38 | 00 | 9E | 00 | CE | 35 | 24 | 00 |
| 26F00 | 1C | 25 | 9E | 00 | 2A | 00 | 0B | 00 | CE | 35 | 24 | 00 | B4 | 09 | 9E | 00 |
| 26F10 | FC | 00 | 68 | 07 | 24 | 00 | 60 | 05 | 38 | 00 | 82 | 35 | 00 | 00 | FC | 00 |
| 26F20 | 9A | 35 | 28 | 00 | 82 | 35 | 24 | 00 | 10 | 25 | D4 | 00 | 9E | 00 | A0 | 35 |
| 26F30 | 28 | 00 | 82 | 35 | 24 | 00 | B8 | 09 | 24 | 00 | 10 | 25 | D6 | 00 | 9E | 00 |
| 26F40 | FC | 00 | 94 | 35 | 28 | 00 | 84 | 09 | 26 | 00 | 10 | 25 | 26 | 00 | 28 | 00 |
| 26F50 | 9A | 35 | 8E | 00 | 1C | 27 | C0 | 00 | 32 | 25 | BC | 00 | D2 | 00 | 02 | 2A |
| 26F60 | BE | 00 | BA | 00 | 28 | 00 | 9A | 35 | 8E | 00 | 1C | 27 | C2 | 00 | 32 | 25 |
| 26F70 | BE | 00 | BA | 00 | 84 | 00 | 24 | 00 | 32 | 25 | D6 | 00 | 9E | 00 | FC | 00 |
| 26F80 | 08 | 35 | 24 | 00 | 1C | 25 | 9E | 00 | 20 | 00 | 24 | 00 | 52 | 27 | 88 | 00 |
| 26F90 | 62 | 00 | 60 | 00 | B1 | 00 | FC | 00 | 24 | 00 | 9A | 35 | 28 | 00 | 84 | 09 |
| 26FA0 | 24 | 00 | 88 | 35 | B8 | 2B | BE | 00 | 32 | 25 | BA | 00 | 24 | 00 | 10 | 25 |
| 26FB0 | D6 | 00 | AC | 00 | 58 | 00 | EB | 00 | FC | 00 | A6 | 35 | 24 | 00 | B4 | 09 |
| 26FC0 | 9E | 00 | 20 | 00 | 24 | 00 | 8E | 2D | 88 | 00 | 62 | 00 | 60 | 00 | 6F | 00 |
| 26FD0 | FC | 00 | BA | 35 | 28 | 00 | 84 | 09 | 24 | 00 | 88 | 35 | B8 | 2B | BE | 00 |
| 26FE0 | EC | 25 | BA | 00 | A6 | 35 | 10 | 25 | BE | 00 | BA | 00 | 24 | 00 | 10 | 25 |
| 26FF0 | D6 | 00 | 9E | 00 | 24 | 00 | BA | 35 | A0 | 35 | B0 | 00 | BA | 35 | C8 | 25 |
| 27000 | B4 | 00 | C8 | 00 | 2E | 00 | 09 | 00 | 24 | 00 | 32 | 25 | 02 | 00 | FC | 00 |
| 27010 | 24 | 00 | A0 | 35 | BA | 35 | AC | 00 | 2E | 00 | 23 | 00 | 94 | 35 | 28 | 00 |
| 27020 | 84 | 09 | 24 | 00 | 88 | 35 | B8 | 2B | BE | 00 | 54 | 25 | BA | 00 | 24 | 00 |
| 27030 | 32 | 25 | D6 | 00 | 9E | 00 | 24 | 00 | 10 | 25 | 02 | 00 | FC | 00 | 5E | 00 |
| 27040 | FC | 00 | 5A | 00 | FC | 00 | 5E | 00 | FC | 00 | 24 | 00 | CE | 35 | 1C | 25 |
| 27050 | AC | 00 | 2E | 00 | 21 | 00 | 68 | 07 | 24 | 00 | 60 | 05 | 38 | 00 | 28 | 00 |
| 27060 | 68 | 07 | 24 | 00 | 60 | 05 | 38 | 00 | 24 | 00 | B8 | 09 | 24 | 00 | 38 | 26 |
| 27070 | D6 | 00 | 9E | 00 | FC | 00 | 24 | 00 | CA | 35 | 1C | 25 | AC | 00 | 2E | 00 |
| 27080 | 19 | 00 | 68 | 07 | 24 | 00 | 60 | 05 | 38 | 00 | 28 | 00 | C8 | 25 | 68 | 07 |
| 27090 | 24 | 00 | 60 | 05 | 38 | 00 | 9E | 00 | FC | 00 | 26 | 00 | 28 | 00 | 94 | 35 |
| 270A0 | 8E | 00 | B4 | 09 | AC | 00 | 84 | 00 | 2E | 00 | 13 | 00 | FE | 06 | 24 | 00 |
| 270B0 | 60 | 05 | 38 | 00 | 24 | 00 | B4 | 09 | 9E | 00 | 02 | 00 | FC | 00 | 90 | 35 |
| 270C0 | 24 | 00 | 1C | 25 | 9E | 00 | 20 | 00 | 24 | 00 | 10 | 25 | 88 | 00 | 62 | 00 |
| 270D0 | 60 | 00 | 89 | 01 | FC | 00 | 84 | 09 | 26 | 00 | 28 | 00 | 94 | 35 | 8E | 00 |
| 270E0 | B8 | 2B | BE | 00 | 90 | 35 | EA | 27 | BE | 00 | BA | 00 | E2 | 35 | BA | 00 |
| 270F0 | 64 | 00 | 24 | 00 | 54 | 25 | D6 | 00 | AA | 35 | 00 | 00 | FC | 00 | 8C | 35 |
| 27100 | 26 | 00 | 28 | 00 | 28 | 00 | AA | 35 | 24 | 00 | 10 | 25 | D4 | 00 | 8E | 00 |
| 27110 | 9E | 00 | FC | 00 | 24 | 00 | 8C | 35 | B4 | 09 | B0 | 00 | 8C | 35 | C0 | 26 |
| 27120 | B4 | 00 | C6 | 00 | 2E | 00 | 1B | 00 | 8C | 35 | 24 | 00 | 22 | 00 | 4A | 06 |
| 27130 | 24 | 00 | 8C | 35 | 1C | 25 | BC | 00 | 88 | 00 | D2 | 00 | A4 | 02 | 9E | 00 |
| 27140 | FC | 00 | 24 | 00 | 8C | 35 | B4 | 09 | B0 | 00 | 58 | 00 | 0B | 01 | FC | 00 |
| 27150 | 24 | 00 | 8C | 35 | 64 | 25 | AE | 00 | 2E | 00 | 25 | 00 | 24 | 00 | 20 | 07 |
| 27160 | 24 | 00 | 8C | 35 | 38 | 00 | 22 | 00 | 24 | 00 | 8C | 35 | 88 | 00 | D2 | 00 |
| 27170 | F2 | 00 | 05 | 00 | 32 | 01 | C8 | 00 | 2E | 00 | 05 | 00 | 02 | 00 | FC | 00 |
| 27180 | B0 | 35 | 26 | 00 | 28 | 00 | 28 | 00 | AA | 35 | 24 | 00 | B8 | 09 | 24 | 00 |
| 27190 | 32 | 25 | D6 | 00 | 8E | 00 | 9E | 00 | FC | 00 | 24 | 00 | B0 | 35 | B4 | 09 |
| 271A0 | B0 | 00 | 58 | 00 | A7 | 00 | FC | 00 | 84 | 09 | 24 | 00 | B0 | 35 | A0 | 27 |
| 271B0 | BE | 00 | E6 | 35 | BA | 00 | 24 | 00 | A0 | 27 | D6 | 00 | B4 | 35 | 00 | 00 |
| 271C0 | FC | 00 | 68 | 07 | 24 | 00 | 60 | 05 | 38 | 00 | 28 | 00 | 68 | 07 | 24 | 00 |
| 271D0 | 60 | 05 | 38 | 00 | 26 | 00 | 28 | 00 | 28 | 00 | B4 | 35 | 24 | 00 | 1C | 25 |
| 271E0 | D4 | 00 | 8E | 00 | 1C | 25 | BA | 00 | 64 | 00 | 24 | 00 | 50 | 25 | D6 | 00 |
| 271F0 | 9E | 00 | FC | 00 | C6 | 35 | 24 | 00 | A0 | 27 | 9E | 00 | 20 | 00 | 24 | 00 |

| | | | | | | | | | | | | | | | | |
|---|---|---|---|---|---|---|---|---|---|---|---|---|---|---|---|---|
| 27200 | 32 | 25 | 66 | 00 | 24 | 00 | 24 | 26 | 98 | 00 | 60 | 00 | 3B | 00 | FC | 00 |
| 27210 | C0 | 35 | 28 | 00 | B4 | 35 | 24 | 00 | C6 | 35 | 24 | 00 | 1C | 25 | D6 | 00 |
| 27220 | 9E | 00 | FC | 00 | 24 | 00 | C0 | 35 | 58 | 0A | B0 | 00 | 2E | 00 | 19 | 00 |
| 27230 | 68 | 07 | 24 | 00 | 60 | 05 | 38 | 00 | 28 | 00 | C0 | 35 | 68 | 07 | 24 | 00 |
| 27240 | 60 | 05 | 38 | 00 | 9E | 00 | FC | 00 | 5E | 00 | FC | 00 | 5A | 00 | FC | 00 |
| 27250 | 24 | 00 | 32 | 25 | 02 | 00 | FC | 00 | 5A | 00 | FC | 00 | 5E | 00 | FC | 00 |
| 27260 | 68 | 07 | 24 | 00 | 60 | 05 | 38 | 00 | 82 | 35 | 00 | 00 | FC | 00 | 24 | 00 |
| 27270 | 74 | 05 | 58 | 00 | 49 | 00 | FC | 00 | EA | 35 | 94 | 00 | 94 | 35 | 94 | 00 |
| 27280 | FC | 00 | 24 | 00 | 88 | 35 | AA | 25 | B4 | 00 | 2E | 00 | 1B | 00 | F8 | 35 |
| 27290 | 94 | 00 | 24 | 00 | 88 | 35 | 94 | 00 | 0E | 36 | 94 | 00 | 24 | 00 | A6 | 35 |
| 272A0 | 1C | 25 | BA | 00 | 94 | 00 | FC | 00 | 26 | 36 | 94 | 00 | 24 | 00 | 90 | 35 |
| 272B0 | 94 | 00 | 32 | 36 | 94 | 00 | 82 | 35 | 94 | 00 | 7A | 00 | FC | 00 | 5A | 00 |
| 272C0 | FC | 00 | 24 | 00 | 8C | 35 | B4 | 09 | AC | 00 | 2E | 00 | 13 | 00 | FE | 06 |
| 272D0 | 24 | 00 | 60 | 05 | 38 | 00 | 24 | 00 | B4 | 09 | 9E | 00 | 02 | 00 | FC | 00 |
| 272E0 | 24 | 00 | 8C | 35 | 64 | 25 | AC | 00 | 2E | 00 | 2F | 00 | FE | 06 | 24 | 00 |
| 272F0 | 60 | 05 | 38 | 00 | 24 | 00 | 64 | 25 | 9E | 00 | 68 | 07 | 24 | 00 | 60 | 05 |
| 27300 | 38 | 00 | 24 | 00 | 22 | 00 | 26 | 00 | 28 | 00 | 82 | 35 | 8E | 00 | 88 | 00 |
| 27310 | 3C | 01 | 90 | 00 | 9E | 00 | 02 | 00 | FC | 00 | 24 | 00 | 8C | 35 | C0 | 26 |
| 27320 | B4 | 00 | 2E | 00 | 1B | 00 | 8C | 35 | 24 | 00 | 22 | 00 | 4A | 06 | 24 | 00 |
| 27330 | 8C | 35 | 1C | 25 | BC | 00 | 88 | 00 | D2 | 00 | A4 | 02 | 9E | 00 | FC | 00 |
| 27340 | 24 | 00 | 20 | 07 | 24 | 00 | 8C | 35 | 38 | 00 | 22 | 00 | 24 | 00 | 8C | 35 |
| 27350 | 88 | 00 | D2 | 00 | F2 | 00 | 05 | 00 | 32 | 01 | C8 | 00 | 2E | 00 | 13 | 00 |
| 27360 | FE | 06 | 24 | 00 | 60 | 05 | 38 | 00 | 24 | 00 | B4 | 09 | 9E | 00 | 02 | 00 |
| 27370 | FC | 00 | 24 | 00 | D6 | 06 | 24 | 00 | 8C | 35 | 38 | 00 | 56 | 25 | AC | 00 |
| 27380 | 2E | 00 | 69 | 00 | 24 | 00 | 54 | 25 | DC | 06 | 24 | 00 | 8C | 35 | 38 | 00 |
| 27390 | BA | 00 | 88 | 00 | D2 | 00 | 24 | 00 | E2 | 06 | 24 | 00 | 8C | 35 | 38 | 00 |
| 273A0 | 88 | 00 | D2 | 00 | F4 | 00 | 01 | 00 | FE | 02 | 24 | 00 | 50 | 25 | 88 | 00 |
| 273B0 | D2 | 00 | 24 | 00 | E2 | 06 | 24 | 00 | 8C | 35 | 38 | 00 | 88 | 00 | D2 | 00 |
| 273C0 | F4 | 00 | 01 | 00 | FE | 02 | 24 | 00 | 24 | 00 | A8 | 05 | 30 | 00 | 6A | 0A |
| 273D0 | C6 | 00 | B4 | 09 | B0 | 00 | 2E | 00 | 13 | 00 | FE | 06 | 24 | 00 | 60 | 05 |
| 273E0 | 38 | 00 | 24 | 00 | B4 | 09 | 9E | 00 | 02 | 00 | FC | 00 | FE | 06 | 24 | 00 |
| 273F0 | 60 | 05 | 38 | 00 | 24 | 00 | 8C | 35 | 9E | 00 | FC | 00 | 02 | 00 | FC | 00 |
| 27400 | 02 | 00 | 24 | 00 | 10 | 25 | D4 | 00 | 28 | 00 | 84 | 09 | 24 | 00 | DA | 35 |
| 27410 | 00 | 00 | 01 | 00 | B4 | 09 | 0D | 00 | 58 | 0A | 24 | 00 | 06 | 00 | B4 | 09 |
| 27420 | AC | 00 | 08 | 00 | 58 | 0A | AC | 00 | C6 | 00 | 2E | 00 | 0B | 00 | 54 | 00 |
| 27430 | 01 | 00 | 01 | 09 | 95 | 02 | FC | 00 | 24 | 00 | 1A | 07 | 24 | 00 | 60 | 05 |
| 27440 | 38 | 00 | 2E | 00 | 19 | 00 | 3E | 36 | 24 | 00 | 1A | 07 | 24 | 00 | 60 | 05 |
| 27450 | 38 | 00 | 9E | 00 | 54 | 00 | 01 | 00 | 9F | 08 | 6D | 02 | FC | 00 | 3E | 36 |
| 27460 | 24 | 00 | 22 | 00 | 24 | 00 | 68 | 25 | 88 | 00 | D2 | 00 | 24 | 00 | 10 | 25 |
| 27470 | 88 | 00 | D2 | 00 | 24 | 00 | 52 | 36 | 88 | 00 | D2 | 00 | F4 | 02 | 9E | 00 |
| 27480 | FC | 00 | 24 | 00 | 3E | 36 | B4 | 09 | AC | 00 | 2E | 00 | 0D | 00 | 24 | 00 |
| 27490 | D2 | 2D | 88 | 00 | 5A | 01 | 02 | 00 | FC | 00 | 1A | 07 | 24 | 00 | 60 | 05 |
| 274A0 | 38 | 00 | 24 | 00 | 3E | 36 | 9E | 00 | FC | 00 | F4 | 00 | 03 | 00 | 24 | 00 |
| 274B0 | 60 | 05 | 88 | 00 | D2 | 00 | 24 | 00 | 3E | 36 | 88 | 00 | D2 | 00 | 0A | 01 |
| 274C0 | FC | 00 | 20 | 07 | 24 | 00 | 3E | 36 | 38 | 00 | 24 | 00 | 60 | 05 | 9E | 00 |
| 274D0 | FC | 00 | 24 | 00 | 10 | 25 | 88 | 00 | D2 | 00 | 24 | 00 | E2 | 06 | 24 | 00 |
| 274E0 | 3E | 36 | 38 | 00 | 88 | 00 | D2 | 00 | F4 | 00 | 01 | 00 | FE | 02 | 24 | 00 |
| 274F0 | DC | 06 | 24 | 00 | 3E | 36 | 38 | 00 | 1C | 25 | BA | 00 | 88 | 00 | D2 | 00 |
| 27500 | 24 | 00 | E2 | 06 | 24 | 00 | 3E | 36 | 38 | 00 | 88 | 00 | D2 | 00 | F4 | 00 |
| 27510 | 03 | 00 | FE | 02 | FC | 00 | 24 | 00 | 06 | 00 | 54 | 00 | 27 | 00 | 9F | 02 |
| 27520 | DD | 00 | BD | 02 | F1 | 00 | DB | 02 | 05 | 01 | 03 | 03 | 19 | 01 | 53 | 03 |
| 27530 | 2D | 01 | C1 | 03 | 41 | 01 | CB | 03 | 55 | 01 | 25 | 04 | 69 | 01 | 75 | 04 |
| 27540 | 7D | 01 | A7 | 04 | 91 | 01 | 3D | 05 | A5 | 01 | 81 | 06 | B9 | 01 | A9 | 06 |
| 27550 | CD | 01 | EF | 06 | E1 | 01 | 85 | 07 | F5 | 01 | CB | 07 | 09 | 02 | 2F | 08 |
| 27560 | 1D | 02 | 2F | 08 | 31 | 02 | 7F | 08 | 45 | 02 | 89 | 08 | 59 | 02 | FC | 00 |
| 27570 | 24 | 00 | 06 | 00 | B4 | 09 | AC | 00 | 08 | 00 | 58 | 0A | AC | 00 | C6 | 00 |
| 27580 | 2E | 00 | 31 | 00 | 24 | 00 | 1C | 25 | DC | 06 | 24 | 00 | 3E | 36 | 38 | 00 |
| 27590 | BA | 00 | 88 | 00 | D2 | 00 | 24 | 00 | E2 | 06 | 24 | 00 | 3E | 36 | 38 | 00 |
| 275A0 | 88 | 00 | D2 | 00 | F4 | 00 | 01 | 00 | FE | 02 | 54 | 00 | 01 | 00 | 9F | 08 |
| 275B0 | 6D | 02 | FC | 00 | 24 | 00 | EC | 25 | 88 | 00 | 58 | 00 | D3 | 00 | 52 | 00 |
| 275C0 | 16 | 00 | 07 | 00 | 02 | 00 | F8 | 00 | FC | 00 | 1A | 07 | 24 | 00 | 3E | 36 |
| 275D0 | 38 | 00 | 24 | 00 | 1A | 07 | 24 | 00 | 3E | 36 | 38 | 00 | 1C | 25 | BA | 00 |
| 273E0 | 9E | 00 | FC | 00 | 42 | 36 | 24 | 00 | 28 | 00 | 28 | 00 | 08 | 00 | 24 | 00 |
| 275F0 | 1A | 07 | 24 | 00 | 3E | 36 | 38 | 00 | 24 | 00 | 1C | 25 | D6 | 00 | CA | 00 |
| 27600 | 9E | 00 | FC | 00 | 24 | 00 | 42 | 36 | 54 | 26 | AC | 00 | 42 | 36 | 68 | 25 |

```
27610  AC 00 C8 00 2E 00 0D 00 24 00 4C 2E 88 00 D2 00
27620  98 04 FC 00 24 00 42 36 AE 25 AC 00 2E 00 0D 00
27630  24 00 EA 27 88 00 D2 00 98 04 FC 00 24 00 42 36
27640  AE 25 B0 00 42 36 44 26 B4 00 C6 00 2E 00 11 00
27650  24 00 42 36 AE 25 BC 00 88 00 D2 00 98 04 FC 00
27660  24 00 42 36 5A 28 B0 00 42 36 54 2E B4 00 C6 00
27670  2E 00 11 00 24 00 42 36 12 28 BC 00 88 00 D2 00
27680  98 04 FC 00 24 00 AC 2D 88 00 D2 00 98 04 FC 00
27690  5C 00 F4 00 01 00 24 00 E2 06 24 00 3E 36 38 00
276A0  88 00 D2 00 6C 03 54 00 01 00 9F 08 6D 02 FC 00
276B0  24 00 56 36 88 00 D2 00 98 04 24 00 5A 36 88 00
276C0  D2 00 98 04 54 00 01 00 89 08 59 02 FC 00 24 00
276D0  5E 36 88 00 D2 00 98 04 24 00 1C 30 88 00 D2 00
276E0  98 04 54 00 01 00 89 08 59 02 FC 00 24 00 62 36
276F0  88 00 D2 00 98 04 24 00 4C 2E 88 00 D2 00 98 04
27700  24 00 56 28 88 00 D2 00 98 04 54 00 01 00 89 08
27710  59 02 FC 00 24 00 56 28 88 00 D2 00 98 04 24 00
27720  26 31 88 00 D2 00 98 04 24 00 56 28 88 00 D2 00
27730  98 04 24 00 AC 2D 88 00 D2 00 98 04 24 00 66 36
27740  88 00 D2 00 98 04 24 00 5E 36 88 00 D2 00 98 04
27750  24 00 1C 30 88 00 D2 00 98 04 54 00 01 00 89 08
27760  59 02 FC 00 24 00 4C 2E 88 00 D2 00 98 04 24 00
27770  4C 2E 88 00 D2 00 98 04 24 00 4C 2E 88 00 D2 00
27780  98 04 24 00 6A 36 88 00 D2 00 98 04 24 00 AC 2D
27790  88 00 D2 00 98 04 24 00 6E 36 88 00 D2 00 98 04
277A0  24 00 A2 25 88 00 D2 00 98 04 24 00 72 36 88 00
277B0  D2 00 98 04 24 00 4C 2E 88 00 D2 00 98 04 24 00
277C0  5A 36 88 00 D2 00 98 04 54 00 01 00 89 08 59 02
277D0  FC 00 54 00 01 00 89 08 59 02 FC 00 24 00 4C 2E
277E0  88 00 D2 00 98 04 24 00 4C 2E 88 00 D2 00 98 04
277F0  24 00 76 36 88 00 D2 00 98 04 24 00 6A 36 88 00
27800  D2 00 98 04 24 00 5A 36 88 00 D2 00 98 04 24 00
27810  32 25 88 00 D2 00 98 04 24 00 7A 36 88 00 D2 00
27820  98 04 24 00 1C 30 88 00 D2 00 98 04 54 00 01 00
27830  89 08 59 02 FC 00 24 00 4C 2E 88 00 D2 00 98 04
27840  24 00 4C 26 88 00 D2 00 98 04 24 00 7E 36 88 00
27850  D2 00 98 04 24 00 82 36 88 00 D2 00 98 04 24 00
27860  86 36 88 00 D2 00 98 04 24 00 32 25 88 00 D2 00
27870  98 04 24 00 8A 36 88 00 D2 00 98 04 54 00 01 00
27880  89 08 59 02 FC 00 24 00 5A 36 88 00 D2 00 98 04
27890  24 00 66 36 88 00 D2 00 98 04 24 00 5E 36 88 00
278A0  D2 00 98 04 24 00 1C 30 88 00 D2 00 98 04 54 00
278B0  01 00 89 08 59 02 FC 00 24 00 8E 36 88 00 D2 00
278C0  98 04 24 00 92 36 88 00 D2 00 98 04 24 00 96 36
278D0  88 00 D2 00 98 04 24 00 BA 25 88 00 D2 00 98 04
278E0  24 00 9A 36 88 00 D2 00 98 04 24 00 7E 36 88 00
278F0  D2 00 98 04 24 00 4C 2E 88 00 D2 00 98 04 24 00
27900  76 36 88 00 D2 00 98 04 24 00 A2 36 88 00 D2 00
27910  98 04 24 00 5A 36 88 00 D2 00 98 04 24 00 44 26
27920  88 00 D2 00 98 04 24 00 4C 2E 88 00 D2 00 98 04
27930  24 00 5E 36 88 00 D2 00 98 04 24 00 1C 30 88 00
27940  D2 00 98 04 54 00 01 00 89 08 59 02 FC 00 46 36
27950  26 00 72 08 24 00 60 05 38 00 A6 36 C0 00 9E 00
27960  4A 36 26 00 72 08 24 00 60 05 38 00 A6 36 C2 00
27970  9E 00 FC 00 24 00 46 36 C0 26 B0 00 2E 00 13 00
27980  46 36 24 00 46 36 38 26 BC 00 9E 00 4E 36 24 00
27990  1C 25 9E 00 2A 00 0B 00 4E 36 24 00 B4 09 9E 00
279A0  FC 00 24 00 46 36 B4 09 AC 00 2E 00 0B 00 46 36
279B0  24 00 38 26 9E 00 FC 00 24 00 BA 25 88 00 D2 00
279C0  98 04 24 00 46 36 88 00 D2 00 98 04 24 00 4C 2E
279D0  88 00 D2 00 98 04 24 00 4A 36 B4 09 AC 00 2E 00
279E0  0B 00 54 00 01 00 41 06 B3 01 FC 00 24 00 4A 36
279F0  48 25 B4 00 2E 00 0D 00 24 00 3C 2E 88 00 D2 00
27A00  98 04 FC 00 24 00 4A 36 AA 25 B4 00 2E 00 15 00
27A10  24 00 4A 36 88 00 D2 00 98 04 54 00 01 00 41 06
```

```
27A20   B3 01 FC 00 24 00 4A 36 48 25 C0 00 3C 26 BA 00
27A30   88 00 D2 00 98 04 24 00 4A 36 48 25 C2 00 2E 00
27A40   11 00 24 00 4A 36 48 25 C2 00 88 00 D2 00 98 04
27A50   FC 00 24 00 4C 2E 88 00 D2 00 98 04 24 00 4E 36
27A60   2E 00 11 00 24 00 AA 36 68 00 D2 00 98 04 2A 00
27A70   0D 00 24 00 54 26 88 00 D2 00 98 04 FC 00 24 00
27A80   2A 28 88 00 D2 00 98 04 54 00 01 00 89 08 59 02
27A90   FC 00 24 00 AE 36 88 00 D2 00 98 04 24 00 5A 36
27AA0   88 00 D2 00 98 04 24 00 44 2E 88 00 D2 00 98 04
27AB0   54 00 01 00 89 08 59 02 FC 00 24 00 B2 36 88 00
27AC0   D2 00 98 04 24 00 5A 36 88 00 D2 00 98 04 24 00
27AD0   26 31 88 00 D2 00 98 04 24 00 26 31 88 00 D2 00
27AE0   98 04 24 00 5E 36 68 00 D2 00 98 04 24 00 1C 30
27AF0   83 00 D2 00 98 04 54 00 01 00 89 08 59 02 FC 00
27B00   24 00 5A 36 88 00 D2 00 98 04 24 00 B6 36 88 00
27B10   D2 00 98 04 24 00 4C 2E 88 00 D2 00 98 04 24 00
27B20   A2 36 88 00 D2 00 98 04 24 00 54 25 88 00 D2 00
27B30   98 04 24 00 AC 2D 88 00 D2 00 98 04 24 00 32 25
27B40   88 00 D2 00 98 04 24 00 BA 36 68 00 D2 00 98 04
27B50   24 00 4C 2E 88 00 D2 00 98 04 24 00 4C 2E 88 00
27B60   D2 00 98 04 24 00 B2 25 88 00 D2 00 98 04 24 00
27B70   AC 2D 88 00 D2 00 98 04 24 00 32 25 88 00 D2 00
27B80   98 04 24 00 BE 36 88 00 D2 00 98 04 54 00 01 00
27B90   89 08 59 02 FC 00 24 00 AE 36 88 00 D2 00 98 04
27BA0   24 00 5A 36 88 00 D2 00 98 04 24 00 1C 30 88 00
27BB0   D2 00 98 04 24 00 5E 35 88 00 D2 00 98 04 24 00
27BC0   A2 36 88 00 D2 00 98 04 24 00 C2 36 88 00 D2 00
27BD0   98 04 54 00 01 00 89 08 59 02 FC 00 24 00 44 2E
27BE0   88 00 D2 00 98 04 24 00 92 36 88 00 D2 00 98 04
27BF0   24 00 C6 36 88 00 D2 00 98 04 24 00 4C 2E 88 00
27C00   D2 00 98 04 24 00 4C 2E 88 00 D2 00 98 04 24 00
27C10   AE 36 88 00 D2 00 98 04 24 00 C6 36 88 00 D2 00
27C20   98 04 24 00 5A 36 88 00 D2 00 98 04 24 00 44 2E
27C30   88 00 D2 00 98 04 54 00 01 00 89 08 59 02 FC 00
27C40   24 00 CA 36 88 00 D2 00 98 04 24 00 92 36 88 00
27C50   D2 00 98 04 24 00 96 36 88 00 D2 00 98 04 24 00
27C60   4C 2E 88 00 D2 00 98 04 24 00 4C 2E 88 00 D2 00
27C70   98 04 24 00 76 36 88 00 D2 00 98 04 24 00 CE 36
27C80   88 00 D2 00 78 04 54 00 01 00 89 08 59 02 FC 00
27C90   54 00 01 00 89 08 59 02 FC 00 F4 00 01 00 24 00
27CA0   E2 06 24 00 3E 36 38 00 88 00 D2 00 6C 03 FC 00
27CB0   24 00 10 25 88 00 D2 00 24 00 E2 06 24 00 3E 36
27CC0   38 00 88 00 D2 00 F4 00 01 00 FE 02 FC 00 24 00
27CD0   24 00 A8 05 30 00 DC 06 24 00 3E 36 38 00 1C 25
27CE0   BA 00 C6 00 2E 00 05 00 02 00 FC 00 24 00 06 00
27CF0   B4 09 AC 00 1A 07 24 00 3E 36 38 00 08 00 A0 00
27D00   B4 00 C6 00 2E 00 05 00 54 00 01 00 C1 00 51 00
27D10   FC 00 F4 00 05 00 24 00 3E 36 88 00 D2 00 24 00
27D20   60 05 88 00 D2 00 0A 01 F4 00 03 00 24 00 3E 36
27D30   88 00 D2 00 D2 01 FC 00 1A 07 24 00 60 05 38 00
27D40   24 00 B4 09 9E 00 FC 00 02 00 4C 2E 88 00 D2 00
27D50   00 00 00 00 00 00 00 00 D2 36 24 00 08 00 9E 00
27D60   20 00 24 00 0A 00 88 00 62 00 60 00 2D 00 FC 00
27D70   24 00 D6 06 24 00 D2 36 38 00 06 00 AC 00 20 07
27D80   24 00 D2 36 38 00 B4 09 AC 00 C6 00 2E 00 0B 00
27D90   24 00 D2 36 82 00 02 00 FC 00 5E 00 24 00 B4 09
27DA0   82 00 02 00 01 00 89 08 59 02 FC 00 24 00 4C 2E
27DB0   00 00 00 00 00 00 65 0A 00 00 F4 00 03 00 24 00
27DC0   08 00 88 00 D2 00 8A 03 24 00 A4 05 24 00 06 00
27DD0   32 00 FC 00 24 00 5E 0A B4 09 AC 00 2E 00 11 00
27DE0   F4 00 03 00 24 00 08 00 88 00 D2 00 6C 03 FC 00
27DF0   02 00 24 00 1C 30 88 00 D2 00 98 04 54 00 01 00
27E00   00 00 0C 00 00 00 01 00 6A 0A F4 00 01 00 24 00
27E10   08 00 88 00 D2 00 8A 03 FC 00 D6 36 24 00 1C 25
27E20   9E 00 20 00 24 00 06 00 A0 00 88 00 62 00 60 00
```

| | | | | | | | | | | | | | | | | |
|---|---|---|---|---|---|---|---|---|---|---|---|---|---|---|---|---|
| 27E30 | C7 | 00 | FC | 00 | DA | 36 | 24 | 00 | 28 | 00 | 28 | 00 | 06 | 00 | 24 | 00 |
| 27E40 | D6 | 36 | 24 | 00 | 1C | 25 | D6 | 00 | CA | 00 | 9E | 00 | FC | 00 | 24 | 00 |
| 27E50 | DA | 36 | AA | 36 | B0 | 00 | DA | 36 | 44 | 26 | B4 | 00 | C6 | 00 | 2E | 00 |
| 27E60 | 17 | 00 | DA | 36 | 24 | 00 | DA | 36 | AE | 25 | BC | 00 | 9E | 00 | 54 | 00 |
| 27E70 | 01 | 00 | E7 | 00 | B5 | 00 | FC | 00 | 24 | 00 | DA | 36 | 5A | 28 | B0 | 00 |
| 27E80 | DA | 36 | 4C | 2E | B4 | 00 | C6 | 00 | 2E | 00 | 17 | 00 | DA | 36 | 24 | 00 |
| 27E90 | DA | 36 | 14 | 27 | BC | 00 | 9E | 00 | 54 | 00 | 01 | 00 | E7 | 00 | B5 | 00 |
| 27EA0 | FC | 00 | 24 | 00 | DA | 36 | 68 | 25 | AC | 00 | 2E | 00 | 13 | 00 | DA | 36 |
| 27EB0 | 24 | 00 | C0 | 26 | 9E | 00 | 54 | 00 | 01 | 00 | E7 | 00 | B5 | 00 | FC | 00 |
| 27EC0 | 24 | 00 | DA | 36 | 50 | 26 | AC | 00 | 2E | 00 | 13 | 00 | DA | 36 | 24 | 00 |
| 27ED0 | 38 | 26 | 9E | 00 | 54 | 00 | 01 | 00 | E7 | 00 | B5 | 00 | FC | 00 | 54 | 00 |
| 27EE0 | 01 | 00 | F7 | 00 | C9 | 00 | FC | 00 | 24 | 00 | A4 | 05 | 24 | 00 | DA | 36 |
| 27EF0 | 0A | 00 | C6 | 00 | 32 | 00 | FC | 00 | 5E | 00 | FC | 00 | F4 | 00 | 03 | 00 |
| 27F00 | 24 | 00 | 08 | 00 | 88 | 00 | D2 | 00 | 6C | 03 | FC | 00 | 02 | 00 | 88 | 00 |
| 27F10 | 00 | 00 | 00 | 00 | 00 | 00 | F4 | 00 | 03 | 00 | 24 | 00 | 08 | 00 | 88 | 00 |
| 27F20 | D2 | 00 | 8A | 03 | FC | 00 | 24 | 00 | A4 | 05 | 24 | 00 | 06 | 00 | 50 | 25 |
| 27F30 | C0 | 00 | 32 | 00 | 24 | 00 | A4 | 05 | 24 | 00 | 06 | 00 | 50 | 25 | C2 | 00 |
| 27F40 | 32 | 00 | FC | 00 | F4 | 00 | 03 | 00 | 24 | 00 | 08 | 00 | 88 | 00 | D2 | 00 |
| 27F50 | 6C | 03 | FC | 00 | 02 | 00 | 38 | 26 | BC | 00 | 9E | 00 | 4E | 36 | 24 | 00 |
| 27F60 | 00 | 00 | 0C | 00 | 00 | 00 | 26 | 00 | 22 | 00 | 24 | 00 | 28 | 30 | 88 | 00 |
| 27F70 | D2 | 00 | F2 | 00 | 05 | 00 | 32 | 01 | 1C | 25 | AC | 00 | 7E | 08 | 24 | 00 |
| 27F80 | 60 | 05 | 38 | 00 | B4 | 07 | AC | 00 | C6 | 00 | 84 | 00 | 2E | 00 | 11 | 00 |
| 27F90 | DE | 36 | 24 | 00 | 08 | 00 | 88 | 00 | D2 | 00 | 40 | 02 | 02 | 00 | FC | 00 |
| 27FA0 | 26 | 00 | 06 | 00 | E6 | 36 | AC | 00 | 22 | 00 | 24 | 00 | 28 | 30 | 88 | 00 |
| 27FB0 | D2 | 00 | F2 | 00 | 05 | 00 | 32 | 01 | 1C | 25 | AC | 00 | 7E | 08 | 24 | 00 |
| 27FC0 | 60 | 05 | 38 | 00 | B4 | 09 | B0 | 00 | C6 | 00 | C8 | 00 | 84 | 00 | 2E | 00 |
| 27FD0 | 11 | 00 | F2 | 36 | 24 | 00 | 08 | 00 | 88 | 00 | D2 | 00 | 40 | 02 | 02 | 00 |
| 27FE0 | FC | 00 | 28 | 00 | FA | 36 | 28 | 00 | 06 | 00 | 24 | 00 | B8 | 09 | D8 | 00 |
| 27FF0 | 88 | 00 | 24 | 00 | 08 | 00 | 88 | 00 | D2 | 00 | 40 | 02 | FC | 00 | 02 | 00 |
| 28000 | 00 | 00 | 00 | 00 | 24 | 00 | 06 | 00 | 4C | 2E | B0 | 00 | 2E | 00 | 11 | 00 |
| 28010 | 00 | 37 | 94 | 00 | 24 | 00 | 06 | 00 | 94 | 00 | 7A | 00 | 02 | 00 | FC | 00 |
| 28020 | 24 | 00 | 24 | 00 | A4 | 05 | 9E | 30 | BC | 00 | 06 | 00 | BA | 00 | 30 | 00 |
| 28030 | 1C | 25 | C6 | 00 | 82 | 00 | 02 | 00 | 88 | 00 | D2 | 00 | 98 | 04 | 2A | 00 |
| 28040 | 00 | 00 | 24 | 00 | 22 | 00 | 24 | 00 | 44 | 2E | 68 | 00 | D2 | 00 | F2 | 00 |
| 28050 | 05 | 00 | 32 | 01 | 2E | 00 | 17 | 00 | 6C | 08 | 24 | 00 | 60 | 05 | 38 | 00 |
| 28060 | 26 | 00 | A0 | 05 | 20 | 37 | BA | 00 | 9E | 00 | 02 | 00 | FC | 00 | 24 | 00 |
| 28070 | 22 | 00 | 24 | 00 | 60 | 25 | 68 | 00 | D2 | 00 | F2 | 00 | 05 | 00 | 32 | 01 |
| 28080 | 2E | 00 | 0B | 00 | 54 | 00 | 01 | 00 | A7 | 00 | 65 | 00 | FC | 00 | 24 | 00 |
| 28090 | 22 | 00 | 24 | 00 | 58 | 25 | 88 | 00 | D2 | 00 | F2 | 00 | 05 | 00 | 32 | 01 |
| 280A0 | 2E | 00 | 0B | 00 | 54 | 00 | 01 | 00 | BD | 00 | 79 | 00 | FC | 00 | 1C | 37 |
| 280B0 | 26 | 00 | 28 | 00 | 28 | 00 | 22 | 00 | F6 | 26 | 24 | 00 | 1C | 25 | 24 | 00 |
| 280C0 | 32 | 25 | D6 | 00 | 6E | 00 | 9E | 00 | FC | 00 | 24 | 00 | 1C | 37 | B8 | 05 |
| 280D0 | B4 | 00 | 1C | 37 | BC | 05 | B0 | 00 | C8 | 00 | 2E | 00 | 0B | 00 | 54 | 00 |
| 280E0 | 01 | 00 | BD | 00 | 79 | 00 | FC | 00 | 6C | 08 | 24 | 00 | 60 | 05 | 38 | 00 |
| 280F0 | 26 | 00 | A0 | 05 | B0 | 05 | BA | 00 | 9E | 00 | 02 | 00 | FC | 00 | 6C | 08 |
| 28100 | 24 | 00 | 60 | 05 | 38 | 00 | 26 | 00 | A0 | 05 | B4 | 05 | BA | 00 | 9E | 00 |
| 28110 | FC | 00 | 02 | 00 | 98 | 04 | 24 | 00 | BA | 36 | 88 | 00 | D2 | 00 | 98 | 04 |
| 28120 | 00 | 00 | 74 | 0A | 0D | 00 | 58 | 0A | 4A | 08 | 24 | 00 | 6E | 0A | 24 | 00 |
| 28130 | 62 | 00 | 40 | 00 | 9E | 00 | FC | 00 | 24 | 00 | 6E | 0A | 54 | 00 | 11 | 00 |
| 28140 | 45 | 00 | 33 | 00 | 73 | 00 | 51 | 00 | 87 | 00 | 65 | 00 | A1 | 00 | 79 | 00 |
| 28150 | BB | 00 | 8D | 00 | D5 | 00 | A1 | 00 | EF | 00 | B5 | 00 | 01 | 01 | C9 | 00 |
| 28160 | F9 | 01 | 2D | 01 | FC | 00 | 2C | 08 | 28 | 00 | E4 | 07 | DE | 07 | 08 | 08 |
| 28170 | D2 | 07 | 20 | 08 | 32 | 08 | 9E | 00 | FC | 00 | 4A | 08 | 26 | 08 | 08 | 00 |
| 28180 | 44 | 08 | 2C | 08 | 14 | 08 | 3E | 08 | 18 | 0B | 54 | 00 | 01 | 00 | 1B | 01 |
| 28190 | DD | 00 | FC | 00 | 4A | 08 | F6 | 07 | F6 | 07 | 1A | 08 | F0 | 07 | F6 | 07 |
| 281A0 | 3E | 08 | 18 | 0B | 02 | 00 | FC | 00 | 4A | 08 | F6 | 07 | EA | 07 | D8 | 07 |
| 281B0 | F0 | 07 | 02 | 08 | 3E | 08 | 18 | 0B | 54 | 00 | 01 | 00 | 1B | 01 | DD | 00 |
| 281C0 | FC | 00 | 4A | 08 | F6 | 07 | EA | 07 | D8 | 07 | F0 | 07 | 02 | 08 | 3E | 08 |
| 281D0 | 18 | 0B | 54 | 00 | 01 | 00 | 1B | 01 | DD | 00 | FC | 00 | 4A | 08 | F6 | 07 |
| 281E0 | F6 | 07 | D8 | 07 | F6 | 07 | F6 | 07 | 3E | 08 | 18 | 0B | 54 | 00 | 01 | 00 |
| 281F0 | 1B | 01 | DD | 00 | FC | 00 | 4A | 08 | F6 | 07 | EA | 07 | 0E | 08 | F0 | 07 |
| 28200 | 02 | 08 | 3E | 08 | 18 | 0B | 54 | 00 | 01 | 00 | 1B | 01 | DD | 00 | FC | 00 |
| 28210 | 4A | 08 | FC | 07 | FC | 07 | FC | 07 | 38 | 08 | FC | 07 | 3E | 08 | 18 | 0B |
| 28220 | FC | 00 | 4A | 08 | F6 | 07 | EA | 07 | 0E | 08 | 50 | 08 | 02 | 08 | 3E | 08 |
| 28230 | 18 | 0B | 54 | 00 | 01 | 00 | 1B | 01 | DD | 00 | FC | 00 | 24 | 00 | 3E | 08 |

```
28240   24 00 B4 09 24 00 62 00 40 00 AC 00 2E 00 05 00
28250   02 00 FC 00 24 00 3E 08 24 00 52 27 24 00 62 00
28260   40 00 AC 00 2E 00 25 00 78 2C 24 00 38 26 88 00
28270   24 00 B4 09 88 00 F2 00 0B 00 F2 00 0F 00 F2 00
28280   13 00 24 37 2C 37 94 00 02 00 FC 00 24 00 3E 08
28290   24 00 AA 25 24 00 62 00 40 00 AC 00 2E 00 41 00
282A0   24 00 38 26 88 00 24 00 B4 09 88 00 F2 00 08 00
282B0   F2 00 0F 00 F2 00 13 00 24 37 78 2C 24 00 38 26
282C0   88 00 24 00 52 27 88 00 24 00 B4 09 88 00 F2 00
282D0   0F 00 F2 00 13 00 14 25 48 37 94 00 02 00 FC 00
282E0   24 00 AC 27 88 00 24 00 1C 25 88 00 F2 00 0B 00
282F0   F2 00 0F 00 F2 00 13 00 14 25 5E 37 94 00 24 00
28300   28 00 4A 08 CA 00 94 00 6C 37 94 00 24 00 28 00
28310   3E 08 CA 00 94 00 02 00 FC 00 26 08 78 37 9E 00
28320   44 08 84 37 9E 00 14 08 8A 37 9E 00 3E 08 24 00
28330   B4 09 24 00 62 00 40 00 9E 00 FC 00 E4 07 24 00
28340   B4 09 24 00 62 00 40 00 9E 00 DE 07 24 00 EC 25
28350   50 25 BE 00 24 00 62 00 40 00 9E 00 08 08 24 00
28360   6A 0A 24 00 62 00 40 00 9E 00 D2 07 24 00 B4 09
28370   24 00 62 00 40 00 9E 00 FC 00 20 08 24 00 B4 09
28380   24 00 62 00 40 00 9E 00 32 08 24 00 B4 09 24 00
28390   62 00 40 00 9E 00 EA 07 22 00 24 00 AA 25 88 00
283A0   24 00 B4 09 88 00 92 37 9E 00 FC 00 EA 07 24 00
283B0   1C 25 24 00 1C 25 D6 00 24 00 48 26 24 00 62 00
283C0   40 00 9E 00 EA 07 24 00 32 25 24 00 1C 25 D6 00
283D0   24 00 60 25 9A 37 BA 00 24 00 62 00 40 00 9E 00
283E0   EA 07 24 00 C0 26 24 00 1C 25 06 00 24 00 9E 37
283F0   24 00 62 00 40 00 9E 00 FC 00 F0 07 24 00 1C 25
28400   24 00 62 00 40 00 9E 00 02 08 28 00 24 00 86 27
28410   24 00 62 00 40 00 24 00 BA 25 24 00 62 00 40 00
28420   9E 00 FC 00 02 00 DA 36 44 26 B4 00 C6 00 2E 00
28430   00 00 01 00 60 05 B2 37 24 00 FE 06 24 00 06 00
28440   38 00 9E 00 A2 37 24 00 04 07 24 00 06 00 38 00
28450   48 25 C0 00 9E 00 24 00 A2 37 48 25 AE 00 A2 37
28460   38 26 AE 00 C6 00 2E 00 05 00 02 00 FC 00 24 00
28470   1A 07 24 00 60 05 38 00 54 00 0B 00 B3 01 65 00
28480   65 02 97 00 FF 02 91 01 5D 03 C3 01 27 04 E1 01
28490   9D 00 1F 00 FC 00 24 00 A2 37 38 26 AC 00 2E 00
284A0   2D 00 24 00 54 26 22 00 24 00 B2 37 88 00 D2 00
284B0   5E 02 BA 00 88 00 D2 00 24 00 22 00 24 00 B2 37
284C0   88 00 D2 00 4A 02 88 00 D2 00 12 03 FC 00 26 00
284D0   A2 37 38 26 AC 00 A0 05 7E 08 24 00 B2 37 38 00
284E0   BC 00 10 25 B4 00 8C 05 C8 00 C6 00 84 00 2E 00
284F0   13 00 1A 07 24 00 60 05 38 00 24 00 B2 25 9E 00
28500   02 00 FC 00 24 00 A2 37 48 25 AC 00 2E 00 0F 00
28510   A6 37 24 00 52 27 9E 00 2A 00 13 00 A6 37 24 00
28520   50 25 9E 00 8C 05 24 00 60 05 9E 00 FC 00 BA 37
28530   28 00 22 00 24 00 A6 37 22 00 24 00 B2 37 88 00
28540   D2 00 5E 02 BA 00 88 00 20 30 24 00 32 25 D8 00
28550   9E 00 FC 00 AA 37 24 00 52 07 24 00 06 00 38 00
28560   A0 00 9E 00 BA 37 28 00 BA 37 24 00 AA 37 90 00
28570   9E 00 FC 00 BA 37 28 00 BA 37 22 00 52 07 24 00
28580   06 00 38 00 A0 01 9E 00 F4 00 03 00 24 00 B2 37
28590   88 00 D2 00 36 02 FC 00 24 00 74 05 2E 00 19 00
285A0   C0 37 94 00 BA 37 94 00 24 00 A2 37 94 00 24 00
285B0   B2 37 94 00 7A 00 FC 00 BA 37 24 00 22 00 24 00
285C0   B2 37 88 00 D2 00 4A 02 88 00 D2 00 F2 00 07 00
285D0   08 03 1A 07 24 00 60 05 38 00 24 00 1C 25 9E 00
285E0   02 00 FC 00 24 00 A2 37 48 25 AC 00 2E 00 0B 00
285F0   54 00 01 00 FF 02 91 01 FC 00 AE 37 24 00 22 00
28600   24 00 B2 37 88 00 D2 00 72 02 9E 00 24 00 AE 37
28610   38 26 AC 00 2E 00 13 00 8C 05 24 00 B4 09 9E 00
28620   54 00 01 00 A5 02 AB 00 FC 00 24 00 AE 37 B8 09
28630   AC 00 2E 00 49 00 8C 05 24 00 B4 09 9E 00 6C 08
28640   24 00 60 05 38 00 26 00 A0 05 DC 05 24 00 1C 25
```

```
28650   22 00 24 00 48 26 88 00 D2 00 F2 00 05 00 32 01
28660   BA 00 88 00 BE 00 BA 00 9E 00 1A 07 24 00 60 05
28670   38 00 24 00 32 25 9E 00 2A 00 17 00 24 00 AE 37
28680   54 25 AC 00 2E 00 0B 00 54 00 01 00 A5 02 AB 00
28690   FC 00 02 00 FC 00 AE 37 24 00 22 00 24 00 B2 37
286A0   88 00 D2 00 72 02 9E 00 24 00 AE 37 54 25 AC 00
286B0   2E 00 0B 00 54 00 01 00 D7 02 B5 00 FC 00 26 00
286C0   6C 08 24 00 60 05 38 00 A0 05 B2 00 84 00 2E 00
286D0   05 00 02 00 FC 00 24 00 B2 37 88 00 D2 00 68 02
286E0   F4 00 05 00 24 00 B2 37 88 00 D2 00 36 02 1A 07
286F0   24 00 60 05 38 00 24 00 B4 09 9E 00 68 05 24 00
28700   B4 09 9E 00 02 00 FC 00 F4 00 05 00 24 00 B2 37
28710   88 00 D2 00 36 02 1A 07 24 00 60 05 38 00 24 00
28720   B4 09 9E 00 68 05 24 00 1C 25 9E 00 02 00 FC 00
28730   24 00 22 00 24 00 B2 37 88 00 D2 00 72 02 C0 26
28740   AE 00 2E 00 13 00 1A 07 24 00 60 05 38 00 24 00
28750   10 25 9E 00 02 00 FC 00 B6 37 24 00 22 00 24 00
28760   B2 37 88 00 D2 00 D6 02 9E 00 6C 08 24 00 60 05
28770   38 00 26 00 A0 05 D0 05 BA 00 9E 00 FC 00 1A 07
28780   24 00 60 05 38 00 24 00 B8 09 9E 00 FC 00 26 00
28790   6C 08 24 00 60 05 38 00 A0 05 B0 00 84 00 2E 00
287A0   05 00 02 00 FC 00 F4 00 05 00 24 00 B2 37 88 00
287B0   D2 00 36 02 24 00 B2 37 88 00 D2 00 68 02 FC 00
287C0   24 00 22 00 24 00 5C 25 88 00 D2 00 24 00 06 00
287D0   88 00 D2 00 32 01 2E 00 1D 00 22 00 7E 07 24 00
287E0   06 00 38 00 A0 01 24 00 B2 37 88 00 D2 00 1C 03
287F0   2A 00 0F 00 CC 37 24 00 B2 37 88 00 D2 00 40 02
28800   FC 00 6C 08 24 00 60 05 38 00 26 00 CC 05 24 00
28810   1C 25 22 00 24 00 48 26 88 00 D2 00 F2 00 05 00
28820   32 01 BA 00 88 00 BE 00 D0 05 BC 00 A0 05 BA 00
28830   9E 00 1A 07 24 00 60 05 38 00 24 00 54 25 9E 00
28840   F4 00 07 00 24 00 B2 37 88 00 D2 00 24 00 10 25
28850   88 00 D2 00 0A 01 FC 00 24 00 22 00 24 00 B2 37
28860   88 00 D2 00 72 02 5C 25 AC 00 22 00 24 00 5C 25
28870   88 00 D2 00 24 00 06 00 88 00 D2 00 32 01 B4 09
28880   AC 00 22 00 24 00 B2 37 88 00 D2 00 D6 02 1C 25
28890   AC 00 C6 00 C8 00 22 00 24 00 82 27 88 00 D2 00
288A0   24 00 06 00 88 00 D2 00 32 01 C8 00 2E 00 0B 00
288B0   54 00 01 00 BB 04 09 02 FC 00 26 00 6C 08 24 00
288C0   60 05 38 00 A0 05 B0 00 84 00 2E 00 05 00 02 00
288D0   FC 00 1A 07 24 00 60 05 38 00 24 00 B4 09 9E 00
288E0   68 05 24 00 B4 09 9E 00 02 00 FC 00 1A 07 24 00
288F0   60 05 38 00 24 00 B4 09 9E 00 68 05 24 00 1C 25
28900   9E 00 02 00 FC 00 02 00 9E 00 FC 00 E4 07 24 00
28910   D9 01 0C 00 EA 37 28 00 06 00 24 00 B8 09 D8 00
28920   9E 00 EA 37 F4 00 03 00 EA 37 F0 37 FC 00 24 00
28930   28 00 EA 37 24 00 1C 25 D4 00 C8 25 B0 00 2E 00
28940   05 00 02 00 FC 00 D2 37 26 00 28 00 28 00 EA 37
28950   24 00 B8 09 24 00 1C 25 D6 00 8E 00 9E 00 24 00
28960   D2 37 B4 09 AC 00 2E 00 0B 00 D2 37 24 00 48 25
28970   9E 00 FC 00 D6 37 26 00 28 00 28 00 EA 37 24 00
28980   10 25 24 00 1C 25 D6 00 8E 00 9E 00 24 00 D6 37
28990   B4 09 AC 00 2E 00 0B 00 D6 37 24 00 48 25 9E 00
289A0   FC 00 DA 37 26 00 28 00 28 00 EA 37 24 00 32 25
289B0   24 00 1C 25 D6 00 8E 00 9E 00 24 00 DA 37 B4 09
289C0   AC 00 2E 00 0B 00 DA 37 24 00 48 25 9E 00 FC 00
289D0   42 00 00 00 FC 00 26 00 28 00 28 00 EA 37 24 00
289E0   1C 25 24 00 1C 25 D6 00 8E 00 54 25 BE 00 DA 37
289F0   32 25 C0 00 BA 00 8C 00 58 00 0B 00 52 00 DE 37
28A00   24 00 98 00 9E 00 5C 00 FC 00 E2 37 24 00 DE 37
28A10   48 25 C0 00 48 25 BE 00 D6 37 BA 00 9E 00 E6 37
28A20   24 00 DE 37 48 25 C2 00 48 25 BE 00 54 25 BA 00
28A30   D2 37 BA 00 9E 00 FC 00 24 00 DA 37 32 25 C2 00
28A40   B4 09 AC 00 2E 00 09 00 E2 37 E6 37 0E 29 FC 00
28A50   E2 37 26 00 F8 37 1C 25 32 25 FC 37 E2 00 C0 00
```

```
28A60   24 00 E2 37 4C 25 BC 00 88 00 E2 00 BE 00 9E 00
28A70   24 00 E2 37 E4 2F B4 00 2E 00 0F 00 E2 37 24 00
28A80   E2 37 48 25 BE 00 9E 00 FC 00 E6 37 26 00 F8 37
28A90   1C 25 32 25 FC 37 E2 00 C0 00 24 00 E6 37 4C 25
28AA0   BC 00 88 00 E2 00 BE 00 9E 00 24 00 E6 37 E4 2F
28AB0   B4 00 2E 00 0F 00 E6 37 24 00 E6 37 48 25 BE C0
28AC0   9E 00 FC 00 28 00 02 38 28 00 24 00 E2 37 90 00
28AD0   24 00 B8 09 D8 00 28 00 24 C0 E6 37 90 00 24 00
28AE0   B8 09 D8 00 82 00 44 00 1B 00 38 26 A6 25 60 25
28AF0   58 25 AC 27 6A 0A 86 27 16 28 50 26 BE 29 00 00
28B00   00 00 FC 00 02 00 A6 37 22 00 24 00 B2 37 88 00
28B10   00 00 01 00 60 05 08 38 24 00 04 07 24 00 06 00
28B20   38 00 48 25 C0 00 9E 00 FC 00 24 00 08 38 1C 25
28B30   AC 00 52 07 24 00 60 05 38 00 A0 00 5C 25 AE 00
28B40   C6 00 2E 00 17 00 18 38 94 00 24 00 EC 05 24 00
28B50   06 00 38 00 94 00 7A 00 02 00 FC 00 24 00 08 38
28B60   C0 26 AC 00 2E 00 0B 00 08 38 24 00 1C 25 9E 00
28B70   FC 00 24 00 08 38 1C 25 B4 00 08 38 4C 25 B0 00
28B80   C8 00 2E 00 0D 00 64 05 24 00 1C 25 9E 00 02 00
28B90   FC 00 24 00 08 38 10 25 AC 00 08 38 B8 09 AC 00
28BA0   C8 00 2E 00 0F 00 08 38 24 00 32 25 9E 00 2A 00
28BB0   17 00 24 00 08 38 54 25 AC 00 2E 00 0B 00 08 38
28BC0   24 00 10 25 9E 00 FC 00 24 00 22 00 24 00 2A 38
28BD0   88 00 D2 00 F2 00 05 00 32 01 1C 25 AC 00 08 38
28BE0   1C 25 AC 00 08 38 32 25 AC 00 C8 00 C6 00 2E 00
28BF0   0F 00 14 38 24 00 B8 09 9E 00 2A 00 0B 00 14 38
28C00   24 00 B4 09 9E 00 FC 00 0C 38 24 00 1A 07 24 00
28C10   60 05 38 00 9E 00 24 00 0C 38 B4 09 B0 00 0C 38
28C20   64 25 B4 00 C6 00 2E 00 1D 00 24 00 F2 05 24 00
28C30   0C 38 38 00 54 00 05 00 F9 02 C9 00 BF 03 19 01
28C40   17 05 BD 02 FC 00 24 00 08 38 B2 25 AC 00 08 38
28C50   EC 25 AC 00 C8 00 08 38 5C 25 AC 00 C8 00 2E 00
28C60   0B 00 54 00 01 00 4D 04 59 02 FC 00 24 00 08 38
28C70   4C 25 AC 00 2E 00 0B 00 54 00 01 00 91 05 21 03
28C80   FC 00 0C 38 24 00 22 00 24 00 08 38 52 27 BA 00
28C90   88 00 D2 00 24 00 10 25 88 00 D2 00 24 00 44 2E
28CA0   88 00 D2 00 F4 02 9E 00 24 00 0C 38 B4 09 AC 00
28CB0   2E 00 13 00 1A 07 24 00 60 05 38 00 24 00 64 25
28CC0   9E 00 02 00 FC 00 56 00 01 00 1D 04 91 01 24 00
28CD0   10 38 1C 25 C6 00 10 38 32 25 08 38 E2 00 C6 00
28CE0   C8 00 2E 00 1F 00 24 00 A0 27 88 00 D2 00 24 00
28CF0   E2 06 24 00 0C 38 38 00 88 00 D2 00 F4 00 01 00
28D00   FE 02 FC 00 F4 00 03 00 24 00 FE 06 24 00 60 05
28D10   38 00 14 38 BA 00 88 00 D2 00 24 00 0C 38 88 00
28D20   D2 00 0A 01 20 07 24 00 0C 38 38 00 24 00 60 05
28D30   9E 00 24 00 14 38 2E 00 1B 00 24 00 FE 06 24 00
28D40   60 05 38 00 14 38 BA 00 88 00 D2 00 F4 00 05 00
28D50   D0 03 FC 00 24 00 04 07 24 00 06 00 38 00 48 25
28D60   C0 00 10 25 AC 00 2E 00 59 00 28 00 24 00 08 38
28D70   90 00 52 07 24 00 06 00 38 00 2E 38 86 00 24 00
28D80   E2 06 24 00 0C 38 38 00 88 00 D2 00 F2 00 07 00
28D90   08 03 28 00 24 00 08 38 90 00 68 07 24 00 60 05
28DA0   38 00 88 00 24 00 E2 06 24 00 0C 38 38 00 88 00
28DB0   D2 00 F2 00 07 00 08 03 54 00 01 00 D9 02 B5 00
28DC0   FC 00 28 00 24 00 08 38 90 00 52 07 24 00 06 00
28DD0   38 00 88 00 24 00 E2 06 24 00 0C 38 38 00 88 00
28DE0   D2 00 F2 00 07 00 08 03 FC 00 1A 07 24 00 60 05
28DF0   38 00 24 00 0C 38 9E 00 F2 05 24 00 0C 38 38 00
28E00   24 00 1C 25 9E 00 02 00 FC 00 56 00 01 00 1D 04
28E10   91 01 24 00 10 38 32 25 08 38 E2 00 C6 00 2E 00
28E20   C5 00 02 00 FC 00 F4 00 05 00 24 00 FE 06 24 00
28E30   60 05 38 00 14 38 BA 00 88 00 D2 00 24 00 0C 38
28E40   88 00 D2 00 0A 01 24 00 14 38 2E 00 1B 00 24 00
28E50   FE 06 24 00 60 05 38 00 14 38 BA 00 88 00 D2 00
28E60   F4 00 03 00 D0 03 FC 00 24 00 22 00 24 00 44 26
```

| | | | | | | | | | | | | | | | | |
|---|---|---|---|---|---|---|---|---|---|---|---|---|---|---|---|---|
| 28E70 | 88 | 00 | D2 | 00 | 24 | 00 | 06 | 00 | 88 | 00 | D2 | 00 | 32 | 01 | B4 | 09 |
| 28E80 | AC | 00 | 2E | 00 | 0B | 00 | 54 | 00 | 01 | 00 | FD | 03 | 41 | 01 | FC | 00 |
| 28E90 | F4 | 00 | 07 | 00 | 24 | 00 | FE | 06 | 24 | 00 | 06 | 00 | 38 | 00 | 88 | 00 |
| 28EA0 | D2 | 00 | 24 | 00 | B8 | 09 | 88 | 00 | D2 | 00 | 0A | 01 | 6C | 08 | 24 | 00 |
| 28EB0 | 06 | 00 | 38 | 00 | 26 | 00 | 22 | 00 | 34 | 38 | 3C | 38 | BA | 00 | 9E | 00 |
| 28EC0 | F2 | 05 | 24 | 00 | 0C | 38 | 38 | 00 | 24 | 00 | 32 | 25 | 9E | 00 | FC | 00 |
| 28ED0 | 26 | 00 | 6C | 08 | 24 | 00 | 06 | 00 | 38 | 00 | 22 | 00 | 34 | 38 | B0 | 00 |
| 28EE0 | 22 | 00 | 34 | 38 | 48 | 25 | B0 | 00 | C6 | 00 | 84 | 00 | 2E | 00 | 05 | 00 |
| 28EF0 | 02 | 00 | FC | 00 | F4 | 00 | 09 | 00 | 24 | 00 | FE | 06 | 24 | 00 | 06 | 00 |
| 28F00 | 38 | 00 | 88 | 00 | D2 | 00 | F2 | 00 | 07 | 00 | 0A | 01 | FC | 00 | 20 | 07 |
| 28F10 | 24 | 00 | 0C | 38 | 38 | 00 | 24 | 00 | B4 | 09 | 9E | 00 | 1A | 07 | 24 | 00 |
| 28F20 | 60 | 05 | 38 | 00 | 24 | 00 | B4 | 09 | 9E | 00 | 02 | 00 | FC | 00 | 24 | 00 |
| 28F30 | 50 | 25 | 88 | 00 | D2 | 00 | 24 | 00 | E2 | 06 | 24 | 00 | 0C | 38 | 38 | 00 |
| 28F40 | 88 | 00 | D2 | 00 | F4 | 00 | 01 | 00 | FE | 02 | 10 | 38 | 24 | 00 | 24 | 00 |
| 28F50 | A8 | 05 | 30 | 00 | 6A | 0A | C6 | 00 | 9E | 00 | 46 | 00 | FC | 00 | 0C | 38 |
| 28F60 | 24 | 00 | FE | 06 | 24 | 00 | 06 | 00 | 38 | 00 | 9E | 00 | 24 | 00 | 0C | 38 |
| 28F70 | 88 | 00 | D2 | 00 | F4 | 00 | 03 | 00 | D0 | 03 | 20 | 07 | 24 | 00 | 0C | 38 |
| 28F80 | 38 | 00 | 24 | 00 | 60 | 05 | 9E | 00 | FC | 00 | 24 | 00 | 22 | 00 | 24 | 00 |
| 28F90 | E2 | 06 | 24 | 00 | 0C | 38 | 38 | 00 | 88 | 00 | D2 | 00 | 26 | 03 | 1C | 25 |
| 28FA0 | AC | 00 | 2E | 00 | 13 | 00 | 1A | 07 | 24 | 00 | 60 | 05 | 38 | 00 | 24 | 00 |
| 28FB0 | 64 | 25 | 9E | 00 | 02 | 00 | FC | 00 | 24 | 00 | 04 | 07 | 24 | 00 | 06 | 00 |
| 28FC0 | 38 | 00 | 48 | 25 | C2 | 00 | 10 | 25 | AE | 00 | 2E | 00 | 0F | 00 | 68 | 07 |
| 28FD0 | 24 | 00 | 60 | 05 | 38 | 00 | 9C | 27 | 9E | 00 | FC | 00 | 28 | 00 | 2E | 38 |
| 28FE0 | 52 | 07 | 24 | 00 | 06 | 00 | 38 | 00 | 68 | 07 | 24 | 00 | 60 | 05 | 38 | 00 |
| 28FF0 | 88 | 00 | 24 | 00 | E2 | 06 | 24 | 00 | 0C | 38 | 38 | 00 | 88 | 00 | D2 | 00 |
| 29000 | F2 | 00 | 07 | 00 | 08 | 03 | FC | 00 | 1A | 07 | 24 | 00 | 60 | 05 | 38 | 00 |
| 29010 | 24 | 00 | 0C | 38 | 9E | 00 | F2 | C5 | 24 | 00 | 0C | 38 | 38 | 00 | 24 | 00 |
| 29020 | 10 | 25 | 9E | 00 | 02 | 00 | FC | 00 | 24 | 00 | 22 | 00 | 24 | 00 | E2 | 06 |
| 29030 | 24 | 00 | 0C | 38 | 38 | 00 | 88 | 00 | D2 | 00 | 26 | 03 | 1C | 25 | AC | 00 |
| 29040 | 2E | 00 | 05 | 00 | 02 | 00 | FC | 00 | 24 | 00 | 32 | 25 | 88 | 00 | D2 | 00 |
| 29050 | 24 | 00 | E2 | 06 | 24 | 00 | 0C | 38 | 38 | 00 | 88 | 00 | D2 | 00 | F4 | 00 |
| 29060 | 01 | 00 | FE | 02 | 24 | 00 | 64 | 25 | 88 | 00 | D2 | 00 | 24 | 00 | E2 | 06 |
| 29070 | 24 | 00 | 0C | 38 | 38 | 00 | 88 | 00 | D2 | 00 | F4 | 00 | 01 | 00 | FE | 02 |
| 29080 | FC | 00 | 20 | 07 | 24 | 00 | 0C | 38 | 38 | 00 | 24 | 00 | B4 | 09 | 9E | 00 |
| 29090 | 1A | 07 | 24 | 00 | 60 | 05 | 38 | 00 | 24 | 00 | E4 | 09 | 9E | 00 | 02 | 00 |
| 290A0 | FC | 00 | 0C | 38 | 24 | 00 | FE | 06 | 24 | 00 | 06 | 00 | 38 | 00 | 9E | 00 |
| 290B0 | 24 | 00 | 22 | 00 | 24 | 00 | E2 | 06 | 24 | 00 | 0C | 38 | 38 | 00 | 88 | 00 |
| 290C0 | D2 | 00 | 26 | 03 | 1C | 25 | AC | 00 | 2E | 00 | 13 | 00 | 1A | 07 | 24 | 00 |
| 290D0 | 60 | 05 | 38 | 00 | 24 | 00 | 64 | 25 | 9E | 00 | 02 | 00 | FC | 00 | 28 | 00 |
| 290E0 | 28 | 00 | 22 | 00 | 24 | 00 | 26 | 06 | 24 | 00 | 74 | 25 | 38 | 00 | 88 | 00 |
| 290F0 | 20 | 30 | 24 | 00 | 32 | 25 | D8 | 00 | 52 | 07 | 24 | 00 | 06 | 00 | 38 | 00 |
| 29100 | 68 | 07 | 24 | 00 | 60 | 05 | 38 | 00 | 88 | 00 | 24 | 00 | E2 | 06 | 24 | 00 |
| 29110 | 0C | 38 | 38 | 00 | 88 | 00 | D2 | 00 | F2 | 00 | 07 | 00 | 08 | 03 | FC | 00 |
| 29120 | 20 | 07 | 24 | 00 | 0C | 38 | 38 | 00 | 24 | 00 | B4 | 09 | 9E | 00 | 1A | 07 |
| 29130 | 24 | 00 | 60 | 05 | 38 | 00 | 24 | 00 | B4 | 09 | 9E | 00 | 02 | 00 | FC | 00 |
| 29140 | 02 | 00 | 24 | 00 | 08 | 38 | 1C | 25 | B4 | 00 | 08 | 38 | 4C | 25 | B0 | 00 |
| 29150 | 00 | 00 | F2 | 00 | 03 | 00 | 2C | 29 | 74 | 05 | 24 | 00 | 10 | 25 | 9E | 00 |
| 29160 | FC | 00 | F4 | 00 | 03 | 00 | F4 | 00 | 03 | 00 | 24 | 00 | 48 | 25 | 88 | 00 |
| 29170 | F4 | 00 | 03 | 00 | 3E | 00 | 1A | 05 | D8 | 44 | FC | 00 | F4 | 00 | 03 | 00 |
| 29180 | 24 | 00 | 48 | 25 | 88 | 00 | F4 | 00 | 03 | 00 | F4 | 00 | 05 | 00 | E0 | 44 |
| 29190 | FC | 00 | 58 | 00 | 3B | 00 | FC | 00 | AC | 04 | FC | 00 | 24 | 00 | 74 | 05 |
| 291A0 | 32 | 25 | AC | 00 | 2E | 00 | 25 | 00 | F4 | 00 | 03 | 00 | 24 | 00 | 48 | 25 |
| 291B0 | 88 | 00 | F4 | 00 | 03 | 00 | F4 | 00 | 03 | 00 | E0 | 44 | 74 | 05 | 24 | 00 |
| 291C0 | B4 | 09 | 9E | 00 | 24 | 00 | 32 | 25 | 02 | 00 | FC | 00 | D4 | 04 | FC | 00 |
| 291D0 | 5C | 00 | FC | 00 | 02 | 00 | FC | 00 | 0C | 38 | 24 | 00 | 1A | 07 | 24 | 00 |
| 291E0 | 00 | 00 | D3 | 0A | 00 | 00 | 00 | 00 | 16 | 00 | 0B | 00 | 54 | 00 | 01 | 00 |
| 291F0 | 29 | 00 | 0B | 00 | FC | 00 | 24 | 00 | 74 | 05 | 32 | 25 | B4 | 00 | 2E | 00 |
| 29200 | 09 | 00 | F4 | 00 | 05 | 00 | F0 | 30 | FC | 00 | 24 | 00 | 08 | 00 | 4C | 2E |
| 29210 | B0 | 00 | 2E | 00 | 3B | 00 | 24 | 00 | A4 | 05 | E8 | 44 | BC | 00 | 08 | 00 |
| 29220 | BA | 00 | 24 | 00 | B4 | 09 | 32 | 00 | 24 | 00 | A4 | 05 | 08 | 00 | BA | 00 |
| 29230 | 76 | 36 | BC | 00 | 24 | 00 | B4 | 09 | 32 | 00 | 24 | 00 | A4 | 05 | 08 | 00 |
| 29240 | BA | 00 | 44 | 2E | BC | 00 | 24 | 00 | B4 | 09 | 32 | 00 | 02 | 00 | FC | 00 |
| 29250 | 24 | 00 | 08 | 00 | A4 | 05 | BA | 00 | 9E | 30 | BC | 00 | 24 | 00 | B4 | 09 |
| 29260 | 32 | 00 | FC | 00 | 02 | 00 | 10 | 25 | 88 | 00 | D2 | 00 | 24 | 00 | 44 | 2E |
| 29270 | 00 | 00 | 00 | 00 | EC | 44 | 24 | 00 | A4 | 06 | 24 | 00 | 06 | 00 | 38 | 00 |

```
29280   9E 00 A4 06 24 00 06 00 38 00 24 00 B4 09 9E 00
29290   FC 00 F4 00 05 00 24 00 EC 44 88 00 D2 00 36 02
292A0   FC 00 24 00 22 00 24 00 EC 44 88 00 D2 00 5E 02
292B0   B8 09 BA 00 88 00 D2 00 24 00 22 00 24 00 EC 44
292C0   88 00 D2 00 4A 02 88 00 D2 00 12 03 FC 00 02 00
292D0   00 00 16 00 13 00 08 45 94 00 24 00 64 00 3C 00
292E0   94 00 7A 00 F8 00 FC 00 B6 07 22 00 16 45 9E 00
292F0   24 00 10 25 88 00 00 25 24 00 1C 25 88 00 24 00
29300   4C 26 88 00 F2 00 0B 00 F2 00 0F 00 F2 00 13 00
29310   14 25 B6 07 94 00 8A 3A 94 00 22 00 F6 26 94 00
29320   24 00 1C 25 88 00 00 25 FC 00 A0 05 26 00 A0 05
29330   1C 25 BA 00 9E 00 F0 44 24 00 F0 44 1C 25 BA 00
29340   9E 00 FC 44 24 00 F4 44 32 25 C0 C0 9E 00 FC 00
29350   24 00 D6 06 24 00 F4 44 38 00 B4 09 B0 00 22 00
29360   24 00 FC 44 1C 25 BA 00 88 00 D2 00 26 03 C6 00
29370   2E 00 0D 00 24 00 F4 44 88 00 D2 00 00 01 FC 00
29380   24 00 F4 44 90 05 B0 00 2E 00 0F 00 F4 44 24 00
29390   B4 09 9E 00 2A 00 0F 00 F4 44 24 00 F4 44 88 09
293A0   BA 00 9E 00 FC 00 24 00 F0 44 38 26 AC 00 2E 00
293B0   0F 00 F0 44 24 00 B4 09 9E 00 2A 00 05 00 02 00
293C0   FC 00 F8 44 24 00 F8 44 1C 25 BA 00 9E 00 FC 00
293D0   24 00 10 25 88 00 00 25 24 00 1C 25 88 00 24 00
293E0   1C 25 88 00 F2 00 0B 00 F2 00 0F 00 F2 00 13 00
293F0   14 25 B0 07 94 00 24 00 80 C5 B4 09 AC 00 2E 00
29400   07 00 1E 45 94 00 FC 00 24 00 1C 25 88 00 00 25
29410   FC 00 24 00 D6 06 24 00 F8 44 38 00 32 25 AC 00
29420   58 00 79 00 FC 00 24 00 20 07 24 00 F8 44 38 00
29430   88 09 80 00 2E 00 05 00 02 00 FC 00 24 00 20 07
29440   24 00 F8 44 38 00 2E 00 21 00 24 00 20 07 24 00
29450   F8 44 38 00 88 00 D2 00 76 03 20 07 24 00 F8 44
29460   38 00 24 00 B4 09 9E 00 FC 00 24 00 20 07 24 00
29470   F8 44 38 00 B4 09 AC 00 2E 00 21 00 20 07 24 00
29480   F8 44 38 00 24 00 F8 44 9E 00 F2 05 24 00 F8 44
29490   38 00 24 00 64 25 9E 00 02 00 FC 00 5A 00 FC 00
294A0   24 00 F8 44 F6 2B AC 00 2E 00 0B 00 F8 44 24 00
294B0   B4 09 9E 00 FC 00 24 00 80 09 58 00 07 02 FC 00
294C0   24 00 80 09 60 26 AC 00 58 00 E7 00 FC 00 24 00
294D0   28 45 8E 00 BE 30 24 00 6C 25 88 00 D2 30 FC 00
294E0   F4 00 03 00 28 00 28 00 22 00 24 00 22 00 2C 45
294F0   88 00 20 30 24 00 32 25 D4 00 34 45 28 00 22 00
29500   24 00 22 00 2C 45 88 00 20 30 24 00 32 25 D8 00
29510   34 45 28 00 22 00 24 00 22 00 3A 45 88 00 20 30
29520   24 00 32 25 D4 00 88 00 EA 2C FC 00 24 00 42 45
29530   8E 00 BE 30 24 00 6C 25 88 00 D2 30 FC 00 F4 00
29540   03 00 28 00 28 00 22 00 24 00 22 00 3A 45 88 00
29550   20 30 24 00 32 25 D4 00 46 45 28 00 22 00 24 00
29560   22 00 3A 45 88 00 20 30 24 00 32 25 D8 00 46 45
29570   22 00 24 00 22 00 2C 45 88 00 20 30 88 00 0C 2D
29580   FC 00 5A 00 FC 00 24 00 80 09 4C 45 AC 00 2E 00
29590   5F 00 F4 00 03 00 28 00 28 00 22 00 24 00 24 00
295A0   80 09 B8 09 BA 00 30 00 88 00 20 30 24 00 32 25
295B0   D8 00 34 45 28 00 22 00 24 00 24 00 80 09 10 25
295C0   BA 00 30 00 88 00 20 30 24 00 32 25 D8 00 34 45
295D0   28 00 22 00 24 00 24 00 80 09 32 25 BA 00 30 00
295E0   88 00 20 30 24 00 32 25 D8 00 88 00 EA 2C FC 00
295F0   24 00 80 09 4C 45 AC 00 2E 00 6B 00 B6 07 28 00
29600   28 00 22 00 24 00 24 00 80 09 EC 25 BA 00 30 00
29610   88 00 20 30 24 00 32 25 D8 00 46 45 28 00 22 00
29620   24 00 24 00 80 09 B2 25 BA 00 30 00 88 00 20 30
29630   24 00 32 25 D8 00 46 45 28 00 22 00 24 00 24 00
29640   80 09 6A 0A BA 00 30 00 88 00 20 30 24 00 32 25
29650   D8 00 9E 00 F4 00 03 00 B6 07 0C 2D B6 07 22 00
29660   16 45 9E 00 FC 00 24 00 80 09 50 45 AC 00 2E 00
29670   55 00 24 00 80 09 24 00 5A 28 32 00 04 45 24 00
29680   24 00 80 09 30 00 6A 0A C6 00 9E 00 24 00 04 45
```

| | | | | | | | | | | | | | | | | |
|---|---|---|---|---|---|---|---|---|---|---|---|---|---|---|---|---|
| 29690 | 1C | 25 | B0 | 00 | 04 | 45 | 5C | 25 | B4 | 00 | C6 | 00 | 2E | 00 | 27 | 00 |
| 296A0 | F4 | 00 | 03 | 00 | 28 | 00 | 28 | 00 | 22 | 00 | F6 | 26 | 24 | 00 | EC | 25 |
| 296B0 | D4 | 00 | 28 | 00 | 24 | 00 | 04 | 45 | 90 | 00 | 24 | 00 | 1C | 25 | D8 | 00 |
| 296C0 | 88 | 00 | EA | 2C | FC | 00 | 5A | 00 | FC | 00 | 02 | 00 | FC | 00 | 00 | 45 |
| 296D0 | 24 | 00 | 00 | 45 | 1C | 25 | BA | 00 | 9E | 00 | 24 | 00 | 00 | 45 | 90 | 05 |
| 296E0 | B2 | 00 | 2E | 00 | 0B | 00 | 00 | 45 | 24 | 00 | 32 | 25 | 9E | 00 | FC | 00 |
| 296F0 | 24 | 00 | D6 | 06 | 24 | 00 | 00 | 45 | 38 | 00 | 38 | 26 | AC | 00 | 58 | 00 |
| 29700 | 48 | 00 | FC | 00 | 24 | 00 | 22 | 00 | 24 | 00 | E2 | 06 | 24 | 00 | 00 | 45 |
| 29710 | 38 | 00 | 88 | 00 | D2 | 00 | 26 | 03 | 1C | 25 | AC | 00 | 20 | 07 | 24 | 00 |
| 29720 | 00 | 45 | 38 | 00 | C8 | 00 | 2E | 00 | 05 | 00 | 02 | 00 | FC | 00 | 20 | 07 |
| 29730 | 24 | 00 | 00 | 45 | 38 | 00 | 24 | 00 | 00 | 45 | 9E | 00 | F2 | 05 | 24 | 00 |
| 29740 | 00 | 45 | 38 | 00 | 24 | 00 | 52 | 28 | 9E | 00 | FC | 00 | 5A | 00 | FC | 00 |
| 29750 | 16 | 00 | 07 | 00 | 02 | 00 | F8 | 00 | FC | 00 | 24 | 00 | 20 | 07 | 24 | 00 |
| 29760 | 00 | 45 | 38 | 00 | 48 | 25 | B0 | 00 | 20 | 07 | 24 | 00 | 00 | 45 | 38 | 00 |
| 29770 | 00 | 45 | AE | 00 | C6 | 00 | 2E | 00 | 59 | 00 | 24 | 00 | 20 | 07 | 24 | 00 |
| 29780 | 20 | 07 | 24 | 00 | 00 | 45 | 38 | 00 | 38 | 00 | B4 | 09 | AC | 00 | 2E | 00 |
| 29790 | 41 | 00 | 20 | 07 | 24 | 00 | 00 | 45 | 38 | 00 | 24 | 00 | B4 | 09 | 9E | 00 |
| 297A0 | 24 | 00 | AA | 07 | 24 | 00 | 1C | 25 | 38 | 00 | 54 | 45 | AC | 00 | AA | 07 |
| 297B0 | 24 | 00 | 1C | 25 | 38 | 00 | 5C | 45 | AC | 00 | C8 | 00 | 2E | 00 | 13 | 00 |
| 297C0 | 54 | 25 | 64 | 45 | 94 | 00 | 24 | 00 | 00 | 45 | 94 | 00 | 7A | 00 | 1E | 00 |
| 297D0 | FC | 00 | 02 | 00 | FC | 00 | 02 | 00 | FC | 00 | 24 | 00 | 08 | 00 | 4C | 2E |
| 297E0 | 00 | 00 | E3 | 0A | 00 | 00 | 00 | 00 | F4 | 00 | 03 | 00 | F0 | 30 | FC | 00 |
| 297F0 | 24 | 00 | 08 | 00 | 4C | 2E | B0 | 00 | 2E | 00 | 38 | 00 | 24 | 00 | A4 | 05 |
| 29800 | E8 | 44 | BC | 00 | 08 | 00 | BA | 00 | 24 | 00 | 1C | 25 | 32 | 00 | 24 | 00 |
| 29810 | A4 | 05 | 08 | 00 | BA | 00 | 76 | 36 | BC | 00 | 24 | 00 | 1C | 25 | 32 | 00 |
| 29820 | 24 | 00 | A4 | 05 | 08 | 00 | BA | 00 | 44 | 2E | BC | 00 | 24 | 00 | 1C | 25 |
| 29830 | 32 | 00 | 02 | 00 | FC | 00 | 24 | 00 | 08 | 00 | A4 | 05 | BA | 00 | 9E | 30 |
| 29840 | BC | 00 | 24 | 00 | 1C | 25 | 32 | 00 | FC | 00 | A8 | 05 | 24 | 00 | A4 | 05 |
| 29850 | 08 | 00 | AC | 27 | C0 | 00 | 4C | 25 | BE | 00 | BA | 00 | 9E | 00 | FC | 00 |
| 29860 | 02 | 00 | F4 | 00 | 05 | 00 | 24 | 00 | EC | 44 | 88 | 00 | D2 | 00 | 36 | 02 |
| 29870 | 00 | 00 | 00 | 00 | 76 | 45 | 24 | 00 | 22 | 00 | 44 | 06 | 24 | 00 | 06 | 00 |
| 29880 | 1C | 25 | BC | 00 | 88 | 00 | D2 | 00 | A4 | 02 | 9E | 00 | 24 | 00 | 76 | 45 |
| 29890 | B4 | 09 | AC | 00 | 2E | 00 | 05 | 00 | 02 | 00 | FC | 00 | 24 | 00 | 74 | 05 |
| 298A0 | 2E | 00 | 0F | 00 | 7A | 45 | 94 | 00 | 24 | 00 | 76 | 45 | 94 | 00 | 7A | 00 |
| 298B0 | FC | 00 | 24 | 00 | 76 | 45 | 88 | 00 | D2 | 00 | F4 | 00 | 05 | 00 | D0 | 03 |
| 298C0 | 20 | 07 | 24 | 00 | 76 | 45 | 38 | 00 | 24 | 00 | 06 | 00 | 9E | 00 | 7E | 03 |
| 298D0 | 24 | 00 | 76 | 45 | 38 | 00 | 26 | 00 | A0 | 05 | 9E | 00 | FC | 00 | 24 | 00 |
| 298E0 | 22 | 00 | 24 | 00 | 76 | 45 | 88 | 00 | D2 | 00 | 5E | 02 | 88 | 00 | D2 | 00 |
| 298F0 | 24 | 00 | 22 | 00 | 24 | 00 | 76 | 45 | 88 | 00 | D2 | 00 | 4A | 02 | 88 | 00 |
| 29900 | D2 | 00 | 12 | 03 | FC | 00 | A4 | 06 | 24 | 00 | 06 | 00 | 38 | 00 | 24 | 00 |
| 29910 | 76 | 45 | 9E | 00 | F4 | 00 | 03 | 00 | 24 | 00 | 76 | 45 | 88 | 00 | D2 | 00 |
| 29920 | 36 | 02 | FC | 00 | 02 | 00 | F4 | 44 | 38 | 00 | 34 | 09 | B0 | 00 | 22 | 00 |
| 29930 | 00 | 00 | 8E | 45 | 24 | 00 | EC | 05 | 24 | 00 | 60 | 05 | 38 | 00 | 1C | 27 |
| 29940 | C2 | 00 | 9E | 00 | 24 | 00 | 8E | 45 | B4 | 09 | AC | 00 | 2E | 00 | 0B | 00 |
| 29950 | 8E | 45 | 24 | 00 | 1C | 27 | 9E | 00 | FC | 00 | F4 | 00 | 03 | 00 | F4 | 00 |
| 29960 | 03 | 00 | 24 | 00 | B8 | 09 | 88 | 00 | 24 | 00 | 8E | 45 | 8E | 00 | 7A | 09 |
| 29970 | 16 | 26 | A8 | 03 | FC | 00 | 8A | 45 | 24 | 00 | 1C | 25 | 9E | 00 | 20 | 00 |
| 29980 | 24 | 00 | EA | 27 | 88 | 00 | 62 | 00 | 60 | 00 | 23 | 00 | FC | 00 | 24 | 00 |
| 29990 | 7A | 09 | 62 | 09 | 24 | 00 | 8A | 45 | 38 | 00 | EC | 05 | 24 | 00 | 60 | 05 |
| 299A0 | 38 | 00 | AC | 00 | 2E | 00 | 09 | 00 | 24 | 00 | 1C | 25 | 82 | 00 | 5E | 00 |
| 299B0 | FC | 00 | 02 | 00 | F2 | 00 | 0B | 00 | F2 | 00 | 0F | 00 | F2 | 00 | 13 | 00 |
| 299C0 | 00 | 00 | 26 | 00 | 7A | 09 | 72 | 09 | 24 | 00 | B4 | 09 | 38 | 00 | B6 | 07 |
| 299D0 | AC | 00 | 28 | 00 | 22 | 00 | F6 | 26 | 8E | 00 | 7C | 05 | B4 | 00 | C8 | 00 |
| 299E0 | 84 | 00 | 2E | 00 | 05 | 00 | 02 | 00 | FC | 00 | 7A | 09 | 9C | 00 | 7A | 09 |
| 299F0 | 72 | 09 | 24 | 00 | B4 | 09 | 38 | 00 | B6 | 07 | 9E | 00 | FC | 00 | 02 | 00 |
| 29A00 | 00 | 00 | 04 | 00 | 96 | 45 | 24 | 00 | 06 | 00 | 1C | 27 | C2 | 00 | 9E | 00 |
| 29A10 | 24 | 00 | 96 | 45 | B4 | 09 | AC | 00 | 2E | 00 | 0B | 00 | 96 | 45 | 24 | 00 |
| 29A20 | 1C | 27 | 9E | 00 | FC | 00 | 7A | 00 | 9E | 45 | 94 | 00 | 24 | 00 | 96 | 45 |
| 29A30 | 94 | 00 | 7A | 00 | FC | 00 | F4 | 00 | 03 | 00 | F4 | 00 | 03 | 00 | 24 | 00 |
| 29A40 | B8 | 09 | 88 | 00 | 24 | 00 | 96 | 45 | 8E | 00 | 7A | 09 | 16 | 26 | FC | 00 |
| 29A50 | 92 | 45 | 24 | 00 | B4 | 09 | 9E | 00 | 20 | 00 | 24 | 00 | 6A | 0A | 88 | 00 |
| 29A60 | 62 | 00 | 60 | 00 | 0B | 01 | FC | 00 | 7A | 45 | 24 | 00 | B4 | 09 | 9E | 00 |
| 29A70 | 20 | 00 | 24 | 00 | 50 | 25 | 88 | 00 | 24 | 00 | 50 | 25 | 88 | 00 | 60 | 00 |
| 29A80 | E9 | 00 | FC | 00 | 26 | 00 | 9A | 45 | A6 | 45 | BE | 00 | 84 | 00 | 8A | 00 |
| 29A90 | D0 | 00 | FC | 00 | 24 | 00 | 92 | 45 | 94 | 45 | BA | 00 | 94 | 00 | 24 | 00 |

| | | | | | | | | | | | | | | | | |
|---|---|---|---|---|---|---|---|---|---|---|---|---|---|---|---|---|
| 29AA0 | 92 | 45 | B4 | 09 | AC | 00 | 9A | 45 | B4 | 09 | AC | 00 | C6 | 00 | 2E | 00 |
| 29AB0 | 17 | 00 | 24 | 00 | 52 | 27 | 8A | 00 | D0 | 00 | 7A | 09 | 72 | 09 | 24 | 00 |
| 29AC0 | B4 | 09 | 38 | 00 | 94 | 00 | FC | 00 | 24 | 00 | 7A | 09 | 62 | 09 | 24 | 00 |
| 29AD0 | 72 | 45 | 9A | 45 | BA | 00 | 38 | 00 | 2E | 00 | 8F | 00 | 26 | 00 | B2 | 25 |
| 29AE0 | 9A | 45 | A6 | 45 | BE | 00 | BA | 00 | 84 | 00 | 8A | 00 | D0 | 00 | 24 | 00 |
| 29AF0 | 7A | 09 | 62 | 09 | 24 | 00 | 92 | 45 | 9A | 45 | BA | 00 | 38 | 00 | 94 | 00 |
| 29B00 | 26 | 00 | 38 | 26 | 9A | 45 | A6 | 45 | BE | 00 | BA | 00 | 84 | 00 | 8A | 00 |
| 29B10 | D0 | 00 | 24 | 00 | 24 | 00 | 7A | 09 | 6A | 09 | 24 | 00 | 92 | 45 | 9A | 45 |
| 29B20 | BA | 00 | 38 | 00 | A6 | 36 | C0 | 00 | D2 | 00 | 94 | 00 | 24 | 00 | 24 | 00 |
| 29B30 | 7A | 09 | 6A | 09 | 24 | 00 | 92 | 45 | 9A | 45 | BA | 00 | 38 | 00 | A6 | 36 |
| 29B40 | C2 | 00 | D2 | 00 | 94 | 00 | 26 | 00 | 52 | 27 | 7A | 45 | A6 | 45 | BE | 00 |
| 29B50 | BA | 00 | 84 | 00 | 8A | 00 | D0 | 00 | 7A | 09 | 72 | 09 | 24 | 00 | 92 | 45 |
| 29B60 | 9A | 45 | BA | 00 | 38 | 00 | 94 | 00 | FC | 00 | 5E | 00 | 7A | 00 | FC | 00 |
| 29B70 | 5E | 00 | FC | 00 | 02 | 00 | 30 | 00 | 88 | 00 | 20 | 30 | 24 | 00 | 32 | 25 |
| 29B80 | 00 | 00 | B4 | 45 | 24 | 00 | EC | 05 | 24 | 00 | 60 | 05 | 38 | 00 | 1C | 27 |
| 29B90 | C2 | 00 | 9E | 00 | 24 | 00 | B4 | 45 | B4 | 09 | AC | 00 | 2E | 00 | 08 | 00 |
| 29BA0 | B4 | 45 | 24 | 00 | 1C | 27 | 9E | 00 | FC | 00 | F4 | 00 | 03 | 00 | F4 | 00 |
| 29BB0 | 03 | 00 | 24 | 00 | B8 | 09 | 88 | 00 | 24 | 00 | B4 | 45 | 8E | 00 | 7A | 09 |
| 29BC0 | 16 | 26 | A8 | 03 | FC | 00 | B0 | 45 | 24 | 00 | 1C | 25 | 9E | 00 | 20 | 00 |
| 29BD0 | 24 | 00 | EA | 27 | 83 | 00 | 62 | 00 | 60 | 00 | 99 | 00 | FC | 00 | 24 | 00 |
| 29BE0 | EC | 05 | 24 | 00 | 60 | 05 | 38 | 00 | 7A | 09 | 62 | 09 | 24 | 00 | B0 | 45 |
| 29BF0 | 38 | 00 | AE | 00 | 2E | 00 | 0B | 00 | 54 | 00 | 01 | 00 | F3 | 00 | B5 | 00 |
| 29C00 | FC | 00 | 68 | 07 | 24 | 00 | 60 | 05 | 38 | 00 | 7A | 09 | 72 | 09 | 24 | 00 |
| 29C10 | B0 | 45 | 38 | 00 | 9E | 00 | AC | 45 | 24 | 00 | 7A | 09 | 6A | 09 | 24 | 00 |
| 29C20 | B0 | 45 | 38 | 00 | 9E | 00 | 72 | 08 | 24 | 00 | 60 | 03 | 38 | 00 | 24 | 00 |
| 29C30 | AC | 45 | 9E | 00 | FC | 00 | 7A | 09 | 62 | 09 | 24 | 00 | B0 | 45 | 38 | 00 |
| 29C40 | 24 | 00 | 7A | 09 | 62 | 09 | 24 | 00 | B0 | 45 | 38 | 00 | CE | 00 | 9E | 00 |
| 29C50 | FC | 00 | F4 | 00 | 03 | 00 | F4 | 00 | 03 | 00 | 24 | 00 | B8 | 09 | 88 | 00 |
| 29C60 | 24 | 00 | B4 | 45 | 8E | 00 | 7A | 09 | CA | 29 | FC | 00 | 24 | 00 | 32 | 25 |
| 29C70 | 02 | 00 | FC | 00 | 5E | 00 | FC | 00 | 68 | 07 | 24 | 00 | 60 | 05 | 38 | 00 |
| 29C80 | 9C | 00 | FC | 00 | 02 | 00 | 04 | 45 | 90 | 00 | 24 | 00 | 1C | 25 | D8 | 00 |
| 29C90 | 00 | 00 | C0 | 45 | 24 | 00 | EC | 05 | 24 | 00 | 60 | 05 | 38 | 00 | 1C | 27 |
| 29CA0 | C2 | 00 | 9E | 00 | 24 | 00 | C0 | 45 | B4 | 09 | AC | 00 | 2E | 00 | 0B | 00 |
| 29CB0 | C0 | 45 | 24 | 00 | 1C | 27 | 9E | 00 | FC | 00 | F4 | 00 | 03 | 00 | F4 | 00 |
| 29CC0 | 03 | 00 | 24 | 00 | B8 | 09 | 88 | 00 | 24 | 00 | C0 | 45 | 8E | 00 | 7A | 09 |
| 29CD0 | 16 | 26 | A8 | 03 | FC | 00 | BC | 45 | 24 | 00 | 1C | 25 | 9E | 00 | 20 | 00 |
| 29CE0 | 24 | 00 | EA | 27 | 88 | 00 | 62 | 00 | 60 | 00 | A3 | 00 | FC | 00 | 24 | 00 |
| 29CF0 | 7A | 09 | 62 | 09 | 24 | 00 | BC | 45 | 38 | 00 | B4 | 09 | B0 | 00 | 2E | 00 |
| 29D00 | 0B | 00 | 54 | 00 | 01 | 00 | FD | 00 | 8D | 00 | FC | 00 | B8 | 45 | 26 | 00 |
| 29D10 | 28 | 00 | 22 | 00 | F6 | 26 | 8E | 00 | A6 | 36 | BE | 00 | 28 | 00 | 28 | 00 |
| 29D20 | 22 | 00 | F6 | 26 | 24 | 00 | 54 | 25 | D8 | 00 | 8E | 00 | BA | 00 | 9E | 00 |
| 29D30 | FC | 00 | 7A | 09 | 62 | 09 | 24 | 00 | BC | 45 | 38 | 00 | 24 | 00 | EC | 05 |
| 29D40 | 24 | 00 | 60 | 05 | 38 | 00 | 9E | 00 | 7A | 09 | 72 | 09 | 24 | 00 | BC | 45 |
| 29D50 | 38 | 00 | 68 | 07 | 24 | 00 | 60 | 05 | 38 | 00 | 9E | 00 | 7A | 09 | 6A | 09 |
| 29D60 | 24 | 00 | BC | 45 | 38 | 00 | 24 | 00 | B8 | 45 | 9E | 00 | FC | 00 | F4 | 00 |
| 29D70 | 03 | 00 | F4 | 00 | 03 | 00 | 24 | 00 | B8 | 09 | 88 | 00 | 24 | 00 | C0 | 45 |
| 29D80 | 8E | 00 | 7A | 09 | CA | 29 | 24 | 00 | 32 | 25 | 02 | 00 | FC | 00 | 5E | 00 |
| 29D90 | FC | 00 | 24 | 00 | 74 | 05 | 2E | 00 | 0F | 00 | C4 | 45 | 94 | 00 | 24 | 00 |
| 29DA0 | C0 | 45 | 94 | 00 | 7A | 00 | FC | 00 | 02 | 00 | 4B | 4E | 49 | 4C | 0E | 01 |
| 29DB0 | 00 | 00 | 00 | 00 | F0 | 0A | 16 | 00 | 13 | 00 | D8 | 45 | 94 | 00 | 24 | 00 |
| 29DC0 | 06 | 00 | 94 | 00 | 7A | 00 | 02 | 00 | F8 | 00 | FC | 00 | 24 | 00 | D6 | 06 |
| 29DD0 | 24 | 00 | 06 | 00 | 38 | 00 | 70 | 25 | AC | 00 | 2E | 00 | 05 | 00 | 02 | 00 |
| 29DE0 | FC | 00 | 24 | 00 | EA | 0A | 1C | 25 | AC | 00 | 2E | 00 | 11 | 00 | 20 | 07 |
| 29DF0 | 24 | 00 | 06 | 00 | 38 | 00 | 24 | 00 | B4 | 09 | 9E | 00 | FC | 00 | D4 | 45 |
| 29E00 | 24 | 00 | 1C | 25 | 9E | 00 | 20 | 00 | 24 | 00 | 48 | 25 | 88 | 00 | 62 | 00 |
| 29E10 | 60 | 00 | 21 | 00 | FC | 00 | 24 | 00 | A4 | 06 | 24 | 00 | D4 | 45 | 38 | 00 |
| 29E20 | 06 | 00 | AC | 00 | 2E | 00 | 0D | 00 | 24 | 00 | D4 | 45 | 88 | 00 | D2 | 00 |
| 29E30 | 76 | 03 | FC | 00 | 5E | 00 | FC | 00 | 24 | 00 | D6 | 06 | 24 | 00 | 06 | 00 |
| 29E40 | 39 | 00 | 54 | 00 | 03 | 00 | D7 | 00 | B5 | 00 | FB | 00 | C9 | 00 | FC | 00 |
| 29E50 | 24 | 00 | D6 | 06 | 24 | 00 | 06 | 00 | 38 | 00 | 6C | 25 | AC | 00 | 2E | 00 |
| 29E60 | 23 | 00 | 24 | 00 | EA | 0A | 1C | 25 | BC | 00 | 88 | 00 | D2 | 00 | 24 | 00 |
| 29E70 | E2 | 06 | 24 | 00 | 06 | 00 | 38 | 00 | 88 | 00 | D2 | 00 | F4 | 00 | 01 | 00 |
| 29E80 | FE | 02 | FC | 00 | 02 | 00 | FC | 00 | 24 | 00 | EA | 0A | 1C | 25 | 8A | 00 |
| 29E90 | 88 | 00 | D2 | 00 | 24 | 00 | E2 | 06 | 24 | 00 | 06 | 00 | 38 | 00 | E8 | 00 |
| 29EA0 | D2 | 00 | F4 | 00 | 01 | 00 | FE | 02 | 02 | 00 | FC | 00 | 24 | 00 | EA | 0A |

```
29EB0   1C 25 AC 00 2E 00 29 00 24 00 DC 06 24 00 06 00
29EC0   38 00 32 25 BA 00 88 00 D2 00 24 00 E2 06 24 00
29ED0   06 00 38 00 88 00 D2 00 F4 00 01 00 FE 02 FC 00
29EE0   24 00 DC 06 24 00 06 00 38 00 EA 0A B8 09 BE 00
29EF0   EA 00 B8 09 BC 00 88 00 D2 00 24 00 E2 06 24 00
29F00   06 00 38 00 88 00 D2 00 F4 00 01 00 FE 02 02 00
29F10   FC 00 02 00 24 00 8E 45 B4 09 AC 00 2E 00 0B 00
29F20   00 00 24 00 22 00 24 00 E2 06 24 00 60 05 38 00
29F30   88 00 D2 00 26 03 1C 25 AC 00 22 00 EE 03 1C 25
29F40   AC 00 C6 00 2E 00 09 00 F4 00 01 00 E4 03 FC 00
29F50   24 00 58 25 88 00 D2 00 24 00 E2 06 24 00 60 05
29F60   38 00 88 00 D2 00 F4 00 03 00 FE 02 24 00 54 25
29F70   60 05 B8 09 C2 00 BA 00 88 00 D2 00 24 00 E2 06
29F80   24 00 60 05 38 00 88 00 D2 00 F4 00 01 00 FE 02
29F90   FC 00 24 00 74 05 2E 00 0F 00 9C 26 94 00 24 00
29FA0   60 05 94 00 7A 00 FC 00 02 00 7C 05 B4 00 C8 00
29FB0   00 00 93 26 00 00 BA 26 68 07 24 00 60 05 38 00
29FC0   9E 00 FC 00 24 00 8C 26 B4 09 AC 00 2E 00 07 00
29FD0   BA 26 9C 00 FC 00 24 00 5C 25 88 00 D2 00 24 00
29FE0   E2 06 24 00 60 05 38 00 88 00 D2 00 F4 00 03 00
29FF0   FE 02 24 00 32 25 88 00 5A 01 FC 00 AE 26 24 00
2A000   24 00 A8 05 30 00 6A 0A C6 00 9E 00 24 00 AE 26
2A010   B4 09 AC 00 2E 00 0B 00 AE 26 24 00 50 25 9E 00
2A020   FC 00 B6 26 24 00 1C 25 9E 00 20 00 24 00 AE 26
2A030   88 00 62 00 60 00 9B 00 FC 00 24 00 A4 05 24 00
2A040   48 25 32 00 24 00 32 25 88 00 5A 01 B2 26 24 00
2A050   24 00 A8 05 30 00 6A 0A C6 00 9E 00 FC 00 24 00
2A060   B2 26 48 25 B4 00 2E 00 21 00 BA 26 28 00 BA 26
2A070   24 00 B2 26 AE 25 BA 00 24 00 62 00 40 00 9E 00
2A080   54 00 01 00 21 01 F1 00 FC 00 24 00 B2 26 48 25
2A090   AC 00 2E 00 0D 00 BA 26 28 00 BA 26 DE 25 9E 00
2A0A0   FC 00 24 00 B2 26 C0 26 AC 00 2E 00 0D 00 BA 26
2A0B0   28 00 BA 26 C4 26 9E 00 FC 00 24 00 B2 26 38 26
2A0C0   AC 00 2E 00 0D 00 BA 26 28 00 BA 26 CA 26 9E 00
2A0D0   FC 00 5E 00 FC 00 F4 00 03 00 24 00 E2 06 24 00
2A0E0   60 05 38 00 88 00 D2 00 6C 03 FC 00 68 07 24 00
2A0F0   60 05 38 00 BA 26 9E 00 FC 00 02 00 24 00 24 00
2A100   00 00 24 00 1C 25 60 05 B8 09 C2 00 BA 00 88 00
2A110   D2 00 24 00 E2 06 24 00 60 05 38 00 88 00 D2 00
2A120   F4 00 01 00 FE 02 FC 00 24 00 24 00 A8 05 30 00
2A130   6A 0A C6 00 82 00 02 00 FC 00 5E 00 7A 00 FC 00
2A140   00 00 24 00 54 25 60 05 B8 09 C2 00 BA 00 88 00
2A150   D2 00 24 00 E2 06 24 00 60 05 38 00 88 00 D2 00
2A160   F4 00 01 00 FE 02 FC 00 24 00 74 05 2E 00 0F 00
2A170   D0 26 94 00 24 00 60 05 94 00 7A 00 FC 00 02 00
2A180   00 00 24 00 DC 06 24 00 60 05 38 00 B8 09 BA 00
2A190   88 00 D2 00 24 00 E2 06 24 00 60 05 38 00 88 00
2A1A0   D2 00 F4 00 01 00 FE 02 FC 00 24 00 D6 06 24 00
2A1B0   60 05 38 00 60 25 AC 00 2E 00 2B 00 24 00 64 25
2A1C0   80 00 D2 00 24 00 F2 06 24 00 60 05 38 00 88 00
2A1D0   D2 00 F4 00 01 00 FE 02 66 28 24 00 EC 25 9E 00
2A1E0   2A 00 0B 00 66 28 24 00 1C 25 9E 00 FC 00 24 00
2A1F0   24 00 A8 05 30 00 66 28 C6 00 82 00 02 00 24 00
2A200   00 00 F2 00 03 00 2C 29 66 2A 94 00 7A 00 FC 00
2A210   9E 2A 94 00 7A 00 FC 00 24 00 28 00 6A 00 1C 25
2A220   CE 00 D0 00 68 26 AE 00 2E 00 05 00 02 00 FC 00
2A230   F2 00 03 00 2C 29 CA 2A 94 00 7A 00 FC 00 F4 00
2A240   01 00 F2 00 07 00 E2 2A FC 00 5C 2A 9C 00 56 2A
2A250   9C 00 FC 00 F2 2A F4 00 03 00 F4 00 03 00 24 00
2A260   1C 25 88 00 F4 00 03 00 F4 00 03 00 24 00 FC 2A
2A270   8E 00 EA 2A FC 00 62 2A 24 00 1C 25 9E 00 20 00
2A280   24 00 D8 05 98 00 62 00 60 00 1D 00 FC 00 F4 00
2A290   03 00 F4 00 03 00 24 00 1C 25 88 00 24 00 62 2A
2A2A0   8E 00 5C 2A CA 29 FC 00 5E 00 FC 00 00 2B F4 00
2A2B0   03 00 F4 00 03 00 24 00 32 25 88 00 F4 00 03 00
```

```
2A2C0  F4 00 03 00 24 00 0E 2B 8E 00 EA 2A FC 00 62 2A
2A2D0  24 00 1C 25 9E 00 20 00 24 00 D8 05 48 25 BE 00
2A2E0  88 00 62 00 60 00 1D 00 FC 00 F4 00 03 00 F4 00
2A2F0  03 00 24 00 32 25 88 00 24 00 62 2A 8E 00 56 2A
2A300  CA 29 FC 00 5E 00 FC 00 F4 00 01 00 C8 01 FC 00
2A310  02 00 60 05 38 00 9E 00 7A 09 72 09 24 00 BC 45
2A320  00 00 16 00 19 00 22 2B 94 00 7A 00 32 2A 24 00
2A330  32 2A 32 25 BC 00 9E 00 02 00 F8 00 FC 00 24 00
2A340  32 2A B8 09 AC 00 58 00 B5 00 FC 00 24 00 22 00
2A350  26 00 9C 05 88 00 3C 01 24 26 AE 00 22 00 26 00
2A360  9C 05 88 00 3C 01 24 2A AE 00 C6 00 56 08 58 0A
2A370  AE 00 C6 00 58 00 2B 00 FC 00 3C 2B 94 00 24 00
2A380  22 00 26 00 9C 05 88 00 3C 01 94 00 7A 00 32 2A
2A390  24 00 32 2A 32 25 BC 00 9E 00 24 00 32 25 02 00
2A3A0  FC 00 5A 00 FC 00 24 00 A4 27 8A 00 CA 00 FC 00
2A3B0  9C 05 56 2A 8A 08 0E 29 FC 00 26 00 56 2A 8A 08
2A3C0  9C 05 AC 00 84 00 2E 00 15 00 36 2A 24 00 B4 09
2A3D0  9E 00 24 00 32 25 02 00 2A 00 0B 00 36 2A 24 00
2A3E0  1C 25 9E 00 FC 00 3E 04 24 00 56 08 58 0A AC 00
2A3F0  2E 00 0B 00 36 2A 24 00 B4 09 9E 00 FC 00 5A 00
2A400  FC 00 24 00 32 2A B2 25 AC 00 2E 00 0D 00 56 2A
2A410  92 08 26 00 9C 05 9E 00 FC 00 24 00 32 2A 4C 25
2A420  AC 00 2E 00 0D 00 56 2A 9A 08 26 00 9C 05 9E 00
2A430  FC 00 24 00 32 2A 48 25 AC 00 2E 00 0D 00 56 2A
2A440  A2 08 26 00 9C 05 9E 00 FC 00 24 00 32 2A 38 26
2A450  AC 00 2E 00 0B 00 56 2A AA 08 56 08 9E 00 FC 00
2A460  24 00 32 2A 58 25 AC 00 58 00 B9 00 FC 00 24 00
2A470  22 00 26 00 9C 05 88 00 3C 01 24 26 AE 00 22 00
2A480  26 00 9C 05 88 00 3C 01 24 2A AE 00 C6 00 56 08
2A490  58 0A AE 00 C6 00 58 00 2B 00 FC 00 3C 2B 94 00
2A4A0  24 00 22 00 26 00 9C 05 88 00 3C 01 94 00 7A 00
2A4B0  32 2A 24 00 32 2A 32 25 BC 00 9E 00 24 00 32 25
2A4C0  02 00 FC 00 5A 00 FC 00 56 08 56 2A B2 08 0E 29
2A4D0  FC 00 24 00 56 2A B2 08 56 08 AC 00 2E 00 15 00
2A4E0  3A 2A 24 00 B4 09 9E 00 24 00 32 25 02 00 2A 00
2A4F0  0B 00 3A 2A 24 00 1C 25 9E 00 FC 00 9C 05 26 00
2A500  28 00 56 08 8E 00 9E 00 FC 00 3E 04 24 00 56 2A
2A510  B2 08 58 0A AC 00 2E 00 0B 00 3A 2A 24 00 B4 09
2A520  9E 00 FC 00 5A 00 FC 00 24 00 A4 27 8A 00 CA 00
2A530  FC 00 24 00 32 2A 50 25 AC 00 2E 00 0B 00 56 2A
2A540  DA 08 56 08 9E 00 FC 00 24 00 32 2A 3C 26 AC 00
2A550  2E 00 0B 00 56 2A C2 08 56 08 9E 00 FC 00 24 00
2A560  32 2A 52 27 AC 00 2E 00 0D 00 56 2A CA 08 26 00
2A570  9C 05 9E 00 FC 00 24 00 32 2A A4 27 AC 00 2E 00
2A580  0D 00 56 2A D2 08 26 00 9C 05 9E 00 FC 00 02 00
2A590  10 00 08 00 54 2B 24 00 22 00 26 00 06 00 88 00
2A5A0  AE 02 9E 00 FC 00 24 00 54 2B D8 05 B0 00 2E 00
2A5B0  0B 00 54 2B 24 00 1C 25 9E 00 FC 00 F4 00 03 00
2A5C0  F4 00 03 00 24 00 1C 25 88 00 24 00 54 2B 8E 00
2A5D0  5C 2A 16 26 5C 2A 18 09 58 2B 00 00 FC 00 24 00
2A5E0  58 2B AA 25 AC 00 2E 00 39 00 5C 2A 10 09 24 00
2A5F0  1C 25 9E 00 F4 00 03 00 F4 00 03 00 24 00 1C 25
2A600  88 00 24 00 54 2B 8E 00 5C 2A CA 29 54 2B 24 00
2A610  54 2B 1C 25 BA 00 9E 00 54 00 01 00 15 00 29 00
2A620  FC 00 5C 2A 00 09 24 00 58 2B 38 00 26 00 06 00
2A630  9E 00 FC 00 5C 2A 08 09 24 00 58 2B 38 00 24 00
2A640  24 2A 9E 00 FC 00 58 2B 24 00 58 2B 1C 25 BA 00
2A650  9E 00 FC 00 F4 00 03 00 F4 00 03 00 24 00 1C 25
2A660  88 00 24 00 54 2B 8E 00 5C 2A CA 29 FC 00 02 00
2A670  00 00 4E 00 FC 00 F2 00 03 00 2C 29 FC 00 F4 00
2A680  03 00 86 2B 3A 03 FC 00 24 00 38 26 88 00 24 00
2A690  C2 29 88 00 F2 00 0B 00 F2 00 0F 00 F2 00 13 00
2A6A0  14 25 62 2B 6A 00 1C 25 CE 00 9E 00 FC 00 26 00
2A6B0  28 00 62 2B 8E 00 84 00 54 00 07 00 75 00 D1 07
2A6C0  D7 00 A1 0F A5 01 71 17 79 02 41 1F FC 00 32 2A
```

| | | | | | | | | | | | | | | | | |
|---|---|---|---|---|---|---|---|---|---|---|---|---|---|---|---|---|
| 2A6D0 | 9C | 00 | 9C | 05 | 9C | 00 | 70 | 05 | 9C | 00 | 2E | 2A | 24 | 00 | 10 | 25 |
| 2A6E0 | 9E | 00 | 02 | 00 | FC | 00 | D8 | 07 | 28 | 00 | 84 | 09 | 24 | 00 | 10 | 25 |
| 2A6F0 | 24 | 00 | 8E | 2B | D6 | 00 | 9E | 00 | FC | 00 | F2 | 00 | 03 | 00 | 2C | 29 |
| 2A700 | F4 | 00 | 03 | 00 | 92 | 2B | 3A | 03 | FC | 00 | F0 | 07 | 24 | 00 | 1C | 25 |
| 2A710 | 24 | 00 | 62 | 00 | 40 | 00 | 9E | 00 | F4 | 00 | 09 | 00 | F2 | 00 | 05 | 00 |
| 2A720 | 3A | 03 | FC | 00 | 84 | 09 | 24 | 00 | 10 | 25 | 24 | 00 | 8E | 2B | D6 | 00 |
| 2A730 | 28 | 00 | D8 | 07 | 24 | 00 | 8E | 2B | D4 | 00 | 9E | 00 | FC | 00 | 54 | 00 |
| 2A740 | 01 | 00 | 05 | 00 | 3D | 00 | FC | 00 | 24 | 00 | 58 | 25 | 88 | 00 | 24 | 00 |
| 2A750 | 6C | 25 | 88 | 00 | F2 | 00 | 0B | 00 | F2 | 00 | 0F | 00 | F2 | 00 | 13 | 00 |
| 2A760 | 14 | 25 | 4A | 00 | 9A | 2B | 94 | 00 | 72 | 00 | 5E | 2B | 74 | 00 | FC | 00 |
| 2A770 | 24 | 00 | 5E | 2B | 1C | 25 | B4 | 00 | 5E | 2B | 52 | 27 | B0 | 00 | C8 | 00 |
| 2A780 | 2E | 00 | 0B | 00 | 54 | 00 | 01 | 00 | D7 | 00 | B5 | 0F | FC | 00 | D8 | 07 |
| 2A790 | 28 | 00 | 84 | 09 | 24 | 00 | 5E | 2B | B8 | 2B | BE | 00 | 24 | 00 | BC | 2B |
| 2A7A0 | D6 | 00 | 9E | 00 | D8 | 07 | 24 | 00 | 1C | 25 | 24 | 00 | 32 | 25 | D6 | 00 |
| 2A7B0 | 28 | 00 | 24 | 00 | 5E | 2B | 90 | 00 | 24 | 00 | 32 | 25 | D8 | 00 | 9E | 00 |
| 2A7C0 | FC | 00 | F2 | 00 | 03 | 00 | 2C | 29 | F4 | 00 | 03 | 00 | C0 | 2B | 3A | 03 |
| 2A7D0 | F0 | 07 | 24 | 00 | B8 | 09 | 24 | 00 | 62 | 00 | 40 | 00 | 9E | 00 | F4 | 00 |
| 2A7E0 | 09 | 00 | F2 | 00 | 05 | 00 | 3A | 03 | FC | 00 | 48 | 04 | FC | 00 | 84 | 09 |
| 2A7F0 | 24 | 00 | 5E | 2B | B8 | 2B | BE | 00 | 24 | 00 | BC | 2B | D6 | 00 | 28 | 00 |
| 2A800 | D8 | 07 | 24 | 00 | BC | 2B | D4 | 00 | 9E | 00 | FC | 00 | 54 | 00 | 01 | 00 |
| 2A810 | 05 | 00 | 3D | 00 | FC | 00 | 24 | 00 | 58 | 25 | 88 | 00 | 24 | 00 | 6C | 25 |
| 2A820 | 88 | 00 | F2 | 00 | 0B | 00 | F2 | 00 | 0F | 00 | F2 | 00 | 13 | 00 | 14 | 25 |
| 2A830 | 4A | 00 | 9A | 2B | 94 | 00 | 72 | 00 | 5E | 2B | 74 | 00 | FC | 00 | 24 | 00 |
| 2A840 | 5E | 2B | 1C | 25 | B4 | 00 | 5E | 2B | 52 | 27 | B0 | 00 | C8 | 00 | 2E | 00 |
| 2A850 | 0B | 00 | 54 | 00 | 01 | 00 | D7 | 00 | B5 | 0F | FC | 00 | D8 | 07 | 28 | 00 |
| 2A860 | 84 | 09 | 24 | 00 | 5E | 2B | B8 | 2B | BE | 00 | BC | 2B | BA | 00 | 24 | 00 |
| 2A870 | 1C | 27 | D6 | 00 | 9E | 00 | FC | 00 | D8 | 07 | 24 | 00 | 1C | 25 | 24 | 00 |
| 2A880 | 32 | 25 | D6 | 00 | 28 | 00 | 24 | 00 | 5E | 2B | 90 | 00 | 24 | 00 | 32 | 25 |
| 2A890 | D8 | 00 | 9E | 00 | FC | 00 | F2 | 00 | 03 | 00 | 2C | 29 | F4 | 00 | 03 | 00 |
| 2A8A0 | C8 | 2B | 3A | 03 | F0 | 07 | 24 | 00 | 1C | 25 | 24 | 00 | 62 | 00 | 40 | 00 |
| 2A8B0 | 9E | 00 | F4 | 00 | 09 | 00 | F2 | 00 | 05 | 00 | 3A | 03 | FC | 00 | 84 | 09 |
| 2A8C0 | 24 | 00 | 5E | 2B | B8 | 2B | BE | 00 | BC | 2B | BA | 00 | 24 | 00 | 1C | 27 |
| 2A8D0 | D6 | 00 | 28 | 00 | D8 | 07 | 24 | 00 | 1C | 27 | D4 | 00 | 9E | 00 | FC | 0C |
| 2A8E0 | 54 | 00 | 01 | 00 | 05 | 00 | 3D | 00 | FC | 00 | F2 | 00 | 03 | 00 | 2C | 29 |
| 2A8F0 | FC | 00 | D8 | 07 | 28 | 00 | 84 | 09 | 24 | 00 | D0 | 2B | 24 | 00 | D4 | 2B |
| 2A900 | D6 | 00 | 9E | 00 | FC | 00 | F4 | 00 | 03 | 00 | D8 | 2B | 3A | 03 | F0 | 07 |
| 2A910 | 24 | 00 | 1C | 25 | 24 | 00 | 62 | 00 | 40 | 00 | 9E | 00 | F4 | 00 | 09 | 00 |
| 2A920 | F2 | 00 | 05 | 00 | 3A | 03 | FC | 00 | 84 | 09 | 24 | 00 | D0 | 2B | 24 | 00 |
| 2A930 | D4 | 2B | D6 | 00 | 28 | 00 | D8 | 07 | 24 | 00 | D4 | 2B | D4 | 00 | 9E | 00 |
| 2A940 | FC | 00 | 54 | 00 | 01 | 00 | 05 | 00 | 3D | 00 | FC | 00 | 02 | 00 | 24 | 00 |
| 2A950 | 00 | 00 | F2 | 00 | 03 | 00 | 2C | 29 | E0 | 2B | 9C | 00 | E8 | 2B | 9C | 00 |
| 2A960 | E4 | 2B | 24 | 00 | B8 | 09 | 9E | 00 | FC | 00 | F4 | 00 | 03 | 00 | EC | 2B |
| 2A970 | 3A | 03 | FC | 00 | E0 | 2B | 24 | 00 | B4 | 09 | 9E | 00 | 20 | 00 | 24 | 00 |
| 2A980 | F6 | 2B | 88 | 00 | 24 | 00 | 3C | 26 | 88 | 00 | 60 | 00 | 7F | 00 | FC | 00 |
| 2A990 | E8 | 2B | 24 | 00 | B4 | 09 | 9E | 00 | 20 | 00 | 24 | 00 | A0 | 27 | 88 | 00 |
| 2A9A0 | 62 | 00 | 60 | 00 | 37 | 00 | FC | 00 | 24 | 00 | 26 | 07 | 24 | 00 | E0 | 2B |
| 2A9B0 | E8 | 2B | BA | 00 | 38 | 00 | B4 | 09 | AC | 00 | 2E | 00 | 0B | 00 | 54 | 00 |
| 2A9C0 | 01 | 00 | AB | 00 | 8D | 00 | FC | 00 | F4 | 00 | 03 | 00 | 24 | 00 | E8 | 2B |
| 2A9D0 | 88 | 00 | 24 | 00 | E4 | 2B | 88 | 00 | F2 | 00 | 0D | 00 | F2 | 00 | 11 | 00 |
| 2A9E0 | F2 | 00 | 15 | 00 | FA | 2B | FC | 00 | 24 | 00 | 26 | 07 | 24 | 00 | E0 | 2B |
| 2A9F0 | E8 | 2B | BA | 00 | 38 | 00 | 94 | 00 | 7A | 00 | FC | 00 | 5E | 00 | E4 | 2B |
| 2AA00 | 24 | 00 | E4 | 2B | 48 | 25 | BA | 00 | 9E | 00 | FC | 00 | 5E | 00 | FC | 00 |
| 2AA10 | F4 | 00 | 03 | 00 | 24 | 00 | 3C | 26 | 88 | 00 | 24 | 00 | 02 | 2A | 88 | 00 |
| 2AA20 | F2 | 00 | 0D | 00 | F2 | 00 | 11 | 00 | F2 | 00 | 15 | 00 | FA | 2B | FC | 00 |
| 2AA30 | 24 | 00 | 28 | 00 | 6A | 00 | 1C | 25 | CE | 00 | C0 | 00 | AC | 29 | AC | 00 |
| 2AA40 | 2E | 00 | 07 | 00 | 26 | 07 | 9C | 00 | FC | 00 | 02 | 00 | AE | 00 | 22 | 00 |
| 2AA50 | 00 | 00 | 9C | 00 | FC | 00 | 58 | 00 | EF | 00 | FC | 00 | 1A | 2B | 24 | 00 |
| 2AA60 | 22 | 00 | 26 | 00 | 9C | 05 | 88 | 00 | AE | 02 | 9E | 00 | FC | 00 | 24 | 00 |
| 2AA70 | 1A | 2B | D8 | 05 | B0 | 00 | 2E | 00 | 0B | 00 | 1A | 2B | 24 | 00 | 1C | 25 |
| 2AA80 | 9E | 00 | FC | 00 | F4 | 00 | 03 | 00 | F4 | 00 | 03 | 00 | 24 | 00 | 1C | 25 |
| 2AA90 | 88 | 00 | 24 | 00 | 1A | 2B | 8E | 00 | 5C | 2A | 16 | 26 | FC | 00 | 24 | 00 |
| 2AAA0 | 5C | 2A | 18 | 09 | B4 | 09 | AC | 00 | 2E | 00 | 09 | 00 | 24 | 00 | 32 | 25 |
| 2AAB0 | 02 | 00 | FC | 00 | 12 | 2B | 24 | 00 | B4 | 09 | 9E | 00 | 20 | 00 | 24 | 00 |
| 2AAC0 | 5C | 2A | 18 | 09 | 1C | 25 | BC | 00 | 88 | 00 | 62 | 00 | 60 | 00 | 41 | 00 |
| 2AAD0 | FC | 00 | 26 | 00 | 5C | 2A | 00 | 09 | 24 | 00 | 12 | 2B | 38 | 00 | 9C | 05 |

```
2AAE0   AC 00 24 2A 5C 2A 08 09 24 00 12 2B 38 00 AC 00
2AAF0   C6 00 84 00 2E 00 19 00 1E 2B 24 00 24 2A 9E 00
2AB00   16 2B 24 00 12 2B 9E 00 24 00 32 25 02 00 FC 00
2AB10   5E 00 FC 00 24 00 5C 2A 10 09 B4 09 AC 00 2E 00
2AB20   11 00 1E 2B 24 00 B4 09 9E 00 24 00 32 25 02 00
2AB30   FC 00 1A 2B 24 00 1A 2B 1C 25 BA 00 9E 00 54 00
2AB40   01 00 1D 00 51 00 FC 00 5A 00 FC 00 58 00 A3 00
2AB50   FC 00 12 2B 24 00 16 2B 9E 00 20 00 24 00 5C 2A
2AB60   18 09 1C 25 BC 00 88 00 62 00 60 00 6F 00 FC 00
2AB70   24 00 12 2B 52 27 AC 00 2E 00 25 00 5C 2A 00 09
2AB80   24 00 52 27 38 00 24 00 B4 09 9E 00 5C 2A 08 09
2AB90   24 00 52 27 38 00 24 00 B4 09 9E 00 02 00 FC 00
2ABA0   5C 2A 00 09 24 00 12 2B 38 00 26 00 5C 2A 00 09
2ABB0   24 00 12 2B 1C 25 BA 00 38 00 9E 00 FC 00 5C 2A
2ABC0   08 09 24 00 12 2B 38 00 24 00 5C 2A 08 09 24 00
2ABD0   12 2B 1C 25 BA 00 38 00 9E 00 FC 00 5E 00 FC 00
2ABE0   5C 2A 18 09 24 00 5C 2A 18 09 1C 25 BC 00 9E 00
2ABF0   FC 00 5A 00 FC 00 F4 00 03 00 F4 00 03 00 24 00
2AC00   1C 25 88 00 24 00 1A 2B 8E 00 5C 2A CA 29 FC 00
2AC10   02 00 9E 00 FC 00 58 2B 24 00 58 2B 1C 25 BA 00
2AC20   00 00 3C 07 9C 00 FC 00 D8 07 24 00 4C 25 24 00
2AC30   72 2B D6 00 68 2B 00 00 FC 00 6E 2B 24 00 1C 25
2AC40   9E 00 20 00 24 00 72 2B 38 00 24 00 10 25 88 00
2AC50   60 00 33 00 FC 00 16 00 0B 00 54 00 01 00 65 00
2AC60   51 00 FC 00 3C 07 26 00 28 00 28 00 68 2B 24 00
2AC70   6E 2B 24 00 10 25 D6 00 8E 00 84 00 38 00 24 00
2AC80   1C 25 9E 00 FC 00 5E 00 FC 00 68 2B 9C 00 FC 00
2AC90   6E 2B 24 00 76 2B 9E 00 20 00 24 00 7A 2B 88 00
2ACA0   62 00 60 00 23 00 FC 00 24 00 3C 07 24 00 6E 2B
2ACB0   38 00 2E 00 13 00 68 2B 7E 2B 6C 00 24 00 6E 2B
2ACC0   94 00 1E 00 1E 00 FC 00 5E 00 FC 00 02 00 2C 29
2ACD0   00 00 F4 00 03 00 F0 30 FC 00 24 00 B8 07 88 00
2ACE0   58 00 41 00 52 00 F4 00 07 00 24 00 FE 06 24 00
2ACF0   60 05 38 00 88 00 D2 00 24 00 54 25 88 00 D2 00
2AD00   0A 01 24 00 86 27 88 00 5A 01 F4 00 09 00 24 00
2AD10   60 05 88 00 D2 00 F2 00 07 00 0A 01 24 00 86 27
2AD20   88 00 5A 01 5C 00 FC 00 F4 00 05 00 F0 30 FC 00
2AD30   02 00 4A 00 9A 2B 94 00 72 00 5E 2B 74 00 FC 00
2AD40   00 00 24 00 22 00 24 00 C0 26 88 00 D2 00 F2 00
2AD50   05 00 32 01 B4 09 AC 00 2E 00 05 00 02 00 FC 00
2AD60   F4 00 03 00 F4 00 03 00 24 00 32 25 88 00 24 00
2AD70   EC 05 24 00 60 05 38 00 8E 00 26 09 16 26 FC 00
2AD80   26 09 A2 08 24 00 60 05 9E 00 FC 00 F4 00 03 00
2AD90   F4 00 03 00 24 00 32 25 88 00 24 00 EC 05 24 00
2ADA0   60 05 38 00 8E 00 26 09 CA 29 FC 00 24 00 74 05
2ADB0   2E 00 0F 00 44 32 94 00 24 00 60 05 94 00 7A 00
2ADC0   FC 00 02 00 B8 2B BE 00 24 00 BC 2B D6 00 28 00
2ADD0   00 00 24 00 38 26 88 00 D2 00 24 00 22 00 24 00
2ADE0   60 05 88 00 D2 00 4A 02 88 00 D2 00 12 03 24 00
2ADF0   50 25 88 00 D2 00 24 00 22 00 24 00 60 05 88 00
2AE00   D2 00 4A 02 88 00 D2 00 F4 00 03 00 FE 02 62 32
2AE10   24 00 24 00 A8 05 30 00 6A 0A C6 00 9E 00 FC 00
2AE20   68 07 24 00 60 05 38 00 9C 00 FC 00 66 32 24 00
2AE30   1C 25 9E 00 20 00 24 00 62 32 88 00 62 00 60 00
2AE40   69 00 FC 00 24 00 A4 05 24 00 50 25 32 00 6A 32
2AE50   24 00 24 00 A8 05 30 00 6A 0A C6 00 9E 00 FC 00
2AE60   24 00 6A 32 60 25 AC 00 2E 00 17 00 68 07 24 00
2AE70   60 05 38 00 6E 32 9E 00 54 00 01 00 D9 00 8D 00
2AE80   FC 00 68 07 24 00 60 05 38 00 28 00 68 07 24 00
2AE90   60 05 38 00 24 00 AE 25 6A 32 48 25 C2 00 BA 00
2AEA0   24 00 62 00 40 00 9E 00 FC 00 5E 00 F4 00 03 00
2AEB0   24 00 22 00 24 00 60 05 88 00 D2 00 4A 02 88 00
2AEC0   D2 00 6C 03 24 00 74 05 2E 00 13 00 74 32 94 00
2AED0   68 07 24 00 60 05 38 00 94 00 7A 00 FC 00 02 00
2AEE0   00 00 24 00 60 05 58 09 C2 00 88 00 D2 00 24 00
```

| | | | | | | | | | | | | | | | | |
|---|---|---|---|---|---|---|---|---|---|---|---|---|---|---|---|---|
| 2AEF0 | E2 | 06 | 24 | 00 | 60 | 05 | 38 | 00 | 88 | 00 | D2 | 00 | F4 | 00 | 01 | 00 |
| 2AF00 | FE | 02 | FC | 00 | 24 | 00 | 74 | 05 | 2E | 00 | 0F | 00 | 9C | 26 | 94 | 00 |
| 2AF10 | 24 | 00 | 60 | 05 | 94 | 00 | 7A | 00 | FC | 00 | 02 | 00 | 02 | 00 | C6 | 9B |
| 2AF20 | 00 | 00 | DD | 33 | 00 | 00 | F2 | 33 | 68 | 07 | 24 | 00 | 60 | 05 | 38 | 00 |
| 2AF30 | 9E | 00 | FC | 00 | 24 | 00 | D6 | 33 | B4 | 09 | AC | 00 | 2E | 00 | 07 | 00 |
| 2AF40 | F2 | 33 | 9C | 00 | FC | 00 | 24 | 00 | 38 | 26 | 60 | 05 | B8 | 09 | C2 | 00 |
| 2AF50 | BA | 00 | 88 | 00 | D2 | 00 | 24 | 00 | E2 | 06 | 24 | 00 | 60 | 05 | 38 | 00 |
| 2AF60 | 88 | 00 | D2 | 00 | F4 | 00 | 01 | 00 | FE | 02 | 24 | 00 | 50 | 25 | 88 | 00 |
| 2AF70 | D2 | 00 | 24 | 00 | E2 | 06 | 24 | 00 | 60 | 05 | 38 | 00 | 88 | 00 | D2 | 00 |
| 2AF80 | F4 | 00 | 03 | 00 | FE | 02 | FC | 00 | E6 | 33 | 24 | 00 | 24 | 00 | A8 | 05 |
| 2AF90 | 30 | 00 | 6A | 0A | C6 | 00 | 9E | 00 | 24 | 00 | E6 | 33 | B4 | 09 | AC | 00 |
| 2AFA0 | 2E | 00 | 05 | 00 | E6 | 33 | 24 | 00 | 50 | 25 | 9E | 00 | FC | 00 | EE | 33 |
| 2AFB0 | 24 | 00 | 1C | 25 | 9E | 00 | 20 | 00 | 24 | 00 | E6 | 33 | 88 | 00 | 62 | 00 |
| 2AFC0 | 60 | 00 | 93 | 00 | FC | 00 | 24 | 00 | A4 | 05 | 24 | 00 | 50 | 25 | 32 | 00 |
| 2AFD0 | EA | 33 | 24 | 00 | 24 | 00 | A8 | 05 | 30 | 00 | 6A | 0A | C6 | 00 | 9E | 00 |
| 2AFE0 | FC | 00 | 24 | 00 | EA | 33 | 48 | 25 | B4 | 00 | 2E | 00 | 21 | 00 | F2 | 33 |
| 2AFF0 | 28 | 00 | F2 | 33 | 24 | 00 | EA | 33 | AE | 25 | BA | 00 | 24 | 00 | 62 | 00 |
| 2B000 | 40 | 00 | 9E | 00 | 54 | 00 | 01 | 00 | 35 | 01 | F1 | 00 | FC | 00 | 24 | 00 |
| 2B010 | EA | 33 | 48 | 25 | AC | 00 | 2E | 00 | 0D | 00 | F2 | 33 | 28 | 00 | F2 | 33 |
| 2B020 | DE | 25 | 9E | 00 | FC | 00 | 24 | 00 | EA | 33 | C0 | 26 | AC | 00 | 2E | 00 |
| 2B030 | 0D | 00 | F2 | 33 | 28 | 00 | F2 | 33 | C4 | 26 | 9E | 00 | FC | 00 | 24 | 00 |
| 2B040 | EA | 33 | 38 | 26 | AC | 00 | 2E | 00 | 0D | 00 | F2 | 33 | 28 | 00 | F2 | 33 |
| 2B050 | CA | 26 | 9E | 00 | FC | 00 | 5E | 00 | FC | 00 | F4 | 00 | 03 | 00 | 24 | 00 |
| 2B060 | E2 | 06 | 24 | 00 | 60 | 05 | 38 | 00 | 88 | 00 | D2 | 00 | 6C | 03 | FC | 00 |
| 2B070 | 68 | 07 | 24 | 00 | 60 | 05 | 38 | 00 | F2 | 33 | 9E | 00 | FC | 00 | 02 | 00 |
| 2B080 | 00 | 00 | 24 | 00 | 54 | 25 | 60 | 05 | B8 | 09 | C2 | 00 | BA | 00 | 88 | 00 |
| 2B090 | D2 | 00 | 24 | 00 | E2 | 06 | 24 | 00 | 60 | 05 | 38 | 00 | 88 | 00 | D2 | 00 |
| 2B0A0 | F4 | 00 | 01 | 00 | FE | 02 | 24 | 00 | 50 | 25 | 88 | 00 | D2 | 00 | 24 | 00 |
| 2B0B0 | E2 | 06 | 24 | 00 | 60 | 05 | 38 | 00 | 88 | 00 | D2 | 00 | F4 | 00 | 01 | 00 |
| 2B0C0 | FE | 02 | FC | 00 | 24 | 00 | 24 | 00 | A8 | 05 | 30 | 00 | 6A | 0A | C6 | 00 |
| 2B0D0 | 82 | 00 | 02 | 00 | 12 | 2B | 9E | 00 | 24 | 00 | 32 | 25 | 02 | 00 | FC | 00 |
| 2B0E0 | 00 | 00 | 24 | 00 | 10 | 25 | 60 | 05 | B8 | 09 | C2 | 00 | BA | 00 | 88 | 00 |
| 2B0F0 | D2 | 00 | 24 | 00 | E2 | 06 | 24 | 00 | 60 | 05 | 38 | 00 | 88 | 00 | D2 | 00 |
| 2B100 | F4 | 00 | 01 | 00 | FE | 02 | FC | 00 | 24 | 00 | 74 | 05 | 2E | 00 | 0F | 00 |
| 2B110 | D0 | 26 | 94 | 00 | 24 | 00 | 60 | 05 | 94 | 00 | 7A | 00 | FC | 00 | 02 | 00 |
| 2B120 | 00 | 00 | 00 | 00 | 24 | 00 | A4 | 05 | 24 | 00 | 06 | 00 | 32 | 00 | FC | 00 |
| 2B130 | 02 | 00 | 1C | 25 | BC | 00 | 88 | 00 | 62 | 00 | 60 | 00 | 6F | 00 | FC | 00 |
| 2B140 | 00 | 00 | 24 | 00 | 50 | 25 | 88 | 00 | D2 | 00 | 24 | 00 | E2 | 06 | 24 | 00 |
| 2B150 | 46 | 38 | 38 | 00 | 1C | 25 | BA | 00 | 88 | 00 | D2 | 00 | F4 | 00 | 01 | 00 |
| 2B160 | FE | 02 | 24 | 00 | 1C | 27 | 88 | 00 | 5A | 01 | 24 | 00 | C4 | 05 | 88 | 00 |
| 2B170 | D2 | 00 | 24 | 00 | E2 | 06 | 24 | 00 | 46 | 38 | 38 | 00 | 88 | 00 | D2 | 00 |
| 2B180 | F4 | 00 | 01 | 00 | FE | 02 | FC | 00 | F2 | 00 | 03 | 00 | 2C | 29 | 24 | 00 |
| 2B190 | A6 | 25 | 88 | 00 | 24 | 00 | 9E | 30 | 88 | 00 | F2 | 00 | 0B | 00 | F2 | 00 |
| 2B1A0 | 0F | 00 | F2 | 00 | 13 | 00 | 14 | 25 | A4 | 38 | 94 | 00 | 7A | 00 | FC | 00 |
| 2B1B0 | 24 | 00 | B2 | 25 | 88 | 00 | 24 | 00 | 36 | 25 | 88 | 00 | F2 | 00 | 0B | 00 |
| 2B1C0 | F2 | 00 | 0F | 00 | F2 | 00 | 13 | 00 | 14 | 25 | B2 | 38 | 94 | 00 | 7A | 00 |
| 2B1D0 | FC | 00 | 24 | 00 | EC | 25 | 88 | 00 | 24 | 00 | 36 | 25 | 88 | 00 | F2 | 00 |
| 2B1E0 | 0B | 00 | F2 | 00 | 0F | 00 | F2 | 00 | 13 | 00 | 14 | 25 | C4 | 38 | 94 | 00 |
| 2B1F0 | 7A | 00 | FC | 00 | 24 | 00 | 4C | 25 | 88 | 00 | 24 | 00 | 36 | 25 | 88 | 00 |
| 2B200 | F2 | 00 | 0B | 00 | F2 | 00 | 0F | 00 | F2 | 00 | 13 | 00 | 14 | 25 | D6 | 38 |
| 2B210 | 94 | 00 | 7A | 00 | FC | 00 | 24 | 00 | 48 | 25 | 88 | 00 | 24 | 00 | 36 | 25 |
| 2B220 | 88 | 00 | F2 | 00 | 0B | 00 | F2 | 00 | 0F | 00 | F2 | 00 | 13 | 00 | 14 | 25 |
| 2B230 | E2 | 38 | 94 | 00 | 7A | 00 | FC | 00 | 24 | 00 | 48 | 25 | 88 | 00 | 24 | 00 |
| 2B240 | 68 | 25 | 88 | 00 | F2 | 00 | 0B | 00 | F2 | 00 | 0F | 00 | F2 | 00 | 13 | 00 |
| 2B250 | 14 | 25 | 24 | 00 | 22 | 00 | DC | 01 | 2E | 00 | 13 | 00 | 4A | 00 | 9C | 27 |
| 2B260 | 94 | 00 | 72 | 00 | 4E | 38 | 78 | 00 | 2A | 00 | 08 | 00 | 54 | 00 | 01 | 00 |
| 2B270 | F7 | 00 | 6F | 00 | FC | 00 | 5A | 38 | 26 | 00 | 28 | 00 | 4E | 38 | 8E | 00 |
| 2B280 | 9E | 00 | 24 | 00 | 5A | 38 | 1C | 25 | B4 | 00 | 5A | 38 | 10 | 25 | B0 | 00 |
| 2B290 | C8 | 00 | 2E | 00 | 2B | 00 | 24 | 00 | 48 | 25 | 88 | 00 | 24 | 00 | 68 | 25 |
| 2B2A0 | 88 | 00 | F2 | 00 | 0B | 00 | F2 | 00 | 0F | 00 | F2 | 00 | 13 | 00 | 14 | 25 |
| 2B2B0 | F2 | 38 | 94 | 00 | 7A | 00 | 54 | 00 | 01 | 00 | D5 | 00 | 65 | 00 | FC | 00 |
| 2B2C0 | 24 | 00 | 5A | 38 | 1C | 25 | AC | 00 | 2E | 00 | 08 | 00 | 54 | 00 | 01 | 00 |
| 2B2D0 | C5 | 01 | BF | 00 | FC | 00 | 24 | 00 | 5A | 38 | 32 | 25 | AC | 00 | 2E | 00 |
| 2B2E0 | 0B | 00 | 54 | 00 | 01 | 00 | 01 | 00 | 13 | 00 | FC | 00 | 24 | 00 | 5A | 38 |
| 2B2F0 | 10 | 25 | AC | 00 | 2E | 00 | 05 | 00 | 02 | 00 | FC | 00 | 54 | 00 | 01 | 00 |

| | | | | | | | | | | | | | | | | |
|---|---|---|---|---|---|---|---|---|---|---|---|---|---|---|---|---|
| 2B300 | 47 | 00 | 29 | 00 | FC | 00 | 5E | 38 | 24 | 00 | 46 | 38 | 9E | 00 | FC | 00 |
| 2B310 | F2 | 00 | 03 | 00 | 2C | 29 | FA | 38 | 94 | 00 | 7A | 00 | FC | 00 | 46 | 38 |
| 2B320 | 24 | 00 | 5E | 38 | 9E | 00 | 20 | 00 | 24 | 00 | 5E | 38 | 10 | 25 | BA | 00 |
| 2B330 | 88 | 00 | 62 | 00 | 60 | 00 | BF | 00 | FC | 00 | 24 | 00 | 22 | 00 | 24 | 00 |
| 2B340 | E2 | 06 | 24 | 00 | 46 | 38 | 38 | 00 | 1C | 25 | BA | 00 | 88 | 00 | D2 | 00 |
| 2B350 | 26 | 03 | 1C | 25 | AC | 00 | 2E | 00 | 23 | 00 | 24 | 00 | 46 | 38 | 88 | 00 |
| 2B360 | D2 | 00 | 00 | 01 | 24 | 00 | 10 | 25 | 83 | 00 | 00 | 25 | F2 | 00 | 03 | 00 |
| 2B370 | 2C | 29 | 24 | 00 | 1C | 25 | 88 | 00 | 00 | 25 | FC | 00 | 24 | 00 | 22 | 00 |
| 2B380 | 24 | 00 | E2 | 06 | 24 | 00 | 46 | 38 | 38 | 00 | 88 | 00 | D2 | 00 | 26 | 03 |
| 2B390 | B4 | 09 | AC | 00 | 2E | 00 | 0B | 00 | 54 | 00 | 01 | 00 | B5 | 02 | 69 | 01 |
| 2B3A0 | FC | 00 | 24 | 00 | 22 | 00 | 4C | 05 | 1C | 25 | AC | 00 | 58 | 00 | 31 | 00 |
| 2B3B0 | FC | 00 | F4 | 00 | 01 | 00 | 38 | 05 | 56 | 05 | FC | 00 | 0E | 39 | 94 | 00 |
| 2B3C0 | 24 | 00 | 46 | 38 | B8 | 09 | C2 | 00 | 1C | 25 | BA | 00 | 94 | 00 | 1A | 39 |
| 2B3D0 | 94 | 00 | 68 | 07 | 24 | 00 | 46 | 38 | 38 | 00 | 94 | 00 | 7A | 00 | FC | 00 |
| 2B3E0 | 5A | 00 | FC | 00 | 24 | 00 | 22 | 00 | 4C | 05 | B8 | 09 | AC | 00 | 2E | 00 |
| 2B3F0 | 05 | 00 | 42 | 05 | FC | 00 | 5E | 00 | FC | 00 | 54 | 38 | 22 | 00 | 1E | 32 |
| 2B400 | 9E | 00 | FC | 00 | 24 | 00 | 54 | 38 | 9C | 27 | AC | 00 | 2E | 00 | 0F | 00 |
| 2B410 | 54 | 00 | 01 | 00 | DD | 01 | C9 | 00 | 2A | 00 | 17 | 00 | 46 | 38 | 24 | 00 |
| 2B420 | 46 | 38 | B8 | 09 | BC | 00 | 9E | 00 | 54 | 00 | 01 | 00 | 47 | 00 | 29 | 00 |
| 2B430 | FC | 00 | 02 | 00 | 60 | 25 | AC | 00 | 2E | 00 | 17 | 00 | 68 | 07 | 24 | 00 |
| 2B440 | 00 | 00 | F2 | 00 | 03 | 00 | 2C | 29 | 34 | 39 | 24 | 00 | 1C | 25 | 9E | 00 |
| 2B450 | 4A | 38 | 24 | 00 | B4 | 09 | 9E | 00 | FC | 00 | F2 | 00 | 03 | 00 | F2 | 00 |
| 2B460 | 07 | 00 | 24 | 00 | B4 | 09 | 88 | 00 | F2 | 00 | 0F | 00 | F2 | 00 | 13 | 00 |
| 2B470 | 14 | 25 | FC | 00 | F4 | 00 | 03 | 00 | 24 | 00 | 10 | 25 | 88 | 00 | 24 | 00 |
| 2B480 | AC | 27 | 88 | 00 | 24 | 00 | B4 | 09 | 83 | 00 | 24 | 00 | AC | 27 | 88 | 00 |
| 2B490 | 24 | 00 | 8E | 2D | 88 | 00 | F4 | 00 | 03 | 00 | F4 | 00 | 03 | 00 | F4 | 00 |
| 2B4A0 | 11 | 00 | F4 | 00 | 01 | 00 | 4C | 39 | FC | 00 | F2 | 00 | 03 | 00 | 2C | 29 |
| 2B4B0 | 28 | 39 | 24 | 00 | B4 | 09 | 9E | 00 | F4 | 00 | 03 | 00 | 28 | 00 | 54 | 39 |
| 2B4C0 | 28 | 00 | 24 | 00 | 34 | 39 | 90 | 00 | 24 | 00 | 1C | 25 | D8 | 00 | 88 | 00 |
| 2B4D0 | 3A | 03 | FC | 00 | 44 | 39 | 24 | 00 | B8 | 09 | 9E | 00 | 30 | 39 | 24 | 00 |
| 2B4E0 | B4 | 09 | 4A | 38 | BA | 00 | 9E | 00 | 20 | 00 | 24 | 00 | 32 | 25 | 4A | 38 |
| 2B4F0 | BA | 00 | 88 | 00 | 24 | 00 | 32 | 25 | 88 | 00 | 60 | 00 | 4F | 00 | FC | 00 |
| 2B500 | 24 | 00 | D6 | 06 | 24 | 00 | 30 | 39 | 38 | 00 | B4 | 09 | AC | 00 | 2E | 00 |
| 2B510 | 0B | 00 | 54 | 00 | 01 | 00 | FF | 00 | 75 | 00 | FC | 00 | 24 | 00 | D6 | 06 |
| 2B520 | 24 | 00 | 30 | 39 | 38 | 00 | 54 | 25 | AC | 00 | 2E | 00 | 09 | 00 | 38 | 39 |
| 2B530 | 5C | 39 | 9E | 00 | FC | 00 | 56 | 00 | 01 | 00 | E5 | 04 | 59 | 02 | FC | 00 |
| 2B540 | 44 | 39 | 24 | 00 | 44 | 39 | B8 | 09 | BA | 00 | 9E | 00 | 5E | 00 | FC | 00 |
| 2B550 | 44 | 39 | 24 | 00 | 38 | 26 | 9E | 00 | 30 | 39 | 24 | 00 | B8 | 09 | 4A | 38 |
| 2B560 | BA | 00 | 9E | 00 | 20 | 00 | 24 | 00 | AA | 36 | 4A | 38 | BA | 00 | 88 | 00 |
| 2B570 | 24 | 00 | B8 | 09 | 88 | 00 | 60 | 00 | 6D | 01 | FC | 00 | 24 | 00 | D6 | 06 |
| 2B580 | 24 | 00 | 30 | 39 | 38 | 00 | B4 | 09 | AC | 00 | 2E | 00 | 0B | 00 | 54 | 00 |
| 2B590 | 01 | 00 | 99 | 02 | 19 | 01 | FC | 00 | 24 | 00 | D6 | 06 | 24 | 00 | 30 | 39 |
| 2B5A0 | 38 | 00 | 1C | 25 | AC | 00 | 2E | 00 | 09 | 00 | 38 | 39 | 6C | 39 | 9E | 00 |
| 2B5B0 | FC | 00 | 24 | 00 | D6 | 06 | 24 | 00 | 30 | 39 | 38 | 00 | 32 | 25 | AC | 00 |
| 2B5C0 | 2E | 00 | 09 | 00 | 38 | 39 | 7E | 39 | 9E | 00 | FC | 00 | 24 | 00 | D6 | 06 |
| 2B5D0 | 24 | 00 | 30 | 39 | 38 | 00 | B8 | 09 | AC | 00 | 2E | 00 | 09 | 00 | 38 | 39 |
| 2B5E0 | 8E | 39 | 9E | 00 | FC | 00 | 24 | 00 | D6 | 06 | 24 | 00 | 30 | 39 | 38 | 00 |
| 2B5F0 | 48 | 25 | AC | 00 | 2E | 00 | 09 | 00 | 38 | 39 | A4 | 38 | 9E | 00 | FC | 00 |
| 2B600 | 24 | 00 | D6 | 06 | 24 | 00 | 30 | 39 | 38 | 00 | 38 | 26 | AC | 00 | 2E | 00 |
| 2B610 | 09 | 00 | 38 | 39 | A0 | 39 | 9E | 00 | FC | 00 | 24 | 00 | D6 | 06 | 24 | 00 |
| 2B620 | 30 | 39 | 38 | 00 | 60 | 25 | AC | 00 | 2E | 00 | 09 | 00 | 38 | 39 | AE | 39 |
| 2B630 | 9E | 00 | FC | 00 | 24 | 00 | D6 | 06 | 24 | 00 | 30 | 39 | 38 | 00 | AA | 25 |
| 2B640 | AC | 00 | 2E | 00 | 09 | 00 | 38 | 39 | BC | 39 | 9E | 00 | FC | 00 | 24 | 00 |
| 2B650 | D6 | 06 | 24 | 00 | 30 | 39 | 38 | 00 | 6C | 25 | AC | 00 | 2E | 00 | 09 | 00 |
| 2B660 | 38 | 39 | CA | 39 | 9E | 00 | FC | 00 | 24 | 00 | D6 | 06 | 24 | 00 | 30 | 39 |
| 2B670 | 38 | 00 | 70 | 25 | AC | 00 | 2E | 00 | 09 | 00 | 38 | 39 | DC | 39 | 9E | 00 |
| 2B680 | FC | 00 | 24 | 00 | D6 | 06 | 24 | 00 | 30 | 39 | 38 | 00 | 68 | 25 | AC | 00 |
| 2B690 | 2E | 00 | 09 | 00 | 38 | 39 | F0 | 39 | 9E | 00 | FC | 00 | 24 | 00 | D6 | 06 |
| 2B6A0 | 24 | 00 | 30 | 39 | 38 | 00 | 58 | 25 | AC | 00 | 2E | 00 | 09 | 00 | 38 | 39 |
| 2B6B0 | 02 | 3A | 9E | 00 | FC | 00 | 24 | 00 | D6 | 06 | 24 | 00 | 30 | 39 | 38 | 00 |
| 2B6C0 | 2A | 28 | AC | 00 | 2E | 00 | 09 | 00 | 38 | 39 | 0E | 3A | 9E | 00 | FC | 00 |
| 2B6D0 | 56 | 00 | 01 | 00 | E5 | 04 | 59 | 02 | FC | 00 | 44 | 39 | 24 | 00 | 44 | 39 |
| 2B6E0 | 32 | 25 | BA | 00 | 9E | 00 | 5E | 00 | FC | 00 | 30 | 39 | 24 | 00 | B8 | 09 |
| 2B6F0 | 9E | 00 | 24 | 00 | 1C | 25 | 88 | 00 | 24 | 00 | 30 | 39 | 88 | 00 | F2 | 00 |
| 2B700 | 0B | 00 | F2 | 00 | 0F | 00 | F2 | 00 | 13 | 00 | 14 | 25 | 24 | 00 | 86 | 27 |

```
2B710   24 00 62 00 40 00 94 00 7A 00 FC 00 3E 39 22 00
2B720   1E 32 9E 00 FC 00 24 00 3E 39 A0 00 32 25 AC 00
2B730   58 00 D9 00 FC 00 24 00 28 00 28 00 3E 39 24 00
2B740   1C 25 D8 00 CA 00 60 2D AC 00 2E 00 43 00 24 00
2B750   1C 25 88 00 24 00 30 39 88 00 F2 00 0B 00 F2 00
2B760   0F 00 F2 00 13 00 14 25 58 0A 94 00 7A 00 30 39
2B770   24 00 30 39 B2 25 BA 00 9E 00 24 00 30 39 50 2E
2B780   B0 00 2E 00 0B 00 30 39 24 00 50 2E 9E 00 FC 00
2B790   24 00 28 00 28 00 3E 39 24 00 1C 25 D8 00 CA 00
2B7A0   C6 29 AC 00 2E 00 3B 00 24 00 1C 25 88 00 24 00
2B7B0   30 39 88 00 F2 00 0B 00 F2 00 0F 00 F2 00 13 00
2B7C0   14 25 58 0A 94 00 7A 00 24 00 30 39 B8 09 AE 00
2B7D0   2E 00 0F 00 30 39 24 00 30 39 B2 25 BC 00 9E 00
2B7E0   FC 00 24 00 1C 25 88 00 24 00 30 39 88 00 F2 00
2B7F0   0B 00 F2 00 0F 00 F2 00 13 00 14 25 24 00 86 27
2B800   24 00 62 00 40 00 94 00 7A 00 FC 00 5A 00 FC 00
2B810   24 00 3E 39 C4 26 AC 00 2E 00 13 00 F2 00 03 00
2B820   2C 29 74 05 24 00 32 25 9E 00 02 00 FC 00 24 00
2B830   3E 39 58 0A AC 00 2E 00 2B 00 24 00 22 00 24 00
2B840   B8 09 88 00 24 00 30 39 88 00 F2 00 07 00 20 3A
2B850   54 26 AE 00 2E 00 0D 00 42 38 24 00 30 39 9E 00
2B860   02 00 FC 00 24 00 3E 39 B8 29 AC 00 3E 39 28 3A
2B870   AC 00 C8 00 58 00 45 00 FC 00 4A 38 24 00 4A 38
2B880   AE 25 BA 00 9E 00 FC 00 24 00 4A 38 44 2E B0 00
2B890   2E 00 13 00 4A 38 24 00 44 2E 9E 00 54 00 01 00
2B8A0   7B 04 D7 01 FC 00 34 39 24 00 34 39 1C 25 BA 00
2B8B0   9E 00 28 39 24 00 1C 25 9E 00 FC 00 5A 00 FC 00
2B8C0   24 00 3E 39 2E 3A AC 00 3E 39 82 31 AC 00 C8 00
2B8D0   56 00 31 00 FC 00 24 00 4A 38 B4 09 AE 00 2E 00
2B8E0   23 00 4A 38 24 00 4A 38 AE 25 BC 00 9E 00 34 39
2B8F0   24 00 34 39 1C 25 BC 00 9E 00 28 39 24 00 1C 25
2B900   9E 00 FC 00 5A 00 FC 00 24 00 28 39 2E 00 0F 00
2B910   54 00 01 00 69 00 15 00 2A 00 0B 00 54 00 01 00
2B920   DB 02 95 01 FC 00 48 39 24 00 38 39 A0 00 10 25
2B930   BA 00 9E 00 FC 00 2C 39 24 00 B8 09 9E 00 20 00
2B940   24 00 48 39 88 00 62 00 60 00 3D 00 FC 00 24 00
2B950   2C 39 88 00 24 00 30 39 4A 38 BC 00 44 39 BA 00
2B960   88 00 F2 00 08 00 F2 00 0F 00 F2 00 13 00 14 25
2B970   FC 00 28 00 38 39 24 00 2C 39 10 25 BC 00 24 00
2B980   1C 25 D6 00 94 00 FC 00 5E 00 FC 00 46 00 FC 00
2B990   02 00 46 38 B6 09 C2 00 1C 25 BA 00 94 00 1A 39
2B9A0   00 00 F2 00 03 00 2C 29 FC 00 F4 00 03 00 48 3A
2B9B0   3A 03 FC 00 24 00 38 26 88 00 24 00 14 27 82 00
2B9C0   F2 00 08 00 F2 00 0F 00 F2 00 13 00 14 25 24 00
2B9D0   22 00 DC 01 2E 00 13 00 4A 00 9C 27 94 00 72 00
2B9E0   3C 3A 78 00 2A 00 0B 00 54 00 01 00 13 00 F1 00
2B9F0   FC 00 34 3A 26 00 28 00 3C 3A 8E 00 9E 00 24 00
2BA00   34 3A 1C 25 B4 00 34 3A 5C 25 B0 00 C8 00 2E 00
2BA10   05 00 02 00 FC 00 24 00 34 3A 56 00 11 00 AD 00
2BA20   91 01 E5 01 59 02 E5 01 59 02 E5 01 59 02 E5 01
2BA30   59 02 E5 01 59 02 E5 01 59 02 07 02 41 06 C1 02
2BA40   09 07 FC 00 54 00 01 00 01 00 15 00 FC 00 F2 00
2BA50   03 00 2C 29 24 00 10 25 88 00 00 25 F2 00 03 00
2BA60   2C 29 24 00 1C 25 83 00 24 00 AC 27 88 00 F2 00
2BA70   0B 00 F2 00 0F 00 F2 00 13 00 14 25 54 3A 94 00
2BA80   24 00 1C 25 88 00 00 25 FC 00 38 3A 24 00 B4 09
2BA90   9E 00 20 00 24 00 A2 30 88 00 62 00 60 00 AB 00
2BAA0   FC 00 24 00 34 3A 88 00 D2 00 24 00 E2 06 24 00
2BAB0   46 38 38 00 88 00 D2 00 F4 00 03 00 FE 02 24 00
2BAC0   38 3A 88 00 D2 00 24 00 E2 06 24 00 46 38 38 00
2BAD0   88 00 D2 00 F4 00 01 00 FE 02 FC 00 24 00 64 25
2BAE0   88 00 D2 00 24 00 E2 06 24 00 46 38 38 00 88 00
2BAF0   D2 00 F4 00 01 00 FE 02 FC 00 24 00 24 00 A8 05
2BB00   30 00 A2 30 C6 00 38 3A AC 00 2E 00 0B 00 54 00
2BB10   01 00 A9 01 1D 02 FC 00 6A 3A 94 00 24 00 38 3A
```

```
2BB20   94 00 7C 3A 94 00 24 00 24 00 A8 05 30 00 A2 30
2BB30   C6 00 94 00 8A 3A 94 00 7A 00 FC 00 24 00 22 00
2BB40   DC 01 2E 00 05 00 02 00 FC 00 5E 00 FC 00 24 00
2BB50   22 00 DC 01 2E 00 25 00 42 3A 6A 00 1C 25 CE 00
2BB60   9E 00 24 00 10 25 88 00 00 25 F2 00 03 00 2C 29
2BB70   24 00 1C 25 68 00 00 25 46 00 FC 00 54 00 01 00
2BB80   E9 00 9B 01 FC 00 24 00 34 3A 88 00 D2 00 24 00
2BB90   E2 06 24 00 46 38 38 00 88 00 D2 00 F4 00 01 00
2BBA0   FE 02 FC 00 46 00 FC 00 24 00 34 3A 88 00 D2 00
2BBB0   24 00 E2 06 24 00 46 38 38 00 68 00 D2 00 F4 00
2BBC0   01 00 FE 02 FC 00 24 00 22 00 24 00 E2 06 24 00
2BBD0   46 38 38 00 88 00 D2 00 26 03 56 00 5F 00 FC 00
2BBE0   24 00 64 25 88 00 D2 00 24 00 E2 06 24 00 46 38
2BBF0   38 00 88 00 D2 00 F4 00 01 00 FE 02 FC 00 24 00
2BC00   10 25 88 00 24 00 48 25 88 00 F2 00 0B 00 F2 00
2BC10   0F 00 F2 00 13 00 14 25 FC 00 24 00 24 00 A8 05
2BC20   30 00 B4 09 AE 00 2E 00 0D 00 90 3A 94 00 7A 00
2BC30   2A 00 09 00 9C 3A 94 00 7A 00 FC 00 5A 00 FC 00
2BC40   42 3A 22 00 1E 32 9E 00 24 00 42 3A 9C 27 AE 00
2BC50   2E 00 05 00 46 00 FC 00 54 00 01 00 25 02 73 06
2BC60   FC 00 24 00 50 25 88 00 D2 00 24 00 E2 06 24 00
2BC70   46 38 38 00 1C 25 BA 00 88 00 D2 00 F4 00 01 00
2BC80   FE 02 FC 00 24 00 32 25 88 00 D2 00 24 00 E2 06
2BC90   24 00 46 38 38 00 88 00 D2 00 F4 00 01 00 FE 02
2BCA0   FC 00 46 00 FC 00 02 00 FC 00 44 39 24 00 44 39
2BCB0   00 00 24 00 22 00 DC 01 2E 00 15 00 AC 3A 6A 00
2BCC0   1C 25 CE 00 9E 00 54 00 01 00 01 00 1F 00 FC 00
2BCD0   F2 00 03 00 2C 29 F4 00 03 00 CA 3A 3A 03 FC 00
2BCE0   24 00 58 25 88 00 24 00 02 2A 88 00 F2 00 0B 00
2BCF0   F2 00 0F 00 F2 00 13 00 14 25 FC 00 24 00 22 00
2BD00   DC 01 2E 00 15 00 AC 3A 6A 00 1C 25 CE 00 9E 00
2BD10   AC 3A 94 00 2A 00 0B 00 54 00 01 00 4B 00 51 00
2BD20   FC 00 26 00 28 00 AC 3A 8E 00 84 00 54 00 0D 00
2BD30   75 01 C9 00 A1 00 8D 00 15 02 59 02 A1 00 8D 00
2BD40   A1 00 8D 00 89 05 B1 04 67 06 79 05 FC 00 C2 00
2BD50   FC 00 24 00 50 25 88 00 24 00 86 27 88 00 F2 00
2BD60   0B 00 F2 00 0F 00 F2 00 13 00 14 25 D6 3A 94 00
2BD70   FC 00 24 00 22 00 DC 01 2E 00 15 00 B6 3A 6A 00
2BD80   1C 25 CE 00 9E 00 B6 3A 94 00 2A 00 0B 00 54 00
2BD90   01 00 C1 00 97 00 FC 00 B2 3A 26 00 28 00 B6 3A
2BDA0   8E 00 9E 00 24 00 B2 3A 1C 25 B4 00 B2 3A B8 09
2BDB0   60 00 C8 00 2E 00 0B 00 B2 3A 24 00 1C 25 9E 00
2BDC0   FC 00 26 00 28 00 AC 3A 8E 00 84 00 54 00 09 00
2BDD0   35 01 C9 00 E9 01 91 01 15 02 59 02 05 03 21 03
2BDE0   D7 03 E9 03 FC 00 24 00 A0 27 88 00 D2 00 24 00
2BDF0   E2 06 24 00 46 38 38 00 88 00 D2 00 F4 00 01 00
2BE00   FE 02 F2 00 03 00 2C 29 24 00 1C 27 88 00 5A 01
2BE10   24 00 64 25 88 00 D2 00 24 00 E2 06 24 00 46 38
2BE20   38 00 88 00 D2 00 F4 00 01 00 FE 02 FC 00 24 00
2BE30   38 26 88 00 24 00 64 26 88 00 F2 00 0B 00 F2 00
2BE40   0F 00 F2 00 13 00 14 25 F4 3A 94 00 FC 00 24 00
2BE50   24 00 A8 05 30 00 B4 09 AC 00 2E 00 08 00 02 3B
2BE60   94 00 2A 00 07 00 0A 3B 94 00 FC 00 24 00 22 00
2BE70   DC 01 2E 00 13 00 4A 00 9C 27 94 00 72 00 AC 3A
2BE80   78 00 2A 00 0B 00 54 00 01 00 BB 01 19 01 FC 00
2BE90   54 00 01 00 01 00 15 00 FC 00 24 00 B2 3A 1C 25
2BEA0   BC 00 88 00 D2 00 24 00 E2 06 24 00 46 38 38 00
2BEB0   88 00 D2 00 F4 00 01 00 FE 02 FC 00 54 00 01 00
2BEC0   01 00 15 00 FC 00 F4 00 03 00 12 3B 3A 03 FC 00
2BED0   24 00 A4 27 88 00 24 00 12 28 88 00 F2 00 0B 00
2BEE0   F2 00 0F 00 F2 00 13 00 14 25 FC 00 BC 3A 24 00
2BEF0   1C 25 9E 00 20 00 24 00 B8 09 88 00 62 00 60 00
2BF00   93 00 FC 00 24 00 10 25 BC 3A BA 00 88 00 D2 00
2BF10   24 00 E2 06 24 00 46 38 38 00 88 00 D2 00 F4 00
2BF20   01 00 FE 02 24 00 1C 27 88 00 5A 01 24 00 64 25
```

```
2BF30   88 00 D2 00 24 00 E2 06 24 00 46 38 38 00 88 00
2BF40   D2 00 F4 00 01 00 FE 02 FC 00 58 0A 94 00 28 00
2BF50   22 00 24 00 24 00 A8 05 30 00 88 00 20 30 24 00
2BF60   32 25 D8 00 94 00 FC 00 24 00 50 25 88 00 58 00
2BF70   1F 00 52 00 24 00 64 25 88 00 D2 00 24 00 E2 06
2BF80   24 00 46 38 38 00 88 00 D2 00 F4 00 01 00 FE 02
2BF90   5C 00 FC 00 5E 00 FC 00 24 00 22 00 DC 01 2E 00
2BFA0   0B 00 54 00 01 00 01 00 15 00 FC 00 54 00 01 00
2BFB0   1F 02 81 02 FC 00 F2 00 03 00 2C 29 24 00 60 25
2BFC0   88 00 24 00 64 26 88 00 F2 00 0B 00 F2 00 0F 00
2BFD0   F2 00 13 00 14 25 1E 3B 94 00 FC 00 24 00 22 00
2BFE0   DC 01 2E 00 13 00 4A 00 9C 27 94 00 72 00 C0 3A
2BFF0   78 00 2A 00 0B 00 54 00 01 00 2B 03 49 03 FC 00
2C000   24 00 28 00 AA 07 24 00 1C 25 38 00 24 00 1C 25
2C010   D8 00 68 26 AC 00 2E 00 27 00 24 00 62 36 B2 3A
2C020   BA 00 88 00 D2 00 24 00 E2 06 24 00 46 38 38 00
2C030   88 00 D2 00 F4 00 03 00 FE 02 2A 00 23 00 24 00
2C040   EC 25 B2 3A BA 00 88 00 D2 00 24 00 E2 06 24 00
2C050   46 38 38 00 88 00 D2 00 F4 00 03 00 FE 02 FC 00
2C060   28 00 38 3B C0 3A 88 00 24 00 E2 06 24 00 46 38
2C070   38 00 88 00 D2 00 F2 00 07 00 08 03 FC 00 54 00
2C080   01 00 15 02 59 02 FC 00 24 00 A4 27 88 00 24 00
2C090   52 27 88 00 F2 00 0B 00 F2 00 0F 00 F2 00 13 00
2C0A0   14 25 3E 3B 94 00 FC 00 24 00 22 00 DC 01 2E 00
2C0B0   0B 00 54 00 01 00 01 00 15 00 FC 00 24 00 B2 3A
2C0C0   10 25 BA 00 88 00 D2 00 24 00 E2 06 24 00 46 38
2C0D0   38 00 88 00 D2 00 F4 00 01 00 FE 02 24 00 64 25
2C0E0   88 00 D2 00 24 00 E2 06 24 00 46 38 38 00 88 00
2C0F0   D2 00 F4 00 01 00 FE 02 FC 00 24 00 24 00 A8 05
2C100   30 00 10 25 AE 00 2E 00 0B 00 54 00 01 00 F7 03
2C110   11 04 FC 00 24 00 B2 3A C0 26 BA 00 88 00 D2 00
2C120   24 00 E2 06 24 00 46 38 38 00 88 00 D2 00 F4 00
2C130   01 00 FE 02 FC 00 24 00 22 00 DC 01 2E 00 0B 00
2C140   54 00 01 00 01 00 15 00 FC 00 24 00 B2 3A 10 25
2C150   BA 00 88 00 D2 00 24 00 E2 06 24 00 46 38 38 00
2C160   88 00 D2 00 F4 00 01 00 FE 02 24 00 64 25 88 00
2C170   D2 00 24 00 E2 06 24 00 46 38 38 00 88 00 D2 00
2C180   F4 00 01 00 FE 02 FC 00 24 00 24 00 A8 05 30 00
2C190   1C 25 AE 00 2E 00 0B 00 54 00 01 00 85 04 51 04
2C1A0   FC 00 24 00 A0 27 B2 3A BA 00 88 00 D2 00 24 00
2C1B0   E2 06 24 00 46 38 38 00 88 00 D2 00 F4 00 01 00
2C1C0   FE 02 24 00 64 25 88 00 D2 00 24 00 E2 06 24 00
2C1D0   46 38 38 00 88 00 D2 00 F4 00 01 00 FE 02 C6 3A
2C1E0   24 00 24 00 A8 05 30 00 9E 00 FC 00 BC 3A 24 00
2C1F0   1C 25 9E 00 20 00 24 00 C6 3A 88 00 62 00 60 00
2C200   2B 00 FC 00 24 00 64 25 88 00 D2 00 24 00 E2 06
2C210   24 00 46 38 38 00 88 00 D2 00 F4 00 01 00 FE 02
2C220   24 00 24 00 A8 05 30 00 94 00 FC 00 5E 00 FC 00
2C230   54 00 01 00 85 04 51 04 FC 00 F2 00 03 00 2C 29
2C240   3A 31 94 00 7A 00 FC 00 BC 3A 24 00 B4 09 9E 00
2C250   FC 00 24 00 22 00 DC 01 2E 00 0B 00 54 00 01 00
2C260   01 00 15 00 FC 00 24 00 50 25 88 00 D2 00 24 00
2C270   E2 06 24 00 46 38 38 00 88 00 D2 00 F4 00 03 00
2C280   FE 02 24 00 BC 3A 88 00 D2 00 24 00 E2 06 24 00
2C290   46 38 38 00 88 00 D2 00 F4 00 01 00 FE 02 24 00
2C2A0   64 25 88 00 D2 00 24 00 E2 06 24 00 46 38 38 00
2C2B0   88 00 D2 00 F4 00 01 00 FE 02 FC 00 24 00 24 00
2C2C0   A8 05 30 00 BC 3A AE 00 2E 00 1D 00 4A 3B 94 00
2C2D0   24 00 BC 3A 94 00 5A 3B 94 00 24 00 24 00 A8 05
2C2E0   30 00 94 00 7A 00 FC 00 24 00 BC 3A 00 32 B4 00
2C2F0   2E 00 13 00 BC 3A 24 00 BC 3A 1C 25 BA 00 9E 00
2C300   2A 00 0B 00 BC 3A 24 00 B4 09 9E 00 FC 00 54 00
2C310   01 00 A1 05 ED 04 FC 00 F2 00 03 00 2C 29 24 00
2C320   38 26 88 00 24 00 52 27 88 00 F2 00 0B 00 F2 00
2C330   0F 00 F2 00 13 00 14 25 FC 00 68 3B 94 00 FC 00
```

| | | | | | | | | | | | | | | | | |
|---|---|---|---|---|---|---|---|---|---|---|---|---|---|---|---|---|
| 20340 | 24 | 00 | 50 | 25 | 68 | 00 | D2 | 00 | 24 | 00 | E2 | 06 | 24 | 00 | 46 | 38 |
| 20350 | 38 | 00 | 1C | 25 | BA | 00 | 88 | 00 | D2 | 00 | F4 | 00 | 01 | 00 | FE | 02 |
| 20360 | FC | 00 | 4A | 00 | 9C | 27 | 94 | 00 | 72 | 00 | AC | 3A | 78 | 00 | 26 | 00 |
| 20370 | 28 | 00 | AC | 3A | 8E | 00 | B4 | 09 | AC | 00 | 84 | 00 | 2E | 00 | 11 | 00 |
| 20380 | AC | 3A | 24 | 00 | 24 | 00 | C0 | 05 | D0 | 00 | 90 | 00 | 9E | 00 | FC | 00 |
| 20390 | 26 | 00 | 28 | 00 | AC | 3A | 8E | 00 | 8C | 00 | D2 | 00 | 24 | 00 | E2 | 06 |
| 203A0 | 24 | 00 | 46 | 38 | 38 | 00 | 88 | 00 | D2 | 00 | F4 | 00 | 01 | 00 | FE | 02 |
| 203B0 | FC | 00 | 54 | 00 | 01 | 00 | 01 | 00 | 15 | 00 | FC | 00 | 02 | 00 | 24 | 00 |
| 203C0 | 00 | 00 | 24 | 00 | B8 | 07 | 88 | 00 | D2 | 00 | 24 | 00 | E2 | 06 | 24 | 00 |
| 203D0 | 46 | 38 | 38 | 00 | 1C | 25 | BA | 00 | 88 | 00 | D2 | 00 | F4 | 00 | 01 | 00 |
| 203E0 | FE | 02 | FC | 00 | F2 | 00 | 03 | 00 | 2C | 29 | FC | 00 | F4 | 00 | 03 | 00 |
| 203F0 | B6 | 3B | 3A | 03 | FC | 00 | 24 | 00 | 6A | 0A | 88 | 00 | 24 | 00 | 52 | 28 |
| 20400 | 88 | 00 | F2 | 00 | 0B | 00 | F2 | 00 | 0F | 00 | F2 | 00 | 13 | 00 | 14 | 25 |
| 20410 | 24 | 00 | 22 | 00 | DC | 01 | 2E | 00 | 11 | 00 | 9C | 3B | 6A | 00 | 1C | 25 |
| 20420 | CE | 00 | 9E | 00 | 2A | 00 | 0B | 00 | 54 | 00 | 01 | 00 | 35 | 00 | 83 | 00 |
| 20430 | FC | 00 | AE | 3B | 26 | 00 | 28 | 00 | 9C | 3B | 8E | 00 | 9E | 00 | FC | 00 |
| 20440 | 24 | 00 | AE | 3B | 1C | 25 | B4 | 00 | AE | 3B | EC | 25 | B0 | 00 | C8 | 00 |
| 20450 | 2E | 00 | 05 | 00 | 02 | 00 | FC | 00 | 24 | 00 | AE | 3B | EC | 25 | AC | 00 |
| 20460 | 2E | 00 | 05 | 00 | 54 | 00 | 01 | 00 | 01 | 00 | 15 | 00 | FC | 00 | 24 | 00 |
| 20470 | AE | 3B | 56 | 00 | 08 | 00 | BF | 01 | 91 | 01 | EF | 01 | F5 | 01 | 21 | 04 |
| 20480 | 59 | 02 | B1 | 04 | 21 | 03 | 41 | 05 | E9 | 03 | 25 | 06 | B1 | 04 | FC | 00 |
| 20490 | 54 | 00 | 01 | 00 | 23 | 00 | 29 | 00 | FC | 00 | 24 | 00 | A0 | 27 | 88 | 00 |
| 204A0 | 24 | 00 | A4 | 27 | 88 | 00 | F2 | 00 | 0B | 00 | F2 | 00 | 0F | 00 | F2 | 00 |
| 204B0 | 13 | 00 | 14 | 25 | C2 | 3B | 94 | 00 | FC | 00 | 24 | 00 | 22 | 00 | DC | 01 |
| 204C0 | 2E | 00 | 13 | 00 | 4A | 00 | 9C | 27 | 94 | 00 | 72 | 00 | 9C | 3B | 78 | 00 |
| 204D0 | 2A | 00 | 0B | 00 | 54 | 00 | 01 | 00 | F9 | 00 | 5F | 01 | FC | 00 | B2 | 3B |
| 204E0 | 26 | 00 | 28 | 00 | 9C | 3B | 8E | 00 | 9E | 00 | FC | 00 | 24 | 00 | B2 | 3B |
| 204F0 | 1C | 25 | B4 | 00 | B2 | 3B | 10 | 25 | B0 | 00 | C8 | 00 | 2E | 00 | 2B | 00 |
| 20500 | 24 | 00 | A0 | 27 | 88 | 00 | 24 | 00 | 68 | 25 | 88 | 00 | F2 | 00 | 0B | 00 |
| 20510 | F2 | 00 | 0F | 00 | F2 | 00 | 13 | 00 | 14 | 25 | F2 | 3B | 94 | 00 | 7A | 00 |
| 20520 | 54 | 00 | 01 | 00 | D9 | 00 | 55 | 01 | FC | 00 | 46 | 00 | FC | 00 | 24 | 00 |
| 20530 | 0A | 26 | 88 | 00 | 24 | 00 | A4 | 27 | 88 | 00 | F2 | 00 | 0B | 00 | F2 | 00 |
| 20540 | 0F | 00 | F2 | 00 | 13 | 00 | 14 | 25 | DA | 3B | 94 | 00 | FC | 00 | 24 | 00 |
| 20550 | 22 | 00 | DC | 01 | 2E | 00 | 13 | 00 | 4A | 00 | 9C | 27 | 94 | 00 | 72 | 00 |
| 20560 | A8 | 3B | 78 | 00 | 2A | 00 | 0B | 00 | 54 | 00 | 01 | 00 | 8D | 01 | 87 | 01 |
| 20570 | FC | 00 | A8 | 3B | 28 | 00 | 38 | 3B | A8 | 3B | 9E | 00 | 46 | 00 | FC | 00 |
| 20580 | 56 | 00 | 01 | 00 | D9 | 00 | 55 | 01 | FC | 00 | 24 | 00 | B2 | 3B | 1C | 25 |
| 20590 | BC | 00 | 88 | 00 | D2 | 00 | 24 | 00 | E2 | 06 | 24 | 00 | 46 | 38 | 38 | 00 |
| 205A0 | 88 | 00 | D2 | 00 | F4 | 00 | 01 | 00 | FE | 02 | FC | 00 | 46 | 00 | FC | 00 |
| 205B0 | 24 | 00 | A0 | 27 | 88 | 00 | 24 | 00 | AC | 27 | 88 | 00 | F2 | 00 | 0B | 00 |
| 205C0 | F2 | 00 | 0F | 00 | F2 | 00 | 13 | 00 | 14 | 25 | 24 | 00 | F4 | 3B | 24 | 00 |
| 205D0 | 62 | 00 | 40 | 00 | 94 | 00 | AE | 38 | 24 | 00 | 1C | 25 | 9E | 00 | 20 | 00 |
| 205E0 | 24 | 00 | 52 | 27 | 88 | 00 | 62 | 00 | 60 | 00 | 0D | 00 | 24 | 00 | F8 | 3B |
| 205F0 | 24 | 00 | 62 | 00 | 40 | 00 | 94 | 00 | 5E | 00 | 24 | 00 | FC | 3B | 24 | 00 |
| 20600 | 62 | 00 | 40 | 00 | 94 | 00 | 7A | 00 | FC | 00 | 24 | 00 | 3C | 26 | 88 | 00 |
| 20610 | 24 | 00 | AC | 27 | 88 | 00 | F2 | 00 | 0B | 00 | F2 | 00 | 0F | 00 | F2 | 00 |
| 20620 | 13 | 00 | 14 | 25 | 24 | 00 | D4 | 2B | 24 | 00 | 62 | 00 | 40 | 00 | 94 | 00 |
| 20630 | 00 | 3C | 94 | 00 | 24 | 00 | D4 | 25 | 24 | 00 | 62 | 00 | 40 | 00 | 94 | 00 |
| 20640 | 7A | 00 | FC | 00 | 24 | 00 | 0A | 26 | 88 | 00 | 24 | 00 | AC | 27 | 88 | 00 |
| 20650 | F2 | 00 | 0B | 00 | F2 | 00 | 0F | 00 | F2 | 00 | 13 | 00 | 14 | 25 | 24 | 00 |
| 20660 | 18 | 3C | 24 | 00 | 62 | 00 | 40 | 00 | 94 | 00 | AE | 3B | 24 | 00 | 1C | 25 |
| 20670 | 9E | 00 | 20 | 00 | 24 | 00 | 52 | 27 | 88 | 00 | 62 | 00 | 60 | 00 | 0D | 00 |
| 20680 | 24 | 00 | F8 | 3B | 24 | 00 | 62 | 00 | 40 | 00 | 94 | 00 | 5E | 00 | 24 | 00 |
| 20690 | 1C | 3C | 24 | 00 | 62 | 00 | 40 | 00 | 94 | 00 | 7A | 00 | FC | 00 | B2 | 3B |
| 206A0 | 24 | 00 | B8 | 09 | 9E | 00 | 20 | 00 | 24 | 00 | B2 | 25 | 88 | 00 | 62 | 00 |
| 206B0 | 60 | 00 | AF | 00 | FC | 00 | F4 | 00 | 01 | 00 | 24 | 00 | E2 | 06 | 24 | 00 |
| 206C0 | 46 | 38 | 38 | 00 | 88 | 00 | D2 | 00 | 8A | 03 | 24 | 00 | A4 | 05 | 24 | 00 |
| 206D0 | B2 | 3B | 32 | 00 | FC | 00 | 24 | 00 | 24 | 00 | A8 | 05 | 30 | 00 | 1C | 25 |
| 206E0 | C6 | 00 | 2E | 00 | 0D | 00 | A8 | 3B | 20 | 3C | 9E | 00 | 2A | 00 | 09 | 00 |
| 206F0 | A8 | 3B | 2C | 3C | 9E | 00 | FC | 00 | 24 | 00 | 50 | 25 | B2 | 3B | BA | 00 |
| 20700 | 88 | 00 | 24 | 00 | AC | 27 | 88 | 00 | F2 | 00 | 0B | 00 | F2 | 00 | 0F | 00 |
| 20710 | F2 | 00 | 13 | 00 | 14 | 25 | 24 | 00 | D4 | 2B | 24 | 00 | 62 | 00 | 40 | 00 |
| 20720 | 94 | 00 | 38 | 3C | 94 | 00 | 24 | 00 | B2 | 3B | 10 | 25 | BC | 00 | 94 | 00 |
| 20730 | 58 | 0A | 94 | 00 | A8 | 3B | 94 | 00 | 58 | 0A | 94 | 00 | 24 | 00 | D4 | 2B |
| 20740 | 24 | 00 | 62 | 00 | 40 | 00 | 94 | 00 | 7A | 00 | FC | 00 | F4 | 00 | 01 | 00 |

```
2C750   24 00 E2 06 24 00 46 38 38 00 88 00 D2 00 6C 03
2C760   FC 00 5E 00 FC 00 24 00 A6 25 88 00 24 00 AC 27
2C770   88 00 F2 00 0B 00 F2 00 0F 00 F2 00 13 00 14 25
2C780   24 00 44 3C 24 00 62 00 40 00 94 00 AE 3B 24 00
2C790   1C 25 9E 00 20 00 24 00 52 27 88 00 62 00 60 00
2C7A0   0D 00 24 00 F8 3B 24 00 62 00 40 00 94 00 5E 00
2C7B0   24 00 56 36 24 00 62 00 40 00 94 00 7A 00 FC 00
2C7C0   A2 3B 22 00 1E 32 9E 00 24 00 A2 3B 9C 27 AC 00
2C7D0   2E 00 0B 00 54 00 01 00 EF 01 F5 01 FC 00 46 00
2C7E0   FC 00 56 00 01 00 D9 00 55 01 56 00 01 00 6D 01
2C7F0   7D 01 FC 00 F4 00 01 00 24 00 E2 06 24 00 46 38
2C800   38 00 88 00 D2 00 8A 03 24 00 A4 05 24 00 B2 3B
2C810   EC 25 BA 00 32 00 FC 00 A8 3B 24 00 E2 06 24 00
2C820   46 38 38 00 88 00 D2 00 F2 00 07 00 08 03 24 00
2C830   AA 25 88 00 24 00 A4 27 88 00 F2 00 0B 00 F2 00
2C840   0F 00 F2 00 13 00 14 25 A8 3B 94 00 7A 00 FC 00
2C850   A2 3B 22 00 1E 32 9E 00 24 00 A2 3B 9C 27 AC 00
2C860   2E 00 0B 00 54 00 01 00 8F 04 9F 02 FC 00 46 00
2C870   FC 00 56 00 01 00 D9 00 55 01 56 00 01 00 6D 01
2C880   7D 01 FC 00 F4 00 01 00 24 00 E2 06 24 00 46 38
2C890   38 00 88 00 D2 00 8A 03 24 00 A4 05 24 00 B2 3B
2C8A0   A6 25 BA 00 32 00 FC 00 A8 3B 24 00 E2 06 24 00
2C8B0   46 38 38 00 88 00 D2 00 F2 00 07 00 08 03 24 00
2C8C0   AA 25 88 00 24 00 A4 27 88 00 F2 00 0B 00 F2 00
2C8D0   0F 00 F2 00 13 00 14 25 A8 3B 94 00 7A 00 FC 00
2C8E0   A2 3B 22 00 1E 32 9E 00 24 00 A2 3B 9C 27 AC 00
2C8F0   2E 00 0B 00 54 00 01 00 1F 05 53 03 FC 00 46 00
2C900   FC 00 56 00 01 00 D9 00 55 01 FC 00 24 00 0A 26
2C910   88 00 24 00 1C 25 86 00 F2 00 0B 00 F2 00 0F 00
2C920   F2 00 13 00 14 25 FC 00 A2 3B 22 00 1E 32 9E 00
2C930   24 00 A2 3B 9C 27 AE 00 2E 00 05 00 46 00 FC 00
2C940   24 00 22 00 24 00 E2 06 24 00 46 38 38 00 88 00
2C950   D2 00 26 03 58 00 81 00 FC 00 F4 00 01 00 24 00
2C960   E2 06 24 00 46 38 38 00 88 00 D2 00 8A 03 24 00
2C970   A4 05 24 00 B2 3B 10 25 BA 00 32 00 FC 00 24 00
2C980   24 00 A8 05 30 00 1C 25 C6 00 2E 00 35 00 24 00
2C990   A4 05 24 00 B2 3B C0 26 BA 00 32 00 24 00 A4 05
2C9A0   24 00 B2 3B C0 26 BA 00 32 00 24 00 D2 2D 88 00
2C9B0   5A 01 24 00 24 00 A8 05 30 00 6A 0A C6 00 94 00
2C9C0   FC 00 F4 00 01 00 24 00 E2 06 24 00 46 38 38 00
2C9D0   88 00 D2 00 6C 03 FC 00 5A 00 FC 00 54 00 01 00
2C9E0   67 05 0B 04 FC 00 24 00 A0 27 88 00 24 00 AC 27
2C9F0   88 00 F2 00 0B 00 F2 00 0F 00 F2 00 13 00 14 25
2CA00   24 00 F4 3B 24 00 62 00 40 00 94 00 AE 3B 24 00
2CA10   1C 25 9E 00 20 00 24 00 52 27 88 00 62 00 60 00
2CA20   0D 00 24 00 F8 3B 24 00 62 00 40 00 94 00 5E 00
2CA30   24 00 FC 3B 24 00 62 00 40 00 94 00 7A 00 FC 00
2CA40   24 00 3C 26 88 00 24 00 AC 27 88 00 F2 00 0B 00
2CA50   F2 00 0F 00 F2 00 13 00 14 25 24 00 D4 2B 24 00
2CA60   62 00 40 00 94 00 48 3C 94 00 24 00 D4 2B 24 00
2CA70   62 00 40 00 94 00 7A 00 FC 00 24 00 0A 26 88 00
2CA80   24 00 AC 27 88 00 F2 00 0B 00 F2 00 0F 00 F2 00
2CA90   13 00 14 25 24 00 18 3C 24 00 62 00 40 00 94 00
2CAA0   AE 3B 24 00 1C 25 9E 00 20 00 24 00 52 27 88 00
2CAB0   62 00 60 00 0D 00 24 00 F8 3B 24 00 62 00 40 00
2CAC0   94 00 5E 00 24 00 1C 3C 24 00 62 00 40 00 94 00
2CAD0   7A 00 FC 00 B2 3B 24 00 B4 09 9E 00 20 00 24 00
2CAE0   32 25 88 00 62 00 60 00 BB 00 FC 00 F4 00 01 00
2CAF0   24 00 E2 06 24 00 46 38 38 00 1C 25 BA 00 38 00
2CB00   D2 00 8A 03 24 00 A4 05 24 00 B2 3B 32 00 FC 00
2CB10   24 00 24 00 A8 05 30 00 1C 25 C6 00 B4 09 AC 00
2CB20   2E 00 0D 00 A8 3B 60 3C 9E 00 2A 00 09 00 A8 3B
2CB30   68 3C 9E 00 FC 00 24 00 52 27 B2 3B BA 00 68 00
2CB40   24 00 AC 27 88 00 F2 00 0B 00 F2 00 0F 00 F2 00
2CB50   13 00 14 25 24 00 D4 2B 24 00 62 00 40 00 94 00
```

```
2CB60  70 3C 94 00 24 00 B2 3B 1C 25 BA 00 94 00 8A 37
2CB70  94 00 A8 3B 94 00 58 0A 94 00 24 00 D4 2B 24 00
2CB80  62 00 40 00 94 00 7A 00 FC 00 F4 00 01 00 24 00
2CB90  E2 06 24 00 46 38 38 00 1C 25 BA 00 88 00 D2 00
2CBA0  6C 03 FC 00 5E 00 FC 00 24 00 A6 25 88 00 24 00
2CBB0  AC 27 88 00 F2 00 0B 00 F2 00 0F 00 F2 00 13 00
2CBC0  14 25 24 00 44 3C 24 00 62 00 40 00 94 00 AE 3B
2CBD0  24 00 1C 25 9E 00 20 00 24 00 52 27 88 00 62 00
2CBE0  60 00 0D 00 24 00 F8 3B 24 00 62 00 40 00 94 00
2CBF0  5E 00 24 00 56 36 24 00 62 00 40 00 94 00 7A 00
2CC00  FC 00 A2 3B 22 00 1E 32 9E 00 24 00 A2 3B 9C 27
2CC10  AC 00 2E 00 0B 00 54 00 01 00 25 06 B1 04 FC 00
2CC20  46 00 FC 00 02 00 0F 00 F2 00 13 00 14 25 24 00
2CC30  00 00 24 00 42 38 B8 09 AC 00 2E 00 0F 00 46 38
2CC40  24 00 B4 09 4A 38 BA 00 9E 00 FC 00 24 00 42 38
2CC50  48 25 AC 00 2E 00 0F 00 46 38 24 00 32 25 4A 38
2CC60  BA 00 9E 00 FC 00 82 3C 24 00 B4 09 9E 00 FC 00
2CC70  7E 3C 24 00 50 25 9E 00 20 00 24 00 50 2E 88 00
2CC80  24 00 B2 25 88 00 60 00 33 00 FC 00 24 00 42 38
2CC90  7E 3C AC 00 2E 00 17 00 46 38 24 00 42 38 38 26
2CCA0  BC 00 82 3C BC 00 4A 38 BA 00 9E 00 FC 00 82 3C
2CCB0  24 00 82 3C 32 25 BA 00 9E 00 FC 00 5E 00 FC 00
2CCC0  24 00 D6 06 24 00 46 38 38 00 1C 25 AC 00 2E 00
2CCD0  05 00 F2 04 FC 00 24 00 D6 06 24 00 46 38 38 00
2CCE0  32 25 AC 00 2E 00 05 00 10 05 FC 00 24 00 D6 06
2CCF0  24 00 46 38 38 00 B8 09 AC 00 2E 00 05 00 DE 04
2CD00  FC 00 24 00 D6 06 24 00 46 38 38 00 54 25 AC 00
2CD10  2E 00 05 00 FC 04 FC 00 24 00 D6 06 24 00 46 38
2CD20  38 00 48 25 AC 00 2E 00 05 00 A2 04 FC 00 24 00
2CD30  D6 06 24 00 46 38 38 00 38 26 AC 00 2E 00 05 00
2CD40  CA 04 FC 00 24 00 D6 06 24 00 46 38 38 00 60 25
2CD50  AC 00 2E 00 05 00 C0 04 FC 00 24 00 D6 06 24 00
2CD60  46 38 38 00 58 25 AC 00 2E 00 05 00 E8 04 FC 00
2CD70  24 00 D6 06 24 00 46 38 38 00 AA 25 AC 00 2E 00
2CD80  05 00 06 05 FC 00 24 00 D6 06 24 00 46 38 38 00
2CD90  6C 25 AC 00 2E 00 05 00 B6 04 FC 00 24 00 D6 06
2CDA0  24 00 46 38 38 00 68 25 AC 00 2E 00 05 00 24 05
2CDB0  FC 00 24 00 D6 06 24 00 46 38 38 00 2A 28 AC 00
2CDC0  2E 00 05 00 2E 05 FC 00 02 00 FC 00 02 00 46 38
2CDD0  00 00 F2 00 03 00 2C 29 FC 00 24 00 50 25 88 00
2CDE0  D2 00 24 00 E2 06 24 00 46 38 38 00 1C 25 BA 00
2CDF0  88 00 D2 00 F4 00 01 00 FE 02 24 00 32 25 88 00
2CE00  D2 00 24 00 E2 06 24 00 46 38 38 00 88 00 D2 00
2CE10  F4 00 01 00 FE 02 FC 00 24 00 22 00 24 00 E2 06
2CE20  24 00 46 38 38 00 88 00 D2 00 26 03 1C 25 AE 00
2CE30  2E 00 2B 00 24 00 B2 25 88 00 24 00 48 25 8E 00
2CE40  F2 00 0B 00 F2 00 0F 00 F2 00 13 00 14 25 A2 3C
2CE50  94 00 7A 00 54 00 01 00 07 01 B5 00 FC 00 24 00
2CE60  50 25 88 00 D2 00 24 00 E2 06 24 00 46 38 38 00
2CE70  88 00 D2 00 F4 00 01 00 FE 02 FC 00 24 00 24 00
2CE80  A8 05 30 00 6A 0A C6 00 2E 00 2B 00 24 00 B2 25
2CE90  88 00 24 00 48 25 88 00 F2 00 0B 00 F2 00 0F 00
2CEA0  F2 00 13 00 14 25 90 3A 94 00 7A 00 54 00 01 00
2CEB0  07 01 B5 00 FC 00 24 00 B2 25 88 00 24 00 54 25
2CEC0  88 00 F2 00 0B 00 F2 00 0F 00 F2 00 13 00 14 25
2CED0  B2 3C 94 00 7A 00 FC 00 96 3C 22 00 1E 32 9E 00
2CEE0  24 00 96 3C 9C 27 A2 00 2E 00 0B 00 54 00 01 00
2CEF0  07 01 B5 00 FC 00 F2 00 03 00 2C 29 F4 00 03 00
2CF00  C2 3C 3A 03 FC 00 24 00 58 25 88 00 24 00 1E 31
2CF10  88 00 F2 00 0B 00 F2 00 0F 00 F2 00 13 00 14 25
2CF20  24 00 22 00 DC 01 2E 00 13 00 4A 00 9C 27 94 00
2CF30  72 00 9C 3C 78 00 2A 00 0B 00 54 00 01 00 35 01
2CF40  03 02 FC 00 86 3C 26 00 28 00 9C 3C 8E 00 9E 00
2CF50  24 00 86 3C 1C 25 B4 00 86 3C 6A 0A B0 00 C8 00
2CF60  2E 00 05 00 02 00 FC 00 24 00 86 3C 6A 0A AC 00
```

| | | | | | | | | | | | | | | | | |
|---|---|---|---|---|---|---|---|---|---|---|---|---|---|---|---|---|
| 2CF70 | 2E | 00 | 11 | 00 | F2 | 00 | 03 | 00 | 2C | 29 | 54 | 00 | 01 | 00 | 09 | 00 |
| 2CF80 | 51 | 00 | FC | 00 | 24 | 00 | 86 | 3C | 5C | 25 | AC | 00 | 2E | 00 | 19 | 00 |
| 2CF90 | 92 | 3C | 24 | 00 | B4 | 09 | 9E | 00 | F2 | 00 | 03 | 00 | 2C | 29 | 54 | 00 |
| 2CFA0 | 01 | 00 | FD | 03 | E9 | 03 | FC | 00 | 24 | 00 | 50 | 25 | 88 | 00 | 24 | 00 |
| 2CFB0 | 48 | 25 | 88 | 00 | F2 | 00 | 0B | 00 | F2 | 00 | 0F | 00 | F2 | 00 | 13 | 00 |
| 2CFC0 | 14 | 25 | CC | 3C | 94 | 00 | FC | 00 | 24 | 00 | 22 | 00 | DC | 01 | 2E | 00 |
| 2CFD0 | 13 | 00 | 4A | 00 | 9C | 27 | 94 | 00 | 72 | 00 | 9C | 3C | 78 | 00 | 2A | 00 |
| 2CFE0 | 0B | 00 | 54 | 00 | 01 | 00 | F7 | 01 | 4F | 02 | FC | 00 | 8A | 3C | 26 | 00 |
| 2CFF0 | 26 | 00 | 9C | 3C | 8E | 00 | 9E | 00 | 24 | 00 | 8A | 3C | 1C | 25 | B4 | 00 |
| 2D000 | 8A | 3C | B8 | 09 | B0 | 00 | C8 | 00 | 2E | 00 | 2B | 00 | 24 | 00 | 50 | 25 |
| 2D010 | 88 | 00 | 24 | 00 | 54 | 26 | 88 | 00 | F2 | 00 | 0B | 00 | F2 | 00 | 0F | 00 |
| 2D020 | F2 | 00 | 13 | 00 | 14 | 25 | F2 | 38 | 94 | 00 | 7A | 00 | 54 | 00 | 01 | 00 |
| 2D030 | D7 | 01 | 45 | 02 | FC | 00 | F4 | 00 | 01 | 00 | 24 | 00 | E2 | 06 | 24 | 00 |
| 2D040 | 46 | 38 | 38 | 00 | 88 | 00 | D2 | 00 | 8A | 03 | 24 | 00 | A4 | 05 | 24 | 00 |
| 2D050 | 86 | 3C | 32 | 00 | 24 | 00 | A4 | 05 | 24 | 00 | 8A | 3C | 32 | 00 | F4 | 00 |
| 2D060 | 01 | 00 | 24 | 00 | E2 | 06 | 24 | 00 | 46 | 38 | 38 | 00 | 88 | 00 | D2 | 00 |
| 2D070 | 6C | 03 | FC | 00 | 24 | 00 | 86 | 3C | 5C | 25 | B4 | 00 | 2E | 00 | 0B | 00 |
| 2D080 | 54 | 00 | 01 | 00 | 25 | 01 | C9 | 00 | FC | 00 | 24 | 00 | 86 | 3C | 48 | 25 |
| 2D090 | AC | 00 | 2E | 00 | 0B | 00 | 54 | 00 | 01 | 00 | 05 | 03 | A9 | 02 | FC | 00 |
| 2D0A0 | 24 | 00 | 10 | 25 | 88 | 00 | 00 | 25 | F2 | 00 | 03 | 00 | 2C | 29 | 24 | 00 |
| 2D0B0 | 1C | 25 | 88 | 00 | 24 | 00 | 38 | 26 | 88 | 00 | F2 | 00 | 0B | 00 | F2 | 00 |
| 2D0C0 | 0F | 00 | F2 | 00 | 13 | 00 | 14 | 25 | E6 | 3C | 94 | 00 | 24 | 00 | 1C | 25 |
| 2D0D0 | 88 | 00 | 00 | 25 | FC | 00 | 24 | 00 | 0A | 26 | 88 | 00 | 24 | 00 | 10 | 25 |
| 2D0E0 | 88 | 00 | F2 | 00 | 0B | 00 | F2 | 00 | 0F | 00 | F2 | 00 | 13 | 00 | 14 | 25 |
| 2D0F0 | FC | 00 | 96 | 3C | 22 | 00 | 1E | 32 | 9E | 00 | 24 | 00 | 96 | 3C | 9C | 27 |
| 2D100 | AE | 00 | 2E | 00 | 21 | 00 | 24 | 00 | 10 | 25 | 88 | 00 | 00 | 25 | F2 | 00 |
| 2D110 | 03 | 00 | 2C | 29 | 24 | 00 | 1C | 25 | 88 | 00 | 00 | 25 | 54 | 00 | 01 | 00 |
| 2D120 | 01 | 00 | 15 | 00 | FC | 00 | 24 | 00 | 22 | 00 | 24 | 00 | E2 | 06 | 24 | 00 |
| 2D130 | 46 | 38 | 38 | 00 | 88 | 00 | D2 | 00 | 26 | 03 | 58 | 00 | 83 | 00 | FC | 00 |
| 2D140 | 24 | 00 | 50 | 25 | 88 | 00 | D2 | 00 | 24 | 00 | E2 | 06 | 24 | 00 | 46 | 38 |
| 2D150 | 38 | 00 | 88 | 00 | D2 | 00 | F4 | 00 | 01 | 00 | FE | 02 | 8E | 3C | 24 | 00 |
| 2D160 | 24 | 00 | A8 | 05 | 30 | 00 | 6A | 0A | C6 | 00 | 9E | 00 | FC | 00 | 24 | 00 |
| 2D170 | 8E | 3C | 48 | 25 | B4 | 00 | 2E | 00 | 11 | 00 | 24 | 00 | 8E | 3C | 94 | 00 |
| 2D180 | 54 | 00 | 01 | 00 | EF | 03 | EF | 02 | FC | 00 | 24 | 00 | 8E | 3C | 48 | 25 |
| 2D190 | AC | 00 | 2E | 00 | 07 | 00 | DE | 25 | 94 | 00 | FC | 00 | 24 | 00 | 8E | 3C |
| 2D1A0 | C0 | 26 | AC | 00 | 2E | 00 | 07 | 00 | C4 | 26 | 94 | 00 | FC | 00 | 24 | 00 |
| 2D1B0 | 8E | 3C | 38 | 26 | AC | 00 | 2E | 00 | 07 | 00 | CA | 26 | 94 | 00 | FC | 00 |
| 2D1C0 | 5A | 00 | FC | 00 | 54 | 00 | 01 | 00 | 21 | 03 | B3 | 02 | FC | 00 | 24 | 00 |
| 2D1D0 | 10 | 25 | 88 | 00 | 00 | 25 | F2 | 00 | 03 | 00 | 2C | 29 | 24 | 00 | 1C | 25 |
| 2D1E0 | 88 | 00 | 24 | 00 | AA | 25 | 88 | 00 | F2 | 00 | 0B | 00 | F2 | 00 | 0F | 00 |
| 2D1F0 | F2 | 00 | 13 | 00 | 14 | 25 | 22 | 3D | 94 | 00 | 24 | 00 | 1C | 25 | 88 | 00 |
| 2D200 | 00 | 25 | FC | 00 | 8E | 3C | 24 | 00 | 1C | 25 | 9E | 00 | 20 | 00 | 24 | 00 |
| 2D210 | 6A | 0A | 88 | 00 | 62 | 00 | 60 | 00 | 0D | 01 | FC | 00 | F4 | 00 | 01 | 00 |
| 2D220 | 24 | 00 | E2 | 06 | 24 | 00 | 46 | 38 | 38 | 00 | 88 | 00 | D2 | 00 | 8A | 03 |
| 2D230 | 24 | 00 | A4 | 05 | 24 | 00 | 86 | 3C | 32 | 00 | 24 | 00 | A4 | 05 | 24 | 00 |
| 2D240 | 8E | 3C | 32 | 00 | F4 | 00 | 01 | 00 | 24 | 00 | E2 | 06 | 24 | 00 | 46 | 38 |
| 2D250 | 38 | 00 | 88 | 00 | D2 | 00 | 6C | 03 | FC | 00 | 24 | 00 | 22 | 00 | DC | 01 |
| 2D260 | 2E | 00 | 09 | 00 | 02 | 00 | 2A | 00 | 0B | 00 | 24 | 00 | D2 | 2D | 88 | 00 |
| 2D270 | 5A | 01 | FC | 00 | 24 | 00 | 22 | 00 | 24 | 00 | E2 | 06 | 24 | 00 | 46 | 38 |
| 2D280 | 38 | 00 | 88 | 00 | D2 | 00 | 26 | 03 | 1C | 25 | AE | 00 | 2E | 00 | 0B | 00 |
| 2D290 | 3A | 3D | 94 | 00 | 7A | 00 | 02 | 00 | FC | 00 | F4 | 00 | 01 | 00 | 24 | 00 |
| 2D2A0 | E2 | 06 | 24 | 00 | 46 | 38 | 38 | 00 | 88 | 00 | D2 | 00 | 8A | 03 | 24 | 00 |
| 2D2B0 | A4 | 05 | 24 | 00 | 50 | 25 | 32 | 00 | F4 | 00 | 01 | 00 | 24 | 00 | E2 | 06 |
| 2D2C0 | 24 | 00 | 46 | 38 | 38 | 00 | 88 | 00 | D2 | 00 | 6C | 03 | FC | 00 | 24 | 00 |
| 2D2D0 | 24 | 00 | A8 | 05 | 30 | 00 | 6A | 0A | C6 | 00 | 8E | 3C | AC | 00 | 2E | 00 |
| 2D2E0 | 0B | 00 | 54 | 00 | 01 | 00 | 55 | 05 | 61 | 04 | FC | 00 | 92 | 3C | 26 | 00 |
| 2D2F0 | 92 | 3C | 1C | 25 | BA | 00 | 9E | 00 | 54 | 3D | 94 | 00 | 24 | 00 | 8E | 3C |
| 2D300 | 94 | 00 | 7C | 3A | 94 | 00 | 24 | 00 | 24 | 00 | AE | 05 | 30 | 00 | 6A | 0A |
| 2D310 | C6 | 00 | 94 | 00 | 58 | 0A | 94 | 00 | 7A | 00 | FC | 00 | 56 | 00 | 01 | 00 |
| 2D320 | 99 | 05 | B1 | 04 | FC | 00 | 5E | 00 | FC | 00 | 24 | 00 | 22 | 00 | DC | 01 |
| 2D330 | 2E | 00 | 2F | 00 | 96 | 3C | 6A | 00 | 1C | 25 | CE | 00 | 9E | 00 | 24 | 00 |
| 2D340 | 10 | 25 | 88 | 00 | 00 | 25 | F2 | 00 | 03 | 00 | 2C | 29 | 24 | 00 | 1C | 25 |
| 2D350 | 88 | 00 | 00 | 25 | 54 | 00 | 01 | 00 | 25 | 01 | C9 | 00 | 2A | 00 | 0B | 00 |
| 2D360 | 54 | 00 | 01 | 00 | 33 | 04 | F3 | 03 | FC | 00 | 24 | 00 | 10 | 25 | 88 | 00 |
| 2D370 | 00 | 25 | 24 | 00 | 1C | 25 | 88 | 00 | 24 | 00 | AE | 25 | 88 | 00 | F2 | 00 |

```
2D380   0B 00 F2 00 0F 00 F2 00 13 00 14 25 26 00 92 3C
2D390   94 00 5E 3D 94 00 24 00 1C 25 88 00 00 25 46 00
2D3A0   FC 00 02 00 03 00 2C 29 FC 00 24 00 50 25 88 00
2D3B0   00 00 24 00 50 25 88 00 D2 00 24 00 E2 06 24 00
2D3C0   46 38 38 00 1C 25 BA 00 88 00 D2 00 F4 00 01 00
2D3D0   FE 02 24 00 32 25 88 00 D2 00 24 00 E2 06 24 00
2D3E0   46 38 38 00 88 00 D2 00 F4 00 01 00 FE 02 FC 00
2D3F0   F2 00 03 00 2C 29 FC 00 F4 00 03 00 7E 3D 3A 03
2D400   FC 00 24 00 60 25 88 00 24 00 AA 36 88 00 F2 00
2D410   0B 00 F2 00 0F 00 F2 00 13 00 14 25 24 00 22 00
2D420   DC 01 2E 00 13 00 4A 00 9C 27 94 00 72 00 78 3D
2D430   78 00 2A 00 0B 00 54 00 01 00 51 00 C7 01 FC 00
2D440   6A 3D 26 00 28 00 78 3D 8E 00 9E 00 24 00 6A 3D
2D450   1C 25 B4 00 6A 3D C0 26 B0 00 C8 00 2E 00 05 00
2D460   02 00 FC 00 24 00 6A 3D C0 26 AC 00 2E 00 0B 00
2D470   54 00 01 00 01 00 51 00 FC 00 24 00 6A 3D 56 00
2D480   13 00 25 01 59 02 53 02 21 03 05 01 31 02 05 01
2D490   31 02 05 01 31 02 05 01 31 02 FB 02 E9 03 FB 02
2D4A0   E9 03 A5 03 B1 04 A5 03 B1 04 FC 00 54 00 01 00
2D4B0   3F 00 C9 00 FC 00 24 00 6A 3D 88 00 D2 00 24 00
2D4C0   E2 06 24 00 46 38 38 00 88 00 D2 00 F4 00 01 00
2D4D0   FE 02 46 00 FC 00 F2 00 03 00 2C 29 24 00 10 25
2D4E0   88 00 00 25 F2 00 03 00 2C 29 24 00 1C 25 88 00
2D4F0   24 00 AC 27 88 00 F2 00 0B 00 F2 00 0F 00 F2 00
2D500   13 00 14 25 54 3A 94 00 24 00 1C 25 88 00 00 25
2D510   FC 00 6E 3D 24 00 B4 09 9E 00 20 00 24 00 6A 0A
2D520   88 00 62 00 60 00 A1 00 FC 00 F4 00 01 00 24 00
2D530   E2 06 24 00 46 38 38 00 88 00 D2 00 8A 03 24 00
2D540   A4 05 24 00 6A 3D 32 00 24 00 A4 05 24 00 6E 3D
2D550   32 00 F4 00 01 00 24 00 E2 06 24 00 46 38 38 00
2D560   88 00 D2 00 6C 03 FC 00 24 00 50 25 88 00 D2 00
2D570   24 00 E2 06 24 00 46 38 38 00 88 00 D2 00 F4 00
2D580   01 00 FE 02 FC 00 24 00 24 00 A8 05 30 00 6A 0A
2D590   C6 00 6E 3D AC 00 2E 00 0B 00 54 00 01 00 17 02
2D5A0   D1 02 FC 00 6A 3A 94 00 24 00 6E 3D 94 00 7C 3A
2D5B0   94 00 24 00 24 00 A8 05 30 00 6A 0A C6 00 94 00
2D5C0   58 04 94 00 7A 00 FC 00 5E 00 FC 00 72 3D 22 00
2D5D0   1E 32 9E 00 24 00 72 3D 9C 27 AE 00 2E 00 1B 00
2D5E0   24 00 10 25 88 00 00 25 F2 00 03 00 2C 29 24 00
2D5F0   1C 25 88 00 00 25 46 00 FC 00 54 00 01 00 61 01
2D600   8B 02 FC 00 24 00 10 25 88 00 24 00 46 25 88 00
2D610   F2 00 0B 00 F2 00 0F 00 F2 00 13 00 14 25 FC 00
2D620   24 00 6A 3D 88 00 D2 00 24 00 E2 06 24 00 46 38
2D630   38 00 88 00 D2 00 F4 00 01 00 FE 02 24 00 D2 2D
2D640   88 00 5A 01 24 00 50 25 88 00 D2 00 24 00 E2 06
2D650   24 00 46 38 38 00 88 00 D2 00 F4 00 01 00 FE 02
2D660   FC 00 24 00 24 00 A8 05 30 00 1C 25 C6 00 2E 00
2D670   11 00 90 3A 94 00 7A 00 54 00 01 00 D9 02 67 03
2D680   FC 00 A2 3C 94 00 7A 00 FC 00 72 3D 22 00 1E 32
2D690   9E 00 24 00 72 3D 9C 27 AC 00 2E 00 0B 00 54 00
2D6A0   01 00 D9 02 67 03 FC 00 46 00 FC 00 24 00 6A 3D
2D6B0   88 00 D2 00 24 00 E2 06 24 00 46 38 38 00 88 00
2D6C0   D2 00 F4 00 01 00 FE 02 24 00 50 25 88 00 D2 00
2D6D0   24 00 E2 06 24 00 46 38 38 00 88 00 D2 00 F4 00
2D6E0   01 00 FE 02 FC 00 24 00 50 25 88 00 24 00 48 25
2D6F0   88 00 F2 00 0B 00 F2 00 0F 00 F2 00 13 00 14 25
2D700   FC 00 84 3D 94 00 24 00 6A 3D B2 25 EC 00 94 00
2D710   FC 00 24 00 24 00 A8 05 30 00 1C 25 C6 00 2E 00
2D720   0D 00 96 3D 94 00 7A 00 2A 00 09 00 A2 3D 94 00
2D730   7A 00 FC 00 72 3D 22 00 1E 32 9E 00 24 00 72 3D
2D740   9C 27 AC 00 2E 00 0B 00 54 00 01 00 83 03 4D 04
2D750   FC 00 46 00 FC 00 6E 3D 24 00 B4 09 9E 00 20 00
2D760   24 00 5C 25 88 00 62 00 60 00 DB 00 FC 00 F4 00
2D770   01 00 24 00 E2 06 24 00 46 38 38 00 E8 00 D2 00
2D780   8A 03 24 00 A4 05 24 00 6A 3D 32 00 24 00 A4 05
```

```
2D790   24 00 6E 3D 32 00 F4 00 01 00 24 00 E2 06 24 00
2D7A0   46 38 38 00 88 00 D2 00 6C 03 FC 00 24 00 D2 2D
2D7B0   88 00 5A 01 FC 00 24 00 22 00 24 00 E2 06 24 00
2D7C0   46 38 38 00 88 00 D2 00 26 03 1C 25 AE 00 2E 00
2D7D0   0B 00 3A 3D 94 00 7A 00 02 00 FC 00 F4 00 01 00
2D7E0   24 00 E2 06 24 00 46 38 38 00 88 00 D2 00 8A 03
2D7F0   24 00 A4 05 24 00 50 25 32 00 FC 00 24 00 24 00
2D800   A8 05 30 00 6A 0A C6 00 6E 3D AE 00 2E 00 21 00
2D810   6A 3A 94 00 24 00 6E 3D 94 00 7C 3A 94 00 24 00
2D820   24 00 A8 05 30 00 6A 0A C6 00 94 00 7A 00 FC 00
2D830   F4 00 01 00 24 00 E2 06 24 00 46 38 38 00 88 00
2D840   D2 00 6C 03 FC 00 5E 00 FC 00 72 3D 22 00 1E 32
2D850   9E 00 24 00 72 3D 9C 27 AE 00 2E 00 05 00 46 00
2D860   FC 00 54 00 01 00 A5 03 C5 04 FC 00 02 00 24 00
2D870   00 00 24 00 B4 09 88 00 D2 00 24 00 E2 06 24 00
2D880   46 38 38 00 1C 25 BA 00 88 00 D2 00 F4 00 01 00
2D890   FE 02 FC 00 F2 00 03 00 2C 29 FC 00 F4 00 03 00
2D8A0   C4 3D 3A 03 FC 00 24 00 38 26 88 00 24 00 F8 31
2D8B0   88 00 F2 00 0B 00 F2 00 0F 00 F2 00 13 00 14 25
2D8C0   24 00 22 00 DC 01 2E 00 11 00 BE 3D 6A 00 1C 25
2D8D0   CE 00 9E 00 2A 00 0B 00 54 00 01 00 35 00 A1 00
2D8E0   FC 00 B0 3D 26 00 28 00 BE 3D 8E 00 9E 00 24 00
2D8F0   B0 3D 1C 25 B4 00 B0 3D 54 25 B0 00 C8 00 2E 00
2D900   05 00 02 00 FC 00 24 00 B0 3D 54 25 AC 00 2E 00
2D910   0B 00 54 00 01 00 01 00 13 00 FC 00 24 00 B0 3D
2D920   56 00 07 00 CF 00 91 01 CF 00 91 01 07 01 59 02
2D930   39 03 21 03 FC 00 54 00 01 00 23 00 29 00 FC 00
2D940   24 00 B0 3D 32 25 AC 00 2E 00 0B 00 B0 3D 24 00
2D950   B4 09 9E 00 FC 00 24 00 B0 3D 88 00 D2 00 24 00
2D960   E2 06 24 00 46 38 38 00 88 00 D2 00 F4 00 01 00
2D970   FE 02 FC 00 46 00 FC 00 24 00 B0 3D 32 25 BC 00
2D980   88 00 D2 00 24 00 E2 06 24 00 46 38 38 00 1C 25
2D990   BA 00 88 00 D2 00 F4 00 01 00 FE 02 FC 00 24 00
2D9A0   6A 0A 88 00 24 00 36 25 88 00 F2 00 0B 00 F2 00
2D9B0   0F 00 F2 00 13 00 14 25 24 00 F4 3B 24 00 62 00
2D9C0   40 00 94 00 B4 3D 24 00 1C 25 9E 00 20 00 24 00
2D9D0   38 26 88 00 62 00 60 00 0D 00 24 00 F8 3B 24 00
2D9E0   62 00 40 00 94 00 5E 00 24 00 FC 3B 24 00 62 00
2D9F0   40 00 94 00 7A 00 FC 00 24 00 50 25 88 00 24 00
2DA00   36 25 88 00 F2 00 0B 00 F2 00 0F 00 F2 00 13 00
2DA10   14 25 24 00 D4 2B 24 00 62 00 40 00 94 00 CE 3D
2DA20   94 00 24 00 D4 2B 24 00 62 00 40 00 94 00 7A 00
2DA30   FC 00 24 00 A0 27 88 00 24 00 36 25 88 00 F2 00
2DA40   0B 00 F2 00 0F 00 F2 00 13 00 14 25 24 00 18 3C
2DA50   24 00 62 00 40 00 94 00 B4 3D 24 00 1C 25 9E 00
2DA60   20 00 24 00 38 26 88 00 62 00 60 00 0D 00 24 00
2DA70   F8 3B 24 00 62 00 40 00 94 00 5E 00 24 00 1C 3C
2DA80   24 00 62 00 40 00 94 00 7A 00 FC 00 24 00 3C 26
2DA90   88 00 24 00 36 25 88 00 F2 00 0B 00 F2 00 0F 00
2DAA0   F2 00 13 00 14 25 24 00 D4 2B 24 00 62 00 40 00
2DAB0   94 00 7A 00 24 00 3C 26 88 00 24 00 38 2E 88 00
2DAC0   F2 00 0B 00 F2 00 0F 00 F2 00 13 00 14 25 24 00
2DAD0   D4 2B 24 00 62 00 40 00 94 00 7A 00 FC 00 24 00
2DAE0   0A 26 88 00 24 00 36 25 88 00 F2 00 0B 00 F2 00
2DAF0   0F 00 F2 00 13 00 14 25 24 00 44 3C 24 00 62 00
2DB00   40 00 94 00 B4 3D 24 00 1C 25 9E 00 20 00 24 00
2DB10   38 26 88 00 62 00 60 00 0D 00 24 00 F8 3B 24 00
2DB20   62 00 40 00 94 00 5E 00 24 00 56 36 24 00 62 00
2DB30   40 00 94 00 7A 00 FC 00 24 00 3C 26 88 00 24 00
2DB40   54 26 88 00 F2 00 0B 00 F2 00 0F 00 F2 00 13 00
2DB50   14 25 FC 00 24 00 22 00 24 00 E2 06 24 00 46 38
2DB60   38 00 1C 25 BA 00 88 00 D2 00 26 03 1C 25 AC 00
2DB70   2E 00 0D 00 DE 3D 94 00 7A 00 2A 00 09 00 E8 3D
2DB80   94 00 7A 00 FC 00 B8 3D 22 00 1E 32 9E 00 24 00
2DB90   B8 30 53 0A AC 00 2E 00 09 00 46 00 2A 00 0B 00
```

| | | | | | | | | | | | | | | | | |
|---|---|---|---|---|---|---|---|---|---|---|---|---|---|---|---|---|
| 2DBA0 | 54 | 00 | 01 | 00 | 15 | 03 | BD | 02 | FC | 00 | 24 | 00 | 6A | 0A | 88 | 00 |
| 2DBB0 | 24 | 00 | A6 | 25 | 88 | 00 | F2 | 00 | 0B | 00 | F2 | 00 | 0F | 00 | F2 | 00 |
| 2DBC0 | 13 | 00 | 14 | 25 | 24 | 00 | F4 | 3B | 24 | 00 | 62 | 00 | 40 | 00 | 94 | 00 |
| 2DBD0 | B4 | 3D | 24 | 00 | 1C | 25 | 9E | 00 | 20 | 00 | 24 | 00 | A4 | 27 | 88 | 00 |
| 2DBE0 | 62 | 00 | 60 | 00 | 0D | 00 | 24 | 00 | F8 | 3B | 24 | 00 | 62 | 00 | 40 | 00 |
| 2DBF0 | 94 | 00 | 5E | 00 | 24 | 00 | FC | 3B | 24 | 00 | 62 | 00 | 40 | 00 | 94 | 00 |
| 2DC00 | 7A | 00 | FC | 00 | 24 | 00 | 50 | 25 | 88 | 00 | 24 | 00 | A6 | 25 | 88 | 00 |
| 2DC10 | F2 | 00 | 0B | 00 | F2 | 00 | 0F | 00 | F2 | 00 | 13 | 00 | 14 | 25 | 24 | 00 |
| 2DC20 | D4 | 2B | 24 | 00 | 62 | 00 | 40 | 00 | 94 | 00 | F2 | 3D | 94 | 00 | 24 | 00 |
| 2DC30 | D4 | 2B | 24 | 00 | 62 | 00 | 40 | 00 | 94 | 00 | 7A | 00 | FC | 00 | 24 | 00 |
| 2DC40 | A0 | 27 | 88 | 00 | 24 | 00 | A6 | 25 | 88 | 00 | F2 | 00 | 0B | 00 | F2 | 00 |
| 2DC50 | 0F | 00 | F2 | 00 | 13 | 00 | 14 | 25 | 24 | 00 | 18 | 3C | 24 | 00 | 62 | 00 |
| 2DC60 | 40 | 00 | 94 | 00 | B4 | 3D | 24 | 00 | 1C | 25 | 9E | 00 | 20 | 00 | 24 | 00 |
| 2DC70 | A4 | 27 | 88 | 00 | 62 | 00 | 60 | 00 | 0D | 00 | 24 | 00 | F8 | 3B | 24 | 00 |
| 2DC80 | 62 | 00 | 40 | 00 | 94 | 00 | 5E | 00 | 24 | 00 | 1C | 3C | 24 | 00 | 62 | 00 |
| 2DC90 | 40 | 00 | 94 | 00 | 7A | 00 | FC | 00 | B4 | 3D | 24 | 00 | B4 | 09 | 9E | 00 |
| 2DCA0 | 20 | 00 | 24 | 00 | 10 | 25 | 88 | 00 | 62 | 00 | 60 | 00 | BB | 00 | FC | 00 |
| 2DCB0 | 24 | 00 | B0 | 3D | 32 | 25 | BC | 00 | 88 | 00 | D2 | 0C | 24 | 00 | E2 | 06 |
| 2DCC0 | 24 | 00 | 46 | 38 | 38 | 00 | 1C | 25 | BA | 00 | 88 | 00 | D2 | 00 | F4 | 00 |
| 2DCD0 | 01 | 00 | FE | 02 | FC | 00 | 24 | 00 | 24 | 00 | A8 | 05 | 30 | 00 | 32 | 25 |
| 2DCE0 | B4 | 3D | E2 | 00 | C6 | 00 | B4 | 09 | B0 | 00 | 2E | 00 | 0D | 00 | BE | 3D |
| 2DCF0 | 10 | 3E | 9E | 00 | 2A | 00 | 09 | 00 | BE | 3D | 18 | 3E | 9E | 00 | FC | 00 |
| 2DD00 | 24 | 00 | A0 | 27 | B4 | 3D | BA | 00 | 1C | 25 | BA | 00 | 89 | 00 | 24 | 00 |
| 2DD10 | A6 | 25 | 88 | 00 | F2 | 00 | 0B | 00 | F2 | 00 | 0F | 00 | F2 | 00 | 13 | 00 |
| 2DD20 | 14 | 25 | 24 | 00 | D4 | 2B | 24 | 00 | 62 | 00 | 40 | 00 | 94 | 00 | 24 | 00 |
| 2DD30 | A0 | 27 | B4 | 3D | BA | 00 | 1C | 25 | BA | 00 | 88 | 00 | 24 | 00 | 68 | 25 |
| 2DD40 | 88 | 00 | F2 | 00 | 0B | 00 | F2 | 00 | 0F | 00 | F2 | 00 | 13 | 00 | 14 | 25 |
| 2DD50 | BE | 3D | 94 | 00 | 58 | 0A | 94 | 00 | 24 | 00 | D4 | 2B | 24 | 00 | 62 | 00 |
| 2DD60 | 40 | 00 | 94 | 00 | 7A | 00 | FC | 00 | 5E | 00 | FC | 00 | 24 | 00 | A4 | 27 |
| 2DD70 | 88 | 00 | 24 | 00 | A6 | 25 | 88 | 00 | F2 | 00 | 0B | 00 | F2 | 00 | 0F | 00 |
| 2DD80 | F2 | 00 | 13 | 00 | 14 | 25 | 24 | 00 | 44 | 3C | 24 | 00 | 62 | 00 | 40 | 00 |
| 2DD90 | 94 | 00 | B4 | 3D | 24 | 00 | 1C | 25 | 9E | 00 | 20 | 00 | 24 | 00 | A4 | 27 |
| 2DDA0 | 88 | 00 | 62 | 00 | 60 | 00 | 0D | 00 | 24 | 00 | F8 | 3B | 24 | 00 | 62 | 00 |
| 2DDB0 | 40 | 00 | 94 | 00 | 5E | 00 | 24 | 00 | 56 | 36 | 24 | 00 | 62 | 00 | 40 | 00 |
| 2DDC0 | 94 | 00 | 7A | 00 | FC | 00 | 56 | 00 | 01 | 00 | 83 | 05 | E9 | 03 | FC | 00 |
| 2DDD0 | 24 | 00 | 22 | 00 | DC | 01 | 2E | 00 | 13 | 00 | B8 | 3D | 6A | 00 | 1C | 25 |
| 2DDE0 | CE | 00 | 9E | 00 | 46 | 00 | 2A | 00 | 0B | 00 | 54 | 00 | 01 | 00 | 39 | 03 |
| 2DDF0 | 21 | 03 | FC | 00 | 24 | 00 | 3C | 26 | 88 | 00 | 24 | 00 | 86 | 27 | 88 | 00 |
| 2DE00 | F2 | 00 | 0B | 00 | F2 | 00 | 0F | 00 | F2 | 00 | 13 | 00 | 14 | 25 | 20 | 3E |
| 2DE10 | 94 | 00 | 7A | 00 | FC | 00 | 24 | 00 | 0A | 26 | 88 | 00 | 24 | 00 | 86 | 27 |
| 2DE20 | 88 | 00 | F2 | 00 | 0B | 00 | F2 | 00 | 0F | 00 | F2 | 00 | 13 | 00 | 14 | 25 |
| 2DE30 | 2C | 3E | 94 | 00 | 7A | 00 | FC | 00 | 24 | 00 | 52 | 27 | 88 | 00 | 24 | 00 |
| 2DE40 | 86 | 27 | 88 | 00 | F2 | 00 | 0B | 00 | F2 | 00 | 0F | 00 | F2 | 00 | 13 | 00 |
| 2DE50 | 14 | 25 | 3C | 3E | 94 | 00 | 7A | 00 | FC | 00 | 24 | 00 | AA | 25 | 88 | 00 |
| 2DE60 | 24 | 00 | 86 | 27 | 88 | 00 | F2 | 00 | 0B | 00 | F2 | 00 | 0F | 00 | F2 | 00 |
| 2DE70 | 13 | 00 | 14 | 25 | 4A | 3E | 94 | 00 | 7A | 00 | FC | 00 | 46 | 00 | FC | 00 |
| 2DE80 | 02 | 00 | F2 | 00 | 0B | 00 | F2 | 00 | 0F | 00 | F2 | 00 | 13 | 00 | 14 | 25 |
| 2DE90 | 00 | 00 | F2 | 00 | 03 | 00 | 2C | 29 | FC | 00 | F4 | 00 | 03 | 00 | 6A | 3E |
| 2DEA0 | 3A | 03 | FC | 00 | 24 | 00 | C0 | 26 | 88 | 00 | 24 | 00 | 0A | 28 | 88 | 00 |
| 2DEB0 | F2 | 00 | 0B | 00 | F2 | 00 | 0F | 00 | F2 | 00 | 13 | 00 | 14 | 25 | 24 | 00 |
| 2DEC0 | 22 | 00 | DC | 01 | 2E | 00 | 11 | 00 | 64 | 3E | 6A | 00 | 1C | 25 | CE | 00 |
| 2DED0 | 9E | 00 | 2A | 00 | 0B | 00 | 54 | 00 | 01 | 00 | 13 | 00 | 8D | 00 | FC | 00 |
| 2DEE0 | 38 | 3E | 26 | 00 | 28 | 00 | 64 | 3E | 8E | 00 | 9E | 00 | FC | 00 | 24 | 00 |
| 2DEF0 | 58 | 3E | 1C | 25 | B4 | 00 | 58 | 3E | 10 | 25 | B0 | 00 | C8 | 00 | 2E | 00 |
| 2DF00 | 05 | 00 | 02 | 00 | FC | 00 | 24 | 00 | 58 | 3E | 1C | 25 | AC | 00 | 2E | 00 |
| 2DF10 | 0F | 00 | 0E | 02 | 64 | 3E | 6A | 00 | 1C | 25 | CE | 00 | 9E | 00 | FC | 00 |
| 2DF20 | 24 | 00 | 58 | 3E | 56 | 00 | 05 | 00 | DF | 01 | BD | 02 | AF | 00 | 91 | 01 |
| 2DF30 | E3 | 01 | 21 | 03 | FC | 00 | 54 | 00 | 01 | 00 | 01 | 00 | 15 | 00 | FC | 00 |
| 2DF40 | F4 | 00 | 03 | 00 | 76 | 3E | 3A | 03 | FC | 00 | 24 | 00 | 6A | 0A | 88 | 00 |
| 2DF50 | 24 | 00 | 44 | 26 | 88 | 00 | F2 | 00 | 09 | 00 | F2 | 00 | 0F | 00 | F2 | 00 |
| 2DF60 | 13 | 00 | 14 | 25 | 24 | 00 | 22 | 00 | DC | 01 | 2E | 00 | 11 | 00 | 64 | 3E |
| 2DF70 | 6A | 00 | 1C | 25 | CE | 00 | 9E | 00 | 2A | 00 | 0B | 00 | 54 | 00 | 01 | 00 |
| 2DF80 | B9 | 00 | 45 | 02 | FC | 00 | 58 | 3E | 26 | 00 | 28 | 00 | 64 | 3E | 8E | 00 |
| 2DF90 | 9E | 00 | 24 | 00 | 58 | 3E | B4 | 09 | B4 | 00 | 58 | 3E | EC | 25 | B0 | 00 |
| 2DFA0 | C8 | 00 | 2E | 00 | 05 | 00 | 46 | 00 | FC | 00 | 24 | 00 | A0 | 27 | 88 | 00 |

| | | | | | | | | | | | | | | | | |
|---|---|---|---|---|---|---|---|---|---|---|---|---|---|---|---|---|
| 2DFB0 | 24 | 00 | 3C | 2E | 88 | 00 | F2 | 00 | 0B | 00 | F2 | 00 | 0F | 00 | F2 | 00 |
| 2DFC0 | 13 | 00 | 14 | 25 | 82 | 3E | 94 | 00 | FC | 00 | 4A | 00 | 9C | 27 | 94 | 00 |
| 2DFD0 | 72 | 00 | 64 | 3E | 78 | 00 | 5C | 3E | 26 | 00 | 28 | 00 | 64 | 3E | 8E | 00 |
| 2DFE0 | 9E | 00 | 24 | 00 | 5C | 3E | B4 | 09 | B4 | 00 | 5C | 3E | F6 | 2B | B0 | 00 |
| 2DFF0 | C8 | 00 | 2E | 00 | 28 | 00 | 24 | 00 | A0 | 27 | 88 | 00 | 24 | 00 | 56 | 28 |
| 2E000 | 88 | 00 | F2 | 00 | 0B | 00 | F2 | 00 | 0F | 00 | F2 | 00 | 13 | 00 | 14 | 25 |
| 2E010 | F2 | 38 | 94 | 00 | 7A | 00 | 54 | 00 | 01 | 00 | 19 | 01 | 6D | 02 | FC | 00 |
| 2E020 | F4 | 00 | 07 | 00 | 24 | 00 | 5C | 3E | 88 | 00 | D2 | 00 | 24 | 00 | 58 | 3E |
| 2E030 | 88 | 00 | D2 | 00 | 0A | 01 | FC | 00 | 24 | 00 | 22 | 00 | DC | 01 | 2E | 00 |
| 2E040 | 27 | 00 | 64 | 3E | 6A | 00 | 1C | 25 | CE | 00 | 9E | 00 | F4 | 00 | 09 | 00 |
| 2E050 | 24 | 00 | 5C | 3E | 88 | 00 | D2 | 00 | 24 | 00 | 58 | 3E | 88 | 00 | D2 | 00 |
| 2E060 | 0A | 01 | 2A | 00 | 0B | 00 | 54 | 00 | 01 | 00 | A7 | 01 | A9 | 02 | FC | 00 |
| 2E070 | 46 | 00 | FC | 00 | 24 | 00 | 32 | 25 | 88 | 00 | D2 | 00 | 24 | 00 | 1C | 25 |
| 2E080 | 88 | 00 | D2 | 00 | F4 | 00 | 01 | 00 | FE | 02 | 24 | 00 | B8 | 09 | 88 | 00 |
| 2E090 | D2 | 00 | 24 | 00 | 1C | 25 | 88 | 00 | D2 | 00 | F4 | 00 | 01 | 00 | FE | 02 |
| 2E0A0 | FC | 00 | F4 | 00 | 05 | 00 | 24 | 00 | 64 | 25 | 88 | 00 | D2 | 00 | F2 | 00 |
| 2E0B0 | 07 | 00 | F4 | 00 | 01 | 00 | F2 | 00 | 0F | 00 | 78 | 01 | F4 | 00 | 05 | 00 |
| 2E0C0 | 24 | 00 | 64 | 25 | 88 | 00 | D2 | 00 | 24 | 00 | B4 | 09 | 88 | 00 | D2 | 00 |
| 2E0D0 | F4 | 00 | 03 | 00 | F2 | 00 | 0F | 00 | 78 | 01 | FC | 00 | 60 | 3E | 24 | 00 |
| 2E0E0 | B4 | 09 | 9E | 00 | 20 | 00 | 24 | 00 | 64 | 25 | 88 | 00 | 62 | 00 | 60 | 00 |
| 2E0F0 | 41 | 00 | FC | 00 | F4 | 00 | 03 | 00 | 24 | 00 | 64 | 25 | 88 | 00 | D2 | 00 |
| 2E100 | 24 | 00 | 60 | 3E | 88 | 00 | D2 | 00 | F4 | 00 | 01 | 00 | F2 | 00 | 0F | 00 |
| 2E110 | 78 | 01 | F4 | 00 | 03 | 00 | 24 | 00 | 64 | 25 | 88 | 00 | D2 | 00 | 24 | 00 |
| 2E120 | 60 | 3E | 88 | 00 | D2 | 00 | F4 | 00 | 03 | 00 | F2 | 00 | 0F | 00 | 78 | 01 |
| 2E130 | FC | 00 | 5E | 00 | FC | 00 | F4 | 00 | 07 | 00 | 24 | 00 | 1C | 25 | 88 | 00 |
| 2E140 | D2 | 00 | F2 | 00 | 07 | 00 | F4 | 00 | 01 | 00 | F2 | 00 | 0F | 00 | 78 | 01 |
| 2E150 | F4 | 00 | 07 | 00 | 24 | 00 | 1C | 25 | 88 | 00 | D2 | 00 | 24 | 00 | B4 | 09 |
| 2E160 | 58 | 00 | D2 | 00 | F4 | 00 | 03 | 00 | F2 | 00 | 0F | 00 | 78 | 01 | FC | 00 |
| 2E170 | 24 | 00 | 54 | 25 | 88 | 00 | D2 | 00 | 24 | 00 | 1C | 25 | 88 | 00 | D2 | 00 |
| 2E180 | F4 | 00 | 01 | 00 | FE | 02 | 24 | 00 | 1C | 25 | 88 | 00 | D2 | 00 | 24 | 00 |
| 2E190 | B4 | 09 | 88 | 00 | D2 | 00 | F4 | 00 | 03 | 00 | FE | 02 | FC | 00 | 60 | 3E |
| 2E1A0 | 24 | 00 | 1C | 25 | 9E | 00 | 20 | 00 | 24 | 00 | A2 | 30 | 68 | 00 | 24 | 00 |
| 2E1B0 | 32 | 25 | 88 | 00 | 60 | 00 | 2D | 00 | FC | 00 | 24 | 00 | A4 | 05 | 24 | 00 |
| 2E1C0 | A2 | 25 | 32 | 00 | 24 | 00 | A4 | 05 | 24 | 00 | B4 | 09 | 32 | 00 | 24 | 00 |
| 2E1D0 | A4 | 05 | 24 | 00 | 10 | 25 | 32 | 00 | 24 | 00 | A4 | 05 | 24 | 00 | 60 | 3E |
| 2E1E0 | 32 | 00 | FC | 00 | 5E | 00 | F4 | 00 | 01 | 00 | 24 | 00 | 1C | 25 | 88 | 00 |
| 2E1F0 | D2 | 00 | 6C | 03 | 24 | 00 | B8 | 09 | 38 | 00 | D2 | 00 | 24 | 00 | 1C | 25 |
| 2E200 | 88 | 00 | D2 | 00 | F4 | 00 | 01 | 00 | FE | 02 | FC | 00 | 46 | 00 | FC | 00 |
| 2E210 | 02 | 00 | 38 | 00 | 24 | 00 | A6 | 25 | 88 | 00 | F2 | 00 | 0B | 00 | F2 | 00 |
| 2E220 | 00 | 00 | F2 | 00 | 03 | 00 | 2C | 29 | F2 | 00 | 03 | 00 | F2 | 00 | 07 | 00 |
| 2E230 | 24 | 00 | B4 | 09 | 88 | 00 | F2 | 00 | 0F | 00 | F2 | 00 | 13 | 00 | 14 | 25 |
| 2E240 | FC | 00 | F4 | 00 | 03 | 00 | BC | 3E | 3A | 03 | FC | 00 | 9A | 3E | 24 | 00 |
| 2E250 | 50 | 25 | 9E | 00 | 56 | 00 | 01 | 00 | 51 | 03 | 21 | 03 | 24 | 00 | 10 | 25 |
| 2E260 | 88 | 00 | 24 | 00 | EA | 27 | 88 | 00 | F2 | 00 | 0B | 00 | F2 | 00 | 0F | 00 |
| 2E270 | F2 | 00 | 13 | 00 | 14 | 25 | 24 | 00 | 24 | 00 | A8 | 05 | 30 | 00 | 6A | 0A |
| 2E280 | C6 | 00 | 94 | 00 | FC | 00 | 9A | 3E | 24 | 00 | 50 | 25 | 9E | 00 | 56 | 00 |
| 2E290 | 01 | 00 | 71 | 03 | 85 | 03 | 24 | 00 | 10 | 25 | 88 | 00 | 24 | 00 | 28 | 30 |
| 2E2A0 | 88 | 00 | F2 | 00 | 0B | 00 | F2 | 00 | 0F | 00 | F2 | 00 | 13 | 00 | 14 | 25 |
| 2E2B0 | 24 | 00 | 24 | 00 | A8 | 05 | 30 | 00 | 6A | 0A | C6 | 00 | 94 | 00 | FC | 00 |
| 2E2C0 | 24 | 00 | 38 | 26 | 88 | 00 | 24 | 00 | 02 | 2A | 88 | 00 | F2 | 00 | 0B | 00 |
| 2E2D0 | F2 | 00 | 0F | 00 | F2 | 00 | 13 | 00 | 14 | 25 | 24 | 00 | 22 | 00 | DC | 01 |
| 2E2E0 | 2E | 00 | 11 | 00 | B6 | 3E | 6A | 00 | 1C | 25 | CE | 00 | 9E | 00 | 2A | 00 |
| 2E2F0 | 0B | 00 | 54 | 00 | 01 | 00 | 9F | 00 | DD | 00 | FC | 00 | 9E | 3E | 26 | 00 |
| 2E300 | 23 | 00 | B6 | 3E | 8E | 00 | 9E | 00 | FC | 00 | 24 | 00 | 9E | 3E | 1C | 25 |
| 2E310 | B4 | 00 | 9E | 3E | B8 | 09 | B0 | 00 | C8 | 00 | 2E | 00 | 05 | 00 | 02 | 00 |
| 2E320 | FC | 00 | 24 | 00 | 9E | 3E | B8 | 09 | AC | 00 | 2E | 00 | 1B | 00 | 9A | 3E |
| 2E330 | 24 | 00 | A0 | 27 | 9E | 00 | 56 | 00 | 01 | 00 | 51 | 03 | 21 | 03 | 54 | 00 |
| 2E340 | 01 | 00 | 01 | 00 | 15 | 00 | FC | 00 | 58 | 00 | 17 | 02 | FC | 00 | 24 | 00 |
| 2E350 | 58 | 25 | 88 | 00 | 24 | 00 | 70 | 25 | 88 | 00 | F2 | 00 | 0B | 00 | F2 | 00 |
| 2E360 | 0F | 00 | F2 | 00 | 13 | 00 | 14 | 25 | C4 | 3E | 94 | 00 | FC | 00 | 24 | 00 |
| 2E370 | 22 | 00 | DC | 01 | 2E | 00 | 13 | 00 | 4A | 00 | 9C | 27 | 94 | 00 | 72 | 00 |
| 2E380 | AA | 3E | 78 | 00 | 2A | 00 | 0B | 00 | 54 | 00 | 01 | 00 | 4D | 01 | 5F | 01 |
| 2E390 | FC | 00 | 24 | 00 | AA | 3E | A0 | 00 | 5C | 25 | B0 | 00 | 9E | 3E | 1C | 25 |
| 2E3A0 | AC | 00 | C6 | 00 | 2E | 00 | 2B | 00 | 24 | 00 | 58 | 25 | 88 | 00 | 24 | 00 |
| 2E3B0 | BE | 25 | 88 | 00 | F2 | 00 | 0B | 00 | F2 | 00 | 0F | 00 | F2 | 00 | 13 | 00 |

```
2E3C0   14 25 E0 3E 94 00 7A 00 54 00 01 00 2D 01 55 01
2E3D0   FC 00 24 00 58 25 88 00 24 00 70 25 88 00 F2 00
2E3E0   0B 00 F2 00 0F 00 F2 00 13 00 14 25 F8 3E 94 00
2E3F0   FC 00 24 00 58 25 88 00 24 00 4E 27 88 00 F2 00
2E400   0B 00 F2 00 0F 00 F2 00 13 00 14 25 24 00 22 00
2E410   DC 01 2E 00 11 00 B6 3E 6A 00 1C 25 CE 00 9E 00
2E420   2A 00 0B 00 54 00 01 00 D1 01 7D 01 FC 00 A6 3E
2E430   26 00 28 00 B6 3E 8E 00 9E 00 FC 00 58 00 21 01
2E440   FC 00 24 00 9E 3E 88 00 D2 00 24 00 E2 06 24 00
2E450   46 38 38 00 88 00 D2 00 F4 00 03 00 FE 02 FC 00
2E460   AA 3E 24 00 E2 06 24 00 46 38 38 00 88 00 D2 00
2E470   F2 00 07 00 08 03 FC 00 58 00 C9 00 FC 00 9A 3E
2E480   24 00 50 25 9E 00 56 00 01 00 51 03 21 03 24 00
2E490   10 25 88 00 24 00 EA 27 88 00 F2 00 0B 00 F2 00
2E4A0   0F 00 F2 00 13 00 14 25 24 00 24 00 A8 05 30 00
2E4B0   6A 0A C6 00 94 00 7A 00 FC 00 24 00 50 25 88 00
2E4C0   24 00 70 25 88 00 F2 00 0B 00 F2 00 0F 00 F2 00
2E4D0   13 00 14 25 FC 00 A2 3E 24 00 1C 25 9E 00 20 00
2E4E0   24 00 AA 3E A0 00 88 00 62 00 60 00 19 00 FC 00
2E4F0   28 00 AA 3E 24 00 A2 3E 24 00 1C 25 D6 00 94 00
2E500   58 0A 94 00 FC 00 5E 00 FC 00 B0 3E 22 00 1E 32
2E510   9E 00 24 00 B0 3E 9C 27 AE 00 2E 00 05 00 02 00
2E520   FC 00 9A 3E 24 00 50 25 9E 00 56 00 01 00 51 03
2E530   21 03 FC 00 24 00 24 00 A8 05 30 00 6A 0A C6 00
2E540   B4 09 AE 00 5C 00 FC 00 24 00 B0 3E 9C 27 AE 00
2E550   2E 00 05 00 02 00 FC 00 24 00 A6 3E B4 09 AC 00
2E560   5C 00 FC 00 5A 00 FC 00 54 00 01 00 01 00 15 00
2E570   FC 00 24 00 9A 3E 88 00 D2 00 24 00 E2 06 24 00
2E580   46 38 38 00 88 00 D2 00 F4 00 01 00 FE 02 46 00
2E590   FC 00 24 00 9A 3E 88 00 D2 00 24 00 E2 06 24 00
2E5A0   46 38 38 00 1C 25 BA 00 88 00 D2 00 F4 00 01 00
2E5B0   FE 02 46 00 FC 00 02 00 B4 00 5C 3E F6 2B B0 00
2E5C0   00 00 24 00 50 25 88 00 D2 00 24 00 E2 06 24 00
2E5D0   46 38 38 00 88 00 D2 00 F4 00 01 00 FE 02 FC 00
2E5E0   F2 00 03 00 2C 29 F4 00 03 00 3A 3F 3A 03 FC 00
2E5F0   24 00 58 25 88 00 24 00 14 27 88 00 F2 00 0B 00
2E600   F2 00 0F 00 F2 00 13 00 14 25 24 00 22 00 DC 01
2E610   2E 00 13 00 4A 00 9C 27 94 00 72 00 34 3F 78 00
2E620   2A 00 0B 00 54 00 01 00 2F 00 C9 00 FC 00 26 3F
2E630   26 00 28 00 34 3F 8E 00 9E 00 24 00 26 3F 1C 25
2E640   B4 00 26 3F 58 25 B0 00 C8 00 2E 00 0B 00 54 00
2E650   01 00 1F 00 1F 00 FC 00 24 00 26 3F 60 25 AC 00
2E660   2E 00 0B 00 54 00 01 00 01 00 15 00 FC 00 24 00
2E670   26 3F 58 25 AC 00 2E 00 05 00 02 00 FC 00 24 00
2E680   26 3F 56 00 17 00 01 01 91 01 01 01 91 01 27 01
2E690   59 02 27 01 59 02 4D 01 21 03 4D 01 21 03 73 01
2E6A0   E9 03 73 01 E9 03 99 01 4D 04 99 01 4D 04 55 02
2E6B0   B1 04 71 04 79 05 FC 00 54 00 01 00 1F 00 1F 00
2E6C0   FC 00 24 00 26 3F 10 25 BA 00 88 00 D2 00 24 00
2E6D0   E2 06 24 00 46 38 38 00 88 00 D2 00 F4 00 01 00
2E6E0   FE 02 FC 00 46 00 FC 00 24 00 26 3F 10 25 BC 00
2E6F0   88 00 D2 00 24 00 E2 06 24 00 46 38 38 00 88 00
2E700   D2 00 F4 00 01 00 FE 02 FC 00 46 00 FC 00 24 00
2E710   26 3F 1C 25 BA 00 88 00 D2 00 24 00 E2 06 24 00
2E720   46 38 38 00 88 00 D2 00 F4 00 01 00 FE 02 FC 00
2E730   46 00 FC 00 24 00 26 3F 54 25 BC 00 88 00 D2 00
2E740   24 00 E2 06 24 00 46 38 38 00 88 00 D2 00 F4 00
2E750   01 00 FE 02 FC 00 46 00 FC 00 24 00 26 3F 88 00
2E760   D2 00 24 00 E2 06 24 00 46 38 38 00 88 00 D2 00
2E770   F4 00 01 00 FE 02 24 00 26 3F 88 00 D2 00 24 00
2E780   E2 06 24 00 46 38 38 00 88 00 D2 00 F4 00 01 00
2E790   FE 02 FC 00 24 00 24 00 A8 05 30 00 26 3F 40 25
2E7A0   BC 00 C6 00 B4 09 B0 00 2E 00 0D 00 34 3F 60 3C
2E7B0   9E 00 2A 00 09 00 34 3F 68 3C 9E 00 FC 00 24 00
2E7C0   A0 27 88 00 24 00 A4 27 88 00 F2 00 0B 00 F2 00
```

```
2E7D0   0F 00 F2 00 13 00 14 25 44 3F 94 00 24 00 26 3F
2E7E0   4C 25 BC 00 94 00 58 0A 94 00 34 3F 94 00 7A 00
2E7F0   FC 00 2E 3F 22 00 1E 32 9E 00 24 00 2E 3F 58 0A
2E800   AC 00 2E 00 09 00 46 00 2A 00 0B 00 54 00 01 00
2E810   31 02 75 04 FC 00 24 00 50 25 88 00 24 00 36 25
2E820   88 00 F2 00 0B 00 F2 00 0F 00 F2 00 13 00 14 25
2E830   24 00 F4 3B 24 00 62 00 40 00 94 00 2A 3F 24 00
2E840   1C 25 9E 00 20 00 24 00 38 26 88 00 62 00 60 00
2E850   0D 00 24 00 F8 3B 24 00 62 00 40 00 94 00 5E 00
2E860   24 00 FC 3B 24 00 62 00 40 00 94 00 7A 00 FC 00
2E870   24 00 A0 27 88 00 24 00 36 25 88 00 F2 00 0B 00
2E880   F2 00 0F 00 F2 00 13 00 14 25 24 00 D4 2B 24 00
2E890   62 00 40 00 94 00 5A 3F 94 00 24 00 D4 2B 24 00
2E8A0   62 00 40 00 94 00 7A 00 FC 00 24 00 3C 26 88 00
2E8B0   24 00 36 25 88 00 F2 00 0B 00 F2 00 0F 00 F2 00
2E8C0   13 00 14 25 24 00 18 3C 24 00 62 00 40 00 94 00
2E8D0   2A 3F 24 00 1C 25 9E 00 20 00 24 00 38 26 88 00
2E8E0   62 00 60 00 0D 00 24 00 F8 3B 24 00 62 00 40 00
2E8F0   94 00 5E 00 24 00 1C 3C 24 00 62 00 40 00 94 00
2E900   7A 00 FC 00 24 00 C0 26 88 00 D2 00 24 00 E2 06
2E910   24 00 46 38 38 00 88 00 D2 00 F4 00 01 00 FE 02
2E920   FC 00 2A 3F 24 00 1C 25 9E 00 20 00 24 00 32 25
2E930   88 00 62 00 60 00 79 00 FC 00 24 00 24 00 A8 05
2E940   30 00 2A 3F C6 00 B4 09 B0 00 2E 00 0D 00 34 3F
2E950   10 3E 9E 00 2A 00 09 00 34 3F 18 3E 9E 00 FC 00
2E960   24 00 3C 26 2A 3F BA 00 88 00 24 00 36 25 88 00
2E970   F2 00 0B 00 F2 00 0F 00 F2 00 13 00 14 25 24 00
2E980   D4 2B 24 00 62 00 40 00 94 00 6A 3F 94 00 24 00
2E990   2A 3F 94 00 8A 3A 94 00 34 3F 94 00 58 0A 94 00
2E9A0   24 00 D4 2B 24 00 62 00 40 00 94 00 7A 00 FC 00
2E9B0   5E 00 FC 00 24 00 AA 25 88 00 24 00 36 25 88 00
2E9C0   F2 00 0B 00 F2 00 0F 00 F2 00 13 00 14 25 24 00
2E9D0   44 3C 24 00 62 00 40 00 94 00 2A 3F 24 00 1C 25
2E9E0   9E 00 20 00 24 00 38 26 88 00 62 00 60 00 0D 00
2E9F0   24 00 F8 3B 24 00 62 00 40 00 94 00 5E 00 24 00
2EA00   56 36 24 00 62 00 40 00 94 00 7A 00 FC 00 2E 3F
2EA10   22 00 1E 32 9E 00 24 00 2E 3F 58 0A AC 00 2E 00
2EA20   09 00 46 00 2A 00 0B 00 54 00 01 00 55 02 B1 04
2EA30   FC 00 24 00 50 25 88 00 24 00 A6 25 88 00 F2 00
2EA40   0B 00 F2 00 0F 00 F2 00 13 00 14 25 24 00 F4 3B
2EA50   24 00 62 00 40 00 94 00 2A 3F 24 00 1C 25 9E 00
2EA60   20 00 24 00 A4 27 88 00 62 00 60 00 0D 00 24 00
2EA70   F8 3B 24 00 62 00 40 00 94 00 5E 00 24 00 FC 3B
2EA80   24 00 62 00 40 00 94 00 7A 00 FC 00 24 00 A0 27
2EA90   88 00 24 00 A6 25 88 00 F2 00 0B 00 F2 00 0F 00
2EAA0   F2 00 13 00 14 25 24 00 D4 2B 24 00 62 00 40 00
2EAB0   94 00 F2 3D 94 00 24 00 D4 2B 24 00 62 00 40 00
2EAC0   94 00 7A 00 FC 00 24 00 3C 26 88 00 24 00 A6 25
2EAD0   88 00 F2 00 0B 00 F2 00 0F 00 F2 00 13 00 14 25
2EAE0   24 00 18 3C 24 00 62 00 40 00 94 00 2A 3F 24 00
2EAF0   1C 25 9E 00 20 00 24 00 A4 27 88 00 62 00 60 00
2EB00   0D 00 24 00 F8 3B 24 00 62 00 40 00 94 00 5E 00
2EB10   24 00 1C 3C 24 00 62 00 40 00 94 00 7A 00 FC 00
2EB20   24 3F 24 00 1C 25 9E 00 20 00 24 00 32 25 88 00
2EB30   62 00 60 00 3B 01 FC 00 24 00 B4 09 88 00 D2 00
2EB40   24 00 E2 06 24 00 46 38 38 00 1C 25 BA 00 88 00
2EB50   D2 00 F4 00 01 00 FE 02 FC 00 24 00 24 00 A8 05
2EB60   30 00 2A 3F C6 00 B4 09 B0 00 2E 00 0D 00 34 3F
2EB70   10 3E 9E 00 2A 00 09 00 34 3F 18 3E 9E 00 FC 00
2EB80   24 00 3C 26 2A 3F BA 00 88 00 24 00 A6 25 88 00
2EB90   F2 00 0B 00 F2 00 0F 00 F2 00 13 00 14 25 24 00
2EBA0   D4 2B 24 00 62 00 40 00 94 00 72 3F 94 00 24 00
2EBB0   2A 3F 94 00 7A 3F 94 00 34 3F 94 00 58 0A 94 00
2EBC0   24 00 D4 2B 24 00 62 00 40 00 94 00 7A 00 FC 00
2EBD0   24 00 B4 09 88 00 D2 00 24 00 E2 06 24 00 46 38
```

| | | | | | | | | | | | | | | | | |
|---|---|---|---|---|---|---|---|---|---|---|---|---|---|---|---|---|
| 2EBE0 | 38 | 00 | 1C | 25 | BA | 00 | 88 | 00 | D2 | 00 | F4 | 00 | 01 | 00 | FE | 02 |
| 2EBF0 | FC | 00 | 24 | 00 | 24 | 00 | A8 | 05 | 30 | 00 | 2A | 3F | B8 | 09 | BE | 00 |
| 2EC00 | C6 | 00 | B4 | 09 | B0 | 00 | 2E | 00 | 0D | 00 | 34 | 3F | 10 | 3E | 9E | 00 |
| 2EC10 | 2A | 00 | 09 | 00 | 34 | 3F | 18 | 3E | 9E | 00 | FC | 00 | 24 | 00 | 3C | 26 |
| 2EC20 | 2A | 3F | BA | 00 | 32 | 25 | BA | 00 | 88 | 00 | 24 | 00 | A6 | 25 | 88 | 00 |
| 2EC30 | F2 | 00 | 0B | 00 | F2 | 00 | 0F | 00 | F2 | 00 | 13 | 00 | 14 | 25 | 24 | 00 |
| 2EC40 | D4 | 2B | 24 | 00 | 62 | 00 | 40 | 00 | 94 | 00 | 8C | 3F | 94 | 00 | 24 | 00 |
| 2EC50 | 2A | 3F | 94 | 00 | 8A | 37 | 94 | 00 | 34 | 3F | 94 | 00 | 58 | 0A | 94 | 00 |
| 2EC60 | 24 | 00 | D4 | 2B | 24 | 00 | 62 | 00 | 40 | 00 | 94 | 00 | 7A | 00 | FC | 00 |
| 2EC70 | 5E | 00 | FC | 00 | 24 | 00 | A6 | 25 | 88 | 00 | 24 | 00 | A6 | 25 | 88 | 00 |
| 2EC80 | F2 | 00 | 0B | 00 | F2 | 00 | 0F | 00 | F2 | 00 | 13 | 00 | 14 | 25 | 24 | 00 |
| 2EC90 | 44 | 3C | 24 | 00 | 62 | 00 | 40 | 00 | 94 | 00 | 2A | 3F | 24 | 00 | 1C | 25 |
| 2ECA0 | 9E | 00 | 20 | 00 | 24 | 00 | A4 | 27 | 88 | 00 | 62 | 00 | 60 | 00 | 0D | 00 |
| 2ECB0 | 24 | 00 | F8 | 3B | 24 | 00 | 62 | 00 | 40 | 00 | 94 | 00 | 5E | 00 | 24 | 00 |
| 2ECC0 | 56 | 36 | 24 | 00 | 62 | 00 | 40 | 00 | 94 | 00 | 7A | 00 | FC | 00 | 2E | 3F |
| 2ECD0 | 22 | 00 | 1E | 32 | 9E | 00 | 24 | 00 | 2E | 3F | 58 | 0A | AC | 00 | 2E | 00 |
| 2ECE0 | 09 | 00 | 46 | 00 | 2A | 00 | 0B | 00 | 54 | 00 | 01 | 00 | 71 | 04 | 79 | 05 |
| 2ECF0 | FC | 00 | 02 | 00 | 88 | 00 | D2 | 00 | F4 | 00 | 01 | 00 | FE | 02 | FC | 00 |
| 2ED00 | 00 | 00 | F4 | 00 | 03 | 00 | 24 | 00 | B4 | 09 | 88 | 00 | 24 | 00 | B4 | 09 |
| 2ED10 | 88 | 00 | 24 | 00 | AC | 27 | 88 | 00 | 24 | 00 | 8E | 2D | 88 | 00 | 3C | 07 |
| 2ED20 | 98 | 2D | FC | 00 | F4 | 00 | 03 | 00 | 24 | 00 | B8 | 09 | 88 | 00 | 24 | 00 |
| 2ED30 | B8 | 09 | 88 | 00 | 24 | 00 | 6C | 25 | 88 | 00 | 24 | 00 | A0 | 27 | 88 | 00 |
| 2ED40 | 24 | 00 | 1C | 30 | 88 | 00 | F4 | 00 | 03 | 00 | F4 | 00 | 03 | 00 | F4 | 00 |
| 2ED50 | 11 | 00 | F4 | 00 | 01 | 00 | 4C | 39 | F4 | 00 | 03 | 00 | 24 | 00 | B8 | 09 |
| 2ED60 | 88 | 00 | F2 | 00 | 07 | 00 | B4 | 3F | 24 | 00 | B8 | 09 | 88 | 00 | 00 | 25 |
| 2ED70 | FC | 00 | F4 | 00 | 03 | 00 | BC | 3F | 3A | 03 | FC | 00 | A8 | 3F | 22 | 00 |
| 2ED80 | 1E | 32 | 9E | 00 | 24 | 00 | A8 | 3F | 9C | 27 | AC | 00 | 2E | 00 | 0B | 00 |
| 2ED90 | 54 | 00 | 01 | 00 | 78 | 00 | 05 | 01 | FC | 00 | 26 | 00 | 28 | 00 | A8 | 3F |
| 2EDA0 | 8E | 00 | B4 | 09 | AC | 00 | 84 | 00 | 58 | 00 | 49 | 00 | FC | 00 | 24 | 00 |
| 2EDB0 | 1C | 25 | 88 | 00 | 00 | 25 | FC | 00 | F4 | 00 | 03 | 00 | 24 | 00 | B4 | 09 |
| 2EDC0 | 88 | 00 | 24 | 00 | B4 | 09 | 88 | 00 | 24 | 00 | AC | 27 | 88 | 00 | 24 | 00 |
| 2EDD0 | 8E | 2D | 88 | 00 | 3C | 07 | 86 | 2D | FC | 00 | 24 | 00 | B8 | 09 | 88 | 00 |
| 2EDE0 | F4 | 00 | 05 | 00 | F4 | 00 | 01 | 00 | C8 | 3F | FC | 00 | 24 | 00 | 32 | 25 |
| 2EDF0 | 02 | 00 | FC | 00 | 5A | 00 | FC | 00 | 9C | 3F | 26 | 00 | 28 | 00 | A8 | 3F |
| 2EE00 | 8E | 00 | 9E | 00 | FC | 00 | 24 | 00 | 9C | 3F | 56 | 00 | 0F | 00 | 39 | 01 |
| 2EE10 | CD | 01 | 39 | 01 | CD | 01 | DD | 06 | 79 | 05 | 0B | 03 | 49 | 03 | F9 | 01 |
| 2EE20 | 6D | 02 | 9B | 08 | 41 | 06 | 71 | 06 | 9D | 04 | AD | 06 | C5 | 04 | FC | 00 |
| 2EE30 | 54 | 00 | 01 | 00 | 71 | 00 | 79 | 00 | FC | 00 | F2 | 00 | 03 | 00 | 2C | 29 |
| 2EE40 | FC | 00 | 24 | 00 | 10 | 25 | 88 | 00 | 24 | 00 | 10 | 25 | 88 | 00 | F2 | 00 |
| 2EE50 | 0B | 00 | F2 | 00 | 0F | 00 | F2 | 00 | 13 | 00 | 14 | 25 | D0 | 3F | 94 | 00 |
| 2EE60 | FC | 00 | 4A | 00 | 68 | 00 | 72 | 00 | AE | 3F | 78 | 00 | A0 | 3F | 26 | 00 |
| 2EE70 | 28 | 00 | AE | 3F | 8E | 00 | 9E | 00 | FC | 00 | 24 | 00 | 54 | 25 | 88 | 00 |
| 2EE80 | 24 | 00 | 10 | 25 | 88 | 00 | F2 | 00 | 0B | 00 | F2 | 00 | 0F | 00 | F2 | 00 |
| 2EE90 | 13 | 00 | 14 | 25 | E4 | 3F | 94 | 00 | FC | 00 | 4A | 00 | 68 | 00 | 72 | 00 |
| 2EEA0 | AE | 3F | 78 | 00 | A4 | 3F | 26 | 00 | 28 | 00 | AE | 3F | 8E | 00 | 9E | 00 |
| 2EEB0 | FC | 00 | 24 | 00 | 9C | 3F | 1C | 25 | AC | 00 | 2E | 00 | 1D | 00 | F4 | 00 |
| 2EEC0 | 03 | 00 | 24 | 00 | A0 | 3F | 88 | 00 | D2 | 00 | 24 | 00 | A4 | 3F | 88 | 00 |
| 2EED0 | D2 | 00 | 0A | 01 | 2A | 00 | 19 | 00 | F4 | 00 | 05 | 00 | 24 | 00 | A0 | 3F |
| 2EEE0 | 88 | 00 | D2 | 00 | 24 | 00 | A4 | 3F | 88 | 00 | D2 | 00 | 0A | 01 | FC | 00 |
| 2EEF0 | F2 | 00 | 03 | 00 | 2C | 29 | 46 | 00 | FC | 00 | F2 | 00 | 03 | 00 | 2C | 29 |
| 2EF00 | FC | 00 | 24 | 00 | B8 | 09 | 88 | 00 | 24 | 00 | 54 | 25 | 88 | 00 | F2 | 00 |
| 2EF10 | 0B | 00 | F2 | 00 | 0F | 00 | F2 | 00 | 13 | 00 | 14 | 25 | F6 | 3F | 94 | 00 |
| 2EF20 | 7A | 00 | FC | 00 | 24 | 00 | 54 | 25 | 88 | 00 | 24 | 00 | 54 | 25 | 88 | 00 |
| 2EF30 | F2 | 00 | 0B | 00 | F2 | 00 | 0F | 00 | F2 | 00 | 13 | 00 | 14 | 25 | 08 | 40 |
| 2EF40 | 94 | 00 | 7A | 00 | FC | 00 | A8 | 3F | 22 | 00 | 1E | 32 | 9E | 00 | FC | 00 |
| 2EF50 | 24 | 00 | A8 | 3F | 58 | 0A | AC | 00 | 2E | 00 | 0B | 00 | F2 | 00 | 03 | 00 |
| 2EF60 | 2C | 29 | 46 | 00 | FC | 00 | 9C | 3F | 26 | 00 | 28 | 00 | A8 | 3F | 8E | 00 |
| 2EF70 | 9E | 00 | 24 | 00 | 9C | 3F | 1C | 25 | B4 | 00 | 9C | 3F | 32 | 25 | B0 | 00 |
| 2EF80 | C8 | 00 | 2E | 00 | 0B | 00 | 54 | 00 | 01 | 00 | 45 | 02 | BD | 02 | FC | 00 |
| 2EF90 | F2 | 00 | 03 | 00 | 2C | 29 | 24 | 00 | B8 | 09 | 88 | 00 | 24 | 00 | 54 | 25 |
| 2EFA0 | 88 | 00 | F2 | 00 | 0B | 00 | F2 | 00 | 0F | 00 | F2 | 00 | 13 | 00 | 14 | 25 |
| 2EFB0 | 1C | 40 | 94 | 00 | FC | 00 | 4A | 00 | 68 | 00 | 72 | 00 | AE | 3F | 78 | 00 |
| 2EFC0 | A0 | 3F | 26 | 00 | 28 | 00 | AE | 3F | 8E | 00 | 9E | 00 | FC | 00 | 24 | 00 |
| 2EFD0 | 9C | 3F | 1C | 25 | AC | 00 | 2E | 00 | 15 | 00 | F4 | 00 | 01 | 00 | 24 | 00 |
| 2EFE0 | A0 | 3F | 88 | 00 | D2 | 00 | 8A | 03 | 2A | 00 | 11 | 00 | F4 | 00 | 01 | 00 |

```
2EFF0   24 00 A0 3F 68 00 D2 00 6C 03 FC 00 F2 00 03 00
2F000   2C 29 54 00 01 00 01 02 95 02 FC 00 F2 00 03 00
2F010   2C 29 24 00 B8 09 88 00 24 00 B8 09 88 00 F2 00
2F020   0B 00 F2 00 0F 00 F2 00 13 00 14 25 2E 40 94 00
2F030   7A 00 FC 00 24 00 10 25 88 00 24 00 B8 09 88 00
2F040   F2 00 0B 00 F2 00 0F 00 F2 00 13 00 14 25 44 40
2F050   94 00 FC 00 4A 00 68 00 72 00 AE 3F 78 00 24 00
2F060   28 00 28 00 AE 3F 24 00 1C 25 D4 00 C0 00 7A 26
2F070   AC 00 2E 00 0F 00 54 00 01 00 E9 03 D5 03 2A 00
2F080   0F 00 A4 3F 26 00 28 00 AE 3F 8E 00 9E 00 FC 00
2F090   24 00 B2 25 88 00 24 00 54 25 88 00 F2 00 0B 00
2F0A0   F2 00 0F 00 F2 00 13 00 14 25 56 40 94 00 24 00
2F0B0   22 00 24 00 A4 3F 68 00 D2 00 26 03 94 00 7A 00
2F0C0   FC 00 A8 3F 22 00 1E 32 9E 00 24 00 A8 3F 58 0A
2F0D0   AC 00 2E 00 0B 00 F2 00 03 00 2C 29 46 00 FC 00
2F0E0   54 00 01 00 8F 03 99 03 FC 00 24 00 B2 25 88 00
2F0F0   24 00 B8 09 88 00 F2 00 0B 00 F2 00 0F 00 F2 00
2F100   13 00 14 25 4A 00 62 40 94 00 72 00 AE 3F 78 00
2F110   FC 00 A4 3F 26 00 28 00 AE 3F 8E 00 9E 00 24 00
2F120   A4 3F 1C 25 B4 00 A4 3F 10 25 B0 00 C8 00 2E 00
2F130   0B 00 54 00 01 00 E9 03 D5 03 FC 00 A4 3F 24 00
2F140   A4 3F 1C 25 BC 00 9E 00 FC 00 F4 00 03 00 24 00
2F150   32 25 88 00 24 00 58 25 88 00 24 00 52 27 88 00
2F160   24 00 AA 25 88 00 24 00 44 26 88 00 F4 00 11 00
2F170   F4 00 03 00 F4 00 03 00 F4 00 01 00 4C 39 F4 00
2F180   03 00 24 00 32 25 88 00 F2 00 07 00 B4 3F FC 00
2F190   24 00 32 25 88 00 00 25 FC 00 A0 3F 24 00 B4 09
2F1A0   9E 00 20 00 24 00 C0 26 88 00 62 00 60 00 A1 00
2F1B0   24 00 1C 25 88 00 24 00 A0 3F 10 25 BE 00 1C 25
2F1C0   BA 00 88 00 F2 00 0B 00 F2 00 0F 00 F2 00 13 00
2F1D0   14 25 24 00 EC 25 88 00 F2 00 07 00 F2 00 0B 00
2F1E0   F2 00 0F 00 F2 00 13 00 24 37 24 00 A0 3F A4 3F
2F1F0   AC 27 BE 00 BA 00 94 00 7A 00 FC 00 24 00 32 25
2F200   88 00 24 00 A0 3F 10 25 BE 00 1C 25 BA 00 88 00
2F210   F2 00 0B 00 F2 00 0F 00 F2 00 13 00 14 25 24 00
2F220   6A 0A 88 00 F2 00 07 00 F2 00 0B 00 F2 00 0F 00
2F230   F2 00 13 00 24 37 24 00 22 00 24 00 A0 3F A4 3F
2F240   AC 27 BE 00 BA 00 88 00 D2 00 26 03 94 00 7A 00
2F250   5E 00 FC 00 A0 3F 24 00 38 26 9E 00 20 00 24 00
2F260   A6 25 88 00 62 00 60 00 A9 00 24 00 B8 09 88 00
2F270   24 00 A0 3F 38 26 BC 00 10 25 BE 00 1C 25 BA 00
2F280   88 00 F2 00 0B 00 F2 00 0F 00 F2 00 13 00 14 25
2F290   24 00 EC 25 88 00 F2 00 07 00 F2 00 0B 00 F2 00
2F2A0   0F 00 F2 00 13 00 24 37 24 00 A0 3F A4 3F AC 27
2F2B0   BE 00 BA 00 94 00 7A 00 FC 00 24 00 54 25 88 00
2F2C0   24 00 A0 3F 38 26 BC 00 10 25 BE 00 1C 25 BA 00
2F2D0   88 00 F2 00 0B 00 F2 00 0F 00 F2 00 13 00 14 25
2F2E0   24 00 6A 0A 88 00 F2 00 07 00 F2 00 0B 00 F2 00
2F2F0   0F 00 F2 00 13 00 24 37 24 00 22 00 24 00 A0 3F
2F300   A4 3F AC 27 BE 00 BA 00 88 00 D2 00 26 03 94 00
2F310   7A 00 5E 00 FC 00 A8 3F 22 00 1E 32 9E 00 24 00
2F320   A8 3F 58 0A AE 00 2E 00 0B 00 54 00 01 00 99 04
2F330   11 04 FC 00 F4 00 03 00 24 00 B4 09 88 00 24 00
2F340   B4 09 88 00 24 00 AC 27 88 00 24 00 8E 2D 88 00
2F350   3C 07 86 2D FC 00 24 00 B8 09 88 00 00 25 24 00
2F360   32 25 88 00 F4 00 05 00 F4 00 01 00 C8 3F 46 00
2F370   FC 00 24 00 1C 25 88 00 00 25 22 02 F4 00 03 00
2F380   24 00 B4 09 88 00 24 00 B4 09 88 00 24 00 AC 27
2F390   88 00 24 00 8E 2D 88 00 3C 07 86 2D 24 00 B8 09
2F3A0   88 00 00 25 F2 00 03 00 2C 29 46 00 FC 00 24 00
2F3B0   10 25 88 00 00 25 F2 00 03 00 2C 29 FC 00 78 40
2F3C0   94 00 FC 00 F4 00 03 00 C8 01 F2 00 03 00 2C 29
2F3D0   24 00 B8 09 88 00 00 25 FC 00 46 00 FC 00 F2 00
2F3E0   03 00 2C 29 24 00 10 25 88 00 24 00 B2 25 88 00
2F3F0   F2 00 0B 00 F2 00 0F 00 F2 00 13 00 14 25 B8 40
```

| | | | | | | | | | | | | | | | | |
|---|---|---|---|---|---|---|---|---|---|---|---|---|---|---|---|---|
| 2F400 | 94 | 00 | 7A | 00 | FC | 00 | A0 | 3F | 24 | 00 | 24 | 00 | A8 | 05 | 30 | 00 |
| 2F410 | 64 | 25 | C6 | 00 | 9E | 00 | FC | 00 | 24 | 00 | 54 | 25 | 88 | 00 | 24 | 00 |
| 2F420 | 5C | 25 | 88 | 00 | F2 | 00 | 0B | 00 | F2 | 00 | 0F | 00 | F2 | 00 | 13 | 00 |
| 2F430 | 14 | 25 | 24 | 00 | A0 | 3F | 94 | 00 | 7A | 00 | FC | 00 | 56 | 00 | 01 | 00 |
| 2F440 | 31 | 0B | F1 | 05 | FC | 00 | A8 | 3F | 22 | 00 | 1E | 32 | 9E | 00 | 24 | 00 |
| 2F450 | A8 | 3F | 58 | 0A | AC | 00 | 2E | 00 | 0B | 00 | F2 | 00 | 03 | 00 | 2C | 29 |
| 2F460 | 46 | 00 | FC | 00 | 24 | 00 | A8 | 3F | CA | 40 | AC | 00 | A8 | 3F | D0 | 40 |
| 2F470 | AC | 00 | C8 | 00 | 2E | 00 | 2D | 00 | 24 | 00 | 54 | 25 | 88 | 00 | 24 | 00 |
| 2F480 | 54 | 25 | 88 | 00 | F2 | 00 | 0B | 00 | F2 | 00 | 0F | 00 | F2 | 00 | 13 | 00 |
| 2F490 | 14 | 25 | 8A | 37 | 94 | 00 | 24 | 00 | A0 | 3F | 94 | 00 | 20 | 2D | 94 | 00 |
| 2F4A0 | 7A | 00 | FC | 00 | 24 | 00 | A8 | 3F | D6 | 40 | AC | 00 | A8 | 3F | DC | 40 |
| 2F4B0 | AC | 00 | C8 | 00 | 2E | 00 | 2B | 00 | 24 | 00 | 54 | 25 | 88 | 00 | 24 | 00 |
| 2F4C0 | 54 | 25 | 88 | 00 | F2 | 00 | 0B | 00 | F2 | 00 | 0F | 00 | F2 | 00 | 13 | 00 |
| 2F4D0 | 14 | 25 | 22 | 00 | 24 | 00 | A0 | 3F | 88 | 00 | E2 | 40 | 94 | 00 | 7A | 00 |
| 2F4E0 | FC | 00 | 24 | 00 | A8 | 3F | 4A | 2D | AC | 00 | A8 | 3F | 2C | 30 | AC | 00 |
| 2F4F0 | C8 | 00 | 2E | 00 | 33 | 00 | 24 | 00 | 54 | 25 | 88 | 00 | 24 | 00 | 54 | 25 |
| 2F500 | 88 | 00 | F2 | 00 | 0B | 00 | F2 | 00 | 0F | 00 | F2 | 00 | 13 | 00 | 14 | 25 |
| 2F510 | 8A | 37 | 94 | 00 | 22 | 00 | 24 | 00 | A0 | 3F | 88 | 00 | 20 | 30 | 94 | 00 |
| 2F520 | 20 | 2D | 94 | 00 | 7A | 00 | FC | 00 | 54 | 00 | 01 | 00 | 45 | 07 | A1 | 05 |
| 2F530 | FC | 00 | 24 | 00 | 4C | 25 | 88 | 00 | 24 | 00 | 4C | 25 | 8E | 00 | F2 | 00 |
| 2F540 | 0B | 00 | F2 | 00 | 0F | 00 | F2 | 00 | 13 | 00 | 14 | 25 | EA | 40 | 94 | 00 |
| 2F550 | 7A | 00 | FC | 00 | 24 | 00 | 5C | 25 | 88 | 00 | 24 | 00 | 4C | 25 | 88 | 00 |
| 2F560 | F2 | 00 | 0B | 00 | F2 | 00 | 0F | 00 | F2 | 00 | 13 | 00 | 14 | 25 | FA | 40 |
| 2F570 | 94 | 00 | 7A | 00 | FC | 00 | 24 | 00 | 48 | 25 | 88 | 00 | 24 | 00 | 4C | 25 |
| 2F580 | 88 | 00 | F2 | 00 | 0B | 00 | F2 | 00 | 0F | 00 | F2 | 00 | 13 | 00 | 14 | 25 |
| 2F590 | 06 | 41 | 94 | 00 | 7A | 00 | FC | 00 | 46 | 00 | FC | 00 | F2 | 00 | 03 | 00 |
| 2F5A0 | 2C | 29 | 24 | 00 | 10 | 25 | 88 | 00 | 24 | 00 | 32 | 25 | 8E | 00 | F2 | 00 |
| 2F5B0 | 0B | 00 | F2 | 00 | 0F | 00 | F2 | 00 | 13 | 00 | 14 | 25 | 14 | 41 | 94 | 00 |
| 2F5C0 | FC | 00 | 4A | 00 | 68 | 00 | 72 | 00 | AE | 3F | 78 | 00 | A0 | 3F | 26 | 00 |
| 2F5D0 | 28 | 00 | AE | 3F | 8E | 00 | 9E | 00 | FC | 00 | 24 | 00 | A4 | 05 | 24 | 00 |
| 2F5E0 | A0 | 3F | 32 | 00 | FC | 00 | F2 | 00 | 03 | 00 | 2C | 29 | 46 | 00 | FC | 00 |
| 2F5F0 | 02 | 00 | F2 | 00 | 0F | 00 | F2 | 00 | 13 | 00 | 14 | 25 | 2E | 40 | 94 | 00 |
| 2F600 | 00 | 00 | F2 | 00 | 03 | 00 | 2C | 29 | 24 | 00 | B4 | 09 | 88 | 00 | D2 | 00 |
| 2F610 | 24 | 00 | E2 | 06 | 24 | 00 | 46 | 38 | 38 | 00 | 88 | 00 | D2 | 00 | F4 | 00 |
| 2F620 | 01 | 00 | FE | 02 | FC | 00 | F4 | 00 | 03 | 00 | 62 | 41 | 3A | 03 | FC | 00 |
| 2F630 | 24 | 00 | C0 | 26 | 88 | 00 | 24 | 00 | 02 | 2A | 88 | 00 | F2 | 00 | 0B | 00 |
| 2F640 | F2 | 00 | 0F | 00 | F2 | 00 | 13 | 00 | 14 | 25 | 24 | 00 | 22 | 00 | DC | 01 |
| 2F650 | 2E | 00 | 11 | 00 | 5C | 41 | 6A | 00 | 1C | 25 | CE | 00 | 9E | 00 | 2A | 00 |
| 2F660 | 0B | 00 | 54 | 00 | 01 | 00 | 2F | 00 | 51 | 00 | FC | 00 | 2C | 41 | 26 | 00 |
| 2F670 | 28 | 00 | 5C | 41 | 8E | 00 | 9E | 00 | 24 | 00 | 2C | 41 | 1C | 25 | B4 | 00 |
| 2F680 | 2C | 41 | 10 | 25 | B0 | 00 | C8 | 00 | 2E | 00 | 05 | 00 | 02 | 00 | FC | 00 |
| 2F690 | 24 | 00 | C0 | 26 | 88 | 00 | 24 | 00 | 52 | 27 | 88 | 00 | F2 | 00 | 0B | 00 |
| 2F6A0 | F2 | 00 | 0F | 00 | F2 | 00 | 13 | 00 | 14 | 25 | 6E | 41 | 94 | 00 | FC | 00 |
| 2F6B0 | 24 | 00 | 22 | 00 | DC | 01 | 2E | 00 | 11 | 00 | 5C | 41 | 6A | 00 | 1C | 25 |
| 2F6C0 | CE | 00 | 9E | 00 | 2A | 00 | 0B | 00 | 54 | 00 | 01 | 00 | AF | 00 | 81 | 00 |
| 2F6D0 | FC | 00 | 34 | 41 | 26 | 00 | 28 | 00 | 5C | 41 | 8E | 00 | 9E | 00 | 24 | 00 |
| 2F6E0 | 34 | 41 | 1C | 25 | B4 | 00 | 34 | 41 | 32 | 25 | B0 | 00 | C8 | 00 | 2E | 00 |
| 2F6F0 | 28 | 00 | 24 | 00 | C0 | 26 | 88 | 00 | 24 | 00 | AE | 25 | 88 | 00 | F2 | 00 |
| 2F700 | 0B | 00 | F2 | 00 | 0F | 00 | F2 | 00 | 13 | 00 | 14 | 25 | F2 | 38 | 94 | 00 |
| 2F710 | 7A | 00 | 54 | 00 | 01 | 00 | 8F | 00 | 79 | 00 | FC | 00 | 24 | 00 | 2C | 41 |
| 2F720 | 56 | 00 | 05 | 00 | 3B | 01 | C9 | 00 | BD | 03 | 91 | 01 | BD | 04 | 59 | 02 |
| 2F730 | FC | 00 | 54 | 00 | 01 | 00 | 01 | 00 | 15 | 00 | FC | 00 | F2 | 00 | 03 | 00 |
| 2F740 | 2C | 29 | FC | 00 | 16 | 00 | 25 | 00 | 24 | 00 | B8 | 09 | 88 | 00 | 24 | 00 |
| 2F750 | 52 | 27 | 88 | 00 | F2 | 00 | 0B | 00 | F2 | 00 | 0F | 00 | F2 | 00 | 13 | 00 |
| 2F760 | 14 | 25 | 8E | 41 | 94 | 00 | 7A | 00 | F8 | 00 | FC | 00 | 24 | 00 | B2 | 25 |
| 2F770 | 88 | 00 | 24 | 00 | 52 | 27 | 88 | 00 | F2 | 00 | 0B | 00 | F2 | 00 | 0F | 00 |
| 2F780 | F2 | 00 | 13 | 00 | 14 | 25 | A6 | 41 | 94 | 00 | FC | 00 | 4A | 00 | 58 | 0A |
| 2F790 | 94 | 00 | 72 | 00 | 5C | 41 | 78 | 00 | 30 | 41 | 26 | 00 | 28 | 00 | 5C | 41 |
| 2F7A0 | 8E | 00 | 9E | 00 | FC | 00 | 24 | 00 | 4C | 25 | 88 | 00 | 24 | 00 | 52 | 27 |
| 2F7B0 | 88 | 00 | F2 | 00 | 0B | 00 | F2 | 00 | 0F | 00 | F2 | 00 | 13 | 00 | 14 | 25 |
| 2F7C0 | C6 | 41 | 94 | 00 | 7A | 00 | FC | 00 | 24 | 00 | 5C | 25 | 88 | 00 | 24 | 00 |
| 2F7D0 | 52 | 27 | 88 | 00 | F2 | 00 | 0B | 00 | F2 | 00 | 0F | 00 | F2 | 00 | 13 | 00 |
| 2F7E0 | 14 | 25 | EA | 41 | 94 | 00 | 7A | 00 | FC | 00 | 24 | 00 | 48 | 25 | 88 | 00 |
| 2F7F0 | 24 | 00 | 52 | 27 | 88 | 00 | F2 | 00 | 0B | 00 | F2 | 00 | 0F | 00 | F2 | 00 |
| 2F800 | 13 | 00 | 14 | 25 | 12 | 42 | 94 | 00 | 7A | 00 | FC | 00 | 24 | 00 | C0 | 26 |

```
2F810   88 00 24 00 52 27 88 00 F2 00 0B 00 F2 00 0F 00
2F820   F2 00 13 00 14 25 3A 42 94 00 7A 00 FC 00 24 00
2F830   38 26 88 00 24 00 52 27 88 00 F2 00 0B 00 F2 00
2F840   0F 00 F2 00 13 00 14 25 5C 42 94 00 7A 00 FC 00
2F850   24 00 B4 09 88 00 D2 00 24 00 E2 06 24 00 46 38
2F860   38 00 88 00 D2 00 F4 00 01 00 FE 02 FC 00 F4 00
2F870   01 00 24 00 E2 06 24 00 46 38 38 00 88 00 D2 00
2F880   8A 03 24 00 A4 05 24 00 34 41 32 00 FC 00 24 00
2F890   A4 05 24 00 30 41 32 00 FC 00 F4 00 01 00 24 00
2F8A0   E2 06 24 00 46 38 38 00 88 00 D2 00 6C 03 FC 00
2F8B0   24 00 B2 25 88 00 24 00 6A 30 88 00 F2 00 0B 00
2F8C0   F2 00 0F 00 F2 00 13 00 14 25 7A 42 94 00 7A 00
2F8D0   FC 00 24 00 B8 09 88 00 24 00 52 27 88 00 F2 00
2F8E0   0B 00 F2 00 0F 00 F2 00 13 00 14 25 90 42 94 00
2F8F0   7A 00 FC 00 24 00 B2 25 88 00 24 00 52 27 88 00
2F900   F2 00 0B 00 F2 00 0F 00 F2 00 13 00 14 25 A8 42
2F910   94 00 24 00 30 41 94 00 8A 3A 94 00 7A 00 FC 00
2F920   56 41 22 00 1E 32 9E 00 FC 00 24 00 56 41 58 0A
2F930   AC 00 2E 00 0B 00 54 00 01 00 4F 02 2D 01 FC 00
2F940   24 00 56 41 BC 42 AC 00 2E 00 17 00 30 41 24 00
2F950   30 41 1C 25 BC 00 9E 00 54 00 01 00 4F 02 2D 01
2F960   FC 00 24 00 56 41 C2 42 AC 00 2E 00 17 00 30 41
2F970   24 00 30 41 1C 25 BA 00 9E 00 54 00 01 00 4F 02
2F980   2D 01 FC 00 24 00 56 41 C8 42 AC 00 56 41 CE 42
2F990   AC 00 C8 00 2E 00 07 00 4E 00 46 00 FC 00 24 00
2F9A0   56 41 C4 26 AC 00 2E 00 0B 00 54 00 01 00 6B 01
2F9B0   D3 00 FC 00 54 00 01 00 1F 03 59 01 FC 00 24 00
2F9C0   B4 09 88 00 D2 00 24 00 E2 06 24 00 46 38 38 00
2F9D0   88 00 D2 00 F4 00 01 00 FE 02 FC 00 24 00 10 25
2F9E0   88 00 D2 00 24 00 E2 06 24 00 46 38 38 00 88 00
2F9F0   D2 00 F4 00 01 00 FE 02 24 00 58 25 88 00 24 00
2FA00   52 27 88 00 F2 00 0B 00 F2 00 0F 00 F2 00 13 00
2FA10   14 25 D4 42 94 00 24 00 24 00 A8 05 30 00 34 41
2FA20   C6 00 94 00 7A 00 24 00 24 00 A8 05 30 00 34 41
2FA30   C6 00 B4 09 B0 00 2E 00 0B 00 54 00 01 00 9B 04
2FA40   E1 01 FC 00 F4 00 01 00 24 00 E2 06 24 00 46 38
2FA50   38 00 88 00 D2 00 8A 03 24 00 A4 05 24 00 34 41
2FA60   32 00 FC 00 24 00 A4 05 26 00 26 00 22 00 24 00
2FA70   1C 25 8E 00 E0 42 64 25 BE 00 D2 00 1C 25 BA 00
2FA80   64 00 32 00 FC 00 F4 00 01 00 24 00 E2 06 24 00
2FA90   46 38 38 00 88 00 D2 00 6C 03 FC 00 56 41 22 00
2FAA0   1E 32 9E 00 24 00 56 41 9C 27 AE 00 2E 00 05 00
2FAB0   46 00 FC 00 54 00 01 00 DB 03 A5 01 FC 00 F2 00
2FAC0   03 00 2C 29 FC 00 F4 00 03 00 E8 42 3A 03 FC 00
2FAD0   56 41 22 00 1E 32 9E 00 24 00 56 41 9C 27 AC 00
2FAE0   2E 00 0B 00 54 00 01 00 CF 04 9F 02 FC 00 2C 41
2FAF0   24 00 1C 25 9E 00 3C 41 24 00 1C 25 9E 00 20 00
2FB00   24 00 50 25 88 00 62 00 60 00 0F 00 50 41 24 00
2FB10   3C 41 38 00 24 00 B4 09 9E 00 5E 00 FC 00 F2 00
2FB20   03 00 2C 29 FC 00 24 00 4C 25 88 00 24 00 52 27
2FB30   88 00 F2 00 0B 00 F2 00 0F 00 F2 00 13 00 14 25
2FB40   F2 42 94 00 7A 00 FC 00 24 00 B2 25 88 00 24 00
2FB50   52 27 88 00 F2 00 0B 00 F2 00 0F 00 F2 00 13 00
2FB60   14 25 1C 43 94 00 FC 00 24 00 2C 41 A0 27 AC 00
2FB70   2E 00 0B 00 54 00 01 00 CF 05 21 03 FC 00 4A 00
2FB80   58 0A 94 00 72 00 5C 41 78 00 38 41 26 00 28 00
2FB90   5C 41 8E 00 9E 00 24 00 38 41 B4 09 AC 00 2E 00
2FBA0   0B 00 54 00 01 00 CF 05 21 03 FC 00 50 41 24 00
2FBB0   2C 41 38 00 24 00 38 41 9E 00 2C 41 24 00 2C 41
2FBC0   1C 25 BA 00 9E 00 54 00 01 00 1D 05 A9 02 FC 00
2FBD0   24 00 B4 09 88 00 D2 00 24 00 E2 06 24 00 46 38
2FBE0   38 00 88 00 D2 00 F4 00 01 00 FE 02 FC 00 F4 00
2FBF0   01 00 24 00 E2 06 24 00 46 38 38 00 88 00 D2 00
2FC00   8A 03 24 00 A4 05 24 00 34 41 32 00 24 00 48 25
2FC10   88 00 24 00 52 27 88 00 F2 00 0B 00 F2 00 0F 00
```

```
2FC20   F2 00 13 00 14 25 FC 00 3C 41 24 00 1C 25 9E 00
2FC30   20 00 24 00 2C 41 1C 25 BC 00 88 00 62 00 60 00
2FC40   23 00 FC 00 24 00 A4 05 24 00 50 41 24 00 3C 41
2FC50   38 00 32 00 FC 00 24 00 50 41 24 00 3C 41 38 00
2FC60   94 00 FC 00 5E 00 FC 00 F4 00 01 00 24 00 E2 06
2FC70   24 00 46 38 38 00 88 00 D2 00 6C 03 FC 00 24 00
2FC80   10 25 88 00 D2 00 24 00 E2 06 24 00 46 38 38 00
2FC90   88 00 D2 00 F4 00 01 00 FE 02 24 00 24 00 A8 05
2FCA0   30 00 34 41 C6 00 B4 09 B0 00 2E 00 0B 00 54 00
2FCB0   01 00 1D 07 8F 03 FC 00 24 00 38 26 88 00 24 00
2FCC0   52 27 88 00 F2 00 0B 00 F2 00 0F 00 F2 00 13 00
2FCD0   14 25 34 43 94 00 7A 00 FC 00 24 00 60 25 88 00
2FCE0   24 00 52 27 88 00 F2 00 0B 00 F2 00 0F 00 F2 00
2FCF0   13 00 14 25 54 43 94 00 7A 00 FC 00 24 00 58 25
2FD00   88 00 24 00 52 27 88 00 F2 00 0B 00 F2 00 0F 00
2FD10   F2 00 13 00 14 25 76 43 94 00 7A 00 FC 00 56 41
2FD20   22 00 1E 32 9E 00 24 00 56 41 58 0A AC 00 2E 00
2FD30   05 00 46 00 FC 00 24 00 56 41 9A 43 AC 00 56 41
2FD40   A0 43 AC 00 C8 00 2E 00 11 00 F2 00 03 00 2C 29
2FD50   54 00 01 00 CF 05 21 03 FC 00 24 00 56 41 C4 26
2FD60   AC 00 2E 00 05 00 46 00 FC 00 24 00 56 41 B6 29
2FD70   AC 00 56 41 28 3A AC 00 C8 00 2E 00 08 00 54 00
2FD80   01 00 ED 04 A5 02 FC 00 54 00 01 00 7D 06 7B 03
2FD90   FC 00 02 00 7A 00 FC 00 24 00 5C 25 88 00 24 00
2FDA0   00 00 24 00 50 25 88 00 D2 00 24 00 E2 06 24 00
2FDB0   46 38 38 00 1C 25 BA 00 88 00 D2 00 F4 00 01 00
2FDC0   FE 02 FC 00 F2 00 03 00 2C 29 24 00 A6 25 88 00
2FDD0   24 00 A2 25 88 00 F2 00 0B 00 F2 00 0F 00 F2 00
2FDE0   13 00 14 25 0E 3A 94 00 7A 00 FC 00 24 00 54 25
2FDF0   88 00 24 00 86 27 88 00 F2 00 0B 00 F2 00 0F 00
2FE00   F2 00 13 00 14 25 BC 43 94 00 7A 00 FC 00 24 00
2FE10   B2 25 88 00 24 00 86 27 88 00 F2 00 0B 00 F2 00
2FE20   0F 00 F2 00 13 00 14 25 D2 43 94 00 7A 00 FC 00
2FE30   24 00 EC 25 88 00 24 00 86 27 88 00 F2 00 0B 00
2FE40   F2 00 0F 00 F2 00 13 00 14 25 E8 43 94 00 7A 00
2FE50   FC 00 24 00 4C 25 88 00 24 00 86 27 88 00 F2 00
2FE60   0B 00 F2 00 0F 00 F2 00 13 00 14 25 04 44 94 00
2FE70   7A 00 FC 00 24 00 5C 25 88 00 24 00 86 27 88 00
2FE80   F2 00 0B 00 F2 00 0F 00 F2 00 13 00 14 25 28 44
2FE90   94 00 7A 00 FC 00 24 00 48 25 88 00 24 00 86 27
2FEA0   88 00 F2 00 0B 00 F2 00 0F 00 F2 00 13 00 14 25
2FEB0   34 44 94 00 7A 00 FC 00 24 00 38 26 88 00 24 00
2FEC0   86 27 88 00 F2 00 0B 00 F2 00 0F 00 F2 00 13 00
2FED0   14 25 E2 38 94 00 7A 00 FC 00 24 00 38 26 88 00
2FEE0   24 00 F8 31 88 00 F2 00 0B 00 F2 00 0F 00 F2 00
2FEF0   13 00 14 25 24 00 22 00 DC 01 2E 00 13 00 4A 00
2FF00   9C 27 94 00 72 00 B6 43 78 00 2A 00 0B 00 54 00
2FF10   01 00 39 01 2D 01 FC 00 AA 43 26 00 28 00 B6 43
2FF20   8E 00 9E 00 24 00 AA 43 1C 25 B4 00 AA 43 E2 25
2FF30   B0 00 C8 00 2E 00 2B 00 24 00 38 26 88 00 24 00
2FF40   F8 31 88 00 F2 00 0B 00 F2 00 0F 00 F2 00 13 00
2FF50   14 25 F2 38 94 00 7A 00 54 00 01 00 17 01 19 01
2FF60   FC 00 24 00 AA 43 54 25 AC 00 2E 00 0B 00 54 00
2FF70   01 00 01 00 51 00 FC 00 24 00 AA 43 B2 25 AC 00
2FF80   2E 00 05 00 02 00 FC 00 24 00 AA 43 56 00 07 00
2FF90   0B 02 91 01 7B 03 59 02 EB 04 21 03 4B 05 E9 03
2FFA0   FC 00 54 00 01 00 23 00 C9 00 FC 00 F2 00 03 00
2FFB0   2C 29 24 00 B2 25 88 00 24 00 86 27 88 00 F2 00
2FFC0   0B 00 F2 00 0F 00 F2 00 13 00 14 25 CC 3C 94 00
2FFD0   FC 00 4A 00 9C 27 94 00 72 00 B6 43 78 00 A6 43
2FFE0   26 00 28 00 B6 43 8E 00 9E 00 24 00 A6 43 1C 25
2FFF0   B4 00 A6 43 B8 07 B0 00 C8 00 2E 00 2B 00 24 00
30000   B2 25 88 00 24 00 AE 25 88 00 F2 00 0B 00 F2 00
30010   0F 00 F2 00 13 00 14 25 F2 38 94 00 7A 00 54 00
30020   01 00 0B 02 9B 01 FC 00 F4 00 03 00 24 00 B2 43
30030   88 00 D2 00 24 00 46 38 A6 43 BA 00 1C 25 BC 00
30040   88 00 D2 00 0A 01 FC 00 24 00 A6 43 EC 25 BA 00
```

| | | | | | | | | | | | | | | | | |
|---|---|---|---|---|---|---|---|---|---|---|---|---|---|---|---|---|
| 30050 | 88 | 00 | D2 | 00 | 24 | 00 | E2 | 06 | 24 | 00 | 46 | 38 | 38 | 00 | 88 | 00 |
| 30060 | D2 | 00 | F4 | 00 | 01 | 00 | FE | 02 | FC | 00 | 24 | 00 | 38 | 26 | 88 | 00 |
| 30070 | 24 | 00 | 86 | 27 | 88 | 00 | F2 | 00 | 0B | 00 | F2 | 00 | 0F | 00 | F2 | 00 |
| 30080 | 13 | 00 | 14 | 25 | 40 | 44 | 94 | 00 | 7A | 00 | FC | 00 | 24 | 00 | 60 | 25 |
| 30090 | 88 | 00 | 24 | 00 | 86 | 27 | 88 | 00 | F2 | 00 | 0B | 00 | F2 | 00 | 0F | 00 |
| 300A0 | F2 | 00 | 13 | 00 | 14 | 25 | FC | 00 | 58 | 00 | 29 | 00 | 1C | 00 | 0A | 00 |
| 300B0 | 24 | 00 | 22 | 00 | DC | 01 | 3C | 00 | FC | 00 | C2 | 42 | 94 | 00 | 24 | 00 |
| 300C0 | EC | 25 | 24 | 00 | 62 | 00 | 40 | 00 | 94 | 00 | 24 | 00 | E4 | 2F | 88 | 00 |
| 300D0 | 5A | 01 | FC | 00 | 5C | 00 | FC | 00 | 24 | 00 | A6 | 43 | 1C | 25 | BC | 00 |
| 300E0 | 88 | 00 | D2 | 00 | 24 | 00 | E2 | 06 | 24 | 00 | 46 | 38 | 38 | 00 | 88 | 00 |
| 300F0 | D2 | 00 | F4 | 00 | 01 | 00 | FE | 02 | FC | 00 | F4 | 00 | 05 | 00 | 24 | 00 |
| 30100 | B2 | 43 | 88 | 00 | D2 | 00 | 24 | 00 | 46 | 38 | A6 | 43 | BA | 00 | 1C | 25 |
| 30110 | BC | 00 | 88 | 00 | D2 | 00 | 0A | 01 | 46 | 00 | FC | 00 | F2 | 00 | 03 | 00 |
| 30120 | 2C | 29 | 24 | 00 | B2 | 25 | 88 | 00 | 24 | 00 | 86 | 27 | 88 | 00 | F2 | 00 |
| 30130 | 0B | 00 | F2 | 00 | 0F | 00 | F2 | 00 | 13 | 00 | 14 | 25 | 4E | 44 | 94 | 00 |
| 30140 | FC | 00 | 4A | 00 | 58 | 0A | 94 | 00 | 72 | 00 | B6 | 43 | 78 | 00 | A6 | 43 |
| 30150 | 26 | 00 | 28 | 00 | B6 | 43 | 8E | 00 | 9E | 00 | 24 | 00 | A6 | 43 | 1C | 25 |
| 30160 | B4 | 00 | A6 | 43 | B8 | 09 | B0 | 00 | C8 | 00 | 2E | 00 | 2B | 00 | 24 | 00 |
| 30170 | B2 | 25 | 88 | 00 | 24 | 00 | AE | 25 | 88 | 00 | F2 | 00 | 0B | 00 | F2 | 00 |
| 30180 | 0F | 00 | F2 | 00 | 13 | 00 | 14 | 25 | F2 | 38 | 94 | 00 | 7A | 00 | 54 | 00 |
| 30190 | 01 | 00 | 7B | 03 | 6D | 02 | FC | 00 | F4 | 00 | 03 | 00 | 24 | 00 | AE | 43 |
| 301A0 | 88 | 00 | D2 | 00 | 24 | 00 | 46 | 38 | A6 | 43 | BA | 00 | 1C | 25 | BC | 00 |
| 301B0 | 88 | 00 | D2 | 00 | 0A | 01 | FC | 00 | 24 | 00 | A6 | 43 | C0 | 26 | BA | 00 |
| 301C0 | 88 | 00 | D2 | 00 | 24 | 00 | E2 | 06 | 24 | 00 | 46 | 38 | 38 | 00 | 88 | 00 |
| 301D0 | D2 | 00 | F4 | 00 | 01 | 00 | FE | 02 | FC | 00 | 24 | 00 | 38 | 26 | 88 | 00 |
| 301E0 | 24 | 00 | 86 | 27 | 88 | 00 | F2 | 00 | 0B | 00 | F2 | 00 | 0F | 00 | F2 | 00 |
| 301F0 | 13 | 00 | 14 | 25 | 68 | 44 | 94 | 00 | 7A | 00 | FC | 00 | 24 | 00 | 60 | 25 |
| 30200 | 88 | 00 | 24 | 00 | 86 | 27 | 88 | 00 | F2 | 00 | 0B | 00 | F2 | 00 | 0F | 00 |
| 30210 | F2 | 00 | 13 | 00 | 14 | 25 | FC | 00 | 58 | 00 | 29 | 00 | 1C | 00 | 0A | 00 |
| 30220 | 24 | 00 | 22 | 00 | DC | 01 | 3C | 00 | FC | 00 | C2 | 42 | 94 | 00 | 24 | 00 |
| 30230 | EC | 25 | 24 | 00 | 62 | 00 | 40 | 00 | 94 | 00 | 24 | 00 | E4 | 2F | 88 | 00 |
| 30240 | 5A | 01 | FC | 00 | 5C | 00 | FC | 00 | 24 | 00 | A6 | 43 | 10 | 25 | 5A | 00 |
| 30250 | 88 | 00 | D2 | 00 | 24 | 00 | E2 | 06 | 24 | 00 | 46 | 38 | 38 | 00 | 88 | 00 |
| 30260 | D2 | 00 | F4 | 00 | 01 | 00 | FE | 02 | FC | 00 | F4 | 00 | 05 | 00 | 24 | 00 |
| 30270 | AE | 43 | 88 | 00 | D2 | 00 | 24 | 00 | 46 | 38 | A6 | 43 | BA | 00 | 1C | 25 |
| 30280 | BC | 00 | 88 | 00 | D2 | 00 | 0A | 01 | 46 | 00 | FC | 00 | 24 | 00 | 38 | 26 |
| 30290 | 88 | 00 | 24 | 00 | 86 | 27 | 88 | 00 | F2 | 00 | 0B | 00 | F2 | 00 | 0F | 00 |
| 302A0 | F2 | 00 | 13 | 00 | 14 | 25 | 74 | 44 | 94 | 00 | 7A | 00 | FC | 00 | 24 | 00 |
| 302B0 | 60 | 25 | 88 | 00 | 24 | 00 | 86 | 27 | 88 | 00 | F2 | 00 | 0B | 00 | F2 | 00 |
| 302C0 | 0F | 00 | F2 | 00 | 13 | 00 | 14 | 25 | 92 | 44 | 94 | 00 | FC | 00 | 4A | 00 |
| 302D0 | 9C | 27 | 94 | 00 | 72 | 00 | B6 | 43 | 78 | 00 | B2 | 43 | 26 | 00 | 28 | 00 |
| 302E0 | B6 | 43 | 8E | 00 | 9E | 00 | FC | 00 | 46 | 00 | FC | 00 | 24 | 00 | 38 | 26 |
| 302F0 | 28 | 00 | 24 | 00 | 86 | 27 | 88 | 00 | F2 | 00 | 0B | 00 | F2 | 00 | 0F | 00 |
| 30300 | F2 | 00 | 13 | 00 | 14 | 25 | A4 | 44 | 94 | 00 | 7A | 00 | FC | 00 | 24 | 00 |
| 30310 | 60 | 25 | 88 | 00 | 24 | 00 | 86 | 27 | 88 | 00 | F2 | 00 | 0B | 00 | F2 | 00 |
| 30320 | 0F | 00 | F2 | 00 | 13 | 00 | 14 | 25 | C6 | 44 | 94 | 00 | FC | 00 | 4A | 00 |
| 30330 | 9C | 27 | 94 | 00 | 72 | 00 | B6 | 43 | 78 | 00 | AE | 43 | 26 | 00 | 28 | 00 |
| 30340 | B6 | 43 | 8E | 00 | 9E | 00 | FC | 00 | 46 | 00 | FC | 00 | 02 | 00 | 54 | 00 |
| 30350 | 00 | 00 | 69 | 38 | 00 | 00 | 7E | 38 | 68 | 07 | 24 | 00 | 46 | 38 | 38 | 00 |
| 30360 | 9E | 00 | FC | 00 | 24 | 00 | 62 | 38 | B4 | 09 | AC | 00 | 2E | 00 | 07 | 00 |
| 30370 | 7E | 38 | 9C | 00 | FC | 00 | 24 | 00 | 5C | 25 | 88 | 00 | D2 | 00 | 24 | 00 |
| 30380 | E2 | 06 | 24 | 00 | 46 | 38 | 38 | 00 | 88 | 00 | D2 | 00 | F4 | 00 | 03 | 00 |
| 30390 | FE | 02 | 24 | 00 | 32 | 25 | 88 | 00 | 5A | 01 | FC | 00 | 72 | 38 | 24 | 00 |
| 303A0 | 24 | 00 | A8 | 05 | 30 | 00 | 6A | 0A | C6 | 00 | 9E | 00 | 24 | 00 | 72 | 38 |
| 303B0 | B4 | 09 | AC | 00 | 2E | 00 | 0B | 00 | 72 | 38 | 24 | 00 | 50 | 25 | 9E | 00 |
| 303C0 | FC | 00 | 7A | 38 | 24 | 00 | 1C | 25 | 9E | 00 | 20 | 00 | 24 | 00 | 72 | 38 |
| 303D0 | 88 | 00 | 62 | 00 | 60 | 00 | 9B | 00 | FC | 00 | 24 | 00 | A4 | 05 | 24 | 00 |
| 303E0 | 48 | 25 | 32 | 00 | 24 | 00 | 32 | 25 | 88 | 00 | 5A | 01 | 76 | 38 | 24 | 00 |
| 303F0 | 24 | 00 | A8 | 05 | 30 | 00 | 6A | 0A | C6 | 00 | 9E | 00 | FC | 00 | 24 | 00 |
| 30400 | 76 | 38 | 48 | 25 | B4 | 00 | 2E | 00 | 21 | 00 | 7E | 38 | 28 | 00 | 7E | 38 |
| 30410 | 24 | 00 | 76 | 38 | AE | 25 | BA | 00 | 24 | 00 | 62 | 00 | 40 | 00 | 9E | 00 |
| 30420 | 54 | 00 | 01 | 00 | 21 | 01 | F1 | 00 | FC | 00 | 24 | 00 | 76 | 38 | 48 | 25 |
| 30430 | AC | 00 | 2E | 00 | 0D | 00 | 7E | 38 | 28 | 00 | 7E | 38 | DE | 25 | 9E | 00 |
| 30440 | FC | 00 | 24 | 00 | 76 | 38 | C0 | 26 | AC | 00 | 2E | 00 | 0D | 00 | 7E | 38 |
| 30450 | 28 | 00 | 7E | 38 | C4 | 26 | 9E | 00 | FC | 00 | 24 | 00 | 76 | 38 | 38 | 26 |
| 30460 | AC | 00 | 2E | 00 | 0D | 00 | 7E | 38 | 28 | 00 | 7E | 38 | CA | 26 | 9E | 00 |
| 30470 | FC | 00 | 3E | 00 | FC | 00 | F4 | 00 | 03 | 00 | 24 | 00 | E2 | 06 | 24 | 00 |

```
30480    46 38 36 00 88 00 D2 00 6C 03 FC 00 68 07 24 00
30490    46 38 38 00 7E 3B 9E 00 FC 00 02 00 F2 00 13 00
304A0    00 00 24 00 22 00 24 00 E2 06 24 00 46 38 38 00
304B0    88 00 D2 00 26 03 1C 25 AC 00 22 00 4C 05 1C 25
304C0    AC 00 C6 00 2E 00 09 00 F4 00 01 00 38 05 FC 00
304D0    24 00 58 25 88 00 D2 00 24 00 E2 06 24 00 46 38
```

We claim:

1. A method of transmitting an information transmission to an information receiver in an information transmission network including a plurality of connected information transmission systems with information transmissions being transmitted between the systems with a plurality of the information transmission systems including a service and a transmitter with the information transmissions being on at least one channel selected from a plurality of channels on which information transmission may be broadcast to the information receivers in the network and occurring only in one direction from the transmitter to the information receiver comprising:

(a) programming the information receiver by at least one RF transmission transmitted by a broadcast of a RF carrier on at least one first channel from a transmitter of one of the information transmission systems to the information receiver to receive information transmissions on at least one second channel to be broadcast by at least one other information transmission system which has been determined prior to initiation of the broadcast on the at least one first channel of the at least one second channel, an area containing the at least one other information transmission system has been stored by the one information transmission system in response to information that the information receiver is to be transported from broadcast range of the one information transmission system into an area which contains the at least one other information transmission system broadcasting on the at least one second channel and the broadcast of the RF carrier on the at least one first channel to program the information receiver to receive transmissions on the at least one second channel has been terminated to stop all communication with the information receiver on any channel prior to initiation of a broadcast on the at least one second channel to the information receiver from the at least one other information transmission system;

(b) transporting the information receiver from broadcast range of the transmitter of the one information system, which broadcast the RF carrier causing the information receiver to be programmed to receive information transmissions on the at least one second channel, to broadcast range of the transmitter of the at least one other information transmission system where an information transmission is to be received on the at least one second channel; and (c) transmitting an information transmission from the one information transmission system to the transmitter of the at least one other information transmission system and transmitting the information transmission from the transmitter of at least one other information transmission system on the at least one programmed second channel to the information receiver.

2. A method in accordance with claim 1 wherein:

the plurality of information transmission systems comprise a radio common carrier service.

3. A method in accordance with claim 2 wherein:

the radio common carrier service is a local service.

4. A method in accordance with claim 3 wherein:

the RF transmission is a channel programming command.

5. A method in accordance with claim 1 wherein:

the plurality of information transmission systems further comprise a plurality of subscriber files with a subscriber file identifying a subscriber of the information transmission system with an identification number and containing any area destination to which the information transmission is to be transmitted from the one information transmission system by the network for broadcast by the at least one other information transmission system with the area destination of an information transmission in the network being programmable prior to transporting the information receiver from broadcast range of the one information transmission system;

the plurality of information transmission systems store a frequency file of at least one second channel of at least one information transmission system of the plurality of information transmission systems located within the area destination to which an information transmission is to be transmitted when the information receiver is transported; and the RF transmission programs the information receiver to receive the at least one second channel from at least one second channel stored in the frequency file.

6. A method in accordance with claim 5 wherein:

the RF transmission programs the information receiver to receive at least one second channel of each of the other information transmission systems located within at least one area destination.

7. A method in accordance with claim 5 wherein:

the area destination is programmable to store a plurality of area destinations; and the RF transmission programs the information receiver to receive at least one channel second stored within the frequency file for a plurality of area destinations.

8. A method in accordance with claim 6 wherein:

the area destination is programmable to store a plurality of area destinations; and the RF transmission programs the information receiver to receive at least one second channel stored within the frequency file for a plurality of area destinations.

9. A method of transmitting a page in accordance with claim 2 wherein:

the plurality of information transmission systems further comprise a plurality of subscriber files with a subscriber file identifying a subscriber of the information transmission system with an identification number and containing any area destination to which the information transmission is to be transmitted from the one information transmission system by the network for broadcast by the at least one other information transmission system with the area destination of a data transmission in the network being programmable prior to transporting the information receiver from broadcast range of the one information transmission system;

the plurality of information transmission systems store a frequency file of at least one second channel of at least one information transmission system of the plurality of information transmission systems located within the area destination to which an information transmission is to be transmitted when the information receiver is transported; and the RF transmission programs the information receiver to receive the at least one second channel from at least one second channel stored in the frequency file.

10. A method in accordance with claim 9 wherein:

the RF transmission programs the information receiver to receive at least one second channel of the other information transmission systems located within at least one area destination.

11. A method in accordance with claim 9 wherein:

the area destination is programmable to store a plurality of area destinations; and the RF transmission programs the information receiver to receive at least one second channel stored within the frequency file for a plurality of area destinations.

12. A method in accordance with claim 10 wherein:

the area destination is programmable to store a plurality of area destinations; and the RF transmission programs the information receiver to receive at least one second channel stored within the frequency file for a plurality of area destinations.

13. A method of transmitting a page in accordance with claim 3 wherein:

the plurality of information transmission systems further comprise a plurality of subscriber files with a subscriber file identifying a subscriber of the information transmission system with an identification number and containing any area destination to which the information transmission is to be transmitted from the one information transmission system by the network for broadcast by the at least one other information transmission system with the area destination of a data transmission in the network being programmable prior to transporting the information receiver from broadcast range of the one information transmission system;

the plurality of information transmission systems store a frequency file of at least one second channel of at least one information transmission system of the plurality of information transmission systems located within the area destination to which an information transmission is to be transmitted when the information receiver is transported; and the RF transmission programs the information receiver to receive the at least one second channel from at least one second channel stored in the frequency file.

14. A method in accordance with claim 13 wherein:

the RF transmission programs the information receiver to receive at least one second channel of the other information transmission systems located within at least one area destination.

15. A method in accordance with claim 13 wherein:

the area destination is programmable to store a plurality of area destinations; and the RF transmission programs the information receiver to receive at least one second channel stored within the frequency file for a plurality of area destinations.

16. A method in accordance with claim 14 wherein:

the area destination is programmable to store a plurality of area destinations; and the RF transmission programs the information receiver to receive at least one second channel stored within the frequency file for a plurality of area destinations.

17. A method of transmitting a page in accordance with claim 4 wherein:

the plurality of information transmission systems further comprise a plurality of subscriber files with a subscriber file identifying a subscriber of the information transmission system with an identification number and containing any area destination to which the information transmission is to be transmitted from the one information transmission system by the network for broadcast by the at least one other information transmission system with the area destination of a data transmission in the network being programmable prior to transporting the information receiver from broadcast range of the one information transmission system;

the plurality of information transmission systems store a frequency file of at least one second channel of at least one information transmission system of the plurality of information transmission systems located within the area destination to which an information transmission is to be transmitted when the information receiver is transported; and the RF transmission programs the information receiver to receive the at least one second channel from at least one second channel stored in the frequency file.

18. A method in accordance with claim 17 wherein:

the RF transmission programs the information receiver to receive at least one second channel of the other information transmission systems located within at least one area destination.

19. A method in accordance with claim 17 wherein:

the area destination is programmable to store a plurality of area destinations; and the RF transmission programs the receiver to receive at least one second channel stored within the frequency file for a plurality of area destinations.

20. A method in accordance with claim 18 wherein:

the area destination is programmable to store a plurality of area destinations; and the RF transmission programs the information receiver to receive at least one second channel stored within the frequency file for a plurality of area destinations.

21. A method in accordance with claim 5 wherein:

an area destination is programmable from anywhere in the network by a non-long distance telephone call specifying an area destination by a code.

22. A method in accordance with claim 21 wherein:

the code identifies an area of telephone service.

23. A method in accordance with claim 6 wherein:

an area destination is programmable from anywhere in the network by a non-long distance telephone call specifying an area destination by a code.

24. A method in accordance with claim 23 wherein:

the code identifies an area of telephone service.

25. A method in accordance with claim 7 wherein:

an area destination is programmable from anywhere in the network by a non-long distance telephone call specifying an area destination by a code.

26. A method in accordance with claim 25 wherein: the code identifies an area of telephone service.

27. A method in accordance with claim 8 wherein: an area destination is programmable from anywhere in the network by a non-long distance telephone call specifying an area destination by a code.

28. A method in accordance with claim 27 wherein: the code identifies an area of telephone service.

29. A method in accordance with claim 9 wherein: an area destination is programmable from anywhere in the network by a non-long distance telephone call specifying an area destination by a code.

30. A method in accordance with claim 29 wherein: the code identifies an area of telephone service.

31. A method in accordance with claim 10 wherein: an area destination is programmable from anywhere in the network by a non-long distance telephone call specifying an area destination by a code.

32. A method in accordance with claim 31 wherein: the code identifies an area of telephone service.

33. A method in accordance with claim 11 wherein: an area destination is programmable from anywhere in the network by a non-long distance telephone call specifying an area destination by a code.

34. A method in accordance with claim 33 wherein: the code identifies an area of telephone service.

35. A method in accordance with claim 12 wherein: an area destination is programmable from anywhere in the network by a non-long distance telephone call specifying an area destination by a code.

36. A method in accordance with claim 31 wherein: the code identifies an area of telephone service.

37. A method in accordance with claim 13 wherein: an area destination is programmable from anywhere in the network by a non-long distance telephone call specifying an area destination by a code.

38. A method in accordance with claim 37 wherein: the code identifies an area of telephone service.

39. A method in accordance with claim 14 wherein: an area destination is programmable from anywhere in the network by a non-long distance telephone call specifying an area destination by a code.

40. A method in accordance with claim 39 wherein: the code identifies an area of telephone service.

41. A method in accordance with claim 15 wherein: an area destination is programmable from anywhere in the network by a non-long distance telephone call specifying an area destination by a code.

42. A method in accordance with claim 41 wherein: the code identifies an area of telephone service.

43. A method in accordance with claim 16 wherein: an area destination is programmable from anywhere in the network by a non-long distance telephone call specifying an area destination by a code.

44. A method in accordance with claim 43 wherein: the code identifies an area of telephone service.

45. A method in accordance with claim 17 wherein: an area destination is programmable from anywhere in the network by a non-long distance telephone call specifying an area destination by a code.

46. A method in accordance with claim 45 wherein: the code identifies an area of telephone service.

47. A method in accordance with claim 18 wherein: an area destination is programmable from anywhere in the network by a non-long distance telephone call specifying an area destination by a code.

48. A method in accordance with claim 47 wherein: the code identifies an area of telephone service.

49. A method in accordance with claim 19 wherein: an area destination is programmable from anywhere in the network by a non-long distance telephone call specifying an area destination by a code.

50. A method in accordance with claim 49 wherein: the code identifies an area of telephone service.

* * * * *